US008073565B2

(12) United States Patent
Johnson

(10) Patent No.: US 8,073,565 B2
(45) Date of Patent: Dec. 6, 2011

(54) SYSTEM AND METHOD FOR ALERTING A FIRST MOBILE DATA PROCESSING SYSTEM NEARBY A SECOND MOBILE DATA PROCESSING SYSTEM

(75) Inventor: William J. Johnson, Flower Mount, TX (US)

(73) Assignee: Apple Inc., Cupertino, CA (US)

( * ) Notice: Subject to any disclaimer, the term of this patent is extended or adjusted under 35 U.S.C. 154(b) by 670 days.

(21) Appl. No.: 11/827,119

(22) Filed: Jul. 10, 2007

(65) Prior Publication Data

US 2009/0031006 A1 Jan. 29, 2009

Related U.S. Application Data

(62) Division of application No. 11/207,080, filed on Aug. 18, 2005, which is a division of application No. 10/823,386, filed on Apr. 12, 2004, now Pat. No. 7,187,997, which is a division of application No. 10/167,532, filed on Jun. 11, 2002, now Pat. No. 6,731,238, which is a division of application No. 09/589,328, filed on Jun. 7, 2000, now Pat. No. 6,456,234.

(51) Int. Cl.
*G06F 19/00* (2011.01)

(52) U.S. Cl. ........ 700/245; 701/200; 701/209; 701/300; 709/218; 455/456.1; 455/456.3; 455/404.2; 455/427; 455/428

(58) Field of Classification Search .................. 700/245; 701/200, 209, 300; 342/357.09; 709/218; 455/456.1, 456.3, 404.2, 427, 428, 460
See application file for complete search history.

(56) References Cited

U.S. PATENT DOCUMENTS 4,644,351 A 2/1987 Zabarsky et al.
4,903,212 A 2/1990 Yokouchi et al.
4,907,159 A 3/1990 Mauge et al.

(Continued)

FOREIGN PATENT DOCUMENTS

BR 9904979 12/2000

(Continued)

OTHER PUBLICATIONS

Feddema et al., Cooperative Sentry Vehicles and Differential GPS Leapfrog, 2000, Internet, p. 1-12.*

(Continued)

*Primary Examiner* — James Trammell
*Assistant Examiner* — McDieunel Marc
(74) *Attorney, Agent, or Firm* — Fish & Richardson P.C.

(57) ABSTRACT

Provided is a fully automated web service with location based services generally involved in transmission of situational location dependent information to automatically located mobile receiving data processing systems. The web service communicates with a receiving data processing system in a manner by delivering information to the device when appropriate without the device requesting it at the time of delivery. There are varieties of configurations made by different user types of the web service for configuring information to be delivered, and for receiving the information. The web service maximizes anonymity of users, provides granular privacy control with a default of complete privacy, and supports user configurable privileges and features for desired web service behavior and interoperability. The web service is fully automated to eliminate human resources required to operate services. Integrated with the web service are enhanced location based services providing map solutions, alerts, sharing of novel services between users, and complete user control for managing heterogeneous device interoperability through the web service.

22 Claims, 295 Drawing Sheets

U.S. PATENT DOCUMENTS

| | | | |
|---|---|---|---|
| 4,999,783 | A | 3/1991 | Tenmoku et al. |
| 5,031,104 | A | 7/1991 | Ikeda et al. |
| 5,046,011 | A | 9/1991 | Kakihara et al. |
| 5,067,081 | A | 11/1991 | Person |
| 5,126,941 | A | 6/1992 | Gurmu et al. |
| 5,164,904 | A | 11/1992 | Sumner |
| 5,170,165 | A | 12/1992 | Iihoshi et al. |
| 5,173,691 | A | 12/1992 | Sumner |
| 5,182,555 | A | 1/1993 | Sumner |
| 5,187,810 | A | 2/1993 | Toneyama et al. |
| 5,195,031 | A | 3/1993 | Ordish |
| 5,208,763 | A | 5/1993 | Hong et al. |
| 5,218,629 | A | 6/1993 | Dumond, Jr. et al. |
| 5,243,652 | A | 9/1993 | Teare |
| 5,274,560 | A | 12/1993 | LaRue |
| 5,289,572 | A | 2/1994 | Yano et al. |
| 5,295,064 | A | 3/1994 | Malec et al. |
| 5,307,278 | A | 4/1994 | Hermans et al. |
| 5,317,311 | A | 5/1994 | Martell et al. |
| 5,337,044 | A | 8/1994 | Folger et al. |
| 5,339,391 | A | 8/1994 | Wroblewski et al. |
| 5,371,678 | A | 12/1994 | Nomura |
| 5,374,933 | A | 12/1994 | Kao |
| 5,379,057 | A | 1/1995 | Clough et al. |
| 5,390,125 | A | 2/1995 | Sennott et al. |
| 5,406,490 | A | 4/1995 | Braegas |
| 5,416,712 | A | 5/1995 | Geier et al. |
| 5,416,890 | A | 5/1995 | Beretta |
| 5,469,362 | A | 11/1995 | Hunt et al. |
| 5,479,600 | A | 12/1995 | Wroblewski et al. |
| 5,504,482 | A | 4/1996 | Schreder |
| 5,508,707 | A | 4/1996 | LeBlanc et al. |
| 5,510,801 | A | 4/1996 | Engelbrecht et al. |
| 5,519,760 | A | 5/1996 | Borkowski et al. |
| 5,523,950 | A | 6/1996 | Peterson |
| 5,537,460 | A | 7/1996 | Holliday, Jr. et al. |
| 5,539,395 | A | 7/1996 | Buss |
| 5,539,647 | A | 7/1996 | Shibata et al. |
| 5,552,989 | A | 9/1996 | Bertrand |
| 5,559,520 | A | 9/1996 | Barzeger et al. |
| 5,570,412 | A | 10/1996 | LeBlanc |
| 5,598,572 | A | 1/1997 | Tanikoshi et al. |
| 5,627,547 | A | 5/1997 | Ramaswamy et al. |
| 5,627,549 | A | 5/1997 | Park |
| 5,628,050 | A | 5/1997 | McGraw |
| 5,630,206 | A | 5/1997 | Urban et al. |
| 5,636,245 | A | 6/1997 | Ernst |
| 5,642,303 | A | 6/1997 | Small |
| 5,646,853 | A | 7/1997 | Takahashi et al. |
| 5,654,908 | A | 8/1997 | Yokoyama |
| 5,663,732 | A | 9/1997 | Stangeland et al. |
| 5,675,362 | A | 10/1997 | Clough et al. |
| 5,675,573 | A | 10/1997 | Karol et al. |
| 5,677,837 | A | 10/1997 | Reynolds |
| 5,684,859 | A | 11/1997 | Chanroo et al. |
| 5,689,252 | A | 11/1997 | Ayanoglu et al. |
| 5,689,270 | A | 11/1997 | Kelley et al. |
| 5,689,431 | A | 11/1997 | Rudow et al. |
| 5,708,478 | A | 1/1998 | Tognazzini |
| 5,717,392 | A | 2/1998 | Eldridge |
| 5,732,074 | A | 3/1998 | Spaur et al. |
| 5,742,666 | A | 4/1998 | Alpert |
| 5,745,865 | A | 4/1998 | Rostoker et al. |
| 5,748,109 | A | 5/1998 | Kosaka et al. |
| 5,752,186 | A | 5/1998 | Malackowski et al. |
| 5,754,430 | A | 5/1998 | Sawada |
| 5,758,049 | A | 5/1998 | Johnson et al. |
| 5,760,773 | A | 6/1998 | Berman et al. |
| 5,767,795 | A | 6/1998 | Schaphorst |
| 5,774,824 | A | 6/1998 | Streit et al. |
| 5,774,829 | A | 6/1998 | Cisneros et al. |
| 5,793,630 | A | 8/1998 | Theimer |
| 5,796,365 | A | 8/1998 | Lewis et al. |
| 5,796,613 | A | 8/1998 | Kato et al. |
| 5,806,018 | A | 9/1998 | Smith et al. |
| 5,825,306 | A | 10/1998 | Hiyokawa et al. |
| 5,825,884 | A | 10/1998 | Zdepski et al. |
| 5,831,552 | A | 11/1998 | Sogawa et al. |
| 5,835,061 | A | 11/1998 | Stewart |
| 5,839,086 | A | 11/1998 | Hirano |
| 5,845,227 | A | 12/1998 | Peterson |
| 5,848,373 | A | 12/1998 | DeLorme et al. |
| 5,862,244 | A | 1/1999 | Kleiner et al. |
| 5,867,110 | A | 2/1999 | Naito et al. |
| 5,870,686 | A | 2/1999 | Monson |
| 5,872,526 | A | 2/1999 | Tognazzini |
| 5,873,068 | A | 2/1999 | Beaumont et al. |
| 5,883,580 | A | 3/1999 | Briancon |
| 5,887,269 | A | 3/1999 | Brunts et al. |
| 5,892,454 | A | 4/1999 | Schipper et al. |
| 5,893,898 | A | 4/1999 | Tanimoto |
| 5,898,680 | A | 4/1999 | Johnstone |
| 5,899,954 | A | 5/1999 | Sato |
| 5,905,451 | A | 5/1999 | Sakashita |
| 5,908,465 | A | 6/1999 | Ito et al. |
| 5,910,799 | A | 6/1999 | Carpenter |
| 5,923,861 | A | 7/1999 | Bertram et al. |
| 5,933,094 | A | 8/1999 | Goss et al. |
| 5,933,100 | A | 8/1999 | Golding |
| 5,936,572 | A | 8/1999 | Loomis et al. |
| 5,938,721 | A | 8/1999 | Dussell et al. |
| 5,941,930 | A | 8/1999 | Morimoto et al. |
| 5,941,934 | A | 8/1999 | Sato |
| 5,946,618 | A | 8/1999 | Agre et al. |
| 5,948,040 | A | 9/1999 | DeLorme et al. |
| 5,948,041 | A | 9/1999 | Abo et al. |
| 5,948,061 | A | 9/1999 | Merriman et al. |
| 5,955,973 | A | 9/1999 | Anderson |
| 5,959,577 | A | 9/1999 | Fan |
| 5,959,580 | A | 9/1999 | Maloney et al. |
| 5,968,109 | A | 10/1999 | Israni et al. |
| 5,969,678 | A | 10/1999 | Stewart |
| 5,982,298 | A | 11/1999 | Lappenbusch et al. |
| 5,982,324 | A | 11/1999 | Watters et al. |
| 5,987,381 | A | 11/1999 | Oshizawa |
| 5,991,692 | A | 11/1999 | Spencer, II et al. |
| 5,999,126 | A | 12/1999 | Ito |
| 6,002,932 | A | 12/1999 | Kingdon et al. |
| 6,002,936 | A | 12/1999 | Roel-Ng et al. |
| 6,005,928 | A | 12/1999 | Johnson |
| 6,014,090 | A | 1/2000 | Rosen |
| 6,014,607 | A | 1/2000 | Yagyu et al. |
| 6,023,653 | A | 2/2000 | Ichimura et al. |
| 6,026,375 | A | 2/2000 | Hall et al. |
| 6,028,550 | A | 2/2000 | Froeberg et al. |
| 6,029,069 | A | 2/2000 | Takaki |
| 6,031,490 | A | 2/2000 | Forssen et al. |
| 6,041,280 | A | 3/2000 | Kohli et al. |
| 6,052,645 | A | 4/2000 | Harada |
| 6,058,350 | A | 5/2000 | Ihara |
| 6,064,335 | A | 5/2000 | Eschenbach |
| 6,067,502 | A | 5/2000 | Hayashida et al. |
| 6,069,570 | A | 5/2000 | Herring |
| 6,073,013 | A | 6/2000 | Agre et al. |
| 6,073,062 | A | 6/2000 | Hoshino et al. |
| 6,076,041 | A | 6/2000 | Watanabe |
| 6,078,818 | A | 6/2000 | Kingdon et al. |
| 6,081,206 | A | 6/2000 | Kielland |
| 6,085,090 | A | 7/2000 | Yee et al. |
| 6,085,148 | A | 7/2000 | Jamison |
| 6,087,965 | A | 7/2000 | Murphy |
| 6,088,594 | A | 7/2000 | Kingdon et al. |
| 6,091,956 | A | 7/2000 | Hollenberg |
| 6,091,957 | A | 7/2000 | Larkins |
| 6,092,076 | A | 7/2000 | McDonough et al. |
| 6,094,607 | A | 7/2000 | Diesel |
| 6,101,443 | A | 8/2000 | Kato |
| 6,104,090 | A | 8/2000 | Unger et al. |
| 6,104,931 | A | 8/2000 | Havinis et al. |
| 6,108,555 | A | 8/2000 | Maloney et al. |
| 6,111,541 | A | 8/2000 | Karmel |
| 6,115,754 | A | 9/2000 | Landgren |
| 6,119,014 | A | 9/2000 | Alperovich et al. |
| 6,122,520 | A | 9/2000 | Want et al. |
| 6,127,945 | A | 10/2000 | Mura-Smith |
| 6,128,482 | A | 10/2000 | Nixon et al. |
| 6,128,571 | A | 10/2000 | Ito et al. |

6,134,548 A 10/2000 Gottsman et al.
6,138,003 A 10/2000 Kingdon et al.
6,138,142 A 10/2000 Linsk
6,140,957 A 10/2000 Wilson et al.
6,151,309 A 11/2000 Busuioc et al.
6,151,498 A 11/2000 Roel-Ng et al.
6,154,152 A 11/2000 Ito
6,157,381 A 12/2000 Bates et al.
6,157,841 A 12/2000 Bolduc et al.
6,163,749 A 12/2000 McDonough et al.
6,166,627 A 12/2000 Reeley
6,167,266 A 12/2000 Havinis et al.
6,169,552 B1 1/2001 Endo et al.
6,175,740 B1 1/2001 Souissi et al.
6,177,905 B1 1/2001 Welch
6,177,938 B1 1/2001 Gould
6,181,934 B1 1/2001 Havinis et al.
6,185,427 B1 2/2001 Krasner et al.
6,188,959 B1 2/2001 Schupfner
6,195,557 B1 2/2001 Havinis et al.
6,195,609 B1 2/2001 Pilley et al.
6,199,014 B1 3/2001 Walker
6,199,045 B1 3/2001 Giniger
6,199,099 B1 3/2001 Gershman et al.
6,202,008 B1 3/2001 Beckert et al.
6,202,023 B1 3/2001 Hancock et al.
6,208,866 B1 3/2001 Rouhollahzadeh et al.
6,212,473 B1 4/2001 Stefan et al.
6,216,086 B1 4/2001 Seymour et al.
6,222,483 B1 4/2001 Twitchell et al.
6,233,518 B1 5/2001 Lee
6,236,365 B1 5/2001 LeBlanc et al.
6,236,933 B1 5/2001 Lang
6,246,948 B1 6/2001 Thakker
6,249,252 B1 6/2001 Dupray
6,252,543 B1 6/2001 Camp
6,252,544 B1 6/2001 Hoffberg
6,256,498 B1 7/2001 Ludwig
6,259,405 B1 7/2001 Stewart et al.
6,266,612 B1 7/2001 Dussell et al.
6,266,614 B1 7/2001 Alumbaugh
6,266,615 B1 7/2001 Jin
6,272,342 B1 8/2001 Havinis et al.
6,278,884 B1 8/2001 Kim
6,281,807 B1 8/2001 Kynast et al.
6,282,491 B1 8/2001 Bochmann et al.
6,282,496 B1 8/2001 Chowdhary
6,295,454 B1 9/2001 Havinis et al.
6,298,306 B1 10/2001 Suarez et al.
6,304,758 B1 10/2001 Iierbig et al.
6,313,761 B1 11/2001 Shinada
6,314,369 B1 11/2001 Ito et al.
6,314,406 B1 11/2001 O'Hagan et al.
6,317,684 B1 11/2001 Roeseler et al.
6,321,158 B1 11/2001 DeLorme et al.
6,323,846 B1 11/2001 Westerman et al.
6,324,692 B1 11/2001 Fiske
6,326,918 B1 12/2001 Stewart
6,332,127 B1 12/2001 Bandera et al.
6,339,437 B1 1/2002 Nielsen
6,343,317 B1 1/2002 Glorikian
6,345,288 B1 2/2002 Reed et al.
6,351,235 B1 2/2002 Stilp
6,353,398 B1 3/2002 Amin et al.
6,353,743 B1 3/2002 Karmel
6,353,837 B1 3/2002 Blumenau
6,356,761 B1 3/2002 Huttunen
6,356,763 B1 3/2002 Kangas et al.
6,356,836 B1 3/2002 Adolph
6,370,629 B1 4/2002 Hastings et al.
6,377,886 B1 4/2002 Gotou
6,381,465 B1 4/2002 Chern et al.
6,381,539 B1 4/2002 Shimazu
6,381,603 B1 4/2002 Chan et al.
6,385,458 B1 5/2002 Papadimitriou et al.
6,385,465 B1 5/2002 Yoshioka
6,385,535 B2 5/2002 Ohishi et al.
6,389,288 B1 5/2002 Kuwahara et al.
6,401,032 B1 6/2002 Jamison
6,405,034 B1 6/2002 Tijerino
6,405,123 B1 6/2002 Rennard et al.
6,411,899 B2 6/2002 Dussell et al.
6,414,635 B1 7/2002 Stewart et al.
6,415,207 B1 7/2002 Jones
6,415,220 B1 7/2002 Kovacs
6,415,227 B1 7/2002 Lin
6,427,115 B1 7/2002 Sekiyama
6,430,411 B1 8/2002 Lempio et al.
6,434,530 B1 8/2002 Sloane et al.
6,438,490 B2 8/2002 Ohta
6,449,485 B1 9/2002 Anzil
6,452,498 B2 9/2002 Stewart
6,456,234 B1 * 9/2002 Johnson .................. 342/357.48
6,456,956 B1 9/2002 Xiong
6,459,782 B1 10/2002 Bedrosian et al.
6,463,289 B1 10/2002 Havinis et al.
6,477,581 B1 11/2002 Carpenter
6,487,305 B2 11/2002 Kambe et al.
6,490,454 B1 12/2002 Kangas et al.
6,490,519 B1 12/2002 Lapidot et al.
6,505,046 B1 1/2003 Baker
6,505,048 B1 1/2003 Moles et al.
6,507,802 B1 1/2003 Payton et al.
6,516,197 B2 2/2003 Havinis et al.
6,519,463 B2 2/2003 Tendler
6,526,335 B1 2/2003 Treyz et al.
6,529,143 B2 3/2003 Mikkola et al.
6,535,140 B1 3/2003 Goss et al.
6,542,812 B1 4/2003 Obradovich et al.
6,542,819 B1 4/2003 Kovacs et al.
6,546,360 B1 4/2003 Gilbert et al.
6,552,682 B1 4/2003 Fan
6,563,430 B1 5/2003 Kemink et al.
6,564,143 B1 5/2003 Alewine et al.
6,571,279 B1 5/2003 Herz et al.
6,574,484 B1 6/2003 Carley
6,587,688 B1 7/2003 Chambers et al.
6,587,782 B1 7/2003 Nocek et al.
6,587,835 B1 7/2003 Treyz et al.
6,594,480 B1 7/2003 Montalvo et al.
6,611,687 B1 8/2003 Clark et al.
6,611,788 B1 8/2003 Hussa
6,615,131 B1 9/2003 Rennard et al.
6,615,213 B1 9/2003 Johnson
6,647,257 B2 11/2003 Owensby
6,650,902 B1 11/2003 Richton
6,667,963 B1 12/2003 Rantalainen et al.
6,671,377 B1 12/2003 Havinis et al.
6,677,894 B2 1/2004 Sheynblat et al.
6,680,694 B1 1/2004 Knockeart et al.
6,681,120 B1 1/2004 Kim
6,683,538 B1 1/2004 Wilkes, Jr.
6,697,018 B2 2/2004 Stewart
6,711,408 B1 3/2004 Raith
6,711,474 B1 3/2004 Treyz et al.
6,718,344 B2 4/2004 Hirono
6,721,572 B1 4/2004 Smith et al.
6,731,238 B2 * 5/2004 Johnson .................. 342/357.48
6,741,188 B1 5/2004 Miller et al.
6,741,926 B1 * 5/2004 Zhao et al. .................... 701/201
6,748,226 B1 6/2004 Wortham
6,748,318 B1 6/2004 Jones
6,750,883 B1 6/2004 Parupudi et al.
6,759,960 B2 7/2004 Stewart
6,762,772 B1 7/2004 Imamura et al.
6,766,174 B1 7/2004 Kenyon
6,813,501 B2 11/2004 Kinnunen et al.
6,813,503 B1 11/2004 Zillikens et al.
6,819,919 B1 11/2004 Tanaka
6,847,969 B1 1/2005 Mathai et al.
6,853,911 B1 2/2005 Sakarya
6,859,149 B1 2/2005 Ohta
6,868,074 B1 3/2005 Hanson
6,882,313 B1 * 4/2005 Fan et al. ...................... 342/457
6,888,536 B2 5/2005 Westerman et al.
6,909,902 B1 6/2005 Sawada et al.
6,912,398 B1 6/2005 Domnitz
6,914,626 B2 7/2005 Squibbs 6,915,208 B2 * 7/2005 Garin et al. .................. 701/213
6,948,656 B2 9/2005 Williams
6,954,735 B1 10/2005 Djupsjobacka et al.
6,957,072 B2 10/2005 Kangras et al.
6,999,779 B1 2/2006 Hashimoto
7,003,289 B1 2/2006 Kolls
7,009,556 B2 3/2006 Stewart
7,058,594 B2 6/2006 Stewart
7,076,255 B2 7/2006 Parupudi et al.
7,096,029 B1 8/2006 Parupudi et al.
7,103,470 B2 9/2006 Mintz
7,120,469 B1 10/2006 Urakawa
7,123,926 B2 10/2006 Himmelstein
7,146,298 B2 12/2006 Matomedi et al.
7,187,997 B2 3/2007 Johnson
7,200,409 B1 4/2007 Ichikawa et al.
7,200,566 B1 4/2007 Moore et al.
7,213,048 B1 5/2007 Parupudi et al.
7,215,967 B1 5/2007 Kransmo et al.
7,236,883 B2 * 6/2007 Garin et al. .................. 701/213
7,257,392 B2 8/2007 Tang et al.
7,260,378 B2 8/2007 Holland et al.
7,271,765 B2 9/2007 Stilp et al.
7,272,404 B2 9/2007 Overy et al.
7,274,332 B1 9/2007 Dupray
7,274,939 B2 9/2007 Ruutu et al.
7,280,822 B2 10/2007 Fraccaroli
7,295,925 B2 11/2007 Breed et al.
7,298,327 B2 * 11/2007 Dupray et al. ................ 342/451
7,313,467 B2 * 12/2007 Breed et al. ...................... 701/1
7,386,396 B2 * 6/2008 Johnson ....................... 701/300
7,395,031 B1 7/2008 Ritter
7,418,402 B2 8/2008 McCrossin et al.
7,421,486 B1 9/2008 Parupudi et al.
7,426,437 B2 9/2008 Breed et al.
7,483,944 B2 1/2009 Parupudi et al.
7,500,607 B2 3/2009 Williams
7,522,927 B2 4/2009 Fitch et al.
7,525,484 B2 * 4/2009 Dupray et al. ................ 342/450
7,545,281 B2 6/2009 Richards et al.
7,577,448 B2 * 8/2009 Pande et al. ............... 455/456.6
7,599,795 B1 10/2009 Blumberg et al.
7,663,502 B2 * 2/2010 Breed ..................... 340/825.72
7,710,290 B2 5/2010 Johnson
7,714,778 B2 5/2010 Dupray
7,743,074 B1 6/2010 Parupudi et al.
7,792,273 B2 * 9/2010 Fano et al. ............... 379/265.02
7,860,758 B2 12/2010 McCrossin et al.
2001/0018349 A1 8/2001 Kinnunen et al.
2001/0022558 A1 * 9/2001 Karr et al. .................... 342/450
2002/0032035 A1 3/2002 Teshima
2002/0035493 A1 3/2002 Mozayeny et al.
2002/0046069 A1 4/2002 Mozayeny et al.
2002/0046077 A1 4/2002 Mozayeny et al.
2002/0046084 A1 4/2002 Steele et al.
2002/0091991 A1 7/2002 Castro
2002/0164999 A1 * 11/2002 Johnson ....................... 455/456
2002/0167442 A1 11/2002 Taylor
2003/0014181 A1 * 1/2003 Myr ............................ 701/117
2003/0060212 A1 3/2003 Thomas
2003/0069683 A1 4/2003 Lapidot et al.
2003/0140136 A1 7/2003 Nakamura
2003/0148774 A1 8/2003 Naghian et al.
2003/0158655 A1 8/2003 Obradovich et al.
2003/0191578 A1 10/2003 Paulauskas et al.
2003/0222819 A1 * 12/2003 Karr et al. .................... 342/457
2004/0010358 A1 * 1/2004 Oesterling et al. ............. 701/49
2004/0104842 A1 6/2004 Drury et al.
2004/0151151 A1 8/2004 Kubler et al.
2004/0180669 A1 9/2004 Kall
2004/0228330 A1 11/2004 Kubler et al.
2004/0246940 A1 12/2004 Kubler et al.
2004/0252051 A1 * 12/2004 Johnson .................. 342/357.09
2004/0264442 A1 12/2004 Kubler et al.
2005/0002419 A1 1/2005 Doviak et al.
2005/0004838 A1 1/2005 Perkowski et al.
2005/0046584 A1 * 3/2005 Breed ..................... 340/825.72
2005/0134440 A1 6/2005 Breed
2005/0153681 A1 7/2005 Hanson
2005/0234637 A1 10/2005 Obradovich et al.
2006/0022048 A1 * 2/2006 Johnson .................... 235/462.1
2006/0025158 A1 * 2/2006 Leblanc et al. ........... 455/456.2
2006/0038719 A1 2/2006 Pande et al.
2006/0284767 A1 12/2006 Taylor
2007/0001875 A1 1/2007 Taylor
2007/0005188 A1 * 1/2007 Johnson ....................... 700/245
2007/0232326 A1 * 10/2007 Johnson .................... 455/456.1
2007/0233387 A1 * 10/2007 Johnson ....................... 701/300
2007/0233388 A1 * 10/2007 Johnson ....................... 701/300
2007/0276587 A1 * 11/2007 Johnson ....................... 701/200
2008/0024360 A1 1/2008 Taylor
2008/0024364 A1 1/2008 Taylor
2008/0030308 A1 * 2/2008 Johnson .................. 340/286.02
2008/0086240 A1 4/2008 Breed
2008/0113672 A1 * 5/2008 Karr et al. ................. 455/456.1
2008/0167083 A1 7/2008 Wyld et al.
2008/0310850 A1 * 12/2008 Pederson et al. ............. 398/135
2008/0318550 A1 12/2008 DeAtley
2009/0003659 A1 1/2009 Forstall et al.
2009/0005005 A1 1/2009 Forstall et al.
2009/0005018 A1 1/2009 Forstall et al.
2009/0005021 A1 1/2009 Forstall et al.
2009/0005068 A1 1/2009 Forstall et al.
2009/0005070 A1 1/2009 Forstall et al.
2009/0005071 A1 1/2009 Forstall et al.
2009/0005072 A1 1/2009 Forstall et al.
2009/0005076 A1 1/2009 Forstall et al.
2009/0005080 A1 1/2009 Forstall et al.
2009/0005082 A1 1/2009 Forstall et al.
2009/0005964 A1 1/2009 Forstall et al.
2009/0005965 A1 1/2009 Forstall et al.
2009/0005975 A1 1/2009 Forstall et al.
2009/0005978 A1 1/2009 Forstall et al.
2009/0005981 A1 1/2009 Forstall et al.
2009/0006336 A1 1/2009 Forstall et al.
2009/0030605 A1 1/2009 Breed
2009/0031006 A1 1/2009 Johnson
2009/0033540 A1 * 2/2009 Breed et al. .................... 342/29
2009/0089706 A1 4/2009 Furches et al.
2009/0098857 A1 4/2009 DeAtley
2009/0228961 A1 * 9/2009 Wald et al. ........................ 726/4
2009/0234743 A1 * 9/2009 Wald et al. ...................... 705/14
2009/0259573 A1 * 10/2009 Cheng et al. .................... 705/28
2009/0271271 A1 * 10/2009 Johnson .................... 705/14.58
2009/0281724 A1 11/2009 Blumenberg et al.
2009/0286549 A1 11/2009 Canon et al.
2009/0315766 A1 * 12/2009 Khosravy et al. ........ 342/357.07
2009/0315775 A1 * 12/2009 Khosravy et al. ............ 342/452
2010/0131584 A1 5/2010 Johnson
2010/0207782 A1 8/2010 Johnson

FOREIGN PATENT DOCUMENTS

CA 2163215 5/1994
CA 2287596 4/2000
DE 3 621 456 1/1988
DE 4437360 4/1996
DE 19506890 8/1996
DE 19914257 3/1999
EP 0 288 068 7/1992
EP 0 745 867 12/1996
EP 0 763 749 3/1997
EP 0 786 646 7/1997
EP 785535 7/1997
EP 0 809 117 11/1997
EP 0 813 072 12/1997
EP 0 699 330 4/1998
EP 0 908 835 4/1999
EP 0 997 808 5/2000
EP 1 083 764 3/2001
FR 2730083 8/1996
FR 2 754 093 4/1998
FR 2272911 6/1999
GB 2 278 196 11/1994
GB 2 322 248 8/1998
GB 2 359 888 9/2001
JP 62142215 6/1987
JP 05-071974 3/1993
JP 06-525189 5/1994

| | | |
|---|---|---|
| JP | 2007-221433 | 5/1994 |
| JP | 08-069436 | 3/1996 |
| JP | 09-054895 | 2/1997 |
| JP | 9-113288 | 5/1997 |
| JP | 09-153125 | 6/1997 |
| JP | 9-062993 | 7/1997 |
| JP | 9-210710 | 8/1997 |
| JP | 9-319300 | 12/1997 |
| JP | 10-021259 | 1/1998 |
| JP | 10-030933 | 2/1998 |
| JP | 11-234736 | 8/1999 |
| JP | 2000-163379 | 6/2000 |
| JP | 2001-160063 | 6/2001 |
| WO | WO 93/20546 | 10/1993 |
| WO | WO 94/08250 | 4/1994 |
| WO | WO 97/07467 | 2/1997 |
| WO | WO 97/24577 | 7/1997 |
| WO | WO 97/41654 | 11/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |
| WO | WO 2009/140031 | 11/2009 |

OTHER PUBLICATIONS

U.S. Appl. No. 09/589,328, filed Jun. 7, 2000, Van Os et al.
U.S. Appl. No. 11/464,671, filed Aug. 15, 2006, Johnson.
U.S. Appl. No. 11/827,065, filed Jul. 10, 2007, Johnson.
U.S. Appl. No. 11/972,559, filed Jan. 10, 2008, Alten.
U.S. Appl. No. 12/044,363, filed Mar. 7, 2008, Johnson.
U.S. Appl. No. 11/114,714, filed May 2, 2008, Williamson et al.
U.S. Appl. No. 12/119,316, filed May 12, 2008, Blumenberg et al.
U.S. Appl. No. 12/122,339, filed May 16, 2008, Sazegari et al.
U.S. Appl. No. 12/233,358, filed Sep. 18, 2008, Low et al.
U.S. Appl. No. 12/270,814, filed Nov. 13, 2008, Herz.
U.S. Appl. No. 11/969,901, filed Jan. 6, 2009, Matas et al.
"DaimlerCrysler Guide5 Usecases Overview Map", 1 page (no reference date).
Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.
Beard et al., "Estimating Positions and Paths of Moving Objects", IEEE 2000, pp. 1-8.
Berman et al., "The Role of Dead Reckoning and Inertial Sensors in Future General Aviation Navigation", IEEE, 1998, pp. 510-517.
Camp et al., "A computer-based method for predicting transit time systems", Decision Sciences, vol. 5, pp. 339-346, 1974.
Dunn et al., "Wireless Emergency Call System", IBM TDB, Sep. 1994.
Ebine, "Dual Frequency resonant base station antennas for PDC systems in Japan", IEEE, pp. 564-567, 1999.
Evans, "In-Vehicle Man-Machine Interaction the Socrates Approach", Vehicle Navigation & Information System Conference Proceedings, 1994, Aug. 31-Sep. 2, 1994, pp. 473-477.
*GPS 12 Personal Navigator Owner's Manual & Reference*, Garmin Corporation, Jan. 1999, pp. 1-60.
Hohman et al., "GPS Roadside Integrated Precision Positioning System", Position Location and Navigation Symposium (IEEE 2000), pp. 221-230.
Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.
Northard, "Docking Station Communication Link", IBM TDB, Feb. 1994.
Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto, J., *Augment-able Reality: Situated Communication through Physical and Digital Spaces*, iswc, pp. 68, Second International Symposium on Wearable computers (ISWC'98), 1998, pp. 1-8.
Rozier, J., *Hear & There: An Augmented Reality System of Linked Audio*, Proceedings of the International Conference on Auditory Display, Atlanta, GA, Apr. 2000, pp. 1-6.
Yang et al. "Global Snapshots for Distributed Debugging", IEEE, pp. 436-440, 1992.
"Cyberguide: a mobile context-aware tour guide", Wireless Networks Archive (Special Issue: Mobile computing and networking; selecting papers from MobiCom '96), 3(5):421-433, 1997.
"Frontiers in electronic media", Interactions Archive 4(4):32-64, 1997.
"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.
Sharp et al., U.S. Appl. No. 12/434,586, filed May 1, 2009.
Sharp et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.
Drane et al., "The accurate location of mobile telephones", Third Annual World Congress on Intelligent Transport Systems, Orlando, Florida, Oct. 1996.
"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.
Ygnace et al., "Travel Time Estimation on the San Francisco Bay Area Network Using Cellular Phones as Probes", Working Paper, Institute of Transportation Studies, University of California, Berkeley, 2000.
Wang et al., "A Unified Vehicle Supervising and Traffic Information System", IEEE, 1996, pp. 968-972.
Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.
Challe, "CARMINAT—An Integrated information and guidance system," Vehicle Navigation and Information Systems Conference, Oct. 20-23, 1991, Renault—Direction de la Recherche, Rueil-Malmaison, France.
Pungel, "Traffic control-beat the jam electronically," Funkschau, 1988, 18:43-45 (w/English translation).
Rillings and Betsold, "Advanced driver information systems," Vehicular Technology, IEEE Vehicular Technology Society, 1991, 40:31-40.
Tsuzawa and Okamoto, "Advanced Mobile Traffic Information and Communication System," First Vehicle Navigation and Information Systems Conference, Sep. 11-13, 1989, Toronto, Canada, Abstract only.
Wong, "GPS: making roads safer and solving traffic tangles," Asia Engineer, 1995, 23(9):31-32.
Ayatsuka et al., "UbiquitousLinks. Hypermedia Links Embedded in the Real World, Technical Report of Information Processing Society, 96-HI-67," Information Processing Society of Japan, Jul. 11, 1996, 96(62):23-30.
Nagao et al., Walk Navi: A Location-Aware Interactive Navigation/Guideline System and Software III, First edition, pp. 9-48, published by Kindai-Kagaku-Sya Co. Ltd., Dec. 10, 1995.

Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.
Freundschuh, "Does 'Anybody' Really Want (Or Need) Vehicle Navigation Aids?" First Vehicle Navigation and Information System Conference, Sep. 11-13, 1989, Toronto, Canada, 5 pages.
Gould, "The Provision of Usable Navigation Assistance: Considering Individual Cognitive Ability," First Vehicle Navigation and Information System Conference, Sep. 11-13, 1989, Toronto, Canada, 7 pages.
Mark, "A Conceptual Model for Vehicle Navigation Systems," First Vehicle Navigation and Information System Conference, Sep. 11-13, 1989, Toronto, Canada 11 pages.
Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.
Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.
Hoogenraad, "Location Dependent Services," 3rd AGILE Conference on Geographic Information Science, Helsinki/Espoo, Finland, May 25-27, 2000, pp. 74-77.
Bonsignore, "A Comparative Evaluation of the Benefits of Advanced Traveler Information System (ATIS) Operational Tests," MIT Masters Thesis, Feb. 1994, 140 pages.
Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.
Mahmassani et al., "Providing Advanced and Real-Time Travel/Traffic Information to Tourists," Center for Transportation Research, Bureau of Engineering Research, The University of Texas at Austin, Oct. 1998, 15 pages.
"New Handsets Strut Their Stuff At Wireless '99," Internet: URL: http://findarticles.com/p/articles/mi_m0BMD/is_1999_Feb_11/ai_n27547656/ downloaded from Internet on Feb. 11, 1999, 3 pages.
"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.
Green et al., "Suggested Human Factors Design Guidelines for Driver Information Systems," Technical Report UMTRI-93-21, Nov. 1993, 119 pages.
Muraskin, "Two-Minute Warnings for School Bus Riders," Internet: URL: http://www.callcentermagazine.com/shared/printableArticle.jhtml;jsessionid=PQH1SZXW . . . Jul. 1, 1999, 3 pages.
Tijerina et al., "Driver Workload Assessment of Route Guidance System Destination Entry While Driving: A Test Track Study," Proceedings of the 5th ITS World Congress, Oct. 12-16, 1998, Seoul, Korea, 9 pages.
Serafin et al., "Functions and Features of Future Driver Information Systems," Technical Report UMTRI-91-16, May 1991, 104 pages.
Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.
"LaBarge in joint venture on bus system," Internet: URL: http://www.bizjournals.com/stlouis/stories/1998/08/10/focus2.html?t-printable, Aug. 7, 1998, 1 page.
Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.
Brown, "The stick-e document: a framework for creating context-aware applications," Electronic Publishing, 1995, 8:259-272.
Brown, "Triggering Information by Context," Personal Technologies, 1998, 2:18-27.
Dey et al., "CyberDesk: a framework for providing self-integrating context-aware services," Knowledge-Based Systems, 1998, 11:3-13.
Hodes and Katz, "Composable ad hoc location-based services for heterogeneous mobile clients," Wireless Networks, 1999, 5:411-427.
Kreller et al., "A Mobile-Aware City Guide Application," ACTS Mobile Communication Summit, 1998, Rhodos, Greece, 7 pages.
Lusky et al., "Mapping the Present," ColoradoBiz, Nov. 1999, 26(11):16-17.
McCarthy and Meidel, "ACTIVEMAP: A Visualization Tool for Location Awareness to Support Informal Interactions," HUC '99, LNCS 1707, 1999, pp. 158-170.
O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.
Pascoe et al., "Developing Personal Technology for the Field," Personal Technologies, 1998, 2:28-36.
Tarumi et al., "Public Applications of SpaceTag and Their Impacts," Digital Cities, LNCS 1765, 2000, pp. 350-363.
Tebbutt, "Dial your way out of the woods," The Australian, Feb. 2000, 1 page.
Tso et al., "Always On, Always Connected Mobile Computing," Mobile Communications Operation—Mobile Handheld Products Group, 1996, pp. 918-924.
Wang and Lin, "Location Aware Information Agent over WAP," Tamkang Journal of Science and Engineering, 2000, 3(2):107-115.
"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.
"Report on Location Service feature (LCS) 25.923 v1.0.0," TSG-RAN Working Group 2 (Radio layer 2 and Radio layer 3), Berlin, May 25-28, 1999, 45 pages.
"3rd Generation Partnership Project; Technical Specification Group Services and System Aspects; Functional stage 2 description of location services in UMTS," 3G TS 23.171 v.1.1.0, Nov. 1999, 42 pages.
"3rd Generation Partnership Project; Technical Specification Group Radio Access Network; Stage 2 Functional Specification of Location Services in UTRAN," 3G TS 25.305 v.3.1.0, Mar. 2000, 45 pages.
"3rd Generation Partnership Project (3GPP); Technical Specification Group (TSG) RAN; Working Group 2 (WG2); Report on Location Services," TS RAN R2.03 V0.1.0, Apr. 1999, 43 pages.
"Revised CR to 09/31 on work item LCS," ETSI SMG3 Plenary Meeting #6, Nice, France, Dec. 13-15, 1999. 18 pages.
Digital cellular telecommunications system (Phase 2+); Location Services (LCS); Service description, Stage 1 (GSM 02.71) ETSI, Apr. 1999, 22 pages.
Borsodi, "Super Resolution of Discrete Arrivals in a Cellular Geolocation System," University of Calgary Thesis, Apr. 2000, 164 pages.
Abowd et al., "Context-awareness in wearable and ubiquitous computing," 1st International Symposium on Wearable Computers, Oct. 13-14, 1997, Cambridge, MA, 9 pages.
Balsiger et al., "MOGID: Mobile Geo-depended Information on Demand," Workshop on Position Dependent Information Services (W3C-WAP), 2000, 8 pages.
Cheverst et al., "The Role of Connectivity in Supporting Context-Sensitive Applications," HUC'99, LNCS 1707, 1999, pp. 193-209.
Efstratiou and Cheverst, "Reflection: A Solution for Highly Adaptive Mobile Systems," 2000 Workshop on Reflective Middleware, 2000, 2 pages.
Cheverst et al., "The Support of Mobile-Awareness in Collaborative Groupware," Personal Technologies, 1999, 3:33-42.
Cheverst et al., "Design of an Object Model for a Context Sensitive Tourist Guide," Computers and Graphics, 1999, 23(6):883-891.

Cheverst et al., "Developing Interfaces for Collaborative Mobile Systems," 1999, 15 pages.
Cheverst et al., "Experiences of Developing and Deploying a Context-Aware Tourist Guide: The GUIDE Project," 2000, pp. 20-31.
Cheverst et al., "Services to Support Consistency in Mobile Collaborative Applications," Proc. 3rd International Workshop on Services in Distributed Networked Environments, 1996, 8 pages.
Cheverst et al., "Sharing (Location) Context to Facilitate Collaboration Between City Visitors," 2000, 8 pages.
Cheverst et al., "Supporting Collaboration in Mobile-aware Groupware," Workshop on Handheld CSCW 1998, 6 pages.
Change Request for "U.S. specific Emergency Services requirements included as an informative annex," Nov. 29, 1999, 2 pages.
Costa et al., "Experiments with Reflective Middleware," Proceedings of the ECOOP'98 Workshop on Reflective Object-Oriented Programming and Systems, ECOOP'98 Workshop Reader, 1998, 13 pages.
Davies et al., "L2imbo: A distributed systems platform for mobile computing," Mobile Networks and Applications, 1998, 3:143-156.
Davies et al., "'Caches in the Air': Disseminating Tourist Information in the Guide System," Second IEEE Workshop on Mobile Computer Systems and Applications, Feb. 25-26, 1999, 9 pages.
Dix et al., "Exploiting Space and Location as a Design Framework for Interactive Mobile Systems," ACM Transactions on Computer-Human Interaction (TOCHI)—Special issue on human-computer interaction with mobile systems, 2000, 7(3):285-321.
Drane et al., "Positioning GSM Telephones," IEEE Communications Magazine, Apr. 1998, pp. 46-59.
Drane and Rizos, "Role of Positioning Systems in ITS," Positioning Systems in Intelligent Transportation Systems, Dec. 1997, pp. 312, 346-349.
Efstratiou et al., "Architectural Requirements for the Effective Support of Adaptive Mobile Applications," 2000, 12 pages.
"Estonian operator to launch world's first Network-based location services," Ericsson Press Release, Oct. 11, 1999, 2 pages.
Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.
French and Driscoll, "Location Technologies for ITS Emergency Notification and E911," Proc. 1996 National Technical Meeting of The Institute of Navigation, Jan. 22-24, 1996, pp. 355-359.
Friday et al., "Developing Adaptive Applications: The MOST Experience," J. Integrated Computer-Aided Engineering, 1999, pp. 143-157.
Gunnarsson et al., "Location Trial System for Mobile Phones," IEEE, 1998, pp. 2211-2216.
Jose and Davies, "Scalabe and Flexible Location-Based Services for Ubiquitous Information Access," HUC'99, LNCS 1707, 1999, pp. 52-66.
Klinec and Nolz, "Nexus-Positioning and Communication Environment for Spatially Aware Applications," IAPRS, Amsterdam, 2000, 7 pages.
Kovacs et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12 pages.
Kreller et al., "UMTS: A Middleware Architecture and Mobile API/ Approach," IEEE Personal Communications, Apr. 1998, pp. 32-38.
Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.
Leonhardt and Magee, "Multi-Sensor Location Tracking," MOBICOM 98, Dallas, TX, pp. 203-214.
Leonhardt and Magee, "Towards a general location service for mobile environments," Proc. Third International Workshop on Services in Distributed and Networked Environments, Jun. 3-4, 1996, 8 pages.
Long et al., "Rapid Prototyping of Mobile Context-Aware Applications: The Cyberguide Case Study," MobiCom '96, 1996, 11 pages.
Yokote, "The Apertos Reflective Operating System: The Concept and Its Implementation," OOPSLA'92, pp. 414-434.
Popescu-Zeletin et al., "Applying Location-Aware Computing for Electronic Commerce: Mobile Guide," Proc. 5th Conference on Computer Communications, AFRICOM-CCDC'98,Oct. 20-22, 1998, 14 pages.
Zhao, "Mobile Phone Location Determination and Its Impact on Intelligent Transportation Systems," IEEE Transactions on Intelligent Transportation Systems, Mar. 2000, 1(1):55-64.
Bederson, "Audio Augmented Reality: A Prototype Automated Tour Guide," CHI '95 Mosaic of Creativity, May 7-11, 1995, Chicago, IL, pp. 210-211.
Maxwell et al., "Alfred: The Robot Waiter Who Remembers You," AAAI Technical Report WS-99-15, 1999, 12 pages.
Authorized officer Matthew Davies, Invitation to Pay Additional Fees and, Where Applicable, Protest Fee, PCT/US2008/050295 mailed Jul. 29, 2008, 10 pages.
Shibata et al., "Development and Integration of Generic Components for a Teachable Vision-Based Mobile Robot," IEEE/ASME Transactions on Mechatronics, 1996, 1(3):230-236.
Spohrer, "New Paradigms for Using Computers (Abstract)," 1997; [online]; Retrieved from the Internet URL: http://www.almaden.ibm.com/almaden/npuc97/1997/spohrer.htm; 1 page.
Ygnace et al., "Travel Time Estimation on the San Francisco Bay Area Network Using Cellular Phones as Probes," Working Paper, Institute of Transportation Studies, University of California, Berkeley, 2000, 58 pages.
US 6,731,928, 05/2004, Tanaka (withdrawn)

* cited by examiner

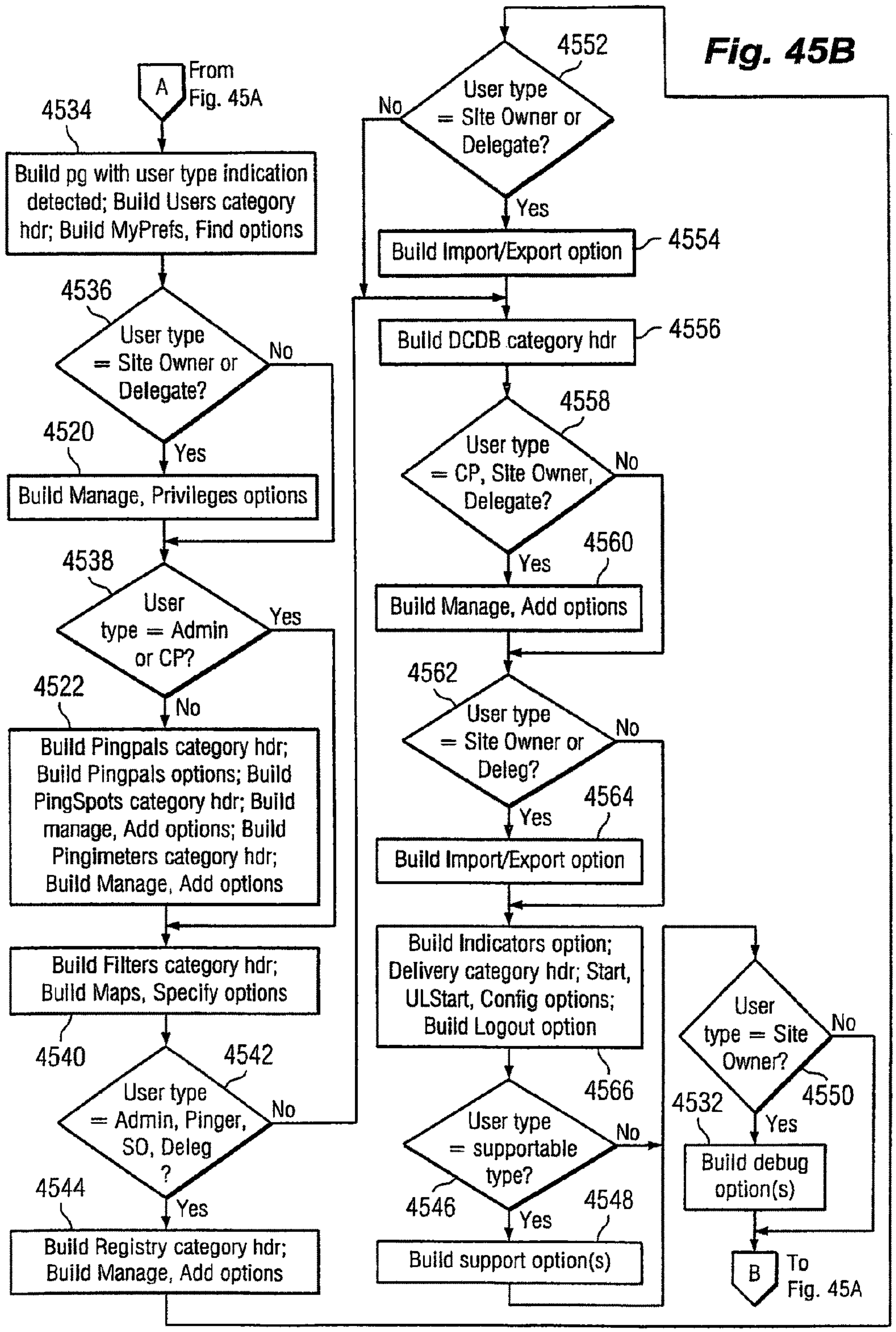

Fig. 45B
A
From Fig. 45A
4534
Build pg with user type indication detected; Build Users category hdr; Build MyPrefs, Find options
4536
User type = Site Owner or Delegate?
No
Yes
4520
Build Manage, Privileges options
4538
User type = Admin or CP?
Yes
No
4522
Build Pingpals category hdr; Build Pingpals options; Build PingSpots category hdr; Build manage, Add options; Build Pingimeters category hdr; Build Manage, Add options
Build Filters category hdr; Build Maps, Specify options
4540
4542
User type = Admin, Pinger, SO, Deleg ?
No
Yes
4544
Build Registry category hdr; Build Manage, Add options
4552
User type = Site Owner or Delegate?
No
Yes
Build Import/Export option
4554
Build DCDB category hdr
4556
4558
User type = CP, Site Owner, Delegate?
No
Yes
4560
Build Manage, Add options
4562
User type = Site Owner or Deleg?
No
Yes
4564
Build Import/Export option
Build Indicators option; Delivery category hdr; Start, ULStart, Config options; Build Logout option
4566
User type = supportable type?
No
4546
Yes
4548
Build support option(s)
User type = Site Owner?
No
4550
4532
Yes
Build debug option(s)
B
To Fig. 45A

*GPSPing.com V1.3 Access Privileges Summary*

Welcome to GPS*Ping*.com! We provide what other GPS companies provide except we provide it for FREE, and we do it in a way that allows you to completely manage and customize your own account automatically. GPS*Ping*.com also provides an Automated Messaging feature, a patented feature not found anywhere else in the world. Let technology work for you in making you aware of location relevant information.

Not only is it dangerous for people to interact with systems while driving in order to determine location relevant information, but it takes time to interface to such systems. GPS*Ping*.com's Automated Messaging is a paradigm shift of delivering location relevant services/information through proactive delivery from then on as relevant content is found for the user's subsequent (future) situational locations. Whether being used as an informative tool, or becoming aware of information in real-time, GPS*Ping*.com's Automated Messaging pushes information in real-time. Similar conventional GPS systems use local information (e.g. locally loaded CD) to deliver information to the GPS enabled device. That information becomes outdated and requires refreshes, depending on the type of information. GPS*Ping*.com communicates from a server to devices in real-time so there is never information that is out of date. Wireless systems are becoming cheaper, and communication speeds are getting faster. GPS*Ping*.com's Automated Messaging is a heterogeneous design applicable to many different applications. As soon as data is entered into the server side database, it is candidate for delivery to eligible devices.

The fact that you had the Privileges option on the menu and are able to see this page implies you have either a Delegate or Site Owner privilege. GPS*Ping*.com is a real fully functional system. Please note that all data you see is live and real data except for the user data found in the Users:Manage area. We did not want to provide delegates with access to personal information of real users, so all user data seen by delegates is manufactured for demo purposes.

| *Option* | *Description* |
|---|---|
| GPS*Ping*.com Options Exposed | Each user that logs into GPS*Ping*.com has a particular *user* type privilege (see column headings below) and a particular device they are currently using to connect to My GPS. Options exposed and available depend on the user type as well as the device type at the time of access. A user will not be aware of what other options exist for other user types. |
| My GPS Logon | There is a link provided into the GPS*Ping*.com members area *My GPS* for cell phones, PDAs, and computers. The GPS*Ping*.com general web site is deigned for full browsers. Once your account is established, an appropriate My GPS logon link can be accessed directly from tour particular device type. These links are available from various pages in the general web site. |
| Users: My Prefs | This option enables every user to tailor their own interfaces according to individual preferences. The GPS*Ping*.com interface look and feel, as well as how (and in what form) content is delivered to their device(s) can be customized. A user's personal and profile information including logon name and password can also be changed here. |
| Users: Find | This option enables a user to find a GPS*Ping*.com user on a map instantly, provided the sought user has granted you the PingPal privilege to view his whereabouts. |

| | |
|---|---|
| PingSpots: Manage | This option enables *End Users*, *Pingers* and *Site Owners* to manage their PingSpots. PingSpots are areas on earth defined by a user with a content delivery message destined for other users that have provided the necessary privileges to receive the content when traveling through the PingSpot. |
| PingSpots: Add | This option enables *End Users*, *Pingers* and *Site Owners* to add PingSpots. |
| Pingimeters: Manage | This option enables *End Users*, *Pingers* and *Site Owners* to manage their Pingimeters. Pingimeters are geodetic fences which define a perimeter to send alerts when someone arrives to, or departs from, the Pingimeter. Pingimeter alerting is only relevant when the traveling user has granted rights to the defining user. Complete privacy is maintained unless you have a PingPal you'd like to provide these privileges to. |
| Pingimeters: Add | This option enables *End Users*, *Pingers* and *Site Owners* to add Pingimeters. |
| Filters: Maps | This option enables users to select maps for specifying geographic territories that will apply for all subsequent information and actions in the user interface. |
| Filters: Specify | This option enables users to explicitly select certain filters that will apply for all subsequent information and actions in the user interface. |
| Registry: Manage | This option enables a device administrator (*Administrator* user type) to administer receiving devices. The administrator can search, list, view, change, or delete device information for devices only he created. An end user can manage only his device(s) in the My Prefs interface. Only the *Site Owner* user type can manage any devices in the system. Device administrators (*Administrator* user type) search for a list of devices with search criteria (or all devices), can view or delete the devices, and modify any information of the devices in the search result list. A *Pinger* can also manage his own devices here. |
| Registry: Add | This option enables an *Administrator* (*Site Owner* too) to add an eligible receiving device to the system. A *Pinger* can add up to 3 devices here. |
| Registry: Im/Export | This option is the preferred method for maintaining large numbers of devices in the system. Command line scripts import data to the system database, export data from the system database, or change/delete/edit data in the system database. Using a GUI could take a long time to administer many devices. Currently, only a *Site Owner* user type can import or export data. |
| DCDB: Manage | This option enables a content administrator (*Content Provider* user type) to administer Deliverable Content Database (DCDB) data. DCDB data is pushed to mobile users based on their situational locations. The content administrator can search, list, view, change, or delete DCDB information that he created. Only the *Site Owner* user type can manage any DCDB content in the system. Content administrators (*Content Provider* user type) search for a list of DCDB data with search criteria, can view or delete the entries, and modify any information of the entries in the search result list. |
| DCDB: Add | This option enables a *Content Provider* (*Site Owner* too) to add DCDB data to the system. |

| | |
|---|---|
| Delivery: Start / ULStart | or laptop. There is a special delivery manager for cellphones. Alternatively for non-GPS equipped devices, the ULStart option can be used by the user to explicitly configure location(s) he is interested in by specifying zip code(s), MAPSCO, or other convenient location information. Subsequently, proactive delivery of content is enabled as soon as it is entered to the DCDB. The ULStart is also a good way to see a demo of the Delivery Manager, although only a single location can be specified for the search and mobility is not applicable (currently, can search many locations by simply opening more browser windows (one each)). |
| Delivery: Config | The Config option allows setting default delivery parameters for delivery processing, and configuring a variety of novel delivery features. |
| Privileges | This option takes *Delegates* or Site *Owners* to the page you are now reading (i.e. this page). |
| Logout | This option completely logs a user out of GPS*Ping*.com and removes evidence from the user's hosting system of the GPS*Ping*.com members area use. Subsequent GPS*Ping*.com access will require a logon with an id and password. |
| Receive Pushed Content | Any user who can logon to GPS*Ping*.com can also participate with a registered device to receive content, and can personalize delivery to the device. A participating device need not have an associated user. An end user (*End User* user type) can be created for users who wish to personalize delivery to their devices. If users of devices are satisfied with the system of defaulted behavior, they do not need to be registered in the GPS*Ping*.com system at all. Devices have their own id and password for authentication to the system. The *End User* user type allows access to My Prefs for personalizing their use of the GPS*Ping*.com system. |
| Support & Download | This option is available to licensed customers for a particular site installation. |
| Variables (Debug) | This option enables debug views, and is currently only available to a *Site Owner* user type. |

| *Option* | *End User* | *Content Provider* | *Administrator* | *Site Owner* | *Delegate* | *Pinger* |
|---|---|---|---|---|---|---|
| Options by User Type and Device Type | YES | YES | YES | YES | YES | YES |
| My GPS Logon | YES | YES | YES | YES | YES | YES |
| Users: My Prefs | self only | self only | self only | Anyone | self only | self only |
| Users: Find | YES | YES | YES | YES | YES | YES |
| Users: Manage | NO | NO | NO | YES, any users | R/O demo data | NO |
| Users: Privileges | NO | NO | NO | YES | YES | NO |
| PingPals™: Manage | YES, for device only | NO | NO | YES | YES, R/O demo data | YES |
| PingPals™: Groups | YES, for device only | NO | NO | YES | YES, R/O demo data | YES |
| PingPals™: Add Group | YES, for device only | NO | NO | YES | YES, R/O demo data | YES |

5050

| | | | | | | | | |
|---|---|---|---|---|---|---|---|---|
| PingPals™ Manage | YES, for device only | NO | NO | YES | YES, R/O demo data | YES | NO | NO |
| PingPals™ Groups | YES, for device only | NO | NO | YES | YES, R/O demo data | YES | NO | NO |
| PingPals™ Add Group | YES, for device only | NO | NO | YES | YES, R/O demo data | YES | NO | NO |
| PingSpots™ Manage | YES, for device only | NO | NO | YES | YES, R/O demo data | YES | NO | NO |
| PingSpots™ Add | YES, for device only | NO | NO | YES | YES, R/O demo data | YES | NO | NO |
| Pingimeters™ Manage | YES, for device only | NO | NO | YES | YES, R/O demo data | YES | NO | NO |
| Pingimeters™ Add | YES, for device only | NO | NO | YES | YES, R/O demo data | YES | NO | NO |
| Filters: Maps/Specify | YES | YES | YES | YES | YES, R/O demo data | YES | YES | YES |
| Registry: Manage | NO | NO | YES, own created devices | YES, any devices | R/O any devices | YES, own (3 max) created devices | NO | NO |
| 5002 Registry: Add | NO | NO | YES, Infinite or contracted maximum # | YES | R/O | YES (3 max) | NO | NO |
| Registry: Im/Export | NO | NO | YES | YES | NO | YES | NO | NO |
| DCDB: Manage | NO | YES, own created content | NO | YES, any content | R/O any content | NO | YES, own (1 max) created content | YES, own created content |
| 5004 DCDB: Add | NO | YES | NO | YES | R/O | NO | YES (1 item) | YES |
| DCDB: Indicators | self only | YES | self only | YES | self only | self only | YES | YES |
| DCDB: Im/Export | NO | YES | NO | YES | NO | NO | YES | YES |
| Delivery: Start/ULStart/Config | YES | YES | YES | YES | YES | YES | YES | YES |
| Logout | YES | YES | YES | YES | YES | YES | YES | YES |
| Receive Pushed Content | YES | YES | YES | YES | YES | YES | YES | YES |
| Support & Download | YES | YES | YES | YES | YES | YES | YES | YES |
| Variables (Debug) | NO | NO | NO | YES | NO | NO | NO | NO |
| System Database Management | NO | NO | NO | YES | NO | NO | NO | NO |
| System Script Management | NO | NO | NO | YES | NO | NO | NO | NO |
| Source Code Management | NO | NO | NO | YES | NO | NO | NO | NO |
| Site Install File | NO | NO | NO | YES | NO | NO | NO | NO |

<u>*GPSPing.com V1.3*</u>

- All My GPS options shown in the table above are presented by user type when presenting to a full browser.
- When appropriate, or depending on system release, certain Administrator, Site Owner, and Content Provider Interfaces are not presented to PDA and cell phone browsers.

Figure 50G:
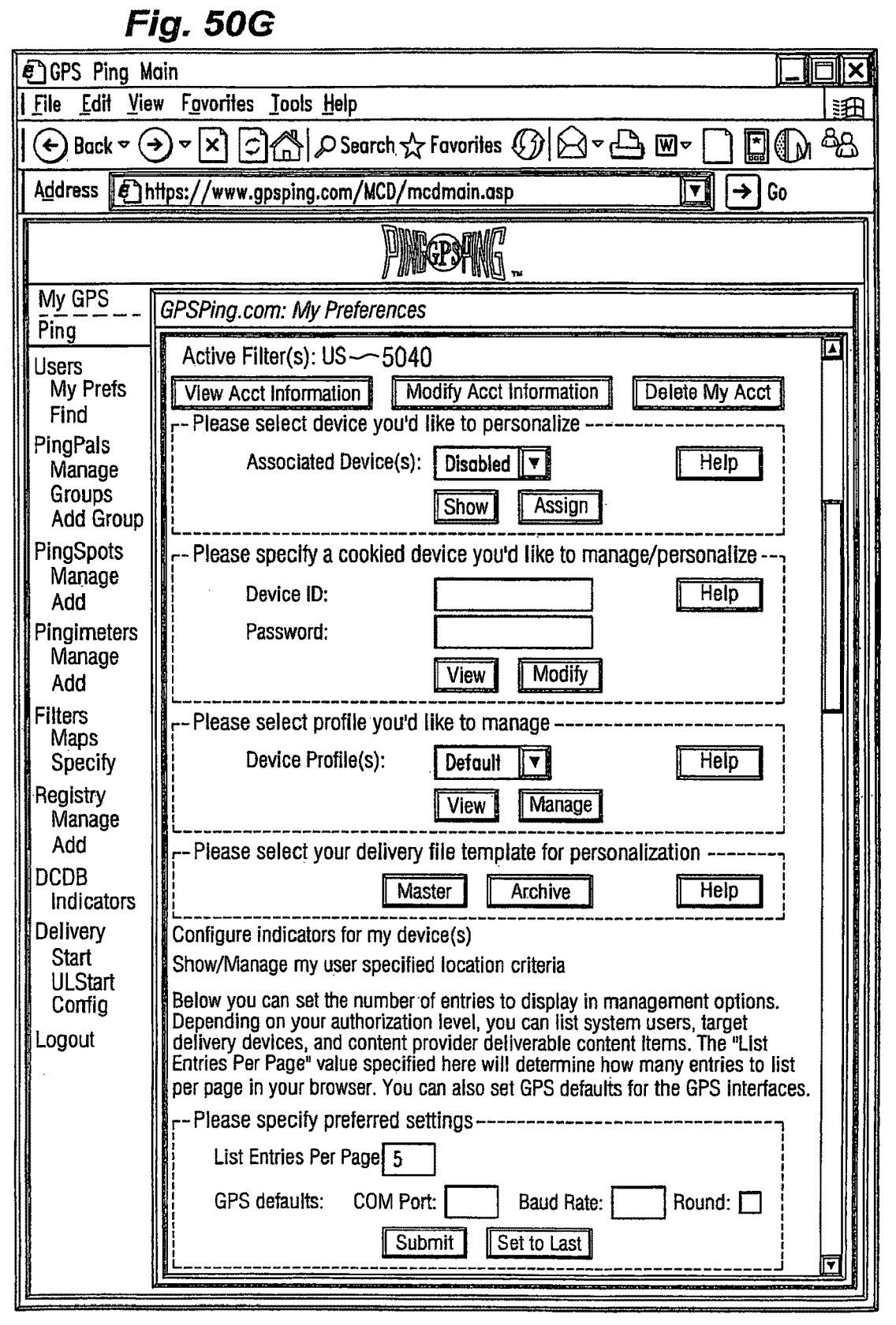

GPS Ping Main

File Edit View Favorites Tools Help

Back Search Favorites

Address https://www.gpsping.com/MCD/mcdmain.asp Go

PING GPS PING ™

My GPS Ping

Users
My Prefs
Find
PingPals
Manage
Groups
Add Group
PingSpots
Manage
Add
Pingimeters
Manage
Add
Filters
Maps
Specify
Registry
Manage
Add
DCDB
Indicators
Delivery
Start
ULStart
Config
Logout

*GPSPing.com: My Preferences*

Active Filter(s): US — 5040

[View Acct Information] [Modify Acct Information] [Delete My Acct]

Please select device you'd like to personalize

Associated Device(s): Disabled [Help]

[Show] [Assign]

Please specify a cookied device you'd like to manage/personalize

Device ID: [Help]

Password:

[View] [Modify]

Please select profile you'd like to manage

Device Profile(s): Default [Help]

[View] [Manage]

Please select your delivery file template for personalization

[Master] [Archive] [Help]

Configure indicators for my device(s)

Show/Manage my user specified location criteria

Below you can set the number of entries to display in management options. Depending on your authorization level, you can list system users, target delivery devices, and content provider deliverable content Items. The "List Entries Per Page" value specified here will determine how many entries to list per page in your browser. You can also set GPS defaults for the GPS interfaces.

Please specify preferred settings

List Entries Per Page 5

GPS defaults: COM Port: Baud Rate: Round:

[Submit] [Set to Last]

| | |
|---|---|
| Fig. 60A | Fig. 60B |

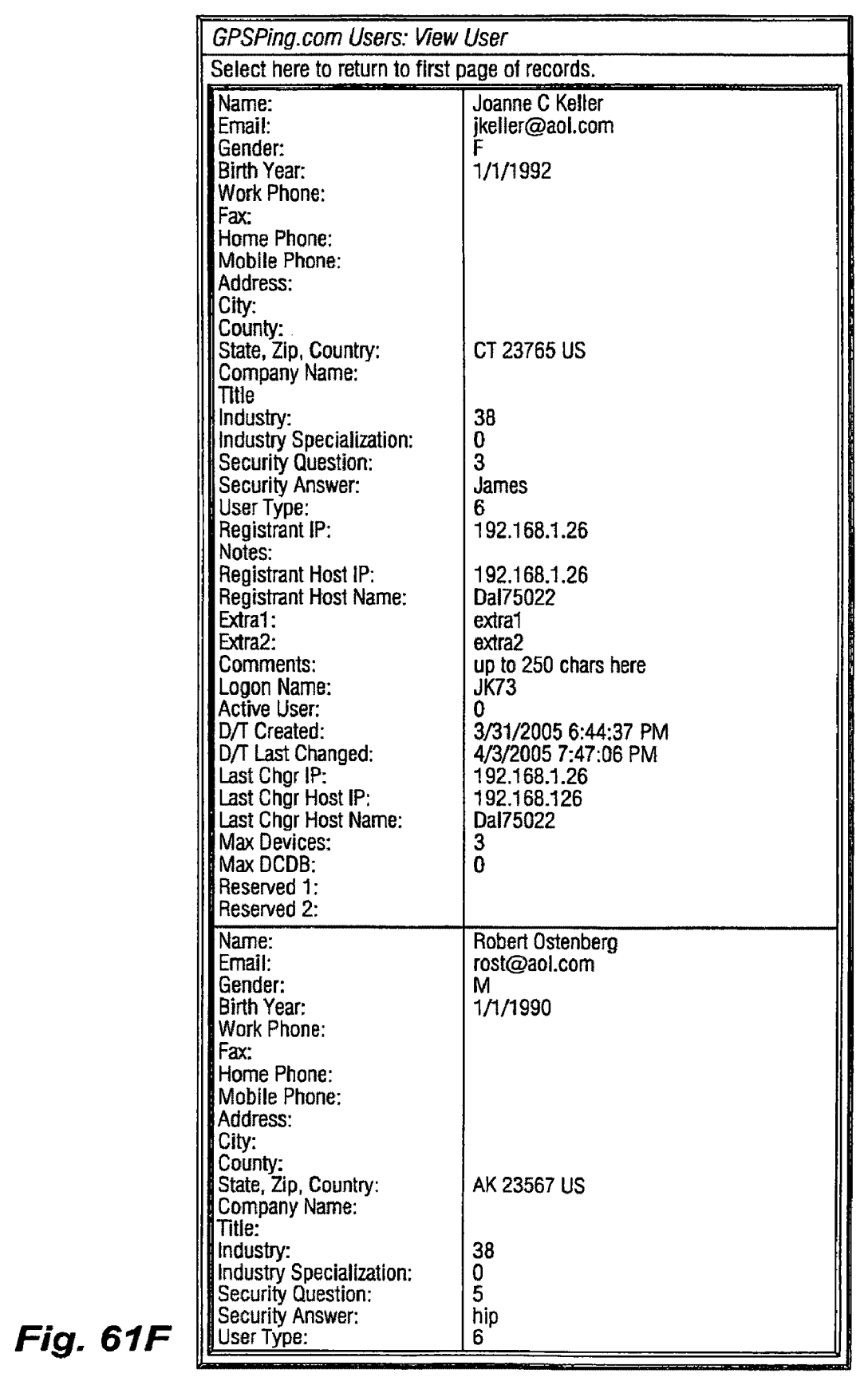

*GPSPing.com Users: View User*

Select here to return to first page of records.

| | |
|---|---|
| Name: | Joanne C Keller |
| Email: | jkeller@aol.com |
| Gender: | F |
| Birth Year: | 1/1/1992 |
| Work Phone: | |
| Fax: | |
| Home Phone: | |
| Mobile Phone: | |
| Address: | |
| City: | |
| County: | |
| State, Zip, Country: | CT 23765 US |
| Company Name: | |
| Title | |
| Industry: | 38 |
| Industry Specialization: | 0 |
| Security Question: | 3 |
| Security Answer: | James |
| User Type: | 6 |
| Registrant IP: | 192.168.1.26 |
| Notes: | |
| Registrant Host IP: | 192.168.1.26 |
| Registrant Host Name: | Dal75022 |
| Extra1: | extra1 |
| Extra2: | extra2 |
| Comments: | up to 250 chars here |
| Logon Name: | JK73 |
| Active User: | 0 |
| D/T Created: | 3/31/2005 6:44:37 PM |
| D/T Last Changed: | 4/3/2005 7:47:06 PM |
| Last Chgr IP: | 192.168.1.26 |
| Last Chgr Host IP: | 192.168.126 |
| Last Chgr Host Name: | Dal75022 |
| Max Devices: | 3 |
| Max DCDB: | 0 |
| Reserved 1: | |
| Reserved 2: | |
| Name: | Robert Ostenberg |
| Email: | rost@aol.com |
| Gender: | M |
| Birth Year: | 1/1/1990 |
| Work Phone: | |
| Fax: | |
| Home Phone: | |
| Mobile Phone: | |
| Address: | |
| City: | |
| County: | |
| State, Zip, Country: | AK 23567 US |
| Company Name: | |
| Title: | |
| Industry: | 38 |
| Industry Specialization: | 0 |
| Security Question: | 5 |
| Security Answer: | hip |
| User Type: | 6 |

*Fig. 61F*

| | |
|---|---|
| Security Answer:<br>User Type:<br>Registrant IP:<br>Notes:<br>Registrant Host IP:<br>Registrant Host Name:<br>Extra1:<br>Extra2:<br>Comments:<br>Logon Name:<br>Active User:<br>D/T Created:<br>D/T Last Changed:<br>Last Chgr IP:<br>Last Chgr Host IP:<br>Last Chgr Host Name:<br>Max Devices:<br>Max DCDB:<br>Reserved 1:<br>Reserved 2: | hip<br>6<br>192.168.1.26<br><br>192.168.1.26<br>Dal75022<br>extra1<br>extra2<br>up to 250 chars here<br>R072<br>0<br>3/31/2005 6:40:20 PM<br>4/3/2005 7:47:06 PM<br>192.168.1.26<br>192.168.1.26<br>Dal75022<br>3<br>0 |
| Name:<br>Email:<br>Gender:<br>Birth Year:<br>Work Phone:<br>Fax:<br>Home Phone:<br>Mobile Phone:<br>Address:<br>City:<br>County:<br>State, Zip, Country:<br>Company Name:<br>Title:<br>Industry:<br>Industry Specialization:<br>Security Question:<br>Security Answer:<br>User Type:<br>Registrant IP:<br>Notes:<br>Registrant Host IP:<br>Registrant Host Name:<br>Extra1:<br>Extra2:<br>Comments:<br>Logon Name:<br>Active User:<br>D/T Created:<br>D/T Last Changed:<br>Last Chgr IP:<br>Last Chgr Host IP:<br>Last Chgr Host Name:<br>Max Devices:<br>Max DCDB:<br>Reserved 1:<br>Reserved 2: | Sara T Piper<br>Pipers777@aol.com<br>F<br>1/1/1982<br><br><br><br><br><br><br><br>OK 74893 US<br><br><br>38<br>0<br>8<br>Dodge<br>6<br>192.168.1.26<br><br>192.168.1.26<br>Dal75022<br>extra1<br>extra2<br>up to 250 chars here<br>SP78<br>0<br>3/31/2005 7:01:08 PM<br>4/3/2005 7:47:06 PM<br><br><br><br>3<br>0 |

Select here to return to first page of records.

Back to Top

*Fig. 61G*

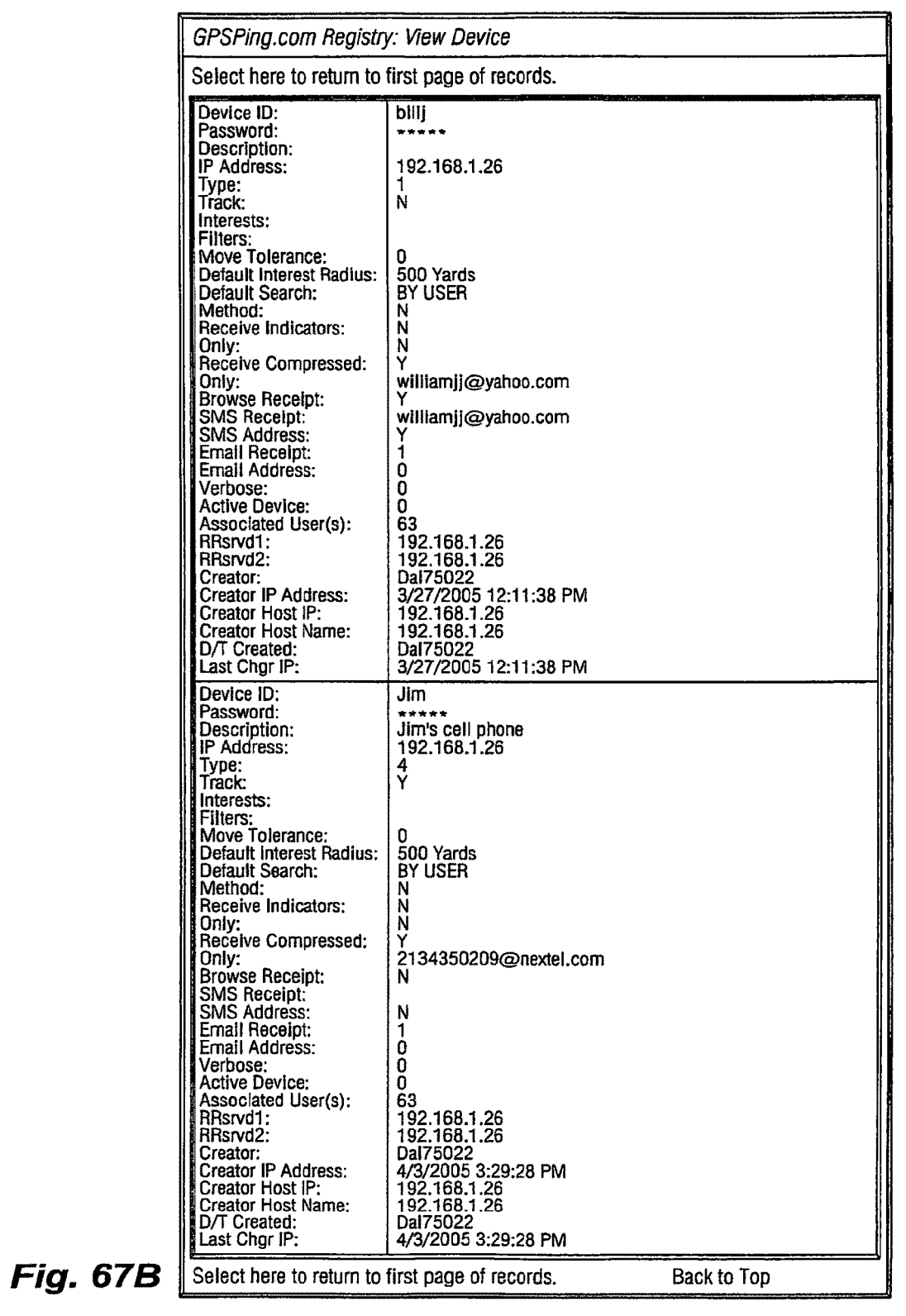

*GPSPing.com Registry: View Device*

Select here to return to first page of records.

| | |
|---|---|
| Device ID: | billj |
| Password: | ***** |
| Description: | |
| IP Address: | 192.168.1.26 |
| Type: | 1 |
| Track: | N |
| Interests: | |
| Filters: | |
| Move Tolerance: | 0 |
| Default Interest Radius: | 500 Yards |
| Default Search: | BY USER |
| Method: | N |
| Receive Indicators: | N |
| Only: | N |
| Receive Compressed: | Y |
| Only: | williamjj@yahoo.com |
| Browse Receipt: | Y |
| SMS Receipt: | williamjj@yahoo.com |
| SMS Address: | Y |
| Email Receipt: | 1 |
| Email Address: | 0 |
| Verbose: | 0 |
| Active Device: | 0 |
| Associated User(s): | 63 |
| RRsrvd1: | 192.168.1.26 |
| RRsrvd2: | 192.168.1.26 |
| Creator: | Dal75022 |
| Creator IP Address: | 3/27/2005 12:11:38 PM |
| Creator Host IP: | 192.168.1.26 |
| Creator Host Name: | 192.168.1.26 |
| D/T Created: | Dal75022 |
| Last Chgr IP: | 3/27/2005 12:11:38 PM |
| Device ID: | Jim |
| Password: | ***** |
| Description: | Jim's cell phone |
| IP Address: | 192.168.1.26 |
| Type: | 4 |
| Track: | Y |
| Interests: | |
| Filters: | |
| Move Tolerance: | 0 |
| Default Interest Radius: | 500 Yards |
| Default Search: | BY USER |
| Method: | N |
| Receive Indicators: | N |
| Only: | N |
| Receive Compressed: | Y |
| Only: | 2134350209@nextel.com |
| Browse Receipt: | N |
| SMS Receipt: | |
| SMS Address: | N |
| Email Receipt: | 1 |
| Email Address: | 0 |
| Verbose: | 0 |
| Active Device: | 0 |
| Associated User(s): | 63 |
| RRsrvd1: | 192.168.1.26 |
| RRsrvd2: | 192.168.1.26 |
| Creator: | Dal75022 |
| Creator IP Address: | 4/3/2005 3:29:28 PM |
| Creator Host IP: | 192.168.1.26 |
| Creator Host Name: | 192.168.1.26 |
| D/T Created: | Dal75022 |
| Last Chgr IP: | 4/3/2005 3:29:28 PM |

Select here to return to first page of records. Back to Top

*Fig. 67B*

Figure 71G:
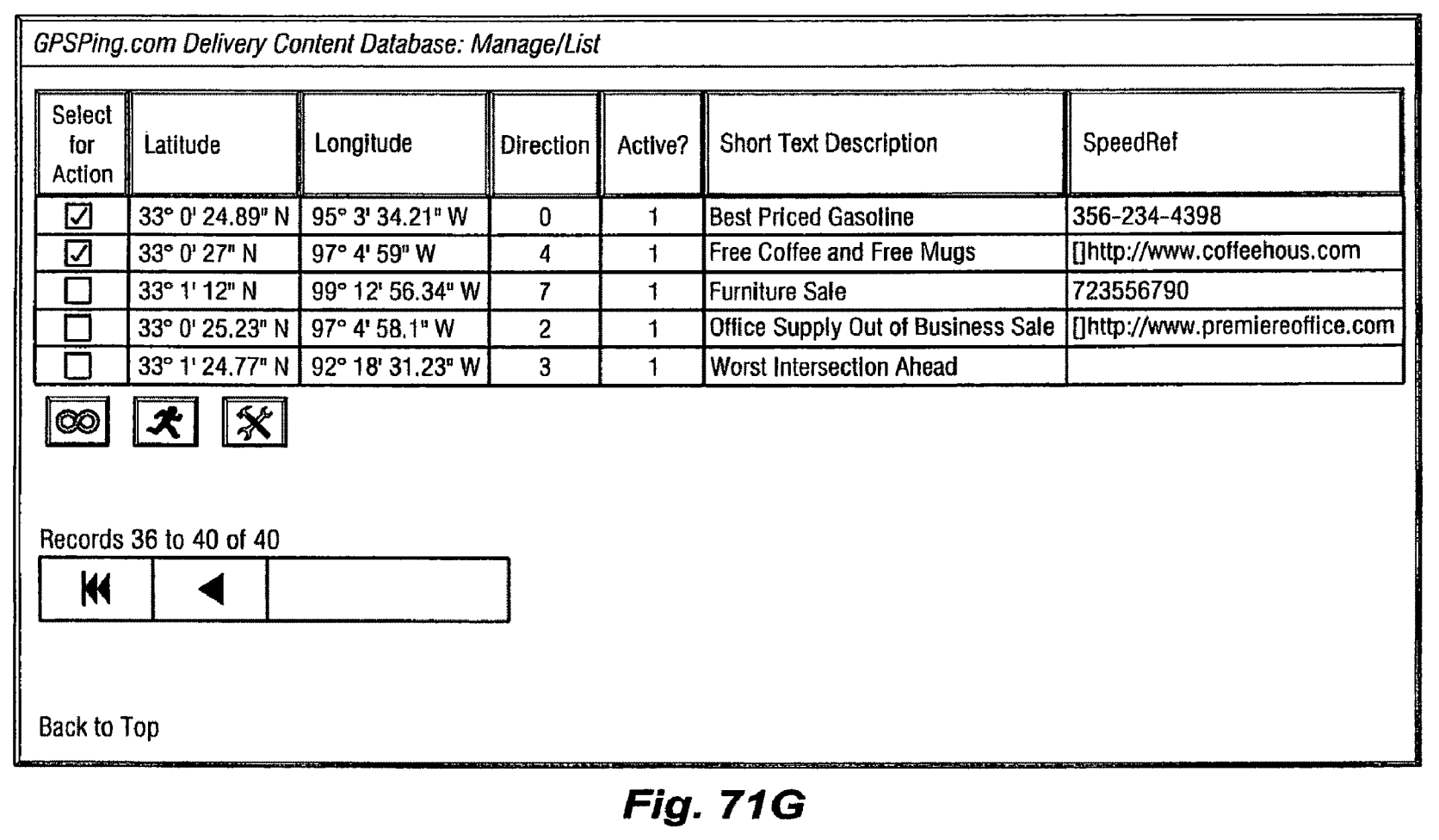

*GPSPing.com Delivery Content Database: Manage/List*

| Select for Action | Latitude | Longitude | Direction | Active? | Short Text Description | SpeedRef |
|---|---|---|---|---|---|---|
| ☑ | 33° 0' 24.89" N | 95° 3' 34.21" W | 0 | 1 | Best Priced Gasoline | 356-234-4398 |
| ☑ | 33° 0' 27" N | 97° 4' 59" W | 4 | 1 | Free Coffee and Free Mugs | []http://www.coffeehous.com |
| ☐ | 33° 1' 12" N | 99° 12' 56.34" W | 7 | 1 | Furniture Sale | 723556790 |
| ☐ | 33° 0' 25.23" N | 97° 4' 58.1" W | 2 | 1 | Office Supply Out of Business Sale | []http://www.premiereoffice.com |
| ☐ | 33° 1' 24.77" N | 92° 18' 31.23" W | 3 | 1 | Worst Intersection Ahead | |

Records 36 to 40 of 40

Back to Top

*GPSPing.com Delivery Content Database: View Entry*

Select here to return to first page of records.

| | |
|---|---|
| Entry Description: | Gasoline Sale |
| Lat, Lon Decimal: | 33.0069138888889, -95.0595027777778 |
| Degrees: | 33° 0' 24.89" N |
| Latitude: | 95° 3' 34.21" W |
| Longitude: | 0 |
| Direction: | 0 |
| Time Criteria: | YYYYNNNNYYYY |
| Delivery Flags: | N |
| Send Indicator Only: | 1 |
| Active Entry: | 6 |
| Content Type: | 0 |
| Offset: | -1 |
| Length: | Best Priced Gasoline in all of Texas - JoeJoe's in Fryertown @ Main Street & FM2432 |
| Path: | N |
| Store Compressed: | Best Priced Gasoline |
| Short Text: | 356-234-4398 |
| Speed Reference: | 0 |
| DRservd 1: | 0 |
| DRservd 2: | 63 |
| Creator: | 192.168.1.26 |
| Creator IP Address: | 192.168.1.26 |
| Creator Host IP: | Dal75022 |
| Creator Host Name: | 4/20/2005 2:33:38 PM |
| D/T Created: | 192.168.1.26 |
| Last Chgr IP: | 192.168.1.26 |
| Last Chgr Host IP: | Dal75022 |
| Last Chgr Host: | 4/20/2005 2:33:38 PM |
| Name: | |
| D/T Last Changed: | |
| Entry Description: | Grand Opening - Coffee |
| Lat, Lon Decimal: | 33.0075, -97.0830555555555 |
| Degrees: | 33° 0' 27" N |
| Latitude: | 97° 4' 59" W |
| Longitude: | 4 |
| Direction: | 0 |
| Time Criteria: | YYYYNNNNYYYY |
| Delivery Flags: | N |
| Send Indicator Only: | 1 |
| Active Entry: | 6 |
| Content Type: | 0 |
| Offset: | -1 |
| Length: | Coffee House Grand Opening just before next light RHS - FREE COFFEE AND MUGS! |
| Path: | N |
| Store Compressed: | Free Coffee and Free Mugs |
| Short Text: | []http://www.coffeehous.com |
| Speed Reference: | 0 |
| DRservd 1: | 0 |
| DRservd 2: | 63 |
| Creator: | 192.168.1.26 |
| Creator IP Address: | 192.168.1.26 |
| Creator Host IP: | Dal75022 |
| Creator Host Name: | 4/20/2005 2:26:52 PM |
| D/T Created: | 192.168.1.26 |
| Last Chgr IP: | 192.168.1.26 |
| Last Chgr Host IP: | Dal75022 |
| Last Chgr Host: | 4/20/2005 2:30:24 PM |
| Name: | |
| D/T Last Changed: | |

Select here to return to first page of records. Back to Top

Fig. 96A

GPS Ping Alert Services

File Edit View Favorites Tools Help

Back Search Favorites

Address http://www.gpsping.com/svcalert.asp?fl= Go

Home
* Service *
Join

PINGGPSPING™

Help
Contact
About pinggps.com/svcalert

Auto-Messaging | Tracking | Alerts | Reports

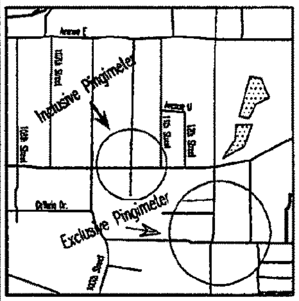

- Specify Inclusive Pingimeters for alerts when your PingPal(s) depart from a specified area.
- Specify Exclusive Pingimeters for alerts when your PingPal(s) arrive to a specified area.
- PingPal(s) must provide you with the privilege to set Pingimeters for them and must enable tracking for the applicable device. You then may specify a point on a map with a radius, and set associated triggers for alerts.
- Triggers define the Pingimeter type in context for your selected authorizing PingPal(s). An alert method (browser, email, and/or SMS message) is also selected.
- Set up to 5 Pingimeters in your account and enable or disable as an object any time you want. Create new ones, delete old ones, make changes, and save them for use at any time.
- Zoom in/out, re-center and pan maps used.
- Pingimeters are great for use by friends, family, employees, team/group members, etc.
- Polygon Pingimeters are under construction and will be available soon.

CHECK BACK WITH US! NEW EXCITING FEATURES ARE UNDERWAY

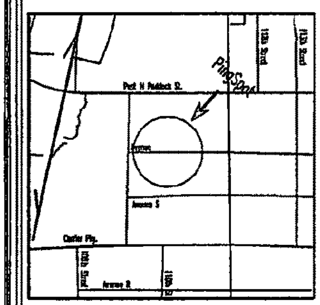

- Specify PingSpots and assign content for delivery to your PingPals who arrive to the spots at some future time.
- While in the field, conveniently and instantly mark the spot, specify a radius, and then, assign a content item and delivery method.
- PingPal(s) must provide you with the privilege to set PingSpots for them and must enable tracking for the applicable device.
- Triggers define a messaging method (browser, email, and/or SMS message) for delivery to your selected PingPal(s) who arrive to the PingSpot.
- Setup up to 5 PingSpots in your account and enable or disable as an object any time you want. Create new ones, delete old ones, make changes, and save them for use at any time.
- Zoom in/out, re-center and pan maps used.
- PingSpots are great for making landmarks for use by friends, family, employees, team/group members, etc.
- Great way to document where you've been and leave a message for PingPal(s) who will go there at a future time.

CHECK BACK WITH US! NEW EXCITING FEATURES ARE UNDERWAY

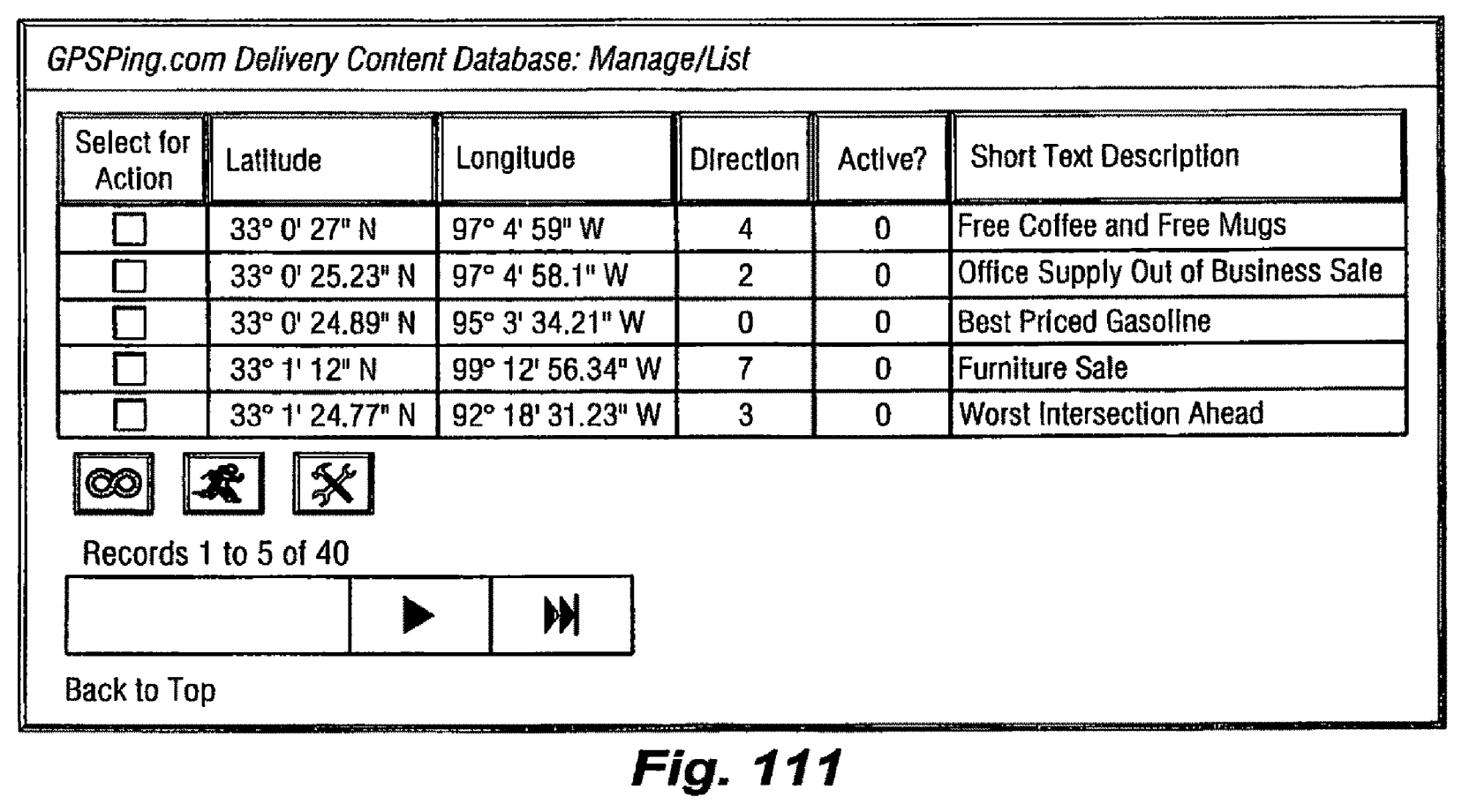

*GPSPing.com Delivery Content Database: Manage/List*

| Select for Action | Latitude | Longitude | Direction | Active? | Short Text Description |
|---|---|---|---|---|---|
| ☐ | 33° 0' 27" N | 97° 4' 59" W | 4 | 0 | Free Coffee and Free Mugs |
| ☐ | 33° 0' 25.23" N | 97° 4' 58.1" W | 2 | 0 | Office Supply Out of Business Sale |
| ☐ | 33° 0' 24.89" N | 95° 3' 34.21" W | 0 | 0 | Best Priced Gasoline |
| ☐ | 33° 1' 12" N | 99° 12' 56.34" W | 7 | 0 | Furniture Sale |
| ☐ | 33° 1' 24.77" N | 92° 18' 31.23" W | 3 | 0 | Worst Intersection Ahead |

Records 1 to 5 of 40

Back to Top

*Fig. 111*

*GPSPing.com Delivery Content Database: Manage/List*

| Select for Action | Latitude | Longitude | Direction | Active? | Short Text Description |
|---|---|---|---|---|---|
| ☐ | 33° 0' 27" N | 97° 4' 59" W | 4 | 0 | Free Coffee and Free Mugs |
| ☐ | 33° 0' 25.23" N | 97° 4' 58.1" W | 0 | 1 | Office Supply Out of Business Sale |
| ☐ | 33° 0' 24.89" N | 95° 3' 34.21" W | 0 | 0 | Best Priced Gasoline |
| ☐ | 33° 1' 12" N | 99° 12' 56.34" W | 7 | 0 | Furniture Sale |
| ☐ | 33° 1' 24.77" N | 92° 18' 31.23" W | 3 | 0 | Worst Intersection Ahead |

Records 1 to 5 of 40

Back to Top

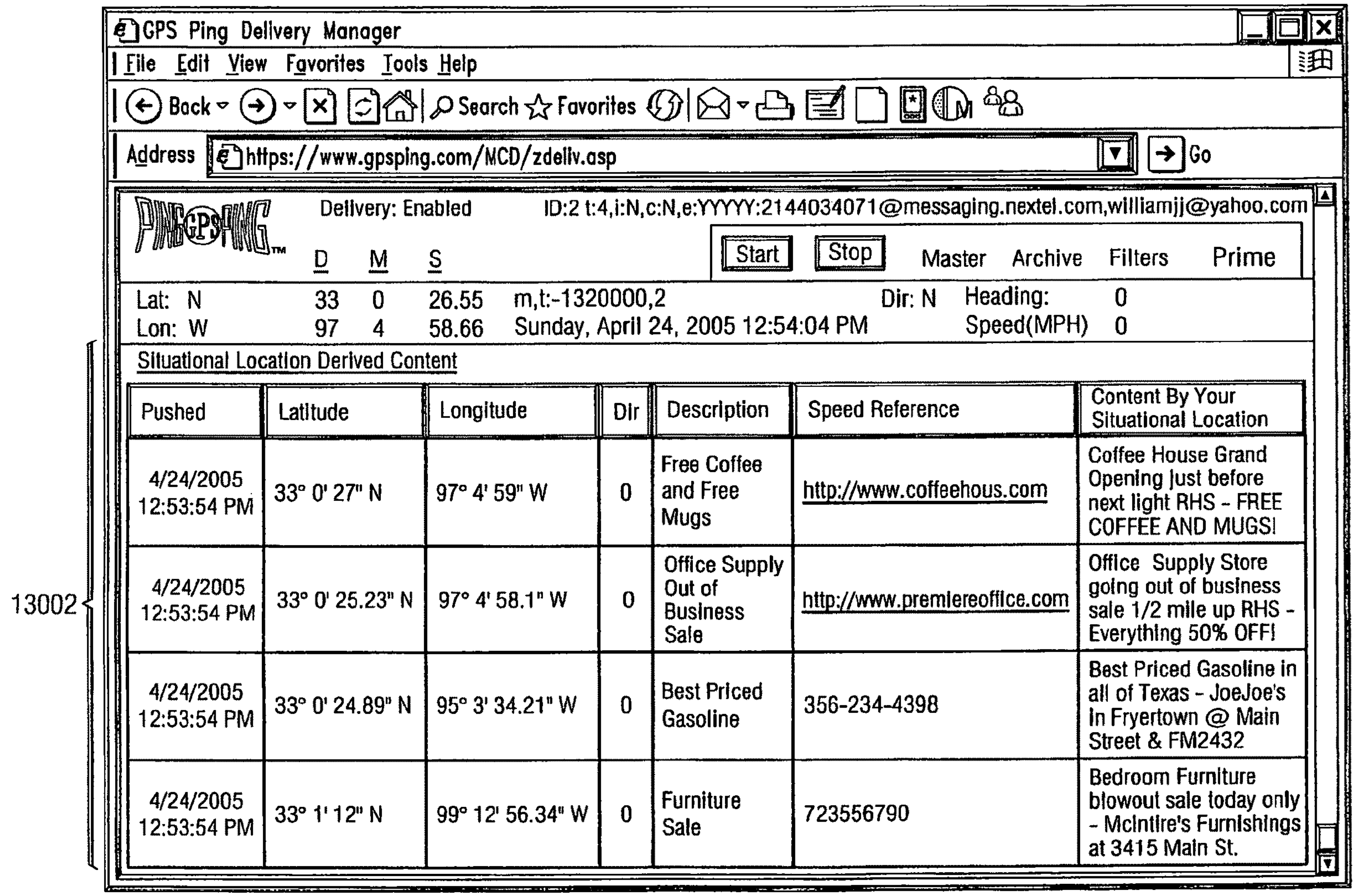

| Pushed | Latitude | Longitude | Dir | Description | Speed Reference | Content By Your Situational Location |
|---|---|---|---|---|---|---|
| 4/24/2005 12:53:54 PM | 33° 0' 27" N | 97° 4' 59" W | 0 | Free Coffee and Free Mugs | http://www.coffeehous.com | Coffee House Grand Opening just before next light RHS - FREE COFFEE AND MUGS! |
| 4/24/2005 12:53:54 PM | 33° 0' 25.23" N | 97° 4' 58.1" W | 0 | Office Supply Out of Business Sale | http://www.premiereoffice.com | Office Supply Store going out of business sale 1/2 mile up RHS - Everything 50% OFF! |
| 4/24/2005 12:53:54 PM | 33° 0' 24.89" N | 95° 3' 34.21" W | 0 | Best Priced Gasoline | 356-234-4398 | Best Priced Gasoline in all of Texas - JoeJoe's in Fryertown @ Main Street & FM2432 |
| 4/24/2005 12:53:54 PM | 33° 1' 12" N | 99° 12' 56.34" W | 0 | Furniture Sale | 723556790 | Bedroom Furniture blowout sale today only - McIntire's Furnishings at 3415 Main St. |

Figure 138C:
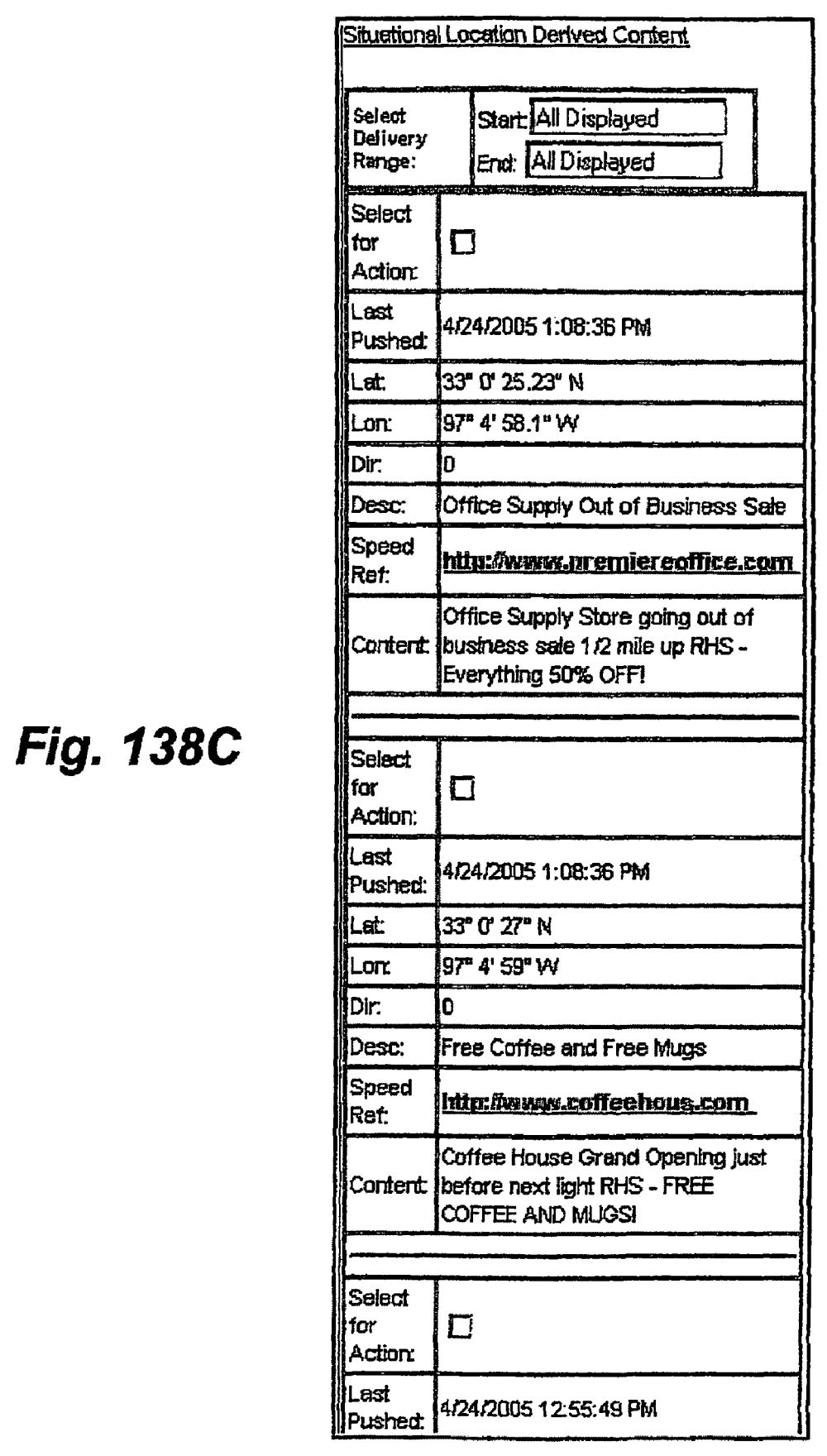

Situational Location Derived Content

| | |
|---|---|
| Select Delivery Range: | Start: All Displayed<br>End: All Displayed |

| | |
|---|---|
| Select for Action: | ☐ |
| Last Pushed: | 4/24/2005 1:08:36 PM |
| Lat: | 33° 0' 25.23" N |
| Lon: | 97° 4' 58.1" W |
| Dir: | 0 |
| Desc: | Office Supply Out of Business Sale |
| Speed Ref: | http://www.premiereoffice.com |
| Content: | Office Supply Store going out of business sale 1/2 mile up RHS - Everything 50% OFF! |

| | |
|---|---|
| Select for Action: | ☐ |
| Last Pushed: | 4/24/2005 1:08:36 PM |
| Lat: | 33° 0' 27" N |
| Lon: | 97° 4' 59" W |
| Dir: | 0 |
| Desc: | Free Coffee and Free Mugs |
| Speed Ref: | http://www.coffeehous.com |
| Content: | Coffee House Grand Opening just before next light RHS - FREE COFFEE AND MUGS! |

| | |
|---|---|
| Select for Action: | ☐ |
| Last Pushed: | 4/24/2005 12:55:49 PM |

*Fig. 138D*

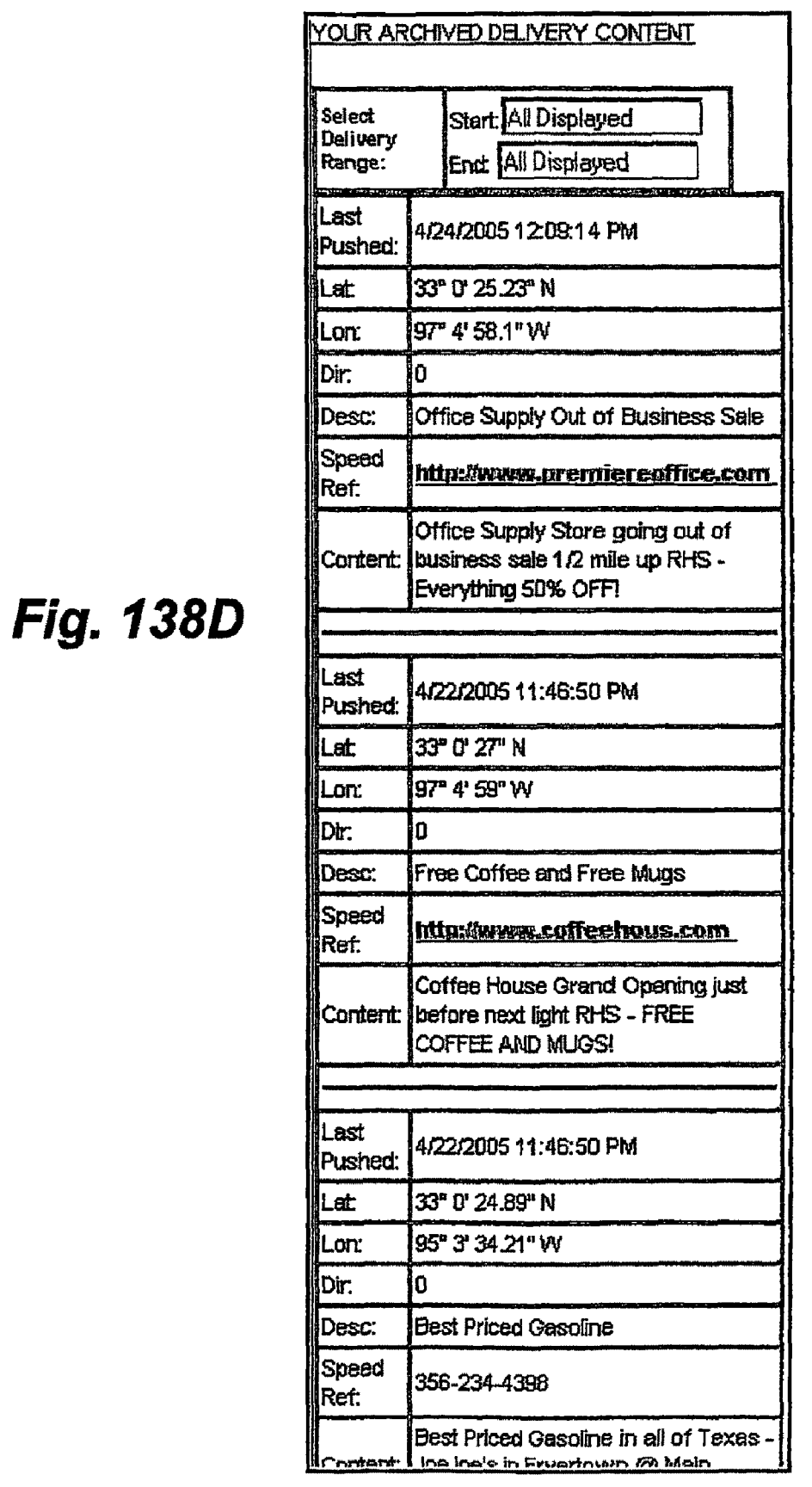

YOUR ARCHIVED DELIVERY CONTENT

| | | |
|---|---|---|
| Select Delivery Range: | Start: All Displayed | End: All Displayed |

| | |
|---|---|
| Last Pushed: | 4/24/2005 12:08:14 PM |
| Lat: | 33° 0' 25.23" N |
| Lon: | 97° 4' 58.1" W |
| Dir: | 0 |
| Desc: | Office Supply Out of Business Sale |
| Speed Ref: | http://www.premiereoffice.com |
| Content: | Office Supply Store going out of business sale 1/2 mile up RHS - Everything 50% OFF! |

| | |
|---|---|
| Last Pushed: | 4/22/2005 11:46:50 PM |
| Lat: | 33° 0' 27" N |
| Lon: | 97° 4' 59" W |
| Dir: | 0 |
| Desc: | Free Coffee and Free Mugs |
| Speed Ref: | http://www.coffeehous.com |
| Content: | Coffee House Grand Opening just before next light RHS - FREE COFFEE AND MUGS! |

| | |
|---|---|
| Last Pushed: | 4/22/2005 11:46:50 PM |
| Lat: | 33° 0' 24.89" N |
| Lon: | 95° 3' 34.21" W |
| Dir: | 0 |
| Desc: | Best Priced Gasoline |
| Speed Ref: | 356-234-4398 |
| Content: | Best Priced Gasoline in all of Texas - Joe Joe's in Fvertown @ Main |

| | |
|---|---|
| Interests: | |
| Filters: | |
| Addresses: | 2144034071@messaging.nextel.com (sms ON)<br>williamjj@yahoo.com (email ON) |

*Fig. 138E* m2.asp - Notepad

Figure 143A:
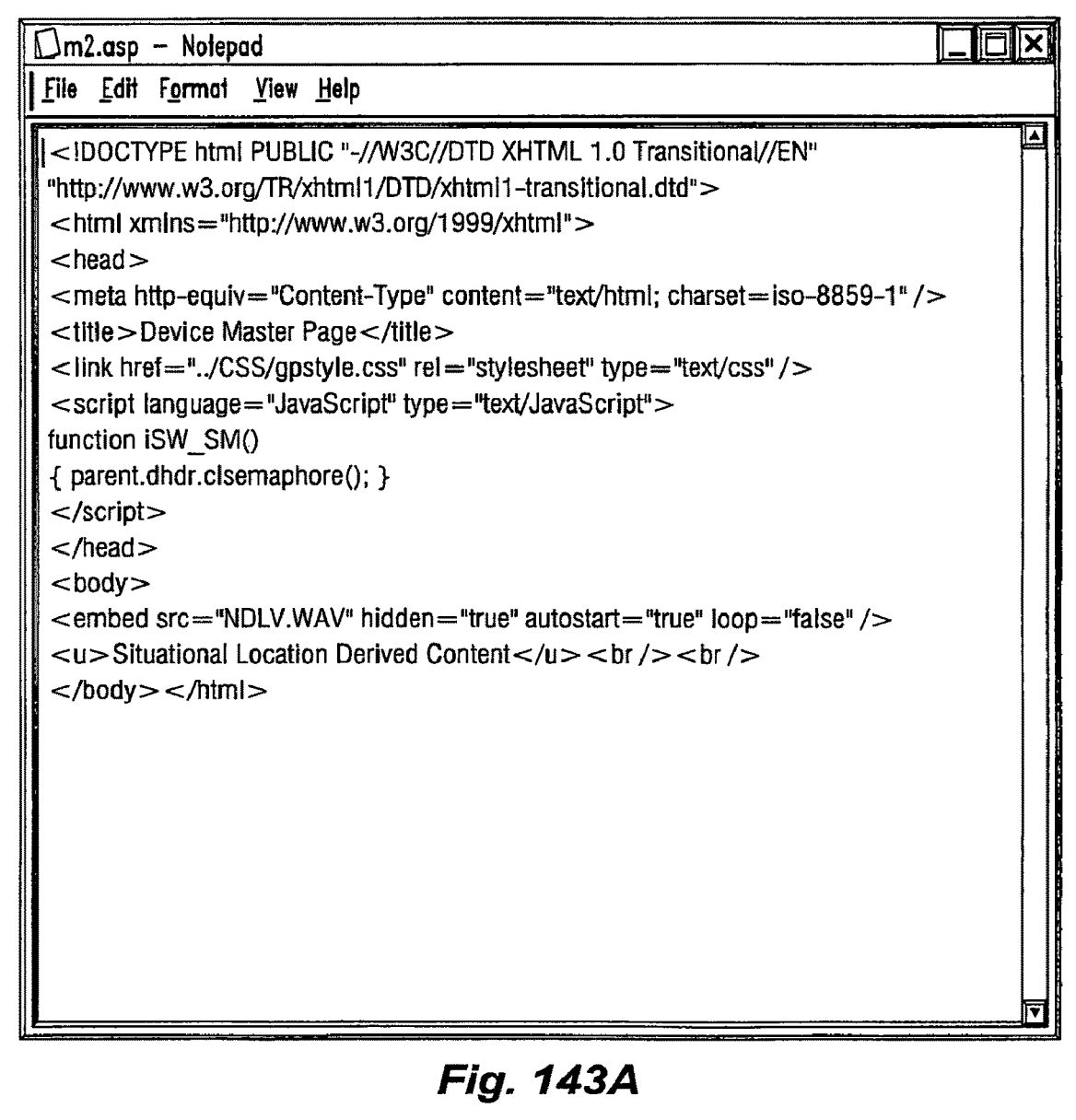

File Edit Format View Help

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
<meta http-equiv="Content-Type" content="text/html; charset=iso-8859-1" />
<title>Device Master Page</title>
<link href="../CSS/gpstyle.css" rel="stylesheet" type="text/css" />
<script language="JavaScript" type="text/JavaScript">
function iSW_SM()
{ parent.dhdr.clsemaphore(); }
</script>
</head>
<body>
<embed src="NDLV.WAV" hidden="true" autostart="true" loop="false" />
<u>Situational Location Derived Content</u><br /><br />
</body></html>
```

*Fig. 143A* a2.asp - Notepad

File Edit Format View Help

```
<!DOCTYPE html PUBLIC "-//W3C//DTD XHTML 1.0 Transitional//EN"
"http://www.w3.org/TR/xhtml1/DTD/xhtml1-transitional.dtd">
<html xmlns="http://www.w3.org/1999/xhtml">
<head>
<meta http-equiv="Content-Type" content="text/html; charset=iso-8859-1" />
<title>Device Archive Page</title>
<link href="../CSS/gpstyle.css" rel="stylesheet" type="text/css" />
</head>
<body>
<u>YOUR ARCHIVED DELIVERY CONTENT</u><br />
</body></html>
```

*Fig. 143B*

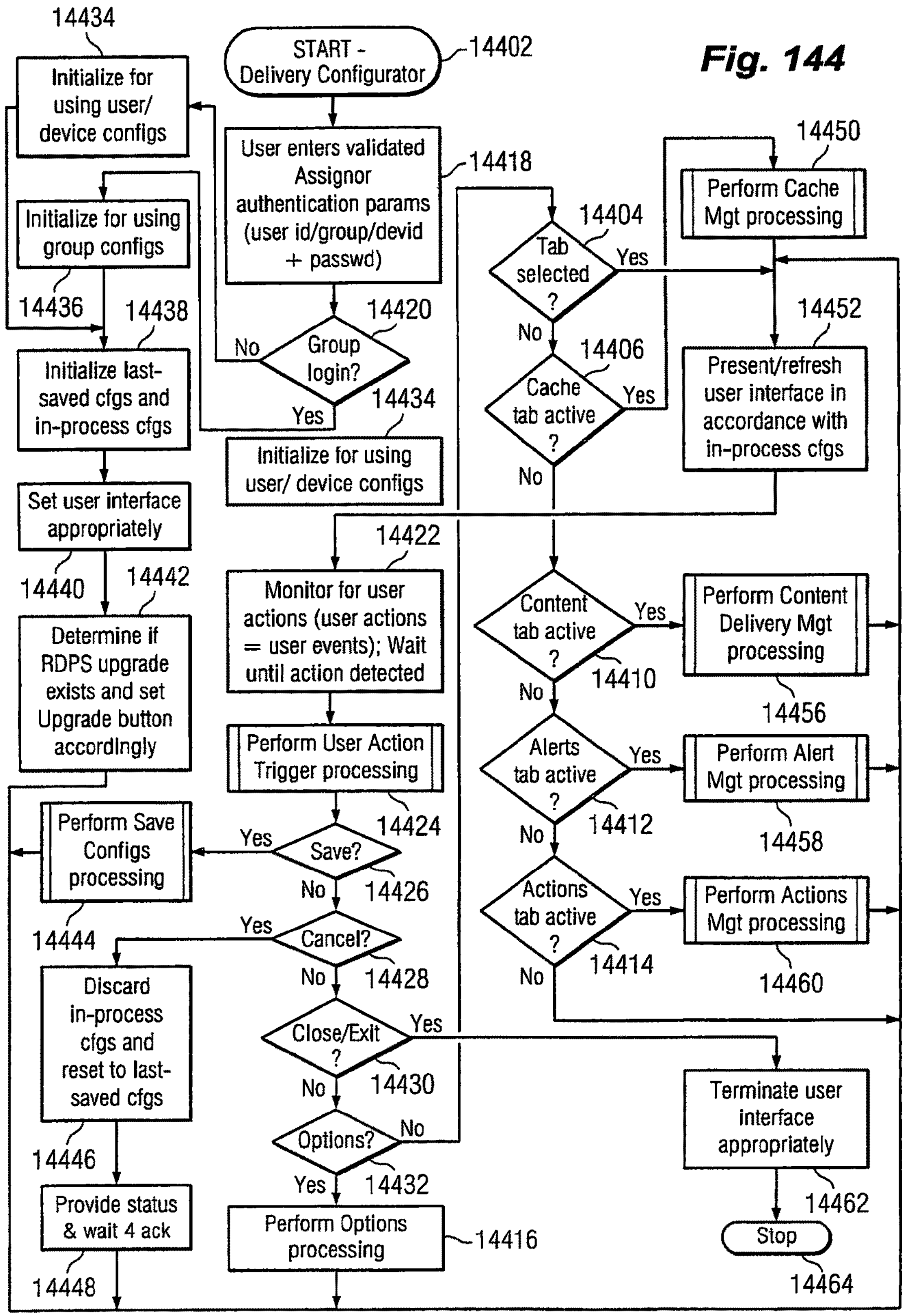

Fig. 144
START - Delivery Configurator
14402
User enters validated Assignor authentication params (user id/group/devid + passwd)
14418
Group login?
14420
No
Yes
Initialize for using user/ device configs
14434
Initialize for using user/ device configs
14434
Initialize for using group configs
14436
Initialize last-saved cfgs and in-process cfgs
14438
Set user interface appropriately
14440
Determine if RDPS upgrade exists and set Upgrade button accordingly
14442
Monitor for user actions (user actions = user events); Wait until action detected
14422
Perform User Action Trigger processing
14424
Save?
14426
Perform Save Configs processing
14444
Cancel?
14428
Discard in-process cfgs and reset to last-saved cfgs
14446
Provide status & wait 4 ack
14448
Close/Exit ?
14430
Options?
14432
Perform Options processing
14416
Tab selected ?
14404
Cache tab active ?
14406
Perform Cache Mgt processing
14450
Present/refresh user interface in accordance with in-process cfgs
14452
Content tab active ?
14410
Perform Content Delivery Mgt processing
14456
Alerts tab active ?
14412
Perform Alert Mgt processing
14458
Actions tab active ?
14414
Perform Actions Mgt processing
14460
Terminate user interface appropriately
14462
Stop
14464

15300

| | |
|---|---|
| ASSIGNOR_ID | 15302 |
| ASSIGNOR_TYPE | 15304 |
| ASSIGNEE_ID | 15306 |
| ASSIGNEE_TYPE | 15308 |
| CONFIG_TYPE | 15310 |
| REC_TYPE | 15312 |
| DELIV_TYPE | 15314 |
| Q4LATER | 15316 |
| CONFIG_ID | 15318 |

| | |
|---|---|
| CONFIG_ID | 15402 |
| USE_SITUATIONAL_LOC | 15404 |
| SITUATIONAL LOCATION | 15406 |
| ALERT COMMUNICATIONS INFO | 15408 |

| | |
|---|---|
| REGISTRANT_ID | 15602 |
| REGISTRANT_TYPE | 15604 |
| ACTION_ID | 15606 |
| ACTION_CONTEXT_INFO | 15608 |
| DATETIME_STAMP | 15610 |

| | |
|---|---|
| ACTION_ID | 15702 |
| USER_EVENT | 15704 |
| DESCRIPTION | 15706 |

*Fig. 157*

SYSTEM AND METHOD FOR ALERTING A FIRST MOBILE DATA PROCESSING SYSTEM NEARBY A SECOND MOBILE DATA PROCESSING SYSTEM

CROSS-REFERENCES TO RELATED APPLICATIONS

This application is a divisional application of co-pending application Ser. No. 11/207,080, filed Aug. 18, 2005, entitled "System and Method for Anonymous Location Based Services", which is a continuation-in-part of application Ser. No. 10/823,386, filed Apr. 12, 2004, and entitled "System and Method for Proactive Content Delivery By Situational Location", now U.S. Pat. No. 7,187,997, issued Mar. 6, 2007, which is a divisional of application Ser. No. 10/167,532, filed Jun. 11, 2002, and entitled "System and Method for Proactive Content Delivery By Situational Location", now U.S. Pat. No. 6,731,238, issued May 4, 2004, which is a divisional of application Ser. No. 09/589,328 filed Jun. 7, 2000, and entitled "System and Method for Proactive Content Delivery By Situational Location", now U.S. Pat. No. 6,456,234, issued Sep. 24, 2002.

REFERENCE TO A "SEQUENCE LISTING", A TABLE, OR A COMPUTER PROGRAM LISTING APPENDIX SUBMITTED

Included in filing this application are two (2) CD-ROMs which are identical copies. The CD-ROMs were each created on Jul. 3, 2007. The files were originated and maintained on a Microsoft Windows operating system and are compatible with Windows operating systems or any other operating system that can handle the file types described below. The files represent a small selection of source file examples of implemented parts of the present application. Files were each created at various dates and may have been edited thereafter at various dates. "Created" dates are derived from the source code headers assuming the file creator ensured an accurate date, however there may be earlier versions of different named files which evolved into the resulting files below. The "Modified" dates are last modified dates automatically maintained by a Windows operating system at Central Standard Time. Contents of each CD-ROM are the following:

| File name | Size | Format | Created; Modified | Description |
|---|---|---|---|---|
| convdegs.asp | 5 KB | ASCII text | Dec. 3, 2004; May 1, 2005 | Javascript include file example for converting decimal degrees to D, M, S, P/H |
| Default.asp | 10 KB | ASCII text | Sep. 12, 2004; Dec. 18, 2004 | GPSPing.com home page example |
| gpstools.asp | 8 KB | ASCII text | Dec. 3, 2004; May 1, 2005 | Javascript include file example for Active-X device GPS interface |
| gsec.asp | 35 KB | ASCII text | Sep. 25, 2004; Dec. 18, 2004 | VBScript heterogeneous heartbeat processing example (e.g. for cell phone) |
| gseclog.asp | 8 KB | ASCII text | Oct. 4, 2004; Dec. 17, 2004 | VBScript heterogeneous device logon example to retrieve Registry Table fields for heartbeats |
| mcdcchdr.asp | 39 KB | ASCII text | Apr. 14, 2004; Dec. 17, 2004 | VBScript heterogeneous Delivery Manager control header processing example |
| Mcdg.asp | 28 KB | ASCII text | Apr. 14, 2004; Dec. 18, 2004 | VBScript heterogeneous heartbeat processing example driven from Delivery Manager GUI |
| svcautom.asp | 10 KB | ASCII text | Dec. 6, 2004; Dec. 24, 2004 | VBScript GPSPing.com Service page example |
| tigermap.pdf | 9,076 KB | Adobe PDF | Hard copy Apr. 2, 2005; Aug. 16, 2005 | Scanned printout of http://tiger.census.gov/instruct.html free map service manual |
| woptions.asp | 2 KB | ASCII text | Feb. 11, 2005; Mar. 20, 2005 | VBScript WAP WML options example (e.g. for minimal capability cell phone) |
| Xmcd.asp | 12 KB | ASCII text | Sep. 12, 2004; Mar. 18, 2005 | VBScript heterogenous logon page example |
| xmcdlout.asp | 4 KB | ASCII text | Apr. 4, 2004; Mar. 17, 2005 | VBScript heterogenous logout page example |
| xoptions.asp | 11 KB | ASCII text | Apr. 14, 2004; Mar. 29, 2005 | VBScript heterogeneous members area options example |
| Zdeliv.asp | 10 KB | ASCII text | Apr. 14, 2004; Dec. 16, 2004 | VBScript heterogeneous Delivery Manager frames setup page example |
| Zdinit.asp | 3 KB | ASCII text | Apr. 14, 2004; Dec. 15, 2004 | VBScript heterogeneous initialization page example |
| zgpsdash.asp | 10 KB | ASCII text | Jun. 26, 2004; Dec. 15, 2004 | VBScript heterogeneous GPS real-time collection dashboard example |
| Zmast.asp | 17 KB | ASCII text | Apr. 14, 2004; Dec. 17, 2004 | VBScript heterogeneous device Master processing example |

FIELD OF THE INVENTION

The present invention relates generally to location dependent delivery of information to mobile data processing systems, and more particularly to a system for delivering situational location dependent content to data processing system devices traveling to locations for, or in directions of, that place which delivery content is designated as deliverable. Further generally related is location based services and internet accessed automated web services.

BACKGROUND OF THE INVENTION

The boom of the internet has greatly provided information to mobile users through wireless web server connected devices such as laptops, personal digital assistants (PDAs), and telephones. People with an internet enabled device can access yahoo.com (yahoo is a trademark of Yahoo corporation) and other internet connected resources. There are also Global Positioning System (GPS) devices that enable mobile users to know exactly where they are on a particular map. Users with GPS device functionality can further manually enter their known location into an internet MAP directory service (e.g. yahoo.com Maps) and then provide a target address they want to go to. Step by step instructions are then provided to the user for how to get to the destination from the current location. Some GPS devices provide local processing for directing, and narrating to, a driver. Mating automated location finding systems with internet travel direction services is an attractive blend.

Cadillac recently announced the OnStar program with sales of Cadillac automobiles (Cadillac and OnStar are trademarks of General Motors corporation). A person is enabled with calling upon an “OnStar Advisor” 7 days a week, 24 hours a day, with the press of a button. An emergency call, for example 911, or for a disabled Cadillac vehicle, allows a driver to instantly call upon wireless connected assistance. The driver may also call upon the OnStar Advisor for directions to a destination. The Advisor has access to automatic processing for determination of the vehicle’s current location in case of auto theft, a disabled vehicle, or assisting with directions. The Advisor can also remotely unlock the vehicle should the driver lock the keys in the car. In effect, Cadillac drivers have full time wireless connected assistance around the clock for many reasons. While the location determination of the vehicle is automatic, there remain manual processes performed by the Advisor. Automation of some of these processes is desirable.

Many internet services derive their revenue stream from advertising. Advertisers pay to have their content delivered to users who access website and web server interfaces. Advertisers desire to target their audience at the most appropriate time. Knowing the location of a user as being relevant to a particular advertisement is desirable. Automating the delivery of the content is desirable.

A method is needed for a low cost business model that enables the efficient configuration of deliverable content for automatic delivery to mobile users based on their situational location that is relevant to receive such content.

To make such services attractive to consumers, quality deliverable content is needed, an environment promoting anonymous use is desirable, and additional complementary location based services will enhance the experience and entice consumers to use services. Consumers are concerned with privacy so location based services should be sensitive to privacy concerns. A model providing private and anonymous location based services without limitation of functionality is desirable.

Two companies, uLocate.com and dodgeball.com, have developed internet accessed websites for making use of user location information (uLocate.com and dodgeball.com are respective trademarks of the website companies). The uLocate.com website lacks full automation, automated registration, privilege assignments, different user types, and does not contain the many other features disclosed below in this application. The dodgeball.com website does not leverage automatic location capability using GPS or triangulation. Text messages have to be manually entered for features and functionality of the website. A globally accessed website is needed that integrates a better mode of such classes of websites using automated features, along with many new features not offered by the websites to provide an enhanced set of location based services.

Different users use different types of devices: laptops, tablet PCs, PDAs, cell phones, etc. An automated website that supports location enhanced services for heterogeneous devices is needed. This should include any mobile device capable of communicating with a web service. Automated account registration, automated billing, and high performance support for mass numbers of users is desirable. Automated deletion of obsolete accounts and data is also desirable. Eliminating the use of (or at least minimizing) human resource operations is reasonable. The websites yahoo.com, google.com, and ebay.com have demonstrated well the ability to provide valuable services to a large dispersed geographic audience through the internet without many human resources to keep the basic operations an on-going business concern (ebay, yahoo, and google are trademarks of the respective website companies). Location enhanced services can be developed to provide a similar model.

Users should have the ability to customize their experience with a website not only in how they interact with the service user interface, but how the service functionality behaves in accordance to user preferences. Users should have complete control over their devices and how they interact with a service through conveniently maintained configurations. All functionality should be provided so users are anonymous and can help themselves to the service.

Not only should deliverable content be configured for targeting mobile users, but the mobile users should also be able to configure deliverable content for other mobile users with novel functionality of interaction and interoperability. Novel methods are further desirable for convenient configuration of the content as well as the convenient configuration of applicable situational locations used to deem delivery of the content. In cases where an indicator is more desirable in place of associated content, users should have the ability to customize delivery indicators. Delivery indicators provide a high performance method for delivery and perhaps provide an element of privacy in cases where content is delivered over an unencrypted communications link. There should be the utmost respect for privacy. Encrypted communications sessions are desirable regardless of the content delivered. People do not want third parties knowing their situational locations, or the content that is delivered based on their situational locations.

BRIEF SUMMARY OF THE INVENTION

The present invention provides transmission of situational location dependent information from a server data processing system (SDPS) to a receiving data processing system (RDPS). The server data processing system (SDPS) communicates with the receiving data processing system (RDPS) by pushing content (i.e. proactive content delivery) when appropriate, rather than in response to a user query. A candidate delivery event associated with a current positional attribute of the receiving data processing system is recognized and a situational location of the remote data processing system is determined. The candidate delivery event may be a location and/or direction change, device state change, or movement exceeding a movement tolerance. The situational location of the remote data processing system may be its location, direction, location and direction, proximity to a location, state change, or location and/or direction relative to a previous location and/or direction, or combinations thereof. At the SDPS, a set of delivery content from a deliverable content database is retrieved according to the situational location of the RDPS, and according to system delivery constraints and/or configured user delivery constraints. The SDPS transmits any applicable content found to the RDPS. The delivery content is configurable by authorized administrators in a manner that enables the configured content for immediate delivery should a RDPS meet the criteria of the associated situational location and delivery constraints.

Various embodiments with respect to recognizing a candidate delivery event and determining a situational location include:

- the SDPS recognizes the candidate delivery event (e.g. various wireless embodiments and physical connection embodiments)
- the RDPS recognizes the candidate delivery event (e.g. GPS and some wireless)
- the SDPS determines the situational location associated with the candidate delivery event which may have been determined by the RDPS and communicated to the SDPS, or determined by the SDPS
- the RDPS determines the situational location associated with the candidate delivery event and communicates the information to the SDPS for further processing A situational location is completely determined for the RDPS upon the candidate delivery event. Content that can be delivered is fully configurable, of any type, and can be instantly activated for candidate delivery upon convenient administration. As well known in the art of software installation, the present invention may be installed to a variety of network embodiments and underlying operating systems through installation parameters, or as distinct installations for the particular platform. Preferably, an internet connection is used for configuring deliverable content, and for the interoperation of communications between the RDPS and SDPS.

The present invention enables a user of a RDPS to be made aware of content that is applicable for the current situational location of the user. Depending on the application of the present invention, the content and configurations will take on a variety of themes.

For example, in an outdoor wireless embodiment of the present invention, advertisement content can be configured by paying customer advertisers through an internet web interface, and then automatically delivered to people when the people are in a location, or heading path to a location, for reasonable delivery of the content to their automobile installed, or handheld, RDPS. For example, as a driver or pedestrian (i.e. user) approaches a retail store with a mobile RDPS, a configured advertisement of a special deal at the retail store can be proactively delivered (i.e. pushed) to the user automatically on behalf of the store. Likewise, an indoor wireless embodiment of the present invention enables the driver or pedestrian, now a shopper inside the store, to receive configured content to a shopping cart mounted, or handheld, RDPS directing the shopper to specific sales items as the shopper moves about the inside of the store.

In another application, a policeman may activate a mobile police automobile device (i.e. RDPS) in a police car for automatic delivery of a person's criminal record as the policeman drives by the location of a person's house. The police establishment configures criminal record content, or pointers thereto, along with the location of the residence that is believed to harbor the person with a record. As the policeman drives by locations with addresses of known offenders, the RDPS displays applicable criminal data. Of course, the policeman can enable or disable the functionality as needed.

In another application, a traveling vehicle, for example a touring bus, carries tourists for a narrated drive through a geographic area. Currently, there are human narrators for providing narration of sites and landmarks to people of the narrated drive. The present invention allows configuring deliverable content for locations on the touring bus path so that an automated narrator RDPS installed in the bus can be provided to people on the bus. For example, an RDPS providing audio, video, multimedia, or combination thereof, communicates narration content to people on the touring bus automatically as locations are encountered, or driven by.

In another application, a person attending a large park (e.g. Disney World (Disney World is a trademark of Walt Disney corporation)) could simply carry a RDPS, and receive content to a handheld device for what attraction lies ahead based on the current location and direction of the person. The person would not have to consult a directory or ask where to find something. Informative content would be proactively delivered, rather than reactively in response to a person's manual query to a service, or question to a human being.

In yet a further example, a valuable use would be for emergencies such as when a child is kidnapped. Currently, there is an Amber-Alert mechanism in Dallas/Ft. Worth, Tex. where radio stations broadcast an emergency message along with a distinguishable series of tones. This enables any pertinent information known about the kidnapper and child to be broadcast immediately to everyone with the radio on. The present invention enables the emergency broadcast to be immediately configured and then communicated to everyone with a RDPS, for example with a wireless internet connection. A picture of the victim and other multimedia information could be delivered along with audio immediately.

In still a further use of the present invention, garage sale and estate sale advertisements could be configured on behalf of paying customers that would otherwise use a newspaper classified section. As drivers become in reasonably close proximity to the sale, in the desired time window, advertisement content would be proactively delivered to a wireless RDPS installed, or handheld, in the automobile.

Thus, there are many applications for the present invention, all accomplished through simply changing the way the present invention is used. Content is pushed out to receiving devices at the most appropriate times. Users do not pull the content with a query.

It is therefore an advantage of the present invention in supporting a variety of applications and uses. The way the invention is used makes it applicable to a wide range of applications. For example, a deliverable content database can be configured with content that is appropriate for the particular application. Situational location parameters associated with the particular application are also variable, provided the installed methodology is utilized consistently. For example, world coordinates, GPS coordinates, regional coordinates, MAPSCO references, Application Address Book locations and directions, a user's caller id, a cell number in a cellular network, and like means used to describe a location can be used. Directional information of North, South, East, West, Northeast, Southeast, Northwest, Southwest, Up, Down, Left, Right, Straight, Back, and like methods used to describe a direction can be used. Further still, there are delivery constraints that can be set up for a system, or configured by a user, which provides flexibility in adapting to a variety of applications.

It is another advantage of the present invention in providing deliverable content to a person, based on the situational location of the person. Content is pushed to a user's RDPS when it is most appropriate for the user to see the content.

It is another advantage of the present invention in automatically recognizing a candidate delivery event of a RDPS and automatically determining a situational location of the RDPS. A user is not burdened with providing information on a query. The present invention automatically determines when content should be delivered and then automatically and proactively delivers it. Content is pushed to the user (of the RDPS). The user is not burdened with pulling content via a query.

It is a further advantage of the present invention to deliver any type, variety, or combination of content. The content is fully configurable by an authorized administrator who may be a paying customer for the privilege of performing configurations. Upon configuration, the content is immediately and instantly activated for proactive delivery to any RDPS meeting the configured criteria. Content may be audio, video, graphical, textual, multimedia, intranet/internet web address(es) activated for transposable selection, image, or any combination thereof.

It is another advantage in maintaining a history of delivered content at the RDPS with information that is useful for later browsing. Contained therein is information relevant to the delivered content. Additionally, provided is an invocable speed address enabling the user to transpose to a web address, or perform a speed dial phone call, that is associated with the delivered content.

Yet another advantage of the present invention is providing new and useful query functionality for querying the total number of known receiving data processing systems for a particular situational location, querying any content configured for delivery to a particular situational location with a comprehensive variety of query parameters, and querying up to a maximum threshold number of deliverable content instances for a particular location in a manner which automatically determines containing (ascending) locations, if necessary, until the specified number is met.

A further advantage is to provide a web service in the context of successful website (web service) offerings such as yahoo.com, google.com, and ebay.com. A web service is a service that is accessed via the public internet. These websites permit users from all over the globe to participate in website functionality. The anonymity, flexibility, functionality, and availability of a web service disclosed herein falls into a similar category for offering consumers enticing services and making them easy to use, while eliminating human resources required for operating the service. The web service disclosed herein is completely automated and does not require a single human being to operate it. Users of the site interoperate and use the web service functionality through completely automated services. The web service maintains itself and its data in response to how the users use the service. Users can remain anonymous while taking advantage of exciting location based services, and the users have full control over how they interact with other users through the service.

Two other websites (web services), uLocate.com and dodgeball.com are missing a multitude of features in fully automating their features and functionality. The web service embodiment discussed herein provides a superior fully automated experience for users seeking location based services in richness of features and functionality not found elsewhere.

A further advantage includes implementing a web service as a hub between different user types for configuring deliverable content and for receiving deliverable content during mobile activity with heterogeneous communications devices. Another advantage is making the web service reasonably anonymous for protecting the privacy of users, but at the same time providing enough information to support statistical inferences and reports. Regardless of the anonymity, granular privacy configurations are provided for full user control over what other users can and cannot do in interoperating with each other through the web services.

A further advantage includes supporting a plurality of different user types with different incentives to use the web service. For example, content providers are incented to provide quality content for reaching mobile users, and for receiving statistics about market conditions based on targeted content deliveries that are actually delivered. Mobile users are incented to use the service because of richness of location based service features not found anywhere else in the world. A Site Owner is incented to deploy the service for providing a value add to mobile users in return for business provided by paying user types, understanding market conditions, controlling the quality of information communicated in a particular application, or simply having the many features available for a specific application. Quality deliverable content is scoped by the group of associated users.

Yet another advantage herein is for promoting anonymous use and the utmost privacy. Consumer privacy is respected through granular privacy configuration as well as a reasonably anonymous specification of information for creating an account to the service. Encrypted communications sessions are used wherever possible regardless of the content delivered.

Yet another advantage is providing map based solutions, user defined deliverable content through a variety of convenient specification methods, a user defined mobile interest radius for targeting which mobile point on earth to deliver content, a user defined hit radius for targeting which area on earth to target content deliveries to mobile users who travel there, and full user customization for how content deliveries are to be made. A mobile interest radius and/or hit radius can be defaulted so a user does not have to configure it.

A further advantage is in providing a global, fully scalable, high performance web service that automates many of the manual value add features of websites such as yahoo.com, google.com, ebay.com, uLocate.com and dodgeball.com. Automation provided herein:

- Enables users to completely customize their experience with the web service through user preferences, profiles, privileges, and account related configurations;
- Enables users to set up proactive search capability so users are not required to spend time waiting, or looking, for search results;
- Brings buyers and sellers together through automatically determining relative situational locations, or mobile user proximity to situational locations of the good being sold, or the mobile locations of purchasers seeking goods at desirable locations;
- Provides superior map solutions in the context of interoperability between mobile users; and Improves the communications experience between business associates, family, friends, or any other group of people where an enhanced location based communications will enhance the lives of the people involved.

Still another advantage herein is for support of heterogeneous locatable devices. Different people like different types of devices. Laptops, Tablet PCs, PDAs, cell phones, and any other communications device is supported. Complete automation of account registration, account management, automated billing, and web service interoperability is provided for eliminating human resource operations to operate the services. Locating functionality can be provided to a device through local automatic location detection means or by automatic location detection means remote to the device. Automatic location detection means determines the whereabouts of a device, and examples include GPS (Global Positioning System) chips, GPS accessories, blue-tooth connected GPS, triangulated location determination, cell-tower triangulated location, antenna triangulated location, in-range proximity based location detection, combinations thereof, or by any other automatic location detection means. The NexTel GPS enabled iSeries cell phones provide excellent examples for use as mobile devices 2540. This includes Nextel phones i325, i58sr, i710, i733, i736, i830, i860, and i88S (Nextel is a trademark of Nextel corporation). Blue-tooth enabled cell phones, PDAs, and other devices also provide excellent examples for use as mobile devices 2540. In one embodiment, the GPS functionality is adapted with a blue-tooth wireless connection between the device(s) and the GPS receiver, often up to as much as 30 feet apart with distances increasing. This disclosure supports any device with GPS functionality regardless of how the GPS functionality is provided to, or for, the device. Many PDAs and cell phones may be blue-tooth enabled which provides the ability to adapt GPS locating means to the device. This disclosure also supports proximity location means which involves a device coming within range of a detecting means for determining a known location. Being within range of the detecting means implies locating the device by associating it to the location of the detecting means. There are various wireless detection methods and implementations well know in the art for knowing when a device comes into range of communications.

Another advantage is in providing a deep integrated set of mapping solutions, convenient situational location specification interfaces, and complete user control for how information is delivered, whether it be by email, SMS messages, cell phone voice connectivity, internet/intranet browser contexts, or any other communications method.

An advantage as disclosed herein is in providing a fully automated web service for a variety of applications. One embodiment is to provide a completely free service to consumers with only the content providers being the paying customers. Consumers are enticed to use the web service by its unprecedented quality of free features offered while the content providers are enticed to use the service because of the large base of consumers attracted in using the free services. Consumers and content providers can conveniently join the service through any web browser. Nothing prevents a person from opening, managing, and closing their own accounts. Further provided is automated billing and account maintenance. Internet connectivity into the web service is all that is required. A reasonable account validation is incorporated to determine that a person opening an account is indeed who he claims to be without asking for personal information perceived to be too personal.

A further feature and advantage is to incorporate an SQL (Standard Query Language) data model for users accounts, device management, content management, user interface management, and in every reasonable aspect of the web service. This model allows leveraging useful features such as backup/restore, high performance I/O (input/output) transactions, heterogeneously developed source code, platform and operating system independence of the implementation, and a proven scalable foundation upon which to build services.

Yet a further advantage herein is security. Each user interface contains access control for enforcing who gets access to which interfaces. Further provided are encrypted communications sessions in appropriate contexts to the web services. An authenticated logon is provided, and automatic transposition to web service options is performed if it is determined that a successful logon had taken place before within a reasonable timeframe from the same device, thereby to prevent burdening the user with repetitively logging on with credentials. User types into the web service have different privileges.

Another advantage is full user customization wherever possible in web service interfaces, delivery processing, custom reports, device profiles, delivery indicators, deliverable content, and wherever it makes sense to have flexibility without adding too much complexity.

It is yet another advantage in having tremendous flexibility and automation in specifying deliverable content as well as for specifying the criteria for when and how to deliver the content. Content can be resident in a DCDB (Deliverable Content Database), or provided dynamically on the fly from remote sources as defined by the DCDB schema and configurations therein.

It is yet another advantage to facilitate managing a particular user's data in the web service through convenient record adds, record searches, record list processing, record modification, plural record modification, record deletion, plural record deletion, record examination, and plural record examination.

It is a further advantage in automating the user specification of DCDB situational locations for configured deliverable content with GPS coordinate retrieval, map selections, circular area selections, rectangular area selections, polygon area selections, address specifications, locations by subscriber identifier, and any other means for identifying a physical location and/or location area or location space. A situational location may include an area on earth, a point on earth, or a three dimensional bounds in space. A mobile user target may include an area on earth, a point on earth, or a three dimensional bounds in space. Content targeted for delivery may result in it being delivered to mobile devices encountering a situational location or may result in delivery of an indicator for the content. Indicators are user configurable by the receiving device for how to receive content, by the Content Provider for how to send content, and/or by system default behavior. Indicators may also be delivered dynamically based on content size, target device types, target device situational location, target device state, criteria contained in the deliverable content, of any other condition associated with the target mobile device, the circumstances of the deliverable content, and/or the deliverable content itself.

It is a further advantage in providing automation for transforming external application data sources into the deliverable content database, and subsequently maintaining the data. External application data sources are existing application data sources used by otherwise unrelated applications that can provide a convenient database of delivery information, depending on the application. External application data sources provide the data for existing applications that normally may not have a relationship otherwise. External application data source examples include automatically processable data formats such as electronically represented Almanac database(s), Guinness Book of World Records database(s), Multiple Listing Service (MLS) real estate database(s), Fishing Area Knowledge Base database(s), Product Advertisement Shopping database(s), Asset Inventory database(s), newspaper classified ad data, address to coordinate mapping data, postal address to latitude and longitude mapping data, or any other database, data format, or combinations thereof, containing useful information for automatic population of the deliverable content database.

Multiple databases and information can also be merged and/or processed for automatic population of the deliverable content database. For example, a large eBay database of advertised goods content (eBay is a trademark of eBay corporation) may contain the seller's location (or location of merchandise) information along with the advertisement in the form of postal address information. Another vendor database may provide latitude and longitude information for known postal addresses. In one example, eBay database location address information is replaced with the corresponding latitude and longitude information from the address mapping database when transforming the eBay data into the deliverable content database. This allows transforming data into the deliverable content database for appropriate situational location matching to situational locations of participating devices. In other embodiments, location information associated with deliverable content (e.g. addresses, zip codes, MAPSCO, etc) is replaced with an appropriate location description from another database (e.g. latitude and longitude, earth mapping grid reference, etc) during automatic population of the deliverable content database. In fact, this disclosure allows transforming any data for any reason from a plurality of data sources in order to achieve an appropriately populated deliverable content database. Data can also be accessed when needed so it need not be stored local to web service 2102.

Existing useful data sources are leveraged for automatic population of the deliverable content database in order to minimize, or eliminate, timely creation and maintaining of data in the deliverable content database.

Yet another advantage is to provide an automated generic transform and maintenance environment for the deliverable content database. This includes automatic transform functionality to transform a variety of data source formats into the deliverable content database using run-time configurable pre-transform rules for affecting transform methodologies. Further provided is an automated post-transform data manipulator for automatically transforming the data once it is contained in the deliverable content database.

Data may also be transformed at delivery time (on the fly) from remote sources so content need not be contained in the DCDB. Pointers and information enabling the instant delivery of remotely accessed content may instead be contained within the DCDB.

It is another advantage to provide functionality for assigning granulated privileges from any particular user to any other particular user, or group of users. A further feature provides an affinity relationship allowing one user to act on behalf of another user, or on behalf of a groups of other users. The web service functionality "out of the box" guarantees full privacy and no users are aware of other users. The privileges provide means for full user control to open up additional services for collaboration, interoperability of novel location based services, sharing user information, viewing user information, and many other features discussed in detail below for users interacting with other users.

Another advantage is providing a comprehensive set of find services, statistics, historical routes, and reports to users in accordance with privacy privileges easily configured any time through a web service interface. As soon as a convenient configuration is made, the privileges and corresponding functionality instantly take affect. There is no delay, or waiting period, for any configuration change. Map preferences are also user configurable so each user gets the map interface to behave exactly as they want it.

Another advantage includes maintaining user configured evidence as a web service cookie, frame variable, system variable, or data file variable with a long term expiration. Subsequent navigations to an interface using such evidence causes automatic population of the evidence into fields or other real-estate of the user interface. That way the user sets preferences one time which becomes in effect for all subsequent applicable service interfaces. In general, all interfaces of the web service 2102 can default user interface fields using the evidence from previous user configurations.

Another advantage is providing a user interface filtering methodology for automatically filtering out undesirable data in every web service interface without requiring the user to filter out the same data in each individual interface. A user sets filter criteria one time, and all web service interfaces reflect the filters that were configured by the user. Filtering criteria is conveniently set by map selections, or manually entered data.

Yet a further advantage is a fully configurable delivery manager conveniently invoked from a command line or from a user interface form. The preferred embodiment of every web service page interface herein supports either a command line invocation (e.g. with URL (Uniform Resource Locator) arguments) or form fields submittal. The delivery manager is for delivering content in response to automatic determination for a device situational location. Disclosed is a Master and Archive for facilitating the content delivery experience. Web service participating devices have a Master and an Archive. A Master contains all content deliveries to a device that have been made. Only a single copy of the content is maintained in the Master, but a date/time stamp is updated if content is delivered redundantly (to indicate the last time the content was pushed). A user can move content items from the Master to an Archive when content items are desired to be saved for the long term. The Archive will contain any number of content items that a user has selected to save from the Master to the Archive. The Archive also does not contain duplicates. The date/time stamp reflects the last time a content item was delivered, or alternatively can reflect when it is last moved to the Archive. As long as a content item remains in the Master, it will not alert the user of a new delivery no matter how many times that item is redundantly delivered. When it is moved to the Archive, then it is eligible again to notify the user of being a new delivery should it be delivered again. The Master and Archive for each device facilitates control over alerting a user of deliveries based on historical deliveries already made. The Master provides the user with control over ensuring redundant deliveries do not produce redundant alerts (only the timestamp is updated to reflect the most recent delivery of the same delivery item). The user can remove an entry from the Master for being re-alerted to another delivery of the same item at a different situational location. The Archive provides the user with control over saving deliveries of interest while ensuring no duplicates are in the Archive. The user can also save deliveries off-line to a file for other applications. The Delivery Manager preferably enforces an authentication of every device that uses it. Preferably the authentication is not the same as a user account authentication, although they could be one in the same in an embodiment. A single user account may manage a plurality of devices, so it is desirable that each device have its own authentication. The delivery manager provides a thorough set of controls for each user to the web service for managing what content gets delivered, how often content is proactively searched, and any preferences and/or configurations of the receiving device for desired web service behavior.

Yet a further advantage is for complete management of a device cache for proactive content delivery by situational location. Options are provided to users for improving the web service performance and experience through having a plurality of DCDB items delivered to the device in advance of traveling to applicable situational locations. The device cache is optimized for local delivery while still providing the experience for frequently changing dynamic data to be delivered to applicable mobile devices as soon as it is configured, modified, or added.

Another advantage is to share experiences (e.g. content deliveries) of one user with other user(s). Content deliveries and/or configurations can be shared between users' data processing systems, and in accordance with privileges granted to various users or systems. The disclosed web service enables users to automatically register membership accounts and provides location based services thereafter. An enhanced location based services experience is provided for users wanting to interact with other users through the web service. Users can grant location based services privileges to other users through the web service user interfaces. Users can perform location based service actions on other users in accordance with location based services privileges that have been granted. For example, a first user grants a set of location based services privileges to a second user. The second user can then use location based services provided in the web service on the first user in accordance with the privileges granted. Privileges assure privacy, confidentiality, and anonymity. Detailed descriptions are presented below in how this works.

Users, or a group of user(s), can provide privileges to other user(s), group(s) of users, device(s), or group(s) of device(s). Users, group of user(s), device(s), or group(s) of device(s) can be provided with privileges from other user(s), or group(s) of user(s), device(s), or group(s) of device(s). In one embodiment, privileges are assigned to participating devices (i.e. data processing systems). In another embodiment, privileges are assigned to users independent of the device a user happens to be using at the time. Specific privileges can be assigned in the following manner:

1. From any receiving device to any other receiving device
2. From any user to any receiving device
3. From any user to any other user
4. From any receiving device to any user
5. Any combinations of 1 through 4

Specific preferences of how to process privileges can also be assigned in the following manner:

6. From any receiving device to any other device
7. From any user to any receiving device
8. From any user to any other user
9. From any receiving device to any user
10. From any group (users or receiving devices) to any user
11. From any user to any group (users or receiving devices)
12. From any group (users or receiving devices) to any device
13. From any device to any group (users or receiving devices)
14. Any combinations of 6 through 14

Preferences govern the ability for users (or devices) to make use of each other's configurations in order to manage content delivery and/or alert delivery in accordance with user actions.

A further advantage herein enables a user (or device) to intercept or duplicate another user's (or device's) content delivery, specified by either the originally intended recipient of the content delivery, a new recipient of the content delivery, or any other user with the appropriate privilege to configure interception or duplication. It is an advantage to deliver content, or deliver content by situational location:

15. To me (or us) using my configurations and/or situational location
16. To me (or us) using other(s) configurations and/or situational location(s)
17. To other(s) using my ("me") configurations and/or situational location
18. To other(s) using other(s) configurations and/or situational location(s)
19. Any combination of 15 through 19

It is an advantage to deliver alerts in desired form(s), or deliver alerts in desired form(s) by situational location:

20. To me (or us) using my configurations and/or situational location
21. To me (or us) using other(s) configurations and/or situational location(s)
22. To other(s) using my ("me") configurations and/or situational location
23. To other(s) using other(s) configurations and/or situational location(s)
24. Any combination of 20 though 24

It is an advantage herein to deliver alerts and/or content in desired form(s) in accordance with user actions, or deliver alerts and/or content in desired form(s) in accordance with user actions at a situational location:

25. To me (or us) using my configurations and/or situational location
26. To me (or us) using other(s) configurations and/or situational location(s)
27. To other(s) using my ("me") configurations and/or situational location
28. To other(s) using other(s) configurations and/or situational location(s)
29. Any combination of 25 through 29

Whether delivery is an alert, content, or action associated alert or content, data processing systems receiving the alert or content may be an RDPS or any other data processing system. Users can assign privileges to other users, users can assign privileges to devices, devices can assign privileges to users, devices can assign privileges to devices, users can assign preferences for interacting with other users, users can assign preferences for interacting with devices, devices can assign privileges for interacting with users, and devices can assign preferences for interacting with other devices.

Another advantage is to share the locally cached deliverable content database between users, directly between the user's data processing systems, or between the user's data processing systems via a server data processing system. A user's local cache (or the local cache of a particular data processing system) may be unique in deliverable content configured for proactive delivery based on certain configurations, and may also be the result of a situational location yielding deliverable content for proactive delivery, in which case sharing makes sense between users (or systems).

Further advantages include user or system configurations for maintaining a local cache of deliverable content, specifying to trickle updates to a local deliverable content database as deliverable content changes or becomes available, and user specification of sharing, and sharing of, a local cache of deliverable content with other users.

Another advantage is to enable a user to specify a target delivery mobile interest radius for receiving content. Disclosed is the ability for a user to configure his RDPS, or receiving system with a target mobile interest radius. For example, a user would like to know what deliverable content would be delivered to his device if the content was set up for delivery to a location within 3 miles of the user's current location at all times. So, as the user travels, any content deemed for delivery within 3 miles of the user (i.e. within 3 miles of the device) is delivered. The mobile interest radius is always relative to the current location of the receiving device, no matter where it is located. The terminology "interest radius", "device interest radius", "mobile interest radius", "moving interest radius", and "traveling interest radius" are all one in the same, and are used interchangeably. Also, the user can specify his mobile interest radius in measurement terms most convenient, for example, feet, yards, miles, meters, kilometers, etc. The mobile interest radius specification enables a user to be made aware of deliverable content that is within a reasonable distance of the user, no matter where the user subsequently is at the time. The user decides what determines a reasonable distance.

Continuing with the eBay example above, a user would like to be made aware of a rare antique table as soon as it becomes available in the eBay database. This disclosure, and the parent applications this is a continuation in part for, provide real time activation of data as soon as is entered into the deliverable content database, and real time delivery of the data to eligible receiving devices with the applicable configured situational location(s). The user travels frequently and has learned through experience it is important to examine merchandise offered by eBay before purchasing it. So, the user decides he is willing to travel 50 miles to examine the merchandise, and he configures a mobile interest radius of 50 miles along with the appropriate interest and/or filter criteria. Therefore, no matter where the user is located at the time, delivery information for a sought antique advertisement (if it exists, or becomes existent in the future to the eBay deliverable content database) will be delivered to his device if the associated antique location is within 50 miles of the user at any time during the user's traveling. Thus, not only is the user alerted as soon as the sought item becomes available, but he is alerted according to a distance relative to his current location. The user was able to set up criteria one time, and all future traveling becomes candidate for content delivery of existing content items or future added items in the deliverable content database.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number. While those skilled in the art can assert an embodiment implementation just from examining screenshots (in Drawings) from the web service, flowcharts and architecture drawings are also provided to facilitate a timely understanding. None of the drawings, discussions, or materials herein is to be interpreted as limiting to a particular embodiment. The broadest interpretation is intended. Other embodiments accomplishing same functionality are within the spirit and scope of this disclosure. It should be understood that information is presented by example and many embodiments exist without departing from the spirit and scope of this disclosure.

BRIEF DESCRIPTION OF THE DRAWINGS

Many of the drawings are representative of an actual embodiment that has been reduced to practice in a web service. Drawings which are screenshots from the web service contain gpsping.com company trademarks in graphical form (e.g. page headers and footers, page animation, various page graphics, etc) and textual form. These trademarks have been developed in accordance with applicable marketing strategies for such time in the future such service would be made public, or offered for sale. Textual trademarks of the gpsping.com company include at least "My GPS", "MyGPS", "GPSPing", "PingGPS", "GPS-Ping", "Ping-GPS", "GPS_Ping", "Ping_GPS", "GPSPing", "PingGPS", "GPSPing.com", "PingGPS.com", "GPSPing.com", "PingGPS.com", "GPS-Ping.com", "Ping-GPS.com", "GPS_Ping.com", "Ping_GPS.com", "PingPal", "PingPal", "Ping-Pal", "Ping_Pal", "Pinger", "PingSpot", "Pingimeter", and any derivations thereof wherein any subset of the trademark string can be any font, style, capitalization, spacing or appearance. Screenshots and drawings have been zoomed in or out to properly fit on a drawing page with appropriate margins. Drawings of database records intentionally do not reveal actual formats used of the fields to prevent pirating of this disclosure for a copied implementation. Those skilled in the art can easily determine what the best formats would be based on the descriptions. Table indexes and other performance considerations are intuitive based on how to access data according to the descriptions. It is assumed that the reader of this disclosure will examine in detail, and read thoroughly, the drawings to assess novel subject matter disclosed thereon. While user interface examples demonstrate a web browser, other user interfaces can be used. The web browser BACK key, URL command line, and CLOSE WINDOW functionality is to be an available function in all user interfaces discussed herein. There is no guarantee that there are descriptions in this specification for explaining every novel feature found in the drawings. The present invention will be described with reference to the accompanying drawings, wherein:

FIGS. 50B through 50E depict preferred embodiment screenshots for the Privileges option;

FIG. 50G depicts a preferred embodiment screenshot for the My Prefs option selected from a full browser;

FIGS. 61F and 61G depict preferred embodiment screenshots for viewing a plurality of selected user account records;

FIG. 66E depicts a preferred embodiment screenshot for viewing Registry information of a selected Registry record;

FIG. 66F depicts a preferred embodiment screenshot for modifying Registry information of a selected Registry record;

FIG. 67A depicts a preferred embodiment screenshot for results from searching the web service Registry records after a user search specification, and then user selecting records to manage;

FIG. 67B depicts a preferred embodiment screenshot for viewing a plurality of selected Registry records;

FIG. 67C depicts a preferred embodiment screenshot for modifying a plurality of selected Registry records;

FIG. 68 depicts a preferred embodiment of a data record in the Trail Table used to track and maintain mobile history of devices registered in the Registry table;

FIG. 69 depicts a flowchart for a preferred embodiment for processing the submittal to add a Delivery Content Database (DCDB) Table record to the web service;

FIG. 70 depicts a preferred embodiment of a data record in the DCDB Table used to maintain deliverable content information to the web service;

FIG. 71A depicts a preferred embodiment screenshot for adding a DCDB record to the web service;

FIG. 71B depicts a preferred embodiment screenshot for searching for web service DCDB records with a search criteria;

FIG. 71C depicts a preferred embodiment screenshot for results from searching the web service DCDB records after a user search specification;

FIG. 71D depicts a preferred embodiment screenshot for viewing DCDB information of a selected DCDB record;

Figure 71A:
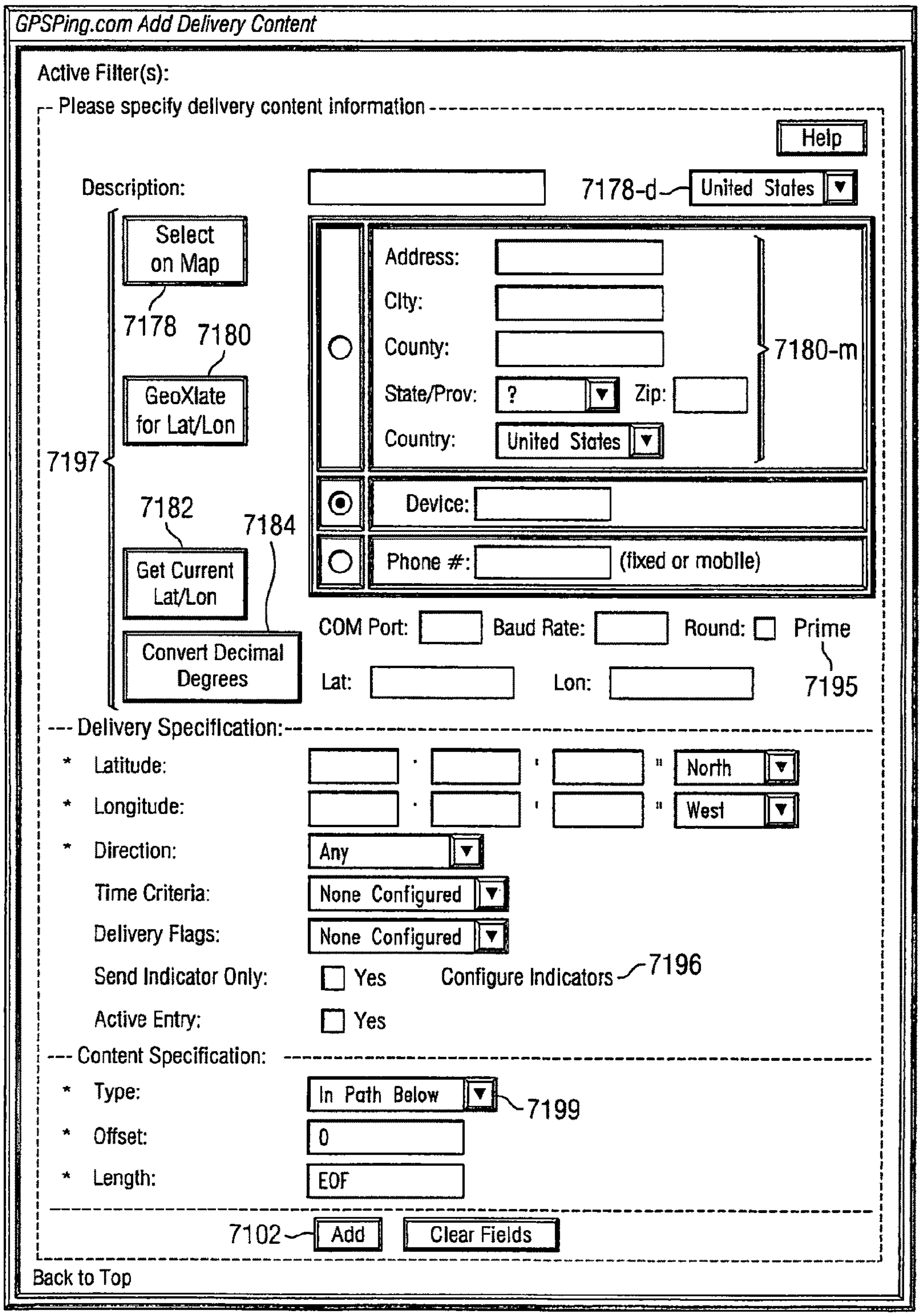
Figure 71B:
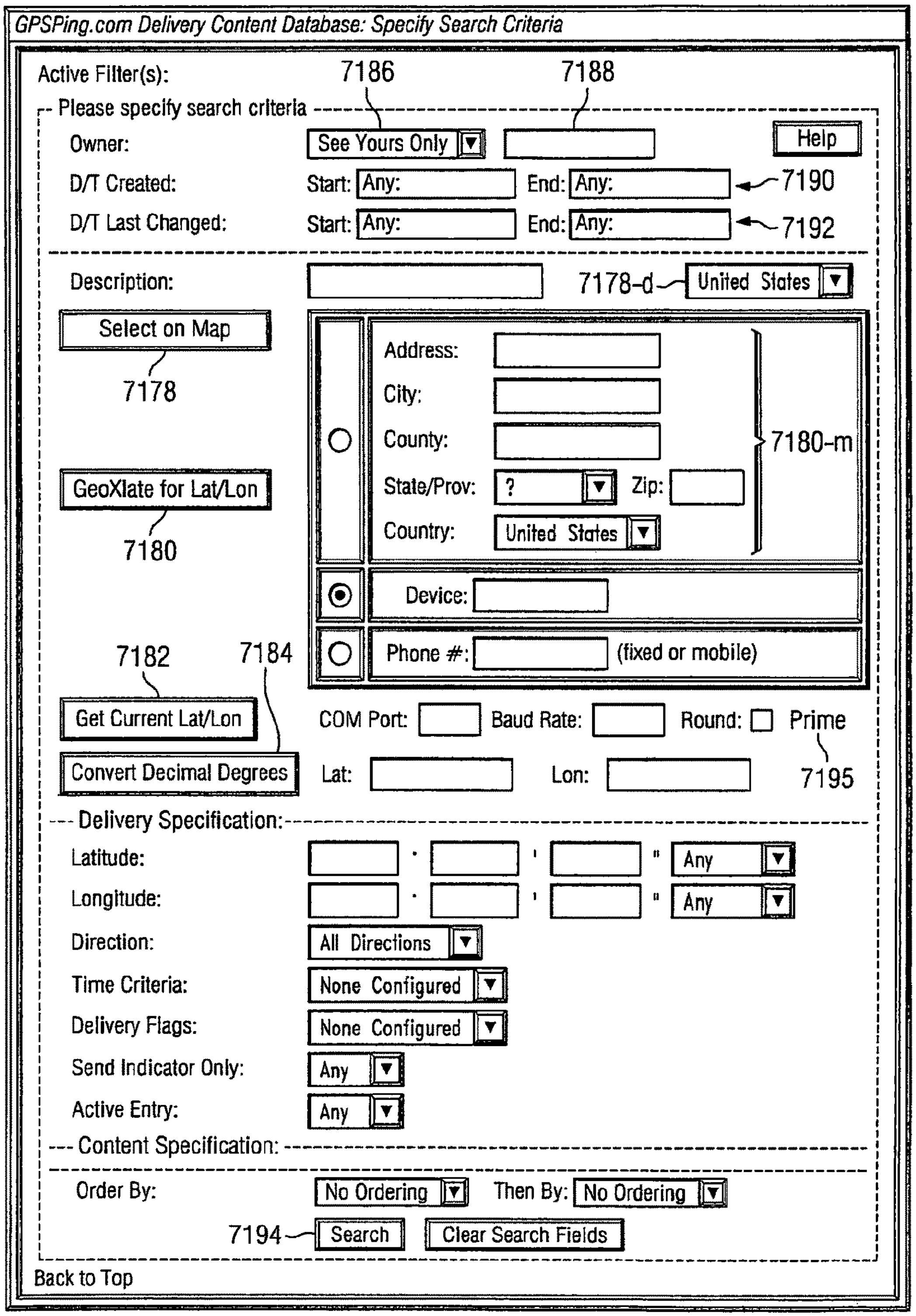
Figure 71C:
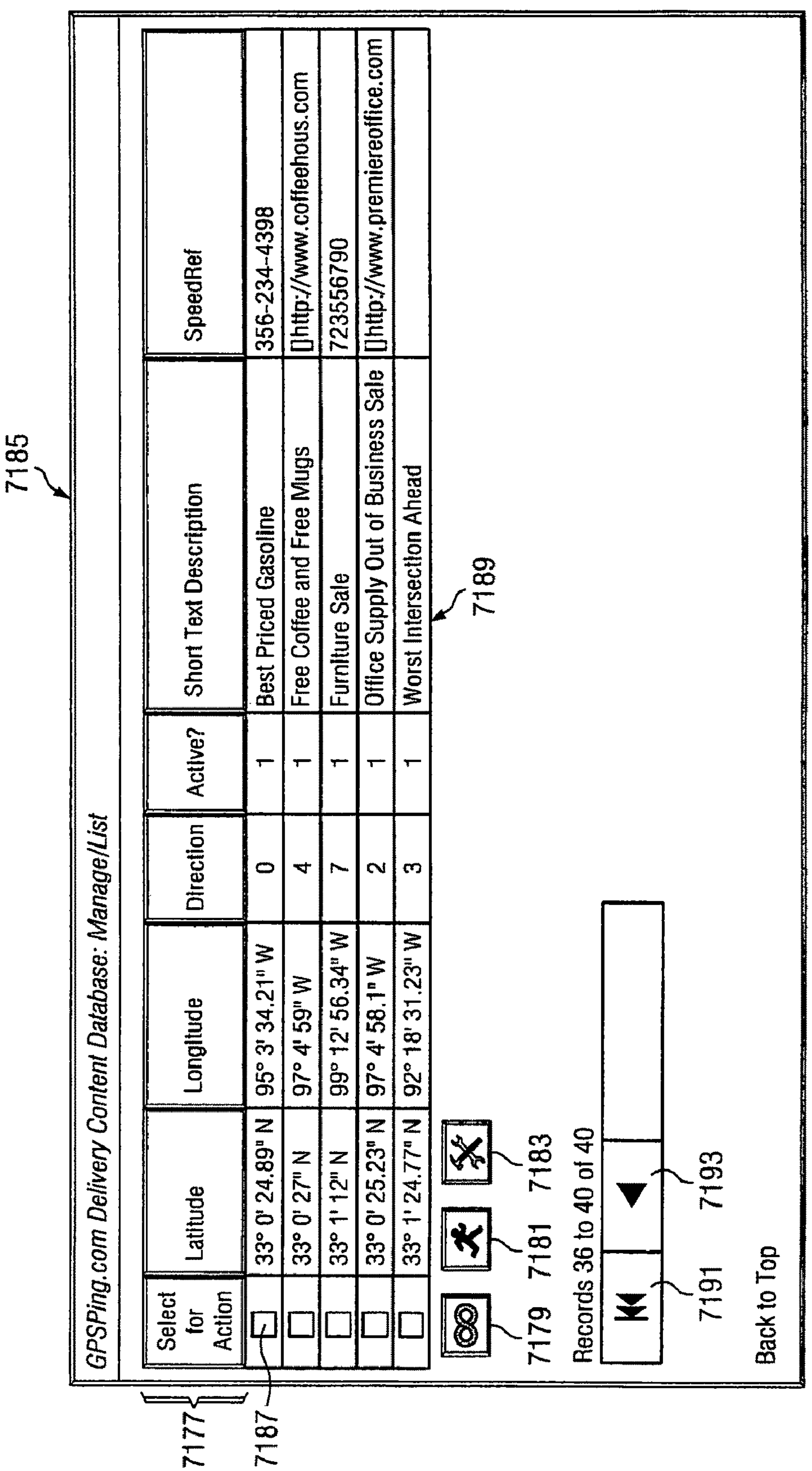
Figure 71D:
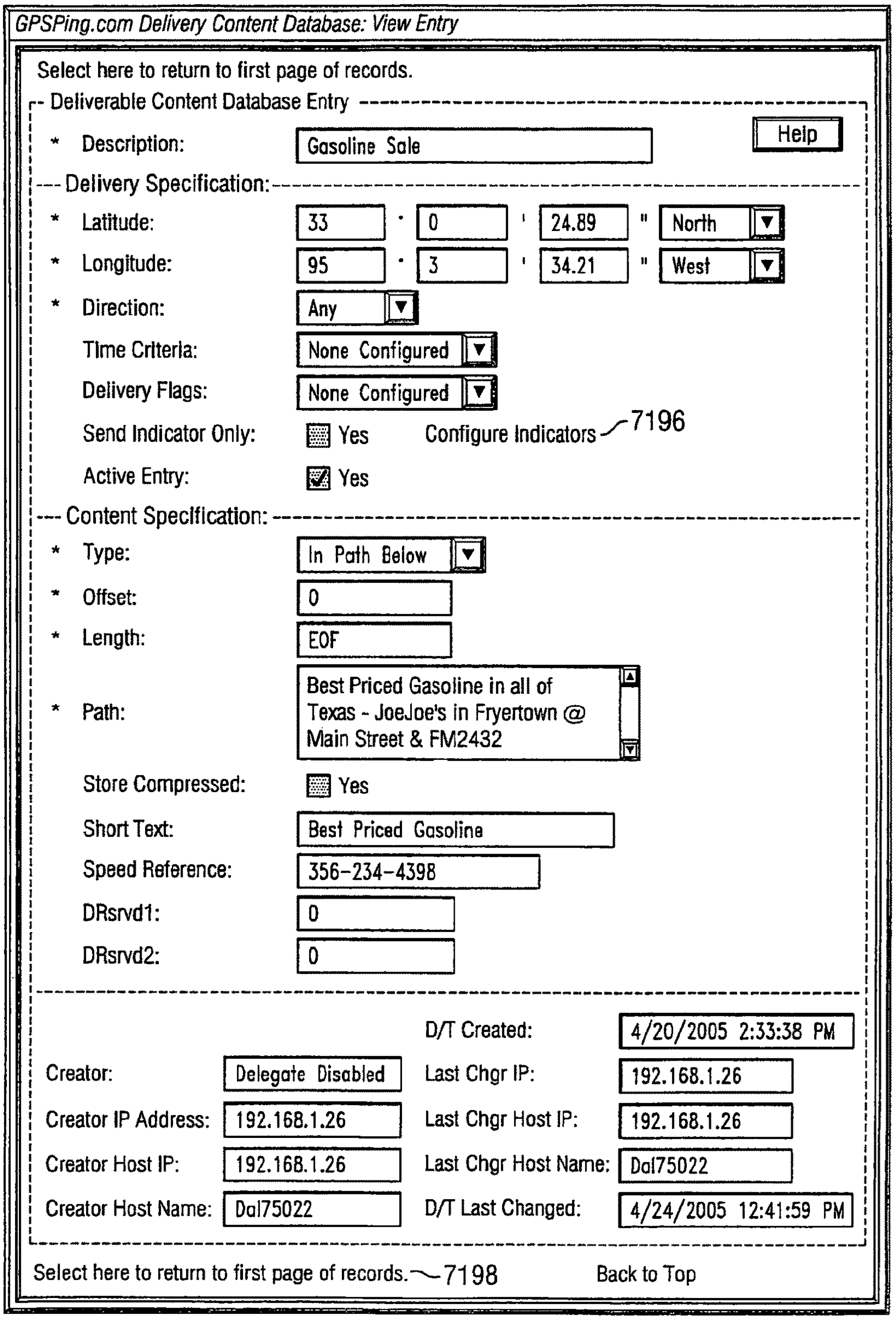
Figure 71E:
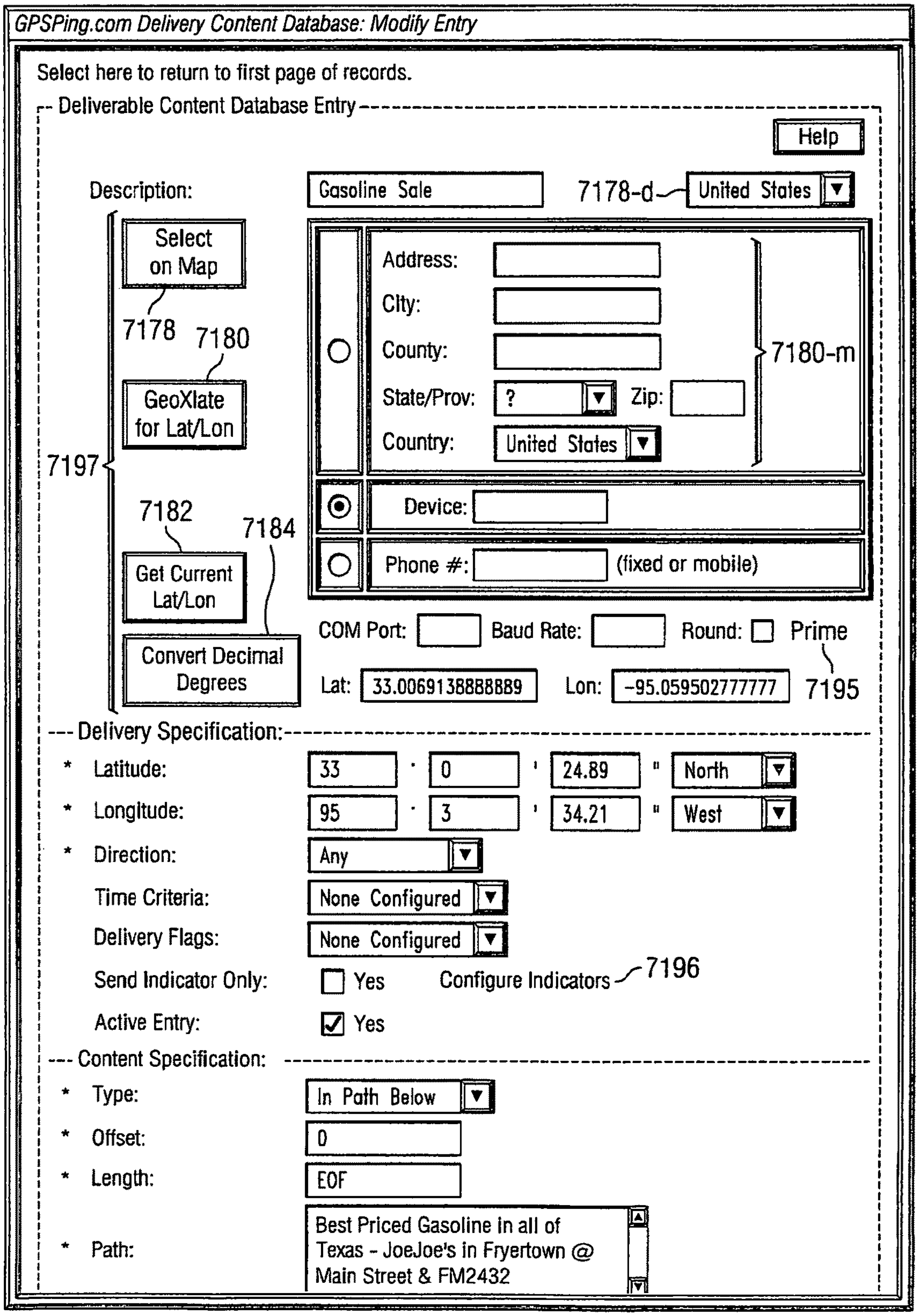
Figure 71F:
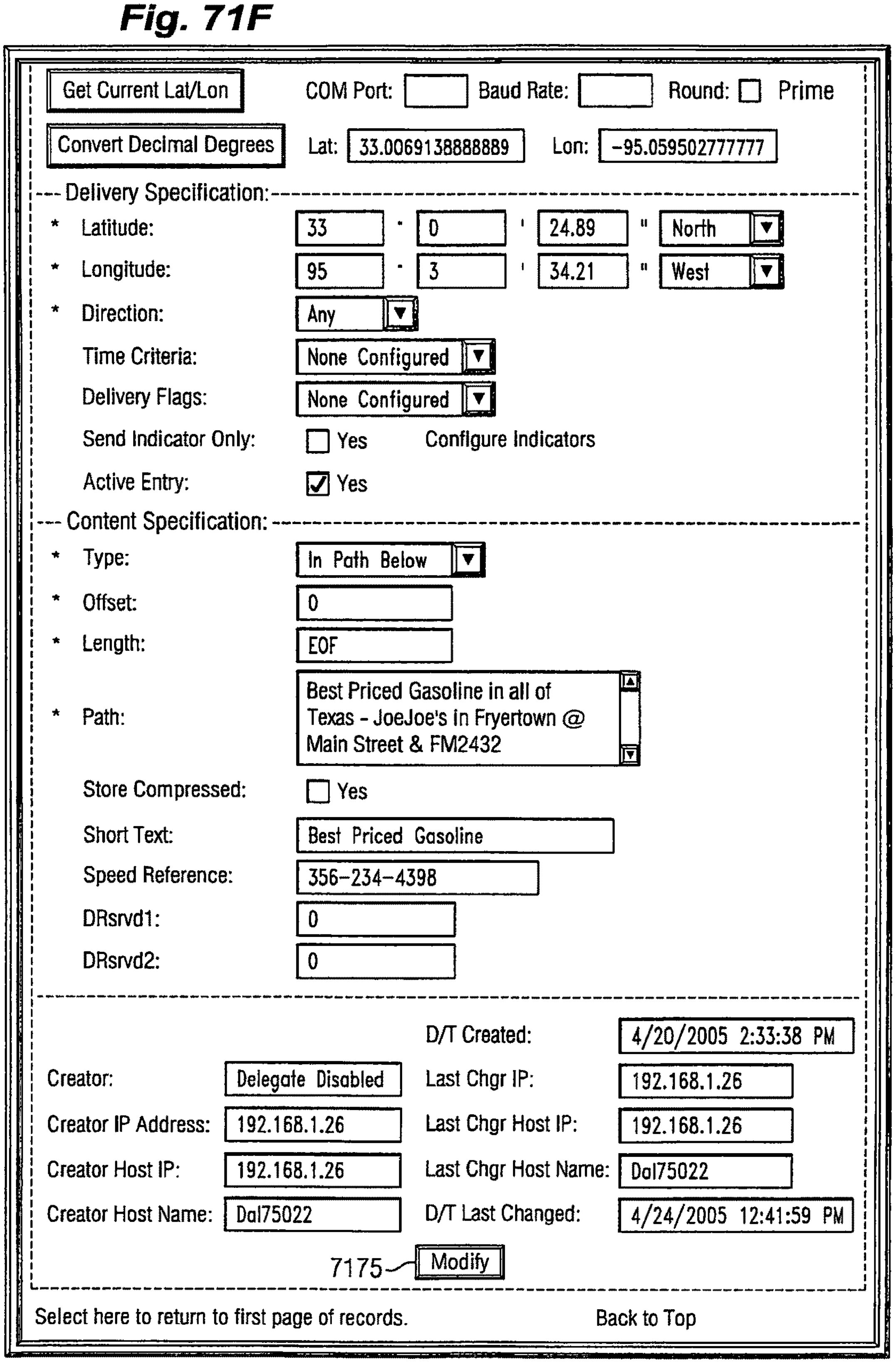
Figure 71I:
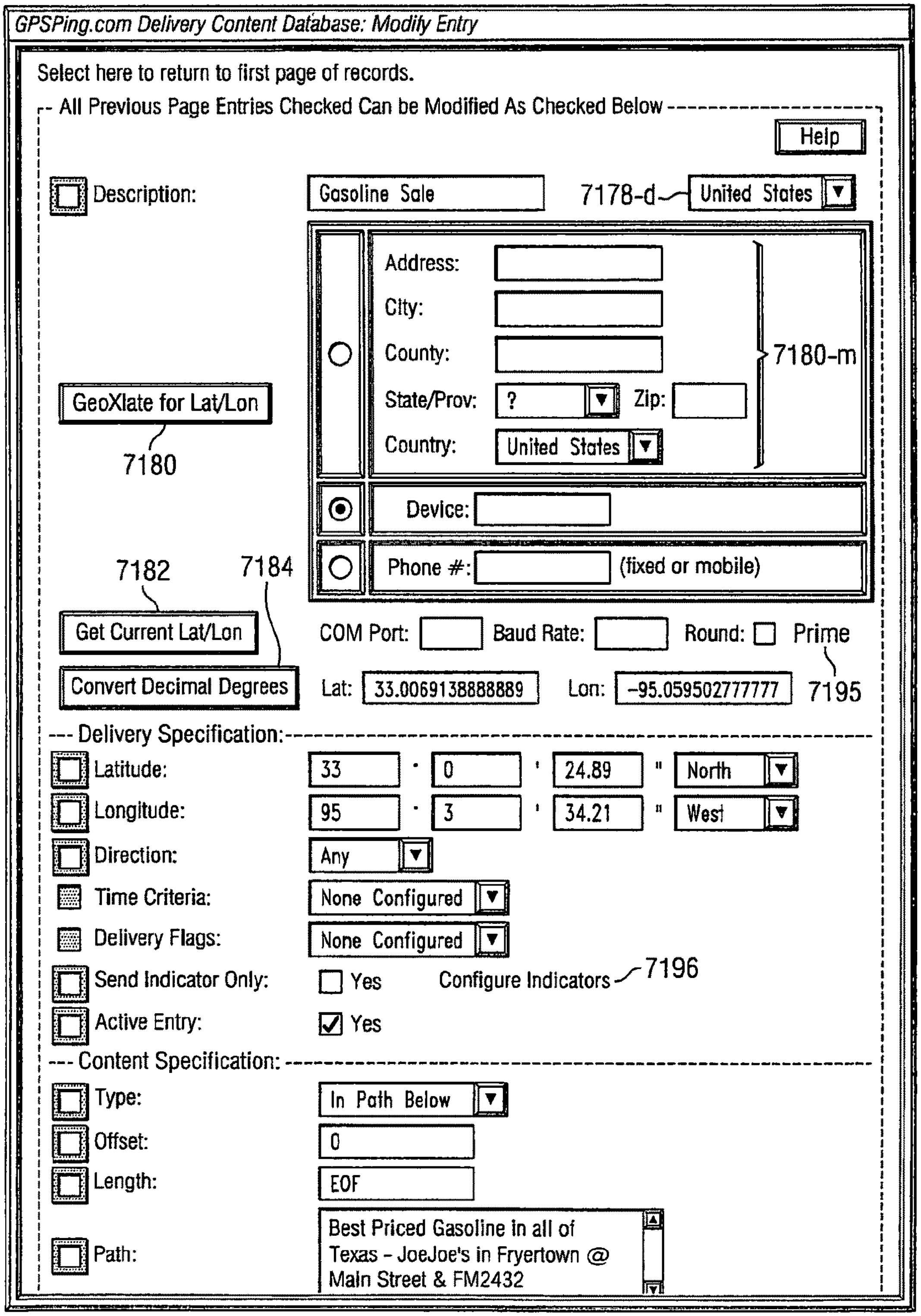
Figure 71J:
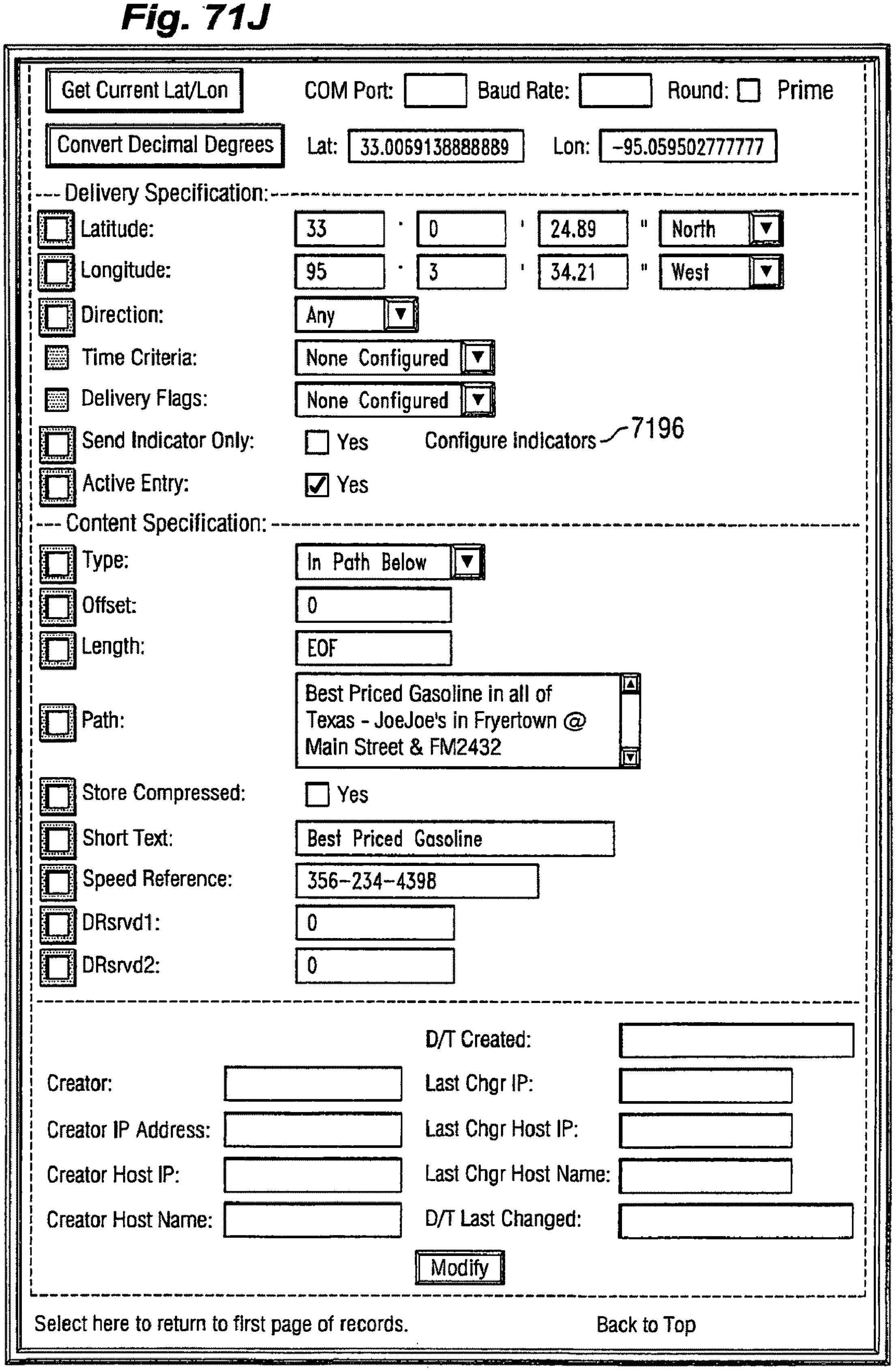
Figure 72:
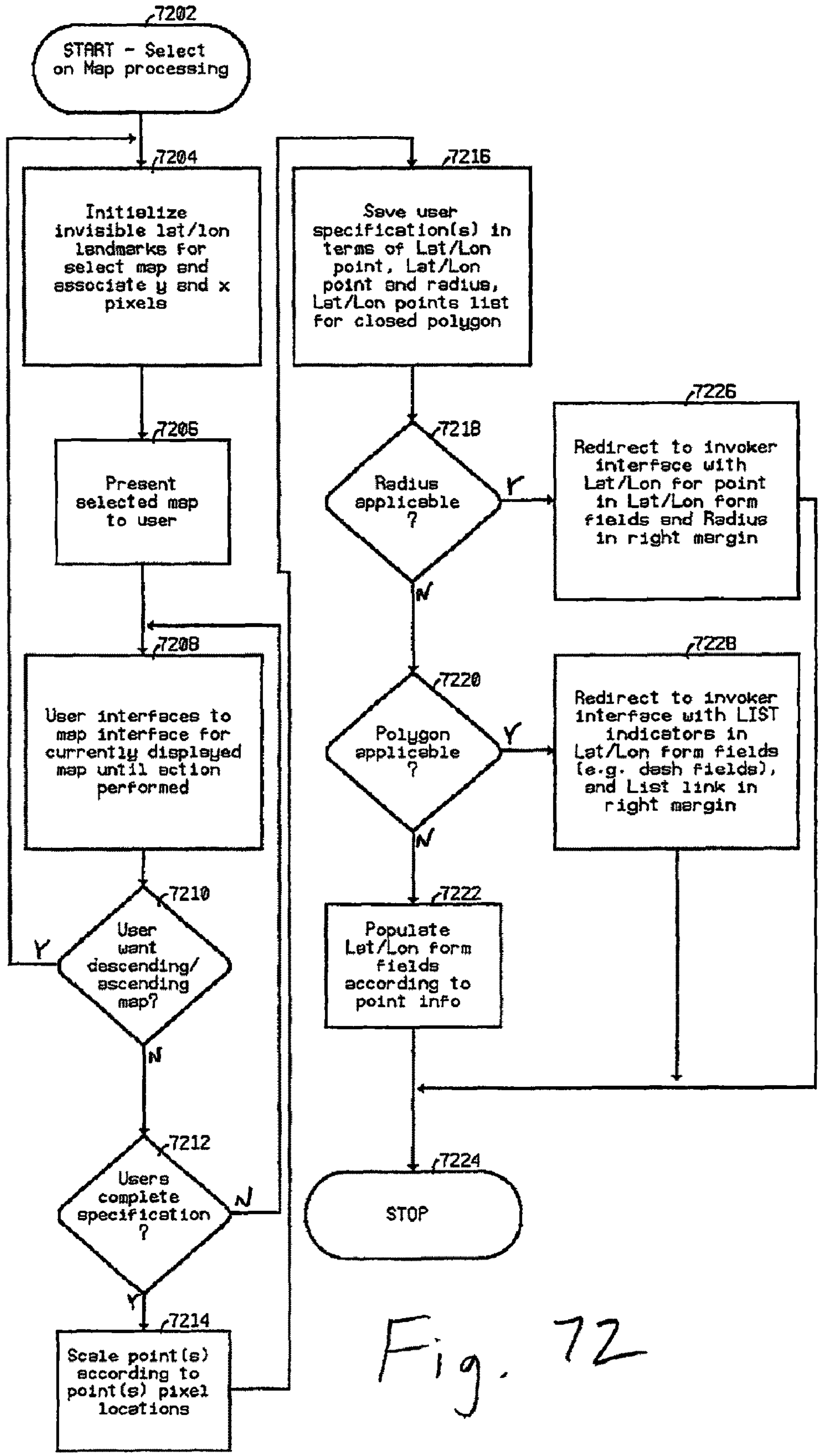
Figure 73:
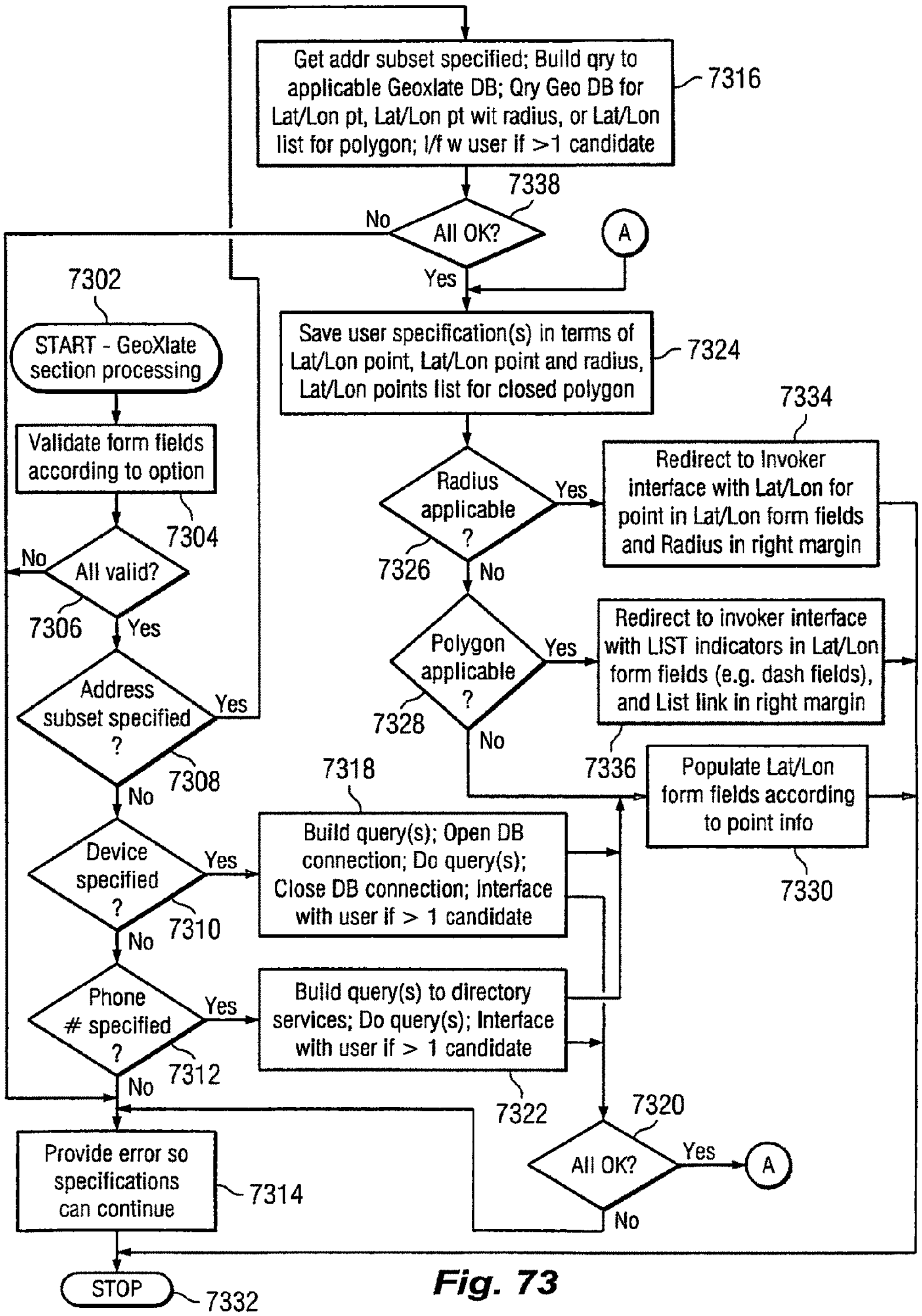
Figure 74:
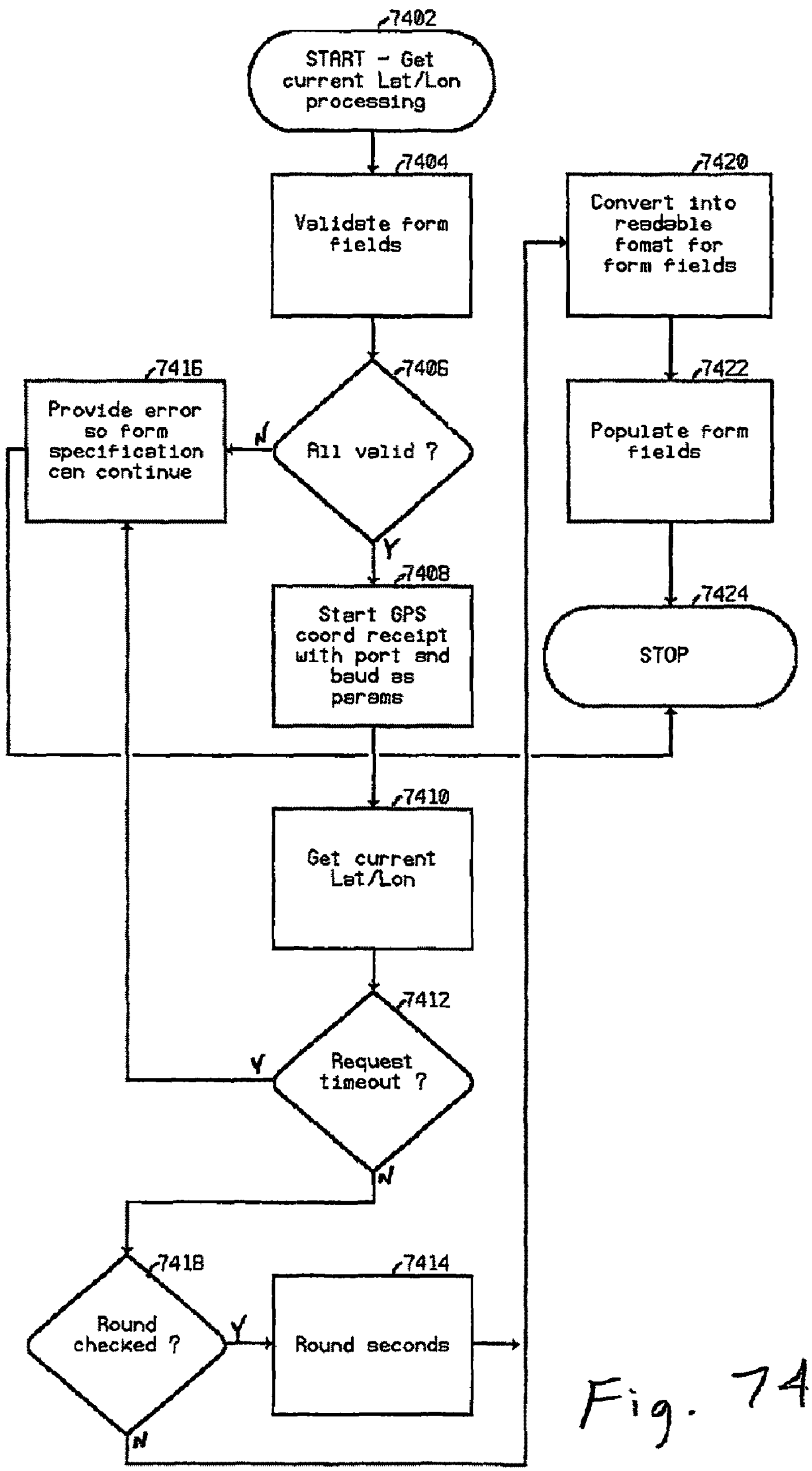
Figure 75A:
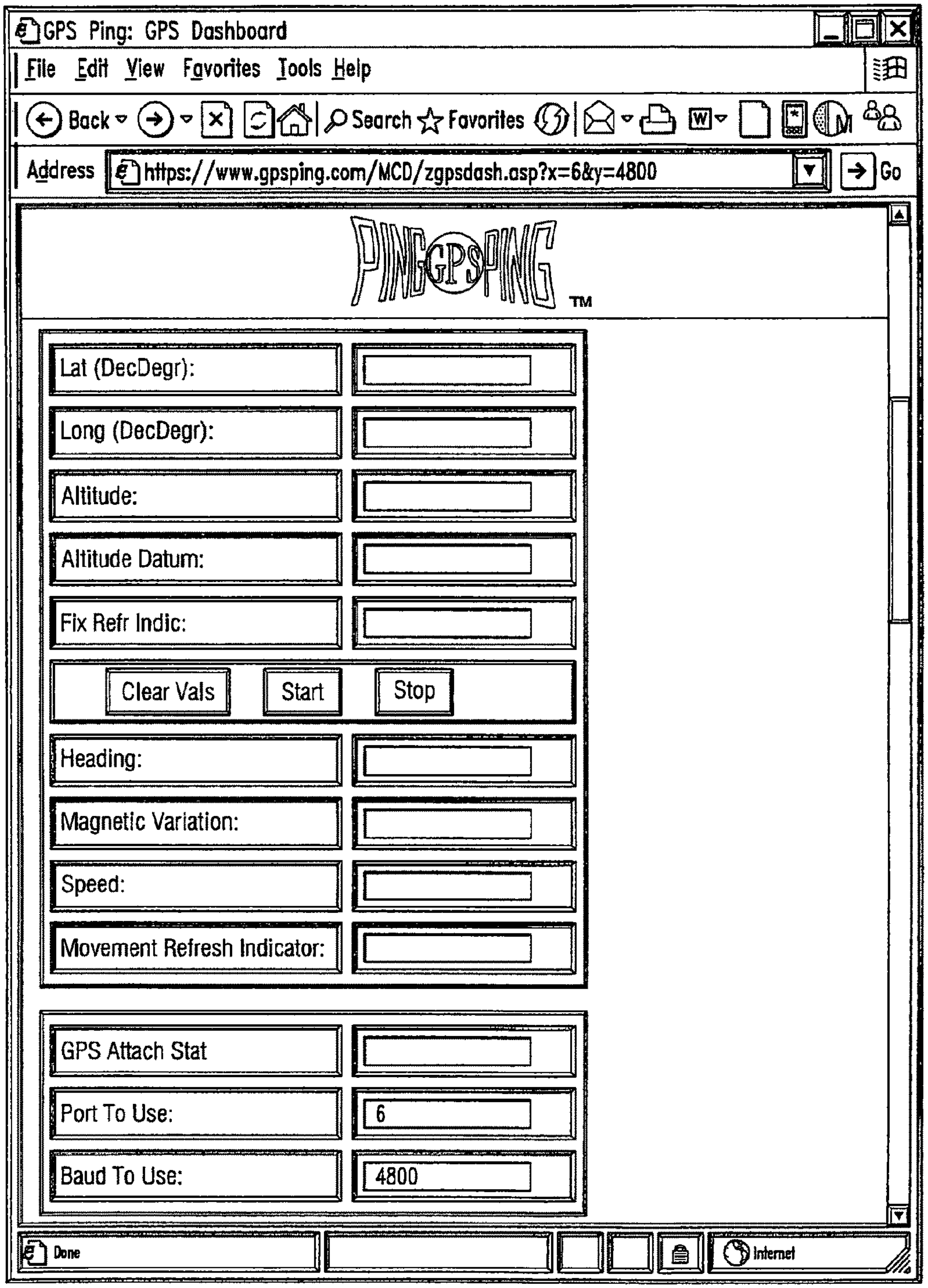
Figure 75B:
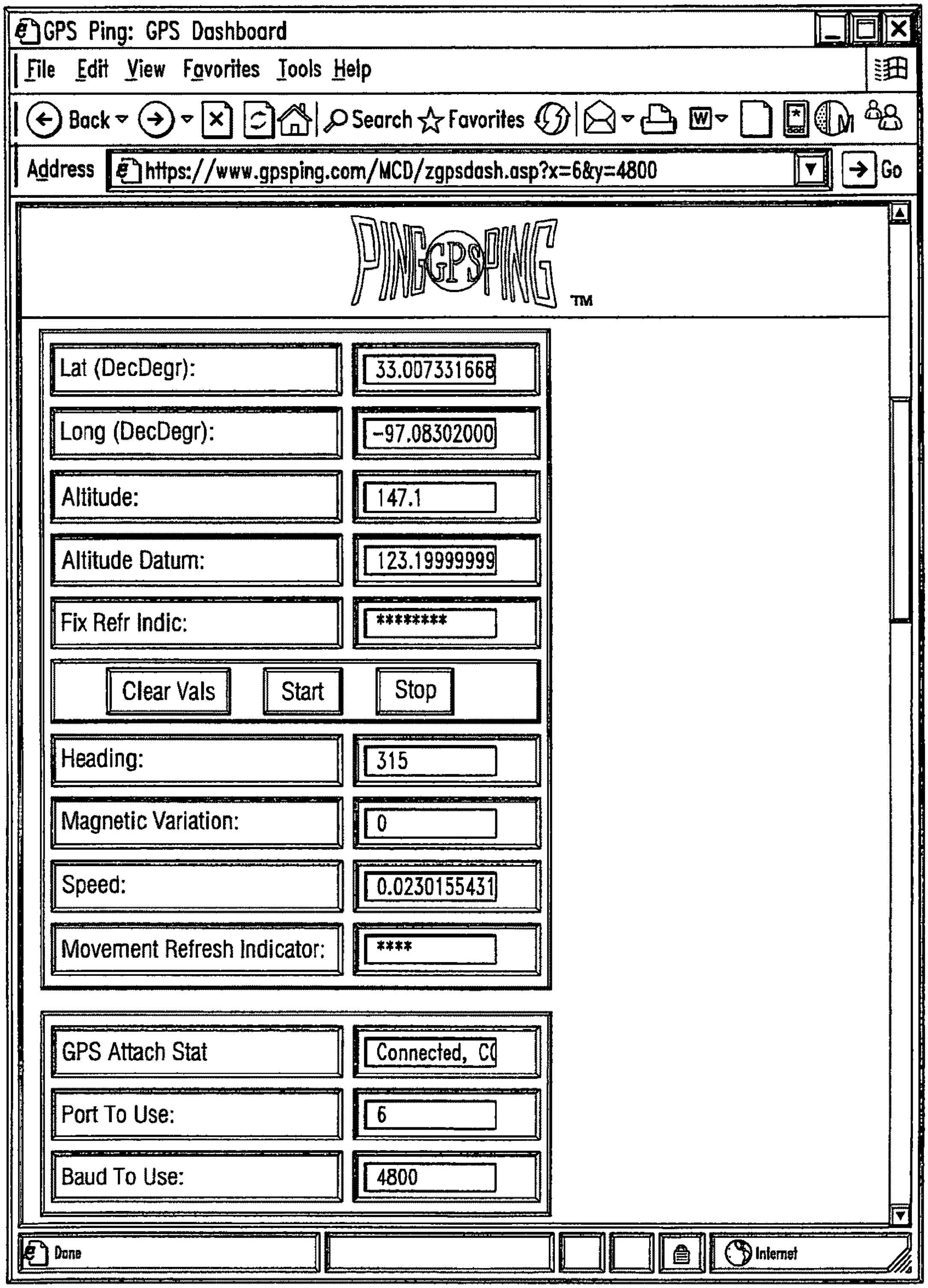
Figure 76:
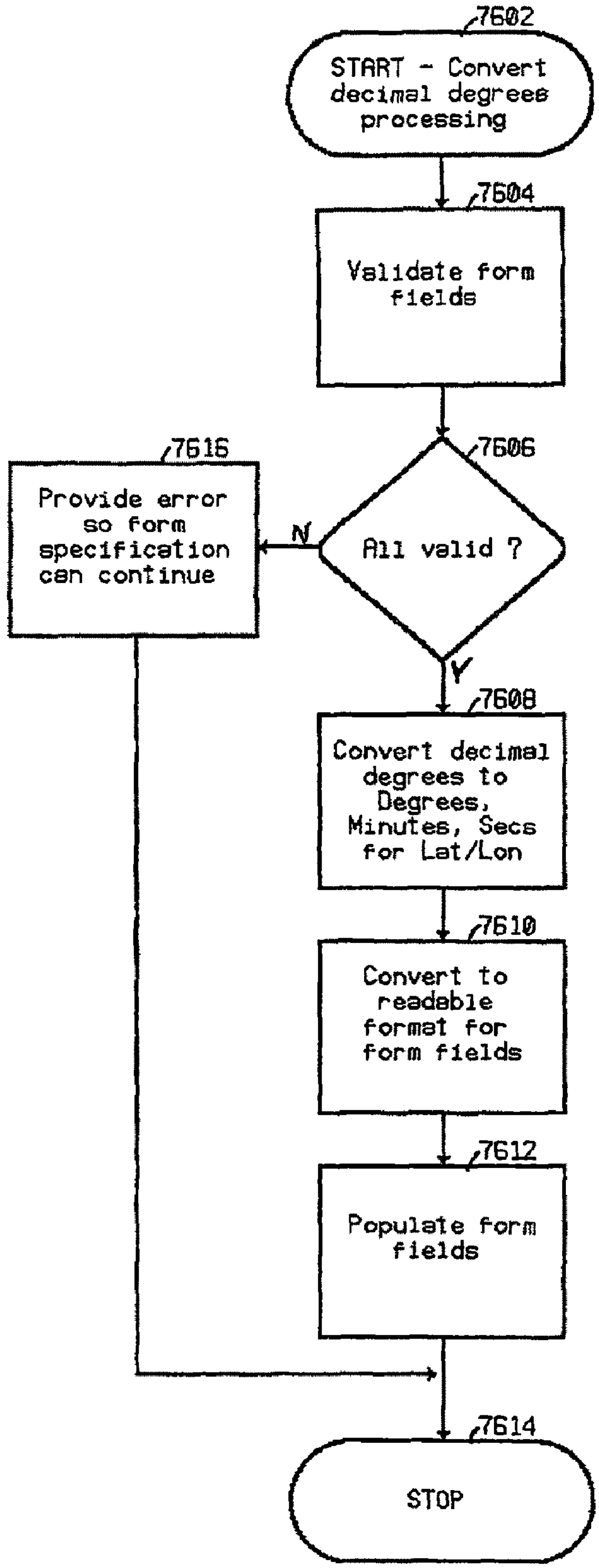
Figure 77:
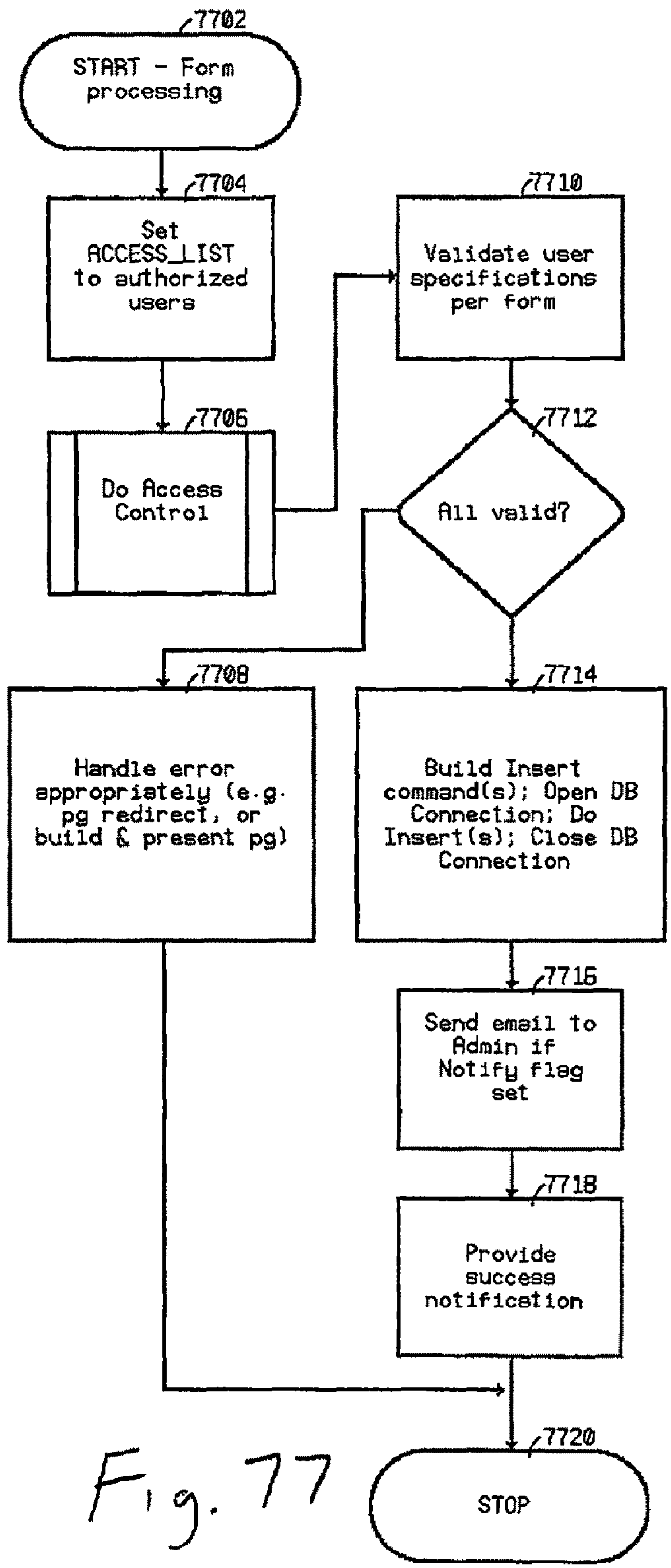
Figure 78:
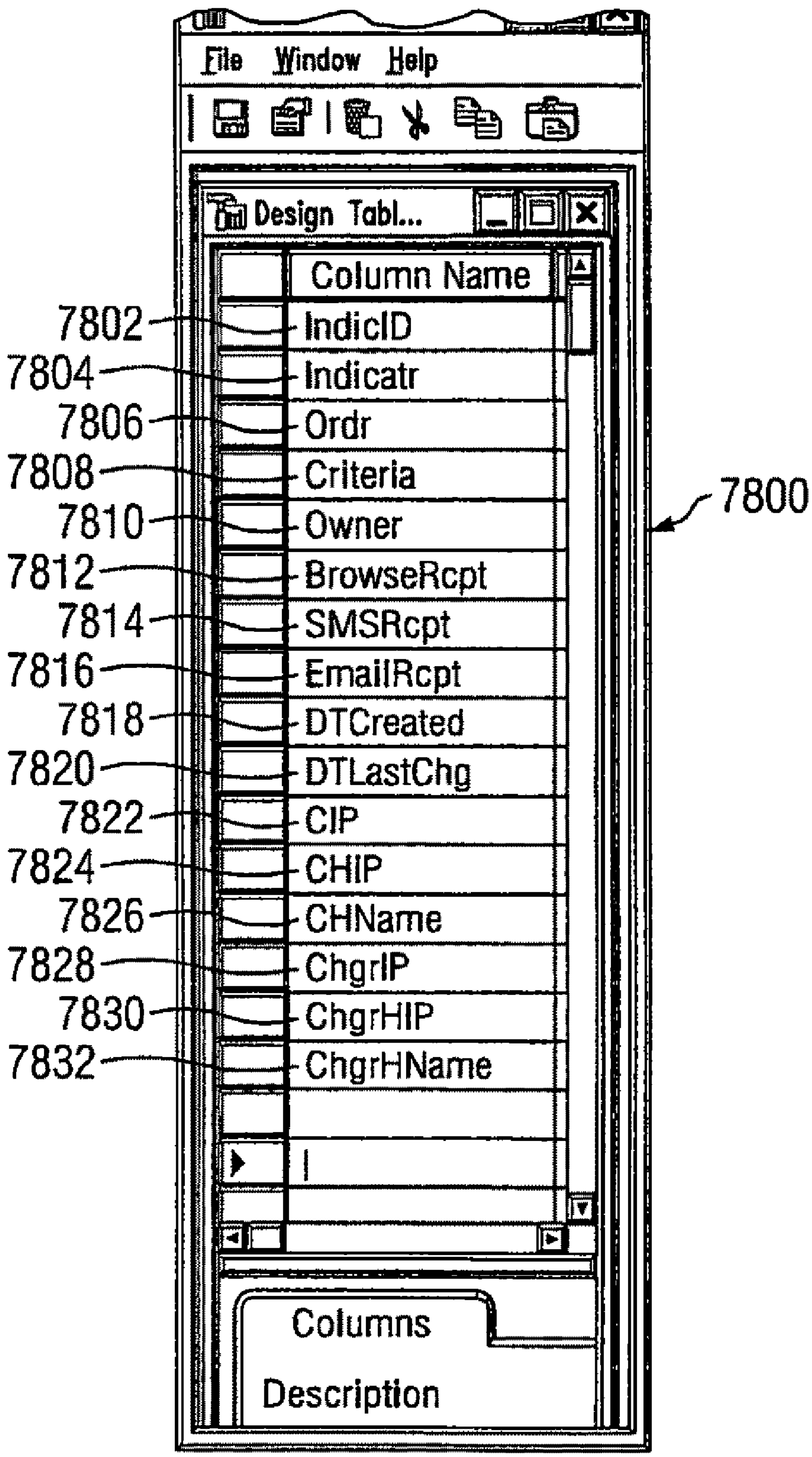
Figure 79A:
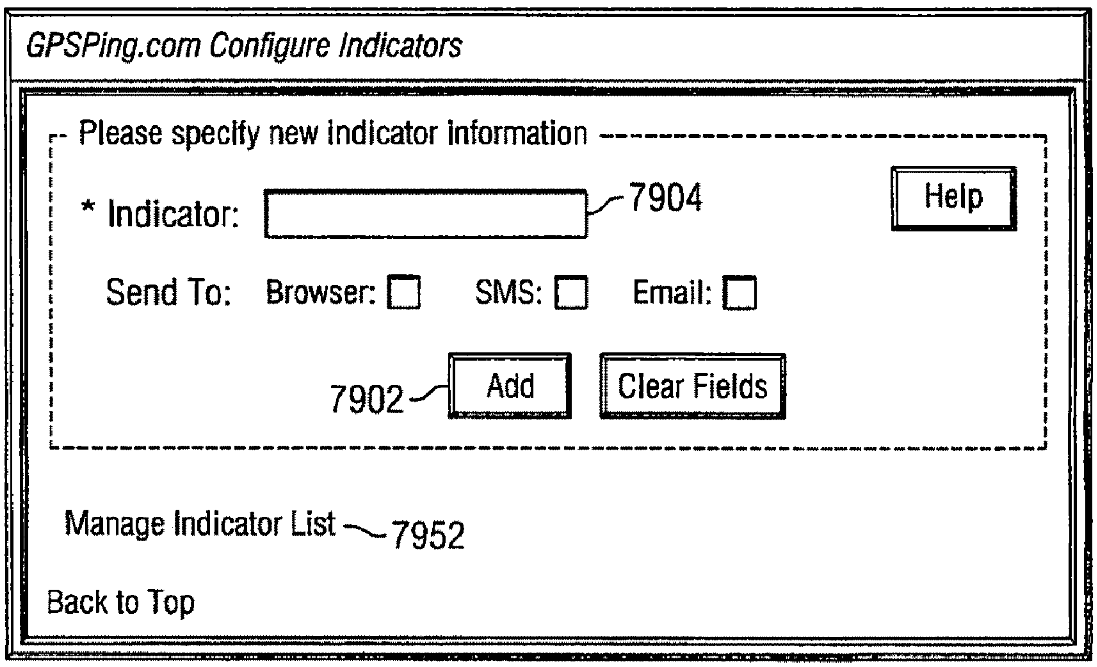
Figure 79B:
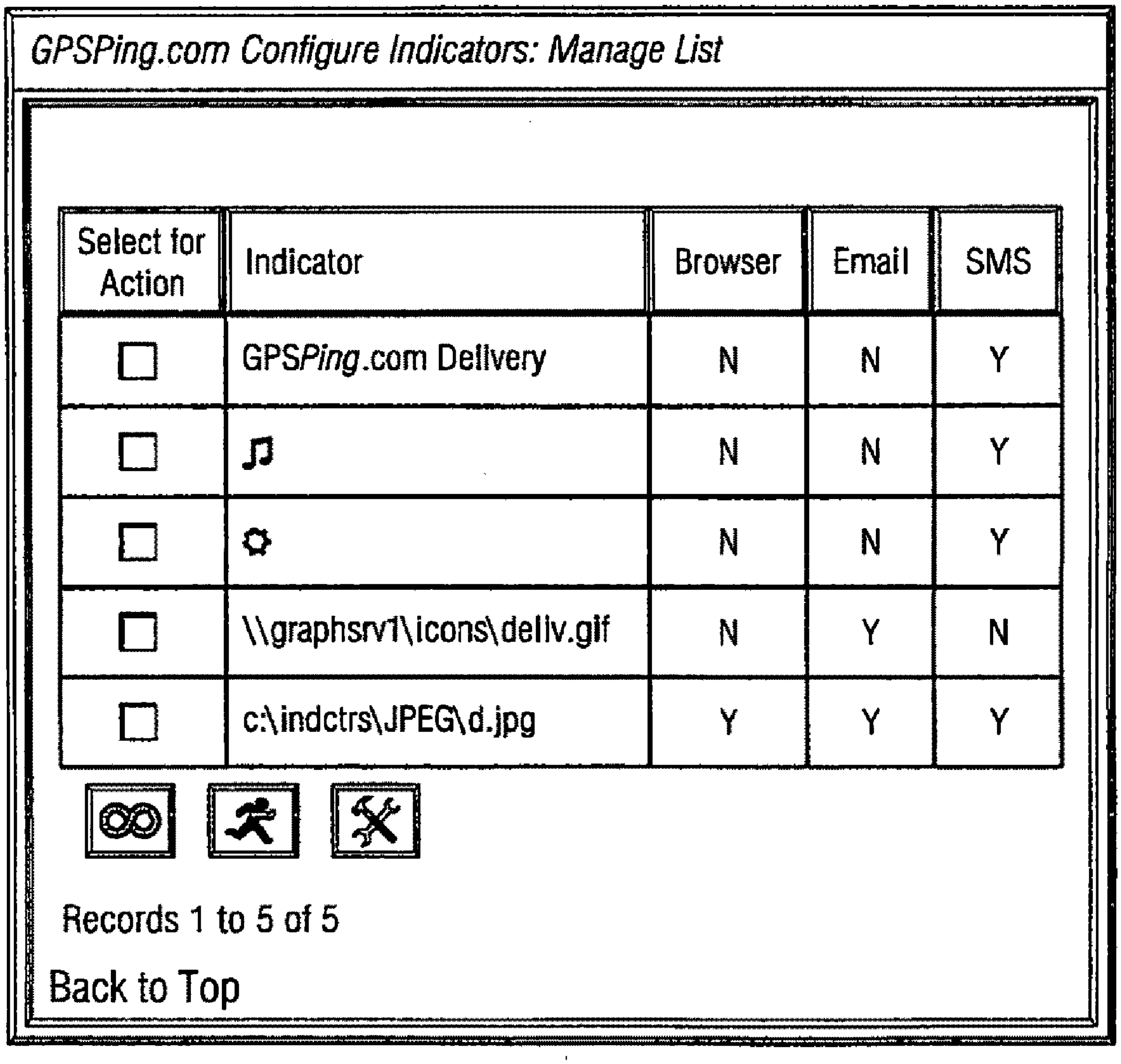
Figure 80:
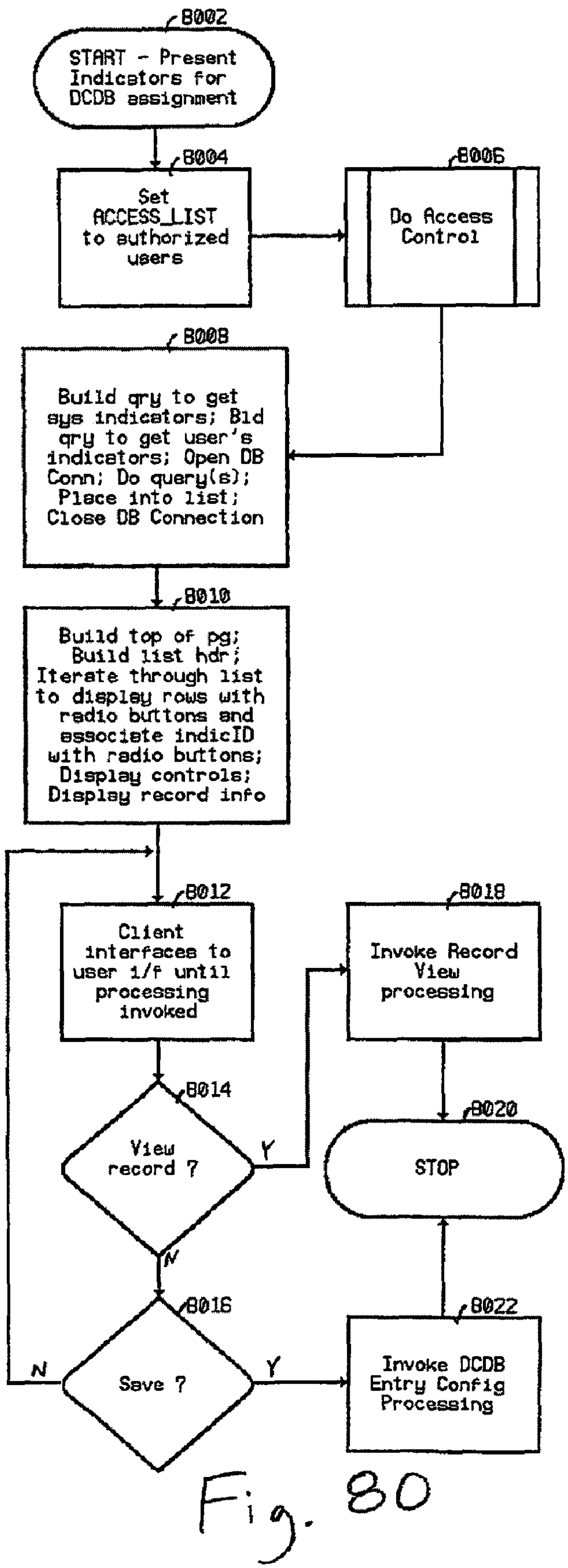
Figure 81:
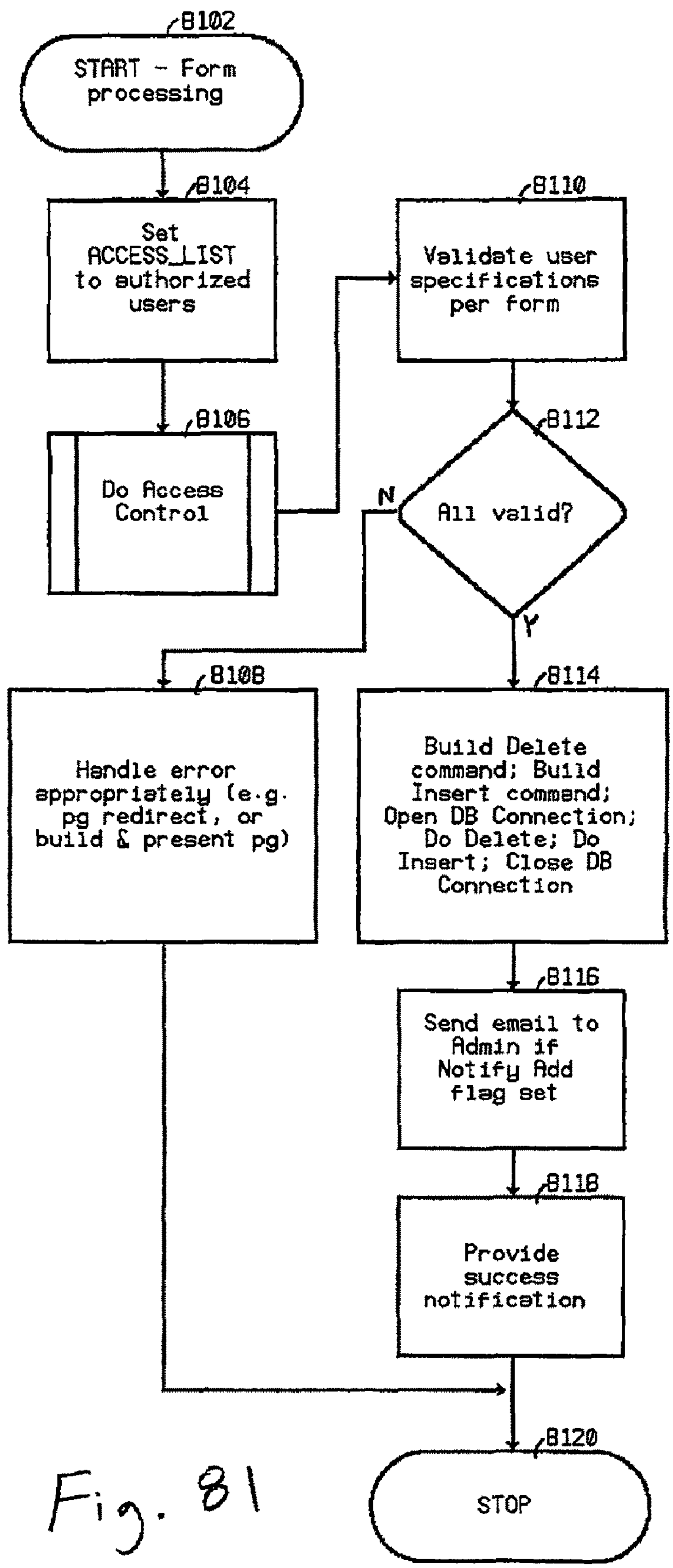
Figure 82:
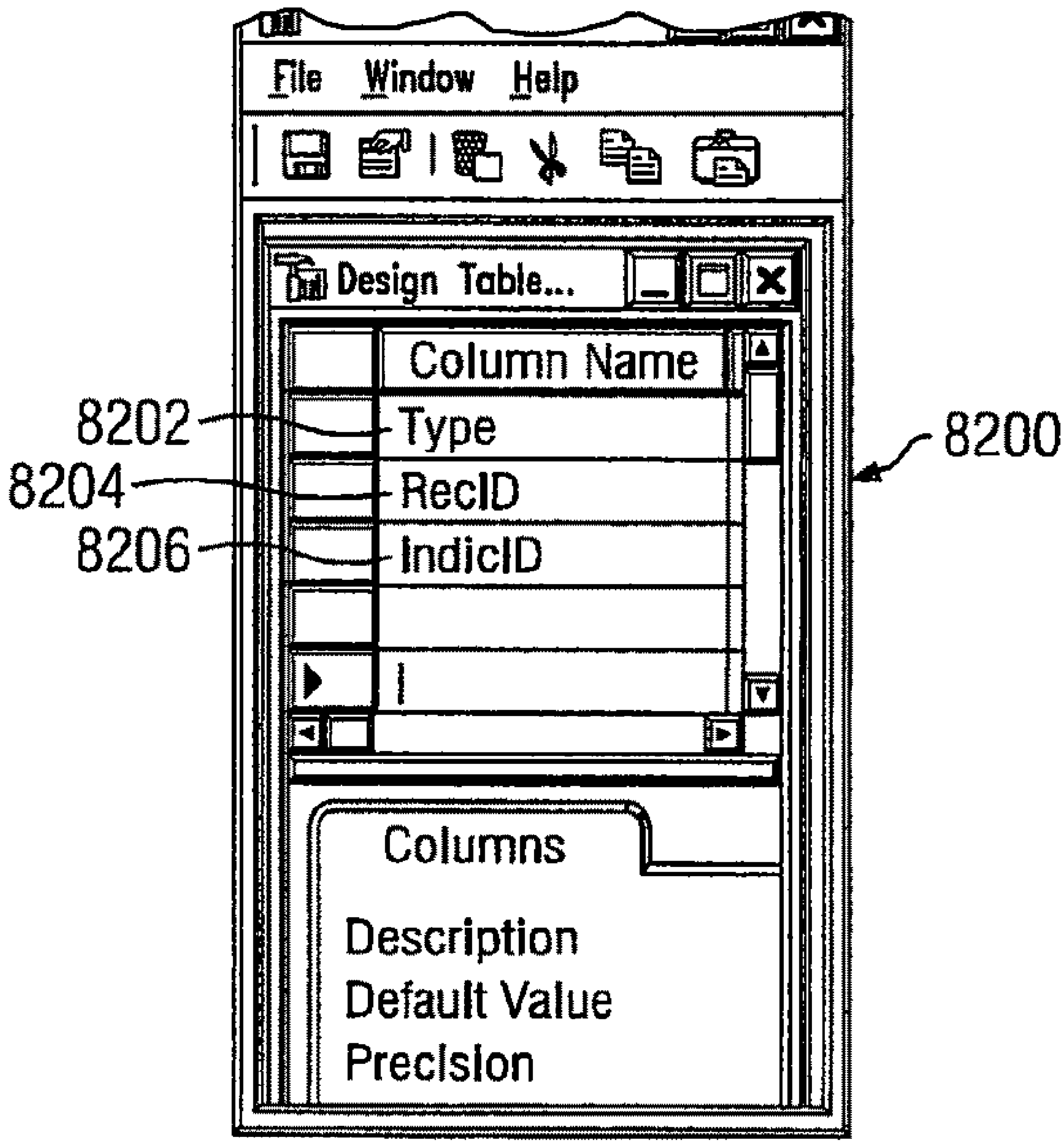
Figure 83:
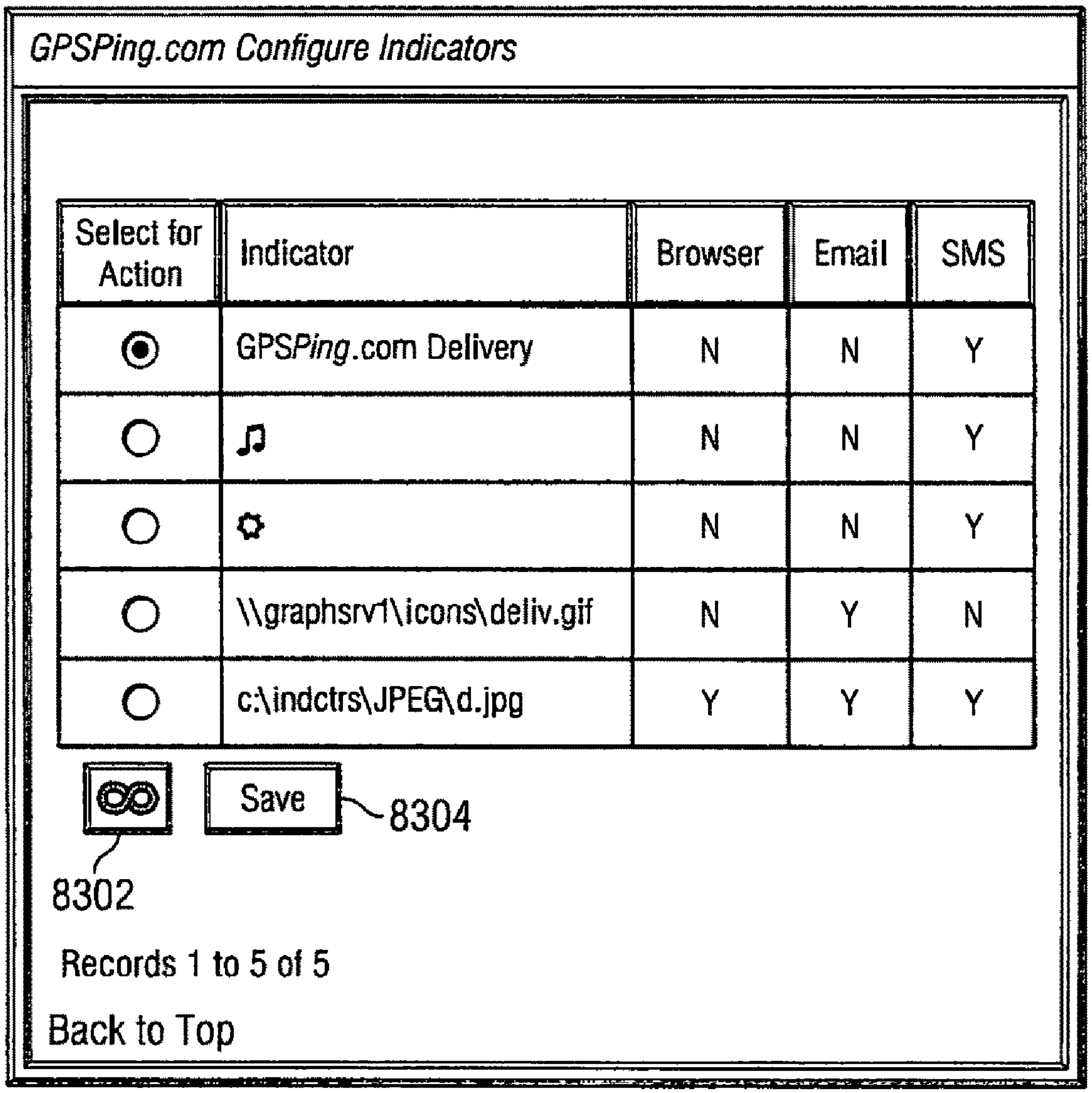
Figure 84A:
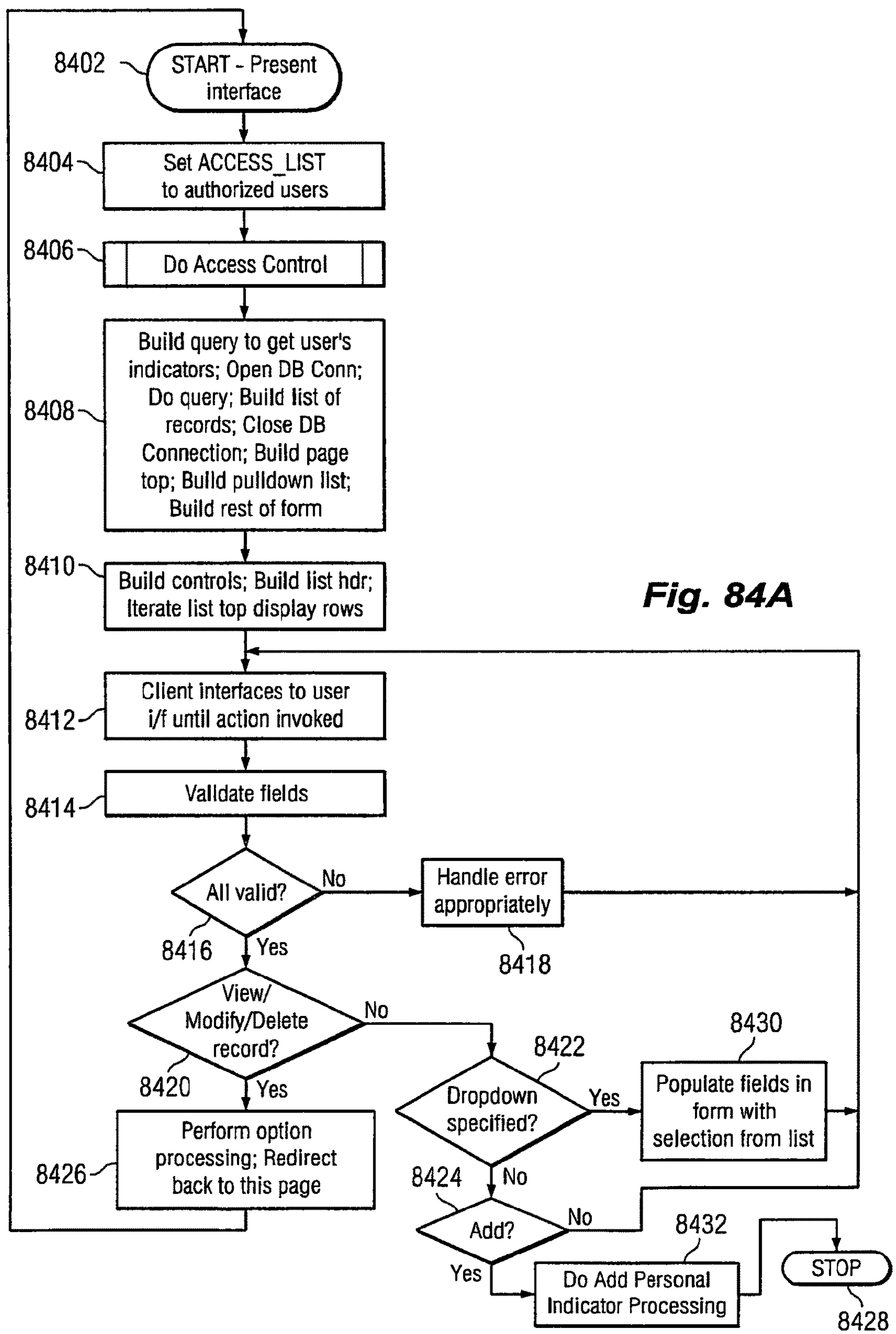
Figure 84B:
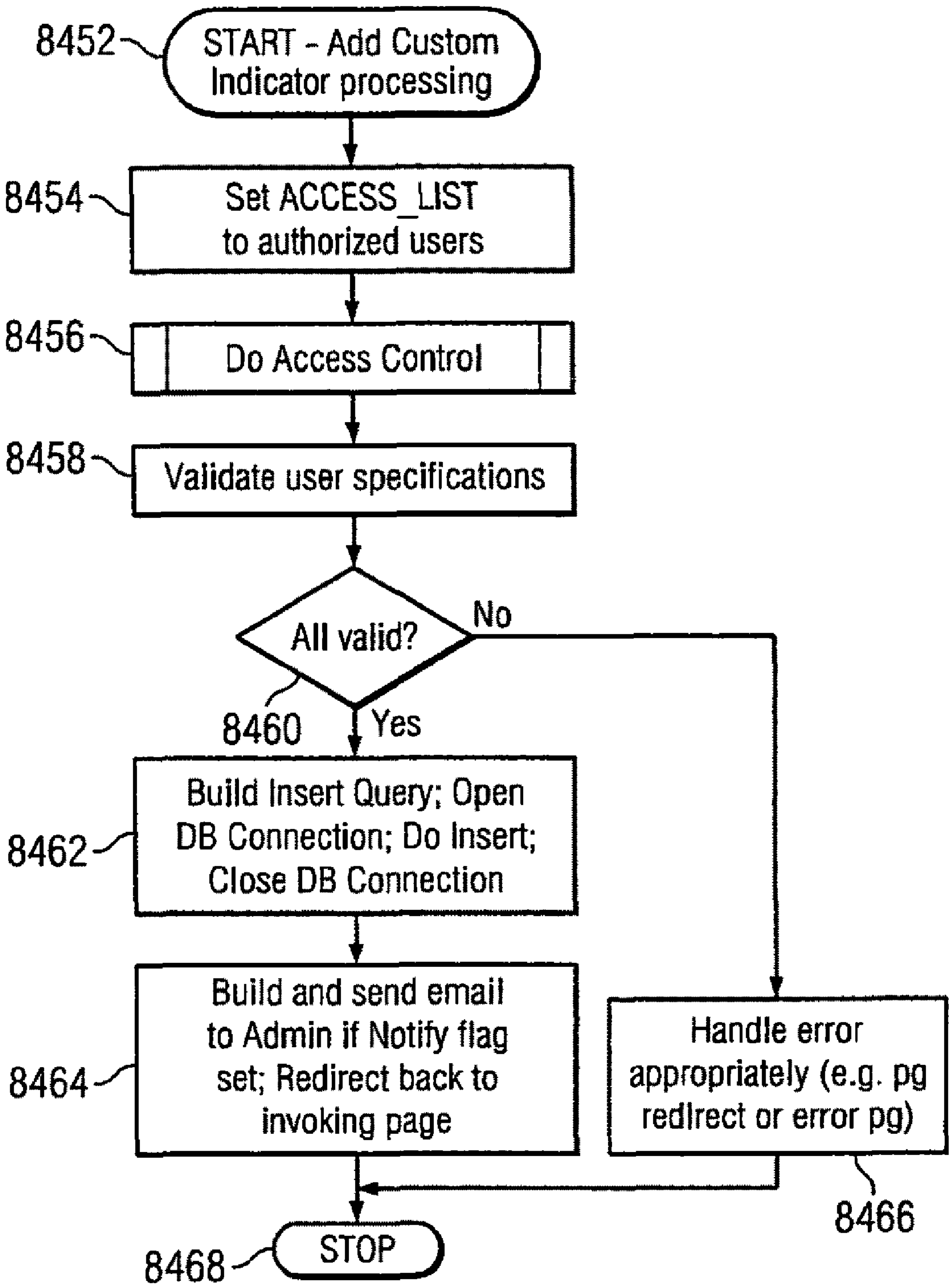
Figure 85:
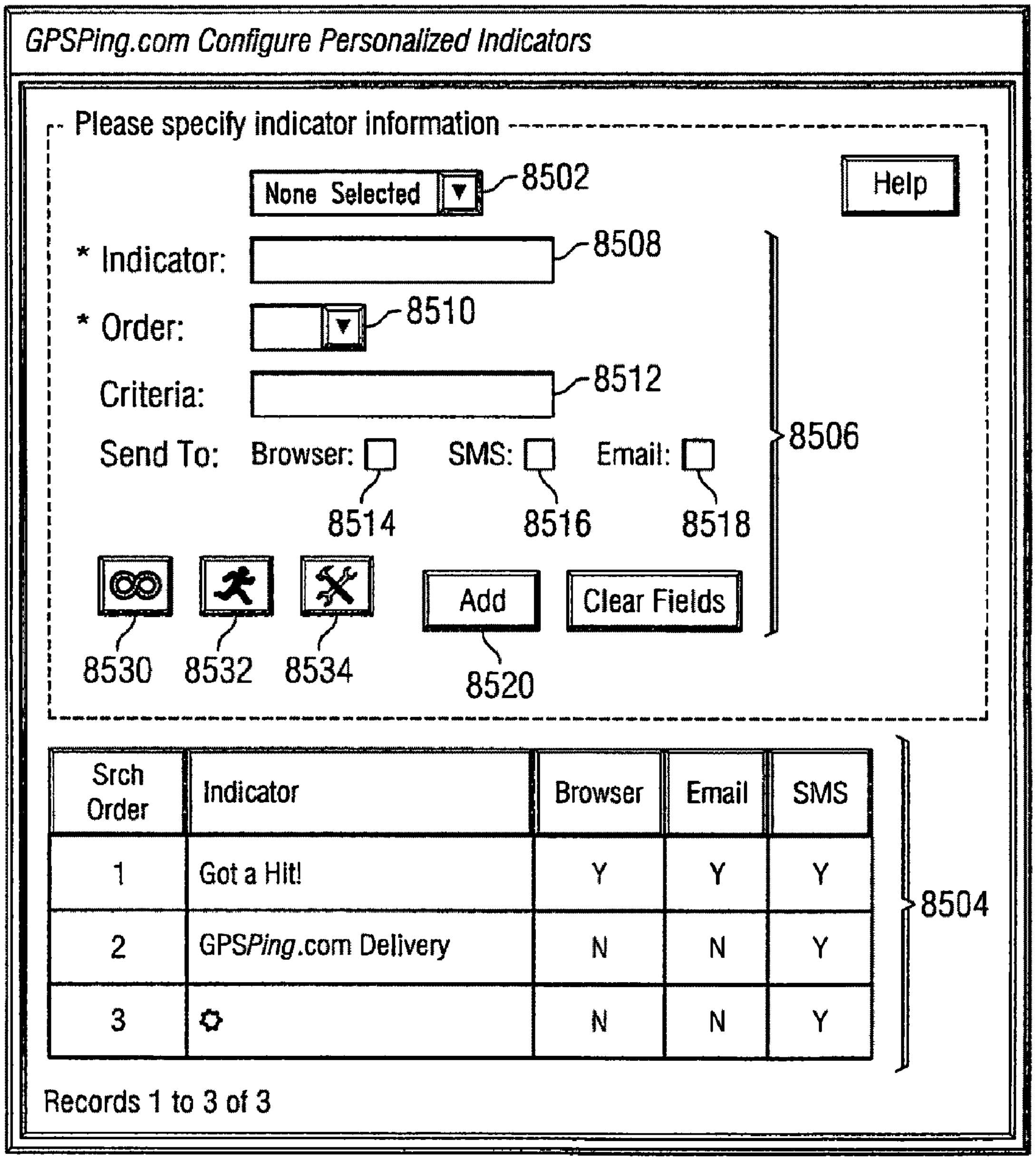
Figure 86:
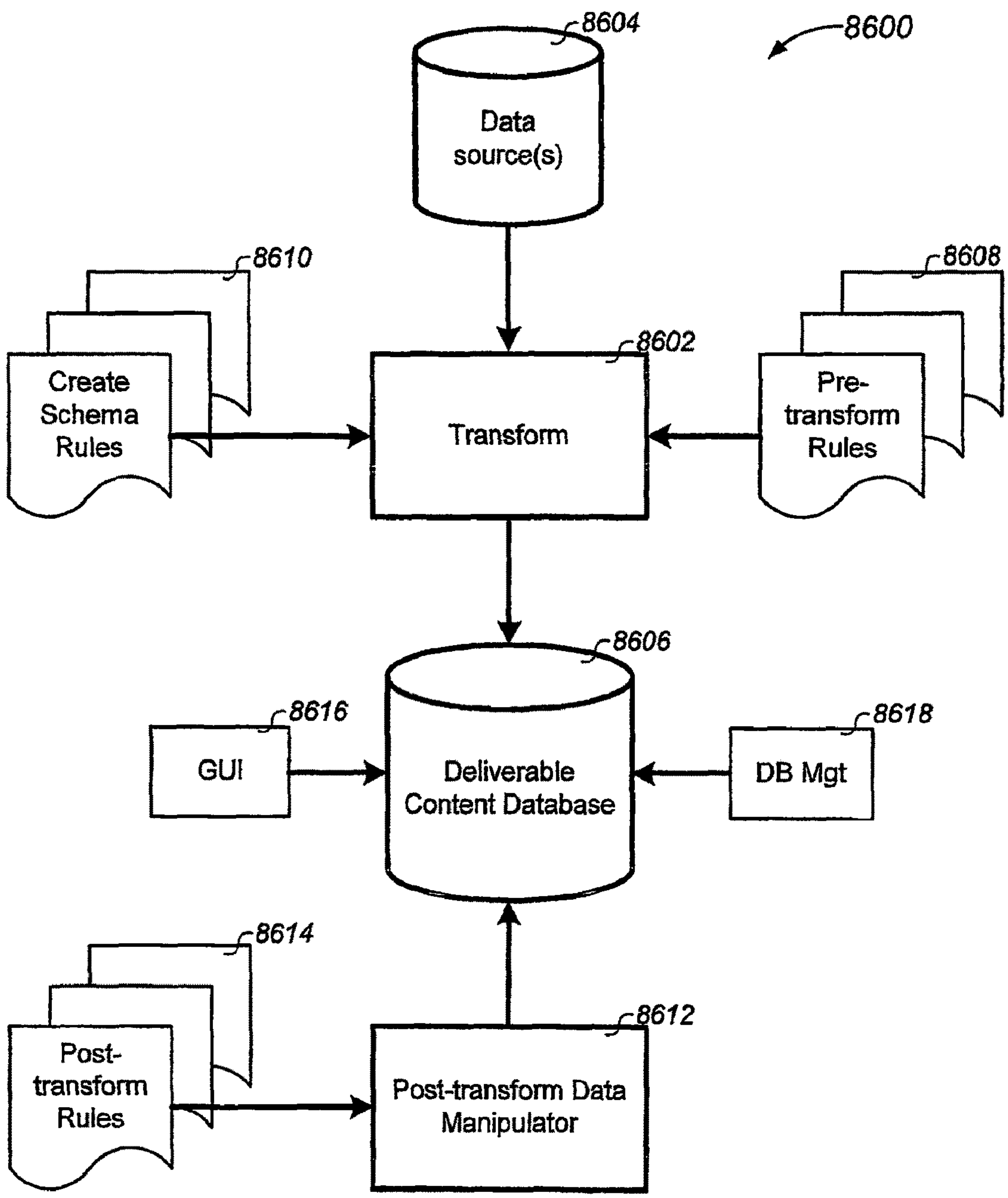
Figure 87:
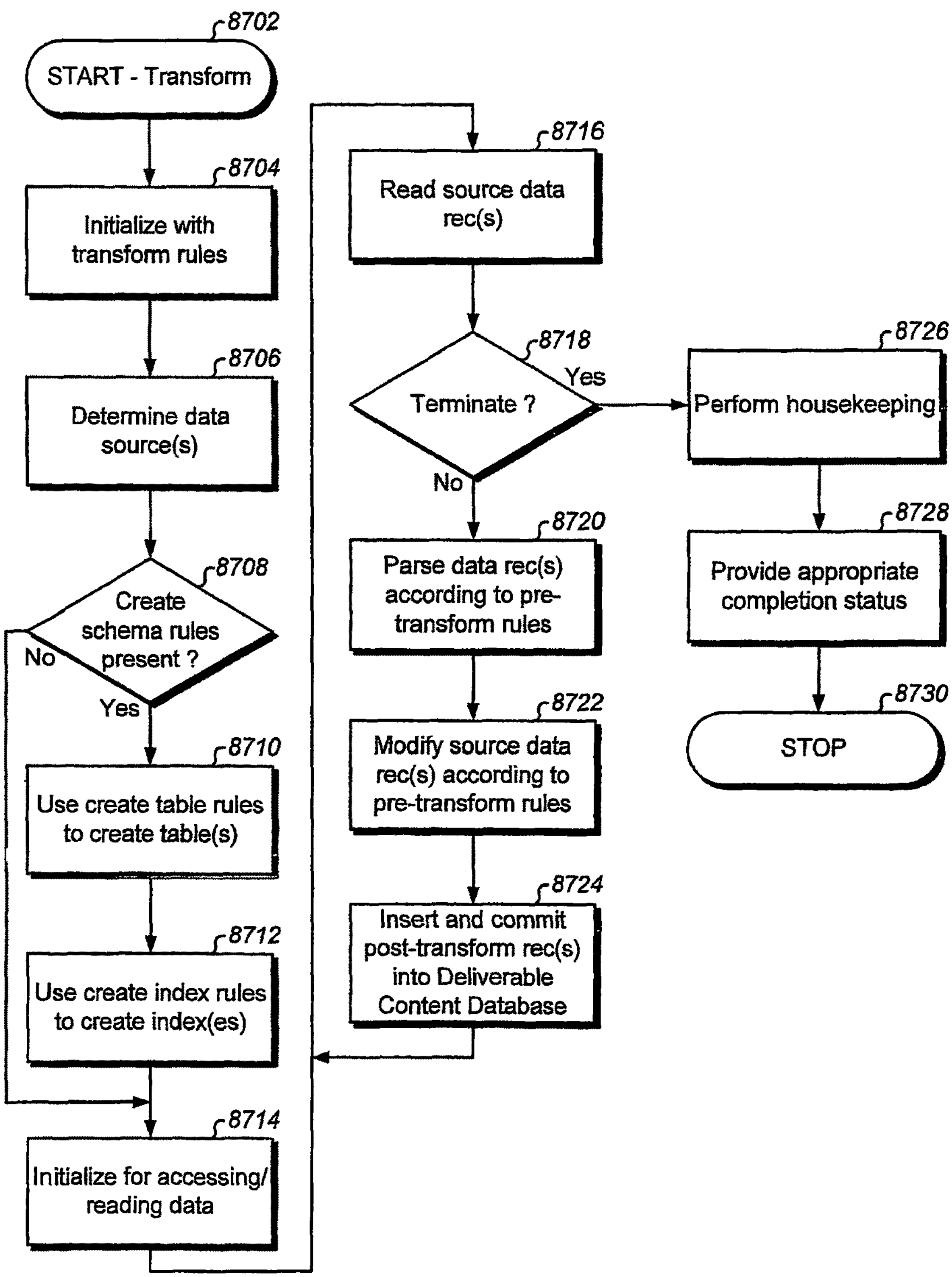
Figure 88:
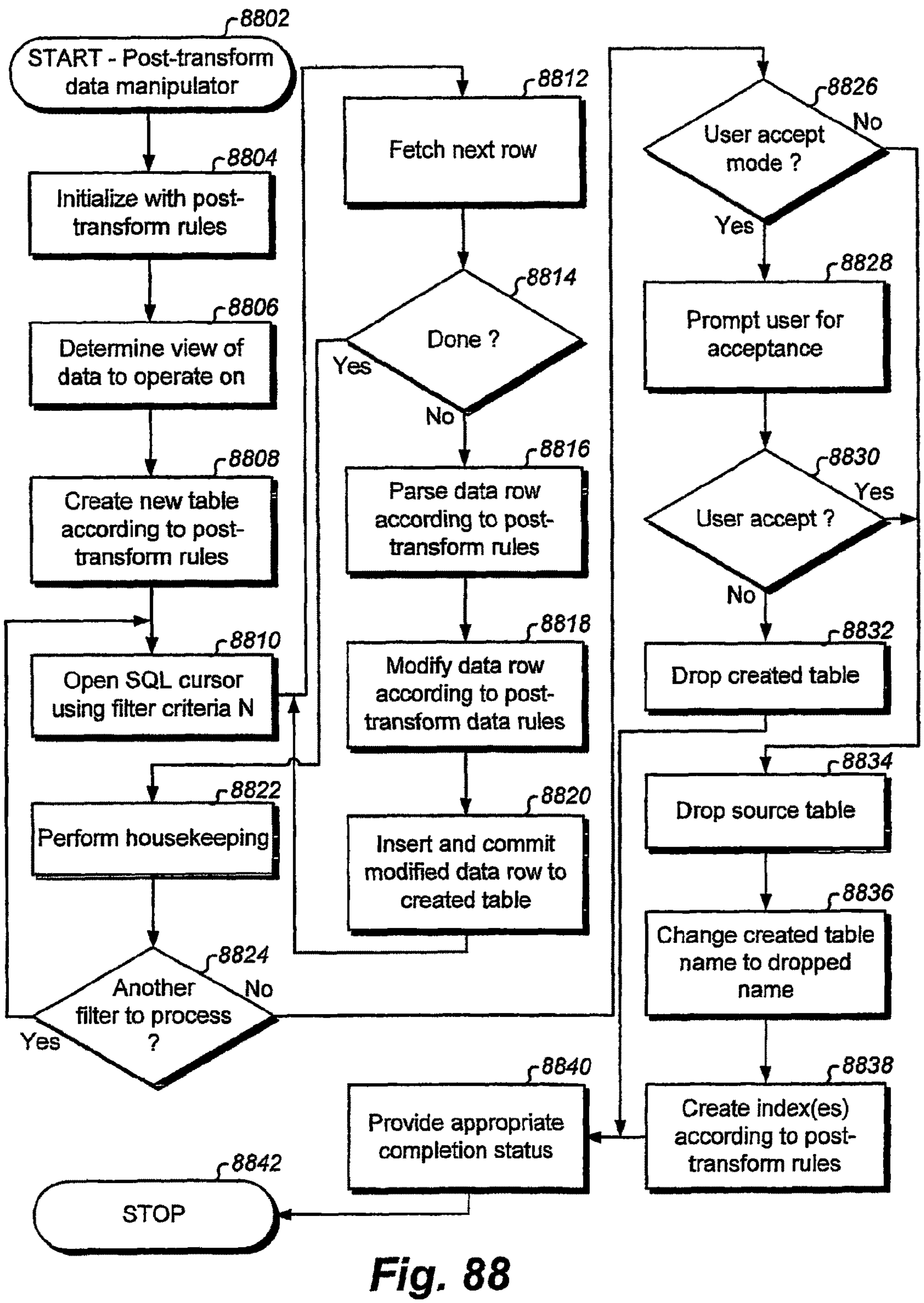
Figure 89:
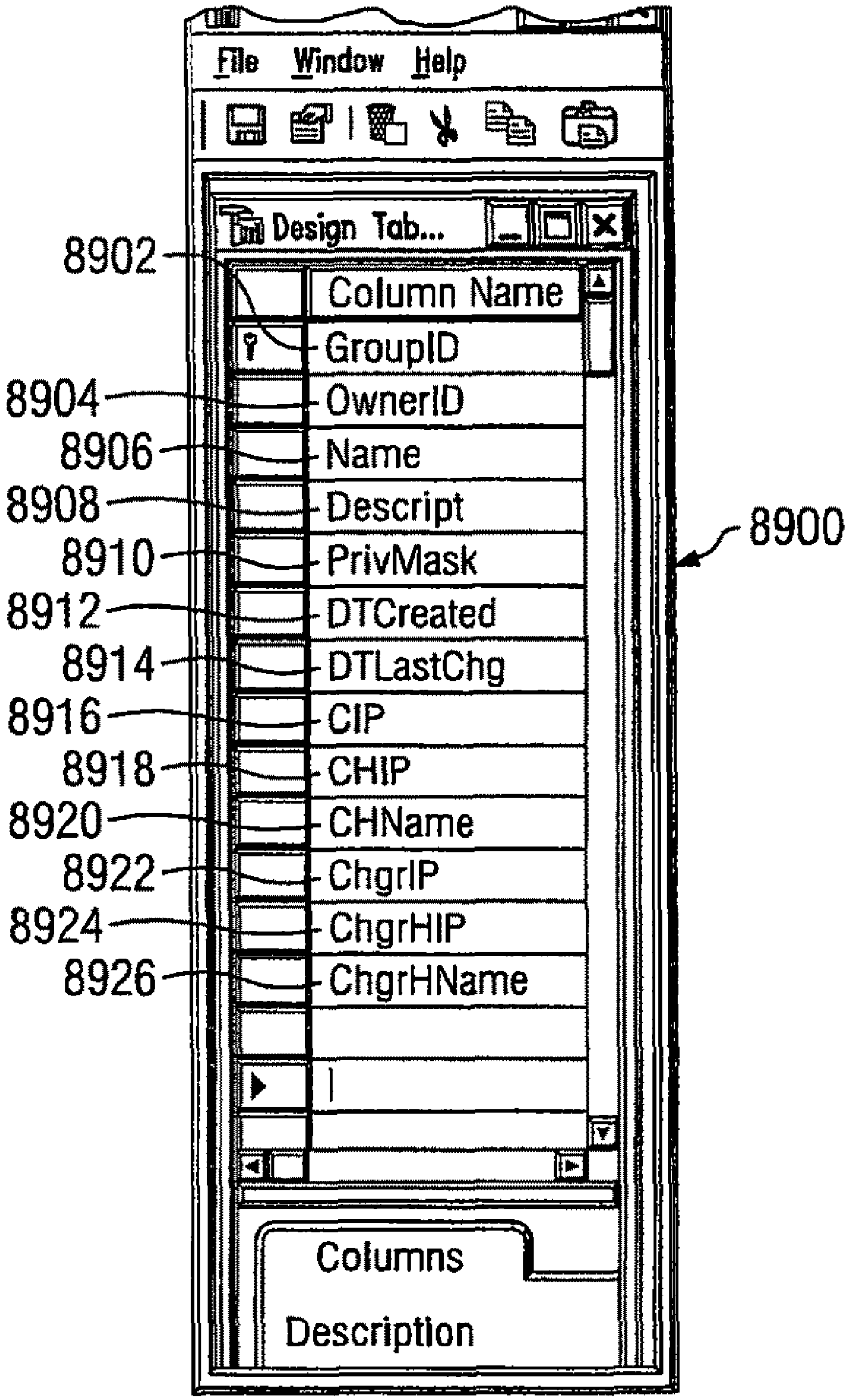
Figure 90A:
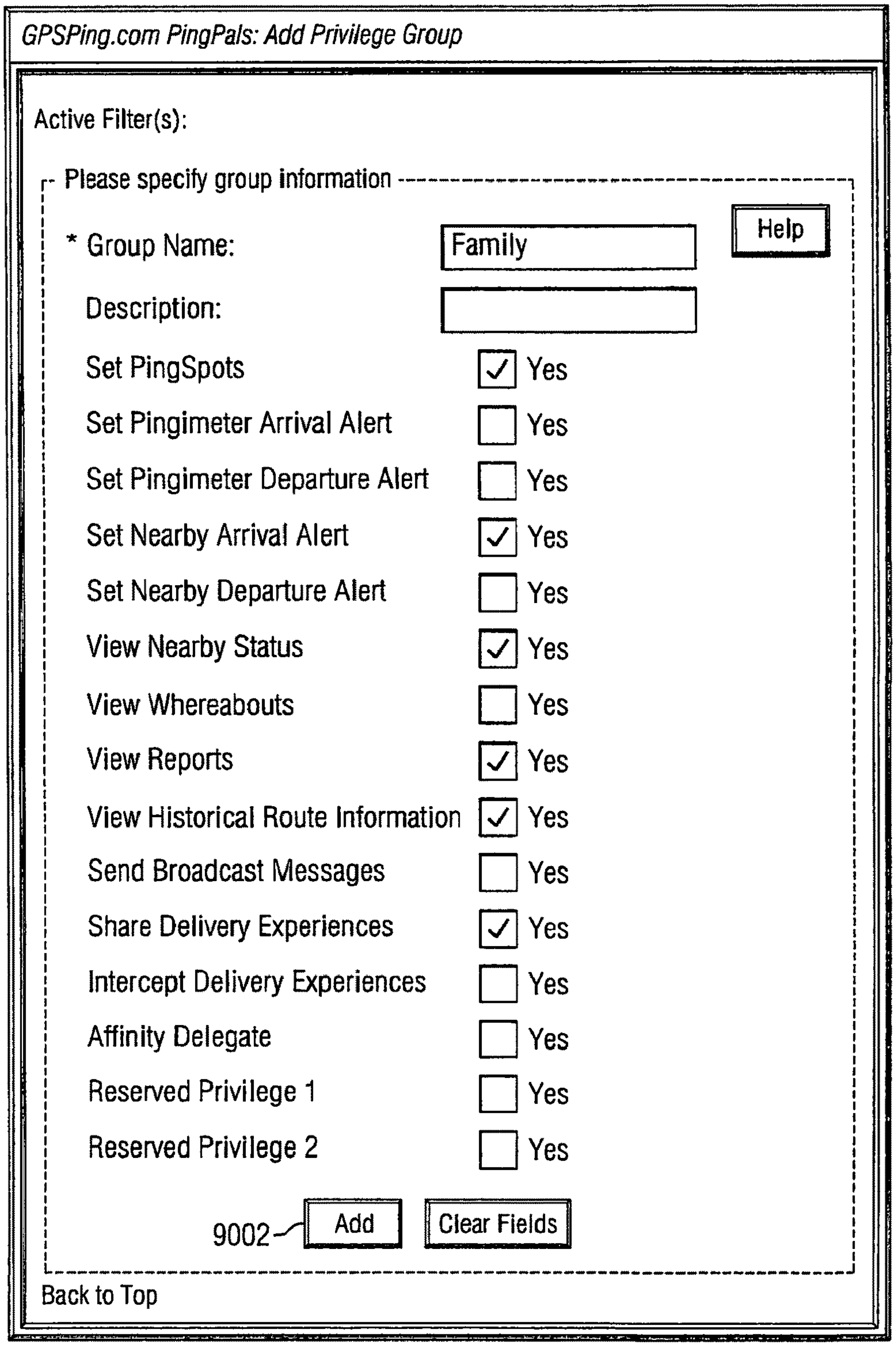
Figure 90B:
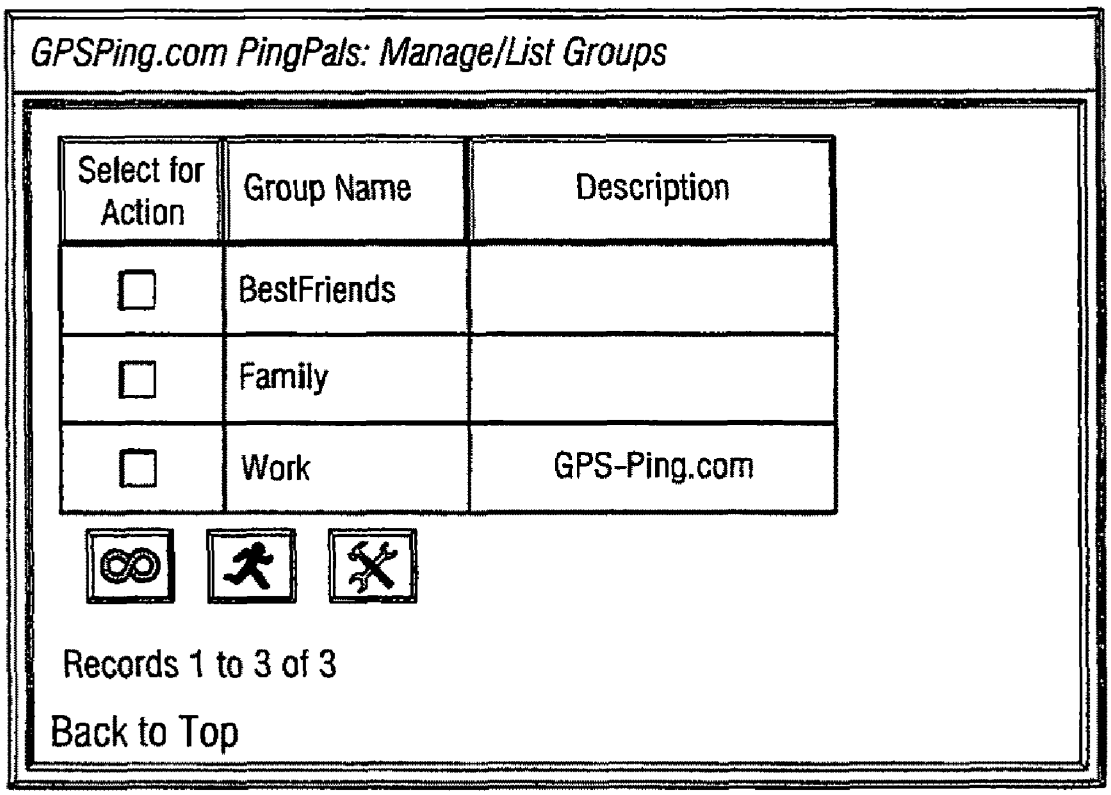
Figure 91A:
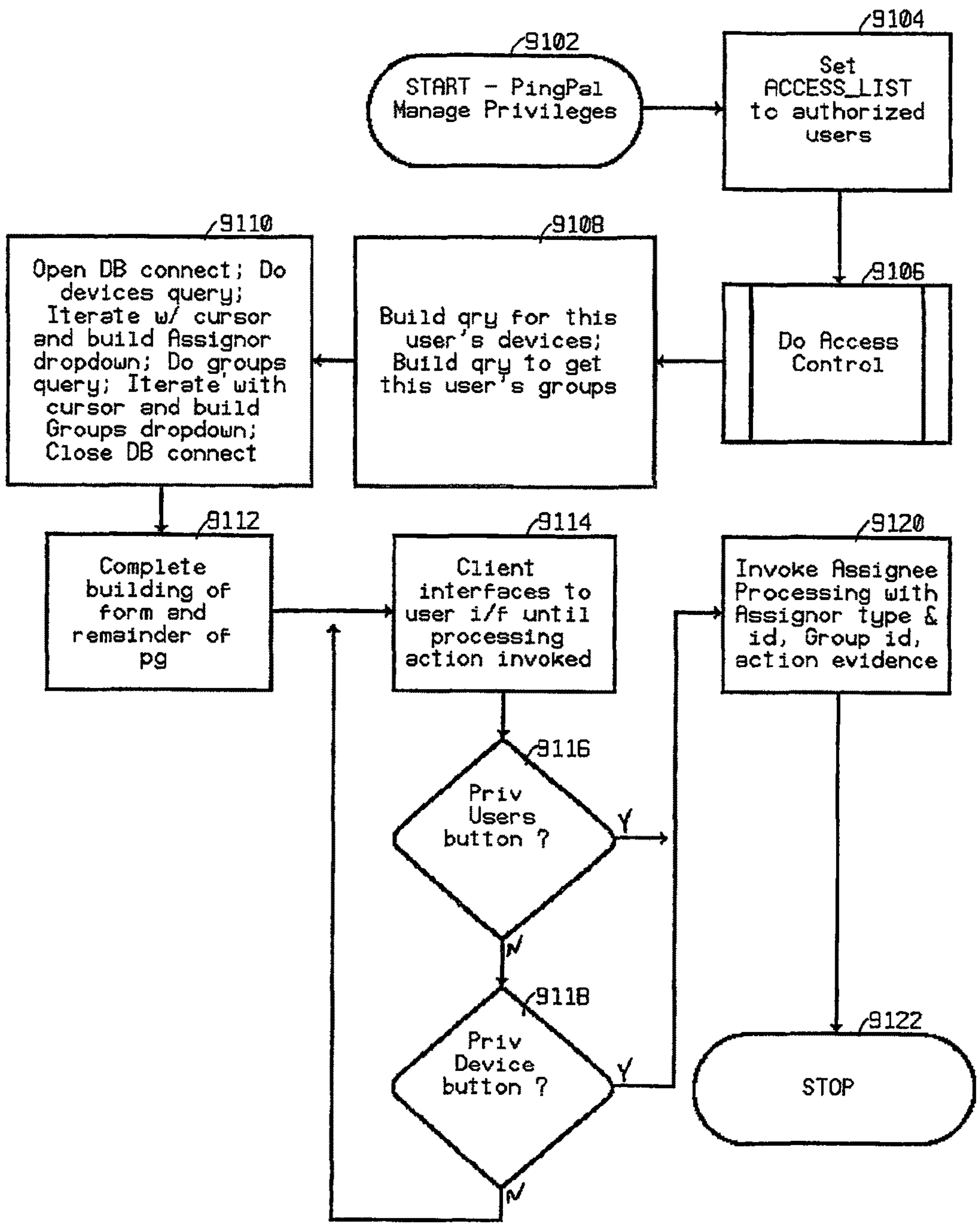
Figure 91B:
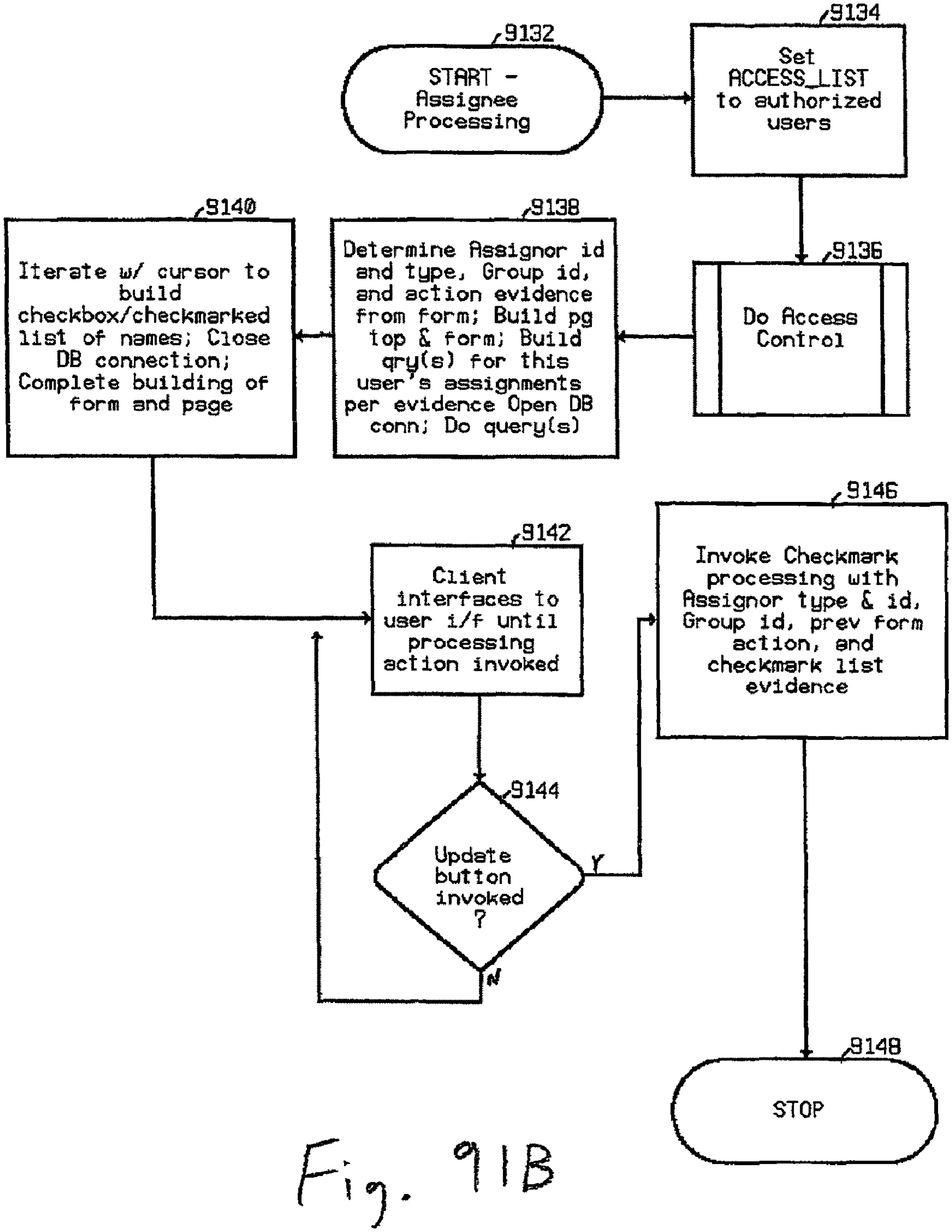
Figure 91C:
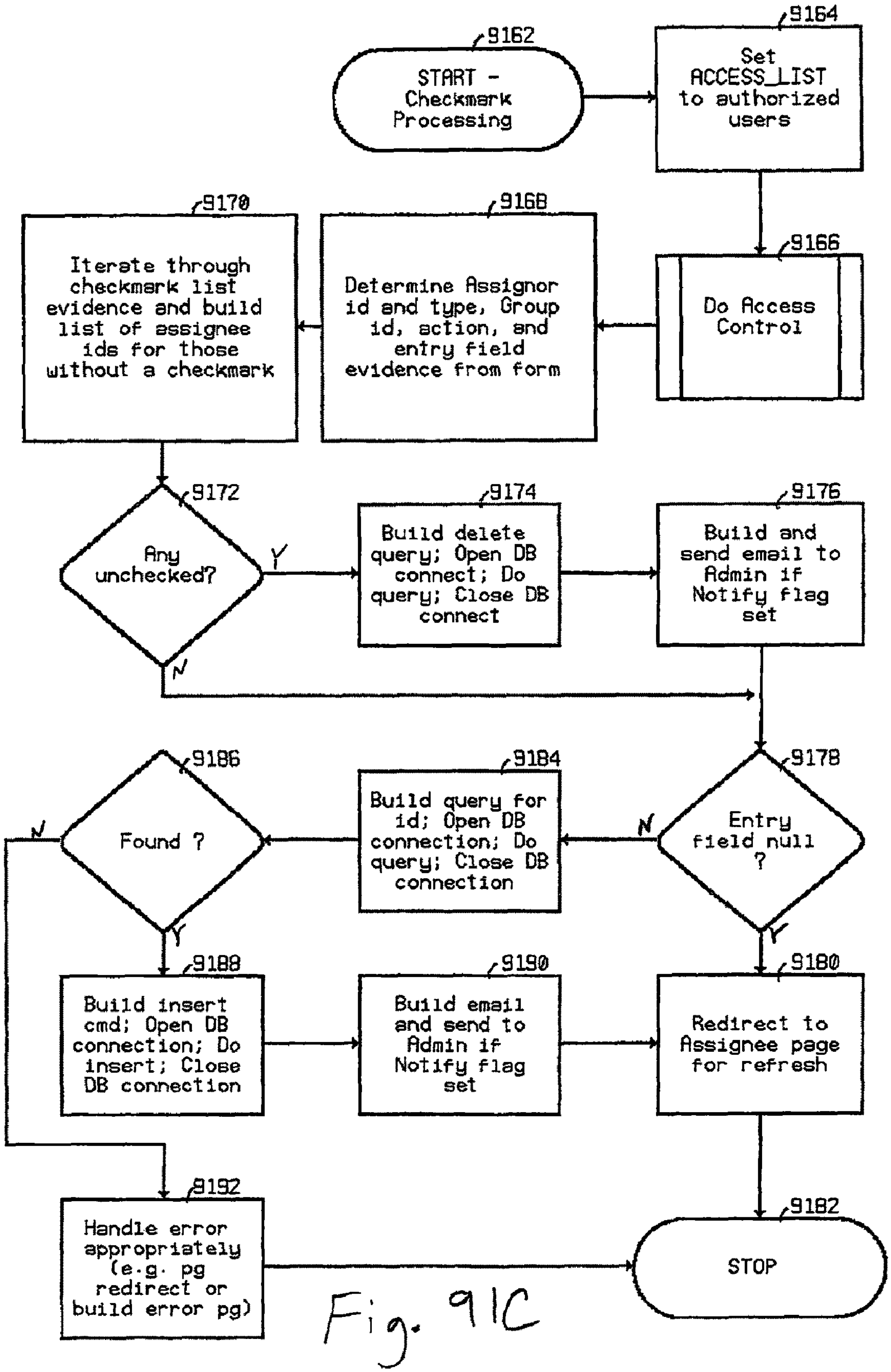
Figure 92:
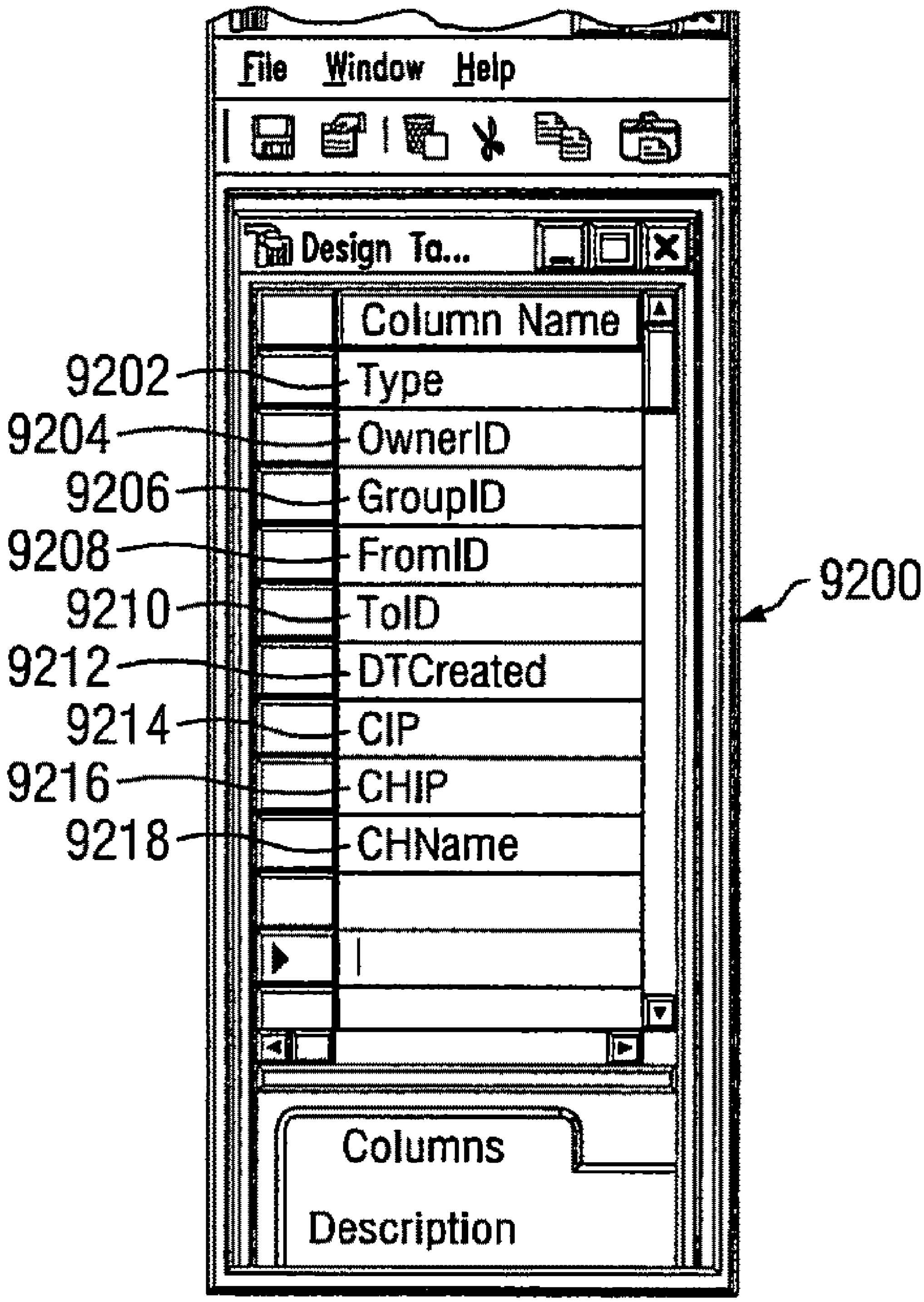
Figure 93A:
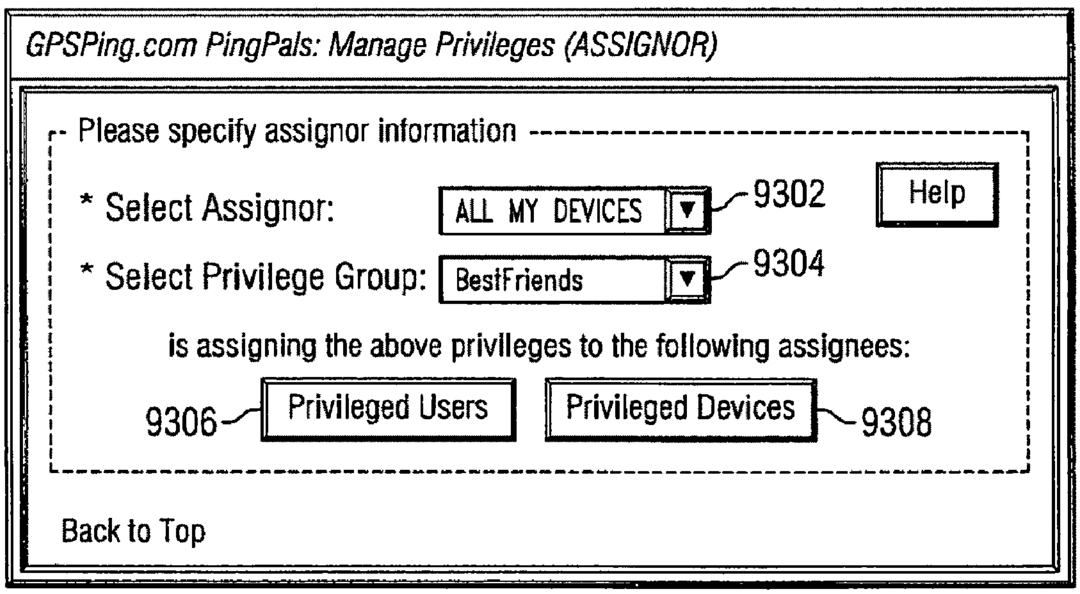
Figure 93B:
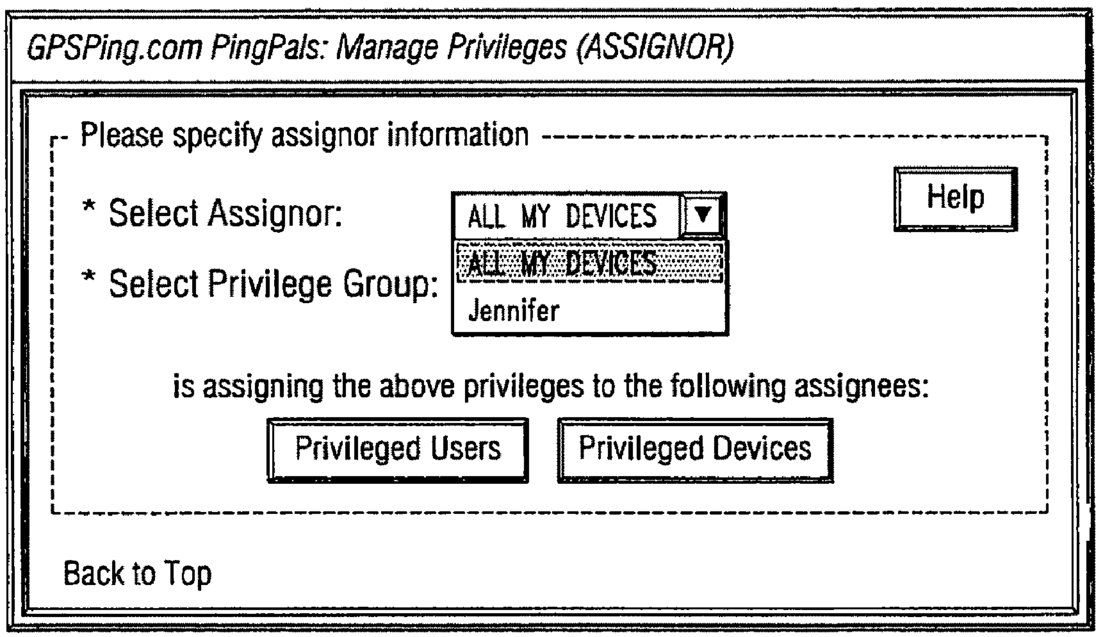
Figure 93C:
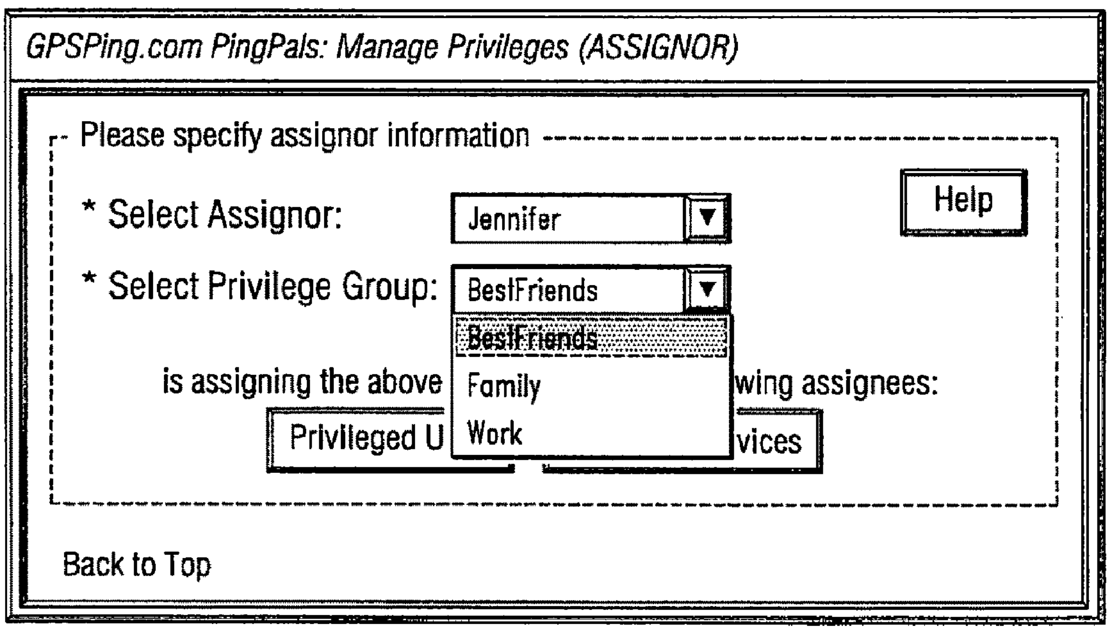
Figure 93D:
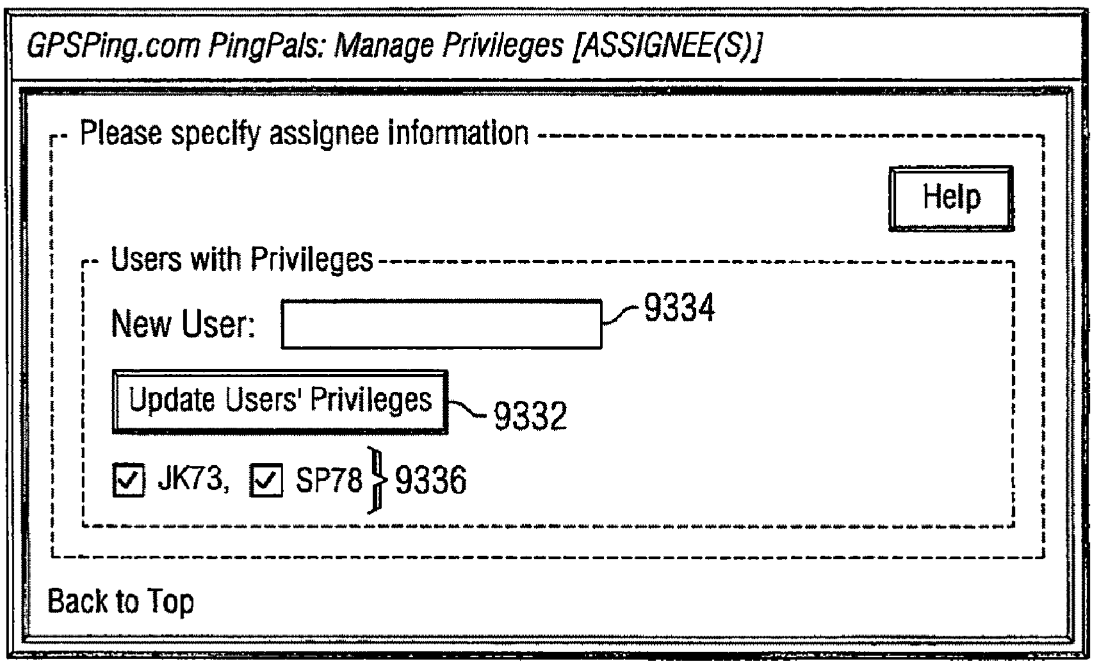
Figure 93E:
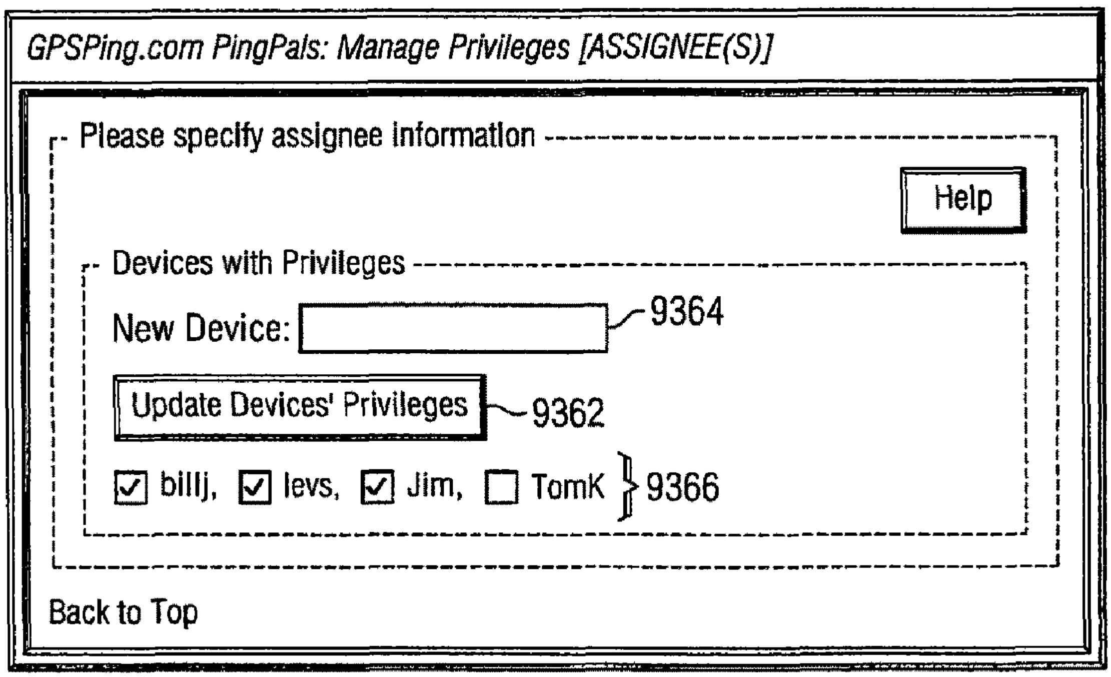
Figure 94A:
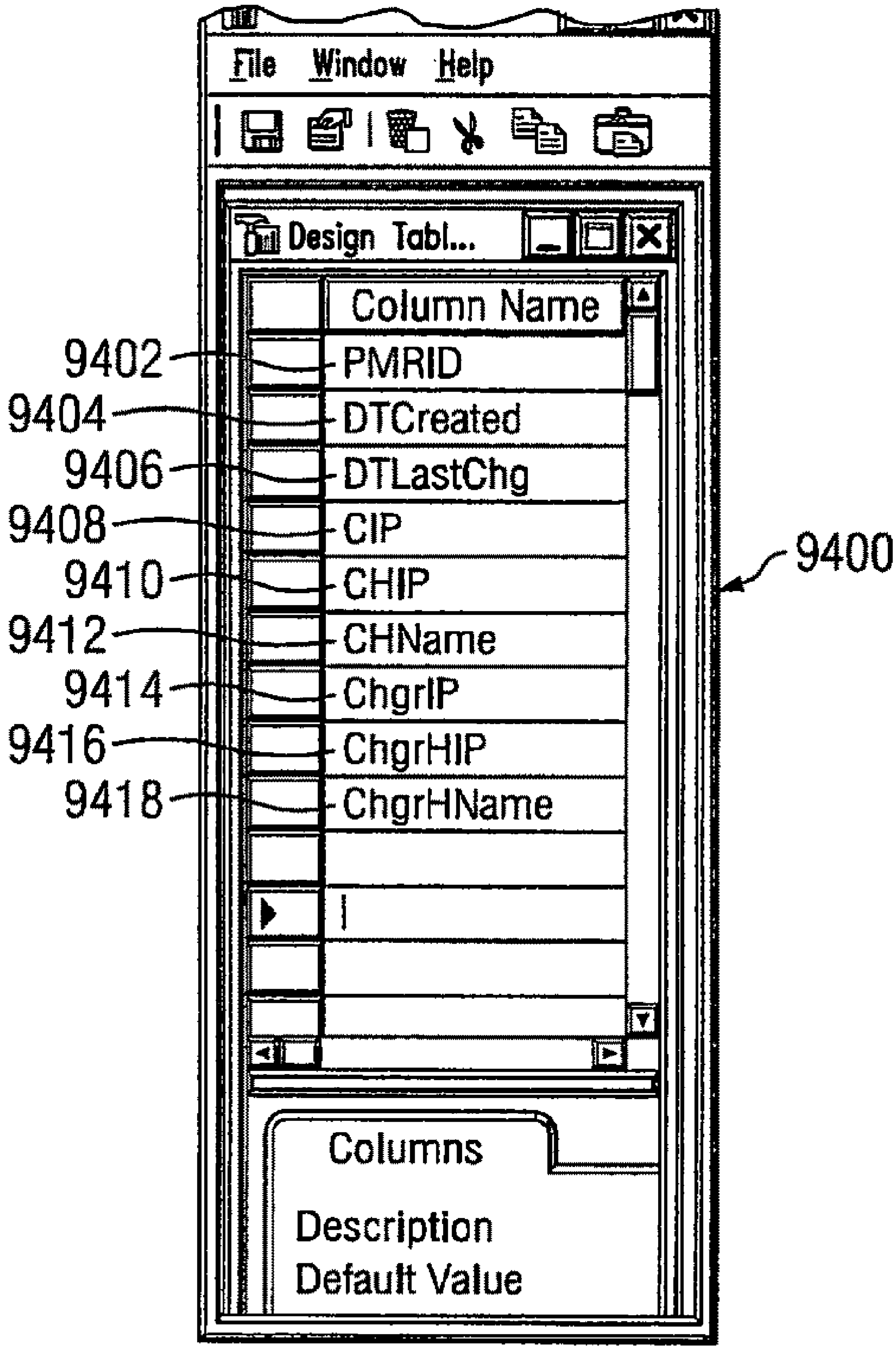
Figure 94B:
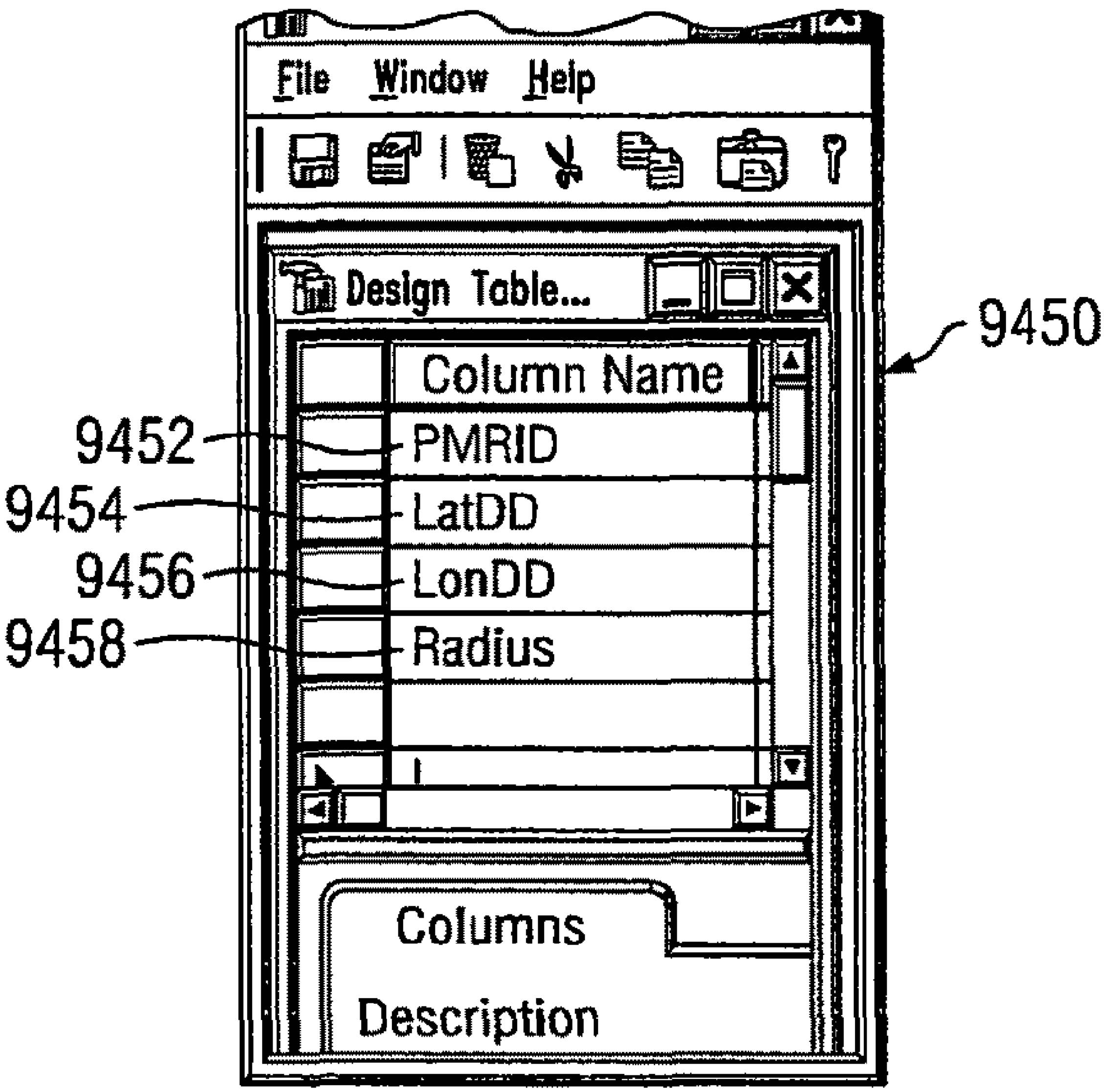
Figure 95:
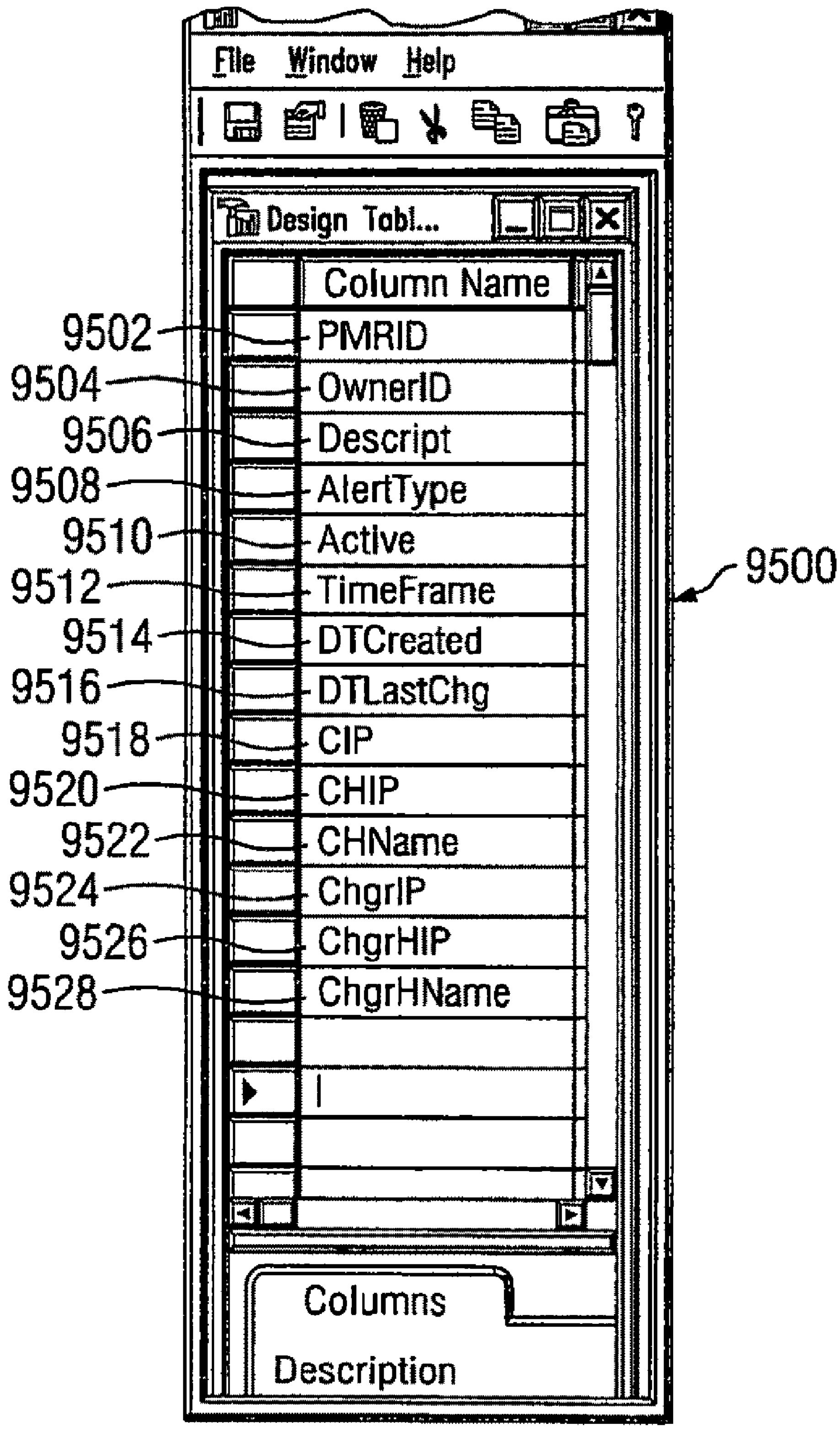
Figure 96B:
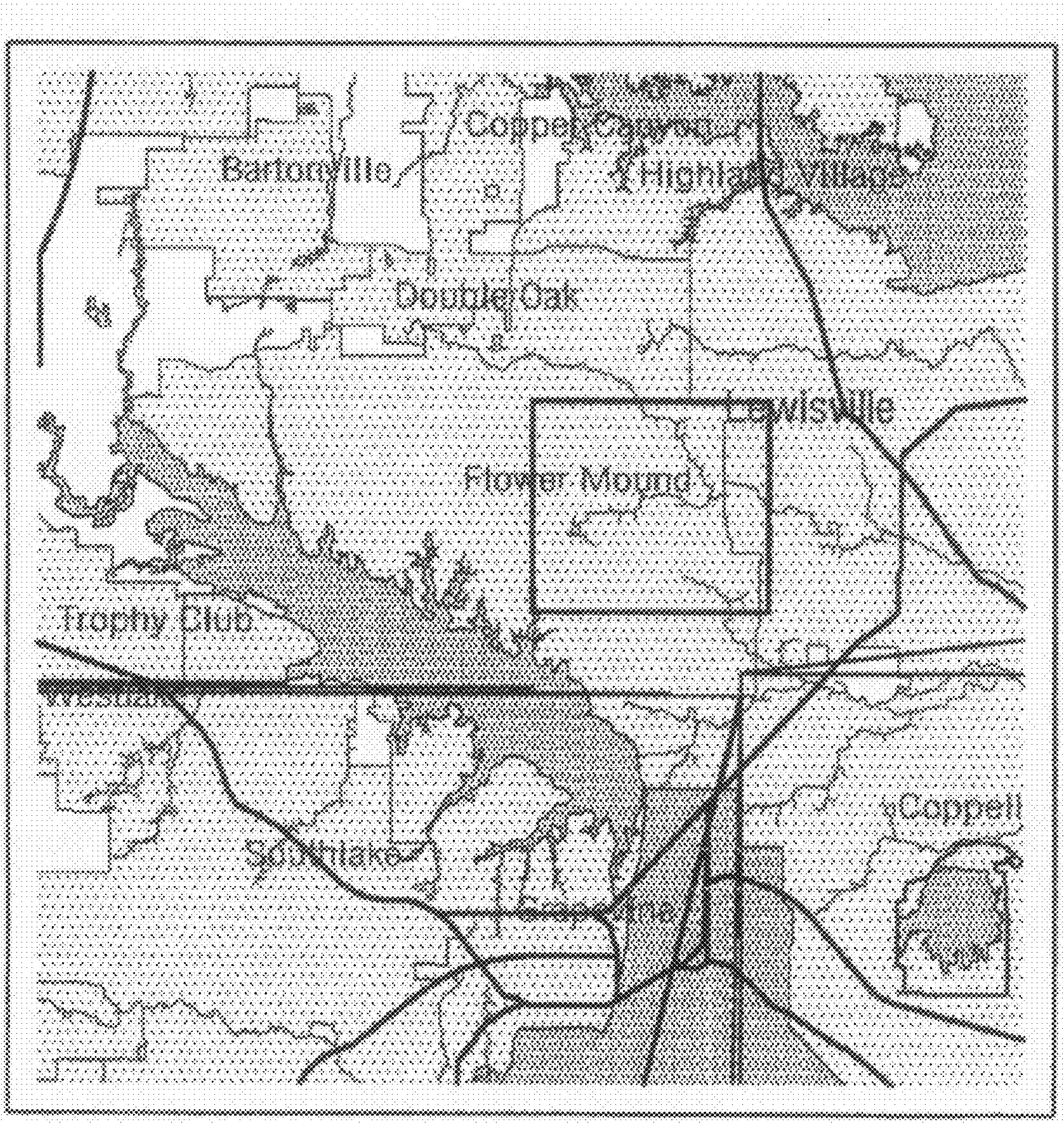
Figure 96C:
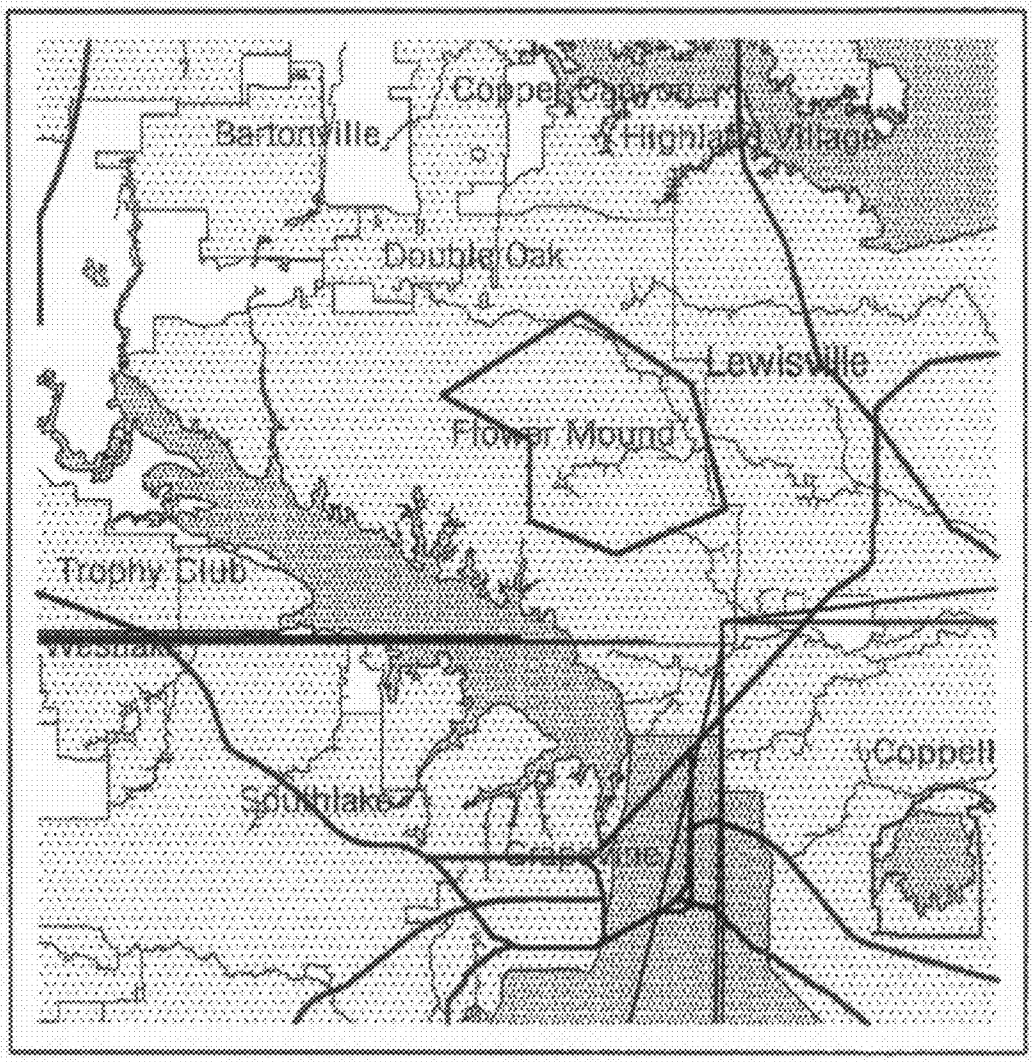
Figure 96D:
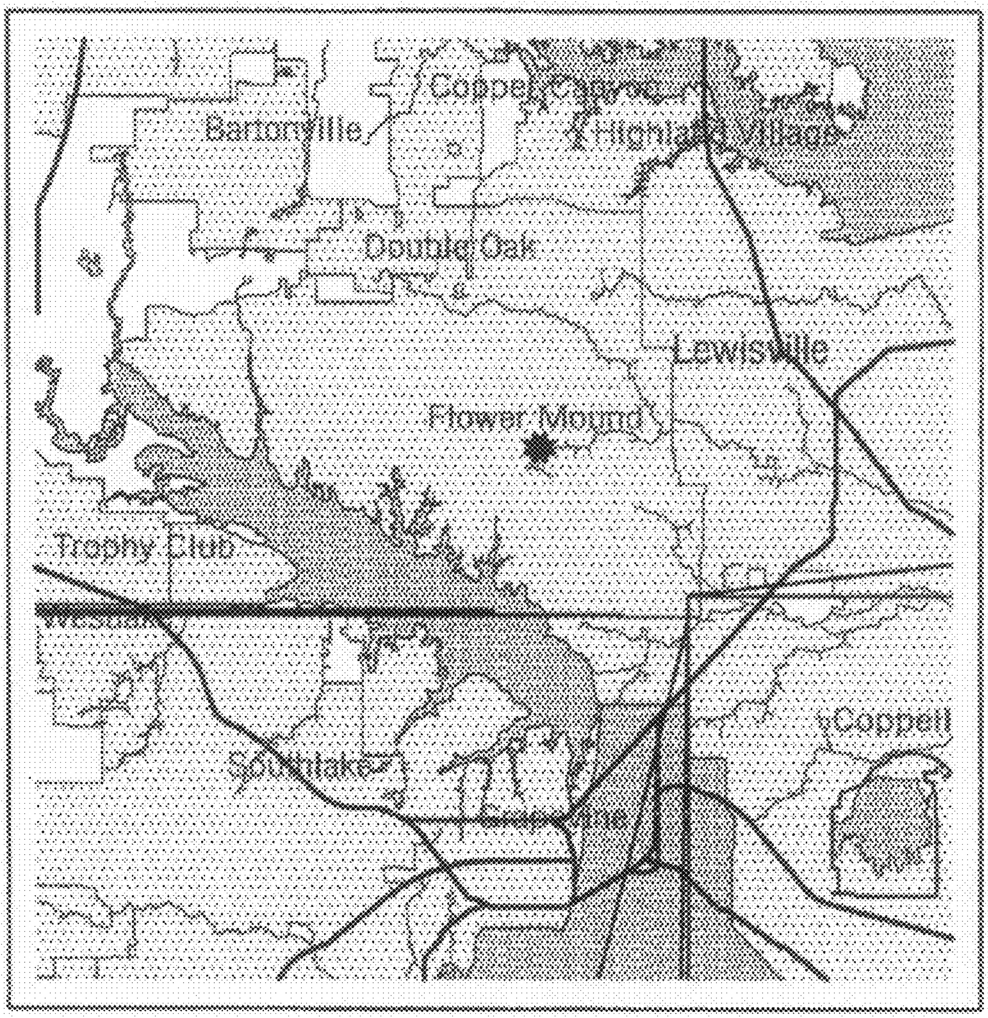
Figure 97A:
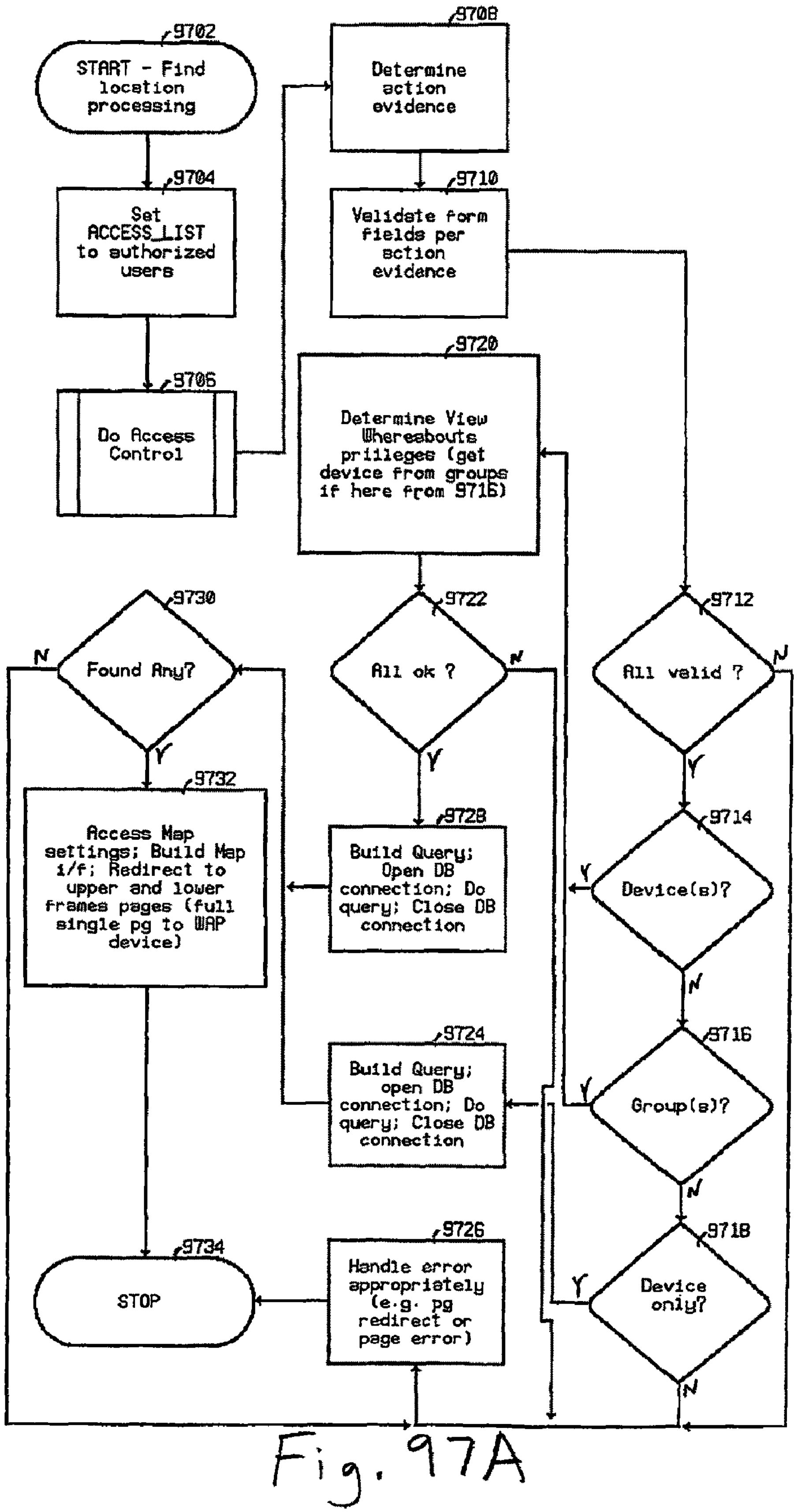
Figure 97B:
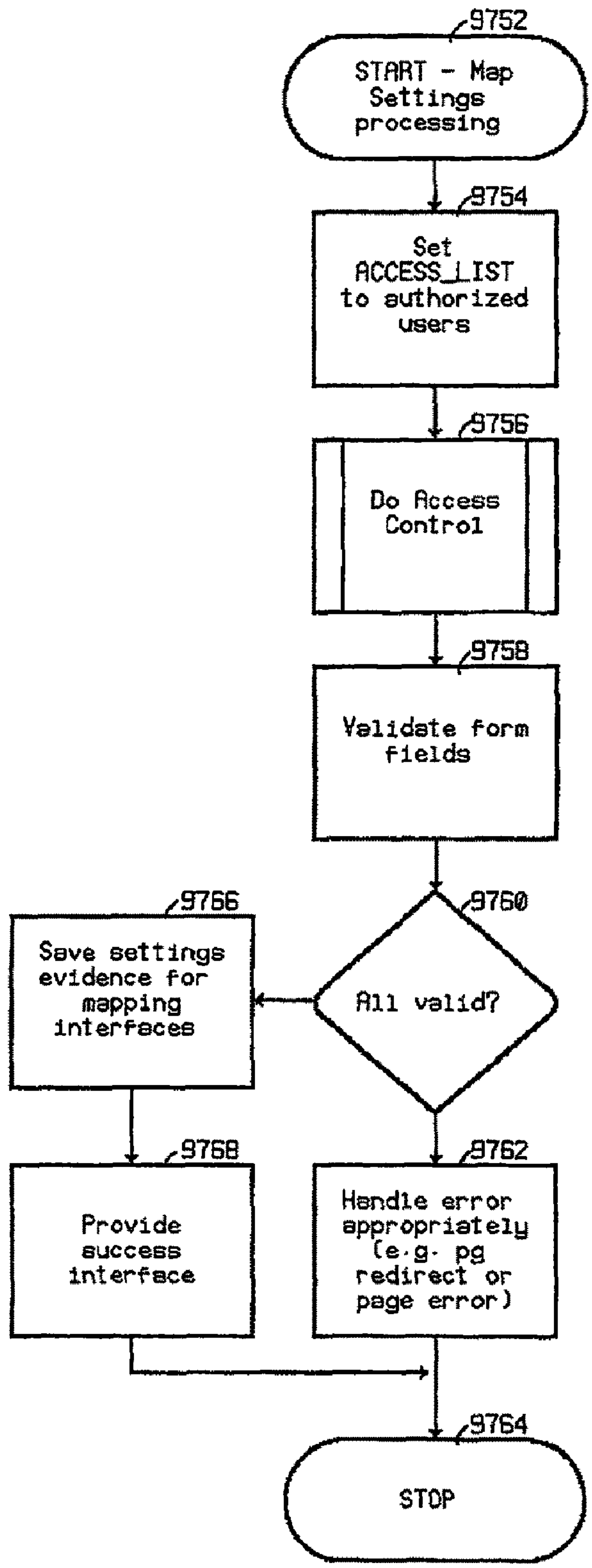
Figure 98A:
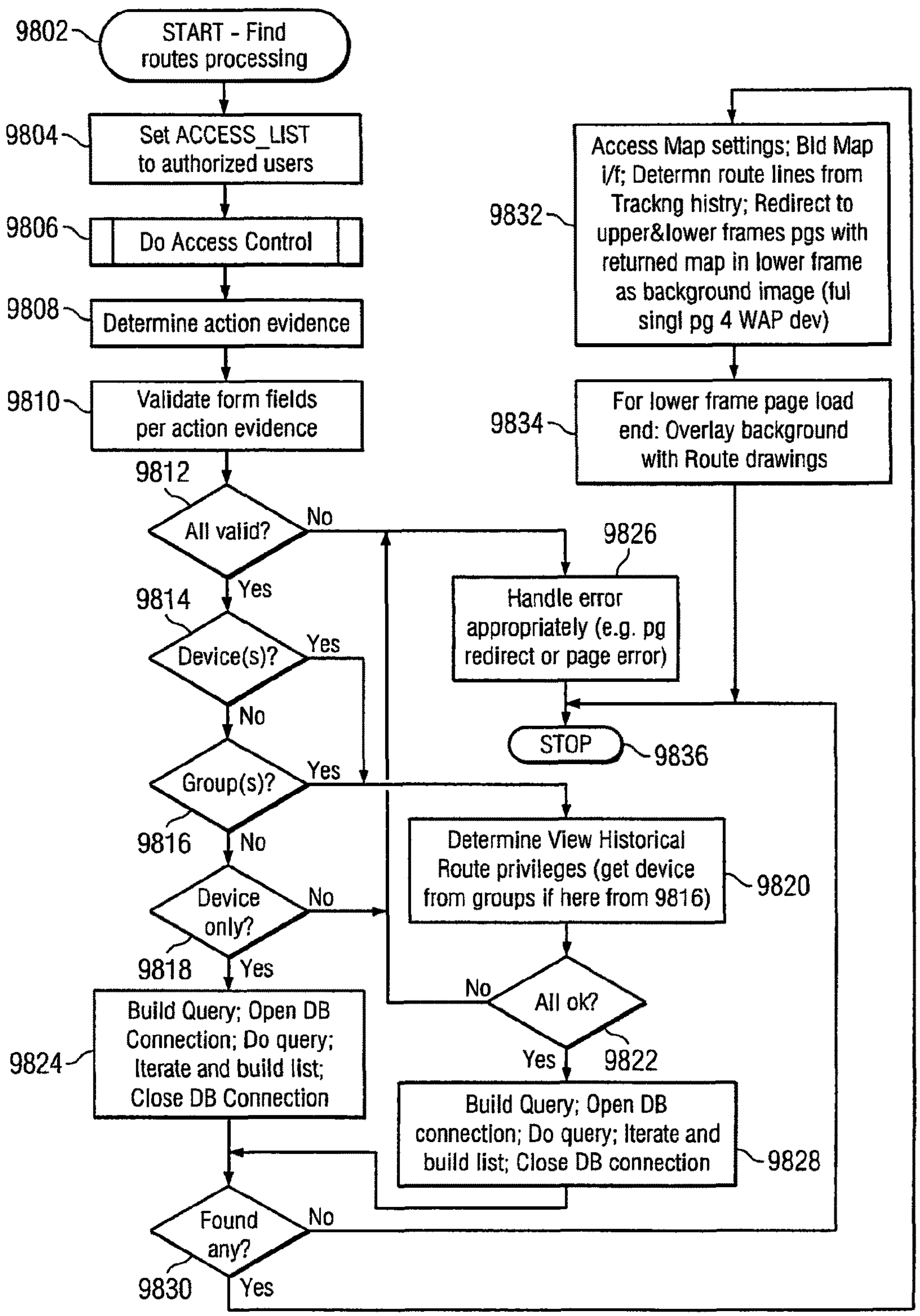
Figure 98B:
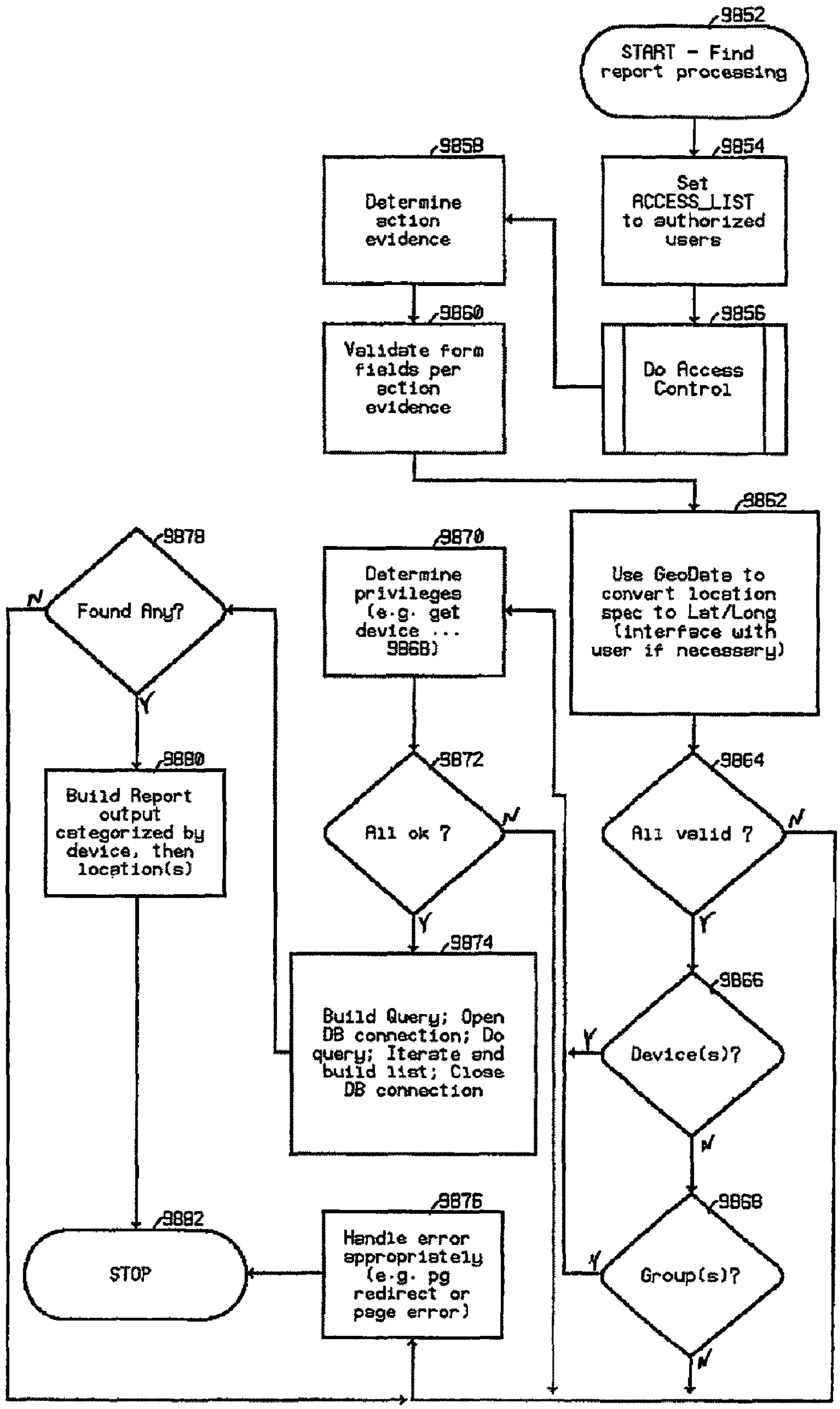
Figure 98C:
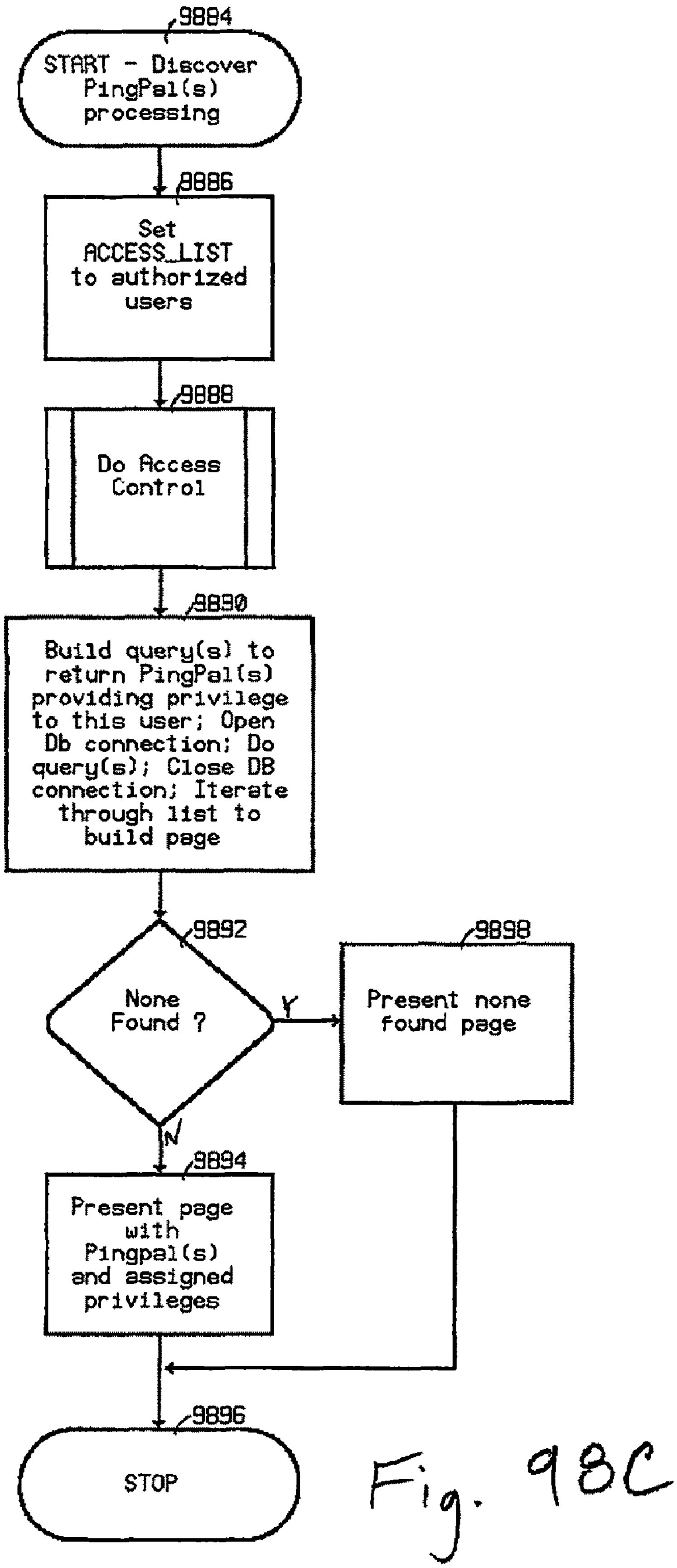
Figure 99:
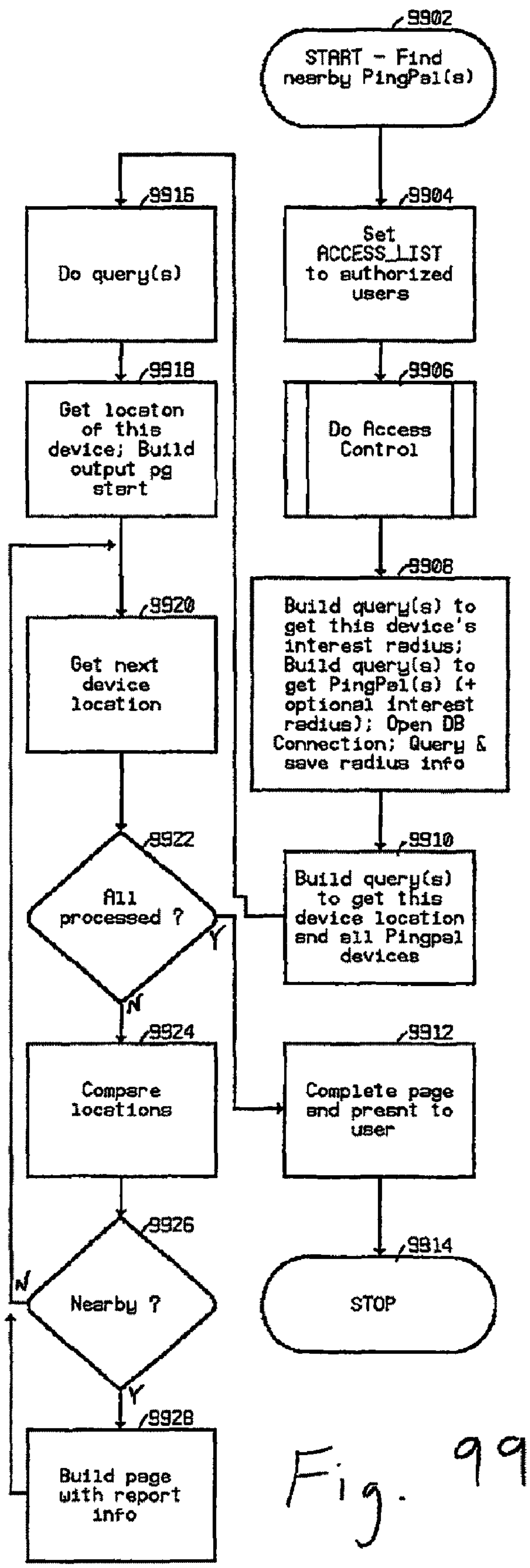
Figure 100A:
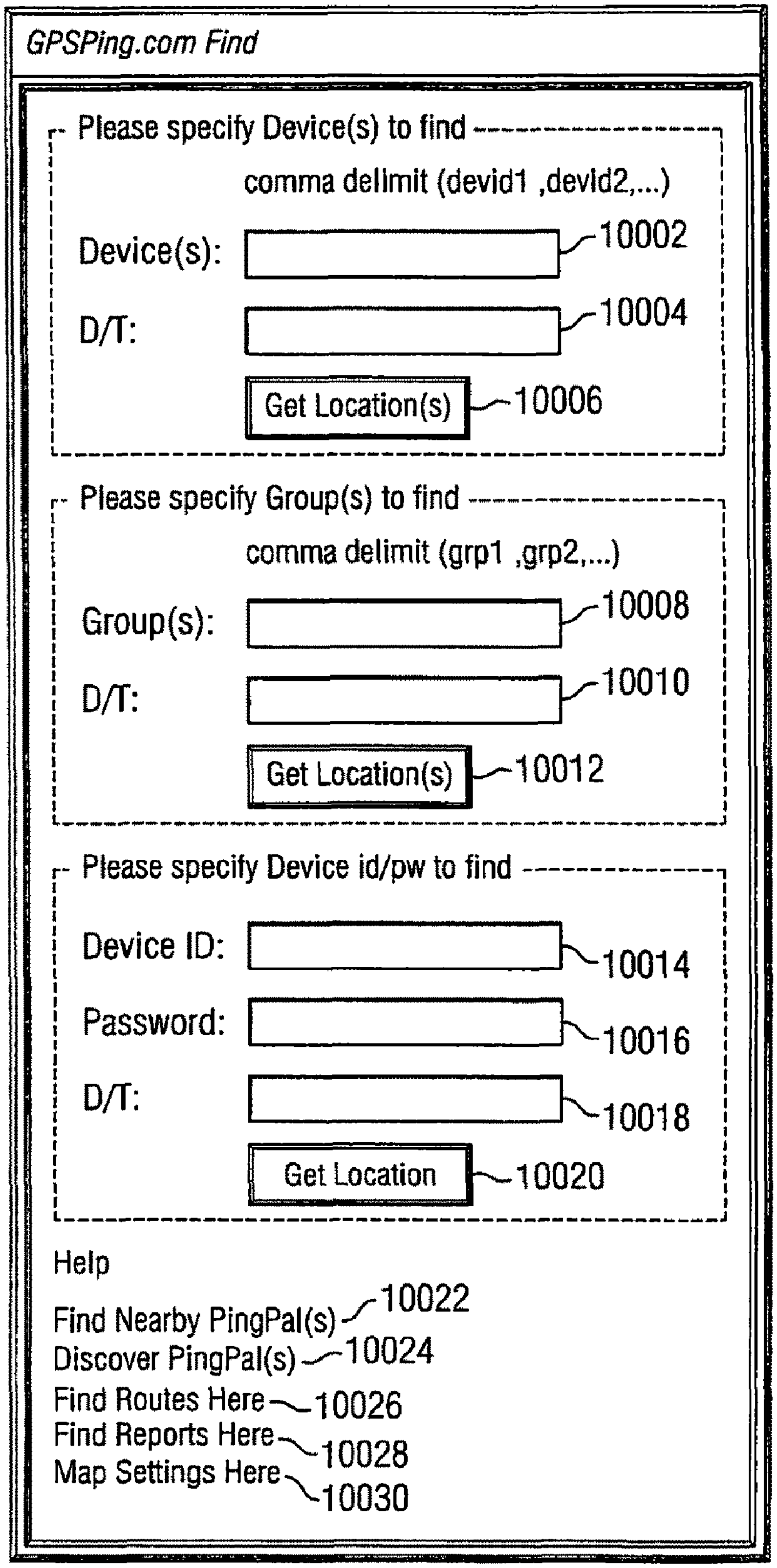
Figure 100B:
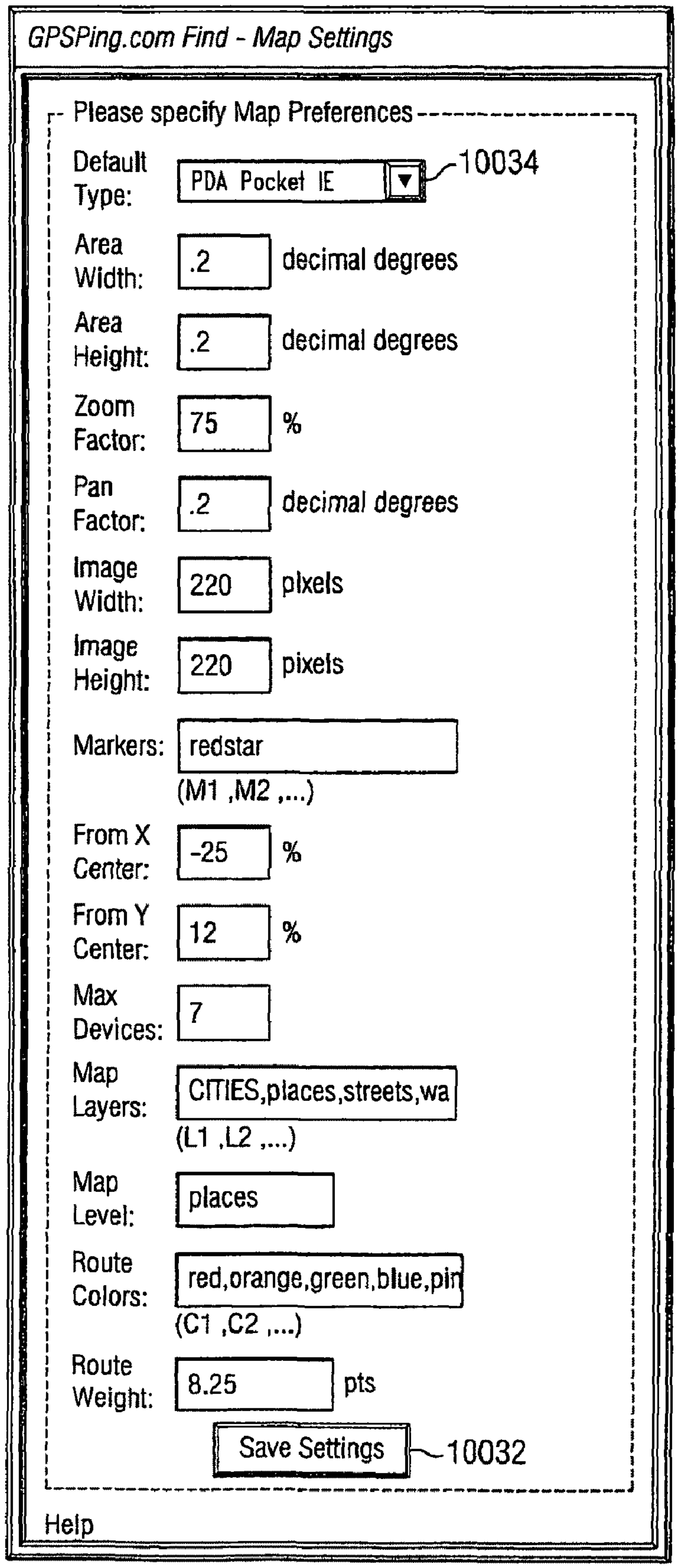
Figure 100C:
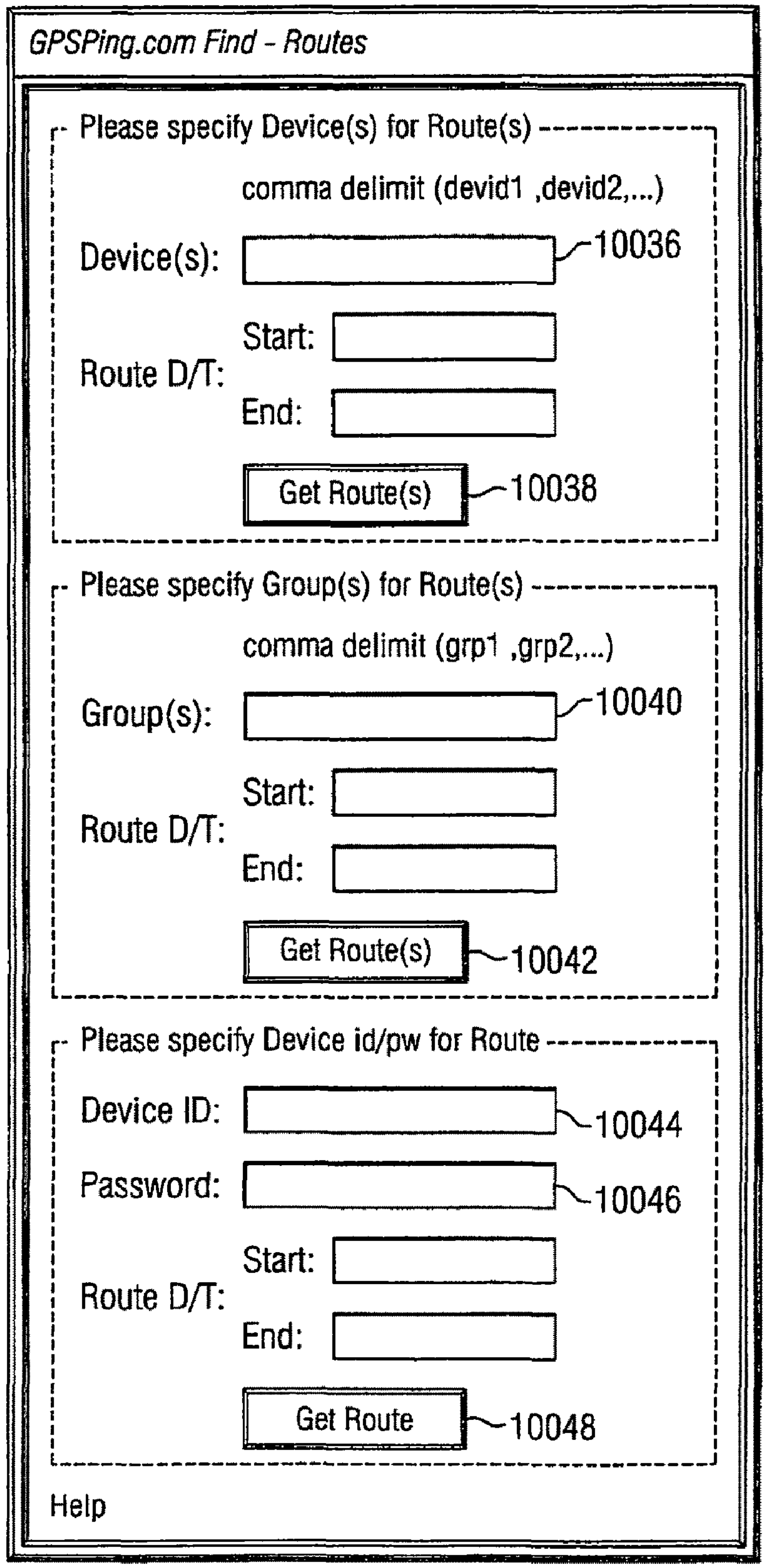
Figure 100D:
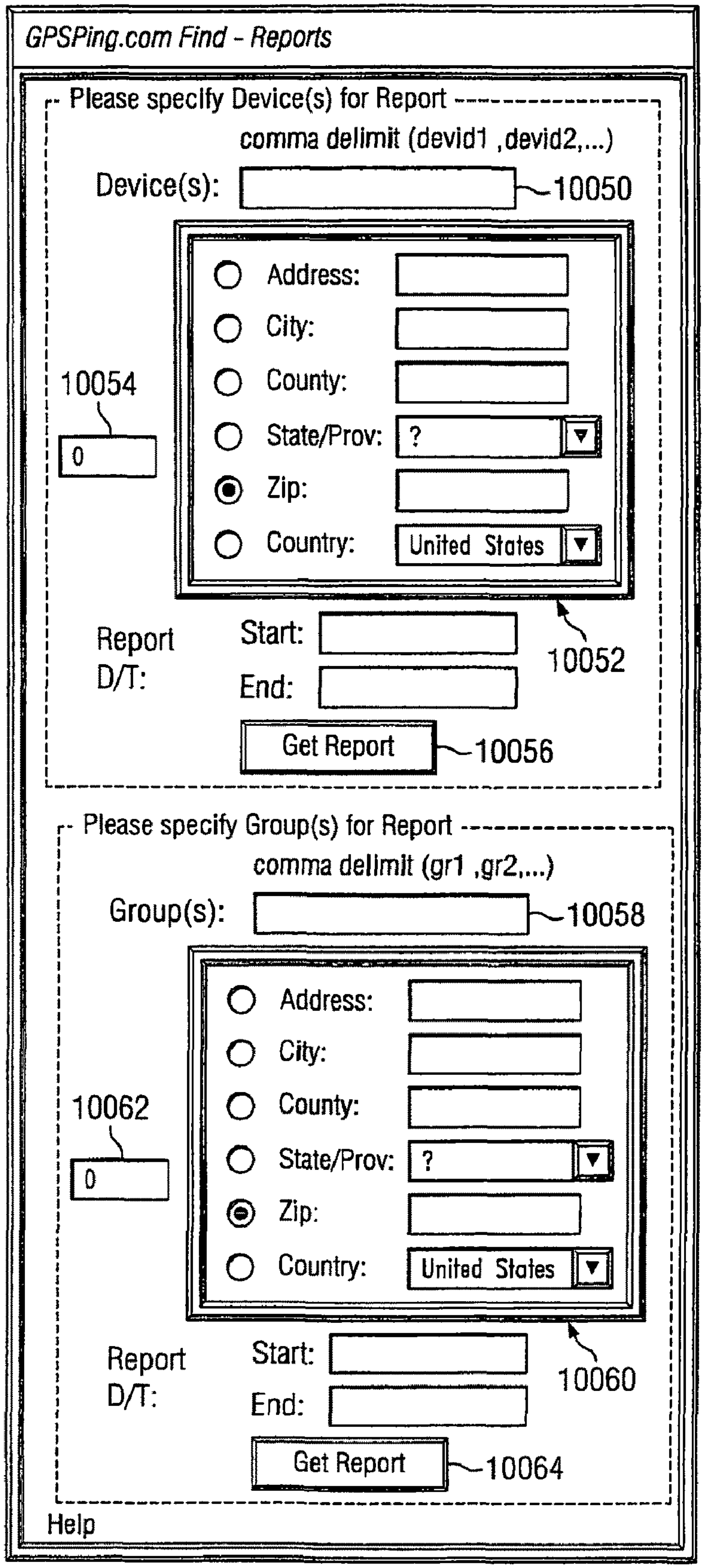
Figure 100E:
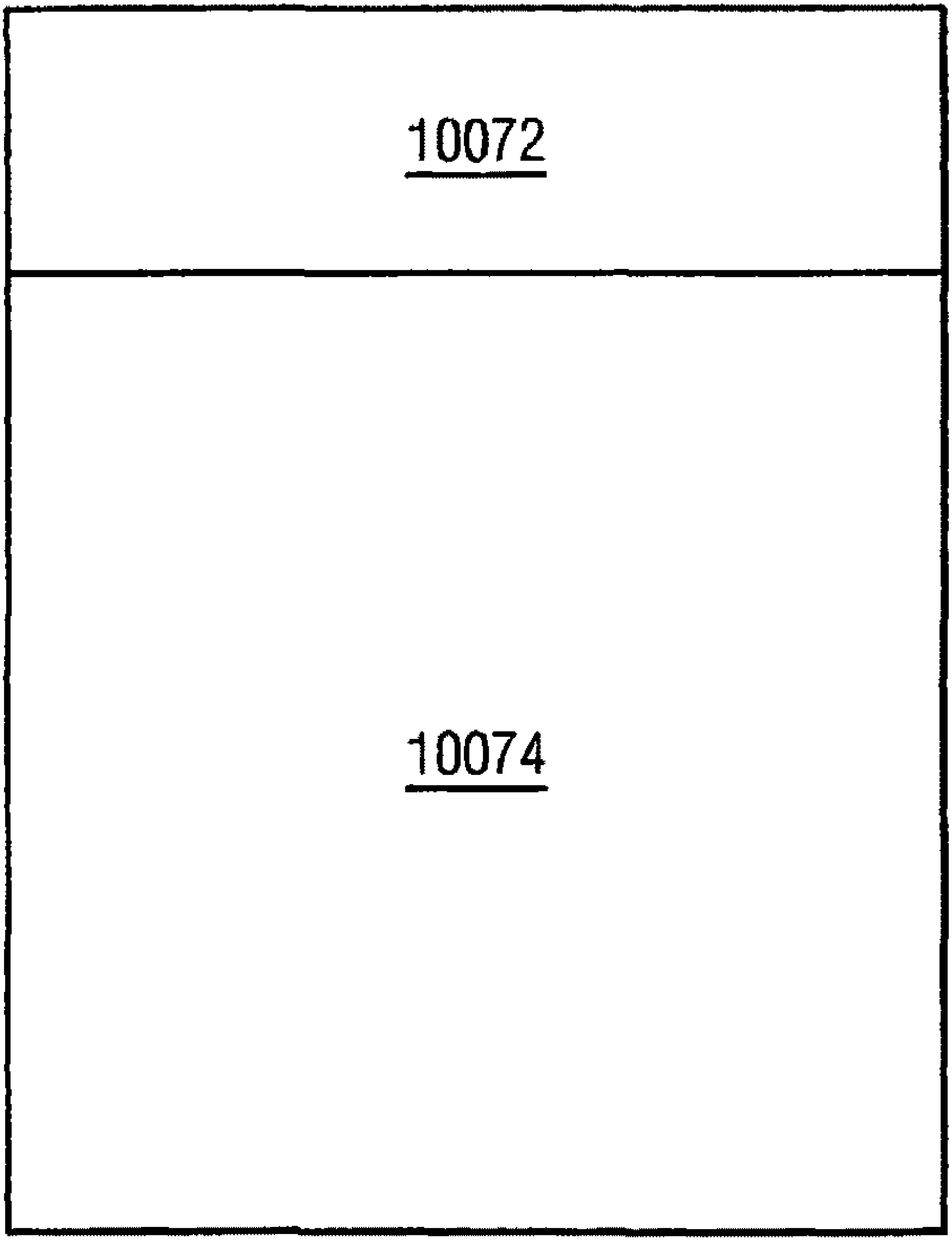
Figure 100F:
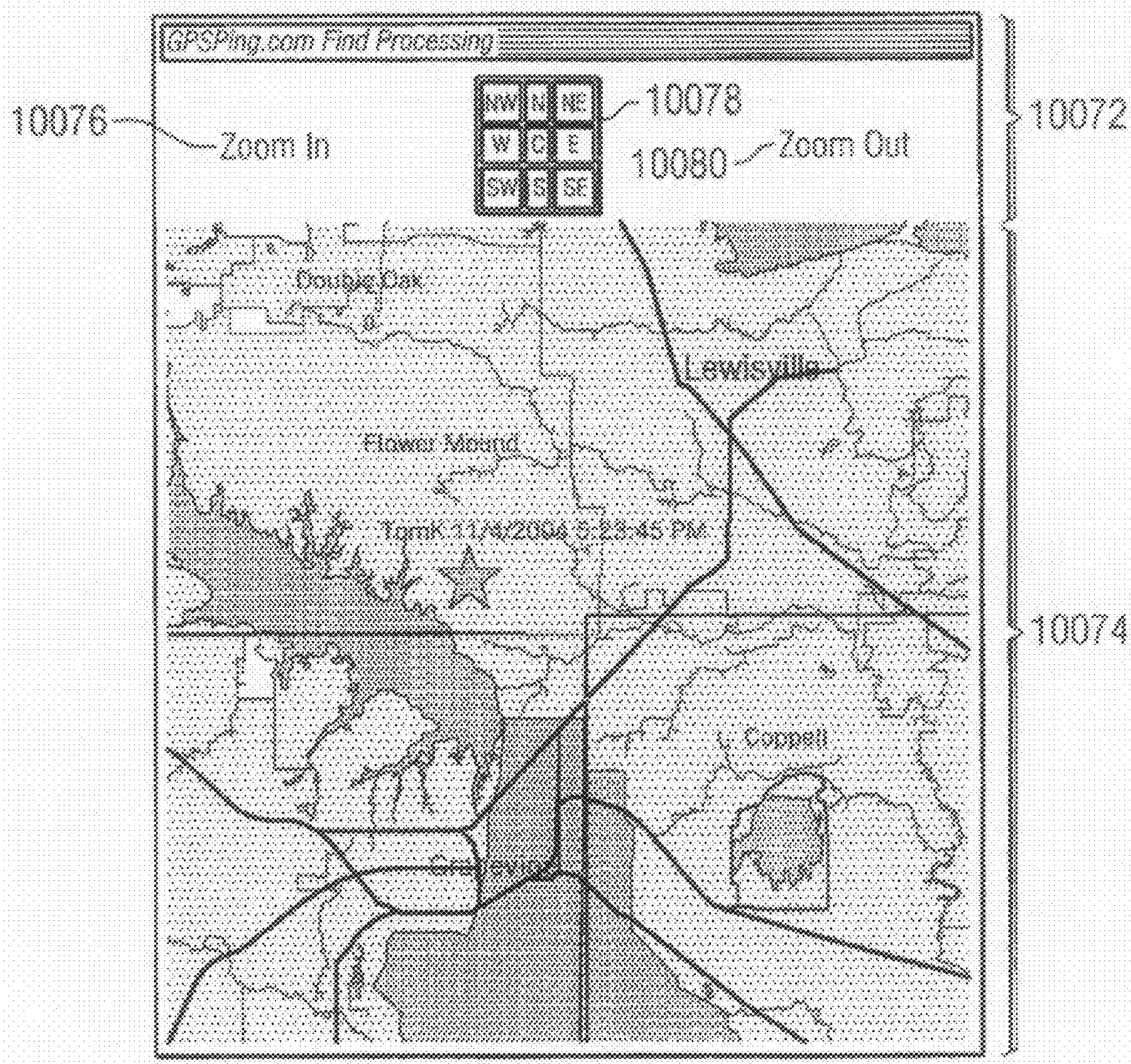
Figure 100G:
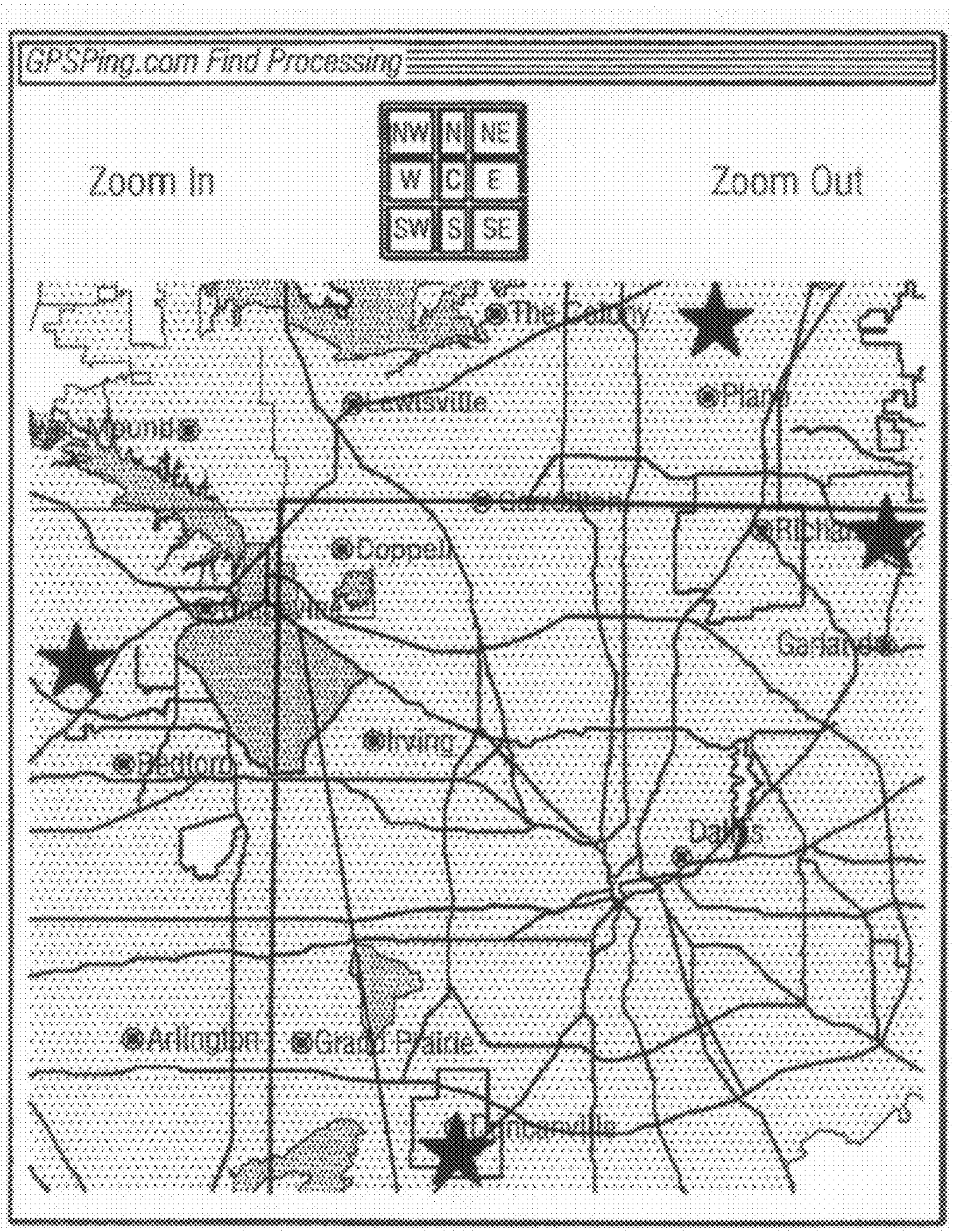
Figure 100H:
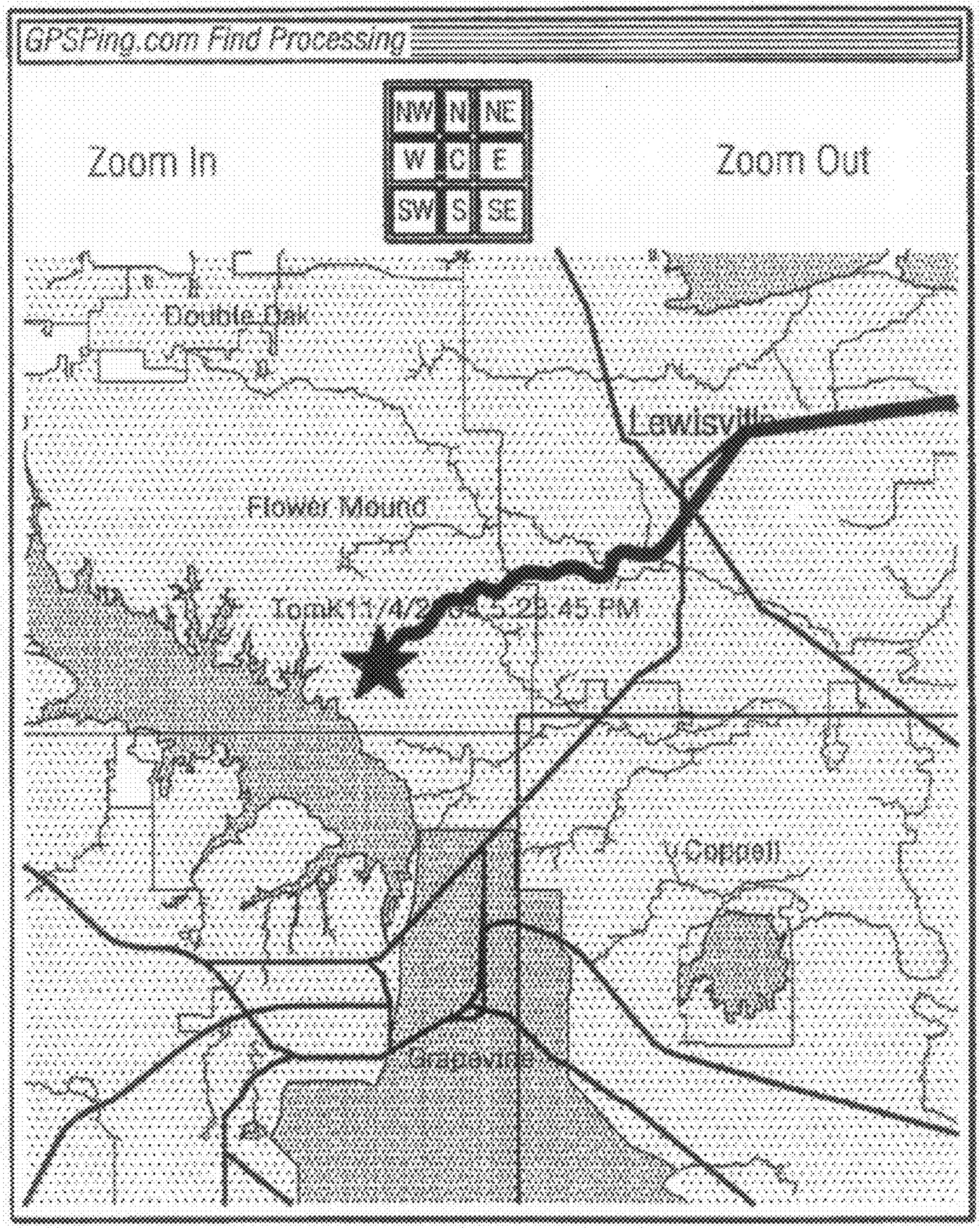
Figure 100I:
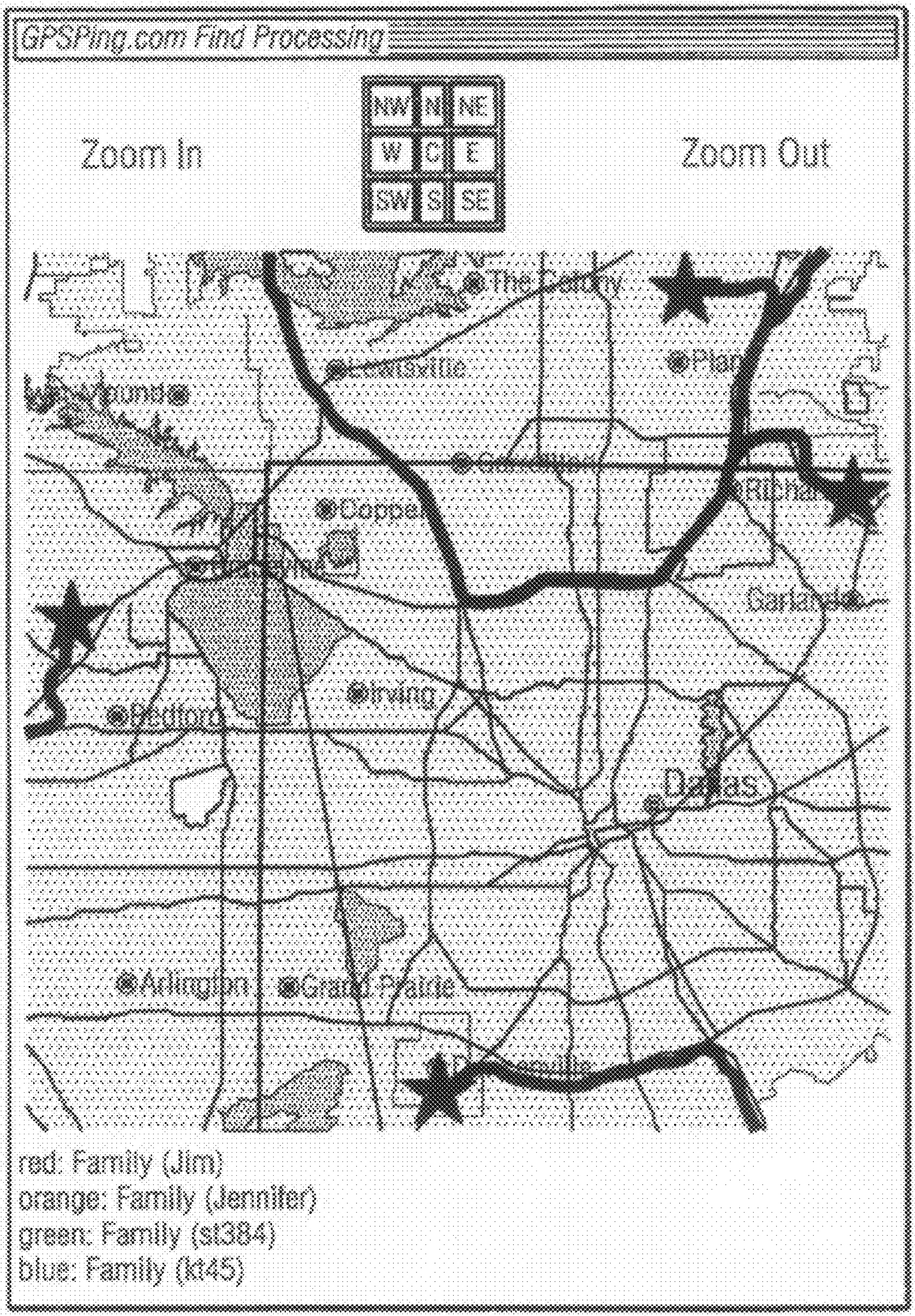
Figure 101:
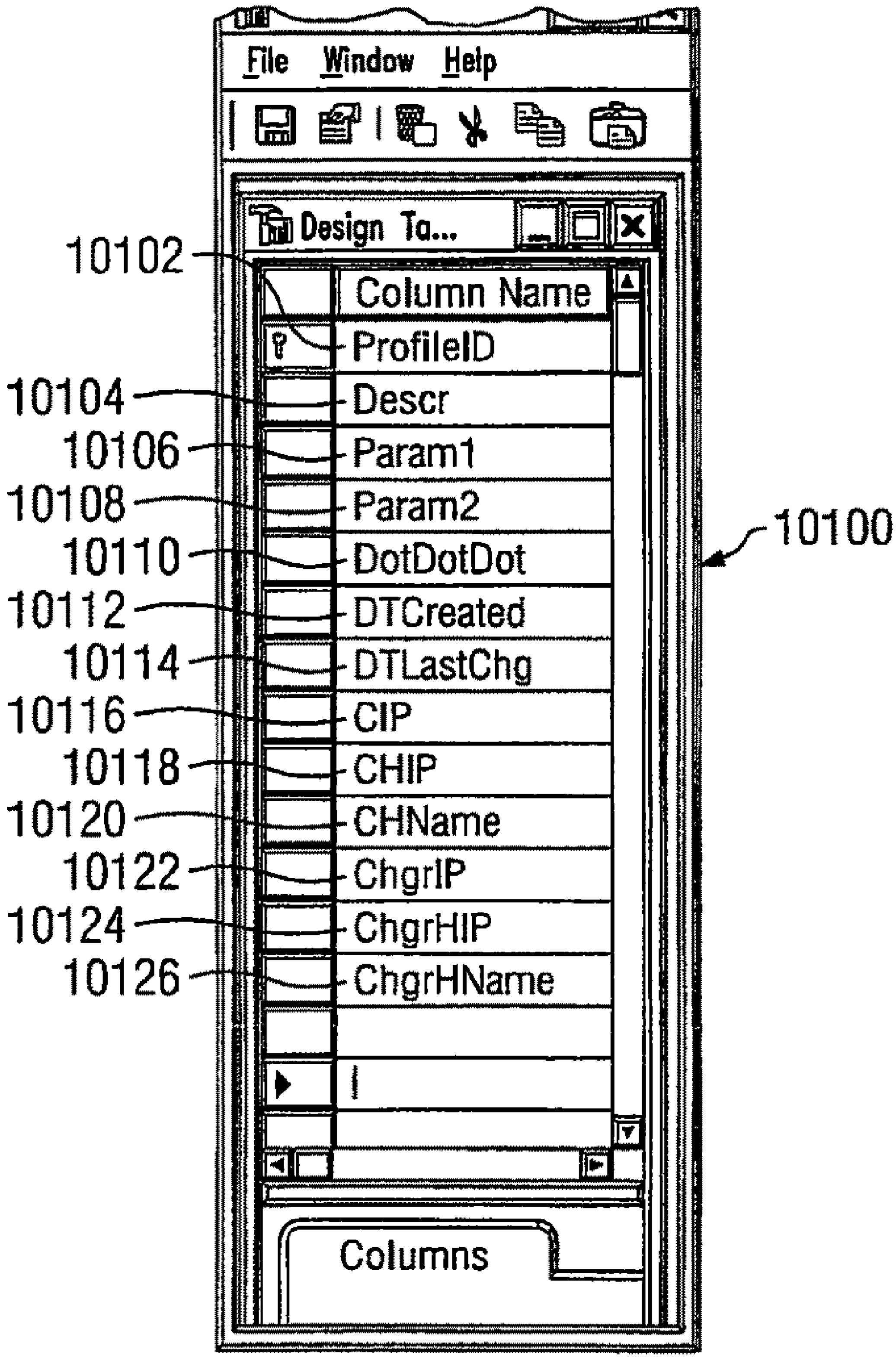
Figure 102:
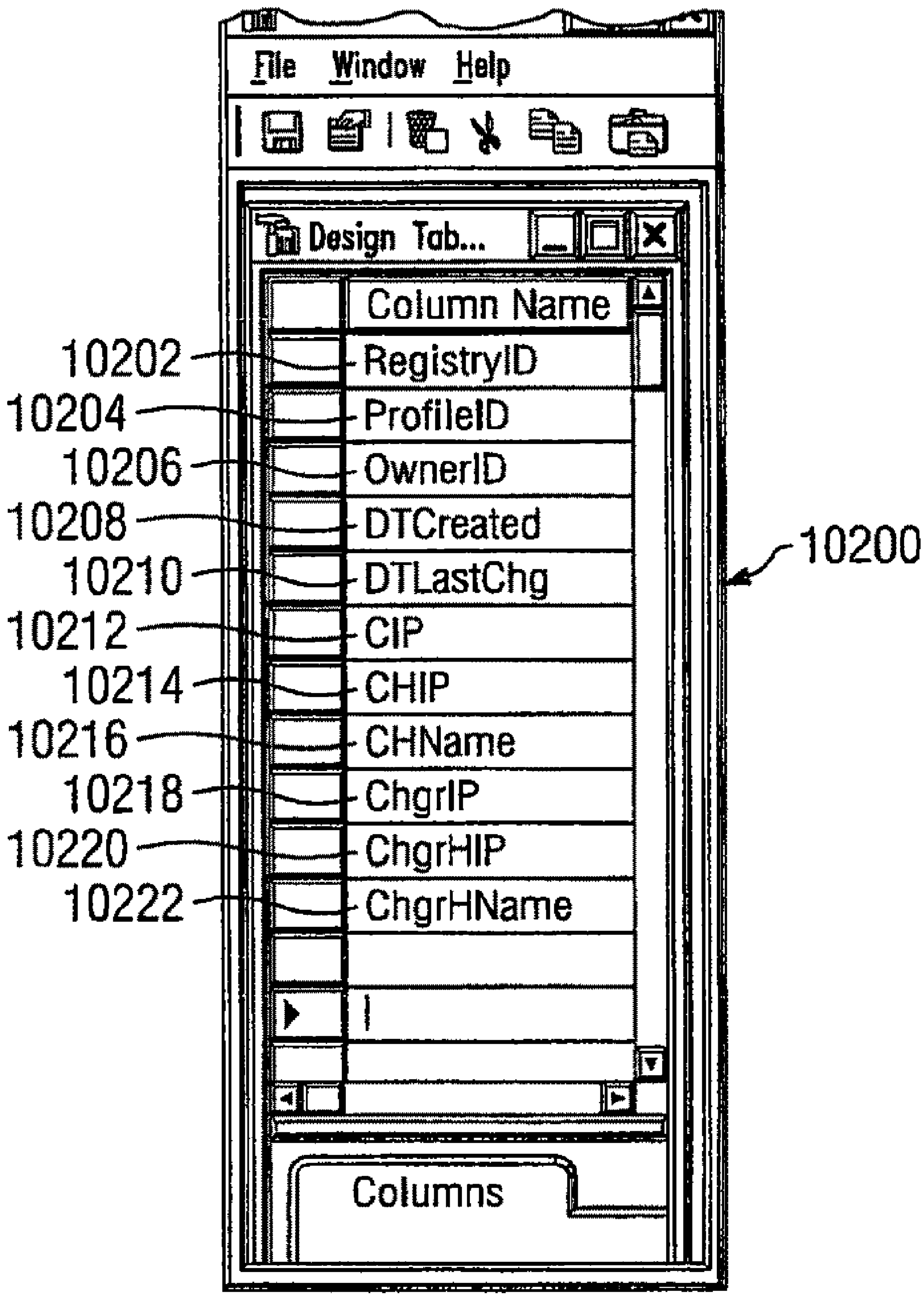
Figure 103:
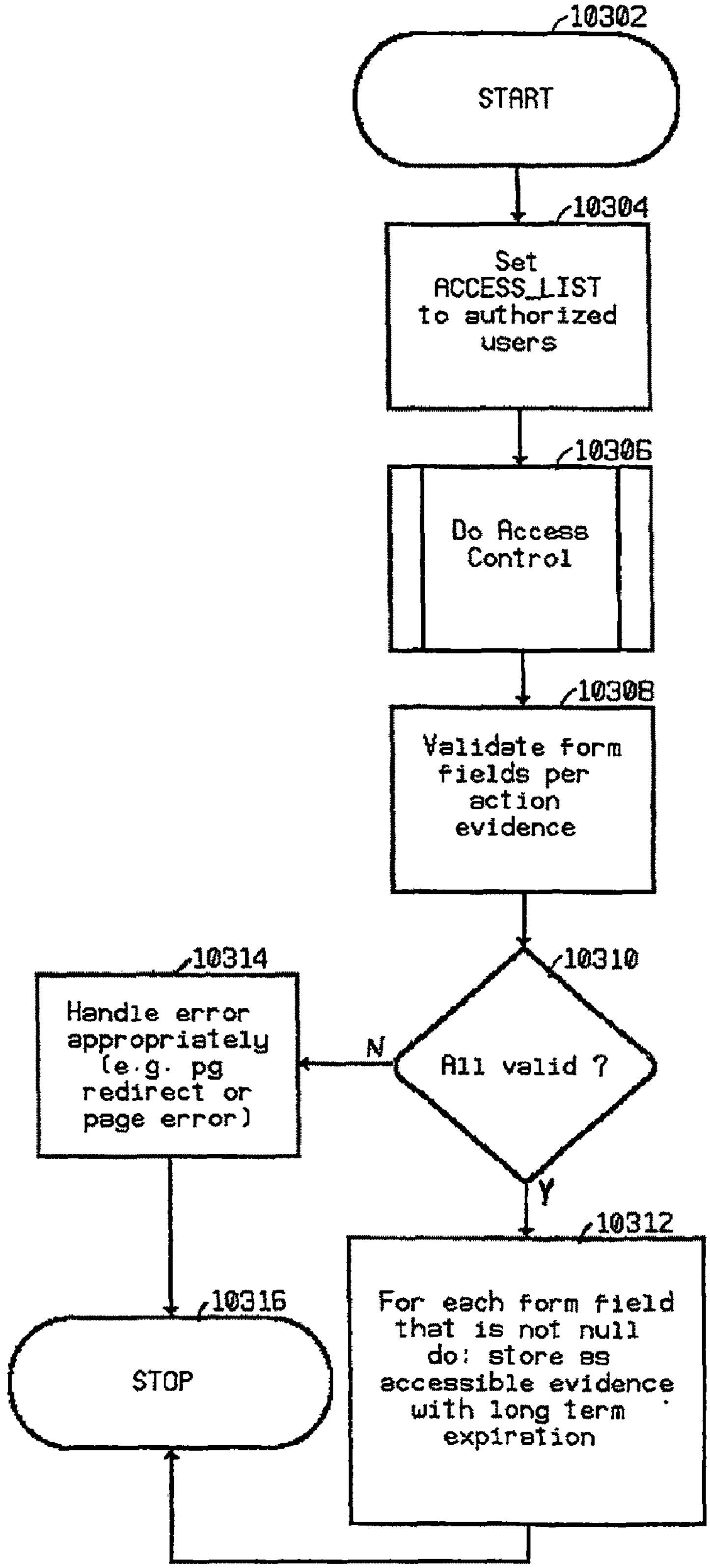
Figure 104A:
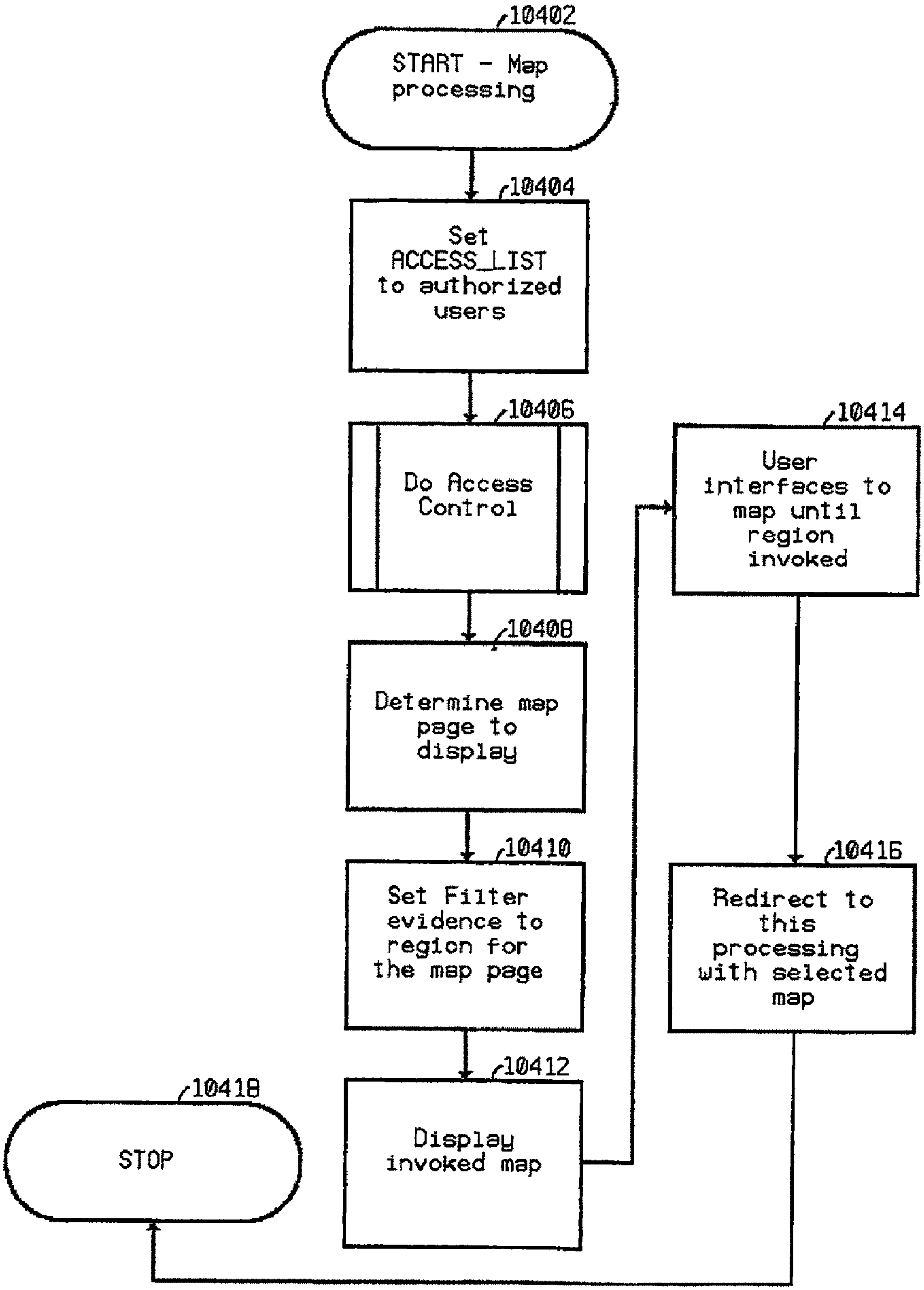
Figure 104B:
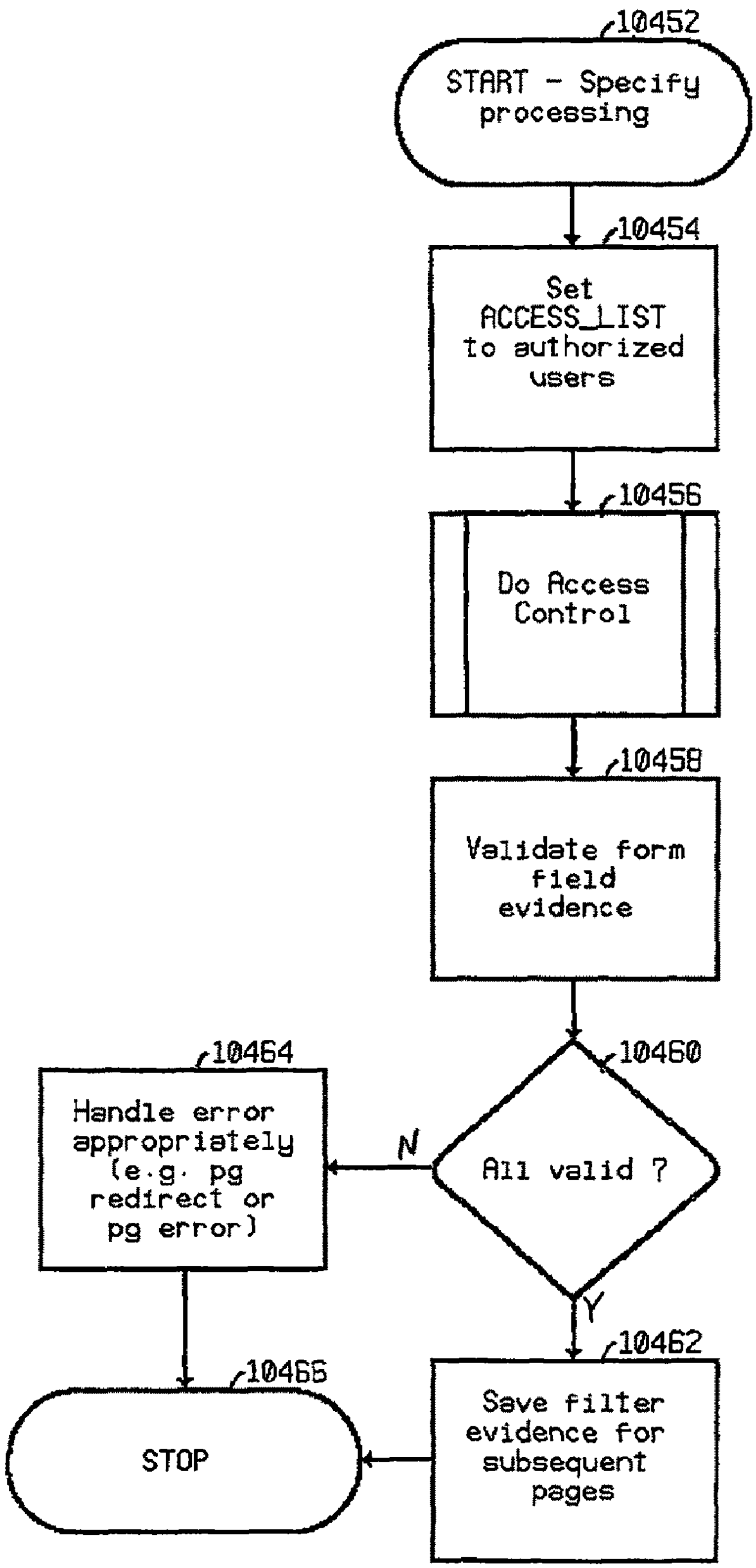
Figure 105A:
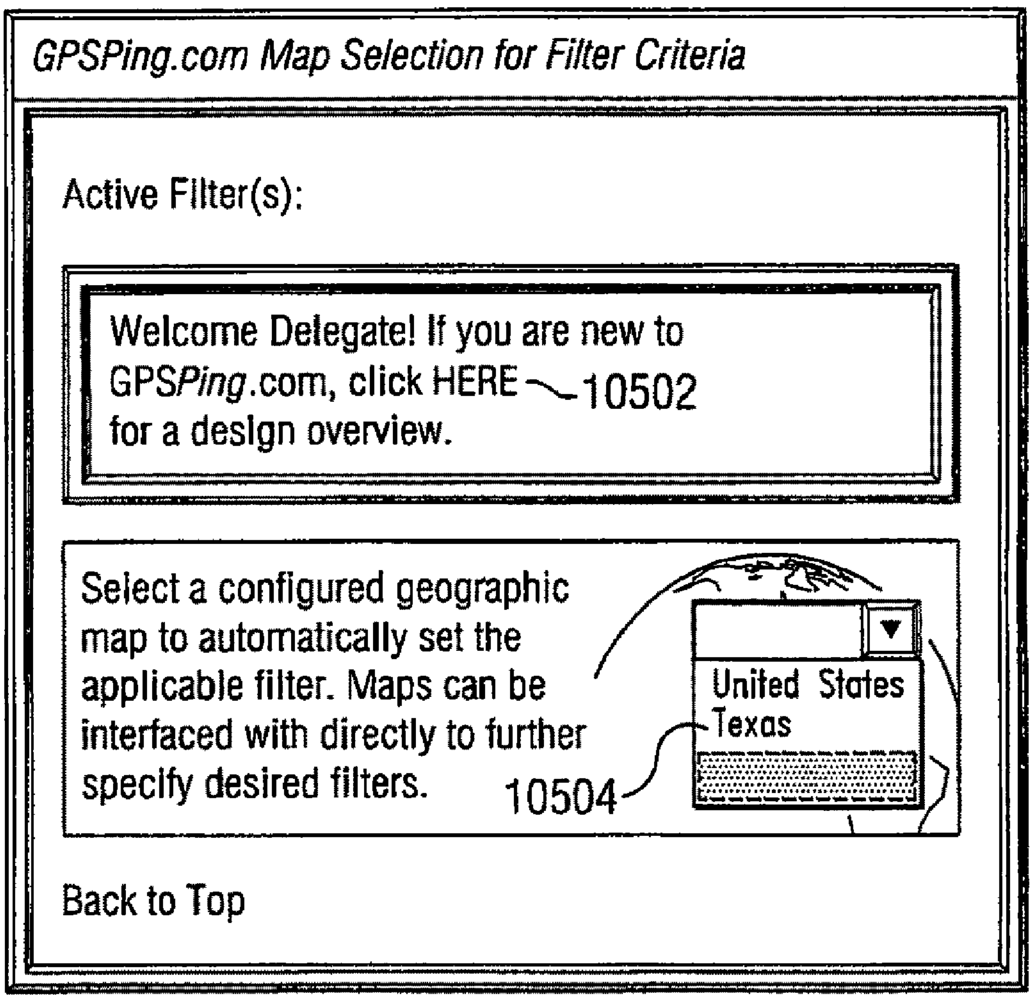
Figure 105B:
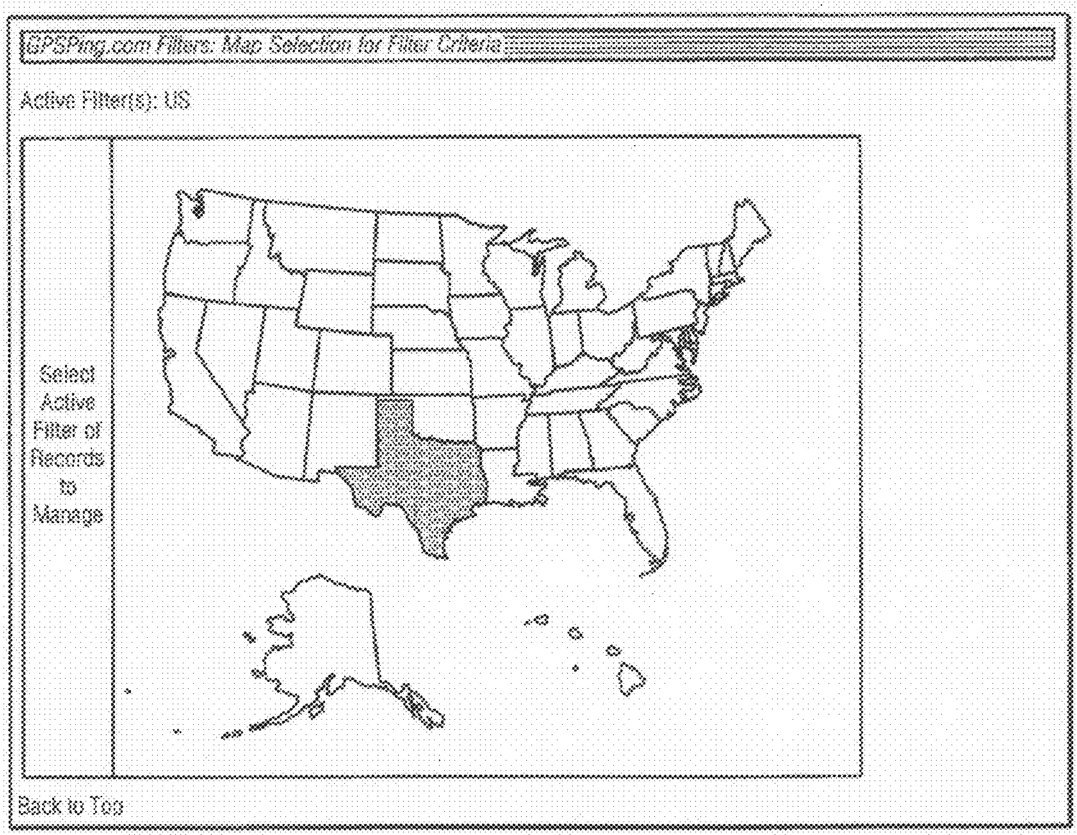
Figure 105C:
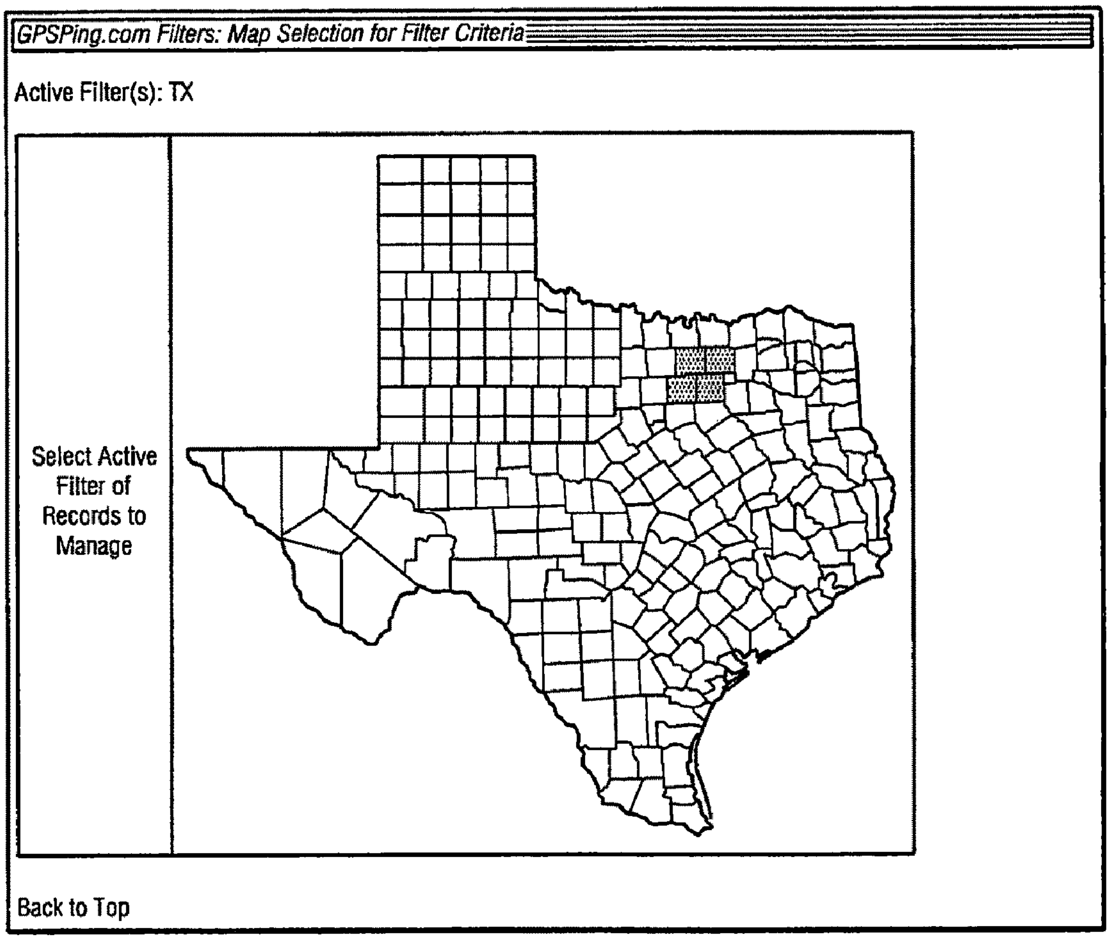
Figure 106A:
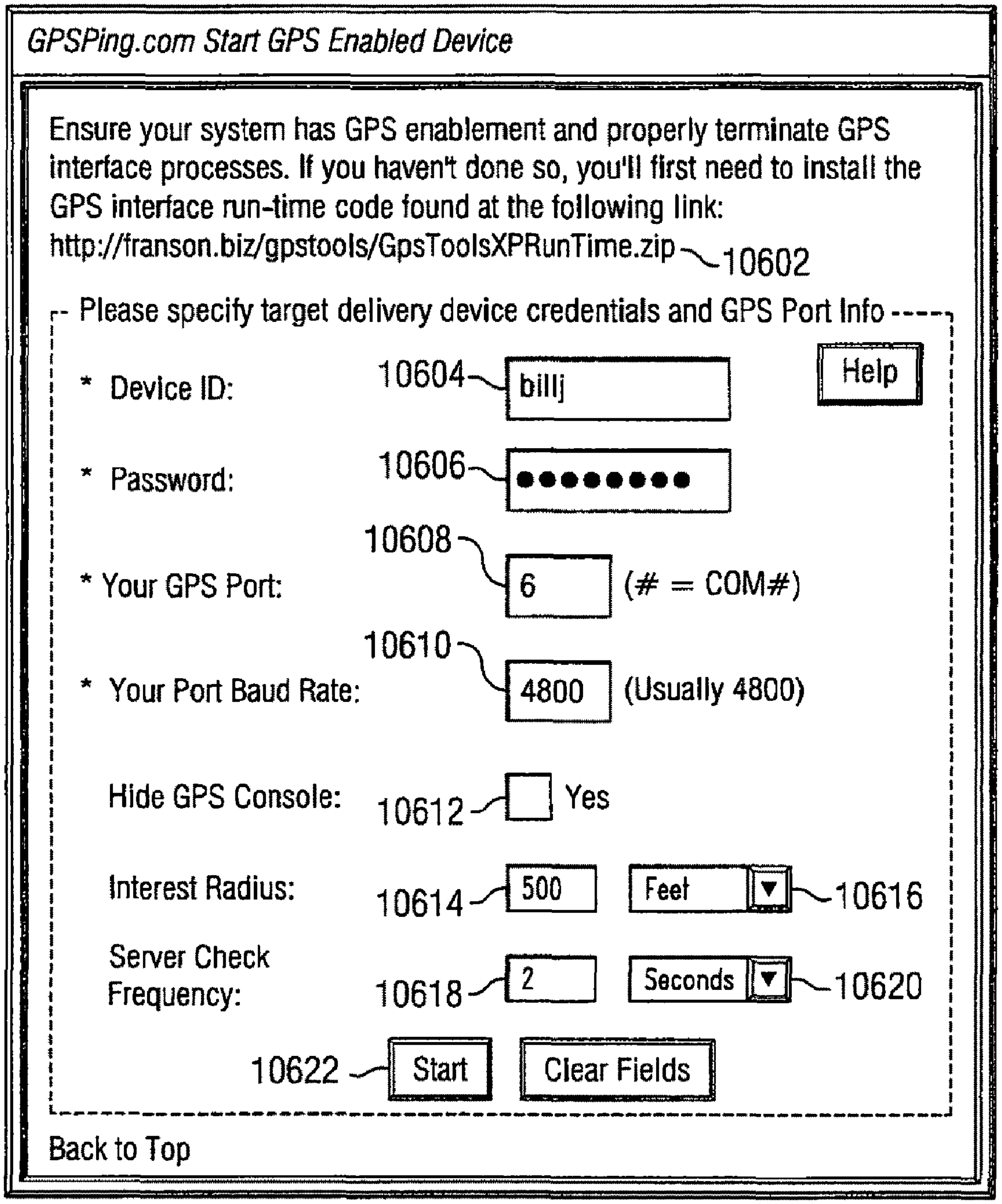
Figure 106B:
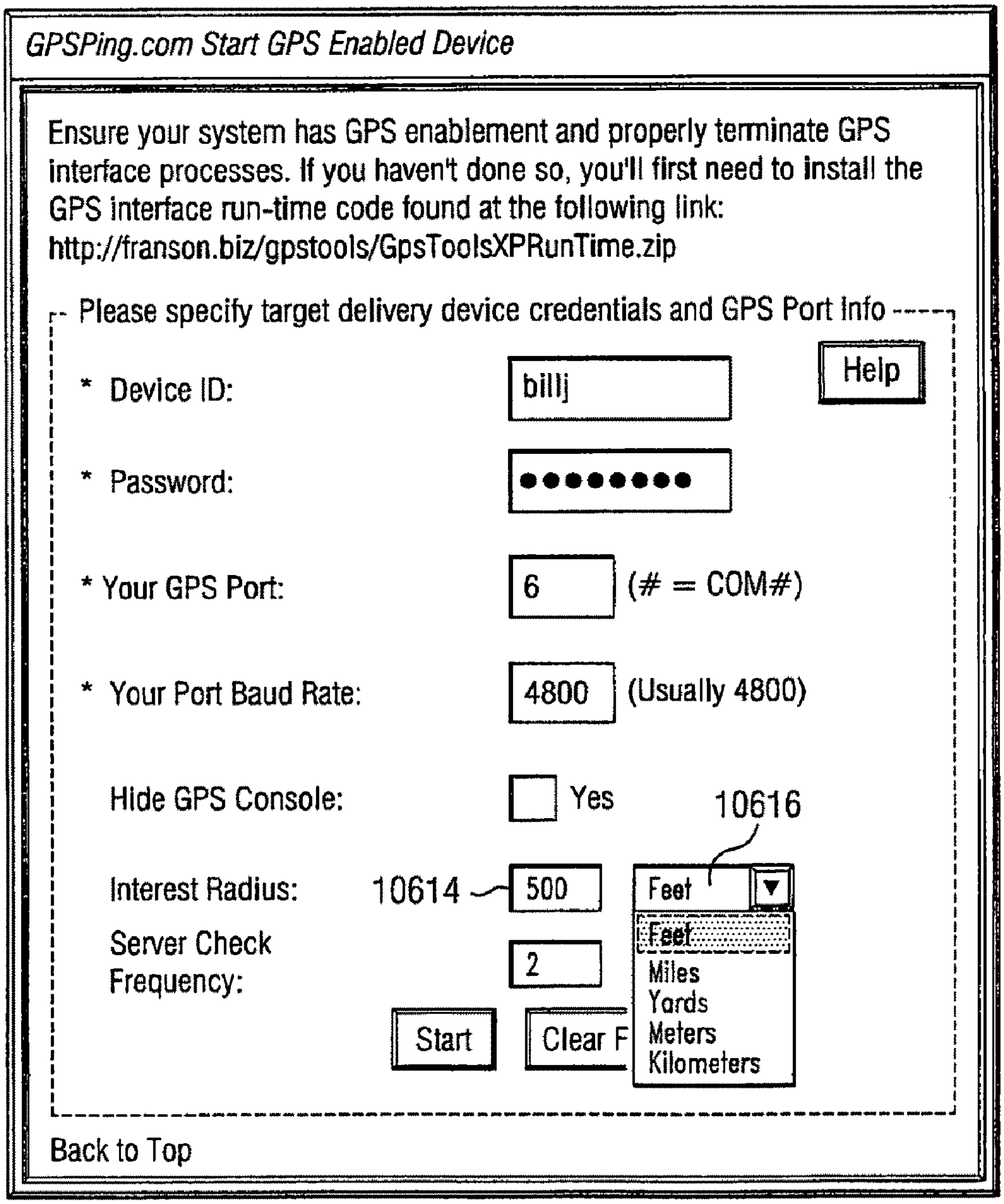
Figure 106C:
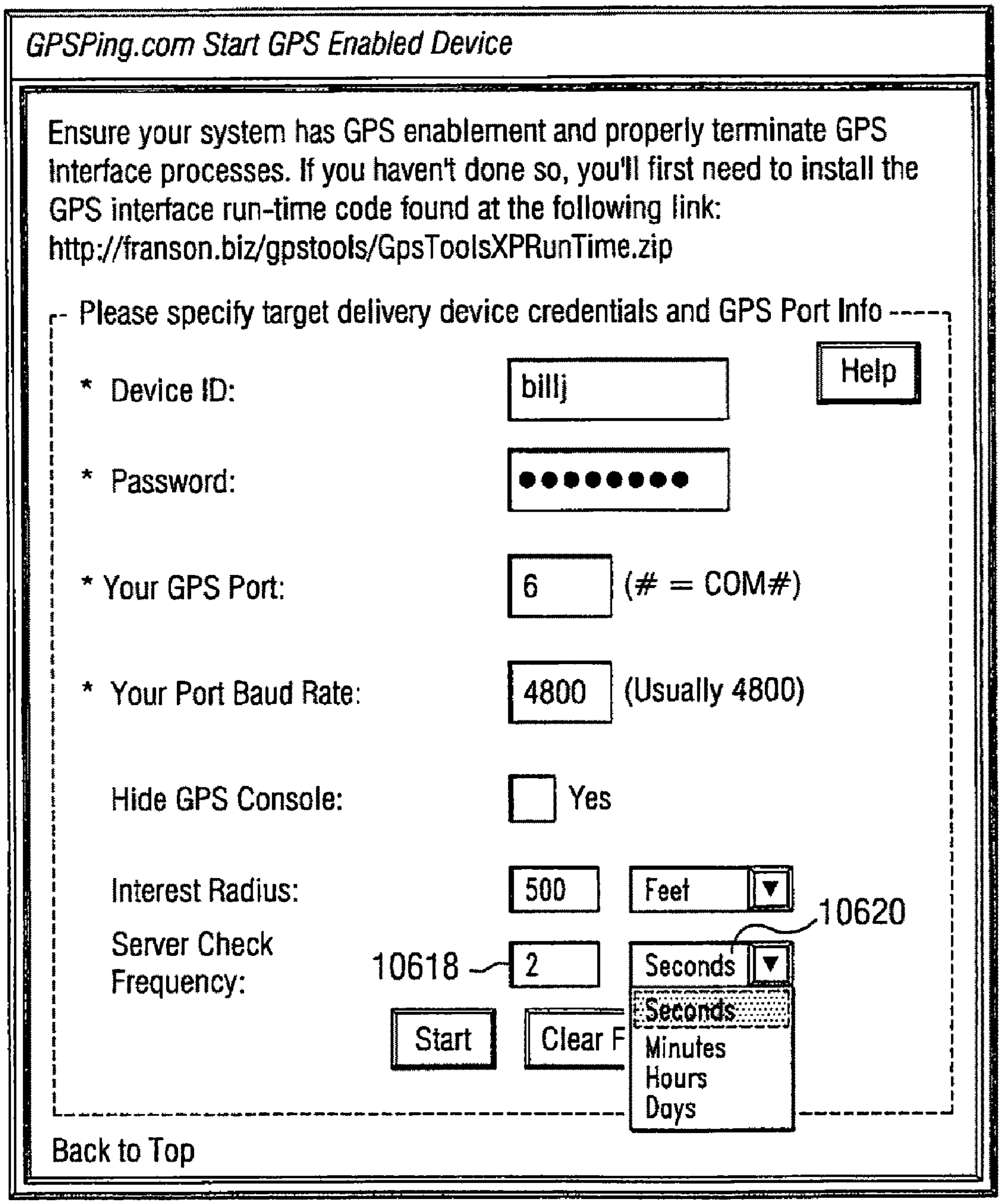
Figure 107:
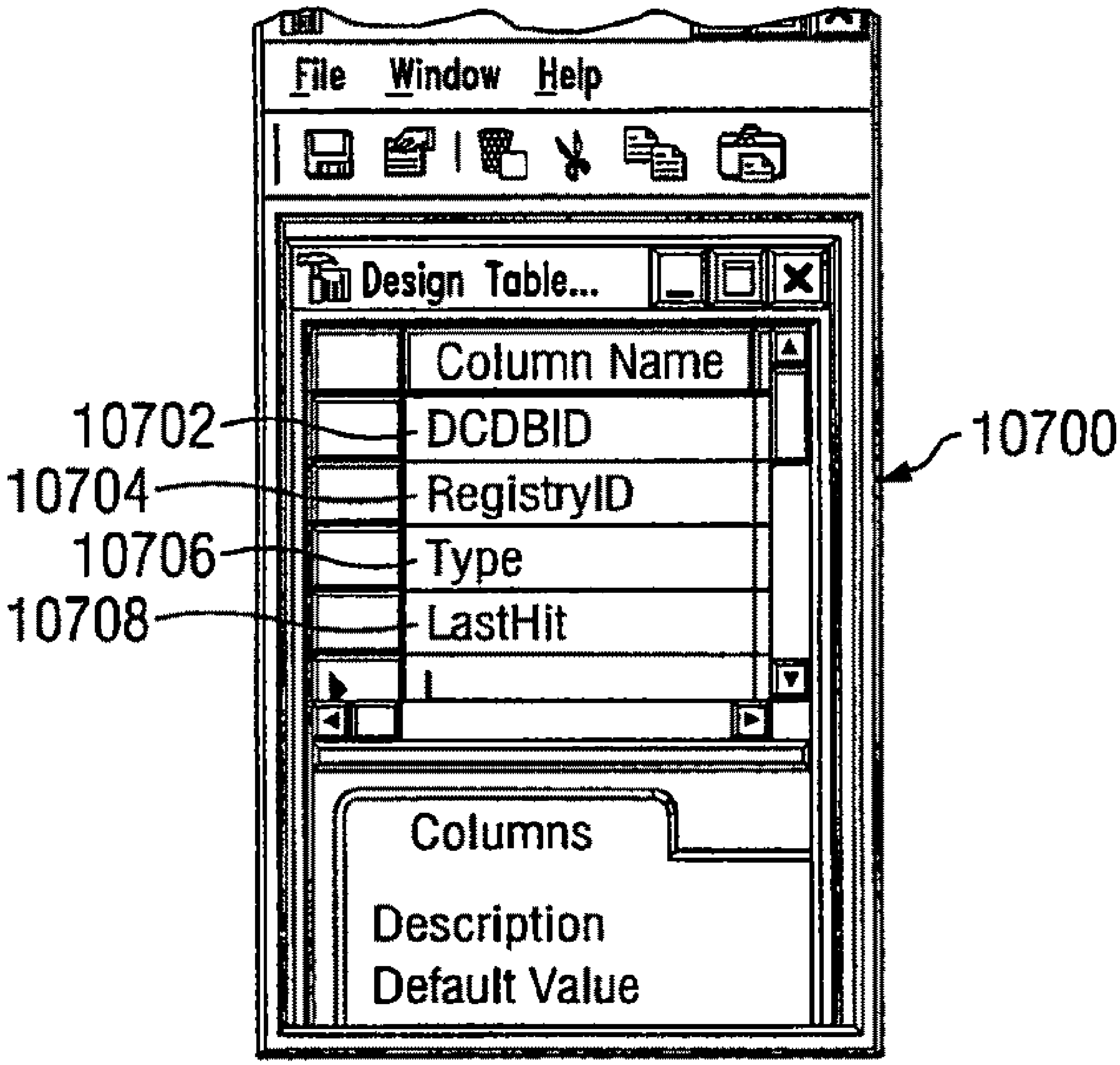
Figure 108:
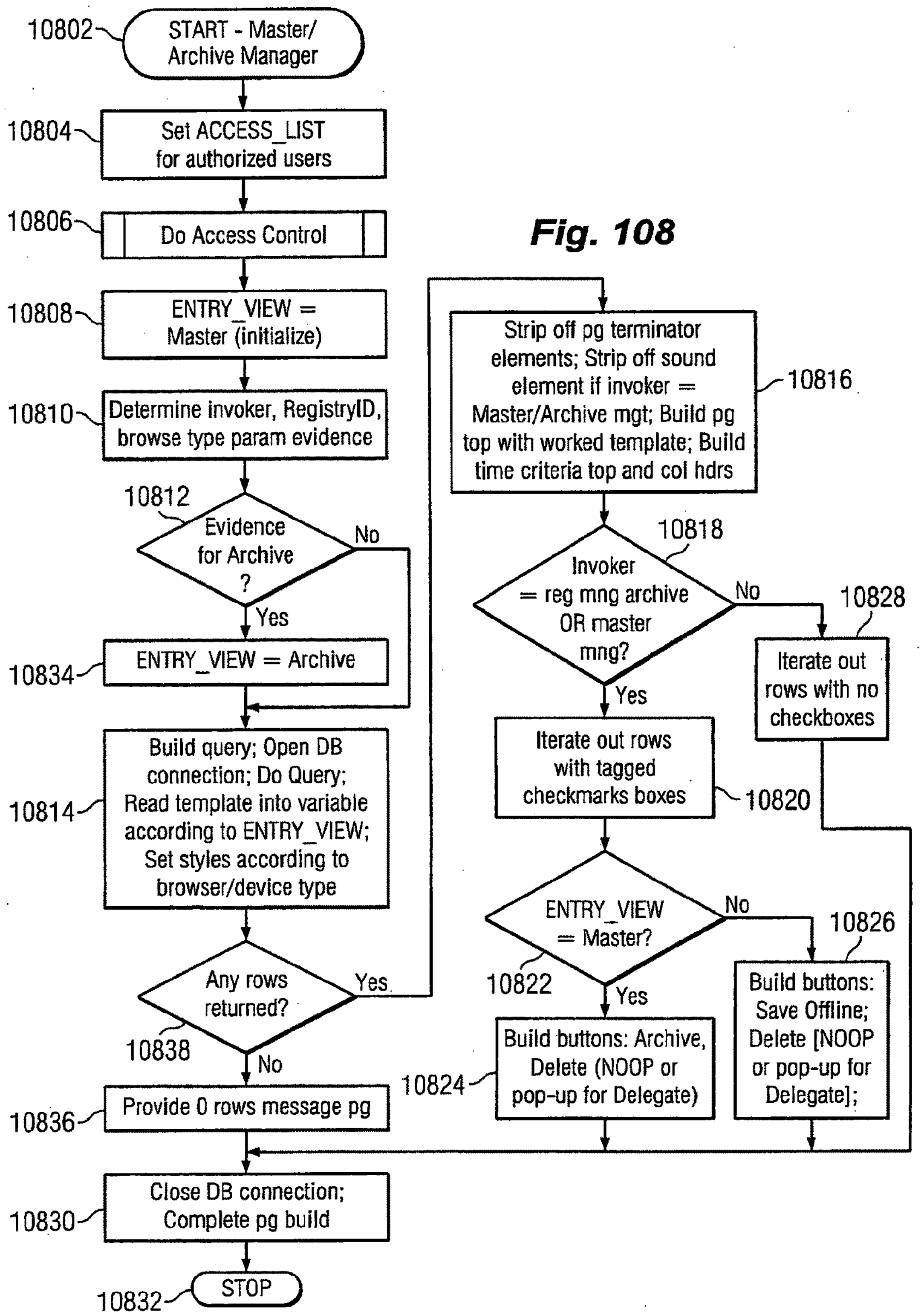
Figure 109:
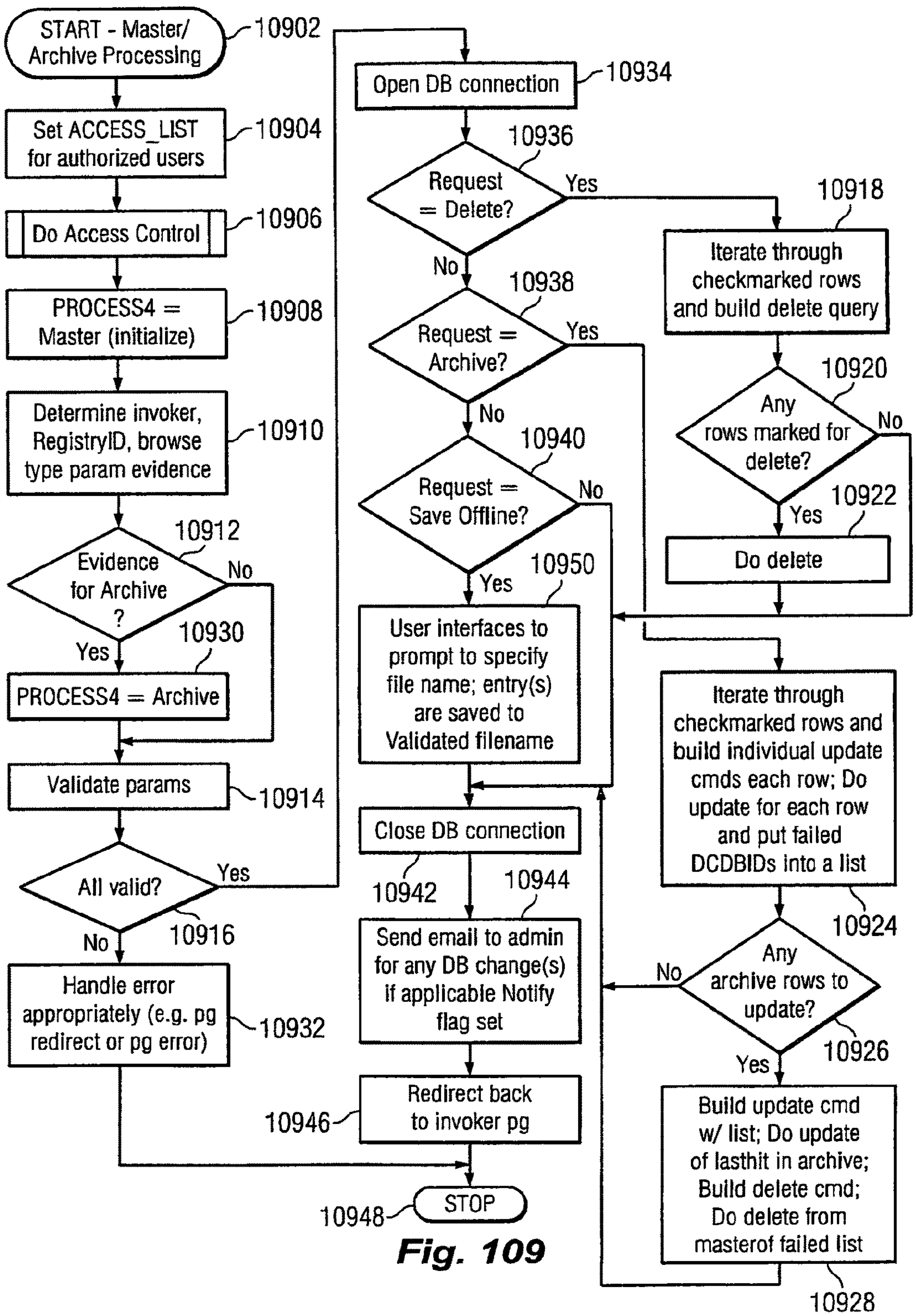
Figure 110A:
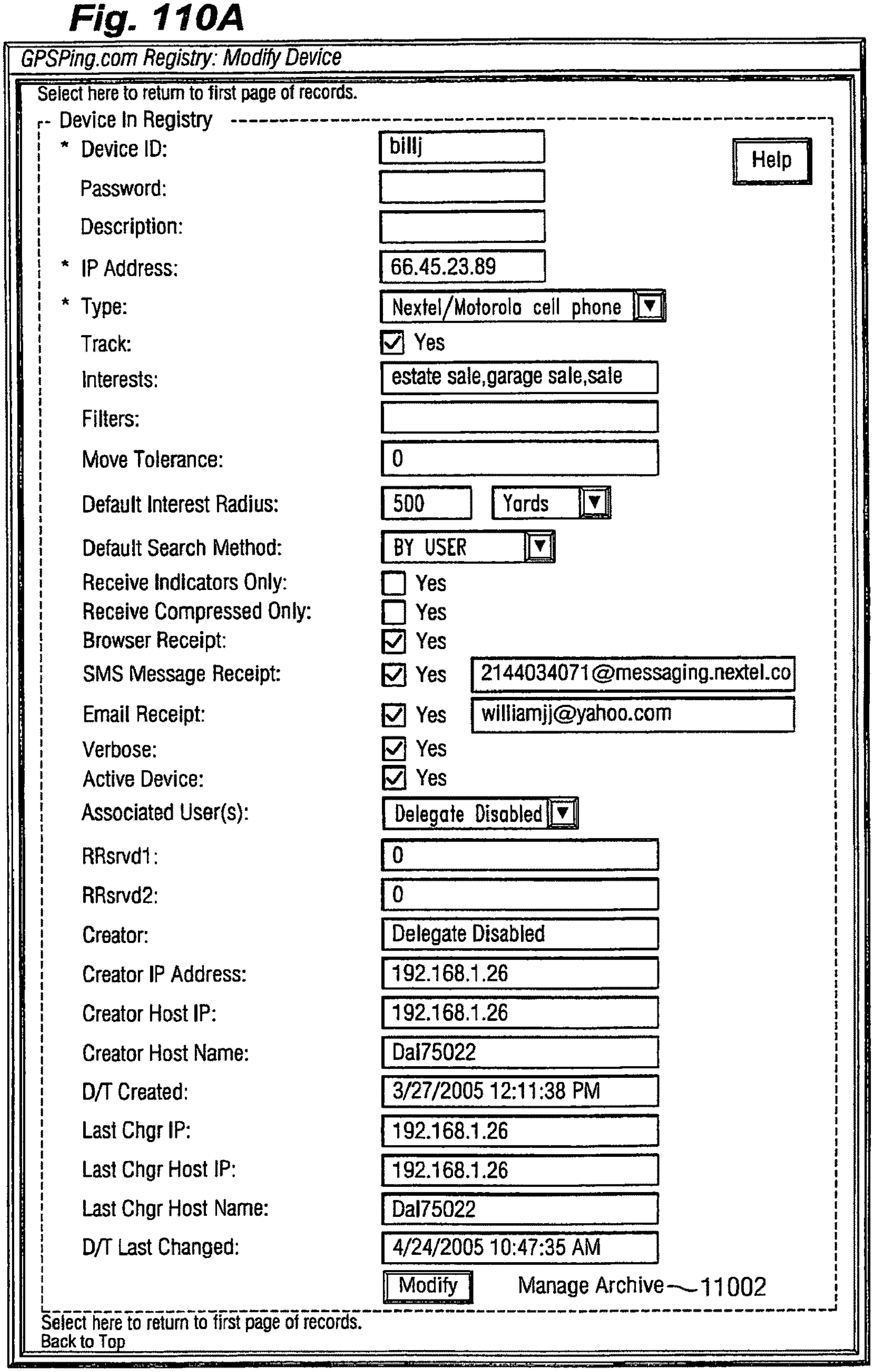
Figure 110B:
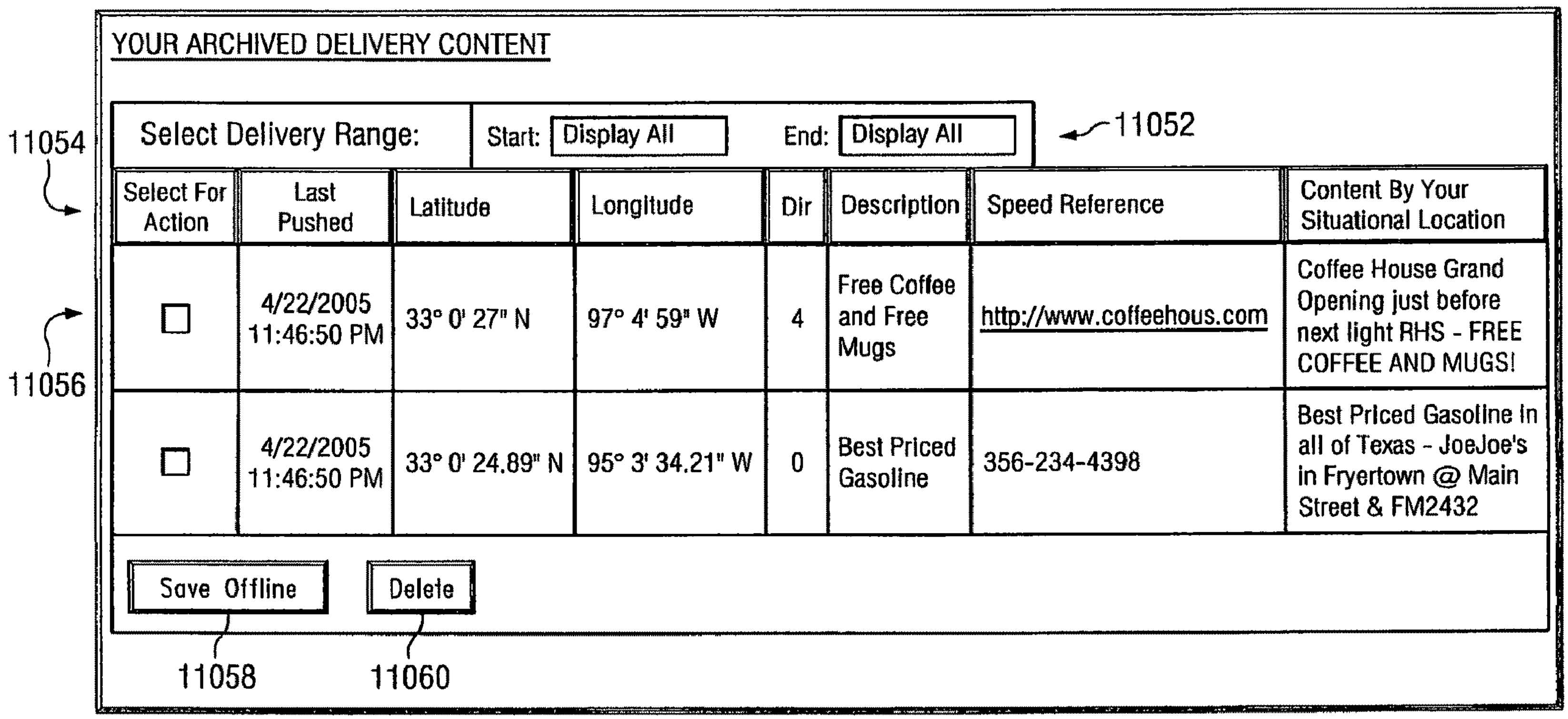
Figure 112:
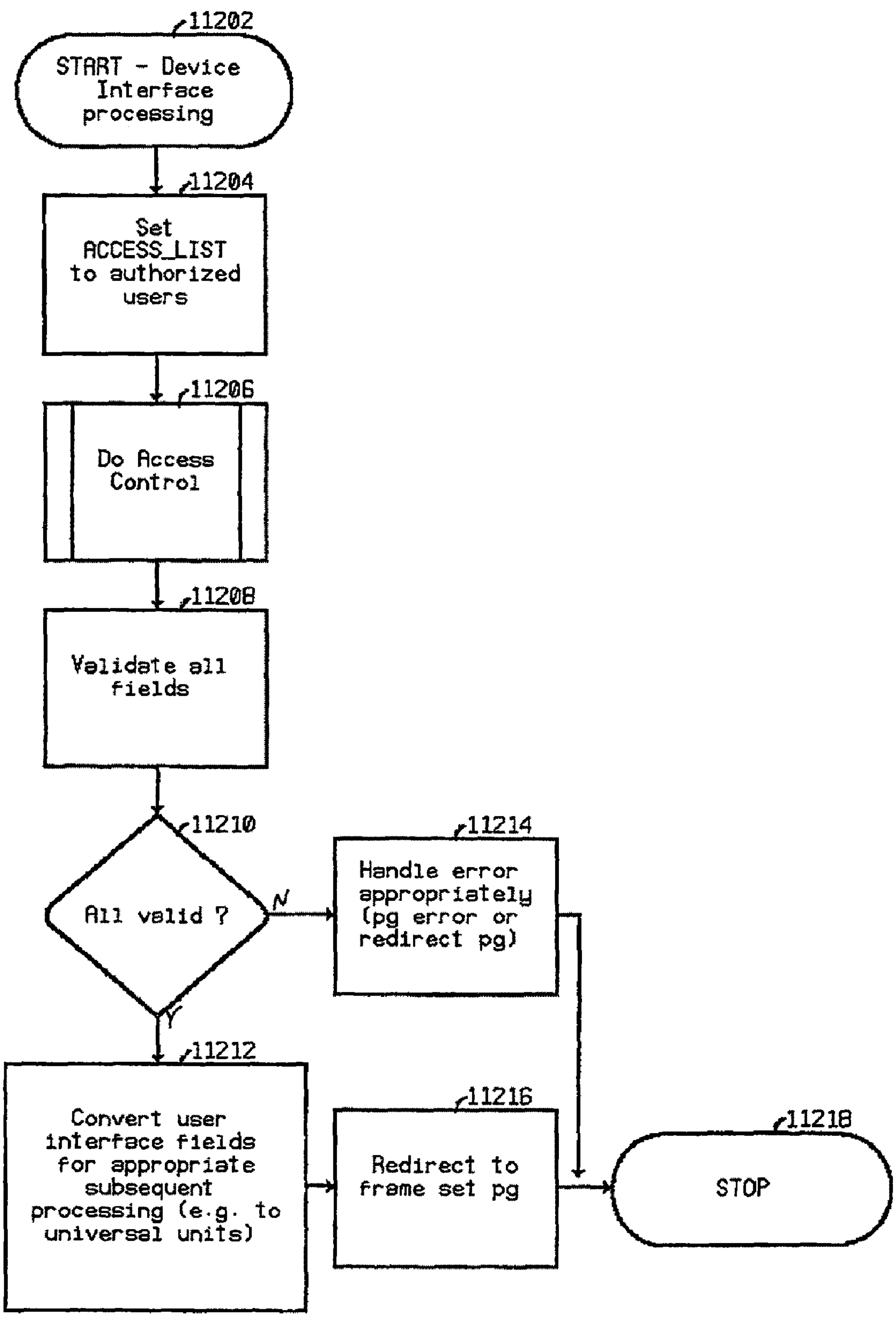
Figure 113:
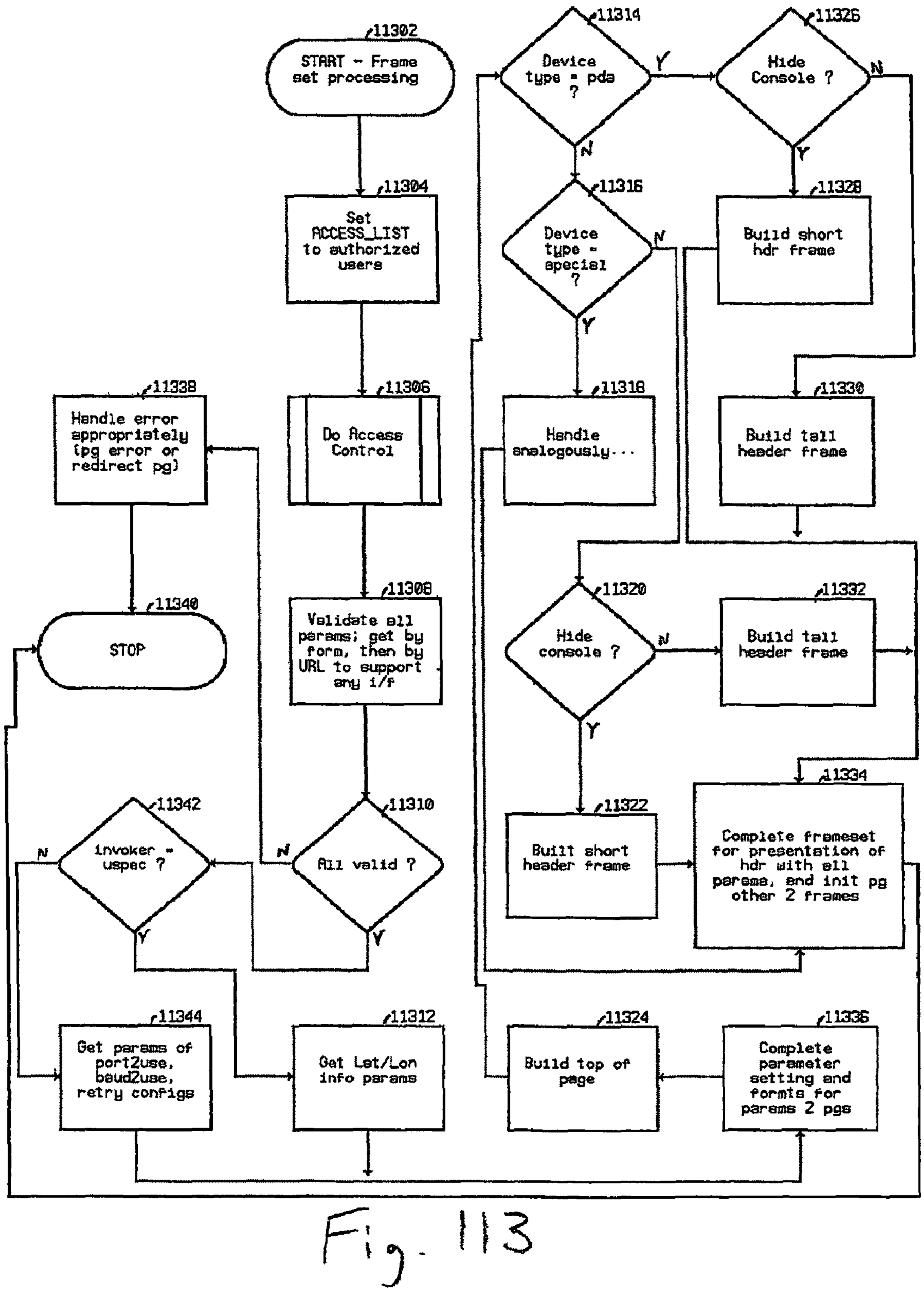
Figure 114A:
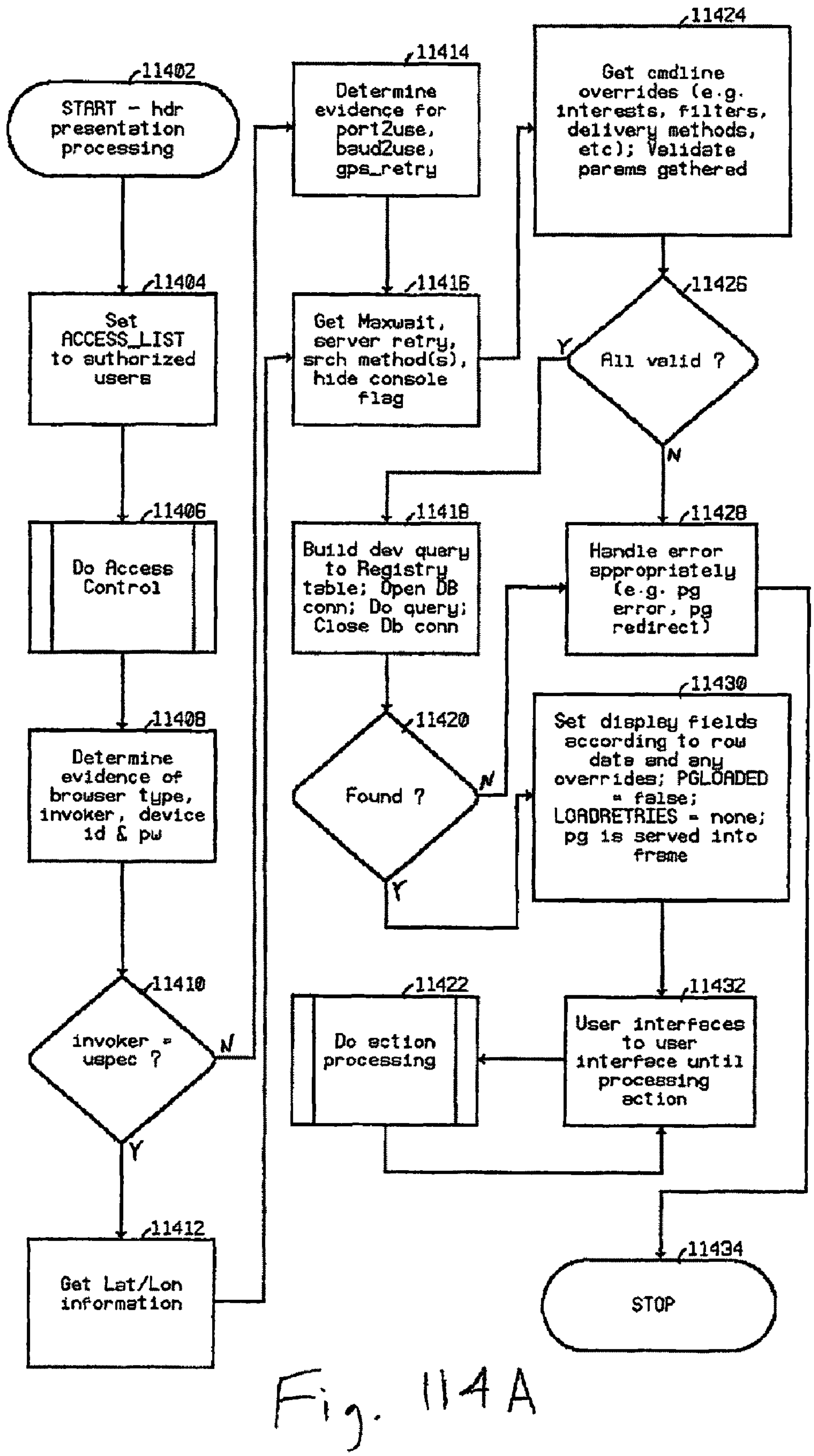
Figure 114B:
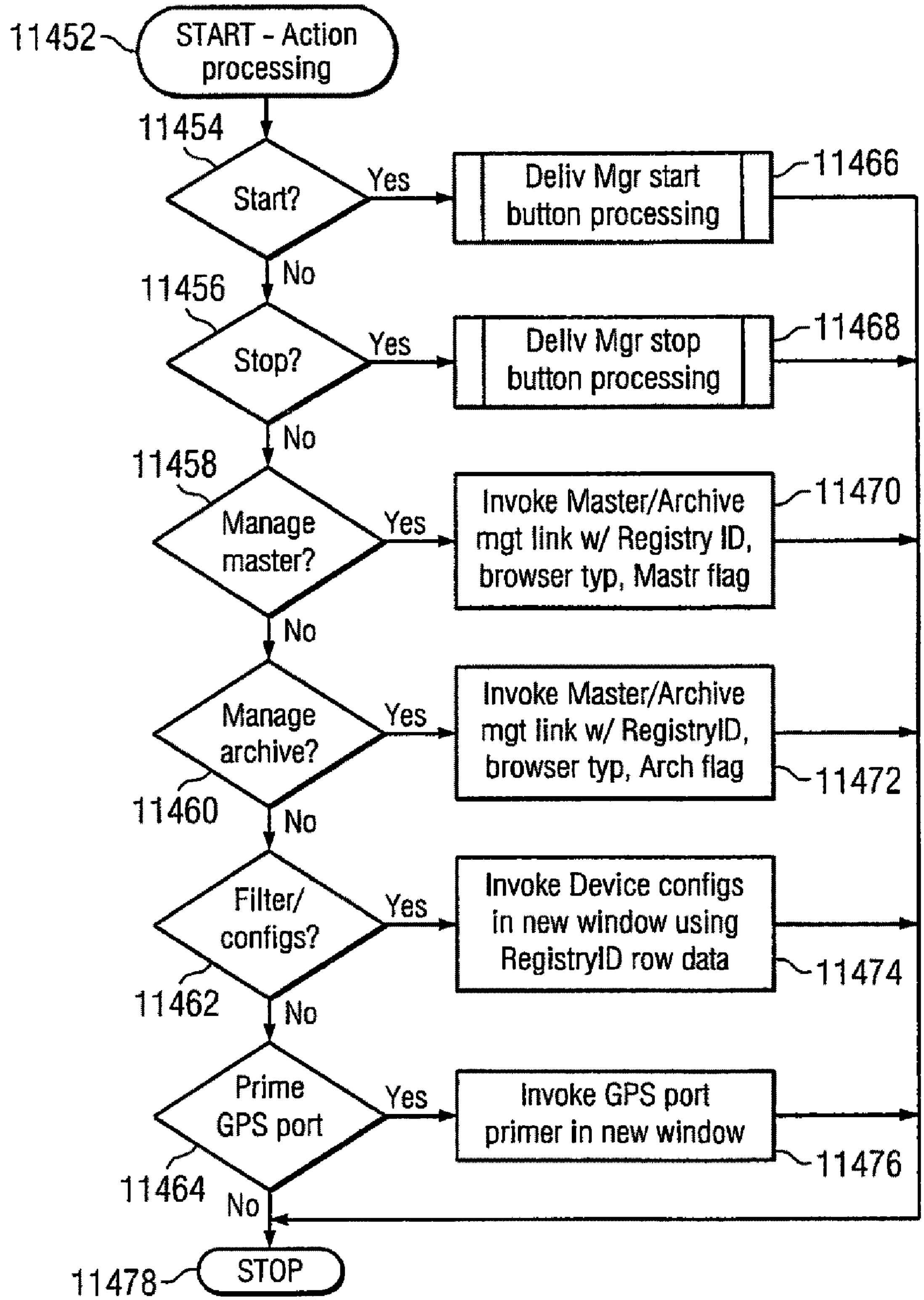
Figure 115:
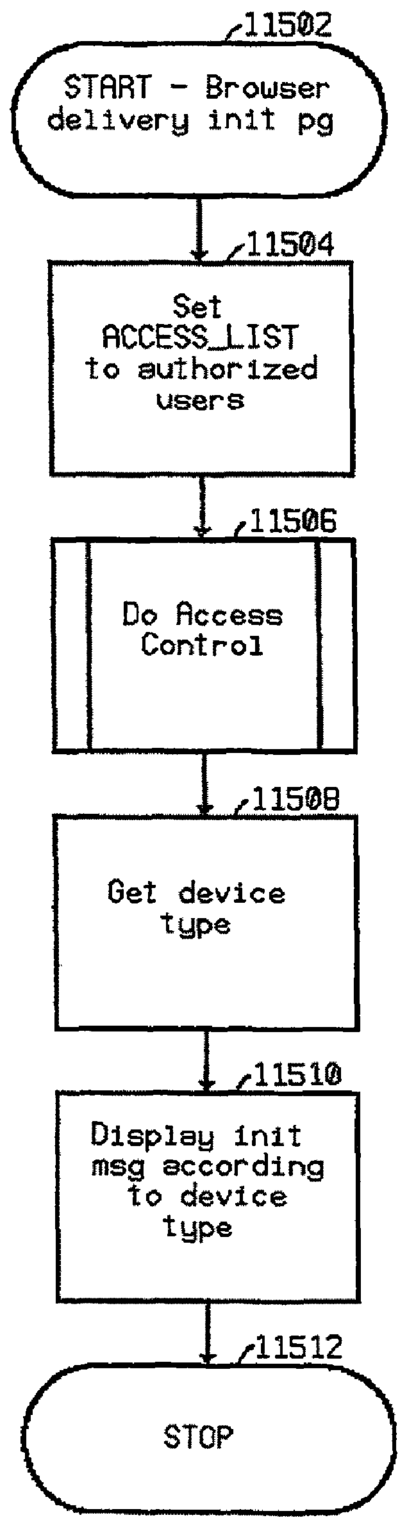
Figure 116:
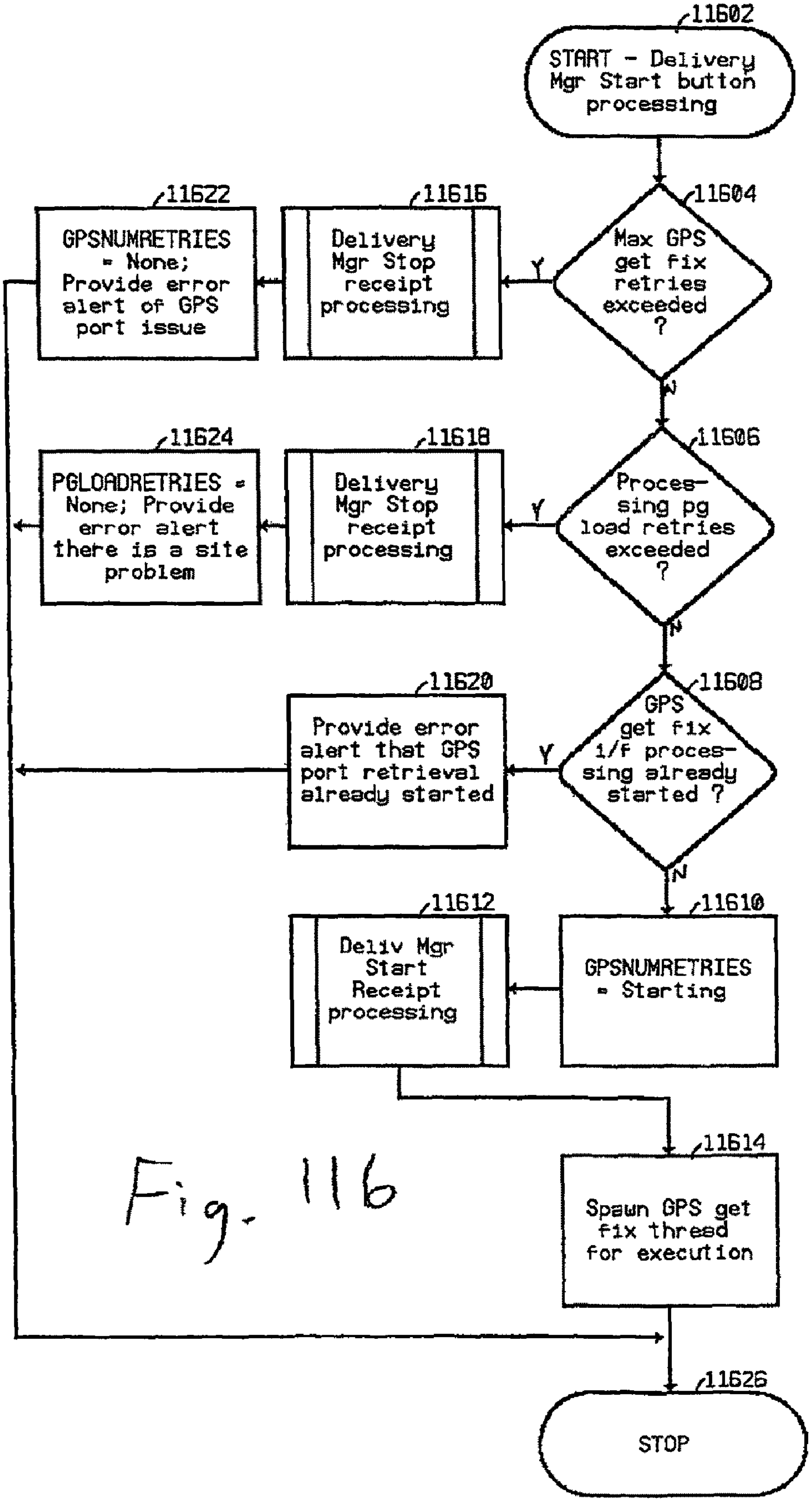
Figures 117A, 117B, 117C:
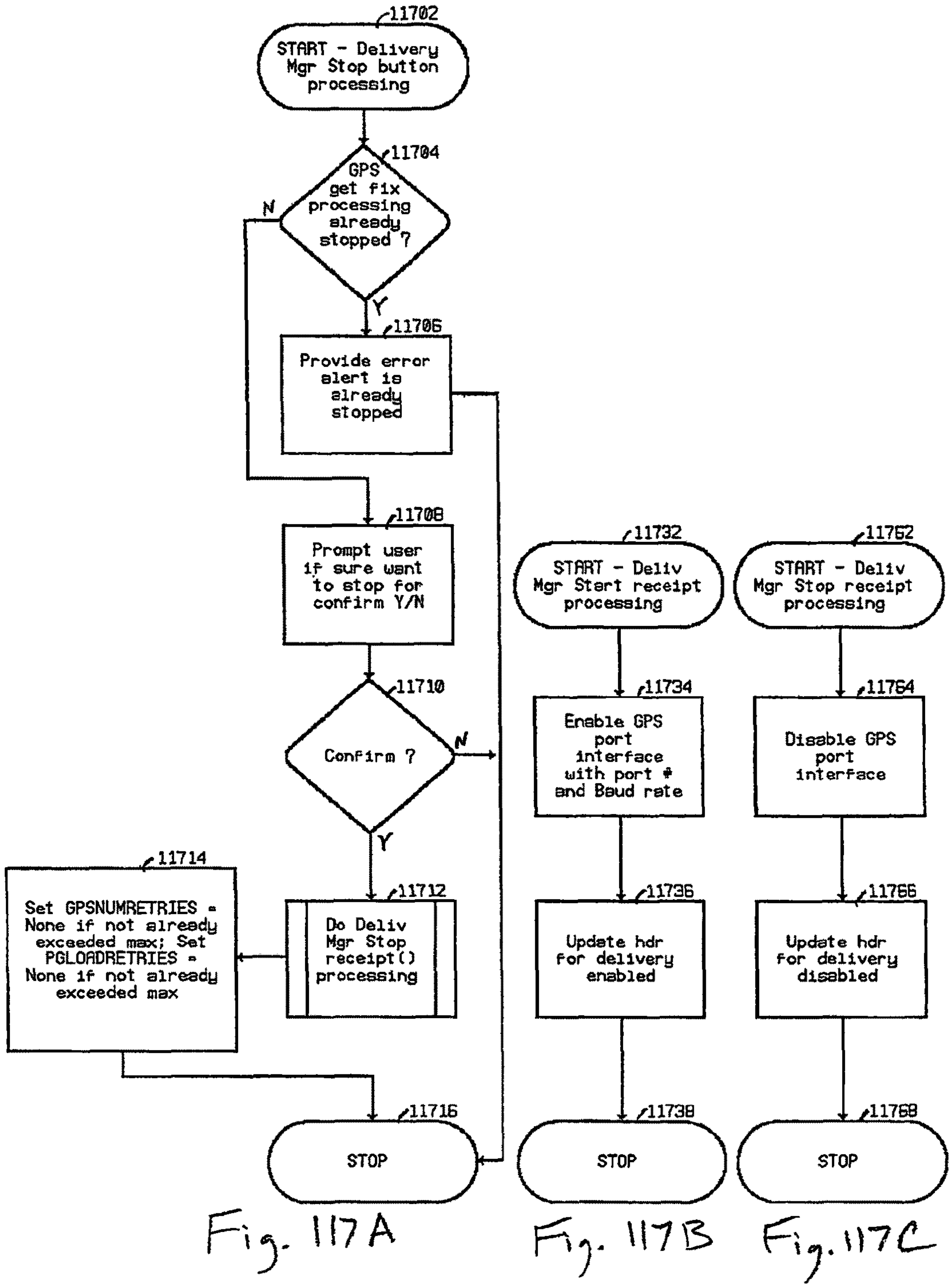
Figure 118:
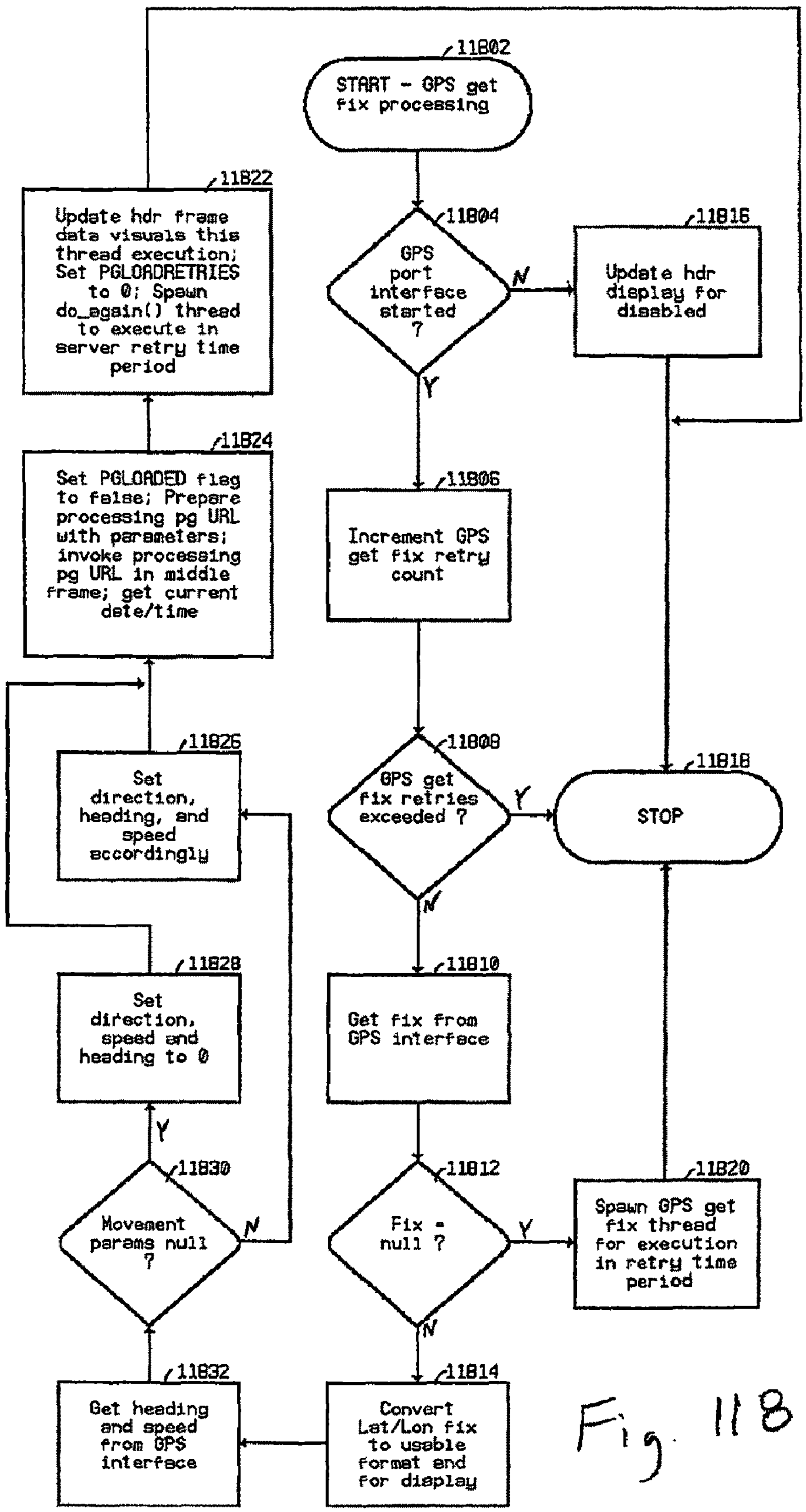
Figure 119:
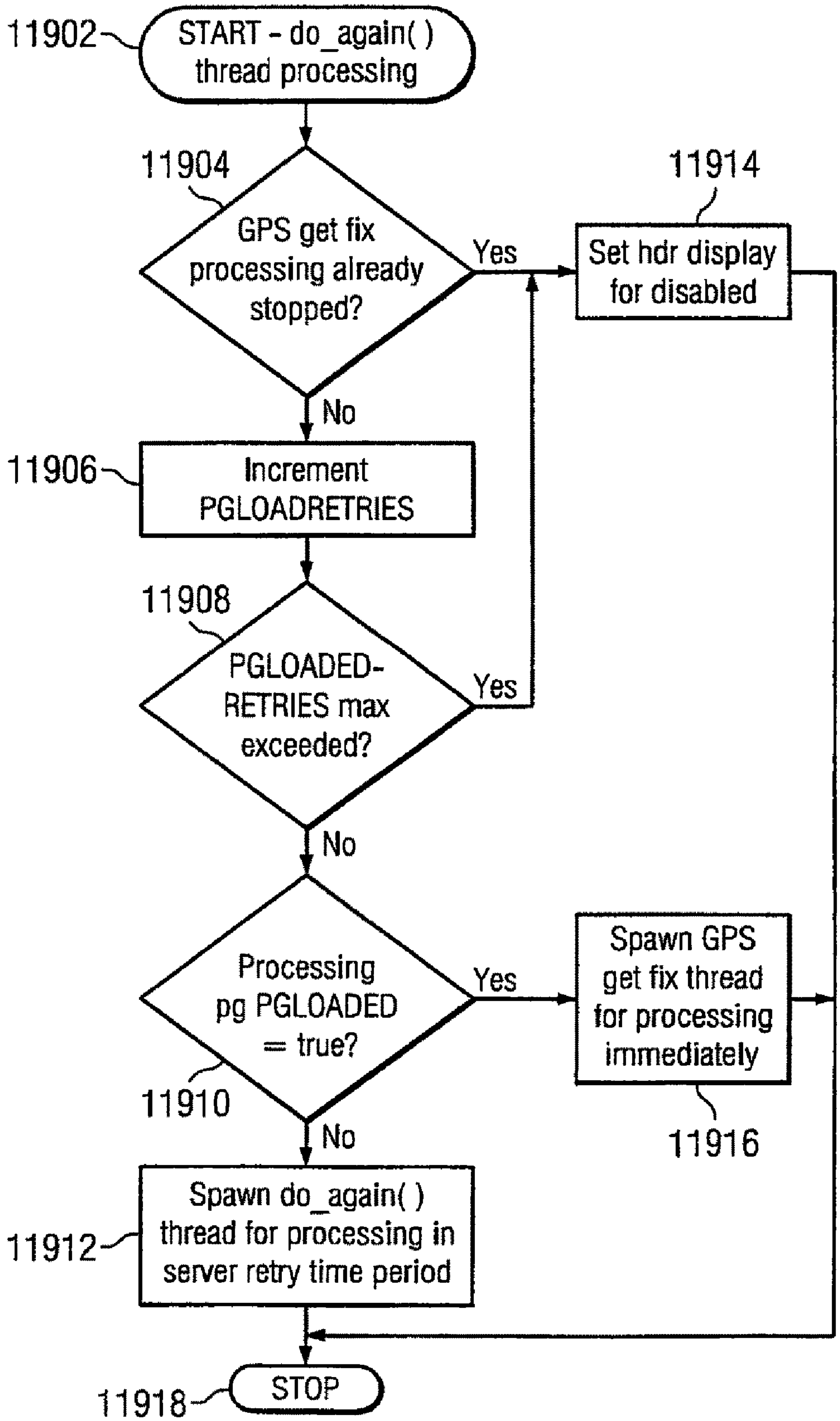
Figure 120:
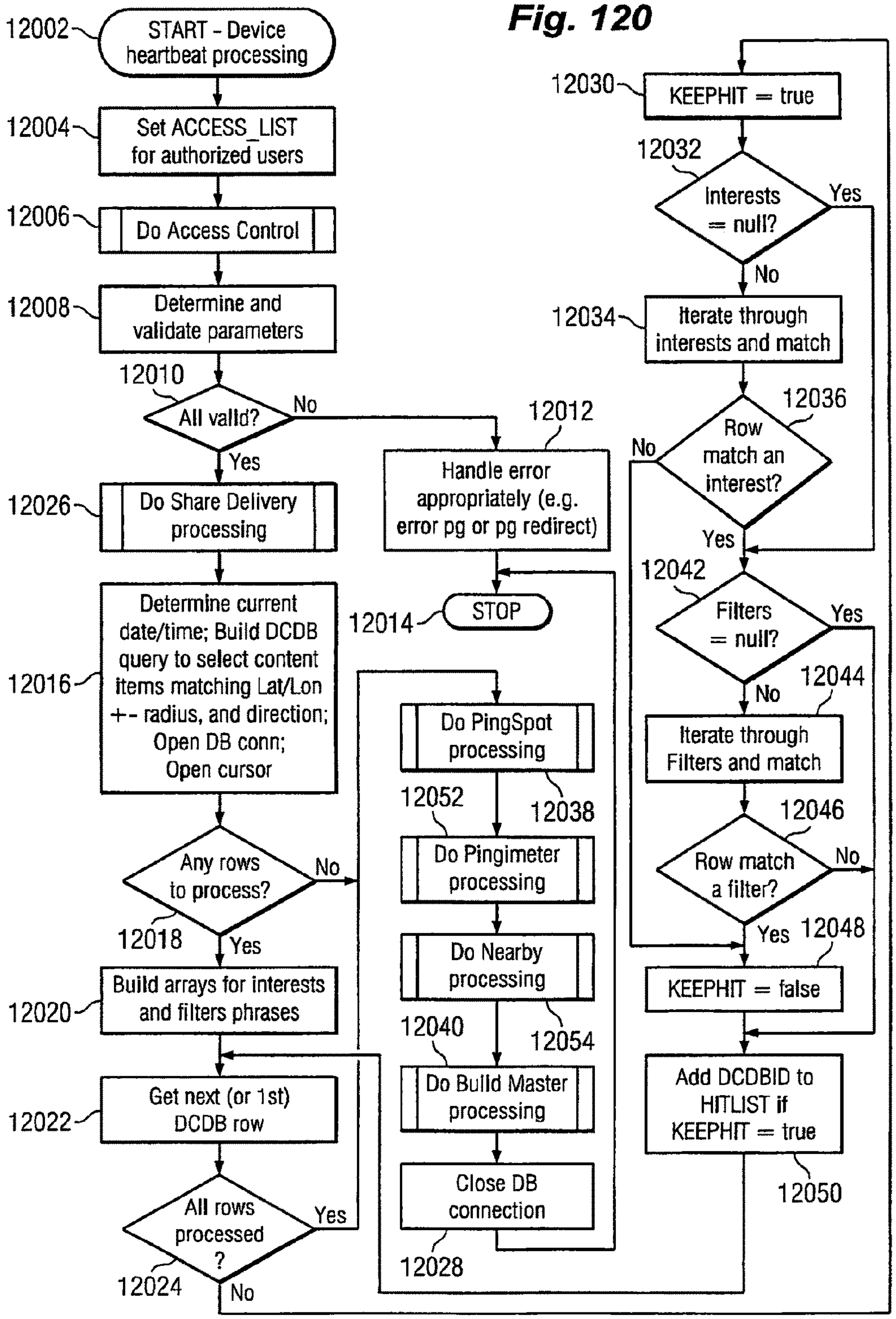
Figure 121:
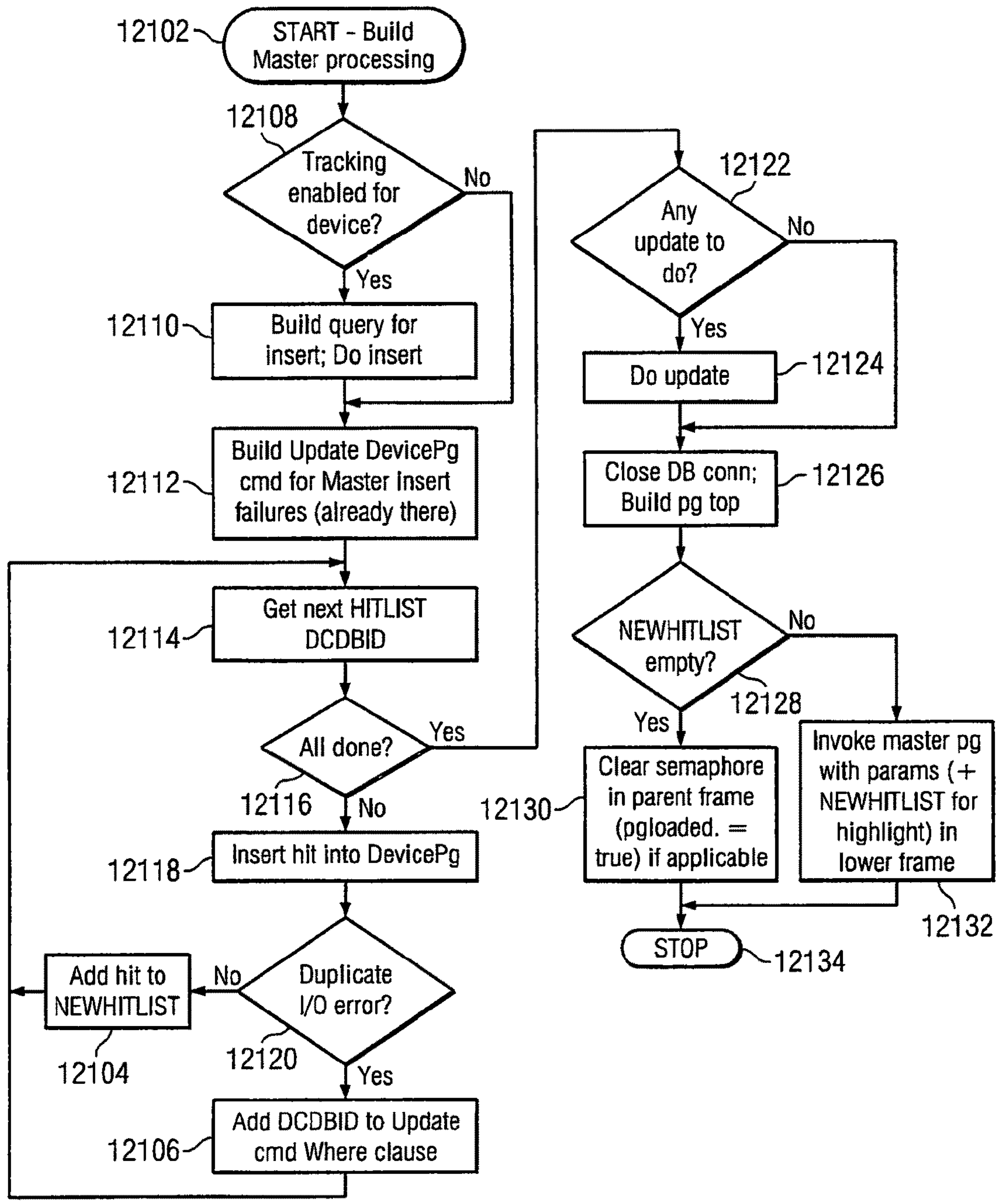
Figure 122:
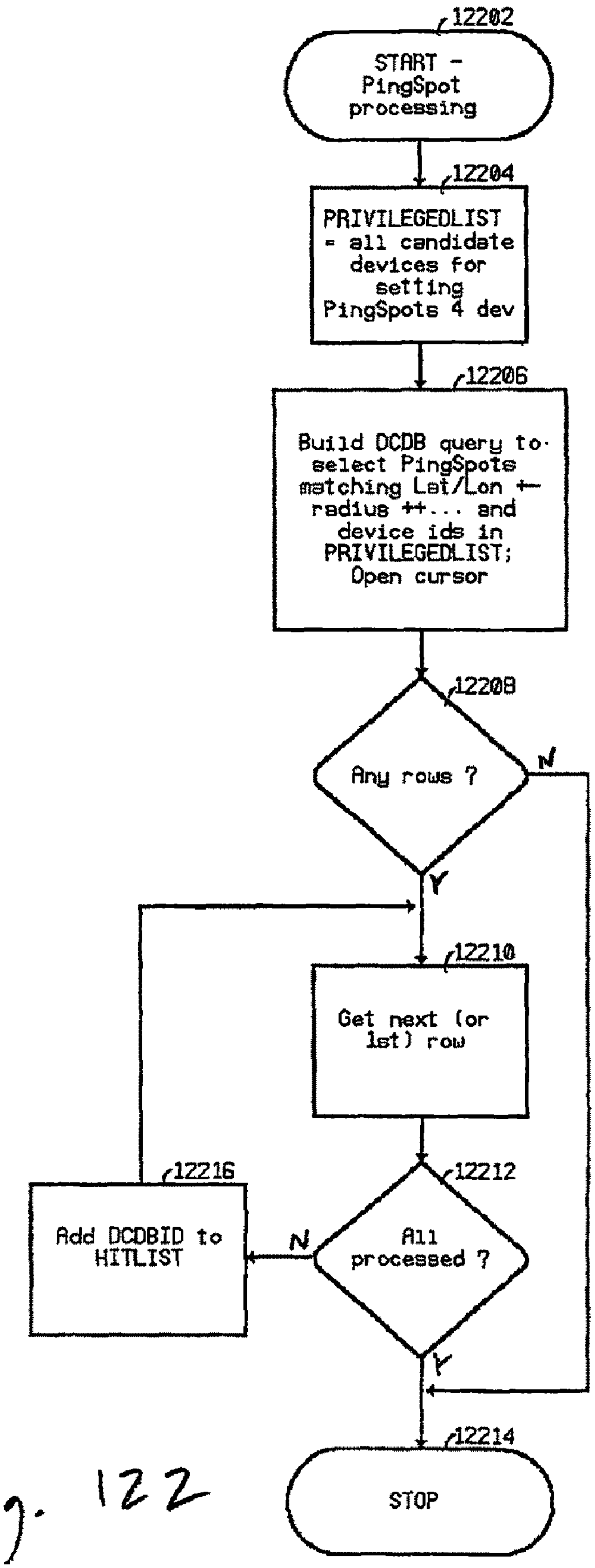
Figure 123:
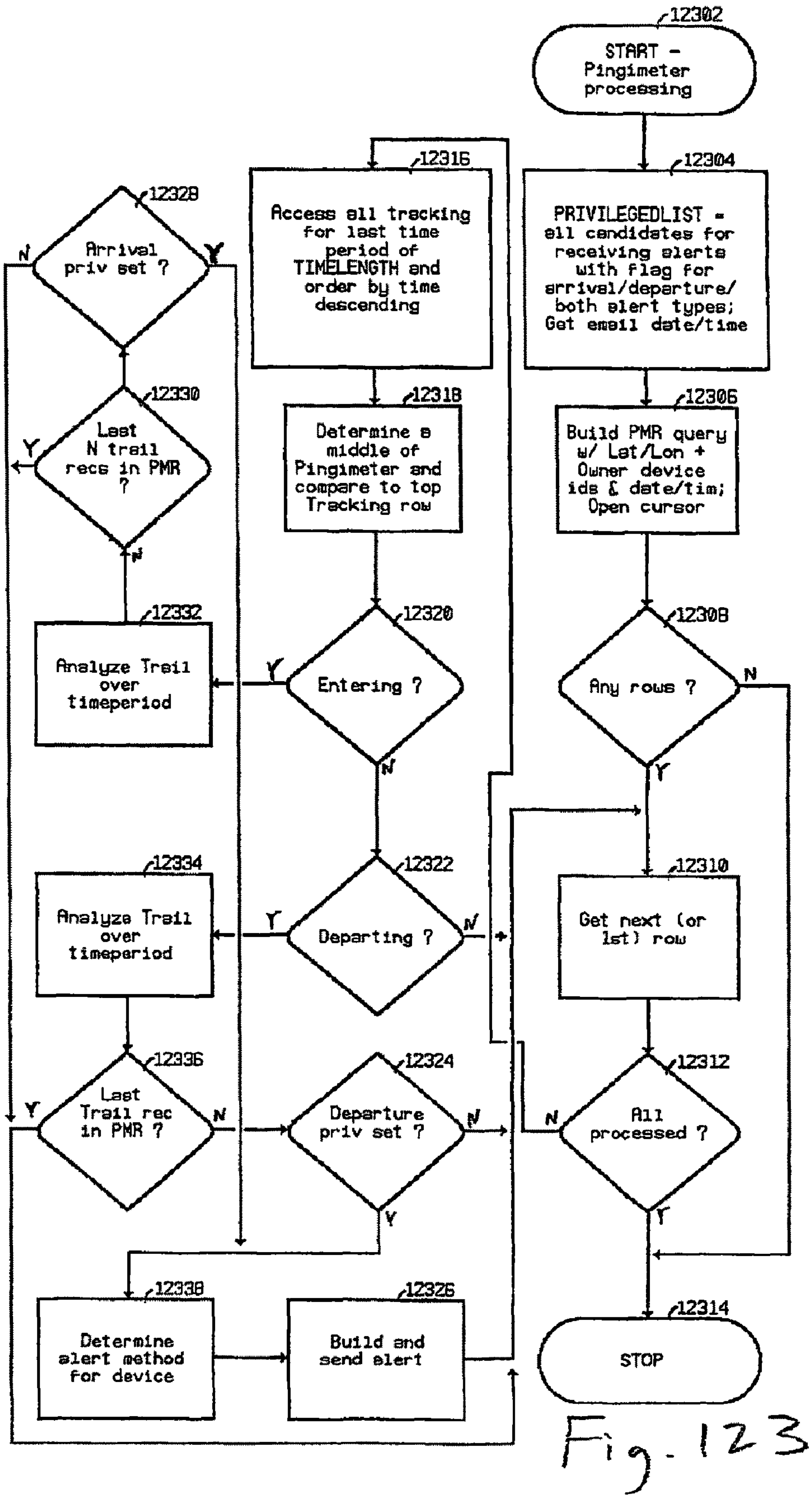
Figure 124:
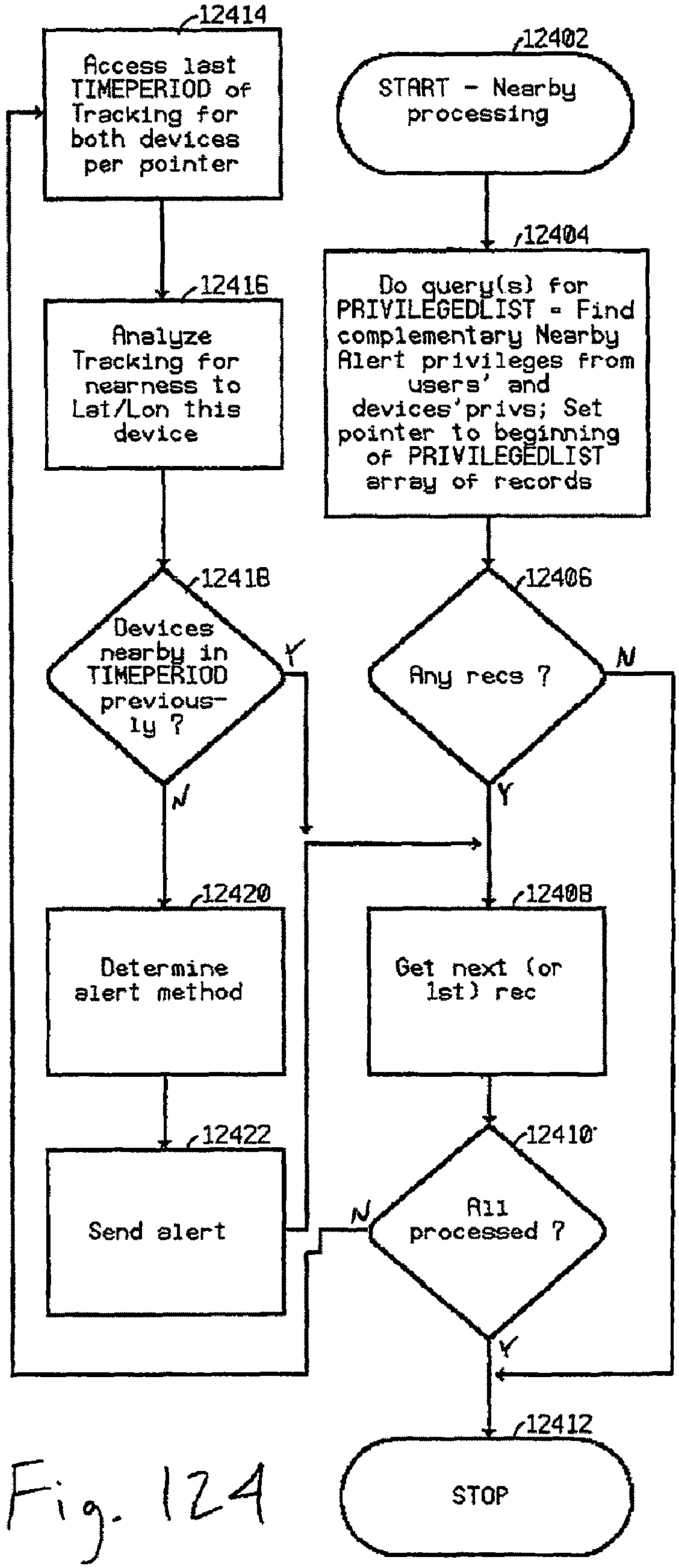
Figure 125A:
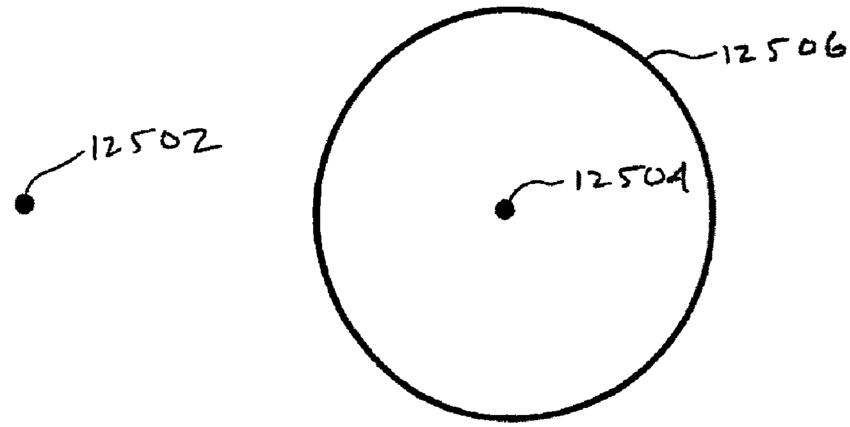
Figure 125B:
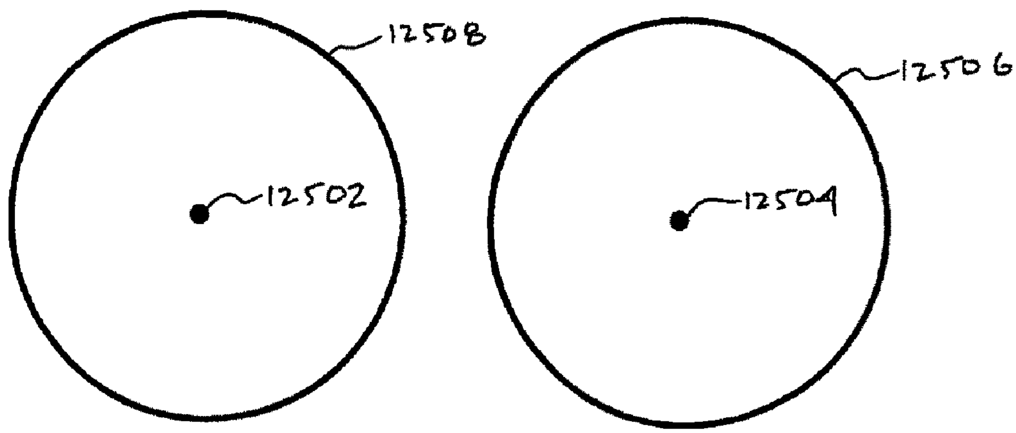
Figure 125C:
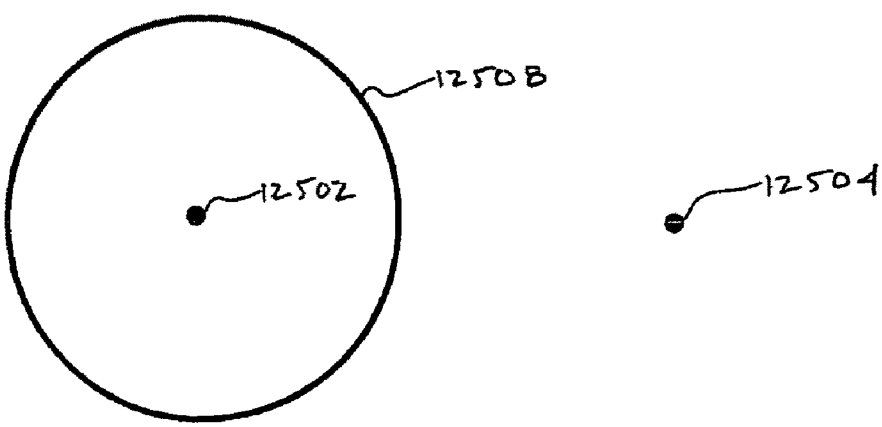
Figure 126:
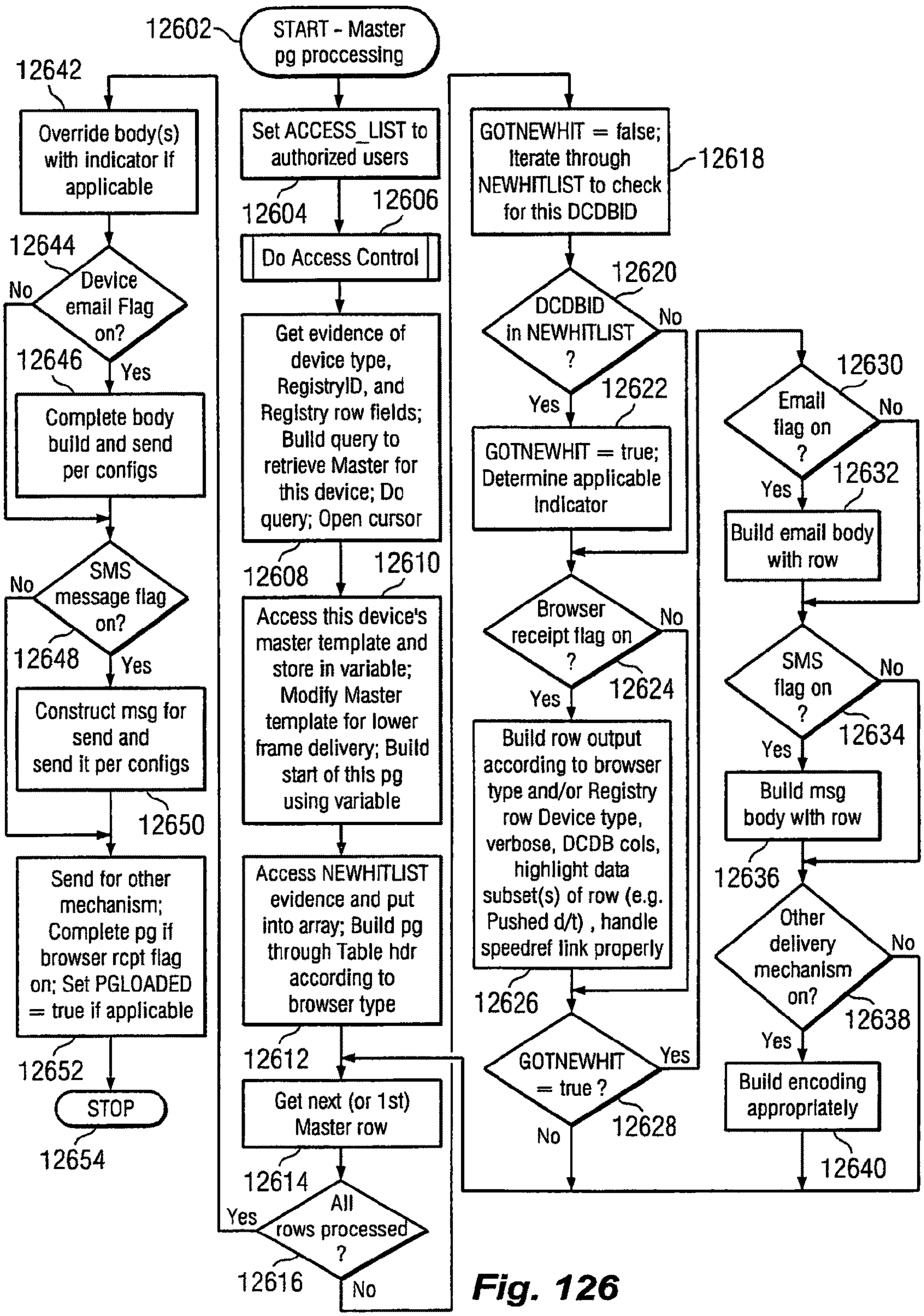
Figure 127:
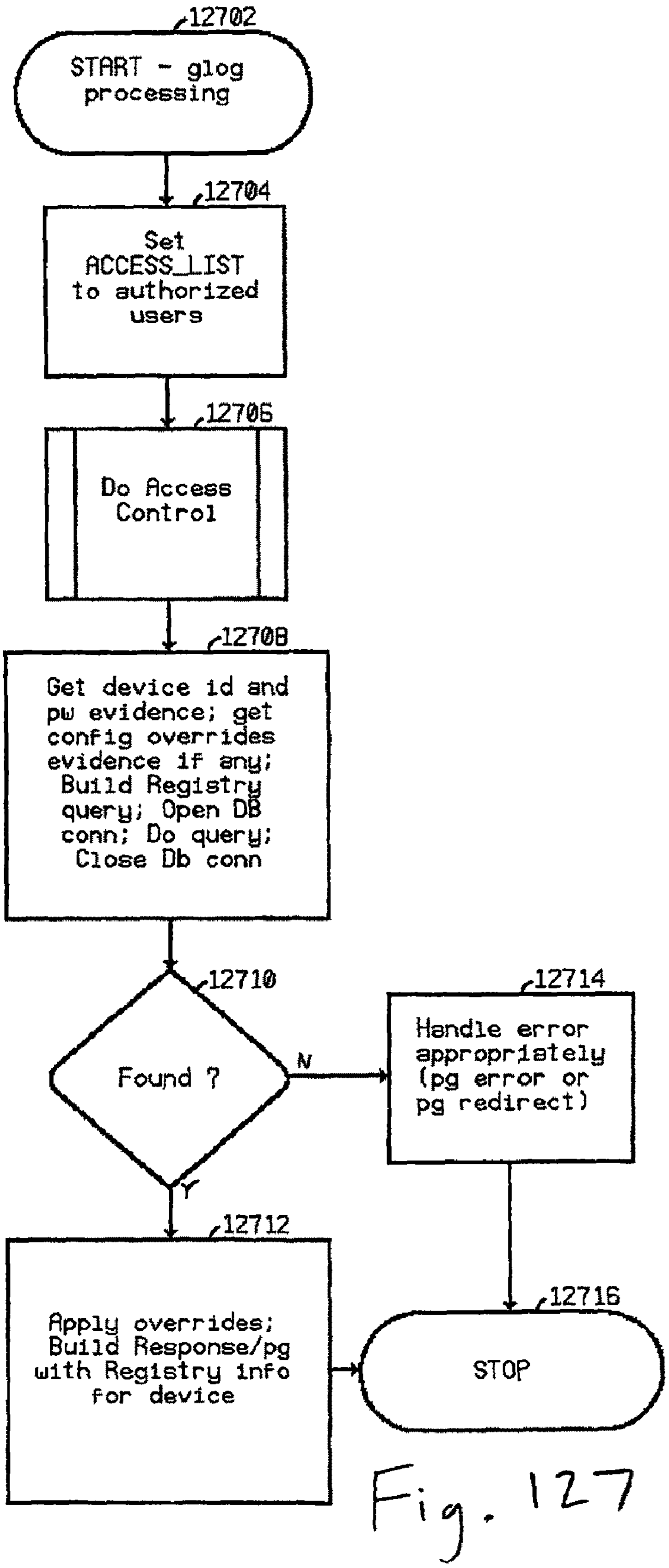
Figure 128A:
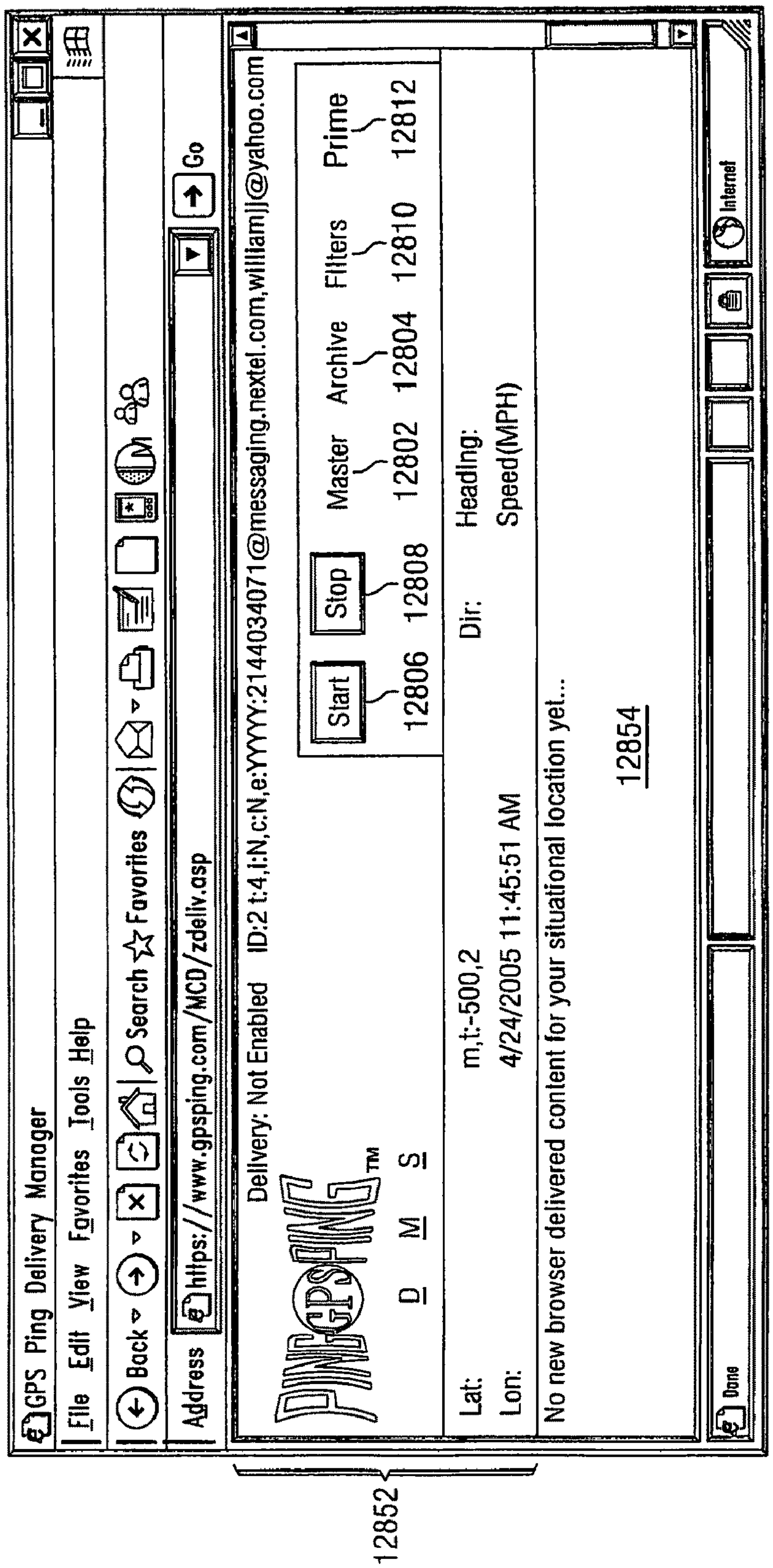
Figure 128B:
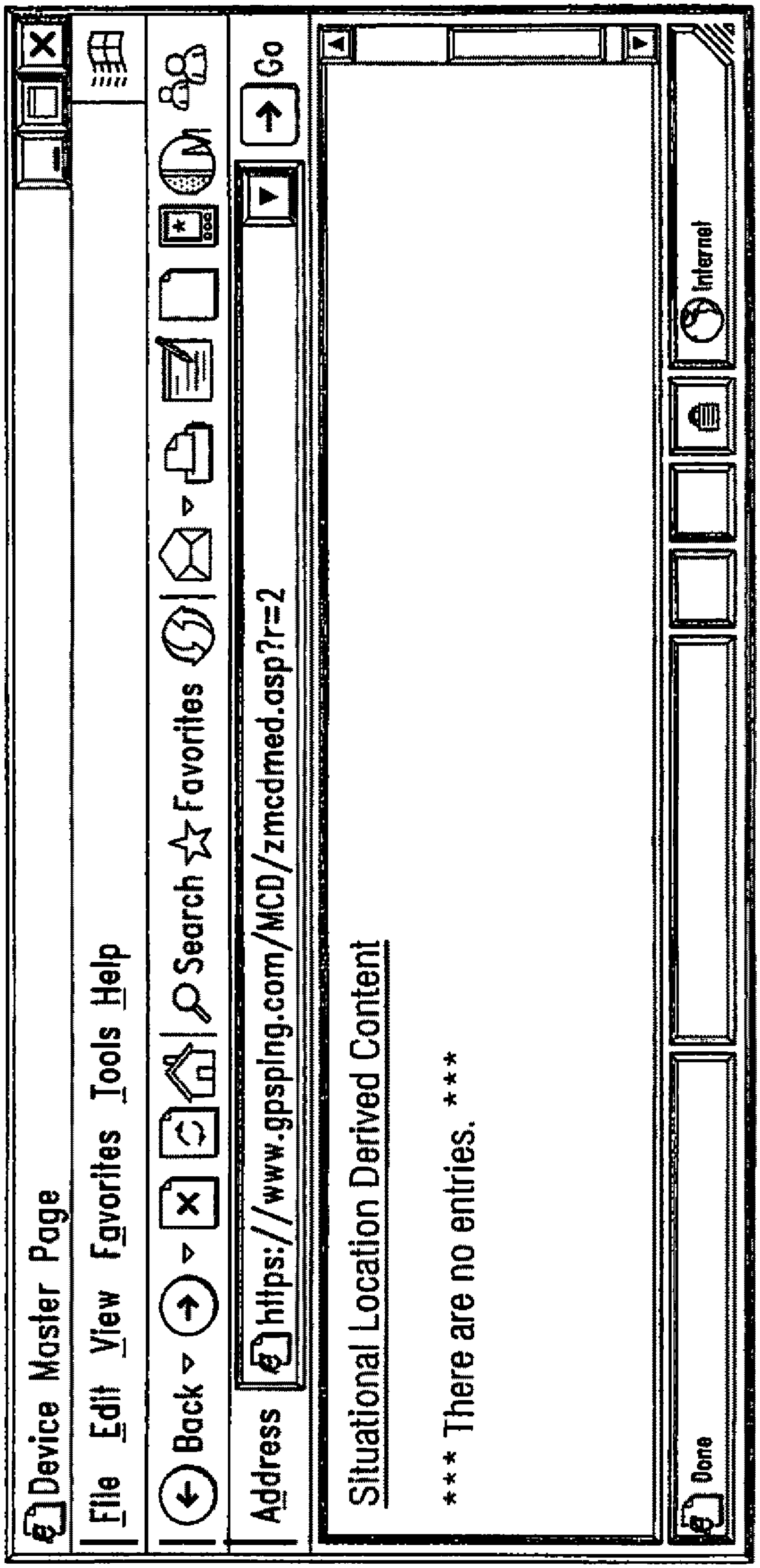
Figure 128C:
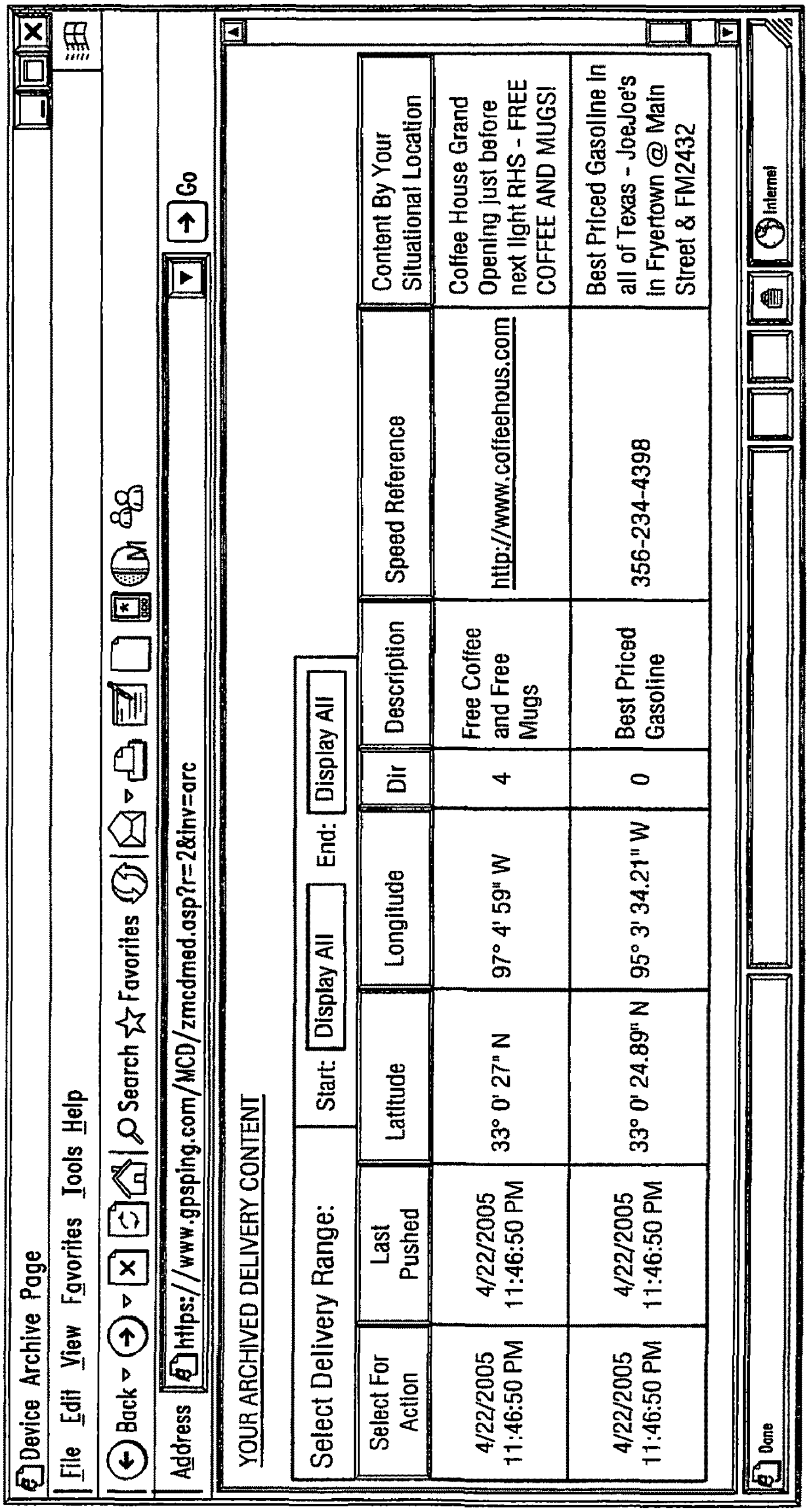
Figure 128D:
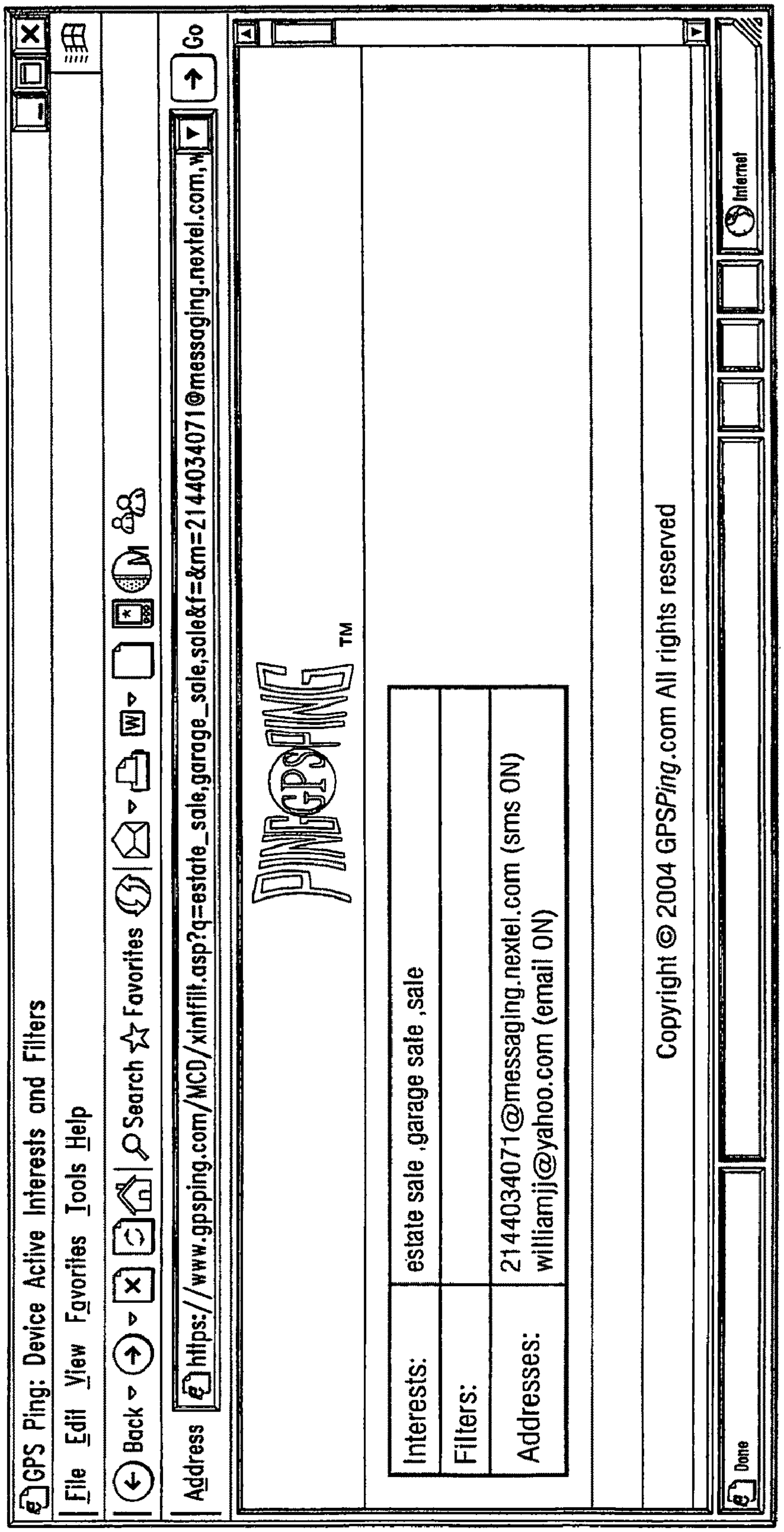
Figure 128E:
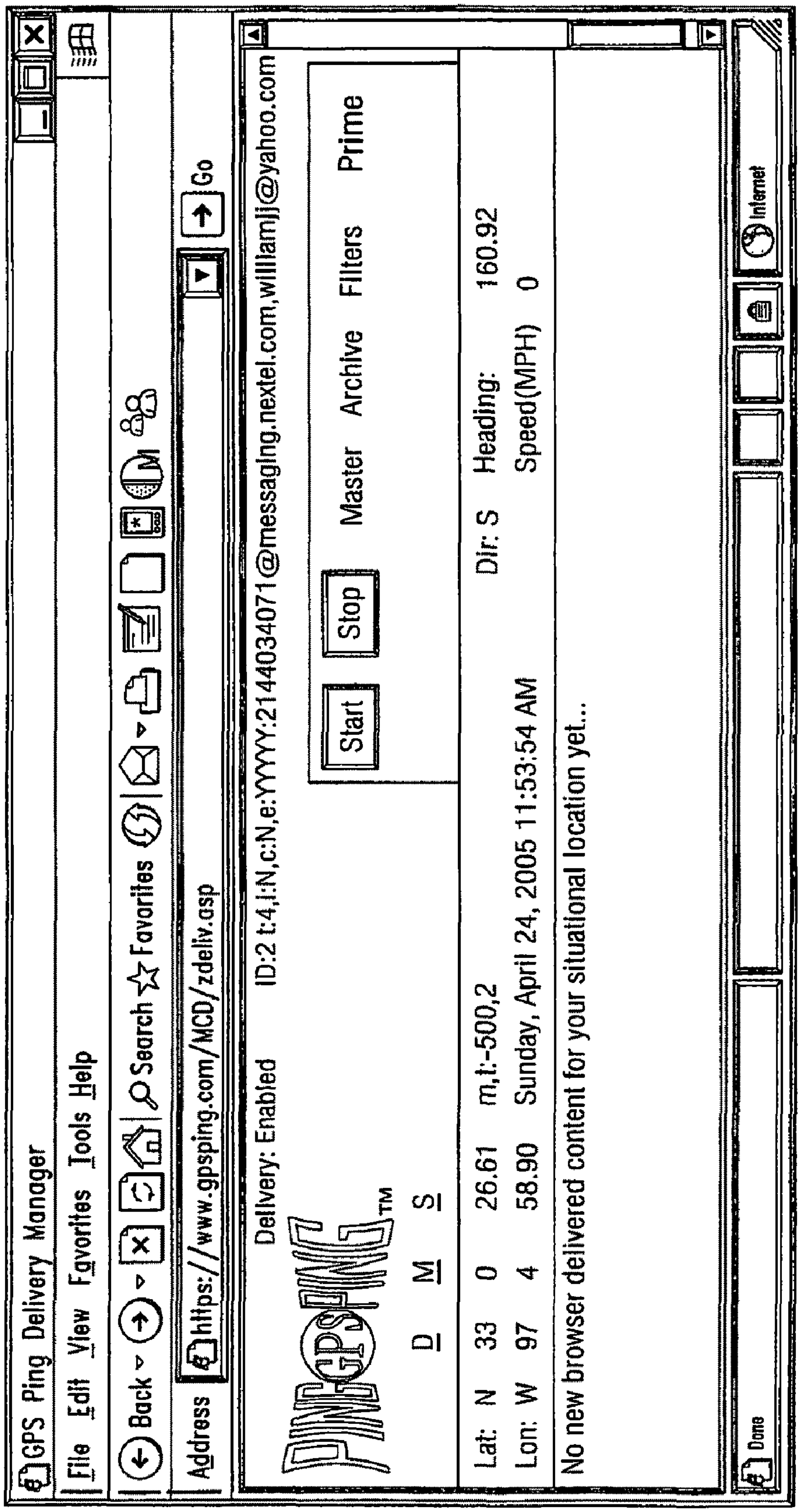
Figure 130A:
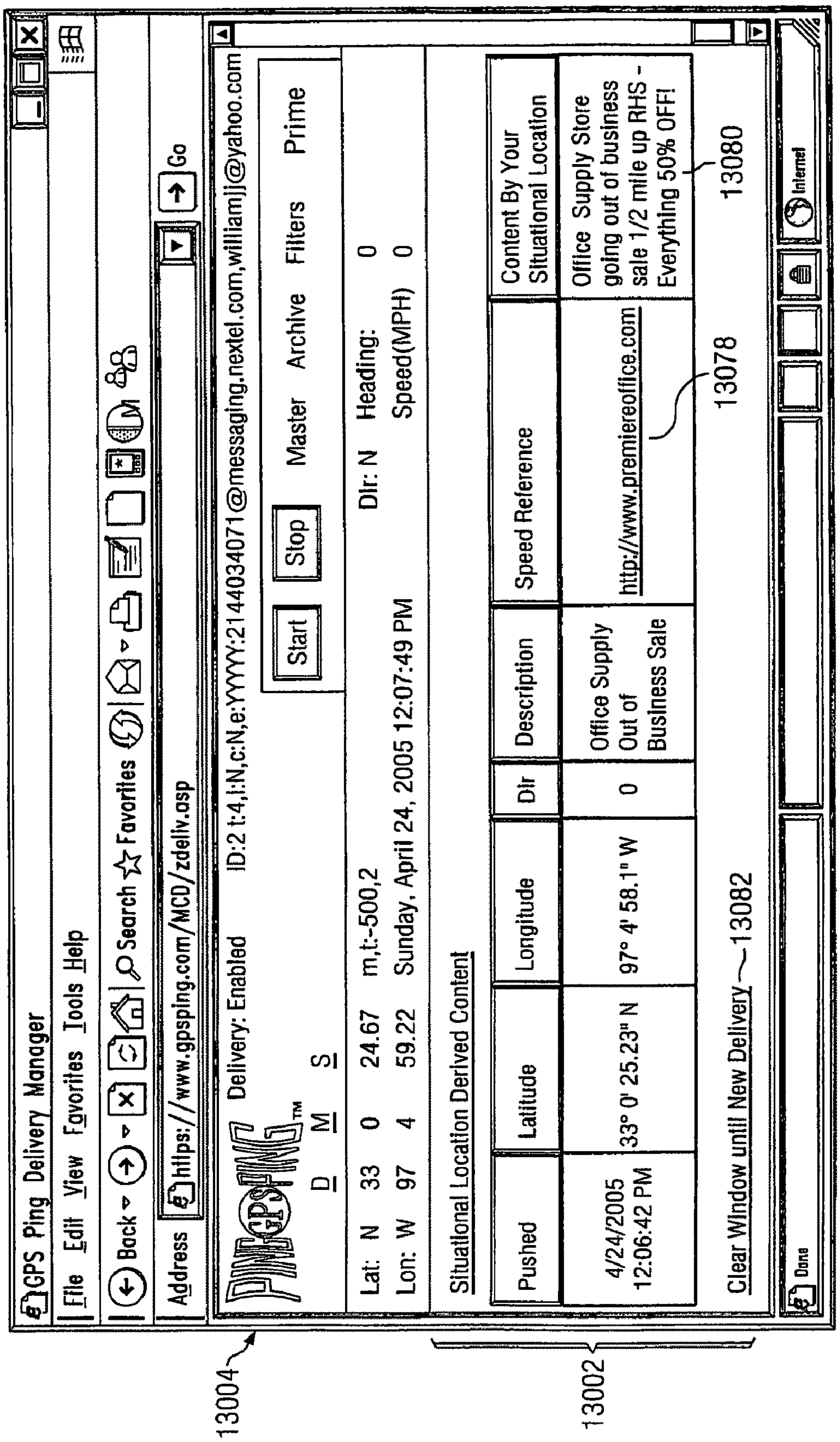
Figure 130B:
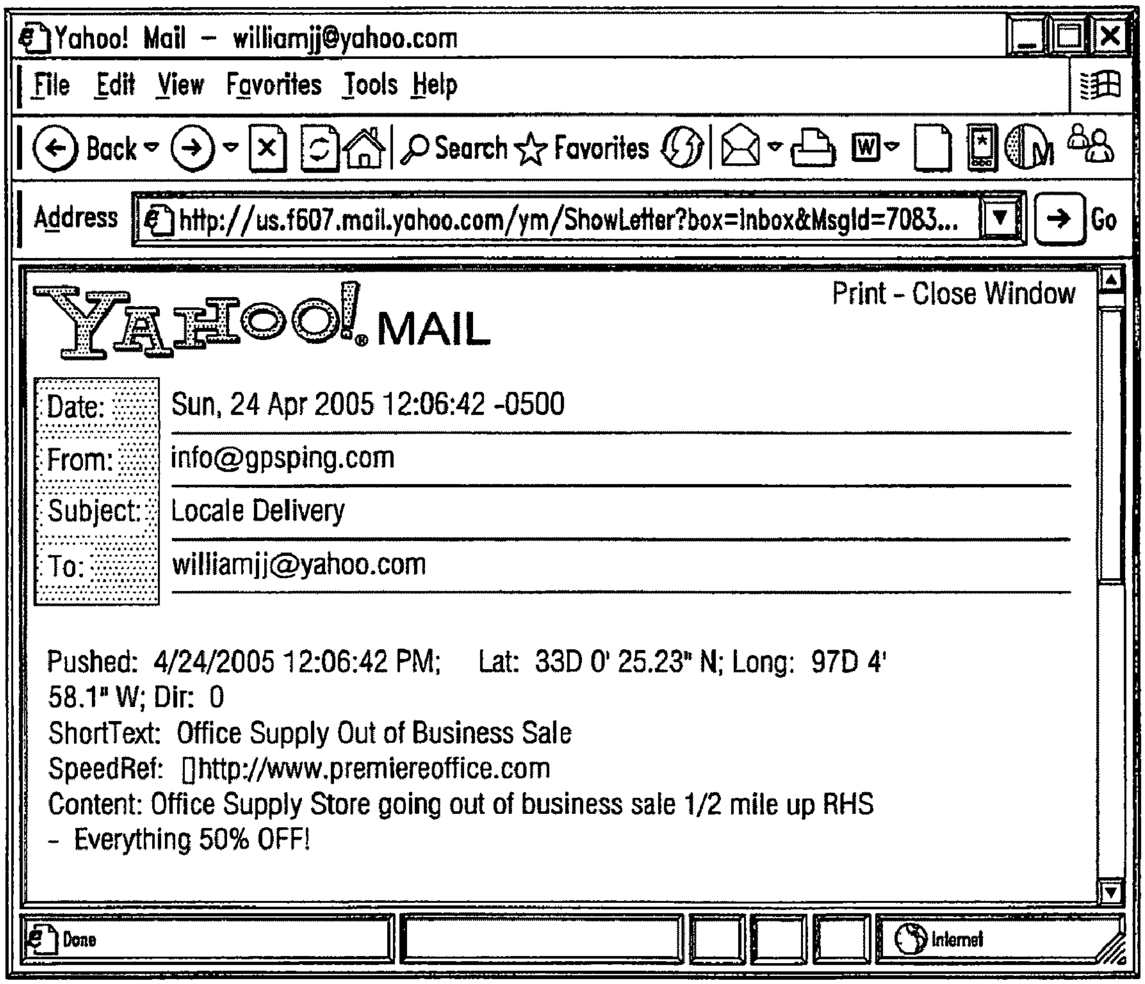
Figure 130C:
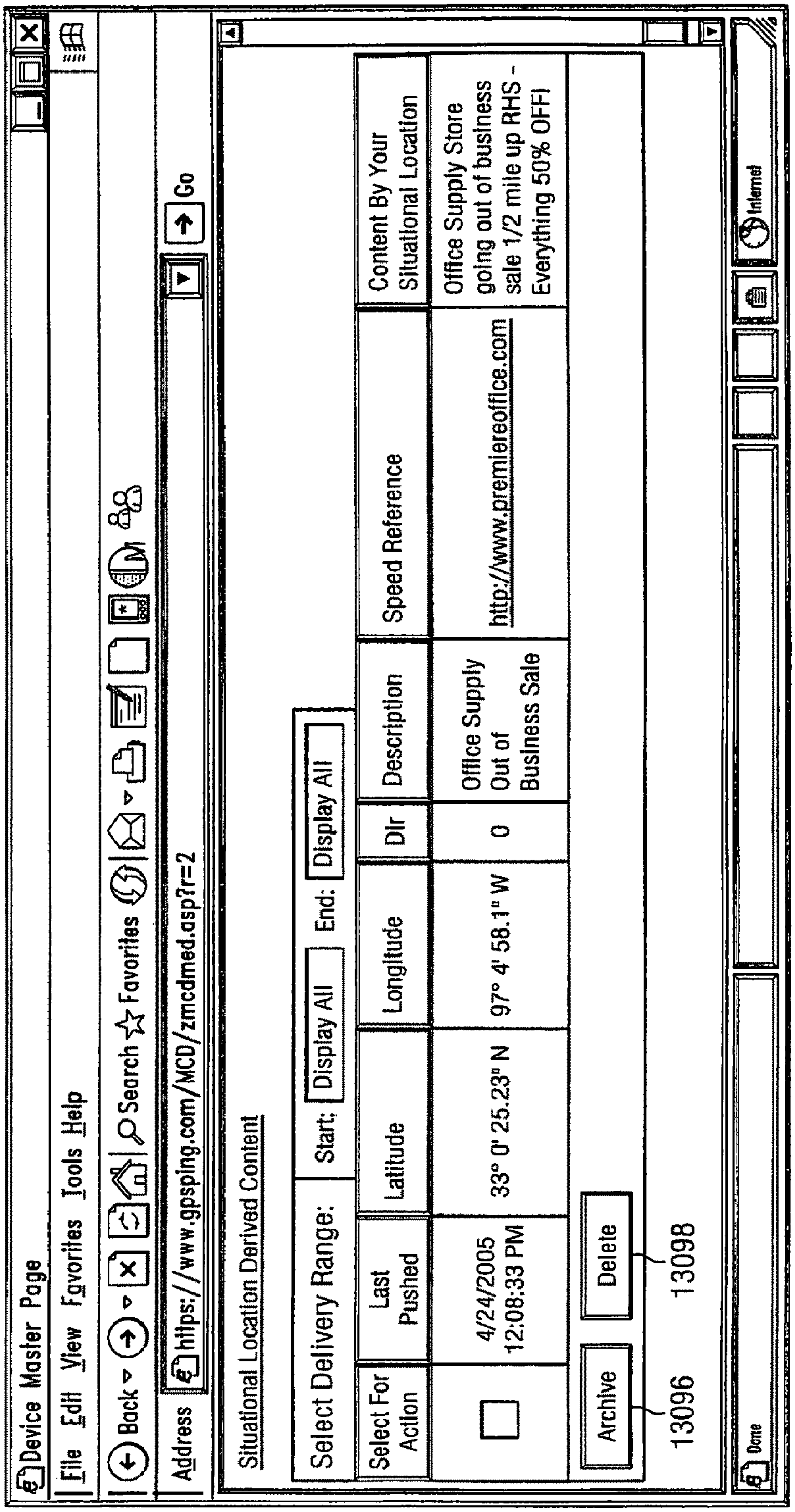
Figure 130D:
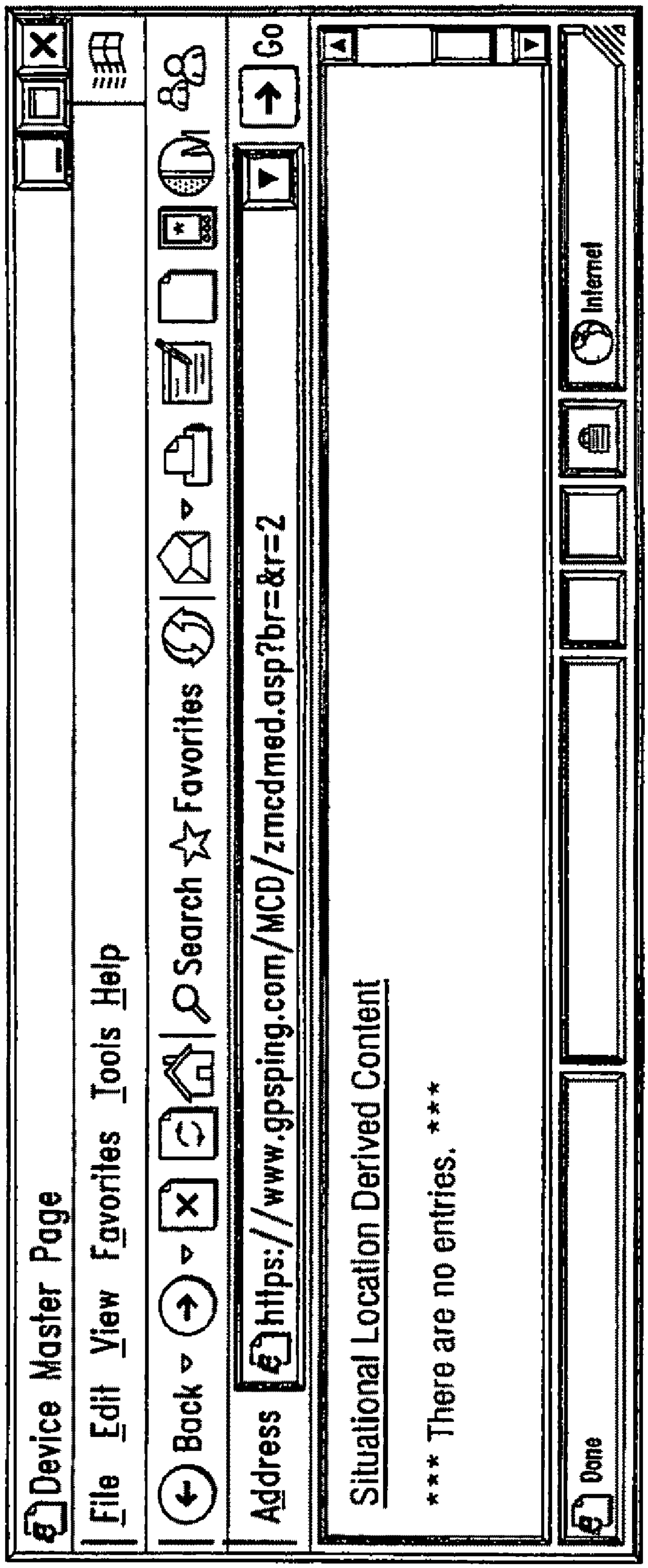
Figure 131:
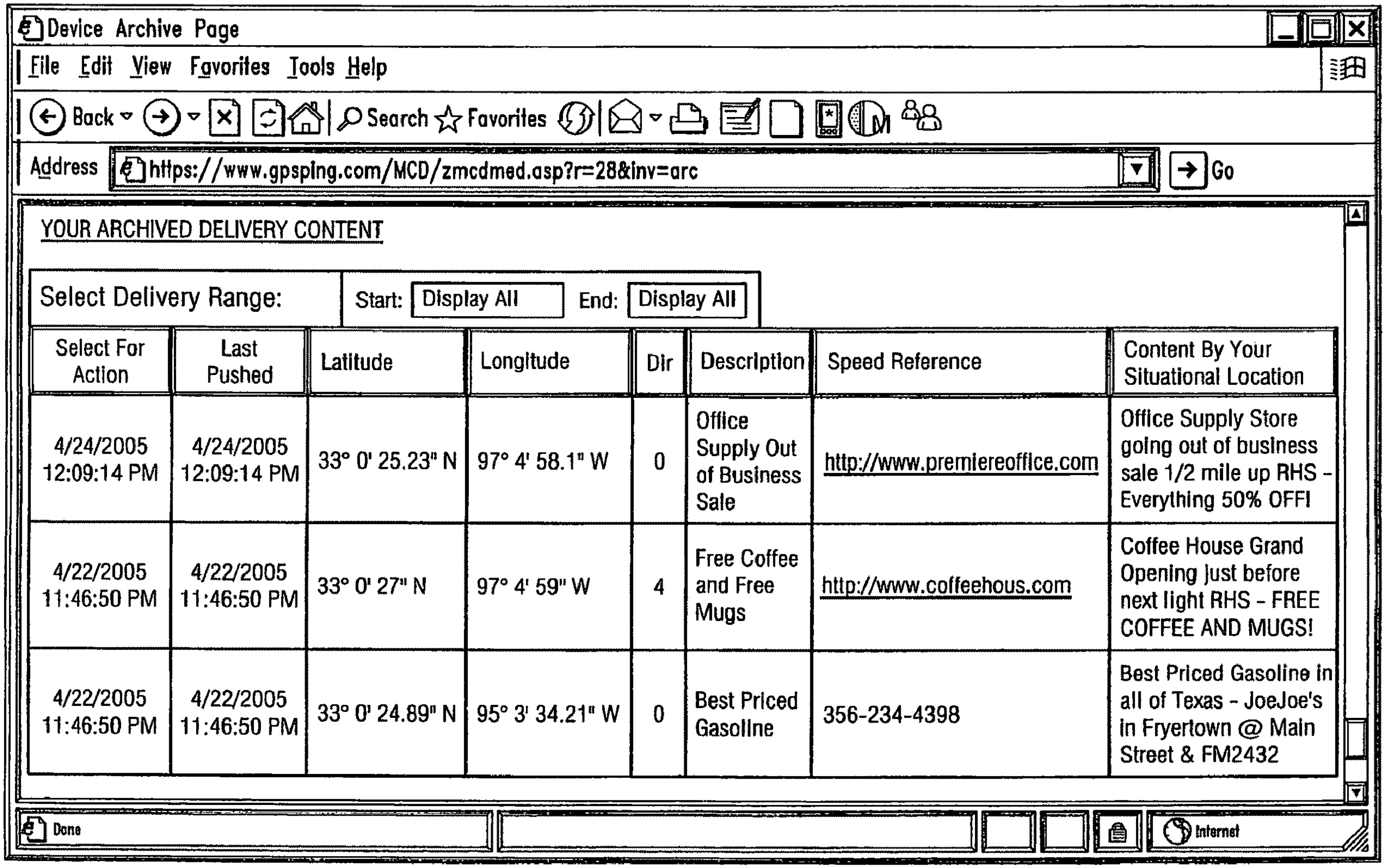
Figure 132:
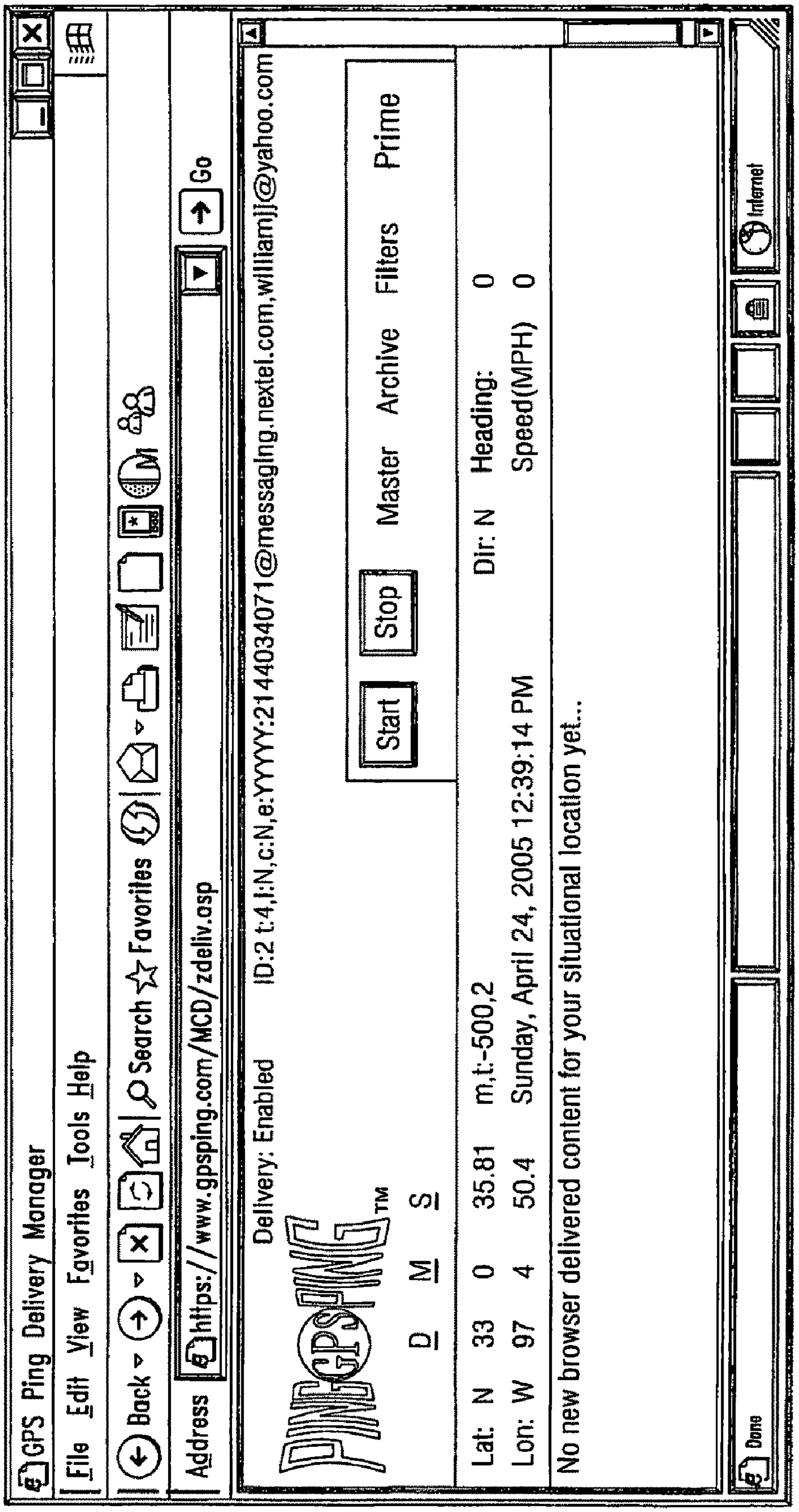
Figure 133A:
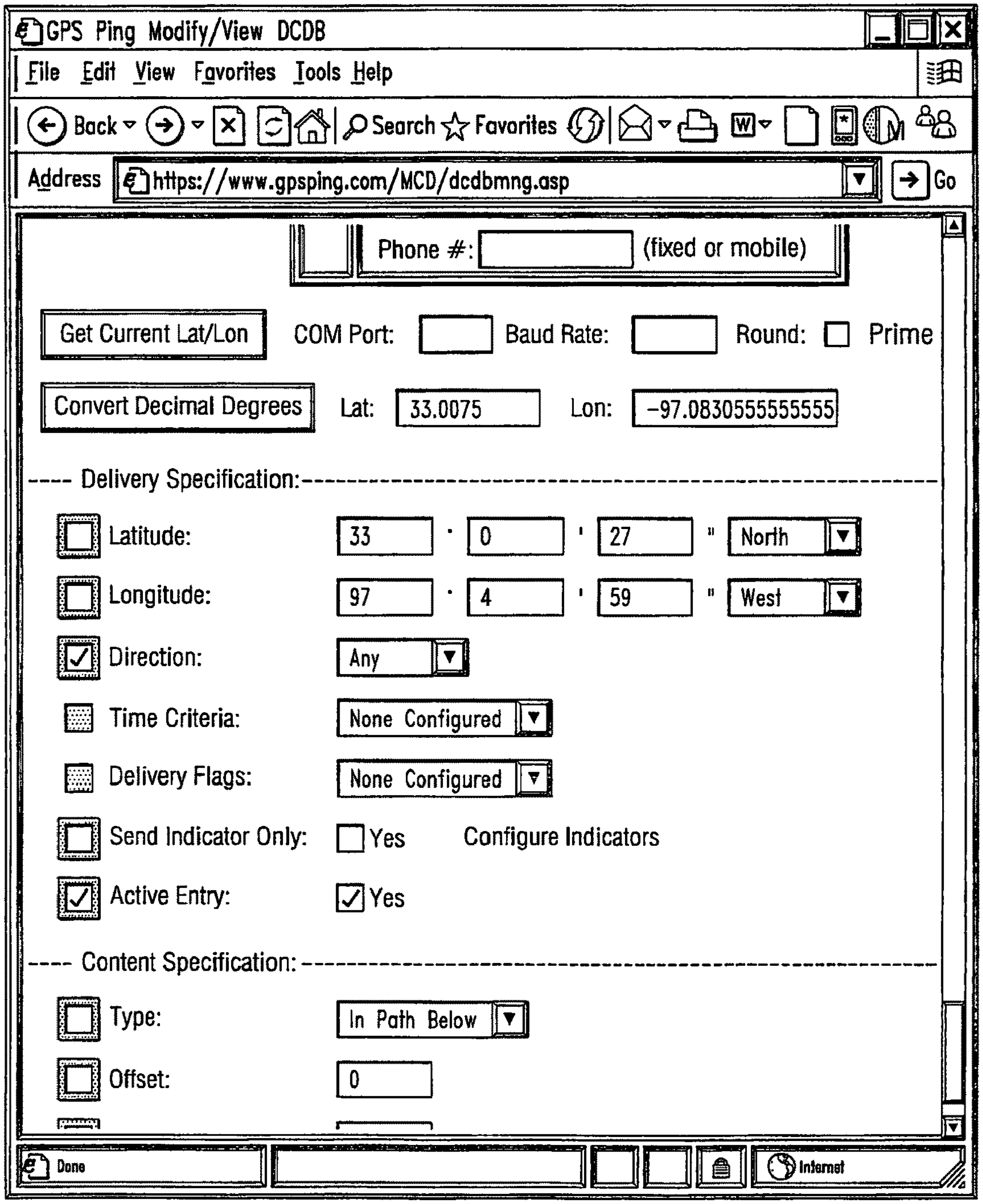
Figure 133B:
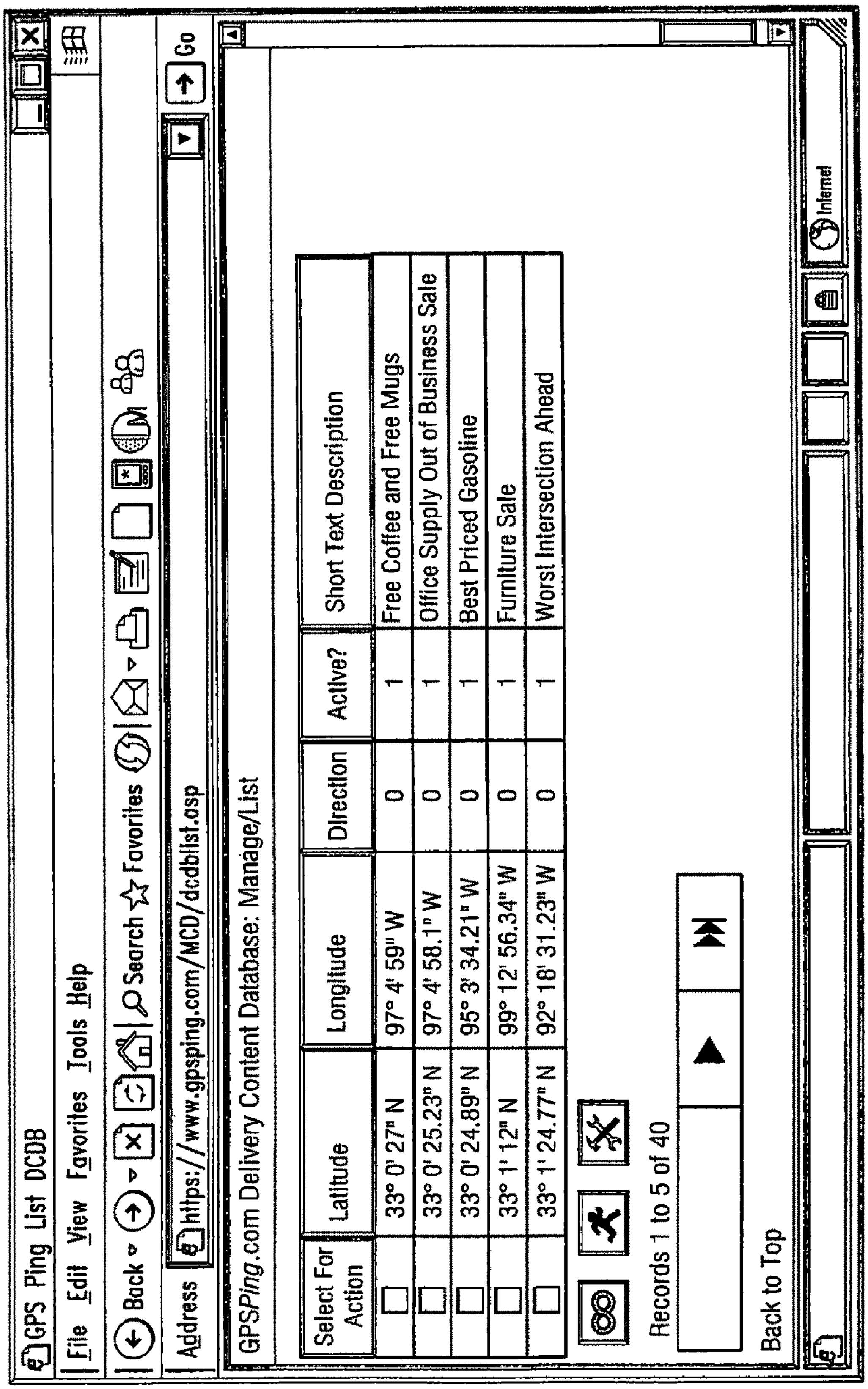
Figure 134A:
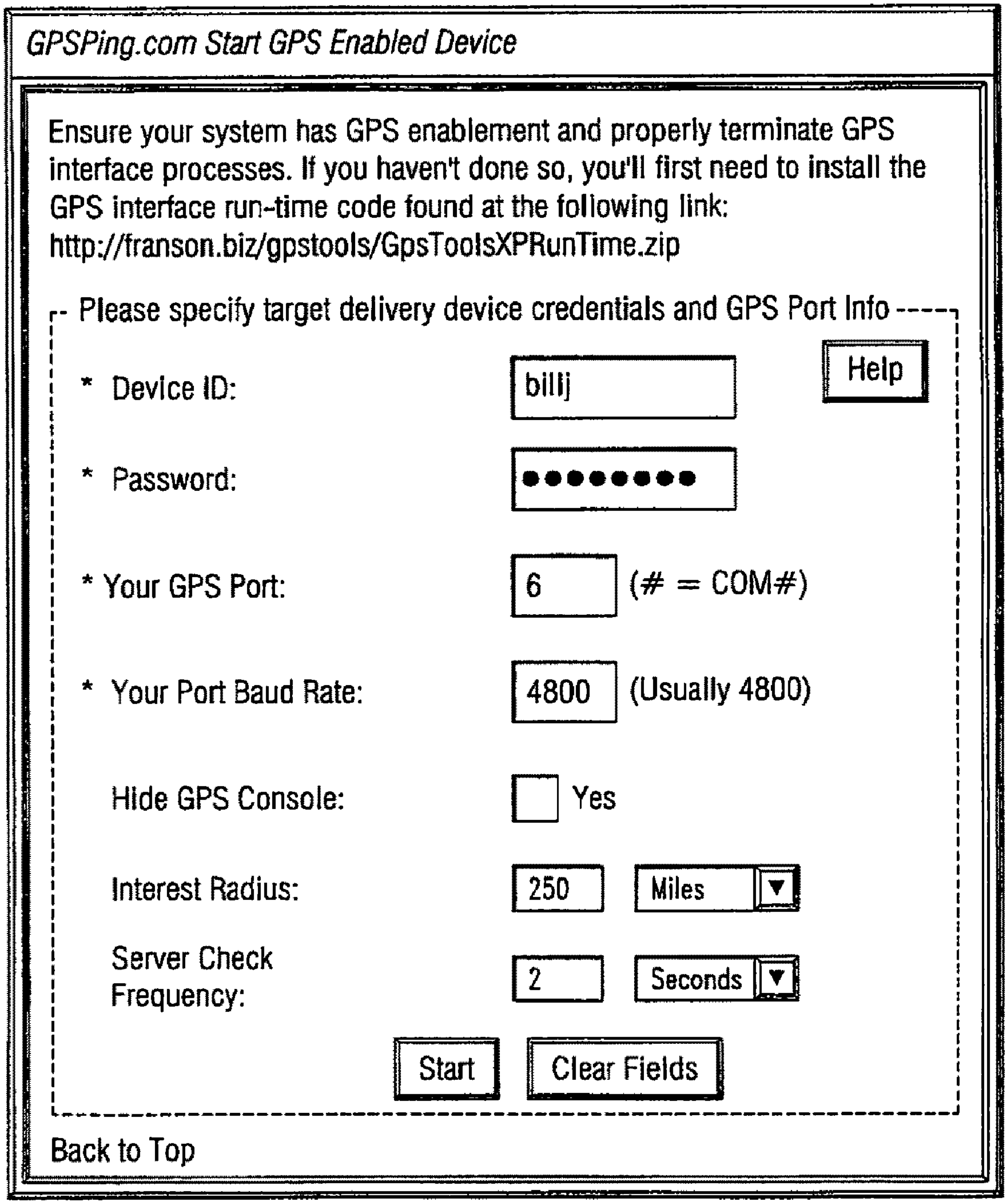
Figure 134B:
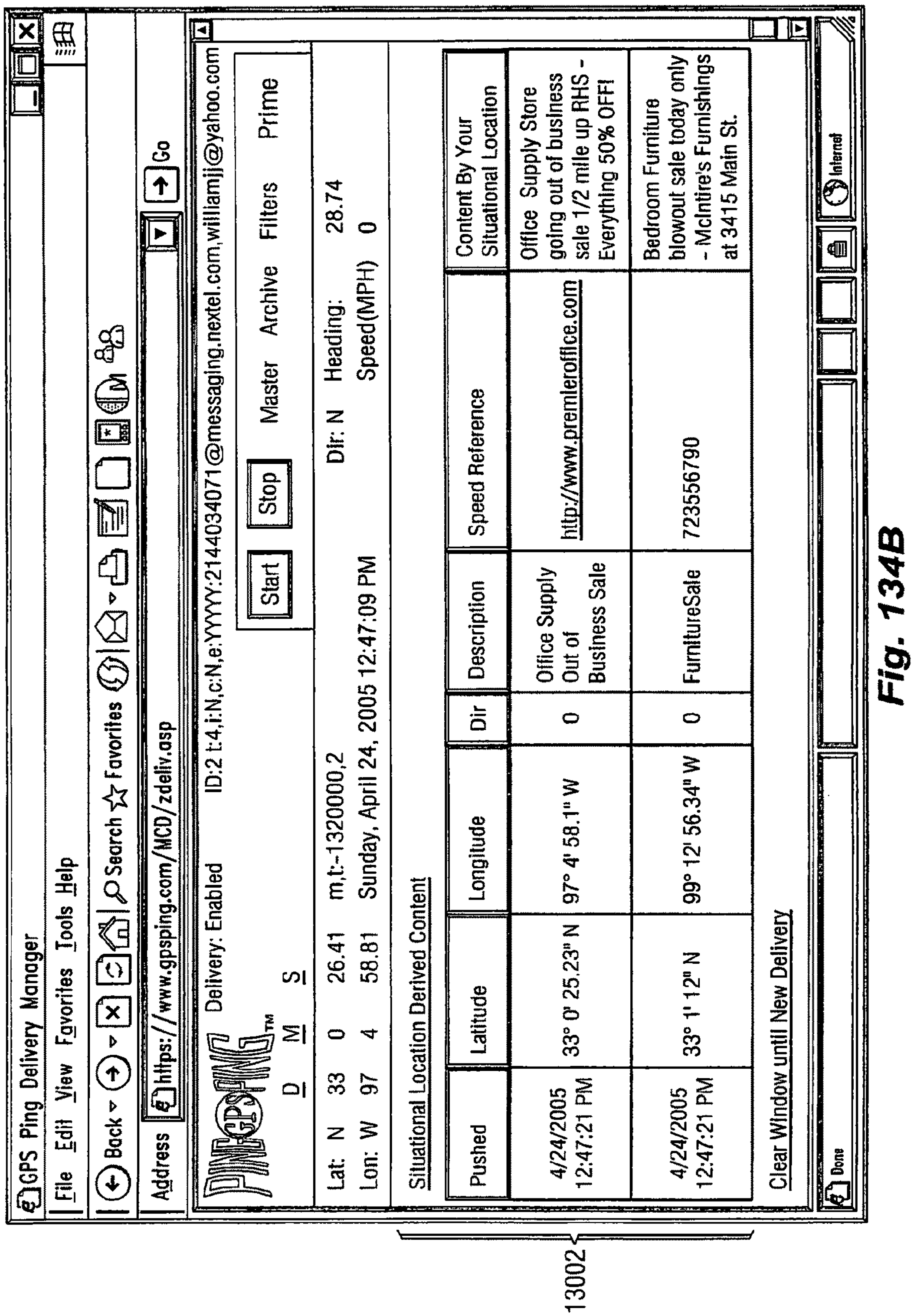

FIGS. 71E and 71F depict preferred embodiment screenshots for modifying DCDB information of a selected DCDB record;

FIG. 71G depicts a preferred embodiment screenshot for results from searching the web service DCDB records after a user search specification, and then user selecting records to manage;

FIG. 71H depicts a preferred embodiment screenshot for viewing a plurality of selected DCDB records;

FIGS. 71I and 71J depict preferred embodiment screenshots for modifying a plurality of selected DCDB records;

FIG. 72 depicts a flowchart for a preferred embodiment for processing the request to select a DCDB situational location from a map;

FIG. 73 depicts a flowchart for a preferred embodiment for processing the request to geo-translate address criteria into latitude and longitude coordinates for a DCDB situational location;

FIG. 74 depicts a flowchart for a preferred embodiment for processing the request to automatically get the current situational location, for example a latitude and longitude, of the requesting device;

FIG. 75A depicts a preferred embodiment screenshot for priming the automatic retrieval of a situational location, for example GPS coordinates;

FIG. 75B depicts a preferred embodiment screenshot demonstrating activity in priming the automatic retrieval of a situational location, for example GPS coordinates;

FIG. 76 depicts a flowchart for a preferred embodiment for processing the request to convert one form of situational location information into another form of situational location, for example decimal degree specifications of latitude and longitude into degrees, minutes, and seconds specifications;

FIG. 77 depicts a flowchart for a preferred embodiment for processing the submittal to add a record to the web service;

FIG. 78 depicts a preferred embodiment of a data record in the Indicator Table used to maintain delivery indicators for the web service;

FIG. 79A depicts a preferred embodiment screenshot for adding an Indicator record to the web service;

FIG. 79B depicts a preferred embodiment screenshot for results from searching the web service Indicator records;

FIG. 80 depicts a flowchart for a preferred embodiment for processing the request to present Indicators for DCDB assignment;

FIG. 81 depicts a flowchart for a preferred embodiment for Indicator management form processing;

FIG. 82 depicts a preferred embodiment of a data record in the DCDB Indicator Assignment Table used to associate Indicators to DCDB records;

FIG. 83 depicts a preferred embodiment screenshot for selecting an Indicator to be associated with a DCDB record;

FIG. 84A depicts a flowchart for a preferred embodiment for processing the request to configure personal Indicators;

FIG. 84B depicts a flowchart for a preferred embodiment for adding a personal Indicator record;

FIG. 85 depicts a preferred embodiment screenshot for managing personal Indicators;

FIG. 86 depicts a block diagram depicting the automated data transform service components for automatic population of the deliverable content database according to the present disclosure;

FIG. 87 depicts a flowchart for describing the automated data transform aspects of the present disclosure;

FIG. 88 depicts a flowchart for describing the post-transform data manipulator aspects of the present disclosure;

FIG. 89 depicts a preferred embodiment of a data record in the Groups Table;

FIG. 90A depicts a preferred embodiment screenshot for adding a Groups Table record to the web service;

FIG. 90B depicts a preferred embodiment screenshot for results from searching Groups Table records;

FIG. 91A depicts a flowchart for a preferred embodiment for processing the request to manage PingPal privileges;

FIG. 91B depicts a flowchart for a preferred embodiment of carrying out processing for assigning privileges to other users, or devices, of the web service;

FIG. 91C depicts a flowchart for a preferred embodiment for checkmark processing of PingPal management;

FIG. 92 depicts a preferred embodiment of a data record in the PingPal Privilege Assignment Table;

FIG. 93A depicts a preferred embodiment screenshot for setting the assignor and privileges for assignment;

FIG. 93B depicts a preferred embodiment screenshot for discussing the assignor dropdown when setting the assignor and privileges for assignment;

FIG. 93C depicts a preferred embodiment screenshot for discussing the privilege group dropdown when setting the assignor and privileges for assignment;

FIG. 93D depicts a preferred embodiment screenshot for assigning privileges to assignees that are users;

FIG. 93E depicts a preferred embodiment screenshot for assigning privileges to assignees that are devices;

FIG. 94A depicts a preferred embodiment of a data record in the Pingimeter Attribute Extension Table;

FIG. 94B depicts a preferred embodiment of a data record in the Pingimeter Table;

FIG. 95 depicts a preferred embodiment of a data record in the Triggers Table;

FIG. 96A depicts a preferred embodiment screenshot of the Alerts option of the Services option from a public interface of the web service demonstrating circular specifications of an area on a map, for example for Pingimeters and PingSpots;

FIG. 96B depicts a preferred embodiment screenshot demonstrating rectangular specification of an area on a map;

FIG. 96C depicts a preferred embodiment screenshot demonstrating polygon specification of an area on a map;

FIG. 96D depicts a preferred embodiment screenshot demonstrating point specification of an area on a map;

FIG. 97A depicts a flowchart for a preferred embodiment for processing the request to find device(s) (e.g. PingPal(s));

FIG. 97B depicts a flowchart for a preferred embodiment for processing the request to set map preferences;

FIG. 98A depicts a flowchart for a preferred embodiment for processing the request to find routes of device(s) (e.g. PingPal(s));

FIG. 98B depicts a flowchart for a preferred embodiment for processing the request to report on device(s) (e.g. PingPal(s));

FIG. 98C depicts a flowchart for a preferred embodiment for processing the request to discover PingPal(s) providing privileges;

FIG. 99 depicts a flowchart for a preferred embodiment for processing the request to find nearby PingPal(s);

FIG. 100A depicts a preferred embodiment screenshot for finding Pingpal(s);

FIG. 100B depicts a preferred embodiment screenshot for setting map preferences;

FIG. 100C depicts a preferred embodiment screenshot for finding routes of Pingpal(s);

FIG. 100D depicts a preferred embodiment screenshot for reporting on the whereabouts of PingPal(s);

FIG. 100E depicts a screenshot for explaining frames used to carry out a preferred embodiment of find services;

FIG. 100F depicts a preferred embodiment screenshot for a find result on a PingPal;

FIG. 100G depicts a preferred embodiment screenshot for a find result on PingPals;

FIG. 100H depicts a preferred embodiment screenshot for a find route result on a PingPal;

FIG. 100I depicts a preferred embodiment screenshot for a find routes result on Pingpals;

FIG. 101 depicts a preferred embodiment of a data record in the Profile Table;

FIG. 102 depicts a preferred embodiment of a data record in the Profile Assignment Table;

FIG. 103 depicts a flowchart for a preferred embodiment for processing user preferred settings for automatically populating user interface variables;

FIG. 104A depicts a flowchart for a preferred embodiment for processing a request for the Filters Maps option;

FIG. 104B depicts a flowchart for a preferred embodiment for processing a request for the Filters Specify option;

FIGS. 105A through 105C depict preferred embodiment screenshots for selecting maps for filter settings;

FIG. 106A depicts a preferred embodiment screenshot for starting the Delivery Manager;

FIG. 106B depicts a preferred embodiment screenshot for the interest radius specification dropdown of the interface for starting the Delivery Manager;

FIG. 106C depicts a preferred embodiment screenshot for the server check frequency specification dropdown of the interface for starting the Delivery Manager;

FIG. 107 depicts a preferred embodiment of a data record in the Delivery History Table;

FIG. 108 depicts a flowchart for a preferred embodiment of processing for requesting to manage an Archive or Master;

FIG. 109 depicts a flowchart for a preferred embodiment of Archive and Master processing;

FIG. 110A depicts a preferred embodiment screenshot for modifying a Registry record;

FIG. 110B depicts a preferred embodiment screenshot for the presentation of Archive records;

FIG. 111 depicts a preferred embodiment screenshot of a list of DCDB records;

FIG. 112 depicts a flowchart for a preferred embodiment of Delivery Manager device interface processing;

FIG. 113 depicts a flowchart for a preferred embodiment of Delivery Manager frame set processing;

FIG. 114A depicts a flowchart for a preferred embodiment of Delivery Manager header presentation processing;

FIG. 114B depicts a flowchart for a preferred embodiment of Delivery Manager user interface action processing;

FIG. 115 depicts a flowchart for a preferred embodiment of Delivery Manager initialization page processing;

FIG. 116 depicts a flowchart for a preferred embodiment of Delivery Manager start button processing;

FIG. 117A depicts a flowchart for a preferred embodiment of Delivery Manager stop button processing;

FIG. 117B depicts a flowchart for a preferred embodiment of Delivery Manager start receipt processing;

FIG. 117C depicts a flowchart for a preferred embodiment of Delivery Manager stop receipt processing;

FIG. 118 depicts a flowchart for a preferred embodiment of Delivery Manager processing for automatically determining situational location parameters, for example GPS parameters;

FIG. 119 depicts a flowchart for a preferred embodiment of Delivery Manager do again processing;

FIG. 120 depicts a flowchart for a preferred embodiment of Delivery Manager heartbeat processing;

FIG. 121 depicts a flowchart for a preferred embodiment of Delivery Manager Build Master processing;

FIG. 122 depicts a flowchart for a preferred embodiment of Delivery Manager PingSpot processing;

FIG. 123 depicts a flowchart for a preferred embodiment of Delivery Manager Pingimeter processing;

FIG. 124 depicts a flowchart for a preferred embodiment of Delivery Manager Nearby processing;

FIGS. 125A through 125C illustrate radius configurations of mobile users and/or DCDB records;

FIG. 126 depicts a flowchart for a preferred embodiment of Delivery Manager Master presentation processing;

FIG. 127 depicts a flowchart for a preferred embodiment of generic Delivery Manager authentication processing;

FIG. 128A depicts a preferred embodiment screenshot for a full browser Delivery Manager prior to starting delivery processing;

FIG. 128B depicts a preferred embodiment screenshot for an empty Master;

FIG. 128C depicts a preferred embodiment screenshot for presentation of records in an Archive;

FIG. 128D depicts a preferred embodiment screenshot for a full browser Device settings interface;

FIG. 128E depicts a preferred embodiment screenshot for a full browser Delivery Manager after starting delivery processing;

FIG. 129 depicts a preferred embodiment screenshot for listing DCDB records;

FIG. 130A depicts a preferred embodiment screenshot for a full browser Delivery Manager after traveling to a situational location having an applicable DCDB record;

FIG. 130B depicts a preferred embodiment screenshot for an automated email delivery after traveling to a situational location having an applicable DCDB record;

FIG. 130C depicts a preferred embodiment screenshot for records in a Master;

FIG. 130D depicts a preferred embodiment screenshot for an empty Master;

FIG. 131 depicts a preferred embodiment screenshot for presentation of records in an Archive;

FIG. 132 depicts a preferred embodiment screenshot for a full browser Delivery Manager after starting delivery processing;

FIG. 133A depicts a preferred embodiment screenshot for modifying a plurality of DCDB records;

FIG. 133B depicts a preferred embodiment screenshot for listing DCDB records;

FIG. 134A depicts a preferred embodiment screenshot for starting the Delivery Manager;

FIG. 134B depicts a preferred embodiment screenshot for a full browser Delivery Manager after starting delivery processing and traveling to a situational location with applicable DCDB records.

Figure 134C:
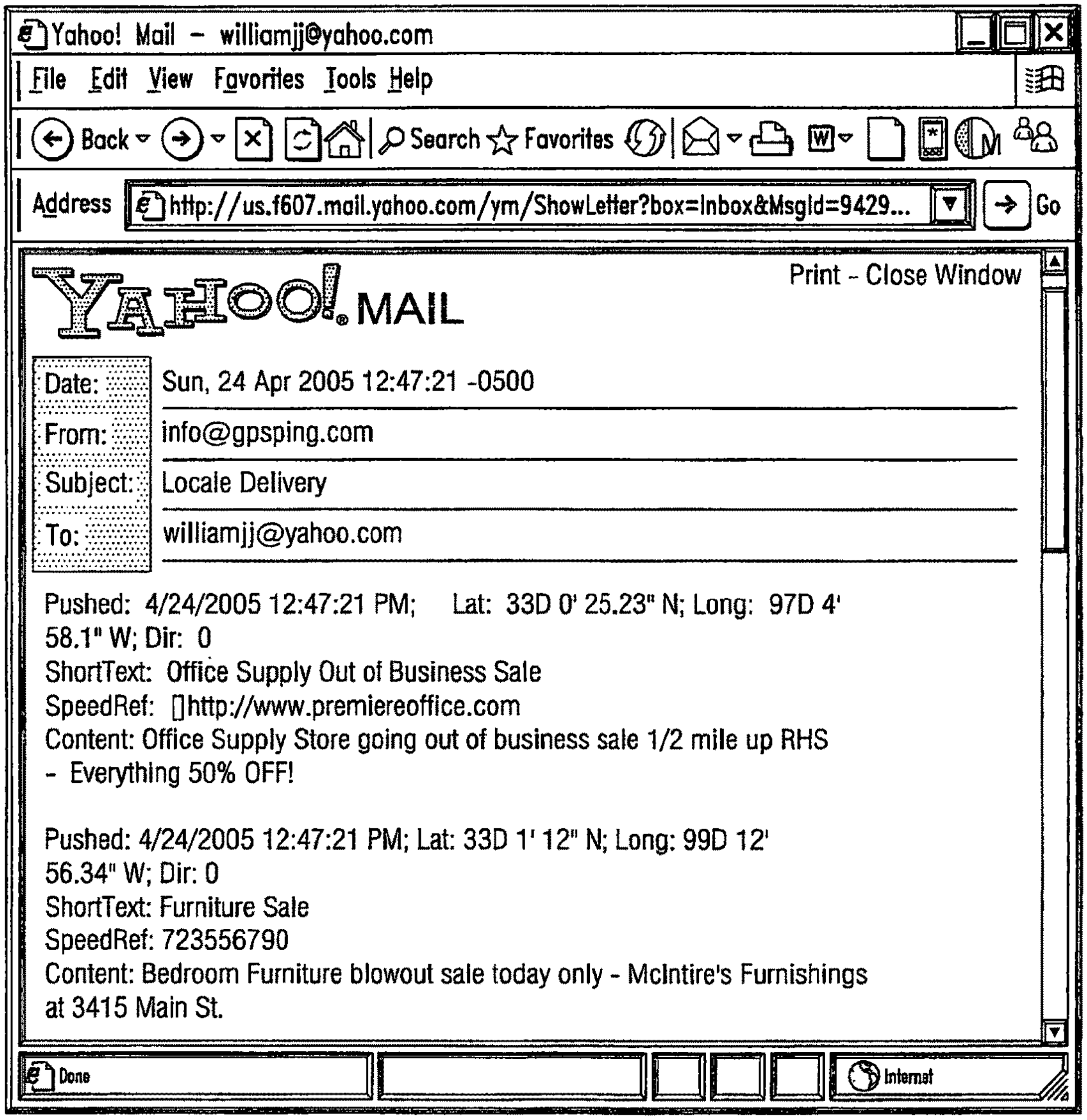
Figure 135:
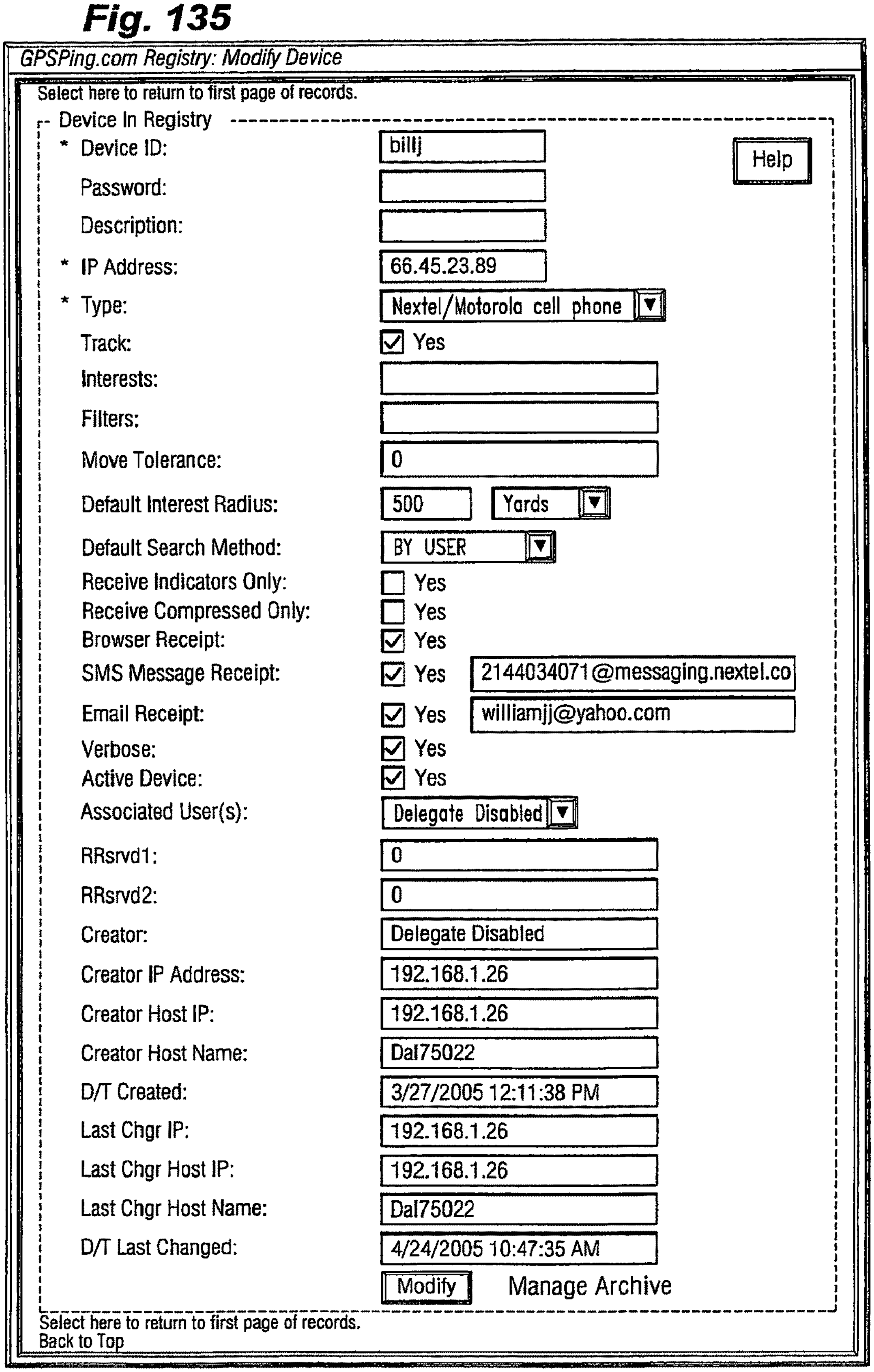
Figure 136B:
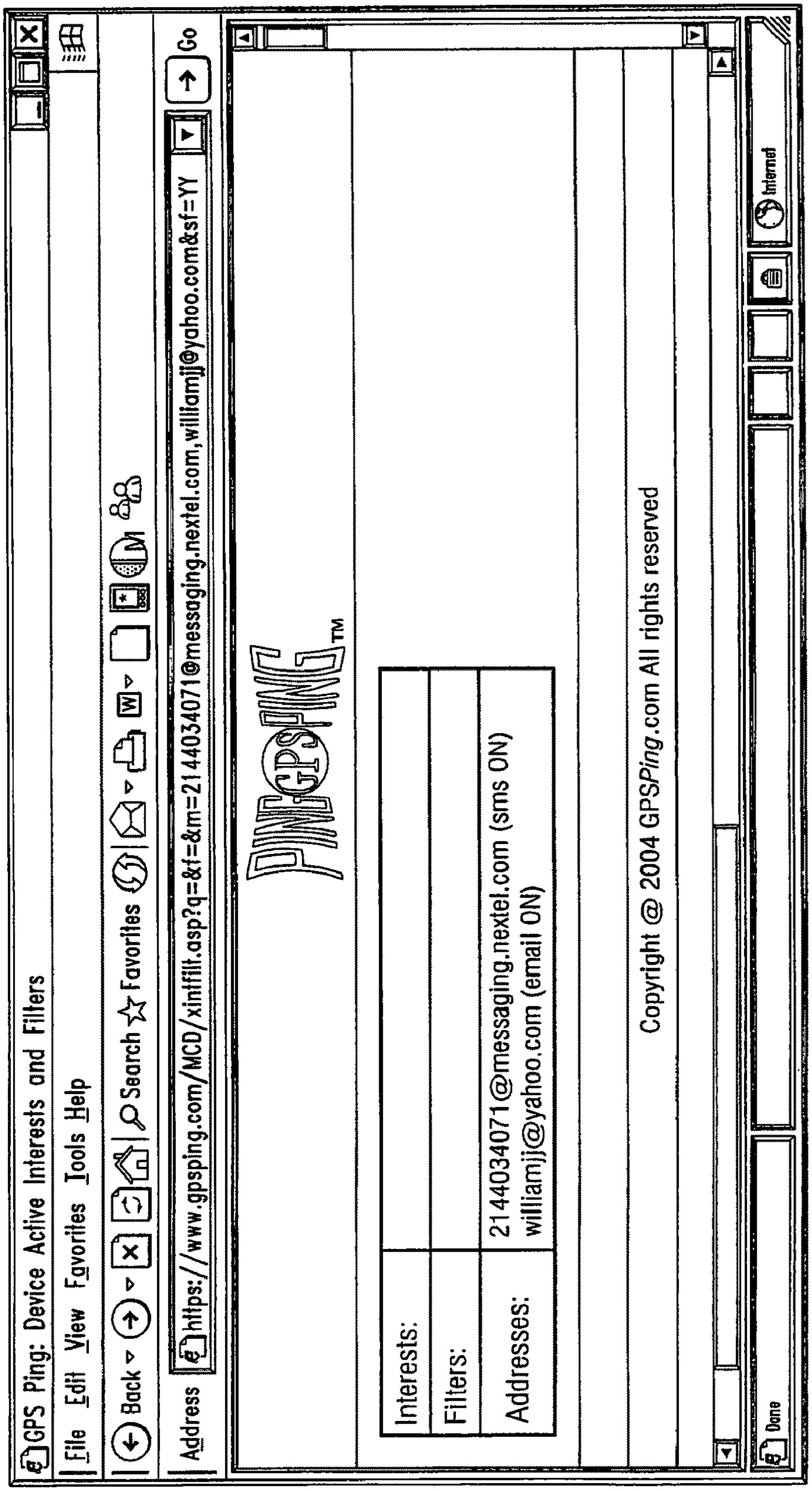
Figure 136C:
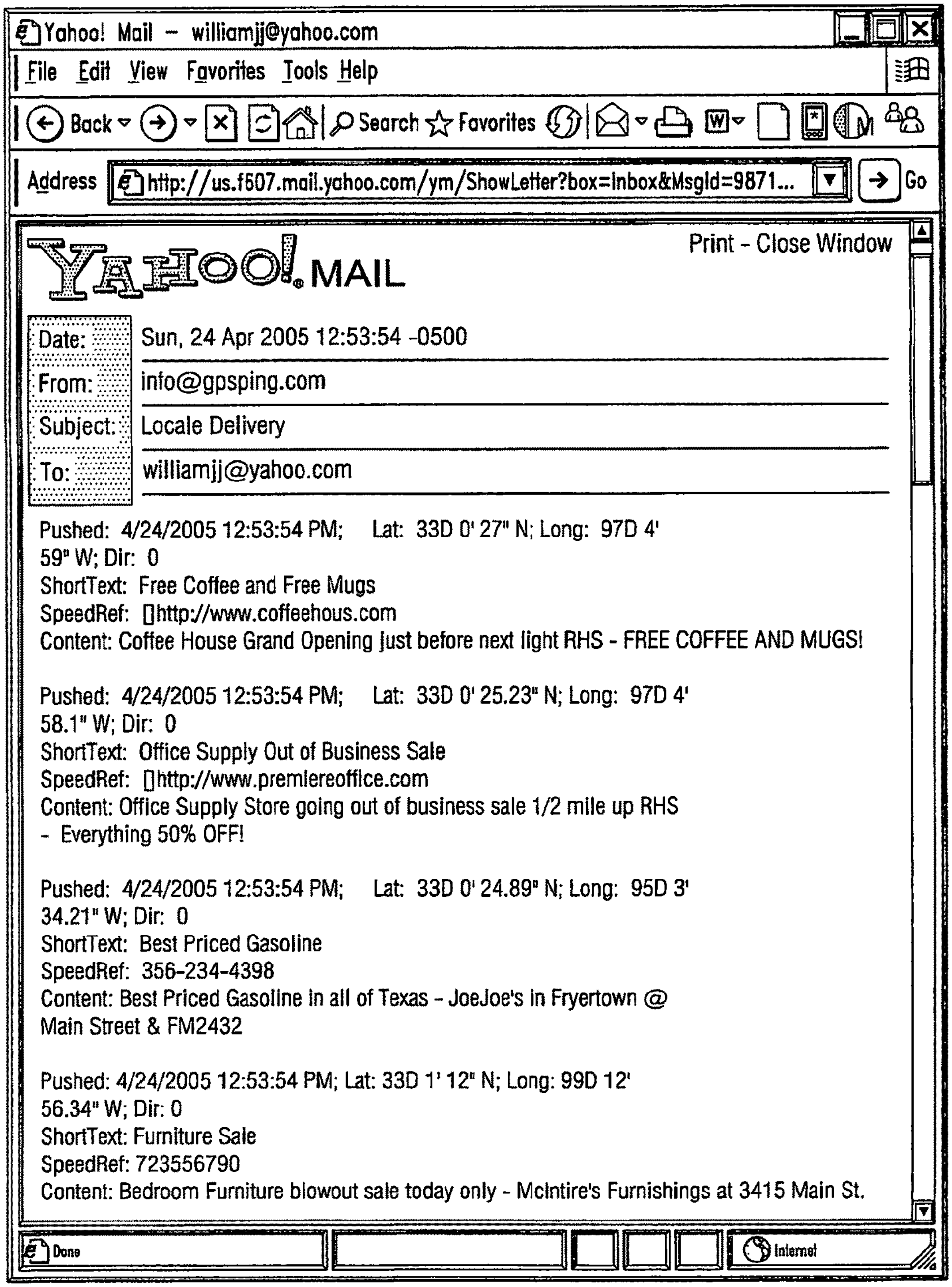
Figure 136D:
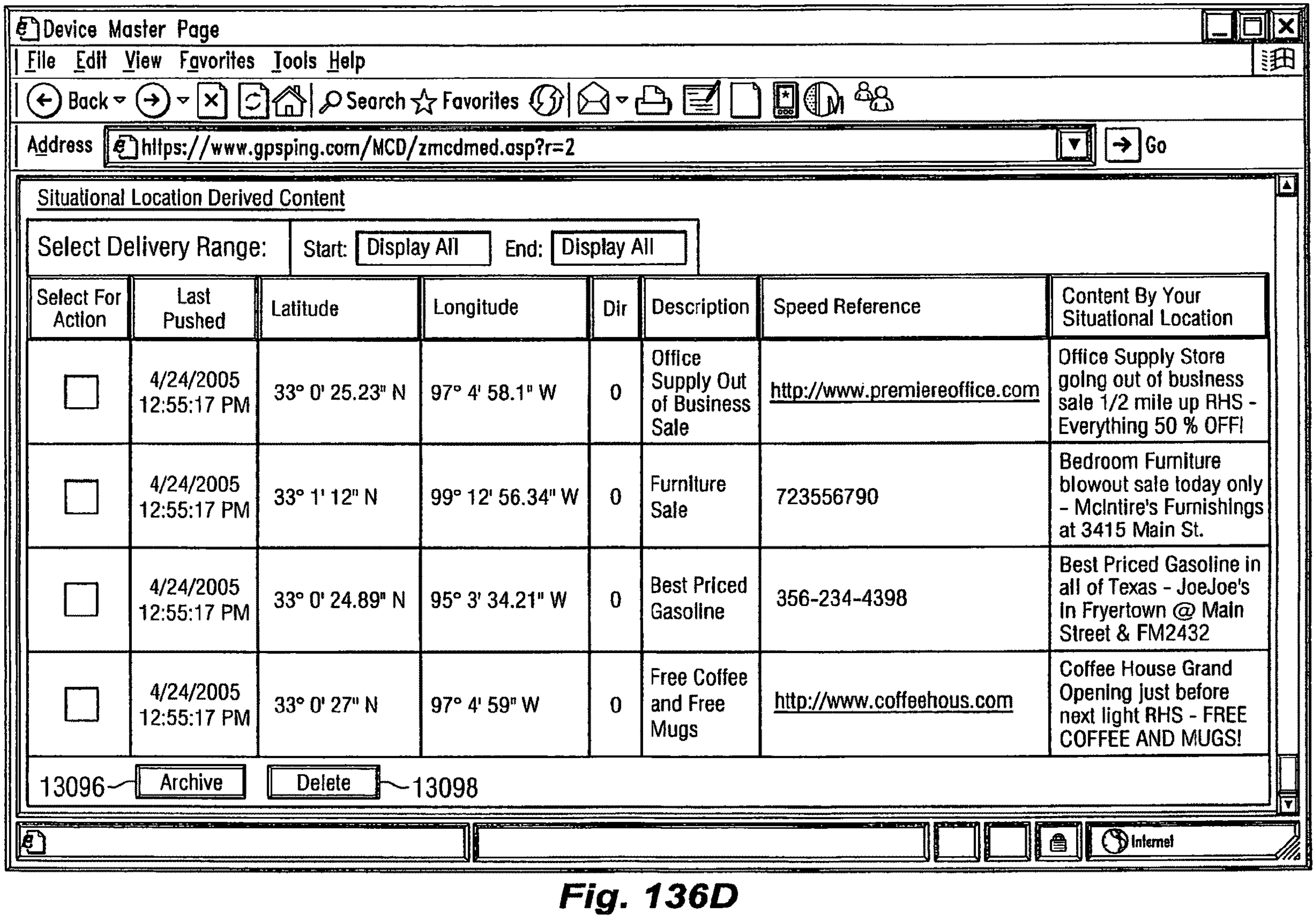
Figure 137:
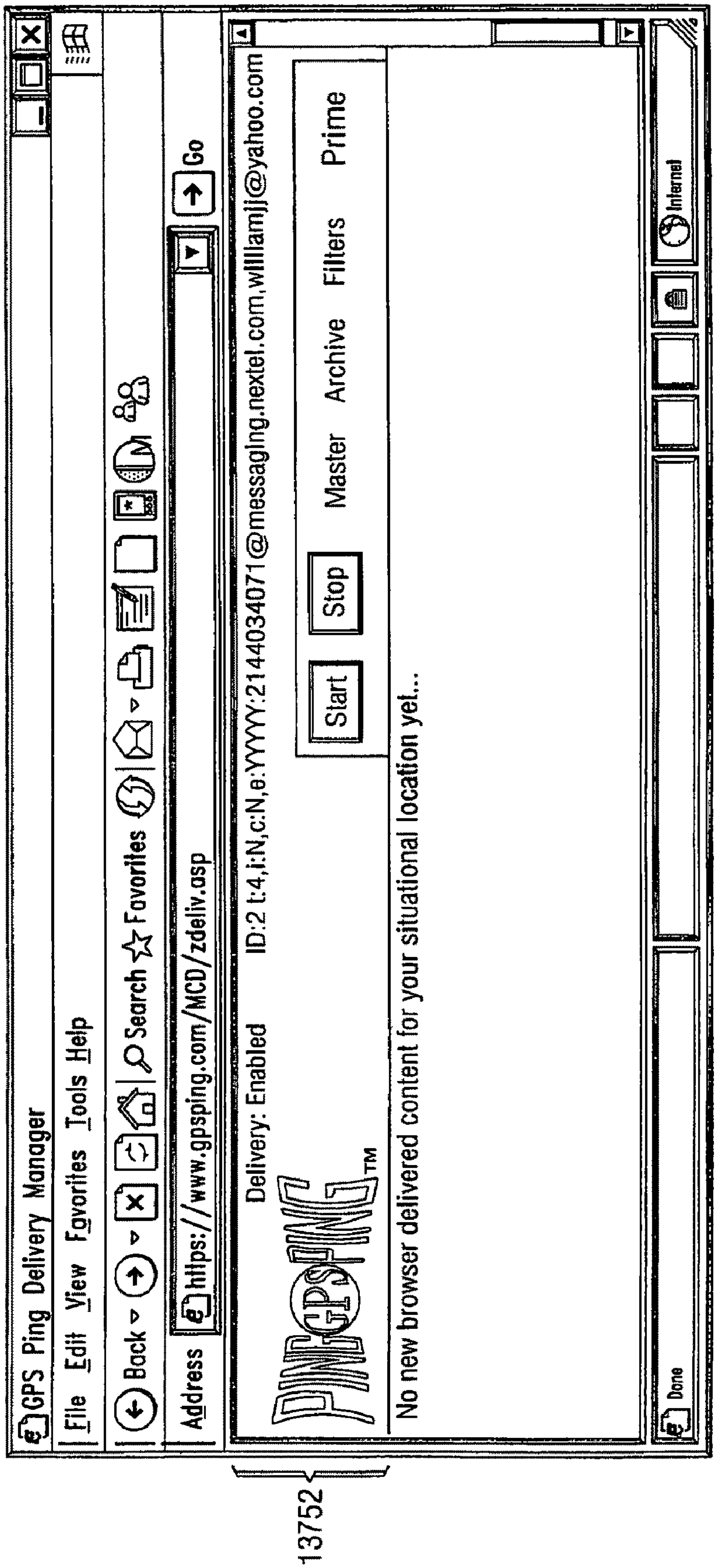
Figure 138A:
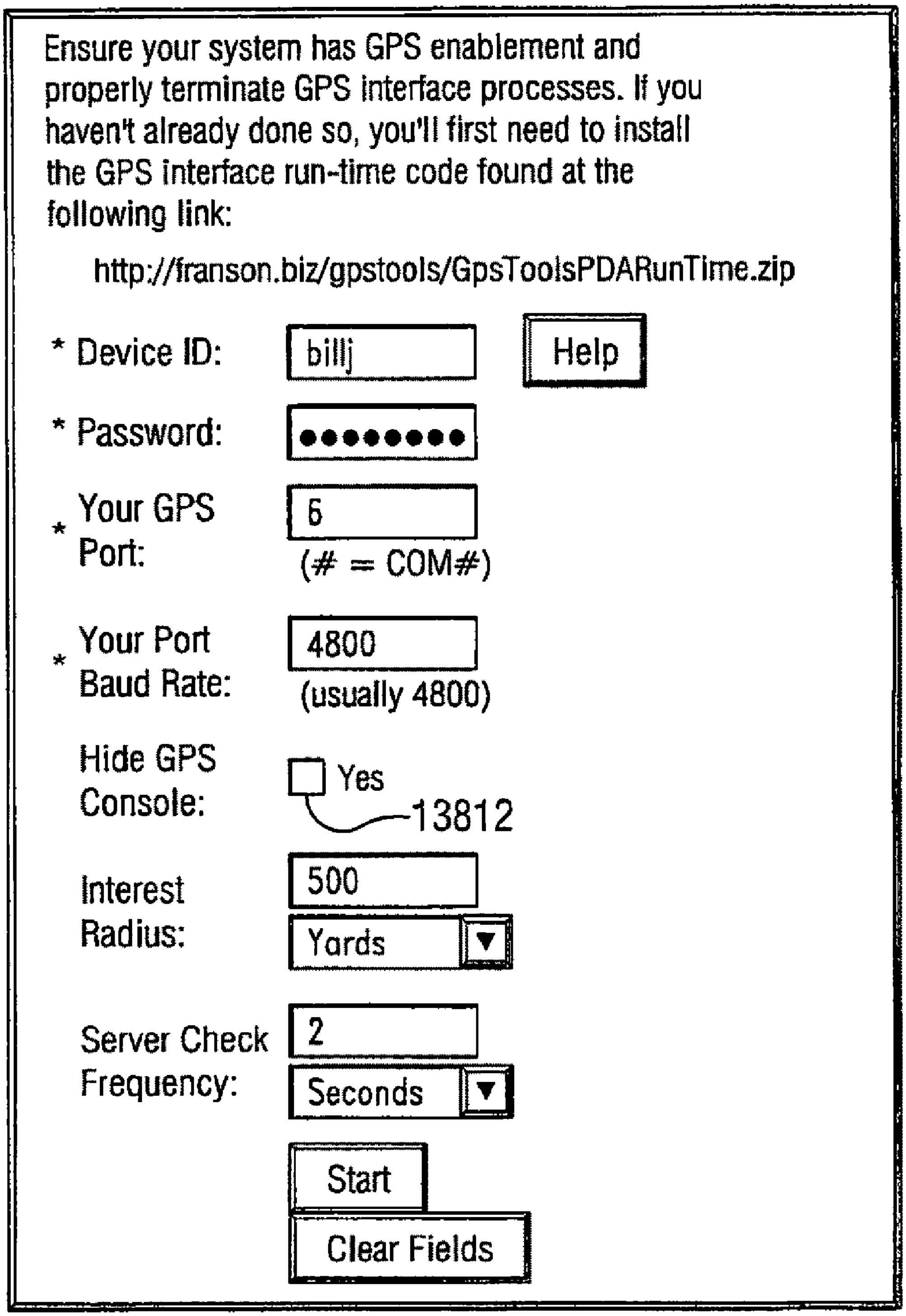
Figure 138B:
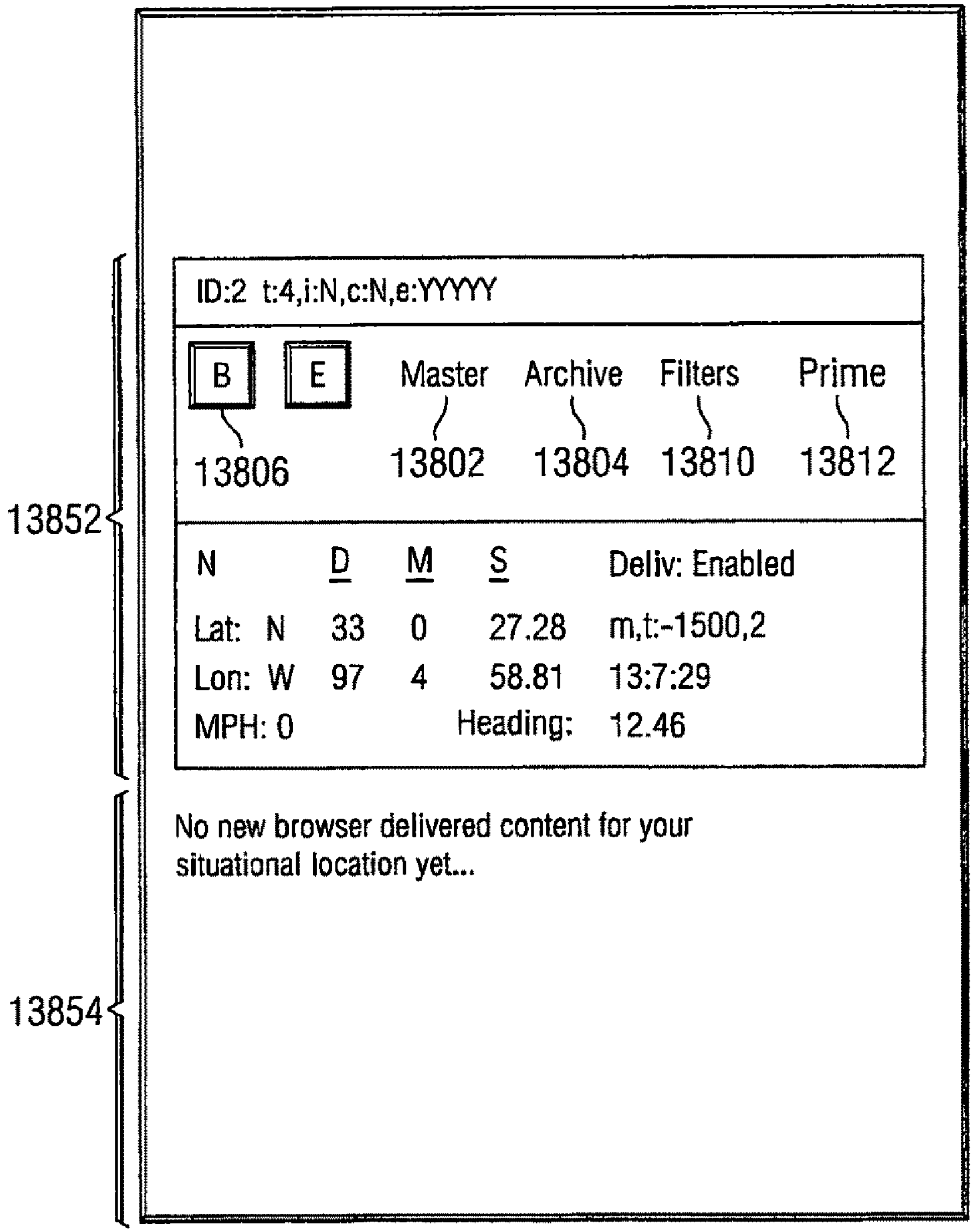

FIG. 134C depicts a preferred embodiment screenshot for an automated email delivery after traveling to a situational location having applicable DCDB records;

FIG. 135 depicts a preferred embodiment screenshot for modifying a Registry record;

FIG. 136A depicts a preferred embodiment screenshot for a full browser Delivery Manager after starting delivery processing and traveling to a situational location with applicable DCDB records;

FIG. 136B depicts a preferred embodiment screenshot for a full browser Device settings interface;

FIG. 134C depicts a preferred embodiment screenshot for an automated email delivery after traveling to a situational location having applicable DCDB records;

FIG. 136D depicts a preferred embodiment screenshot for records in a Master;

FIG. 137 depicts a preferred embodiment screenshot after starting delivery processing for a full browser Delivery Manager with the hide console option set;

FIG. 138A depicts a preferred embodiment screenshot of a Delivery Manager device interface for a PDA;

FIG. 138B depicts a preferred embodiment screenshot for a PDA browser Delivery Manager after starting delivery processing;

FIG. 138C depicts a preferred embodiment screenshot for presenting records in a Master to a PDA;

FIG. 138D depicts a preferred embodiment screenshot for presenting records in an Archive to a PDA.

Figure 139:
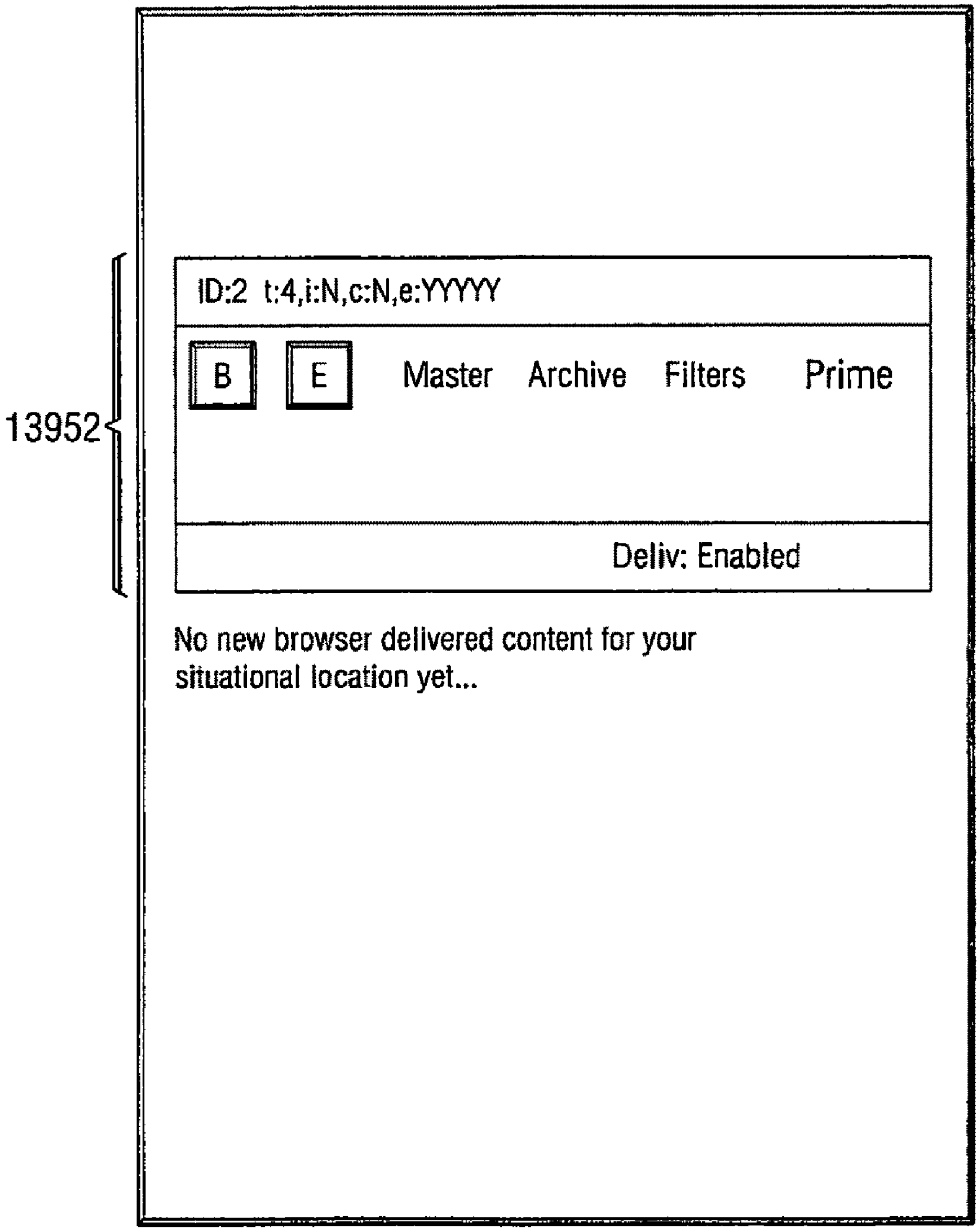
Figure 140:
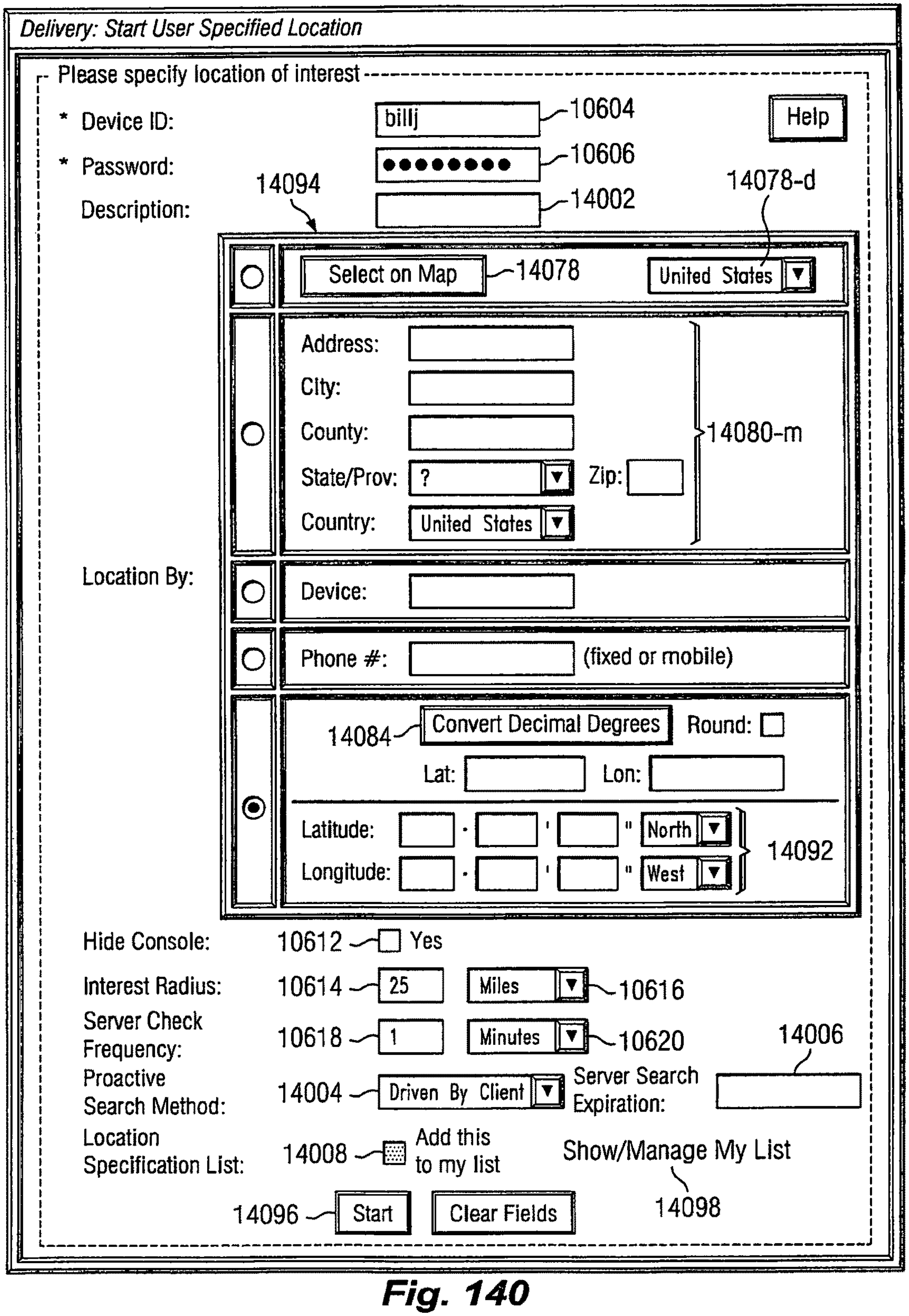
Figure 141:
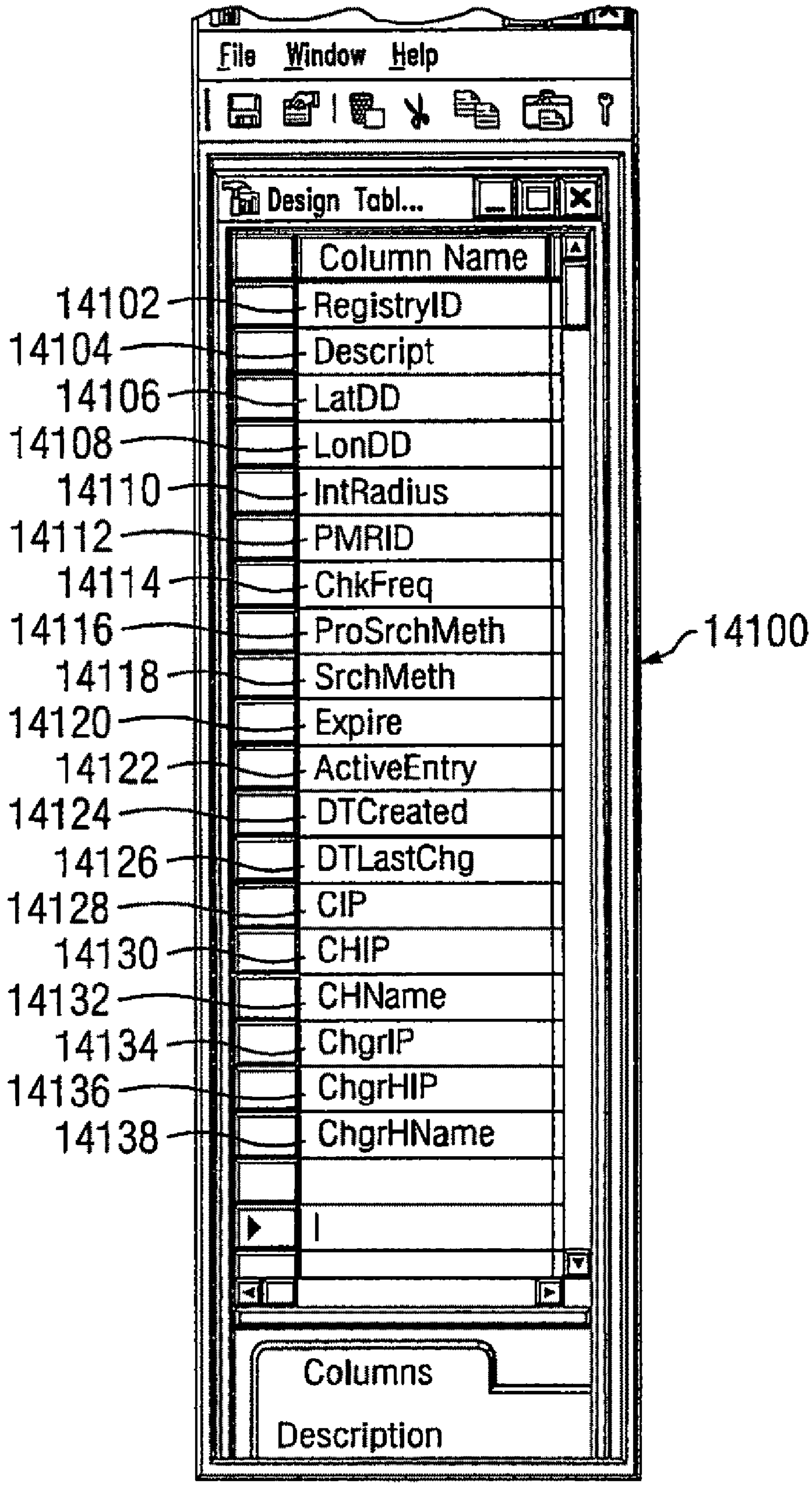
Figure 142A:
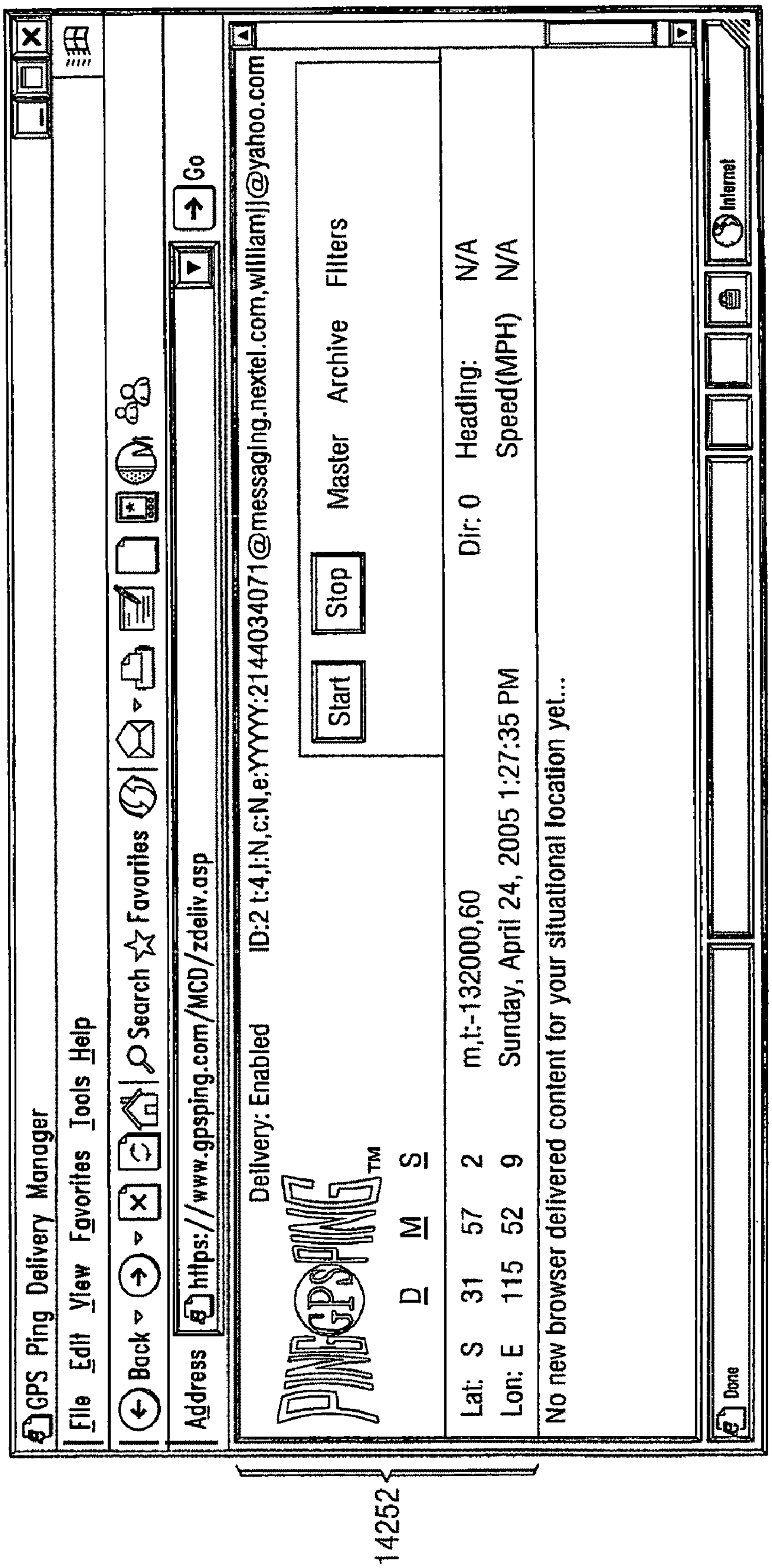
Figure 142B:
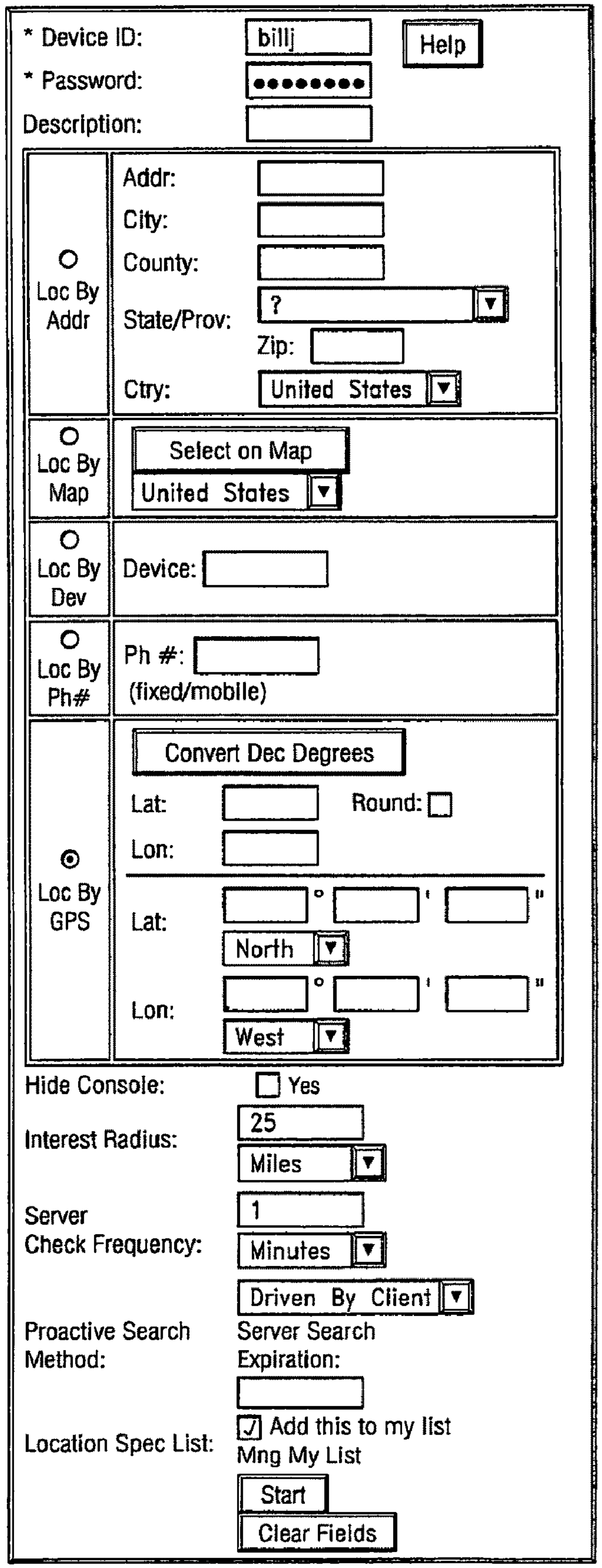
Figure 142C:
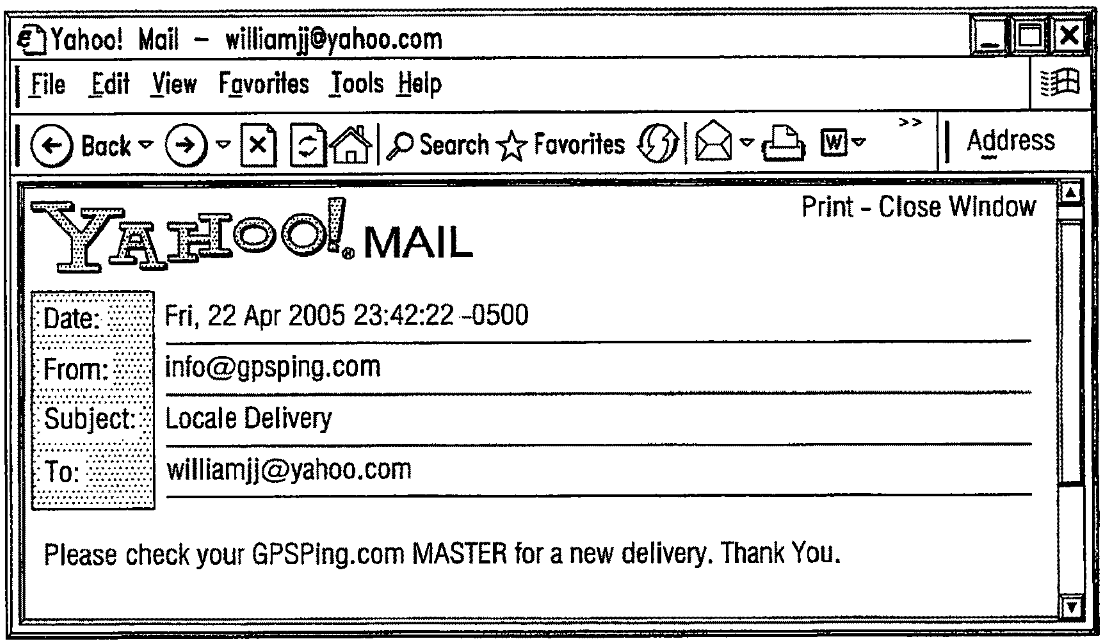
Figure 145:
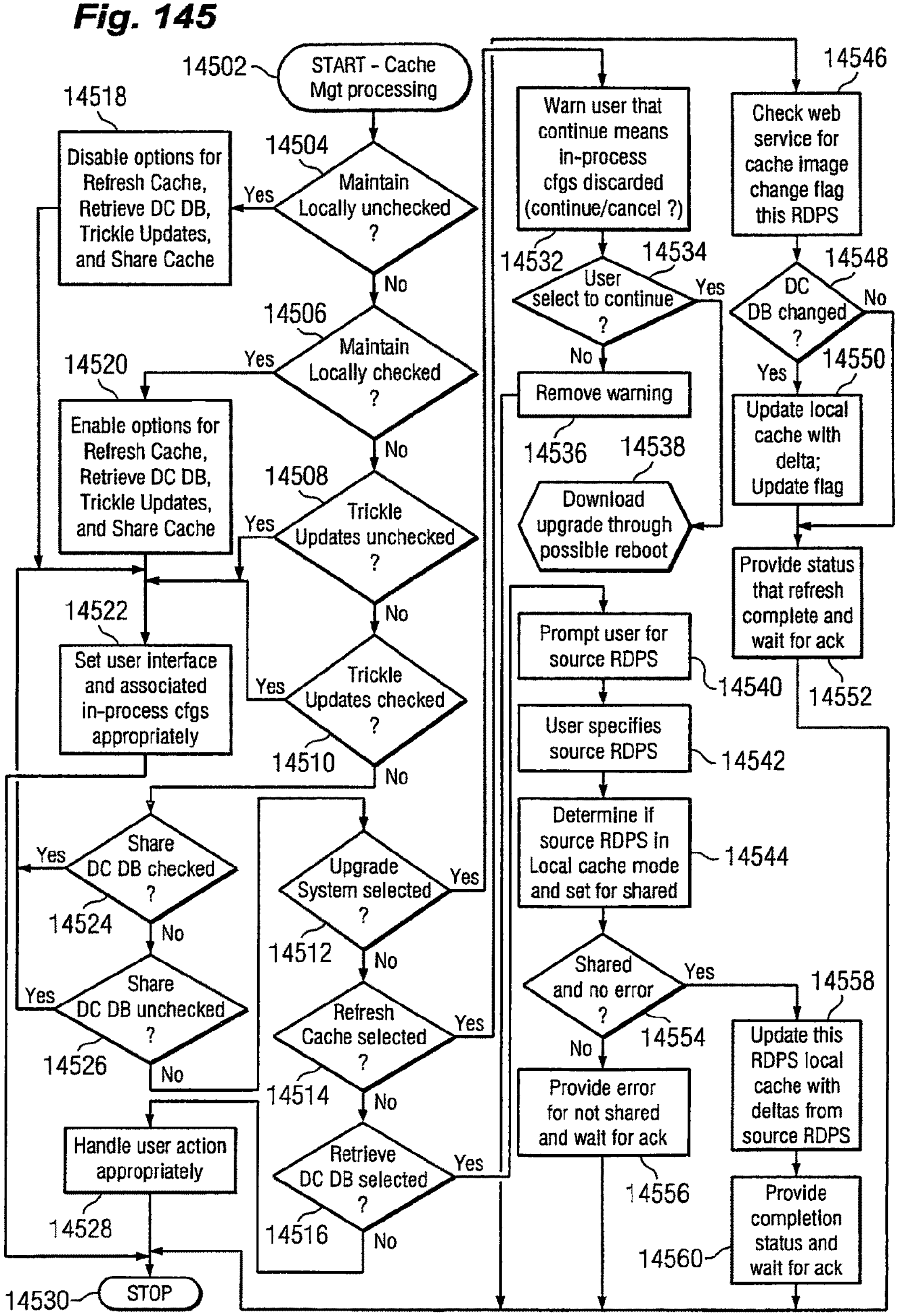
Figure 146:
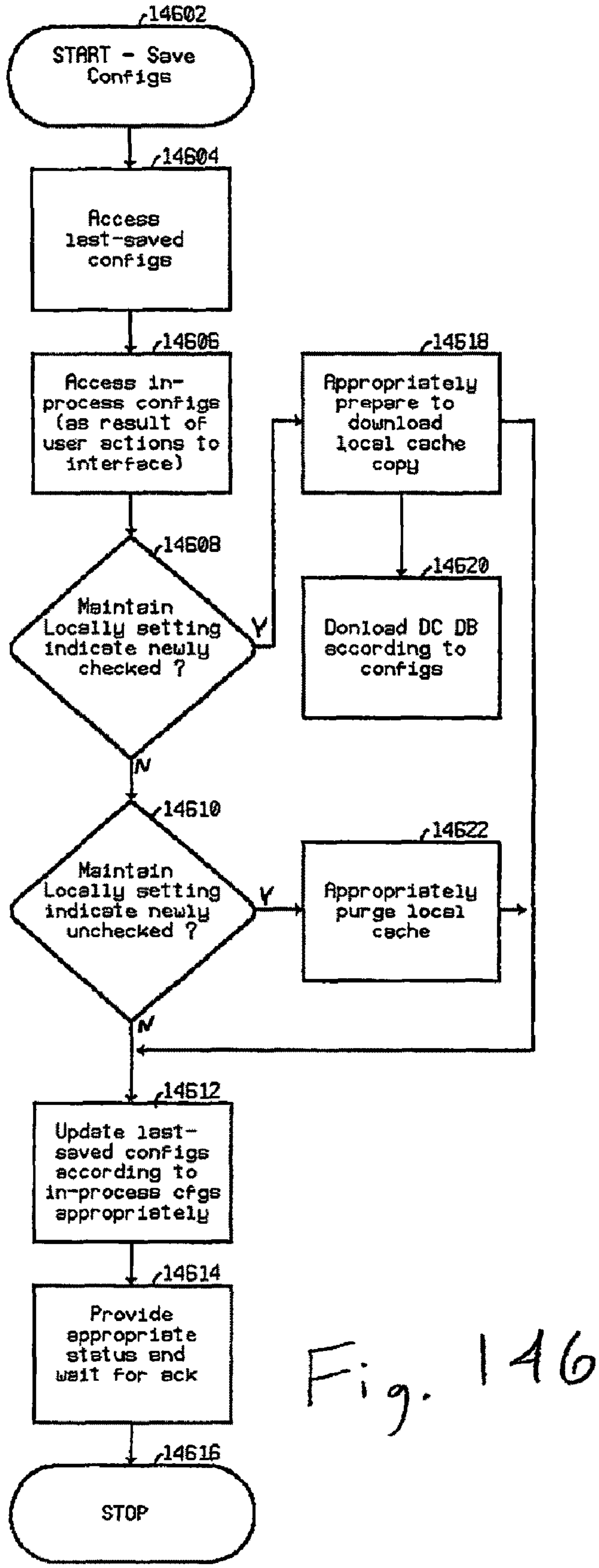
Figure 147:
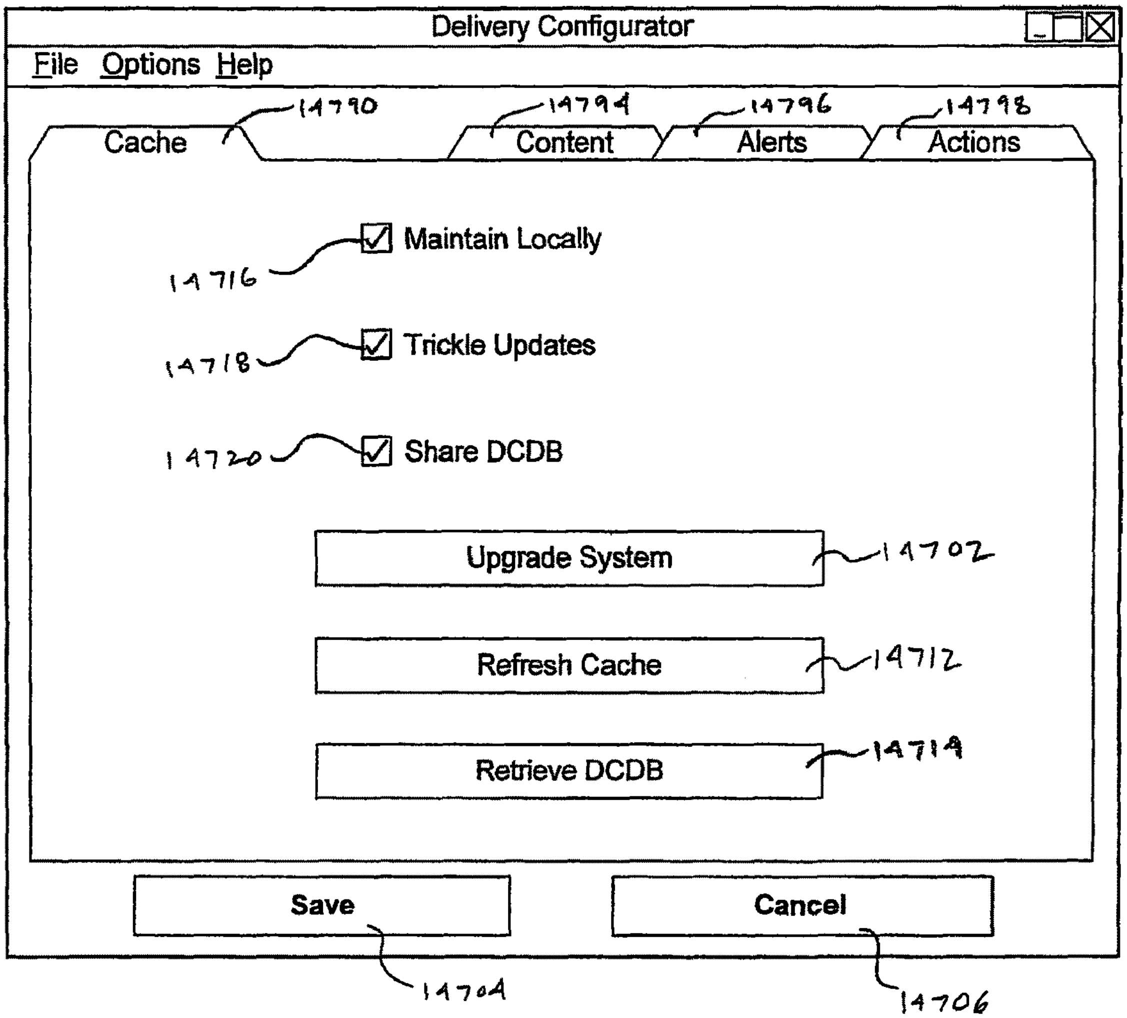
Figure 148:
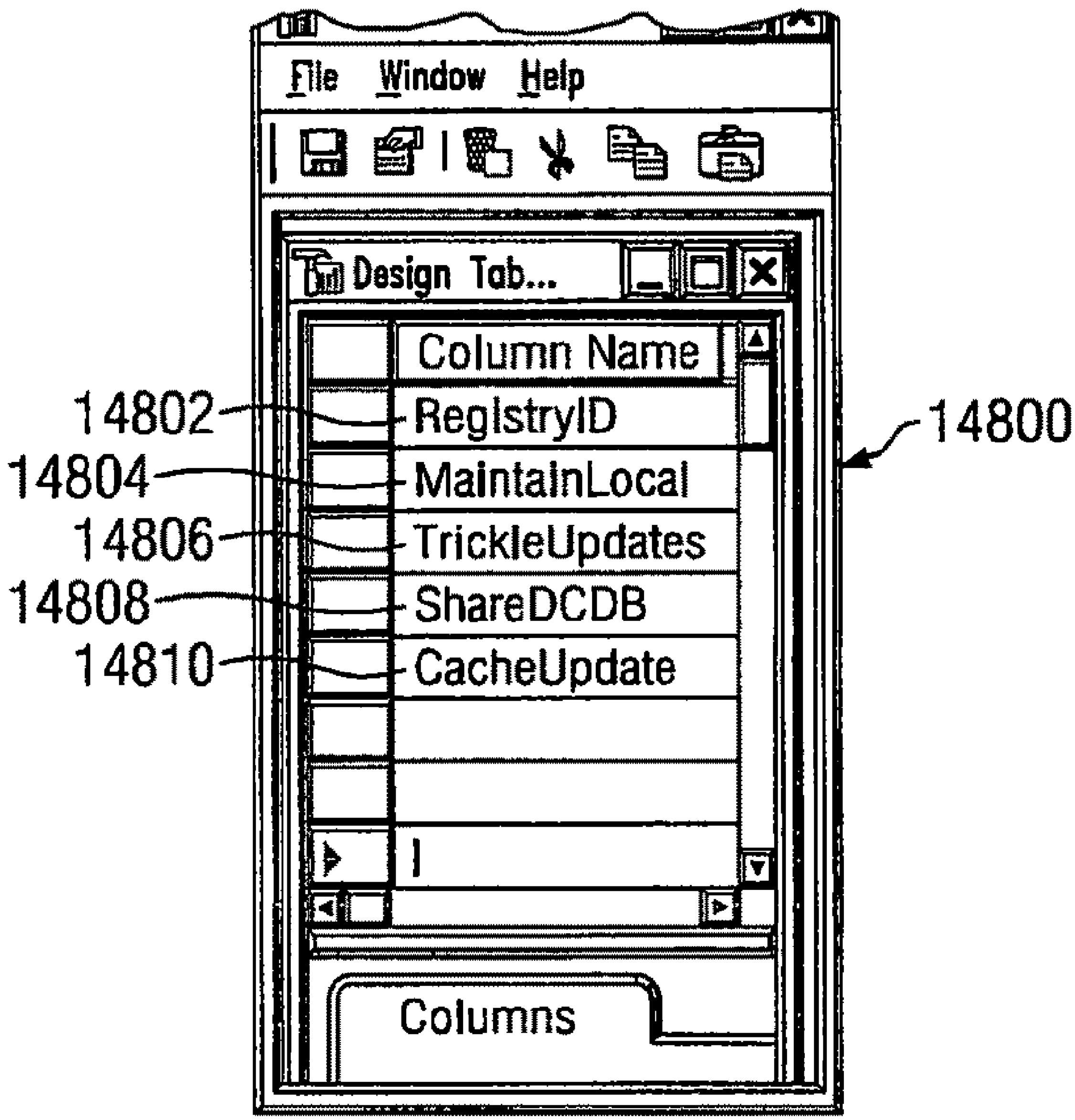
Figure 149:
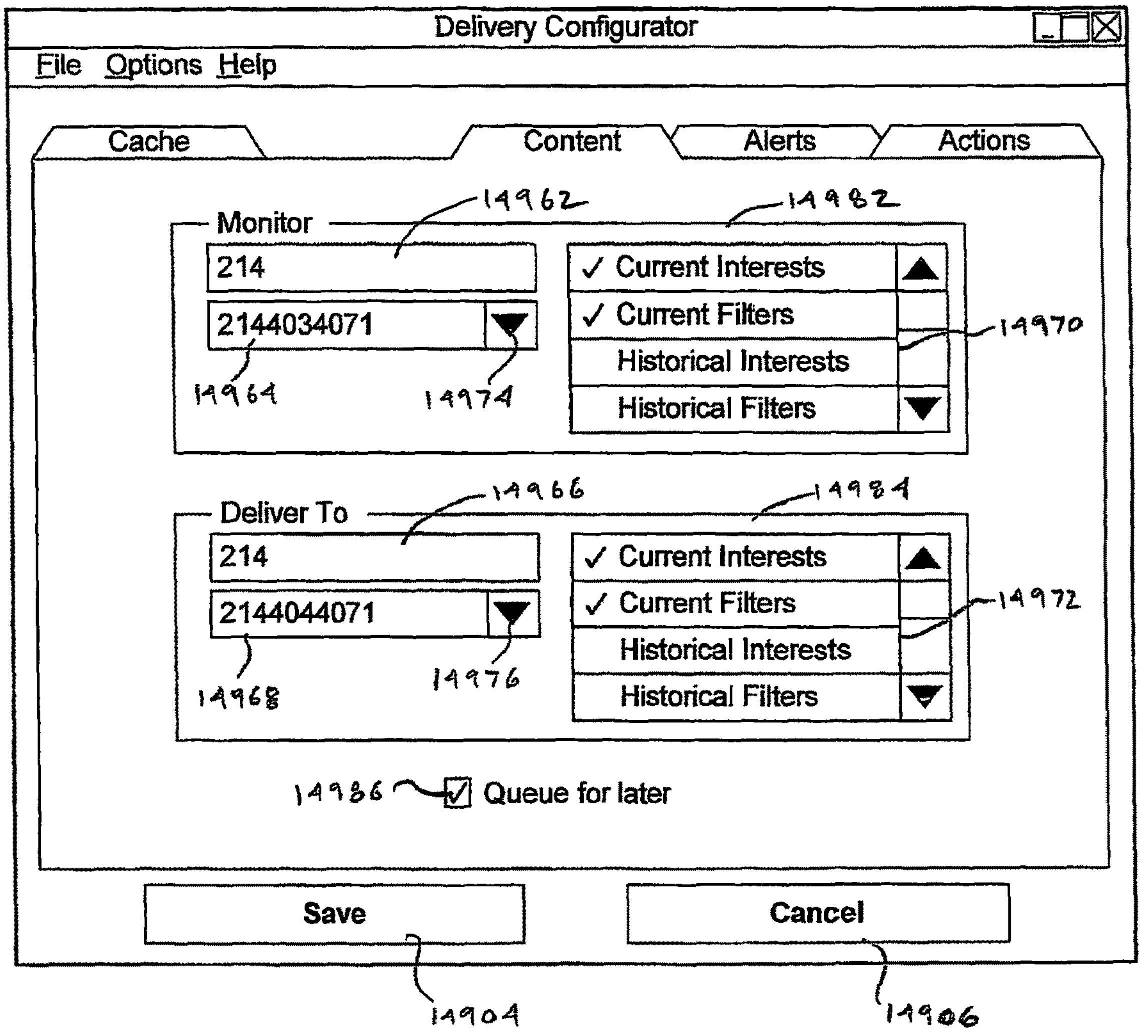
Figure 150:
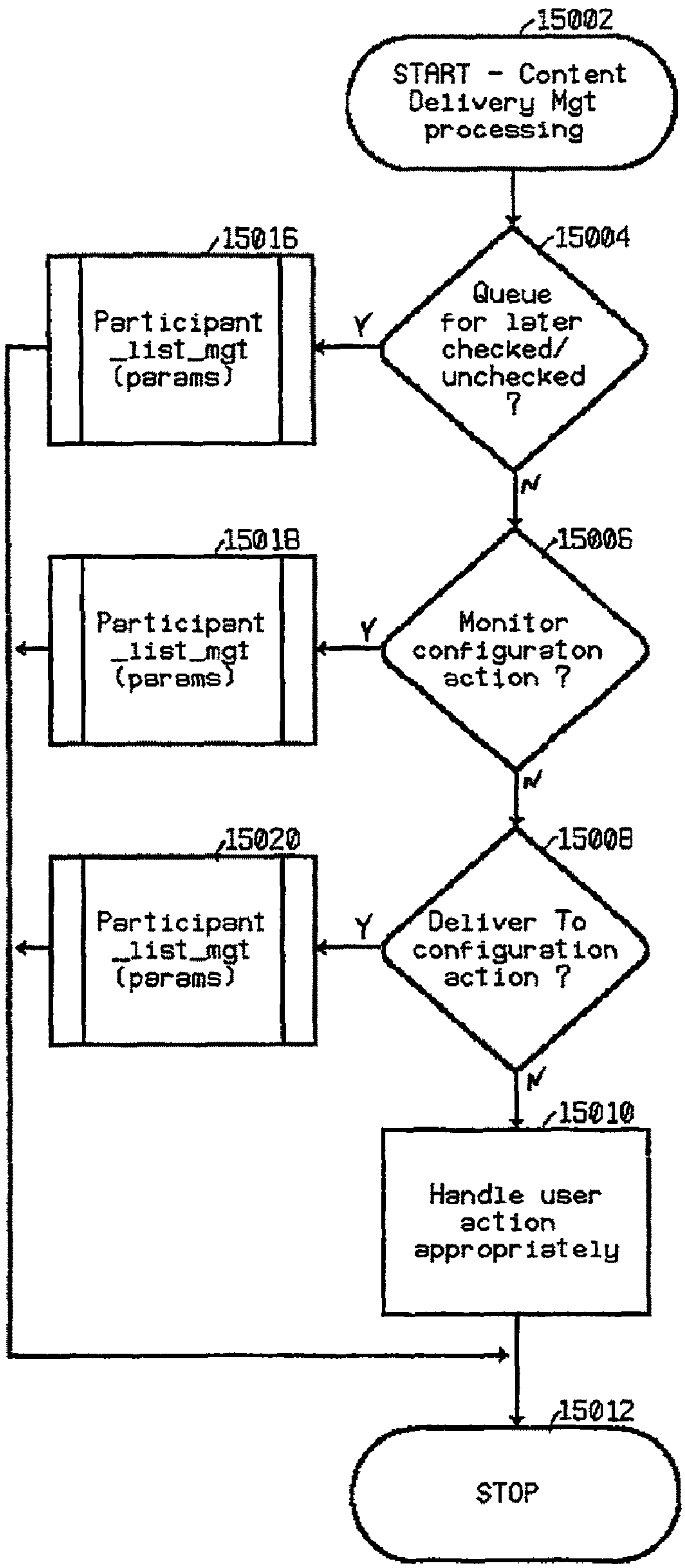
Figure 151:
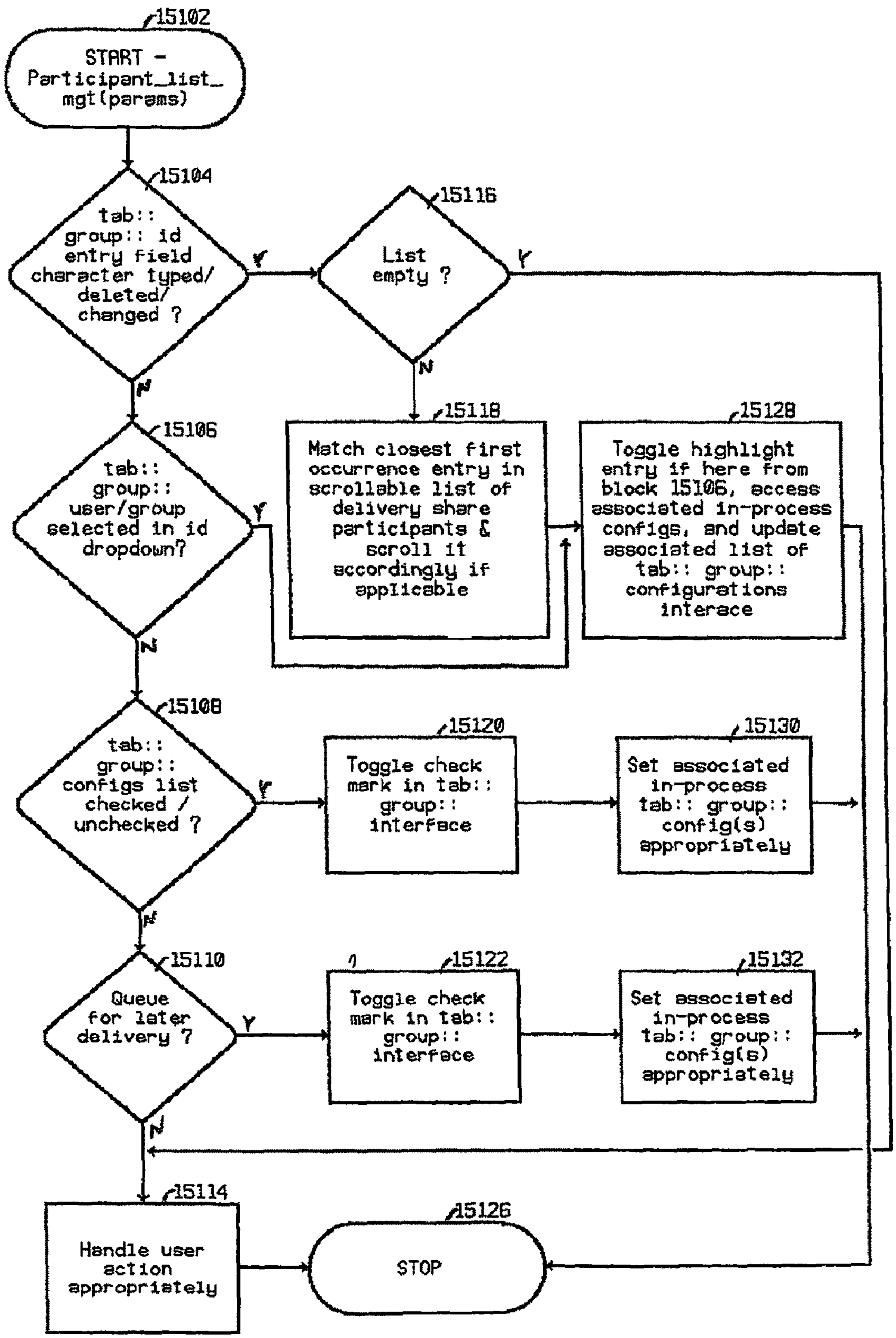
Figure 152:
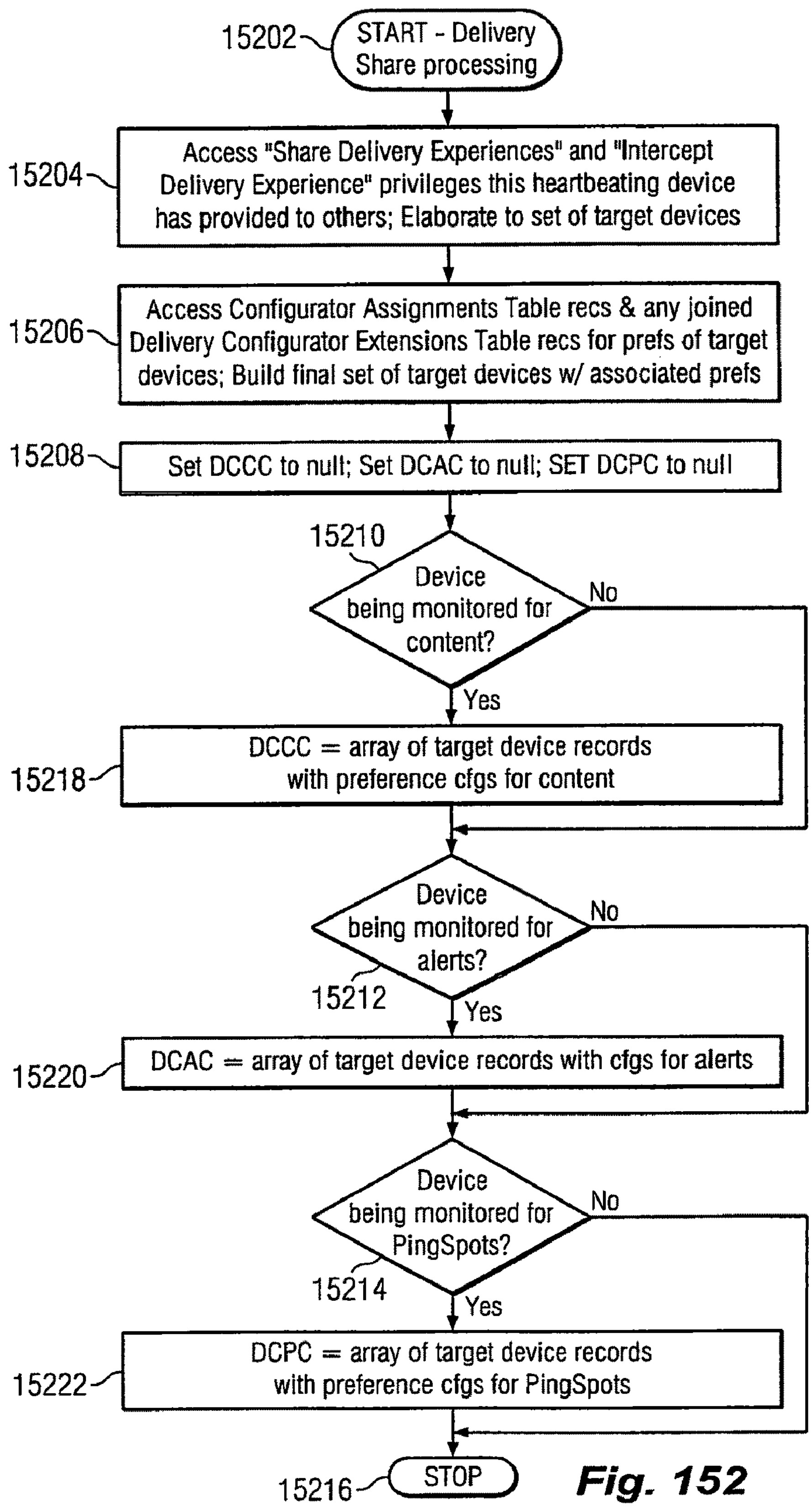
Figure 155A:
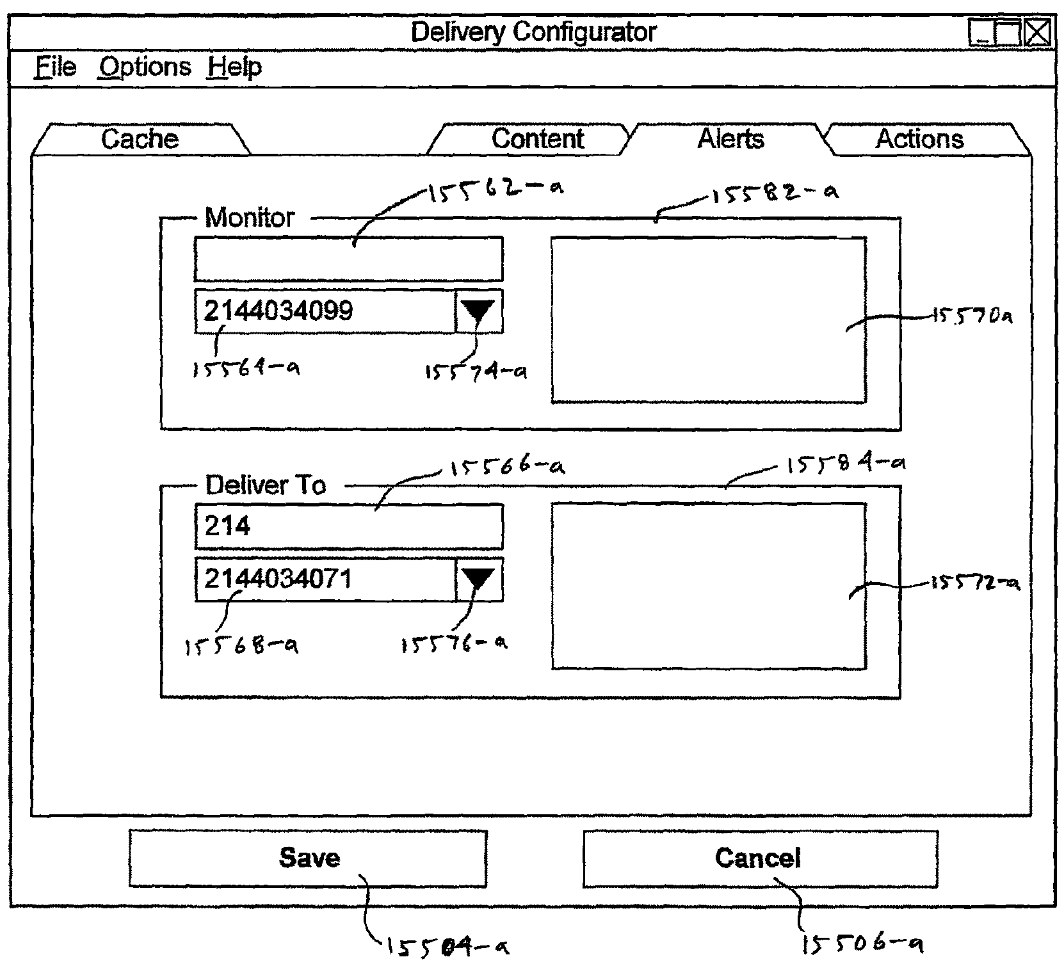
Figure 155B:
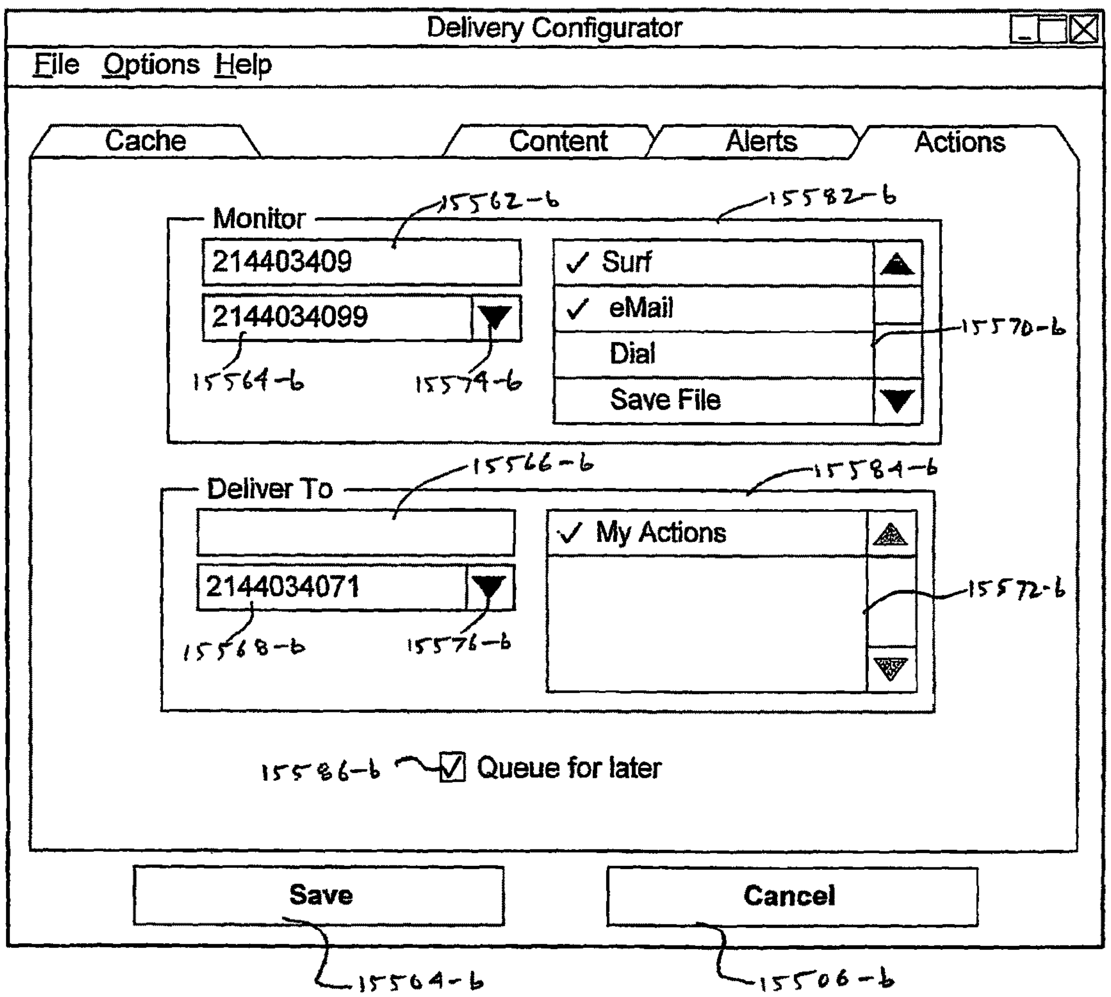
Figure 158:
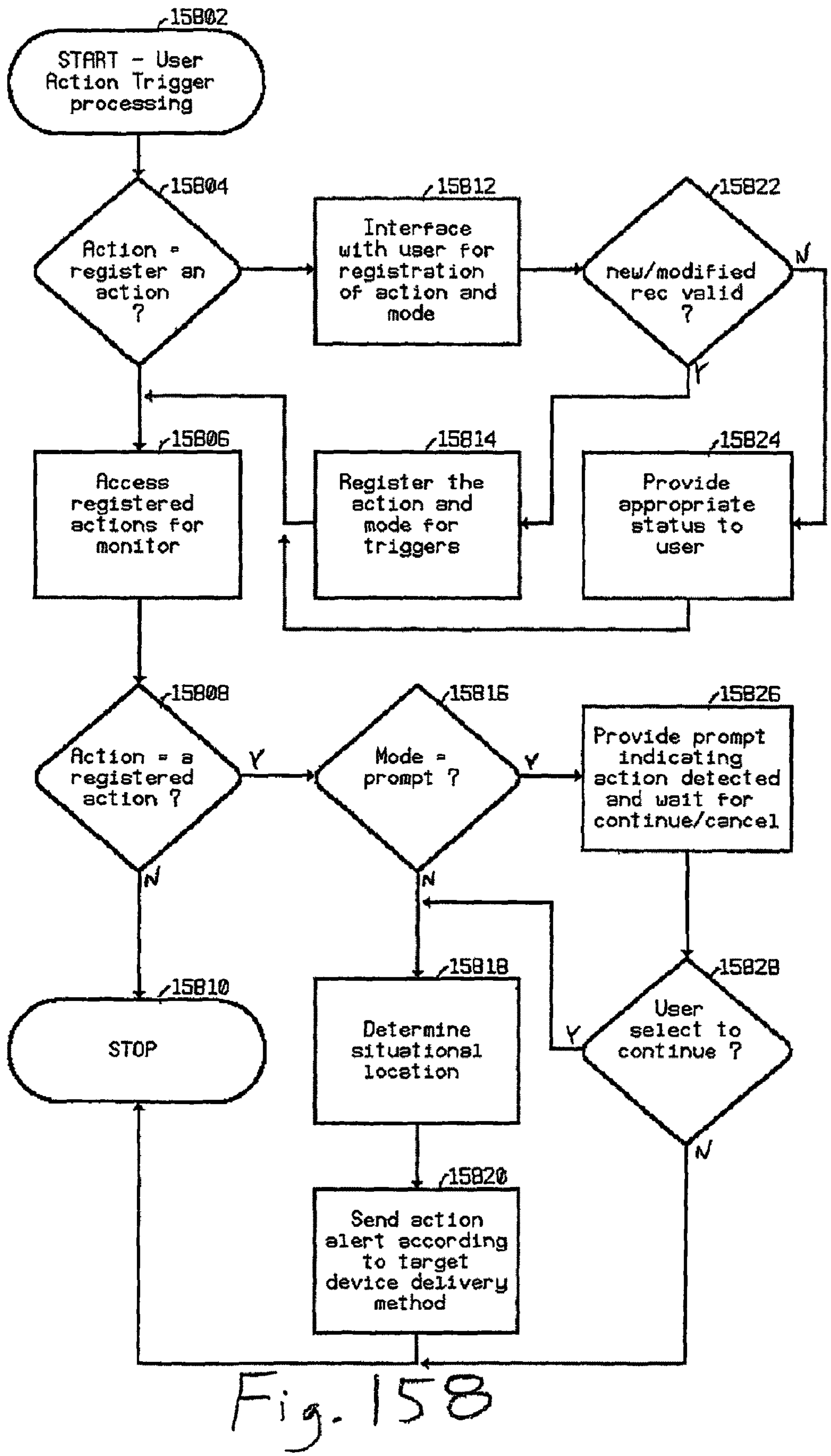
Figure 159:
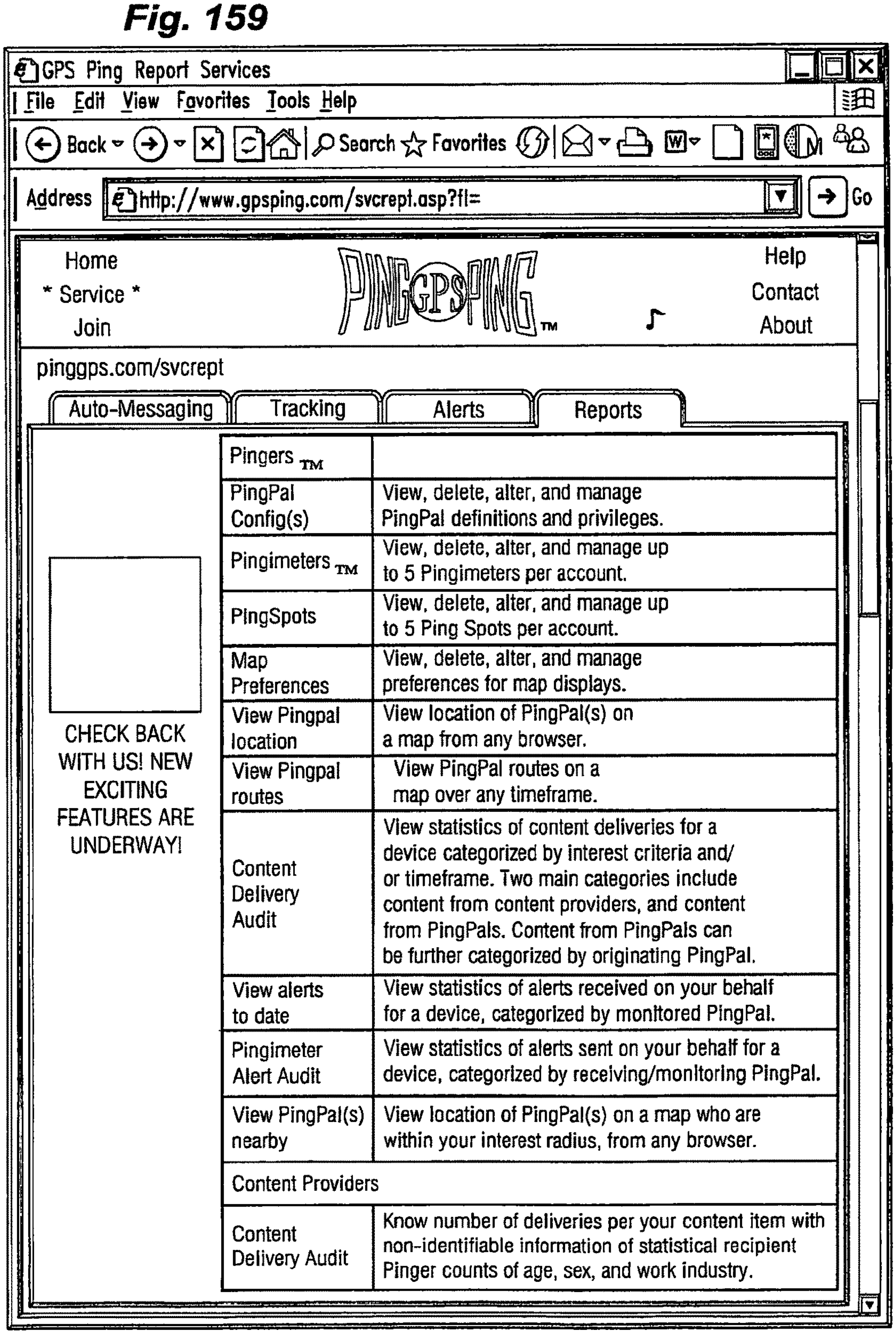
Figure 160A:
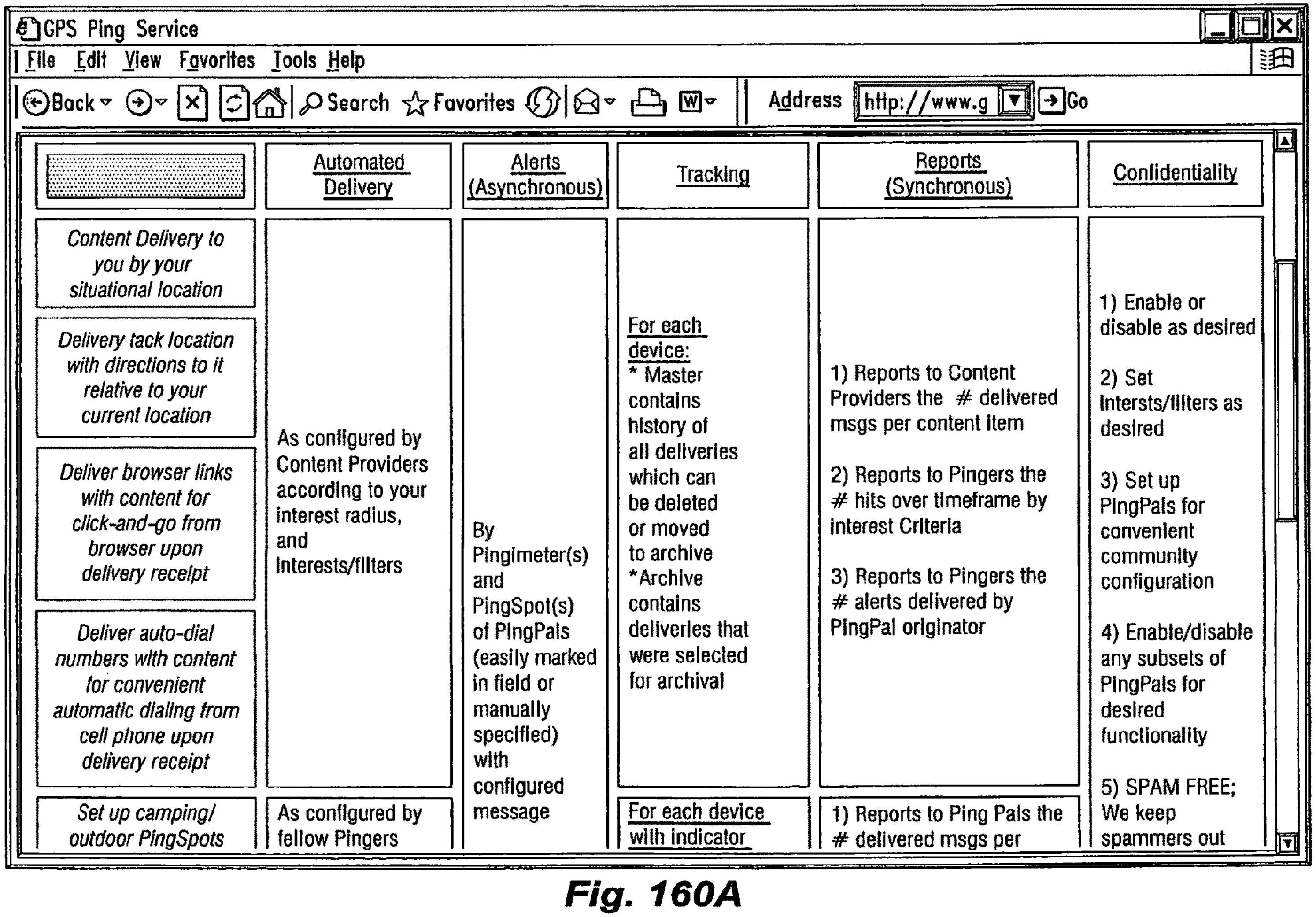
Figure 160B:
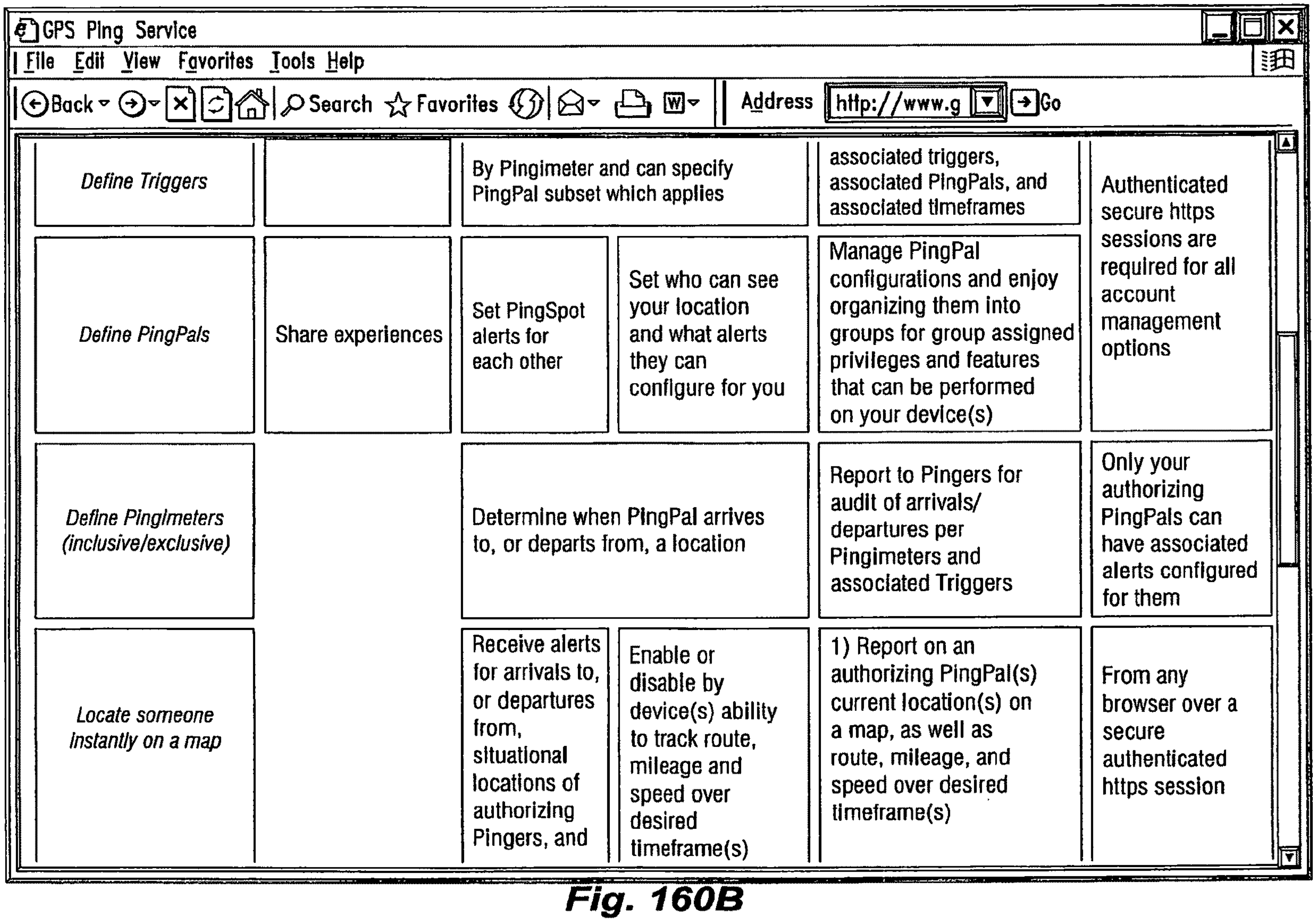
Figure 161:
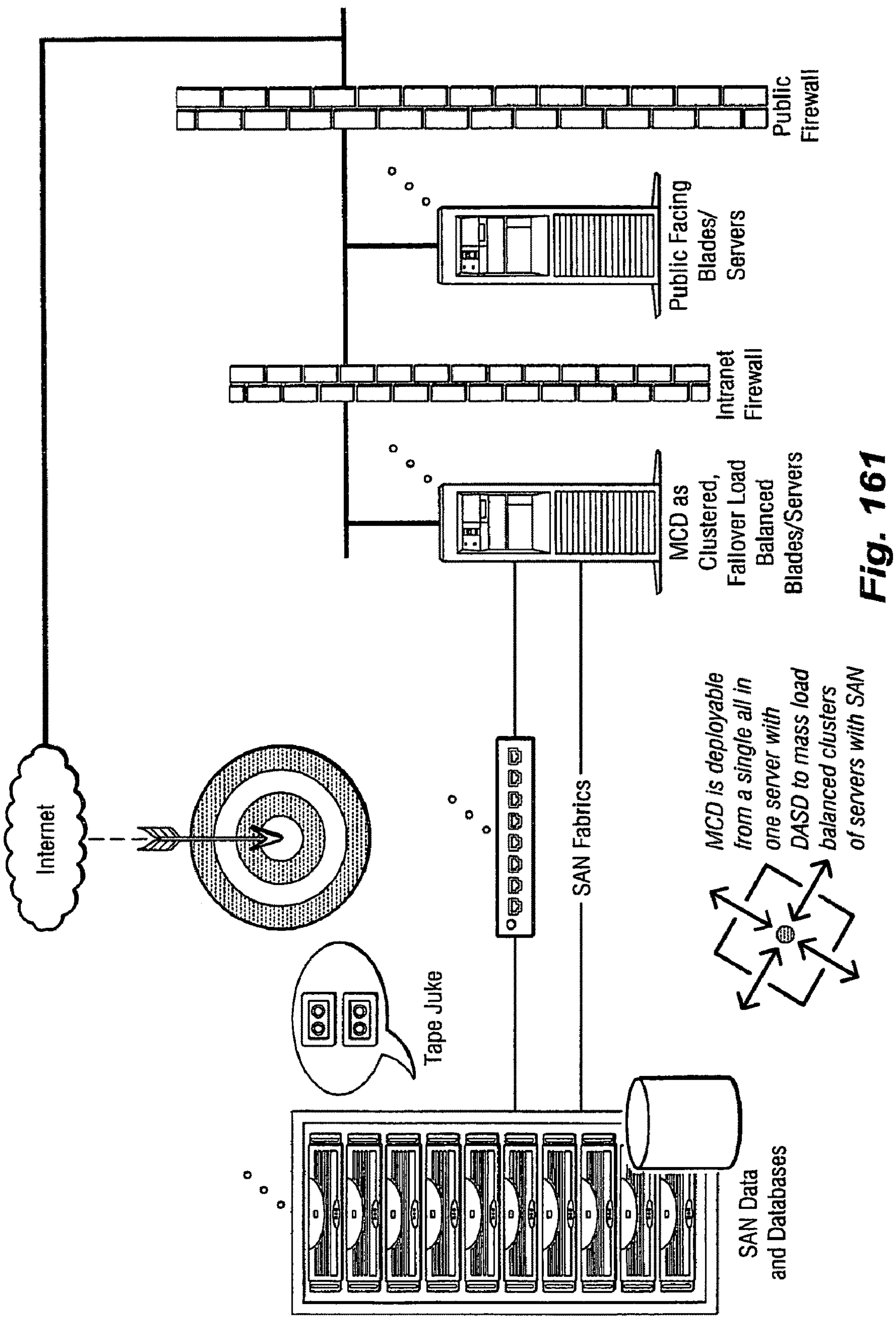
Figure 162:
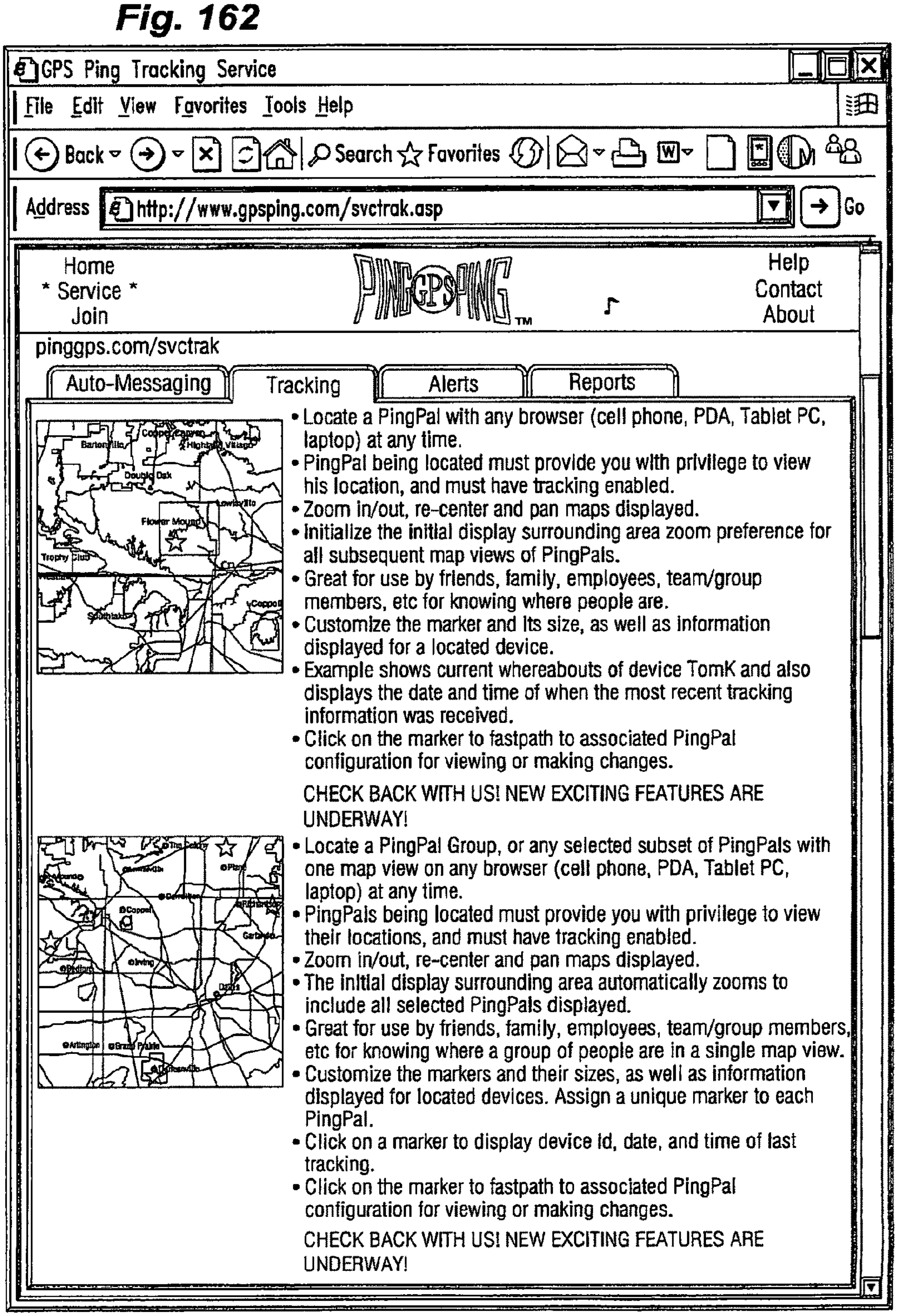

FIG. 138E depicts a preferred embodiment screenshot for a PDA Device settings interface;

FIG. 139 depicts a preferred embodiment screenshot after starting delivery processing for a PDA Delivery Manager with the hide console option set;

FIG. 140 depicts a preferred embodiment screenshot for starting the Delivery Manager with a user specified situational location;

FIG. 141 depicts a preferred embodiment of a data record in the Proactive Search Table;

FIG. 142A depicts a preferred embodiment screenshot for a full browser Delivery Manager after starting delivery processing for a user specified situational location;

FIG. 142B depicts a preferred embodiment screenshot of Delivery Manager PDA device interface processing for a user specified situational location;

FIG. 142C depicts a preferred embodiment screenshot for an automated email delivery after traveling to a situational location having applicable DCDB records wherein the content length exceeds reasonable size of the receiving device;

FIG. 143A depicts a preferred embodiment screenshot for a text editor edit of a default Master presentation preferences file;

FIG. 143B depicts a preferred embodiment screenshot for a text editor edit of a default Archive presentation preferences file;

FIG. 144 depicts a flowchart for describing a preferred embodiment for Delivery Configurator configuration aspects;

FIG. 145 depicts a flowchart for describing a preferred embodiment for Cache Management configuration processing;

FIG. 146 depicts a flowchart for describing a preferred embodiment for Save Configurations processing;

FIG. 147 depicts a preferred embodiment screenshot for Cache Management configuration aspects;

FIG. 148 depicts a preferred embodiment of a data record in the Cache Configuration Table;

FIG. 149 depicts a preferred embodiment screenshot for Delivery Content configuration aspects;

FIG. 150 depicts a flowchart for describing a preferred embodiment of Delivery Configurator Management Configuration processing;

FIG. 151 depicts a flowchart for describing a preferred embodiment of participant list management processing;

FIG. 152 depicts a flowchart for describing a preferred embodiment of Share Delivery processing;

FIG. 153 depicts a preferred embodiment of a data record in the Configurator Assignments Table;

FIG. 154 depicts a preferred embodiment of a data record in the Delivery Configuration Extensions Table;

FIG. 155A depicts a preferred embodiment screenshot for Alerts Management configuration aspects;

FIG. 155B depicts a preferred embodiment screenshot for Actions Management configuration aspects;

FIG. 156 depicts a preferred embodiment of a data record in the Action Registration Table;

FIG. 157 depicts a preferred embodiment of a data record in the Actions Table;

FIG. 158 depicts a flowchart for describing a preferred embodiment of Action Trigger processing;

FIG. 159 depicts a preferred embodiment screenshot for the Reports option of the Service option of the publicly accessed area of the web service;

FIGS. 160A and 160B depict preferred embodiment screenshots for the Service option of the publicly accessed area of the web service for summarizing some site features;

FIG. 161 depicts an illustration of a preferred implementation environment for carrying out the web service described in this application; and FIG. 162 depicts a preferred embodiment screenshot for the Tracking option of the Service option of the publicly accessed area of the web service.

DETAILED DESCRIPTION OF THE INVENTION

With reference now to detail of the drawings, the present invention is described. Obvious error handling is omitted from the flowcharts in order to focus on the key aspects of the present invention. Obvious error handling includes database I/O errors, field validation errors, errors as the result of database table/data constraints or unique keys, and any other error handling as known to those skilled in the art of software programming in context of this disclosure. A semicolon is used in flowchart blocks to represent, and separate, multiple blocks of processing within a single physical block. This allows simpler flowcharts with less blocks in the drawings by placing multiple blocks of processing description in a single physical block of the flowchart. Flowchart processing is intended to be interpreted in the broadest sense by example, and not for limiting methods of accomplishing the same functionality. Preferably, field validation in the flowcharts checks for SQL injection attacks, syntactical appropriateness, and semantics errors where appropriate. Associated user interface screenshots are also preferred embodiment examples that can be implemented in many other ways without departing from the spirit and scope of this disclosure.

Flowcharts are described in a manner to enable the reader to identify where the detailed descriptions of record formats and fields are to be accessed, managed, and used for applicable processing. While many fields are referenced by name in processing, others are intuitively mapped to the described places of processing.

The terminology "data evidence" is used throughout this disclosure as meaning some data which is stored and made accessible between different processing. Those skilled in the art recognize that web services are stateless implementations and require data (i.e. evidence) to remain between different pages (user interfaces) in order to communicate data from one page to another. Data evidence may be embodied as data passed through form processing from one page to another (e.g. Request.Form("fieldname")), passed as URL variables from one page to another (e.g. Request.QueryString("paramname")), stored in a cookie to the browser device in one page and then accessed by another page (e.g. Request.Cookies ("varname")), stored in a frame variable and made accessible to another frame in the frame hierarchy (e.g. Javascript variable set and passed in a frames implementation), stored in an SQL database in one page and then accessed from the database in another page (e.g. ADODB object), stored in a file system object in one page and then accessed by another page (e.g. FILESYSTEM object), or any other means for storing data by one process or thread of execution and then accessing it by another process or thread of execution. The term "data evidence" can use any one of these methods in one disclosed explanation and any other method in another disclosed explanation. Alternative user interfaces (since this disclosure is not to be limiting to a web service) will use similar mechanisms, but may use different mechanisms without departing from the spirit and scope of this disclosure.

Figure 1:
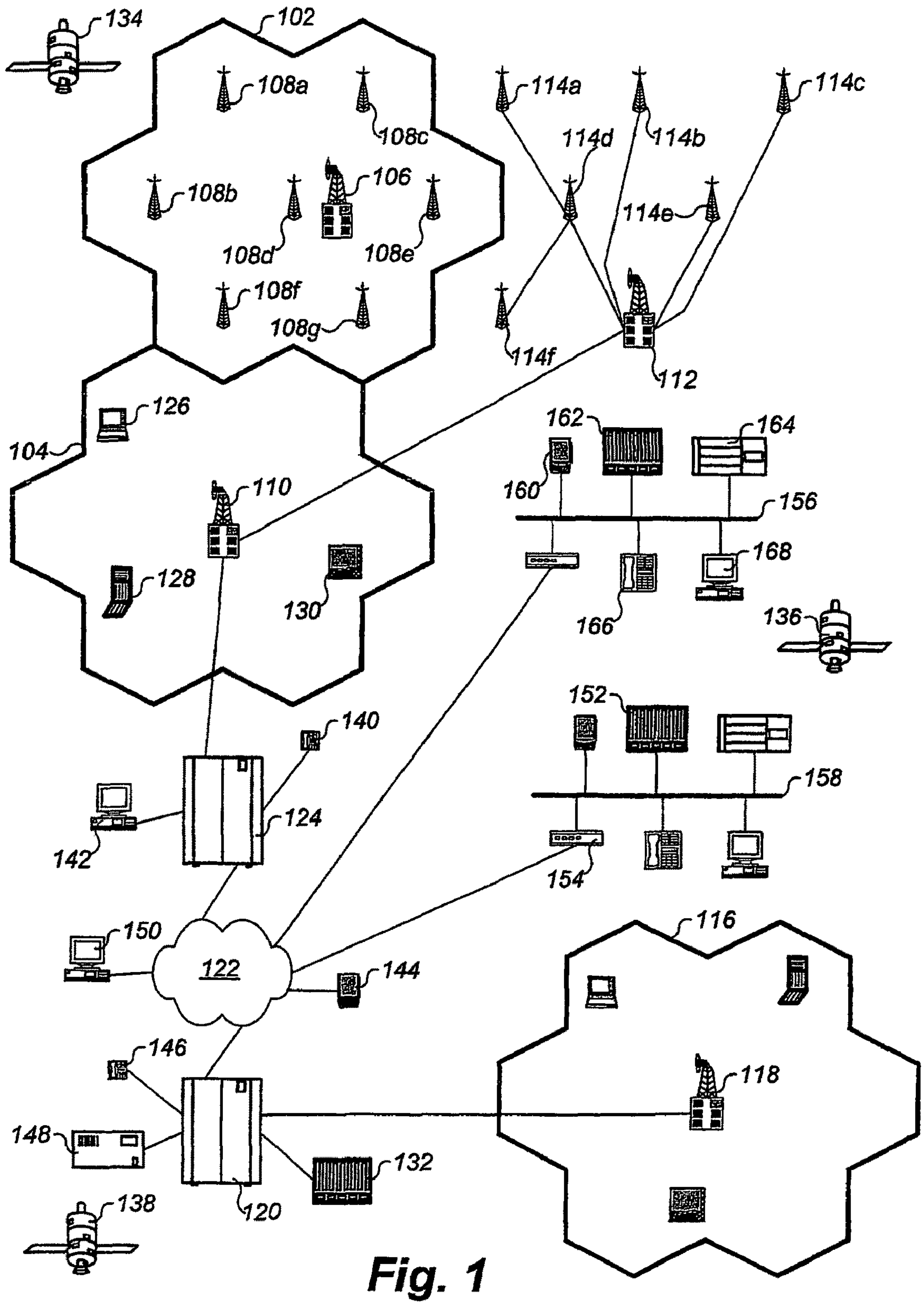
FIG. 1 depicts a network illustration for discussing the various outdoor embodiments of the present invention.

FIG. 1 depicts a network illustration for discussing the various outdoor embodiments of the present invention. In one embodiment, a cellular network cluster 102 and cellular network cluster 104 are parts of a larger cellular network. Cellular network cluster 102 contains a controller 106 and a plurality of base stations, shown generally as base stations 108. Each base station covers a single cell of the cellular network cluster, and each base station 108 communicates through a wireless connection with the controller 106 for call processing, as is well known in the art. Wireless devices communicate via the nearest base station (i.e. the cell the device currently resides in), for example base station 108*b*. Roaming functionality is provided when a wireless device roams from one cell to another so that a session is properly maintained with proper signal strength. Controller 106 acts like a telephony switch when a wireless device roams across cells, and it communicates with controller 110 via a wireless connection so that a wireless device can also roam to other clusters over a larger geographical area. Controller 110 may be connected to a controller 112 in a cellular cluster through a physical connection, for example, copper wire, optical fiber, or the like. This enables cellular clusters to be great distances from each other. Controller 112 may in fact be connected with a physical connection to its base stations, shown generally as base stations 114. Base stations may communicate directly with the controller 112, for example, base station 114*e*. Base stations may communicate indirectly to the controller 112, for example base station 114*a* by way of base station 114*d*. It is well known in the art that many options exist for enabling interoperating communications between controllers and base stations for the purpose of managing a cellular network. A cellular network cluster 116 may be located in a different country. Base controller 118 may communicate with controller 110 through a Public Service Telephone Network (PSTN) by way of a telephony switch 120, PSTN 122, and telephony switch 124, respectively. Telephony switch 120 and telephony switch 124 may be private or public. In one cellular network embodiment of the present invention, the SDPS executes at controllers, for example controller 110. The RDPS executes at a wireless device, for example mobile laptop computer 126, wireless telephone 128, a personal digital assistant (PDA) 130, or the like. As the RDPS moves about, positional attributes are monitored for determining a situational location. The RDPS may be handheld, or installed in a moving vehicle. Locating a wireless device using wireless techniques such as Time Difference of Arrival (TDOA) and Angle Of Arrival (AOA) are well known in the art. The SDPS may also execute on a server computer accessible to controllers, for example server computer 132, provided an appropriate timely connection exists between cellular network controller(s) and the server computer 132. Wireless devices (i.e. RDPS) are known by a unique identifier, for example a caller id, device identifier, or like appropriate unique handle.

In another embodiment of the present invention, GPS satellites such as satellite 134, satellite 136, and satellite 138 provide information, as is well known in the art, to GPS devices on earth for triangulation locating of the GPS device. In this embodiment, a RDPS has integrated GPS functionality so that the RDPS monitors its positional attribute(s). When the RDPS determines a candidate delivery event, it communicates parameters to the controller by way of the nearest base station. Thus, positional attribute information is provided by the RDPS to the SDPS. The RDPS is again known by a unique identifier, for example a caller id, device identifier, or like appropriate unique handle.

In yet another embodiment of the present invention, a physically connected device, for example, telephone 140, computer 142, PDA 144, telephone 146, and fax machine 148, may be newly connected to a network. Each is a RDPS. Physical connections include copper wire, optical fiber, or the like. Devices are known by a unique identifier, for example a caller id, device identifier, physical or logical network address, or like appropriate unique handle. When the RDPS is detected for being newly located, the SDPS determines the candidate delivery event. The SDPS may execute at an Automatic Response Unit (ARU) 150, a telephony switch, for example telephony switch 120, a web server 152 (for example, connected through a gateway 154), or a like data processing system that communicates with the RDPS. RDPS detection may be a result of the RDPS initiating a communication with the SDPS directly or indirectly. Thus, a user may connect his laptop to a hotel network, initiate a communication with the SDPS, and the SDPS determines that the user is in a different location than the previous communication. A local area network (LAN) 156 may contain a variety of connected devices, each an RDPS that later becomes connected to a local area network 158 at a different location, such as a PDA 160, a server computer 162, a printer 164, an internet protocol telephone 166, a computer 168, or the like. Hard copy presentation could be made to printer 164 and fax 148. Electronic content could be delivered to any RDPS.

Current technology enables devices to communicate with each other, and other systems, through a variety of heterogeneous system and communication methods. Current technology allows executable processing to run on diverse devices and systems. Current technology allows communications between the devices and/or systems over a plethora of methodologies at close or long distance. Many technologies also exist for automatic locating of devices. It is well known how to have an interoperating communications system that comprises a plurality of individual systems communicating with each other with one or more protocols. As is further known in the art of developing software, executable processing of the present invention may be developed to run on a particular target data processing system in a particular manner, or customized at install time to execute on a particular data processing system in a particular manner.

Figure 2:
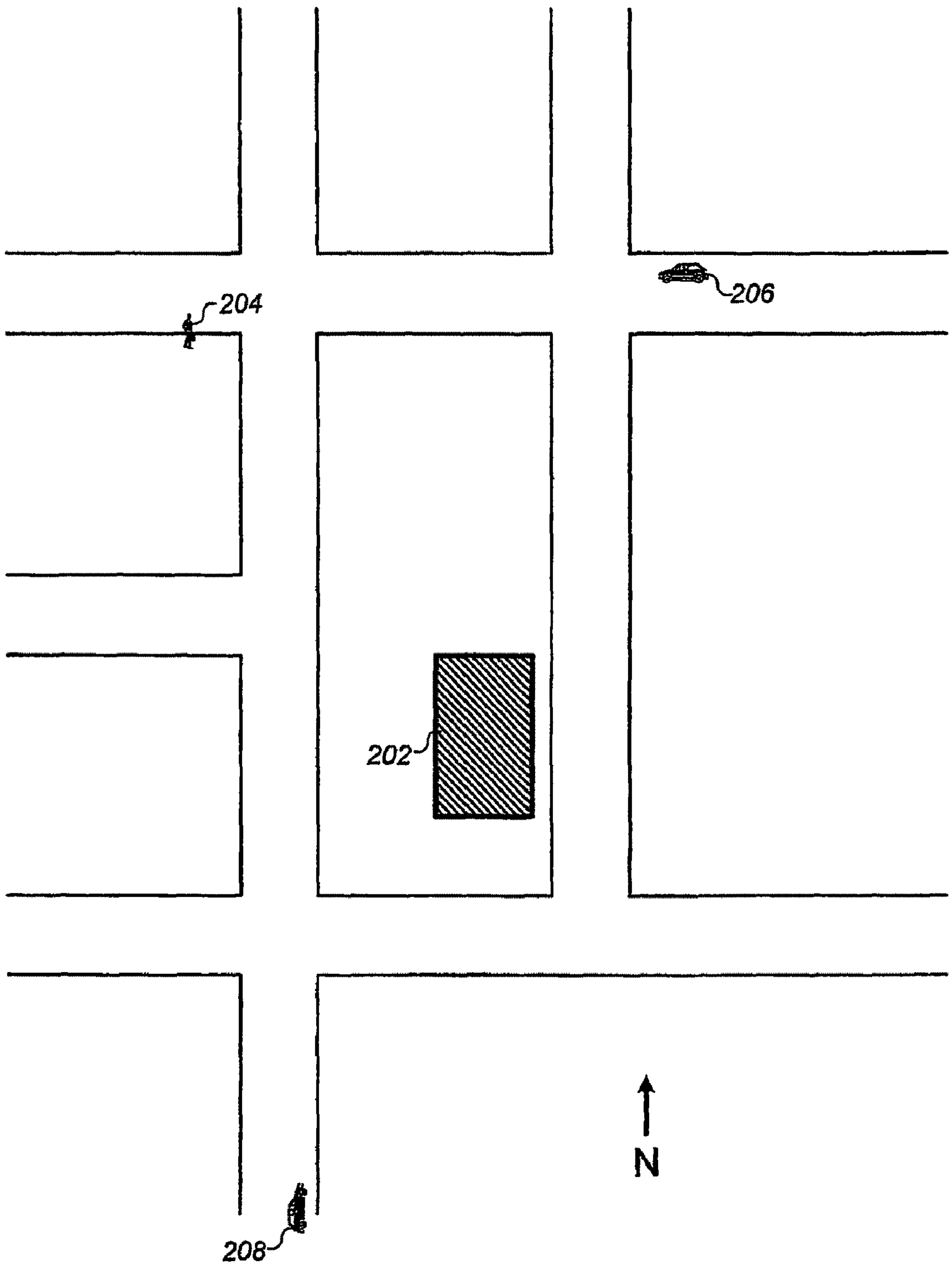
FIG. 2 depicts an aerial view of a city region useful for discussing aspects of the present invention.

FIG. 2 depicts an aerial view of a city region useful for discussing aspects of, and helps explain one application of, the present invention. A Starbucks coffee shop 202 (Starbucks is a trademark of Starbucks corporation) is located in an area frequented by handheld wireless device (i.e. RDPS) user pedestrians, for example pedestrian 204, and wireless device (i.e. RDPS) equipped vehicles, for example automobile 206 and automobile 208. Starbucks is a paying customer to the owner of the present invention wherein content can be configured for advertising to potential customers of Starbucks. An authorized and authenticated Starbucks representative uses the present invention, for example by way of an internet connected web browser, to configure the deliverable content. The representative also configures situational location information that is to be matched to situational locations of a RDPS of mobile customers. Upon configuration completion, the content is immediately activated for proactive delivery. The present invention will automatically deliver the Starbucks configured content to any RDPS according to the representative's configurations, for example, when pedestrian 204 becomes in a specified proximity to the Starbucks location, encounters a specific location, travels in a manner which provides predictive information, heads in a specified direction at, to, or from a location, or the like, using positional attribute(s). Likewise, automobile 206 will receive the content according to configurations, for example, when making a left hand turn (i.e. changing direction at a location area) onto the street bearing Starbucks' address. Likewise, automobile 208 will receive the content according to configurations, for example, when encountering a location in proximity to the Starbucks location while heading North. One example of the content may be a textual message such as "Starbucks has a 60% off sale just ahead at 314 Main Street with free no-spill coffee mugs!!!". Other examples may include a graphical map showing where the Starbucks establishment is in relation to showing where the RDPS is currently located and headed.

Figure 3A:
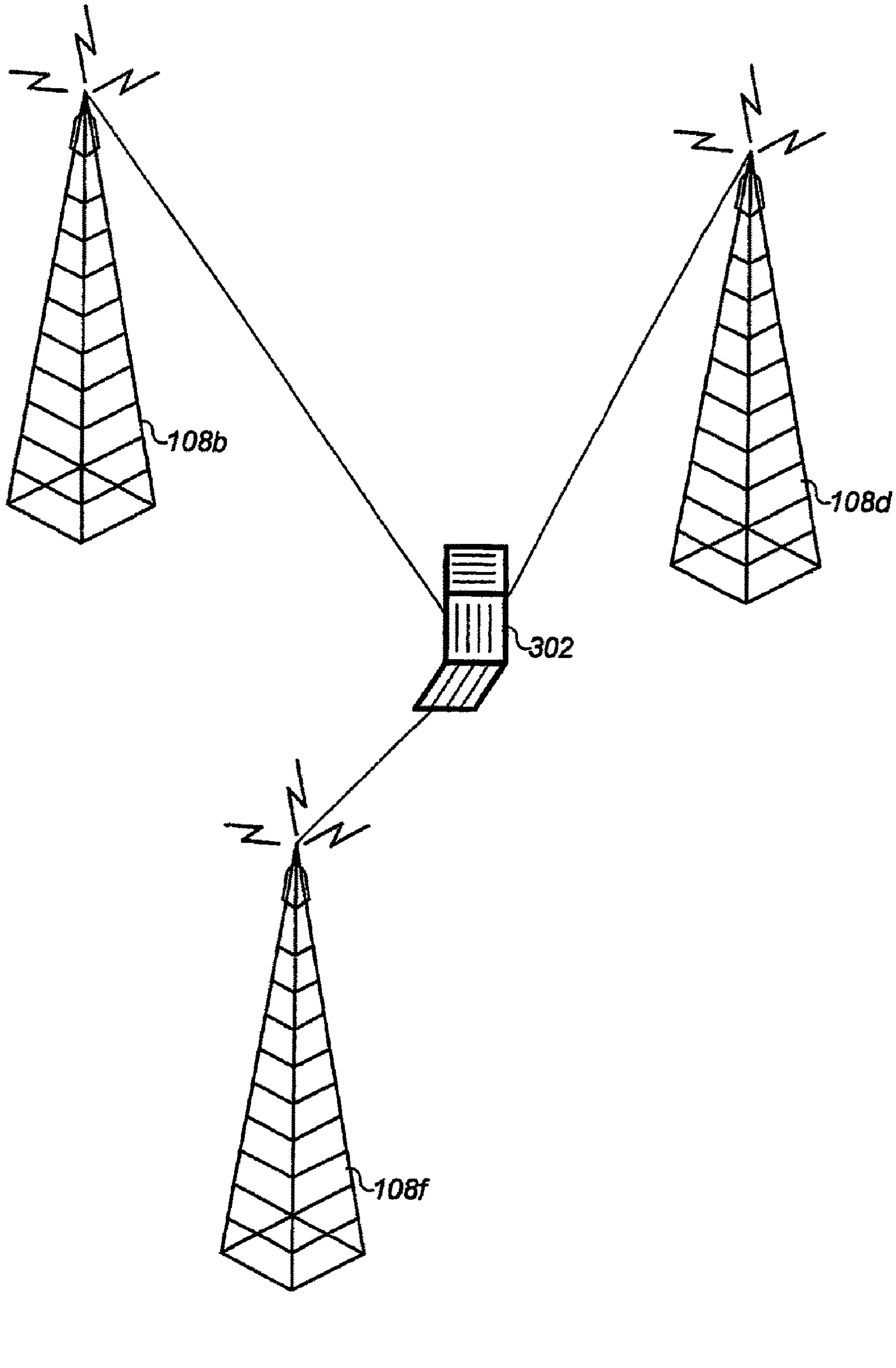
FIG. 3A depicts a locating by triangulation illustration for discussing a wireless, or cellular, embodiment of the present invention.

FIG. 3A depicts a locating by triangulation illustration for discussing a wireless, or cellular, embodiment of the present invention. A RDPS 302 is located through triangulation, as is well known in the art. At least three base towers, for example, base tower 108*b*, base tower 108*d*, and base tower 108*f*, are necessary for locating the RDPS. A fourth base tower would be used if altitude was configured for use by the present invention. There are cases where only two base towers are necessary given routes of travel are limited and known, for example, in spread out roadways or limited configured locations.

Figure 3B:
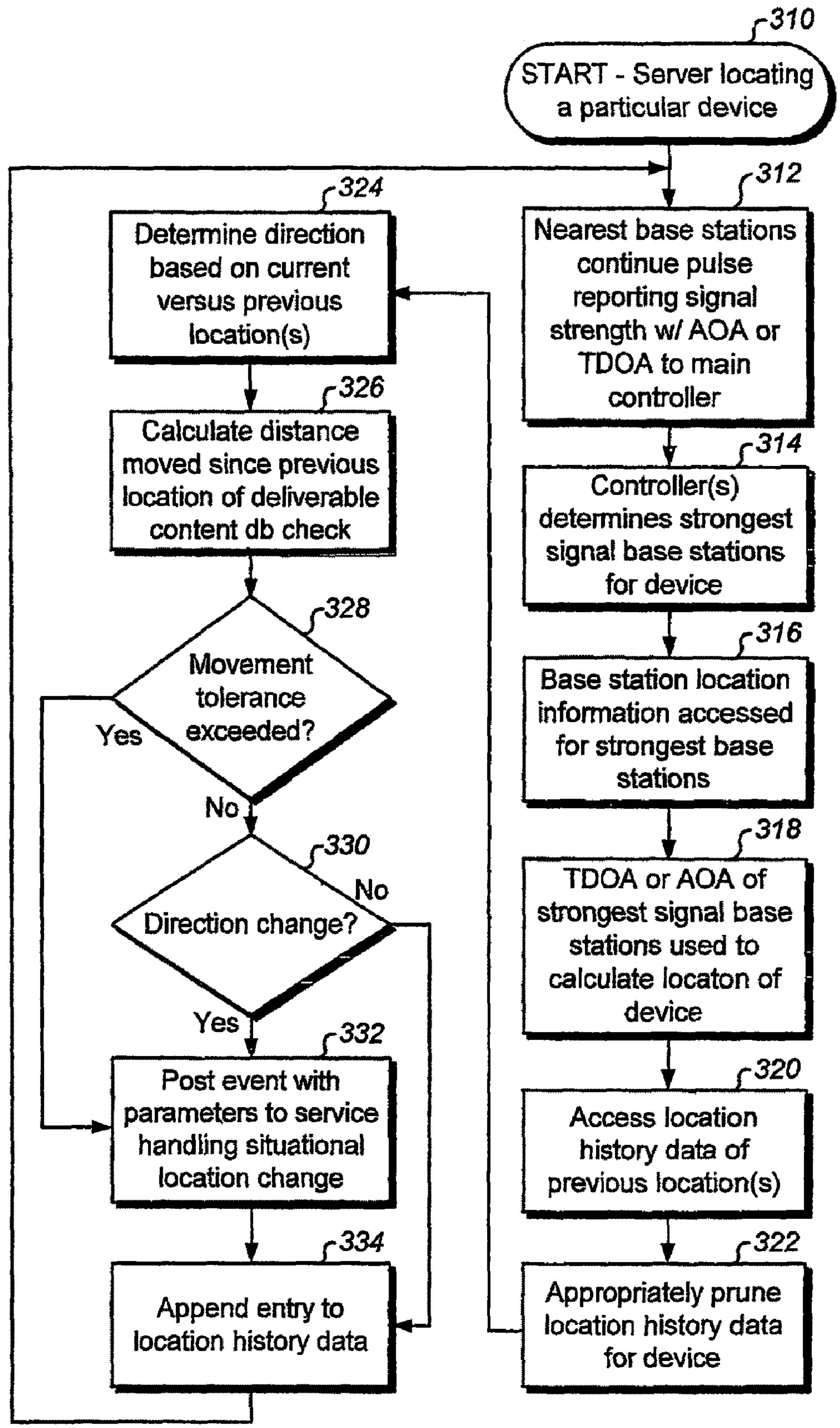
FIG. 3B depicts a flowchart for describing a preferred embodiment of the candidate delivery event generation aspect relevant to a wireless, or cellular, embodiment of the present invention, in the context of positional attribute(s) being monitored by a SDPS.

FIG. 3B depicts a flowchart for describing a preferred embodiment of the candidate delivery event generation aspect relevant to a wireless, or cellular, embodiment of the present invention, in the context of positional attribute(s) being monitored by a SDPS. Processing begins at block 310 and continues to block 312 where base stations able to communicate to any degree with a RDPS continue reporting to their controller the RDPS signal strength with an RDPS identifier (i.e. a unique handle) and Time Difference of Arrival (TDOA) information, or alternatively, Angle of Arrival (AOA) information, depending on the embodiment. When the RDPS turns on, it registers itself. The RDPS can pick signals from base stations. In one embodiment, the RDPS monitors a paging channel, called a forward channel. There can be multiple forward channels. A forward channel is the transmission frequency from the base tower to the RDPS. Either the RDPS provides heartbeats for base stations, or the base stations provide heartbeats for a response from the RDPS. Communication from the RDPS to the base tower is on what is called the reverse channel. Forward channels and reverse channel are used to perform call setup for a created session channel.

TDOA is conventionally calculated from the time it takes for a communication to occur from the RDPS back to the RDPS via the base tower, or alternatively, from a base tower back to that base tower via the RDPS. AOA is conventionally performed through calculations of the angle by which a signal from the RDPS encounters the base tower antenna. Simple triangle geometry is then used to calculate a location. The AOA antenna is typically of a phased array type.

The controller at block 314 may communicate with other controllers when base stations in other cellular clusters are picking up a signal, for example, when the RDPS roams. In any case, at block 314, the controller(s) determines the strongest signal base stations needed for locating the RDPS, at block 314. The strongest 3 (or 2 or 4 as discussed above) are used. Thereafter, block 316 accesses base station location information for base stations determined at block 314. The base station provides location anchors used to (relatively) determine the location of the RDPS. Then, block 318 uses the TDOA, or AOA, information together with known base station locations to calculate the RDPS location. Blocks 310 through 318 are well known to those skilled in art. Thereafter, block 320 accesses historical RDPS location information, and block 322 performs housekeeping by pruning location history data for the RDPS by time, number of entries, or other criteria. Block 324 then determines a direction of the RDPS based on previous location information. Block 324 may perform Artificial Intelligence (AI) to determine where the traveler may be going by consulting many or all of the location history data. Block 324 may also consider when and/or where a candidate delivery event (CADE) was generated for a direction change in order to cause certain flow from block 330. Block 326 calculates how much (e.g. distance) the RDPS has moved since the previous location that caused a candidate delivery event (CADE) generation for the RDPS (event generated Y/N field in location history data). Thereafter, block 328 compares the movement since the last CADE generation, and if the distance exceeds a movement tolerance, then block 332 posts (generates) a CADE to a present invention service handling RDPS situational location changes. The movement tolerance may be a system wide setting for all RDPS devices, particular to a type of RDPS, or specific for an RDPS.

If, at block 328, movement did not exceed the tolerance, then block 330 checks for a direction change as determined at block 324. If, at block 330, the direction did change, then a CADE is generated at block 332. If, at block 330, the direction of the RDPS did not change, then block 334 appends an appropriate entry to the location history data (see FIG. 9B). Block 332 also flows to block 334. Blocks 324 through 330 determine if a CADE is to be generated, and if so, a CADE is generated at block 332. Blocks 324 through 330 determine part, or all, (i.e. a subset) of the situational location, depending on the installation. FIG. 3B processing is continuous for every RDPS in the wireless network 7 days a week, 24 hours a day.

Figure 3C:
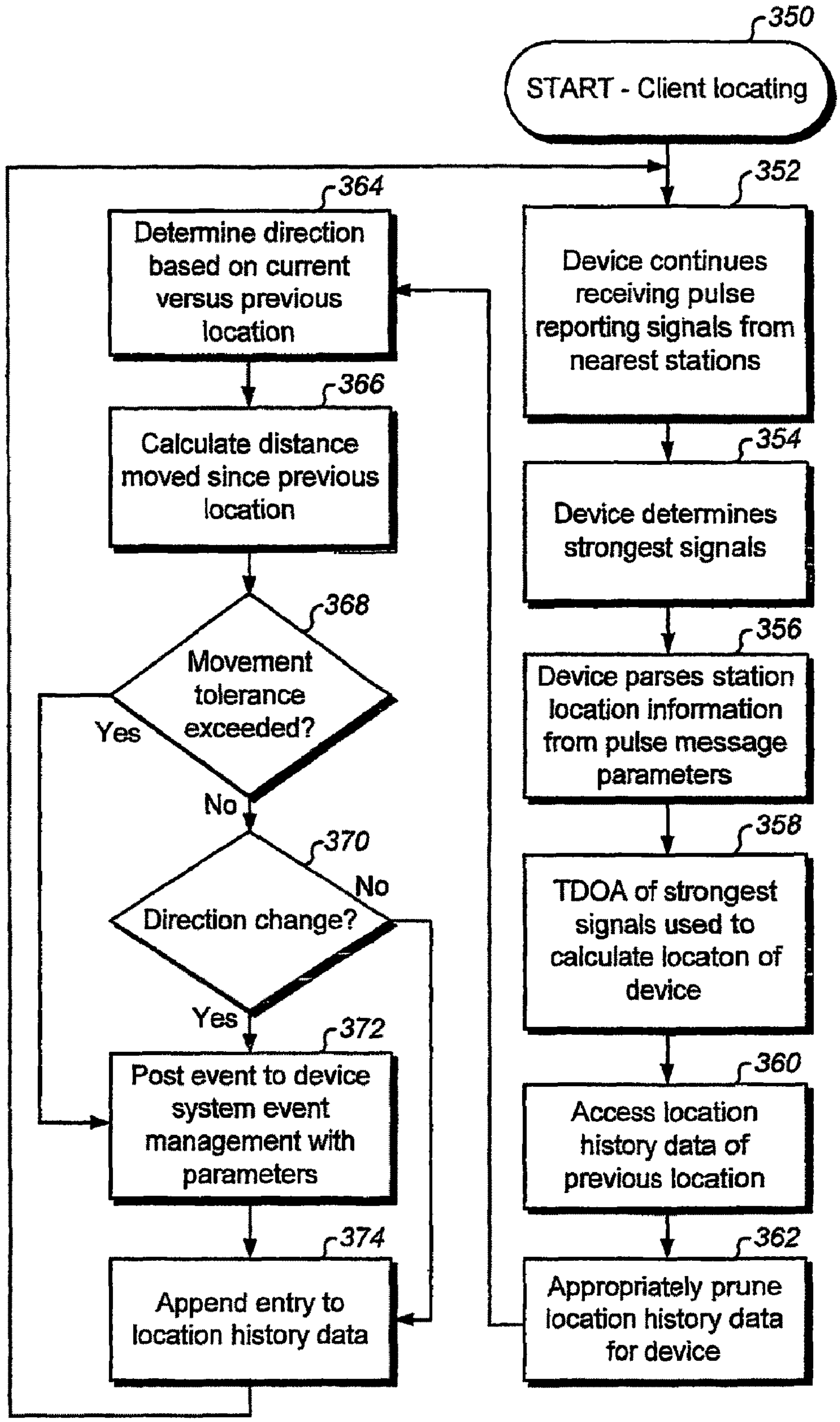
FIG. 3C depicts a flowchart for describing a preferred embodiment of the candidate delivery event generation aspect relevant to a wireless, or cellular embodiment, of the present invention, in the context of positional attribute(s) being monitored by a RDPS.

FIG. 3C depicts a flowchart for describing a preferred embodiment of the candidate delivery event generation aspect relevant to a wireless, or cellular, embodiment, of the present invention, in the context of positional attribute(s) being monitored by a RDPS. FIG. 3B demonstrated the CADE and part, or all, of the situational location being determined by a SDPS service. FIG. 3C demonstrates the CADE, and part, or all, of the situational location being determined by the RDPS itself, and then communicated to the SDPS for any further situational location determination and applicable content delivery. Communications between the base stations and RDPS is similar to above except the RDPS receives information for performing calculations and related processing. Processing begins at block 350 and continues to block 352 where the RDPS continues receiving pulse reporting from base stations. Block 354 determines the strongest 3 signals (or 2 or 4). Thereafter, block 356 parses base station location information from the pulse messages that are received by the RDPS. Block 358 communicates with base stations to perform TDOA calculations. The time it takes for a communication to occur from the RDPS back to the RDPS, or alternatively, from a base tower back to that base tower is used. Block 358 uses the TDOA information with the known base station information to determine the RDPS location. Blocks 350 through 358 are well known to those skilled in art.

Thereafter, block 360 accesses historical RDPS location information, and block 362 performs housekeeping by pruning the location history data for the RDPS by time, number of entries, or other criteria. Block 364 then determines a direction of the RDPS based on previous location information. Block 364 may perform Artificial Intelligence (AI) to determine where the traveler may be going by consulting much or all of the location history data. Block 364 may also consider when and/or where a candidate delivery event (CADE) was generated for a direction change in order to cause certain flow from block 370. Block 366 calculates how much (e.g. distance) the RDPS has moved since the previous location that caused a candidate delivery event (CADE) generation for the RDPS (event generated Y/N field in location history data). Thereafter, block 368 compares the movement since the last CADE generation and if the distance exceeds a movement tolerance, then block 372 posts (generates) a CADE to the present invention system event manager of the RDPS. The movement tolerance may be a system or user configured setting.

If, at block 368, movement did not exceed the tolerance, then block 370 checks for a direction change as determined at block 364. If, at block 370, the direction did change, then a CADE is generated to the system event manager at block 372. If, at block 370, the direction of the RDPS did not change, then block 374 appends an appropriate entry to the location history data (see FIG. 9B). Block 372 also flows to block 374. Blocks 364 through 370 determine if a CADE is to generated, and if so, a CADE is generated at block 332. Blocks 364 through 370 determine part, or all, (i.e. a subset) of the situational location, depending on the installation. FIG. 3C processing is continuous for the RDPS as long as the RDPS is enabled.

Figure 4A:
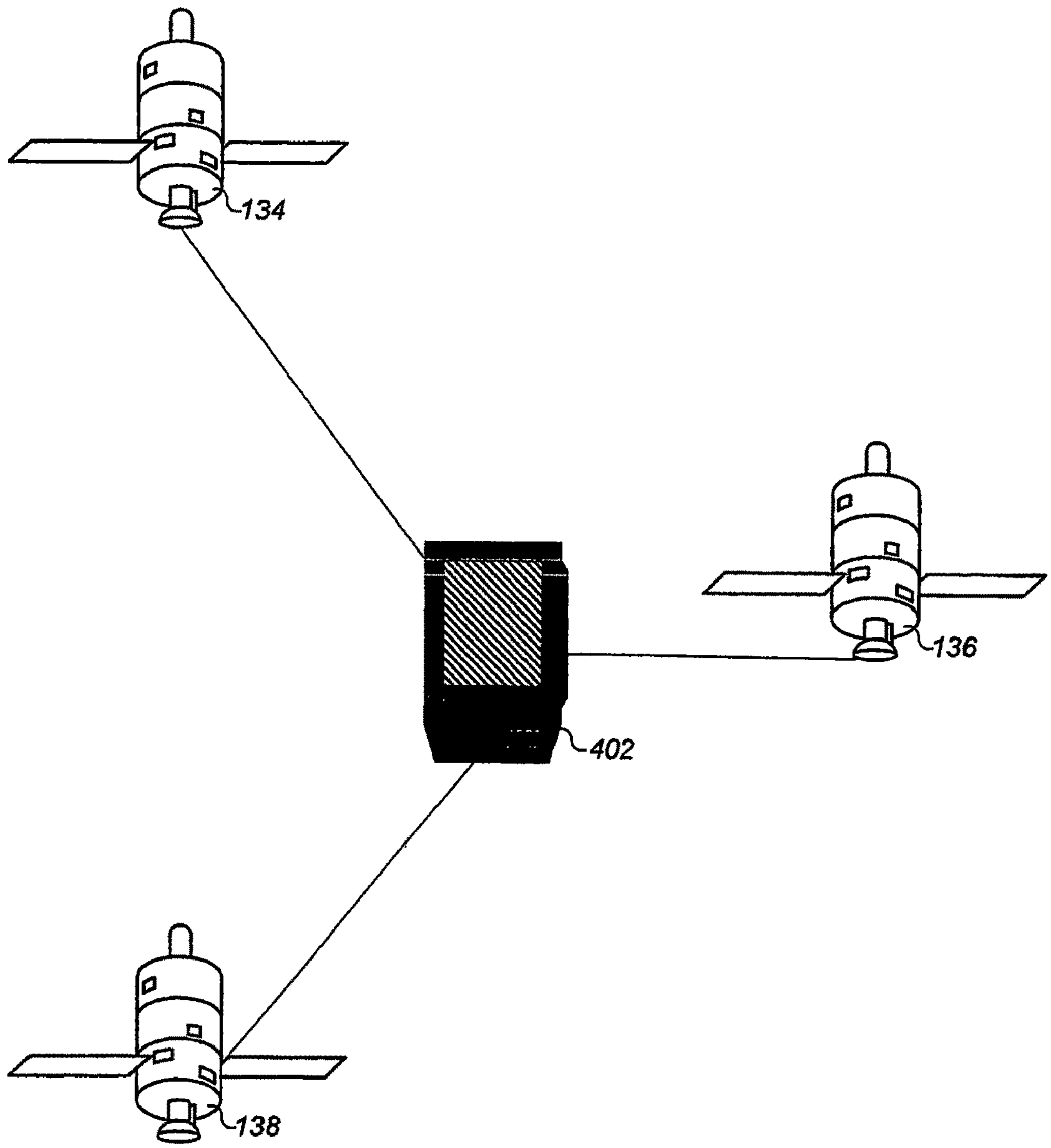
FIG. 4A depicts a locating by triangulation illustration for discussing a GPS, or satellite, embodiment of the present invention.

FIG. 4A depicts a locating by triangulation illustration for discussing a GPS, or satellite, embodiment of the present invention. A RDPS 402 is located through GPS triangulation as is well known in the art. At least three satellites, for example, satellite 134, satellite 136, and satellite 138, are necessary for locating the RDPS. A fourth satellite would be used if altitude was configured for use by the present invention.

Figure 4B:
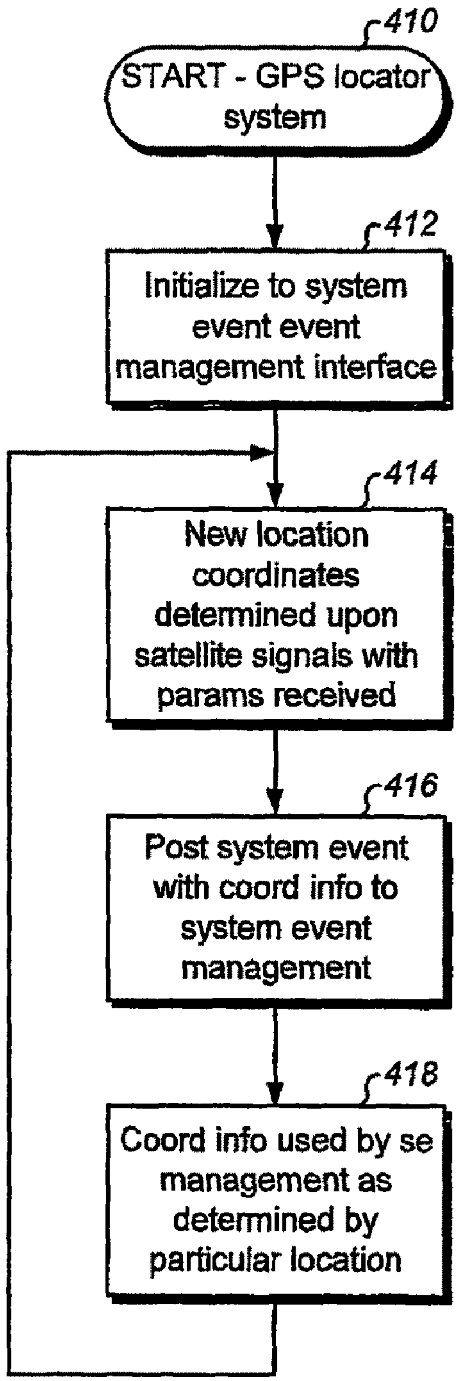
FIG. 4B depicts a flowchart for describing a preferred embodiment of the candidate delivery event generation aspect relevant to a GPS, or satellite, embodiment of the present invention.

FIG. 4B depicts a flowchart for describing a preferred embodiment of the candidate delivery event generation aspect relevant to a GPS, or satellite, embodiment of the present invention. GPS location processing begins at block 410 and continues to block 412 where the RDPS initializes for using a system management interface. The system event manager may be a software interrupt, hardware interrupt, queue, or other event handling entity. Block 414 performs the conventional locating of the GPS enabled RDPS, and block 416 posts (generates) a CADE to the RDPS system event manager. Block 414 may be an implicit wait for pulses from satellites, or an event driven mechanism when GPS satellite pulses are received for synchronized collection. Block 414 processing is well known in the art. Block 416 may post the event information to other processes depending on the RDPS features using such information. Thereafter, the GPS location information is used at block 418 as applicable to the particular RDPS embodiment, for example showing the RDPS location on a graphical map. GPS location processing is continuous for the RDPS as long as the RDPS is enabled.

The CADE in this example is a result of a simple location change. Any further situational location determination task remains for the system event manager. An alternative embodiment to block 414 would further include processing of FIG. 3C blocks 360 through 370 to determine part, or all, (i.e. a subset) of the situational location so that a CADE is generated at block 416 only if the situation warrants it.

Figure 5A:
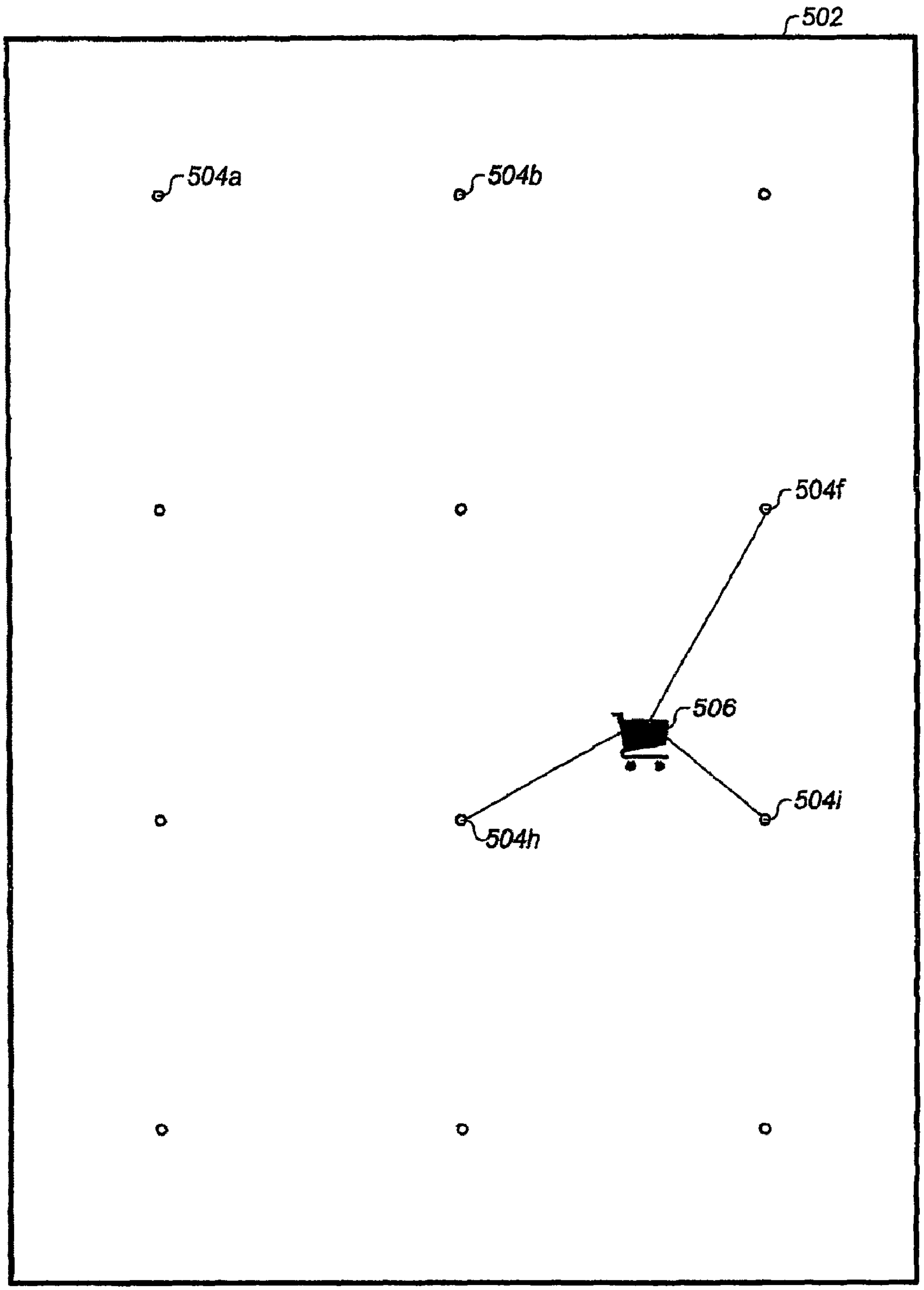
FIG. 5A depicts a locating by triangulation illustration for discussing an indoor wireless embodiment of the present invention.

FIG. 5A depicts a locating by triangulation illustration for discussing an indoor wireless embodiment of the present invention. There may be communication/transmission issues when an RDPS is taken indoors. There are also unique applications of the present invention for indoor use. Shown is a top view of an indoor floor plan 502. Antenna stations 504 (shown generally as 504) are strategically placed over the area so that an RDPS, for example, an RDPS equipped shopping cart 506, can be located. The conventional triangulation techniques again apply. At least three antenna stations, for example, station 504*f*, station 504*h*, and station 504*i* are used to locate the RDPS equipped shopping cart 506. In floor plan embodiments where aisles delimit travel, only two antenna stations may be necessary, for example at either end of the particular aisle. While most stations 504 may receive signals from the RDPS, only the strongest stations are used.

In this example embodiment of using the present invention, a shopper with a grocery cart receives content at the RDPS as the shopping cart is navigated throughout the store. Special deal, sales, or other promotional content is pushed automatically by the present invention to the RDPS of the shopping cart, at appropriate situational locations of the shopping cart. A store representative will manage what content to deliver through convenient configuration of the present invention. The store will provide RDPS equipped shopping carts, or may provide handheld RDPS devices, so that shoppers will get the most of their experience by automatically receiving content that is appropriate to the shopper's situational location in the store.

Figure 5B:
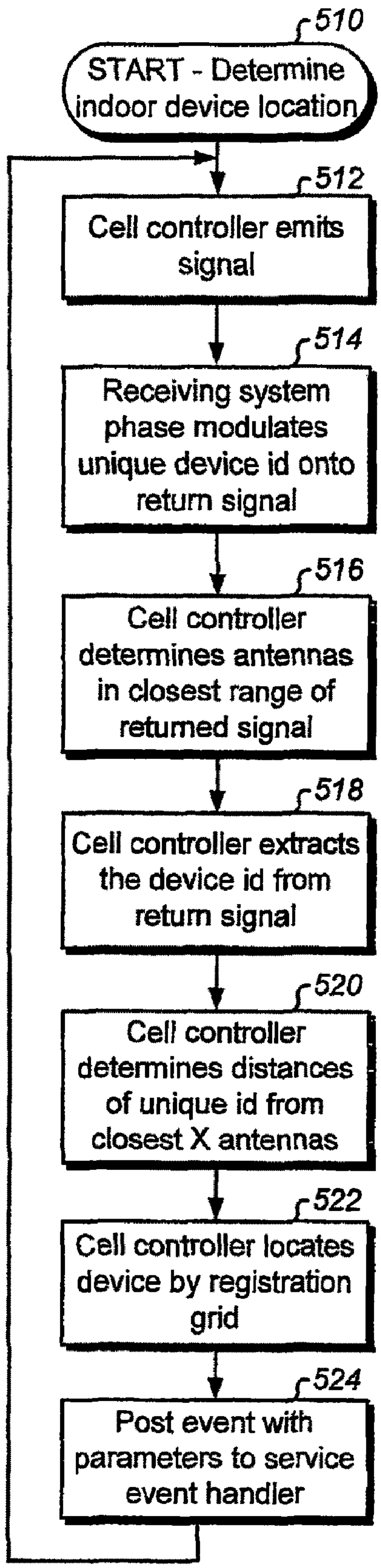
FIG. 5B depicts a flowchart for describing a preferred embodiment of the candidate delivery event generation aspect relevant to an indoor wireless embodiment of the present invention.

FIG. 5B depicts a flowchart for describing a preferred embodiment of the candidate delivery event generation aspect relevant to an indoor wireless embodiment of the present invention. In one embodiment, indoor location technology of Pinpoint corporation (Pinpoint is a trademark of Pinpoint Corporation) is utilized to locate any RDPS that moves about the indoor location. The Pinpoint corporation methodology begins at block 510 and continues to block 512. A cell controller drives antenna stations to emit a broadcast signal from every station. Any RDPS within range (i.e. indoors), will phase modulate its unique identifier onto a return signal it transmits, at block 514. Stations at block 516 receive the transmission and strength of signal. The cell controller that drives stations sorts out and selects the strongest 3 signals. The cell controller, at block 518, also extracts the RDPS unique identifier from the return signal, and TDOA (or AOA if phase array antennas are used) is used to calculate distances from the stations receiving the strongest signals from the RDPS at block 520. The locations of the controller selected stations are registered in an overlay map in an appropriate coordinate system, landmark system, or grid of cells. Block 522 locates the RDPS using the overlay map, locations of the 3 selected stations, and the calculated distances triangulated from the selected stations. Processing through block 522 has located the RDPS with known Pinpoint corporation technology. Thereafter, a block 524 can perform a CADE generation to a SDPS service of the present invention. Processing continues with repeated broadcast at block 512 and subsequent processing for every RDPS.

The CADE in this example is a result of a simple location change. Any further situational location determination task remains for the SDPS event handler. An alternative embodiment to block 524 would further include processing of FIG. 3B blocks 320 through 330 to determine part, or all, (i.e. a subset) of the situational location so that a CADE is generated at block 524 only if the situation warrants it.

Figure 6:
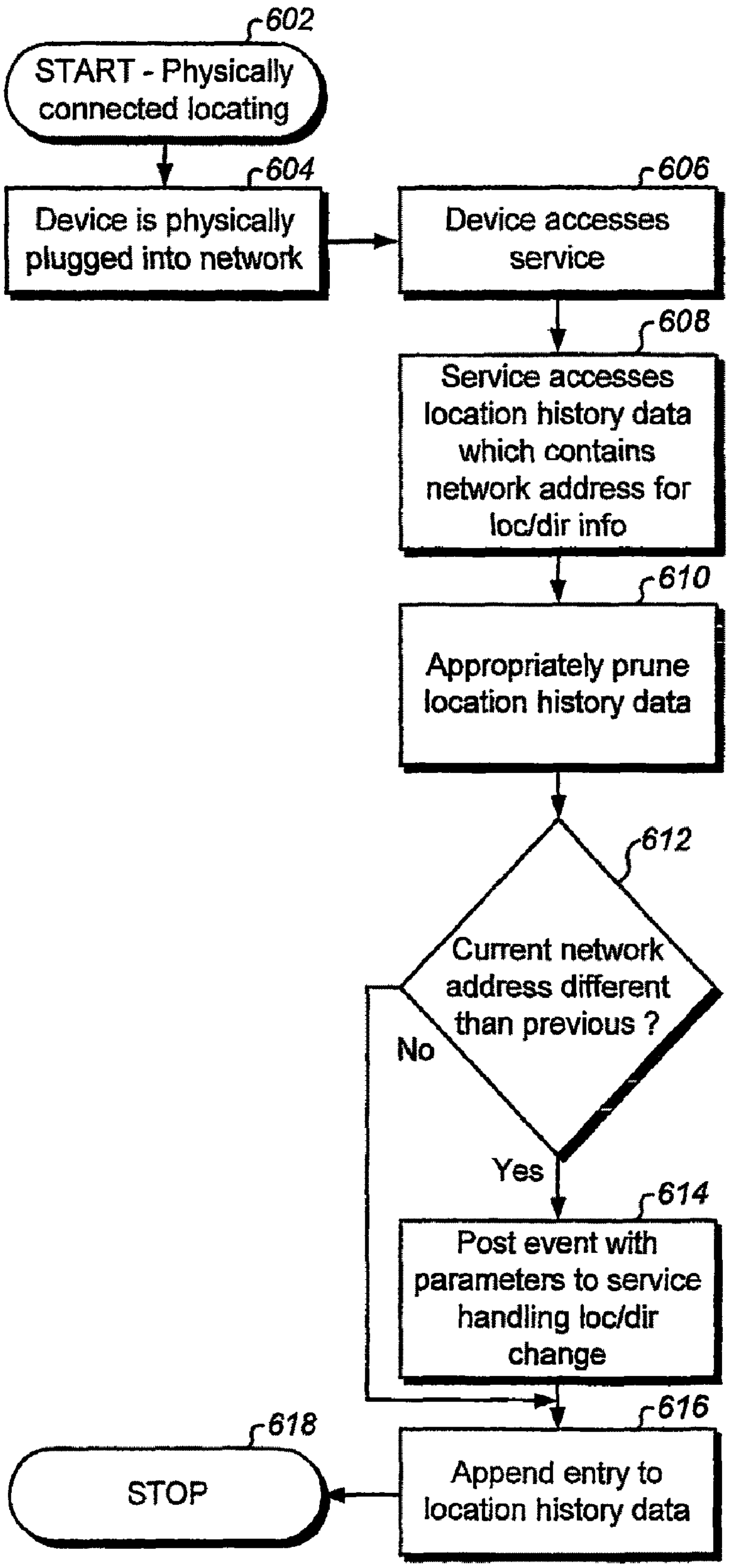
FIG. 6 depicts a flowchart for describing a preferred embodiment of the candidate delivery event generation aspect relevant to a physically connected embodiment of the present invention.

FIG. 6 depicts a flowchart for describing a preferred embodiment of the candidate delivery event generation aspect relevant to a physically connected embodiment of the present invention. A RDPS may be newly located and physically connected, whereby communications between the RDPS and SDPS is over a physical connection. With reference now to FIG. 1, when a RDPS, for example internet protocol telephone 166, is moved from LAN 156 to a LAN 158 in a different location, the present invention detects the location change when the RDPS initiates a communication to the SDPS. With reference back to FIG. 6, relevant processing according to the present invention begins at block 602 and continues to block 604 where an RDPS device is physically connected to a network. Thereafter, the RDPS accesses a SDPS incorporating the present invention, at block 606. Then, at block 608, the SDPS accesses historical RDPS location information (i.e. the previous location history data record 900—see FIG. 9B location history data discussion below), and block 610 performs housekeeping by pruning the location history data maintained for the RDPS by time, number of entries, or other criteria. Block 608 may perform Artificial Intelligence (AI) to determine where the traveler may be going (e.g. using direction based on previous locations) by consulting much or all of the location history data. Thereafter, SDPS processing, at block 612, compares the current network address with the previous network address. If they are identical, then SDPS processing continues to block 616. If they are different, then the SDPS generates a CADE to the event handling service of the SDPS at block 614. Thereafter, SDPS processing continues to block 616. Block 616 appends an entry to the location history data for the RDPS, and SDPS processing ends at block 618. Block 612 may compare to other location history data information, depending on any AI of block 608.

Figure 7A:
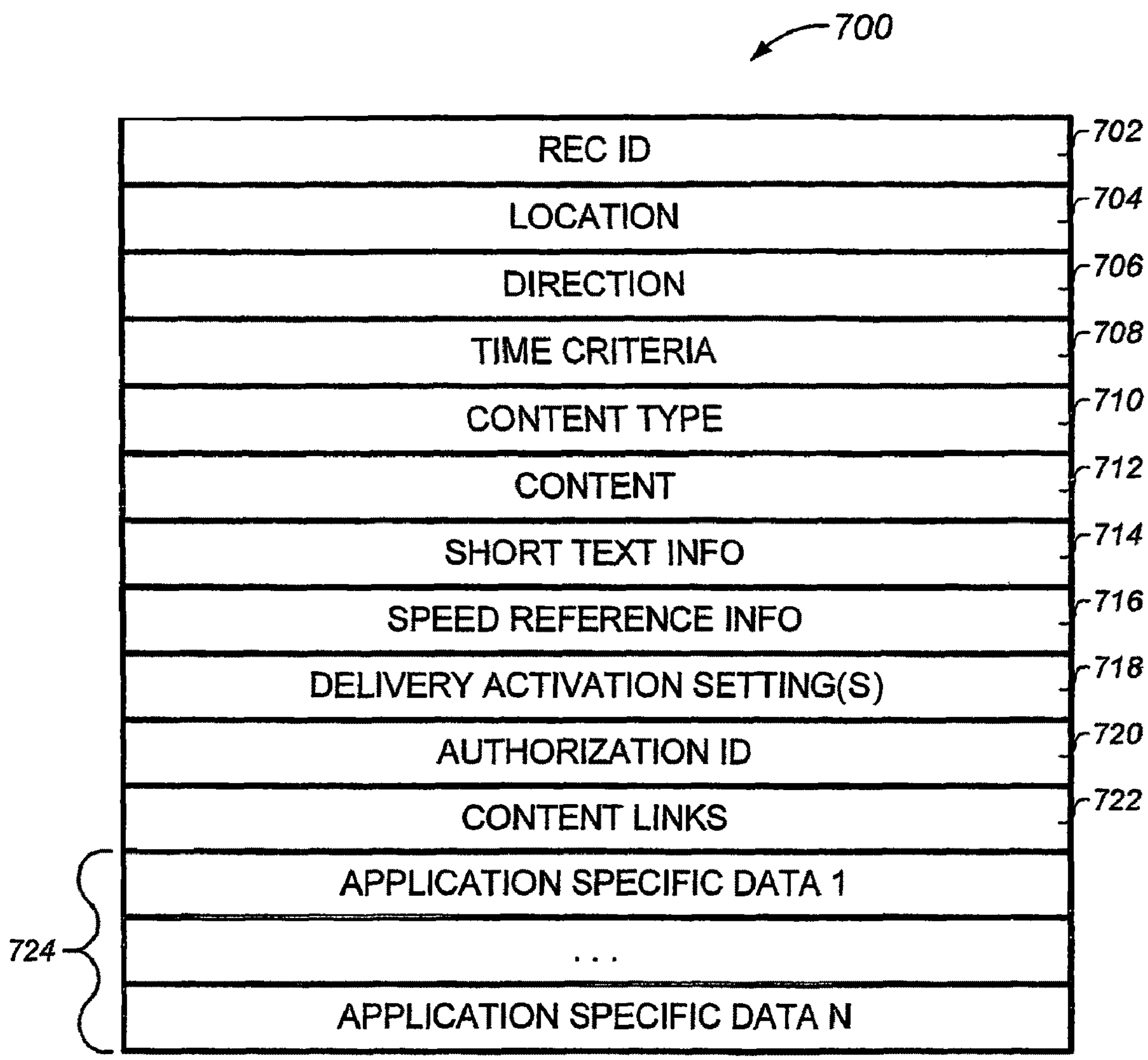
FIG. 7A depicts a preferred embodiment of a data record in the deliverable content database of the present invention.

FIG. 7A depicts a preferred embodiment of a data record in the deliverable content database of the present invention. A deliverable content database record 700 includes fields 702 through 724 as shown. Rec id field 702 is a unique identifier to the record in the database. Rec id field 702 is system generated, for example, using an Oracle unique sequence number function (Oracle is a trademark of Oracle corporation) upon inserting the record (i.e. database row) into the deliverable content database (i.e. database table). The rec id field 702 is used in the transmission history data to correlate transmitted content, enables detection of redundant delivery, and enables later RDPS retrieval of content when only a content delivery indicator is transmitted to an RDPS. Location field 704 contains a positional attribute of location information for which the associated content will be delivered. Depending on the installation, the location field contains a cellular network cell identifier, truncated precision geocentric coordinates, truncated precision geodetic coordinates, truncated three dimensional space coordinates, area described by GPS coordinates (e.g. four corners of a grid rectangle), overlay grid region identifier or coordinates, GPS coordinates with truncated precision, altitude, MAPSCO reference, telephone number (e.g. caller id), physical or logical network address (including a wildcard (e.g. ip addresses 145.32.*.*)), particular application address, or a like location. Truncated precision allows specifying a broader scope, for example, latitude/longitude in degrees, minutes, seconds, etc., depends on how the number is truncated. Zooming in implies more precision. Zooming out implies less precision. Combinations of these positional attributes may also designate a location. Depending on the installation, the positional attribute direction field 706 contains a direction such as North, South, East, West, or Southwest, Southeast, Northwest, Northeast, or Left, Right, Straight, Back, or Up, Down, or the like. A value of null may also be present when a direction is inappropriate, for example in one embodiment of FIG. 6. Time criteria field 708 contains a time window(s), or time interval(s), for which the associated deliverable content is valid for delivery. Preferably, time points of time criteria are entered in "YYYYMMDDHHMMSS" format. Content type field 710 describes the type of content field 712. Content types include, and are not limited to, web address, audio, image, multimedia, text, and video. The content field 712 contains the deliverable content, or a reference such as a file name, pointer, or the like, to the content. Short Text info field 714 allows configuration of a short textual message to be delivered to the RDPS and maintained in the RDPS transmission history data, for example, a business address. Speed reference info 716 is a web address or phone number that is delivered to the RDPS with the content, and is also maintained in the RDPS transmission history for convenient invocation. Thus, the user may browse the history, and invoke the speed reference for automatic telephone call dialing from the RDPS, or for automatic web address transposition in a launched web browser, upon a simple user selection of the speed reference from the history. Depending on the installation, delivery activation setting(s) field 718 will contain a bit mask, or the like, for the RDPS state which establishes delivery. For example, the bit mask will contain a settable bit for:

- Deliver on RDPS registration
- Deliver on RDPS termination
- Deliver only when RDPS requests
- Deliver always (used for emergency use—see Amber-Alert discussion above)
- Deliver for situational location change
- 3 or more bits reserved for future use Authorization id field 720 contains a handle to the user who configured the database record 700, for example, a password, user identifier, or the like (may be encrypted). Content links field 722 contains a YES/NO flag for whether there are multiple content fields associated with the database record 700. A separate database entity (not shown), for example a database table, can be maintained with 3 fields: one containing a matching rec id field 702 to associate the content to the deliverable content database record 700, one for the content type (like content type field 710), and one for the content (like content field 712). There may be a plurality of database records in the separate database entity that are associated with the deliverable content database record 700. The value in the rec id field 702 will be used to join all content items.

Applications specific data fields 724 are available for the SDPS being an integrated solution with some other service. Location field 704, direction field 706, time criteria field 708, and delivery activation setting(s) field 718 together with application specific fields 724 form the situational location information associated with the content which establishes a delivery.

Figure 7B:
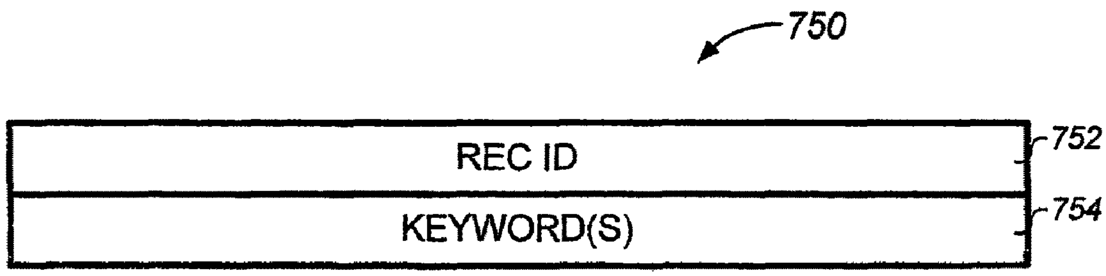
FIG. 7B depicts a preferred embodiment of a data record in the keyword data of the present invention.

FIG. 7B depicts a preferred embodiment of a data record in the keyword data of the present invention. A keyword data record 750 is joined to a deliverable content database record 700 through a matching rec id field 752. Keywords field 754 contains one or more comma separated text strings used to associate criteria to the deliverable content database record 700. Phrases containing blank separated words are enclosed in quote marks. In one embodiment of the present invention, a RDPS user specifies interests that are matched to the keywords field 754. Only the user's interests, along with the RDPS situational location, will cause delivery of associated content. An alternative embodiment for maintaining keyword data will associate a plurality of keyword data records 750 to a deliverable content database record 700, each containing a singular keyword, or phrase, in keywords field 754. Fields 704, 706, 708, 718, and 754 are system delivery constraints of the present invention.

Figure 8:
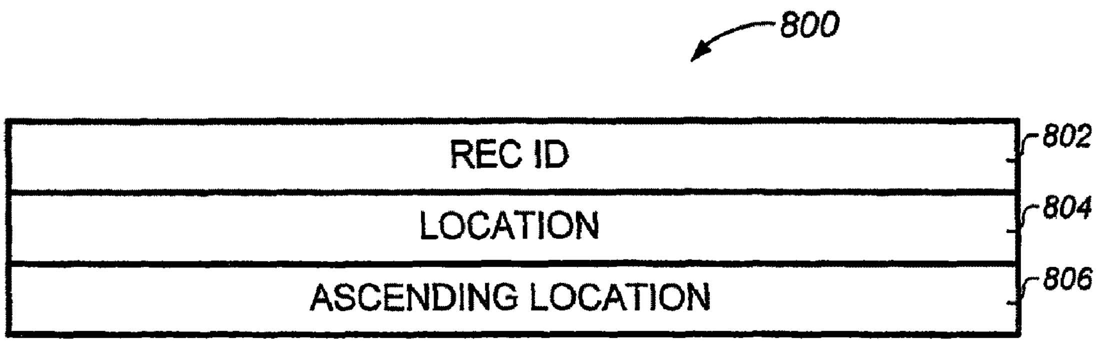
FIG. 8 depicts a preferred embodiment of a data record in the location hierarchy data of the present invention.

FIG. 8 depicts a preferred embodiment of a data record in the location hierarchy data of the present invention. A location hierarchy data record 800 has fields as shown. Rec id field 802 is a unique identifier to the record. Rec id field 802 is system generated, for example, using an Oracle unique sequence number function upon inserting the record (i.e. database row). Location field 804 is a location of the nature as described for location field 704. Ascending location field 706 is a value found in rec id field 802 of another location hierarchy data record 800. If used, the configuration of this table must be performed carefully so as to affect its use appropriately. Semantically, field 806 must be an ascending location to field 804. For example, Texas is ascending to Denton County, and Denton County is ascending to Flower Mound. Similarly, a set of MAPSCO grid numbers, that surround a MAPSCO reference grid D of map 691, are ascending to MAPSCO reference grid D of map 691. Ascending implies zooming out to cover more surrounding area. Location hierarchy data is searched in the following manner:

- For content by candidate delivery events, content is retrieved by the location, and any locations descending to that location (i.e. zoom in)
- For situational location queries, content is optionally retrieved by the location and descending locations, and optionally, ascending locations as necessary (i.e. zoom out) according to parameters (discussed below)

Figure 9A:
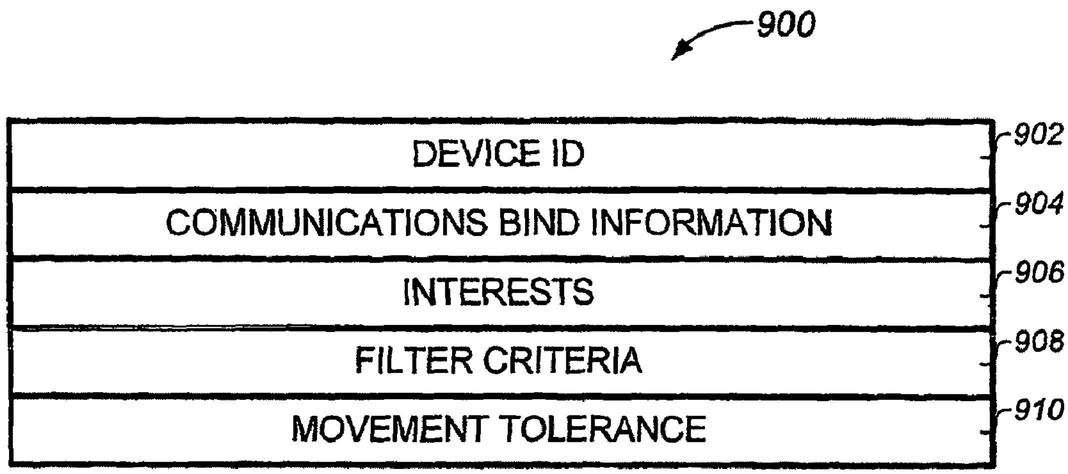
FIG. 9A depicts a preferred embodiment of a data record in the registration data of the present invention.

FIG. 9A depicts a preferred embodiment of a data record in the registration data of the present invention. A registration data record 900 is maintained by the SDPS and includes fields as shown. Device id field 902 is a unique handle to an RDPS. Depending on the installation, device id field 902 may be a telephone #, physical or logical address, or some other unique handle to the RDPS. Communications bind information field 904 is a record describing the communications session between the RDPS and SDPS, as is well known in the art. In some embodiments, field 904 contains capability information sent from the RDPS so that only the appropriate content is delivered, for example acceptable types of, or acceptable amounts (size) of, content. Interests field 906 contains one or more comma separated user configured text strings used to match to the keywords field 754. If used, only the user's interests, along with the RDPS situational location, will cause proactive delivery of associated content. Filter criteria field 908 is identical in nature to interests field 906 and keywords field 754 except the criteria is for exclusion. If used, filter criteria field 908 is also compared with keywords field 754. Thus, the RDPS user can configure interests for inclusion through field 906, or criteria for exclusion through field 908. Movement tolerance field 910 defines the minimal amount of movement since the last delivery content retrieval attempt that determines to perform another retrieval. Movement tolerance field 910 is optional depending on the installation. The movement tolerance may be a system wide setting enforced by the SDPS, associated to a class of RDPS devices, or individualized by the user or system. Field 910 may not be present because the movement tolerance is maintained by the RDPS, or is not applicable to the installation (e.g. RDPS physically connected, or located by caller id). The movement tolerance depends on the installed use of location field 704. For example, in a coordinate system, a distance may be configured. In an overlay map, region, or cell change, a number of regions or cells from a previous location may be configured. Fields 906 and 908 are user configured delivery constraints of the present invention. Registration data record 900 presence enables delivery to the associated RDPS, otherwise the RDPS is not an eligible receiver. Obvious error handling at the SDPS ignores all requests that are not from a RDPS with a device id in the registration data (except for registration types of requests (i.e. events)).

Figure 9B:
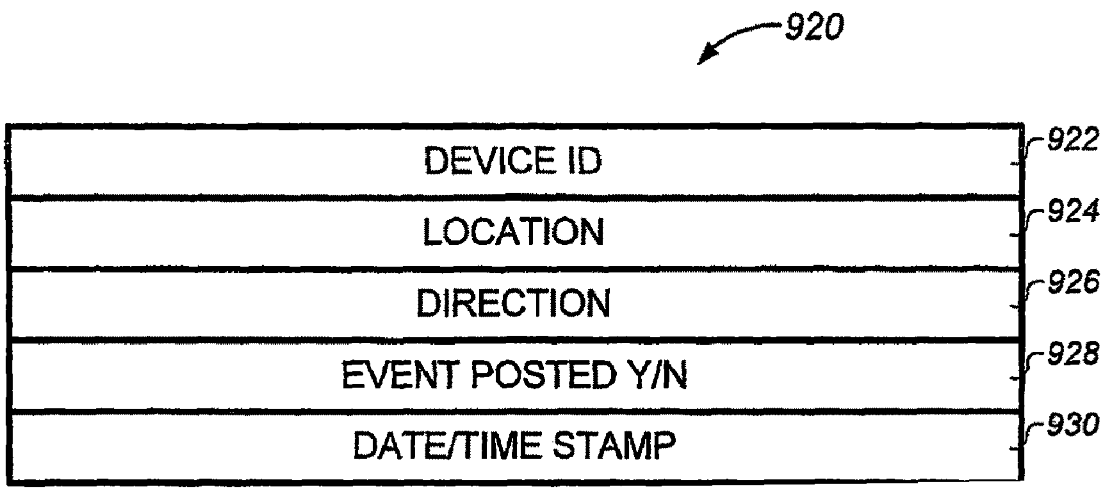
FIG. 9B depicts a preferred embodiment of a data record in the location history data of the present invention.

FIG. 9B depicts a preferred embodiment of a data record in the location history data of the present invention. A location history data record 920 is maintained for the travels of a RDPS, and includes fields as shown. Device id field 922 is identical in nature to device id field 902. Location field 924 is identical in nature to location field 704. Direction field 926 is identical in nature to direction field 706. Event posted field 928 is a YES/NO flag for whether or not this location history data record 920 is associated with generating a CADE. Date/time stamp field 930 is the time that the RDPS was detected at the associated location and specified direction of fields 924 and 926. Direction field 926 is optional depending on the installation, as discussed above.

Figure 9C:
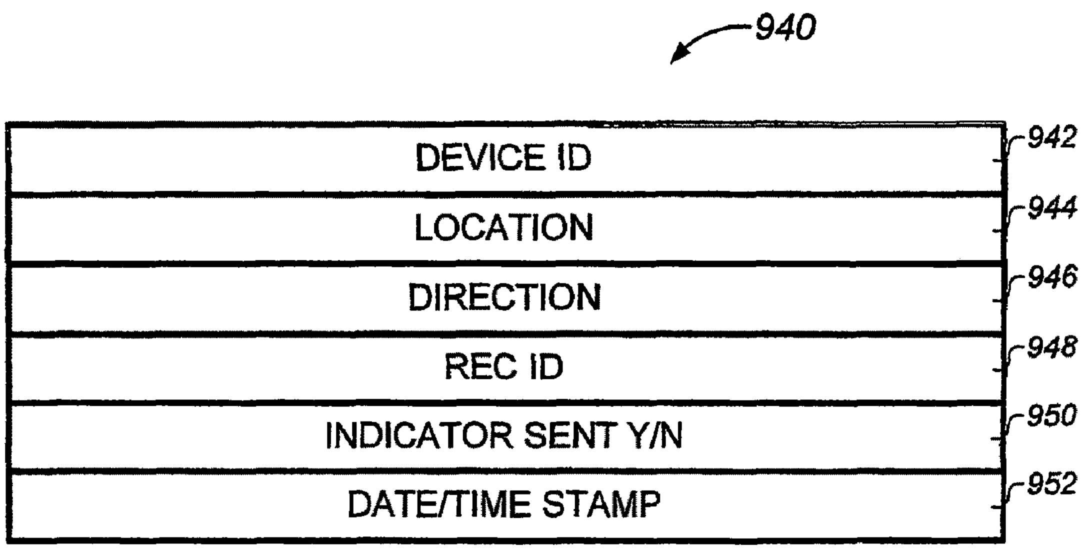
FIG. 9C depicts a preferred embodiment of a data record in the SDPS transmission history data of the present invention.

FIG. 9C depicts a preferred embodiment of a data record in the SDPS transmission history data of the present invention. A transmission history data record 940 is maintained at the SDPS for all content that is transmitted to the RDPS, and includes fields as shown. Device id field 942 is identical in nature to device id field 902. Location field 944 is identical in nature to location field 704. Direction field 946 is identical in nature to direction field 706. Rec id field 948 contains a copy of rec id field 702 for content that was transmitted to the RDPS of field 942. Indicator sent field 950 is a YES/NO flag for whether or not the content was actually transmitted, or a content delivery indicator for the content was transmitted. Date/time stamp field 952 is the time that content described by field 948 was transmitted to the RDPS. Direction field 946 is optional depending on the installation, as discussed above.

Figure 9D:
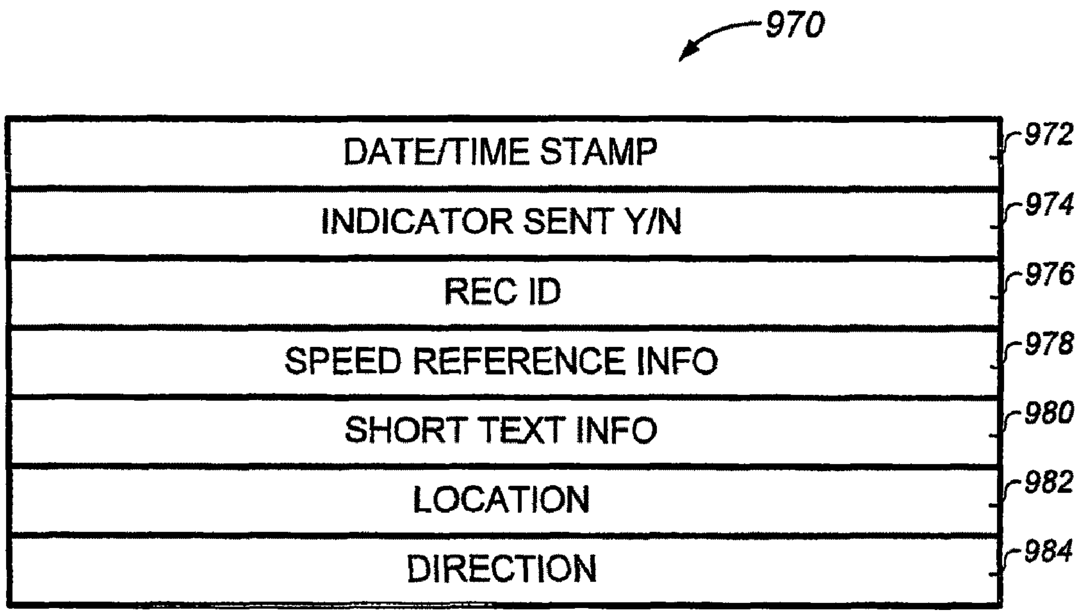
FIG. 9D depicts a preferred embodiment of a data record in the RDPS transmission history data of the present invention.

FIG. 9D depicts a preferred embodiment of a data record in the RDPS transmission history data of the present invention. A transmission history data record 970 is maintained at the RDPS for all content that is received by the RDPS, and includes fields as shown. Date/time stamp field 972 is the time that content described by rec id field 976 was received by the RDPS. Indicator sent field 974 is a YES/NO flag for whether or not the content was actually received, or an indicator for the content was received. Rec id field 976 contains a copy of rec id field 702 for content that was received by the RDPS. Speed reference information field 978 contains a phone number for automatic dialing, a web page reference for automatic transposition, or both. Speed reference information field 978 is obtained by the RDPS from field 716. Short text field 980 is obtained by the RDPS from 714. Location field 982 is identical in nature to field 704. Direction field 984 is identical in nature to field 706. Field 982 and 984 may not be used if this information is maintained at the SDPS. Fields 982 and 984 are preferably used when the RDPS handles CADE generation, or if the SDPS additionally transmits the information with the content. Direction field 984 is optional depending on the installation, as discussed above.

Figure 10A:
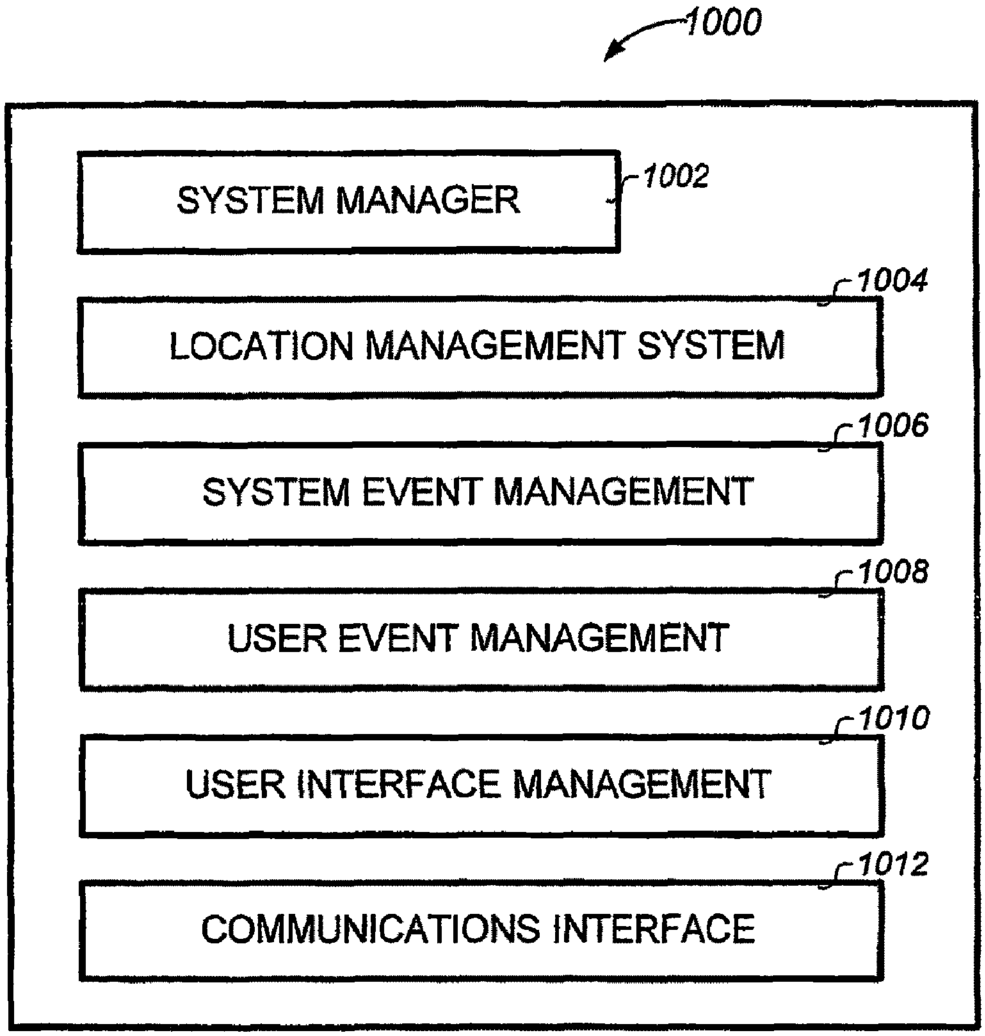
FIG. 10A depicts a preferred embodiment high level example componentization of a RDPS of the present invention when the RDPS generates the candidate delivery event.

FIG. 10A depicts a preferred embodiment high level example componentization of a RDPS of the present invention when the RDPS generates the candidate delivery event. An RDPS 1000 includes system manager 1002, location management system 1004, system event management 1006, user event management 1008, user interface management 1010, and communications interface 1012. System manager 1002 is the operating system environment of the RDPS 1000. Location management system 1004 provides means for locating the RDPS 1000, for example GPS functionality. System event management 1006 provides an interface to system event processing relevant to the present invention that is not directly caused by a user. User event management 1008 provides an interface to event processing relevant to the present invention that is directly caused by a user, for example when the user uses the RDPS user interface. User interface management 1010 is the user interface system environment of the RDPS 1000, for example, a variety of Microsoft Windows (Microsoft and Windows are trademarks of Microsoft corporation), a wireless phone interface, or some other user interface system. Communications interface 1012 provides the interface between the RDPS 1000 and the SDPS.

Figure 10B:
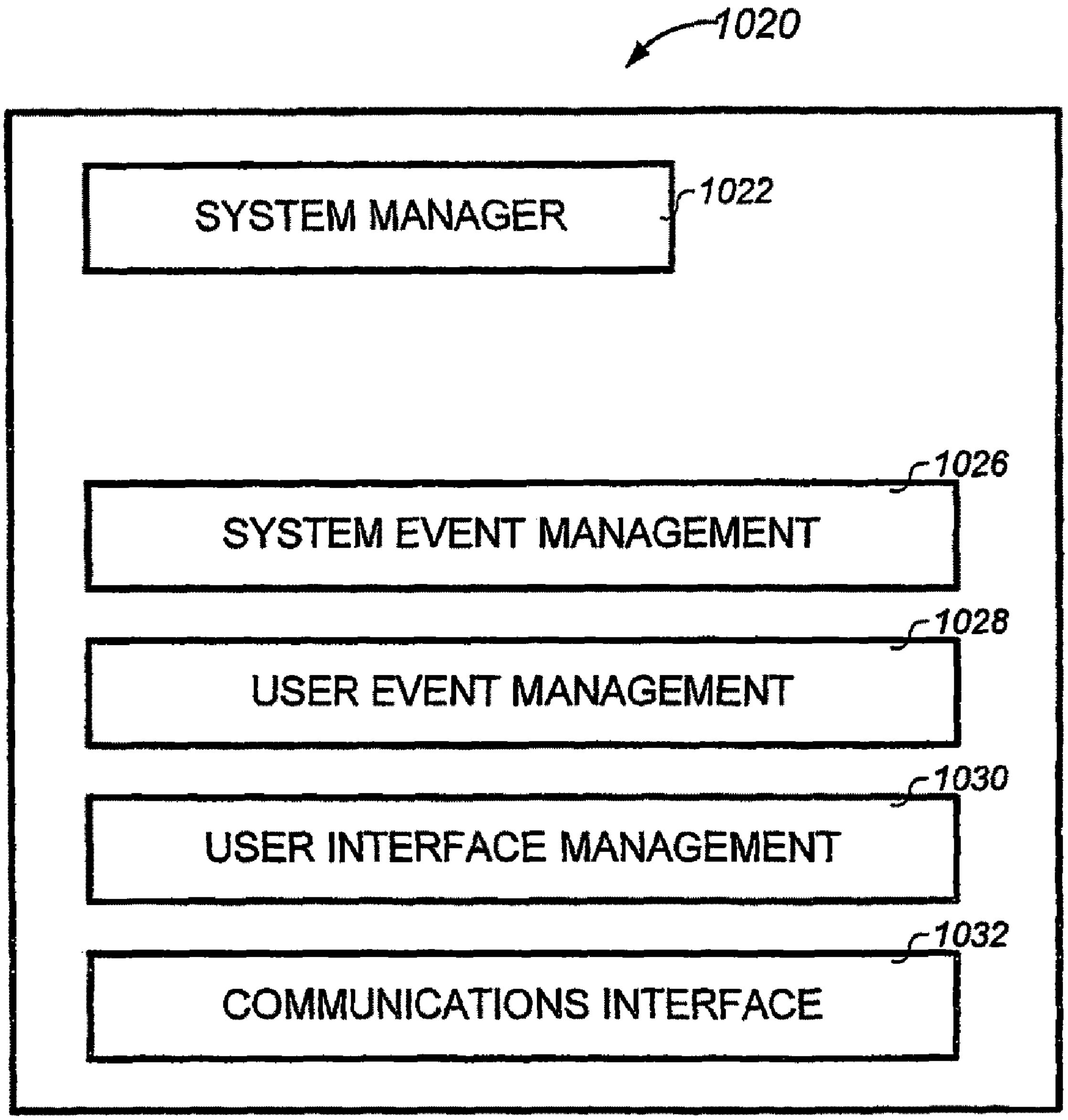
FIG. 10B depicts a preferred embodiment high level example componentization of a RDPS of the present invention when the SDPS generates the candidate delivery event.

FIG. 10B depicts a preferred embodiment high level example componentization of a RDPS of the present invention when the SDPS generates the candidate delivery event. An RDPS 1020 includes a system manager 1022, system event management 1026, user event management 1028, user interface management 1030, and communications interface 1032. System manager 1022 is the operating system environment of the RDPS 1020. System event management 1026 provides an interface to system event processing relevant to the present invention that is not directly caused by a user. User event management 1028 provides an interface to event processing relevant to the present invention that is directly caused by a user, for example when the user uses the RDPS user interface. User interface management 1030 is the user interface system environment of the RDPS 1020, for example, a variety of Microsoft Windows (Microsoft and Windows are trademarks of Microsoft corporation), a wireless phone interface, or some other user interface system. Communications interface 1032 provides the interface between the RDPS 1020 and the SDPS. RDPS 1000 and RDPS 1020 may further include a local cache with a cache management component that facilitates cacheing the deliverable content database and associated data at the RDPS for efficient access.

Figure 10C:
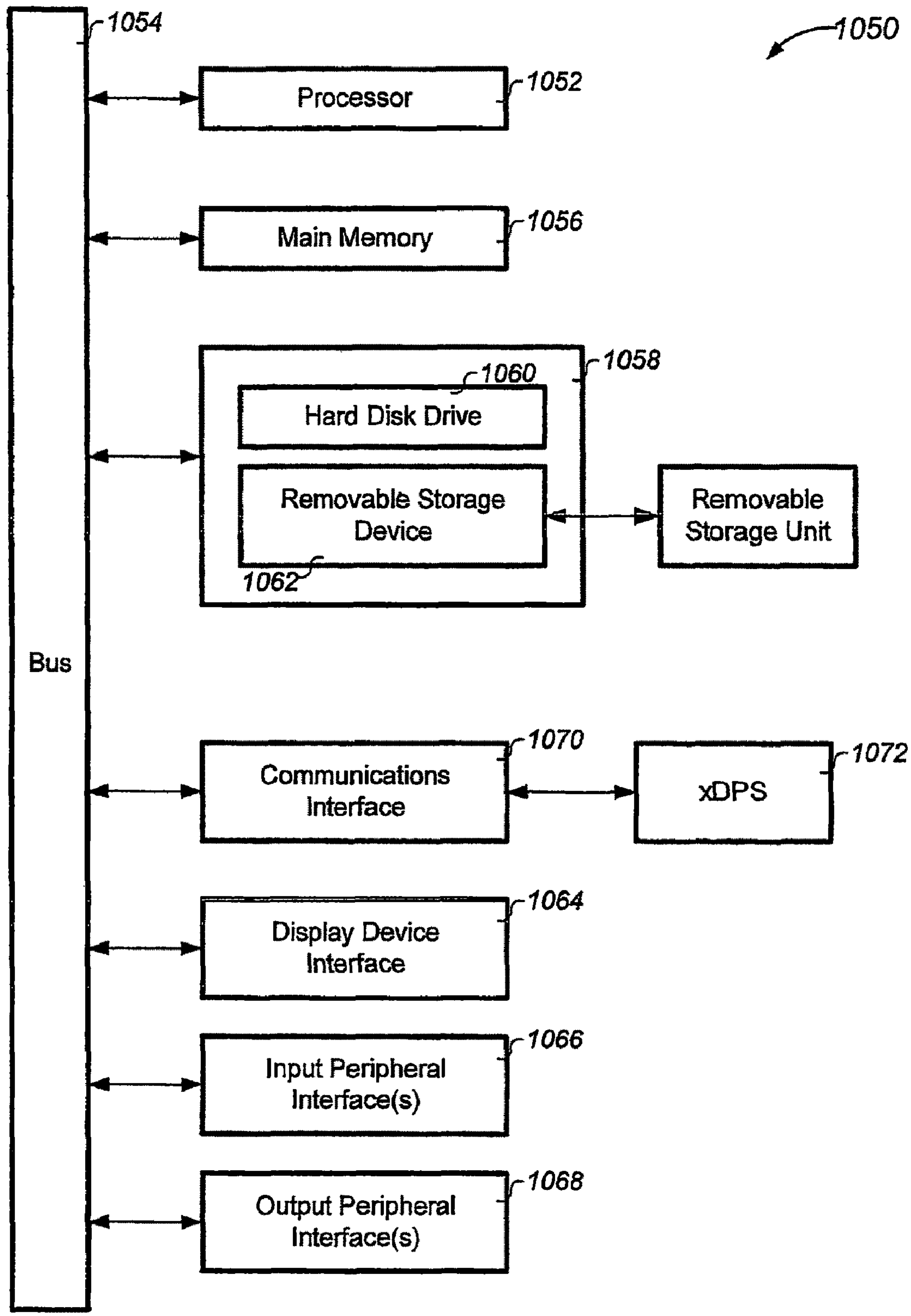
FIG. 10C depicts a block diagram of a data processing system useful for implementing RDPS aspects of the present invention, and SDPS aspects of the present invention.

FIG. 10C depicts a block diagram of a data processing system useful for implementing RDPS aspects of the present invention, and SDPS aspects of the present invention. A data processing system 1050 according to the present invention includes at least one processor 1052 coupled to a bus 1054. The data processing system 1050 also includes main memory 1056, for example, random access memory (RAM). Optionally, the data processing system 1050 may include secondary storage devices 1058 such as a hard disk drive 1060, and/or removable storage device 1062 such as a compact disk, floppy diskette, or the like, also connected to bus 1054. In one embodiment, secondary storage devices could be remote to the data processing system 1050 and coupled through an appropriate communications interface.

The data processing system 1050 may also include a display device interface 1064 for driving a connected display device (not shown). The data processing system 1050 may further include one or more input peripheral interface(s) 1066 to input devices such as a keyboard, telephone keypad, Personal Digital Assistant (PDA) writing implements, mouse, voice interface, or the like. User input ("user input", "user events" and "user actions" used interchangeably) to the data processing system are inputs accepted by the input peripheral interface(s) 1066. The data processing system 1050 may still further include one or more output peripheral interface(s) 1068 to output devices such as a printer, facsimile device, or the like.

Data processing system 1050 will include a communications interface 1070 for communicating to an other data processing system 1072 via analog signal waves, digital signal waves, infrared proximity, copper wire, optical fiber, or the like. Other data processing system 1072 is an RDPS when data processing system 1050 is an SDPS. Other processing system 1072 is an SDPS when data processing system 1050 is an RDPS. In any case, the RDPS and SDPS are said to be interoperating when communicating. Thus, the RDPS and SDPS form an interoperating communications system between which data may be communicated.

Data processing system programs (also called control logic) may be completely inherent in the processor 1052 being a customized semiconductor, or may be stored in main memory 1056 for execution by processor 1052 as the result of a read-only memory (ROM) load (not shown), or may be loaded from a secondary storage device into main memory 1056 for execution by processor 1052. Such programs, when executed, enable the data processing system 1050 to perform features of the present invention as discussed herein. Accordingly, such data processing system programs represent controllers of the data processing system.

In one embodiment, the invention is directed to a control logic program product comprising a processor 1052 readable medium having control logic (software) stored therein. The control logic, when executed by processor 1052, causes the processor 1052 to perform functions of the invention as described herein.

In another embodiment, the invention is implemented primarily in hardware, for example, using a prefabricated component state machine (or multiple state machines) in a semiconductor element such as processor 1052.

Those skilled in the art will appreciate various modifications to the data processing system 1050 without departing from the spirit and scope of the invention. Data processing system 1050, as discussed, is representative of a RDPS of the present invention. Data processing system 1050, as discussed, is representative of a SDPS of the present invention.

Receiving Data Processing System Candidate Delivery Event Generation Embodiment

Figure 11:
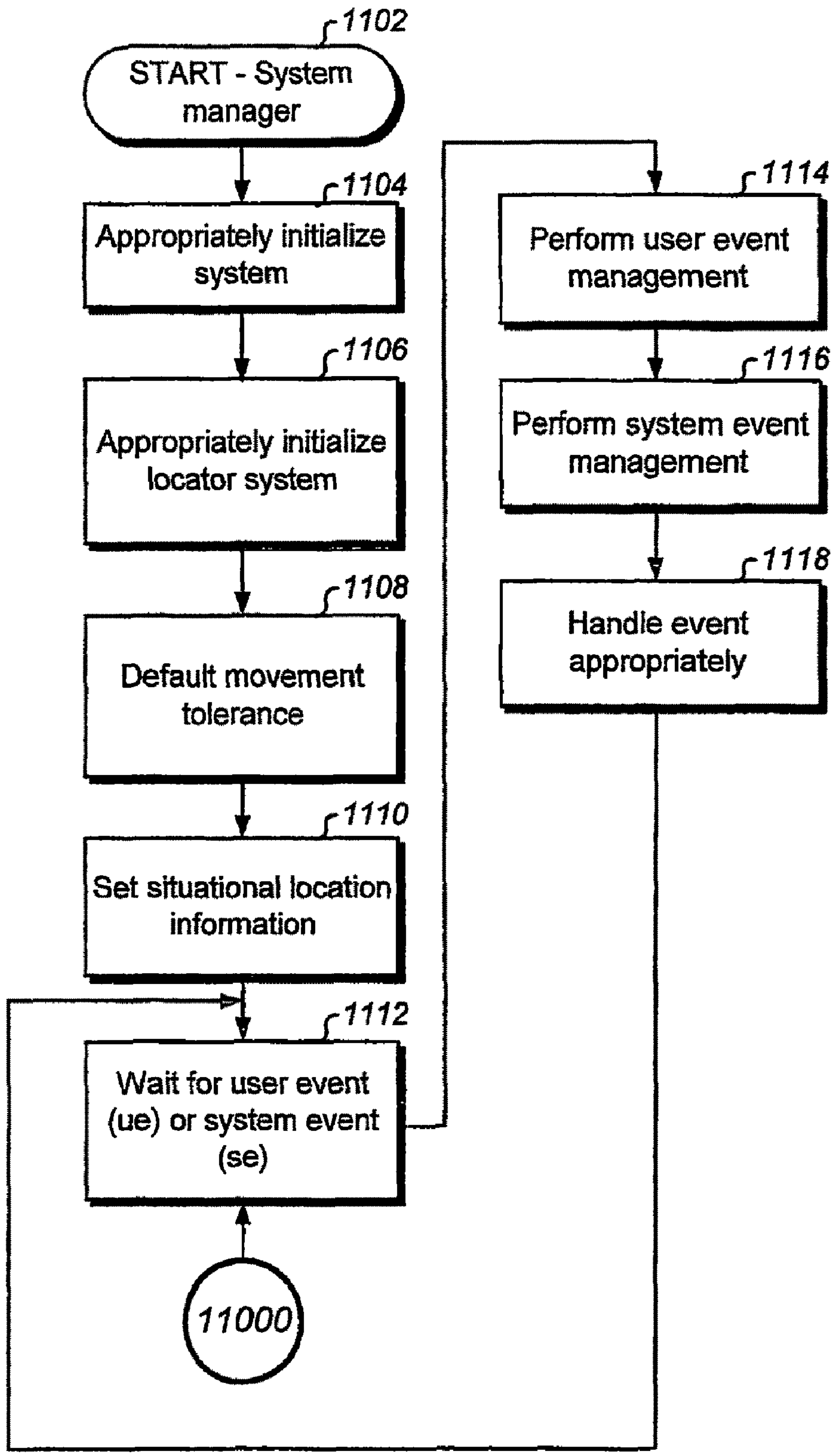
FIG. 11 depicts a flowchart for describing data processing system aspects relevant to a preferred embodiment of the RDPS of the present invention, in the context of candidate delivery event determination by the RDPS.

FIG. 11 depicts a flowchart for describing data processing system aspects relevant to a preferred embodiment of the RDPS of the present invention, in the context of candidate delivery event generation by the RDPS. When the RDPS is enabled, for example, by a power switch, system manager processing begins at block 1102 and continues to block 1104 where the system appropriately initializes, for example to default interfaces. Processing continues to block 1106 where the location management system is initialized as is appropriate for the particular RDPS, and then on to block 1108 where a movement tolerance is defaulted, depending on the RDPS installation, and depending on what it was during the last power-on. The movement tolerance may be user configurable or system set, and is therefore either a system delivery constraint, or user configured delivery constraint. Thereafter, block 1110 defaults situational location information to the most recent setting for a CADE from last power-on, or system just started if this is the first power-on, and block 1112 waits for a user event or system event. User interface management is coupled with the system manager to enable a user to the RDPS. Upon detection of an event, block 1112 flows to block 1114 for any user event management processing. Should block 1114 processing return, block 1116 performs any system event management processing. Should processing of block 1116 return, block 1118 handles the event appropriately as is relevant for other events of the RDPS, for example, user interface control of little interest to discussion of the present invention. Thereafter, block 1118 flows to block 1112 for processing as described. Another embodiment of FIG. 11 will implement a multithreaded system wherein events are handled asynchronously as they occur.

Figure 12A:
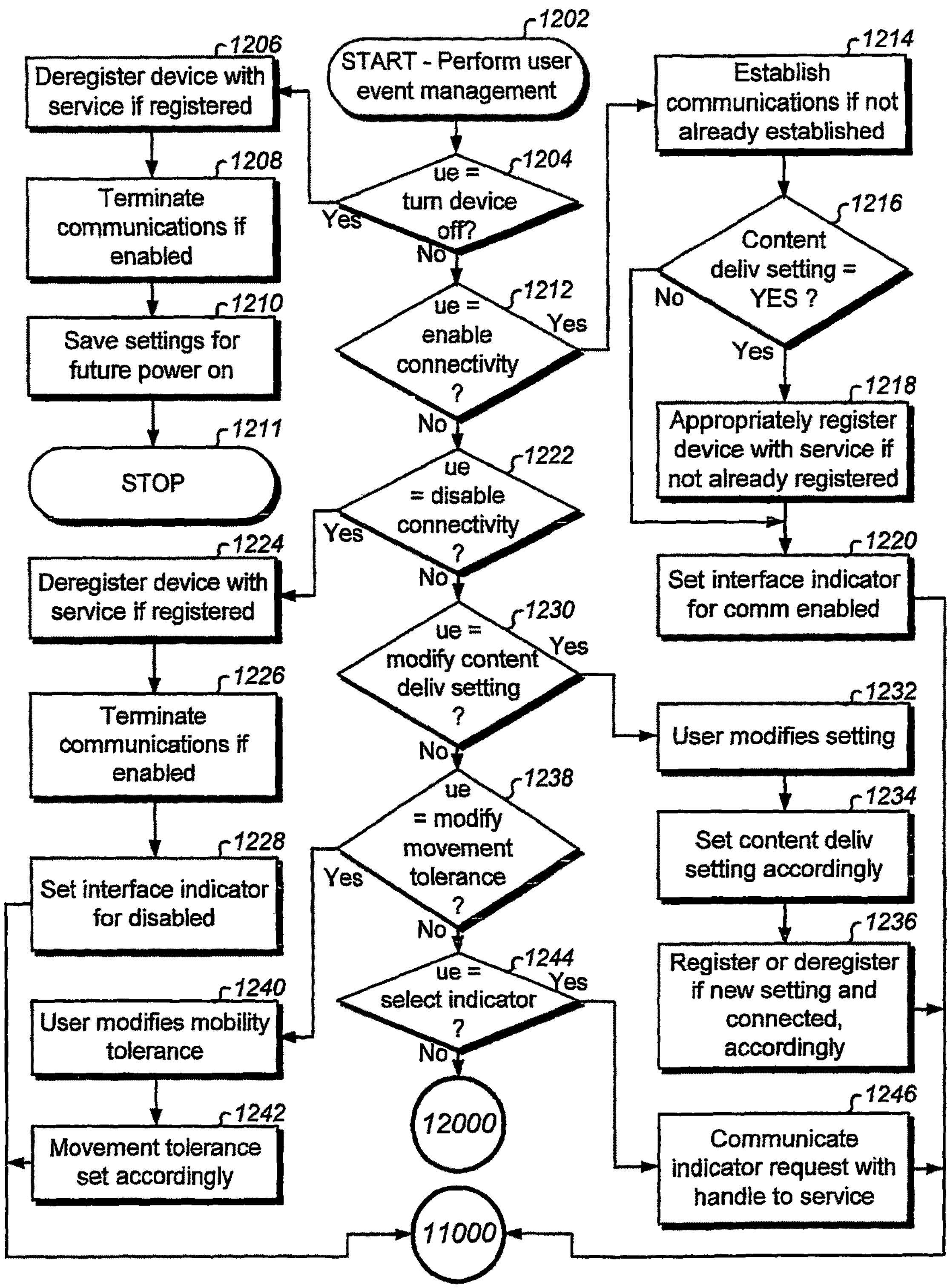
FIGS. 12A and 12B depict flowcharts for describing user event management processing aspects of a preferred embodiment of the RDPS of the present invention, in the context of candidate delivery event determination by the RDPS.
Figure 12B:
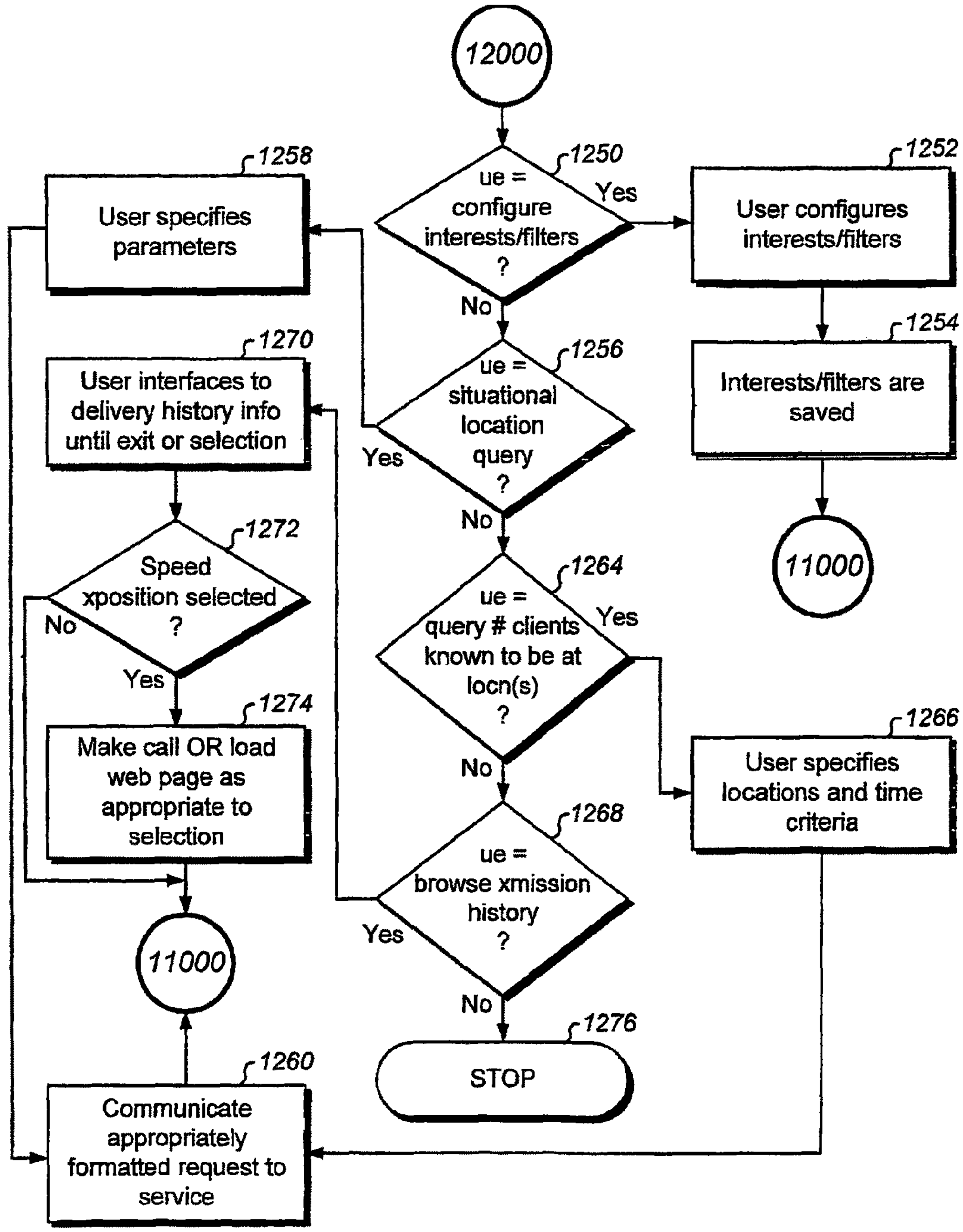

FIGS. 12A and 12B depict flowcharts for describing user event management processing aspects of a preferred embodiment of the RDPS of the present invention, in the context of candidate delivery event generation by the RDPS. User event management begins at block 1202 and continues to block 1204. If block 1204 determines that the user event is powering the RDPS off, then block 1206 communicates with the SDPS to remove (if any) its RDPS data record 900 from the registration data, block 1208 terminates any communication session gracefully (if required) depending on the RDPS, block 1210 saves settings, for example, the movement tolerance and delivery setting for the next power on, and RDPS processing stops at block 1211.

If block 1204 determines the RDPS was not turned off, then processing continues to block 1212. If block 1212 determines that the user selected to enable communications with the SDPS, then block 1214 establishes communications with the SDPS (if not already established), and block 1216 consults the current delivery setting. In one embodiment, block 1214 through 1220 may be processed just as the result of a wireless device being powered on. If block 1216 determines that the content delivery setting for receiving situational location dependent content is enabled, then block 1218 communicates with the SDPS for inserting a registry data record 900 into the registry data. Thereafter, block 1220 sets a RDPS user interface indicator showing that communications to the SDPS is enabled, and processing returns to block 1112 of FIG. 11 by way of off page connector 11000. If block 1216 determines the delivery setting is not enabled, then processing continues to block 1220.

If block 1212 determines that the user did not select to enable communications to the SDPS, then processing continues to block 1222. If block 1222 determines that the user selected to disable SDPS communications, then block 1224 communicates with the SDPS to remove its registry data record 900 from registry data, block 1226 terminates the communications session gracefully (if required) depending on the RDPS embodiment, block 1228 sets the communications to SDPS user interface indicator to disabled, and processing continues back to block 1112. In one embodiment, block 1224 through 1228 may be processed just as the result of a wireless device being powered off.

If block 1222 determines the user did not select to disable communications to the SDPS, then processing continues to block 1230. If block 1230 determines that the user selected to modify the RDPS content delivery setting, then the user modifies the setting at block 1232, the delivery setting is set accordingly at block 1234. Preferably, blocks 1230/1232 allow a user to toggle the content delivery setting. No content will be delivered when this setting is disabled. Being registered with the SDPS constitutes being eligible for delivery. Alternative embodiments won't have such a feature. The content delivery setting is a user configured delivery constraint. Block 1234 also sets and an indicator in the user interface for displaying that setting, and block 1236 communicates with the SDPS to insert or remove its registry data record 900 should the setting be different than previous. Of course, appropriate error handling is performed by block 1236 if there is no communications enabled. Thereafter, processing continues to block 1112.

If block 1230 determines that the user did not select to modify the content delivery setting, then processing continues to block 1238. If block 1238 determines that the user selected to modify the movement tolerance, then the user modifies a validated movement tolerance at block 1240, the movement tolerance is set at block 1242, and processing continues back to block 1112.

If block 1238 determines that the user did not select to modify the movement tolerance, then processing continues to block 1244. If block 1244 determines that the user selected a content delivery indicator, as maintained in a transmission history data record 970 for deliverable content from the SDPS, then block 1246 communicates with the SDPS using the rec id field 976. In one embodiment, the user peruses the transmission history data in response to receiving a content delivery indicator from the SDPS. In another embodiment, correlation is maintained between individual user interface indicators to their associated transmission history data record 970 for allowing the user to simply select the indicator in the user interface for communicating with the SDPS to deliver the associated content. Providing a visual and/or audible presentation of the indicator is well known in the art, and may be implemented with a variety of methods. Block 1246 makes the request for content to the SDPS with the rec id 976. Thereafter, via a received system event, blocks 1318 through 1326 handle receipt, delivery, and RDPS user interface presentation of the content in a manner appropriate to the content type from the SDPS. Processing continues from block 1246 back to block 1112.

If block 1244 determines that the user did not select an indicator of deliverable content, then processing continues to block 1250 by way of off page connector 12000. If block 1250 determines that the user selected to configure interests or filters, then block 1252 interfaces with the user to configure interests or filters which are saved locally at block 1254, and processing continues back to block 1112 by way of off page connector 11000. Any configured interests and filters are communicated to the SDPS at blocks 1218 and 1236 as part of registration. Interests field 906 and filter criteria field 908 are set with data configured at block 1252. The RDPS must de-register and re-register with new settings. In an alternative embodiment, block 1254 communicates with the SDPS to update the RDPS' registry data record 900.

If block 1250 determines that the user did not select to configure interests or filters, then processing continues to block 1256. If block 1256 determines the user selected to perform a situational location query, then the user specifies validated parameters (discussed with FIG. 15B) at block 1258. Thereafter, block 1260 communicates an appropriate formatted request to the SDPS. Thereafter, via a received system event, blocks 1318 through 1326 handle receipt, delivery, and RDPS user interface presentation of the content in a manner appropriate to the content type from the SDPS. Processing leaves block 1260 and returns to block 1112.

If block 1256 determines that the user did not select to perform a situational location query, then processing continues to block 1264. If block 1264 determines that the user selected to query the number of known RDPS devices at a location(s) (i.e. a client count request), then block 1266 interfaces with the user to specify valid parameters including situational location information and time criteria, and processing continues to block 1260 which was described. A content specification parameter may also be specified for retrieving the situational location content as well. Time criteria embodiments include any time window in history, a current time window (of request, transmission of request, SDPS receipt of request, or processing the request), or a truncated precision time. Truncated precision time allows specifying time windows (e.g. 12:04 pm implies 4 minutes after 12:00 pm and additionally any number of seconds up to and not including 5 minutes after 12:00 pm).

If block 1264 determines that the user did not select to query the number of RDPS devices at a location(s) (i.e. a client count request), then processing continues to block 1268. If block 1268 determines that the user selected to browse transmission history data, then block 1270 interfaces with the user until he either exits, or selects information from the speed reference information field 978 from a transmission history data record 970. Preferably, block 1270 permits scrolling transmission history data records 970 with fields columnized. If, at block 1272, the user selected information of field 978, then block 1274 automatically performs the action, an automatic dialing of a telephone number, or automatic transposition to a web page. Speed reference information field 978 is preferably related to content that was delivered as referenced by rec id field 976. Thereafter, processing continues back to block 1112. If block 1272 determines that the user exited from block 1270, then processing continues back to block 1112.

If block 1268 determines that the user did not select to browse the transmission history data, then processing stops at block 1276. Note that some RDPS embodiments will not require blocks 1212 through 1228 because there may not be an active session required to have communications between the RDPS and SDPS.

Figure 13:
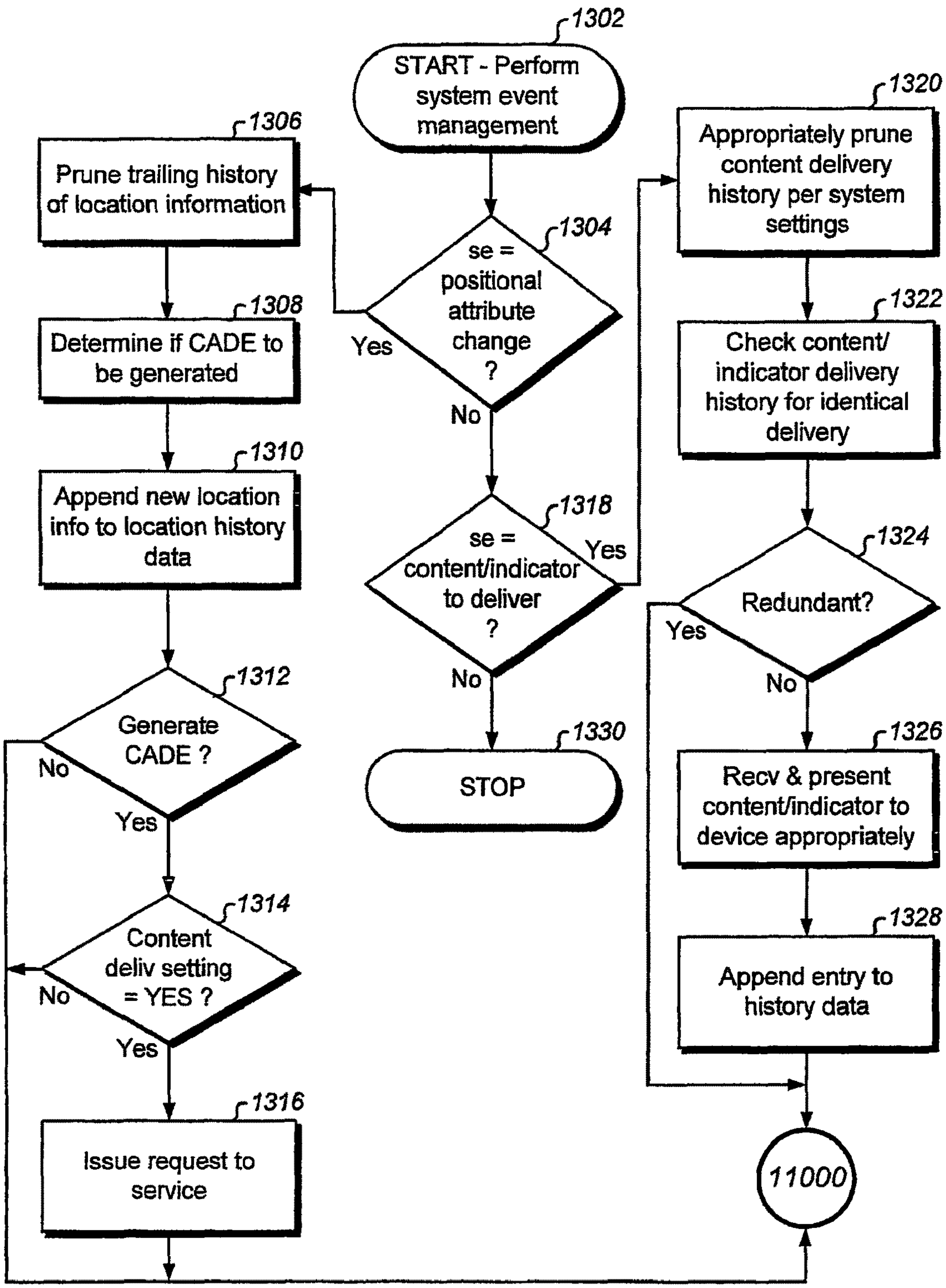
FIG. 13 depicts a flowchart for describing system event management processing aspects of a preferred embodiment of the RDPS of the present invention, in the context of candidate delivery event determination by the RDPS.

FIG. 13 depicts a flowchart for describing system event management processing aspects of a preferred embodiment of the RDPS of the present invention, in the context of candidate delivery event generation by the RDPS. System event management begins at block 1302, and continues to block 1304. If block 1304 determines the system event is a positional attribute change (e.g. location change) from the RDPS location management system, housekeeping is performed at block 1306 by pruning the location history data maintained at the RDPS. Pruning may be by time, number of entries, or other criteria. Thereafter, block 1308 determines if a CADE is to be generated. In one embodiment, block 1308 compares the current positional attribute (e.g. location) with the former positional attribute of location history data record 920 that contains an event posted YES/NO field 928 set to YES. The distance is calculated and then compared with the movement tolerance. Block 1308 also determines if there was a direction positional attribute change. Processing continues to block 1310 where a location history data record 920 is appended to the location history data for the current location and/or direction with the event posted field 928 set according to what block 1308 determined. Block 1310 flows to block 1312.

If block 1312 determines that a CADE is to be generated to the SDPS, then processing continues to block 1314. If block 1314 determines that the content delivery setting is set to enabled, then block 1316 formats and issues a CADE request to the SDPS, and processing continues to block 1112 by way of off page connector 11000.

If block 1314 determines that the content delivery setting is not enabled, then processing continues to block 1112. If block 1312 determines that a CADE is not to be generated, then processing continues to block 1112.

If block 1304 determines that the system event was not for a RDPS positional attribute change from the location management system, then processing continues to block 1318. If block 1318 determines that the system event is a transmission from the SDPS with content to deliver, or a content delivery indicator to content, then block 1320 performs housekeeping by pruning transmission history data records 970. Pruning is performed by time, number of entries, or some other criteria. Block 1320 flows to block 1322 where the transmission history data is checked to see if the rec id field 702 for the content or content delivery indicator, communicated with the system event, is already present in a transmission history data record 970. If the same content was already delivered, a rec id field 976 will match the rec id field 702 for pending presentation. The system event contains parameters including rec id field 702 with an indicator status for allowing the user to retrieve the content at a later time. If block 1324 determines the rec id field 702 of the event is already contained in the transmission history data, then processing continues back to block 1112 with no delivery processing. If block 1324 determines it is not a redundant delivery, then block 1326 communicates with the SDPS for retrieval of the location field 704, direction field 706, content type field 710, short text field 714, and speed reference info field 716. Any type of content is presented to the RDPS user interface in the appropriate manner. Various embodiments may limit types of content using a variety of methods, located at the RDPS or SDPS. Additionally, either content field 712 and linked content via content links field 722 is retrieved, or content delivery indicator(s) status is retrieved. Thereafter, block 1328 appends a transmission history data record 970 to the RDPS transmission history data, and processing continues to block 1112. Blocks 1320 through 1326 handle all content (or indicator) delivery to the RDPS, preferably asynchronously to all other RDPS processing.

If block 1318 determines that the system event was not for delivery, then processing stops at block 1330. An alternative embodiment to FIG. 13 processing will not check history for redundant content delivery. Or, a user may enable or disable the feature. Block 1326 may also include applying client located filters for filtering out content. In such an embodiment, a filter criteria field 908 may not be required. The user of the RDPS may also modify the transmission history data to allow a redundant refresh.

Figure 14:
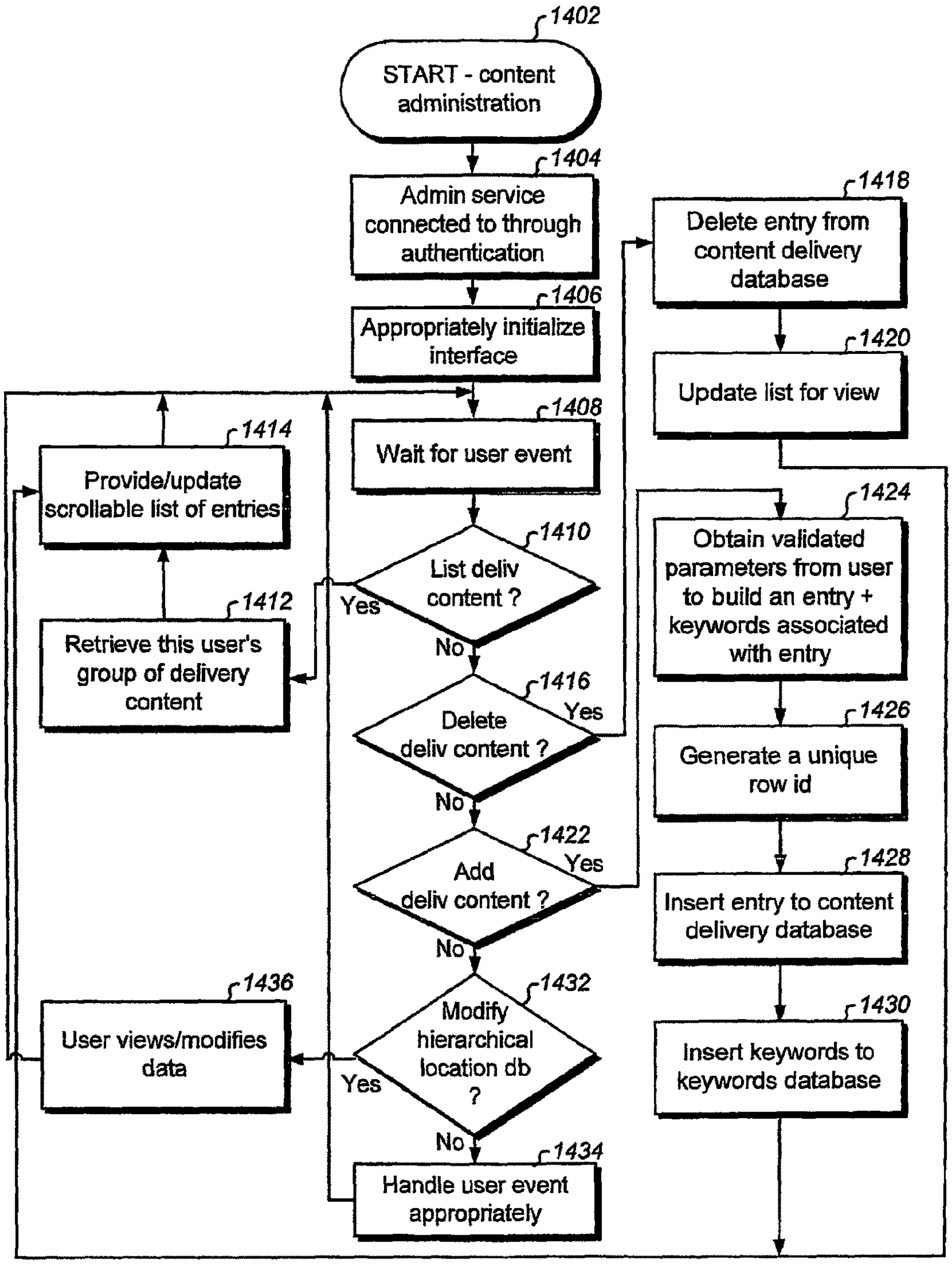
FIG. 14 depicts a flowchart for describing the content administration aspects of the present invention.

FIG. 14 depicts a flowchart for describing the content administration aspects of the present invention. An administrator, preferably a paying customer with rights to configure the deliverable content database, invokes the present invention administration interface. FIG. 14 is preferably a public access enabled, internet connected user interface for modifying the deliverable content database. The administrator may act on behalf of a paying customer. Processing begins at block 1402 and continues to block 1404 where the administrator is first authenticated as a valid user to perform administration. Then, block 1406 appropriately initializes the administration interface. Thereafter, block 1408 waits for user action (a user event). Once a user action is detected, processing continues.

If block 1410 determines that the administrator selected to list his deliverable content database records 700, then the deliverable content database is searched using the administrator's authorization id against the authorization id field 720. Any deliverable content database records 700 belonging to the administrator are put into a scrollable list at block 1414, and processing continues back to block 1408. Options are available for appropriately presenting the content, keywords data record 750, and linked content via content links field 722. The scrollable list preferably columnizes the displayable fields 702, 704, 706, 708, 710, 714, 716, 718, and 724.

If block 1410 determines the user did not select to list his deliverable content database configurations, then processing continues to block 1416. If block 1416 determines that the user selected to delete a deliverable content data record 700 from the scrollable list, then block 1418 deletes the record 700 from the content deliverable database along with any associated keywords data record 750, and linked content via content links field 722. Thereafter, block 1420 updates the scrollable list data, and processing continues back to block 1414.

If block 1416 determines that the administrator did not select to delete, then processing continues to block 1422. If block 1422 determines the administrator selected to add a deliverable content database record 700, then block 1424 interfaces with the administrator for validated entry. Thereafter, block 1426 generates a unique number record identifier for rec id field 702, block 1428 inserts into the deliverable content database, block 1430 inserts any associated keyword data record 750 to the keyword data, and processing continues back to block 1414. Keywords specification allows associating delivery content to a user's interests or filters in registration data for establishing a basis of delivery. Block 1424 provides appropriate interfaces for specifying and reviewing all types of content. Block 1428 additionally populates linked content if content links field 722 is used. Once a deliverable content database record 700 is inserted, it is instantly activated for candidate delivery. The delivery is proactive when the RDPS situational location is automatically determined.

If block 1422 determines the user did not select to add a deliverable content database record 700, then processing continues to block 1432. If block 1432 determines that the user selected to modify location hierarchy data records 800, then the user modifies the data at block 1436 and processing continues back to block 1408. If block 1432 determines the user did not select to modify location hierarchy data, then processing continues to block 1434 where other user actions are handled. Other user actions include scrolling, window manipulation, exiting the administration interface, or other navigation not relevant for discussion. Processing then continues back to block 1408.

Preferably, the block 1432 option only presents itself to a special super-user administrator who is unlikely to cause problems for all other administrated configurations. It is very important that all data be maintained with integrity by blocks 1418 and 1428. For example, a deliverable content database record 700 deleted should not be referenced by transmission history data 940. The rec id field 702 will no longer be valid. FIG. 14 processing may include an update deliverable database record option in alternative embodiments.

Figure 15A:
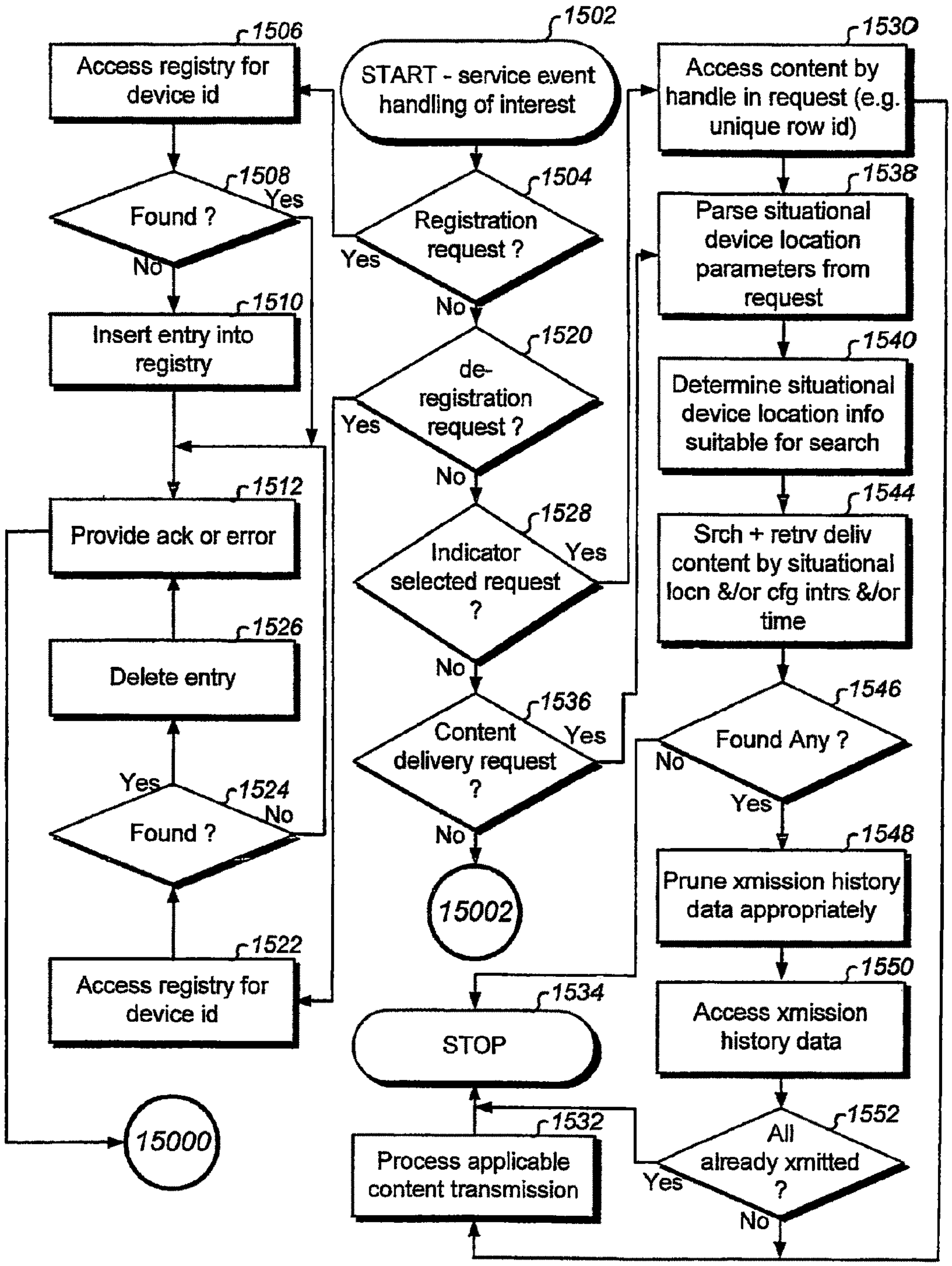
FIGS. 15A, 15B, and 15C depict flowcharts for service event handling aspects of a preferred embodiment of the SDPS of the present invention, in the context of candidate delivery event determination by the RDPS.
Figure 15B:
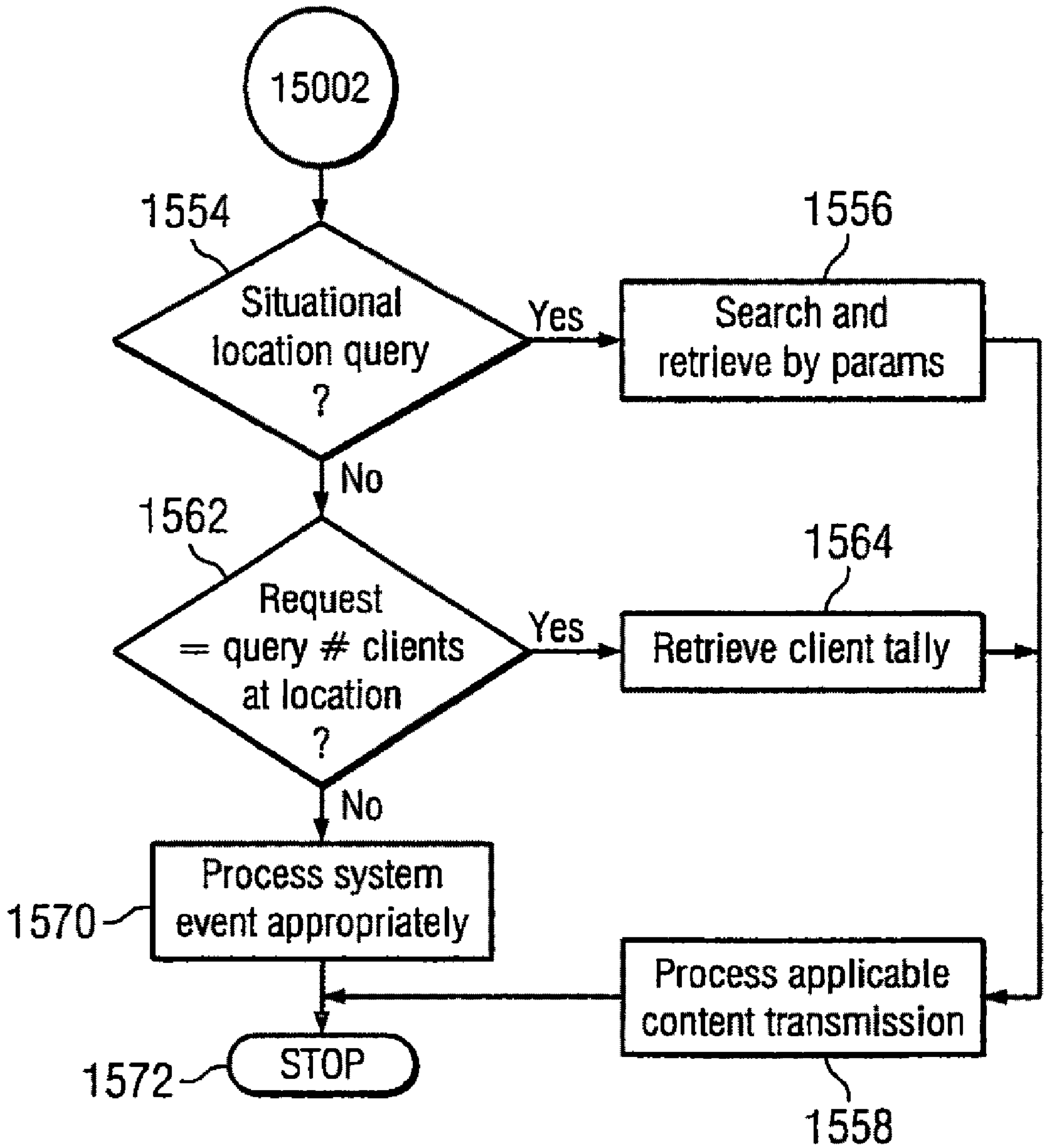
Figure 15C:
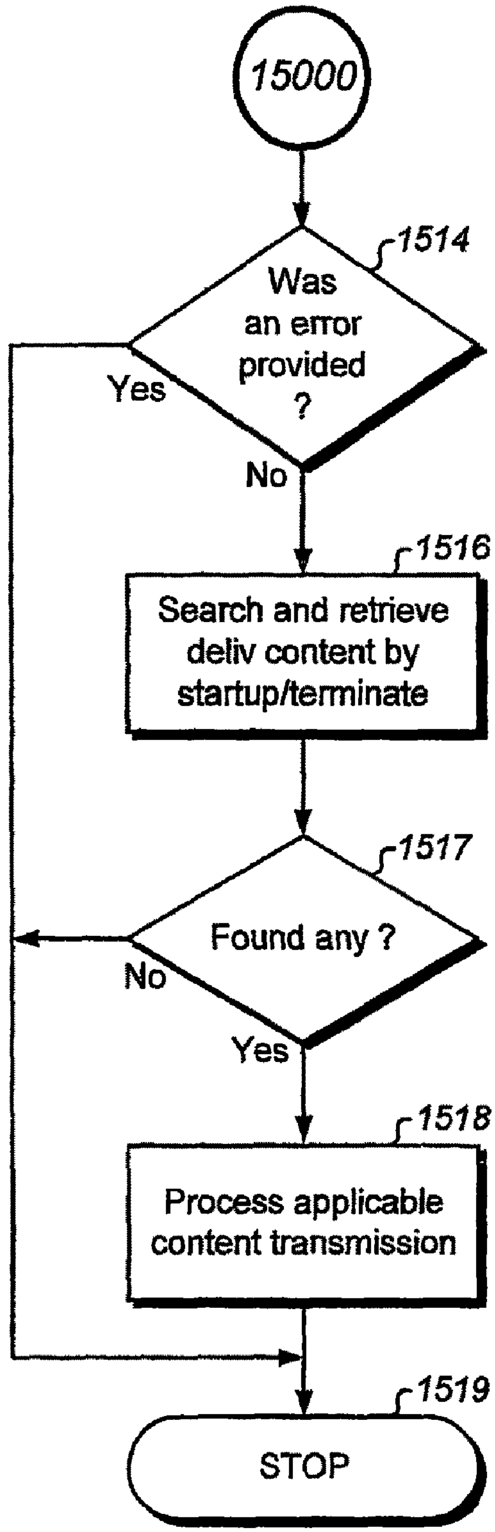

FIGS. 15A, 15B, and 15C depict flowcharts for service event handling aspects of a preferred embodiment of the SDPS of the present invention, in the context of candidate delivery event generation by the RDPS. SDPS processing relevant to the present invention begins at block 1502 when a service event (request) is posted (generated) to the SDPS, and continues to block 1504. All events are requests containing parameters including at least the device id 902 of the RDPS. Flowchart processing block discussions describe other parameters received, depending on the event (request) type.

If block 1504 determines that the event is an RDPS registration request, then block 1506 accesses registration data to see if the RDPS unique device id is already present (i.e. already registered) in a device id field 902. Thereafter, if block 1508 determines the RDPS does not already have a registration data record 900 registered, then block 1510 inserts a registration data record 900 into registration data. Much of the information may be provided as parameters to the event, or alternatively, block 1506 communicates with the RDPS to gather needed field information. Then, block 1512 provides an acknowledgement to the RDPS, or an error if already registered. Processing continues to block 1514 by way of off page connector 15000. If block 1514 determines that the RDPS was newly registered (i.e. an error was not provided), then block 1516 searches the deliverable content database for delivery activation setting(s) field 718 with a "deliver on RDPS registration" bit enabled. Thereafter, if block 1517 determines there are deliverable content database records 700 with the bit set, then block 1518 processes applicable content transmission (see FIG. 16), and processing stops at block 1519. If block 1517 determines that there was no records, then processing stops at block 1519. If block 1514 determines that the RDPS was already registered (existing entry), then processing continues to block 1519. Thus, a situational location change may be an RDPS state changed to registered.

If block 1504 determines that the event was not a registration request, then processing continues to block 1520. If block 1520 determines that the event is a de-registration request, then block 1522 access the registration data for the device id field 902 provided with the event parameters, and if block 1524 determines one is found, then it is deleted at block 1526, and then an acknowledgement is provided at block 1512 with processing continuing from there as was described except block 1516 searches for the "deliver on RDPS termination bit" enabled. If block 1524 determines that a registration data record 900 was not found, then an error is provided at block 1512 and processing continues as previously described. Thus, a situational location change may be an RDPS state changed to terminated.

If block 1520 determines that the event was not for an RDPS de-registration, then processing continues to block 1528. If block 1528 determines that the RDPS user selected to retrieve content for a content delivery indicator previously sent to the RDPS by the SDPS, then block 1530 accesses the deliverable content database by the rec id field 702 provided as parameters to the event, processing continues to block 1532 where the applicable content is processed (see FIG. 16), and processing stops at block 1534.

If block 1528 determines that the event was not an indicator selection request, then processing continues to block 1536. If block 1536 determines the event is a CADE generated by the RDPS, then block 1538 parses parameters from the request, for example, location and direction. Thereafter, block 1540 completes determination of the situational location from the parameters and converts into a form suitable for searching the deliverable content database. Block 1540 consults location hierarchy data and determines the date/time to further refine the RDPS situational location. Then, block 1544 retrieves deliverable content database records using RDPS parameters and any applicable location hierarchy data records 800 to fields 704, 706 and 708. Also used is data in interests field 906 and filter criteria 908 of the RDPS for comparing against keywords field 754 in keywords data associated with content deliverable database records 700. Delivery activation setting(s) field 718 is consulted as well. In some embodiments, the capabilities of the RDPS are maintained in field 904 to ensure no content of an inappropriate type is delivered. Thus, field 904 may also be utilized. If block 1546 determines that content was found, then block 1548 prunes transmission history data records 940 (by time, depth of records, etc.), block 1550 accesses the SDPS transmission history data, and block 1552 continues. If block 1552 determines that the content was not already transmitted (device id field 942 and rec id field 948 don't match any record in transmission history), then processing continues to block 1532 for processing described by FIG. 16. If block 1552 determines that the content was transmitted, then processing stops at block 1534. If block 1546 determines content applies, then processing stops at block 1534.

If block 1536 determines that the event was not a CADE, then processing continues to block 1554 by way of off page connector 15002. If block 1554 determines that the event is for a situational location query, then block 1556 searches deliverable content database records 700 with parameters from the RDPS: positional attribute parameters from the RDPS with the location field 704 and direction field 706, time criteria with time criteria field 708, and so on. All fields associated to record 700 are searchable through parameters. Block 1556 also applies location hierarchy data depending on a zoom specification parameter. The zoom specification allows control over the block 1556 search algorithm for whether or not to use hierarchy data, and whether or not to check descending locations, ascending locations up to a maximum threshold parameter of content, both descending and ascending (respectively) up to a threshold of content, or neither ascending nor descending hierarchy data functionality. The maximum threshold parameter may be specified regardless, and optionally limits the amount of content to deliver to the RDPS by size, number of content instances, or number of hierarchical data record nestings to search. Further still block 1556 may use field 904 as described above, or the user's interest and/or filters as described above. Information for records found are transmitted as content to the RDPS at block 1558 (see FIG. 16) and processing stops at block 1572.

If block 1554 determines that the event was not a situational location query, then processing continues to block 1562. If block 1562 determines that the request is a client count query request, then block 1564 retrieves the known number of RDPS devices at the specified situational location (e.g. location/direction) given specified time criteria; the number of transmission history data records 940 for unique values in rec id field 948 that contain a date/time stamp 952 according to the user's specified time criteria. A null time criteria parameter implies use the current time of processing the request with a truncated precision for a time window. Otherwise, a specified time window was entered by the user, or automatically inserted as a parameter by the RDPS or SDPS. Presence of the content specification parameter implies to additionally retrieve content from the deliverable content database as described by blocks 1538 through 1544. This allows providing information (e.g. graphical) to complement presentation of the total number of RDPS devices identified. Processing then continues to block 1558 for transmitting the count as content.

If block 1562 determines that the event was not a client count query request, then processing continues to block 1570 where any other SDPS event (request) is processed as is appropriate for the particular service application, and processing stops at block 1572.

Figure 16:
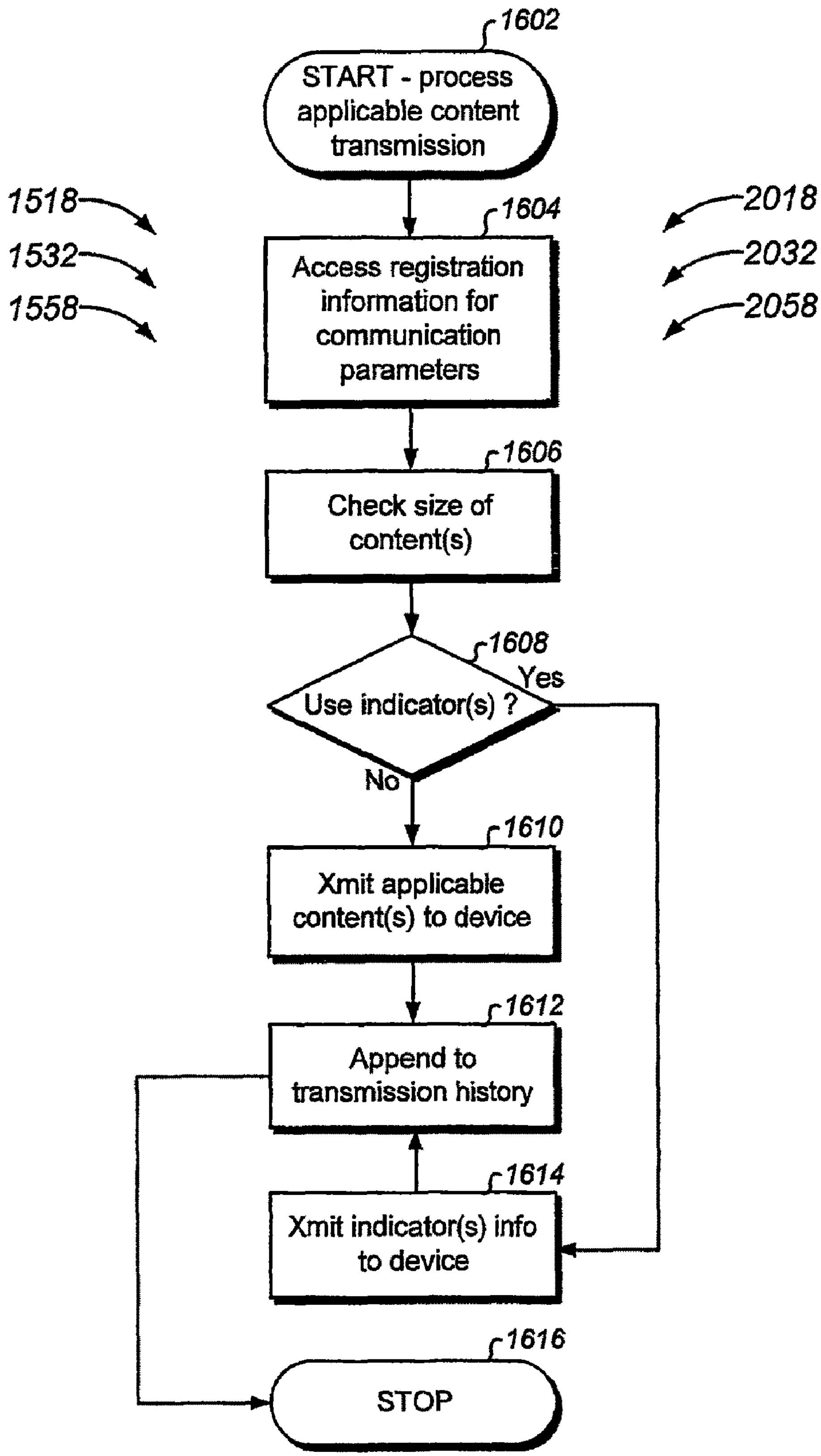
FIG. 16 depicts a flowchart for describing the content transmission aspects of the present invention.

FIG. 16 depicts a flowchart for describing the content transmission aspects of the present invention. FIG. 16 describes processing of blocks 1518, 1532, 1558, 2018, 2032, and 2058. Processing begins at block 1602, continues to block 1604 where registration data is accessed for communications bind information field 904 that is inserted when the RDPS registers, and then continues to block 1606. Block 1606 checks the size of the transmission destined for the RDPS. Thereafter, if block 1608 determines that the information is small enough to not worry about transmission, then block 1610 transmits the situational location dependent information using field 904, block 1612 appends a transmission history data record 940 to transmission history data, and processing stops at block 1616. Block 1610 may first compress and/or encrypt content transmission for efficient and/or safe communications that is then decompressed and/or decrypted by the RDPS at block 1326. Content may also by transmitted at block 1610 depending on capabilities of the RDPS maintained in field 904, for example, transmission speed, memory, storage space, etc. Thus, block 1610 may transmit using transmission delivery constraints of field 904.

If block 1608 determines there may be too much information to unquestionably transmit, then block 1614 transmits content delivery indicator(s) information to the RDPS and processing continues to block 1612. Thus, the total size of the transmission is a transmission delivery constraint affecting the delivery information of the content. Of course, FIG. 16 could always transmit an indicator, or a transmission delivery constraint size could be configured to cause content delivery indicators delivered all, or most, of the time. Block 1608 may use a system size setting (e.g. number of bytes), or may use size information relative to RDPS capabilities maintained in communications bind information field 904.

Server Data Processing System Candidate Delivery Event Generation Embodiment

Figure 17:
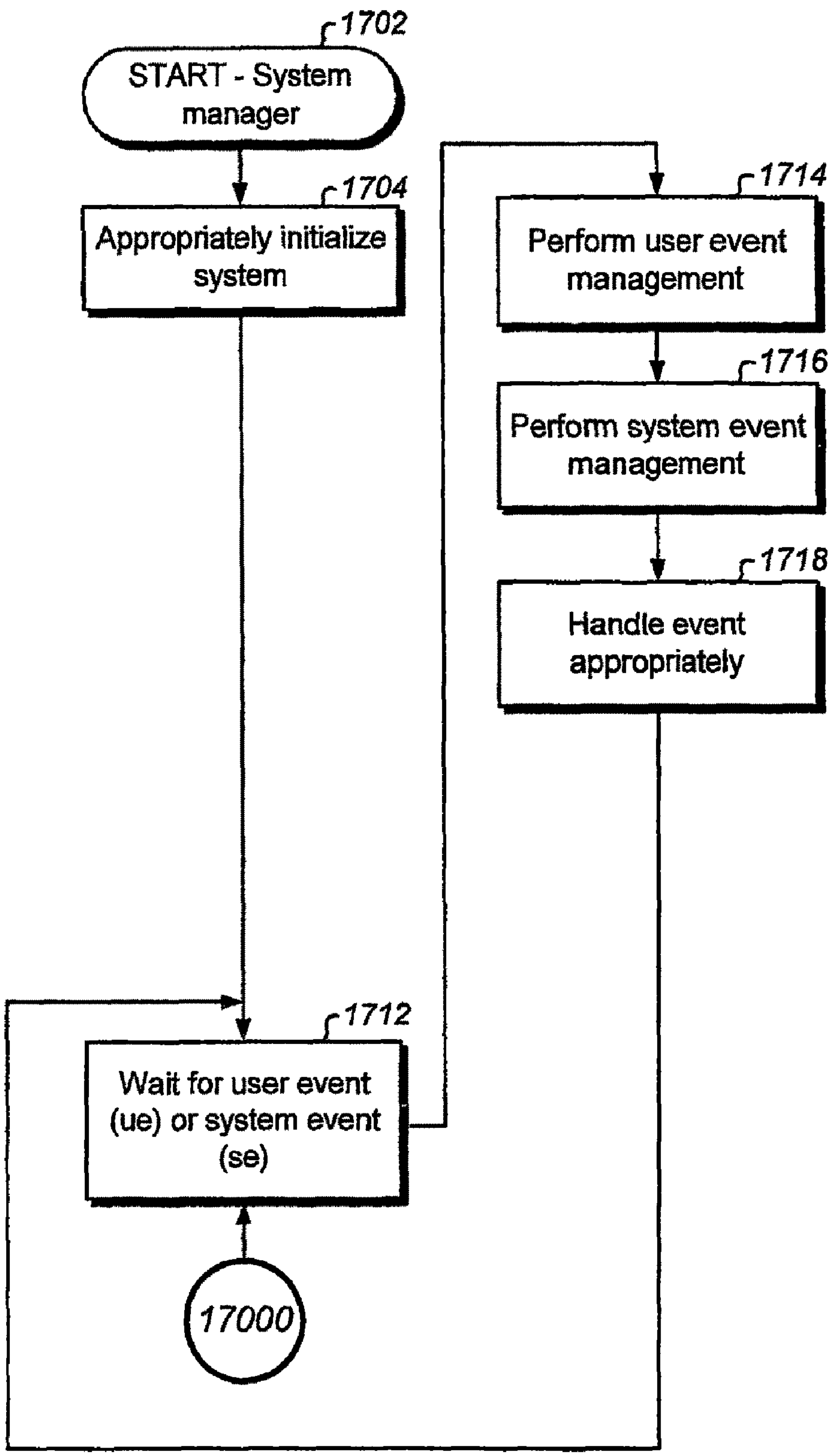
FIG. 17 depicts a flowchart for describing data processing system aspects relevant to a preferred embodiment of the RDPS of the present invention, in the context of candidate delivery event determination not by the RDPS.

The reader should make note of the nearly identical descriptions and enumerations between the figures in different embodiments. The rightmost two digits of the block numbering have been preserved to facilitate correlation. FIG. 17 correlates FIG. 11, and so on. FIG. 14 and FIG. 16 are applicable to both embodiments: SDPS CADE generation and RDPS CADE generation.

FIG. 17 depicts a flowchart for describing data processing system aspects relevant to a preferred embodiment of the RDPS of the present invention, in the context of candidate delivery event generation by the SDPS. When the RDPS is enabled, for example, by a power switch, system manager processing begins at block 1702 and continues to block 1704 where the system appropriately initializes, for example to default interfaces. Processing continues to block 1712. Block 1712 waits for a user event or system event. User interface management is coupled with the system manager to enable a user to the RDPS. Upon detection of an event, block 1712 flows to block 1714 for any user event management processing. Should block 1714 processing return, block 1716 performs any system event management processing. Should processing of block 1716 return, block 1718 handles the event appropriately as is relevant for other events of the RDPS, for example, user interface control of little interest to discussion of the present invention. Thereafter, block 1718 flows to block 1712 for processing as described. Another embodiment of FIG. 17 will implement a multithreaded system wherein events are handled asynchronously as they occur.

Figure 18A:
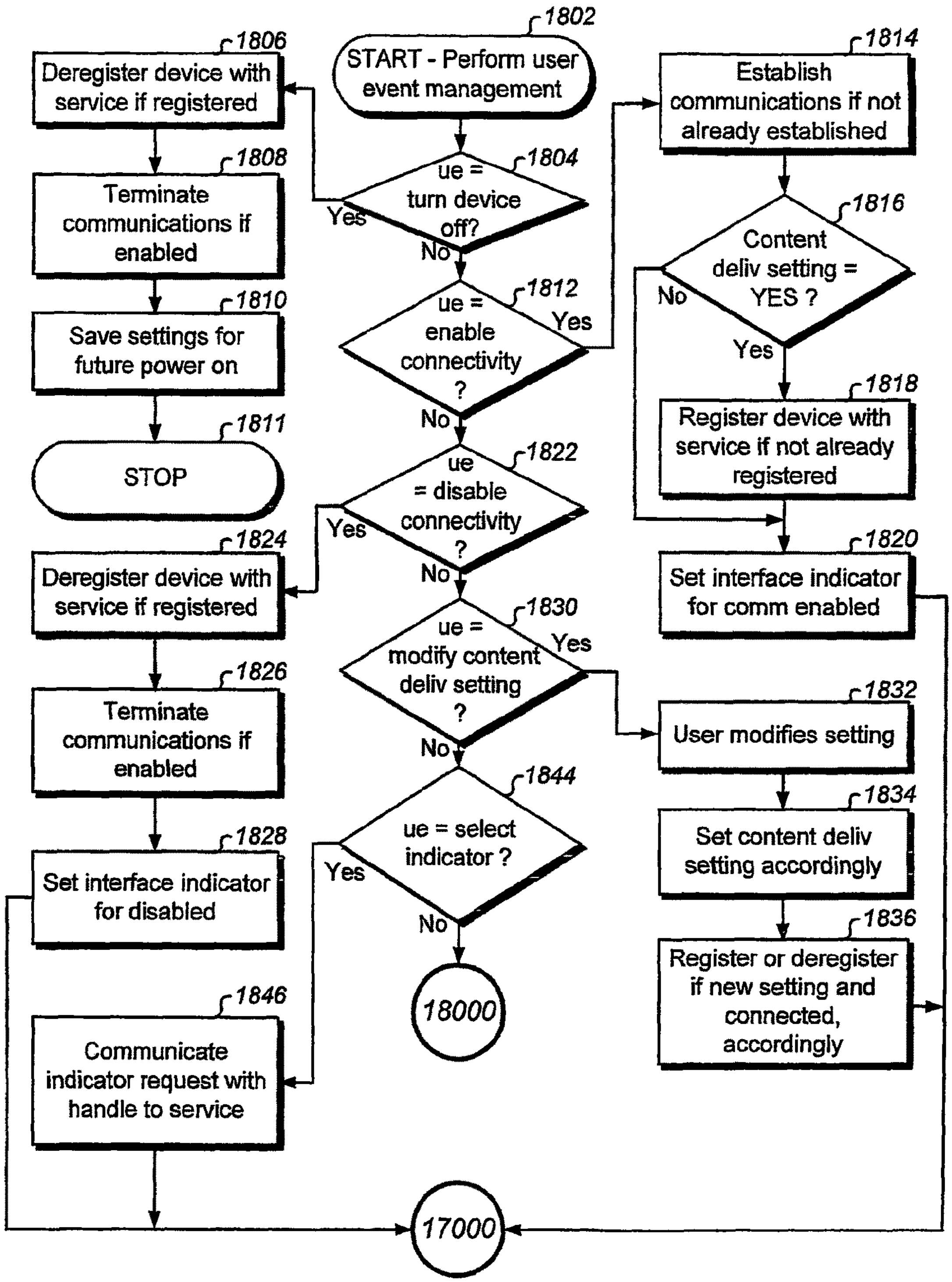
FIGS. 18A and 18B depict flowcharts for describing user event management processing aspects of a preferred embodiment of the RDPS of the present invention, in the context of candidate delivery event determination not by the RDPS.
Figure 18B:
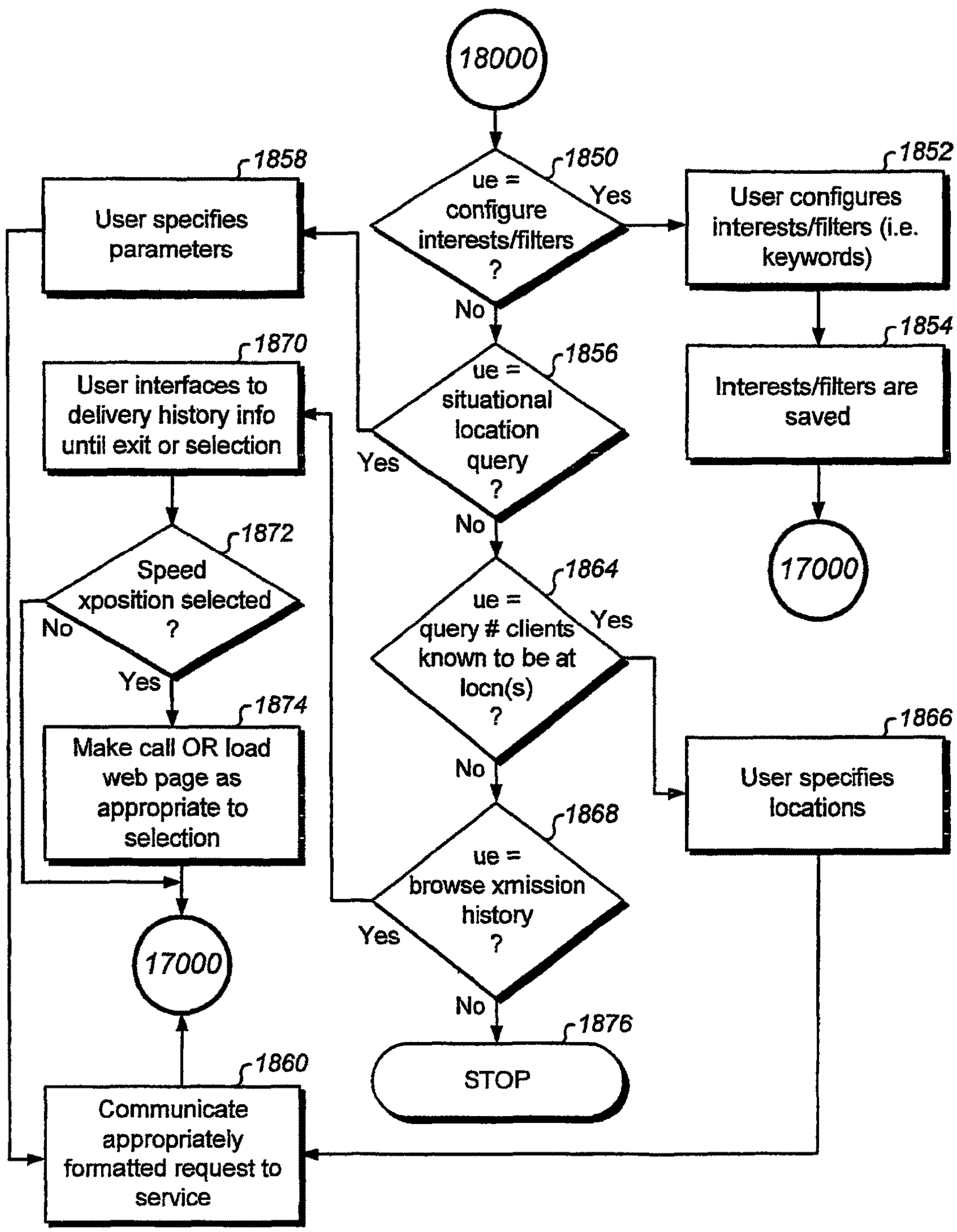

FIGS. 18A and 18B depict flowcharts for describing user event management processing aspects of a preferred embodiment of the RDPS of the present invention, in the context of candidate delivery event generation by the SDPS. User event management begins at block 1802 and continues to block 1804. If block 1804 determines that the user event is powering the RDPS off, then block 1806 communicates with the SDPS to remove (if any) its RDPS data record 900 from the registration data, block 1808 terminates any communication session gracefully (if required) depending on the RDPS, block 1810 saves settings, for example, the delivery setting for the next power on, and RDPS processing stops at block 1811.

If block 1804 determines the RDPS was not turned off, then processing continues to block 1812. If block 1812 determines that the user selected to enable communications with the SDPS, then block 1814 establishes communications with the SDPS (if not already established), and block 1816 consults the current delivery setting. In one embodiment, block 1814 through 1820 may be processed just as the result of a wireless device being powered on. If block 1816 determines that the content delivery setting for receiving situational location dependent content is enabled, then block 1818 communicates with the SDPS for inserting a registry data record 900 into the registry data. Thereafter, block 1820 sets a RDPS user interface indicator showing that communications to the SDPS is enabled, and processing returns to block 1712 of FIG. 17 by way of off page connector 17000. If block 1816 determines the delivery setting is not enabled, then processing continues to block 1820.

If block 1812 determines that the user did not select to enable communications to the SDPS, then processing continues to block 1822. If block 1822 determines that the user selected to disable SDPS communications, then block 1824 communicates with the SDPS to remove its registry data record 900 from registry data, block 1826 terminates the communications session gracefully (if required) depending on the RDPS embodiment, block 1828 sets the communications to SDPS user interface indicator to disabled, and processing continues back to block 1712. In one embodiment, block 1824 through 1828 may be processed just as the result of a wireless device being powered off.

If block 1822 determines the user did not select to disable communications to the SDPS, then processing continues to block 1830. If block 1830 determines that the user selected to modify the RDPS content delivery setting, then the user modifies the setting at block 1832, the delivery setting is set accordingly at block 1834. Preferably, blocks 1830/1832 allow a user to toggle the content delivery setting. No content will be delivered when this setting is disabled. Being registered with the SDPS constitutes being eligible for delivery. Alternative embodiments won't have such a feature. Block 1834 also sets an indicator in the user interface for displaying that setting, and block 1836 communicates with the SDPS to insert or remove its registry data record 900 should the setting be different than previous. Of course, appropriate error handling is performed by block 1836 if there is no communications enabled. Thereafter, processing continues to block 1712.

If block 1830 determines that the user did not select to modify the content delivery setting, then processing continues to block 1844. If block 1844 determines that the user selected a content delivery indicator, as maintained in a transmission history data record 970 for deliverable content from the SDPS, then block 1846 communicates with the SDPS using the rec id field 976. In one embodiment, the user peruses the transmission history data in response to receiving a content delivery indicator from the SDPS. In another embodiment, correlation is maintained between individual user interface indicators to their associated transmission history data record 970 for allowing the user to simply select the indicator in the user interface for communicating with the SDPS to deliver the associated content. Providing a visual and/or audible presentation of the indicator is well known in the art and may be implemented with a variety of methods. Block 1846 makes the request for content to the SDPS with the rec id 976. Thereafter, via a received system event, blocks 1918 through 1926 handle receipt, delivery, and RDPS user interface presentation of the content in a manner appropriate to the content type from the SDPS. Processing continues from block 1846 back to block 1712.

If block 1844 determines that the user did not select an indicator of deliverable content, then processing continues to block 1850 by way of off page connector 18000. If block 1850 determines that the user selected to configure interests or filters, then block 1852 interfaces with the user to configure interests or filters which are saved locally at block 1854, and processing continues back to block 1712 by way of off page connector 17000. Any configured interests and filters are communicated to the SDPS at blocks 1818 and 1836 as part of registration. Interests field 906 and filter criteria field 908 are set with data configured at block 1852. The RDPS must de-register and re-register with new settings. In an alternative embodiment, block 1854 communicates with the SDPS to update the RDPS' registry data record 900.

If block 1850 determines that the user did not select to configure interests or filters, then processing continues to block 1856. If block 1856 determines the user selected to perform a situational location query, then the user specifies validated parameters (discussed with FIG. 20B) at block 1858. Thereafter, block 1860 communicates an appropriate formatted request to the SDPS, and thereafter via a received system event, blocks 1918 through 1926 handle receipt, delivery, and RDPS user interface presentation of the content in a manner appropriate to the content type from the SDPS. Processing leaves block 1860 and returns to block 1712.

If block 1856 determines that the user did not select to perform a situational location query, the processing continues to block 1864. If block 1864 determines that the user selected to query the number of known RDPS devices at a location(s) (i.e. a client count request), then block 1866 interfaces with the user to specify valid parameters including situational location information and time criteria, and processing continues to block 1860 which was described. A content specification parameter may also be specified for retrieving the situational location content as well. Time criteria embodiments include any time window in history, a current time window (of request, transmission of request, SDPS receipt of request, or processing the request), or a truncated precision time.

If block 1864 determines that the user did not select to query the number of RDPS devices at a location(s) (i.e. a client count request), then processing continues to block 1868. If block 1868 determines that the user selected to browse transmission history data, then block 1870 interfaces with the user until he either exits, or selects information from the speed reference information field 978 from a transmission history data record 970. Preferably, block 1870 permits scrolling transmission history data records 970 with fields columnized. If, at block 1872, the user selected information of field 978, then block 1874 automatically performs the action, an automatic dialing of a telephone number, or automatic transposition to a web page. Speed reference information field 978 is preferably related to content that was delivered as referenced by rec id field 976. Thereafter, processing continues back to block 1712. If block 1872 determines that the user exited from block 1870, then processing continues back to block 1712. If block 1868 determines that the user did not select to browse the transmission history data, then processing stops at block 1876. Note that some RDPS embodiments will not require blocks 1812 through 1828 because there may not be an active session required to have communications between the RDPS and SDPS. In one embodiment, the movement tolerance is communicated to the SDPS at blocks 1818 and 1836, and then inserted to movement tolerance field 910.

Figure 19:
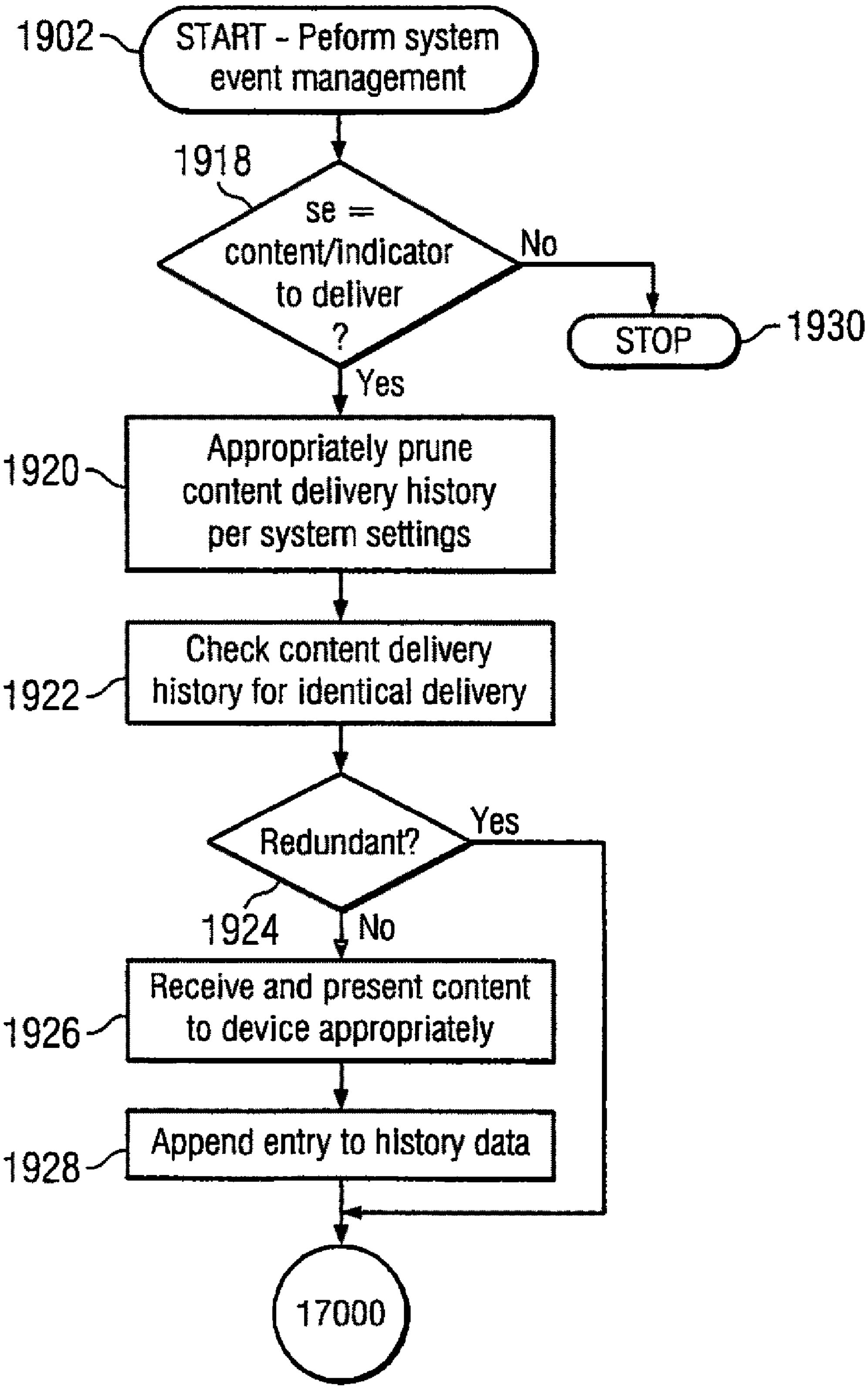
FIG. 19 depicts a flowchart for describing system event management processing aspects of a preferred embodiment of the RDPS of the present invention, in the context of candidate delivery event determination not by the RDPS.

FIG. 19 depicts a flowchart for describing system event management processing aspects of a preferred embodiment of the RDPS of the present invention, in the context of candidate delivery event generation by the SDPS. System event management begins at block 1902, and continues to block 1918. If block 1918 determines that the system event is a transmission from the SDPS with content to deliver, or a content delivery indicator to content, then block 1920 performs housekeeping by pruning transmission history data records 970. Pruning is performed by time, number of entries, or some other criteria. Block 1920 flows to block 1922 where the transmission history data is checked to see if the rec id field 702 for the content or content delivery indicator, communicated with the system event, is already present in a transmission history data record 970. If the same content was already delivered, a rec id field 976 will match the rec id field 702 for pending presentation. The system event contains parameters including rec id field 702 with an indicator status for allowing the user to retrieve the content at a later time. If block 1924 determines the rec id field 702 of the event is already contained in the transmission history data, then processing continues back to block 1712 with no delivery processing. If block 1924 determines it is not a redundant delivery, then block 1926 communicates with the SDPS for retrieval of the location field 704, direction field 706, content type field 710, short text field 714, and speed reference info field 716. Any type of content is presented to the RDPS user interface in the appropriate manner. Various embodiments may limit types of content using a variety of methods, located at the RDPS or SDPS. Additionally, either content field 712 and linked content via content links field 722 are retrieved, or content delivery indicator status is retrieved. Thereafter, block 1928 appends a transmission history data record 970 to the RDPS transmission history data, and processing continues to block 1712. Blocks 1920 through 1926 handle all content (or indicator) delivery to the RDPS, preferably asynchronously to all other RDPS processing.

If block 1918 determines that the system event was not for delivery, then processing stops at block 1930. An alternative embodiment to FIG. 19 processing will not check history for redundant content delivery. Or, a user may enable or disable the feature. Block 1926 may also include applying client located filters for filtering out content. In such an embodiment, a filter criteria field 908 may not be required. The user of the RDPS may also modify the transmission history data to allow a redundant refresh.

Figure 20A:
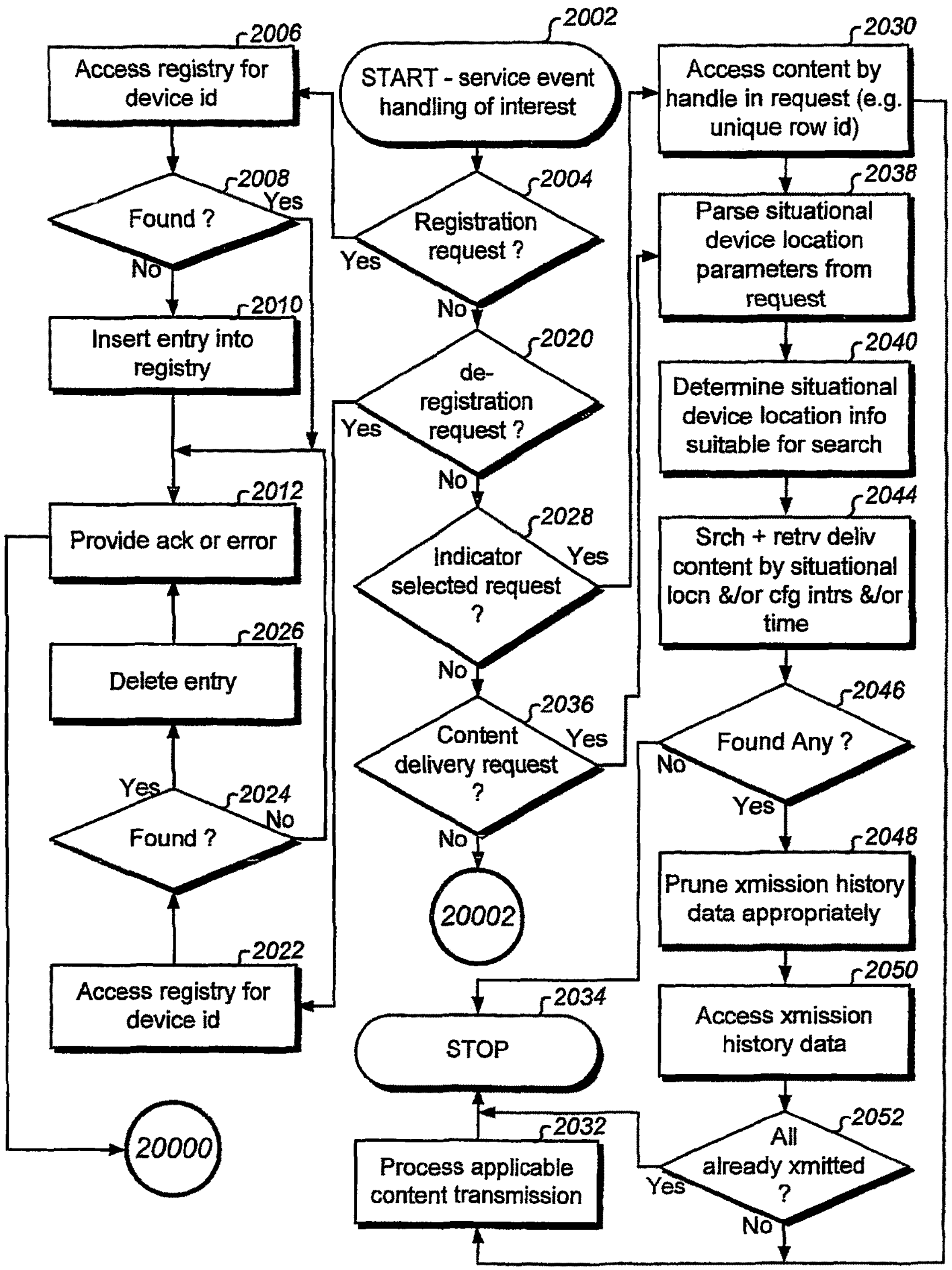
FIGS. 20A, 20B, and 20C depict flowcharts for service event handling aspects of a preferred embodiment of the SDPS of the present invention, in the context of candidate delivery event determination not by the RDPS.
Figure 20B:
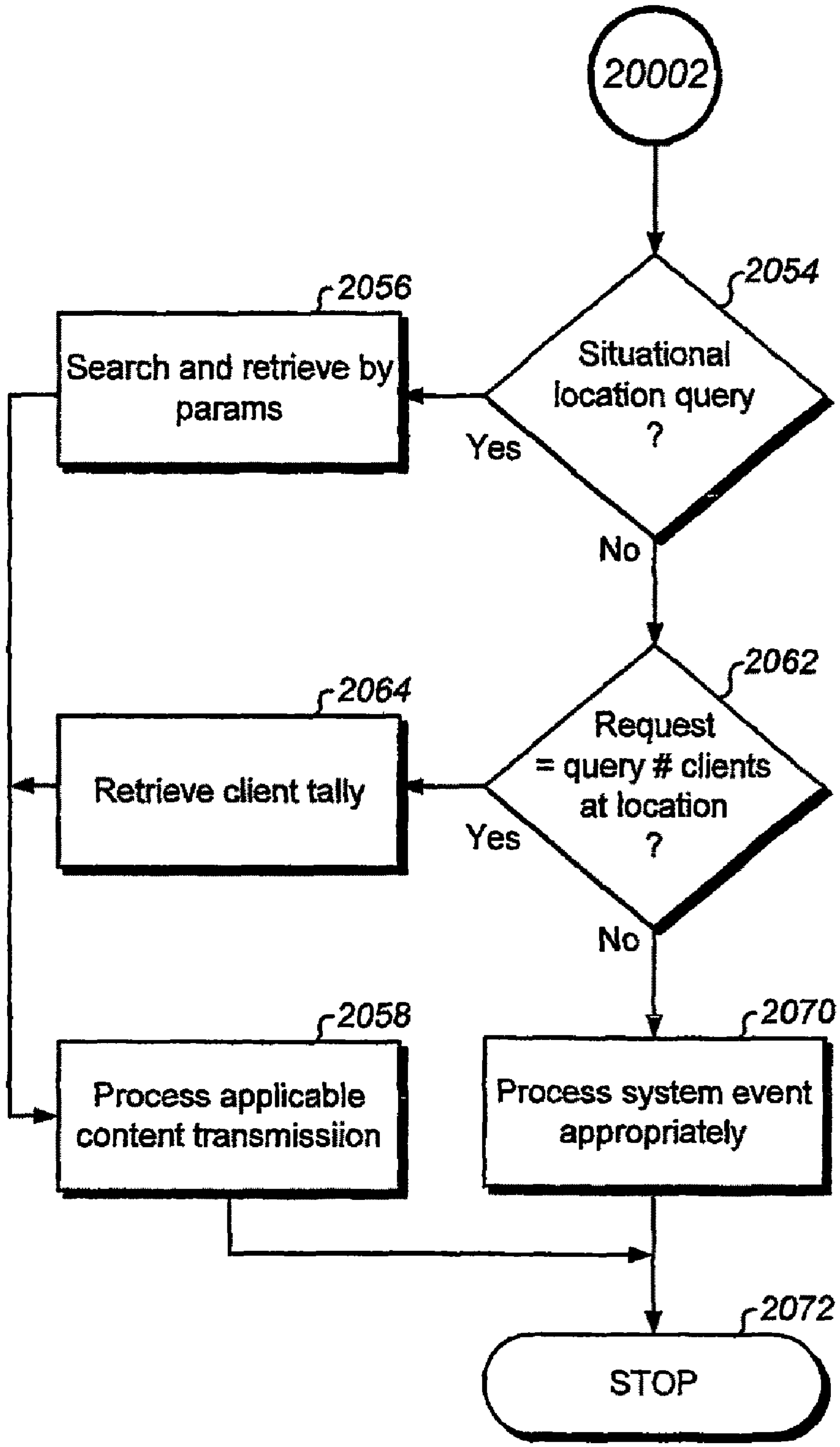
Figure 20C:
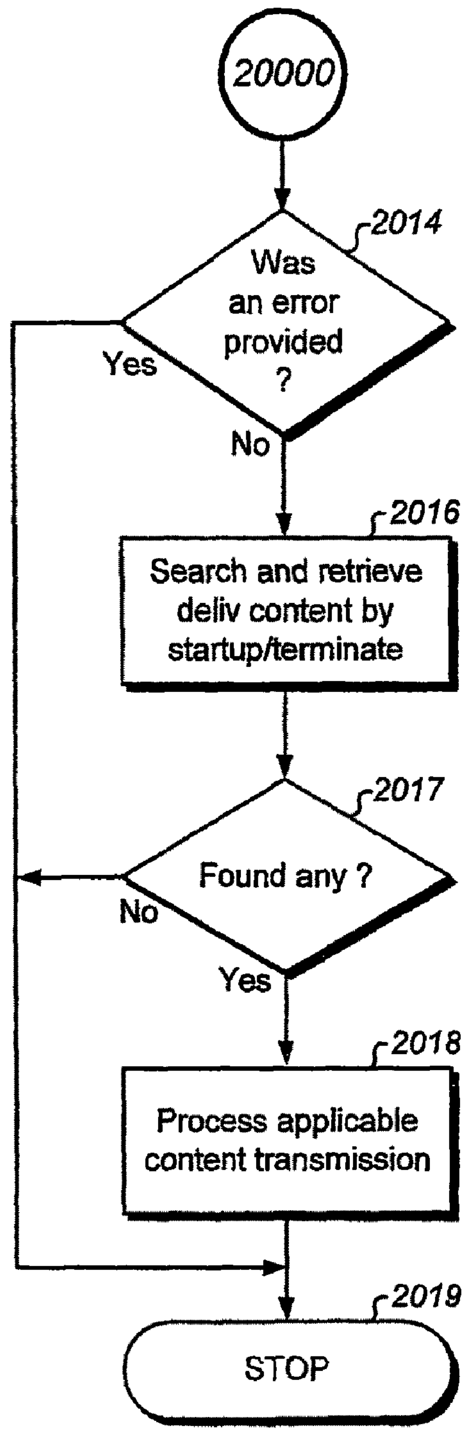

FIGS. 20A, 20B, and 20C depict flowcharts for service event handling aspects of a preferred embodiment of the SDPS of the present invention, in the context of candidate delivery event generation by the SDPS. SDPS processing relevant to the present invention begins at block 2002 when a service event (request) is posted (generated) to the SDPS, and continues to block 2004. All events are requests containing parameters including at least the device id 902 of the RDPS.

Flowchart processing block discussions describe other parameters received, depending on the event (request) type.

If block 2004 determines that the event is an RDPS registration request, then block 2006 accesses registration data to see if the RDPS unique device id is already present (i.e. already registered) in a device id field 902. Thereafter, if block 2008 determines the RDPS does not already have a registration data record 900 registered, then block 2010 inserts a registration data record 900 into registration data. Much of the information may be provided as parameters to the event, or alternatively, block 2006 communicates with the RDPS to gather needed field information. Then, block 2012 provides an acknowledgement to the RDPS, or an error if already registered. Processing continues to block 2014 by way of off page connector 20000. If block 2014 determines that the RDPS was newly registered (i.e. an error was not provided), then block 2016 searches the deliverable content database for delivery activation setting(s) field 718 with a "deliver on RDPS registration" bit enabled. Thereafter, if block 2017 determines there are deliverable content database records 700 with the bit set, then block 2018 processes applicable content transmission (see FIG. 16), and processing stops at block 2019. If block 2017 determines that there was no records, then processing stops at block 2019. If block 2014 determines that the RDPS was already registered (existing entry), then processing continues to block 2019. Thus, a situational location change may be an RDPS state changed to registered.

If block 2004 determines that the event was not a registration request, then processing continues to block 2020. If block 2020 determines that the event is a de-registration request, then block 2022 access the registration data for the device id field 902 provided with the event parameters, and if block 2024 determines one is found, then it is deleted at block 2026, and then an acknowledgement is provided at block 2012 with processing continuing from there as was described except block 2016 searches for the "deliver on RDPS termination bit" enabled. If block 2024 determines that a registration data record 900 was not found, then an error is provided at block 2012 and processing continues as previously described. Thus, a situational location change may be an RDPS state changed to terminated.

If block 2020 determines that the event was not for an RDPS de-registration, then processing continues to block 2028. If block 2028 determines that the RDPS user selected to retrieve content for a content delivery indicator previously sent to the RDPS by the SDPS, then block 2030 accesses the deliverable content database by the rec id field 702 provided as parameters to the event, processing continues to block 2032 where the applicable content is processed (see FIG. 16), and processing stops at block 2034.

If block 2028 determines that the event was not an indicator selection request, then processing continues to block 2036. If block 2036 determines the event is a CADE generated by a service of, or to, the SDPS (see FIG. 3B, FIG. 5B, and FIG. 6), then block 2038 parses parameters from the request, for example, location and direction. Thereafter, block 2040 completes determination of the situational location from the parameters and converts into a form suitable for searching the deliverable content database. Block 2040 consults location hierarchy data and determines the date/time to further refine the RDPS situational location. Then, block 2044 retrieves deliverable content database records using RDPS parameters and any applicable location hierarchy data records 800 to fields 704, 706 and 708. Also used is data in interests field 906 and filter criteria 908 of the RDPS for comparing against keywords field 754 in keywords data associated with content deliverable database records 700. Delivery activation setting(s) field 718 is consulted as well. In some embodiments, the capabilities of the RDPS are maintained in field 904 to ensure no content of an inappropriate type is delivered. Thus, field 904 may also be utilized. If block 2046 determines that content was found, then block 2048 prunes transmission history data records 940 (by time, depth of records, etc.), block 2050 accesses the SDPS transmission history data, and block 2052 continues. If block 2052 determines that the content was not already transmitted (device id field 942 and rec id field 948 don't match any record in transmission history), then processing continues to block 2032 for processing described by FIG. 16. If block 2052 determines that the content was transmitted, then processing stops at block 2034. If block 2046 determines content applies, then processing stops at block 2034.

If block 2036 determines that the event was not a CADE, then processing continues to block 2054 by way of off page connector 20002. If block 2054 determines that the event is for a situational location query, then block 2056 searches deliverable content database records 700 with parameters from the RDPS: positional attribute parameters from the RDPS with the location field 704 and direction field 706, time criteria with time criteria field 708, and so on. All fields associated to record 700 are searchable through parameters. Block 2056 also applies location hierarchy data depending on a zoom specification parameter. The zoom specification allows control over the block 2056 search algorithm for whether or not to use hierarchy data, and whether or not to check descending locations, ascending locations up to a maximum threshold parameter of content, both descending and ascending (respectively) up to a threshold of content, or neither ascending nor descending hierarchy data functionality. The maximum threshold parameter may be specified regardless, and optionally limits the amount of content to deliver to the RDPS by size, number of content instances, or number of hierarchical data record nestings to search. Further still block 2056 may use field 904 as described above, or the user's interest and/or filters as described above. Information for records found is transmitted as content to the RDPS at block 2058 (see FIG. 16) and processing stops at block 2072.

If block 2054 determines that the event was not a situational location query, then processing continues to block 2062. If block 2062 determines that the request is a client count query request, then block 2064 retrieves the known number of RDPS devices at the specified situational location (e.g. location/direction) given specified time criteria; the number of location history data records 920 for unique values in rec id field 922 that contain a date/time stamp 930 according to the user's specified time criteria. A null time criteria parameter implies use the current time of processing the request with a truncated precision for a time window. Otherwise, a specified time window was entered by the user, or automatically inserted as a parameter by the RDPS or SDPS. Presence of the content specification parameter implies to additionally retrieve content from the deliverable content database as described by blocks 2038 through 2044. This allows providing information (e.g. graphical) to complement presentation of the total number of RDPS devices identified. Processing then continues to block 2058 for transmitting the count as content.

If block 2062 determines that the event was not a client count query request, then processing continues to block 2070 where any other SDPS event (request) is processed as is appropriate for the particular service application, and processing stops at block 2072. FIG. 16 depicts a flowchart for describing the content transmission aspects. FIG. 16 describes processing of blocks 2018, 2032, and 2058.

In any of the embodiments described above, a performance conscious implementation of the present invention including a cache may be pursued given the RDPS has appropriate capability. Without departing from the spirit and scope of the invention, deliverable content database records 700, and joined data from them, may be stored at an RDPS. The SDPS may transmit a compression of the data to the RDPS for decompression and local maintaining. Transmission may be at registration and/or performed asynchronously to the RDPS as necessary. Thus, the deliverable content database, and joined data from it, will be accessed locally to the RDPS to prevent real-time communication of what could be large amounts of content. FIG. 14 processing would include updating any RDPS with a local cache when configuration was complete.

A Web Service Embodiment

Figure 21:
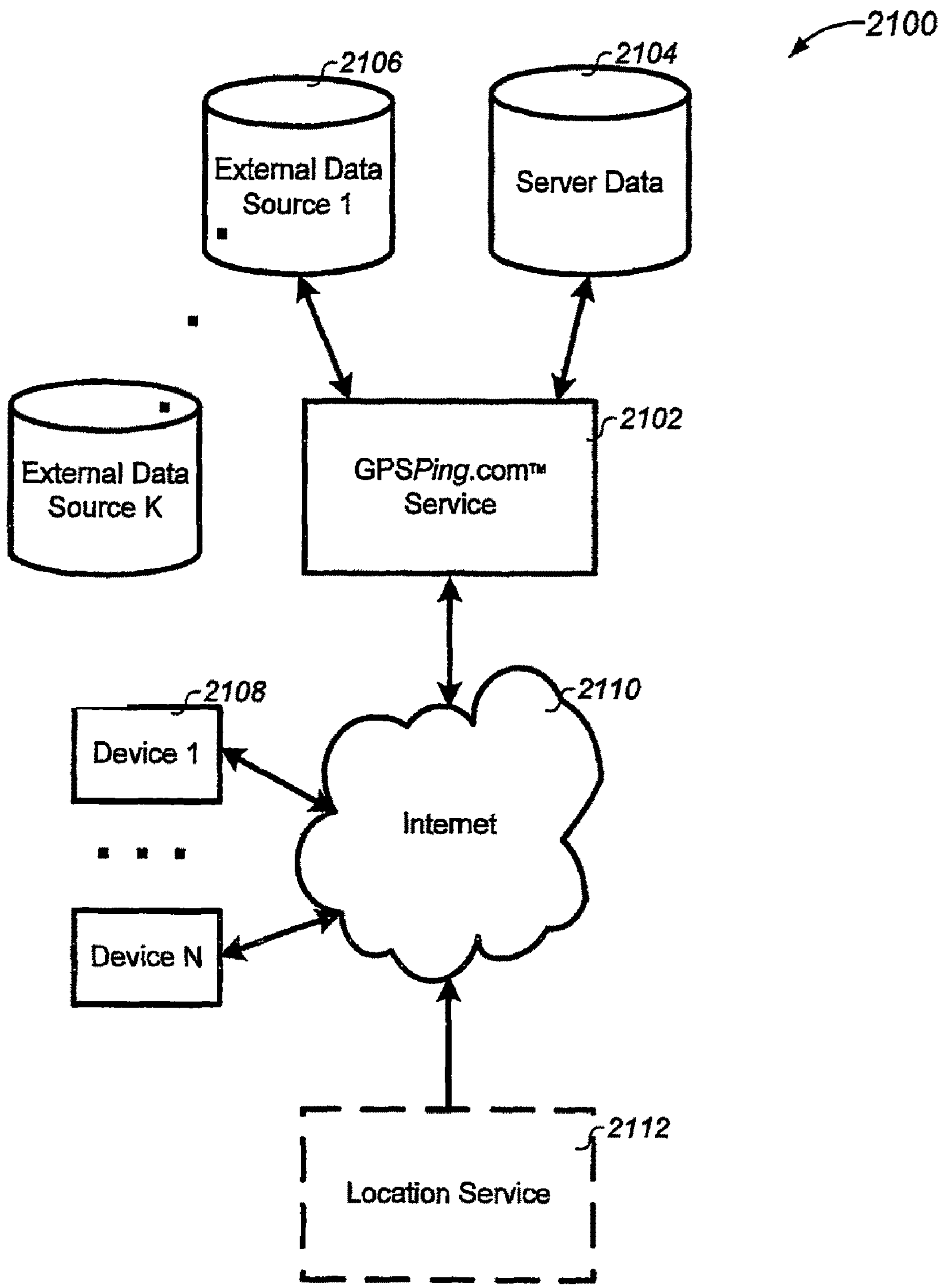
FIG. 21 depicts a block diagram for describing a preferred embodiment of key architectural web service components at a high level.

FIG. 21 depicts a block diagram for describing a preferred embodiment of key architectural web service components at a high level. A web service environment 2100 includes a web service 2102, service server data 2104, external data source(s) such as external data source 2106, a plurality of devices, for example device 2108, internet connectivity 2110, and an optional location service 2112. The web service 2102 implementation/configuration includes a single server data processing system or a plurality of server data processing systems, for example in a clustered configuration. Web service 2102 implementation/configuration preferably includes a plurality of executable threads in support of attached communications devices, for example device 2108. Web service 2102 includes at least one SDPS, and device 2108 is, or contains, an RDPS. Those skilled in the art recognize that web service 2102 is implemented with any of a variety of platforms, hardware, operating system types, data centers, communications connectivity, etc. Appropriate failover, redundancy, scalability, and availability is provided to web service 2102. Web service 2102 preferably includes public website user interface pages and member only user interfaces pages. Web service 2102 maintains server data 2104 for driving functionality provided by web service 2102. Server data 2104 preferably includes maintaining some data in an SQL database and includes a single database or a plurality of databases. Server data 2104 includes file information such as website user interfaces, for example Active Server Pages (ASPs), as well as SQL database data. Server data 2104 preferably contains all the Tables disclosed (e.g. records 2900, 3000, 3100, 3400, 3800, 6500, 6800, 7000, 7800, 8200, 8900, 9200, 9400, 9450, 9500, 10100, 10200, 10700, 14100, 14800, 15300, 15400, 15600, 15700, and all other tables disclosed here), or any subset of the Tables disclosed. Tables are preferably maintained in an SQL database and contain keys, indexes, and constraints that assure appropriate integrity of the data. A plurality of external data sources, for example external data source 2106, may contain useful deliverable content data for delivery to devices. Deliverable Content Database (DCDB) data may completely be contained in server data 2104 as the result of creating it therein. DCDB data may be contained in server data 2104 as the result of moving, transforming, or importing data from one or more external data sources 2106 into the server data 2104. DCDB data may be maintained outside of server data 2104 at external data source(s) 2106 and accessed at the time it is needed through pointer information maintained in server data 2104. Internet connectivity 2110 comprises any medium capable of transporting communications between any or all components of FIG. 21, for example as discussed above for FIG. 1. Devices communicating to web service 2102 by way of internet connectivity 2110 are heterogeneous, for example as discussed for a FIG. 1 RDPS. Device 2108 at least requires the ability to receive data from web service 2102, and preferably has the ability to also send data to web service 2102. Devices, for example device 2108, are mobile devices anywhere in our universe, for example on earth. The device 2108 whereabouts and/or situational location may be determined at itself, at a service, as described above, or anywhere else in the web service environment 2100. In one embodiment, a location service 2112 is provided for communicating the whereabouts and/or situational locations of devices 2108 to web service 2102. Location service 2112 may also include one or more servers. The term "service" implies one or more servers. Location service 2112 implementation/configuration is preferably implemented and configured similarly to web service 2102 as discussed above, and may communicate directly with devices 2108 as well as web service 2102. Location service 2112 may communicate with another service for determining the whereabouts or situational locations of devices. Location Service 2112 may be instrumental in communicating situational location information to web service 2102 for devices that come within range of sensing means connected to Location Service 2112. Devices 2108 preferably have some web browser for navigating the web service 2102, and the web service accommodates the device with an appropriately formatted web page based on the device type and/or browser type. Devices 2108 include mobile devices 2540 as well as those devices used by an Administrator 2532, MCD User 2534, Content Provider 2536, and Site Owner 2538. A single device 2108 can be a mobile device 2540 and the same device used by any, or all, of the user types to web service 2102 (e.g. web service users 2532 through 2538).

Figure 22:
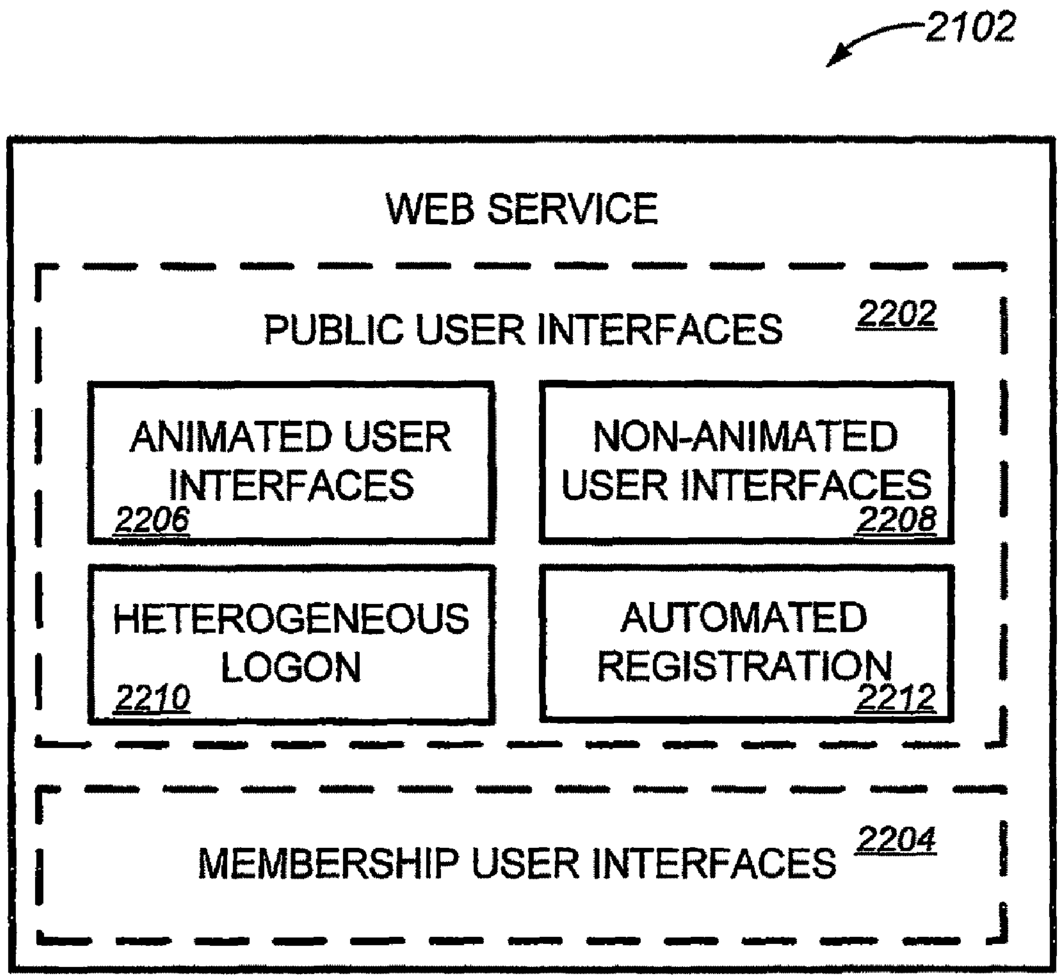
FIG. 22 depicts a block diagram of a preferred embodiment of the overall design for web service Active Server Pages (ASPs) supporting heterogeneous device connectivity.
Figures 28, 28A:
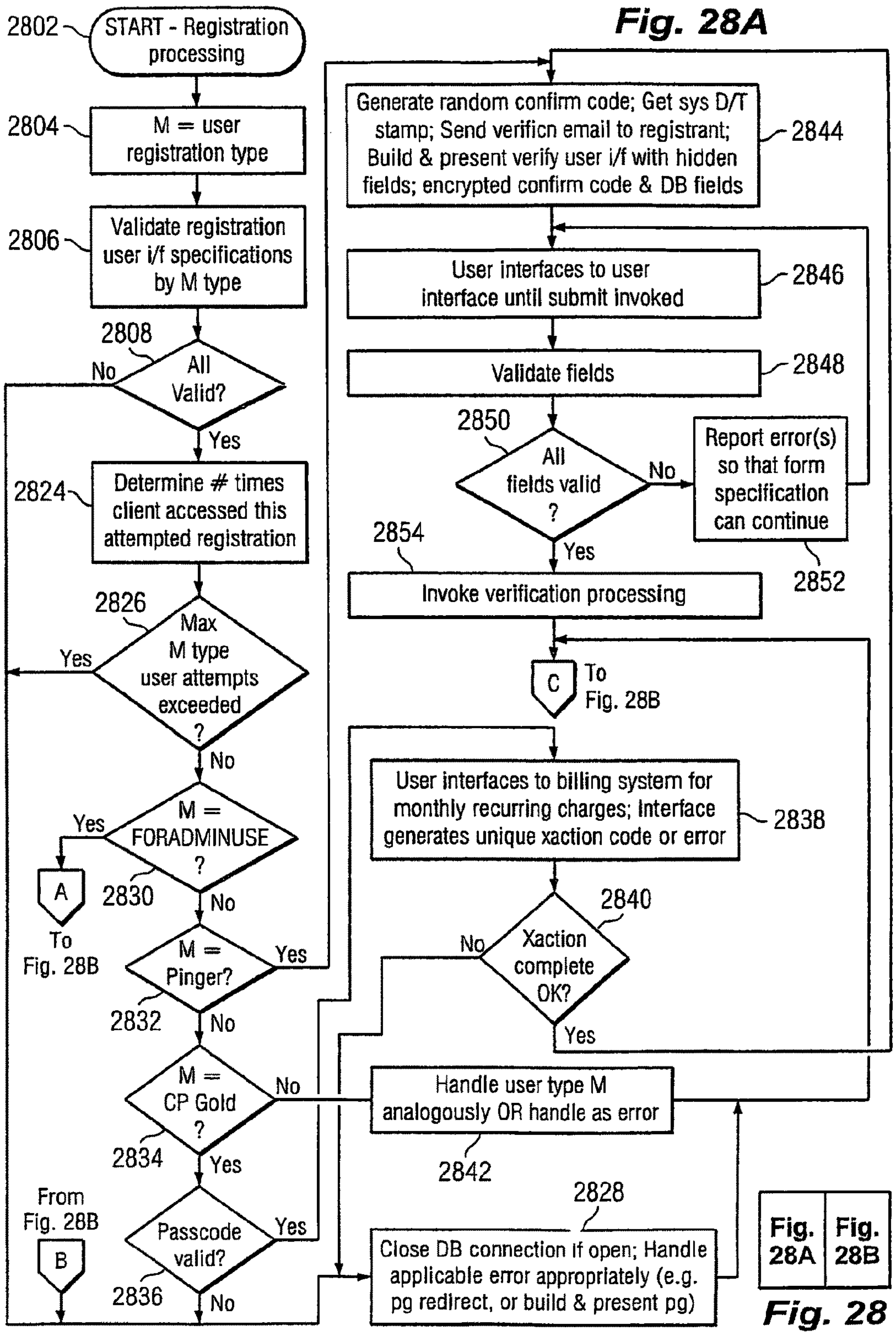
FIG. 28 depicts a flowchart for a preferred embodiment of the automated user registration/membership processing resulting from user interaction to the registration/membership user interfaces and submittal therefrom.
Figure 28B:
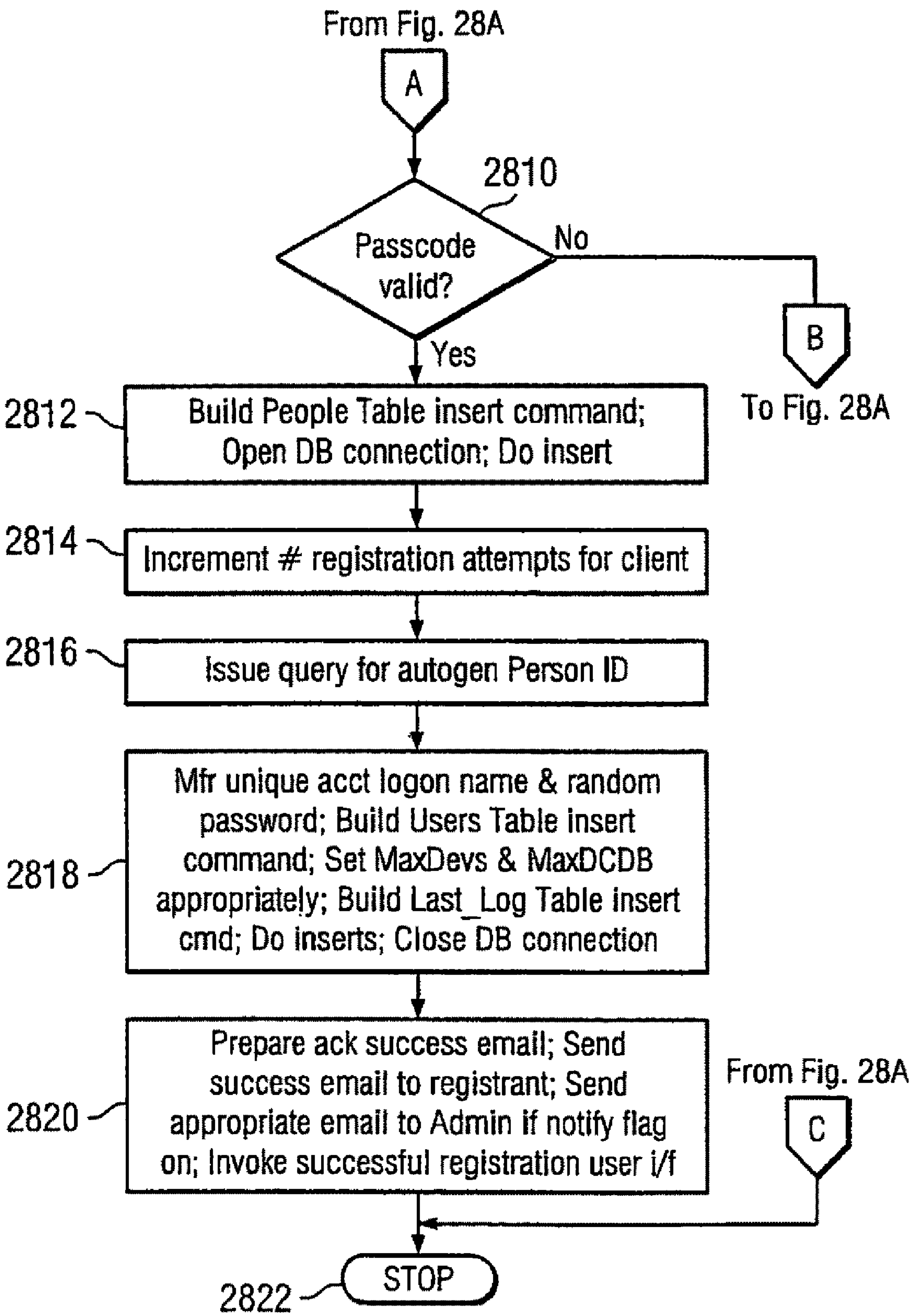

FIG. 22 depicts a block diagram of a preferred embodiment of the overall design for web service Active Server Pages (ASPs) supporting heterogeneous device connectivity. Web service 2102 is shown to include public user interfaces 2202, for example public web pages, and membership user interfaces 2204, for example membership web pages. The terminology user interface(s) and web page(s) are used synonymously and interchangeably throughout this disclosure. The term "web page" is intended to be interpreted in the broadest sense of an accessible user interface, regardless of the user interface format, web page format, platform, programming language, or system(s) involved. A web page may include an Active Server Page (ASP), html page, Java Server Page, WML (Wireless Markup Language) page, or any other means for accomplishing a user interface page. Public user interfaces 2202 preferably include animated user interfaces (animated web pages) 2206, non-animated user interfaces (non-animated web pages) 2208, a heterogeneous logon user interface (heterogeneous logon web page(s)) 2210 (FIG. 41 and associated processing), and an automated registration user interface (registration web page(s)) 2212 (FIG. 28 and associated processing). In one embodiment, a parameter is passed to the web pages for specifying the device type accessing the page so the page is returned to the device in the proper format. In one embodiment, a parameter is passed to the web pages for whether or not to provide animated versions of the page so the page is returned to the device in the proper format. In another embodiment, the web service or web service page determines automatically what types of devices (or browsers) is communicating to it, for example using Active Server Page protocol variables (e.g. Server variables) as well known to those skilled in the art. Automatic determination enables returning to the device an appropriately formatted page, or enables automatically setting and passing the appropriate parameter to another page for returning to the device an appropriately formatted page.

Figure 23A:
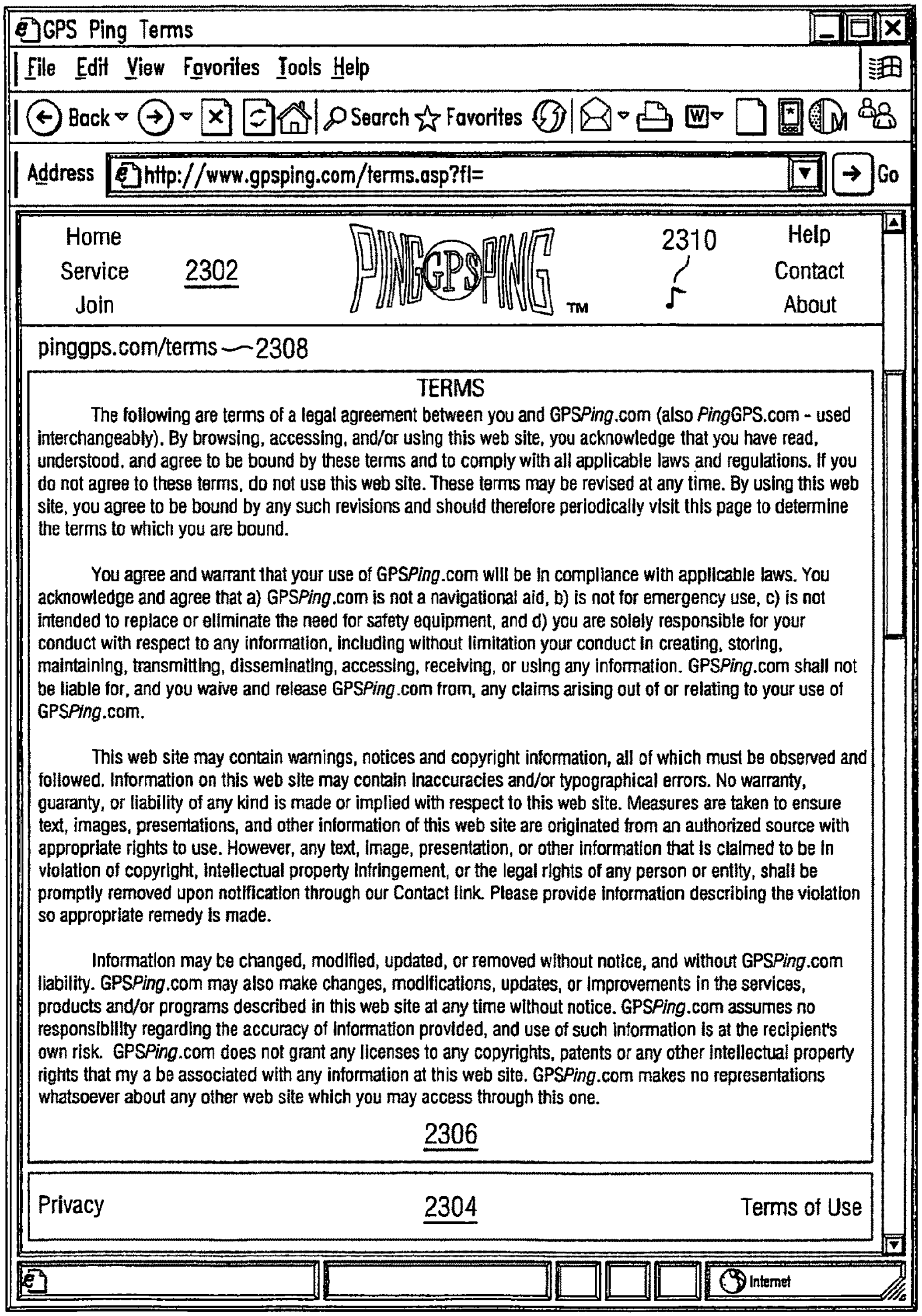
FIG. 23A depicts a preferred embodiment screenshot for the Terms of Use option of the web service as an animated page.

FIG. 23A depicts a preferred embodiment screenshot for the Terms of Use option of the web service as an animated page for a full browser. There is little evidence of animation in this screenshot when compared to FIG. 23B. The screenshot captures a snapshot in time, so depending upon when the snapshot was made, there will be more or less visual evidence. Web page header 2302 is animated with radial patterns emanating outward from the center of the header. If it were not for the GPSPing.com theme music selection option 2310, it would be very difficult to see that header 2302 is indeed animated in the screenshot. Each public web page preferably contains an attractive header 2302 for selecting navigable link options, for example, "Home", "Service", "Join", "Help", "Contact", and "About". The "Contact" option need not be available since the web service 2102 presented herein is completely automated and does not require a human being to operate it. The "Contact" option is provided for an extra level of complementary human being service. Each public web page preferably contains an attractive footer 2304, also for selecting navigable link options, for example, "Privacy" and "Terms of Use". Each web page contains a content view area 2306 containing formatted content in context for a selected navigable link of the web service. The web service 2102 further returns a navigation indicator 2308 for indicating where in the tree hierarchy of web pages a user is at currently, and whether or not the user is viewing an animated page. In one embodiment a web page prefixed domain name of pinggps.com indicates a non-animated page, and a web page prefixed domain name of gpsping.com indicates an animated page. In this way, users know how to type in a URL for the preference of animated or non-animated pages served to their device by web service 2102. Another embodiment will detect the device type or browser type and automatically serve back pages according to the capabilities. Navigation indicator 2308 is itself a link to the self described web service page so the user can click the link to toggle between animated pages and non-animated pages containing the same web page content. Each web page returned to a device from web service 2102 preferably highlights the navigable link option when that corresponding page is currently displayed. Highlighting includes size, font, color, or any other change to demonstrate where the user is currently at in the context of web service 2102. The "Terms of Use" navigable link option of FIG. 23A in the bottom right corner has been changed in color from white to gold and its point size increased.

Figure 23B:
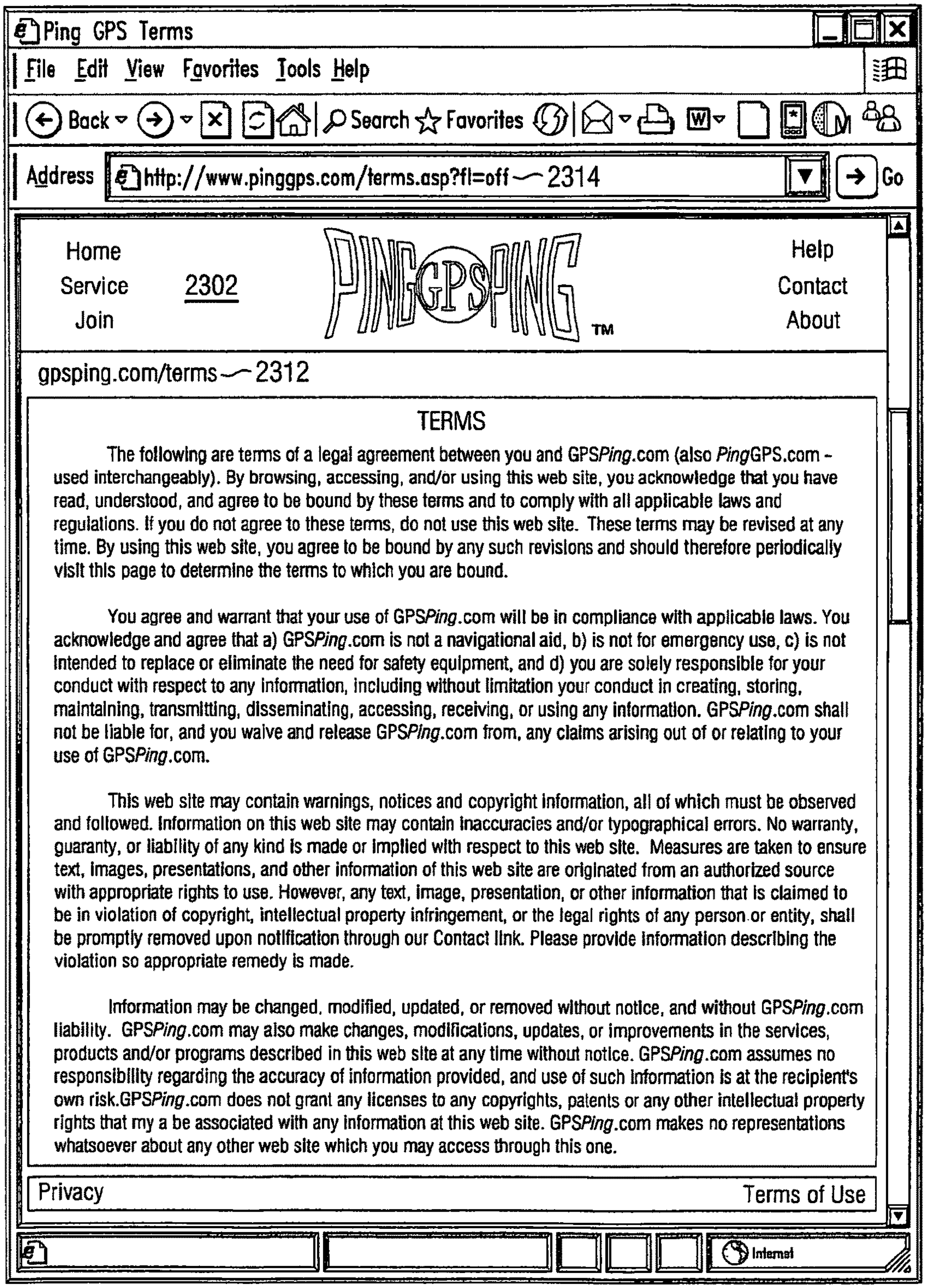
FIG. 23B depicts a preferred embodiment screenshot for the Terms of Use option of the web service as a non-animated page.

FIG. 23B depicts a preferred embodiment screenshot for the Terms of Use option of the web service as a non-animated page for a full browser. Notice that the GPSPing.com theme music selection option 2310 is no longer present since that is only available in an animated page. The navigation indicator 2312 now provides a selectable link back to the animated version of the same page in accordance with discussions above. Also notice that a URL parameter (fl=off) has been passed in the URL descriptor 2314 to the web service 2102 for returning a page with no Flash animation.

Figure 23C:
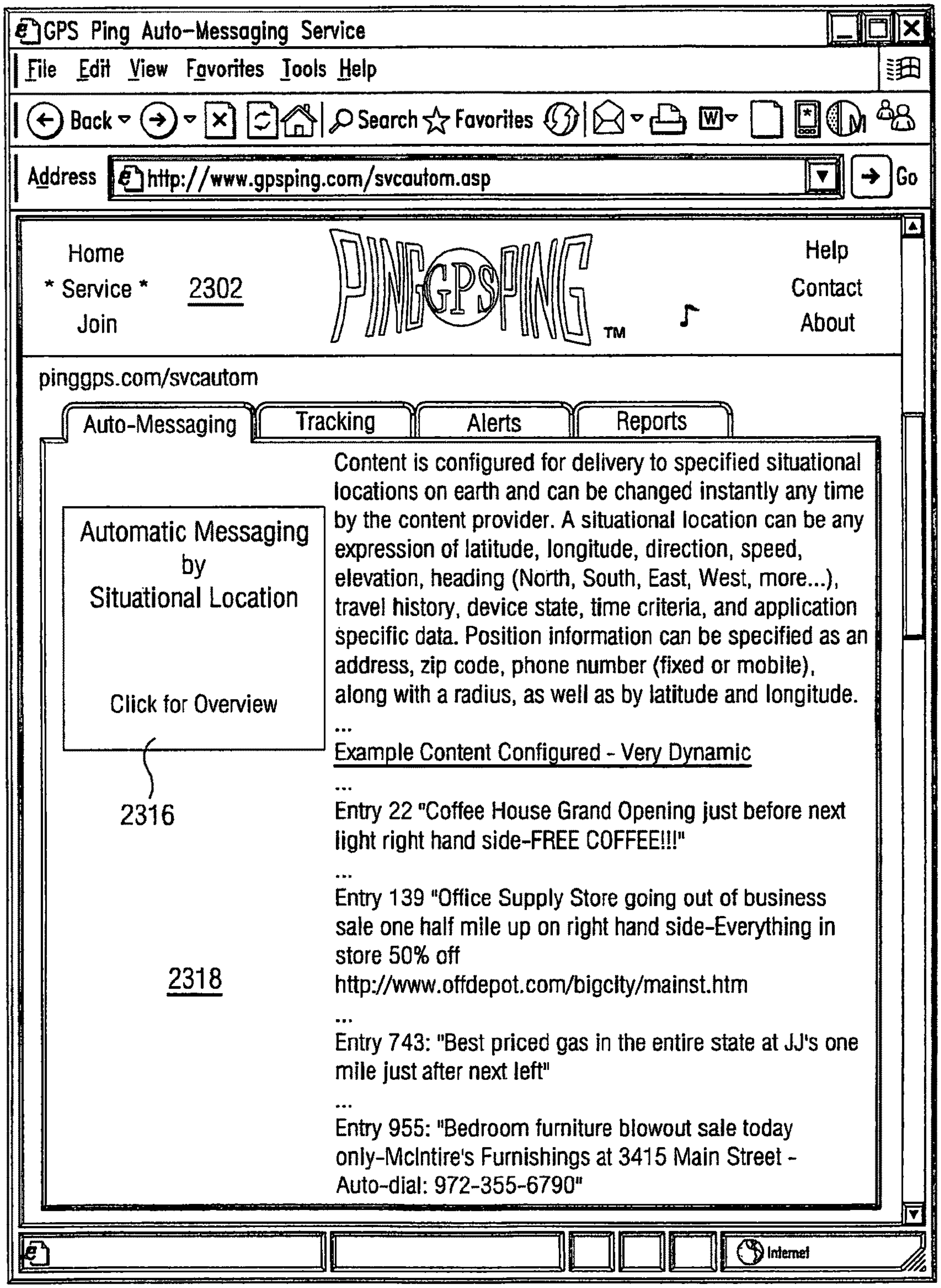
FIG. 23C depicts a preferred embodiment screenshot for the Auto-Messaging option under the Service option of the web service as an animated page.

FIG. 23C depicts a preferred embodiment screenshot for the Auto-Messaging option under the Service option of the web service as an animated page for a full browser. FIG. 23C has been captured as a snapshot wherein there is more evidence of emanation animation in header 2302 as described above. Also, the FIG. 23C animated page provides a Flash presentation 2316 which plays as a video in the displayed page upon being clicked (selected) by a mouse. The page contains other content for this page context such as content 2318.

Figure 23D:
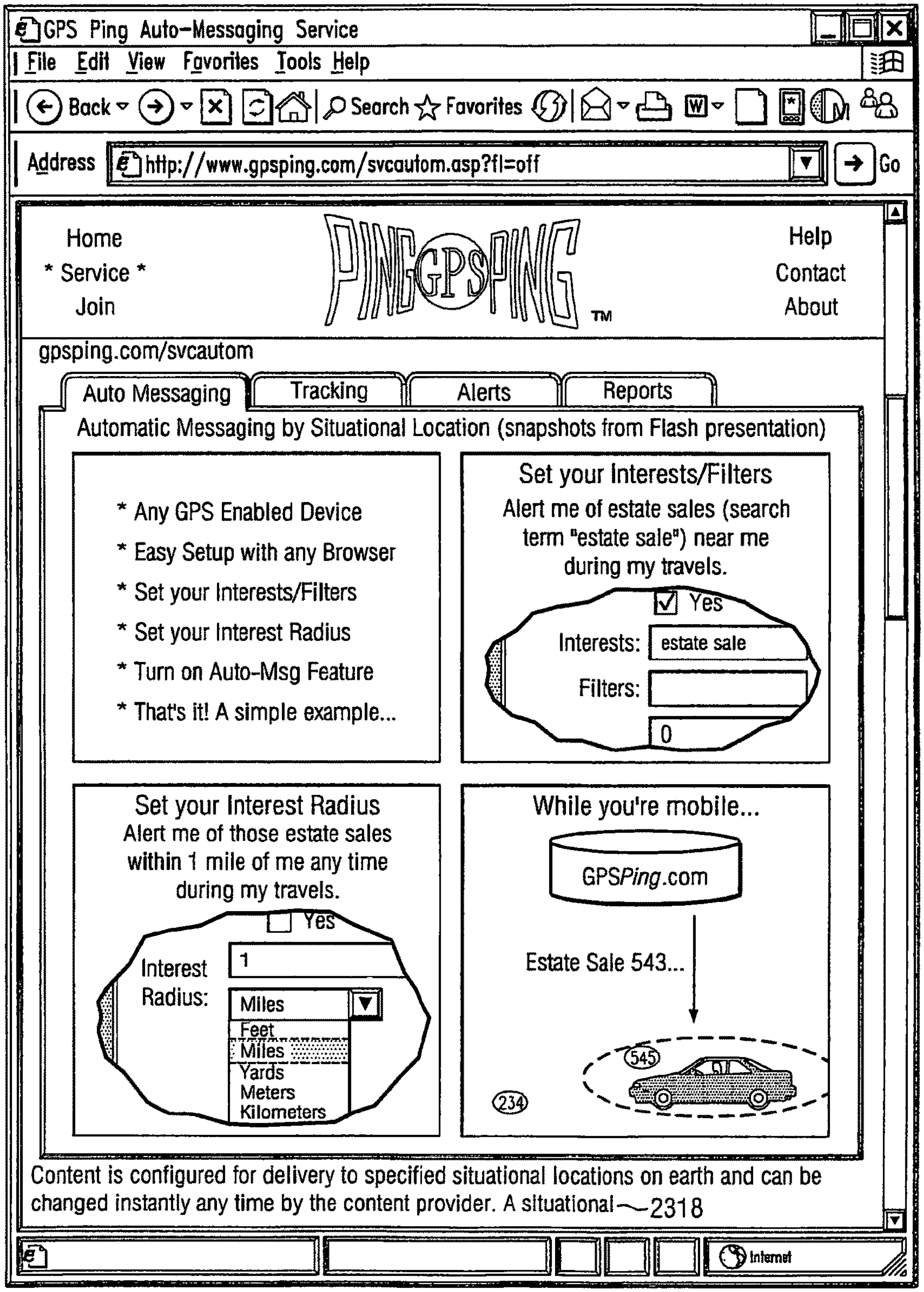
FIG. 23D depicts a preferred embodiment screenshot for the Auto-Messaging option under the Service option of the web service as a non-animated page.

FIG. 23D depicts a preferred embodiment screenshot for the Auto-Messaging option under the Service option of the web service as a non-animated page for a full browser. Notice that key presentation mini-screenshots have been taken and inserted directly within the non-animated page. The user is viewing a non-animated page so there had to be adjustments replacing the Flash presentation with fixed content. Also, notice that the same content 2318 is still presented to the page since both pages represent the same context, although in a different format. FIGS. 23A through 23D are examples of public user interfaces 2202.

Figure 24:
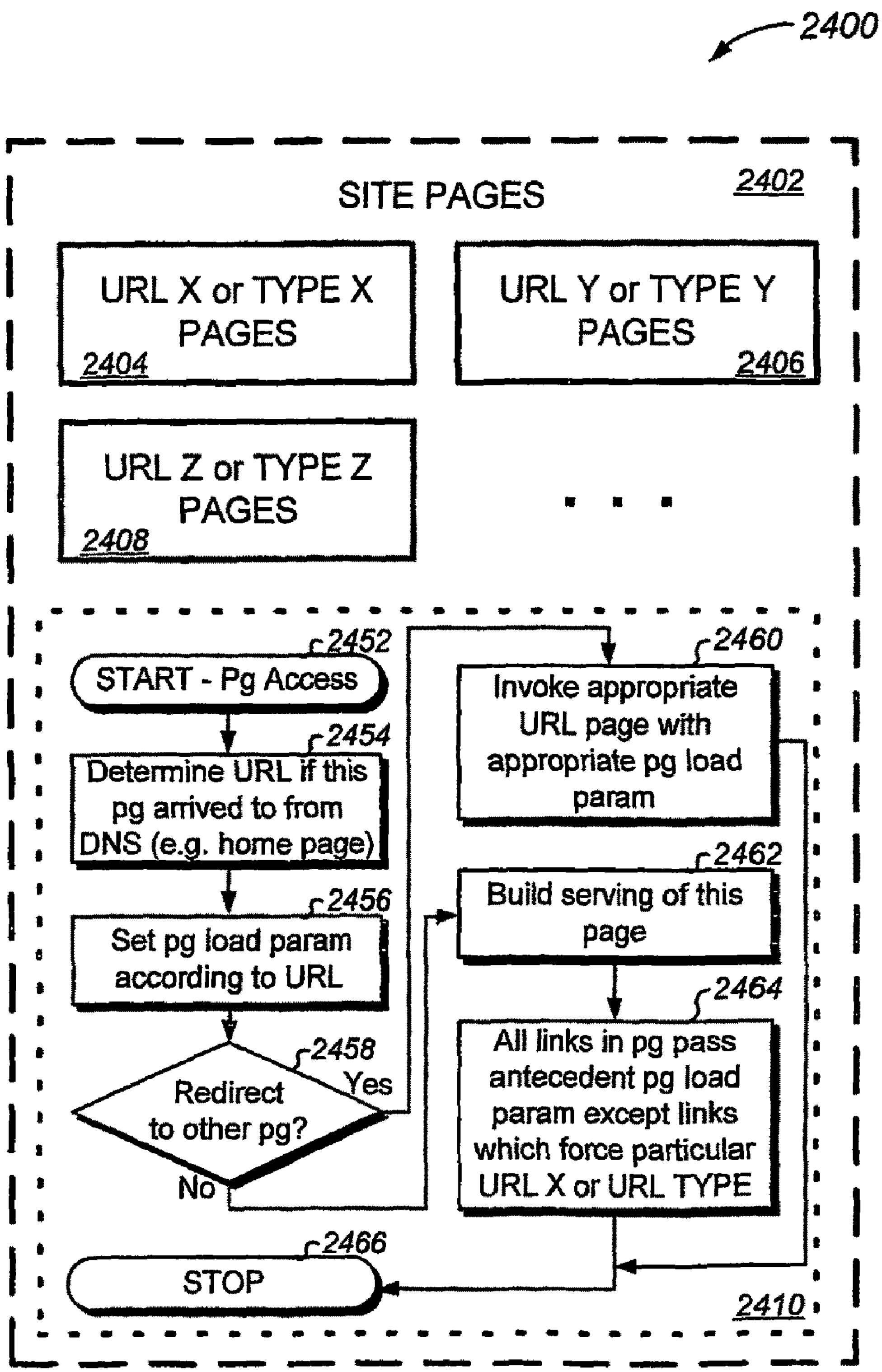
FIG. 24 depicts a block diagram of a preferred embodiment of the overall design for any particular web service Active Server Page (ASP) supporting heterogeneous device connectivity.

FIG. 24 depicts a block diagram of a preferred embodiment of the overall design for any particular web service Active Server Page (ASP) supporting heterogeneous device connectivity. Web service 2102 has a user interface design 2400 including website pages 2402. The term "website page" or "web page" is not to limit the scope of this disclosure to certain user interfaces, or various implementations of them, in particular when providing the same functionality. Website pages 2402 include type X pages 2404, type Y pages 2406, type Z pages 2408, and any number of specific types of pages. Page types depend on the device type or browser type receiving the page, whether or not the page should be animated, which URL prefix to use, which web service content is sought, and any other characteristics for determining a customized page to return to the requestor of some device. Page processing flow chart 2410 provides the fundamental processing by each ASP for true heterogeneous device support.

In a preferred embodiment, a type page 2404, 2406, or 2408 contains encoded logic according to a URL that invokes the page. The URL will have a prescribed domain name and possibly URL parameter(s) for governing the encoded logic for returning an appropriately formatted page to the device. In this way, the type page 2404, 2406, or 2408 (i.e. ASP) responds uniquely for a particular heterogeneous device type, animation preference, domain name server (DNS) prefix, and the particular page context content sought. In one embodiment, the web service home ASP automatically determines a device type or browser type and then sets parameter(s) for redirecting to another ASP of the web service 2102 with those parameter(s). In another embodiment, every ASP automatically determines the device type or browser type upon page load for appropriate processing. In another embodiment, the invoking browser is burdened with knowing the URL and parameter(s) for invoking each ASP for appropriate processing. In yet another embodiment, any or all of the aforementioned processing techniques are incorporated in ASP processing of the web service 2102.

Page processing flowchart 2410 starts in block 2452 upon being invoked and continues to block 2454. Block 2454 determines how the page was arrived to, for example by www.pinggps.com or www.gpsping.com for processing as described above, along with any parameters that were passed (e.g. ?br=pda for browser type of pda, or ?fl=off for no Flash animation). ASP Server variables (e.g. Request.ServerVariables("HTTP_HOST")) and Request objects (e.g. Request.QueryString("fl")) provide this information. This design allows a plurality of DNS entries of the World Wide Web to route to a single website home page for subsequent processing. This design also enables a single ASP to support any of a number of heterogeneous devices. Thereafter, block 2456 sets a page load parameter (e.g. URL param) according to the requestor's URL and specified parameters so that ASP processing of the redirected page target performs properly.

For example, www.pinggps.com would cause a page load parameter of fl=off to be added to the URL www.gpsping.com (i.e. http://www.gpsping.com?fl=off) for no animation. Block 2456 continues to block 2458 to check if another page should be redirected to with parameter(s). If block 2458 determines that the current ASP will process the requested page correctly, then processing continues to block 2462, otherwise processing flows to block 2460 where an appropriate ASP is determined and invoked with an appropriate URL and parameter(s) for some page type, and then processing terminates for the current ASP at block 2466.

Block 2462 determines and builds a correctly formatted page to be returned to the requestor (e.g. connected device browser) and block 2464 builds any navigable selection links in the page for appending any parameter(s) determined at block 2456 so parameters are passed to all descending web pages from this point forward in the navigation tree of web service 2102. Therefore, once the appropriate page format is determined for the requesting device, all links returned in the page already reflect proper invocation of subsequent links. The user only has to click a link in the returned page and the invoked page will be properly formatted for his device. Thereafter, this ASP terminates processing at block 2466.

Flowchart 2410 is performed for every ASP. In this way, heterogeneous devices are determined at the top of every page and handled properly in either the current ASP or for redirection with parameters to another ASP. Thus, flowchart 2410 discloses a preferred design for not only handling heterogeneous devices, but for handling an animation preference, and other reasonable preferences by the requesting browser. In a preferred web service 2102, animated pages include Macromedia Flash and/or Shockwave elements (Macromedia, Flash, and Shockwave are trademarks of the Macromedia company). CD-ROM file name "Default.asp" provides an ASP program source code listing for a home page embodiment of flowchart 2410 exemplifying animation handling, and CD-ROM file name "svcautom.asp" provides an ASP program source code listing for one web service page for animation handling. Heterogeneous browser handling of flowchart 2410 is exemplified by CD-ROM files referenced in disclosure below for FIGS. 40 through 45.

Figure 25:
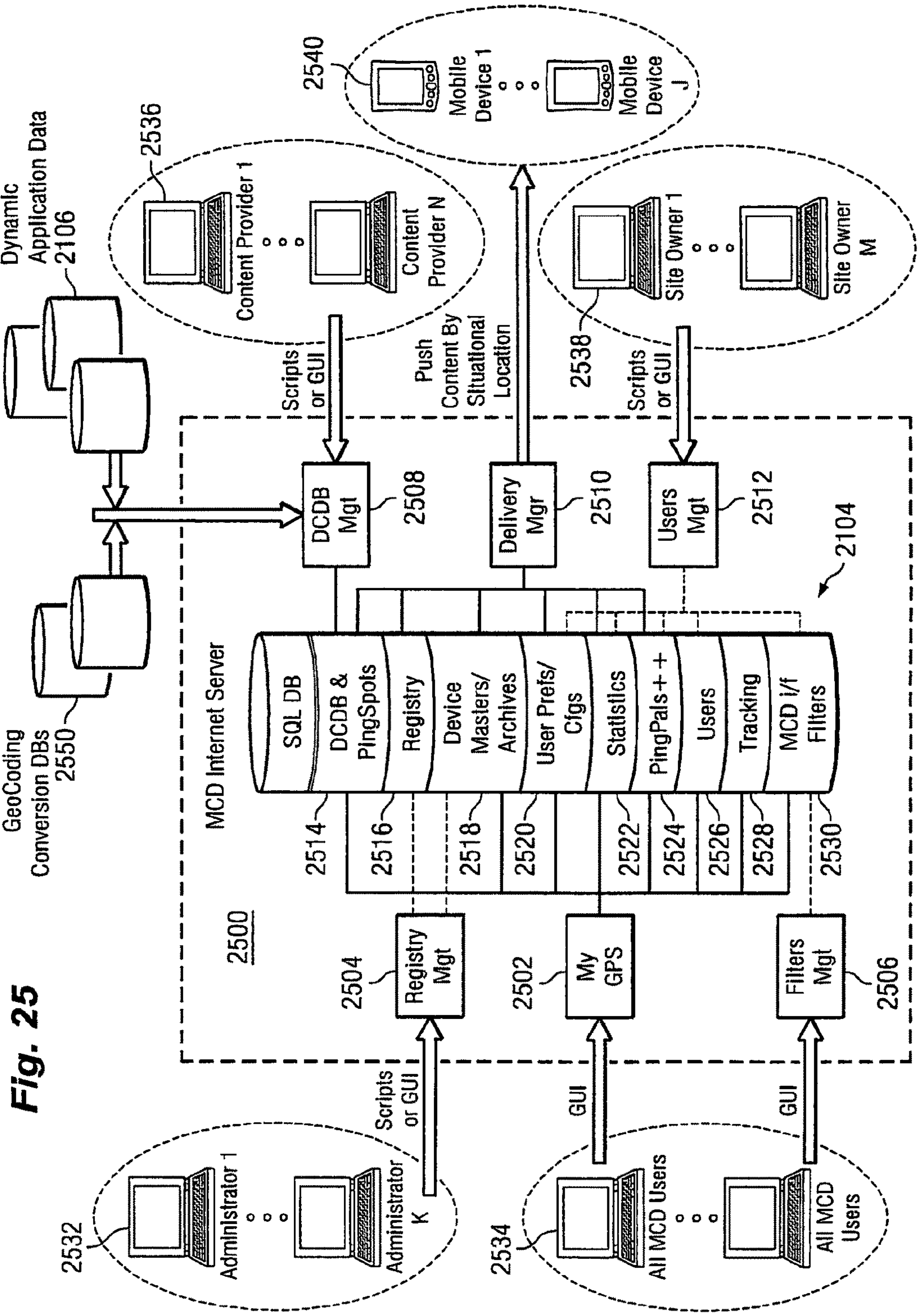
FIG. 25 illustrates a preferred embodiment of the main architectural web service components used to carry out novel functionality and how different user types interoperate with the web service through heterogeneous devices.

FIG. 25 illustrates a preferred embodiment of the main architectural web service components used to carry out novel functionality and how different user types interoperate with the web service through heterogeneous devices. The web service 2102 members area 2500 (as opposed to the public site pages of web service 2102) is sometimes referred to as a Mobile Content Delivery (MCD) Internet Server as titled in the drawing. Web service members area 2500 includes a My GPS component 2502 which provides web service members area user interfaces to a heterogeneous device by user type, device type, and user preferences. The My GPS component 2502 intersects with other components in that it is the main shell interface by which other component interfaces show through to a user. All users to the web service members area 2500 access members area interfaces through the My GPS interface. The members area 2500 also includes a Registry Management component 2504 for managing devices to web service 2102, a Filters Management component 2506 for managing convenient user interface filters for automatically filtering data through all members area 2500 user interfaces, a DCDB Management component 2508 for managing deliverable content in the members area 2500 of web service 2102, a Delivery Manager component 2510 for managing content deliveries by situational locations as well as additional device interface functionality disclosed below, and a Users Management component 2512 for managing users in the members area 2500 of web service 2102. Components 2502 through 2512 are preferably composed each of a plurality of web pages, for example ASPs, and each page supports a heterogeneous device by user type, device type, and user preferences. Pages of the members area 2500 are membership user interfaces 2204.

Components access server data 2104 for novel functionality. The data is preferably maintained in an SQL database. Server data 2104 for members area 2500 includes deliverable content 2514 (e.g. DCDB data, PingSpot content (discussed below)), Registry data 2516 (discussed below)) for maintaining devices to the web service, Device Delivery History data 2518 (Masters and Archives discussed below), User preferences and configurations 2520 (discussed below), Statistics 2522 (discussed below), PingPal configurations 2524 (discussed below), User data 2526 (discussed below) of the web service 2102 members area 2500, Tracking information 2528 for tracking the whereabouts or historical situational locations of heterogeneous devices (discussed below), and user interface filters 2530 (discussed below) for enabling a user friendly user interface to members area 2500. Registry Management 2504 enables Administrator user types to administrate a permitted number of heterogeneous devices to the web service. There are also different types of Administrator user types, each with a specified number of devices they can manage. Filters Management 2506 enables all user types to customize members area user interfaces. DCDB Management 2508 enables Content Provider user types to administrate a permitted number of deliverable content data items to the DCDB of the web service. There are also different types of Content Provider user types, each with a specified number of content items they can manage. Other user types can manage content to the DCDB through My GPS 2502, for example PingSpots and Pingimeters as discussed below. Delivery Manager 2510 interacts with mobile devices of the Registry 2516 for delivery of deliverable content 2514 and other novel processing discussed in detail below. Users Management 2512 is optional to the web service and enables Site Owner user types to administrate a permitted subset of User member account records of User data 2526. All users can manage their own member account records and any records they own or created. Components each access certain areas in server data 2104 as demonstrated by lines adjoining components to the particular data area. Any of the FIG. 25 components can be accessed with any heterogeneous device, mobile or not.

In one embodiment, external data source(s) 2106 (may be remote) provides deliverable content, and Geocoding Conversion data 2550 enables converting situational location data of external data source(s) 2106 into a more suitable format situational location data, for example in converting a postal address to a latitude and longitude. Data from external data source(s) 2106 may be imported to deliverable content 2514 for participation in delivery, perhaps after a geocoding transform (but not necessarily). Data from external data source(s) 2106 may be accessed at delivery time when needed, or transformed with geocoding data 2550 when needed, in which cases minimal pointer information is maintained in deliverable content 2514 for pointing to needed data when it is needed. Geocoding data 2550 includes databases facilitating conversions such as:

Postal address information to latitude and longitude;

Mapsco grid reference to latitude and longitude, or applicable area in latitude and longitude coordinates;

elephone number for fixed phone location, or mobile phone current location to associated latitude and longitude;

Proximity sensing means location, for example as discussed in U.S. Pat. Nos. 6,389,010 and 5,726,984 (Kubler et al), to latitude and longitude; or Any mapping transformation of a situational location subset form or format to another situational location subset form or format.

The same user can be an Administrator 2532, Content Provider 2536, Site Owner 2538, and general MCD User 2534, while at the same time being a user of a mobile device 2540.

Figure 26:
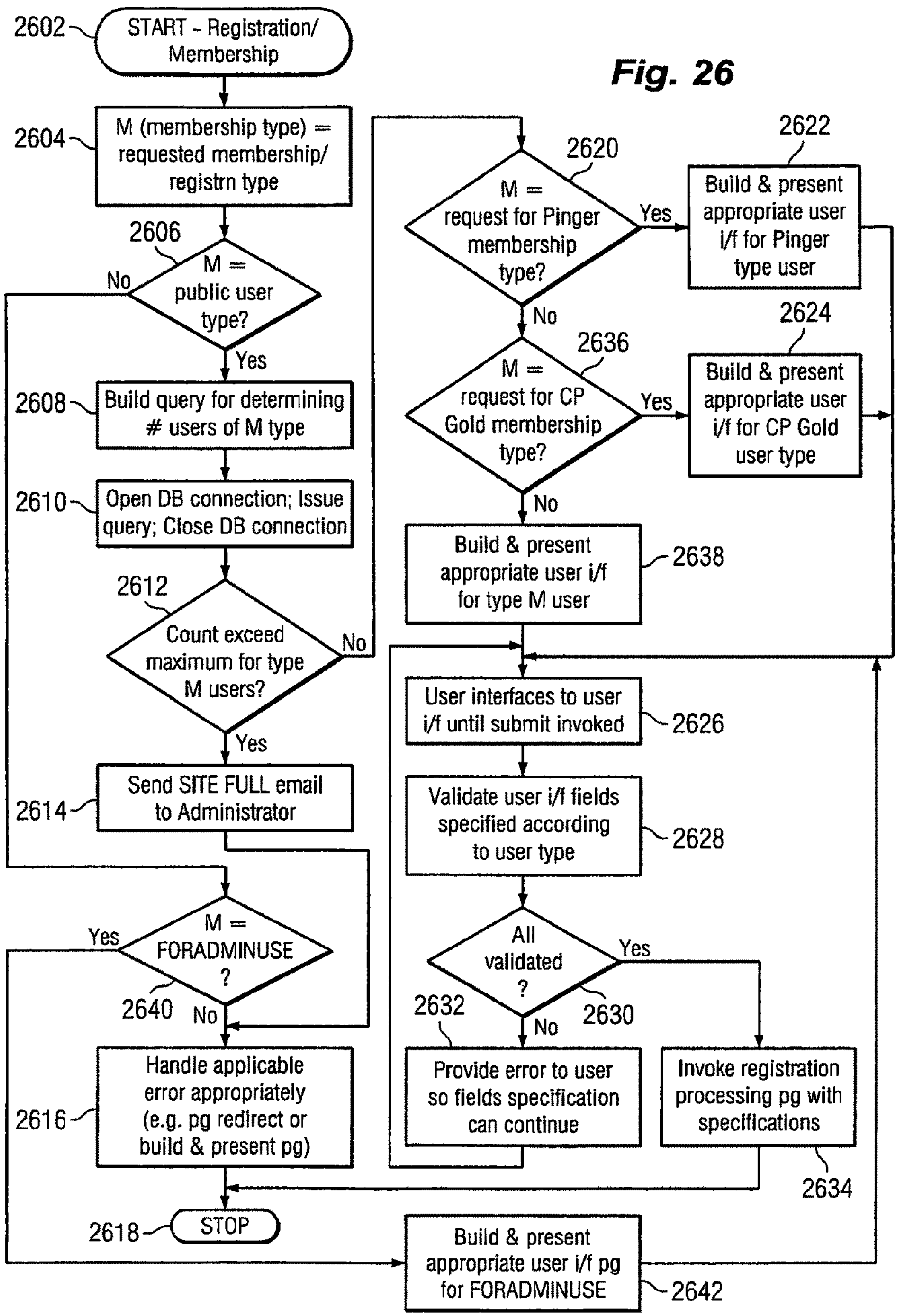
FIG. 26 depicts a flowchart for a preferred embodiment of the user interface invoked for automated registration/membership to the web service.

FIG. 26 depicts a flowchart for a preferred embodiment of the user interface invoked for automated registration/membership to the web service. FIG. 26 and associated Figures is part of automated registration 2212. Processing begins at block 2602, for example as a result of clicking FIG. 27A links 2702 or 2704, or upon entering a proper URL string in a web address bar of a browser such as FIG. 27D URL string 2798. Thereafter, block 2604 sets a variable M to the membership type requested passed as a ("m") parameter to the FIG. 26 ASP, and block 2606 determines which user type was requested for registration/membership.

If block 2606 determines that a public user type was requested (e.g. by way of FIG. 27A links 2702 and 2704), then block 2608 builds a query for querying the number of members area 2500 users already registered in Users data 2526. Thereafter, block 2610 opens a database connection, issues an appropriate select count(*) query and closes the database connection. Then, block 2612 checks to see if there are too many users already registered in the web service. Web service 2102 is fully automated so must ensure current capability accommodates the number of users trying to register to the service. It is conceivable that millions of users may try to register to the web service 2102. A site configuration file is maintained for the maximum number of users (preferably for each user type) the site can currently support at any particular time. If that number becomes exceeded, no other users can register. An automated process (or human being) is notified with an alert email to scale the web service 2102 up to support more users. At that point, the site configuration maximum number of users supported is also increased.

If block 2612 determines the web service 2102 members area 2500 is already at capacity of maximum number of users supported for the requested user type, then block 2614 sends a site full alert email to an Administrator account, block 2616 handles the error appropriately as discussed below, and processing terminates at block 2618. The Administrator account is preferably an automated program scanning email content for kicking off automated processing for submitting work order(s) to scale up the web service 2102, for example, an increase in communications bandwidth, data storage, processing power, or any other web service resource. Work orders may also be handled by automated processes for scaling up the web service 2102. Once the resources are provisioned, the site configuration maximums are automatically updated with new maximum values in accordance with the scaled website. In one embodiment, the Administrator account can be a human being monitored account for taking care of web service scaling with subsequent manual procedures involved. The site configuration maximums are constants preferably maintained in an include file included by web service 2102 pages. The include file is updated once the web service 2102 is appropriately scaled to support more users.

If at block 2612 it is determined that the maximum number of users of the requested type will not be exceeded, then processing continues to block 2620 where a Pinger membership account type is determined. If this registration/membership request is for a Pinger type, then block 2622 builds and presents the Pinger registration page of FIG. 27B. Thereafter, in block 2626 the user interfaces to the registration page until doing a Submit of the completed form fields. Upon submission, block 2628 validates user interface fields according to the user type requested just prior to invoking the form processing page. All form validation processing (in this entire disclosure) just prior to invoking a form processing page is preferably implemented in Javascript for cross browser compatibility, but may be implemented with any reasonable method.

Thereafter, if block 2630 determines one or more fields are invalid, then an error is communicated to the user at block 2632 so user input specification can continue on return to block 2626. Blocks 2628 and 2630 preferably check for SQL injection attacks, common character entry errors, and typical issues that occur in data entry. One method for reporting an error is to use a popup, which is read by the user, then removed without submitting the user interface form fields to the form processing page. Upon return to block 2626, the user responds to the errors reports. If at block 2630 all the fields specified in the user interface are valid, then block 2634 invokes the registration processing page of FIG. 28 with the user input specified as data evidence (preferably form fields), and the current page terminates at block 2618. Processing of blocks 2626 through 2632 are analogous throughout similar user interface processing blocks discussed below in other flowcharts. Other embodiments of this and other flowcharts may not include device side validation at all such as blocks 2628 through 2632 prior to page form submission, such that submission from a user interfacing block such as block 2626 continues directly to a processing page block such as block 2634 for validation and processing.

If block 2620 determines a Pinger membership was not requested, then processing continues to block 2636. If block 2636 determines a Content Provider Gold membership is being requested, then block 2624 builds and presents the Content Provider Gold registration page of FIG. 27C and processing continues to block 2626 and subsequent processing as already described.

If block 2636 determines the request was not for a Content Provider Gold membership, then block 2638 builds and presents an appropriate interface corresponding to the membership requested and processing continues on to block 2626 already described. If block 2606 determines that a public user type was not requested, then processing continues to block 2640. Only a certain keyword parameter known to a site administrator can invoke an interface for registering any user type. If block 2640 determines that the membership requested is for site administrator use, then block 2642 builds and presents the FORADMINUSE only registration page of FIG. 27D. Thereafter, processing continues to block 2626 as already described. If block 2640 determines that the registration request is invalid, then the error is handled appropriately at block 2616 by way of reporting the error to the requesting user, or by redirecting the user to an error page.

Figure 27A:
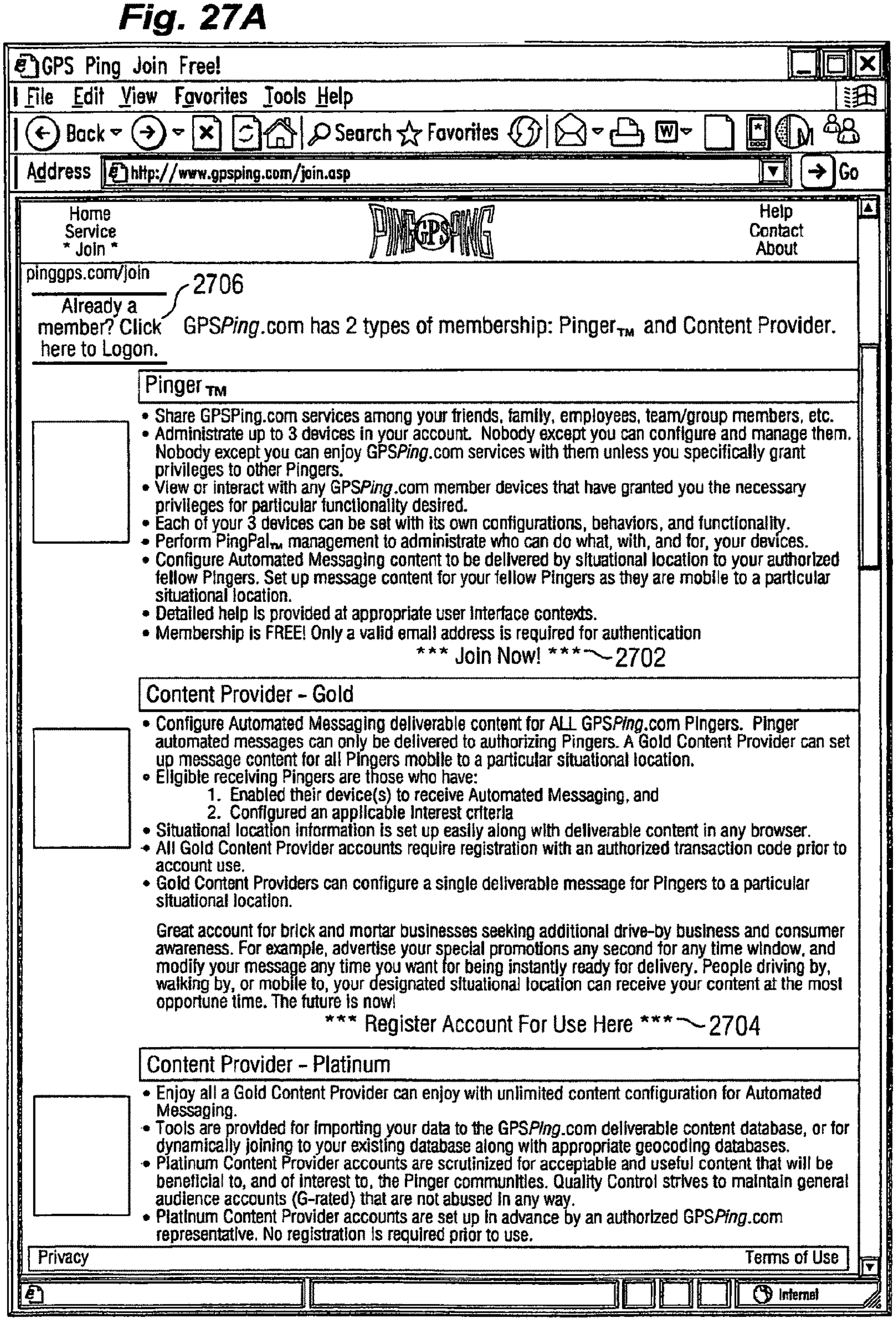
FIG. 27A depicts a preferred embodiment screenshot for the Join option of the web service as an animated page.

FIG. 27A depicts a preferred embodiment screenshot for the Join option of the web service as an animated page for a full browser, available from the public website. Public user types of Pinger and Content Provider Gold are exposed in the FIG. 27A user interface. A Platinum Content Provider join link could also be exposed for automated registration and billing, but it is not at the time of taking the screenshot of FIG. 27A. Registration and membership user interface processing preferably enforces a full browser, but alternative embodiments will permit the processing from any heterogeneous device. Member area logon link 2706 is provided for users who are already registered members and wish to logon to the members area 2500 for membership user interfaces (pages) 2204. Logon link 2706 redirects the user to an appropriate logon page depending on the device type. If a successful logon was already made from the device as determined by a logon processing ASP, the logon user interface is automatically bypassed and an appropriate options page presented to the user by his user type, device type, and previously set user preferences, as discussed below. All users can register to web service 2102 automatically, or another embodiment will rely on a human administrator for certain user types.

Figure 27B:
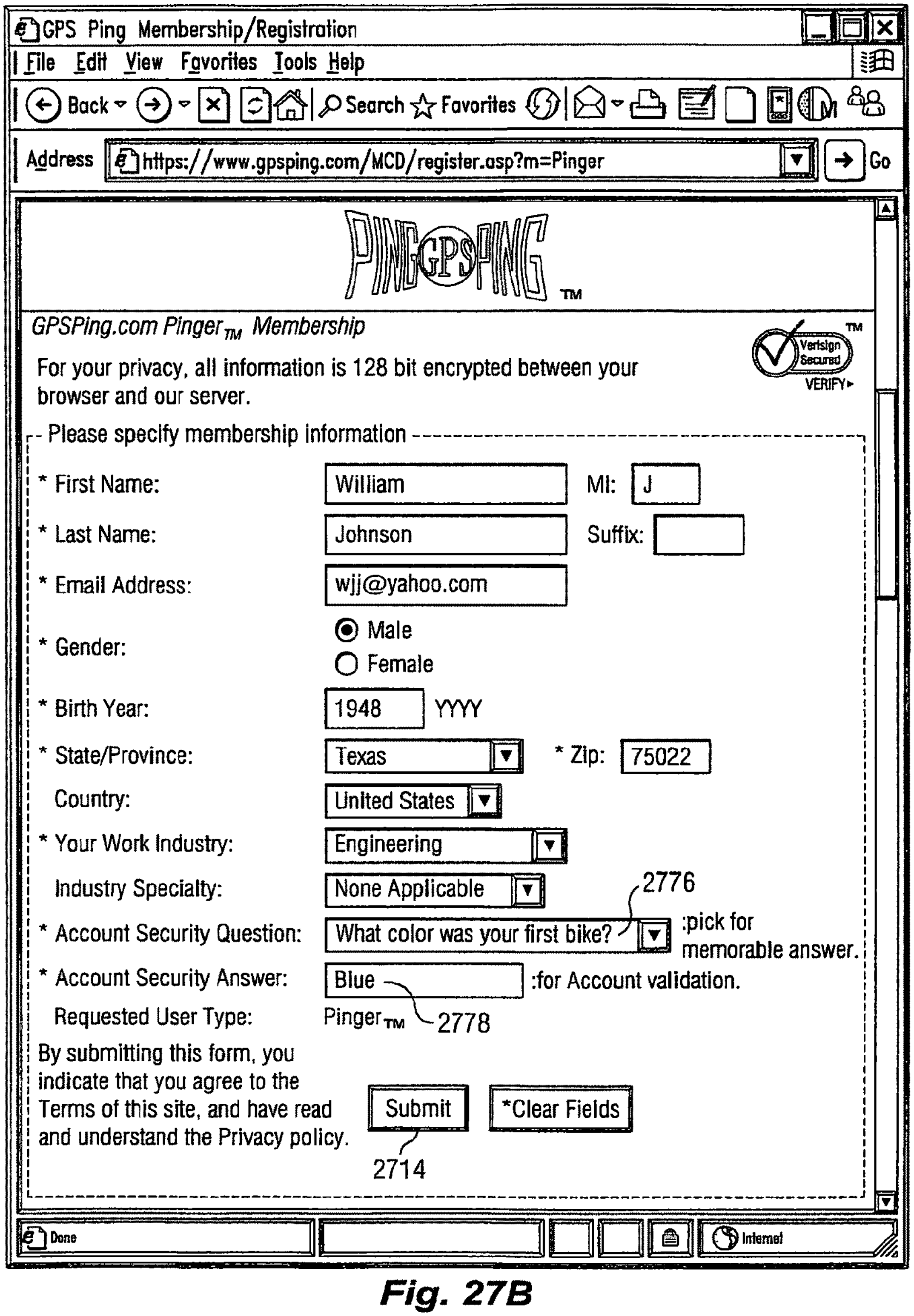
FIG. 27B depicts a preferred embodiment screenshot for the Pinger registration/membership option of the web service.

FIG. 27B depicts a preferred embodiment screenshot for the Pinger registration/membership option of the web service, for example upon clicking link 2702. Fields specified by the user are intuitive. Notice that only the minimal amount of personal information is requested to maintain a level of anonymity. There is still enough information provided by users for web service 2102 statistics based on birth year, sex, location, work industry, and work industry specialty. A work industry specialty clarification may or may not exist for a particular work industry. A "Your Work Industry" selection populates field 2972. An "Industry Specialty" selection populates field 2974. Other embodiments can request less personal information, or more personal information. Giving a new user the sense that not too much information is being requested is preferred to achieve confirmation that the web service 2102 is anonymous. Account security question dropdown 2776 provides a convenient list of options to help the user remember his account information in case he forgets his logon id or password. FIG. 49B shows a dropdown example in detail for user selection. The user selects a desired account security question and then enters a string for the answer in security answer field 2778. Submit button 2714 submits the user specifications for processing. Generally, the submit button in all user interfaces of this disclosure submits user specifications for processing.

Figure 27C:
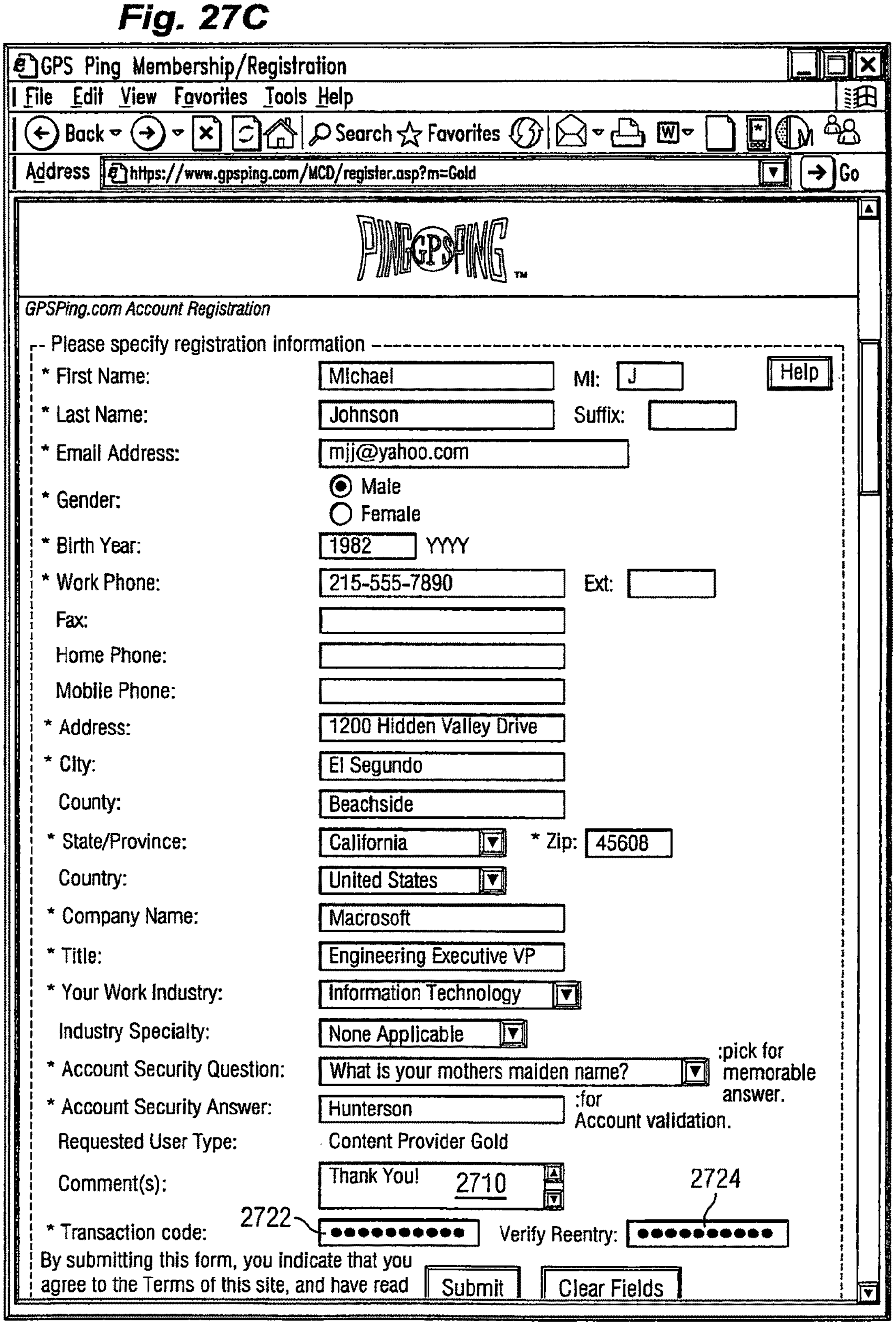
FIG. 27C depicts a preferred embodiment screenshot for the Content Provider Gold registration/membership option of the web service.

FIG. 27C depicts a preferred embodiment screenshot for the Content Provider Gold registration/membership option of the web service, for example upon clicking link 2704. More personal information is required for a Content Provider Gold account membership because they are paying customers to the web service 2102. Fields specified by the user in FIG. 27C are intuitive and are a superset of those specified in FIG. 27B. FIG. 27B shows that the user has already specified data to the user interface just prior to submission. A comment field 2710 is provided for the user to enter a comment to the web service for his account setup. Only a valid transaction code known to a potential Content Provider Gold user enables a successful registration. The transaction code is entered into fields 2722 and 2724, and is validated by the processing page upon successful form submission. Block 2630 ensures the transaction code entered twice matches before submitting to the processing page.

Figure 27D:
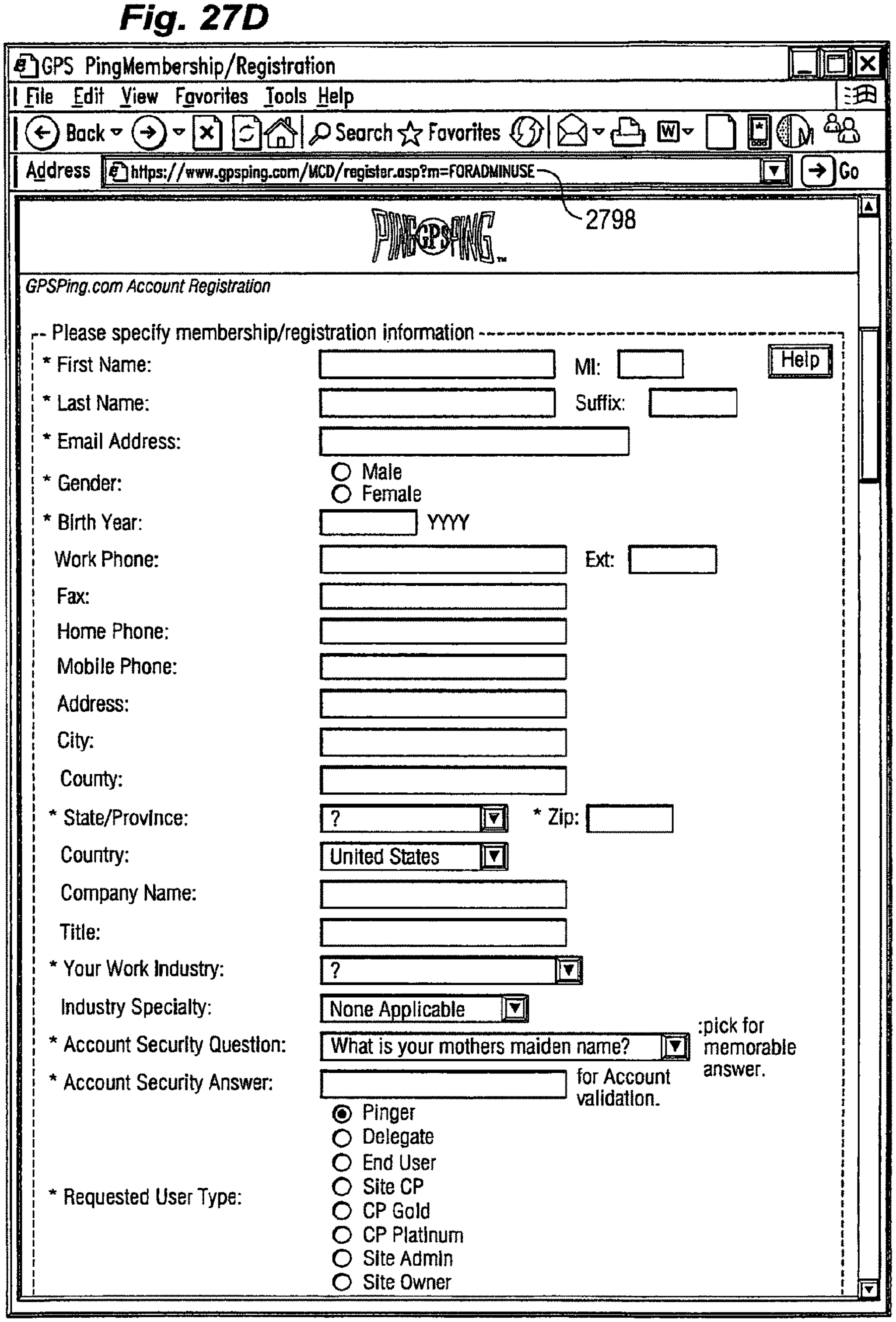
FIG. 27D depicts a preferred embodiment screenshot for the administrator specified registration/membership option of the web service.

FIG. 27D depicts a preferred embodiment screenshot for the administrator specified registration/membership option of the web service, for example upon entering URL 2798. FIG. 27D is a superset of FIG. 27C with the caveat that a different transaction code must be specified by a knowing administrator, and any user type can be requested by the administrator for registration. Notice that additional information can be specified for any user type in the system. All user types are preferably maintained in the same database table(s) so data is populated in the table(s) if provided.

Figure 27E:
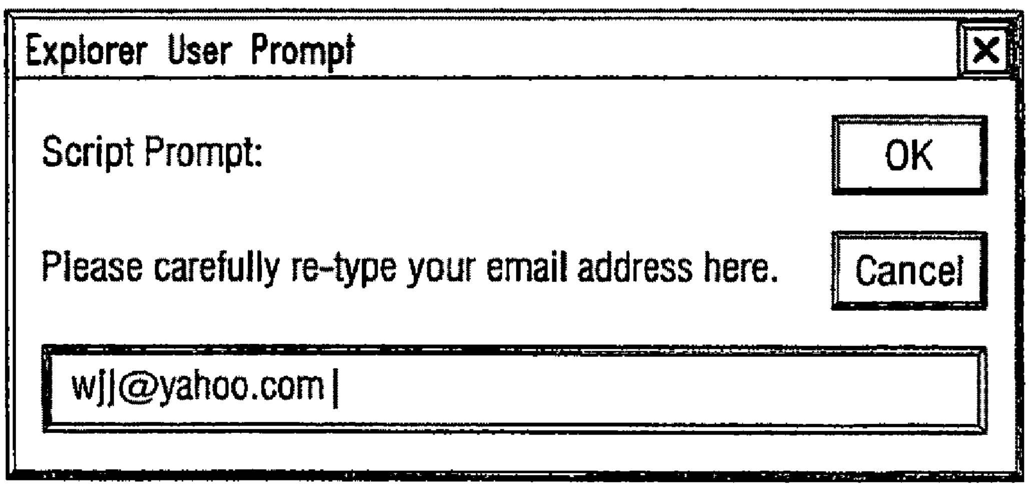
FIG. 27E depicts a preferred embodiment screenshot for the email address validation aspect of the web service.

FIG. 27E depicts a preferred embodiment screenshot for the email address validation aspect of the web service. Block 2628 further includes processing for prompting the user to re-enter his email address specified in a FIG. 27B through FIG. 27D interface. The FIG. 27E pop-up accepts input from the user for comparison to the email address entered in the "Email Address" form field. Block 2630 additionally compares the email address entered to the pop-up with the email address originally entered in the form. A mismatch causes processing flow from block 2630 to block 2632. A match causes processing flow from block 2630 to block 2634.

FIG. 28 depicts a flowchart for a preferred embodiment of the automated user registration/membership processing resulting from user interaction to the registration/membership user interfaces and submittal therefrom. Processing resulting from block 2634 begins at block 2802 and continues to block 2804 where a variable M is set to the membership type requested as passed from the registration/membership user interface page ("m" variable). Thereafter, block 2806 validates the form fields communicated for processing. Fields are preferably not only validated prior to submission, but similarly also in all processing pages in case an attacker tries to access the processing page(s) directly. Thereafter, block 2808 checks to see if fields passed were all valid. If they were not all valid, then block 2828 handles the error appropriately either by informing the user or confusing a potential attacker, and processing terminates for this ASP at block 2822. Block 2828 will also close any database connection should one be open if arrived to as the result of an error.

If block 2808 determines that all form fields are valid, then block 2824 determines the number of registration attempts thus far made by this user. For example, registration attempt evidence can be cached at the user's device in a cookie, or kept in the server data 2104 with identifying information in a best attempt to know that this is a repeat registration attempt. Thereafter, if block 2826 determines the maximum number of attempts has been exceeded, then processing continues to block 2828 for processing as heretofore described.

If block 2826 determines that a maximum number of repeated attempts has not been exceeded, then block 2830 checks if the type of registration requested is a FORADMINUSE request. If block 2830 determines that this is for a FORADMINUSE request, then block 2810 validates the "Transaction code" entered. If the transaction code entered is not valid, then processing continues to block 2828. If block 2810 determines the transaction code is valid, then block 2812 builds an insert command to insert data into Users data 2526 in the form of a People table record such as FIG. 29, opens a database connection, and does the insert. The number of current registration attempts is incremented for the requestor thereafter at block 2814, and block 2816 issues a query for an automatically generated primary key PersonID 2902 upon SQL insert. Thereafter, block 2818 constructs a default unique account logon name and random password, builds an insert command to insert data into Users data 2526 in the form of a Users table record such as FIG. 30, and specifies the foreign key of PersonID 3002 to associate the records between tables and facilitate a future SQL cascade delete. PersonID 2902 is identical to PersonID 3002. Block 2818 sets fields 3020 and 3022 according to the user type (discussed below). In another embodiment, fields 3020 and 3022 are also exposed in the FORADMINUSE interface for individual setting of the values (they are described below). Thereafter, block 2818 inserts to the Users table, builds an insert command to insert data into Users data 2526 in the form of a LastLog table record such as FIG. 31, does the insert to the LastLog table, and closes the database connection.

Thereafter, block 2820 prepares an acknowledgement email for registration success, sends it to the "Email Address" field specification of the form (such as FIG. 35B), and additionally sends a Notify email to an Administrator email account if a site configuration indicates to do so for documentary purposes. Thereafter, block 2820 presents a successful registration completion page to the user, for example FIG. 35A, and processing terminates at block 2822.

If block 2830 determines that registration is not for FORADMINUSE, then block 2832 checks to see if the registration attempt is for Pinger membership. If this request is for Pinger membership, then processing continues to block 2844 where a random confirmation code is generated, a system date/time stamp determined, and an email is sent to the user's "EmailAddress" specified. The email is built to contain the random confirmation code and date/time stamp, for example FIG. 32B. Thereafter, block 2844 builds and presents a verification user interface, for example FIG. 32A which prompts the user to enter the randomly generated confirmation code automatically sent to his email address. Data evidence is set for subsequent processing, and includes the encrypted data for at least the confirmation code, and all fields entered by the user to the registration/membership interface, preferably as hidden form fields for later insert processing. If this user is a paying customer (arrived here by way of block 2838 through 2840), additional data evidence is created for the paying customer. Thereafter, in block 2846 the user interfaces to the verification page until doing a Submit of the completed form fields. Upon submission, block 2848 validates user interface fields just prior to invoking the form processing page.

Thereafter, if block 2850 determines that one or more fields are invalid, then an error is communicated to the user at block 2852 so user input specification can continue on return to block 2846. Block 2850 preferably checks for SQL injection attacks, common character entry errors, and typical issues that occur in data entry. One method for reporting an error is to use a popup, which is read by the user, then removed without submitting the user interface form fields to the form processing page. Upon return to block 2846, the user responds to the errors reported. If at block 2850 all the fields specified in the user interface are valid (confirmation code preferably not checked yet for match), then block 2854 invokes the verification processing page of FIG. 33 with the user input specified, and the current page terminates at block 2822. Block 2850 will also preferably allow a maximum number of field specification attempts to the FIG. 32A verification interface before handling a maximum attempt error and proceeding directly to block 2828 for appropriate error processing (not shown).

Blocks 2844 through 2854 ensure no User data 2526 is created for the registrant (i.e. user that is performing registration) until it is proven there is confirmation of his email address specified, and validating email receipt through entering of the confirmation code. This automates account creation to the automated web service 2102 in an appropriate manner using email address as a globally unique identifier.

If block 2832 determines that the requested membership is not for a Pinger, then processing continues to block 2834. If block 2834 determines that membership being requested is for a Content Provider Gold account, then block 2836 checks the transaction code entered from the form. If it is invalid, then processing continues to block 2828 which was heretofore described. If the transaction code is valid, then block 2838 invokes a connected billing system (e.g. online credit card billing system) for monthly recurring charges. The user interfaces with the billing system until completion or cancellation, whereupon a billing transaction code is returned at block 2838. The billing transaction code will be uniquely generated from the interface upon successful account billing, or it will be an error status indicating that billing did not complete successfully for any of a variety of reasons.

Thereafter, block 2840 checks the automated billing transaction code returned. If the billing transaction code is the expected proper format and content, then processing continues to block 2844 as heretofore described. If block 2840 determines the transaction code is in error, or indicates an unsuccessful billing transaction, then processing continues to block 2828 for appropriate error handling as already described. If block 2834 determines this is not a Content Provider Gold request, then block 2842 handles the particular public user type as appropriate and analogously to the descriptions above. Thereafter processing terminates at block 2822.

In one human managed website embodiment, block 2818 sets record activated ActiveUser field 3008 to not active for requiring human reconciliation. Otherwise, block 2818 is assumed to enter activated records with record activated field (ActiveUser field 3008) set to active. The preferred method for creating users in the members area 2500 is through the registration interface processing just discussed. A web service 2102 installation preferably already has a Site Owner user created in the database with record activated ActiveUser field 3008 set to active and user type field 2980 set to Site Owner. The confirmation code generated at block 2844 can be encrypted in a cookie at the user's device, placed in a hidden form field, or stored to another suitable data evidence form. A Site Owner may have access to an SQL Query Manager to Server Data 2104 for enabling all conceivable modifications to server data 2104.

Figure 29:
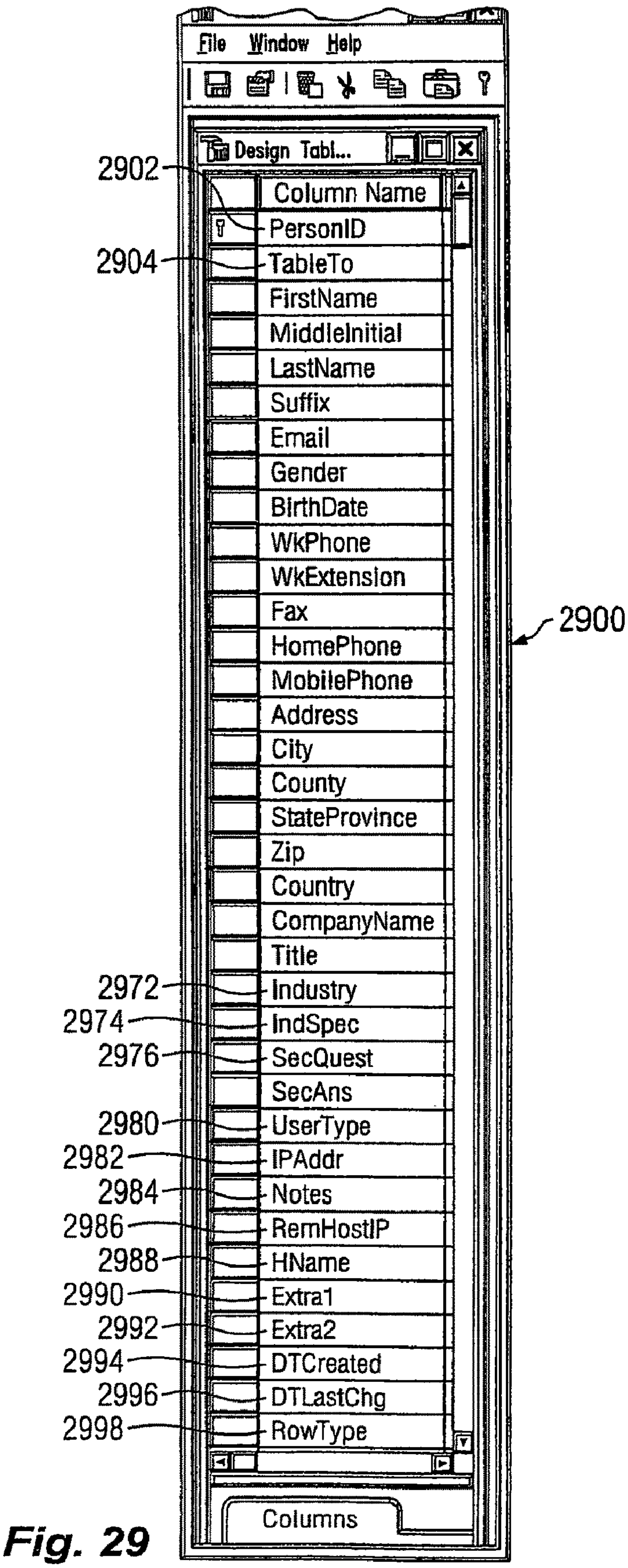
FIG. 29 depicts a preferred embodiment of a data record in the People Table used to carry out registration/membership functionality.

FIG. 29 depicts a preferred embodiment of a data record in the People Table used to carry out registration/membership functionality; A People Table data record 2900 mostly contains fields that are intuitively determined and are easily matched to fields of FIGS. 27B through 27D. The PersonID 2902 is preferably an automatically generated unique number field for each record in the People Table, and is a primary key. The TableTo field 2904 indicates which foreign key relationship table this table can be joined to. The TableTo field 2904 contains a value indicating a FIG. 30 Users Table record, FIG. 38B Contact Table record, and perhaps a Job Applicant Table (not shown) record. So, the People Table is the main table where records therein can be SQL joined to records in the Users Table, Contact Table, or Job Applicants Table. The People Table data record 2900 contains person information common to a variety of different person record types maintained in server data 2104 for a variety of purposes.

The record 2900 "Email" field preferably has a unique key or constraint defined preventing duplicates in web service 2102. This is preferably the point of verification that users are who they say they are through verification processing involving their email address.

UserType field 2980 contains a value for the particular person user type of the record. User types are explained in detail in FIGS. 50B through 50E. A user type indicates a web service 2102 privilege for certain options exposed in the web service interfaces. IPAddr field 2982 preferably contains an internet protocol (ip) address of the registrant's device at successful registration time. This is determined, for example, with ASP Server variables. The Notes field 2984 contains any notes that are made on the user record, for example by Users Management 2512 interfaces. The RemHostIP field 2986 preferably contains the ip address of the actual physical server of web service 2102 that inserted the data record 2900. The HName field 2988 preferably contains the host name of the physical server of web service 2102 that inserted the record, for example because web service 2102 may be a large cluster of physical servers. Extra1 field 2990 and Extra2 field 1992 are provided as convenient reserved future use fields. DTCreated field 2994 contains the date/time stamp for when the record was created in the Database, and the DTLastChg field 2996 contains when the record 2900 was last modified. The RowType field 2998 is a special field for providing demo People Table data records 2900 to the People Table for the Delegate user type. It indicates a real record ("R"), or a demo record ("D"). Delegate user types are essentially read-only access Site Owners of web service 2102. RowType field 2998 enables setting up false People Table records so that Delegates do not see real user data in the database. RowType field 2998 values of "D" imply a row created for Delegate user types.

Figure 30:
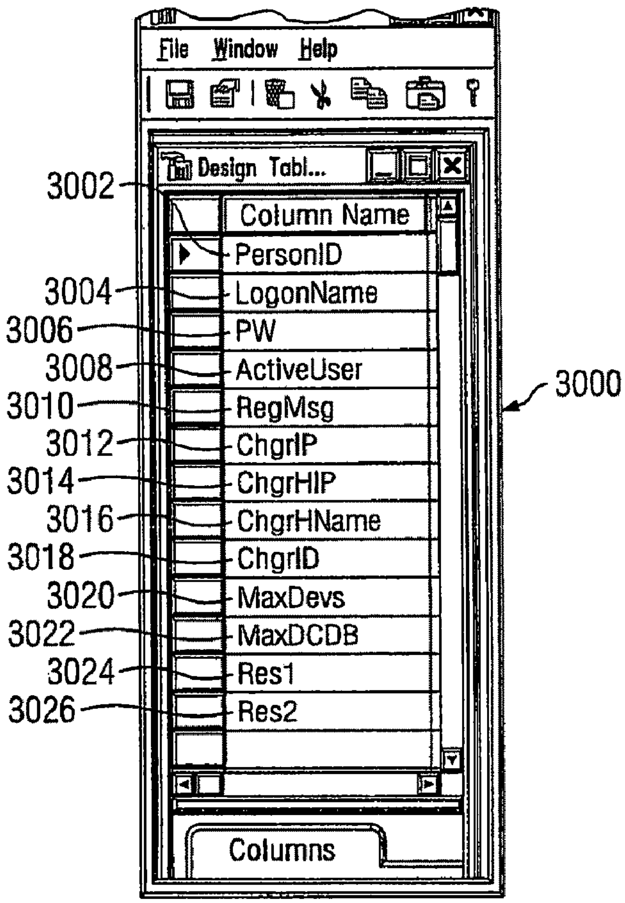
FIG. 30 depicts a preferred embodiment of a data record in the Users Table used to carry out registration/membership functionality.
Figures 39, 39A:
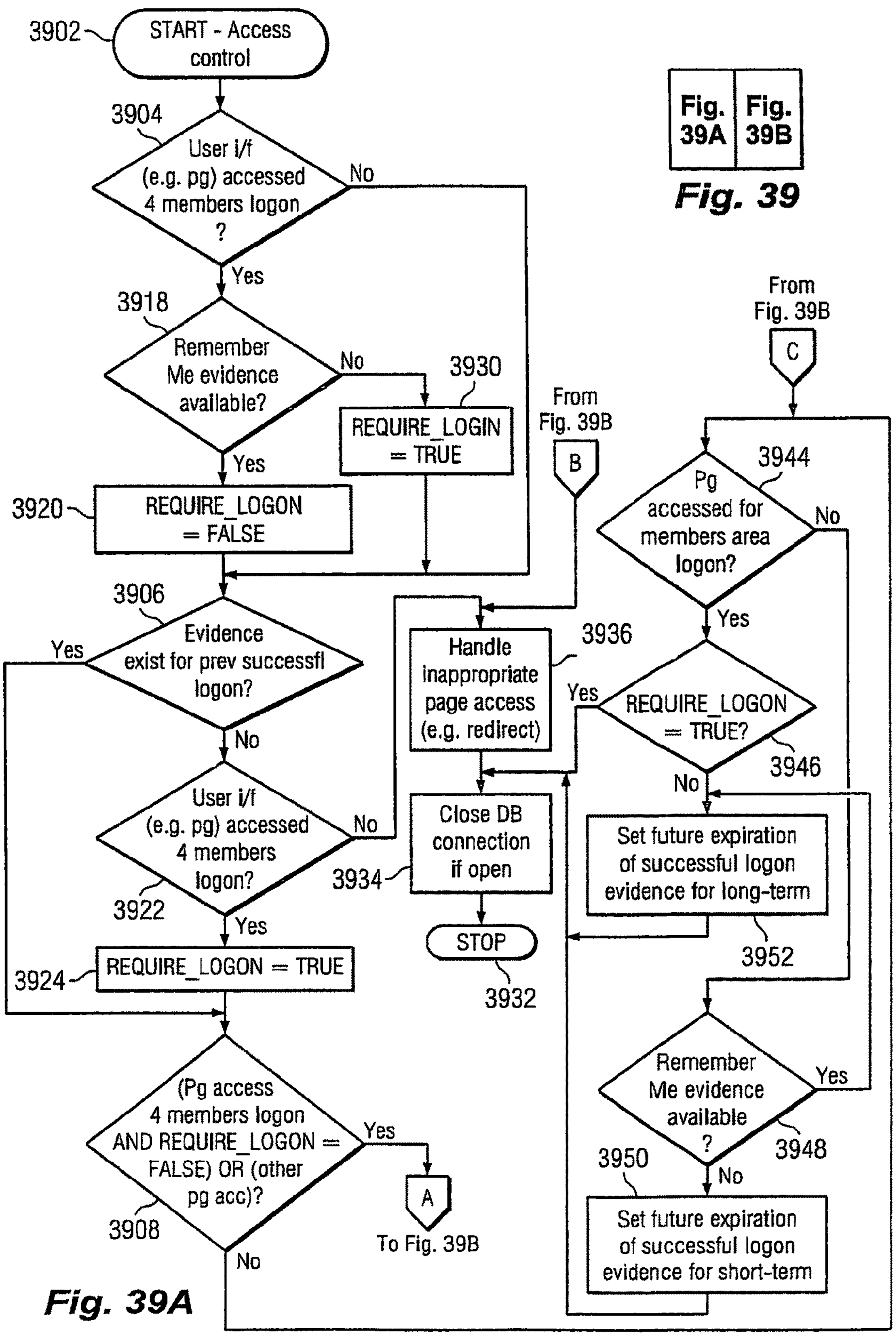
FIG. 39 depicts a flowchart for a preferred embodiment of the security access control processing aspects of the web service.
Figure 39B:
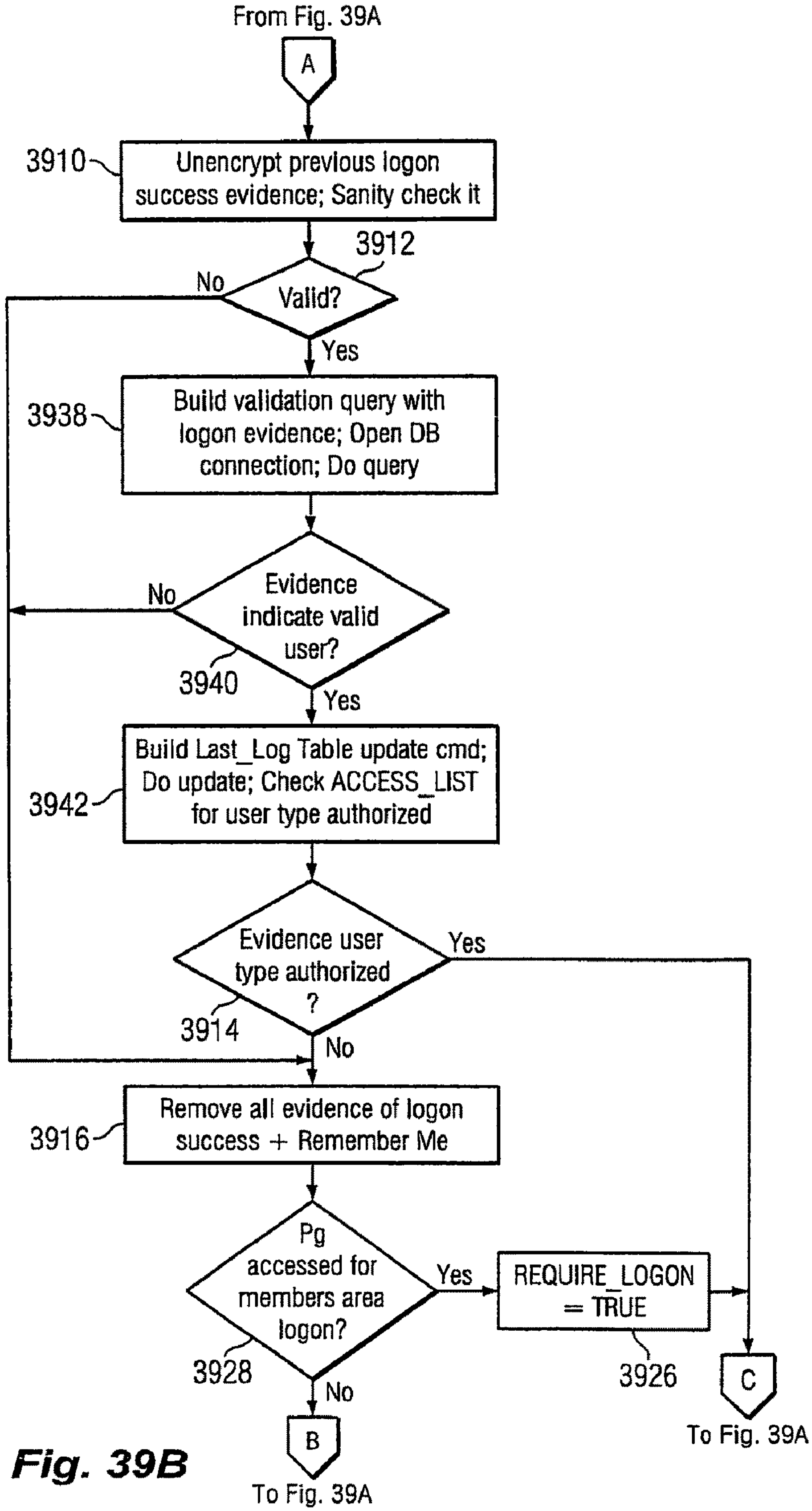

FIG. 30 depicts a preferred embodiment of a data record in the Users Table used to carry out registration/membership functionality. The PersonID 3002 is preferably a foreign key for cascade delete to the PersonID 2902 of the People Table. The LogonName field 3004 contains a user's logon identifier for access to the members area 2500. LogonName field 3004 is often referred to as the user name, and therefore should have a unique key or constraint defined to ensure uniqueness in web service 2102. The PW field 3006 contains the user's password for access to the members area 2500. The ActiveUser field 3008 enables (Set to Yes) or disables (Set to No) the Users Table record 3000 without deleting it from the table. Inactive treats the record as though it does not exist in the table. Various embodiments of inserts will insert active records on creation, or may require a human administrator to activate it after being created. FIG. 39 Access Control processing accesses only active records. Inactivating a record immediately prevents it from being a valid user account. The RegMsg field 3010 corresponds to data entered to form field 2710. ChgrIP field 3012 preferably contains an internet protocol (ip) address of the user's device that last modified the applicable data record 3000. The ChgrHIP field 3014 preferably contains the ip address of the actual physical server of web service 2102 that handled the last modification of applicable data record 3000. The ChgrHName field 3016 preferably contains the host name of the physical server of web service 2102 that last modified the applicable data record 3000, for example because web service 2102 may be a large cluster of physical servers. The ChgrID 3018 preferably contains the PersonID value of the People Table data record 2900 that last modified the applicable data record 3000. MaxDevs field 3020 contains the maximum number of devices this user can create (default=0). MaxDCDB field 3022 contains the maximum number of DCDB items this user can create (default=0). Fields 3020 and 3022 are set according to user types and/or contractually agreed upon limitations. For example, a Site Owner user type has full web service capability so these values could each be −1 to indicate an infinite maximum. An Administrator user type may have a −1 for MaxDevs field 3020 and a 0 for MaxDCDB field 3022. A Content Provider user type may have a 0 for MaxDevs field 3020 and a −1 for MaxDCDB field 3022. A Pinger user type may have a 3 or a 1 for MaxDevs field 3020 and a 0 for MaxDCDB field 3022. A Content Provider Gold user type may have a 0 for MaxDevs field 3020 and a 1 for MaxDCDB field 3022. Any user types can automatically be set with constraining limits, or the Users Table of Users data 2526 can be edited to set desired limits based on contractual obligations. Depending on the embodiment, MaxDevs field 3020 and MaxDCDB field 3022 may be exposed for edit in various interfaces and under various circumstances. Res1 field 3024 and Res2 field 3026 are provided as convenient reserved future use fields.

Figure 31:
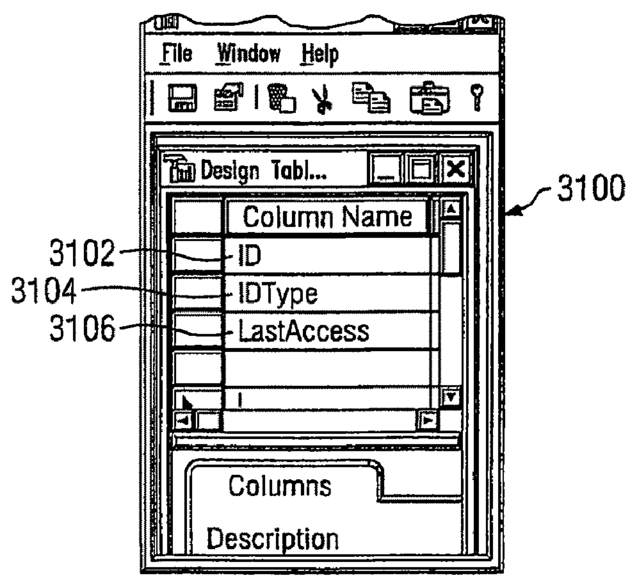
FIG. 31 depicts a preferred embodiment of a data record in the LastLog Table used to facilitate automatic account data deletion functionality.

FIG. 31 depicts a preferred embodiment of a data record in the LastLog Table used to facilitate automatic account data deletion functionality. A LastLog Table data record 3100 contains an ID 3102, IDType field 3104, and LastAccess field 3106. ID 3102 may contain a PersonID 2902 value, or a RegistryID 6502 value. IDType field 3104 contains an indicator of which type of id is contained in the ID 3102 (unique record identifier to People Table or Registry Table). LastAccess field 3106 contains a date/time stamp of when the user described by the People Table PersonID last accessed the members area 2500, or contains a date/time stamp of when the device described by the Registry Table RegistryID last accessed the Delivery Manager 2510. This depends on how to interpret the data record 3100 according to IDType field 3104. On initial insert, the date/time stamp reflects when the record was created. Another embodiment to the LastLog Table is to maintain two tables, one for user accounts and one for devices. Each table would have the same columns as record 3100 except no IDType field 3104 would be required (i.e. 2 columns each table).

Figure 32A:
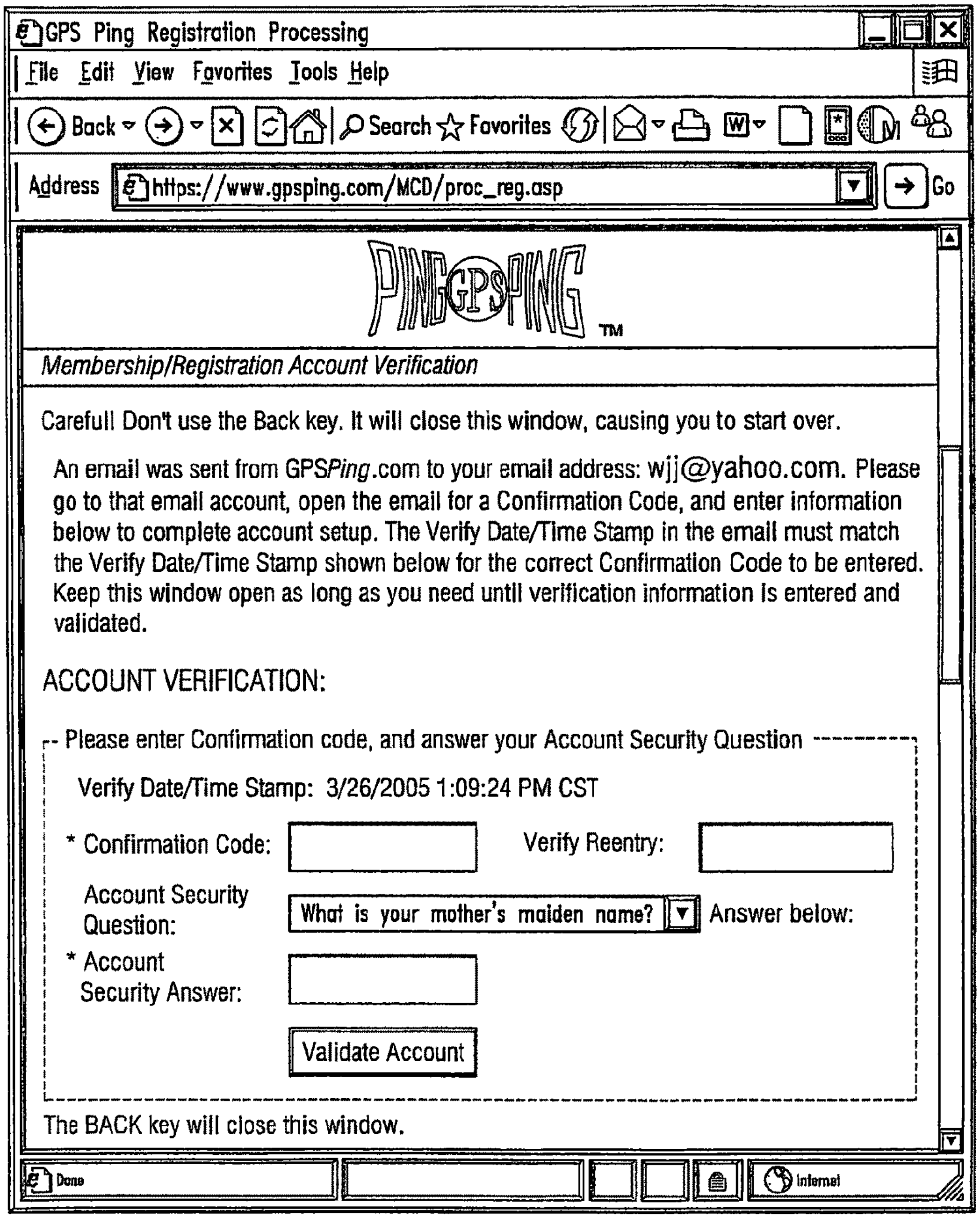
FIG. 32A depicts a preferred embodiment screenshot for the registration/membership account verification of the web service.

FIG. 32A depicts a preferred embodiment screenshot for the registration/membership account verification of the web service as described above. The "Verify Date/Time Stamp" provides correlation to an automated email sent to the registrant's email address in case multiple registration attempts were made by the same user. The "Confirmation Code" is entered twice for validation prior to verification page processing. Remaining form fields have already been discussed and provide pre-submit processing validation. The "Validate Account" button submits the form for processing after validating fields entered to make sure they are good form for processing (e.g. non-null confirmation code fields that match, and preferably the correct account security information).

Figure 32B:
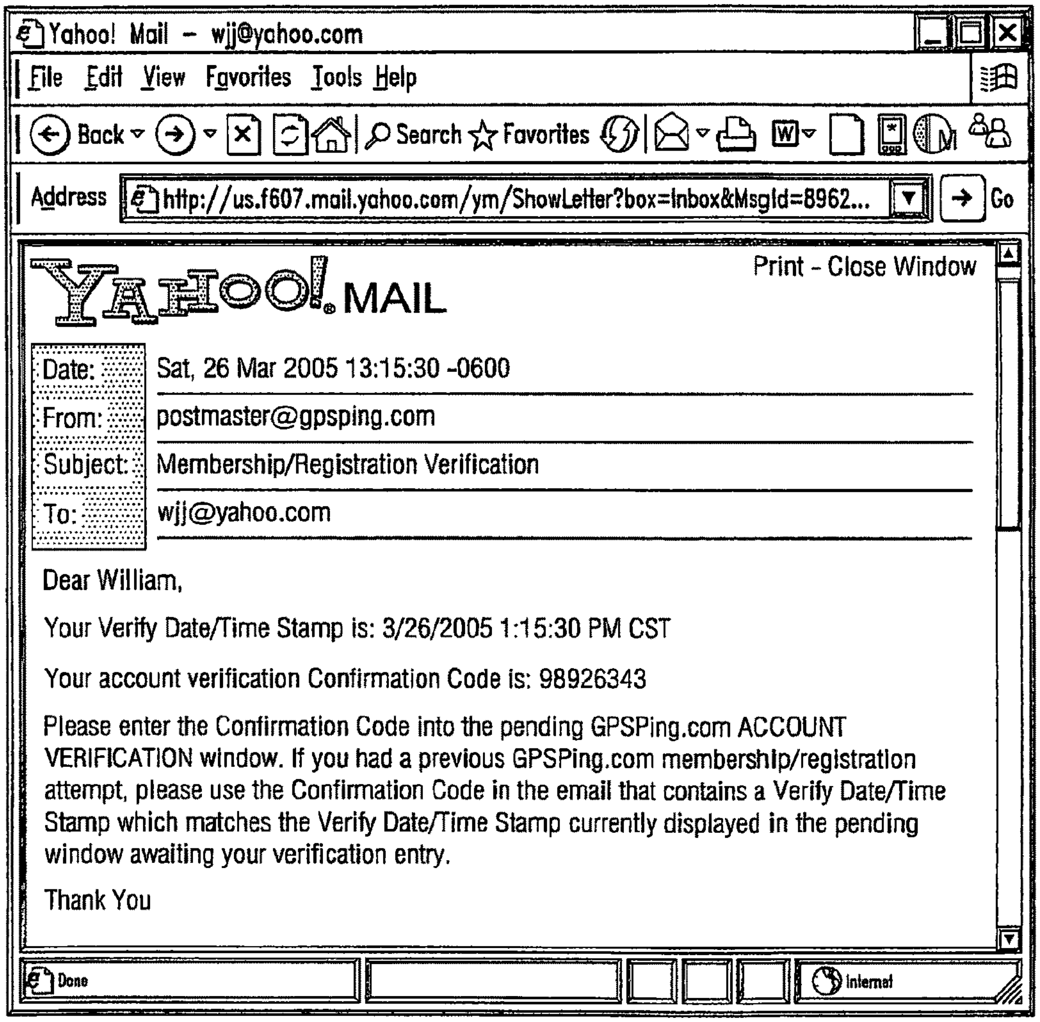
FIG. 32B depicts a preferred embodiment screenshot for the registration/membership account verification automated email of the web service.

FIG. 32B depicts a preferred embodiment screenshot for the registration/membership account verification automated email of the web service. The registrant receives the automated email, ensures the Verify Date/Time stamp in the email matches the Verify Date/Time Stamp of the FIG. 32A registration verification interface, and enters the randomly generated email Confirmation Code into the FIG. 32A registration verification interface for validation processing.

Figure 33:
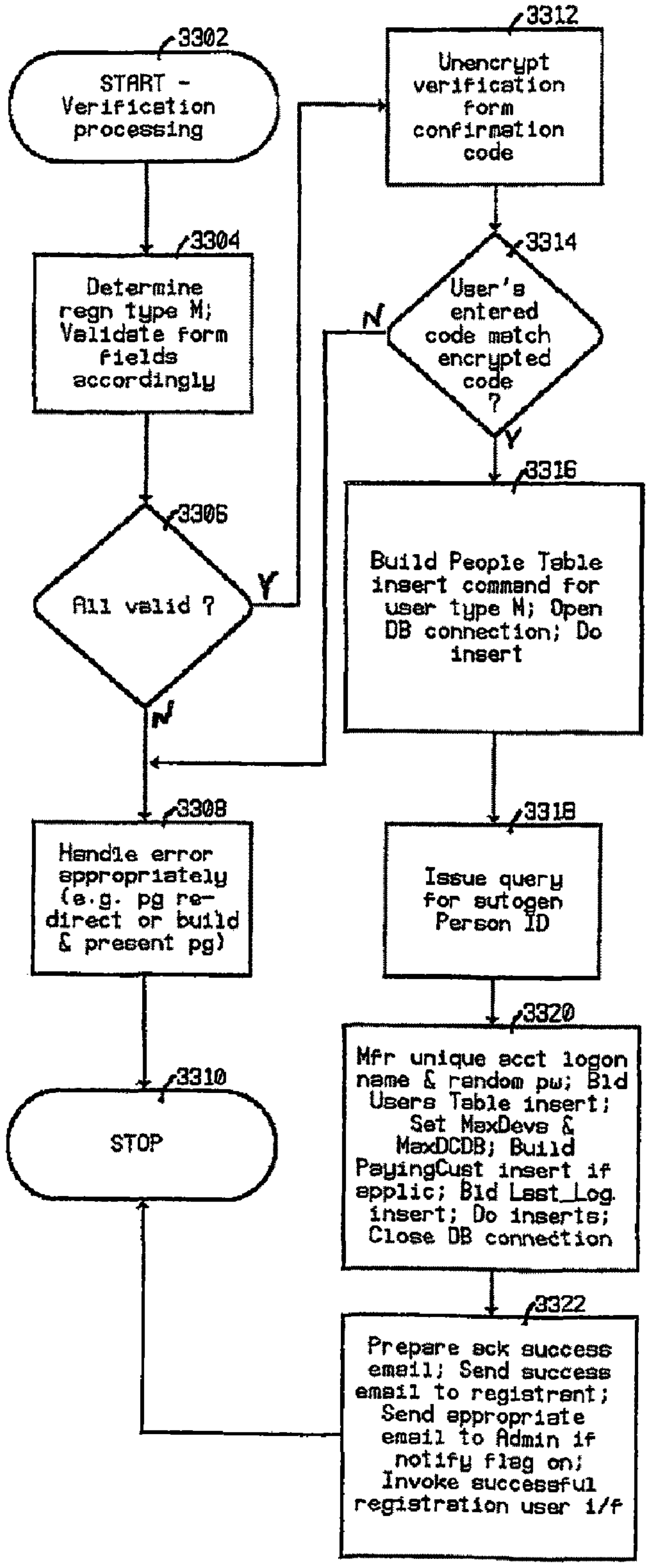
FIG. 33 depicts a flowchart for a preferred embodiment of the automated user registration/membership account verification processing resulting from user interaction to the registration/membership account verification user interface and submittal therefrom.

FIG. 33 depicts a flowchart for a preferred embodiment of the automated user registration/membership account verification processing resulting from user interaction to the registration/membership account verification user interface of FIG. 32A and submittal therefrom. Processing begins at block 3302 and continues to block 3304 where the user registration type M is determined as passed from registration processing. Block 3304 also validates all data evidence passed, for example form fields. Thereafter, block 3306 checks for user interface field validity. If all fields specified are not valid, then processing continues to block 3308 where the error is handled properly and processing terminates at block 3310. Preferably the account security questions and account security answer were validated just prior to being submitted by FIG. 32A processing, but those are re-validated for a sanity check, and to handle an attacker properly.

If block 3306 determines that all fields specified in FIG. 32A are valid, then block 3312 accesses and un-encrypts the data evidence confirmation code and block 3314 checks if the code entered matches the data evidence of the encrypted confirmation code. If block 3314 determines the user did not enter a matching confirmation code, then processing continues to block 3308. Block 3308 preferably enforces a maximum number of unsuccessful attempts before denying further processing by the user's device or browser. If block 3314 determines the user entered a matching confirmation code, then block 3316 builds an insert command, from data evidence passed at block 2844, to insert data into Users data 2526 in the form of a People table record such as FIG. 29, opens a database connection, and does the insert. Data evidence is further used for other inserts as discussed below. Block 3318 issues a query for an automatically generated primary key PersonID 2902 upon SQL insert. Thereafter, block 3320 constructs a default unique account logon name and random password, builds an insert command to insert data into Users data 2526 in the form of a Users table record 3000, and specifies the foreign key of PersonID 3002 to associate the records between tables and facilitate an SQL cascade delete. PersonID 2902 is identical to PersonID 3002. Block 3320 sets fields 3020 and 3022 according to the user type. Thereafter, block 3320 inserts to the Users table, builds an insert command to insert data into Users data 2526 in the form of a LastLog table record such as FIG. 31, does the insert to the LastLog table, builds an insert command to insert data into Users data 2526 in the form of a PayingCust table record such as FIG. 34 if this is for a paying customer and does the insert to the PayingCust Table, and closes the database connection. Thereafter, block 3322 prepares an acknowledgement email for registration success (such as FIG. 35B), sends it to the "Email Address" field specification of the registration/membership form (passed as data evidence), and additionally sends a Notify email to an Administrator email account if a site configuration indicates to do so for documentary purposes. Thereafter, block 3322 presents a successful registration completion page to the user, for example FIG. 35A, and processing terminates at block 3310.

Figure 34:
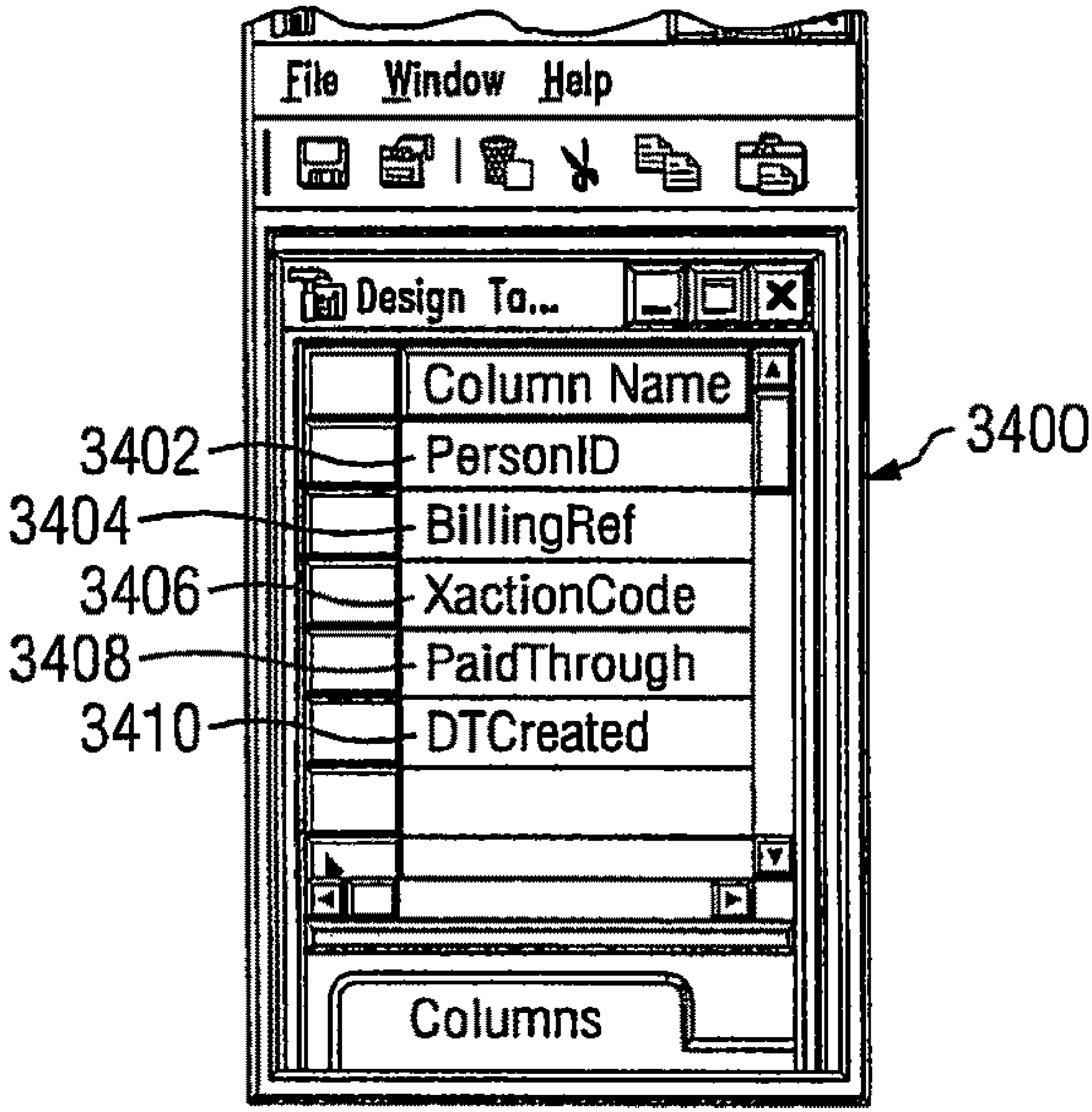
FIG. 34 depicts a preferred embodiment of a data record in the PayingCust Table used to carry out functionality for web service paying registrants/members.
Figure 35A:
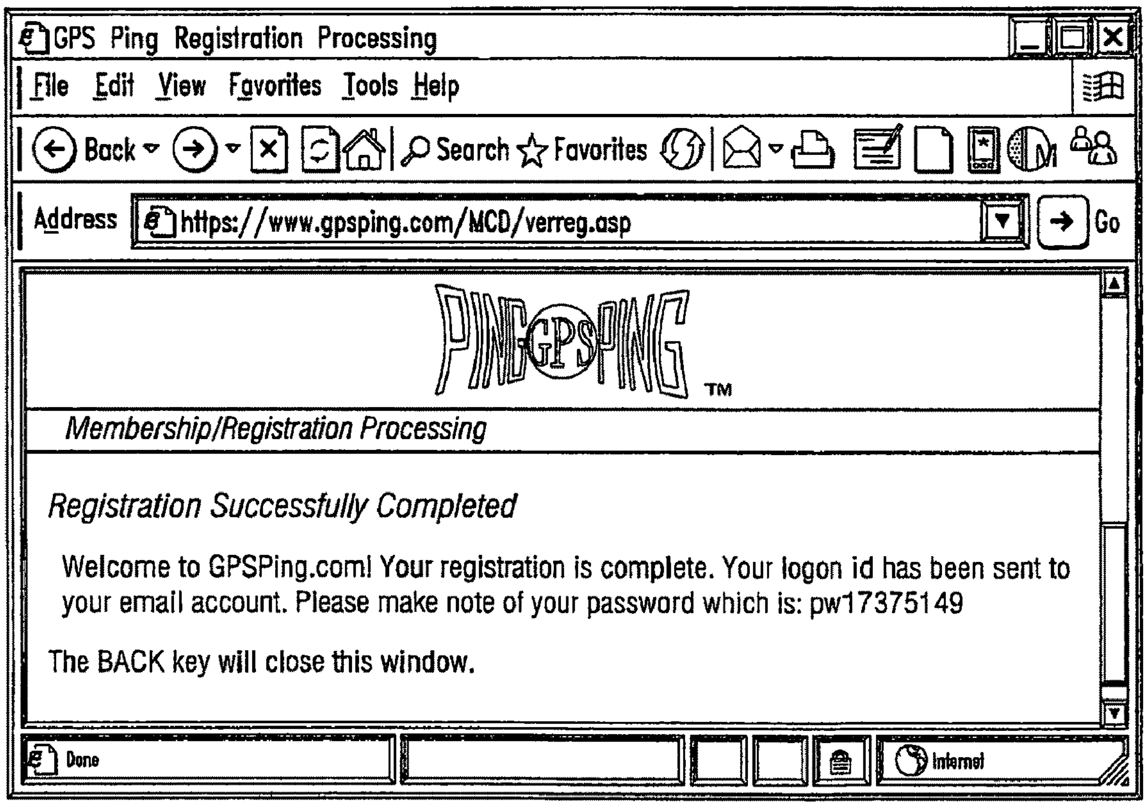
FIG. 35A depicts a preferred embodiment screenshot for the account registration/membership completion success of the web service.

FIG. 34 depicts a preferred embodiment of a data record in the PayingCust Table used to carry out functionality for web service paying registrants/members. A PayingCust data record 3400 contains data associated with paying customers of the members area 2500, for example those that are automatically registered, and interface to automated billing. The PersonID 3402 is preferably a foreign key for cascade delete to the PersonID 2902 of the People Table. PersonID 3402 is used to join the record to the associated People Table and Users Table records through PersonID fields 2902 and 3002, respectively. BillingRef field 3404 contains a unique reference to the user's billing account, for example a credit card type and number, billing account number, or accounting number used to do a transaction. The XactionCode field 3406 contains the confirmed transaction code as the result of a successful billing. The PaidThrough field 3408 contains a date/time stamp in the future of when the account is paid through. The DTCreated field 3410 contains the date/time stamp of when the data record 3400 was created (inserted) in the database. Fields 3404 through 3408 are passed as data evidence between registration processes until being inserted FIG. 35A depicts a preferred embodiment screenshot for the account registration/membership completion success of the web service. Preferably, only the automatically generated password is shown. The automatically generated logon name is sent in an email upon successful registration. For security reasons, it is best to not keep the logon name and password documented in the same place. Alternatively, the logon name could be presented to the FIG. 35A success window, and the password sent to the user in an email. All users can change their own logon name and/or password at any time in the members area 2500. The Site Owners user type can additionally change any other user's logon name and/or password.

Figure 35B:
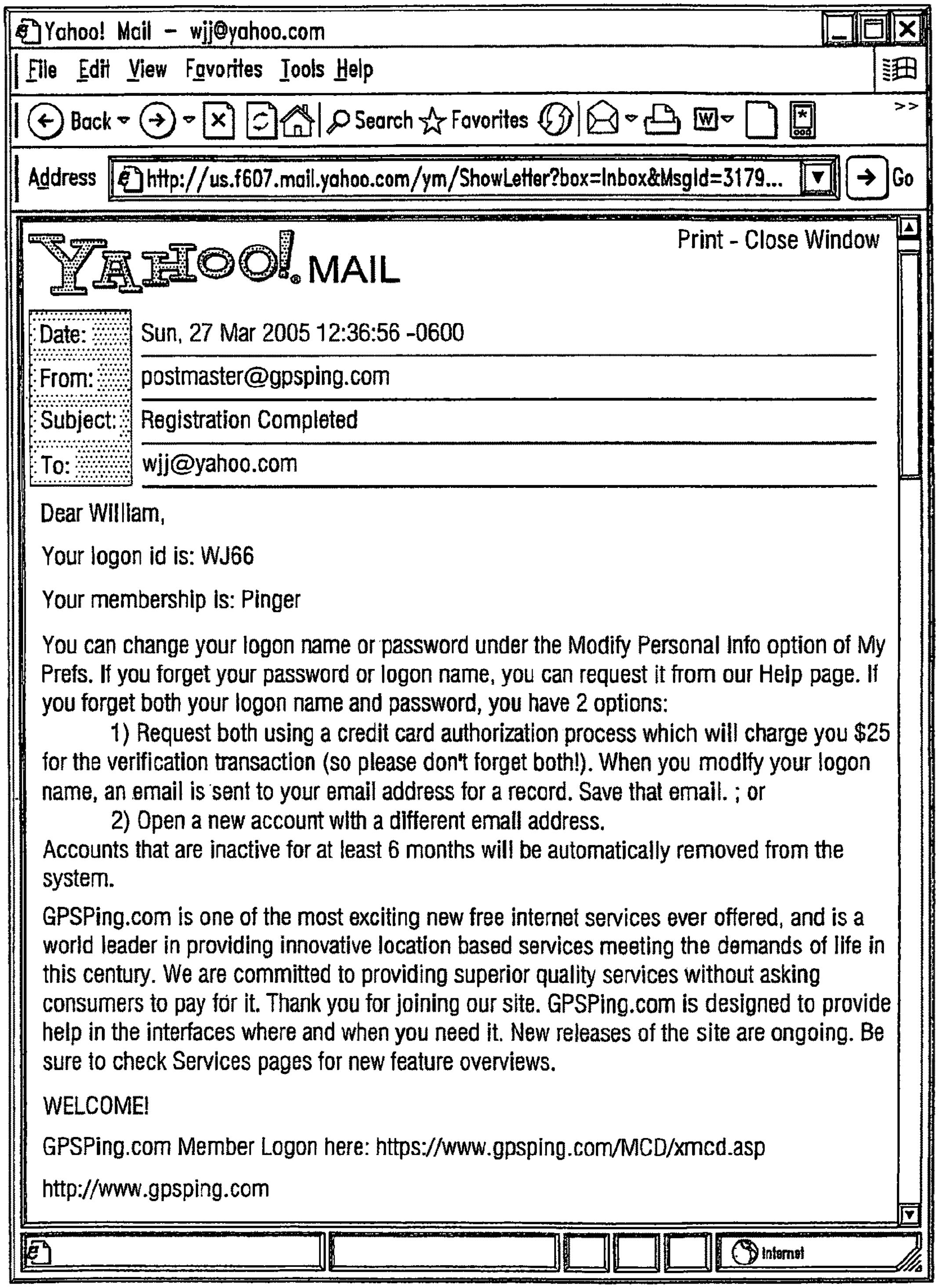
FIG. 35B depicts a preferred embodiment screenshot for the registration/membership account completion success automated email of the web service.

FIG. 35B depicts a preferred embodiment screenshot for the registration/membership account completion success automated email of the web service. This email is sent as described at FIG. 28 block 2820 and FIG. 33 block 3322.

FIG. 26 through 35B described fully automated registration and membership processing to web service 2101. Paying customers interface to an online credit card system for automated billing during the registration process. The billing system is interfaced by paying user types independently of web service 2102. However, web service 2102 has interfaces to the billing system for deactivating (payment missed) and re-activating (payment made) accounts. Additional automated billing interfaces are discussed below. Web service 2102 maintains a reasonable maximum number of supported users (and clarified by user types in a preferred embodiment) to web service 2102 based on a known current web service 2102 capability. When a user registration attempt is made which exceeds the number of supported users, automated processing takes place to increase support in web service 2102 and the attempting user is provided with an appropriate error. When the web service 2102 user support is scaled up, site maximums are updated to reflect the new number of maximum supported users for automated checking in subsequent registration attempts. There is a plurality of automated registration user interfaces supporting a plurality of user types to web service 2102. A Notify flag is provided for optionally and automatically documenting an alteration to server data 2104 with an email to an Administrator account. Depending on the embodiment, the Notify flag can be a plurality of distinct flags maintained in web service 2102 for documenting individual types of data alterations, there can be a plurality of Notify flags for various types of data alterations for documentary purposes, or there can be one Notify flag for all data alterations of interest for documentary purposes. All references to a Notify flag in this disclosure for the purpose of documenting an alteration to data can use any one of these embodiments.

Figure 36A:
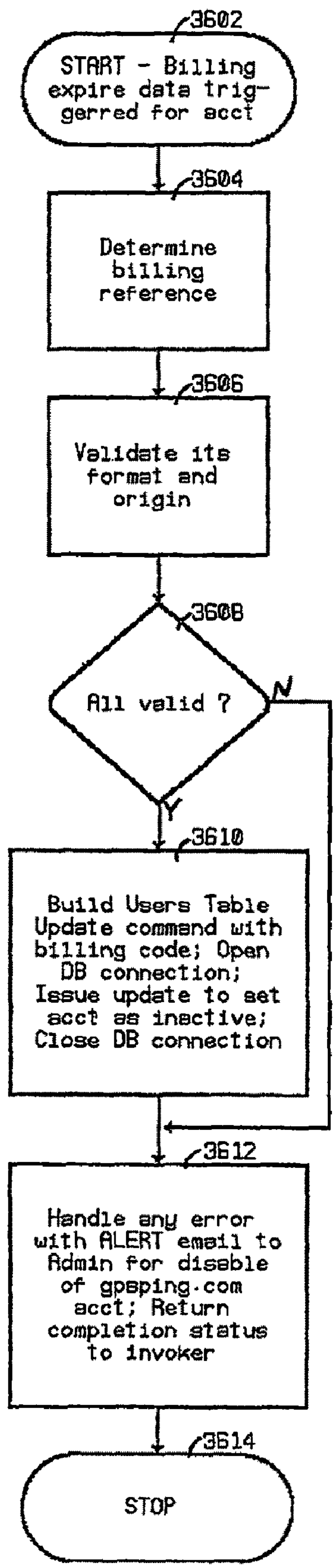
FIG. 36A depicts a flowchart for a preferred embodiment of the automated processing resulting from payment expiration of a paying registrant/member to the web service.

FIG. 36A depicts a flowchart for a preferred embodiment of the automated processing resulting from payment expiration of a paying registrant/member to the web service. Processing starts at block 3602 as the result of billing expiration triggered. Triggering is caused by a database trigger on PaidThrough field 3408 being earlier than a current date/time, a chron job that polls PaidThrough fields 3408 on a scheduled basis, an external process causing the execution of FIG. 36A, or the like. Thereafter, block 3604 determines data evidence for the billing reference (i.e. BillingRef field 3404), block 3606 validates the format and origin in the data evidence, and block 3608 checks if valid. If block 3608 determines that the data evidence is valid, then block 3610 builds an update command to set the associated user account to inactive, opens a database connection, does the update, and closes the database connection. The update command modifies ActiveUser field 3008 to be set for inactive where the BillingRef field 3404 matches the data evidence passed to FIG. 36A processing. The PersonID fields 3002 and 3402 are used to join the appropriate records for the update. Thereafter, block 3612 handles any database I/O errors (if one occurs) with an email alert to an Administrator account for reconciliation. Preferably, the Administrator account includes an automated process monitoring incoming email to act upon. Block 3612 also returns a completion status to the invoking process of FIG. 36A and processing terminates at block 3614. If block 3608 determines the billing reference data evidence to be invalid, then processing continues directly to block 3612 for appropriate error handling, and Administrator account notification to at least document the invalid invocation of FIG. 36A processing.

Figure 36B:
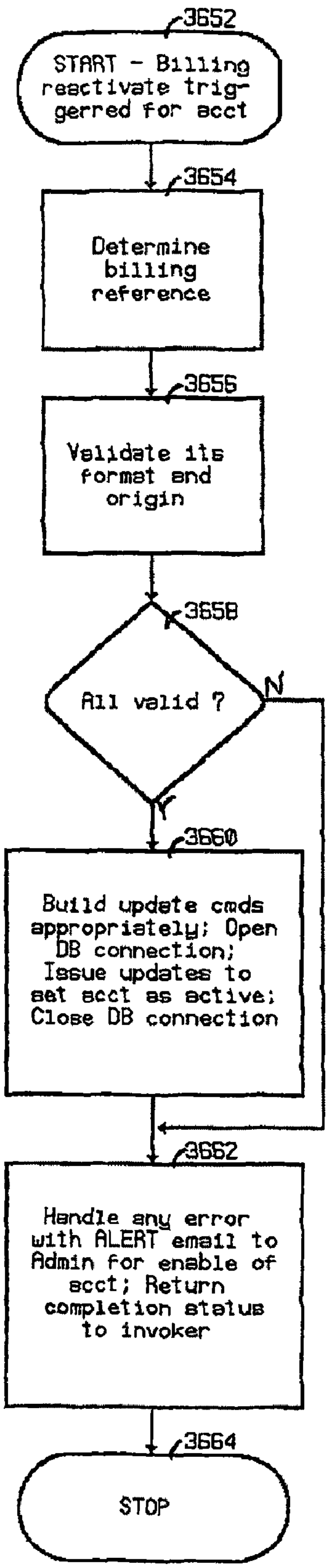
FIG. 36B depicts a flowchart for a preferred embodiment of the automated processing resulting from payment reactivation of a paying registrant/member to the web service.

FIG. 36B depicts a flowchart for a preferred embodiment of the automated processing resulting from payment reactivation of a paying registrant/member to the web service. Processing starts at block 3652 as the result of billing reactivation triggered. Triggering is caused by an external process causing the execution of FIG. 36B, preferably an automated process rather than a manual process, for example from a credit card billing system. Thereafter, block 3654 determines data evidence including the billing reference (i.e. BillingRef field 3404), block 3656 validates the format and origin in the data evidence, and block 3658 checks if valid. Data evidence passed to FIG. 36 processing preferably includes the XactionCode field 3406 and PaidThrough field 3408 (if not already updated in record 3400 prior to invoking FIG. 36 processing). If block 3658 determines that all data evidence is valid, then block 3660 builds an update command to set the associated user account back to active and an update command to update fields 3406 and 3408 of the corresponding record 3400, opens a database connection, does the updates, and closes the database connection. The record 3000 update command modifies ActiveUser field 3008 to be set for active where the BillingRef field 3404 matches the data evidence passed to FIG. 36B processing. The PersonID fields 3002 and 3402 are used to join the appropriate records for the update. The record 3400 update command modifies with data evidence XactionCode field 3406 and PaidThrough field 3408 where the BillingRef field 3404 matches data evidence passed to FIG. 36B processing (assuming not already updated by external processing). Thereafter, block 3662 handles any database I/O errors (if one occurs) with an email alert to an Administrator account for reconciliation. Block 3662 also returns a completion status to the invoking process of FIG. 36B and processing terminates at block 3664. If block 3658 determines the billing reference data evidence to be invalid, then processing continues directly to block 3662.

It is possible that the record is not found for being updated at blocks 3610 and 3660 since web service 2102 is fully automated and user account records may have been automatically deleted because of inactivity for a site configured length of time (account expiration time). These not found errors preferably do not cause error processing in blocks 3612 and 3662. Not found errors are preferably ignored. Data evidence may be passed in encrypted form to FIGS. 36A and/or 36B in which case the FIGS. 36A and/or 36B processing is responsible for unencrypting (e.g. assuming not an https connection already).

Figure 37A:
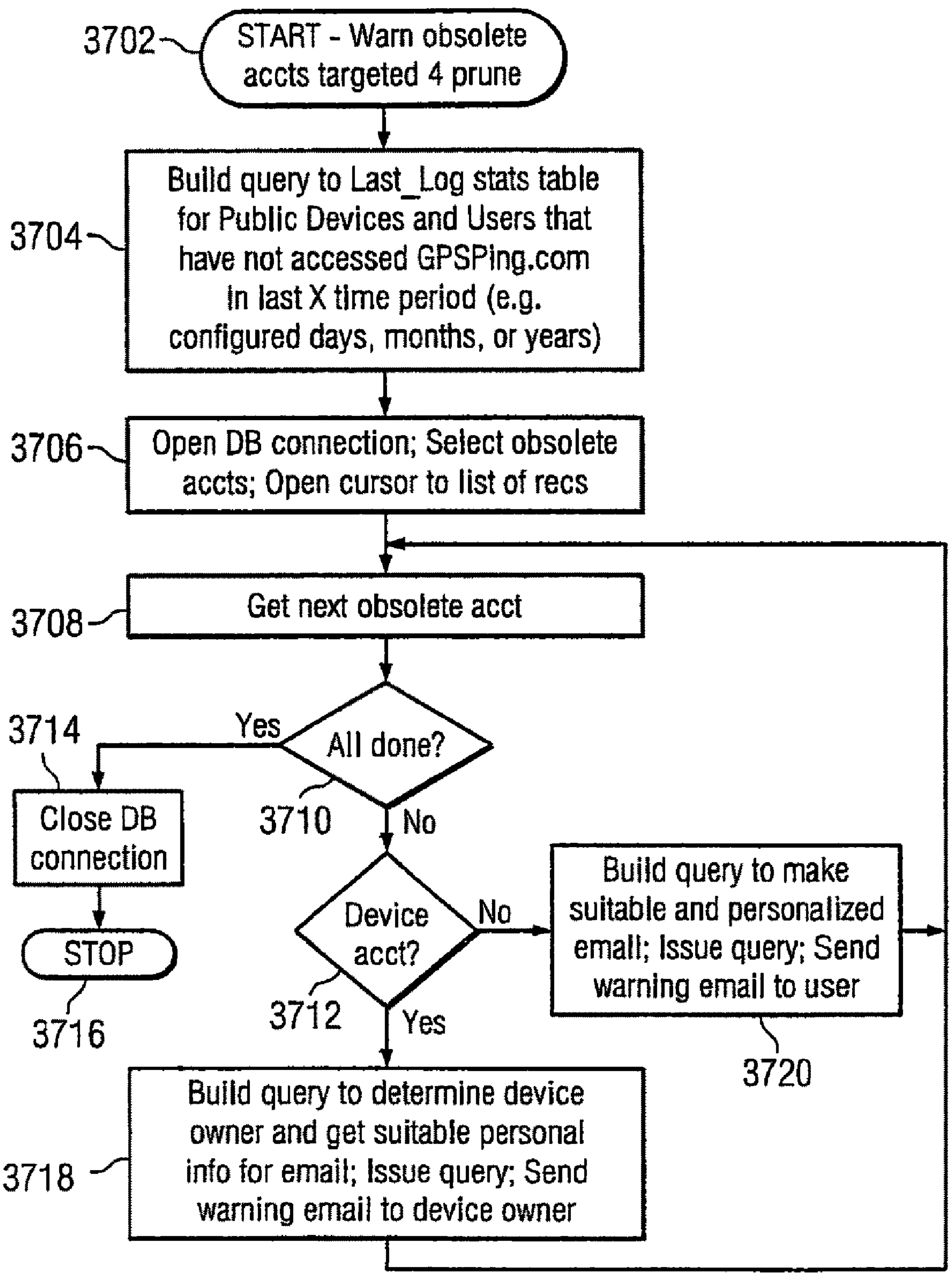
FIG. 37A depicts a flowchart for a preferred embodiment of the automated processing for warning obsolete registrant/member accounts in the web service that they are identified for automated deletion.

FIG. 37A depicts a flowchart for a preferred embodiment of the automated processing for warning obsolete registrant/member accounts in the web service that they are identified, or have devices identified, for automated deletion. Processing starts at block 3702 and continues to block 3704. Block 3702 is preferably initiated with a periodically scheduled job (e.g. chron job), or in an ASP that is consistently accessed without affecting user experience performance. Block 3704 builds a query to the FIG. 31 LastLog Table records 3100 for selecting all records which contain a LastAccess field 3106 being reasonably old in accordance with the current date/time and a website expiration configuration (e.g. site expiration for user account and devices of 6 months minus a reasonable warning lead time). LastAccess field 3106 always reflects when a user last entered the members area 2500 when the IDType field is for the People Table. LastAccess field 3106 always reflects when a user's device last accessed the Delivery Manager 2510 when the IDType field 3104 is for the Registry Table. Thereafter, block 3706 opens a database (DB) connection, selects the potentially obsolete LastLog records and opens a cursor into the resulting list of records.

Thereafter, block 3708 gets the next LastLog record with the cursor and continues to block 3710. Block 3710 determines if all records were already processed (or if there were none to process to start with). If there is a next record to process, block 3712 checks the LastLog record IDType field 3104 to see if it is for a User account or a device. If block 3712 determines the LastLog record is for a device, then block 3718 builds a query to the FIG. 65 Registry Table records 6500 (discussed below) using ID 3102 for selecting the Registry Table record containing the matching unique RegistryID 6502, and joining Owner field 6522 with People Table PersonID 2902 to select the device owner's account information, specifically the owner's email address. Thereafter, block 3718 does the query for also selecting enough information to create a friendly warning email (e.g. First name, last name, etc), creates the warning email, and sends it to the owner's email address. Processing then flows back to block 3708.

If block 3712 determines the LastLog record is for a user account, then block 3720 builds a query to the FIG. 29 People Table records 2900 using ID 3102 for selecting a record containing the unique PersonID 2902 to return the user account information, specifically the user's email address. Thereafter, block 3720 does the query for also selecting enough information to create a friendly warning email (e.g. First name, last name, etc), creates the warning email, and sends it to the owner's email address from the People Table. Processing then flows back to block 3708.

If block 3710 determines there are no records remaining to process, then block 3714 closes the DB connection and processing terminates at block 3716. Thus, obsolete devices or user accounts are automatically warned for being removed from the system to keep web service 2102 and members area 2500 fully automated without maintaining unnecessary server data 2104. Another embodiment to FIG. 37A is to process user accounts and devices individually and/or with different site configuration expirations for each. The warning email tells the user how to keep the user account or device active, for example, do a members area logon or access the Delivery Manager. The email preferably also includes how much time the user has remaining to do the access.

Figure 37B:
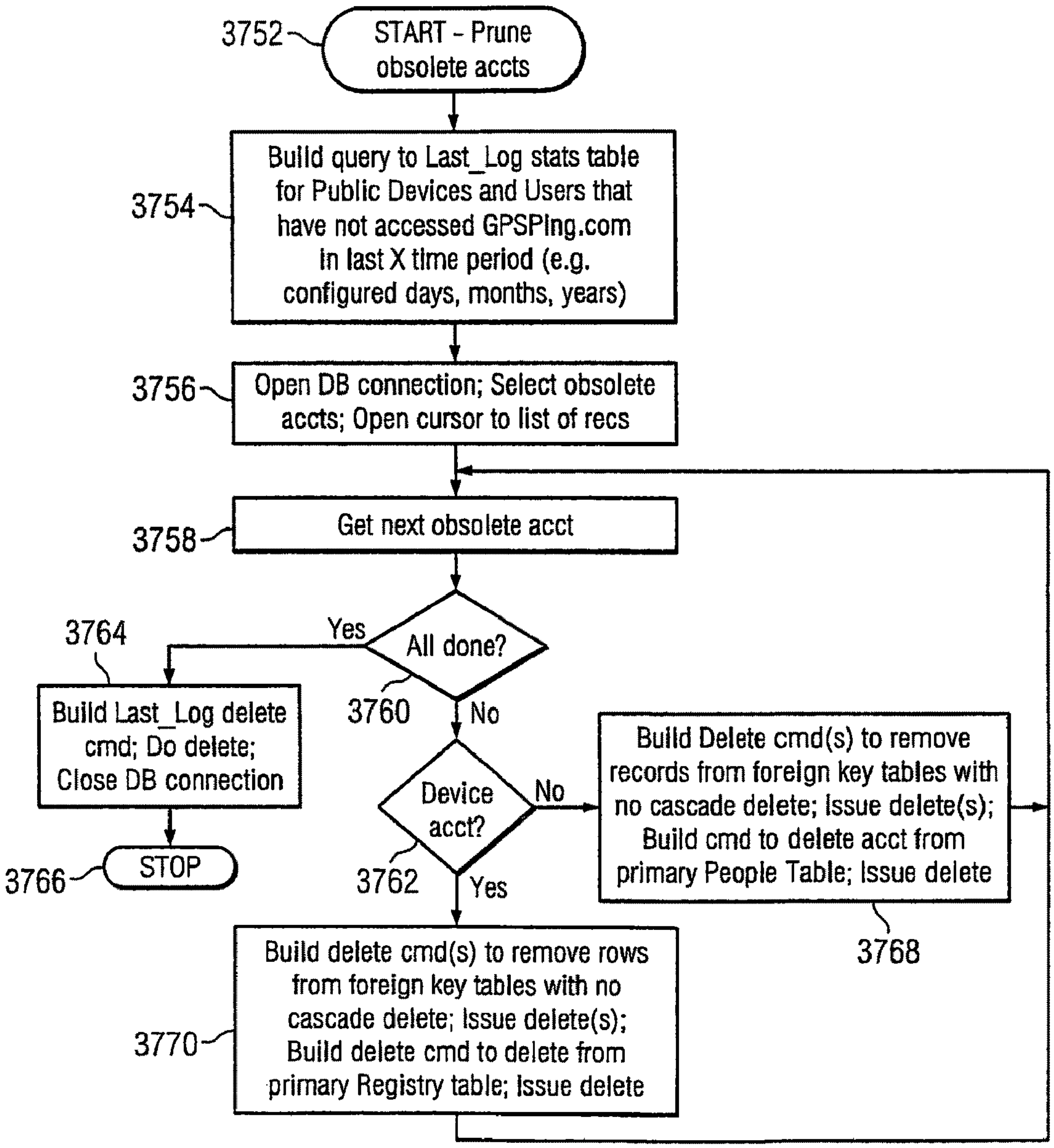
FIG. 37B depicts a flowchart for a preferred embodiment of the automated processing for deletion of obsolete registrant/member accounts in the web service.

FIG. 37B depicts a flowchart for a preferred embodiment of the automated processing for deletion of obsolete registrant/member accounts in the web service. Processing starts at block 3752 and continues to block 3754. Block 3752 is preferably initiated with a periodically scheduled job (e.g. chron job), or in an ASP that is consistently accessed without affecting user experience performance. Block 3754 builds a query to the FIG. 31 LastLog Table records 3100 for selecting all records which contain a LastAccess field 3106 being too old in accordance with the current date/time and an absolute website expiration configuration (e.g. site expiration for user account and devices of 6 months). LastAccess field 3106 always reflects when a user last entered the members area 2500 when the IDType field is for the People Table. LastAccess field 3106 always reflects when a user's device last accessed the Delivery Manager 2510 when the IDType field 3104 is for the Registry Table. Thereafter, block 3756 opens a database (DB) connection, selects the potentially obsolete LastLog records and opens a cursor into the resulting list of records.

Thereafter, block 3758 gets the next LastLog record with the cursor and continues to block 3760. Block 3760 determines if all records were already processed (or if there were none to process to start with). If there is a next record to process, block 3762 checks the LastLog record IDType field 3104 to see if it is for a User account or a device. If block 3762 determines the LastLog record is for a device, then block 3770 builds a delete command for issue to the FIG. 65 Registry Table (discussed below) records 6500 using ID 3102 for specifying the Registry Table record containing the matching unique RegistryID 6502. Thereafter, block 3770 does the delete command for removing the device from server data 2104. Block 3770 will also delete any device associated records (prior to deleting the Registry Table record) in other tables that do not have a foreign key relationship to the Registry table (e.g. on RegistryID 6502) for automatic cascade delete. Processing then flows back to block 3758.

If block 3762 determines the LastLog record is for a user account, then block 3768 builds a delete command to the FIG. 29 People Table records 2900 using ID 3102 for specifying the record containing the unique PersonID 2902. Thereafter, block 3768 does the delete for removing the user from server data 2104. Block 3768 will also delete any user associated records (prior to deleting the People Table record) in other tables that do not have a foreign key relationship to the People table (e.g. on PersonID 2902) for automatic cascade delete. Processing then flows back to block 3758.

If block 3760 determines there are no records remaining to process, then block 3764 deletes all the LastLog records processed by FIG. 37B and then closes the DB connection. Processing then terminates at block 3766. Block 3764 preferably builds a delete command with a where clause that selected records at block 3756. Thus, obsolete devices or user accounts are automatically removed from the system to keep web service 2102 and members area 2500 fully automated without maintaining unnecessary server data 2104. Another embodiment to FIG. 37B is to process user accounts and devices individually and/or with different site configuration expirations for each user or user type.

Figure 38A:
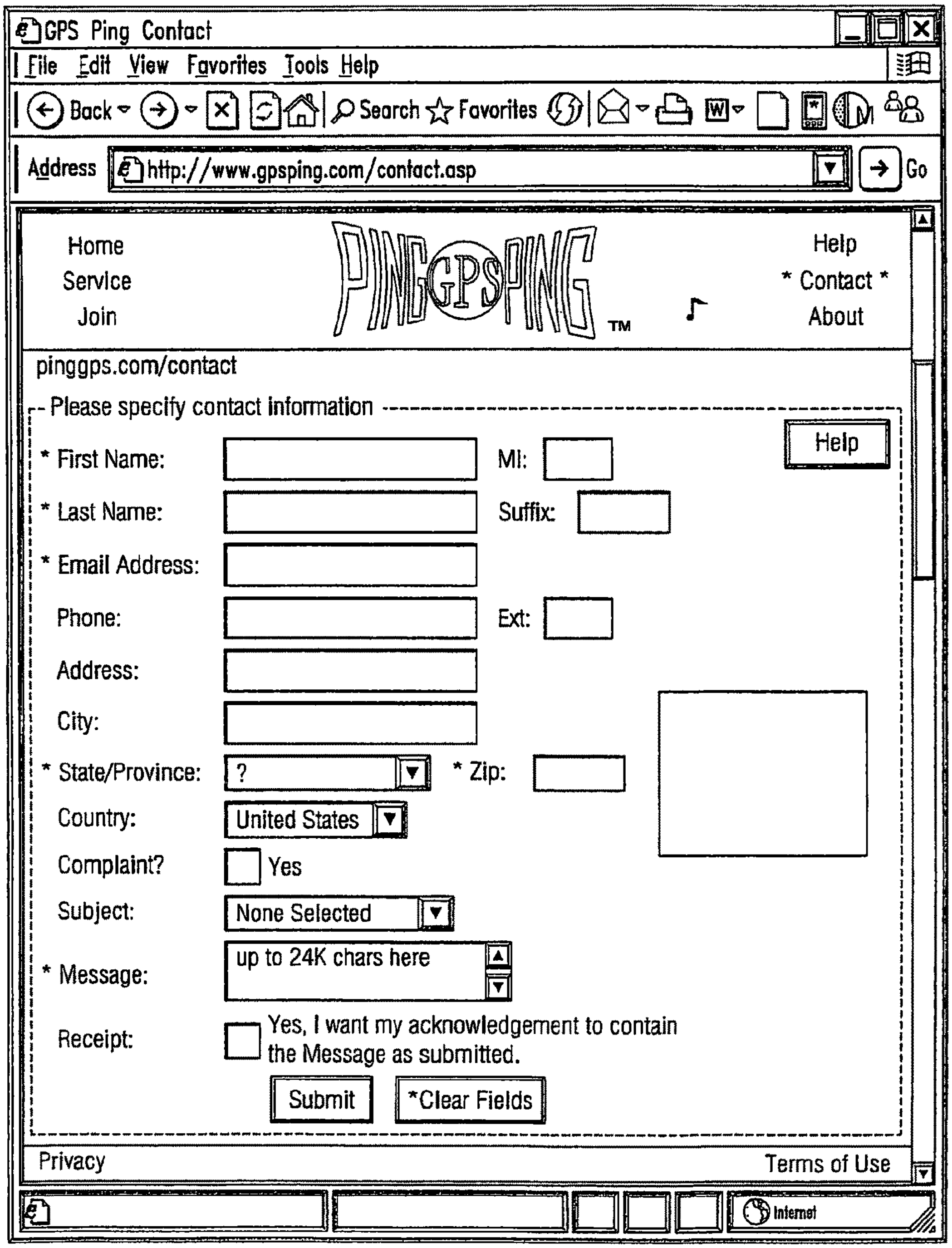
FIG. 38A depicts a preferred embodiment screenshot for the web service personnel contact aspect of the web service.

FIG. 38A depicts a preferred embodiment screenshot for the web service personnel contact aspect of the web service. The contact option is a convenience and need not be provided as an option to the fully automated web service 2102 as disclosed. The reader can examine the drawing for obvious understanding of the processing involved.

Figure 38B:
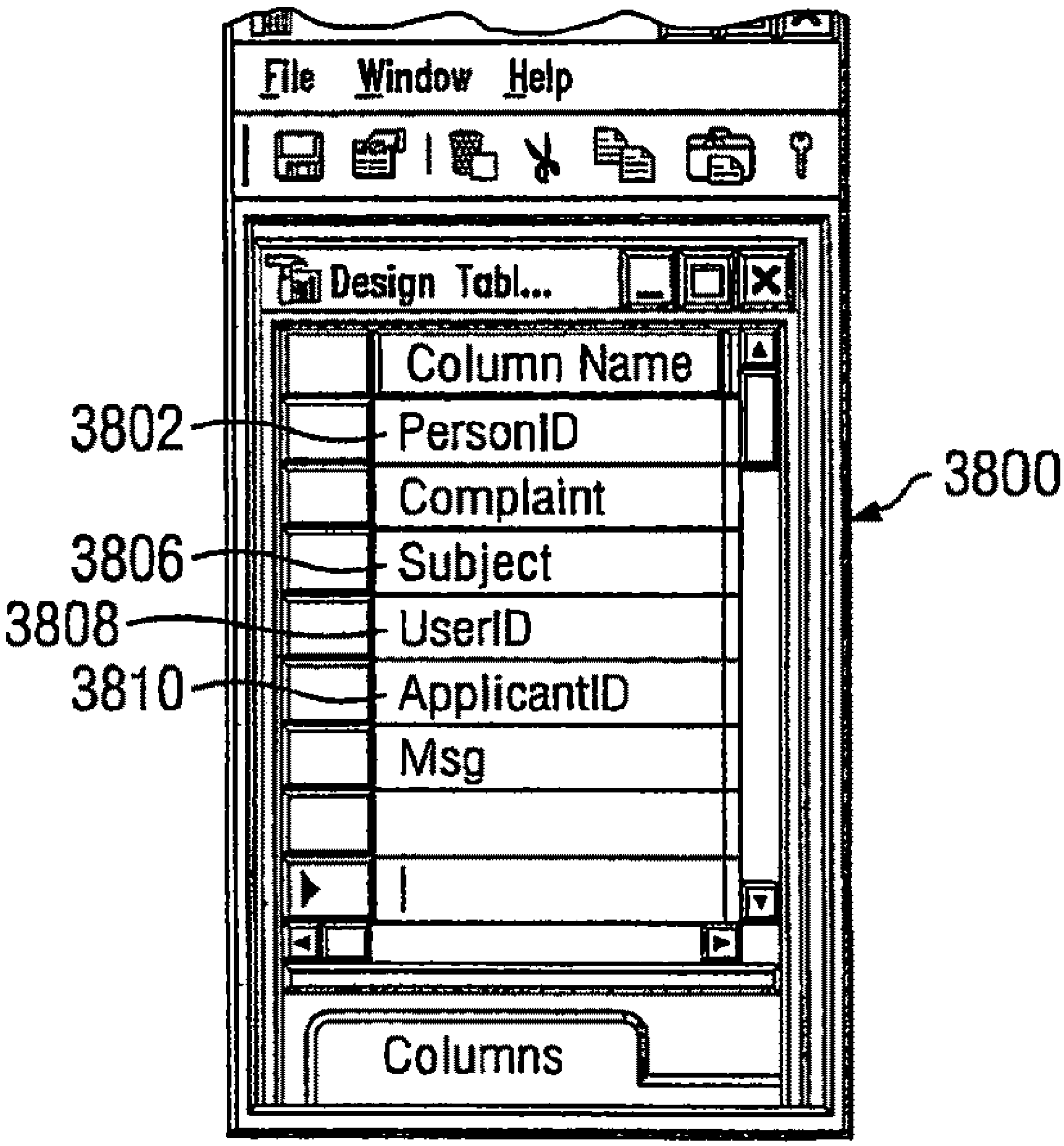
FIG. 38B depicts a preferred embodiment of a data record in the Contact Table used to carry out functionality for users who contact web service personnel through the web service.

FIG. 38B depicts a preferred embodiment of a data record in the Contact Table used to carry out functionality for users who contact web service personnel through the web service contact option. Contact Table data record 3800 contains fields as determined when comparing to FIG. 38A (i.e. Complaint, Msg). On submittal, a record is first inserted into the People Table (record 2900) with obvious fields specified in FIG. 38A. Then, a record 3800 is inserted into the Contact Table with a foreign key relationship between PersonID 2902 and PersonID 3802 for cascade delete. The TableTo field 2904 is set for associating the Contact Table record. Subject field 3806 contains an enumeration from the "Subject" dropdown selection made of FIG. 38A. UserID 3808 can contain a PersonID 2902 from other web service 2102 processing for associating the contact action with a user of the members area 2500. ApplicantID 3810 can contain a PersonID 2902 from other web service 2102 processing for associating the contact action with a user who has submitted an employment application to the company of web service 2102.

FIG. 39 depicts a flowchart for a preferred embodiment of the security access control processing aspects of the web service. Every user interface (e.g. pages) of the members area 2500 enforces security access control to prevent attacks and to reveal appropriate options by user type. There are also variables of the user accounts made available to each page that includes the access control processing. Each members area page preferably includes the list of different user types, which are permitted to access the particular page, defined ahead of the included access control processing. For example, in an ASP VBScript embodiment, each member area page would include an array:

```
...
ACCESS_LIST =
    array(ACCESS_SITEOWNER, ACCESS_ADMINISTRATOR,
    ACCESS_PINGER, ACCESS_DELEGATE,
    ACCESS_CONTENTPROVIDER, ACCESS_GOLD,
    ACCESS_PLATINUM, ACCESS_ENDUSER)
%>
<!--#include file="incl/mcdvusr.asp" -->
<%
...
```

such that each member in the array elaborates to a user type constant equivalent to values maintained in UserType field 2980. Then, the included access control page (e.g. mcdvusr.asp) uses the user type list to determine which user types can access the current page. The example above includes most user types, but any user type subset can be specified in the array depending upon which user types are permitted to access the current page.

Access Control processing starts at block 3902 and continues to block 3904 where the parent page (i.e. the including page with the VBScript example above) is checked for being a members logon page. The members logon page preferably includes a constant before including the Access Control page such as:

```
...
VALIDATE_PG_ACCESS = "LOGON"
...
```

That way FIG. 39 processing would know that the parent page is the members logon page for unique access control processing. If block 3904 determines this access control processing has been included in a members logon page (e.g. VALIDATE_PG_ACCESS variable set as above), then processing continues to block 3918 where Remember Me data evidence is sought. A user can optionally request to keep successful logon data evidence at logon time (FIGS. 42A through 42C fields 4202, 4232, and 4262) so another logon is not required in the future. The logon interface is automatically bypassed to go to presenting options as long as successful logon data evidence is found (i.e. Remember Me option checked). For example, a cookie with long term expiration can be maintained at the user's device logged on from.

If block 3918 determines that successful logon data evidence is found, then a variable for forcing a logon is set to FALSE at block 3920, otherwise block 3918 continues to block 3930 where the variable for forcing a logon is set to TRUE. Blocks 3920 and 3930 each continue to block 3906. If block 3904 determines the parent page is not for a member area 2500 logon page, then processing continues to block 3906. Block 3906 checks if successful logon data evidence is found since the page being accessed may not be a members area logon page. If block 3906 determines the successful logon data evidence is not found, then block 3922 checks to see if the access control including page is for members area logon processing. If block 3922 determines the page access is for members area logon processing, then the variable for forcing a logon is set to TRUE at block 3924 and processing continues to block 3908. If block 3922 determines the page being accessed is not a members area logon page (and there is no successful logon data evidence), then block 3936 handles the error appropriately, block 3934 closes any DB connection that may be open (not if arrived to by way of block 3922) and processing terminates at block 3932. Thus, if there is no data evidence showing a previous successful logon, and the page being accessed is not the members area logon, then the page is not permitted to be accessed. Error handling may redirect to an invalid page, or actually produce an error for the user to see. This way any URLs typed manually into a browser cannot access pages not permitted to be accessed. If block 3906 determines there is successful logon data evidence, then processing continues to block 3908. Block 3908 checks if this is a members area logon page access and that there was successful logon evidence found OR if this is an access to any other members area page. If either of these cases is true, then processing continues to block 3910 where logon data evidence is interrogated, otherwise processing continues to block 3944.

Block 3910 unencrypts the logon data evidence and sanity checks its format to make sure this is not an attack by a website attacker. Thereafter, block 3912 checks the findings. If block 3912 determines the successful logon data evidence is valid, then processing continues to block 3938 where a validation query is built using data from the successful logon data evidence. Block 3938 then opens a DB connection and preferably queries the People Table (records 2900) and Users Table (records 3000) with a join for an active user based on the logon data evidence (e.g. using the user id and password encrypted from a previous successful logon as found in the data evidence). There are many alternative embodiments for exactly what identifying data is kept in the successful logon data evidence for constructing the query to determine there is indeed such an active user. Regardless, there has to be enough unique information in the successful logon data evidence for uniquely identifying a user. Thereafter, if block 3940 determines the successful logon data evidence is valid for a user in the People/Users Table(s) (i.e. found the record), then block 3942 builds a LastLog Table update command for this user and does the update with the current date/time for LastAccess field 3106. This ensures the LastLog Table always reflects the last time a page was accessed in the members area by the user. Block 3942 also checks the ACCESS_LIST (e.g. VBScript array example above) for user types permitted to access the page with the UserType field 2980 in the record returned from the query. Thereafter, if block 3914 determines the logon data evidence contains a user type authorized to access the page, then processing continues to block 3944. If block 3914 determines the user type is not permitted to access the page, then block 3916 permanently removes all logon data evidence and Remember Me data evidence so it cannot be used again by the user for page accesses, because the user is trying to access a page not permitted to be accessed. Block 3916 continues to block 3928 where again it is determined if the including page is for a members area logon page. If block 3928 determines it is, then block 3926 sets the forced logon variable to TRUE and processing continues to block 3944. If block 3928 determines it is any other members area page, then processing continues to block 3936 for error processing already described.

If block 3940 determines the successful logon data evidence is not valid (no corresponding active user data records 2900/3000 found in Users data 2525 (People/Users Table(s))), then processing continues to block 3916 already described. If block 3912 determines the successful logon data evidence (from a previous logon) is invalid, then processing also continues to block 3916.

Block 3944 again checks to see if a members area logon page is being accessed since there are paths to get to block 3944 which require the check. If block 3944 determines it is not a members area logon page being accessed, then block 3948 checks for Remember Me checkmark data evidence. If it is found at block 3948, then block 3952 resets the expiration time of all logon data evidence for a long term in the future (e.g. 30 days from current date/time). One embodiment is setting cookie data evidence with an expiration in the future. Thereafter, processing continues to block 3934. If block 3948 determines there is no Remember Me evidence, then block 3950 resets the expiration time of all logon data evidence for a short term in the future (e.g. 30 minutes from current date/time). Preferably, a session cookie is used so the user's session to web service 2102 only times out after 30 minute of inactivity. Thereafter, processing continues to block 3934.

If block 3944 determines this access control processing is for a members area logon page, then block 3946 checks if the variable to force a members area logon has been set to TRUE. If block 3946 determines the variable (REQUIRE_LOGON) to force a members logon page is set to true, then processing continues to block 3934, otherwise processing continues to block 3952 already described. The FIG. 39 Access Control also makes user account variables associated with a successful page access validation available to the parent (including) page subsequent processing, such as PersonID 2902, UserType field 2980, MaxDevs field 3020, and MaxDCDB field 3022, etc. Any field from account applicable records 2900 or 3000 can be made accessible to code of the parent (including) page after the point of including access control processing in the parent (including) page. The field data can be available from either the previous successful logon evidence validated, or from querying the People/Users Table(s) at block 3938. The variable to force a members area logon is also passed back to the parent (including) page with either a TRUE or FALSE setting.

FIG. 39 Access Control can also query all devices owned by the user accessing the including page of FIG. 39 processing for making available to the including pages just as PersonID and other fields are as disclosed herein. So, records 6500 with Owner field 6522 matching the user can be queried for all RegistryIDs 6502 and other record 6500 information for making available to the including pages. The Deviceid field 6504 of the device can also be automatically determined, for example by most recent interaction with the Delivery Manager 2510, for making associated record 6500 data available to all pages the user interacts with from the device.

Figure 40:
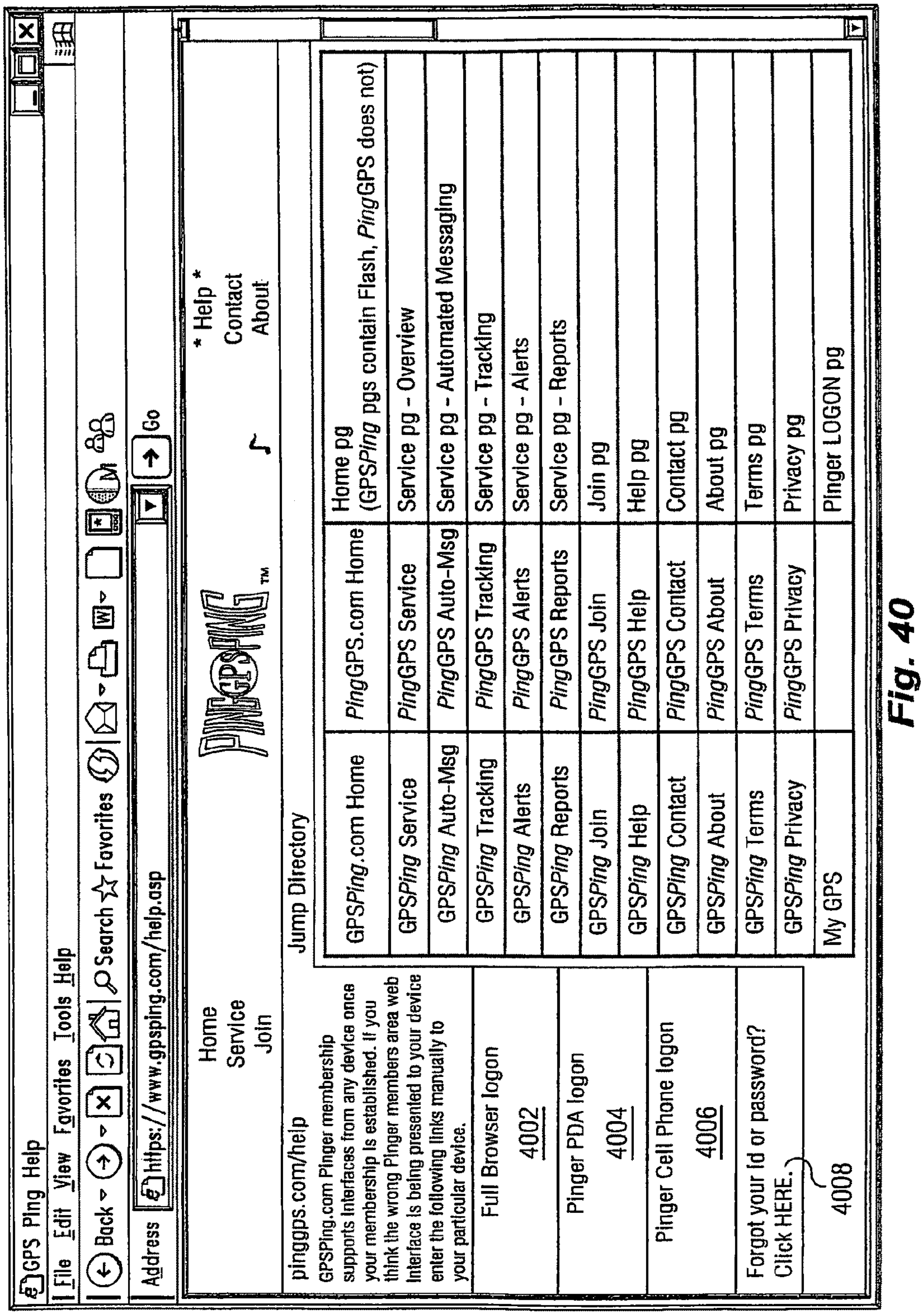
FIG. 40 depicts a preferred embodiment screenshot for the Help option of the web service.

FIG. 40 depicts a preferred embodiment screenshot for the Help option of the web service for a full browser. The web service 2102 preferably automatically determines the device browser invoking a web page and automatically returns the appropriately formatted page (as described below). With the proliferation of different browsers, and different versions of the browsers, this is not always a guaranteed successful approach, so there is a public user interface help page for launching the correct link for a particular device. Members area logon link 4002 provides a navigable (i.e. clickable) link to a full browser members area logon page such as FIG. 42A. Members area logon link 4004 provides a navigable (i.e. clickable) link to a PDA browser members area logon page such as FIG. 42B. Members area logon link 4006 provides a navigable (i.e. clickable) link to a microbrowser (e.g. WAP (Wireless Application Protocol) device) members area logon page such as FIG. 42C. Worst case, the user determines the underlying link URL and manually enters it into his device, for example his Favorites or bookmarks, to force the correct logon page when needed. Preferably, there are members area 2500 options not permitted on a smaller scale browser for performance reasons, so the members area 2500 interfaces will present options to the user based on device type, as well as user type and user preferences. Each of the links 4002 through 4006 take the user to a My GPS logon page for access to the members area 2500. If successful logon data evidence exists (has already taken place previously with Remember Me option set) from the device accessing links 4002 through 4006, then the logon interface is automatically bypassed and options are presented as though the user just logged on. This is discussed below. A closer examination of the links 4002 through 4006 shows the same ASP is invoked with a browser type parameter in the URL string (e.g. http://www.gpsping.con/MCD/xmcd.asp?br=pda). The ASP determines how to format the appropriate page based on the browser type parameter. Another embodiment could have different pages for each device and/or browser type. Memory lapse link 4008 is for users that forget their logon name or password (discussed below).

My GPS

Figure 41:
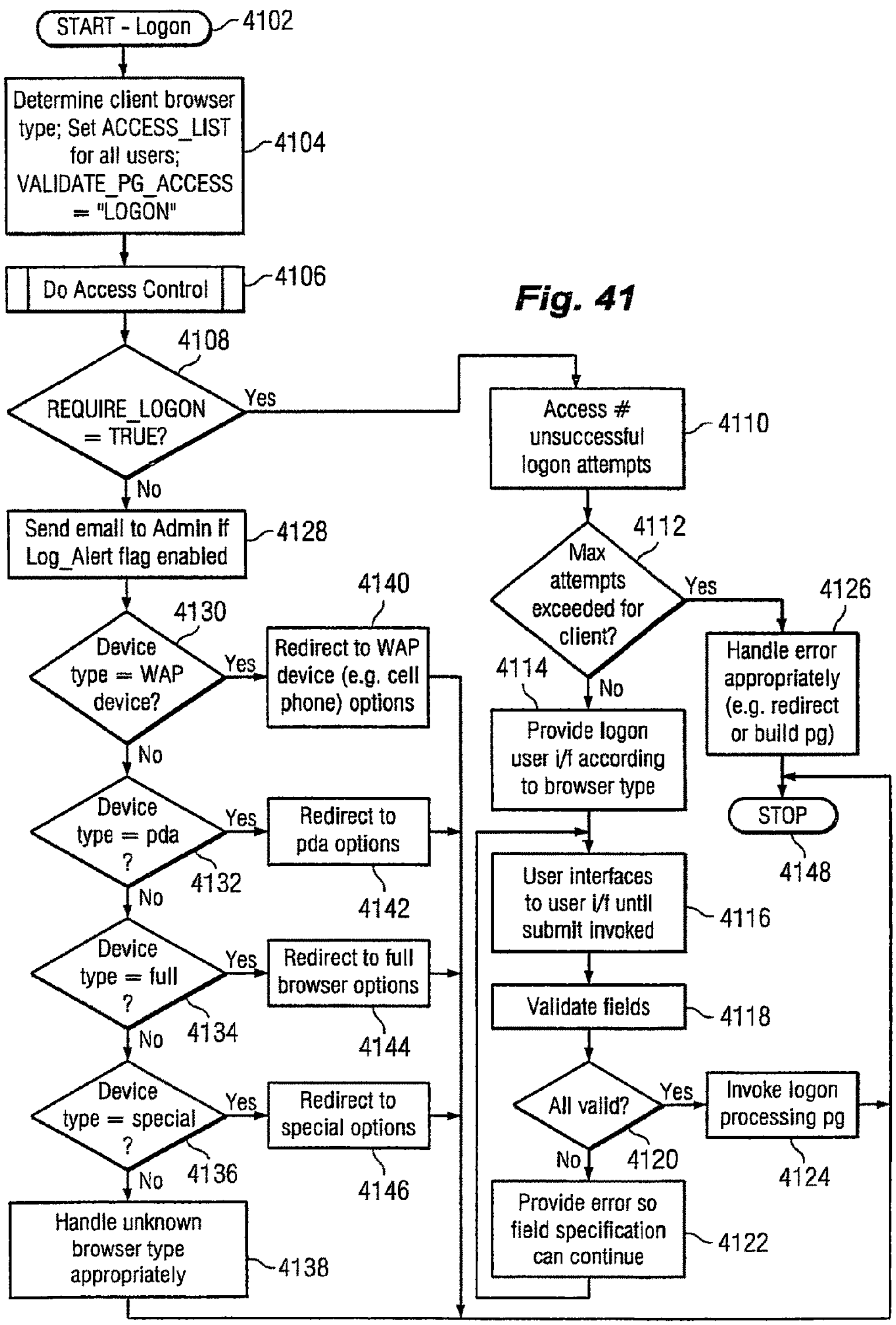
FIG. 41 depicts a flowchart for a preferred embodiment of the web service member logon aspect of the web service supporting heterogeneous device connectivity.
Figure 42A:
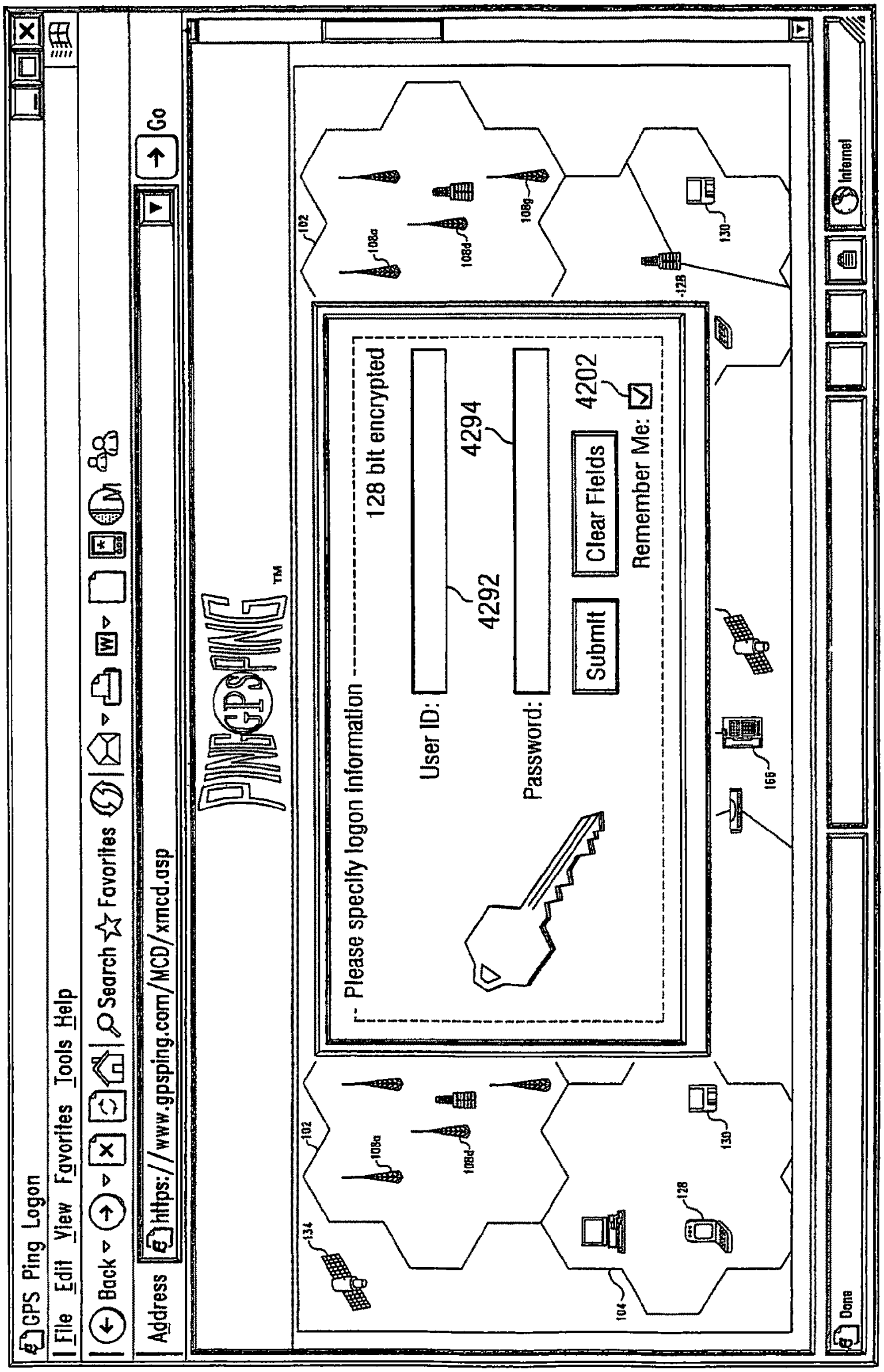
FIG. 42A depicts a preferred embodiment screenshot for the web service member logon aspect using a full browser.
Figure 42B:
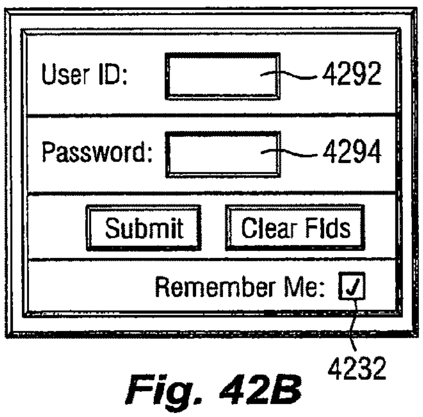
FIG. 42B depicts a preferred embodiment screenshot for the web service member logon aspect using a Personal Digital Assistant (PDA) browser.
Figure 42C:
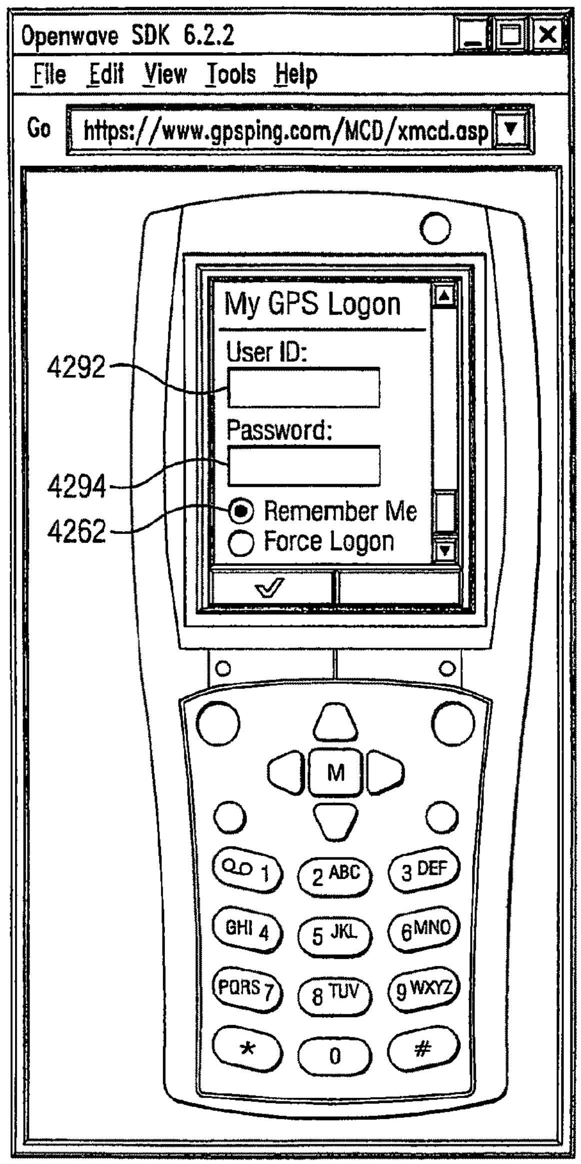
FIG. 42C depicts a preferred embodiment screenshot for the web service member logon aspect using a microbrowser, for example on a cell phone.

FIG. 41 depicts a flowchart for a preferred embodiment of the web service members area 2500 logon aspect of the web service supporting heterogeneous device connectivity. Logon processing starts at block 4102, for example as a result of clicking a link 4002, 4004, or 4006, or manually entering the underlying URL of those links. Block 4102 continues to block 4104 where the device browser type is determined. Preferably, the browser type is passed as a parameter, passed as a parameter from another page that automatically determines the browser type and then passes a browser type parameter to FIG. 41, or is automatically determined at block 4104. Browser type is determined similarly for all members area pages. Block 4104 sets an ACCESS_LIST for all users (or user types) permitted to access the logon page (e.g. VBScript ACCESS_LIST example above) and sets VALIDATE_PG_ACCESS="LOGON" (also described above) to indicate to included FIG. 39 access control processing that this is a members area logon page being accessed. Block 4104 continues to block 4106 where the FIG. 39 Access Control processing is performed. Thereafter, block 4108 determines if access-control processing set a variable for forcing a members area logon (i.e. REQUIRE_LOGON=TRUE or FALSE as described above). If a members area logon is required, then block 4110 accesses data evidence for the number of consecutive unsuccessful logon attempts thus far from the requesting device. Thereafter, if block 4112 determines the maximum number of consecutive unsuccessful logon attempts from the requesting device per the data evidence has been exceeded, then the error is handled appropriately at block 4126 and processing terminates at block 4148. If block 4112 determines that the number of consecutive unsuccessful logon attempts from the requesting device has not been exceeded, then block 4114 provides a logon interface according to the browser type determined at block 4104, and the user interfaces to the logon interface at block 4116 until submitting credentials to logon. FIGS. 42A through 42C depict preferred embodiments for a logon interface (page) to a full browser, PDA, and microbrowser (e.g. WAP) device, respectively.

Figure 43:
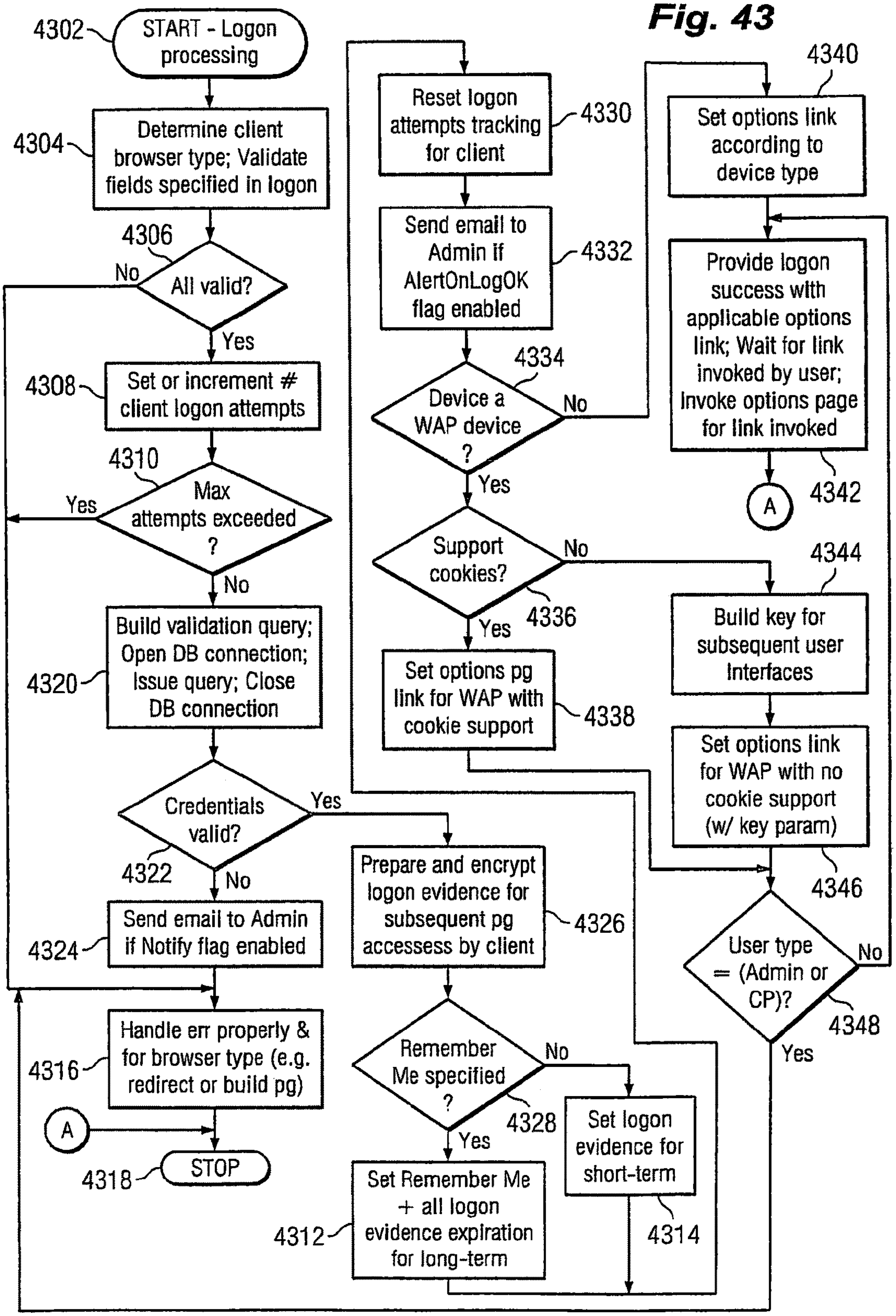
FIG. 43 depicts a flowchart for a preferred embodiment of the web service member logon processing resulting from user interaction to the logon user interfaces and submittal therefrom.

When submit is invoked, block 4118 validates fields provided, for example to make sure they are non-null, and a password of proper length. Thereafter, block 4120 checks if fields entered were valid. If block 4120 determines the logon name and password are valid, then processing continues to block 4124 where logon processing of FIG. 43 is invoked, and current page processing terminates at block 4148. If block 4120 determines not all fields were valid for processing, then an error is provided at block 4122 so user entry can continue back at block 4116. Form fields do not have to be validated at the client device at a block 4118 through 4122 in some embodiments. Submission of credentials can go directly to block 4124 for validation and processing.

Figure 45A:
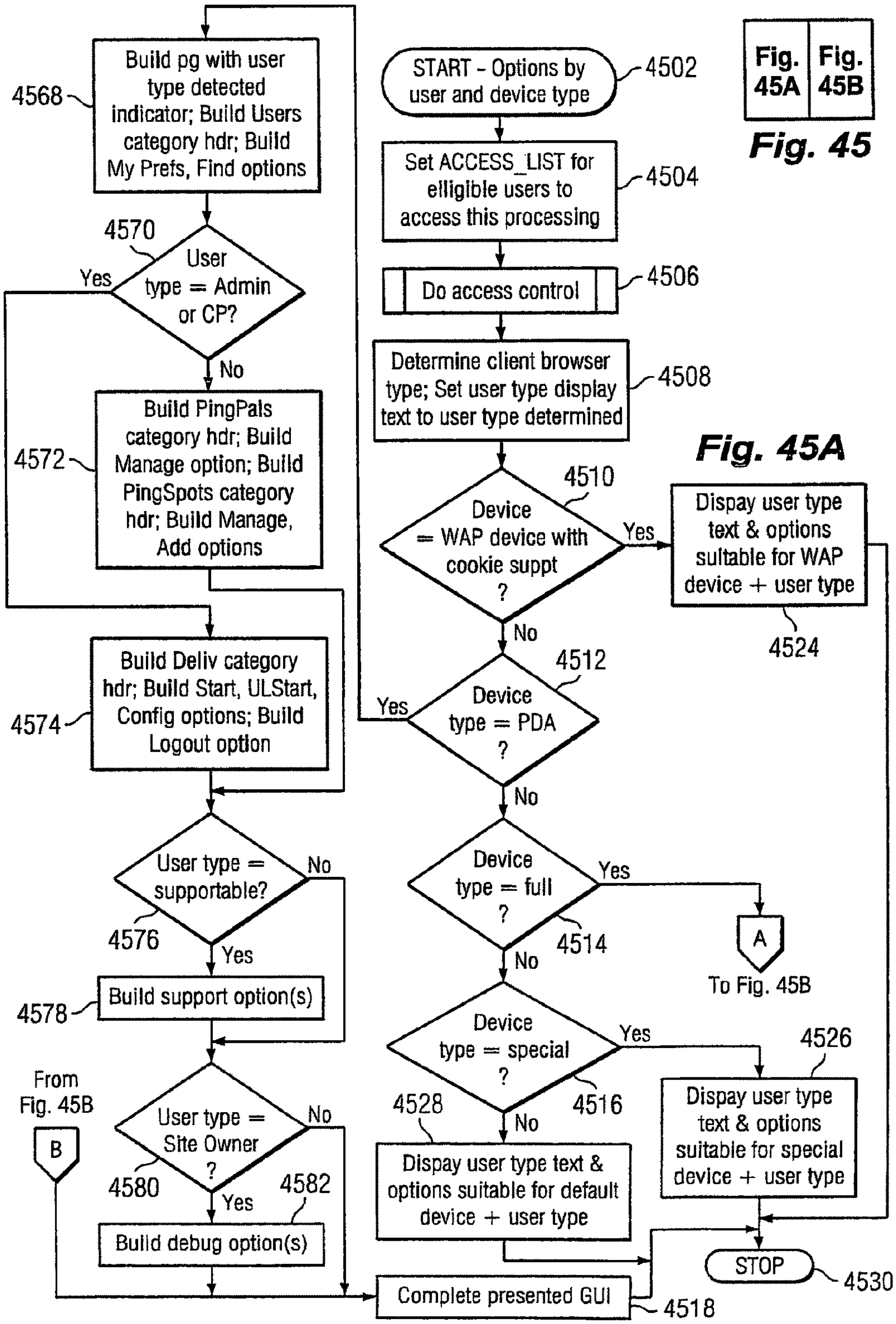
FIG. 45 depicts a flowchart for a preferred embodiment of the web service options presented to a user of any heterogeneous device that completed a previous successful logon into the web service.

The REQUIRE_LOGON variable passed from FIG. 39 processing for forcing a logon was determined based on successful logon data evidence found for preventing the user from redundantly re-entering logon name and password into a logon interface every time he accesses the members area 2500. If block 4108 determines a members area logon is not required, then block 4128 sends an email for documentary purposes of the user logging on (with bypass method) if a flag to send such an alert is enabled. Thereafter, blocks 4130 through 4136 determine the device (or browser) type for presenting the correct members area options interface format. If block 4130 determines the device type (or browser type) is a WAP device, then block 4140 redirects the WAP device to the WAP options page, for example FIGS. 46E to 46F. If block 4130 determines the device (or browser) is not a WAP device, then block 4132 checks for a PDA browser. If block 4132 determines the device type (or browser type) is a PDA browser device, then block 4142 redirects the PDA device to the PDA options page, for example FIG. 46D. If block 4132 determines the device (or browser) is not a PDA device, then block 4134 checks for a full browser. If block 4134 determines the device type (or browser type) is a full browser device, then block 4144 redirects the full browser device to the full browser options page, for example FIG. 46B. If block 4134 determines the device (or browser) is not a full browser device, then block 4136 checks for a special browser. If block 4136 determines the device type (or browser type) is a special device, then block 4146 redirects the special device to the appropriate special options page. If block 4136 determines the device (or browser) is not a special device, then block 4136 continues to block 4138 to handle an error for the unknown device type and processing terminates at block 4148. Blocks 4140, 4142, 4144, and 4146 also continue to block 4148 where processing terminates. FIG. 45 processing handles options pages. CD-ROM file name "xmcd.asp" provides an ASP program source code listing for a members area logon embodiment of FIG. 41. Various embodiments of blocks 4130, 4132, 4134 and 4136 can check for browser type and/or device type to determine appropriately presented and formatted options.

FIG. 42A depicts a preferred embodiment screenshot for the web service member logon aspect using a full browser. FIG. 42B depicts a preferred embodiment screenshot for the web service member logon aspect using a Personal Digital Assistant (PDA) browser. FIG. 42C depicts a preferred embodiment screenshot for the web service member logon aspect using a microbrowser, for example on a cell phone. Entry field 4292 of the Figures is for entry of a matching LogonName field 3004. Entry field 4294 of the Figures is for entry of a matching PW field 3006 (password).

FIG. 43 depicts a flowchart for a preferred embodiment of the web service member logon processing resulting from user interaction to the logon user interfaces and submittal therefrom. Logon processing starts at block 4302 and continues to block 4304 where the device (or browser) type is determined. Preferably, the browser type is passed as a parameter, or is automatically determined at block 4304. Block 4304 also validates form fields passed for logon name and password (the credentials). Thereafter, if block 4306 determines the user specified fields are valid, then block 4308 sets (if first time here for device according to logon attempt data evidence), or increments, the number of consecutive logon attempts in data evidence for the requesting device, and block 4310 determines if the maximum consecutive attempts has been exceeded (with consecutive logon attempts data evidence). If block 4310 determines the maximum consecutive attempts was exceeded by this try, then block 4316 handles the error appropriately and processing terminates at block 4318. If block 4306 determines that form fields are not valid, then processing continues to block 4316 for error handling and termination of processing therefrom. If block 4310 determines the maximum number of consecutive attempts is not exceeded, then block 4320 builds a query with the user logon name and password specified (the credentials) to select an active record from the Users Table, opens a DB connection, does the query, and closes the DB connection. Thereafter, if block 4322 determines the credentials were valid (i.e. found record in Users Table), then block 4326 prepares and encrypts successful logon data evidence (for example a cookie to the user's device) for subsequent page accesses of the members area 2500. Thereafter, block 4328 checks to see if the Remember Me option was checked (FIGS. 42A through 42C fields 4202, 4232, and 4262). If the user selected Remember Me, then block 4312 sets Remember Me data evidence and encrypted successful logon data evidence for a long term expiration period (e.g. 30 days). Thereafter, block 4330 resets consecutive logon attempts data evidence for 0 attempts thus far, and block 4332 sends an email to an Administrator account if a flag indicates to do so for documentary purposes. Thereafter, block 4334 checks if the device browser type is a WAP device. If block 4334 determines the device browser type is a WAP device browser, then block 4336 checks if it supports cookies. If block 4336 determines the WAP device supports cookies, then block 4338 sets an options page link variable for the WAP options page with cookie support. Thereafter, block 4348 checks the user type to make sure no Administration or Content Provider user types are using a poorly performing WAP device to do their members area options. An alternative embodiment may allow the WAP device to do any options any other device can do. If block 4348 determines the user is an Administrator or Content Provider user type, then processing continues to block 4316. If block 4348 determines the user type is eligible for displaying options to the WAP device, then block 4342 provides a logon success page (e.g. FIG. 44C) with an options link 4402 set according to the options page link variable. Block 4342 waits for the options link to be invoked by the user, and then invokes the options page according to the link. Thereafter, current page processing terminates at block 4318.

If block 4336 determines the WAP device does not support cookies, then block 4344 builds a key to be passed as a URL variable for subsequent interfaces, block 4346 sets the options page link variable for the WAP options page with no cookie support (and the key parameter), and processing continues to block 4348. If block 4334 determines the device is not a WAP device, then block 4340 sets the options page link variable according to the device (or browser) type detected at block 4304, and processing continues to block 4342 where an appropriate success page is presented to the user depending on his device, for example, any of FIG. 44A, 44B, or 44C. Block 4342 also waits for the options link 4402 to be invoked by the user, and then invokes the options page according to the link. Thereafter, current page processing terminates at block 4318.

Figure 46A:
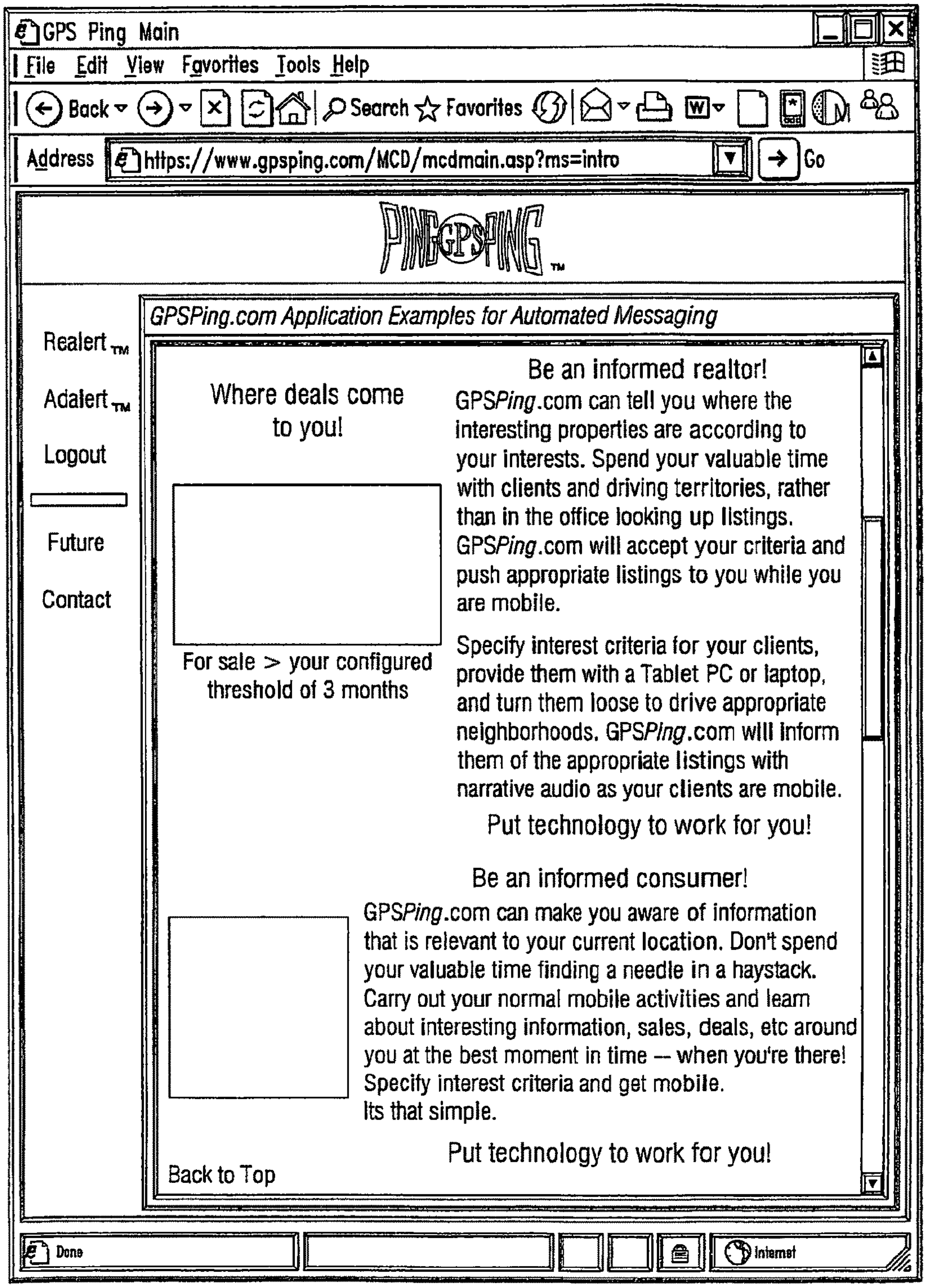
FIG. 46A depicts a preferred embodiment screenshot for the interface presented after a successful logon where the user has just submitted credentials for logging into the web service from a full browser.

A preferred embodiment of block 4342 provides the options link 4402 to navigate to FIG. 46A whenever the device is determined to be a full browser device. FIG. 46A is presented as a page for first time logons into the members area 2500 to highlight features and usefulness of web service 2102. Once successful logon data evidence is saved to the user's device, subsequent accesses to the members area 2500 options page causes immediate automatic navigation to an options page (e.g. FIG. 46B by way of FIG. 45 processing), such as resulting from block 4144. Therefore, FIG. 46A is bypassed for users that have already logged on successfully before and have placed a checkmark in Remember Me option 4202.

If block 4328 determines the Remember Me option was not checked, then block 4314 sets successful logon data evidence to short-term expiration (e.g. 30 minutes) and processing continues to block 4330. If block 4322 determines the credentials entered for logon are not valid, then block 4324 sends an email for documentary purposes to an Administrator account if a Notify flag is enabled and processing continues to block 4316.

Thus, the option link 4402 always provides a convenient navigable link to the correctly formatted options page as clicked from the correctly formatted success page depending on the device and/or browser type. Success page examples include any of FIGS. 44A through 44C depending on the device. Options page examples include any of FIGS. 46B, 46D, 46E and 46F. The user is always presented with an appropriate set of options in an appropriate format based on browser type and/or device type as well as user and/or user type.

Figure 44A:
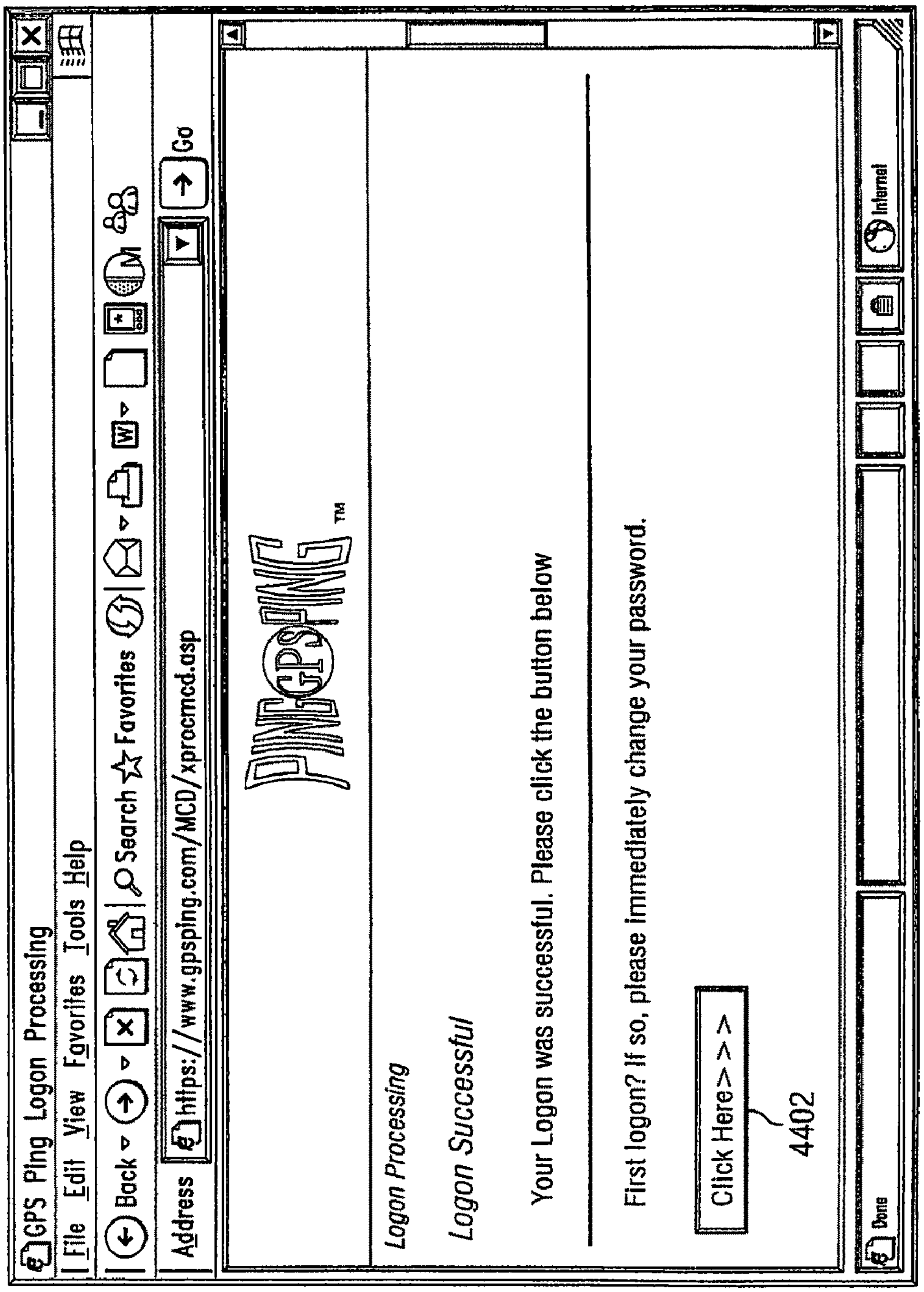
FIG. 44A depicts a preferred embodiment screenshot for member logon success completion to the web service using a full browser.
Figure 44B:
FIG. 44B depicts a preferred embodiment screenshot for member logon success completion to the web service using a PDA browser.
Figure 44C:
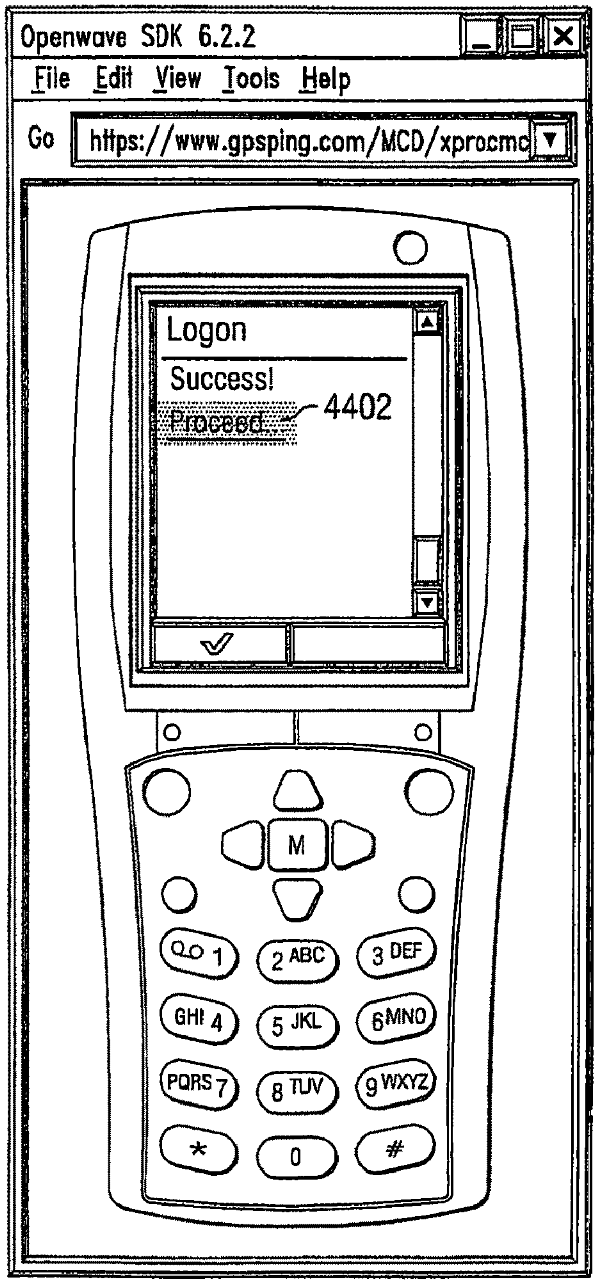
FIG. 44C depicts a preferred embodiment screenshot for member logon success completion to the web service using a microbrowser, for example on a cell phone.

FIG. 44A depicts a preferred embodiment screenshot for member logon success completion to the web service using a full browser. FIG. 44B depicts a preferred embodiment screenshot for member logon success completion to the web service using a PDA browser. FIG. 44C depicts a preferred embodiment screenshot for member logon success completion to the web service using a microbrowser, for example on a cell phone. A success page interface is bypassed when there is successful logon data evidence as determined by FIG. 39 Access Control, and then determined at block 4108 processing for continuing to block 4128 and subsequent processing. This allows a "fastpath" to options without requiring users to re-logon every time they want to access the members area 2500.

FIG. 45 depicts a flowchart for a preferred embodiment of the web service options presented to a user of any heterogeneous device that completed a previous successful logon into the web service. Processing starts at block 4502 and continues to block 4504 where the ACCESS_LIST (as discussed above) is set for authorized users (e.g. authorized user types). Thereafter, block 4506 performs FIG. 39 access control processing and continues to block 4508 where the client device (or browser) type is determined, and then the user type from access control processing is used to set a user type display variable for the user's type, for example, to present display field 4602. Note that block 4506 access control processing will not continue to block 4508 if it is determined that the user should not have access to further processing of the FIG. 45 flowchart. User types are well described in FIGS. 50B through 50E.

Execution of block 3936 prevents processing further by any page that includes FIG. 39 processing. This prevents unauthorized access to members area pages. In one validation, FIG. 39 logic flows to block 3936 when the user type is unauthorized to access the parent page (page including the access control), for example blocks 3942 to 3914. Page access authorization depends on user type of the logged on user. Options presented to the user are also presented by the user type. In another validation, data evidence must exist for a successful logon when the page being accessed requires a previous valid logon has already been performed. Logon applicable pages for entering/validating credentials do not require successful logon data evidence for members area 2500 pages.

In another embodiment, each user specifically may be authorized to access specific pages. For example, the ACCESS_LIST can include a list of user identifiers or reference(s) to them, or credentials, which are preferably maintained in an SQL database queried by credentials for determining which pages a user can access (although a file, string, or any other means to store the relationships between users and accessible pages can be used). Each user in the database would have a list of pages they are allowed to access, or a wildcard pattern describing pages they can access. So, each members area 2500 page loaded would determine if a user has access to it through applicable access control, and if the user does, then the user type would be used to present options based on user type.

In yet another embodiment, once a user is validated for access to a page, the specific user can be presented options of the page depending on the user. For example, each user credentials would be associated with exposable options in each interface depending on user specific assigned options permitted. While the user type would initially provide a set of presented options, further options would be assignable by an administrator, or configured by the system, in response to actions by the user in certain options.

So, all user interfaces of this disclosure are presented to users by user type, user credentials, specific user permitted options, browser type and/or device type, and then additionally any user preferences that have been configured upon access to at least one page accessed by the user (preferences discussed below). Any blocks in subsequent flowcharts that do access control also behave as just described.

Figure 46B:
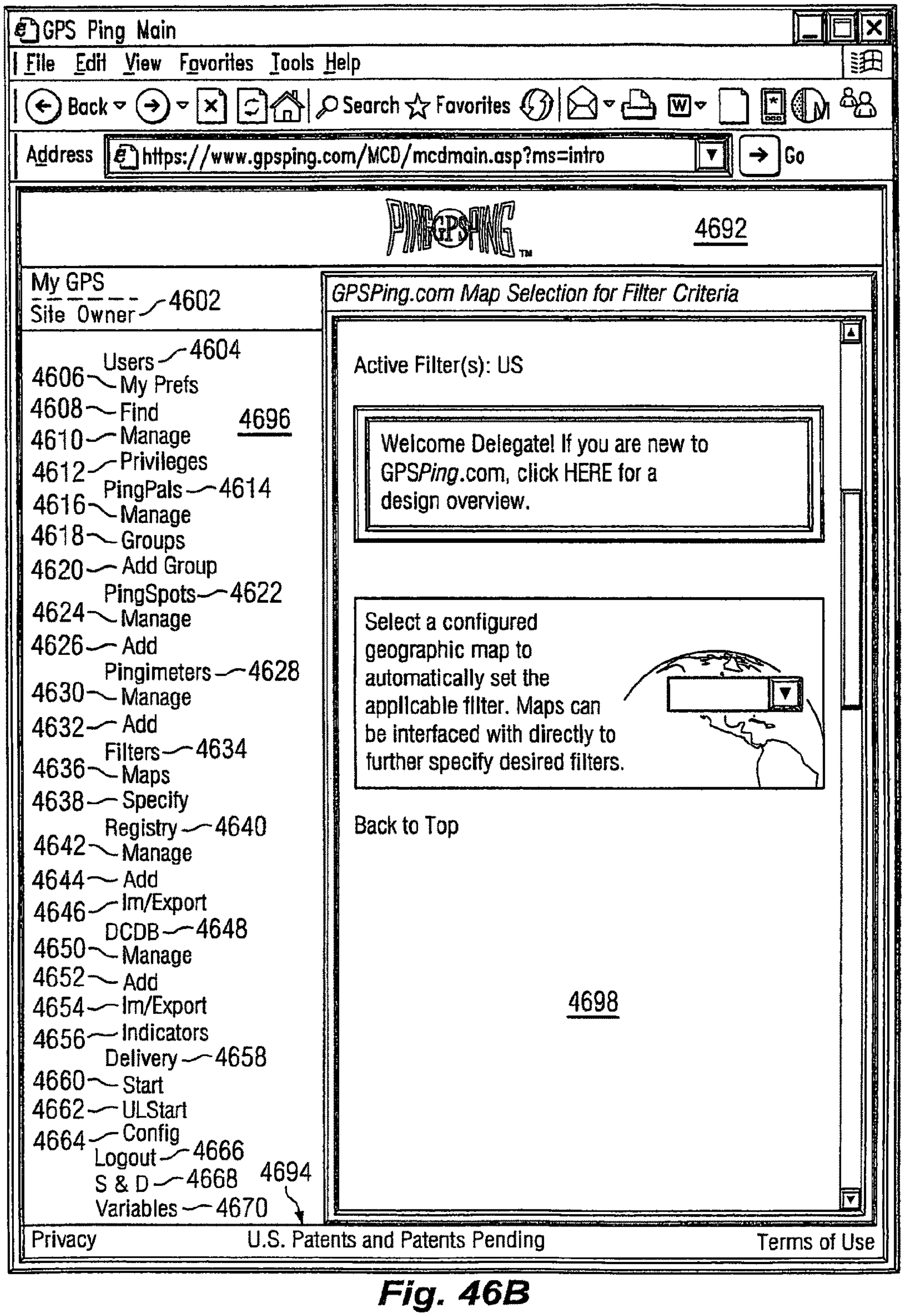
FIG. 46B depicts a preferred embodiment screenshot for the interface presented after a successful logon to the web service from a full browser.
Figure 46C:
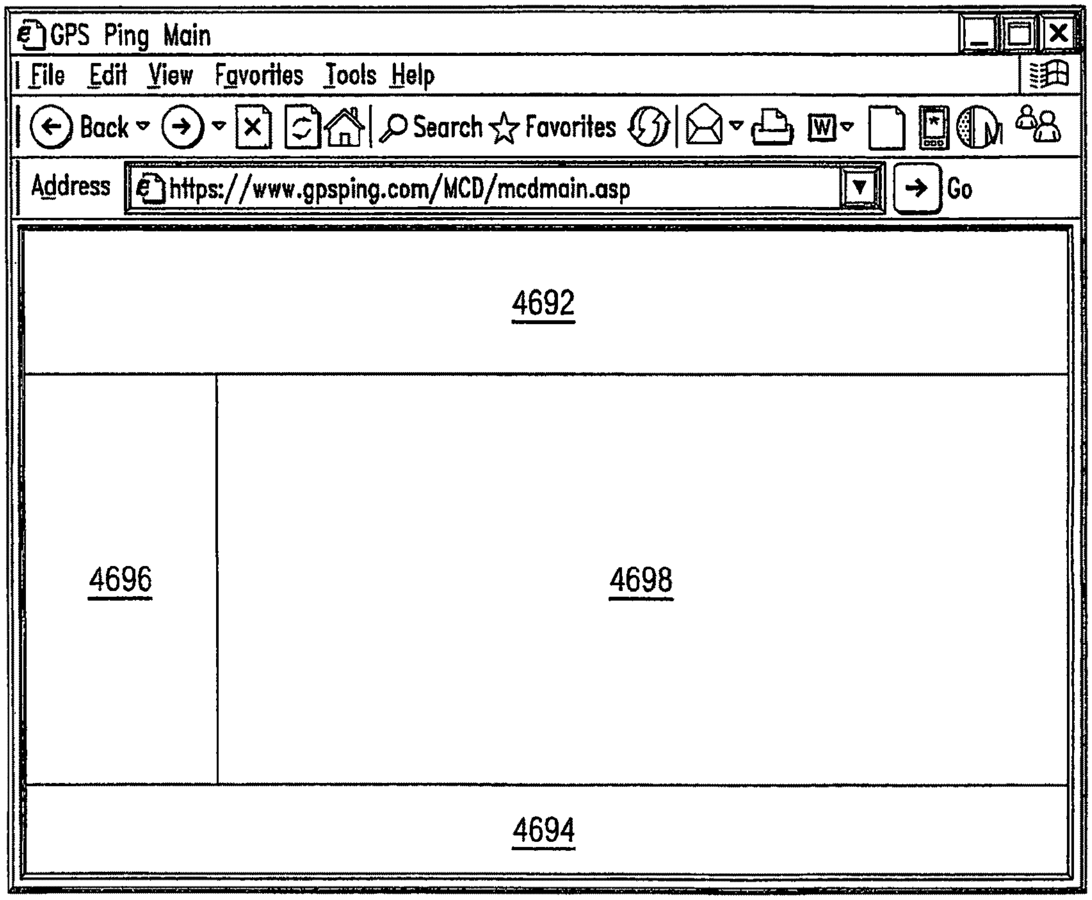
FIG. 46C depicts an illustration for describing an html frames embodiment of web service member pages.

If the user is permitted access to the page, then block 4506 continues to block 4508 as described, and onto block 4510 to check device (or browser) type. If block 4510 determines the page is being accessed by a WAP device (e.g. cell phone), then block 4524 displays the user type variable text (e.g. field 4602 of FIG. 46E), and displays members area 2500 options appropriate for the WAP device and user type, for example as depicted in FIGS. 46E and 46F. FIG. 46F results from a user paginating from FIG. 46E. Processing then terminates at block 4530.

If block 4510 determines that the device or browser type is not a WAP device then block 4510 continues to block 4512. If block 4512 determines the device or browser type is a Personal Digital Assistant (PDA), for example a device that runs a Microsoft Pocket Internet Explorer, or Palm browser, or the like, then processing continues to block 4568. In some embodiments, a Microsoft Pocket Internet Explorer device will be processed by a unique execution path from a Palm PDA browser which will be processed by a unique execution path from yet a different PDA. Therefore, it is understood that there may be many decisions made like blocks 4510 through 4516 for distinctly handling the nuances and specific requirements for a particular type of device (or browser). Block 4568 builds the options page through the user type display field 4602 (FIG. 46D referenced in these PDA discussions) from the user type display variable, builds the Users options category header 4604 (FIG. 46D), and builds the Users My Preferences option 4606 and Users Find option 4608. Thereafter, block 4570 checks the user type. If block 4570 determines the user is not an Administrator or Content Provider, then block 4572 builds the PingPals options category header 4614 (FIG. 46D), PingPals Manage option 4616, PingSpots options category header 4622, PingSpots Manage option 4624, and PingSpots Add option 4626. Thereafter, block 4574 builds the Delivery options category header 4658 (FIG. 46D), Delivery Start option 4660, Delivery User Specified Location Start option 4662, Delivery Configurator option 4664, and Logout option 4666. Thereafter, block 4576 checks to see if this user is supportable. If block 4570 determines the user is an Administrator or Content Provider, then processing continues directly to block 4574 thereby providing no PingPals or PingSpots options to the user.

If block 4576 determines the user is supportable, then block 4578 builds support option 4668 and processing continues to block 4580. If block 4576 determines the user is not supportable, then block 4576 continues to block 4580. A supportable user type is preferably one that did not enroll automatically through the public website. Web Service 2102 is fully automated and contracted user types that were enrolled in the system by a human being are supportable. Web service 2102 supports many different user types. In another embodiment, being supportable is accomplished on a user by user basis with the user account (e.g. field in records 3000). In another embodiment, automatically registered users are also supportable, for example through the FIG. 38A contact interface, a pop-up with a support phone number and/or navigable web link, or the like, where help is provided.

If block 4580 determines the user is a Site Owner, then block 4582 builds Debug Variables option 4670, the page is completed for serving back to the user's device at block 4518, and processing terminates at block 4530. If block 4580 determines the user is not a Site Owner, then block 4518 completes the page to service back to the user's device, and processing terminates at block 4530. Note that the PDA interface was presented to the user by device type (or browser type), and user (or user type).

If block 4512 determines that the device or browser type is not a PDA device then block 4512 continues to block 4514. If block 4514 determines the device or browser type is a full browser capable device, for example a device that runs a Microsoft Internet Explorer, or like full browser, then processing continues to block 4534. Block 4534 builds the options page through the user type display field 4602 (FIG. 46B referenced in these full browser discussions) from the user type display variable, builds the Users options category header 4604 (FIG. 46B), and builds the Users My Preferences option 4606 and Users Find option 4608. Thereafter, block 4536 checks the user type. If block 4536 determines the user is a Site Owner or Delegate, then block 4520 builds the Users Manage option 4610 (FIG. 46B) and User Options Privileges option 4612, otherwise block 4536 continues to block 4538. Block 4520 also continues to block 4538. If block 4538 determines the user is not an Administrator or Content Provider, then block 4522 builds the PingPals options category header 4614 (FIG. 46B), PingPals Manage option 4616, PingPals Groups option 4618, PingPals Add Group option 4620, PingSpots options category header 4622, PingSpots Manage option 4624, PingSpots Add option 4626, Pingimeters options category header 4628, Pingimeters Manage option 4630, and Pingimeters Add option 4632. Thereafter, block 4522 continues to block 4540. If block 4538 determines the user is an Administrator or Content Provider, then processing continues directly to block 4540 thereby providing no PingPals, PingSpots, Pingimeters options to the user. Note that the full browser interface of FIG. 46B contains extra PingPals options and a set of Pingimeters options that were not presented to the PDA interface of FIG. 46D for the same user type. A performance conscious web service presents options that make sense for a device. The presented embodiment chose not to present the more user interface intensive options to the PDA, however it did present the options that made sense for still capturing functionality that makes most sense for the mobile user with a PDA. Other embodiments will make all options available regardless of device, or may implement the interfaces differently to enhance the performance. Any subset of options can be made available to any type of device (or browser).

Block 4540 builds Filters options category header 4634 (FIG. 46B), Filters Maps option 4636, and Filters Specify option 4638. Thereafter, if block 4542 determines the user is an Administrator, Pinger, Site Owner, or Delegate, then block 4544 builds the Registry option category header 4640 (FIG. 46B), Registry Manage option 4642, and Registry Add option 4644. Processing then continues to block 4552. If block 4552 determines the user is a Site Owner or Delegate, then block 4554 builds Registry Import/Export option 4646 (FIG. 46B), and processing continues to block 4556. If block 4552 determines the user is not a Site Owner or Delegate, then block 4552 continues to block 4556. If block 4542 determines the user is not an Administrator, Pinger, Site Owner, or Delegate, then processing continues to block 4556. Block 4556 builds the Delivery Content Database (DCDB) options category header 4648. Thereafter, block 4558 checks the user.

If block 4558 determines the user is a Content Provider, Site Owner, or Delegate, then block 4560 builds the DCDB Manage option 4650 (FIG. 46B) and DCDB Add option 4652. Thereafter, block 4562 checks the user. If block 4558 determines the user is not a Content Provider, Site Owner or Delegate, then block 4558 continues to block 4562. If block 4562 determines the user is a Site Owner or Delegate, then block 4564 builds the DCDB Import/Export option 4654 (FIG. 46B), and then block 4566 builds the DCDB Indicators option 4656, the Delivery options category header 4658 (FIG. 46D), Delivery Start option 4660, Delivery User Specified Location Start option 4662, Delivery Configurator option 4664, and Logout option 4666. Thereafter, block 4546 checks to see if this user is supportable. If block 4562 determines the user is not a Site Owner or Delegate, then processing continues directly to block 4566 thereby providing no Import/Export option 4654 to the user.

If block 4546 determines the user is supportable, then block 4548 builds support option 4668 (FIG. 46B) and processing continues to block 4550. If block 4546 determines the user is not supportable, then block 4546 continues to block 4550. If block 4550 determines the user is a Site Owner, then block 4532 builds Debug Variables option 4670, the page is completed for serving back to the user's device at block 4518, and processing terminates at block 4530. If block 4550 determines the user is not a Site Owner, then block 4518 completes the page to service back to the user's device, and processing terminates at block 4530. Note that the full browser interface was presented to the user by device type (or browser type), and user (or user type). FIG. 46B shows that the Filters Maps option 4636 has been presented to the options initial page as though the user already clicked that option. Other embodiments will default any other option to the device.

If block 4514 determines the device or browse type is not a full browser, then block 4516 checks for a special type. If block 4516 determines the page is being accessed by a special device, then block 4526 displays the user type variable text, and displays members area 2500 options back to the user that are appropriate for the special device and user type. Processing then terminates at block 4530. If block 4516 determines the page is not being accessed by a special device, then block 4528 displays the user type variable text, and displays members area 2500 options back to the user that are appropriate for the particular device and user type. Processing then terminates at block 4530.

So, options in the members area 2500 of web service 2102 are presented by device type (or browser type) and user (or user type). Other embodiments will present options depending on specific users. Any subset of options can be made available to any type of device (or browser) as well as to any particular user (or user type). CD-ROM file names "xoptions.asp" and "woptions.asp" provides ASP program source code listings for presenting members area 2500 options to heterogeneous devices of different users (e.g. FIG. 45).

FIG. 46A depicts a preferred embodiment screenshot for the interface presented after a successful logon where the user has just submitted credentials for logging into the web service from a full browser. FIG. 46A is intended for first time user logons.

FIG. 46B depicts a preferred embodiment screenshot for the interface presented after a successful logon to the web service from a full browser. FIG. 46B is not intended for first time logons, however, it is intended for all subsequent accesses to members area 2500. In a preferred full browser embodiment, FIG. 46B is implemented with frames, namely header frame 4692, footer frame 4694, options frame 4696, and page content frame 4698. Clicking options in the options frame 4696 loads pages into the content frame 4698. Header frame 4692 and footer frame 4694 are loaded once upon entry to the members area which eliminates redundant traffic of content from the service to the user's device. Another embodiment may not use frames and may load all content of the browser window (e.g. FIG. 46B) with each option selected. A Site Owner user type that accesses the members area with a full browser sees ALL members area options as depicted in FIG. 46B. FIG. 46C depicts an illustration for describing the html frames embodiment of web service member pages. Frames 4692 through 4698 are shown as areas that get filled with content from the web service.

Figure 46D:
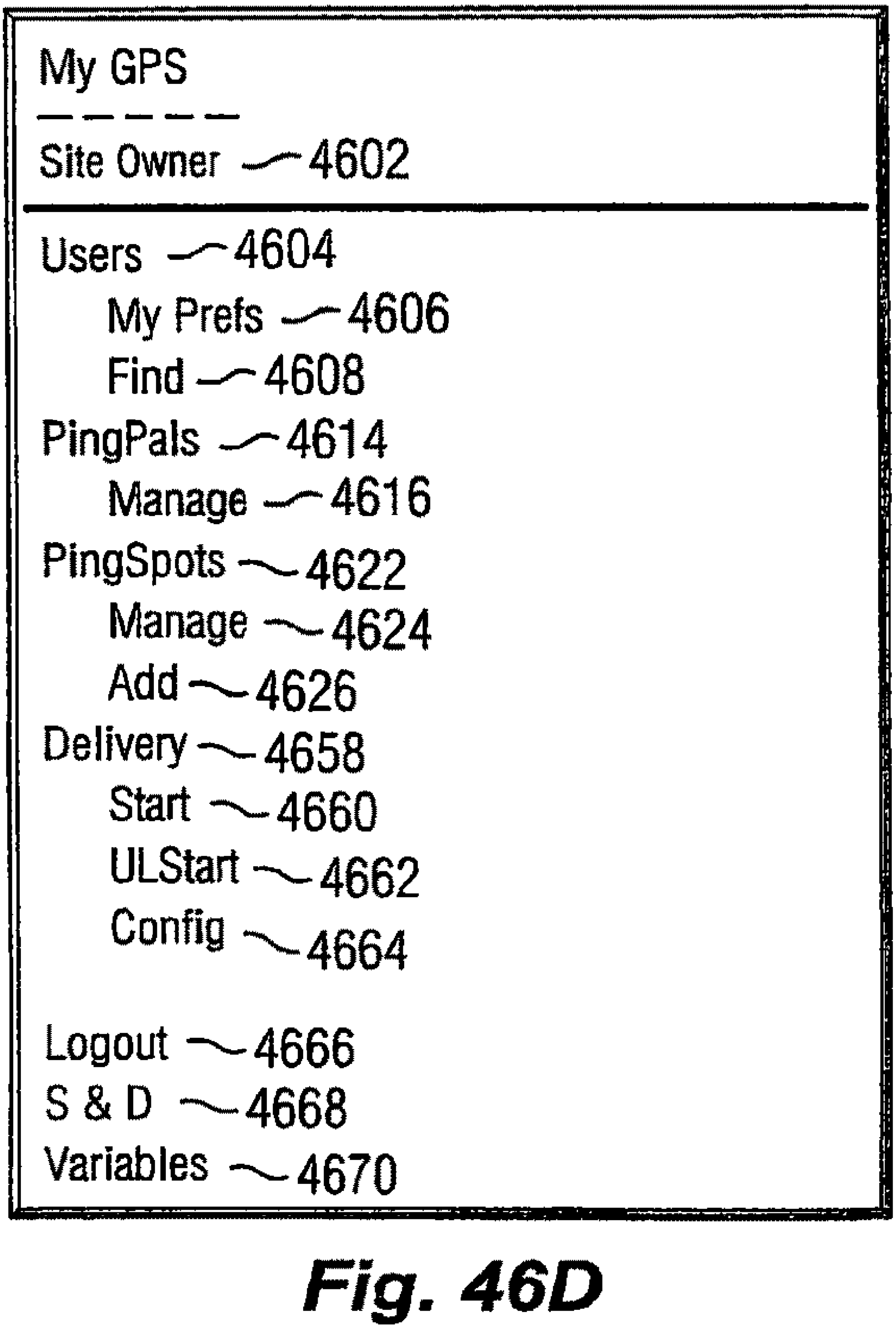
FIG. 46D depicts a preferred embodiment screenshot for the interface presented after a successful logon to the web service from a PDA browser.
Figure 46E:
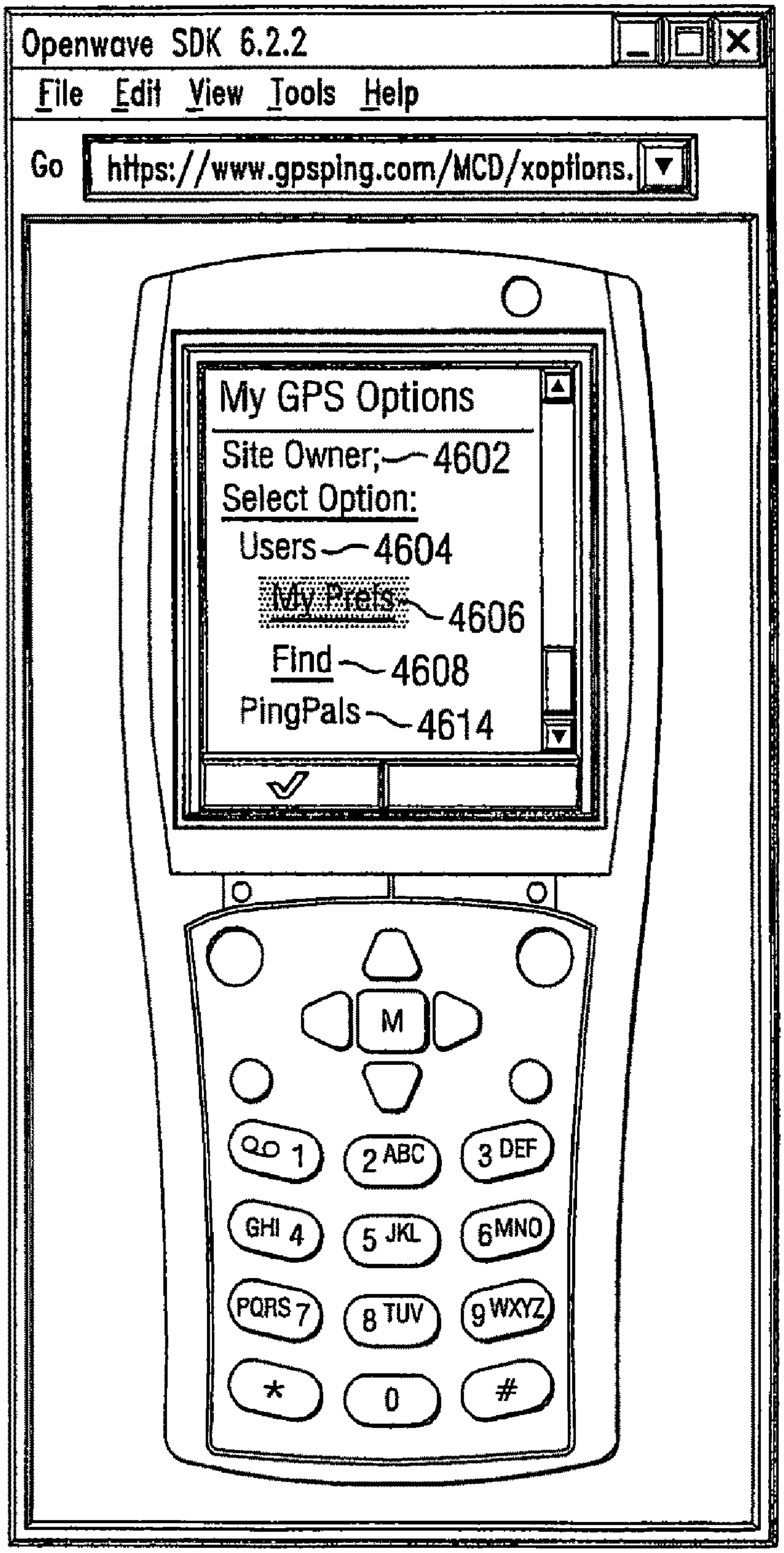
FIGS. 46E and 46F depict preferred embodiment screenshots for the interface presented after a successful logon to the web service from a microbrowser, for example on a cell phone.
Figure 46F:
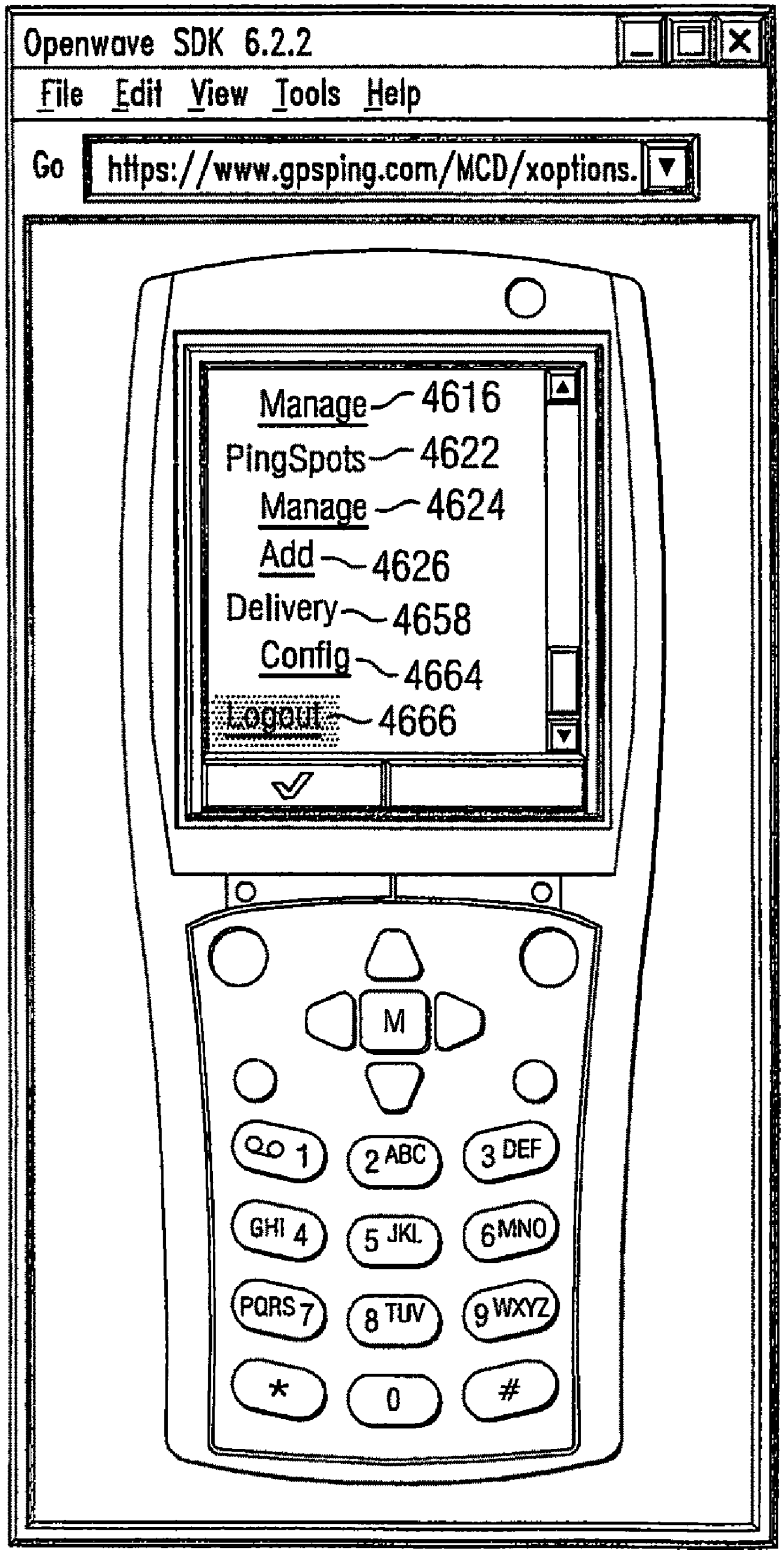

FIG. 46D depicts a preferred embodiment screenshot for the interface presented after a successful logon to the web service from a PDA browser. A Site Owner user type sees ALL members area options that are reasonable for a PDA browser as depicted in FIG. 46D. The device type has eliminated some of the options which are better off accessed with a full browser, without affecting required functionality while mobile.

FIGS. 46E and 46F depict preferred embodiment screenshots for the interface presented after a successful logon to the web service from a microbrowser, for example on a cell phone or WAP device. A Site Owner user type sees ALL members area options that are reasonable for the WAP device as depicted in FIGS. 46E and 46F. The device type has eliminated some of the options which are better off accessed with a full browser, without affecting required functionality while mobile. In general, for any user type, the cell phone interface is preferably a subset of a PDA interface, and the PDA interface is preferably a subset of the full browser interface. However, any and all options can be presented to all device types.

Figure 47:
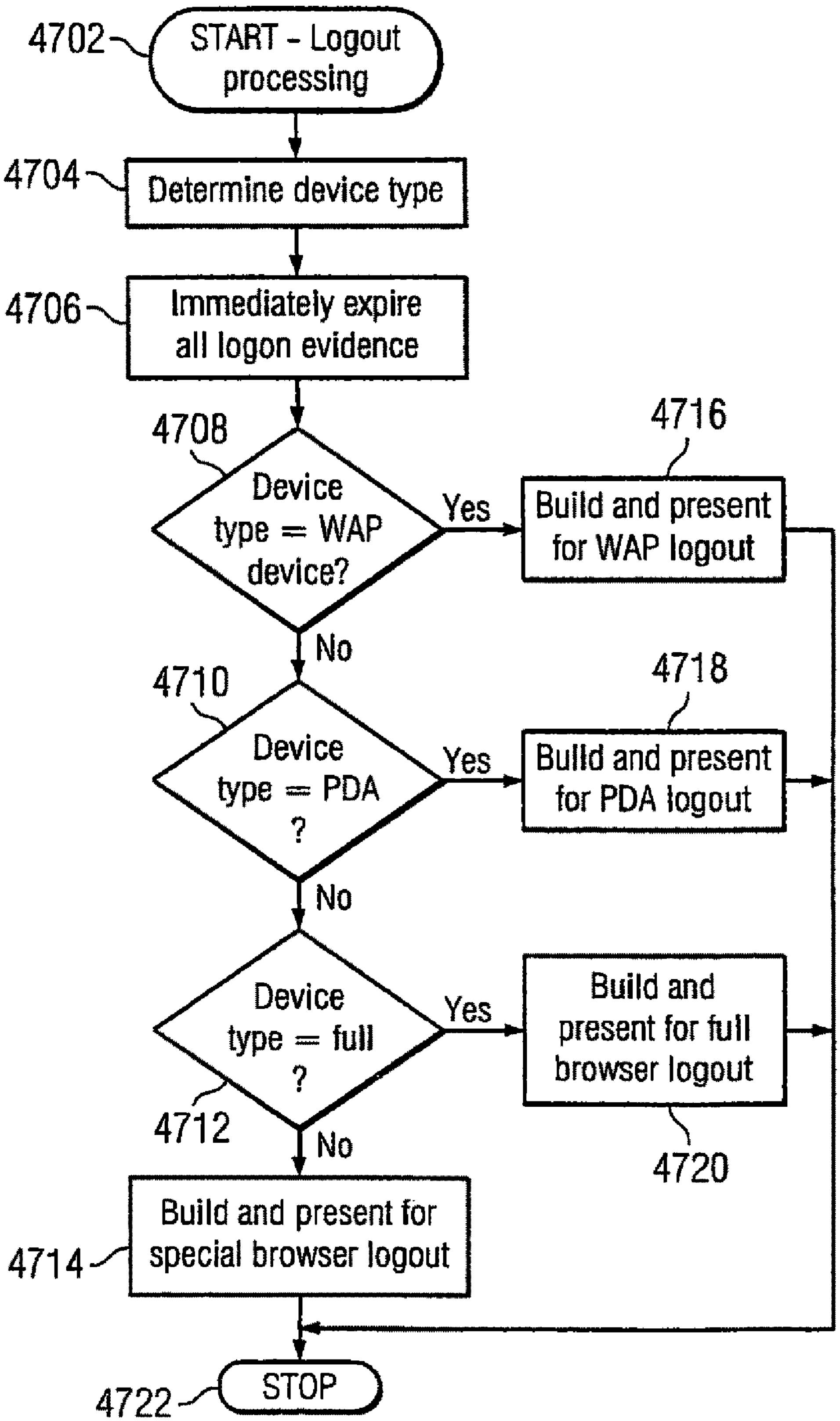
FIG. 47 depicts a flowchart for a preferred embodiment of the web service logout processing resulting from user interaction to the logout user interface from heterogeneous devices.
Figure 48A:
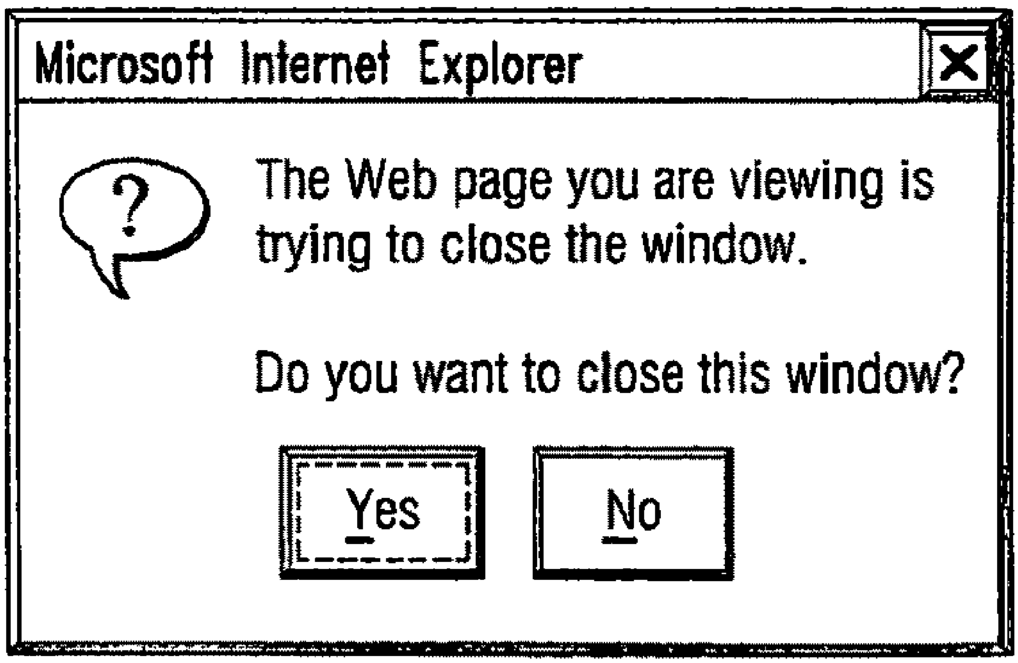
FIG. 48A depicts a preferred embodiment screenshot for the interface presented after a successful logout from the web service from a full browser.
Figure 48B:
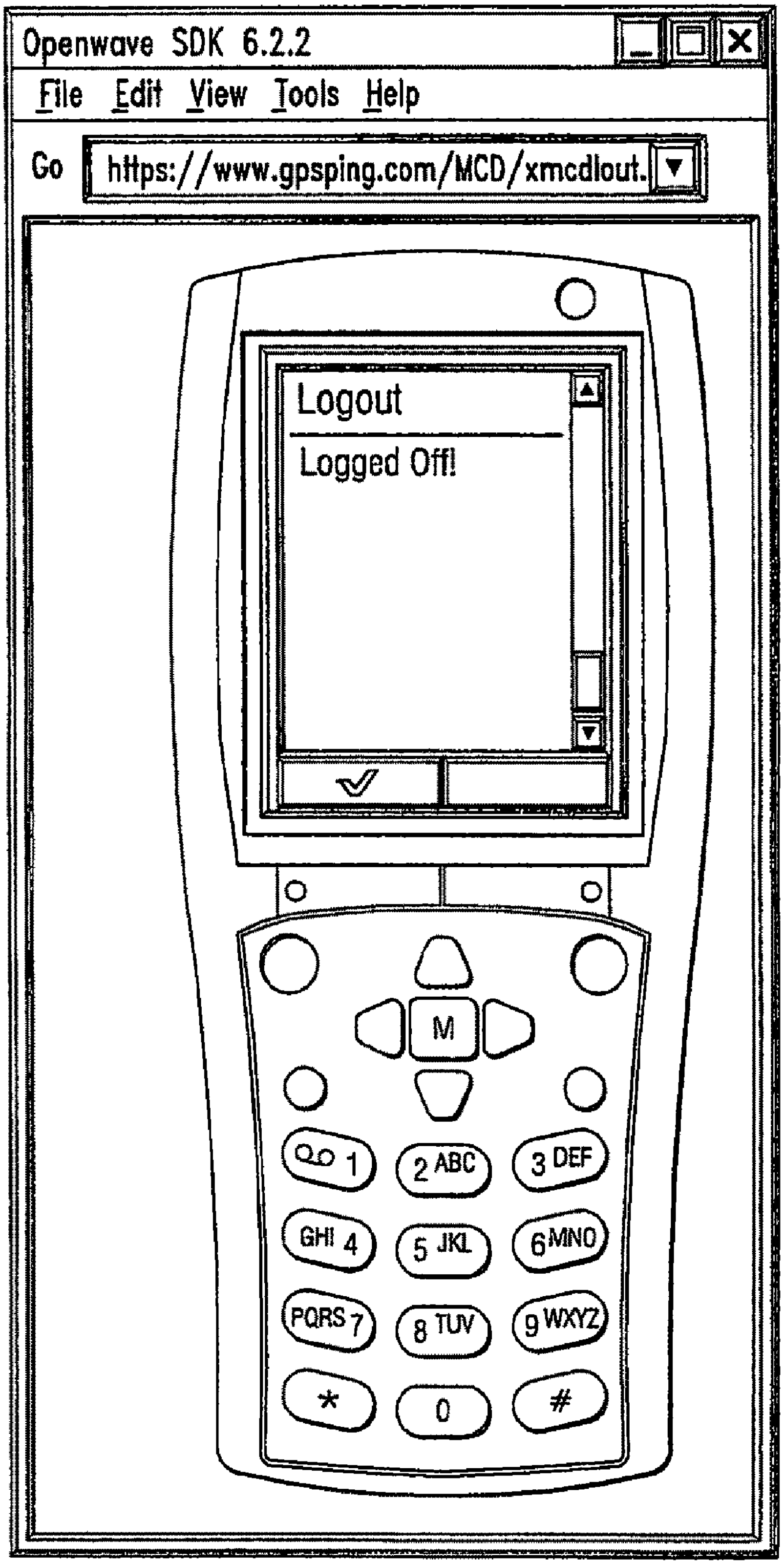
FIG. 48B depicts a preferred embodiment screenshot for the interface presented after a successful logout from the web service from a microbrowser, for example on a cell phone.

FIG. 47 depicts a flowchart for a preferred embodiment of the web service logout processing resulting from user interaction to the logout user interface from heterogeneous devices. Processing starts at block 4702, for example when clicking logout option 4666, and continues to block 4704 where the device type (or browser type) is determined. Thereafter, block 4706 immediately expires all successful logon data evidence and remember me data evidence (thereby removing the data evidence as though the user has never successfully logged on before) and block 4708 is the first check to communicate back a successful logoff to the requesting device. If block 4708 determines the device type (or browser type) to be a WAP device (e.g. cell phone), then block 4716 builds and presents back to the user a logoff page, for example FIG. 48B. If block 4708 determines the device type (or browser type) is not a WAP device, then processing continues to block 4710. If block 4710 determines the device type (or browser type) to be a PDA device, then block 4718 builds and presents back to the user a logoff page that simply closes out the current page interface. If block 4710 determines the device type (or browser type) is not a PDA device, then processing continues to block 4712. If block 4712 determines the device type (or browser type) to be a full browser device, then block 4720 builds and presents back to the user a logoff page, for example FIG. 48A, for simply closing out the current page interface. If block 4712 determines the device type (or browser type) is not a full browser device, then processing continues to block 4714 for building and presenting back to the user a logoff page for simply closing out the current page interface of the special device as determined. Blocks 4716, 4718, 4720, and 4714 each continue to block 4722 where processing terminates. CD-ROM file name "xmcdlout.asp" provides an ASP program source code listing for a members area logoff embodiment of FIG. 47.

Figure 49A:
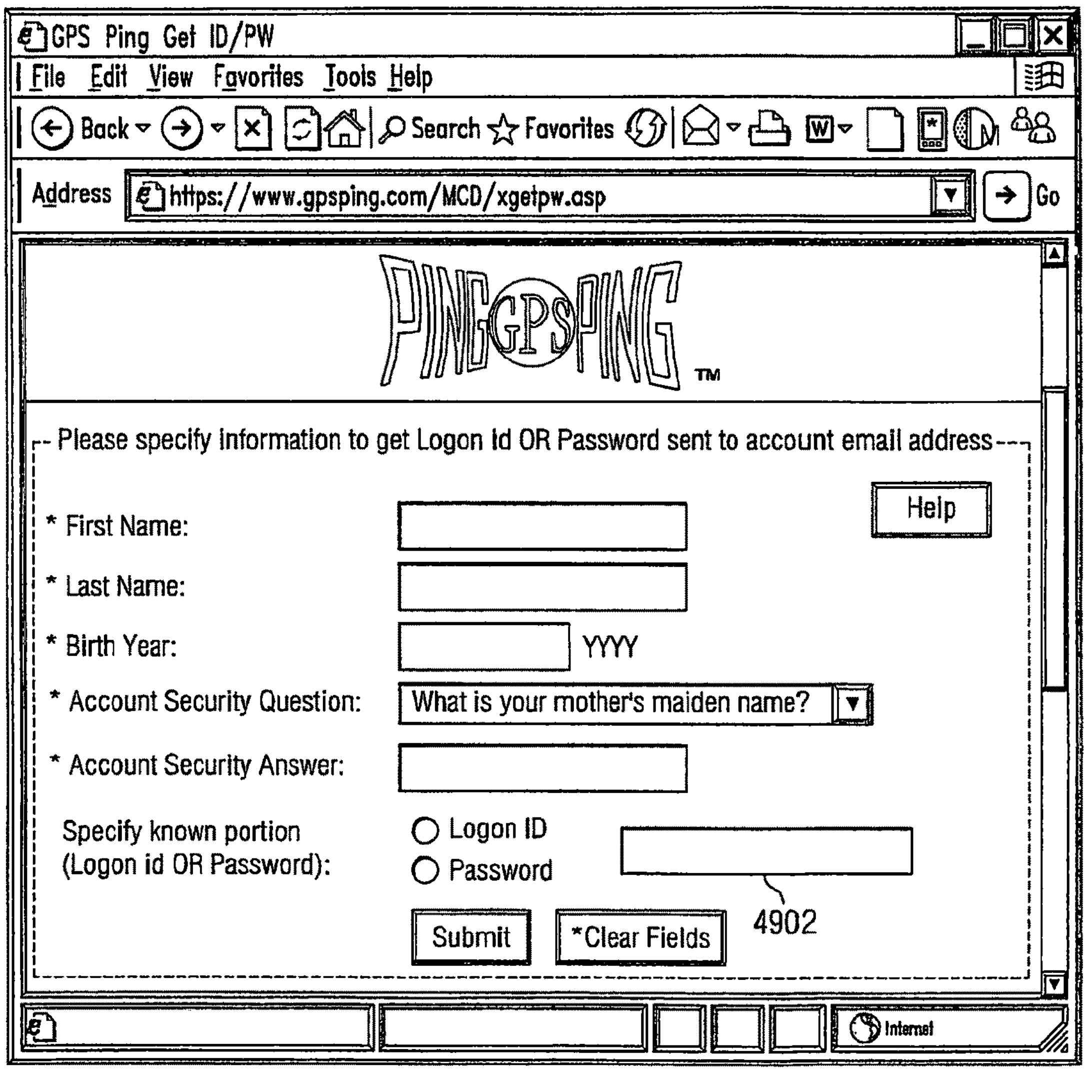
FIG. 49A depicts a preferred embodiment screenshot for the interface presented to a full browser after a user requests to discover a password or user logon name for an account in the web service.
Figure 49B:
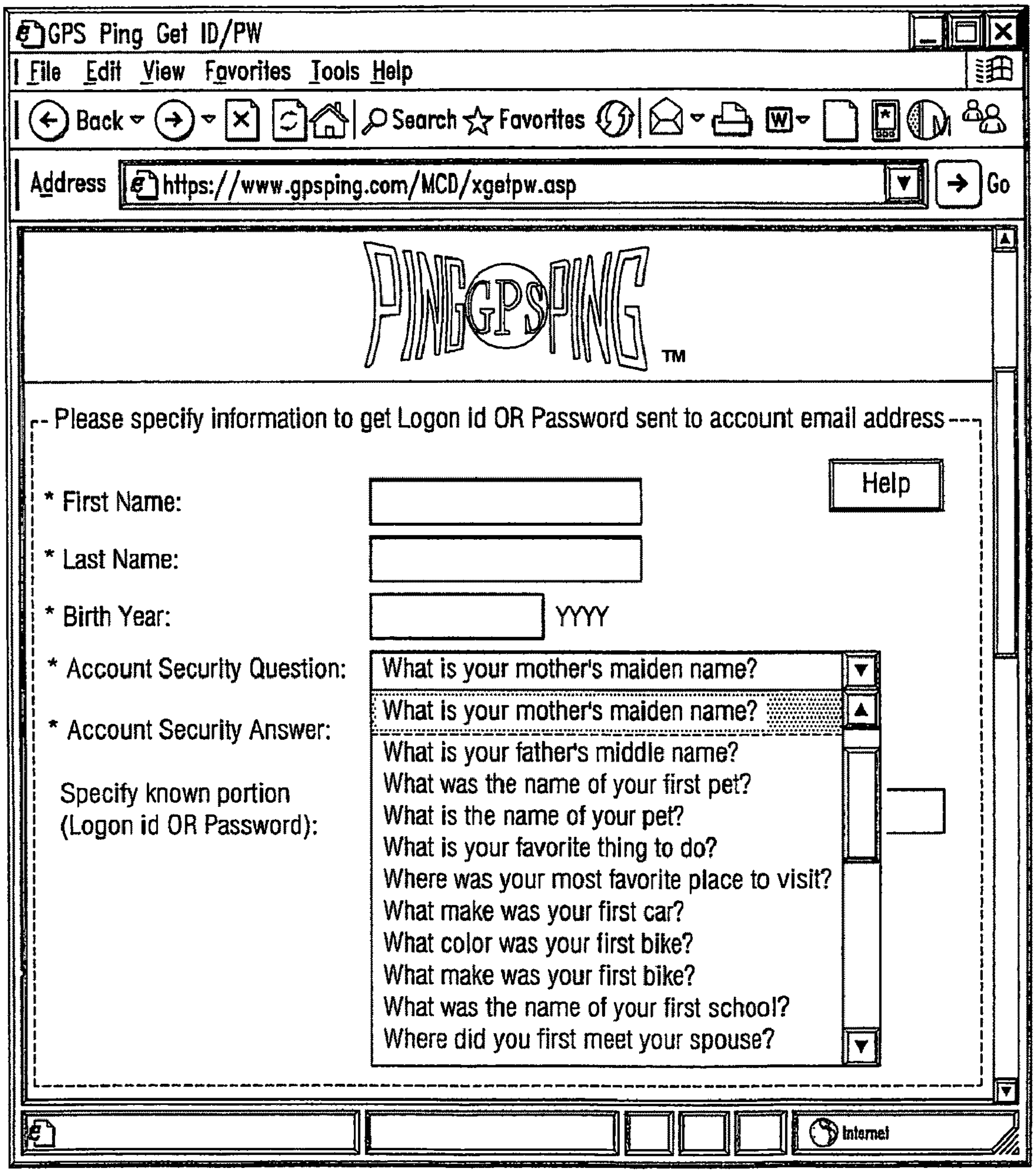
FIG. 49B depicts the account security question dropdown options in the preferred embodiment screenshot for the interface presented to a full browser after a user requests to discover a password or user logon name for an account in the web service.

FIG. 49A depicts a preferred embodiment screenshot for the interface presented to a full browser after a user requests to discover a password or user logon name for an account in the web service (e.g. clicking memory lapse link 4008). The user enters his first and last name, birth year, account security question and answer, and then specifies the logon name or password in known portion field 4902. The correct radio button must be selected which describes data entered to known portion field 4902. All fields specified by the user to FIG. 49A must match corresponding record 2900/3000 fields for the user. FIG. 49B depicts the account security question dropdown options in the preferred embodiment screenshot for the interface presented to a full browser after a user requests to discover a password or user logon name for an account in the web service. The user selects the option from the pulldown that will match security question field 2976 of his record 2900 and then answer it with a match to the "SecAns" field of record 2900 which was populated as a required field at registration time.

Figure 49C:
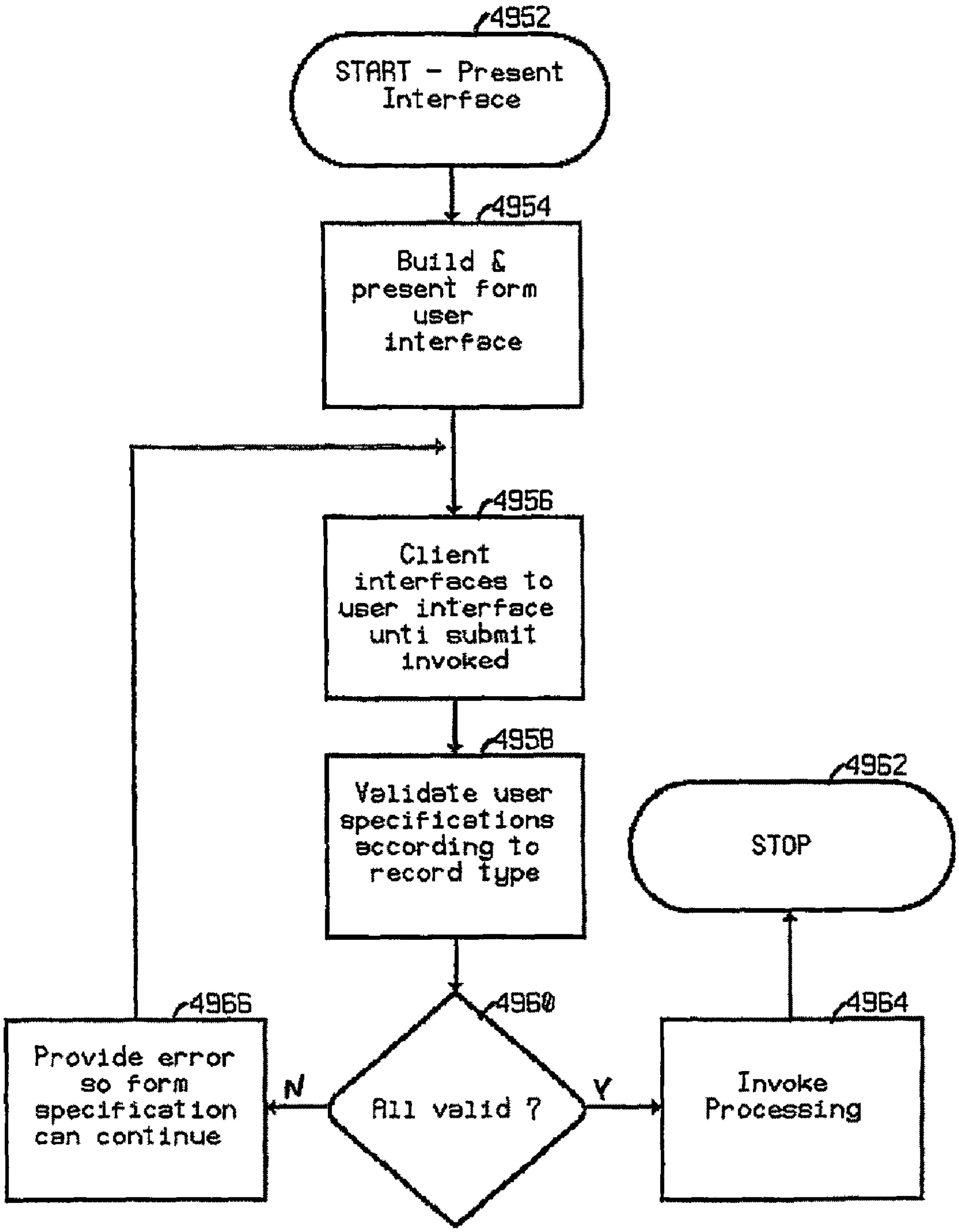
FIG. 49C depicts a flowchart for a preferred embodiment of carrying out processing for presenting a web service user interface form and then processing user specifications to the interface prior to submitting to the service for further processing.

FIG. 49C depicts a flowchart for a preferred embodiment of carrying out processing for presenting a web service user interface form and then processing user specifications to the interface prior to submitting to the service for further processing. Processing starts at block 4952 and continues to block 4954 where a user interface is presented to a user, for example FIG. 49A. Thereafter, the user interacts with the user interface at block 4956 until submit is invoked. Submit is invoked when form specifications are completed. Upon submittal, block 4958 validates user specifications according to the record type (e.g. FIG. 49A logon/password request form record) and block 4960 checks results. If block 4960 determines the fields are valid (and can be submitted for processing), then block 4964 invokes user specification processing and current page processing terminates at block 4962. If block 4960 determines that not all fields specified are valid, then block 4966 provides an error to the user so that specification can continue back at block 4956 (e.g. pop-up).

Figure 49D:
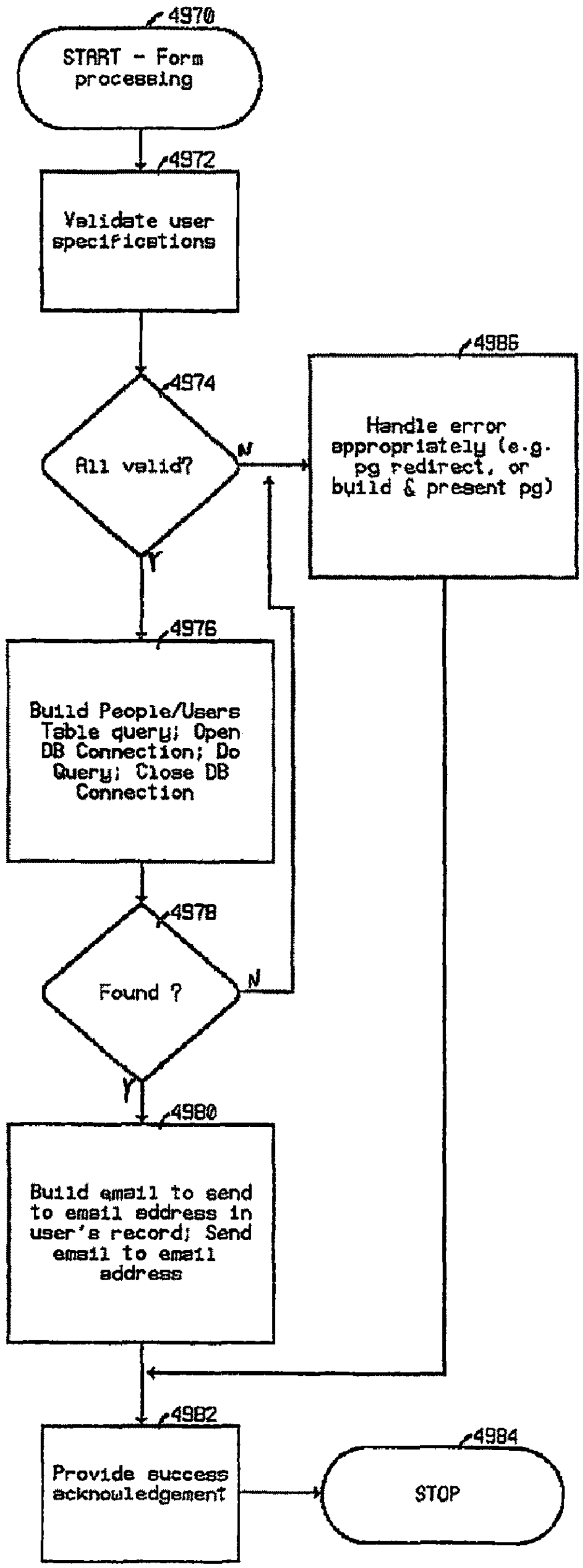
FIG. 49D depicts a flowchart for a preferred embodiment of carrying out form processing resulting from submission of user specifications for discovering an account password or user logon name.

FIG. 49D depicts a flowchart for a preferred embodiment of carrying out form processing resulting from submission of user specifications for discovering an account password or user logon name. Processing starts at block 4970, for example as the result of a block 4964, and continues to block 4972 for validating user specifications to FIG. 49A, and then to block 4974. If block 4974 determines all user specifications are valid, then block 4976 builds a People/Users table query to return the joined record from records 2900 and 3000 which match user specifications made to FIG. 49A. The query should return at least the user's email address and missing portion of credentials. Block 4976 opens a DB connection, does the query, and closes the DB connection. Thereafter, if block 4978 determines the user's information was found, then an appropriate email is built at block 4980 destined for the user's email address queried from record 2900 for containing the logon name or password from record 3000 as needed per specification to FIG. 49A. The query built at block 4976 will return the user's information if indeed all form specifications to FIG. 49A match for a query result. Block 4980 sends the email to the user, block 4982 provides a success acknowledgement to the user, and processing terminates at block 4984. The user is then free to navigate by closing the window, using the BACK key to a previous context, or navigating to another user interface context. This is true of all interfaces disclosed in this application. If block 4978 determines there was no matching joined record, or if block 4974 find an invalid user specification, then block 4986 handles reporting the error to the user in an appropriate manner, and processing terminates at block 4984. A preferred embodiment will enforce a maximum number of consecutive unsuccessful attempts to discover a missing logon credential portion from the same device using data evidence, in a similar manner to flowcharts above.

Figure 50A:
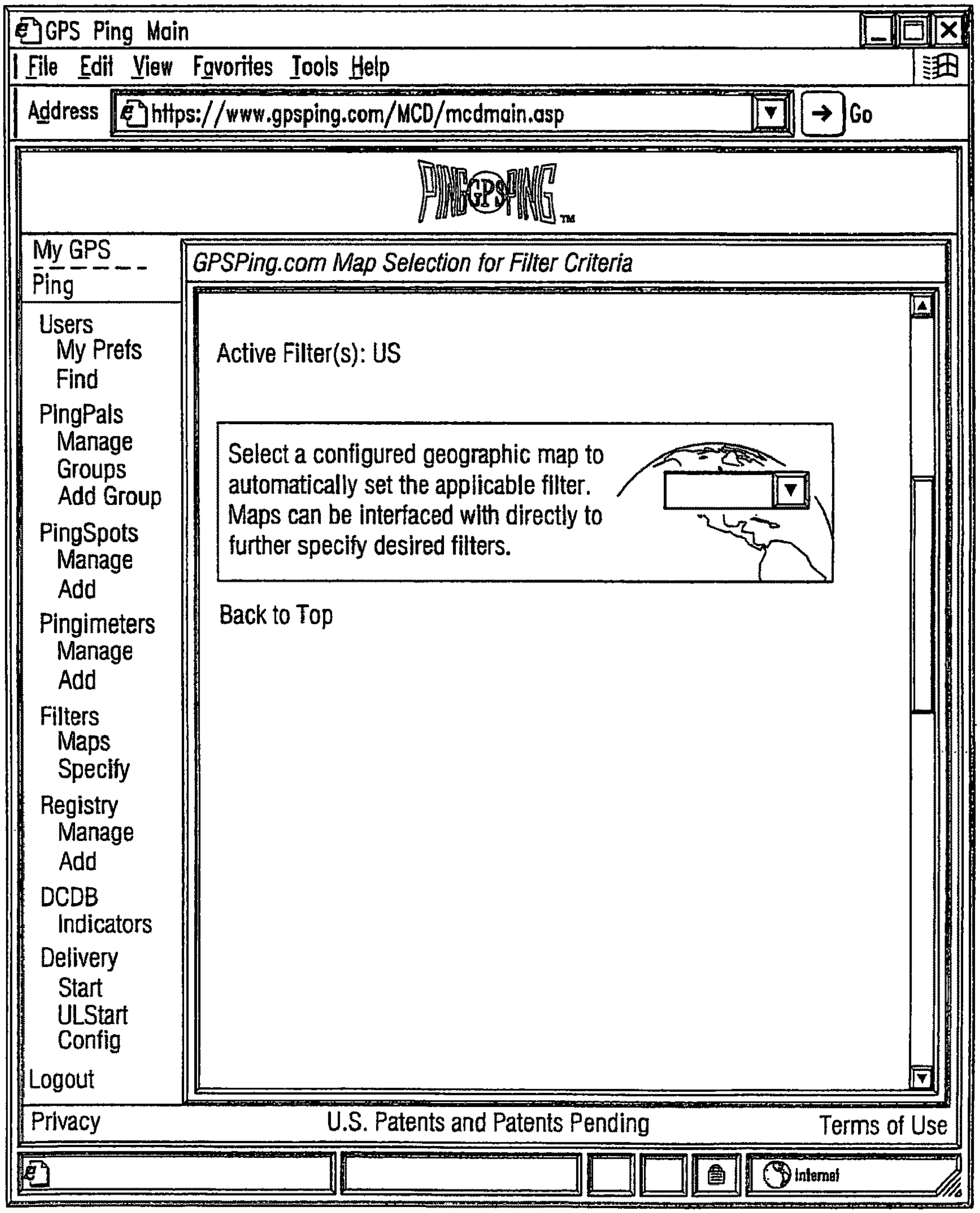
FIG. 50A depicts a preferred embodiment screenshot for logon success completion to the web service using a full browser when the user type is a Pinger.

FIG. 50A depicts a preferred embodiment screenshot for logon success completion to the web service using a full browser when the user type is a Pinger. FIG. 50A is identical in description as FIG. 46B except there are fewer options exposed to the user because the user type is a Pinger (using a full browser).

FIGS. 50B through 50E depict preferred embodiment screenshots for the Privileges option, such as upon clicking User Options Privileges option 4612. FIGS. 50B through 50E are actually presented to page content frame 4698 in an actual implementation of members area 2500 of web service 2102 upon clicking User Options Privileges option 4612. A user interface viewing area border 5050 simply shows the bounded and scrollable content that is presented to frame 4698. While information in these screenshots (FIGS. 50B through 50E) can be determined elsewhere in this disclosure, the reader can take the time to read the information in one place (FIGS. 50B through 50E) for a thorough understanding of user types and user type options privileges of the preferred embodiment members area 2500. FIGS. 50D and 50E show a preferred matrix for which user types get access to which options, and which device types (or browser types) get which options. Other embodiments will expose options differently. The matrix describes a preferred embodiment of 8 user types, each with a unique set of options privileges defined system wide. An End User is a user who can configure preferences for one or more associated receiving devices that can receive content according to the installation and configuration of the system. End Users use the Delivery Manager 2510. End Users are not required registered users (records 2900/3000) in members area 2500. Devices can be administrated for receiving content according to system defaults, or according to administrator configurations. While there are End Users using the devices, they need not be known to the system. End users are created when there are device users under a single Administrator account wanting to personalize behavior and preferences of their device(s) without having a members area 2500 registered account. There can be many End Users under a single Administrator account. Only device logon credentials are needed. A Content Provider is responsible for creating and maintaining deliverable content that is candidate for delivery to participating devices. The more enticing content made available, the more consumers will want to become Pingers. An Administrator is responsible for creating and maintaining eligible receiving devices. A Site Owner is a super user who has every option privilege possible in the system, and also has options privileges unavailable to other users of the system. A Delegate is a special option privilege for read-only (R/O) access to most options in the system. A Delegate is a potential customer for a web service 2102 installation, an investor, or someone provided with the option privilege to experience the members area 2500 in read-only mode. A Pinger is equivalent to an Administrator except a Pinger is a user who automatically becomes an Administrator for up to 3 devices through automated registration through the public site. A Pinger account is preferably free. The more Pingers to members area 2500, the more interest content providers will have in providing deliverable content. Members area 2500 provides a huge menu of enticing GPS features that make becoming a Pinger a great opportunity and service. A CP Gold (Content Provider Gold) account is equivalent to a Content Provider account except a CP Gold user automatically registers himself through the web service 2102 public website and preferably has a maximum of 1 content item that can be configured for a particular situational location at any time, and changed any time. A CP Platinum (Content Provider Platinum) account is equivalent to a Content Provider account except a CP Platinum user has a contractual number of content items that can be configured for particular situational locations with the ability to change them at any time. Content Providers are paying customers to web service 2102. Content items may be changed frequently, and instantly become activated for automated delivery. Another embodiment will limit a Pinger to a single device, and the credentials for it can be forced to match the user logon name and password credentials. Or, the Registry options exposed as discussed below force a maximum of a single RDPS (device) in the account.

The dark grey highlighting of cells in the table from FIGS. 50D to 50E indicate options preferably presented to a WAP device. The light grey highlighting indicates options added to the WAP device options for preferably presenting to a PDA device. The cells not highlighted indicate options added to the PDA device options for preferably presenting to any full browser device. Registry Add row 5002 with a "YES" value indicates the user type can add devices under his account up to a maximum as determined by MaxDevs field 3020. DCDB Add row 5004 with a "YES" value indicates the user type can add DCDB content items under his account up to a maximum as determined by MaxDCDB field 3022. Different embodiments will populate fields 3020 and 3022 based on different requirements, user types, etc.

Figure 50F:
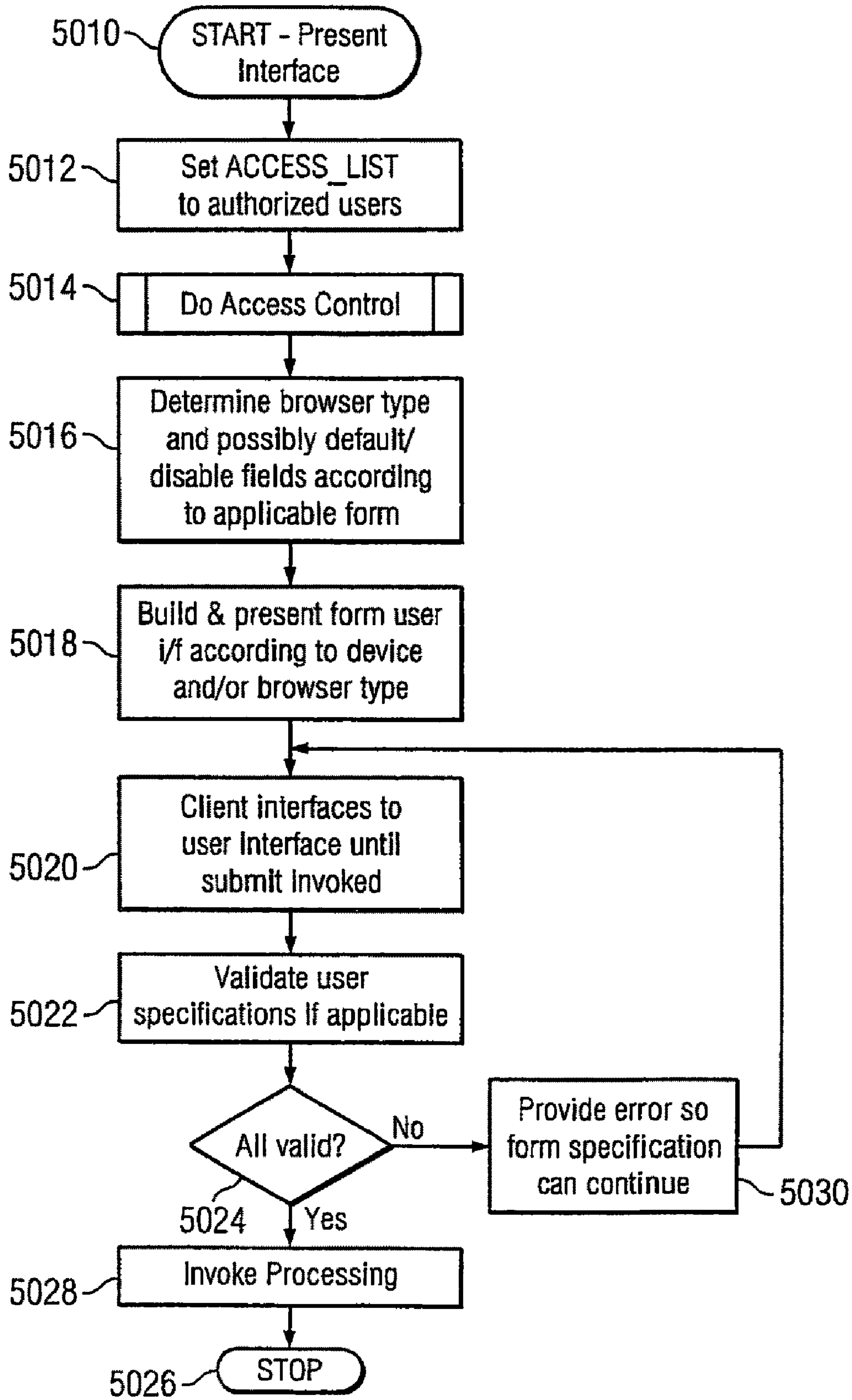
FIG. 50F depicts a flowchart for a preferred embodiment of carrying out processing for presenting a web service user interface form and then processing in accordance with user selectable actions of the user interface form.

FIG. 50F depicts a flowchart for a preferred embodiment of carrying out processing for presenting a web service user interface form and then processing in accordance with user selectable actions of the user interface form, for example a user interface of members area 2500. Processing starts at block 5010 and continues to block 5012 where the ACCESS_LIST (as discussed above) is set for authorized users (or authorized user types). Thereafter, block 5014 performs FIG. 39 access control processing and continues to block 5016 where the client device (or browser) type is determined and any defaulted fields of the user interface are set appropriately (automatically populated, defaulted, or disabled), and then block 5018 presents the user interface according to the device (or browser) type. Thereafter, a user interfaces with the user interface at block 5020 until a processing action is invoked from the page presented at block 5018. When an action is invoked by the user, block 5022 validates any applicable user specifications and block 5024 checks the results. Note that block 5014 access control processing will not continue to block 5016 if it is determined that the user should not have access to further processing of the FIG. 50F flowchart, just as described for FIG. 45 above. If block 5024 determines the fields are valid (and can be submitted for processing), then block 5028 invokes applicable action associated processing, and current page processing terminates at block 5026. If block 5024 determines that not all fields specified are valid, then block 5030 provides an error to the user so that specification can continue back at block 5020 (e.g. pop-up). Generally, FIG. 50F processing occurs at the user interface after selection (e.g. mouse clicking) of selectable options 4604 through 4670 for presenting the applicable interface (i.e. page). Other embodiments of blocks 5016 and 5018 will populate dropdowns, build queries for page field population, read cookies, or access any other data evidence to initialize a page. For example, Filters options 4636 and 4638 result in setting filter data evidence that gets accessed at block 5016 for automatically populating filter display field 5040 (FIG. 50G) and filtering any records associated with the context of the displayed page (discussed below).

Figure 50H:
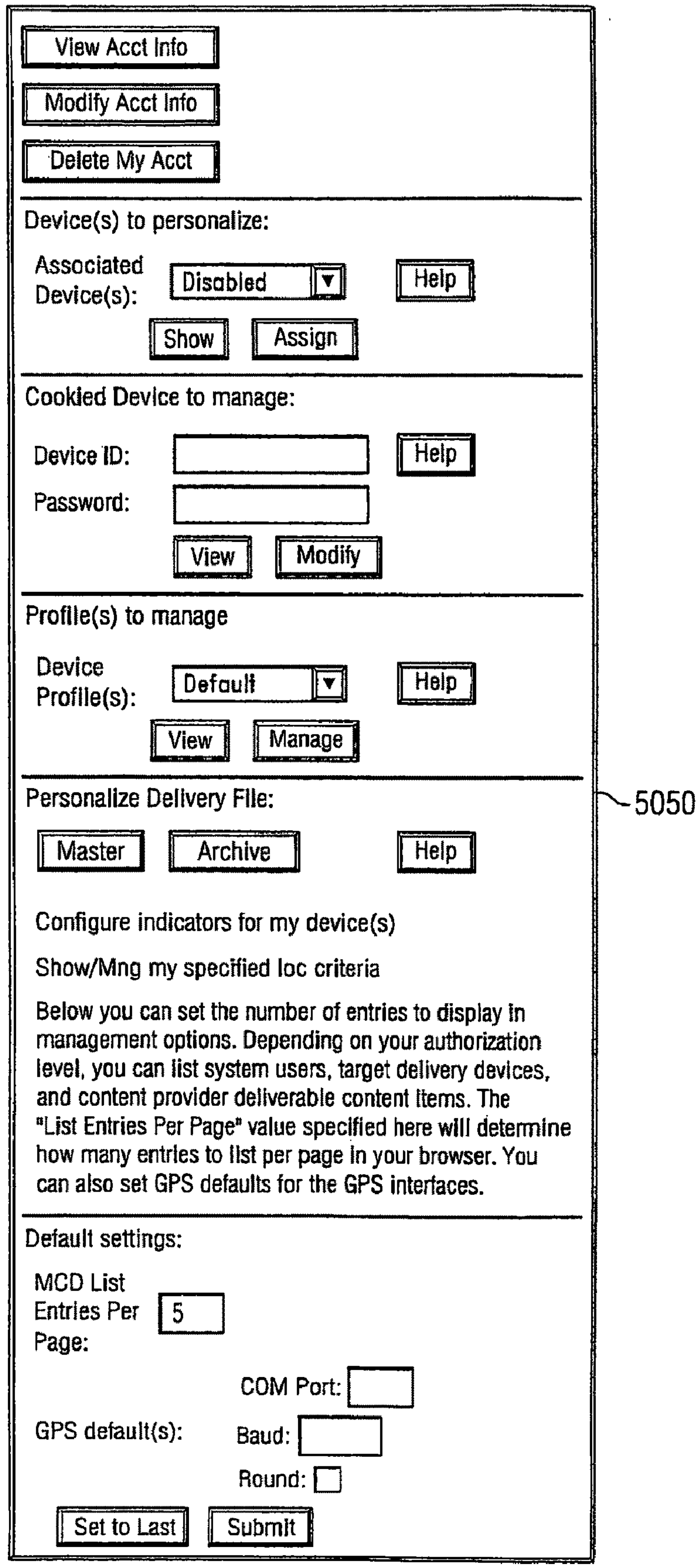
FIG. 50H depicts a preferred embodiment screenshot for the My Prefs option selected from a PDA browser.
Figure 50I:
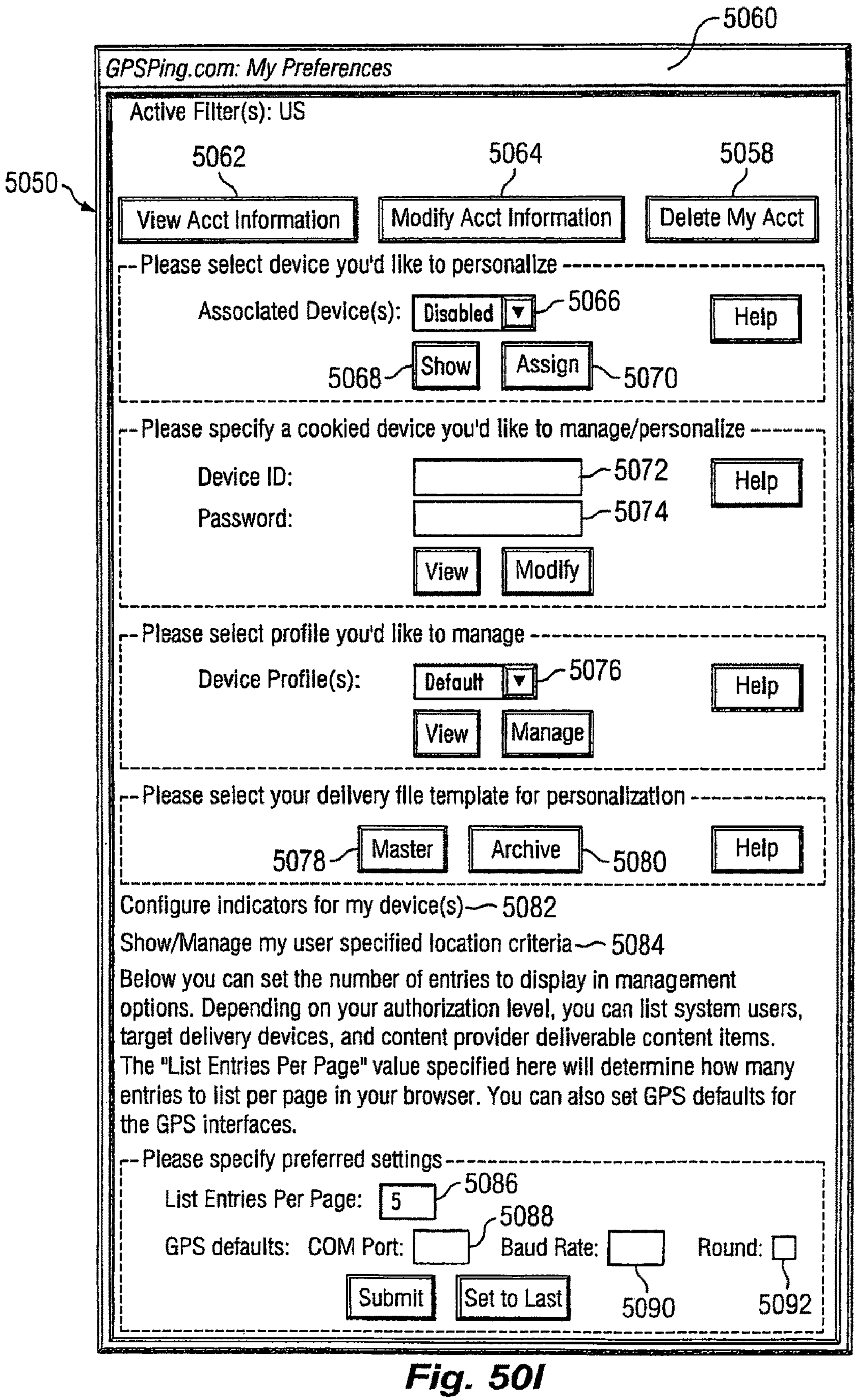
FIG. 50I depicts a preferred embodiment screenshot for the My Prefs option selected from an arbitrary device of supported heterogeneous devices.

FIG. 50G depicts a preferred embodiment screenshot for the My Prefs option selected from a full browser, as the result of selecting the Users My Preferences option 4606 from a full browser device. FIG. 50G shows the interface for a Pinger user type with a full browser device. Descriptions generally refer to FIG. 46B since all options are displayed for a Site Owner user type to a full browser. FIG. 50H depicts a preferred embodiment screenshot for the My Prefs option selected from a PDA browser, as the result of selecting the Users My Preferences option 4606 from a PDA device. A user interface viewing area border 5050 is a dark border around the user interface area. It should be understood that the page displayed within the viewing area bounded by border 5050 can be scrolled and interacted with depending on the device type. FIG. 50I depicts a preferred embodiment screenshot for the My Prefs option selected from an arbitrary device of supported heterogeneous devices, as the result of selecting the Users My Preferences option 4606. FIG. 50I is the preferred format for discussing user interfaces to heterogeneous devices. Border 5050 surrounds and identifies a user interface area regardless of the heterogeneous device type. Those skilled in the art will recognize that options 4604 through 4670 can result in a user interface with the same functionality, albeit with different appearances, sizes, formats and controls to do the same functionality. All user interface (page) descriptions hereinafter are referred to as a user interface that can be displayed to any heterogeneous device, for example as discussed in detail above. A user interface viewing area border 5050 simply shows scrollable content that is presented to a user by way of page content frame 4698, PDA device format such as FIG. 46D, cell phone format such as FIG. 46E, or any other presentation format to any heterogeneous device. It is redundant showing the minor differences between similar interfaces for the same option just to describe the same functionality to heterogeneous devices. Therefore, user interface discussions hereinafter refer to a page bounded by a border 5050 which is displayed, scrolled, interfaced to, and managed as appropriate for a particular device. Border 5050 need not be labeled in the figures since it is the rectangular dark line boundary around all screenshots hereinafter. The device type (or browser type) is also assumed to have been determined for appropriate processing. This allows focusing on the key aspects of the present disclosure. User interfaces (pages) preferably include a navigation context bar 5060 for indicating to a user what context in the members area 2500 the current page is being displayed, however, such information may or may not be presented to a device (e.g. in consideration of minimizing data communications).

Figure 51:
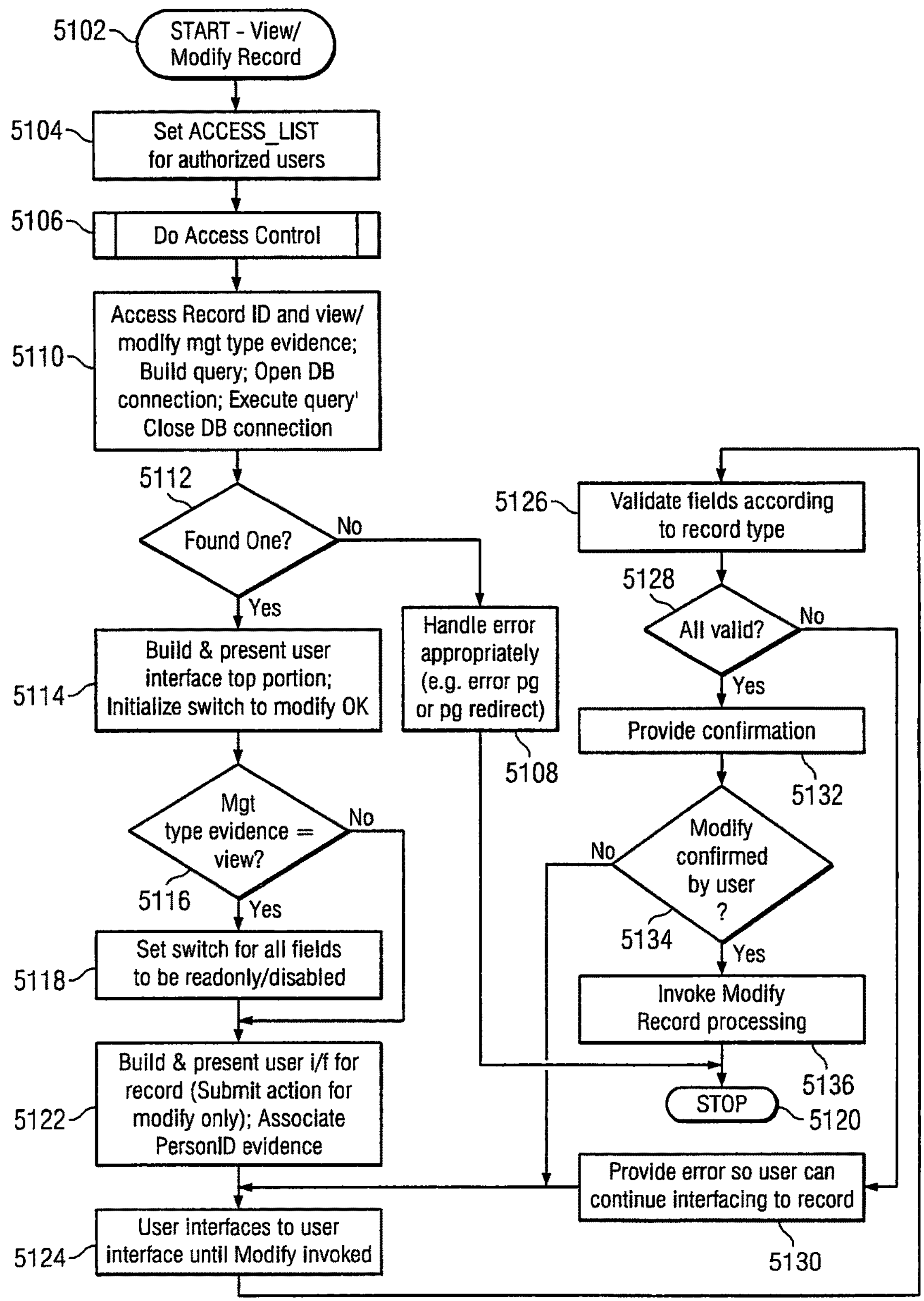
FIG. 51 depicts a flowchart for a preferred embodiment of carrying out processing for presenting the user interface to view or modify web service record information.

FIG. 51 depicts a flowchart for a preferred embodiment of carrying out processing for presenting the user interface to view or modify web service record information. For this discussion, FIG. 51 is discussed in context for registrant/member personal account information, as the result of selecting the view account information button 5062 or modify account information button 5064. View account information button 5062 enables every user to view their own records 2900 and 3000. Modify account information button 5064 enables every user to modify information in their own records 2900 and 3000. A user can delete his user account from web service 2102 with the delete account button 5058. Button 5058 is provided for the user removing himself from the web service 2102. This will delete the records 2900 and 3000 as well as any records 6500, 7000, etc, or any other record created by the user in web service 2102. This prevents relying on automated account deletion to remove obsolete users.

Figure 52A:
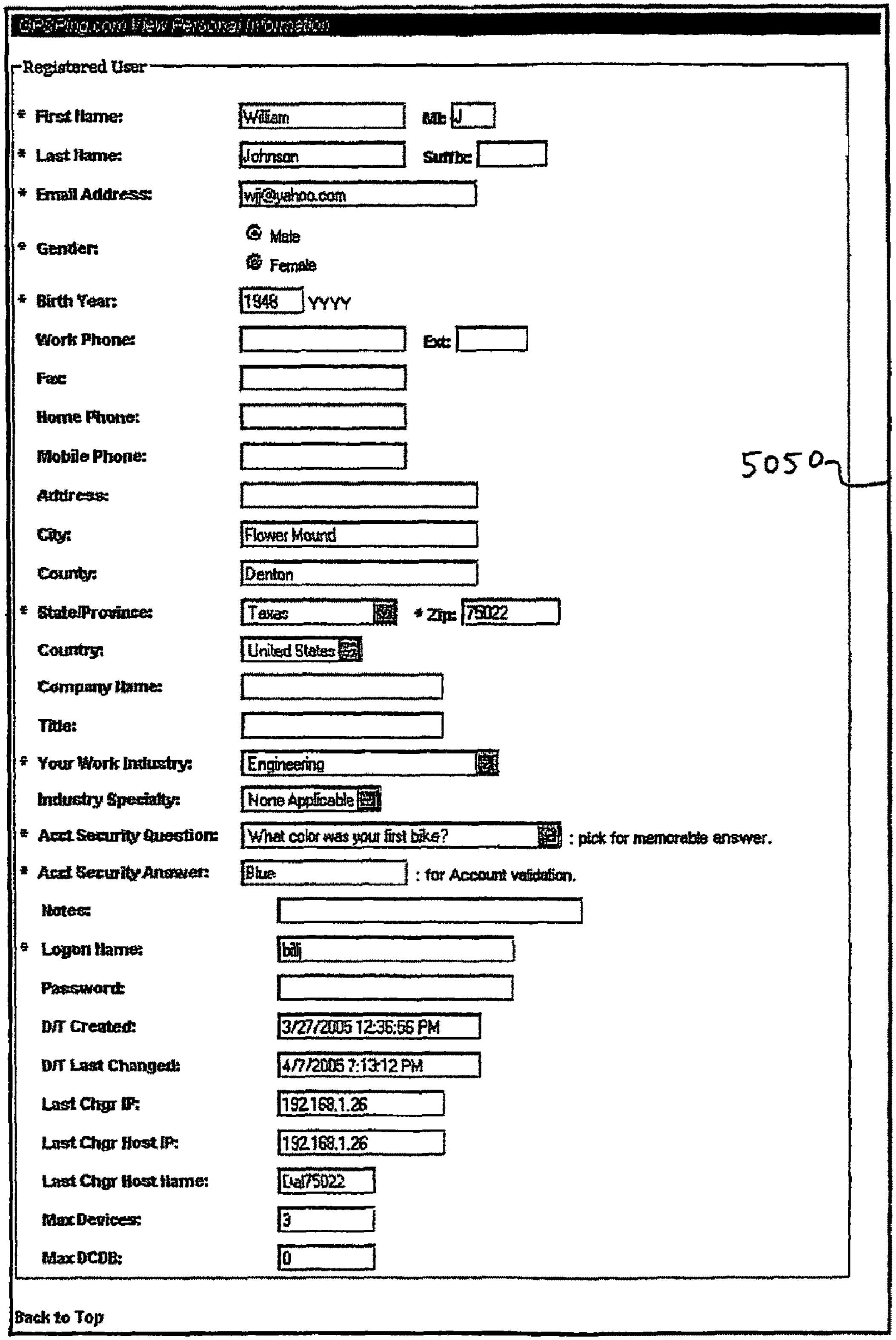
FIG. 52A depicts a preferred embodiment screenshot for viewing web service user account information.
Figure 52B:
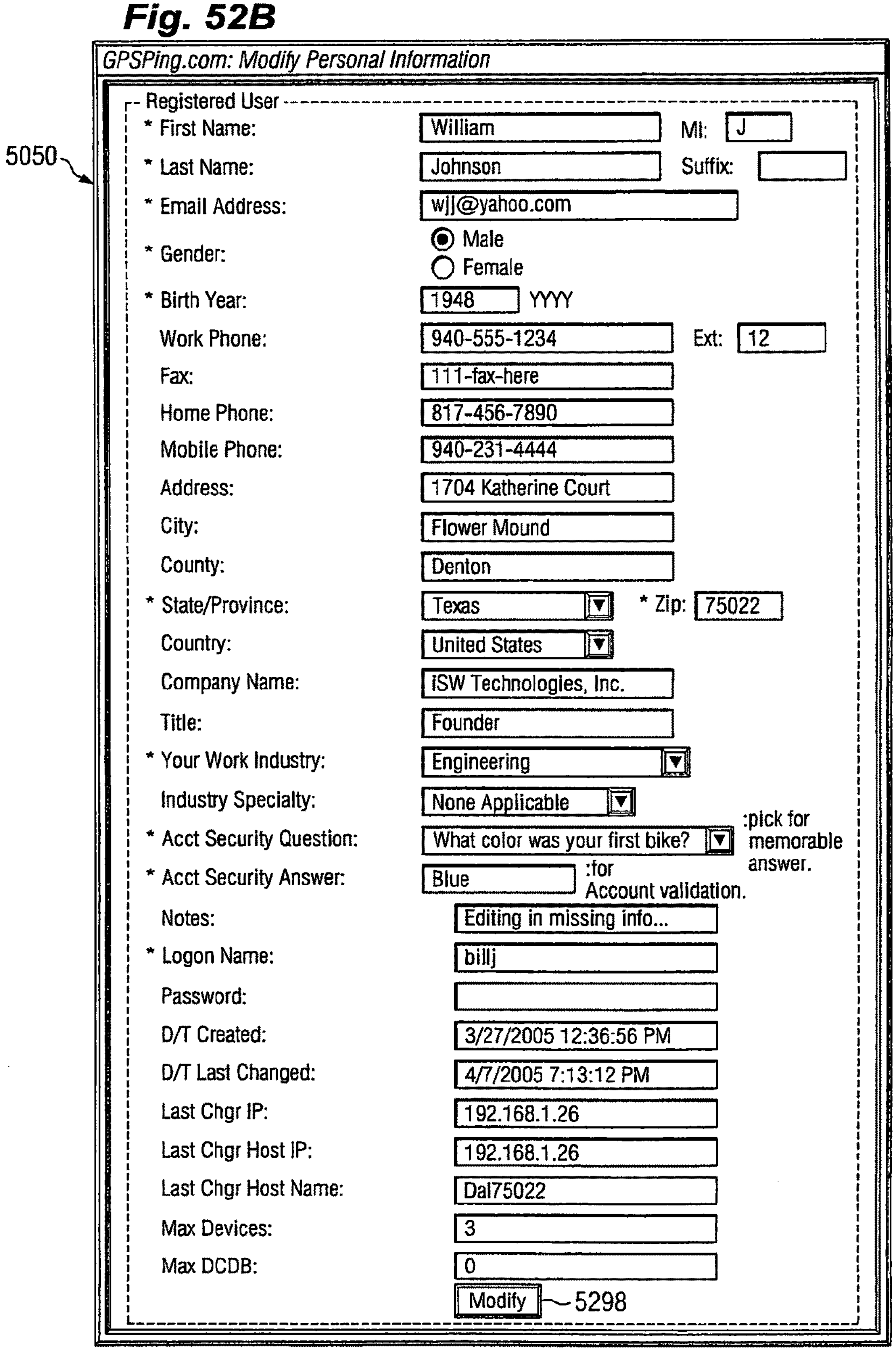
FIG. 52B depicts a preferred embodiment screenshot for modifying web service user account information.
Figure 52C:
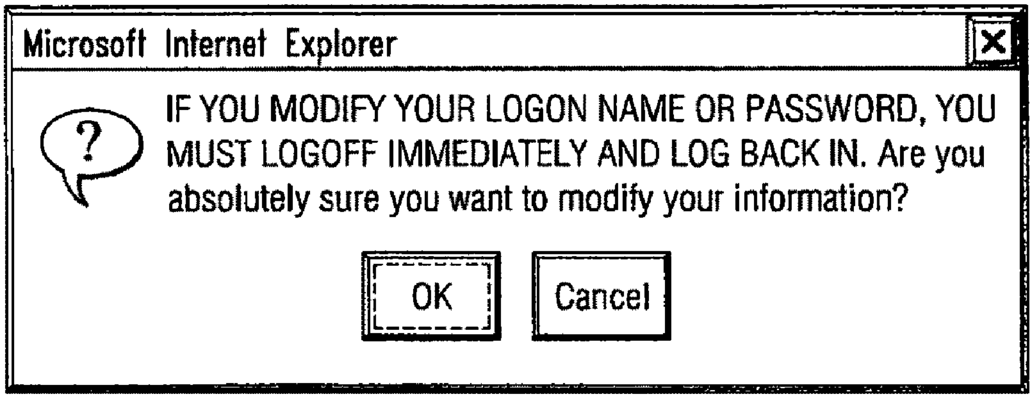
FIG. 52C depicts a preferred embodiment screenshot for a warning prompt when modifying a user account logon name or password.

Processing starts at block 5102 and continues to block 5104 where the ACCESS_LIST (as discussed above) is set for authorized users. Thereafter, block 5106 performs FIG. 39 access control processing and continues to block 5110 where record id evidence is accessed for reading the user's information. Record id data evidence is preferably passed as an argument in the form when selecting buttons 5062 or 5064. Record id data evidence is placed as a parameter in the form processing for the button when the page 501 is built and FIG. 39 access control processing makes it available to the page as the PersonID of the user accessing the page. Block 5110 then builds a table join query to read from the People Table and Users Table using the record id data evidence, opens a DB connection, does the query, and closes the DB connection. Thereafter, if block 5112 determines no record was found (unlikely since page access was just validated for this user), then block 5108 reports the error appropriately to the user interface, and processing terminates at block 5120. If block 5112 determines the query found the information, then block 5114 builds and presents the top portion of the page (e.g. FIG. 52A top portion), and initializes a read-only field switch to null (i.e. modify ok). Thereafter, block 5116 determines if FIG. 51 was invoked for view or modify. If block 5116 determines that the information is for view, then the read-only field switch is set at block 5118 to make all fields disabled (or readonly), otherwise the field switch remains set to null (i.e. " " for modify ok). For example, an html field definition embedded in VBScript such as:

<input name="fN" type="text" id="fN" value="<%= pfn %>" size="20"<%=dfld %>/> references the VBScript variable dfld (disable field) which elaborates to either a null value (i.e. do not disable the field) or the string of: disabled="disabled" (field is disabled). In this way, every html form construct that includes <%=dfld %> within its context can be disabled or available for edit. If block 5116 determines the information is for modify, then processing continues to block 5122 where the record interface is presented for modify (FIG. 52B). Block 5118 also continues to block 5122 where the record user interface is presented disabled (FIG. 52A). Block 5122 also presents a modify button 5298 if the fields are editable (i.e. information for modify as the result of selecting button 5064). Block 5122 also inserts a hidden field into the form of FIG. 52B so processing has record id data evidence (PersonID 2902/3002) of what gets modified. Thereafter, the user interfaces to block 5124 until the Modify button 5298 is invoked. If FIG. 52A is displayed for viewing, then block 5124 never exits to block 5126. The user has to use the browser back key, select a different selectable option 4604 through 4670, close the window, or perform another user interface action that may be available for the particular heterogeneous device. If FIG. 52B is displayed for modifying, then block 5124 continues to block 5126 when the Modify button 5298 is invoked upon interfacing to FIG. 52B. Block 5126 validates FIG. 52B form fields according to requirements of the record types 2900 and 3000. Thereafter, block 5128 determines if all fields are valid for processing, and if they are, then block 5132 provides a warning pop-up to ensure user information should be modified, for example as depicted in FIG. 52C. Thereafter, if block 5134 determines the information should be modified (acted on by user with confirm), then block 5136 invokes modify record processing (FIG. 53 processing), and block 5120 terminates processing for the current page. If block 5134 determines information should not be modified (user cancels), then processing continues back to block 5124. If block 5128 determines that not all fields are valid for processing, then block 5130 provides an error in such a way that user interface specification can continue back at block 5124. Fields of FIGS. 52A and 52B are easily associated to record fields 2900 and 3000.

Figure 53:
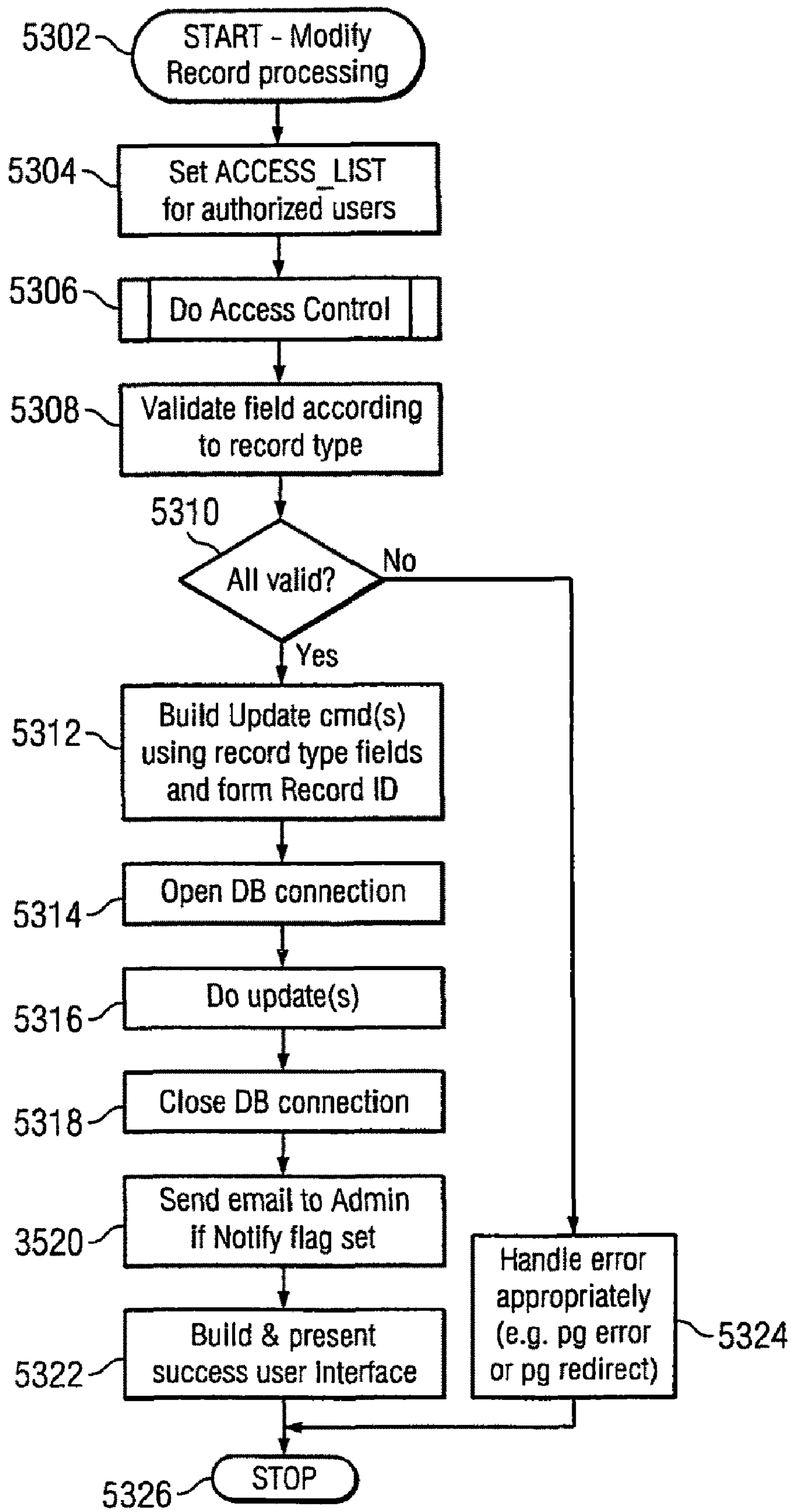
FIG. 53 depicts a flowchart for a preferred embodiment of processing for modifying web service record information.

FIG. 53 depicts a flowchart for a preferred embodiment of processing for modifying web service record information. For this discussion, FIG. 53 is discussed in context of modification processing of user account information. Processing starts at block 5302 and continues to block 5304 where the ACCESS_LIST (as discussed above) is set for authorized users. Thereafter, block 5306 performs FIG. 39 access control processing and continues to block 5308 where the form fields for the record information are validated according to record type (i.e. person record=People and Users Tables records=records 2900 and 3000), and then results are checked at block 5310. If any field is found invalid for processing at block 5310, then block 5324 reports the error appropriately to the user interface, and processing terminates at block 5326. If all fields are found to be valid at block 5310, then block 5312 builds update commands for the People Table and Users Table using fields from the form where the PersonID equals the record id data evidence passed for processing. Thereafter, block 5314 opens a DB connection, block 5316 does the updates, and block 5318 closes the DB connection. Thereafter, block 5320 sends an alert email to an Administrator account if a Notify flag is enabled to document this type of database update, block 5322 builds and serves back a success interface (e.g. FIG. 54A) to the user, and processing terminates at block 5326. Users can change their LogonName field 3004 and/or password field 3006. A uniqueness key or constraint on LogonName field 3004 prevents more than one user from using the same LogonName. Obvious error processing not shown in flowcharts would report the error as a unique key error (logon name already in use), and the user could then try another LogonName.

If the user modifies his email address, a re-verification should be performed to ensure the email address is valid for the user. Email address data evidence is preferably placed as a hidden field in the form of FIG. 52B to compare with any user update of the email entry field in the form after submission. Block 5308 will detect the difference before continuing to block 5310. Assuming all form fields are valid, then block 5310 will continue to a block 5311 for checking for and responding to a difference. If there is a difference, then block 5311 sends a randomly generated confirmation code to the new email address, presents FIG. 32A, and waits for a user response to FIG. 32A (verification processing was described above). If the user fails to enter the correct confirmation code at block 5311 user interface processing within a reasonable number of attempts, then user account modification processing continues to block 5324 for handling the error. If the user enters the correct confirmation code at block 5311 user interface processing, then processing continues to block 5312 for doing the updates. A uniqueness key or constraint on the Email field prevents more than one user from using the same Email address. Obvious error processing not shown in flowcharts would report the error as a unique key error (email address already in use), and the user could then try another Email address (an unlikely error). Another embodiment will simply make the email address disabled/read-only for user account modifications, in which case an account would have to be deleted and re-created through registration with a new email address.

Figure 54A:
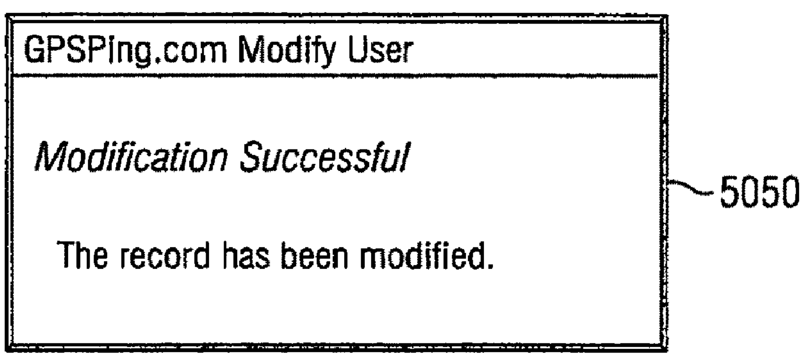
FIG. 54A depicts a preferred embodiment screenshot for successful completion of modifying web service record information.
Figure 54B:
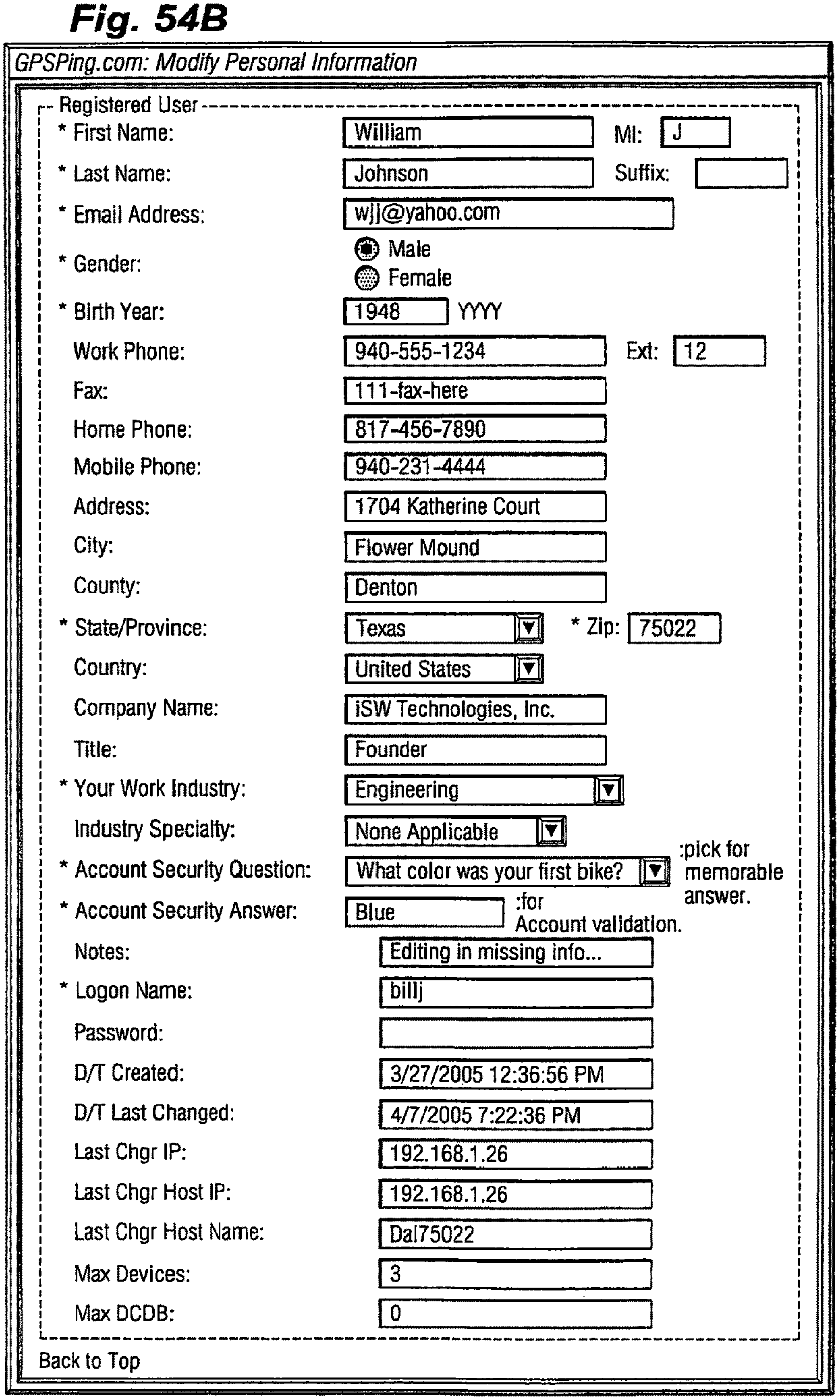
FIG. 54B depicts a preferred embodiment screenshot for viewing web service user account information.

FIG. 54A depicts a preferred embodiment screenshot for successful completion of modifying web service record information, for example the record information modified as discussed in FIG. 53. FIG. 54B depicts a preferred embodiment screenshot for viewing web service user account information. FIG. 54B is arrived to by way of invoking button 5062. Note that FIG. 52A demonstrates the user's information before it is modified, FIG. 52B demonstrates the user's information has been edited just prior to submitting it with modify button 5298, and FIG. 54B demonstrates a view of the user's information after it has been modified. Every user to members area 2500 can maintain their registrant information through the My GPS component 2502 with buttons 5062 and 5064 via the Users My Preferences option 4606. The My GPS component 2502 is the main interface to members area 2500 for each user, and it includes the set of options available to all users regardless of user type.

Figure 59C:
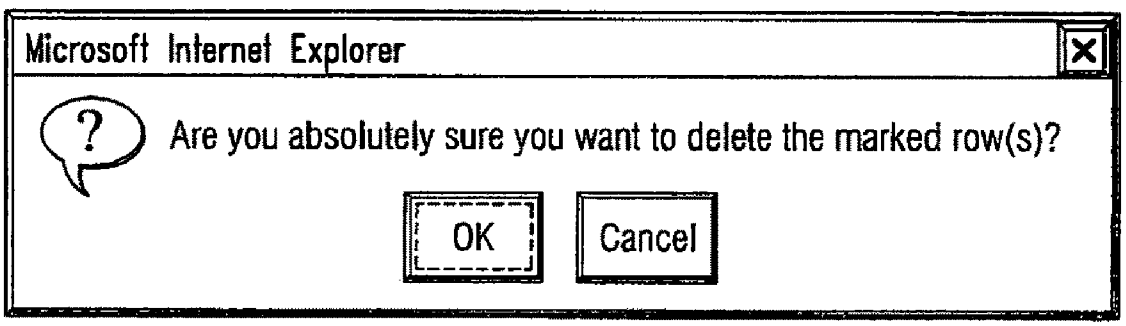
FIG. 59C depicts a preferred embodiment screenshot for a warning prompt for deleting one or more marked records.
Figures 60, 60A:
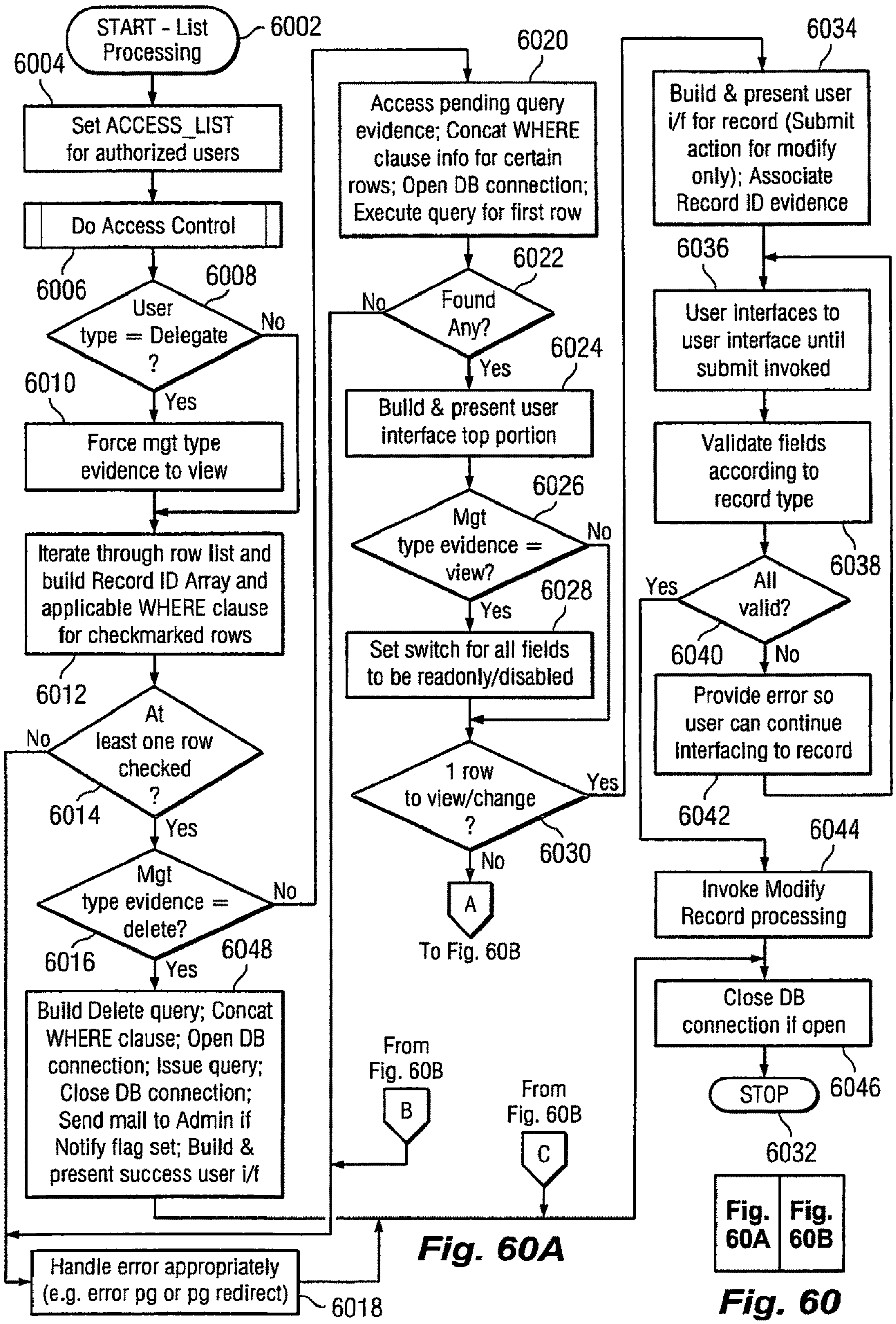
FIG. 60 depicts a flowchart for a preferred embodiment of search result list processing of records of the web service.
Figure 60B:
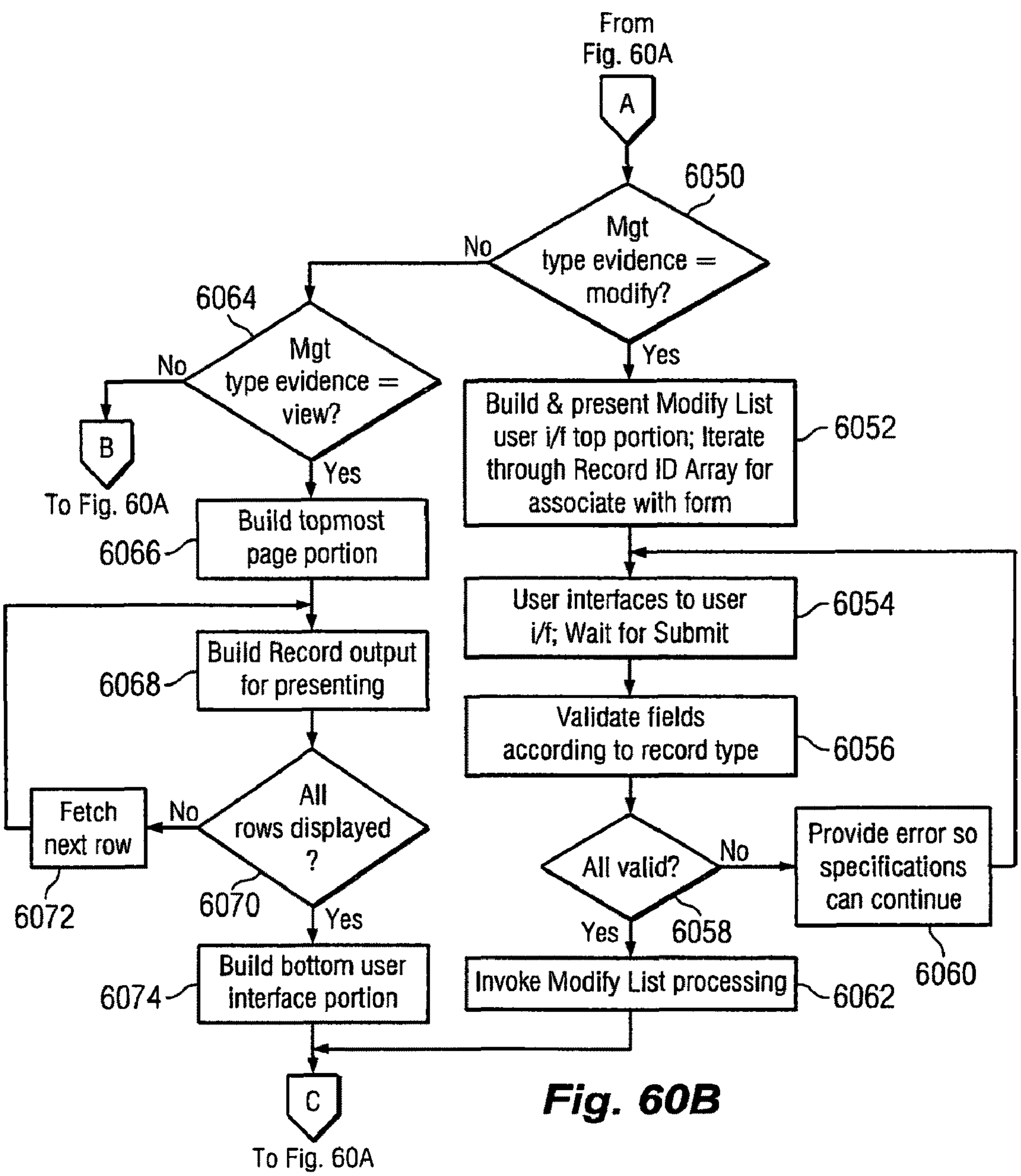

Button 5058 invokes FIG. 60 processing for a single record id data evidence (PersonID field 2902/3002 of user) to be deleted, preferably after the user responds affirmatively to a prompt (e.g. FIG. 59C) produced by client side processing for FIGS. 50G through 50I. FIG. 60 can enforce attack prevention at block 6048 to ensure nobody except a Site Owner deletes other user records (e.g. using UserType field 2980 and PersonID 2902/3002 from FIG. 39 access control with RecordID 2902/3002 passed for deletion). See FIG. 60 discussions below.

Users Management

A Site Owner user type can manage user information of other users of the members area 2500 through Users Management component 2512. Users management component 2512 comprises the selectable Users Management option 4610 under Users options category header 4604. In another preferred embodiment, there is no option 4610 for a human to manage user account records. The fully automated web service 2102 does not need such an option. Users Management option 4610 is provided for enabling a human to change information in other person records, for example, UserType field 2980, fields 3004, 3006, 3008, 3020, 3022, or any other fields of any record in the People and Users tables (records 2900 and 3000). An SQL administrator could use a query manager (e.g. SQL Server Enterprise manager) to directly manage any records in the SQL database, but that may be inconvenient. So, a convenient scalable web interface is provided to web service 2102 for managing user records from anywhere in the world over the internet by way of https over an encrypted Secure Sockets Layer (SSL) connection. An SSL connection is the preferred method for accessing members area 2500.

Figure 55:
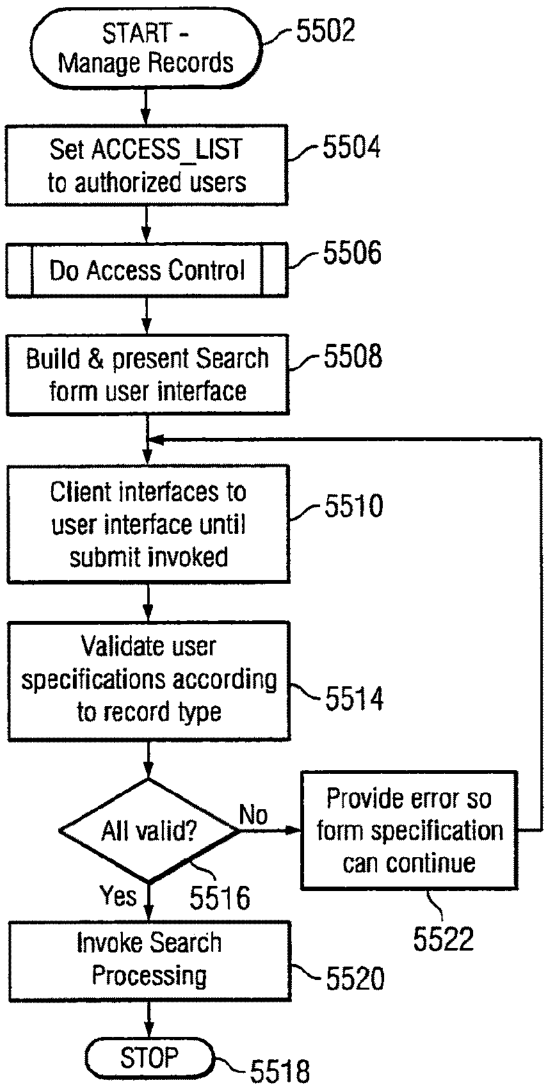
FIG. 55 depicts a flowchart for a preferred embodiment of processing for managing records of the web service.
Figure 57B:
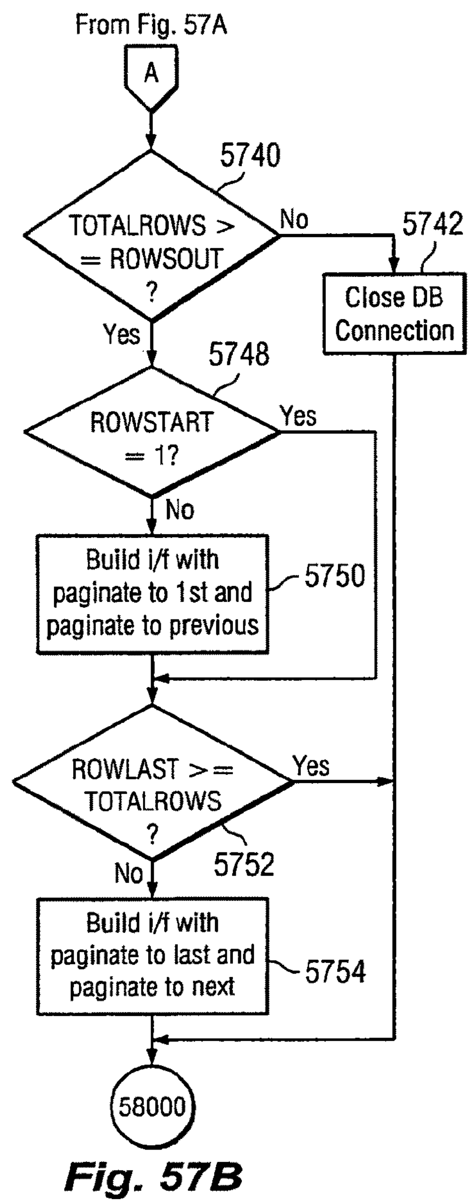
FIGS. 57 and 58 depict flowcharts for a preferred embodiment of search processing of records of the web service.

FIG. 55 depicts a flowchart for a preferred embodiment of processing for managing records of the web service. For this discussion, user information records are discussed as being managed, for example upon clicking Users Manage option 4610. Processing starts at block 5502 and continues to block 5504 where the ACCESS_LIST (as discussed above) is set for authorized users. Thereafter, block 5506 performs FIG. 39 access control processing and continues to block 5508 where the search form interface is built and presented to the user, for example the search interface of FIG. 56A. Thereafter, a user interfaces with the search interface at block 5510 until a search action is requested, for example by search button 5602. When the search action is requested by the user, block 5514 validates any applicable user specifications and block 5516 checks the results. If block 5514 determines the fields are valid (and can be submitted for processing), then block 5520 invokes search processing of FIG. 57, and current page processing terminates at block 5518. If block 5516 determines that not all fields specified are valid, then block 5522 provides an error to the user so that specification can continue back at block 5510 (e.g. pop-up). Any pending Filters Management component settings made by the user further filter records found by the search interface.

Figure 56A:
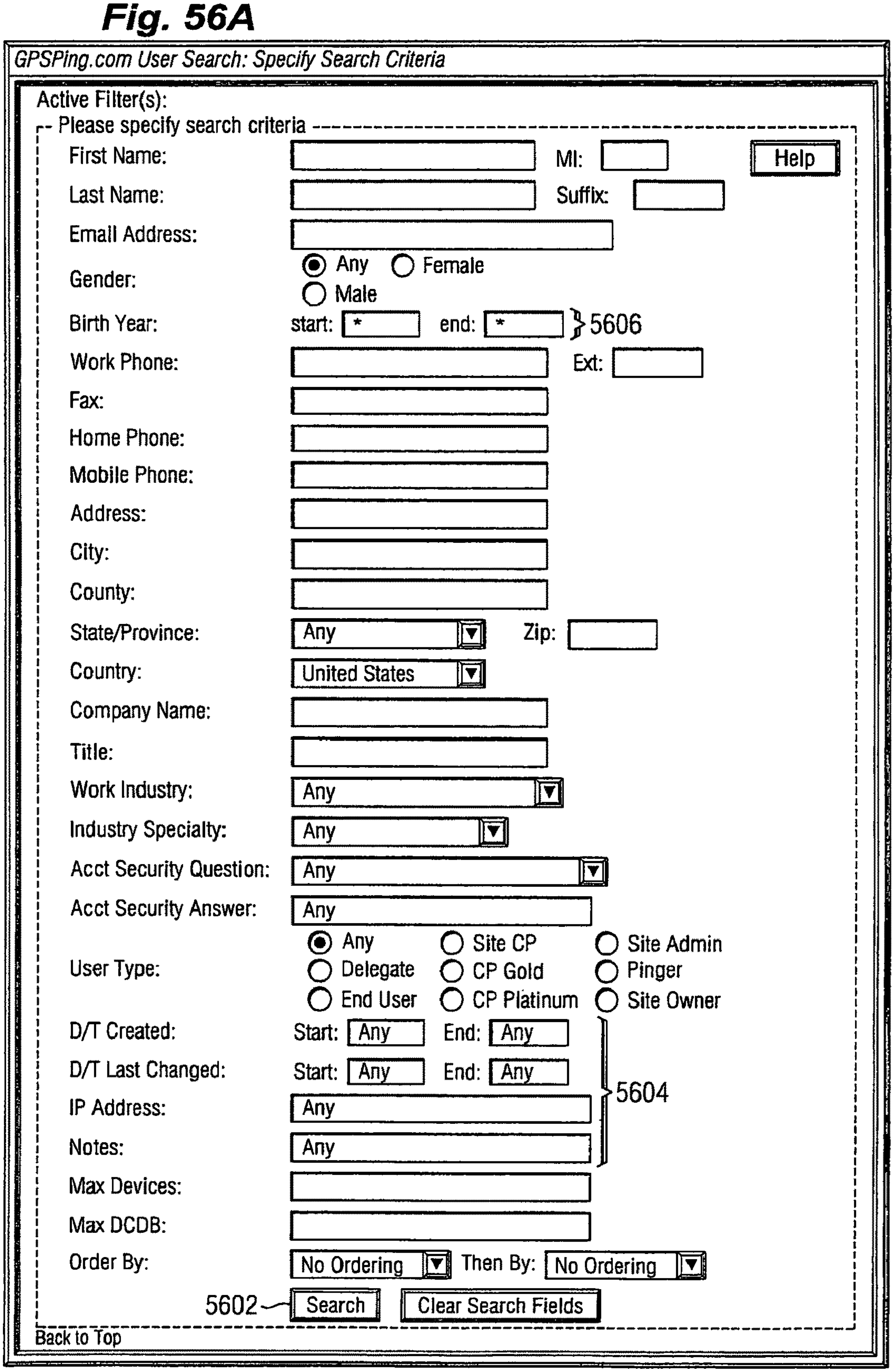
FIG. 56A depicts a preferred embodiment screenshot for searching for web service user registrant/member account records.

FIG. 56A depicts a preferred embodiment screenshot for searching for web service user registrant/member account records. By default, FIG. 56A finds all records in the database including as described by active filters from Filters Management component 2506. As soon as data is entered to a field of the FIG. 56A search form, or selects a value other than "Any", the search result is narrowed accordingly. Search fields of FIG. 56A are easily identifiable to records 2900 and 3000. All fields of records 2900 and 3000 may be searchable, or any subset thereof, in other embodiments. Defaulted fields 5604 and 5606 may be disabled by block 5508 as the result of first querying the total count of user records in the database, and determining that there are less than a website installed search minimum (e.g. 10). This limits the search criteria options since there are so few records that a search almost doesn't make sense. Any subset of fields can be defaulted this way, or all of the fields can be defaulted this way, based on a configured threshold of total records where a search indeed makes sense. If there were more than the website installed minimum for searching, then defaulted fields 5604 and 5606 would be available to the user for specification. Any field can be defaulted with a value for search and saved as data evidence for defaulting field(s) the next time the user is in the same interface at a future time. In this way, the user specifies search criteria, and that specification always defaults the interface according to the user's last specification for each field in the search interface.

Figure 56B:
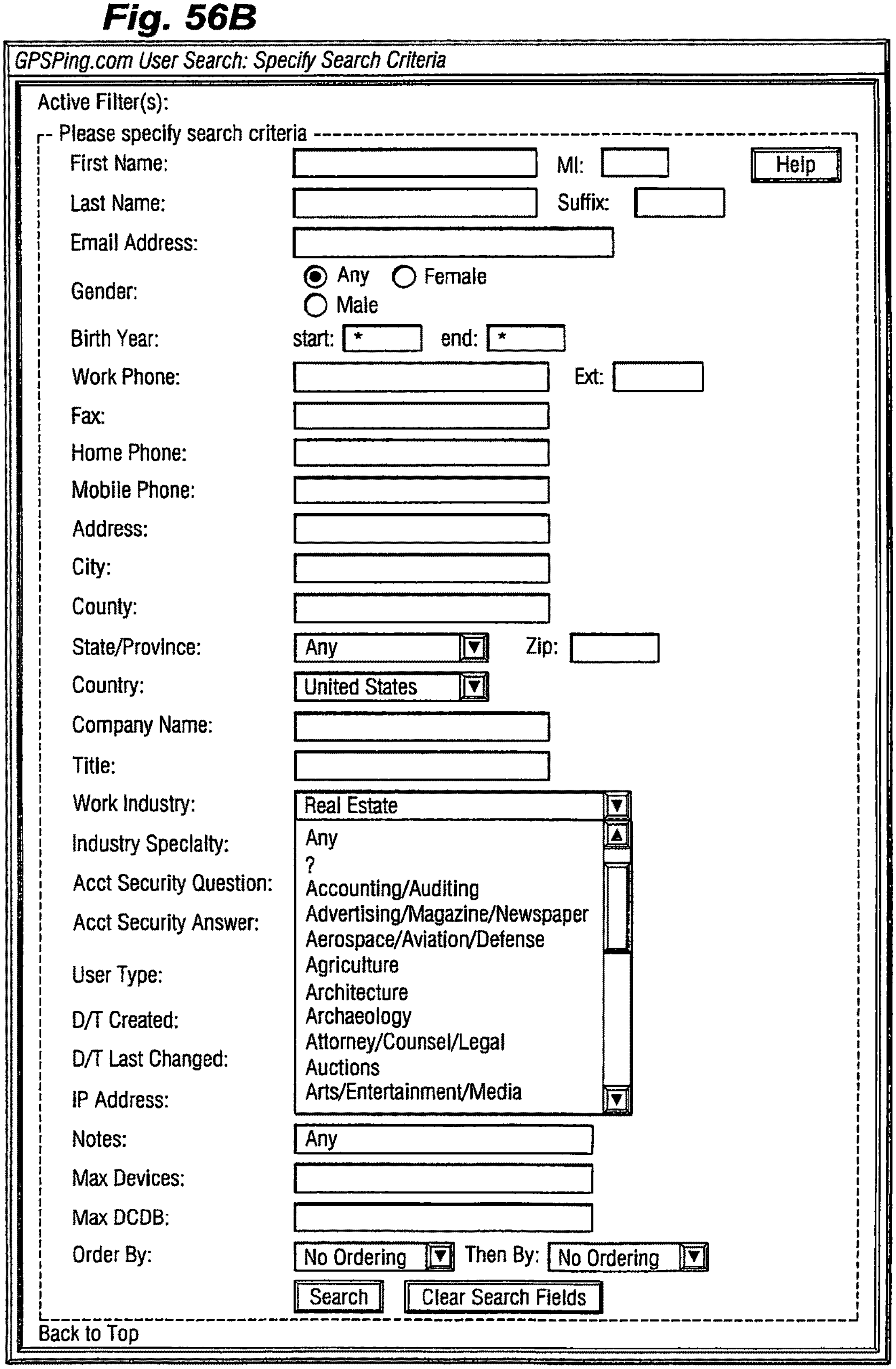
FIG. 56B depicts a preferred embodiment screenshot of the Work Industry selection dropdown options for searching for web service user registrant/member account records.

FIG. 56B depicts a preferred embodiment screenshot of the Work Industry selection dropdown options for searching for web service user registrant/member account records. A selection from the dropdown may have had a corresponding "Industry Specialty" dropdown of selections to make at the time of member registration. These were all provided to registrants, for example in FIGS. 27B through 27D.

Figure 56C:
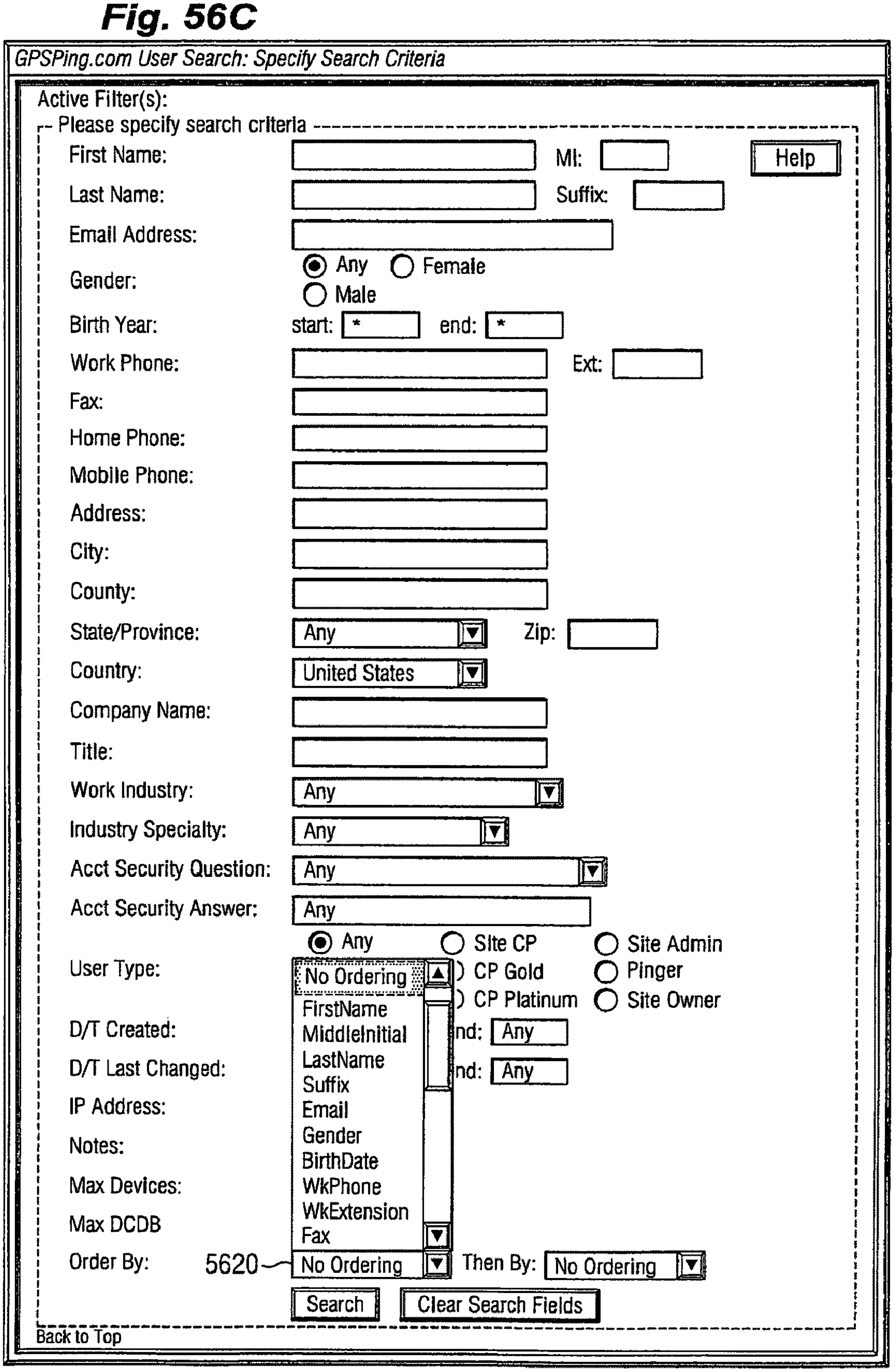
FIG. 56C depicts a preferred embodiment screenshot of Order By selection dropdown options for searching for web service user registrant/member account records.

FIG. 56C depicts a preferred embodiment screenshot of Order By selection dropdown options for searching for web service user registrant/member account records. Order by specification 5620 sorts search results by preferred fields, and adds the fields to the search results if they are not already part of a standard set of fields shown in the results list.

Figure 56D:
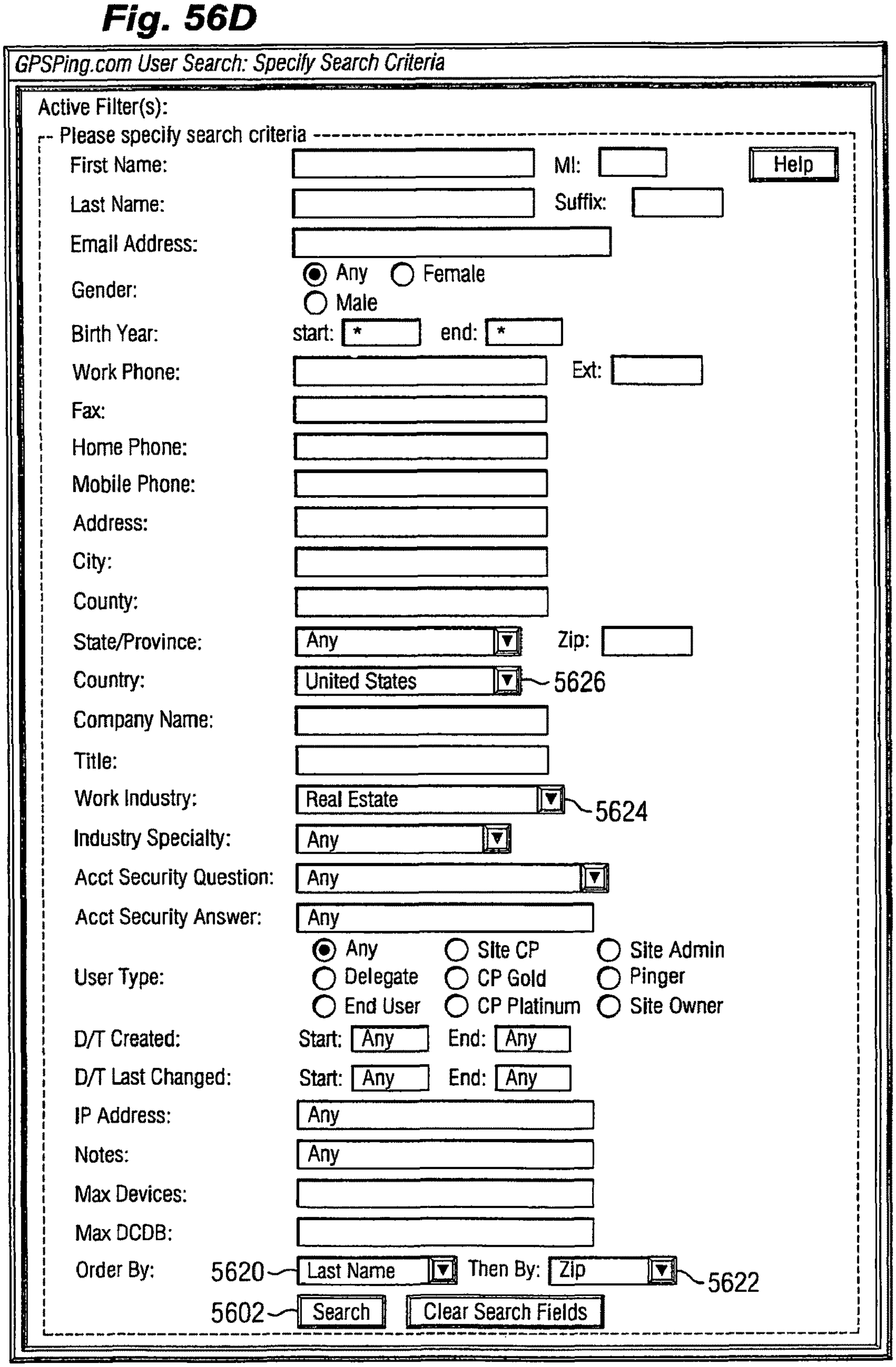
FIG. 56D depicts a preferred embodiment screenshot for searching for web service user registrant/member account records after some user specification for doing a search.

FIG. 56D depicts a preferred embodiment screenshot for searching for web service user registrant/member account records after some user specification for doing a search. Order by specification field 5620 specifies to return all search results sorted by their last name. Order by specification 5622 specifies to then return user records sorted by zip code within the last name results. Work industry specification 5624 indicates to only return records in the Real Estate industry (e.g. as entered to FIGS. 27B through 27D), and country specification 5626 limits search results to those registrants of the United States (e.g. as entered to FIGS. 27B through 27D). Order by specifications preferably include selecting any field from records 2900 and 3000 for sorting results, and for display of fields not provided in search results for standard list display.

Figures 57, 57A:
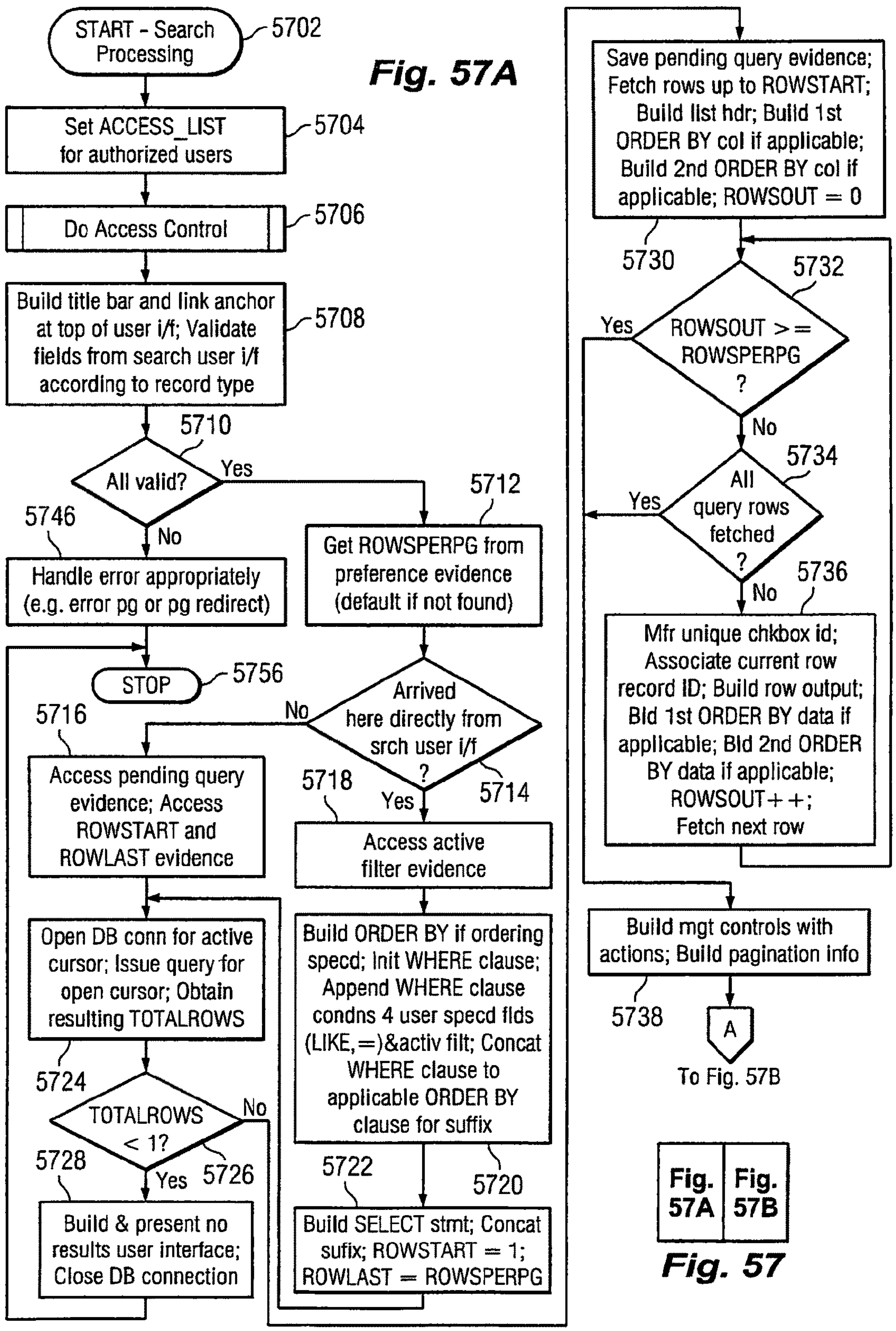
Figure 58:
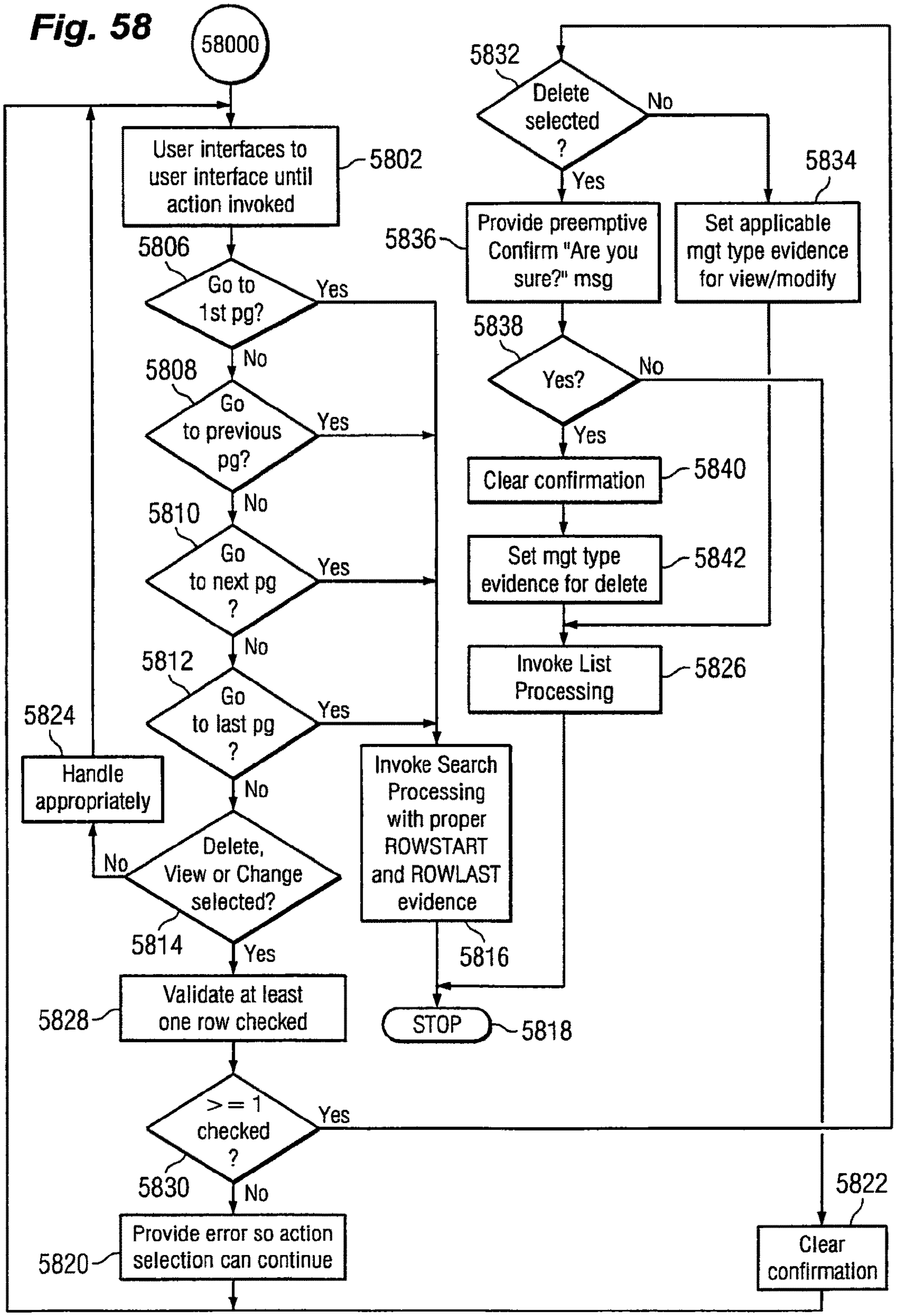

FIGS. 57 and 58 depict flowcharts for a preferred embodiment of search processing of records of the web service. For this discussion, user information search criteria (e.g. from FIG. 56D) is discussed as being processed, for example upon clicking search button 5602. Processing starts at block 5702 and continues to block 5704 where the ACCESS_LIST is set for authorized users. Thereafter, block 5706 performs FIG. 39 access control processing and continues to block 5708. Block 5708 builds the top of the page to return to the user, validates all fields specified in the search criteria interface (e.g. FIG. 56D) according to the record type (i.e. records 2900 and 3000), and processing continues to block 5710. If all fields specified in the search criteria interface are valid, then processing continues to block 5712. If there is at least one invalid field specified, then block 5746 reports the error appropriately to the user interface, and processing terminates at block 5756.

Block 5712 sets a variable ROWSPERPG to rows per page data evidence as configured by records per page field 5086 of FIG. 50. A defaulted number is used if the data evidence is not found. Then, block 5714 checks to see how this page processing was arrived to, for example, by pagination or directly from the search criteria interface. If block 5714 determines the processing page was arrived to directly as the result of invoking the search button 5602, then block 5718 accesses page filter data evidence for appending to a SQL Select WHERE clause. Thereafter, block 5720 builds any SQL ORDER BY clause if order by specifications were made, appends SQL WHERE clause criteria based on search criteria interface field specifications, appends any Filters management data evidence found to the SQL WHERE clause, and constructs a SQL query string suffix comprised of a completed WHERE clause and ORDER BY clause. If the user accessing the page (as determined by access control) is a Delegate, then the WHERE clause is also clarified with: RowType='D' to make sure no real users are seen by Delegates. Delegates can only view demo user data for privacy reasons. WHERE clause conditions will use "LIKE" or "=" depending on the field type being searched. Thereafter, block 5722 completes building the SQL SELECT statement with the SQL query string suffix appended for all records 2900 joined to 3000 on PersonID. List output variable ROWSTART is initialized to 1 and list output variable ROWLAST is set to ROWSPERPG. These variables enable proper pagination between pages of results, and are maintained as list pagination data evidence. Thereafter, block 5724 opens a DB connection, opens an active cursor using the SQL SELECT statement and determines the number of resulting rows produced by the query which is kept in a variable TOTALROWS. Thereafter, if block 5726 determines there are no resulting rows, then block 5728 reports the condition of no results to the user interface, closes an open DB connection, and processing terminates at block 5756.

If block 5726 determines there is at least one row in the results (i.e. TOTALROWS>=1), then block 5730 saves the SQL SELECT query as query data evidence, rows are fetched up to the variable ROWSTART, the list output header is built (e.g. 5902), an ORDER BY column 5904 is added to the results if not already presented in the standard list output, and a variable ROWSOUT is set to 0. Name information is already put out in the standard result list form, so only the zip code column had to be added to the results (FIG. 59A), assuming the search criteria example of FIG. 56D. Thereafter, if block 5732 determines ROWSOUT>=ROWSPERPG, then no additional rows are iterated out from query results in which case block 5738 builds management controls 5906 through 5910. and pagination information 5912 is output. Thereafter, if block 5740 determines TOTALROWS>ROWSOUT, then processing continues to block 5748, otherwise processing continues to block 5742 where a DB connection is closed and onto block 5802 of FIG. 58 by way off page connector 58000.

Figure 59A:
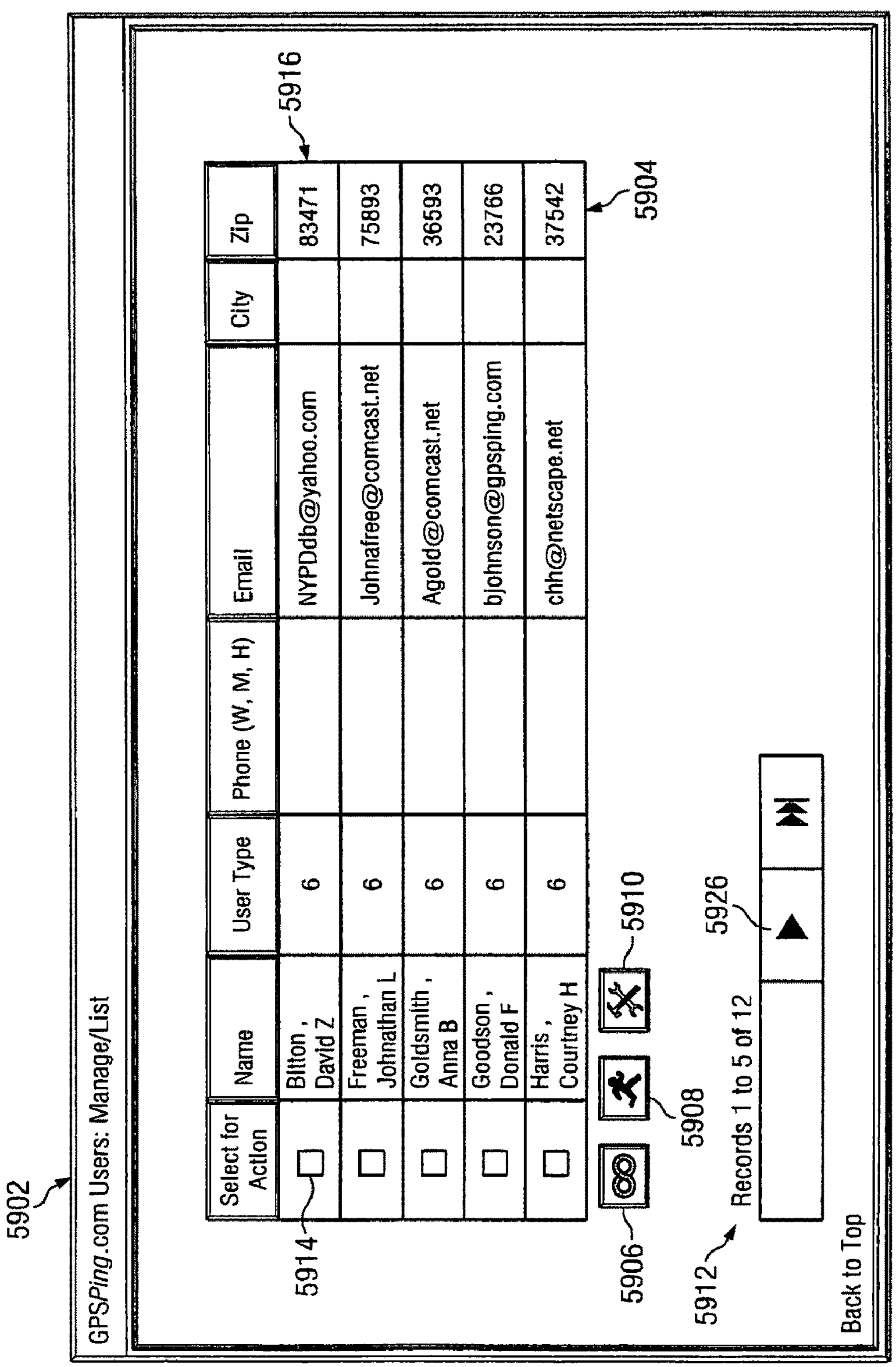
FIG. 59A depicts a preferred embodiment screenshot for results from searching the web service user registrant/member account records after a user search specification.
Figure 59B:
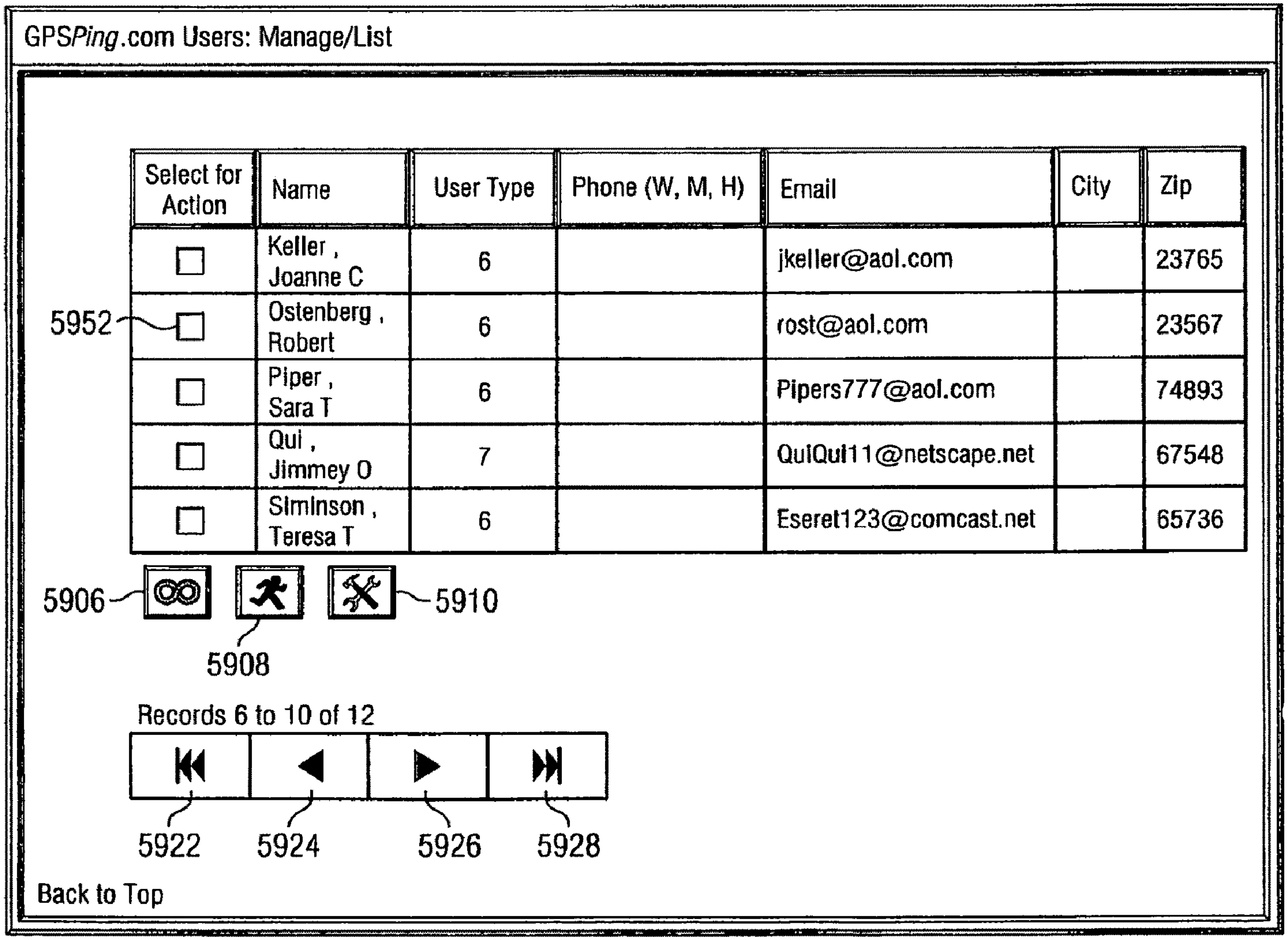
FIG. 59B depicts a preferred embodiment screenshot for paginated results from searching the web service user registrant/member account records after a user search specification.

If block 5748 determines ROWSTART=1, then processing continues to block 5752, otherwise block 5750 builds the user interface page with pagination control for first page pagination control 5922 (FIG. 59B) and previous page pagination control 5924 (FIG. 59B). Thereafter, processing continues to block 5752. If block 5752 determines that ROWLAST>=TOTALROWS then processing continues to block 5802 by way of off page connector 58000, otherwise block 5754 builds the user interface page with pagination control for last page pagination control 5928 (FIG. 59B) and next page pagination control 5926 (FIGS. 59A and 59B). Thereafter, processing continues to block 5802.

If block 5732 determines ROWSOUT were not greater than or equal to ROWSPERPG, then block 5734 checks if all rows have been fetched for output processing. If block 5734 determines all rows have been fetched (processed), then processing continues to block 5738 already described. If block 5734 determines all rows have not been fetched (processed), then block 5736 manufactures a checkbox (e.g. checkbox 5914) for a row, associates record id data evidence (i.e. PersonID), for example in a hidden field associated with the checkbox, builds the row output (e.g. a row 5916) for presenting all fields of the list header 5902, increments the ROWSOUT variable by 1, then fetches the next row using the open cursor. Thereafter, processing continues back to block 5732. Blocks 5732 through 5736 comprise a loop for output of rows satisfying search criteria. Processing continuing to block 5802 by way of off page connector 58000 also preferably builds and presents a "Back to Top" link at the page bottom in case the user has to scroll lots of information as dictated by ROWSPERPG.

If block 5714 determines the search processing page was arrived to by pagination (e.g. controls 5922 through 5928), then block 5716 accesses the query data evidence, accesses the list pagination data evidence (ROWSTART and ROWLAST), then continues to block 5724 for issuing the query and performing subsequent processing.

The user interfaces with search results at block 5802 until an action is selected. FIGS. 59A and 59B are examples of the search results interface upon the start of block 5802. When an action is selected, block 5806 checks if it was pagination to go to the first results page, for example clicking control 5922. If block 5806 determines pagination to go to first page was selected (e.g. by way of control 5922), then FIG. 57 processing is invoked after properly setting ROWSTART and ROWLAST data evidence for first page results at block 5816, and current page processing terminates at block 5818. If block 5806 determines the action was not for go to first page, then processing continues to block 5808. If block 5808 determines pagination to go to the previous page was selected (e.g. by way of control 5924), then FIG. 57 processing is invoked after properly setting ROWSTART and ROWLAST data evidence for previous page results at block 5816, and current page processing terminates at block 5818. If block 5808 determines the action was not for go to previous page, then processing continues to block 5810. If block 5810 determines pagination to go to the next page was selected (e.g. by way of control 5926), then FIG. 57 processing is invoked after properly setting ROWSTART and ROWLAST data evidence for next page results at block 5816, and current page processing terminates at block 5818. If block 5810 determines the action was not for go to next page, then processing continues to block 5812. If block 5812 determines pagination to go to the last page was selected (e.g. by way of control 5928), then FIG. 57 processing is invoked after properly setting ROWSTART and ROWLAST data evidence for last page results at block 5816, and current page processing terminates at block 5818. If block 5812 determines the action was not for go to last page, then processing continues to block 5814. If block 5814 determines a delete, view, or change action was invoked, then processing continues to block 5828, otherwise block 5824 handles the action appropriately and processing continues back to block 5802. Block 5824 handles actions associated with the interface depending on the device type that are not necessarily relevant for understanding this disclosure.

Block 5828 determines how many rows are marked with a checkmark by the user and block 5830 validates it. If block 5832 determines no checkmarks are present, then block 5820 provides an error for report to the user so user specification can continue back at block 5802. If block 5830 determines at least one row has been checked, then block 5832 checks the action type. If block 5832 determines that delete was invoked by the user (e.g. delete management control 5910 selected), then block 5836 provides a confirmation message and block 5838 determines the user's answer to the "Are you sure?" confirmation (e.g. pop-up of FIG. 59C). If block 5838 determines the user confirmed the delete, then the confirmation is cleared at block 5840, list management data evidence is set for delete at block 5842, block 5826 invokes list processing of FIG. 60, and current page processing terminates at block 5818. If block 5838 determines the user cancelled the delete, then the confirmation is cleared at block 5822, and the user continues to interact with the search results at block 5802. If block 5832 determines that delete was not selected, then list management data evidence is set for view (i.e. view management control 5906 selected) or modify (i.e. change management control 5908 selected) per user action, block 5826 invokes list processing of FIG. 60, and current page processing terminates at block 5818. Thus, FIGS. 57 through 58 provide search result list processing of registrant records for being conveniently viewed, modified, or viewed.

FIG. 59A depicts a preferred embodiment screenshot for results from searching the web service user registrant/member account records after a user search specification. FIG. 59A is in fact a real output from the search criteria as specified in FIG. 56D. Note the names are sorted on last name and the ROWSPERPG is set at 5. FIG. 59B depicts a preferred embodiment screenshot for paginated results from searching the web service user registrant/member account records after a user search specification. The Site Owner user has invoked pagination control 5926 from FIG. 59A to get to FIG. 59B. FIG. 59C depicts a preferred embodiment screenshot for a warning prompt for deleting one or more marked records. Other embodiments may present a different confirmation appearance or method.

FIG. 60 depicts a flowchart for a preferred embodiment of search result list processing of records of the web service. For this discussion, FIG. 60 was invoked at block 5826. Processing starts at block 6002 and continues to block 6004 where the ACCESS_LIST is set for authorized users. Thereafter, block 6006 performs FIG. 39 access control processing and continues to block 6008. If block 6008 determines the user is a Delegate (from access control processing), then block 6010 forces list management data evidence to view since Delegate access is read only to the members area. Processing then continues to block 6012. If block 6008 determines the user is not a Delegate, then processing continues to block 6012.

Block 6012 iterates through the form checkboxes (from FIGS. 59A, 59B) to build an array of record ids (i.e. PersonIDs) from record id data evidence associated with rows that are check-marked for action. Additionally built is a WHERE clause string of the same check-marked record id evidence (i.e. PersonIDs) so an action can be done in a single SQL query to multiple records (e.g. records 2900 and 3000 joined on PersonID). Thereafter, block 6014 checks if at least one check-marked checkbox (e.g. 5914) was found. If none were check-marked, then block 6018 reports an appropriate error to the user, block 6046 closes any DB connection that is open (none open yet), and current page processing terminates at block 6032. If block 6014 determines at least one checkmark is found, then block 6016 checks list management data evidence. If block 6016 determines list management data evidence indicates a delete action, then an SQL Delete command is built at block 6048 for the People Table with the WHERE clause of record ids built at block 6012. The corresponding User Table record(s) will cascade delete. Block 6048 also opens a DB connection, does the People Table delete, closes the DB connection, sends an email to an Administrator account if a Notify flag indicates to document this type of transaction, and a success interface is returned to the user. Processing then continues to block 6046 for closing any DB connection that is still open, and current page processing terminates at block 6032. Block 6048 will also delete any records and data of server data 2104 that has been created by the user account(s) being deleted by block 6048 which are not set up for cascade delete. Such records should be deleted prior to finally deleting the record 2900 which cascade deletes other records.

If block 6016 determines the list management data evidence does not indicate a delete action, then block 6020 accesses pending query data evidence, concatenates WHERE clause information of record ids (PersonIDs) built at block 6012 so only the check-marked rows are fetched, opens a DB connection, does the query, and fetches the first row. Thereafter, block 6022 checks if even a first row was fetched. If block 6022 determines no first row was fetched (no rows result from query), then block 6018 handles reporting the error to the user and processing continues from there as described above. If block 6022 determines a first row was fetched, then block 6024 builds the top portion of the page to return to the user. Thereafter, if block 6026 determines the list management data evidence is for view, then block 6028 sets the disabled/read-only switch (dfld variable as discussed above) for read-only and processing continues to block 6030. If block 6026 determines the list management data evidence is not for view, then processing continues to block 6030 (where the dfld variable is null for modify capability).

If block 6030 determines there is only 1 row returned from the query at block 6022, then block 6034 builds and presents a record interface, presenting a Modify button only if the list management data evidence indicate a modify action (e.g. control 5908). Block 6034 also associates record id data evidence (PersonID) of the information presented, preferably as a hidden form field. Block 6034 presents FIG. 61A and FIG. 61B (scrolled forward) if the list management data evidence was for view of a single row check-marked, such as with a checkmark at checkbox 5952. Block 6034 presents FIG. 61C and FIG. 61D (scrolled forward) if the list management data evidence was for modify of a single row check-marked, such as with a checkmark at checkbox 5952. Thereafter, the user interfaces to any of FIGS. 61A through 61D at block 6036 until a Modify action is invoked, for example clicking button 6150. If a view interface is presented (FIGS. 61A, 61B), then no Modify button can be pressed. The user can use the Back key, click the first page link 6102 to return to the first page of records (FIG. 59A), close the window, or do whatever makes sense at the device. If the Modify button 6150 is pressed, then block 6038 validates form fields according the record type (i.e. records 2900 and 3000), and processing continues to block 6040. If block 6040 determines at least one field is invalid, then block 6042 reports the error to the user so field specification can continue back at block 6036 (e.g. pop-up). If block 6040 determines all fields are valid, then block 6044 invokes modify record processing of FIG. 53, block 6046 closes any open DB connection, and current page processing terminates at block 6032.

If block 6030 determines there is more than 1 row returned by the query at block 6020, then block 6050 checks the list management data evidence for the action requested. FIG. 61E shows the user has selected (i.e. check-marked) multiple rows prior to invoking a control 5906 through 5910. If block 6050 determines the list management data evidence is not modify, then processing continues to block 6064. If block 6064 determines the list management data evidence is not for view, then block processing continues to block 6018 since list management data evidence is invalid. If block 6064 determines the list management data evidence is for view, then block 6066 builds the output page topmost portion, and block 6068 builds a record output from the last record fetched. Thereafter, if block 6070 determines the last row was fetched for output, then block 6074 completes page output and processing continues to block 6046. If block 6070 determines there is another row to output, then block 6072 fetches the next row and processing loops back to block 6068. Blocks 6066 through 6074 include a processing loop for presenting a view of multiple records such as FIGS. 61F through 61G. FIGS. 61F and 61G are actual view outputs from processing upon invoking view management control 5906 on FIG. 61E.

Figure 61A:
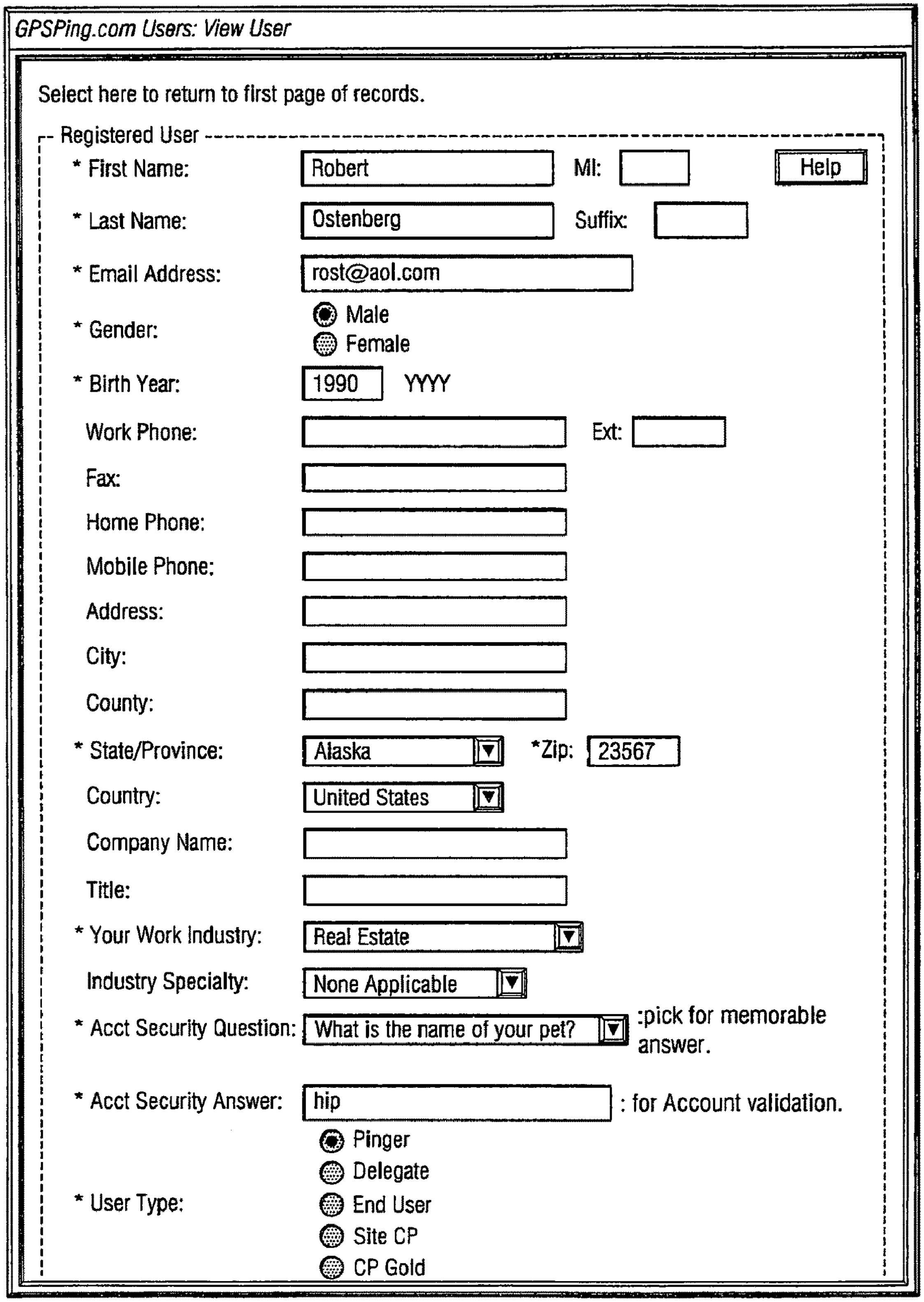
FIGS. 61A and 61B depict preferred embodiment screenshots for viewing user account information of a selected user record.
Figure 61B:
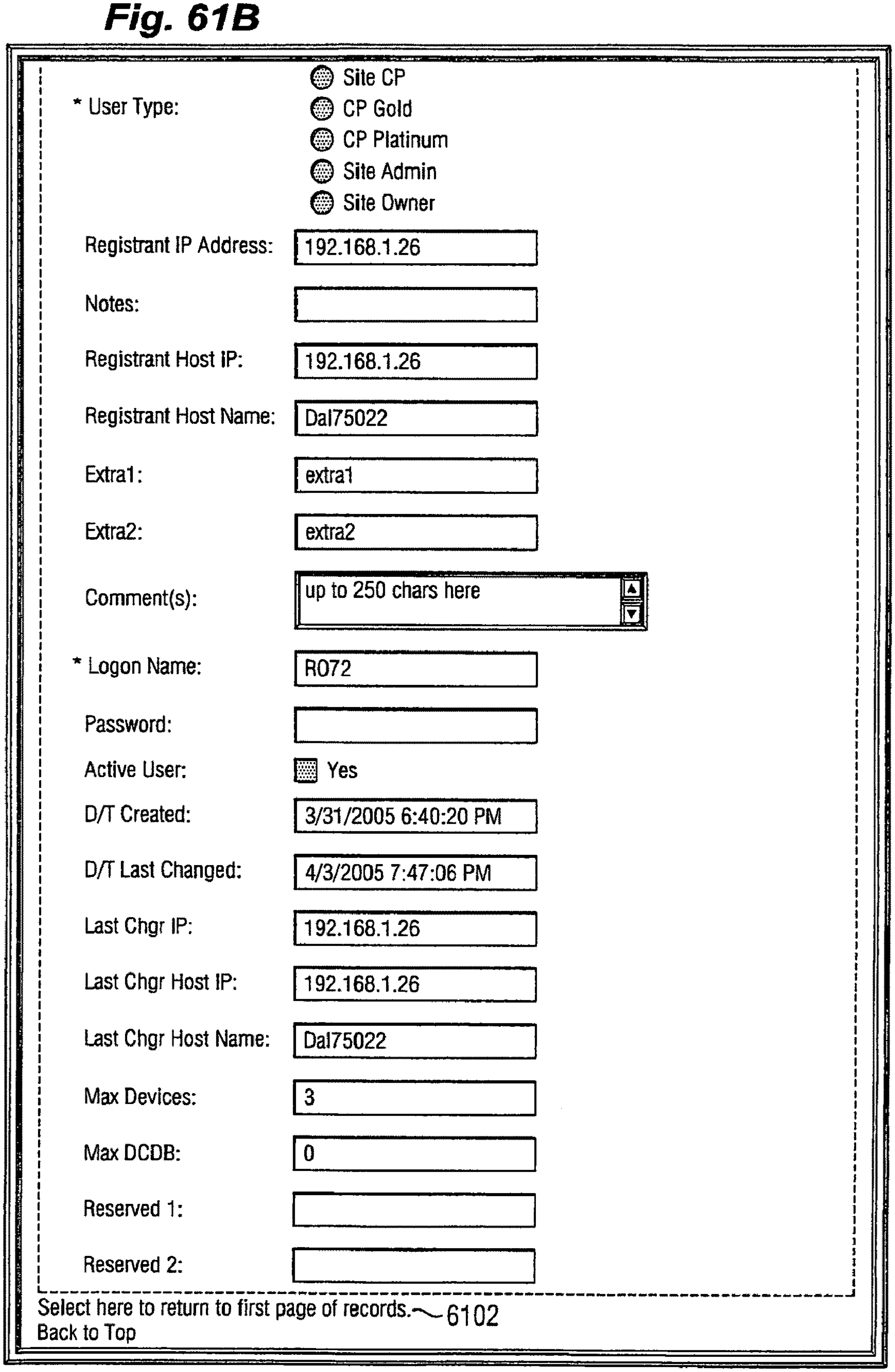
Figure 61C:
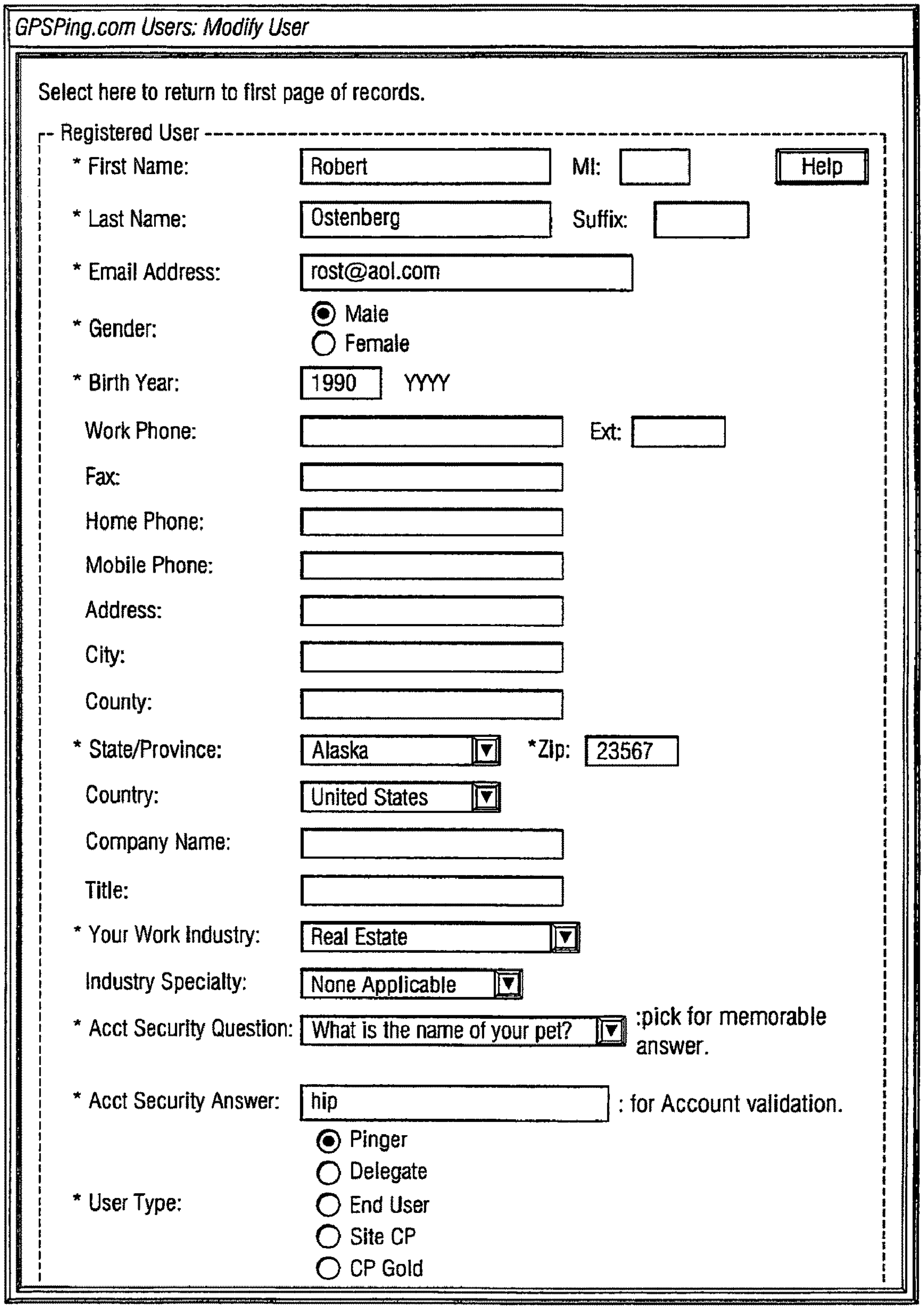
FIGS. 61C and 61D depict preferred embodiment screenshots for modifying user account information of a selected user record.
Figure 61D:
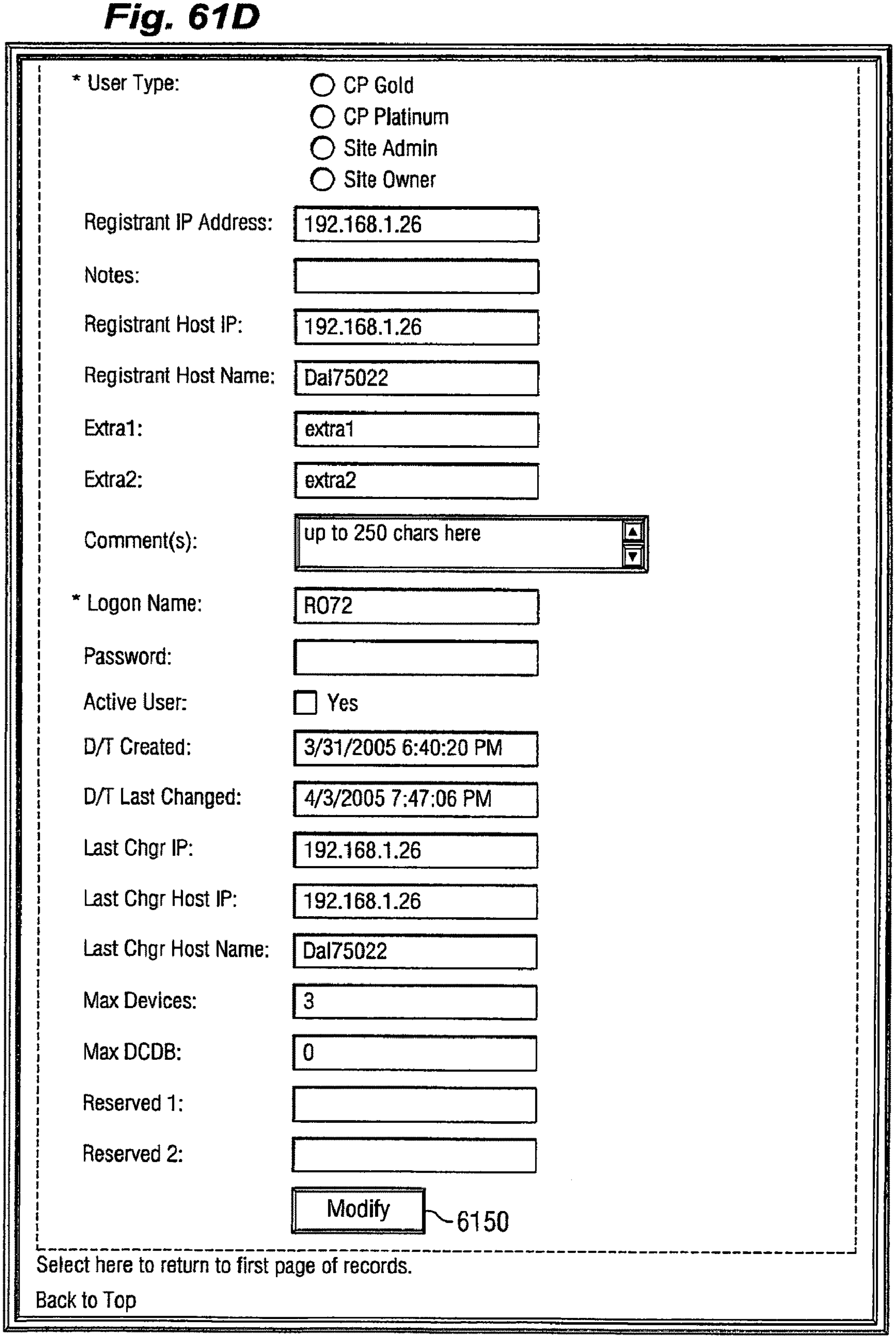
Figure 61E:
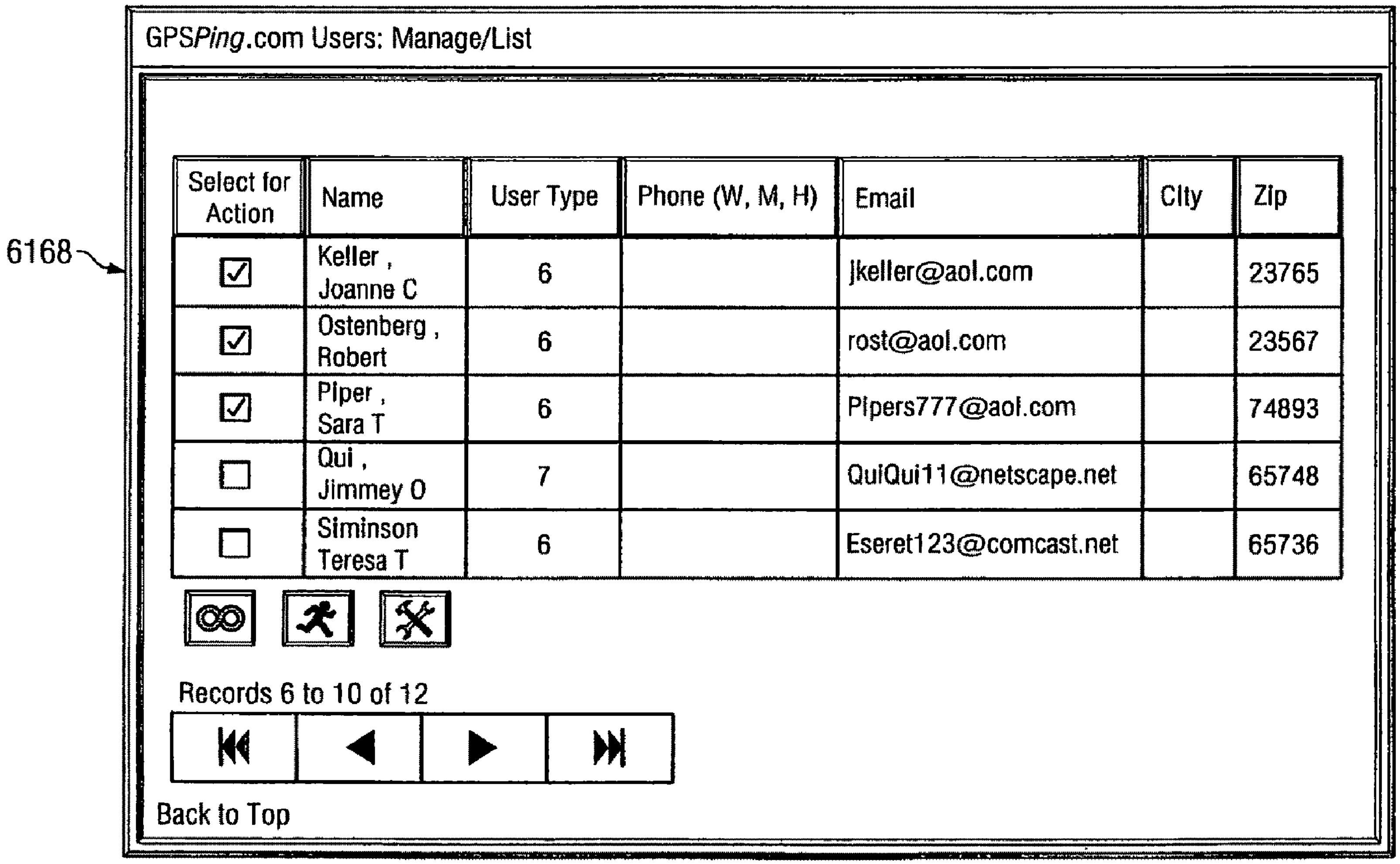
FIG. 61E depicts a preferred embodiment screenshot for results from searching the web service user registrant/member account records after a user search specification, and then user selecting records to manage.
Figure 61H:
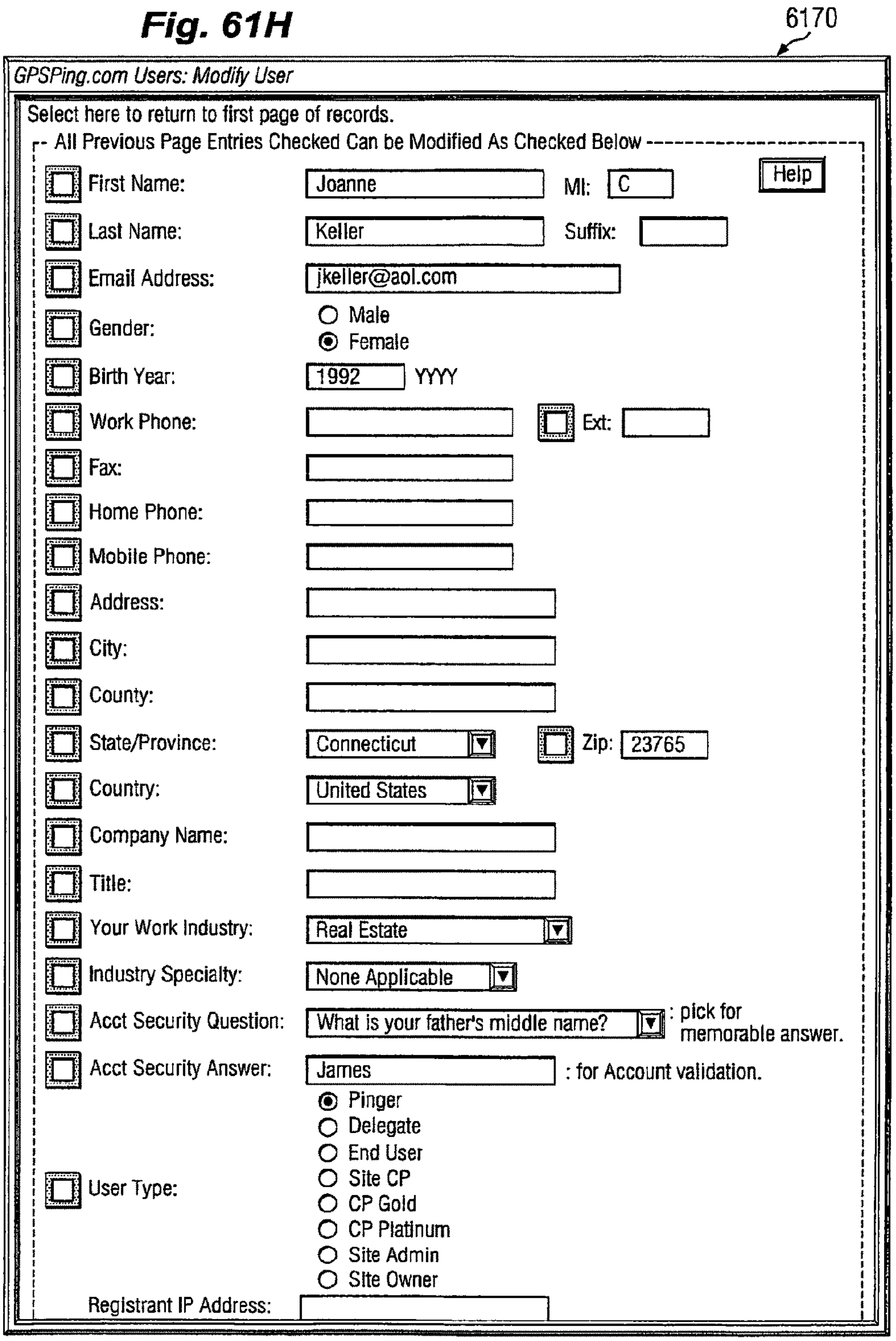
FIGS. 61H and 61I depict preferred embodiment screenshots for modifying a plurality of selected user account records.
Figure 61I:
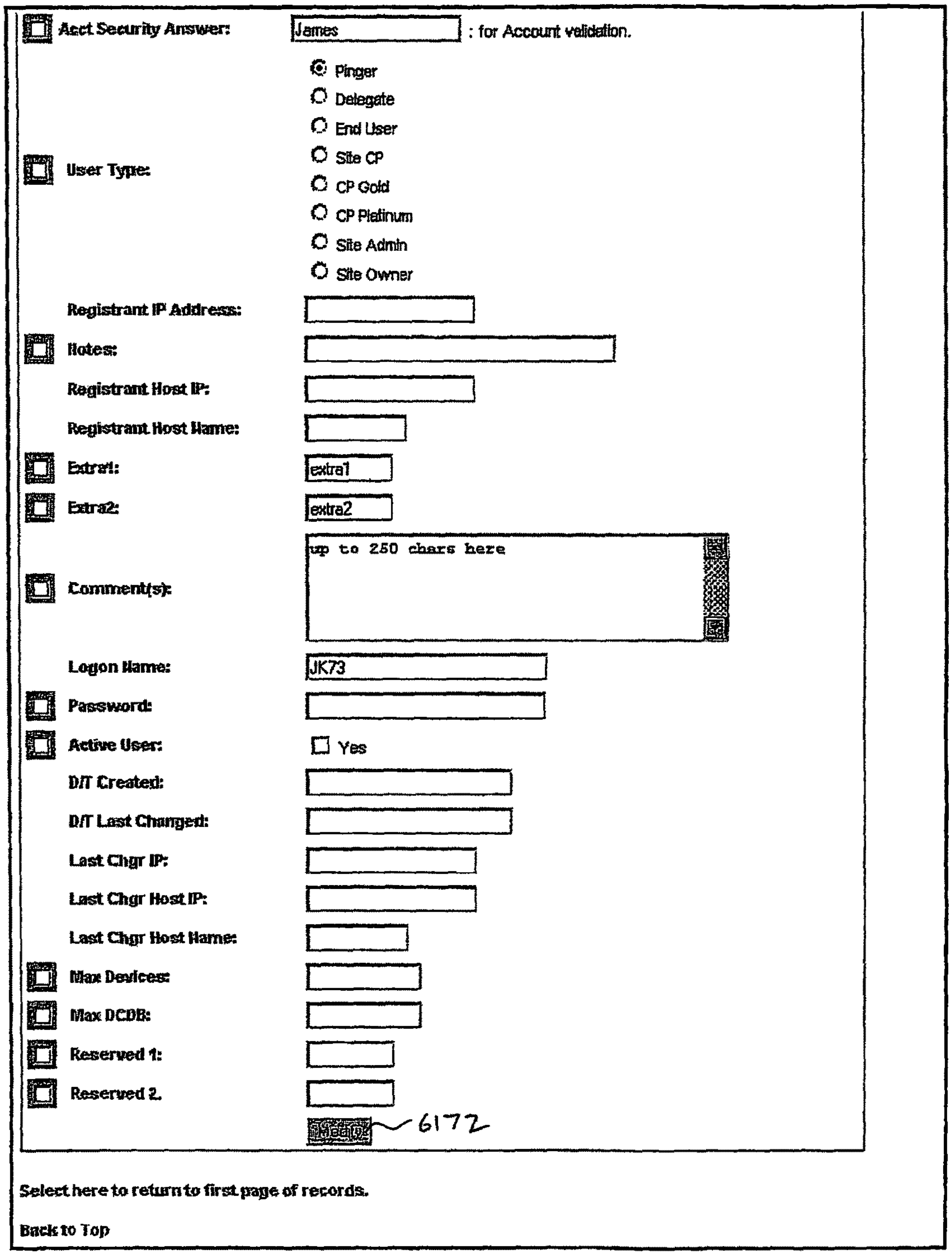

If block 6050 determines the list management data evidence is for modify, then block 6052 builds a Modify List user interface, iterates through fetches of query results from block 6020, and establishes record id array data evidence (e.g. PersonIDs) for records returned, preferably as hidden form fields in FIGS. 61H and 61I. FIGS. 61H and 61I actually result from invoking modify management control 5908 from FIG. 61E. Data from the first record in the query results is conveniently defaulted in fields (e.g. record 6168). A preferred embodiment will save which row was check-marked first from list output (e.g. FIG. 61E) as first check data evidence so that the first checkmark determines which data is used to default the modify list interface (e.g. FIGS. 61H and 61I). Note checkmark column 6170 is included for the user selecting which fields with checkmarks to update in the plurality of records resulting from the query at block 6020. Thereafter, the user interfaces to FIGS. 61H and 61I at block 6054 until Modify button 6172 is invoked. When modify is invoked, processing continues to block 6056 where fields are validated from FIGS. 61H and 61I, and block 6058 checks validation results. If block 6058 determines all fields are valid (i.e. syntax, at least one checkmark, checkmark corresponds to non-null field, etc), then block 6062 invokes Modify List processing of FIG. 62, and processing continues to block 6046. If not all fields are valid as determined at block 6058, then an error is reported at block 6060 to the user so field specification can continue back at block 6054 (e.g. pop-up).

FIGS. 61A and 61B depict preferred embodiment screenshots for viewing user account information of a selected user record, for example when placing a single checkmark at checkbox 5952 and invoking control 5906. FIGS. 61C and 61D depict preferred embodiment screenshots for modifying user account information of a selected user record, for example when placing a single checkmark at checkbox 5952 and invoking control 5908. FIG. 61E depicts a preferred embodiment screenshot for results from searching the web service user registrant/member account records after a user search specification, and then user selecting records to manage with checkmarks placed next to a plurality of desired records for management. FIGS. 61F and 61G depict preferred embodiment screenshots for viewing a plurality of selected user account records, for example in accordance with those records that were check-marked in FIG. 61E and then invoking control 5906. FIGS. 61H and 61I depict preferred embodiment screenshots for modifying a plurality of selected user account records, for example in accordance with those records that were check-marked in FIG. 61E and then invoking control 5908.

Figure 62:
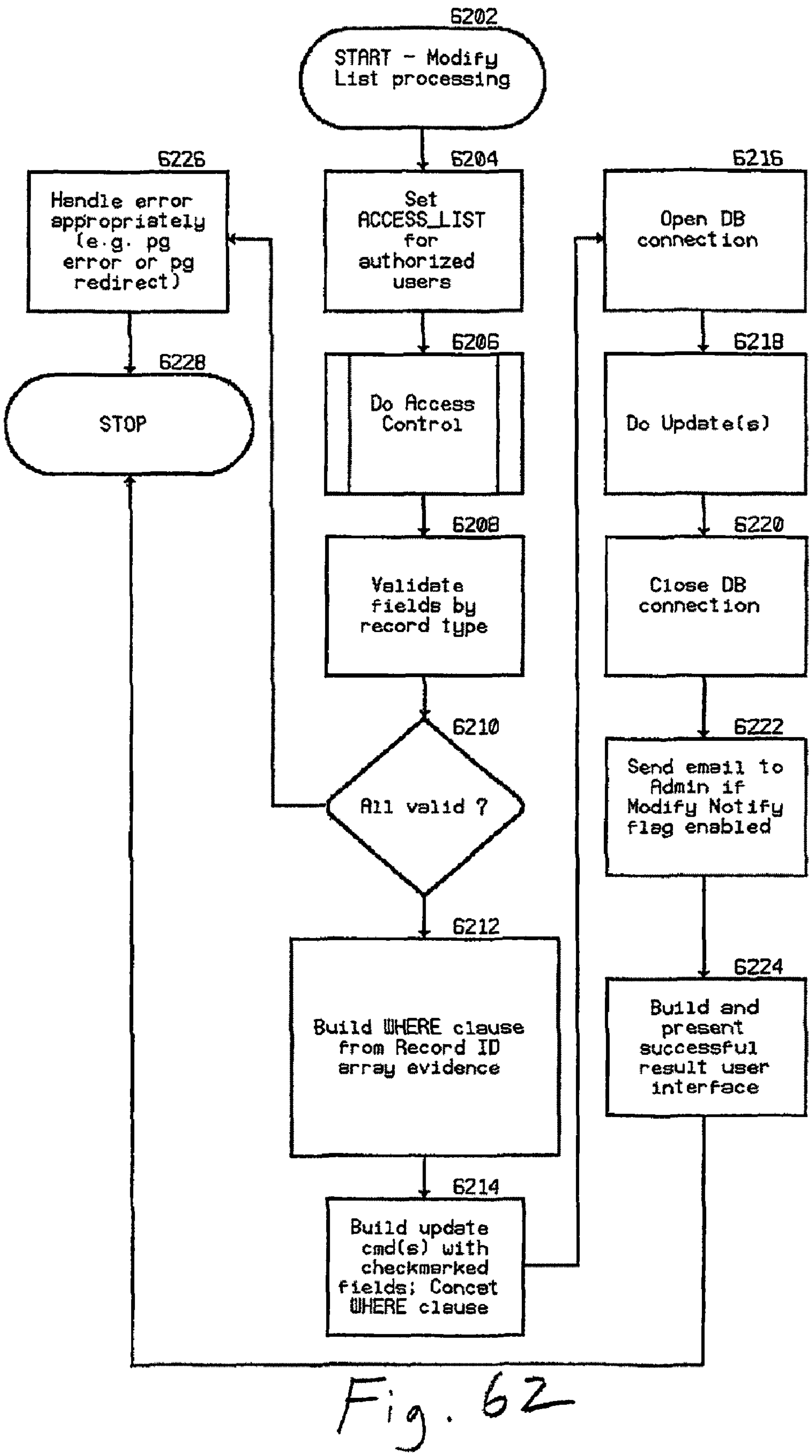
FIG. 62 depicts a flowchart for a preferred embodiment for processing the request to modify a plurality of records of the web service.

FIG. 62 depicts a flowchart for a preferred embodiment for processing the request to modify a plurality of records of the web service. For this discussion, FIG. 62 was invoked at block 6062. Processing starts at block 6202 and continues to block 6204 where the ACCESS_LIST is set for authorized users. Thereafter, block 6206 performs FIG. 39 access control processing and continues to block 6208. Block 6208 validates form fields (e.g. from FIGS. 61H and 61I), and then block 6210 checks validation results. If at least one field is invalid, then block 6226 appropriately reports the error to the user, and processing terminates at block 6228. If all fields are valid, then block 6210 continues to block 6212. Block 6212 builds a WHERE clause string from record id array data evidence (e.g. from hidden form field), builds an update command for the People Table with any fields specified and check-marked in FIGS. 61H and 61I, builds an update command for the Users Table with any fields specified and check-marked in FIGS. 61H and 61I, and concatenates the WHERE clause string of record ids (PersonIDs) constructed at block 6212 to the update command(s). Thereafter, block 6216 opens a DB connection, block 6218 does the update command(s), block 6220 closes the DB connection, block 6222 send an email to an administrator account if a Notify flag indicates to document this type of transaction, block 6224 builds and serves back a successful result interface, and processing terminates at block 6228. So, a plurality of users are modified all at once as check-marked, for example on FIG. 61E and modified at FIGS. 61H and 61I.

Registry Management

The Devices

An Administrator and Site Owner user type can manage and add devices to members area 2500 through the Registry Management component 2504. Registry Management component 2504 comprises the selectable Registry Manage option 4642 and Registry Add option 4644 under Registry options category header 4640. Registry Management component 2504 also provides a Registry Import/Export option 4646 to a Site Owner user type (read only access for Delegate) for scripting management of devices. Scripts maintained can insert large numbers of devices, update large numbers of devices, delete large numbers of devices, or do any management to devices as discussed herein, except automated with scripting. It may be inconvenient requiring a user to use a Graphical User Interface (GUI) to maintain large numbers of devices, therefore full scripting capability is provided for managing records 6500 in the Registry Table. No administrator or user (except a Site Owner) can see or manage another administrator's devices, unless an "Affinity Delegate" privilege (discussed below) has been granted to that user. A Pinger is also an administrator, but on a smaller scale. Each Pinger user type can add up to a small maximum number (1 or 3) of devices, and then manage them.

Figure 63:
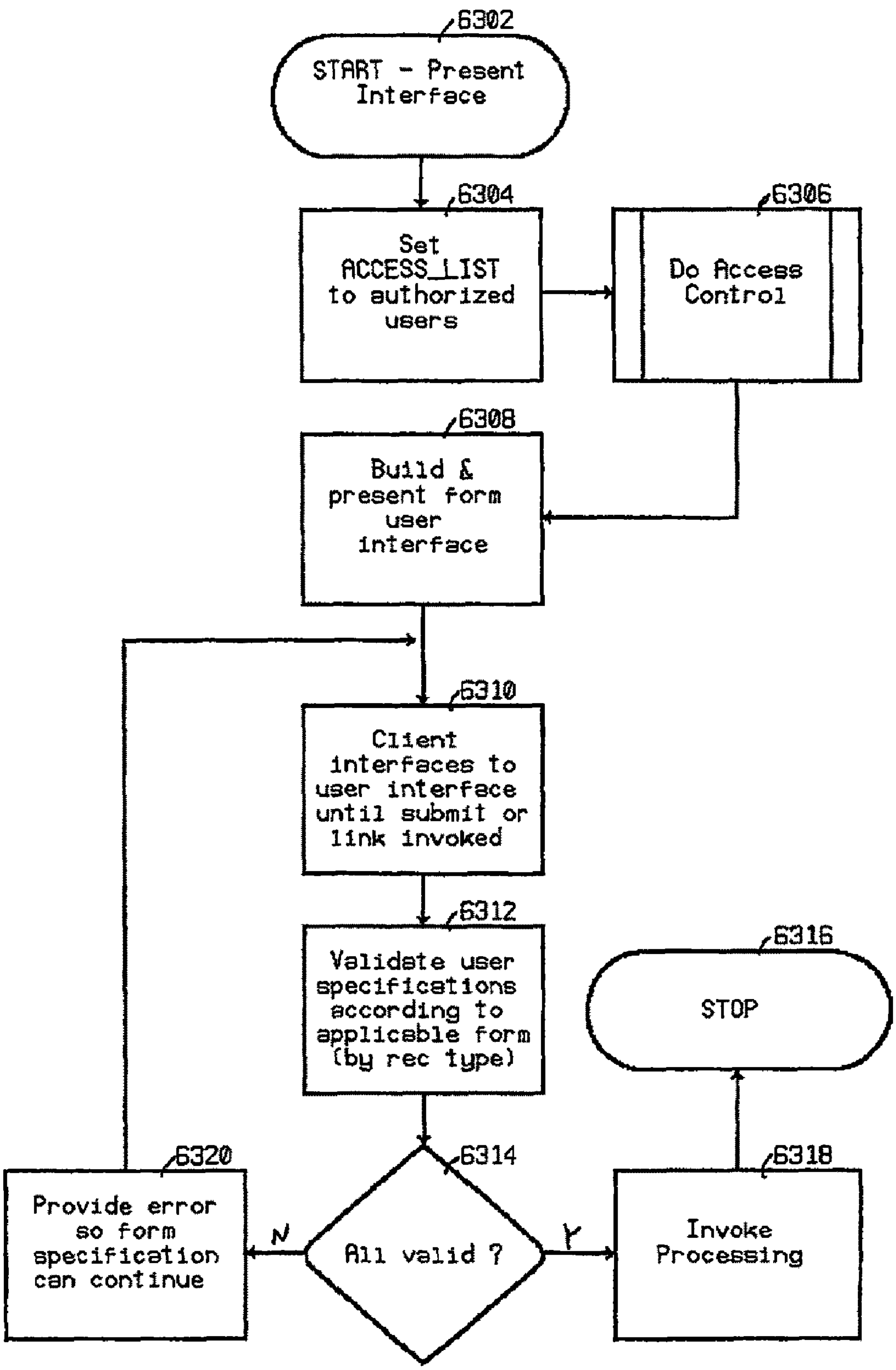
FIG. 63 depicts a flowchart for a preferred embodiment of carrying out processing for presenting a web service user interface form in the members area and then processing user specifications to the interface prior to submitting to the service for further processing.

FIG. 63 depicts a flowchart for a preferred embodiment of carrying out processing for presenting a web service user interface form in the members area and then processing user specifications to the interface prior to submitting to the service for further processing. For this discussion, FIG. 63 is invoked for adding a record 6500 to a Registry Table (FIG. 65 records) upon invoking Registry Add option 4644. Processing starts at block 6302 and continues to block 6304 where the ACCESS_LIST is set for authorized users. Thereafter, block 6306 performs FIG. 39 access control processing and continues to block 6308. Block 6308 builds and presents FIG. 66A for adding a Registry record, and then a user interfaces with FIG. 66A at block 6310 until the Add button 6602 action is invoked. When an add action is invoked by the user, block 6312 validates user field specifications to FIG. 66A, and block 6314 checks the results. If block 6314 determines the fields are valid (and can be submitted for processing), then block 6318 invokes FIG. 64 processing for adding the record 6500, and current page processing terminates at block 6316. If block 6314 determines that not all fields specified are valid, then block 6320 provides an error to the user so that specification can continue back at block 6310 (e.g. pop-up).

Figure 64:
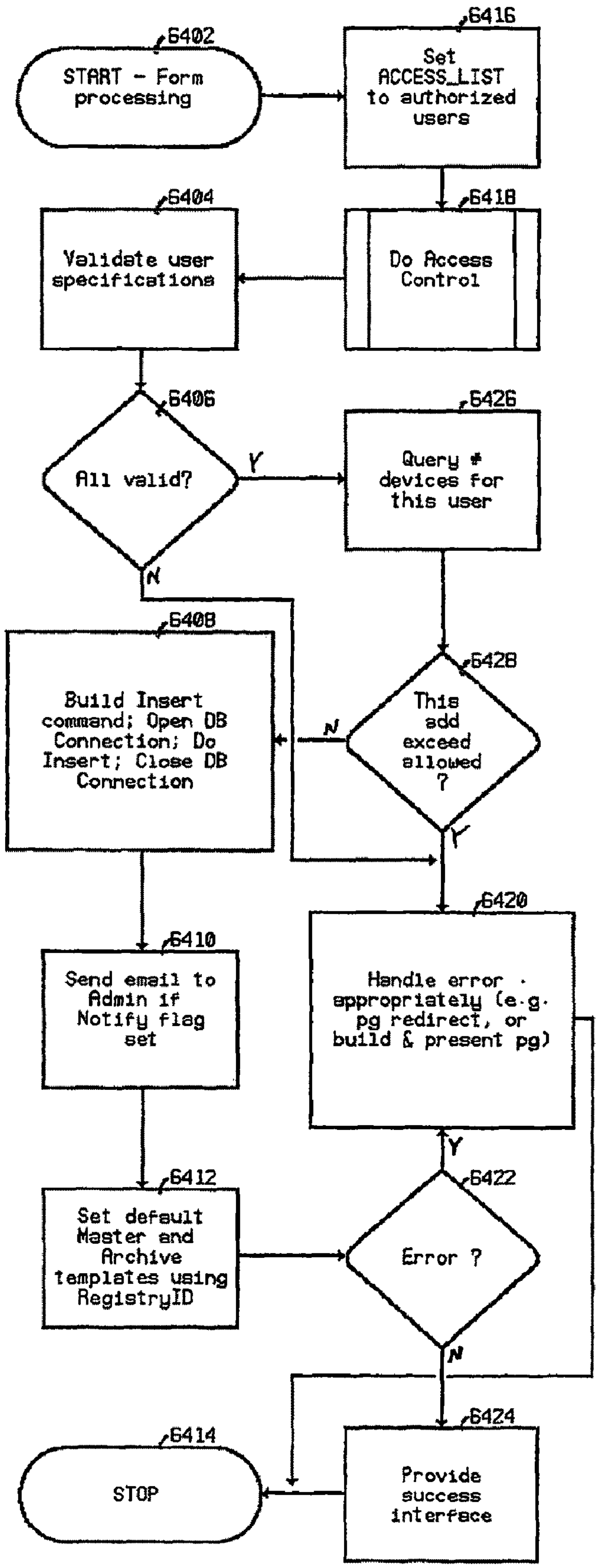
FIG. 64 depicts a flowchart for a preferred embodiment for processing the submittal to add a Registry Table record to the web service.
Figure 65:
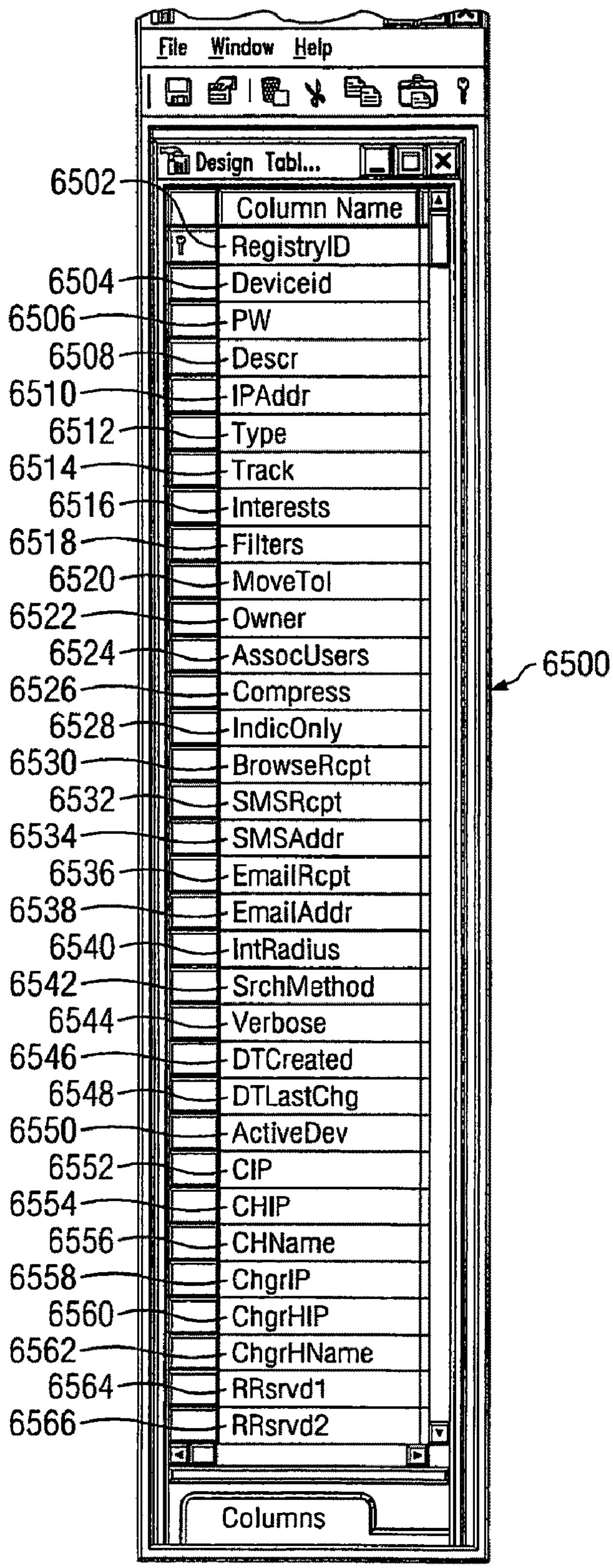
FIG. 65 depicts a preferred embodiment of a data record in the Registry Table used to maintain heterogeneous devices participating with the web service.

FIG. 64 depicts a flowchart for a preferred embodiment for processing the submittal to add a Registry Table record to the web service. FIG. 64 is invoked at block 6318 per discussion above for adding a record 6500 to the Registry Table (FIG. 65 records). Processing starts at block 6402 and continues to block 6416 where the ACCESS_LIST is set for authorized users. Thereafter, block 6418 performs FIG. 39 access control processing and continues to block 6404. Block 6404 validates user field specifications to FIG. 66A, and block 6406 checks the results. If block 6406 determines all fields are valid, then block 6426 queries the number of devices this user currently has in the Registry Table (SELECT(Count) from Registry Table query built where Owner field 6522 equals the PersonID passed from FIG. 39 access control processing). Thereafter, if block 6428 determines the count returned at block 6424 equals or exceeds the MaxDevs field 3020 for this user as passed from FIG. 39 access control processing, then block 6420 reports the error to the user in an appropriate manner and processing terminates at block 6414. If block 6428 determines the user (doing the add) has not exceeded his allowed maximum of devices, then block 6408 builds a Registry Table insert command from FIG. 66A specifications, opens a DB connection, does the insert, and closes the DB connection. Thereafter, block 6410 sends an email to an administrator account if a Notify flag is set to document this type of transaction, and block 6412 sets default Master and Archive templates for Delivery Manager processing using the unique RegistryID auto-generated at block 6408 on the SQL insert (e.g. SELECT @@Identity AS NewID). Thereafter, block 6422 determines if an error occurred creating the device Master or Archive. If block 6422 determines an error occurred in creating the Master and/or Archive for this newly created device, then processing continues to block 6420. If block 6422 determines, everything created successfully, then block 6424 provides the user with a successful add acknowledgement interface such as FIG. 66B, and processing terminates at block 6414.

In one embodiment, the device Master and Archive is an html file created as a unique web service file path constructed with RegistryID. In another embodiment, the device Master and Archive is an html file created as a row in an SQL database for easy query. The device Master and Archive are discussed in detail with Delivery Manager component 2510 descriptions below.

Figure 66A:
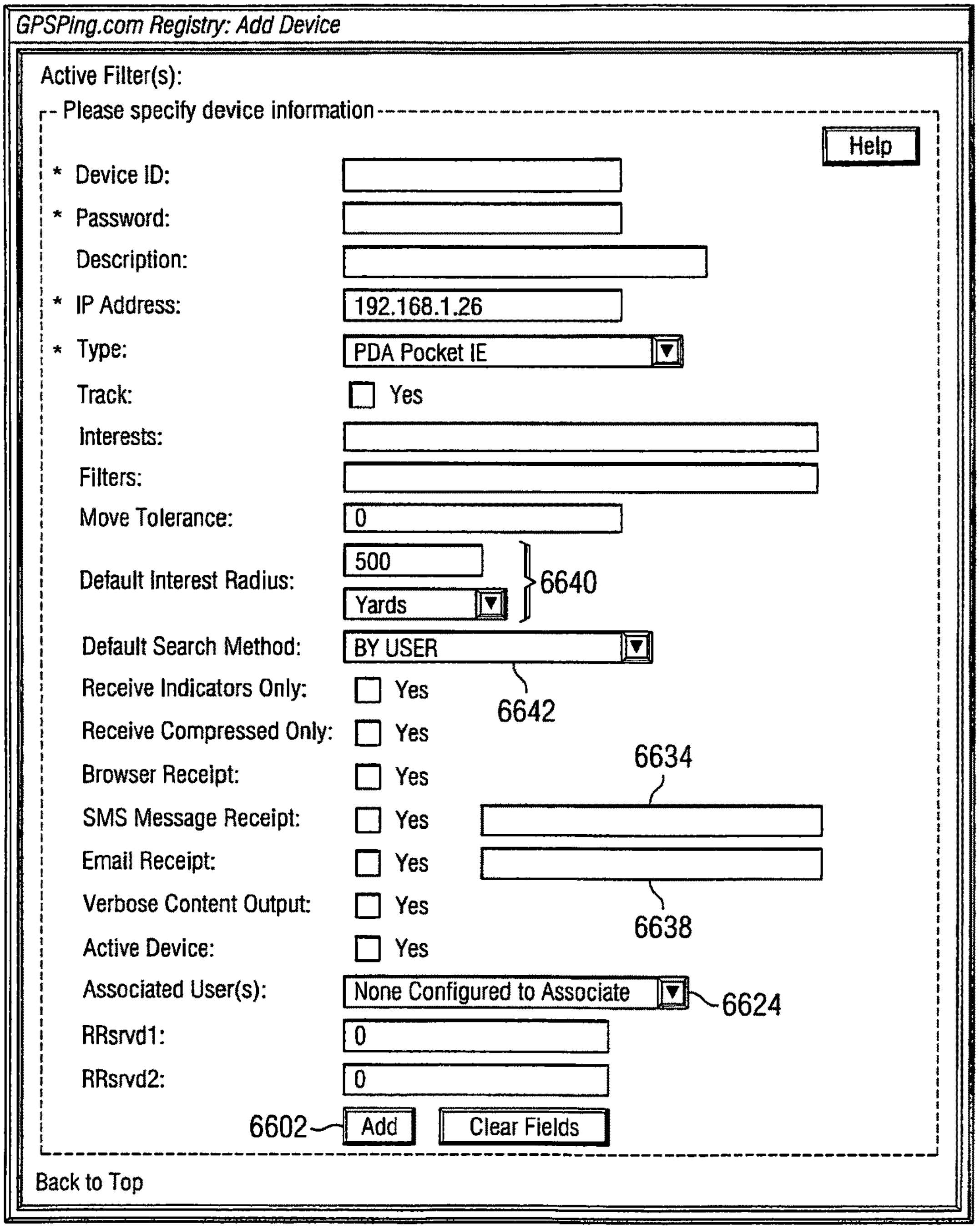
FIG. 66A depicts a preferred embodiment screenshot for adding a Registry record to the web service.

FIG. 65 depicts a preferred embodiment of a data record in the Registry Table used to maintain heterogeneous devices participating with the web service 2102. RegistryID 6502 is preferably a unique primary key automatically generated by the underlying SQL database system to ensure uniqueness when inserting a record 6500 to the Registry Table. Deviceid field 6504 is a device logon name and the PW field 6506 is the device logon password. Fields 6504 and 6506 are used to logon to the Delivery Manager component 2510. In a preferred embodiment, these are maintained separately from LogonName field 3004 and PW field 3006, as shown by FIGS. 66A, 66E, and 66F. In another embodiment, fields 6504 and 6506 are populated with equivalent values from fields 3004 and 3006, respectively, for one to one correspondence between a registrant's account and a device he can manage. In yet another embodiment, fields 6504 and 6506 are not included in record 6500 in which case fields 3004 and 3006 are used from the User Table record 3000 containing a PersonID equivalent to the Owner field 6522. User interfaces are appropriately adjusted depending on the embodiment in use. The Descr field 6508 contains an optional user specified description of the device record 6500. IPAddr field 6510 contains an ip address of the device of record 6500. Type field 6512 contains the type of device, for example a certain type of cell phone, PDA, or equipment type so device interface processing can best adapt to the device through the Delivery Manager component 2510. Track field 6514 is a Yes/No flag for whether or not to track the device whereabouts. Interests field 6516 contains user interests associated with the device for content to be included for delivery. This is preferably a string of words or phrases separated by commas (e.g. "basketball,estate sale,a great deal,cheap gas,baseball"=an interest in "basketball", "estate sale", "a great deal", "cheap gas", "baseball"). Filters field 6518 contains user filter criteria associated with the device for content to omit from delivery. They are configured identically to Interests except they are strings to cause associated deliverable content to not be delivered. MoveTol field 6520 contains a movement tolerance of the device, for example to define how much the device should physically move before a request to find content can be automatically made for the device. That way a device that never moves only has a single request made for its situational location. MoveTol field 6520 is an optional field in certain embodiments. Owner field 6522 contains the PersonID of the People/Users Tables that created (added) the record 6500. A unique key is preferably defined on Deviceid field 6504 to ensure unique device names. Insertion without a unique name should cause an insert error. AssocUsers field 6524 contains a unique joinable column id to a table containing potentially a plurality of users who have an "Affinity Delegate" privilege assigned to also manage the device as though they owned it. Compress field 6526 is a Yes/No flag for whether or not to compress deliverable content before sending it to the device by the device's situational location. IndicOnly field 6528 is a Yes/No flag for whether or not to always send an indicator for content rather than the content itself, perhaps to prevent large communications of data to the device by its situational location. BrowseRcpt field 6530 is a Yes/No flag for whether or not to deliver content to the device in an active Delivery Manager connected browser window. SMSRcpt field 6532 is a Yes/No flag for whether or not to deliver situational location derived content in an SMS message. SMSAddr field 6534 contains an SMS recipient address (e.g. 2144034071@messaging.nextel.com) for SMS message delivery of situational location derived content, for example to the device. EmailRcpt field 6536 is a Yes/No flag for whether or not to deliver situational location derived content in an email message. EmailAddr field 6538 contains an email recipient address (e.g. williamjj@yahoo.com) for email message delivery of situational location derived content, for example to the device. IntRadius field 6540 contains a mobile interest radius (also referred to as interest radius, moving interest radius, and traveling interest radius) surrounding the mobile device of record 6500 during mobility, which is the eligible target for situational location derived content. IntRadius field 6540 can be maintained in any units but preferably is maintained in feet, however, it can be derived from any units in a user interface. The mobile interest radius is a distance from a current device location which defines a circle (in a two dimensional embodiment (e.g. earth's surface)) around the device (device at circle middle) as a target area for receiving content to the device. In a three dimensional embodiment, the mobile interest radius is a distance from a current device location which defines a sphere in space around the device (device at sphere middle) as a target region in space for receiving content to the device. A mobile interest radius is moving as the device moves, so is in effect a moving target for deliverable content. SrchMethod field 6542 defines a preferred search method for the device when finding situational location content for the device. Search Methods include, and are not limited to:

| | |
|---|---|
| Const PRECISE__EXACTMATCH = 1 | 'Seconds (S) from client is used for exact match. |
| Const PRECISE__ROUNDnMATCH = 2 | 'Seconds (S) from client are rounded to an integer, then used to match exactly. |
| Const PRECISE__ROUNDw1D = 3 | 'S from client are rounded to a # with one decimal place, then used to match exactly. |
| Const PRECISE__HALFSECOND = 4 | 'S +/− .5 second range. |
| Const PRECISE__FULLSECOND = 5 | 'S +/− 1 second range. |
| Const PRECISE__SP25toP75 = 6 | 'X.25 < S < X.75 uses X; X.0 <= S <= X.25: (X − 1) & X; X.75 <= S <= X + 1: X & (X + 1). |
| Const PRECISE__SM1toSP1 = 7 | 'S = X.aaa...: (X − 1) to (X + 1) range. |
| Const PRECISE__BYUSER = −N | 'Negative indicates an interest radius in feet |

Verbose field 6544 if a Yes/No flag for whether or not to send a verbose version of situational location content, for example including location parameters of where the content was configured for, the time of sending, and other extra attribute information with the situational location derived content. DTCreated field 6546 contains a date/time stamp of when the record 6500 was created in (added to) the Registry Table. DTLastChg field 6548 contains a date/time stamp of when any field in the record 6500 was last modified. ActiveDev field 6550 is a Yes/No flag for whether or not the record 6500 is active to the web service 2102. Inactive treats the record as though it does not exist in the table, except for the owner of the record to manage it. CIP field 6552 preferably contains an internet protocol (ip) address of the user's device that created the applicable data record 6500. The CHIP field 6554 preferably contains the ip address of the actual physical server of web service 2102 that created applicable data record 6500. CHName field 6556 preferably contains the host name of the physical server of web service 2102 that created applicable data record 6500, for example because web service 2102 may be a large cluster of physical servers. ChgrIP field 6558 preferably contains an internet protocol (ip) address of the user's device that last modified the applicable data record 6500. The ChgrHIP field 6560 preferably contains the ip address of the actual physical server of web service 2102 that last modified applicable data record 6500. ChgrHName field 6562 preferably contains the host name of the physical server of web service 2102 that last modified applicable data record 6500, for example because web service 2102 may be a large cluster of physical servers. RRsrvd1 field 6564 and RRsrvd2 field 6566 are reserved fields for future use.

FIG. 66A depicts a preferred embodiment screenshot for adding a Registry record to the web service 2102, for example by invoking Registry Add option 4644. Fields specified are mapped to the record 6500. Field labels are easily identifiable to corresponding record 6500 fields. Default Interest Radius specification 6640 is shown as a disabled system defaulted amount. This can be a system wide setting default easily changed in a site configuration file, or may be selectable in feet, meters, yards, miles, kilometers, or any other distance units. The amount of units permitted will depend on the units selected. Upon record add, the units are preferably converted to feet as the universal format for maintaining this specification 6640 to IntRadius field 6540. The interest radius (also referred to as mobile interest radius, moving interest radius, and traveling interest radius) can later be specified at any time by the user when interfacing to the Delivery Manager 2510, so it makes sense to force a system default value for simply adding the record. Default Search Method specification 6642 may be a system wide setting default easily changed in a site configuration file (e.g. shown as disabled in FIG. 66A), or may be selectable in accordance with settings as described above for SrchMethod field 6542. The search method can be specified at any time by the user when interfacing to the Delivery Manager 2510, so that it makes sense to force a system default value for simply adding the record. The SMS Address specification 6634 sets the value for field 6534. The Email address specification 6638 sets the value for field 6538. Associated User(s) specification 6624 corresponds to field 6524 and is automatically populated with all users that the owner of the device being added has provided an "Affinity Delegate" privilege to. The "Affinity Delegate" privilege allows another user to manage the device as if they owned (created) it. If no affinity relationship has been provided to other users, then the dropdown is disabled as shown with text of "None Configured to Associate". Dropdown 6624 gets populated at block 6308 after affinity relationships are determined (discussed below). Various record 6500 embodiments may not need field 6524 since "Affinity Delegate" privilege assignments can be determined as needed. Fields 6502, 6546, 6548, and 6552 through 6562 are set automatically by add processing such as FIG. 64 (e.g. block 6408 insert command build).

Figure 66B:
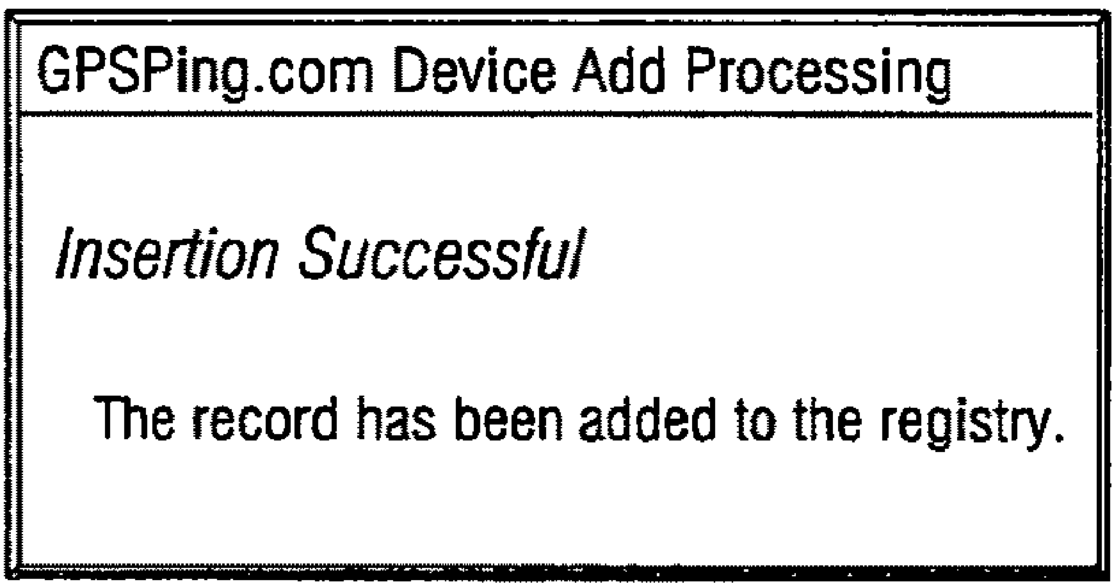
FIG. 66B depicts a preferred embodiment screenshot for successful completion of having added a Registry record to the web service.

FIG. 66B depicts a preferred embodiment screenshot for successful completion of having added a Registry record 6500 to the web service. FIGS. 66A through 67C are analogous in processing the devices of the Registry Table as described by FIGS. 55 through 62 for processing users in the People/Users Table, in consideration of how records are managed (i.e. searched, viewed, modified, deleted, listed, paginated, etc). The flowcharts among FIGS. 55 through 62 shall be described below in context for Registry Table records 6500.

Other embodiments will provide a "dummy-proof" user interface for adding a record 6500 to web service 2102 for the device registration. A wizard or minimal user interaction interface can be used. In one preferred embodiment, a record 6500 is created at the time of creating records 2900 and 3000 for the user account, thereby eliminating user hassle in creating a separate device record. In another embodiment, record 6500 fields are provided as part of the user account record(s) 2900 and/or 3000 for associating a device with the account at the time of creating the account. There are various embodiments which can facilitate registration of devices in web service 2102 without departing from the essence of functionality provided by the record fields.

FIG. 55 depicts a flowchart for a preferred embodiment of processing for managing records of the web service. For this discussion, device information records 6500 are discussed as being managed, for example upon clicking Registry Manage option 4642. Records 6500 are searched and processed analogously to records 2900/3000 as discussed above, and discussion above for records 2900/3000 is relevant in the context of records 6500. Processing starts at block 5502 and continues to block 5504 where the ACCESS_LIST (as discussed above) is set for authorized users. Thereafter, block 5506 performs FIG. 39 access control processing and continues to block 5508 where the search form interface is built and presented to the user, for example the search interface of FIG. 66C. Thereafter, a user interfaces with the search interface at block 5510 until a search action is requested, for example by search button 6698. When the search action is requested by the user, block 5514 validates any applicable user specifications and block 5516 checks the results. If block 5514 determines the fields are valid (and can be submitted for processing), then block 5520 invokes search processing of FIG. 57, and current page processing terminates at block 5518. If block 5516 determines that not all fields specified are valid, then block 5522 provides an error to the user so that specification can continue back at block 5510 (e.g. pop-up). Any pending Filters Management component settings made by the user further filter records found by the search interface.

Figure 66C:
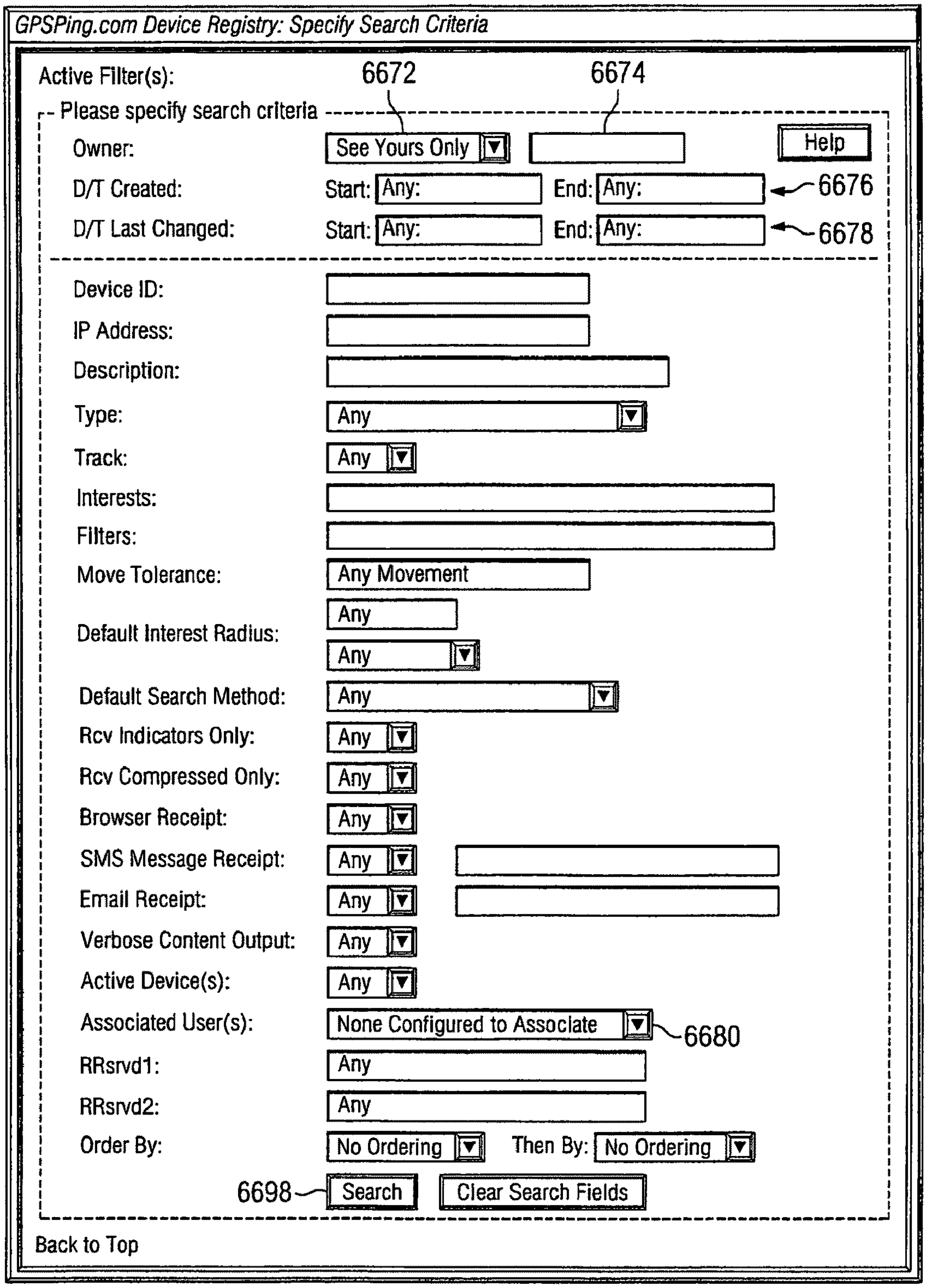
FIG. 66C depicts a preferred embodiment screenshot for searching for web service Registry records with a search criteria.

FIG. 66C depicts a preferred embodiment screenshot for searching for web service Registry records with a search criteria. By default, FIG. 66C finds all records in the database including as described by active filters from Filters Management component 2506. As soon as data is entered to a field of the FIG. 66C search form, or selects a value other than "Any", the search result is narrowed accordingly. Search fields of FIG. 66C are easily identifiable to records 6500. All fields of record 6500 may be searchable, or any subset thereof, in alternative embodiments. Defaulted Date/Time Range specifications 6676 and 6678 may be disabled by block 5508 as the result of first querying the total count of records 6500 in the database for this user (or user type), and determining that there are less than a website installed search minimum. This limits the search criteria options since there are so few records that a search almost doesn't make sense. Any subset of fields can be defaulted this way, or all of the fields can be defaulted this way, based on a configured threshold of total records where a search indeed makes sense. If there were more than the website installed minimum for searching, then defaulted Date/Time Range specifications 6676 and 6678 would be available to the user for specification. Specification 6676 searches on field 6546 and specification 6678 searches on field 6548. Any field can be defaulted with a value for search and saved as data evidence for defaulting field(s) the next time the user is in the same interface at a future time. In this way, the user specifies search criteria, and that specification always defaults the interface according to the user's last specification for each field in the search interface. A Site Owner sees all records 6500 in the web service. Other users only see records 6500 they created by default. Owner field 6674 allows a Site Owner (will be disabled when a Site Owner encounters the interface of 66C if no "Affinity Delegate" privilege is explicitly defined (Site Owner needs no "Affinity Delegate" privileges since can see all users records anyway)) to specify the logon name of the user for seeing records 6500 as though he was logged in as that user. A Site Owner, or user granted with the "Affinity Delegate" privilege by another user, enters the logon name to field 6674 to match to LogonName field 3004 for returning the PersonID 3002 which will then override all processing for page display as though FIG. 39 processing from Access Control made that PersonID available to the including page and subsequent pages. In another embodiment, the specified owner field 6674 simply narrows the search results to records owned by that user by comparing the PersonID 3002 (of the same record 3000 Logon Name field 3004 entered to the field 6674) with the Owner field 6522 of searched records 6500. The registry affinity dropdown 6672 will contain a list of all logon names that have provided an "Affinity Delegate" privilege (discussed below) to the user who encounters FIG. 66C (a Site Owner can enter anything he wants to field 6674). Therefore, any user that has been granted the "Affinity Delegate" privilege from any other user can select the granting logon name from the dropdown 6672 to populate field 6674 for seeing records 6500 as though he was logged on as that user, or for narrowing the search to that user's records (depends on embodiment). Selecting (clicking) from the dropdown 6672 automatically populates field 6674. FIG. 66C shows what displays in dropdown 6672 when the user has no "Affinity Delegate" privileges granted by any other user. Block 5508 gathers assigned "Affinity Delegate" privileges to populate dropdown 6672, and block 5720 ensure an appropriate query is built.

Any, many or all fields can be defaulted with values, or disabled based on desired search criteria support, or associated numbers of records 6500 in the web service. The "Rcv indicators Only" dropdown, "Rcv Compressed Only" dropdown, etc provide the user with a selection for Any, Yes, or No for searching records 6500. Associated user dropdown 6680 provides being able to search those records 6500 which have associated users as defined by the "Affinity Delegate" privilege discussed below. Dropdowns 6672 and 6680 will reveal identical logon names with associated PersonIDs upon selection, but are maintained separately so that granulated "Affinity Delegate" privileges can be implemented. In one embodiment, there is a Registry "Affinity Delegate" privilege for searching records 6500 (dropdown 6672 and field 6674), a DCDB "Affinity Delegate" privilege for searching records 7000, and a specific "Affinity Delegate" privilege for searching certain types of other records. There can also be a specific User to User "Affinity Delegate" privilege for generally acting on behalf of another user (dropdown 6680). All search results can be sorted according to the "Order By" dropdown specifications which preferably include every column of record 6500.

FIGS. 57 and 58 depict flowcharts for a preferred embodiment of search processing of records of the web service. For this discussion, device information search criteria (e.g. from FIG. 66C) is discussed as being processed, for example upon clicking search button 6698. Records 6500 are searched and processed analogously to records 2900/3000 as discussed above, and discussion above for records 2900/3000 is relevant in the context of records 6500. Processing starts at block 5702 and continues to block 5704 where the ACCESS_LIST is set for authorized users. Thereafter, block 5706 performs FIG. 39 access control processing and continues to block 5708. Block 5708 builds the top of the page to return to the user, validates all fields specified in the search criteria interface (e.g. FIG. 66C) according to the record type (i.e. record 6500), and processing continues to block 5710. If all fields specified in the search criteria interface are valid, then processing continues to block 5712. If there is at least one invalid field specified, then block 5746 reports the error appropriately to the user interface, and processing terminates at block 5756.

Block 5712 sets a variable ROWSPERPG to rows per page data evidence as configured by records per page field 5086 of FIG. 50I. A defaulted number is used if the data evidence is not found. Then, block 5714 checks to see how this page processing was arrived to, for example, by pagination or directly from the search criteria interface. If block 5714 determines the processing page was arrived to directly as the result of invoking the search button 6698, then block 5718 accesses page filter data evidence for appending to a SQL Select WHERE clause. Thereafter, block 5720 builds any SQL ORDER BY clause if order by specifications were made, appends SQL WHERE clause criteria based on search criteria interface field specifications, appends any Filters management data evidence found to the SQL WHERE clause, and constructs a SQL query string suffix comprised of a completed WHERE clause and ORDER BY clause. The WHERE clause is also amended with the PersonID of the logged on user of FIG. 66C if the user type is not a Site Owner and no specification was made at field 6674. If a specification was made at field 6674, then the WHERE clause is amended with the associated PersonID which is preferably determined in block 5708 by querying the Users Table for the PersonID with the logon name and ensuring one that granted the “Affinity Delegate” privilege was returned at block 5710 (Site Owner does not require an “Affinity Delegate” privilege). WHERE clause conditions will use “LIKE” or “=” depending on the field type being searched. Thereafter, block 5722 completes building the SQL SELECT statement with the SQL query string suffix appended for all records 6500. List output variable ROWSTART is initialized to 1 and list output variable ROWLAST is set to ROWSPERPG. These variables enable proper pagination between pages of results, and are maintained as list pagination data evidence. Thereafter, block 5724 opens a DB connection, opens an active cursor using the SQL SELECT statement and determines the number of resulting rows produced by the query which is kept in a variable TOTALROWS. Thereafter, if block 5726 determines there are no resulting rows, then block 5728 reports the condition of no results to the user interface, closes an open DB connection, and processing terminates at block 5756.

Figure 66D:
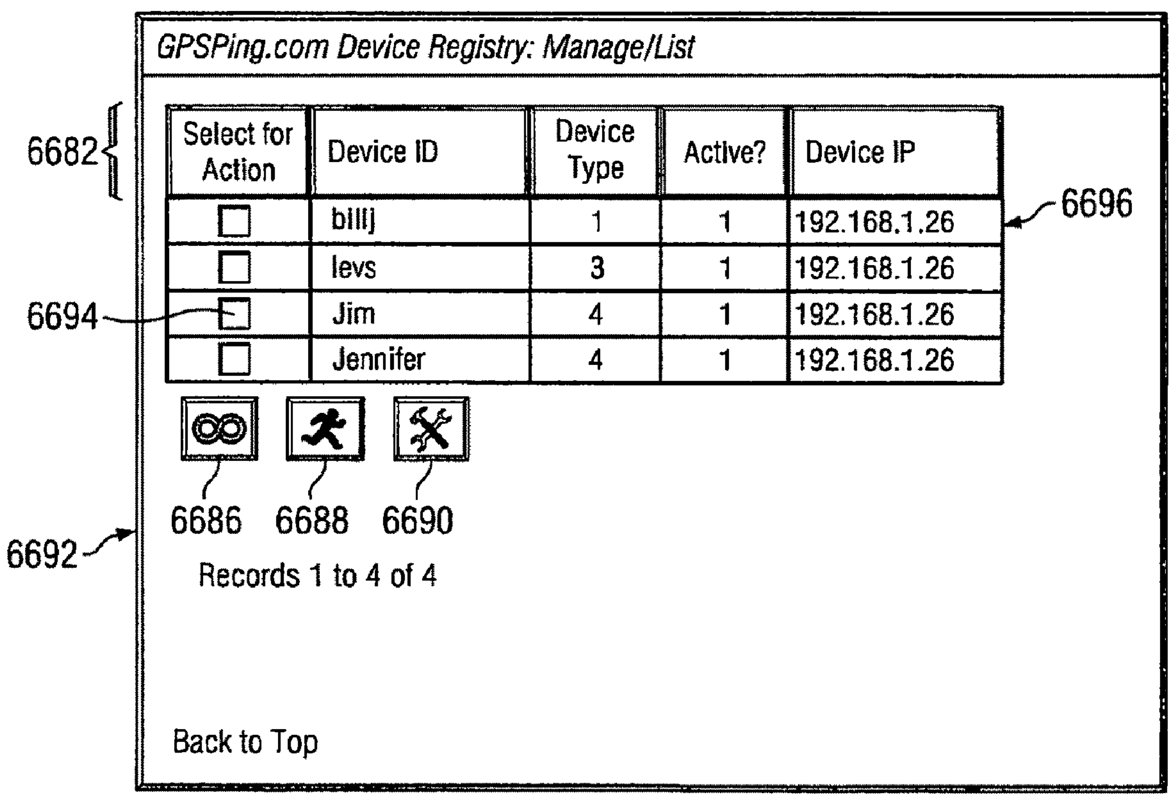
FIG. 66D depicts a preferred embodiment screenshot for results from searching the web service Registry records after a user search specification.
Figure 66E:
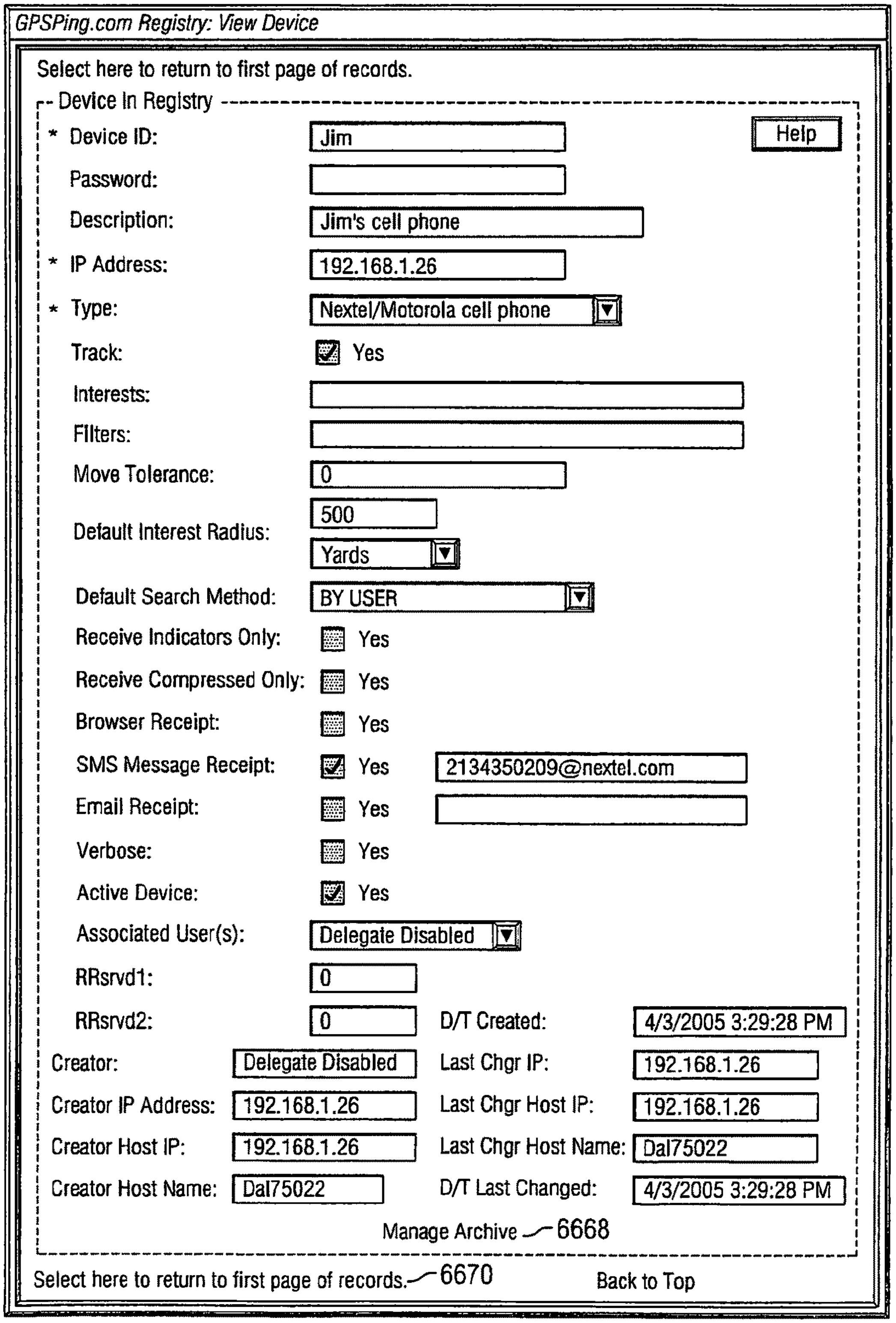
Figure 66F:
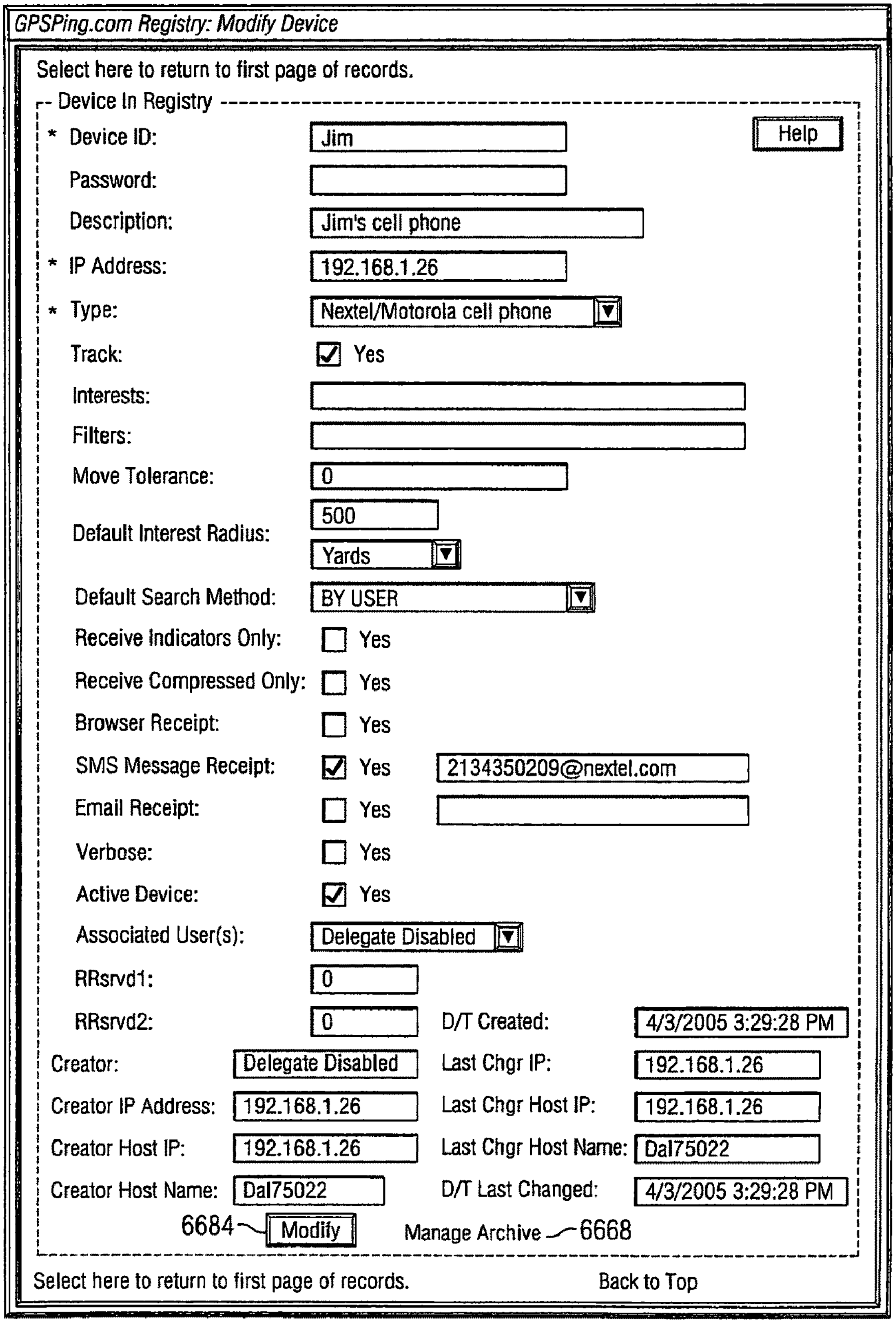

If block 5726 determines there is at least one row in the results (i.e. TOTALROWS>=1), then block 5730 saves the SQL SELECT query as query data evidence, rows are fetched up to the variable ROWSTART, the list output header is built (e.g. 6682), no ORDER BY columns are added to the standard list output since none was selected, and a variable ROWSOUT is set to 0. Columns shown in FIG. 66D are already put out in the standard result list form. Thereafter, if block 5732 determines ROWSOUT>=ROWSPERPG, then no additional rows are iterated out from query results in which case block 5738 builds management controls 6686 through 6690, and pagination information 6692 is output. Thereafter, if block 5740 determines TOTALROWS>ROWSOUT, then processing continues to block 5748, otherwise processing continues to block 5742 where a DB connection is closed and onto block 5802 of FIG. 58 by way off page connector 58000.

If block 5748 determines ROWSTART=1, then processing continues to block 5752, otherwise block 5750 builds the user interface page with pagination control for first page pagination control and previous page pagination control. Thereafter, processing continues to block 5752. If block 5752 determines that ROWLAST>=TOTALROWS then processing continues to block 5802 by way of off page connector 58000, otherwise block 5754 builds the user interface page with pagination control for last page pagination control and next page pagination control. Thereafter, processing continues to block 5802.

If block 5732 determines ROWSOUT were not greater than or equal to ROWSPERPG, then block 5734 checks if all rows have been fetched for output processing. If block 5734 determines all rows have been fetched (processed), then processing continues to block 5738 already described. If block 5734 determines all rows have not been fetched (processed), then block 5736 manufactures a checkbox (e.g. checkbox 6694) for a row, associates record id data evidence (i.e. RegistryID), for example in a hidden field associated with the checkbox, builds the row output (e.g. a row 6696) for presenting all fields of the list header 6682, increments the ROWSOUT variable by 1, then fetches the next row using the open cursor. Thereafter, processing continues back to block 5732. Blocks 5732 through 5736 comprise a loop for output of rows satisfying search criteria. Processing continuing to block 5802 by way of off page connector 58000 also preferably builds and presents a “Back to Top” link at the page bottom in case the user has to scroll lots of information as dictated by ROWSPERPG.

If block 5714 determines the search processing page was arrived to by pagination (e.g. pagination controls analogously displayed such as those of controls 5922 through 5928), then block 5716 accesses the query data evidence, accesses the list pagination data evidence (ROWSTART and ROWLAST), then continues to block 5724 for issuing the query and performing subsequent processing.

The user interfaces with search results at block 5802 until an action is selected. FIG. 66D is an example of the search results interface upon the start of block 5802. When an action is selected, block 5806 checks if it was pagination to go to the first results page, for example clicking a pagination control (controls not shown since only 4 records). If block 5806 determines pagination to go to first page was selected, then FIG. 57 processing is invoked after properly setting ROWSTART and ROWLAST data evidence for first page results at block 5816, and current page processing terminates at block 5818. If block 5806 determines the action was not for go to first page, then processing continues to block 5808. If block 5808 determines pagination to go to the previous page was selected (controls not shown since only 4 records), then FIG. 57 processing is invoked after properly setting ROWSTART and ROWLAST data evidence for previous page results at block 5816, and current page processing terminates at block 5818. If block 5808 determines the action was not for go to previous page, then processing continues to block 5810. If block 5810 determines pagination to go to the next page was selected (controls not shown since only 4 records), then FIG. 57 processing is invoked after properly setting ROWSTART and ROWLAST data evidence for next page results at block 5816, and current page processing terminates at block 5818. If block 5810 determines the action was not for go to next page, then processing continues to block 5812. If block 5812 determines pagination to go to the last page was selected (controls not shown since only 4 records), then FIG. 57 processing is invoked after properly setting ROWSTART and ROWLAST data evidence for last page results at block 5816, and current page processing terminates at block 5818. If block 5812 determines the action was not for go to last page, then processing continues to block 5814. If block 5814 determines a delete, view, or change action was invoked, then processing continues to block 5828, otherwise block 5824 handles the action appropriately and processing continues back to block 5802. Block 5824 handles actions associated with the interface depending on the device type that are not necessarily relevant for understanding this disclosure.

Block 5828 determines how many rows are marked with a checkmark by the user and block 5830 validates it. If block 5832 determines no checkmarks are present, then block 5820 provides an error for report to the user so user specification can continue back at block 5802. If block 5830 determines at least one row has been checked, then block 5832 checks the action type. If block 5832 determines that delete was invoked by the user (e.g. delete management control 6690 selected), then block 5836 provides a confirmation message and block 5838 determines the user's answer to the "Are you sure?" confirmation (e.g. pop-up of FIG. 59C). If block 5838 determines the user confirmed the delete, then the confirmation is cleared at block 5840, list management data evidence is set for delete at block 5842, block 5826 invokes list processing of FIG. 60, and current page processing terminates at block 5818. If block 5838 determines the user cancelled the delete, then the confirmation is cleared at block 5822, and the user continues to interact with the search results at block 5802. If block 5832 determines that delete was not selected, then list management data evidence is set for view (i.e. view management control 6686 selected) or modify (i.e. change management control 6688 selected) at block 5834 per user action, block 5826 invokes list processing of FIG. 60, and current page processing terminates at block 5818. Thus, FIGS. 57 through 58 provide search result list processing of device records of the Registry Table for being conveniently viewed, modified, or viewed.

FIG. 66D depicts a preferred embodiment screenshot for results from searching the web service Registry records after a user search specification. FIG. 66D is in fact a real output from the search criteria as specified in FIG. 66C. Note the entries are not sorted since no Order By was specified. Also note there were no additional columns displayed beyond the standard fields displayed, because no Order By was selected. FIG. 66D depicts a preferred embodiment screenshot upon no reason to paginate results from searching the web service device records after a search specification. There is no pagination controls displayed because only 4 device records 6500 were returned. Otherwise, appropriate pagination controls may be returned for processing analogous to processing of control 5922 through 5928 of FIGS. 59A and 59B. FIG. 59C depicts a preferred embodiment screenshot for a warning prompt for deleting one or more marked records. Other embodiments may present a different confirmation appearance or method.

FIG. 60 depicts a flowchart for a preferred embodiment of search result list processing of records of the web service. For this discussion, FIG. 60 was invoked at block 5826 for processing record(s) 6500. Records 6500 are searched and processed analogously to records 2900/3000 as discussed above, and discussion above for records 2900/3000 is relevant in the context of records 6500. Processing starts at block 6002 and continues to block 6004 where the ACCESS_LIST is set for authorized users. Thereafter, block 6006 performs FIG. 39 access control processing and continues to block 6008. If block 6008 determines the user is a Delegate (from access control processing), then block 6010 forces list management data evidence to view since Delegate access is read only to the members area. Processing then continues to block 6012. If block 6008 determines the user is not a Delegate, then processing continues to block 6012.

Block 6012 iterates through the form checkboxes (from FIG. 66D) to build an array of record ids (i.e. RegistryIDs) from record id data evidence associated with rows that are check-marked for action. Additionally built is a WHERE clause string of the same check-marked record id evidence (i.e. RegistryIDs) so an action can be done in a single SQL query to multiple records (e.g. records 6500). Thereafter, block 6014 checks if at least one check-marked checkbox (e.g. 6694) was found. If none were check-marked, then block 6018 reports an appropriate error to the user, block 6046 closes any DB connection that is open (none open yet), and current page processing terminates at block 6032. If block 6014 determines at least one checkmark is found, then block 6016 checks list management data evidence. If block 6016 determines list management data evidence indicates a delete action, then an SQL Delete command is built at block 6048 for the Registry Table with the WHERE clause of record ids built at block 6012. Any foreign key relationship tables will cascade delete (using RegistryID). Block 6048 also opens a DB connection, does the Registry Table delete, closes the DB connection, sends an email to an Administrator account if a Notify flag indicates to document this type of transaction, and a success interface is returned to the user. Processing then continues to block 6046 for closing any DB connection that is still open, and current page processing terminates at block 6032. Block 6048 will also delete any records and data of server data 2104 that has been associated to the device record(s) 6500 being deleted by block 6048 which are not set up for cascade delete. Such records should be deleted prior to finally deleting the record 6500 which cascade deletes other records.

If block 6016 determines the list management data evidence does not indicate a delete action, then block 6020 accesses pending query data evidence, concatenates WHERE clause information of record ids built at block 6012 so only the check-marked rows are fetched, opens a DB connection, does the query, and fetches the first row. Thereafter, block 6022 checks if even a first row was fetched. If block 6022 determines no first row was fetched (no rows result from query), then block 6018 handles reporting the error to the user and processing continues from there as described above. If block 6022 determines a first row was fetched, then block 6024 builds the top portion of the page to return to the user. Thereafter, if block 6026 determines the list management data evidence is for view, then block 6028 sets the disabled/readonly switch (dfld variable as discussed above) for read-only and processing continues to block 6030. If block 6026 determines the list management data evidence is not for view, then processing continues to block 6030.

If block 6030 determines there is only 1 row returned from the query at block 6022, then block 6034 builds and presents a record interface, presenting a Modify button only if the list management data evidence indicate a modify action (e.g. control 6688). Block 6034 also associates record id data evidence (RegistryID) of the information presented, preferably as a hidden form field. Block 6034 presents FIG. 66E if the list management data evidence was for view of a single row check-marked, for example in checkbox 6694. Block 6034 presents FIG. 66F if the list management data evidence was for modify of a single row check-marked (e.g. checkbox 6694). Thereafter, the user interfaces to any of FIGS. 66E through 66F at block 6036 until a Modify action is invoked, for example clicking button 6684. If a view interface is presented (FIG. 66E), then no Modify button can be pressed. The user can use the Back key, click the first page link 6670 to return to the first page of records (FIG. 66D), close the window, or do whatever makes sense at the device. If the Modify button 6684 is pressed, then block 6038 validates form fields according the record type (i.e. record 6500), and processing continues to block 6040. If block 6040 determines at least one field is invalid, then block 6042 reports the error to the user so field specification can continue back at block 6036 (e.g. pop-up). If block 6040 determines all fields are valid, then block 6044 invokes modify record processing of FIG. 53 (re-described for Registry Table context below), block 6046 closes any open DB connection, and current page processing terminates at block 6032.

Figure 67A:
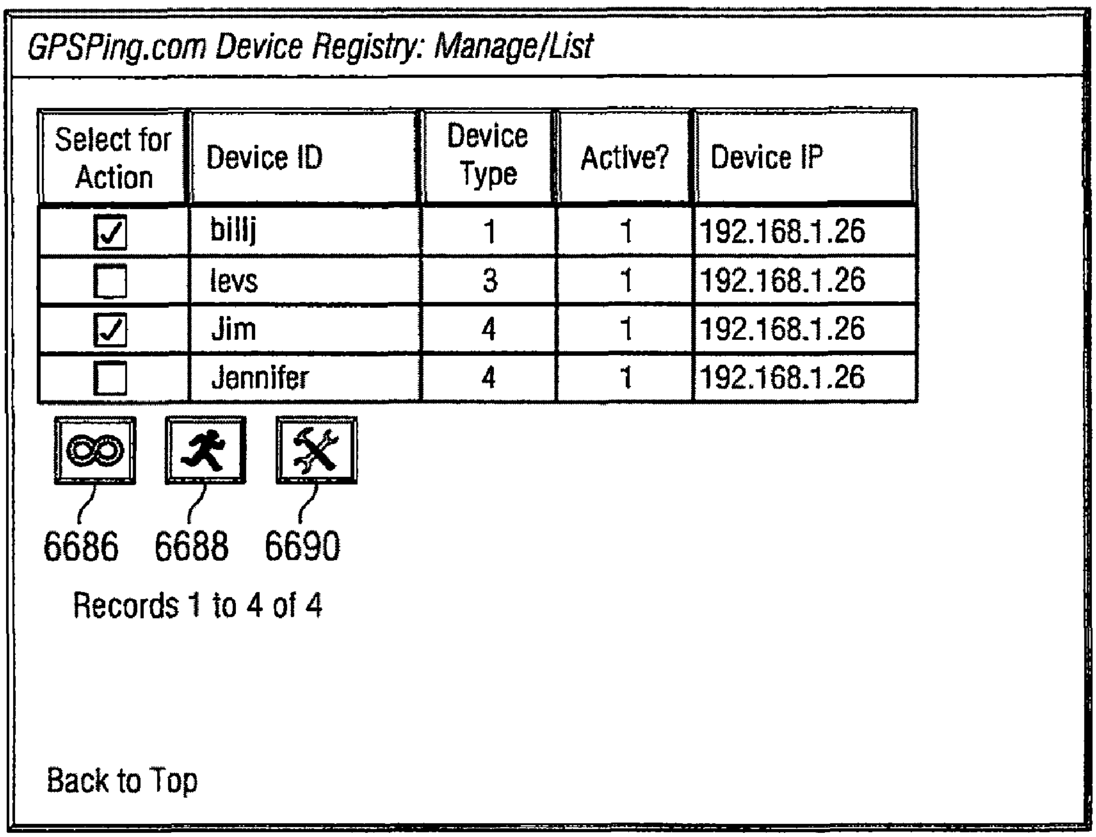

If block 6030 determines there is more than 1 row returned by the query at block 6020, then block 6050 checks the list management data evidence for the action requested. FIG. 67A shows the user has selected (i.e. check-marked) multiple rows prior to invoking a control 6686 through 6690. If block 6050 determines the list management data evidence is not modify, then processing continues to block 6064. If block 6064 determines the list management data evidence is not for view, then block processing continues to block 6018 since list management data evidence is invalid. If block 6064 determines the list management data evidence is for view, then block 6066 builds the output page topmost portion, and block 6068 builds a record output from the last record fetched. Otherwise, block 6064 continues to block 6018 for error handling of unexpected list management data evidence. After block 6068, if block 6070 determines the last row was fetched for output, then block 6074 completes page output and processing continues to block 6046. If block 6070 determines there is another row to output, then block 6072 fetches the next row and processing loops back to block 6068. Blocks 6066 through 6074 include a processing loop for presenting a view of multiple records such as FIG. 67B. FIG. 67B is an actual view output from processing upon invoking view management control 6686 on FIG. 67A.

Figure 67C:
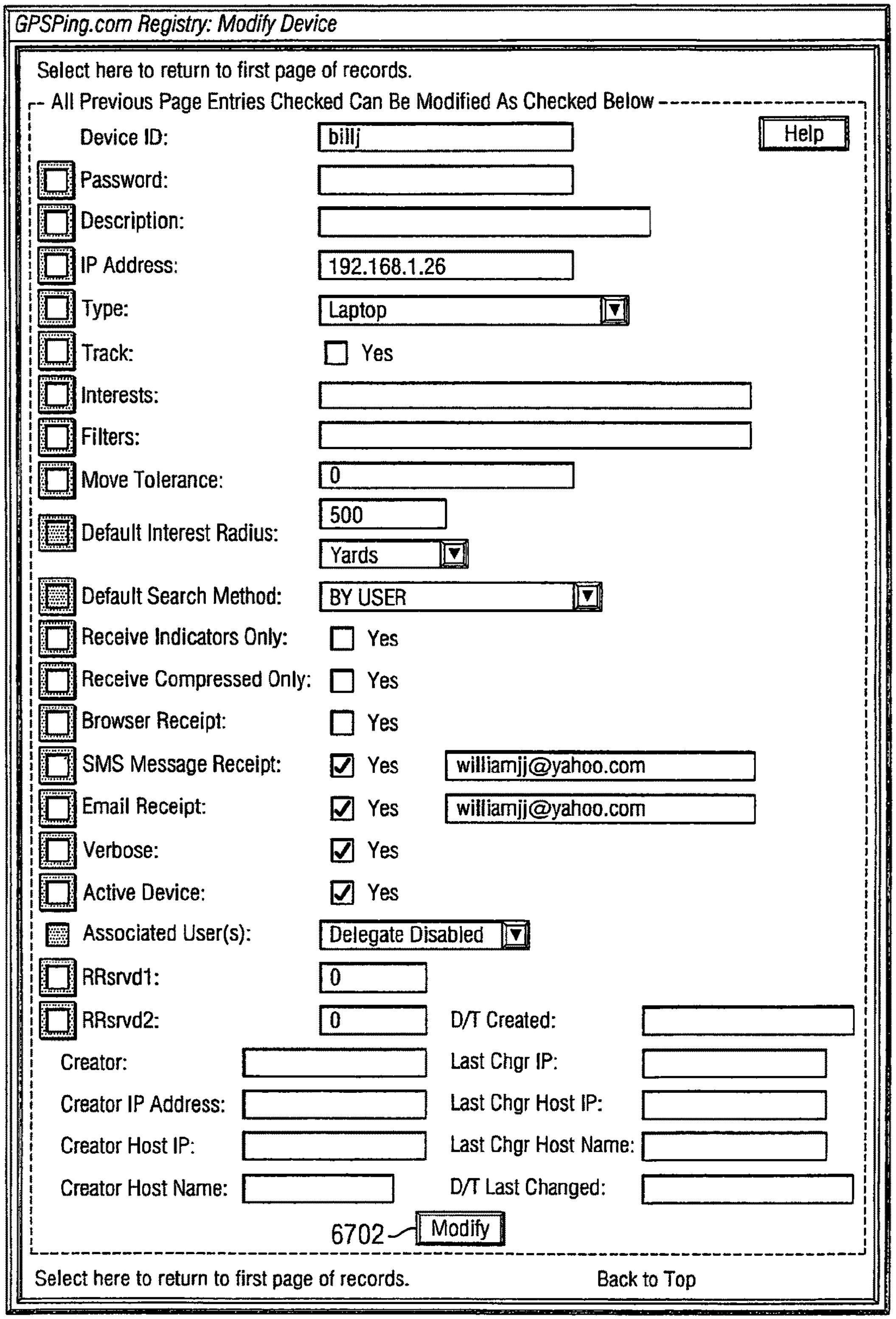

If block 6050 determines the list management data evidence is for modify, then block 6052 builds a Modify List user interface, iterates through fetches of query results from block 6020, and establishes record id array data evidence (e.g. RegistryIDs) for records returned, preferably as hidden form fields in FIG. 67C. FIG. 67C actually results from invoking modify management control 6688 from FIG. 67A. Data from the first record in the query results is conveniently defaulted in fields. A preferred embodiment will save which row was check-marked first from list output (e.g. FIG. 67A) as first check data evidence so that the first checkmark determines which data is used to default the modify list interface (e.g. FIG. 67C). Note the checkmark included for the user selecting which fields with checkmarks to update in the plurality of records resulting from the query at block 6020. Thereafter, the user interfaces to FIG. 67C at block 6054 until Modify button 6702 is invoked. When modify is invoked, processing continues to block 6056 where fields are validated from FIG. 67C and block 6058 checks validation results. If block 6058 determines all fields are valid (i.e. syntax, at least one checkmark, checkmark corresponds to non-null field, etc), then block 6062 invokes Modify List processing of FIG. 62, and processing continues to block 6046. If not all fields are valid as determined at block 6058, then an error is reported at block 6060 to the user so field specification can continue back at block 6054 (e.g. pop-up).

For this discussion, FIG. 53 is discussed in context of modification processing of the device record information invoked at block 6044 in context for a record 6500. Processing starts at block 5302 and continues to block 5304 where the ACCESS_LIST (as discussed above) is set for authorized users. Thereafter, block 5306 performs FIG. 39 access control processing and continues to block 5308 where the form fields for the record information are validated according to record type (i.e. device record=Registry Table record=record 6500), and then results are checked at block 5310. If any field is found invalid for processing at block 5310, then block 5324 reports the error appropriately to the user interface, and processing terminates at block 5326. If all fields are found to be valid at block 5310, then block 5312 builds an update command for the Registry Table using fields from the form where the RegistryID equals the record id data evidence passed for processing. Thereafter, block 5314 opens a DB connection, block 5316 does the update, and block 5318 closes the DB connection. Thereafter, block 5320 sends an alert email to an Administrator account if a Notify flag is enabled for this type of database update, block 5322 builds and serves back a success interface to the user, and processing terminates at block 5326.

FIG. 66E depicts a preferred embodiment screenshot for viewing Registry information of a selected Registry record, for example when placing a single checkmark at checkbox 6694 and invoking control 6686. FIG. 66F depicts a preferred embodiment screenshot for modifying Registry information of a selected Registry record, for example when placing a single checkmark at checkbox 6694 and invoking control 6688. FIG. 67A depicts a preferred embodiment screenshot for results from searching the web service Registry records after a user search specification, and then user selecting records to manage with checkmarks placed next to desired records for management. FIG. 67B depicts a preferred embodiment screenshot for viewing a plurality of selected Registry records, for example in accordance with those records that were check-marked in FIG. 67A and then invoking control 6686. FIG. 67C depicts a preferred embodiment screenshot for modifying a plurality of selected Registry records, for example in accordance with those records that were check-marked in FIG. 67A and then invoking control 6688.

FIG. 62 depicts a flowchart for a preferred embodiment for processing the request to modify a plurality of records of the web service. For this discussion in context for records 6500, FIG. 62 was invoked at block 6062. Processing starts at block 6202 and continues to block 6204 where the ACCESS_LIST is set for authorized users. Thereafter, block 6206 performs FIG. 39 access control processing and continues to block 6208. Block 6208 validates form fields (e.g. from FIG. 67C), and then block 6210 checks validation results. If at least one field is invalid, then block 6226 appropriately reports the error to the user, and processing terminates at block 6228. If all fields are valid, then block 6210 continues to block 6212. Block 6212 builds a WHERE clause string from record id array data evidence (e.g. from hidden form field), builds an update command for the Registry Table with fields specified and check-marked in FIG. 67C, and concatenates the WHERE clause string of record ids (RegistryIDs) constructed at block 6212. Thereafter, block 6216 opens a DB connection, block 6218 does the update command, block 6220 closes the DB connection, block 6222 send an email to an administrator account if a Notify flag indicates to document this type of transaction, block 6224 builds and serves back a successful result interface, and processing terminates at block 6228. So, a plurality of devices are modified all at once as check-marked, for example on FIG. 67A and FIG. 67C.

Figure 68:
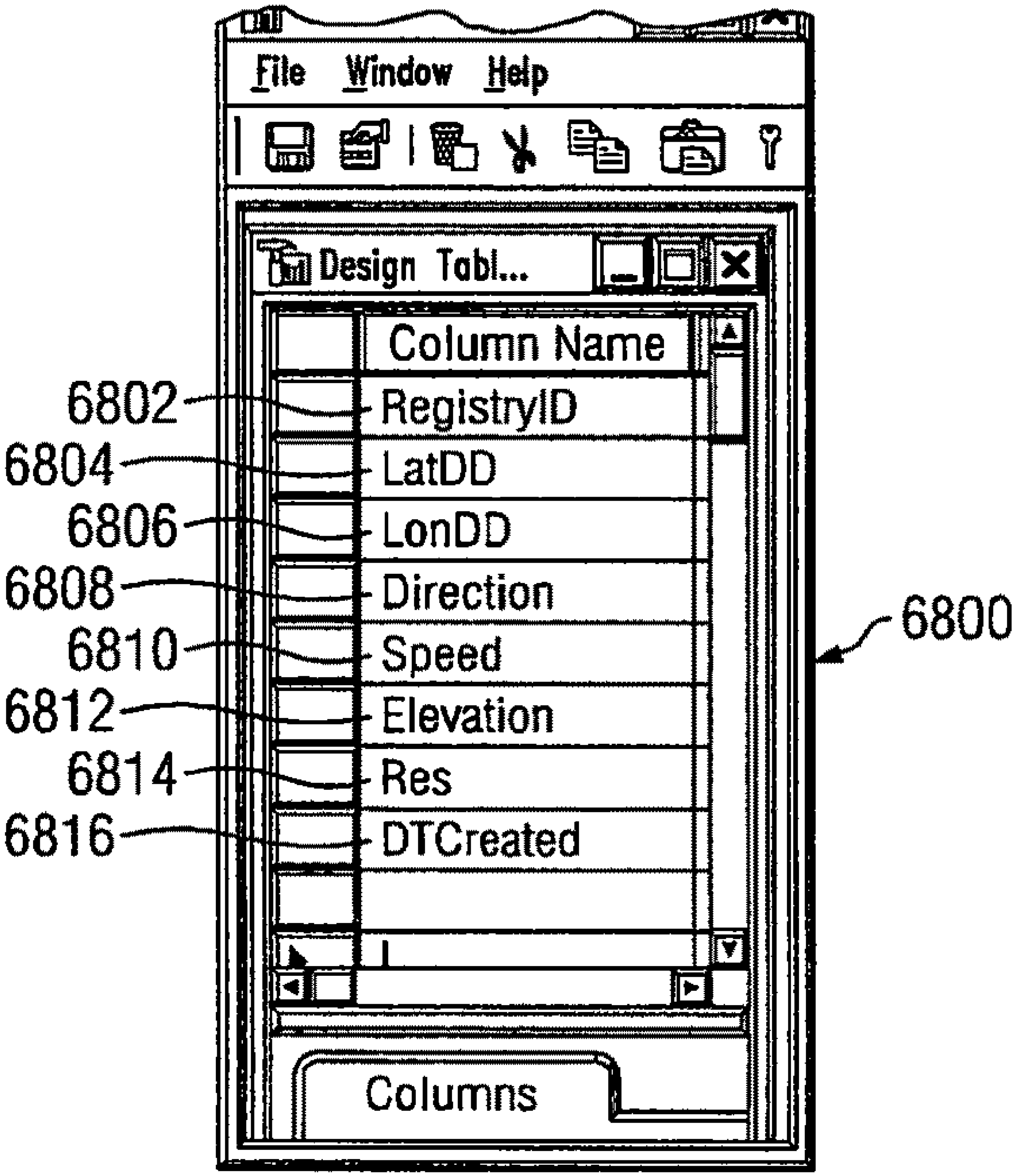

FIG. 68 depicts a preferred embodiment of a data record in the Trail Table used to track and maintain mobile history of devices registered in the Registry table. RegistryID 6802 is a foreign key with cascade delete to RegistryID 6502 so that records 6800 are automatically deleted when associated parent records 6500 are deleted. LatDD field 6804 contains the device latitude in decimal degrees. LonDD field 6806 contains the device longitude in decimal degrees. Direction field 6808 contains the device direction at the time of the recorded device latitude and longitude in record 6800. Direction can be a continuous measure heading value (e.g. degrees clockwise relative from North such as 47.23), a discrete heading value (e.g. East), or any direction data means. Speed field 6810 contains the device speed, preferably in miles per hour. Elevation field 6812 contains the device elevation relative to earth or some level on earth (e.g. sea level), preferably in feet. Res field 6814 is for future use. DTCreated field 6816 is a date/time stamp for when the record was inserted into the database. Records 6800 are periodically inserted into the database for mobile devices. Records 6800 provide data means for driving location functionality in web service 2102. Elevation field 6812 may not be required in some embodiments, and any of the record 6800 measurement fields (6804 through 6812) may be units or classes of measurement as desired by a particular embodiment without departing from the essence of information captured in record 6800. When the Track field 6514 is set to Yes for a device, records 6800 are inserted into the Trail Table (FIG. 68 records) according to a configured device heartbeat rate. The device heartbeat is a CADE generated periodically by system event management. The heartbeat rate can be any time period desired, either defaulted by the system, set by a user of the device, set by an Administrator of the device, set for device type, set for a class of devices, dependent on the device movement tolerance, or set for the device as applicable configuration is desired.

Another embodiment to FIG. 68 maintains three dimensional space tracking information for the whereabouts of devices. This enables locating, finding routes for, showing travel reports for, and tracking devices in three dimensional space. For example, the LatDD field 6804 and LonDD field 6806 information along with Elevation field 6812 can be used, or an x-y-z Cartesian coordinate or Polar coordinate system can be used with appropriate fields for an origin and for maintaining the location in three dimensional space. In another embodiment, a new Planet field 6813 (e.g. Earth, Mars, etc) may describe the planet that other record 6800 fields are in reference of. Yet another embodiment inserts records 6800 containing additional fields for all situational location information about the device. This provides additional means for reporting and searching information about devices.

A preferred embodiment requires verification to be performed to ensure EmailAddr field 6538 and SMSAddr field 6534 are valid whenever a record 6500 is added or modified (unless added or modified by a Site Owner). Verification processing is analogous to descriptions above for registration and user account modification processing. For the EmailAddr field 6538, an interface similar to FIG. 32A can be presented to the user with identical confirmation code processing requiring the user to enter the confirmation code sent to his desired email address being added or modified. Only a valid entry of the confirmation code will permit setting the EmailAddr field 6538. For the SMSAddr field 6534, an interface similar to FIG. 32A can be presented to the user with identical confirmation code processing requiring the user to enter the confirmation code sent as a message to his desired SMS address being added or modified. Only a valid entry of the confirmation code will permit setting the SMSAddr field 6534.

A preferred embodiment for streamlining the registration process and device management process for users (e.g. Pingers) combines device creation in the Registry (record 6500) with user account creation (records 2900/3000). For example, link 2702 invoked registration will enforce a MaxDevs field 3020 to a value of 1 for the account created. Neighboring text to link 2702 will document that the user account and device are one in the same. Blocks 2818 and 3320 will additionally insert a record 6500 with Deviceid field 6504 set to the user LogonName field 3004 and PW field 6506 set to PW field 3006 for the successfully registered user using appropriately defaulted fields. The record 2900 "Email" field can be defaulted to EmailAddr field 6538 without a Yes in field 6536. Different FIG. 45 processing will present FIG. 50A options without a Registry options category header 4640, Registry Manage option 4642, and Registry Add option 4644. The user will use the Users my preferences option 4606 to manage the device at FIGS. 50G through 501 at fields 5072 and 5074. Preferably, fields 5072 and 5074 are already defaulted for the user so he never has to do data entry there. In a similar embodiment, records 3000 and 6500 are combined to a single record 3000 for user accounts. In yet another similar embodiment, options 4640, 4642 and 4644 continue to show but the user can only manage a single record 6500 which has already been defaulted for him from registration. There are various embodiments for giving the user the perception (or realization) that the user account credentials and device credentials are indistinguishable, while making it convenient to automatically create account information to alleviate the user from web service 2102 complexities.

Delivery Content Database (DCDB) Management—The Deliverable Content

Figure 70:
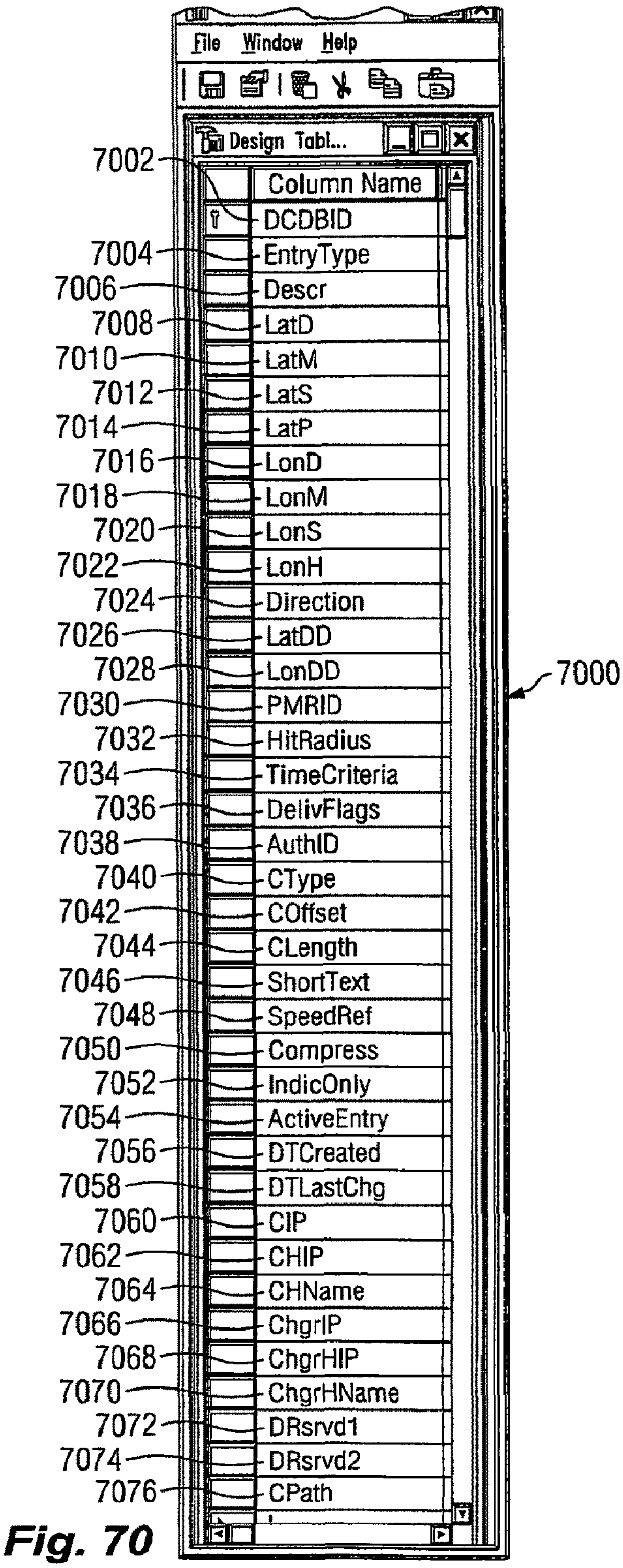

A Content Provider user type (e.g. Content Provider, Content Provider Gold, Content Provider Platinum) can manage and add deliverable content to members area 2500 through the DCDB Management component 2508. DCDB Management component 2508 comprises the selectable DCDB Manage option 4650 and DCDB Add option 4652 under DCDB options category header 4648. DCDB Management component 2508 also provides a DCDB Import/Export option 4654 to a Site Owner user type (read only access for Delegate) for scripting management of devices. Scripts maintained can insert large numbers of content items, update large numbers of content items, delete large numbers of content items, or do any management to content items as discussed herein, except automated with scripting. It may be inconvenient requiring a user to use a Graphical User Interface (GUI) to maintain large numbers of content items, therefore full scripting capability is provided for managing records 7000 in the DCDB Table (FIG. 70 records). No content provider or user (except a Site Owner) can see or manage another content provider's content items, unless an "Affinity Delegate" privilege has been granted to that user. A Pinger is not a content provider, but does have the ability to configure PingSpots and Pingimeters as discussed below.

FIGS. 69 through 71J are analogous in processing deliverable content of the DCDB Table as described by FIGS. 63 through 67C for processing devices in the Registry Table, in consideration of how records are managed (i.e. searched, viewed, modified, deleted, listed, paginated, etc). The flowcharts discussed for FIGS. 63 through 67C shall be described below in context for DCDB Table records 7000. Records 7000 are searched and processed analogously to records 2900/3000 as well as to records 6500 as discussed above, and discussion above for records 2900/3000 and 6500 is relevant in the context of records 7000.

Other embodiments of managing records 7000 will provide a "dummy-proof" user interface to web service 2102. A wizard or minimal user interaction interface can be used. In one preferred embodiment, a record 7000 is automatically created by a device with sensing means, thereby eliminating user hassle in manually creating a record. There are various embodiments which can facilitate creation and management of deliverable content in web service 2102 without departing from the essence of functionality provided by the record fields.

FIG. 63 depicts a flowchart for a preferred embodiment of carrying out processing for presenting a web service user interface form in the members area and then processing user specifications to the interface prior to submitting to the service for further processing. For this discussion, FIG. 63 is invoked in context for records 7000 for adding a DCDB record 7000 to a DCDB Table (FIG. 70 records) upon invoking DCDB Add option 4652. Processing starts at block 6302 and continues to block 6304 where the ACCESS_LIST is set for authorized users. Thereafter, block 6306 performs FIG. 39 access control processing and continues to block 6308. Block 6308 builds and presents FIG. 71A for adding a DCDB record, and then a user interfaces with FIG. 71A at block 6310 until the Add button 7102 action is invoked. When an add action is invoked by the user, block 6312 validates user field specifications to FIG. 71A, and block 6314 checks the results. If block 6314 determines the fields are valid (and can be submitted for processing), then block 6318 invokes FIG. 69 processing for adding the record 7000, and current page processing terminates at block 6316. If block 6314 determines that not all fields specified are valid, then block 6320 provides an error to the user so that specification can continue back at block 6310 (e.g. pop-up).

Figure 69:
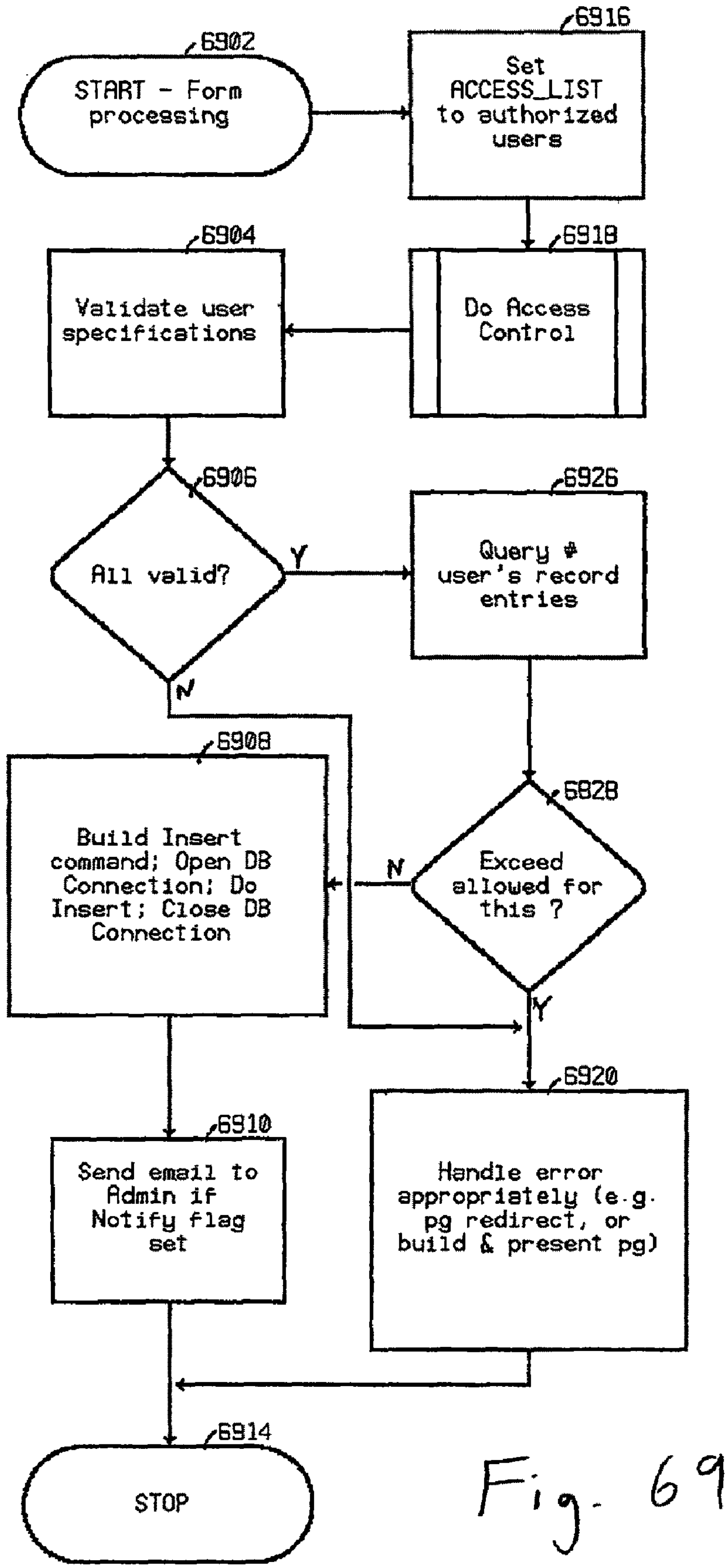

FIG. 69 depicts a flowchart for a preferred embodiment for processing the submittal to add a Delivery Content Database (DCDB) Table record to the web service. FIG. 69 is invoked at block 6318 per discussion above for adding a record 7000 to the DCDB Table (FIG. 70 records). Processing starts at block 6902 and continues to block 6916 where the ACCESS_LIST is set for authorized users. Thereafter, block 6918 performs FIG. 39 access control processing and continues to block 6904. Block 6904 validates user field specifications to FIG. 71A, and block 6906 checks the results. If block 6906 determines all fields are valid, then block 6926 queries the number of DCDB records this user currently has in the DCDB Table (SELECT(Count) from DCDB Table query built where AuthID 7038 equals the PersonID passed from FIG. 39 access control processing). Thereafter, if block 6928 determines the count returned at block 6424 equals or exceeds the MaxDCDB field 3022 for this user as passed from FIG. 39 access control processing, then block 6920 reports the error to the user in an appropriate manner and processing terminates at block 6914. If block 6928 determines the user (doing the add) has not exceeded his allowed maximum of DCDB records, then block 6908 builds a DCDB Table insert command from FIG. 71A specifications, opens a DB connection, does the insert, and closes the DB connection. Thereafter, block 6910 sends an email to an administrator account if a Notify flag is set to document this type of transaction, and then processing terminates at block 6914. DCDB records added define content that can be delivered to mobile users based on their situational locations and configurable interest radiuses around the physical location of the mobile device situational locations. The DCDB Table also contains mobile user defined content for delivery to other mobile users as discussed below for PingSpots and Pingimeters.

FIG. 70 depicts a preferred embodiment of a data record in the DCDB Table used to maintain deliverable content information to the web service. Note that record 7000 is another embodiment to record 700. DCDBID 7002 is preferably a unique primary key automatically generated by the underlying SQL database system to ensure uniqueness when inserting a record 7000 to the DCDB Table. EntryType field 7004 indicates the type of DCDB record 7000, for example, a DCDB record as added with FIG. 71A (e.g. EntryType='D'), a PingSpot configuration as discussed below (e.g. EntryType='S'), a Pingimeter (e.g. EntryType='R') related content item as discussed below, or some other type of deliverable content item depending on the embodiment. Descr field 7006 contains a user defined description for the record 7000. LatD field 7008 contains the degree portion (an integer) of the latitude location where the record 7000 is applicable for delivery to mobile devices traveling to the location. LatM field 7010 contains the minutes portion (an integer) of the latitude location where the record 7000 is applicable for delivery to mobile devices traveling to the location. LatS field 7012 contains the seconds portion (a decimal number) of the latitude location where the record 7000 is applicable for delivery to mobile devices traveling to the location. LatP field 7014 is the latitude pole location ('N' for North, "S' for South) where the record 7000 is applicable for delivery to mobile devices traveling to the location. LonD field 7016 contains the degree portion (an integer) of the longitude location where the record 7000 is applicable for delivery to mobile devices traveling to the location. LonM field 7018 contains the minutes portion (an integer) of the longitude location where the record 7000 is applicable for delivery to mobile devices traveling to the location. LonS field 7020 contains the seconds portion (a decimal number) of the longitude location where the record 7000 is applicable for delivery to mobile devices traveling to the location. LonH field 7022 is the longitude hemisphere location ('E' for East, "W' for West) where the record 7000 is applicable for delivery to mobile devices traveling to the location. Direction field 7024 is the direction a mobile device is to be traveling at the location in order to be eligible for content delivery (e.g. North, East, South, West, Northeast, Southeast, Northwest, Southwest, Any, other direction embodiments . . . ). LatDD field 7026 contains the latitude degrees (signed decimal number) location where the record 7000 is applicable for delivery to mobile devices traveling to the location. LonDD field 7028 contains the longitude degrees (signed decimal number) location where the record 7000 is applicable for delivery to mobile devices traveling to the location. Fields 7008 through 7014 are redundant to field 7026 and either one may be eliminated in some embodiments. Fields 7016 through 7022 are redundant to field 7028 and either one may be eliminated in some embodiments. PMRID 7030 is an id for joining to records 9450 in the Pingimeter Table on PMRID 9452. HitRadius field 7032 defines a radius around the latitude and longitude of record 7000 which broadens the scope of the situational location eligible for content delivery to mobile devices. The hit radius is a distance from a fixed target delivery point which defines a circle (in a two dimensional embodiment (e.g. earth's surface)) around the target delivery point (point at circle middle) as an area where devices can travel to for receiving associated content. In a three dimensional embodiment, the hit radius is a distance from a fixed target delivery point which defines a sphere around the target delivery point (point at sphere middle) as a region in space where devices can travel to for receiving associated content. A hit radius is preferably fixed in many embodiments and can change when the content provider modifies it. Intersection of the device interest radius and the HitRadius of record 7000 can determine an eligible delivery. When HitRadius is 0, intersection of the device interest radius and the point on earth (latitude and longitude) of record 7000 can determine an eligible delivery. Fields 7030 and 7032 are used for PingSpots as discussed below. TimeCriteria field 7034 defines when the record 7000 is valid for eligible delivery to mobile users. In one embodiment, field 7034 joins to time information kept in a separate table(s). In another embodiment, field 7034 contains a time range. In yet another embodiment, field 7034 comprises two fields 7034A and 7034B for maintaining a start date/time stamp and end date/time stamp, respectively. DelivFlags field 7036 contains a list of flags for special functionality as discussed above for equivalent delivery activation setting(s) field 718. Other flags maintained here include:

- Delivering on a particular mobile device application action or sequence of actions invoked by a user when at the situational location
- Deliver only when a privileged PingPal is intercepting or sharing content delivery
- Deliver only when record 7000 is owned by the user who's device is currently traveling to the situational location described by record 7000 (for testing)
- Deliver only when the mobile device interest radius is set to 0
- Deliver only when the HitRadius field 7032 is set to 0
- Deliver when there are no other records 7000 that are marked inactive owned by the Content Provider described by field 7038

AuthID 7038 contains the PersonID of the user who created the record 7000. CType field 7040 contains the content type in record 7000. COffset field 7042 contains the offset (e.g. byte offset) into the content datastream described by CPath field 7076 for finding the deliverable content. CLength field 7044 contains the length of content described by the CPath field 7076 starting at the offset of COffset field 7042. Fields 7042 and 7044 provide means for referencing a single datastream file, or content entity, for multiple addressable content items. ShortText field 7046 is equivalent to short text info field 714. SpeedRef field 7048 is equivalent to speed reference info field 716. Compress field 7050 is a Yes/No indicator for whether or not to compress content delivery made to the receiving mobile device (i.e. RDPS). IndicOnly field 7052 is a Yes/no indicator for whether or not to deliver an indicator to the mobile device that content exists for its situational location instead of the actual content itself. ActiveEntry field 7054 is a Yes/No indicator for whether or not the record 7000 is active within web service 2102. If it is not active, the record is treated as though it does not exist in the DCDB Table, except for the owner of the record to manage it. DTCreated field 7056 contains a date/time stamp of when the record 7000 was created in (added to) the DCDB Table. DTLastChg field 7058 contains a date/time stamp of when any field in the record 7000 was last modified. CIP field 7060 preferably contains an internet protocol (ip) address of the user's device that created the applicable data record 7000. The CHIP field 7062 preferably contains the ip address of the actual physical server of web service 2102 that created applicable data record 7000. CHName field 7064 preferably contains the host name of the physical server of web service 2102 that created applicable data record 7000, for example because web service 2102 may be a large cluster of physical servers. ChgrIP field 7066 preferably contains an internet protocol (ip) address of the user's device that last modified the applicable data record 7000. The ChgrHIP field 7068 preferably contains the ip address of the actual physical server of web service 2102 that last modified applicable data record 7000. ChgrHName field 7070 preferably contains the host name of the physical server of web service 2102 that last modified applicable data record 7000, for example because web service 2102 may be a large cluster of physical servers. DRsrvd1 field 7072 and DRsrvd2 field 7074 are reserved fields for future use. CPath field 7076 is a fully qualified path name to a file containing the deliverable content, or actually contains the content itself in the CPath field 7076.

CType field 7040 describes the type of content maintained at CPath field 7076. Content types supported (as provided by a dropdown 7199) include:

- MCD File (Mobile Content Delivery File)—When CType field 7040 contains this value, the CPath field 7076 contains a fully qualified path name of a file (preferably with a .mcd file type extension) accessible to web service 2102. The MCD file is a scripted rule based file that is run time interpreted for identifying single or multiple content items for delivery to mobile devices. The MCD file can reference all content types and can support multiple content items of any of the content types as a single reference in record 7000. Alternative embodiments of web service 2102 will cache a readily processable form of the .mcd file so run time parsing execution time is minimized or eliminated. In the most common use, a mcd file contains references for dynamically linking remote database schemas and remote date sources of external data source(s) 2106 which are internet connected to web service 2102 so that content need not be maintained local to the DCDB Table (FIG. 70). For example, rules reference a remote internet protocol (ip) connected SQL database with authentication credentials and a run-time query for getting at the deliverable content data associated with record 7000. In another example, rules reference a remote ip connected data source other than an SQL database form but also accessed dynamically when needed for delivery to mobile devices traveling to situational locations. External data source(s) 2106 can be accessed when needed for delivery to mobile devices via the .mcd file. The MCD file need not reference dynamically accessed external data sources 2106. The MCD file is fully flexible in accessing any type of data from any source and could in fact be the only content type used in web service 2102. COffset field 7042 and CLength field 7044 can be used to access certain areas within the referenced .mcd file.
- MLS Listing (Multiple Listing Service Listing)—When CType field 7040 contains this value, the CPath field 7076 contains a fully qualified path name of a file (preferably with a .mls file type extension) accessible to web service 2102. The file contains a Realtor's MLS file from a territory Multiple Listing Service. Multiple real estate descriptions can be maintained in the file and are easily accessed individually with COffset field 7042 and CLength field 7044. The .mls file is used in particular for real estate applications and special formatting and conversions can take place as part of delivering the real estate information to mobile devices.
- Picture Phone Snapshot—When CType field 7040 contains this value, the CPath field 7076 contains a fully qualified path name of a file (preferably with a graphic file type extension, for example .jpg, .gif, .tif, .pcx, or any other graphic file type) accessible to web service 2102, which was captured by a cell phone. The file contains a graphic which is to be delivered to a mobile device. COffset field 7042 and CLength field 7044 are typically not used for graphic file types, but may be for a specific graphic area. The graphic file extension is used to perform pixel conversions depending on the receiving device type, and can be passed to most devices so rendering is well understood. A full browser device can receive the graphic as is, but a cell phone may require a conversion for a smaller or render-friendly image. In general for all content types, the device Type field 6512 provides means for doing special conversions to devices as needed at delivery time. An alternate embodiment can store multiple formats of record 7000 content so all content is ready for delivery to devices for all values in Type fields 6512. Web service 2102 preferably delivers content depending on the device type. Mobile devices 2540 may receive the same content in different forms based on the device capabilities, for example.

Picture Phone Movie—When CType field 7040 contains this value, the CPath field 7076 contains a fully qualified path name of a file (preferably with a movie file type extension, for example .mpeg, .avi, .rm, .swf (Flash) or any other movie or animation file type) accessible to web service 2102 which was captured by a cell phone. The file contains a video/movie which is to be delivered to a mobile device. COffset field 7042 and CLength field 7044 are typically not used for movie or animation file types, but may be for movie clips. The movie file extension is used to perform conversions depending on the receiving device type, and can be passed to most devices so rendering is well understood. A full browser device can receive the movie or animation as is, but a cell phone may require a conversion for a smaller or render-friendly image. Web service 2102 can deliver content depending on the device type. Mobile devices 2540 may receive the same content in different forms based on the device capabilities, for example.

HTML file—When CType field 7040 contains this value, the CPath field 7076 contains a fully qualified path name of an HTML file or directory structure accessible to web service 2102 for delivery to mobile devices.

In Path Below—When CType field 7040 contains this value, the CPath field 7076 itself contains text for delivery to mobile devices. CPath field 7076 can contain substitution variables as part of the text string for filling in at run-time. For example, the occurrence of "% dt" (no quotes) denotes to substitute the current date/time stamp, "% d" the date, "% t" the time, "% ip" the mobile device's ip address detected, "% r" the RegistryID of the target mobile device, or any other substitution variable for any other purpose of completing at delivery time.

Executable File—When CType field 7040 contains this value, the CPath field 7076 contains a fully qualified path name of an executable binary file accessible to web service 2102 for delivery to mobile devices. There may be various executable file types that are meant for conversion or for delivery as is for execution by receiving mobile devices.

Text File—When CType field 7040 contains this value, the CPath field 7076 contains a fully qualified path name of a text file accessible to web service 2102 for delivery to mobile devices. There may be various textual file types (e.g. MS Word .doc, Notepad .txt, Tablet PC notes note, .RTF, or any other format intended to format text for reading. Flat text .txt files are commonly used here but the file extension can be used to define any type of file here for readable text. The file extension determines the file type referenced.

Movie—When CType field 7040 contains this value, the CPath field 7076 contains a fully qualified path name of a file (preferably with a movie file type extension, for example .mpeg, .avi, .rm, .swf (Flash) or any other movie or animation file type) accessible to web service 2102. The file contains a video/movie which is to be delivered to a mobile device. COffset field 7042 and CLength field 7044 are typically not used for movie or animation file types, but may be for movie clips. The movie file extension is used to perform conversions depending on the receiving device type, and can be passed to most devices so rendering is well understood. A full browser device can receive the movie or animation as is, but a cell phone may require a conversion for a smaller or render-friendly image. Web service 2102 delivers content depending on the device type. Mobile devices 2540 may receive the same content in different forms based on the device capabilities, for example.

Picture—When CType field 7040 contains this value, the CPath field 7076 contains a fully qualified path name of a file (preferably with a graphic file type extension, for example .jpg, .gif, .tif, .pcx, or any other graphic file type) accessible to web service 2102. The file contains a graphic which is to be delivered to a mobile device. COffset field 7042 and CLength field 7044 are typically not used for graphic file types, but may be for a specific graphic area. The graphic file extension is used to perform pixel conversions depending on the receiving device type, and can be passed to most devices so rendering is well understood. A full browser device can receive the graphic as is, but a cell phone may require a conversion for a smaller or render-friendly image. Web service 2102 delivers content depending on the device type. Mobile devices 2540 may receive the same content in different forms based on the device capabilities, for example.

Sound—When CType field 7040 contains this value, the CPath field 7076 contains a fully qualified path name of a sound file (preferably with a sound file type extension, for example .wav, .midi, .mpeg, .swf (Flash) or any other sound file type) accessible to web service 2102. The file contains sound content for play which is to be delivered to a mobile device. COffset field 7042 and CLength field 7044 are typically not used for sound, but may be for sound clips. The sound file extension is used to perform conversions depending on the receiving device type, and can be passed to most devices so rendering is well understood. Web service 2102 additionally delivers content depending on the device type so a sound sampling conversion can be performed to reduce the file size. Mobile devices 2540 may receive the same content in different forms based on the device capabilities, for example.

Auto-Message—When CType field 7040 contains this value, the CPath field 7076 contains a fully qualified path name of a sound file (preferably with a sound file type extension, for example .wav, .midi, .mpeg, .swf (Flash) or any other sound file type) accessible to web service 2102. The file contains sound content for play which is suitable for human device play, but also suitable for storing to an answering system, or message service. COffset field 7042 and CLength field 7044 are typically not used for auto-message, but may be for clips therein. The sound file extension is used to perform conversions depending on the receiving device type, and the auto-message can be left on most device message services and automated answering systems so rendering is well understood.

A content type can be anything represented by at least a bit and up to a datastream that can be communicated to a mobile device. Content may be visual, audible, executable, interpretable by any of the human senses, or combinations thereof. Conversions may take place upon delivery at a SDPS, RDPS, or both depending on the device type, device state, delivery flags, time criteria, or any other variable designating a situational location. A situational location is as described above including any application specific data fields, along with any data that can be related to the user of the mobile device, or the mobile device itself. A situational location includes system delivery constraints and/or user configured delivery constraints. CPath field 7076, or any file referenced by CPath 7076 can contain substitution variables for any purpose of completing a data fill in at delivery time. In general, a referenced file name's extension helps describe the type of file being referenced and how to deal with it. CPath field 7076 is preferably validated to dynamically accessed remote data sources to ensure they are valid before web service 2102 tries to access for deliveries by FIG. 120 processing. FIG. 120 processing will handle any errors regardless.

Speed, elevation, and other situational location fields can be specified in a record 7000. A single situational location can be defined for multiple deliverable content items, and a single content item (or multiple content items) can have an associated plurality of situational locations. A plurality of applicable situational locations could be specified for a record 7000 by preferably joining to another table with situational location fields for designating deliverable content to a plurality of unique situational locations.

Deliverable content may also have urgency levels that can be configured with it (e.g. high importance, normal, etc). These urgency levels can be embodied as a new field in record 7000 with unique values for appropriate handling and unique notification to the receiving devices.

FIG. 71A depicts a preferred embodiment screenshot for adding a DCDB record to the web service, for example by invoking DCDB Add option 4652. Fields specified are mapped to the record 7000. Automated situational location specification area 7197 is described in detail for FIGS. 72 through 76 below. Data entry field labels in other areas of FIG. 71A are easily identifiable to corresponding record 7000 fields. HitRadius field 7032 is defaulted by the system to 0, but can certainly be exposed in the FIG. 71A interface in other embodiments for user specification. HitRadius field 7032 can be analogous in configuration to Interest Radius specification 6640. TimeCriteria field 7034 and DelivFlags field 7036 may be a system wide setting default easily changed in a site configuration file (e.g. shown as disabled in FIG. 71A), or may be selectable in accordance with settings elsewhere. In the FIG. 71A screenshot embodiment, time criteria and delivery flags are disabled for specification, for example the result of a user profile configuration, a system imposed configuration, or a group (of users) configuration. There is an analogous interface (to FIG. 66B) for successful completion of having added a DCDB record 7000 to the web service.

FIG. 55 depicts a flowchart for a preferred embodiment of processing for managing records of the web service. For this discussion, DCDB information records 7000 are discussed as being managed, for example upon clicking DCDB Manage option 4650. Processing starts at block 5502 and continues to block 5504 where the ACCESS_LIST (as discussed above) is set for authorized users. Thereafter, block 5506 performs FIG. 39 access control processing and continues to block 5508 where the search form interface is built and presented to the user, for example the search interface of FIG. 71B. Thereafter, a user interfaces with the search interface at block 5510 until a search action is requested, for example by search button 7194. When the search action is requested by the user, block 5514 validates any applicable user specifications and block 5516 checks the results. If block 5514 determines the fields are valid (and can be submitted for processing), then block 5520 invokes search processing of FIG. 57, and current page processing terminates at block 5518. If block 5516 determines that not all fields specified are valid, then block 5522 provides an error to the user so that specification can continue back at block 5510 (e.g. pop-up). Any pending Filters Management component settings made by the user further filter records found by the search interface.

FIG. 71B depicts a preferred embodiment screenshot for searching for web service DCDB records with a search criteria. By default, FIG. 71B finds all records in the database including as described by active filters from Filters Management component 2506. As soon as data is entered to a field of the FIG. 71B search form, or selects a value other than "Any", the search result is narrowed accordingly. Search fields of FIG. 71B are easily identifiable to records 7000. All fields of record 7000 may be searchable, or any subset thereof, in alternative embodiments. Defaulted Date/Time Range specifications 7190 and 7192 may be disabled by block 5508 as the result of first querying the total count of records 7000 in the database for this user (or user type), and determining that there are less than a website installed search minimum. This limits the search criteria options since there are so few records that a search almost doesn't make sense. Any subset of fields can be defaulted this way, or all of the fields can be defaulted this way, based on a configured threshold of total records where a search indeed makes sense. If there were more than the website installed minimum for searching, then defaulted Date/Time Range specifications 7190 and 7192 would be available to the user for specification. Specification 7190 searches on field 7056 and specification 7192 searches on field 7058. Any field can be defaulted with a value for search and saved as data evidence for defaulting field(s) the next time the user is in the same interface at a future time. In this way, the user specifies search criteria, and that specification always defaults the interface according to the user's last specification for each field in the search interface.

A Site Owner sees all records 7000 in the web service. Other users only see records 7000 they created by default. Owner field 7188 allows a Site Owner (will be disabled when a Site Owner encounters the interface of 71B if no "Affinity Delegate" privilege is explicitly defined (Site Owner needs no "Affinity Delegate" privilege since can see all anyway)) to specify the logon name of the user for seeing records 7000 as though he was logged in as that user. A Site Owner enters the logon name to match to LogonName field 3004 for returning the PersonID 3002 which will then override all processing for page display as though FIG. 39 processing from Access Control made that PersonID available to the including page and subsequent pages. In another embodiment, the specified owner field 7188 simply narrows the search results to records owned by that user by comparing the PersonID 3002 (of the same record 3000 Logon Name field 3004 entered to the field 6674) with the AuthID 7038 of searched records 7000. The DCDB affinity dropdown 7186 will contain a list of all logon names that have provided an "Affinity Delegate" privilege (discussed below) to the user who encounters FIG. 71B (a Site Owner can enter anything he wants to field 7188). Therefore, any user that has been granted the "Affinity Delegate" privilege from any other user can also enter the logon name in the dropdown to field 7188 for seeing records 7000 as though he was logged on as that user, or for narrowing the search to that user's records (depends on embodiment). A user may also select (click) from the dropdown 7186 to automatically populate field 7188. FIG. 71B shows what displays in dropdown 7186 when the user has no "Affinity Delegate" privileges granted by any other user.

Any, many or all fields can be defaulted with values, or disabled based on desired search criteria support, or associated numbers of records 7000 in the web service. An Associated user dropdown can be provided to FIG. 71B for defining those other users that are free to manage and search for records 7000 which have associated users as defined by the "Affinity Delegate" privilege discussed below, or the other embodiment "Affinity Delegate" privileges discussed above. All search results can be sorted according to the "Order By" dropdown specifications which preferably include every column of record 7000.

FIGS. 57 and 58 depict flowcharts for a preferred embodiment of search processing of records of the web service. For this discussion, DCDB information search criteria (e.g. from FIG. 71B) is discussed as being processed, for example upon clicking search button 7194. Processing starts at block 5702 and continues to block 5704 where the ACCESS_LIST is set for authorized users. Thereafter, block 5706 performs FIG. 39 access control processing and continues to block 5708. Block 5708 builds the top of the page to return to the user, validates all fields specified in the search criteria interface (e.g. FIG. 71B) according to the record type (i.e. record 7000), and processing continues to block 5710. If all fields specified in the search criteria interface are valid, then processing continues to block 5712. If there is at least one invalid field specified, then block 5746 reports the error appropriately to the user interface, and processing terminates at block 5756.

Block 5712 sets a variable ROWSPERPG to rows per page data evidence as configured by records per page field 5086 of FIG. 50I. A defaulted number is used if the data evidence is not found. Then, block 5714 checks to see how this page processing was arrived to, for example, by pagination or directly from the search criteria interface. If block 5714 determines the processing page was arrived to directly as the result of invoking the search button 7194, then block 5718 accesses page filter data evidence for appending to a SQL Select WHERE clause. Thereafter, block 5720 builds any SQL ORDER BY clause if order by specifications were made, appends SQL WHERE clause criteria based on search criteria interface field specifications, appends any Filters management data evidence found to the SQL WHERE clause, and constructs a SQL query string suffix comprised of a completed WHERE clause and ORDER BY clause. If a specification was made at field 7188, the WHERE clause is amended with the associated PersonID which is preferably determined in block 5708 by querying the Users Table for the PersonID with the logon name and ensuring one that granted the "Affinity Delegate" privilege was returned at block 5710 (Site Owner does not require an "Affinity Delegate" privilege). WHERE clause conditions will use "LIKE" or "=" depending on the field type being searched. Thereafter, block 5722 completes building the SQL SELECT statement with the SQL query string suffix appended for all records 7000. List output variable ROWSTART is initialized to 1 and list output variable ROWLAST is set to ROWSPERPG. These variables enable proper pagination between pages of results, and are maintained as list pagination data evidence. Thereafter, block 5724 opens a DB connection, opens an active cursor using the SQL SELECT statement and determines the number of resulting rows produced by the query which is kept in a variable TOTALROWS. Thereafter, if block 5726 determines there are no resulting rows, then block 5728 reports the condition of no results to the user interface, closes an open DB connection, and processing terminates at block 5756.

If block 5726 determines there is at least one row in the results (i.e. TOTALROWS>=1), then block 5730 saves the SQL SELECT query as query data evidence, rows are fetched up to the variable ROWSTART, the list output header is built (e.g. 7177), no ORDER BY columns are added to the standard list output since none was selected, and a variable ROWSOUT is set to 0. Columns shown in FIG. 71C are already put out in the standard result list form. Thereafter, if block 5732 determines ROWSOUT>=ROWSPERPG, then no additional rows are iterated out from query results in which case block 5738 builds management controls 7179, 7181, and 7183, and pagination information 7185 is output. Thereafter, if block 5740 determines TOTALROWS>ROWSOUT, then processing continues to block 5748, otherwise processing continues to block 5742 where a DB connection is closed and onto block 5802 of FIG. 58 by way off page connector 58000.

If block 5748 determines ROWSTART=1, then processing continues to block 5752, otherwise block 5750 builds the user interface page with pagination control for first page pagination control 7191 and previous page pagination control 7193. Thereafter, processing continues to block 5752. If block 5752 determines that ROWLAST>=TOTALROWS then processing continues to block 5802 by way of off page connector 58000, otherwise block 5754 builds the user interface page with pagination control for last page pagination control and next page pagination control. Thereafter, processing continues to block 5802.

If block 5732 determines ROWSOUT were not greater than or equal to ROWSPERPG, then block 5734 checks if all rows have been fetched for output processing. If block 5734 determines all rows have been fetched (processed), then processing continues to block 5738 already described. If block 5734 determines all rows have not been fetched (processed), then block 5736 manufactures a checkbox (e.g. checkbox 7187) for a row, associates record id data evidence (i.e. DCDBID), for example in a hidden field associated with the checkbox, builds the row output (e.g. a row 7189) for presenting all fields of the list header 7177, increments the ROWSOUT variable by 1, then fetches the next row using the open cursor. Thereafter, processing continues back to block 5732. Blocks 5732 through 5736 comprise a loop for output of rows satisfying search criteria. Processing continuing to block 5802 by way of off page connector 58000 also preferably builds and presents a "Back to Top" link at the page bottom in case the user has to scroll lots of information as dictated by ROWSPERPG.

If block 5714 determines the search processing page was arrived to by pagination (e.g. pagination controls 7191 and 7193 or as analogously displayed such as those of controls 5926 and 5928), then block 5716 accesses the query data evidence, accesses the list pagination data evidence (ROWSTART and ROWLAST), then continues to block 5724 for issuing the query and performing subsequent processing.

The user interfaces with search results at block 5802 until an action is selected. FIG. 71C is an example of the search results interface upon the start of block 5802. When an action is selected, block 5806 checks if it was pagination to go to the first results page, for example clicking a pagination control 7191. If block 5806 determines pagination to go to first page was selected, then FIG. 57 processing is invoked after properly setting ROWSTART and ROWLAST data evidence for first page results at block 5816, and current page processing terminates at block 5818. If block 5806 determines the action was not for go to first page, then processing continues to block 5808. If block 5808 determines pagination to go to the previous page was selected (control 7193), then FIG. 57 processing is invoked after properly setting ROWSTART and ROWLAST data evidence for previous page results at block 5816, and current page processing terminates at block 5818. If block 5808 determines the action was not for go to previous page, then processing continues to block 5810. If block 5810 determines pagination to go to the next page was selected (control not shown since list has been paginated forward to last page already), then FIG. 57 processing is invoked after properly setting ROWSTART and ROWLAST data evidence for next page results at block 5816, and current page processing terminates at block 5818. If block 5810 determines the action was not for go to next page, then processing continues to block 5812. If block 5812 determines pagination to go to the last page was selected (control not shown since list has been paginated forward to last page), then FIG. 57 processing is invoked after properly setting ROWSTART and ROWLAST data evidence for last page results at block 5816, and current page processing terminates at block 5818. If block 5812 determines the action was not for go to last page, then processing continues to block 5814. If block 5814 determines a delete, view, or change action was invoked, then processing continues to block 5828, otherwise block 5824 handles the action appropriately and processing continues back to block 5802. Block 5824 handles actions associated with the interface depending on the device type that are not necessarily relevant for understanding this disclosure.

Block 5828 determines how many rows are marked with a check by the user and block 5830 validates it. If block 5832 determines no checkmarks are present, then block 5820 provides an error for report to the user so user specification can continue back at block 5802. If block 5830 determines at least one row has been checked, then block 5832 checks the action type. If block 5832 determines that delete was invoked by the user (e.g. delete management control 7183 selected), then block 5836 provides a confirmation message and block 5838 determines the user's answer to the "Are you sure?" confirmation (e.g. pop-up of FIG. 59C). If block 5838 determines the user confirmed the delete, then the confirmation is cleared at block 5840, list management data evidence is set for delete at block 5842, block 5826 invokes list processing of FIG. 60, and current page processing terminates at block 5818. If block 5838 determines the user cancelled the delete, then the confirmation is cleared at block 5822, and the user continues to interact with the search results at block 5802. If block 5832 determines that delete was not selected, then list management data evidence is set for view (i.e. view management control 7179 selected) or modify (i.e. change management control 7181 selected) per user action, block 5826 invokes list processing of FIG. 60, and current page processing terminates at block 5818. Thus, FIGS. 57 through 58 provide search result list processing of DCDB records for being conveniently viewed, modified, or viewed.

FIG. 71C depicts a preferred embodiment screenshot for results from searching the web service DCDB records after a user search specification. FIG. 71C is in fact a real output from the search criteria as specified in FIG. 71B. Note the entries are not sorted since no Order By was specified. Also note there were no additional columns displayed beyond the standard fields displayed, because no Order By was selected. FIG. 71C depicts a preferred embodiment screenshot after the user has paginated to the last page of results from searching the web service DCDB records after a search specification. There is no page forward or go to last page pagination controls displayed because the last page of results is already displayed. Otherwise, appropriate pagination controls are displayed for processing analogously to processing of controls 5922 through 5928 of FIGS. 59A and 59B. FIG. 59C depicts a preferred embodiment screenshot for a warning prompt for deleting one or more marked records. Other embodiments may present a different confirmation appearance or method.

The standard set of fields output (5902, 6682, 7177) for any records of web service 2102 are preferably configurable for the web service 2102 so conceivably any fields can provide the standard set. Then, the appropriate Order By dropdown selections can be made to not only sort records in the list returned, but to display other fields to complement the standard output fields. In another embodiment, every user of web service 2102 has the ability to customize which fields are his standard set of output fields for a particular record type. For example, each user can have the ability to configure standard output fields for Registry Table records, DCDB Table records, or any other Table records that may be managed by the user. The Order By dropdowns could then be selected with respect to what are the user's preferred standard output fields for a record type.

FIG. 60 depicts a flowchart for a preferred embodiment of search result list processing of records of the web service. For this discussion, FIG. 60 was invoked at block 5826 in context of processing records 7000. Processing starts at block 6002 and continues to block 6004 where the ACCESS_LIST is set for authorized users. Thereafter, block 6006 performs FIG. 39 access control processing and continues to block 6008. If block 6008 determines the user is a Delegate (from access control processing), then block 6010 forces list management data evidence to view since Delegate access is read only to the members area. Processing then continues to block 6012. If block 6008 determines the user is not a Delegate, then processing continues to block 6012.

Block 6012 iterates through the form checkboxes (from FIG. 71C) to build an array of record ids (i.e. DCDBIDs) from record id data evidence associated with rows that are checkmarked for action. Additionally built is a WHERE clause string of the same check-marked record id evidence (i.e. DCDBIDs) so an action can be done in a single SQL query to multiple records (e.g. records 7000). Thereafter, block 6014 checks if at least one check-marked checkbox (e.g. checkbox 7187) was found. If none were check-marked, then block 6018 reports an appropriate error to the user, block 6046 closes any DB connection that is open (none open yet), and current page processing terminates at block 6032. If block 6014 determines at least one checkmark is found, then block 6016 checks list management data evidence. If block 6016 determines list management data evidence indicates a delete action, then an SQL Delete command is built at block 6048 for the DCDB Table with the WHERE clause of record ids built at block 6012. Any foreign key relationship tables will cascade delete (using DCDBID). Block 6048 also opens a DB connection, does the DCDB Table delete, closes the DB connection, sends an email to an Administrator account if a Notify flag indicates to document this type of transaction, and a success interface is returned to the user. Processing then continues to block 6046 for closing any DB connection that is still open, and current page processing terminates at block 6032. Block 6048 will also delete any records and data of server data 2104 that has been associated to the DCDB record(s) 7000 being deleted by block 6048 which are not set up for cascade delete. Such records should be deleted prior to finally deleting the record 7000 which cascade deletes other records.

If block 6016 determines the list management data evidence does not indicate a delete action, then block 6020 accesses pending query data evidence, concatenates WHERE clause information of record ids built at block 6012 so only the check-marked rows are fetched, opens a DB connection, does the query, and fetches the first row. Thereafter, block 6022 checks if even a first row was fetched. If block 6022 determines no first row was fetched (no rows result from query), then block 6018 handles reporting the error to the user and processing continues from there as described above. If block 6022 determines a first row was fetched, then block 6024 builds the top portion of the page to return to the user. Thereafter, if block 6026 determines the list management data evidence is for view, then block 6028 sets the disabled/readonly switch (dfld variable as discussed above) to read-only and processing continues to block 6030. If block 6026 determines the list management data evidence is not for view, then processing continues to block 6030.

If block 6030 determines there is only 1 row returned from the query at block 6022, then block 6034 builds and presents a record interface, presenting a Modify button only if the list management data evidence indicate a modify action (e.g. control 7181). Block 6034 also associates record id data evidence (DCDBID) of the information presented, preferably as a hidden form field. Block 6034 presents FIG. 71D if the list management data evidence was for view of a single row check-marked, for example in checkbox 7187. Block 6034 presents FIGS. 71E-71F if the list management data evidence was for modify of a single row check-marked. Thereafter, the user interfaces to any of FIGS. 71D through 71F at block 6036 until a Modify action is invoked, for example clicking button 7175. If a view interface is presented (FIG. 71D), then no Modify button can be pressed. The user can use the Back key, click the first page link 7191 to return to the first page of records, close the window, or do whatever makes sense at the device. If the Modify button 7175 is pressed, then block 6038 validates form fields according the record type (i.e. record 7000), and processing continues to block 6040. If block 6040 determines at least one field is invalid, then block 6042 reports the error to the user so field specification can continue back at block 6036 (e.g. pop-up). If block 6040 determines all fields are valid, then block 6044 invokes modify record processing of FIG. 53 (re-described for DCDB Table context below), block 6046 closes any open DB connection, and current page processing terminates at block 6032.

If block 6030 determines there is more than 1 row returned by the query at block 6020, then block 6050 checks the list management data evidence for the action requested. FIG. 71G shows the user has selected (i.e. check-marked) multiple rows prior to invoking a pagination control. If block 6050 determines the list management data evidence is not modify, then processing continues to block 6064. If block 6064 determines the list management data evidence is not for view, then block processing continues to block 6018 since list management data evidence is invalid. If block 6064 determines the list management data evidence is for view, then block 6066 builds the output page topmost portion, and block 6068 builds a record output from the last record fetched. Thereafter, if block 6070 determines the last row was fetched for output, then block 6074 completes page output and processing continues to block 6046. If block 6070 determines there is another row to output, then block 6072 fetches the next row and processing loops back to block 6068. Blocks 6066 through 6074 include a processing loop for presenting a view of multiple records such as FIG. 71H. FIG. 71H is an actual view output from processing upon invoking view management control 7179 on FIG. 71G.

If block 6050 determines the list management data evidence is for modify, then block 6052 builds a Modify List user interface, iterates through fetches of query results from block 6020, and establishes record id array data evidence (e.g. DCDBIDs) for records returned, preferably as hidden form fields in FIGS. 71I-71J. FIGS. 71I-71J actually result from invoking modify management control 7181 from FIG. 71G. Data from the first record in the query results is conveniently defaulted in fields (e.g. record 7187). A preferred embodiment will save which row was check-marked first from list output (e.g. FIG. 71G) as first check data evidence so that the first checkmark determines which data is used to default the modify list interface (e.g. FIGS. 71I and 71J). Note the checkmark column included for the user selecting which fields with checkmarks to update in the plurality of records resulting from the query at block 6020. Thereafter, the user interfaces to FIGS. 71I-71J at block 6054 until Modify button 6702 is invoked. When modify is invoked, processing continues to block 6056 where fields are validated from FIGS. 71I-71J and block 6058 checks validation results. If block 6058 determines all fields are valid (i.e. syntax, at least one checkmark, checkmark corresponds to non-null field, etc), then block 6062 invokes Modify List processing of FIG. 62, and processing continues to block 6046. If not all fields are valid as determined at block 6058, then an error is reported at block 6060 to the user so field specification can continue back at block 6054 (e.g. pop-up).

For this discussion, FIG. 53 is discussed in context of modification processing of the DCDB record 7000 information. Processing starts at block 5302 and continues to block 5304 where the ACCESS_LIST (as discussed above) is set for authorized users. Thereafter, block 5306 performs FIG. 39 access control processing and continues to block 5308 where the form fields for the record information are validated according to record type (i.e. DCDB record=DCDB Table record=record 7000), and then results are checked at block 5310. If any field is found invalid for processing at block 5310, then block 5324 reports the error appropriately to the user interface, and processing terminates at block 5326. If all fields are found to be valid at block 5310, then block 5312 builds an update command for the DCDB Table using fields from the form where the DCDBID equals the record id data evidence (DCDBID) passed for processing. Thereafter, block 5314 opens a DB connection, block 5316 does the update, and block 5318 closes the DB connection. Thereafter, block 5320 sends an alert email to an Administrator account if a Notify flag is enabled for this type of database update, block 5322 builds and serves back a success interface to the user, and processing terminates at block 5326.

FIG. 71D depicts a preferred embodiment screenshot for viewing DCDB information of a selected DCDB record. FIGS. 71E and 71F depict preferred embodiment screenshots for modifying DCDB information of a selected DCDB record, for example when placing a single checkmark at checkbox 7187 and invoking control 7181. FIG. 71G depicts a preferred embodiment screenshot for results from searching the web service DCDB records after a user search specification, paginating results, and then user selecting records to manage with checkmarks placed next to desired records for management. FIG. 71H depicts a preferred embodiment screenshot for viewing a plurality of selected DCDB records, for example in accordance with those records that were check-marked in FIG. 71G and then invoking control 7179. FIGS. 71I and 71J depict preferred embodiment screenshots for modifying a plurality of selected DCDB records, for example in accordance with those records that were check-marked in FIG. 71G and then invoking control 7181.

FIG. 62 depicts a flowchart for a preferred embodiment for processing the request to modify a plurality of records of the web service. For this discussion, FIG. 62 was invoked at block 6062 in processing records 7000. Processing starts at block 6202 and continues to block 6204 where the ACCESS_LIST is set for authorized users. Thereafter, block 6206 performs FIG. 39 access control processing and continues to block 6208. Block 6208 validates form fields (e.g. from FIGS. 71I-71J, and then block 6210 checks validation results. If at least one field is invalid, then block 6226 appropriately reports the error to the user, and processing terminates at block 6228. If all fields are valid, then block 6210 continues to block 6212. Block 6212 builds a WHERE clause string from record id array data evidence (e.g. from hidden form fields), builds an update command for the DCDB Table with fields specified and check-marked in FIG. 71G, and concatenates the WHERE clause string of record ids (DCDBIDs) constructed at block 6212. Thereafter, block 6216 opens a DB connection, block 6218 does the update command, block 6220 closes the DB connection, block 6222 send an email to an administrator account if a Notify flag indicates to document this type of transaction, block 6224 builds and serves back a successful result interface, and processing terminates at block 6228. So, a plurality of records 7000 are modified all at once as check-marked, for example on FIG. 71G and FIGS. 71I-71J.

FIGS. 72 through 76 describe processing from invocation means from FIGS. 71A, 71B, 71E-71F, and 71I-71J. DCDB records 7000 are conveniently configured by a user. FIGS. 72 through 76 are simply detailed elaborations within the scope of FIG. 14 for facilitating automated specification of situational location information for record 700 or record 7000. Any, or all fields, of record 7000 can be automatically populated by software and hardware processes to alleviate the manual processes involved in specifying such information. Examples include discussions around the automated situational location specification area 7197, but other embodiments are not limited to merely automating the specification of situational location information for record 7000. Area 7197 is preferably available to a user for adding, searching for, and modifying records 7000. While discussions are themed on GPS parameters, cell tower location coordinates and any other location means, or combinations thereof, can replace any of the automated locating examples below. This disclosure is based on situational locations regardless of how location information is determined.

FIG. 72 depicts a flowchart for a preferred embodiment for processing the request to select a DCDB situational location from a map, for example from selecting button 7178 from the automated situational location specification area 7197. Button 7178 is selected after the user selects a geographical territory from the neighboring dropdown 7178-*d* (e.g. "United States" defaulted in FIGS. 71A, 71B, 71E, and 71F). FIG. 71I can certainly also have a button 7178 with a neighboring dropdown 7178-*d*, but at the time of writing this disclosure that option was not yet added to the GPSPing.com implementation, so is not shown in the screenshot of FIG. 71I. It should be understood that there is full intention of making a button 7178 and dropdown 7178-*d* available to the user of FIG. 71I.

FIG. 72 processing begins at block 7202 upon selection of button 7178 after dropdown specification of dropdown 7178-*d*, and continues to block 7204. There can be many geographical territories available for dropdown selection. FIG. 72 is invoked for:

- configuring DCDB records for DCDB delivery to all mobile users 2540
- configuring PingSpot content for delivery to PingPals (discussed below)
- configuring alert content for delivery to PingPals (discussed below)

Block 7204 establishes latitude and longitude landmarks upon the displayed map and associates corresponding x and y pixels, preferably with the leftmost bottom corner at the Cartesian coordinate system origin, for example the leftmost top corner (e.g. (x,y)=(0,Y)), rightmost top corner (e.g. (x,y)=(X, Y)), rightmost bottom corner (e.g. (x,y)=(X,0)), and leftmost bottom corner (e.g. (x,y)=(0,0)) of a rectangular map graphic. Other embodiments may use a different system. Each map graphic is preferably stored with the 4 corners being a well known latitude and longitude, along with a vertical and horizontal curvature factor. In cases where humans have traveled to other planets (also moons or any other body in space) with use of web service 2102, associated planetary maps (parent map selectable from dropdown 7178-*d*) will contain applicable latitude and longitude coordinates with relative curvature factors depending on the particular body in space. In such an embodiment, the situational location information of record 7000 preferably includes three dimensional coordinates in space for defining a solid area some mobile user 2540 may travel through. The solid area may be relative to earth, another planet, or any origin in the universe.

The map graphics are preferably small enough in area, yet large enough in display, to avoid too much skewing of latitude and longitude calculations based on points a user selects in the map relative to the four well known corners. Latitude and longitude considers earth curvature wherein one embodiment of map selection may not. However, other embodiments will use curvature factors relative to where map points are selected.

Thereafter, block 7206 presents the selected map to the user, and the user interfaces to the displayed map at block 7208 until an action is invoked. Thereafter, if block 7210 determines the user selected to display a descending geographical map (map that drills down into a territory on the current map), or ascending map (map that covers more territory including the current map), then processing continues back to block 7204 for the desired map initialization. Convenient map hierarchy traversal is provided for zooming in or out. Panning may also be provided at block 7208 which will access other maps for display before returning to block 7204 for subsequent processing, as determined by action subsequent to block 7208. FIG. 105B depicts a map of the United States, and based on descending maps currently configured in web service 2102, a selectable territory is highlighted for drilldown, for example a Texas map as displayed in FIG. 105C. The Texas map in turn enables drill down to specific counties that do have maps in the web service 2102. Likewise, the user can traverse the map hierarchy in any direction for situational location specification.

If block 7210 determines the user did want a descending or ascending map, then processing continues to block 7212. If block 7212 determines the user completed situational location specifications, for example a point, circle, rectangle, or polygon, then processing continues to block 7214. Block 7208 is intended for the user to specify a point, circle (point with radius), rectangle, or polygon on a map for convenient automated location information specification. Examples of how the user would select with a cursor a point, circle, rectangle, or polygon are exampled in FIGS. 96D, 96A, 96B, and 96C, respectively. Block 7214 scales the specified points (point, center of circle (with radius), 4 rectangle corners, polygon sequence of points) according to pixel locations for deriving the corresponding latitude(s) and longitude(s) as determined relative to the map well known 4 corners and any curvature skewing information. Thereafter, block 7216 saves the user specifications (ultimately to be saved to record 7000). If the specification is a point, then record 7000 fields for maintaining latitude and longitude will be used. If the specification is a circle, then record 7000 fields for maintaining latitude and longitude will be used for the circle center, and HitRadius field 7032 is used for the radius. If the specification is a rectangle or polygon, then PMRID 7030 is used to join record 7000 to the Pingimeter Table (FIG. 94B records) on PMRID 9452 for maintaining a plurality of records in the Pingimeter Table for individual latitudes and longitudes comprising the rectangle or polygon points.

Thereafter, processing continues for communicating selections to the user interface that FIG. 72 was invoked from. If it is determined at block 7218 that a radius was specified at block 7208, then block 7226 redirects the page back to the invoking page for automatically populating the latitude and longitude fields for the circle center and any radius field that is there. If no radius field (HitRadius) is present (e.g. FIGS. 71A, 71B, 71E, 71F, 71I, and 71J), then the radius is displayed out in the right margin of the page. Block 7226 continues to block 7224 where processing terminates. If block 7218 determines a circle was not selected, then processing continues to block 7220. If it is determined at block 7220 that a polygon (including rectangle) was specified at block 7208, then block 7228 redirects the page back to the invoking page for automatically populating the latitude and longitude fields with a LIST indication. If no scrollable list fields are present to be populated (e.g. FIGS. 71A, 71B, 71E, 71F, 71I, and 71J), then a list invocable page link is displayed out in the right margin of the page. The user can select the list link for a pop-up or page showing an ordered set of latitude and longitude specifications, or another embodiment will produce the underlying map where selections were made showing the selections on the map used, or another embodiment will provide an option to see either format. Block 7228 continues to block 7224 where processing terminates. If block 7220 determines a polygon (including rectangle) was not selected, then processing continues to block 7222 where the selected point latitude and longitude are automatically populated to the invoking page fields for latitude and longitude, and processing terminates at block 7224. If block 7212 determines the user selected another action, then processing continues back to block 7208 for integrating the action with user interface processing at block 7208. So, FIG. 72 automatically populates the invoking user interface for subsequently populating fields in a record 7000. Some embodiments will always allow displaying the map and selections made thereon from the invoking page after FIG. 72 processing. One embodiment will provide a show on map button 7178-*s* for being able to display the user's configurations for record 7000. Yet another embodiment, will provide a "See Current" option in dropdown 7178-*d* which then shows the current record 7000 configuration(s) on the map upon selection of button 7178 when the dropdown item "See Current" is selected.

Alternate embodiments to FIG. 72 will enable selection of multiple points, circles, rectangles, polygons, regions, etc for multiple situational locations defined to a record 7000. Various mathematical models can be used to achieve high accuracy on deriving user selected pixels on maps to precise location coordinates.

FIG. 73 depicts a flowchart for a preferred embodiment for processing the request to geo-translate address criteria into latitude and longitude coordinates for a DCDB situational location, for example upon selection of button 7180. Pre-translation criteria menu 7180-*m* enables the user to select a radio button for which type of information to translate to latitude and longitude, specifically an address radio button, mobile device 2540 radio button, and a phone number radio button. When the user selects the address radio button, any subset of address information can be specified for returning one distinct conversion or a plurality of choices to choose from. Wildcard characters can also be used, or wildcard substrings assumed. The user interfaces to block 7316 when there are a plurality of candidates for selection before processing continues to block 7338. Thereafter, block 7338 will determine if the user cancelled out, selected one, or selected a plurality, or if an error occurred. In one embodiment regardless of how configured, a user can select a plurality of locations for associating to a record 7000 for candidate delivery, in which case a new table of records will be joined to a record 7000 for associating a plurality of situational locations for a single record 7000.

When the user selects the "Device" radio button, the last known whereabouts of the mobile device 2540 of web service 2102 (identified with deviceid field 6504) that is specified in the corresponding entry field is searched for from the Trail Table (FIG. 68 records) to get the latitude and longitude. Only the devices which have provided the "View Whereabouts" privilege to the user (e.g. of FIGS. 71A, 71B, 71E, 71F, and 71I) are enabled for search from the Trail Table. A user cannot simply request the whereabouts of any device 2540 of the web service 2102. A PingPal privilege enables the right to do that, and any user or device can assign the right to any other user or device. The user can also enter a group name (record 8900) by qualifying it with a "G:" prefix. That way the user can have a group set up of devices which have provided the "View Whereabouts" privilege for then selecting from a group of devices and/or users to use the location(s). The user can also use wildcard device specification(s) but all devices found in server data 2104 (records 6500) must have provided the "View Whereabouts" privilege, otherwise none will be found because a single query is preferably used with a LIKE condition. Other embodiments will find the valid devices that have granted the "View Whereabouts" privilege.

When the user selects the "Phone #" radio button, a telephone phone number can be entered to the entry field for dynamically finding the location of the equipment with that phone number. A (public) address book is accessed which contains a directory of all participating fixed phone numbers and/or any participating mobile phone numbers. The address book will contain those numbers that people do not object to having published in such an address book along with address information, or latitude and longitude information to prevent an extra translation step. Mobile phone numbers can continually update the public address book as the mobile devices roam, on a reasonable periodic basis. This functionality is preferably outside the web service 2102, but could in fact be integrated with tracking records 6800 maintained in the Trail Table (FIG. 68 records) for heartbeats received from, or on behalf of, mobile devices 2540. For the purposes of this discussion, the (public) address book simply correlates phone numbers with the last known location of the device (or home address phone number) associated with that phone number. The user can also use wildcard phone number specification(s) for returning multiple phone numbers to choose from.

FIG. 73 processing begins at block 7302, and continues to block 7304 where all fields of pre-translation criteria menu 7180-*m* are validated according to the radio button selected of the pre-translation criteria menu 7180-*m*. Thereafter, if any field is not valid as determined by block 7306, then block 7314 provides an appropriate error so specification can continue by the user in pre-translation criteria menu 7180-*m*. Thereafter, FIG. 73 processing terminates at block 7332. If block 7306 determines there were no errors found at block

7304, then block 7306 continues to block 7308. If block 7308 determines the address radio button was selected, then block 7316 uses the address subset to build a query for querying connected geo-translation database(s). The geo-translation database (DB) may be a DB local to web service 2102, or accessed remotely (e.g. Geocoding Conversion Database(s) 2550), for example by way of an internet connection. Block 7316 can interface to multiple translation databases, for example to use the output from one query to build a next query in turn, until after a sequence of crafted queries the latitude and longitude information for the user specification is retrieved. Depending on the embodiment, a point, circle, rectangle, or polygon can be returned as the final result of block 7316 to approximate location information for the user specified address information. Block 7316 will interface with the user if there is a plurality of selections to make because of ambiguity or wildcarding. Block 7316 continues to block 7338 where the conversion and user results or user selection results are checked. If block 7338 determines there was a result found and there were no errors at block 7316, and the user did not cancel out of making selections, then processing continues to block 7324, otherwise processing continues to block 7314 for appropriate error handling. Block 7324 starts processing for communicating the result back to the invoking user interface similarly as described for FIG. 72, except for saving the translated specifications (ultimately to be saved to record 7000). If the specification is a point, then record 7000 fields for maintaining latitude and longitude will be used. If the specification is a circle, then record 7000 fields for maintaining latitude and longitude will be used for the circle center, and HitRadius field 7032 is used for the radius. If the specification is a rectangle or polygon, then PMRID 7030 is used to join record 7000 to the Pingimeter Table (FIG. 94B records) on PMRID 9452 for maintaining a plurality of records in the Pingimeter Table for individual latitudes and longitudes comprising the rectangle or polygon points. Thereafter, processing continues for how to communicate selections to the user interface that FIG. 73 was invoked from. If it is determined at block 7326 that a radius was returned at block 7316, then block 7334 redirects the page back to the invoking page for automatically populating the latitude and longitude fields for the circle center and any radius field that is there. If no radius (HitRadius) field is present (e.g. FIGS. 71A, 71B, 71E, 71F, 71I, and 71J), then the radius is displayed out in the right margin of the page. Block 7334 continues to block 7332 where processing terminates. If block 7326 determines a circle was not returned, then processing continues to block 7328. If it is determined at block 7328 that a polygon (including rectangle) was returned at block 7316, then block 7336 redirects the page back to the invoking page for automatically populating the latitude and longitude fields with a LIST indication. If no scrollable list fields are present to be populated (e.g. FIGS. 71A, 71B, 71E, 71F, 71I, and 71J), then a list invocable page link is displayed out in the right margin of the page. The user can select the list link for a pop-up or page showing an ordered set of latitude and longitude specifications, or another embodiment will produce the underlying map where selections were made showing the selections on the map used. Block 7336 continues to block 7332 where processing terminates. Various embodiments discussed with FIG. 72 analogously apply here. If block 7328 determines a polygon (including rectangle) was not selected, then processing continues to block 7330 where the returned point latitude and longitude are automatically populated to the invoking page fields for latitude and longitude, and processing terminates at block 7332. In the multiple selection embodiment, the user may have selected a plurality of points, circles, rectangles, polygons, or combinations thereof, in which case appropriate logic from blocks 7326 through 7330 is incorporated respectively.

If block 7308 determines the user did not select the address radio button in the menu 7180-*m*, then processing continues to block 7310. If block 7310 determines the "Device" radio button was selected, then block 7318 builds query(s), including to the Trail table upon successful determination (PingPal Privilege Assignment Table (FIG. 92 records) queried and joined records therefrom) that the user causing FIG. 73 processing does indeed have the right to view the whereabouts of the device(s) (by Deviceid, group name, or wildcard) specified (determining privileges discussed below). The query returns the most recently inserted record(s) 6800 in the Trail Table (FIG. 68 records) for the device(s) with the Deviceid field(s) 6504 specified by the user, and having associated RegistryID (s) 6502 that matches RegistryID (s) 6802. Block 7318 opens a DB connection, does the appropriate query(s), and closes the DB connection. The user will interface to results at block 7318 if there is a plurality of results to choose from. Thereafter, if block 7320 determines an entry was not found in the Trail Table or an error occurred, or the user cancelled out of selections, then processing continues to block 7314 for appropriately handling the error. If block 7320 determines an entry was found in the Trail Table and/or selected by the user, then block 7324 continues processing as already described. If block 7310 determines the user did not select the device radio button, then block 7312 determines if the phone number radio button was selected. If the phone number radio button was selected as determined by block 7312, then block 7322 builds query(s) to the address book, for example as described above and queries location information for the phone number. Block 7322 can interface to multiple databases, for example to use the output from one query to build a next query in turn, until after a sequence of crafted queries the latitude and longitude information for the user specification is retrieved. Preferably, a point is returned for the sought phone number. If a plurality of selections result (e.g. wildcarding), the user interfaces at block 7322 to make selection(s). Thereafter, if block 7320 determines the number was found in the address book and/or selected by the user, processing continues to block 7330 by way of block 7324 for communicating the latitude and longitude point information back to the invoking user interface. If block 7320 determines the phone number was not found or an error occurred, or the user cancelled out of making selections, then processing continues to block 7314 for handling the error. If block 7312 determines the phone number radio button was also not specified, then block 7314 handles an unusual error for no radio button specified (as might be the case for stand-alone modular unit code testing of FIG. 73). Some embodiments will allow displaying a map and translated selections thereon from the invoking page after FIG. 73 processing. So, FIG. 73 automatically populates the invoking user interface for subsequently populating fields in a record 7000.

FIG. 74 depicts a flowchart for a preferred embodiment for processing the request to automatically get the current situational location, for example a latitude and longitude, of the requesting device. The user manually enters data into fields for "COM Port", "Baud Rate", and an optional checkmark for "Round" if the fields do not automatically populate when arriving to the interface (e.g. FIGS. 71A, 71B, 71E, 71F, 71I, and 71J). These fields are easily defaulted from GPS (Global Positioning System) mechanism data evidence established one time with fields 5088, 5090, and 5092, respectively, of FIG. 50I (also shown in FIGS. 50G and 50H). COM port and Baud rate are required for how to interface a connected GPS source to the device with user interfaces FIGS. 71A, 71B, 71E, 71F, 71I, and 71J. Other embodiments may not expose this information in the DCDB interfaces to avoid confusion by users who may not need it, or understand it.

FIG. 74 processing starts at block 7402 upon selecting button 7182, and continues to block 7404 where "COM Port", and "Baud Rate" are validated. Thereafter, block 7406 checks validity. If block 7406 determines the specified fields are valid and not empty, then block 7408 starts the GPS interface to the specified COM port in anticipation of the specified baud rate. GPS coordinates should be streaming off the COM port, for example in National Marine Electronics Association (NMEA) 0183 format as the result of connected GPS means, for example a serial attached GPS device, USB attached GPS device, blue-tooth attached GPS device, or any GPS device attached in an appropriate manner for communicating GPS information to the host system with interfaces of FIGS. 71A, 71B, 71E, 71F, 71I, and 71J. Thereafter, block 7410 retrieves the most recent GPS information and continues to block 7412 if retrieved or timed out waiting. If block 7412 determines the request to get GPS information timed out, then an error is reported at block 7416 so the invoking user interface specification can continue, and processing terminates at block 7424. If block 7406 determines the "COM Port" and "Baud Rate" specified were not valid, then block 7416 reports the error so the invoking user interface specification can continue, and processing terminates at block 7424.

If block 7412 determines the request for information was satisfied, then the "Round" checkmark is interrogated at block 7418. If block 7418 determines the "Round" checkmark was checked, then latitude and longitude seconds are rounded to a system configured number of decimal places (e.g. 2) at block 7414 and processing continues to block 7420. If block 7418 determines that "Round" was not checked, then processing continues directly to block 7420.

Block 7420 converts the retrieved latitude and longitude into readable format for automatically populating the invoking user interface, then block 7422 populates the latitude and longitude fields in the invoking user interface, and processing terminates at block 7424. CD-ROM file name "gpstools.asp" provides a Javascript interface of an actual GPSPing.com implementation of FIG. 74 for interfacing a fully scalable and internet accessible ASP program to connected GPS gathering means.

FIG. 75A depicts a preferred embodiment screenshot for priming the automatic retrieval of a situational location, for example GPS coordinates. A GPS prime link 7195 is provided since some GPS device interface implementations are somewhat fragile based on having a clear view to the sky, timeout parameters, and other issues in ensuring a live GPS information feed. GPS chips and devices are becoming more sensitive, and Adjusted GPS (AGPS), Differential GPS (DGPS), WAAS (Wide Area Augmentation System) enablement, and the like, is assuring highly accurate GPS feeds while in concrete and steel buildings, and other areas or situations historically difficult for capturing GPS information. GPS functionality soon will be available to many devices regardless of their physical location. The user can select link 7195 to get to the GPS dashboard page of FIG. 75A. The GPS dashboard page allows validation that the GPS information is indeed streaming off the expected port, so that FIG. 74 processing will have no issue. Typically, the user will encounter a timeout issue first, then click on link 7195 to prime the port again for retrieving GPS information. Future embodiments of web service 2102 will not need a GPS prime link 7195 because there will be no requirements in the future to have a clear view to the sky. The user of the FIG. 75A Dashboard can select the "Clear Vals" button to clear all fields at any time, select the "Start" button to start interfacing to the GPS port for GPS information collection, or select the "Stop" button to stop the interface to the GPS port. FIG. 75A shows that the GPS port is COM port 6 and the Baud rate is 4800, both of which can be defaulted with GPS mechanism data evidence as described above. FIG. 75B depicts a screenshot demonstrating activity in automatic retrieval of a situational location, for example GPS coordinates. The user has selected "Start" from the screenshot in FIG. 75A prior to taking the screenshot for FIG. 75B. GPS information is updated real-time into fields of the window, mostly at an interval of every second as is consistent with a GPS interface, for example NMEA 0183 format. Other GPS formats and devices can of course be used as well to accomplish functionality described herein. Once the user sees a live feed is good, he can go back to the invoking user interface and then automatically retrieve GPS information with button 7182. CD-ROM file name "zgpsdash.asp" provides a Javascript and hosting ASP interface of an actual GPSPing.com implementation of FIGS. 75A and 75B for interfacing in a fully scalable and internet accessible manner to connected GPS gathering means.

FIG. 76 depicts a flowchart for a preferred embodiment for processing the request to convert one form of situational location information into another form of situational location, for example decimal degree specifications of latitude and longitude into degrees, minutes, and seconds specifications. FIG. 76 starts processing at block 7602 upon selection of button 7184 and continues to block 7604. Prior to selecting button 7184, the neighboring "Lat" and "Lon" fields are entered as any decimal real numbers for decimal degrees, a common format. Button 7184 then converts those specifications into the latitude and longitude parameters of the user interface in terms of Degrees, Minutes, Seconds, and Pole or Hemisphere. Another embodiment may always use decimal degrees, or only the D/M/S notation, or some other latitude and longitude representation without departing from the spirit and scope disclosed herein. Block 7604 validates the "Lat" and "Lon" fields and processing continues to block 7606. If block 7606 determines a "Lat" or "Lon" specification is invalid, then block 7616 reports the error to the user so user specification can continue, and processing terminates at block 7614. If block 7606 determines that the user specification for "Lat" and "Lon" are valid, then block 7608 converts the decimal degree values to Degrees, Minutes, and Seconds (and Pole for Lat, Hemisphere for Lon), block 7610 makes the values human readable, block 7612 automatically updates target fields in the invoking user interface, and processing terminates at block 7614. CD-ROM file name "convdegs.asp" provides a Javascript interface of an actual GPSPing.com implementation of FIG. 76 for interfacing to a fully scalable and internet accessible ASP program.

With reference back to FIG. 63, shown is a flowchart for a preferred embodiment of carrying out processing for presenting a web service user interface form in the members area 2500 and then processing user specifications to the interface prior to submitting to the service for further processing. For this discussion in context for indicators, FIG. 63 is invoked for adding a record 7800 to an Indicator Table (FIG. 78 records) upon invoking DCDB Indicators link 4656. Processing starts at block 6302 and continues to block 6304 where the ACCESS_LIST is set for authorized users. Thereafter, block 6306 performs FIG. 39 access control processing and continues to block 6308. Block 6308 builds and presents FIG. 79A for adding an Indicator record, and then a user interfaces with FIG. 79A at block 6310 until the Add button 7902 action is invoked. When an add action is invoked by the user, block 6312 validates user field specifications to FIG. 79A, and block 6314 checks the results. If block 6314 determines the fields are valid (and can be submitted for processing), then block 6318 invokes FIG. 77 processing for adding the record 7800, and current page processing terminates at block 6316. If block 6314 determines that not all fields specified are valid, then block 6320 provides an error to the user so that specification can continue back at block 6310 (e.g. pop-up).

FIG. 77 depicts a flowchart for a preferred embodiment for processing the submittal to add a record to the web service. For purposes of this discussion, a record 7800 is being added to the Indicator Table (FIG. 78 records), for example by a Content Provider or a Pinger (e.g. for PingSpot). Processing starts at block 7702 and continues to block 7704 where the ACCESS_LIST is set for authorized users. Thereafter, block 7706 performs FIG. 39 access control processing and continues to block 7710. Block 7710 validates user field specifications to FIG. 79A, and block 7712 checks the results. If block 7712 determines all fields are not valid, then block 7708 reports the error to the user in an appropriate manner and processing terminates at block 7720. If block 7712 determines all fields are valid, then block 7714 builds an Indicator Table insert command from FIG. 79A specifications, opens a DB connection, does the insert, and closes the DB connection. Thereafter, block 7716 sends an email to an administrator account if a Notify flag is set to document this type of transaction, and block 7718 provides the user with a successful add acknowledgement interface similar to those described above, and processing terminates at block 7720. FIG. 77 processing inserts a record 7800 into the Indicator Table and defaults fields appropriately (e.g. Ordr field 7806, Owner field 7810 to PersonID of the user adding the record (as communicated from Access Control processing, etc)).

FIG. 78 depicts a preferred embodiment of a data record in the Indicator Table used to maintain delivery indicators for the web service 2102. Delivery Indicators can be assigned to DCDB records, or assigned to receiving device(s) in the Registry Table. IndicID 7802 is preferably a unique primary key automatically generated by the underlying SQL database system to ensure uniqueness when inserting a record 7800 to the indicator Table. Indicatr field 7804 contains an indicator value or reference thereof for delivery to a mobile device 2540 instead of content. Indicatr field 7804 may contain a character, character string, fully qualified path name of a file accessible to web service 2102 which contains the indicator character, character string, image, or any indication means. Various embodiments will always store the indicator in field 7804, or will always store a reference to the indicator described by field 7804, or will use references simultaneously. Any indicator format, or type, can be used. For example, an indicator may be visual or audible, or a combination thereof. Ordr field 7806 contains an integer for priority order of indicators when the same owner of the record has multiple indicator records 7800 in the Indicator Table. This allows defining an order of indicators to check for delivery, so that when one record 7800 does not satisfy the delivery, the next record 7800 can be checked to see if it satisfies being delivered, and so on until the best matching indicator is found. Criteria field 7808 contains criteria about the deliverable content that when found to be true, denotes to use the record 7800 as the best match indicator record for delivery to a mobile device 2540. Various embodiments will use criteria for matching to one or more fields of the Registry Table record 6500 for the target device, or for matching to one or more fields of the DCDB record 7000 that is determined to be selected for subsequent delivery. Criteria field 7808 can be similar in configuration to Interests Field 6516. There can be multiple Criteria fields in a record 7800. Owner field 7810 contains the PersonID 2902 for the user who created the record 7800. Each user has a reasonable system configured limited number of records 7800 they can create. BrowseRct field 7812 is a Yes/No flag for whether or not to deliver the indicator to the device in an active Delivery Manager connected browser window. SMSRcpt field 7814 is a Yes/No flag for whether or not to deliver the indicator in an SMS message. EmailRcpt field 7816 is a Yes/No flag for whether or not to deliver the indicator in an email message. An alternate embodiment to fields 7812 through 7816 will use the equivalent fields in an applicable record 6500. DTCreated field 7818 contains a date/time stamp of when the record 7800 was created in (added to) the Indicator Table. DTLastChg field 7820 contains a date/time stamp of when any field in the record 7800 was last modified. CIP field 7822 preferably contains an internet protocol (ip) address of the user's device that created the applicable data record 7800. The CHIP field 7824 preferably contains the ip address of the actual physical server of web service 2102 that created applicable data record 7800. CHName field 7826 preferably contains the host name of the physical server of web service 2102 that created applicable data record 7800, for example because web service 2102 may be a large cluster of physical servers. ChgrIP field 7828 preferably contains an internet protocol (ip) address of the user's device that last modified the applicable data record 7800. The ChgrHIP field 7830 preferably contains the ip address of the actual physical server of web service 2102 that last modified applicable data record 7800. ChgrHName field 7832 preferably contains the host name of the physical server of web service 2102 that last modified applicable data record 7800, for example because web service 2102 may be a large cluster of physical servers. The Indicator Table should always be initially set with some number of records 7800 that provide system default behavior to web service 2102 so that indicators exist even if no user has yet added an indicator through members area 2500. These default system indicators preferably have a lowest priority (e.g. negative) value in Ordr field 7802 so they are never available to any user for managing, and are always the lowest priority record(s) 7800 in the indicators Table at the time of request. Another embodiment will permit a Site Owner to use interfaces discussed in FIGS. 77 through 85 for maintaining the system default indicators for web service 2102.

FIG. 79A depicts a preferred embodiment screenshot for adding an Indicator record 7800 to the web service, preferably upon selection of DCDB Indicators option 4656. FIG. 79A is arrived to after clicking DCDB Indicators option 4656. Field 7904 is used to populate field 7804 with characters, and will be a path to a file if applicable. Indicator format and content as well as any file path format and existence is checked for validity at blocks 7710 and 7712. Other fields of FIG. 7902 are easily identified for corresponding record 7800 fields. Ordr field 7806 is defaulted for preferably setting the priority to the lowest priority. In some embodiments, the default may duplicate the values between records 7800 in the Indicator Table which requires subsequent updating. In other embodiments, the current records for the user adding the record 7800 are queried to determine the next available value for a unique default value for Ordr field 7806. Criteria field is defaulted to null. Selecting manage indicators link 7952 produces the screenshot of FIG. 79B.

FIG. 79B depicts a preferred embodiment screenshot for results from searching the web service Indicator records for the user of the interface, for example upon selecting link 7952. There is preferably no search interface to indicators since there is preferably a reasonably limited enforced maximum, however FIG. 79B is provided to support all conceivable embodiments where many indicators will be managed. A website defined maximum per user and/or per record is preferably enforced at blocks 7710 and 7712. In another embodiment, record 3000 will contain a maximum (e.g. new field 3023) for each user, much like MaxDevs field 3020 is defined and used. A new max DCDB Indicators field 3023 would be passed to pages including FIG. 39 Access Control processing in a similar manner.

So, clicking the link 7952 takes the user directly to the list interface similarly described above for other record types (2900, 6500, 7000). Another embodiment could provide a similar search interface in context for records 7800. It should be readily understood now from previous descriptions that FIGS. 55, 57, 58, 60, 53, and 62 are easily described in context for records 7800 and applicable FIG. 79B processing, and for obvious screenshots subsequent to actions from FIG. 79B. So for brevity, the redundant descriptions and figures are not included here except to say Indicator Table records 7800 can be viewed, deleted, and modified (individually or as a list) in a similar manner to records 2900, records 6500, and records 7000.

FIG. 80 depicts a flowchart for a preferred embodiment for processing the request to present Indicators for DCDB assignment, for example upon selection of configure indicators link 7196. FIG. 80 processing starts at block 8002 and continues to block 8004 where the ACCESS_LIST is set for authorized users. Thereafter, block 8006 performs FIG. 39 access control processing and continues to block 8008. Block 8008 builds queries to retrieve the default system indicator record(s) 7800 from the Indicator Table (may not have to query system default(s) specifically since Ordr field 7806 will present all records in the proper order including the system defaults defined with a single query in the preferred embodiment) and the user's configured indicator records 7800 as determined by the Owner field 7810 (and a system default Owner field if all retrieved in a single query). Block 8008 opens a DB connection, does the query(s), builds the indicator record 7800 list, closes the DB connection, and continues to block 8010. The user's records 7800 are queried with an ORDER BY clause on Ordr field 7806 to show priority order in the list retuned. Block 8010 builds the user interface of FIG. 83 and sets the radio button to a system default Indicator if the user has no records 7800 defined, or to the highest priority indicator found (if applicable) for the user according to Ordr field 7806. FIG. 83 preferably allows selecting a single Indicator when assigning to the DCDB item for delivery, however other embodiments may allow more. Block 8010 also maintains IndicID 7802 data evidence with each row output (along with the radio button field), preferably as a hidden field. Thereafter, the user interfaces to FIG. 83 at block 8012 until action processing is invoked. Thereafter, block 8014 checks for a view record action (selected view control 8302) and if it determines the view action was requested, then block 8018 invokes record view processing for displaying the contents of the record 7800 with the radio button selected at the time of selecting control 8302. Browser Back key, window closing, and other navigation can be subsequently performed. Thereafter, processing terminates at block 8020. If block 8014 determines the action was not for viewing a record 7800, then processing continues to block 8016. If block 8016 determines the user selected to save (e.g. clicked button 8304), then block 8022 invokes Indicator management form processing of FIG. 81 on the entry with the radio button set, then processing terminates at block 8020. If block 8016 determines a save action was not selected, then processing continues back to block 8012 for other actions of little relevance to this disclosure with respect to FIG. 83.

FIG. 81 depicts a flowchart for a preferred embodiment for Indicator management form processing. Processing starts at block 8102 and continues to block 8104 where the ACCESS_LIST is set for authorized users. Thereafter, block 8106 performs FIG. 39 access control processing and continues to block 8110. Block 8110 validates user specifications from FIG. 83 which should be minimal if any. Thereafter, block 8112 checks form field validity. If all form specifications are not valid, then block 8108 reports an appropriate error to the user and processing terminates at block 8120. If block 8112 determines that all form fields are valid, then block 8114 builds a delete command on the IndicID data evidence for the selected radio button row from FIG. 83A for first deleting any occurrence in the DCDB Indicator Assignment Table (FIG. 82 records) using IndicID field 7802 data evidence for the row with the radio button selected. An insert command is also constructed for insertion of a record 8200 into the DCDB Indicator Assignment Table (FIG. 82 records) for mapping a delivery indicator to a DCDB record 7000. Preferably, only a single best indicator is assignable. Block 8114 opens a DB connection, does the delete and insert commands, respectively, then closes the DB connection and continues to block 8116. Another embodiment can allow a single update command. Block 8116 sends an email to an administrator account if a Notify flag is set to document this type of transaction, then block 8118 provides the user with a successful add acknowledgement interface similar to those described above, and processing terminates at block 8120.

FIG. 82 depicts a preferred embodiment of a data record in the DCDB Indicator Assignment Table used to associate Indicators to DCDB records 7000 and Registry records 6500. Type field 8202 is a type indicator for the type of record id in field 8204. Type field 8202 can be for assign DCDB Table record to indicator, assign all the user's DCDB Table records to indicator, assign Registry Table record to indicator, assign all the user's Registry Table records to indicator. RecID 8204 contains either a DCDBID 7002 value, a PersonID 2902, or a RegistryID field 6502. This allows joining the record 8200 to either the DCDB table (on AuthID 7038 (for all), or on DCDBID 7002) or Registry table (on Owner field 6522 (for all), or on RegistryID 6502) for associating indicators to DCDB items or devices, respectively. IndicID 8206 contains an IndicID 7802 value for joining to a record 7800 for the associated indicator(s). A PersonID field 2902 in RecID 8204 implies all of the user's devices are associated. A DCDBID 7002 in RecID 8204 implies a deliverable content item is associated. A RegistryID 6502 in RecID 8204 implies a single user's device is associated. Another embodiment will define a different value in type field 8202 for using a PersonID 2902 value in RecID 8204 for associating an indicator to all the user's deliverable contents items (via AuthID 7038).

Another embodiment to the DCDB Indicator Assignment Table (FIG. 82 records) is to have multiple tables for each type maintained in type field 8202 so joins can be done without a condition to get associated DCDB record(s) or Registry record(s). For example, one table would always have a RecID 8204 containing DBDBID 7002 values, another table would always have a RecID 8204 containing Owner field 6522 values, another table would always have a RecID 8204 containing RegistryID 6502 values, and another table would always have a RecID 8204 containing an AuthID 7038 values. Thus, the DCDB Indicator Assignment Table provides means for assigning indicator(s) to: a) individual deliverable content item(s) 7000, b) individual device(s) 6500, c) all of a user's deliverable content item(s) 7000, and d) all of a user's device(s) 6500.

FIG. 83 depicts a preferred embodiment screenshot for selecting an Indicator to be associated with a DCDB record. System defaults are shown, but others would display based on configurations made by the user of FIG. 83. Preferably, a single indicator is assigned to a DCDB record 7000, however another embodiment can allow a priority order of multiple assignments as described above for associating multiple records 7800 to a DCDB record 7000 using the Criteria field 7808 for conditional assignment as discussed below. Yet another embodiment will permit the user to assign an indicator 7800 to all his created records 7000. FIGS. 77 through 83 have so far been described for associating records 7800 to records 7000 through maintaining the records 7800 by a Content Provider, Pinger, Site Owner, or any other user who want the ability to assign indicators to deliverable content items. FIGS. 84A through 85 shall describe enabling users to assign indicators to their receiving devices for overriding any indicators that may be assigned for a deliverable content item 7000.

FIG. 84A depicts a flowchart for a preferred embodiment for processing the request to configure personal Indicators, for example upon selecting configure indicators link 5082. Configure indicators link 5082 preferably links to FIG. 85 for all user types to manage indicators for their devices. Presence of records 7800 resulting from FIGS. 84A through 85 define the user's preferences. Another embodiment to record 7800 includes an Active field 7817 which enables (i.e. active) or disables (i.e. inactive) records in the Indicator Table for entries to be maintained, yet without being considered when queried. The active field 7817 would be managed as any other record 7800 field similarly described above and/or described below. FIG. 85 provides users with enablement for fully customizing indicators for their devices through a FIG. 85 interface which is different than FIGS. 79A and 79B. Different embodiments can use only FIGS. 79A and 79B and associated processing, only FIG. 85 and associated processing, or both as described herein. Configure indicators link 5082 is intended for user interface personalization from FIGS. 50G through 501, so configure indicators link 5082 preferably links to FIG. 85 regardless for all users.

FIG. 84A processing begins at block 8402 and continues to block 8404 where the ACCESS_LIST is set for authorized users. Thereafter, block 8406 performs FIG. 39 access control processing and continues to block 8408. Block 8408 builds queries to retrieve the current user's configured indicator records 7800 as determined by the Owner field 7810. Block 8408 opens a DB connection, does the query(s), builds the indicator record 7800 list, closes the DB connection, builds the top of page FIG. 85, populates the indicator dropdown list 8502 with Ordr Fields 7806 (and IndicID 7802 assigned to each for any actions), completes building the FIG. 85 page with a table containing all the user's indicators (current user of FIG. 85), and continues to block 8410. The query constructed in block 8408 selects those records with Owner field 7810 equal to the PersonID 2902 of the user who clicked configure indicators link 5082. The user's records 7800 are queried with an ORDER BY clause on Ordr field 7806 to show priority order in the list retuned. Dropdown list 8502 contains an entry for each listed in view area 8504. Block 8410 completes building the user interface of FIG. 85. Thereafter, the user interfaces to FIG. 85 at block 8412 until action processing is invoked. When an action is invoked, form fields are validated at block 8414, and block 8416 checks the validity. If block 8416 determines a field is invalid, then block 8418 reports the error to the user so specification can continue back at block 8412. If block 8416 determines all fields are valid, then processing continues to block 8420. If block 8420 determines a view, modify, or delete action was requested (via button 8530 for view, button 8532 for modify, button 8534 for delete), then block 8426 invokes record view, delete, or modify processing on the record according to the one displayed in dropdown 8502 (and fields populated to the change area 8506). The appropriate page processing shall be invoked for viewing, deleting, or modifying the record 7800 according to user field specifications at fields 8508 through 8518 in a similar manner to above described record processing of other tables. Thereafter, instead of providing a success acknowledgement page for record alterations performed, processing is redirected back to FIG. 84A processing starting at block 8402 which will then build a FIG. 85 page reflecting any changes that may have been made. If block 8420 determines no view, modify, or delete action was requested, then block 8422 checks if the dropdown was manipulated for selecting a different record. If block 8422 determines a different dropdown record was selected, then block 8430 automatically populates the selected record 7800 fields to fields 8508 through 8518, and processing continues back to block 8412 for further user interface. If block 8422 determines a dropdown was not manipulated, then processing continues to block 8424. If block 8424 determines the user selected to add a record (via add button 8520), then block 8432 performs Add Personal Indicator processing (adding a record 7800) and current page processing terminates at block 8428. If block 8424 determines an add action was not selected, then processing continues back to block 8412.

FIG. 84B depicts a flowchart for a preferred embodiment for adding a personal Indicator record, such as Add Personal Indicator processing from block 8432. Processing starts at block 8452 and continues to block 8454 where the ACCESS_LIST is set for authorized users. Thereafter, block 8456 performs FIG. 39 access control processing and continues to block 8458. Block 8458 validates user specifications from FIG. 85. Thereafter, block 8460 checks form field validity, and to make sure a maximum number of personalized records 7800 has not been exceeded. If all form specifications are not valid, or a maximum number is exceeded, then block 8466 reports an appropriate error to the user and current page processing terminates at block 8468. Browser Back key, window closing, and other navigation can be subsequently performed. If block 8460 determines that all form fields are valid and a maximum is not exceeded for adding a record 7800, then block 8462 builds an insert command to insert the new record 7800 to the Indicator Table. Block 8462 opens a DB connection, does the insert, then closes the DB connection and continues to block 8464. Block 8464 sends an email to an administrator account if a Notify flag is set to document this type of transaction, then redirects the user back to the invoking page, and current page processing is subsequently terminated at block 8468. Processing of FIG. 84A is redirected back to at block 8464 for display of FIG. 85 with the newly added record being used in display.

A website defined maximum is preferably enforced at blocks 8458 and 8460. In another embodiment, record 3000 will contain a maximum (e.g. new field 3021) for each user, much like MaxDevs field 3020 is defined and used. A new max Personalized indicators field 3021 would be passed to pages including FIG. 39 Access Control processing in a similar manner. FIG. 85 depicts a preferred embodiment screenshot for managing personal Indicators for assignment to devices through Assign button 5070. Assign button 5070 provides each user with the ability to assign indicators to all their devices (insert record 8200 with type field 8202 for assign Registry Table record to indicator, or insert record 8200 with type field 8202 for assign all the user's Registry Table records to indicator).

Thus, a Content Provider can control which content can have which indicators delivered instead of the content itself. Likewise, an Administrator (and Pinger) can control which devices can have which indicators delivered instead of the content itself. All users can assign criteria for when to deliver an indicator. System default indicators are provided in cases of: IndicOnly field 6528 is set to Yes and an applicable user has not configured any indicators, or IndicOnly field 7052 is set to Yes and an applicable user has not configured any indicators. So, indicators are conveniently administered with the content, for the receiving device, or both. Criteria field 7808 may also contain size deliverable content limit information, time criteria, or any other criteria which will conditionally affect delivering the indicator instead of the deliverable content. So, attributes beyond those stored in either record 6500 or 7000 may also be used for determining a criteria condition.

Automatic Data Transformation to Deliverable Content Database

FIG. 86 depicts a block diagram depicting the automated data transform service components for automatic population of the deliverable content database according to the present disclosure. An automated data transform service 8600 includes a transform process 8602, data source(s) 8604 (also referred to as content sources), and the deliverable content database 8606 containing, for example, a table of deliverable content database records 7000 (or 700), or similar records suitable for deliverable content to be delivered by situational location. The transform process 8602 is capable of transforming heterogeneous data source(s) and data types into any configured tables of the deliverable content database, optionally through configuration of pre-transform rules 8608 and optional create schema rules 8610. Data source(s) 8604 are typically external application data sources in formats including database SQL data, comma delimited .csv files, binary files containing variable or fixed length records, text files containing variable or fixed length records, XML (Extensible Markup Language) files, html files, executable binary image or file, or any other data form where data can be parsed out or processed unambiguously and transformed into the deliverable content database 8606. The deliverable content database 8606 is preferably as heretofore described, an SQL database suitable for the present invention, however various embodiments will make use of a particular deliverable content database format as is appropriate in order to contain content of any type as heretofore described.

Pre-transform rules 8608 provide run time configurations to the transform process 8602 for how to parse, interpret, and transform data source(s) 8604, and for how to load the deliverable content database 8606. Depending on an embodiment, pre-transform rules 8608 and create schema rules 8610 may be dynamically configurable without restart of the transform process, or may require the transform process to initialize with configurations upon startup at block 8704 of FIG. 87. Once the data, for example delivery content (i.e. pre-transform rules 8608 may be configured to populate any data in any table(s)), has been automatically populated into the deliverable content database, it may be in a form ready for proactive content delivery by situational location, or may undergo further tailoring to be in a more suitable form. A post-transform data manipulator process 8612 is further provided for transforming deliverable content database data (can be used to transform content/data in any table(s)) should transforming be desirable or necessary after content data is contained in the deliverable content database, or after population by the transform process 8602. Post-transform rules 8614 provide run time configurations to the post-transform data manipulator process 8612 for how to parse, interpret, and transform the content or data, and for how to update that content or data. Depending on the embodiment, post-transform rules 8614 may be dynamically configurable without restart of the post-transform data manipulator process 8612, or may require the post-transform data manipulator process to initialize with configurations upon startup at block 8804 of FIG. 88.

The transform process 8602 and/or the post-transform data manipulator process 8612 may be a single executable process, multiple executable processes, one or multiple executable threads, or any other execution entity capable of carrying out processing as described by the figures (FIGS. 87 and 88), similarly to data processing system programs described above with FIG. 10C.

A Graphical User Interface (GUI) 8616 may also be used to perform post-transform data modifications. The GUI 8616 may be an SQL (Standard Query Language) Query generation user interface for issuing SQL commands to tailor data, a specific application user GUI 8616 developed for modifying data in the deliverable content database, or any other graphical user interface (gui) providing an administrator with the ability to change deliverable content database data. One example of GUI 8616 is an embodiment as described by FIGS. 14 and 71A through 76, and associated processing.

A Database Management interface 8618, for example an Oracle SQLNet interface, SQL Server Enterprise Manager, or SQL user interface tool (Oracle is a trademark of Oracle Corp., SQL Server and Enterprise Manager are trademarks of Microsoft Corp.) may also be used to modify the deliverable content database through issuing SQL commands/queries.

Data source(s) 8604 preferably include external application data sources such as a World Almanac, Encyclopedia, World Fishing Record database, Guinness book of World Records, classified ads, newspaper subscribers, phone book yellow pages, restaurant catalogues, database of historical events, database of captured field data, or any other collection of data useful for carrying out a particular application of the present invention. Data source(s) 8604 may also include location translation data to facilitate translating location data of deliverable content into a new suitable location format. For example, addresses associated with advertised merchandise can be translated to latitude and longitude using location translation data. Transform process 8602 may process a single source of data or multiple sources of data to accomplish appropriate automatic deliverable content database population. Data source(s) 8604 preferably reside in an SQL database, in an electronic or magnetic representation on disk, diskette, tape, or the like, or on Compact Disk (i.e. CD), mechanically recorded record, punched cards or paper, written media capable of being interpreted automatically (e.g. OCR, bar codes, etc) or any other media capable of being automatically processed. Data source(s) 8604 may be processed visually through pattern recognition, audibly through sound or voice recognition, or sensed through technological means as is appropriate for data being sensed and processed. Pre-transform rules 8608 contain appropriate rules depending on the embodiment. Although transform process 8602 can hard-code all transformation logic within itself, it is preferred to have run time configuration outside of transform process 8602 processing, for example some or all of pre-transform rules 8608, for flexibility preventing modification of executable code of transform process 8602 while supporting many varieties of data source(s) 8604, and even varieties of formats of target deliverable content databases.

Pre-transform rules 8608 consist of a set of rules that include a rule type and rule information. The number of members in the set may be equivalent to the number of data sources to be automatically transformed in a start to finish execution of the transform process 8602. Rule information preferably contains a connectivity descriptor, input descriptor, parse descriptor, and a data transform descriptor. In alternative embodiments, an optional join descriptor may be included for providing information on intersecting, merging, integrating, or processing together more than one data source to a particular target transform result, for example to translate location infrastructure to a more suitable form. Otherwise, multiple data sources are processed on their own merit in accordance with their own member in the set of rules, and their own entries in the pre-transform rules 8608.

A rule type describes how to interpret the associated rule. It includes SQL database table data ('DSQL'), Textual data of fixed length records ('TFLR'), textual data of varying length records with a delimiter or length descriptor ('TVLR'), binary file of fixed length records ('BFLR'), binary non-executable data of varying length records with a delimiter or length descriptor ('BVLR'), comma delimited field data (e.g. Excel .csv file) ('TCSV'), Spreadsheet (e.g. MS Excel) data ('SXLS'), text data with a start key and end key ('TKEY'), textual data with a start key and end offset (TKEO'), binary non-executable data with start key and end key ('BKEY'), binary non-executable data with start key and end offset ('BKEO'), executable textual data (html, xml, programming language), executable binary data (program object code, compiled & linked program, etc), and other source formats depending on the application. While handling the types mentioned enables handling the majority of preferable data source(s) 8604, it is understood that other types are easily incorporated without departing from the spirit and scope of the present disclosure so as to handle interpretation and transform of a particular media, format and/or data type.

Rule information depends on the rule type. The rule type describes to the transform process 8602 how to interpret the rule syntax and/or semantics. The connectivity descriptor preferably provides a reference to an executable script, program, or executable interface that has all the necessary processing capability for initializing to the data source to the point of being able to receive or retrieve the data, preferably in an electronic form as described above. Data source specific setup is preferably isolated to the referenced script, program, or executable interface. Other embodiments will move command logic, setup commands, and/or connectivity logic directly into the connectivity descriptor or transform process 8602.

The input descriptor indicates to the transform process 8602 whether or not the data source(s) 8604 input stream is finite ('F') or an infinite on-going feed ('I'), and exactly how to access the data source. A delimiter character or byte sequence is provided for rule types describing varying length delimited records, and length description information is provided for rule types of varying length records. A record length is provided for fixed length records. Alternative embodiments will move some or all of input descriptor logic or encoding directly into processing of transform process 8602.

The parse descriptor indicates to the transform process 8602 where fields in a record of the input stream are located in the record, their data type, and their length. Regardless of the media of the data source, it is preferable to have the data eventually in an electronic interface (e.g. memory record, database or file) as a result of the particular media connectivity directed by the connectivity descriptor, and the data feed directed by the input descriptor. Alternative embodiments will move some or all of parse descriptor logic or encoding directly into processing of transform process 8602.

The data transform descriptor describes to the transform process how to treat each field to be parsed in the source data, and where to populate it. This preferably includes ignoring the field, using the field as is, converting the field into a different data type and/or length, or combining the field with other field(s) before population of the deliverable content database. In the preferred embodiment of an SQL database deliverable content database, the data transform descriptor contains information for a target SQL table and column names for inserting the data. The transform process 8602 can simply build an appropriate SQL INSERT query for a target table defined. The present invention handles multiple target tables through configurations resulting in multiple SQL INSERT queries being built for certain target tables. Further provided to the data transform descriptor are transform means for carrying out the data conversion aspects of the present invention. These transform means include converting data type, format and length, as well as translating data, merging data from multiple columns, and replacing data from one source with data from another source. Interfaces may also be provided for converting from an address to a MAPSCO grid location, from an address to latitude and longitude location, from a text stream to an audible annunciation, and any other conversion for converting one data form to another. Interfaces may be provided within the transform process executable code itself, through invocable Application Programming Interfaces (APIs), object oriented class library interfaces, referenced scripts, or other executable means. Automated transform requirements from particular data sources(s) 8604 to the deliverable content database 8606 will drive requirements in pre-transform rules 8608 and any associated interfaces needed.

While those skilled in the art will determine what is appropriate for pre-transform rules 8608 to flexibly enable the transform process 8602 as described above for a particular data source and deliverable content database, an example is described below to facilitate understanding.

SQL Database Table Data Source Example

Consider a newspaper classified ad database table containing rows for active estate and garage sales. The present application would be to proactively notify travelers having cell phones, PDAs, or laptops, of appropriate estate and garage sales based on their situational location and configured interests. For the purposes of straightforward explanation, assume that being in a location deems it being a situational location. Existing external application data source table schema of interest may look like the following:

| Column Name | Type | Description |
|---|---|---|
| Table name = CLASSIFIED_AD_ENTRY | | |
| CUSTOMER_ID | INTEGER | Unique identifier for SQL joining to other tables containing customer information |
| START_DATE | DATE | Start date of Ad event |
| END_DATE | DATE | End date of Ad event |
| AD_PHONE_NO | CHAR(10) | 'AAANPAXXXX' for Ad phone number |

-continued

| Column Name | Type | Description |
|---|---|---|
| AD | VARCHAR(255) | Varying length character string of classified advertisement for garage or estate sale |
| | Table name = CUSTOMER INFO | |
| CUSTOMER__ID | INTEGER | Unique identifier for SQL joining to other tables containing customer information |
| ORDER__DATE | DATE | Date order was taken |
| ORDER__TIME | FLOAT 12:00AM | Time order was taken in # of seconds past |
| CUST__NAME` | CHAR(35) | Customer full name |
| CUST__ADDR | CHAR(50) | Customer address |
| CUST__CITY | CHAR(30) | Customer city |
| CUST__STATE | CHAR(2) | Customer state code |
| CUST__ZIP | CHAR(5) | Customer PO zip code |
| CUST__PHONE | CHAR(10) | Customer phone number |

In one preferred embodiment, pre-transform rules 8608 are contained as data populated into SQL table columns and accessed by the transform process 8602 as run time input configurations. In another embodiment, pre-transform rules 8608 are maintained in a flat text file as run time input configurations to the transform process 8602.

Consider an example using a flat text file embodiment of pre-transform rules 8608 to facilitate the reader's understanding. The flat text file preferably contains section headings to indicate a rule definition in the set of rules, with an identifier handle delimited in brackets (e.g. "[Rule 1]"). Text occurring up to the next bracketed identifier handle, or an end of file, represents rule information for the preceding bracketed entry. A token followed by an equal ('=') sign with punctuation and keywords can be used to describe rule information descriptors for parsing. Continuing with the above example, and in light of a record 700 to facilitate understanding:

Example 1

PRE-TRANSFORM RULES / CREATE SCHEMA RULES FLAT TEXT CONFIG FILE

```
//
// Comment lines are preceded by leading // characters
// Create the Deliverable Content Database content delivery table.
// Could create any/other tables and indexes here as well...
//
[Schema]
TABLE=DCDB.DELIV__TABLE
DCDB.DELIV__TABLE::COLUMNS=RECID:INTEGER:not__null,LOCATION1:DOUBLE:not__null,
LOCATION2:DOUBLE:not__null,DIRECTION:FLOAT:nullable,TIME__CRITERIA__1:DATE:nullable,
TIME__CRITERIA__2:FLOAT:nullable,TIME__CRITERIA__3:DATE:nullable,TIME__CRITERIA__4:FLOAT:nullable,
TIME__CRITERIA__5:DATE:nullable,TIME__CRITERIA__6:FLOAT:nullable,TIME__CRITERIA__7:DATE:nullable,
TIME__CRITERIA__8:FLOAT:nullable,CONTENT__TYPE:CHAR
(4):nullable,CONTENT:VARCHAR__BINARY(255):nullable,SHORT__TEXT__INFO:CHAR(50):nullable,
SPEED__REFERENCE__INFO:CHAR(100):nullable,DELIVERY__ACTIVATION__SETTINGS:
INTEGER:not__null,AUTH__ID:CHAR(25):nullable,CONTENT__LINKS:INTEGER:nullable,
APP__SPEC__DATA1:char(15):nullable,APP__SPEC__DATA2:DOUBLE:nullable;
DCDB.DELIV__TABLE::INDEXES=(LOCATION1,LOCATION2),UNIQUE(RECID),(AUTHID);
// Next line actually creates the table and indexes.    Absence of the next line // simply provides the
schema to the rules below for building the prescribed
// INSERT command.
DCDB.DELIV__TABLE::CREATE=YES,YES
// =NO,NO is equivalent to having no entry (first YES is for create table,
// second YES is for create indexes. =NO,YES just creates indexes on
// existing table.
[Rule 1]
TYPE=TCSV;
CONNECT=/usr/Joe/sqlget; // script to make .csv from SQL table above to
                         // ready for input to parse descriptor as .csv
INPUT=F,FILE:j:/usr/Joe/ad__data__out.csv;
                                 // FILE indicates a finite file to access until EOF
                         // since no #recs specified
// Parse descriptor for csv columns of CLASSIFIED__AD__ENTRY.CUSTOMER__ID,
// .START__DATE, .END__DATE, .AD__PHONE__NO, .AD;
// CUSTOMER__INFO.CUST__ADDR, .CUST__CITY, .CUST__STATE,
// .CUST__ZIP, respectively. CUSTOMER__ID reference 0 is ignored.
PARSE=long,char,char,char,char,char,char,char,char;
XFORM=DCDB.DELIV__TABLE::addr21atlonDecDegrees(&LOCATION1,&LOCATION2,[5],[6],
[7],[8]),DIRECTION=<null>,CONTENT__TYPE='TEXT',CONTENT='START DATE = ', [1], '.
END DATE = ',[2],' . PHONE = ',[3], '. ADDRESS = ', [5], ' ', [6], ' ', [7],' ', [8], ' >>> ',[4],
SHORT__TEXT__INFO='GARAGE/ESTATE                SALE',
SPEED__REFERENCE__INFO='http://www.dallasnews.com',
DELIVERY__ACTIVATION__SETTINGS=0x0001, other__columns=<null>.
```

Alternatively, a syntax may also be used to specify up the address information (reference 5, 6, 7, 8) in another Database table and being returned with the latitude and longitude.

The transform process 8602 does not need pre-transform rules 8608, and/or post transform data manipulator process 8612 does not need post-transform rules 8614. As mentioned above, logic can be directly encoded in the processes themselves. For example, the transform process may encode static or dynamic SQL within its processing for interfacing directly to the data source SQL tables above, and converting rows from the table(s) on the fly into the deliverable content database. There are many methods for accomplishing automatic transformation of data source(s) 8604 into the deliverable content database 8606 without departing from the spirit and scope. Obvious error handling is omitted from the flowcharts in order to focus on the key aspects of the present invention.

FIG. 87 depicts a flowchart for describing the automated data transform aspects of the present disclosure. The automated data transform process 8602 starts at block 8702, and continues to block 8704 where the transform process initializes with any pre-transform rules 8608, and create schema rules 8610, and appropriately internalizes the information in accordance with the rule type. The rule type may be inherent in transform process 8602 logic, or may be configured in pre-transform rules 8608 as shown in the example above, or as is appropriate depending on the embodiment. Block 8704 ensures descriptor information is appropriately validated and internalized to facilitate use, and will error out as appropriate for continuing to block 8726 (not shown). It is assumed that any errors detected by FIG. 87 will result in process flow to block 8726 for appropriate housekeeping, error handling and termination. Block 8704 also initializes to the Deliverable Content database using appropriate database commands, for example, a START USING DATABASE command. The connectivity descriptor may include rules for how to connect to the target deliverable content table, or that may be inherent in transform process 8602 logic as demonstrated in the example above. Thereafter, block 8706 would interrogate the connectivity descriptor and input descriptor to determine data source(s) configured, "Rule 1" in the example, which is of a comma delimited type (.CSV), and then block 8708 would check for any create schema rules configured. Block 8706 performs appropriate validation. If in block 8708, there were create schema rules configured for processing, then block 8710 creates any tables designated for creation, block 8712 creates any indexes designated for creation, and block 8714 initializes for accessing/reading the data source(s) 8604.

If in block 8708 there were no create schema rules to process, then processing continues to block 8714. In the example above, the "DCDB.DELIV_TABLE::CREATE=YES,YES" line indicates to create a table and to create indexes for the table as described by preceding configuration lines "TABLE=DCDB.DELIV_TABLE . . . DCDB.DELIV_TABLE::COLUMNS= . . . " and DCDB.DELIV_TABLE::INDEXES= . . . ". The TABLE=DCDB.DELIV_TABLE line indicates to scan for configurations for a table named DCDB.DELIV_TABLE (on the left hand side of a definition). The first YES is in the create table position, and the second YES is in the create index position. So, it is possible to create the table and no indexes, or create the indexes and not the table (i.e. already created), or create both the table and indexes, or create nothing with the absence of a DCDB.DELIV_TABLE::CREATE line, or through specification of NO,NO. In this example, there is still a requirement to have the table schema defined, so that the rule knows how to be interpreted. Obvious error handling at block 8704 validates that rules reference defined table schema.

Block 8714 initializes to the data source(s) 8604 according to the internalized configurations for particular data source type, connectivity descriptor, and input descriptor. In the example, "TYPE=TCSV;" indicates the data source is a textual comma delimited file with a record per line. An end of line indicates the end of a record and fields in the record are separated by commas. This provides the recipe for the parse descriptor, and the format of the input descriptor information. The "CONNECT=/usr/Joe/sqlget;" indicates that connectivity to the data source is accomplished through running the (script) executable "sqlget" in the "/usr/Joe" subdirectory. Assume the sqlget script simply creates a temporary result table, then SQL SELECTS columns CUSTOMER_ID, START_DATE, END_DATE, AD_PHONE_NO, AD, CUST_ADDR, CUST_CITY, CUST_STATE, CUST_ZIP with a join on CUSTOMER_ID from the classified ad SQL tables above, and inserts resulting rows into the temporary table. Also assume sqlget queries so that it handles multiple ads per customer. Then, sqlget exports the temporary result table to a comma delimited file. The resulting comma delimited file is named "ad_data_out.csv" placed in the "j:\usr\Joe" subdirectory. The input descriptor indicates the data source is finite from a file (i.e. process up to end of file) at the path "j:/usr/Joe/ad_data_out.csv". So, upon interpreting internalized configurations, block 8714 runs the script, and opens the file at j:/usr/Joe/ad_data_out.csv for reading comma delimited fields.

Thereafter, block 8716 reads the first (line) record (first encounter to block 8716), or the next (line) record from the comma delimited file, and block 8718 checks to see if the last record was already processed by a previous iteration of block 8716 (i.e. time to terminate), or if the transform process was told to terminate by an external process, for example through a service management interface. If block 8718 determines that the transform process is not to terminate, then block 8720 parses the record read at block 8716 using the parse descriptor, for example using the parse descriptor above (PARSE=long,char,char,char,char,char,char,char,char). In the example, all fields are varying length character strings except the first field, and columns respect the order of data columns (fields) expected in the comma delimited file. Note the parse descriptor maps to the SELECTed columns by sqlget above in the same order (i.e. CUSTOMER_ID, START_DATE, END_DATE, AD_PHONE_NO, AD, CUST_ADDR, CUST_CITY, CUST_STATE, CUST_ZIP, respectively).

Block 8720 continues to block 8722 where the parsed data is transformed using the transform descriptor, for example our XFORM configurations above.

```
XFORM=
DCDB.DELIV__TABLE::addr2latlonDecDegrees(&LOCATION1,
&LOCATION2,[5],[6],[7],[8]),DIRECTION=<null>,CONTENT__TYPE=
'TEXT',CONTENT='START DATE = ', [1], '.
END DATE = ',[2],' . PHONE = ',[3], '. ADDRESS =
', [5], ' ', [6], ' ', [7],' ', [8], ' >>> ',[4],
SHORT__TEXT__INFO='GARAGE/ESTATE                SALE',
SPEED__REFERENCE__INFO='http://www.dallasnews com',
DELIVERY__ACTIVATION__SETTINGS=0x0001,
other__columns=<null>.
```

The DCDB.DELIV_TABLE has been defined and is referenced for building an appropriate SQL INSERT command. In the example, columns not accounted for are set to null if nullable, and set to 0 if a not nullable number, a null string if a not nullable character or binary string, or a 0 AD date if a non-nullable date column. A special "other_columns" predicate may be used to default other columns as well, as shown in the example. Note that the example allows building strings using reference fields from the parsed record. [n] indicates to reference the field at offset n in the record. [0] represents the first field, [1] represents the second field, and so on. The addr2latlonDecDegrees( ) function call converts the address information into Decimal Degrees values for latitude and longitude, respectively, assuming the location means of this embodiment determines the latitude and longitude of mobile users. addr2latlonDecDegrees( ) is an example of a plug in interface for facilitating conversions in the transform process. For example, addr2latlonDecDegrees( ) populates the INSERT command LOCATION1 column field with the latitude in decimal degrees, and the INSERT command LOCATION2 column field with the longitude in decimal degrees. Note how the other columns are prepared for the INSERT command using the transform descriptor. The transform process 8602 handles transforms/conversions as applicable to type and format of source field(s) and target field(s).

Upon completion of block 8722, the INSERT command information is formatted, and processing continues to block 8724 where the INSERT command is finalized, prepared and executed against the deliverable content database DCDB.DELIV_TABLE table. Processing then continues back to block 8716 for retrieving the next record from the input stream.

In a high performance embodiment, Blocks 8720, 8722, and 8724 may each be in their own executable threads (or separate processes) that communicate through queues. While block 8716 reads a data record, and block 8720 parses it, block 8720 may also deposit a parsed record onto a raw data queue. Block 8722 can be an executable thread feeding from the raw data queue and then transforming it into a formatted data record. Block 8722 may in turn deposit the formatted data record onto a formatted data record queue. Block 8724 may also be a separate executable database population thread that feeds from the formatted data queue, and finalizes formatting a SQL INSERT command, or may wait until enough records are gathered off the formatted data queue to build a bulk load of information into the database table. In such a high performance embodiment, asynchronous threads operate independently through queue interfaces. There may be multiple instances of the same thread which feeds the raw data queue, multiple instances of the same thread which feeds the formatted data queue, and multiple instances of the database population thread. Blocks 8720 and 8722 may be in the same thread instance. Block 8722 and 8724 may be in the same thread instance. All blocks may be in a common thread.

Also note that processing FIG. 87 may be for multiple data source(s), and in conjunction with processing a join descriptor. In one embodiment, each FIG. 87 block could process each of the multiple data source(s) as described above before continuing to the next block. In a multithreaded embodiment described, a queue element may include a type for distinguishing between queue entries for in turn distinguishing between multiple/different data sources, or there may be distinct queues between executable threads for distinguishing between multiple/different data sources.

If at block 8718, it is determined that the transform process should terminate, then block 8726 performs any housekeeping such as freeing up dynamically allocated memory, closing files, generating reports, etc. Thereafter, block 8728 provides a discernible completion status for how the automated transform process succeeded (or failed as the result of an error path to it), and block 8730 terminates processing.

FIG. 87 is capable of receiving an on-going source of data source(s) at real time for dynamic data collection and transform, or may be invoked to process data source(s) that have already been established for static data collection and transform. FIG. 87 may execute on a single data processing system, the SDPS, or across multiple data processing systems. Note that block 8716 can receive a trickle of data source(s), for example from a tcp/ip connected real time feed, for example. In a real time feed data source example, an external process would likely signal or indicate to the transform process to terminate when appropriate.

The point of the example above is to show an example embodiment for implementing pre-transform rules. Those skilled in the art will choose a design, method, and/or syntax that makes sense to accomplish automated transform of data using pre-transform rules.

Consider another automated transform process 8602 that utilizes an SQL embodiment of pre-transform rules 8608 for automatically transforming existing external application SQL data sources into the deliverable content database. Continuing with data source(s) 8604 in SQL form, for example, the CLASSIFIED_AD_ENTRY and CUSTOMER_INFO tables above, the pre-transform rules 8608 and create table schema 8610 may look like the following:

Example 2

Pre-Transform Rules/Create Schema Rules in SQL

CREATE_SCHEMA table contains column of:

| Column Name | Type | Description |
|---|---|---|
| SQL_COMMAND | VARCHAR(2048) | Character string containing valid dynamic SQL cmd (CREATE TABLE . . . or CREATE INDEX . . . ) |
| ENABLED | SMALLINT | for 0 = OFF, 1 = ON |

TARGET_TABLE table contains columns of:

| Column Name | Type | Description |
|---|---|---|
| DB_ID | INTEGER | Unique id generated for the Database this column belongs to for joining to CONNECT_DBS table |
| COLUMN_ID | INTEGER | Unique id system generated for this column in this table (create key/index for being unique every row) |
| COLUMN_NAME | VARCHAR(100) | Deliverable Content DB column name in form QUALIFIER.TABLE.COL (create key/index for being unique every row) |

-continued

| Column Name | Type | Description |
|---|---|---|
| LENGTH | INTEGER | Length of Deliverable Content DB table column value |
| TYPE | INTEGER | Target type of Deliverable Content DB table column value (number maps to a particular target format and type for conversion) |
| NULLABLE | CHAR(1) | Whether or not this column is nullable or NOT NULL |
| DESCRIPTION | VARCHAR(100) | Optional documentary description |

SOURCE_TABLES table contains columns of:

| Column Name | Type | Description |
|---|---|---|
| DB_ID | INTEGER | Unique id generated for the Database this column belongs to for joining to CONNECT_DBS table |
| COLUMN_ID | INTEGER | Unique id system generated for this column in this table (create key/index for being unique every row) |
| COLUMN_NAME | VARCHAR(100) | Deliverable Content DB column name in form QUALIFIER.TABLE.COL (create key/index for being unique every row) |
| LENGTH | INTEGER | Length of source table column value |
| TYPE | INTEGER | Type of source table column value (number maps to a particular source format and type for conversion) |
| DESCRIPTION | VARCHAR(100) | Optional documentary description |

CONNECT_DBS table contains columns of:

| Column Name | Type | Description |
|---|---|---|
| DB_NAME | VARCHAR(20) | Database name |
| DB_PASSWORD | VARCHAR(20) BINARY | Encrypted database password |
| DB_ID | INTEGER | Unique id system generated for the database for joining to TARGET_TABLE or SOURCE_TABLES table |

XFORM_MAP table contains columns of:

| Column Name | Type | Description |
|---|---|---|
| TARGET_COLUMN_ID | INTEGER | Join value to TARGET_TABLE COLUMN_ID |
| SOURCE_COLUMN_ID | INTEGER | Join value to SOURCE_TABLES COLUMN_ID |
| OPERATOR | INTEGER | Operand indicating transform operation to perform between source and target column beyond the format and type conversion as indicated in the respective TYPE columns |
| PRECEDENCE_ORDER | INTEGER | Order in handling multiple source table rows for a particular target row so transform precedence is set for type/format conversion and/or OPERATOR conversion (transform process 8602 can SELECT . . . with an ORDER BY PRECEDENCE clause to ensure correct order of conversions) |

Alternate embodiments may expand information kept in the CONNECT_DBS table. In one embodiment, the TYPE column contains values that map to, for example, a transform matrix for accomplish required conversions. The transform process 8602 looks up the source TYPE (for example the column heading) and target TYPE (for example the row heading) in the matrix to determine how to convert it (for example, the cell at corresponding column and row); internally, through a referenced plug-in, or other processing means.

The XFORM_MAP table can use the Procedure_Order column and OPERATOR column to translate location data, for example. Multiple rows with address information populated with unique SOURCE_COLUMN_ID values can be operated on together by having the same value in PRECE- DENCE_ORDER and in OPERATOR that joins to another source table for a column to select so the target column id can be populated with location translation information. There are varieties of methods by using the above scheme, modifying it, or adding to it to accomplish requirements without departing from the spirit and scope.

The CREATE_SCHEMA table contains a row for each dynamic SQL CREATE . . . command that should be issued. Therefore, blocks 8708 through 8712 would check for presence of rows, and if there are some enabled for issuing (ENABLED=ON), then the rows with ENABLED=ON would be issued to the target database. The ENABLED column allows keeping a history of CREATEs without removing them from the table. Note that the connectivity descriptor is embodied in the CONNECT_DBS table for the DB name and password for connecting to the database. The input descriptor is embodied by the SOURCE_TABLES table, and it is finite by the number of rows in the table. The parse descriptor is also embodied by the SOURCE_TABLES table. The data transform descriptor is embodied by the XFORM_MAP table and is facilitated by the TARGET_TABLE table and SOURCE_TABLES table. The optional join descriptor is supported through having multiple rows in the XFORM_MAP table for the same TARGET_TABLE column (TARGET_COLUMN_ID value), thereby permitting multiple source values to contribute to a single target value. References in the flowchart description to use of the different descriptors is comparable hereof. Block 8716 would read rows from SOURCE_TABLES, block 8720 would parse according to SOURCE_TABLES information, block 8722 would transform according to XFORM_MAP joined to SOURCE_TABLES and TARGET_TABLE for parse, transform, and join descriptor information, and block 8724 would use TARGET_TABLE for populating the deliverable content database table. Block 8704 could internalize everything by querying the example 2 schema to have it ready for subsequent processing. An alternative embodiment to any or all tables is to keep a DATE, TIMESTAMP, and/or information about the administrator who configured the table(s).

Ignoring the CLASSIFIED_AD_ENTRY and CUSTOMER_INFO table above, another preferred embodiment of pre-transform rules 8608 would define data in SQL for converting fixed length or varying length records from an on-going input stream. Here is what such a schema may look like:

Example 3

Pre-Transform Rules/Create Schema Rules in Sol for Record Input

CREATE_SCHEMA table contains column of:

| Column Name | Type | Description |
|---|---|---|
| SQL_COMMAND | VARCHAR(2048) | Character string containing valid dynamic SQL cmd (CREATE TABLE . . . or CREATE INDEX . . . ) |
| ENABLED | SMALLINT | for 0 = OFF, 1 = ON |

TARGET_TABLE table contains columns of:

| Column Name | Type | Description |
|---|---|---|
| DB_ID | INTEGER | Unique id generated for the Database this column belongs to for joining to CONNECT_DBS table |
| COLUMN_ID | INTEGER | Unique id system generated for this column in this table (create key/index for being unique every row) |
| COLUMN_NAME | VARCHAR(100) | Deliverable Content DB column name in form QUALIFIER.TABLE.COL (create key/index for being unique every row) |
| LENGTH | INTEGER | Length of Deliverable Content DB table column value |
| TYPE | INTEGER | Target type of Deliverable Content DB table column value (number maps to a particular target format and type for conversion) |
| NULLABLE | CHAR(1) | Whether or not this column is nullable or NOT NULL |
| DESCRIPTION | VARCHAR(100) | Optional documentary description |

RULE_INIT table contains columns of:

| Column Name | Type | Description |
|---|---|---|
| RULE_TYPE | INTEGER | Type of rule(s) (fixed length recs, varying length recs by token, varying length recs by length description, etc) thereby declaring which SOURCE table to use below. |

SOURCE_RECORDS_FIXED table contains columns of:

| Column Name | Type | Description |
|---|---|---|
| FIELD_ID | INTEGER | Unique id system generated for this column in this table (create key/index for being unique every row) |
| FIELD_OFFSET | INTEGER | Offset into record for start of field |
| FIELD_NAME | VARCHAR(100) | Description for documentary purposes |
| LENGTH | INTEGER | Length of field data |
| TYPE | INTEGER | Type of field data (number maps to a particular source format and type for conversion) |

SOURCE_RECORD_TYPES table contains columns of:

| Column Name | Type | Description |
|---|---|---|
| RECORD_ID | INTEGER | Record id to join RECORD_TYPES table |
| RECORD_TYPE | INTEGER | Type of record (may map to another table containing parse information by RECORD_TYPE) |
| RECORD_LENGTH | INTEGER | Length of this record type |
| DESCRIPTION | VARCHAR(100) | Optional documentary description |

SOURCE_RECORDS_BY_RECTYPE table contains columns of:

| Column Name | Type | Description |
|---|---|---|
| RECORD_ID | INTEGER | Record id to join to RECORD_TYPES table |
| FIELD_ID | INTEGER | Unique id system generated for this column in this table (create key/index for being unique every row) |
| FIELD_OFFSET | INTEGER | Offset into record for start of field |
| FIELD_NAME | VARCHAR(100) | Description for documentary purposes |
| LENGTH | INTEGER | Length of field data |
| TYPE | INTEGER | Type of field data (number maps to a particular source format and type) |

SOURCE_RECORD_FIELDS_BY_TOKEN table contains columns of:

| Column Name | Type | Description |
|---|---|---|
| FIELD_ID | INTEGER | Unique id system generated for this column in this table (create key/index for being unique every row) |
| FIELD_TOKEN | INTEGER | Token value of field in record |
| FIELD_NAME | VARCHAR(100) | Description for documentary purposes |
| TYPE | INTEGER | Type of field data (number maps to a particular source format and type) |

CONNECT_DBS table contains columns of:

| Column Name | Type | Description |
|---|---|---|
| DB_NAME | VARCHAR(20) | Database name |
| DB_PASSWORD | VARCHAR(20) BINARY | Encrypted database password |
| DB_ID | INTEGER | Unique id system generated for the database for joining to TARGET_TABLE or SOURCE_TABLES table |

XFORM_MAP table contains columns of:

| Column Name | Type | Description |
|---|---|---|
| TARGET_COLUMN_ID | INTEGER | Join value to TARGET_TABLE COLUMN_ID |
| SOURCE_COLUMN_ID | INTEGER | Join value to SOURCE_TABLES COLUMN_ID |
| OPERATOR | INTEGER | Operand indicating transform operation to perform between source and target column beyond the format and type conversion as indicated in the respective TYPE columns |
| PRECEDENCE_ORDER | INTEGER | Order in handling multiple source table rows for a particular target row so transform precedence is set for type/format conversion and/or OPERATOR conversion (transform process 8602 can SELECT . . . with an ORDER BY PRECEDENCE clause to ensure correct order of conversions) |

CONNECT_STREAM table contains columns of:

| Column Name | Type | Description |
|---|---|---|
| TARGET_ADDRESS | CHAR(15) | TCP/IP address to remote feed |
| TARGET PORT | INTEGER | TCP/IP port number of feed |

In example 3, the SOURCE_RECORDS_FIXED table can be used for the same length records received form the input stream. The SOURCE_RECORD_TYPES and SOURCE_RECORDS_BY_RECTYPE tables can be used for varying record types and lengths received from the input stream. The SOURCE_RECORD_FIELDS_BY_TOKEN table can be used for Token, Length and Value encodings similar to X.409 encodings, where the transform process 8602 has processing for parsing the input stream for recognizing tokens. In example 3, the table CREATE_SCHEMA, TARGET_TABLE, CONNECT_DBS, and XFORM_MAP are equivalent to example 2. Same named columns between examples are analogous.

Pre-transform rules 8608 of example 3 configures automatic transform of input streams of fixed length records, varying record types of fixed length records, and varying length records with varying length fields as defined by the input stream. Table with the SOURCE prefix in their names represent parse descriptor information and, similarly to the explanation above, when used in conjunction with the TARGET_TABLE and XFORM_MAP tables, defines the transform descriptor information. The RULE_INIT table communicates the rule type to the transform process 8602 so that the correct source schema is accessed. The CONNECT_STREAM table in this example provides input descriptor information for receiving the input stream. Alternative embodiments may keep other communications information, may handle other communications protocols, sessions, etc. Schema above can be used, or adaptations are easily made for facilitating processing multiple data source(s) and processing searches and/or conversions between them to result in desired target data.

FIG. 88 depicts a flowchart for describing the post-transform data manipulator (PXDM) aspects of the present disclosure. Post-transform rules 8614 are identical in nature to pre-transform rules 8608 in that they may be embodied for driving logic of the transform processing. Particular embodiments configure rules in SQL database schema, a flat text file, or any other format capable of unambiguously defining what and how to read data, how to parse it, transform it, and then insert/update the data in the deliverable content database.

The automated post-transform data manipulator (PXDM) process 8612 starts at block 8802, and continues to block 8804 where the PXDM process initializes with any post-transform rules 8614 and appropriately internalizes the information in accordance with the rule type. The rule type may be inherent in PDXM process 8612 logic, or may be configured in post-transform rules 8614 similarly to examples above. Block 8804 ensures any descriptor information is appropriately validated and internalized to facilitate use, and will error out as appropriate (not shown). It is assumed that any errors detected by FIG. 88 will result in appropriate housekeeping as described above, error handling and termination. Block 8804 also initializes to the Deliverable Content database using appropriate database commands, for example, a START USING DATABASE command. Hereinafter, the FIG. 88 processing descriptions will describe processing in terms of end results, whether post-transform rules 8614 are configured or not, and regardless of threaded design. In view of discussions above, analogous explanations apply and those skilled in the art will recognize how to configure post-transform rules 8614 if they are used.

Thereafter, block 8806 determines a view of the source table data to operate on, and block 8808 creates a post-transform result target table. Processing continues to block 8810 where a cursor is opened into the view using one of a set of optionally specified filter criteria (i.e. WHERE clause information). Then, block 8812 fetches a row using the cursor opened at block 8810, and block 8814 checks to see if the last row has already been fetched.

If a first row, or next row, was fetched from the source deliverable content database table then block 8816 parses the row data, block 8818 modifies the row data, and block 8820 inserts the transformed row into the created target table. Note the similarity between block 8812 through 8820 and blocks 8716 through 8724 for analogous discussion. Block 8820 continues back to block 8812 for processing as described.

If at block 8814, it is determined that the last row was fetched, then block 8822 performs housekeeping such as freeing any dynamically allocated memory closing an open cursor, generating reports, etc, and block 8824 checks for another filter configured to process this execution of the PXDM process 8612. If there is another filter, then processing continues back to block 8810 for processing as described.

If it is determined at block 8824 that the last filter was processed, then processing continues to block 8826. If block 8826 determines that a user accept mode was configured, then block 8828 prompts the PXDM process user for acceptance with an implicit wait for action, and block 8830 determines the response. When prompted by block 8828, the user can inspect the results of the PXDM process 8612 thus far to ensure the results are acceptable. If block 8830 determines that the results are acceptable to the user, then processing continues to block 8834 which drops (deletes) the source (deliverable content database) table, and then to block 8836 where the target table name is changed to the original name of the dropped table. If there is no convenient method to change the target table name, then block 8836 may have to create another table with the dropped name and having the same schema as the target table, copy over rows to the correctly named table, and then drop the original target table. Thereafter, block 8838 creates configured indexes according to post-transform rules 8614, block 8840 provides appropriate completion status in an appropriate manner and the process terminates at block 8842. Blocks 8826 through 8840 handle their own housekeeping in on embodiment.

If at block 8830 it is determined that the user did not accept the results, then the target table is dropped at block 8832 and processing continues to block 8840. If at block 8826 it is determined that processing is not set for user accept mode, then processing continues to block 8834.

Deliverable content can also be accessed by remote data source 8604 at time of delivery, for example through configuration of a MCD (Mobile Content Delivery) file with mcd file name extension. Rules in the MCD file determine how to access the remote data sources 8604 when needed. So, the Delivery Manager 2510 will access remote data sources 8604 and possibly transform associated location data with geo-translation databases for appropriate real-time delivery to mobile devices 2540.

Privacy Privileges

With reference back to FIG. 63, shown is a flowchart for a preferred embodiment of carrying out processing for presenting a web service user interface form in the members area 2500 and then processing user specifications to the interface prior to submitting to the service for further processing. For this discussion, FIG. 63 is invoked for adding a record 8900 to the Groups Table (FIG. 89 records) upon invoking PingPals Add Group option 4620. Processing starts at block 6302 and continues to block 6304 where the ACCESS_LIST is set for authorized users. Thereafter, block 6306 performs FIG. 39 access control processing and continues to block 6308. Block 6308 builds and presents FIG. 90A for adding a Group record 8900, and then a user interfaces with FIG. 90A at block 6310 until the Add button 9002 action is invoked. When an add action is invoked by the user, block 6312 validates user field specifications to FIG. 90A, and block 6314 checks the results. If block 6314 determines the fields are valid (and can be submitted for processing), then block 6318 invokes FIG. 77 processing for adding the record 8900, and current page processing terminates at block 6316. If block 6314 determines that not all fields specified are valid, then block 6320 provides an error to the user so that specification can continue back at block 6310 (e.g. pop-up).

FIG. 77 depicts a flowchart for a preferred embodiment for processing the submittal to add a record to the web service. For purposes of this discussion, a record 8900 is being added to the Groups Table (FIG. 89 records), for example by a Pinger. Processing starts at block 7702 and continues to block 7704 where the ACCESS_LIST is set for authorized users. Thereafter, block 7706 performs FIG. 39 access control processing and continues to block 7710. Block 7710 validates user field specifications to FIG. 90A, and block 7712 checks the results. If block 7712 determines all fields are not valid, then block 7708 reports the error to the user in an appropriate manner and processing terminates at block 7720. If block 7712 determines all fields are valid, then block 7714 builds a Groups Table insert command from FIG. 90A specifications, opens a DB connection, does the insert, and closes the DB connection. Thereafter, block 7716 sends an email to an administrator account if a Notify flag is set to document this type of transaction, and block 7718 provides the user with a successful add acknowledgement interface similar to those described above, and processing terminates at block 7720. FIG. 77 processing inserts a record 8900 into the Groups Table and defaults fields appropriately.

FIG. 89 depicts a preferred embodiment of a data record in the Groups Table. Groups Table records have dual purpose. They define a group for assigning one or more other users (or other devices) called PingPals into a group, and at the same time assign a set of privileges to all assignees of the group. GroupID 8902 is preferably a unique primary key automatically generated by the underlying SQL database system to ensure uniqueness when inserting a record 8900 to the Groups Table. OwnerID 8904 contains the PersonID 2902 for the user who created the record 8900. Each user has a reasonable system configured limited number of records 8900 they can create. Blocks 7710 and 7712 described in the Groups Table context additionally checks how many Groups the user has already created to validate the maximum is not exceeded. A Select Count(*) query to the Groups Table for the particular OwnerID 8904 can be used to determine how many already exist. In another embodiment, OwnerID 8904 contains a RegistryID 6502 value for associating groups to devices. In this embodiment, each device can own a number of groups. The user would be authenticated with a device id (device name) and password through validated data entry, device data evidence, or from a last successful access data evidence to the Delivery Manager. In yet another embodiment, a new OwnerType field 8903 would indicate the type of owner of the record 8900. This would allow both users and devices to own a number of groups. Name field 8906 is a user defined character string for naming the group of Group record 8900. A unique key is preferably defined on (OwnerID, Name) to ensure unique group names for a particular owner. Insertion without a unique name for an owner should cause an insert error at block 7714 (described in context for groups records 8900) for appropriate error handling. Descript field 8908 contains an optional user defined character string describing the Group record 8900. PrivMask field 8910 contains a bitmask for privileges that are assigned to members of the group. Each privilege of web service 2102 is mapped to a unique offset into the bitmask for enabling the privilege (bit set to 1), or disabling the privilege (bit set to 0). By default, no users or devices have any privileges provided in web service 2102. A user has to assign a privilege for it to become in effect. DTCreated field 8912 contains a date/time stamp of when the record 8900 was created in (added to) the Groups Table. DTLastChg field 8914 contains a date/time stamp of when any field in the record 8900 was last modified. CIP field 8916 preferably contains an internet protocol (ip) address of the user's device that created the applicable data record 8900. The CHIP field 8918 preferably contains the ip address of the actual physical server of web service 2102 that created applicable data record 8900. CHName field 8920 preferably contains the host name of the physical server of web service 2102 that created applicable data record 8900, for example because web service 2102 may be a large cluster of physical servers. ChgrIP field 8922 preferably contains an internet protocol (ip) address of the user's device that last modified the applicable data record 8900. The ChgrHIP field 8924 preferably contains the ip address of the actual physical server of web service 2102 that last modified applicable data record 8900. ChgrHName field 8926 preferably contains the host name of the physical server of web service 2102 that last modified applicable data record 8900, for example because web service 2102 may be a large cluster of physical servers.

In one preferred embodiment, there is a record 8900 created at web service 2102 installation time which is a system created record 8900 that contains a bit set on for every bit in the PrivMask field 8910 (e.g. 0xFFFFFFFFFFFFFFFF) thereby enabling every privilege in the system for the group. This group can be referenced for enabling privileges from any user to himself and from any device to its owner. This prevents requiring a user to assign privileges between his own devices while preventing writing special privilege handling code in the web service 2102.

FIG. 90A depicts a preferred embodiment screenshot for adding a Groups Table record 8900 to the web service. Preferably, all privilege checkmark fields are defaulted to unchecked thereby forcing the user to checkmark them. Another embodiment will permit the user to define how to default each invocation of FIG. 90A and will save it as privilege default data evidence which is used to automatically checkmark FIG. 90A according to the user's preferred checkmark defaults when adding a record 8900. FIG. 90A shows a minimal set of privileges in web service 2102, and many more can be available. Fields are easily mapped to the Groups Table record 8900, and each privilege checkmark box corresponds to a bit in PrivMask field 8910 according to a unique bit offset. Privileges are defined as:

- Set PingSpots—Grants privilege to the assignee for setting PingSpots for the assignor; enables automated delivery of content to the assignor which has been configured with a situational location by the assignee for delivery at the future travels of the assignor to the situational location.
- Set Pingimeter Arrival Alert—Grants privilege to the assignee for setting Pingimeter alerts for the assignor that trigger to the assignee when the assignor arrives to the Pingimeter set up by the assignee; enables delivery of an automated alert to the assignee when the assignor arrives to a situational location configured by the assignee.

Set Pingimeter Departure Alert—Grants privilege to the assignee for setting Pingimeter alerts for the assignor that trigger to the assignee when the assignor departs the Pingimeter set up by the assignee; enables delivery of an automated alert to the assignee when the assignor departs a situational location configured by the assignee.

Set Nearby Arrival Alert—Grants privilege to the assignee for sending nearby arrival alert status of the assignor to the assignee that trigger when the assignor is arriving to be nearby the assignee, for example as determined by the interest radius of the assignee; enables delivery of an automated alert to the assignee when the assignor arrives to being nearby the assignee.

Set Nearby Departure Alert—Grants privilege to the assignee for sending nearby departure alert status of the assignor to the assignee that trigger when the assignor is departing being nearby the assignee, for example as determined by the interest radius of the assignee; enables delivery of an automated alert to the assignee when the assignor departs from being nearby the assignee.

View Nearby Status—Grants privilege to the assignee for viewing nearby status of the assignor, for example as determined by the interest radius of the assignee; enables the assignee to determine whether the assignor is located nearby the assignee.

View Whereabouts—Grants privilege to the assignee for viewing the whereabouts of the assignor, for example on a map; enables assignee to determine the whereabouts of the assignor.

View Reports—Grants privilege to the assignee for viewing reports about the assignor, for example map reports and statistical reports; enables the assignee to view reports of the whereabouts of the assignor.

View Historical Route Information—Grants privilege to the assignee for viewing the assignor's historical route information; enables the assignee to view the historical travels of the assignor.

Send Broadcast Messages—Grants privilege to the assignee for sending broadcast messages to the assignor; enables the assignee to send a broadcast message to the assignor wherein the broadcast message includes a plurality of recipient users or devices as maintained in server data 2104.

Share Delivery Experiences—Grants privilege to the assignee for sharing delivery experiences of the assignor. For example, as content is delivered to the assignor, it can be delivered to the assignee for sharing the experience. Sharing is a duplicated delivery (delivers to both assignor and assignee); enables the assignee to automatically receive copies of content deliveries made to the assignor wherein the content deliveries are delivered by configured preferences (See Delivery Configurator). Preferences in web service 2102 can be defaulted so use of the Delivery Configurator is not required.

Intercept Delivery Experiences—Grants privilege to the assignee for intercepting delivery experiences of the assignor. For example, as content is delivered to the assignor, it can be intercepted and delivered to the assignee. Intercepting is an intercepted delivery (delivers to only the assignee). When both Intercepting Delivery Experiences and Share Delivery Experiences are set, Intercepting Delivery Experiences preferably takes precedence; enables the assignee to automatically receive intercepted content deliveries destined to the assignor wherein the content deliveries are delivered by configured preferences (See Delivery Configurator). Preferences in web service 2102 can be defaulted so use of the Delivery Configurator is not required.

Affinity Delegate—Grants privilege to the assignee for acting on behalf of the assignor for actions taken in web service 2102. This privilege is required for being an associated user able to manage other's devices as defined by AssocUsers field 6524, and for performing certain delivery related configurations discussed. In one embodiment, the Users Table could have an AssocUsers field 3009 for permitting the assignee to act on behalf of the assignor in all web service 2102 interfaces of the members area 2500; enables the assignee to act on behalf of the assignor when using location based services (various uses discussed below).

Reserved Privilege 1—A reserved privilege bit offset.

Reserved Privilege 2—A reserved privilege bit offset.

FIG. 90B depicts a preferred embodiment screenshot for results from searching Groups Table records, for example upon selecting PingPals Groups option 4618. There is preferably no search interface to groups since there is preferably a reasonably limited enforced maximum, however FIG. 90B is provided to support all conceivable embodiments where many groups will be managed. A website defined maximum is preferably enforced at blocks 7710 and 7712. In another embodiment, record 3000 will contain a maximum (e.g. new field 3019) for each user, much like MaxDevs field 3020 is defined and used. A new max Groups field 3019 would be passed to pages including FIG. 39 Access Control processing in a similar manner.

So, clicking the option 4618 takes the user directly to the list interface similarly described above for other record types (2900, 6500, 7000). Another embodiment could provide a similar search interface in context for records 8900. It should be readily understood now from previous descriptions that FIGS. 55, 57, 58, 60, 53, and 62 are easily described in context for records 8900 and applicable FIG. 90B processing, and for obvious screenshots subsequent to actions from FIG. 90B. So for brevity, the redundant descriptions and figures are not included here except to say Groups Table records 8900 can be viewed, deleted, and modified (individually or as a list) in a similar manner to records 2900, records 6500, and records 7000.

FIG. 91A depicts a flowchart for a preferred embodiment for processing the request to manage PingPal privileges, for example upon selecting PingPals Manage option 4616. Processing starts at block 9102 and continues to block 9104 where the ACCESS_LIST is set for authorized users. Thereafter, block 9106 performs FIG. 39 access control processing and continues to block 9108. Block 9108 builds a query for this user's (of option 4616) devices (records 6500 from FIG. 65 with Owner field 6522 matching the user's PersonID 2902) and builds a query for this user's groups (records 8900 from FIG. 89 in Groups Table). Thereafter, block 9110 opens a DB connection, does the query(s), builds the devices dropdown 9302 and groups dropdown 9304 of FIG. 93A. The dropdowns are built independently of each other. Devices dropdown 9302 contains all the user's devices with the associated RegistryID 6502 (for form processing) and a special entry called "ALL MY DEVICES" which is associated with the user's PersonID 2902 (or corresponding same PersonID 3002). The group name field 8906 is displayed in the dropdown and the GroupID 8902 is associated to each dropdown group item (for form processing). Thereafter, block 9112 completes building the user interface of FIG. 93A and then the user interfaces to FIG. 93A at block 9114 until an action is invoked. FIG. 93B demonstrates devices dropdown 9302 for showing the user only has a single device defined that can be individually assigned. So, "ALL MY DEVICES" and the device named "Jennifer" would essentially be the same assignor if no other devices were created for the user. FIG. 93C demonstrates groups dropdown 9304 for the groups (privilege groups) the user currently has defined. Each of the groups has some set of privileges currently defined (if any). When assignees have been assigned to the group and granted privileges from the assignor(s), any group can still be changed later to modify privileges for immediately affecting privileges for members of the group.

The user can specify the privilege assignor as all his devices (PersonID), or any of his individual devices he created (RegistryID) with the dropdown 9302. This allows assigning the privileges defined in the group selected at dropdown 9304 to some other user's device(s), or all of some other user's devices. Upon detecting an action at block 9114 to FIG. 93A, block 9116 checks if the privileged users button 9306 was selected. If block 9116 determines the button 9306 was selected, then block 9120 invokes Assignee Processing of FIG. 91B with assignor data evidence: the assignor type (all devices or specific device) and associated id selected in dropdown 9302 along with the group id selected for the group from dropdown 9304. Thereafter, current page processing terminates at block 9122. If block 9116 determines the button 9306 was not selected, then processing continues to block 9118. If block 9118 determines the privileged device button 9308 was selected, then block 9120 invokes Assignee Processing with assignor data evidence: the assignor type and associated id selected in dropdown 9302 along with the group id selected for the group from dropdown 9304. Thereafter, current page processing terminates at block 9122. If block 9118 determines the button 9308 was not selected, then processing continues back to block 9114. Thus, with FIG. 93A, a user can assign privileges from one of his devices to another user (i.e. to all of the other user's devices), or from one of his devices to another user's device(s), or from all of his devices to another user (i.e. to all of the other user's devices), or from all of his devices to another user's device(s).

FIG. 91B depicts a flowchart for a preferred embodiment of carrying out processing for assigning privileges to other users, or devices, of the web service. Assignee processing starts at block 9132 and continues to block 9134 where the ACCESS_LIST is set for authorized users. Thereafter, block 9136 performs FIG. 39 access control processing and continues to block 9138. Block 9138 determines the assignor data evidence and which button was selected. Block 9138 then builds a query of the privilege records 9200 for this user that are currently defined in PingPal Privileges Assignment Table (FIG. 92 records) according to the assignor data evidence from FIG. 91A processing, and the assignee button selected of privileges user button 9306 or privileged devices button 9308. Block 9138 then opens a DB connection, does the query for records 9200 (joined to records 6500, 3000, 8900 for determining name information) and processing continues to block 9140. Block 9140 builds the user interface of FIG. 93D when button 9306 was selected. FIG. 93D enables the user to remove users that are assignees by unchecking checkmark(s) and selecting button 9332. Block 9140 builds the FIG. 93D page for all records 9200 found with the assignor data evidence providing group privileges to users (i.e. to all the assignee user's devices), and initializes those records found with a checkmark for denoting a current assignment. The assignee user's LogonName field 3004 is displayed with the checkmarks. A LogonName can be entered by the user to field 9334 for then selecting button 9332 for adding to the list in the list area 9336 (and also adding a record 9200). The list area 9336 could potentially be long horizontally and vertically. Blocks 9138 and 9140 build the user interface of FIG. 93E when button 9308 was selected. FIG. 93E enables the user to remove devices that are assignees by unchecking checkmark(s) and selecting button 9362. Block 9140 builds the FIG. 93E page for all records 9200 found with the assignor data evidence providing group privileges to specific devices, and initializes those records found with a checkmark for denoting a current assignment. The assignee device's Deviceid field 6504 is displayed with the checkmarks. A Deviceid can be entered by the user to field 9364 for then selecting button 9362 for adding to the list in the list area 9366 (and also adding a record 9200). The list area 9366 could potentially be long horizontally and vertically. Block 9140 also closes the DB connection and completes building the page of FIG. 93D or FIG. 93E as described above. Thereafter, the user interfaces to FIG. 93D, or FIG. 93E, at block 9142 as the case may be according to previous FIG. 91B processing up to this point, until an action is detected, such as selecting button 9332 or button 9362. Upon detecting an action at block 9142, block 9144 checks if the update button was selected (i.e. button 9332 or 9362 as the case may be). If button 9332, or button 9362, was selected, then block 9146 invokes checkmark processing of FIG. 91C with the assignor data evidence passed from FIG. 91A and checkmark data evidence of list area 9336, or 9366, as the case may be. Every checkmark of the list area is associated with the primary record id (for form processing) such that list area 9336 contains PersonID 2902/3002 values, and list area 9366 contains RegistryID 6502 values. Thereafter, current page processing terminates at block 9148. If block 9144 determines an update button was not selected, then processing continues back to block 9142.

FIG. 91C depicts a flowchart for a preferred embodiment for checkmark processing of PingPal management. Checkmark processing starts at block 9162 and continues to block 9164 where the ACCESS_LIST is set for authorized users. Thereafter, block 9166 performs FIG. 39 access control processing and continues to block 9168. Block 9168 determines the assignor data evidence: id and type, group id; and action (button 9332 or 9362). Contents of the entry field 9334, or 9364, as the case may be, are also determined. Thereafter, block 9170 iterates through the checkmark list data evidence from the list area 9336, or 9636, as the case may be, and builds the list of assignee ids for those without checkmarks (if any). Thereafter, if block 9172 determines there were no assignees unchecked, then processing continues to block 9178. If block 9172 determines there were one or more assignees unchecked, then block 9174 builds a delete query for deleting records 9200 for all unchecked assignees, opens a DB connection, does the query, and then closes the DB connection. Thereafter, block 9176 builds and sends an email to an Administrator account if a Notify flag indicates to document this type of transaction, and processing continues to block 9178. If block 9178 determines the entry field (field 9334 or 9364 as the case may be) is null, then block 9180 redirects processing back to FIG. 91B processing starting at block 9132 for a refreshed page, and current page processing terminates at block 9182. If block 9178 determines the entry field is not null, then block 9184 builds a query to check validity of data entry for adding a record 9200 (a LogonName, or Deviceid as the case may be), opens a DB connection, does the query (for PersonID 3002 (same as corresponding field 2902), or RegistryID 6502 as the case may be), and closes the DB connection. Thereafter, block 9186 checks if the data entry was found (record 3000 or record 6500 as the case may be). If block 9186 determines the record was not found, then block 9192 handles reporting the error to the user in an appropriate manner and current page processing terminates at block 9182. If block 9186 determines the record was found, then block 9188 builds a record 9200 insert command for the new assignment, opens a DB connection, does the insert, and closes the DB connection. Thereafter, block 9190 builds and sends an email to an Administrator account if a Notify flag indicates to document this type of transaction, and processing continues to block 9180 already described. FIG. 91C may use a single DB open connection at the top of processing and a single close DB connection at the end of processing.

FIG. 92 depicts a preferred embodiment of a data record in the PingPal Privilege Assignment Table. Records 9200 provide both group membership and assigning location based services privileges. Type field 9202 defines the type of assignment record (i.e. FU2U=From user to user (i.e. all user's devices to all user's devices; FU2D=From user (i.e. all user's devices) to a device; FD2U=From a device to a user (i.e. to all user's devices); FD2D=From a device to a device). The Type field 9202 depends on the privilege that is being assigned for what subset out of the four types is valid. The context of when the privilege is sought for processing will search for the correct types to decide if the privilege is in effect. Therefore, a privilege may make sense only for assigning a user to a user, or only for a device to a device, or only for a device to a user, or only for a user to a device, or any combination thereof. In one embodiment, the user assigning the privilege should know what makes sense based on how the privilege is used. In another embodiment, privilege assignment varieties are enforced in processing during assignment for what makes sense in web service 2102, for example FIG. 91B (e.g. client side validation upon update button invoked) and/or FIG. 91C (validation and validity check of assignment requested at a new block 9167 continued to from block 9166; block 9167 would continue to block 9168 if no error was detected, otherwise it would continue to block 9192) can enforce which privileges are assignable based on privileges contained in a group. An informative error message can notify the user that the group contains one or more privileges which cannot be assigned based on the user selected assignment requested for process. OwnerID 9204 contains a PersonID 2902 value for the person who created the record 9200. In another embodiment, OwnerID 9204 contains a RegistryID 6502 value for associating privileges to devices. In this embodiment, each device can own a number of privilege assignments. The user would be authenticated with a device id (device name) and password through validated data entry, device data evidence, or from a last successful access evidence to the Delivery Manager. In yet another embodiment, a new OwnerType field 9203 would indicate the type of owner of the record 9200. This would allow both users and devices to own a number of privilege assignments. GroupID 9206 contains a GroupID 8902 value for joining to the associated group record 8900 from the Groups Table which contains privileges. GroupID 9206 defines which privileges are in effect between FromID 9208 and ToID 9210. FromID 9208 contains a record id value of a PersonID 2902/3002 when type field 9202 is FU2U or FU2D. FromID 9208 contains a record id value of a RegistryID 6502 when type field 9202 is FD2U or FD2D. ToID 9210 contains a record id value of a PersonID 2902/3002 when type field 9202 is FU2U or FD2U. ToID 9210 contains a record id value of a RegistryID 6502 when type field 9202 is FD2D or FU2D. DTCreated field 9212 contains a date/time stamp of when the record 9200 was created in (added to) the PingPals Privilege Assignment Table. CIP field 9214 preferably contains an internet protocol (ip) address of the user's device that created the applicable data record 9200. The CHIP field 9216 preferably contains the ip address of the actual physical server of web service 2102 that created applicable data record 9200. CHName field 9218 preferably contains the host name of the physical server of web service 2102 that created applicable data record 9200, for example because web service 2102 may be a large cluster of physical servers.

Another embodiment to the PingPal Privilege Assignment Table (FIG. 92 records) is to have four separate tables thereby no longer requiring a type field 9202. There could be a separate table for providing privileges for:

- assignor device to assignee device (device to device)
- assignor device to all assignee user devices (device to user)
- assignor user's all devices to all assignee user's devices (user to user)
- assignor user's all devices to assignee device (user to device)

A first user or first device which has granted at least one location based services privilege to a second user or second device is said to have granted the rights for the second user or second device to use location based services on the first user or first device. The second user or second device which makes use of one or more privileges assigned to it from a first user or first device is said to use location based services on the first user or first device.

The term PingPals refers to mobile users 2540 to web service 2102 who interact with other mobile users 2540 of web service 2102 for functionality governed by privacy and privilege controls managed by the mobile users 2540. Of course, the users do not have to be mobile to be PingPals. If there is a web service 2102 relationship as defined by a record 9200 privilege configuration between two mobile users, two mobile devices, a user and a device, or a device and a user, then they are referred to as PingPals. So, PingPals are a plurality of users who have assigned at least one privilege between them (i.e. between their devices). FIGS. 89 through 93E all describe functionality for managing relationships between PingPals. The user of FIGS. 89 through 93E can also assign privileges to himself, or to any of his own devices so desired functionality of web service 2102 is achieved.

In one preferred embodiment, there is a record 8900 created at web service 2102 installation time which is a system created record 8900 that contains a bit set on for every bit in the PrivMask field 8910 (e.g. 0xFFFFFFFFFFFFFFFF) thereby enabling every privilege in the system for the group. This group can be automatically referenced by records 9200 that are automatically created upon creation of user accounts (records 2900/3000) and/or device registry accounts (records 6500). This prevents requiring a user to assign privileges between his own devices, and prevents writing special privilege handling code in the web service 2102. Automatic deletion of the user accounts and/or device registry accounts will also preferably delete the associated records 9200.

In various embodiments, a user can act on behalf of any other user through the "Affinity Delegate" privilege. If a first user has been granted the "Affinity Delegate" privilege by a second user, then the second user's device(s) can show up as an Assignor at dropdown 9302. Preferably a qualifier is displayed in the dropdown 9302 selection such as "JB345: johnsPDA" where "JB345" is the second user's logon name and "johnsPDA is the second user's device name (Deviceid). This reminds the first user he has been granted the privilege to assign on behalf of the particular second user(s). This allows the first user to assign privileges to other users or devices as though the second user was doing the assignment. The user to user, device to user, device to device, and user to device privilege of "Affinity Delegate" would be treated properly for what shows up, and what is preferably enforced, as valid Assignor(s). In one embodiment, a special Assignor of "JB345:ALL DEVICES" can show up if the user was granted the "Affinity Delegate" privilege as a user to user assignment. There is preferably a unique index defined on (Type field 9202, OwnerID 9204, GroupID 9206, FromID 9208, ToID 9210) to prevent redundant records 9200. Insertion of a redundant privilege (record 9200) should cause an appropriately handled error.

FIG. 93D demonstrates a user interface that should have an entry made to field 9334, or a checkmark removed from a user account (JK73, SP78) prior to invoking button 9332 for processing. FIG. 93E demonstrates a user interface that has already unchecked a device (TomK) just prior to submitting for processing with button 9362. The user could additionally make an entry to field 9364, or uncheck additional devices, prior to invoking button 9362 for processing.

While records 8900 and 9200 can be used to define groups of users and/or devices with a group name while at the same time assigning privileges to members of the group (i.e. groups have dual purpose), other embodiments may separate the same functionality without departing from the spirit and scope if this disclosure. Groups could be defined to solely collect together users and/or devices. Privileges could be assigned as needed. Key functionality herein includes being able to assign location based services privileges from a user to a device, from a device to a device, from a device to a user, and from a user to a user. Key functionality also includes being able to define groups in a location based service which contain users, devices, or both users and devices.

DCDB

Other

FIG. 94A depicts a preferred embodiment of a data record in the Pingimeter Attribute Extension Table (PAXT). Pingimeters are a user selected boundary to define a geographical area. Another embodiment will be a three dimensional boundary that defines a solid area in space. Pingimeters are defined with a trigger for alerting one user of the arrival, or departure, of another user to/from a Pingimeter (i.e. alert to a device upon detection of arrival to, or departure from, a Pingimeter by another device). PMRID 9402 is a join field to PMRID fields 9452 and 9502. A primary key and foreign keys may be used in various embodiments, for example a record 7000 or a record 9500 being primary to records 9400 and 9450. Preferably, the database system is used to generate a unique value for use in the fields. Attributes associated with managing a Pingimeter are maintained in the PAXT. The records 9450 are used to define the Pingimeter and are joined to through PMRID 9452. DTCreated field 9404 contains a date/time stamp of when the record 9400 was created in (added to) the PAXT. DTLastChg field 9406 contains a date/time stamp of when any field in the associated record(s) 9450 was last modified. CIP field 9408 preferably contains an internet protocol (ip) address of the user's device that created the applicable data record 9400. The CHIP field 9410 preferably contains the ip address of the actual physical server of web service 2102 that created applicable data record 9400. CHName field 9412 preferably contains the host name of the physical server of web service 2102 that created applicable data record 9400, for example because web service 2102 may be a large cluster of physical servers. ChgrIP field 9414 preferably contains an internet protocol (ip) address of the user's device that last modified the applicable data record(s) 9450. The ChgrHIP field 9416 preferably contains the ip address of the actual physical server of web service 2102 that last modified applicable data record(s) 9450. ChgrHName field 9418 preferably contains the host name of the physical server of web service 2102 that last modified applicable data record(s) 9450, for example because web service 2102 may be a large cluster of physical servers. Records 9500 are typically the parent creation records to join with records 9400 and 9450 for defining the Pingimeters, except when a record 7000 joins to records 9450 as needed (discussed above). Various embodiments will allow defining Pingimeters outside of defining a Trigger record 9500, and then allow creating associated records 9500 when ready to use. Records 9400 are efficient for defining one set of attributes for a plurality of records 9450 which make up a Pingimeter.

FIG. 94B depicts a preferred embodiment of a data record in the Pingimeter Table. PMRID field 9452 joins to PMRID 9502 and PMRID 9402. Preferably, the database system is used to generate a unique value for use in the fields. LatDD field 9454 is the latitude of a point defining the Pingimeter in decimal degrees. LonDD field 9456 is a longitude of the point defining the Pingimeter in decimal degrees. Radius field 9458 contains either −1 (for no Radius), or a positive integer value for a radius in feet (alternate embodiments may use other units). Radius field 9458 is set by a user in any convenient units before converting it to units maintained in Radius field 9458. If the Pingimeter is a circular area, then there will be a single 9450 record for the Pingimeter where fields 9454 and 9456 define the center point, and Radius field 9458 defines the radius from the center point. The top map image of FIG. 96A demonstrates a circular Pingimeter that has been selected on a map by a user. If the Pingimeter is a rectangular area, then there will be a four 9450 records for the Pingimeter where fields 9454 and 9456 define the vertices of the rectangle, and Radius field 9458 is set to −1 (i.e. null). FIG. 96B demonstrates a rectangular Pingimeter that has been selected on a map by a user. If the Pingimeter is a polygon area, then there will be a plurality of 9450 records for the Pingimeter where fields 9454 and 9456 define the vertices of the polygon, and Radius field 9458 is set to −1 (i.e. null). FIG. 96C demonstrates a polygon Pingimeter that has been selected on a map by a user. If the Pingimeter is a point with area defined based on its precision, then there will be a single record for the Pingimeter where fields 9454 and 9456 define the point, and Radius field 9458 is set to −1 (i.e. null). FIG. 96D demonstrates a point Pingimeter that has been selected on a map by a user. Of course, smaller or larger point graphics may be used.

FIG. 95 depicts a preferred embodiment of a data record in the Triggers Table. The Triggers Table defines what happens, along with a time constraint, when a PingPal who has granted either the "Set Pingimeter Arrival Alert" privilege or "Set Pingimeter Departure Alert" privilege, causes an alert with respect to a Pingimeter defined by a PingPal. The "Set Pingimeter Arrival Alert" privilege maps to exclusive ('E') and Both ('B') types of Pingimeters. The "Set Pingimeter Departure Alert" privilege maps to inclusive ('I') and Both ('B') types of Pingimeters. An exclusive Pingimeter (i.e. 'E') is a Pingimeter set for alerting when a PingPal arrives to the Pingimeter. An inclusive Pingimeter (i.e. 'I') is a Pingimeter set for alerting when a PingPal departs the Pingimeter. A Both Pingimeter (i.e. 'B') is a Pingimeter set for alerting when a PingPal arrives to, or departs from, the Pingimeter. "Set Pingimeter Departure Alert" and "Set Pingimeter Arrival Alert" are preferably assigned from a user (i.e. all his devices) or device, to a user. Another embodiment will also allow assigning from a user or device, to a device, wherein the device id is known when configuring Pingimeters and is saved with the Pingimeter unit of data (record 9500, 9400, and record(s) 9450) in the OwnerID 9504. Yet another embodiment will maintain an OwnerType field 9503 for determining whether or not the Pingimeter is configured on behalf of a user or on behalf of a device. In one embodiment, the Deviceid field 6504 and device password field 6506 can be used to authenticate to an interface of web service 2102 just as LogonName field 3004 and password field 3006 are used. In another embodiment the device id and device password are automatically determined, for example by a most recent interaction with the Delivery Manager 2510. In another embodiment, device data evidence (fields 5072 and 5074) is used.

PMRID 9502 is a join field to PMRID fields 9402 and 9452. Preferably, the database system is used to generate a unique value for use in the fields. OwnerID 9504 preferably contains the PersonID 2902/3002 value of the user that created the records 9400, 9450, and 9500, however, another embodiment will have it contain a RegistryID 6502 (and optionally with presence of an OwnerType field 9503 as discussed above). Descript field 9506 contains a user defined character string describing the Trigger record 9500. AlertType field 9508 defines the type of Pingimeter and what method to use to alert the owning user when a PingPal causes an alert based on the associated Pingimeter defined. In some embodiments, AlertType will be multiple fields to prevent parsing individual data elements from the contents. In one embodiment, AlertType has a syntax defining the type of Pingimeter in the first character ('I' for inclusive, 'E' for exclusive, 'B' for both), and how to send the alert according to the third character (after a separating semicolon). For example, the third character indicates the methods of:

'D'—[USE DEVICE]=use device parameters (browser receipt (field 6530) and/or SMS address (fields 6532 and 6534) and/or Email address (fields 6536 and 6538)) associated with a device of the user. If the OwnerID 9504 is a RegistryID, then that is the device record to use for fields 6530 through 6538. If the OwnerID 9504 is a PersonID, then the 'D' is followed by a specification for the user's device. If 'D' is followed by a "#' character, then that is followed by a number which is the RegistryID of the specified user's device (e.g. "B;D#63489" where 63489 is a RegistryID 6502). Another embodiment will follow the 'D' with the DeviceID 6504 of the user's specified device. The Pingimeter specification interface will enable the user to specify any of his devices, or any devices he has an "Affinity Delegate" privilege for, as a receiving device for the alert(s). If 'D' is followed by an "@' character ("B;D@"), then the most recent device to access the Delivery Manager 2510 by the user making the Pingimeter configuration (of OwnerID 9504) is used as the target record 6500 device (fields 6530 through 6538 are interrogated for preferences) for the alert(s). The USE DEVICE ('D') option is a preferred standard allowable configuration in web service 2102 because the Pingimeter management model enforces sending alerts to the user's devices, or devices he has an "Affinity Delegate" privilege for.

'X'—[EXPLICIT]=use the string after the colon (:) as the recipient address to send the alert to (e.g. E;X: 2144034071@messaging.nextel.com, or I;X: williamjj@yahoo.com). This option may not be permitted in some embodiments of web service 2102 because users can send alerts to email addresses without a privilege to do so.

'O'—[USE OTHER DEVICE]=use the string after the colon (:) as the device credentials (e.g. B;O:device67, password) for associated record 6500 fields (browser receipt and/or SMS address and/or Email address) to define how to deliver the alert. If a user knows the device credentials of any record 6500 in web service 2102, then the device credentials (fields 6504 and 6506) can be specified for which record 6500 fields 6530 through 6538 to use for alert(s).

'A'—[DO ACTION]=use the string after the colon (:) as the device address and credentials (e.g. E;A: 14.57.207.34(16344)/homeaircond,airpassword/ON) for associated parameters to define what action to perform. The device is not a device of web service 2102 (i.e. not a record 6500 of web service 2102). The device can be a hardware or software entity which can be communicated to, preferably by an internet connection, for authenticating to and then performing a requested action. For example, a device at the public ip address and ip port 16344 is used to turn on a person's air conditioning unit at home. The credentials authenticate to the device. When the alert for the Pingimeter is detected, the air conditioning system will automatically turn on. The 'A' parameter is boiled down into one primary form, although there are many embodiments without departing from the spirit and scope of this disclosure. The action will have a device address (e.g. ipaddress), preferably also a channel to talk to (e.g. (ipport)), authenticating credentials (e.g. preferably an id and password), and an action for the device (e.g. ON or OFF). Other embodiments may use address information other than an ip address which can be automatically communicated with, may use different credential formats, and may use any command native to the device being communicated with. Various credential embodiments can also be used.

Alerts are mostly predefined messages containing textual strings formed by the user/device name that triggered the Pingimeter with date/time stamp information, Pingimeter Descript field 9506 information, and the situational location information of the device at the time of triggering the Pingimeter. However, the DO ACTION ('A') option provides means to perform a particular action automatically when the user/device triggers the Pingimeter. The DO ACTION ('A') is a great method for turning something on or off (e.g. lights) as someone enters or leaves a Pingimeter. Any action can be performed as enabled by the target device for receiving an authenticated command to do something. Complex scripts, programs, batch files, or specific commands can be executed at remote systems or devices as the result of triggering a Pingimeter. Various embodiments to records 9500 will include another field 9509 for defining the message to send upon alert, thereby overriding a system defined alert message format. The new message field 9509 will be a varying length character string up to a reasonable maximum length to interoperate with the target device for the alert. Substitution variables are preferably supported in the string as discussed above.

Active field 9510 is for enabling or disabling a record 9500 and associated records 9400 and 9450 so that a query will treat the record as though it did not exist in the table, however the owner of the record can still manage it. TimeFrame field 9512 provides means for specifying a time specification (e.g. range) when the Pingimeter is enabled for causing alerts. DTCreated field 9514 contains a date/time stamp of when the record 9500 was created in (added to) the Trigger Table. DTLastChg field 9516 contains a date/time stamp of when any field in the associated record 9500 was last modified. CIP field 9518 preferably contains an internet protocol (ip) address of the user's device that created the applicable data record 9500. The CHIP field 9520 preferably contains the ip address of the actual physical server of web service 2102 that created applicable data record 9500. CHName field 9522 preferably contains the host name of the physical server of web service 2102 that created applicable data record 9500, for example because web service 2102 may be a large cluster of physical servers. ChgrIP field 9524 preferably contains an internet protocol (ip) address of the user's device that last modified the applicable data record(s) 9524. The ChgrHIP field 9526 preferably contains the ip address of the actual physical server of web service 2102 that last modified applicable data record(s) 9500. ChgrHName field 9528 preferably contains the host name of the physical server of web service 2102 that last modified applicable data record(s) 9500, for example because web service 2102 may be a large cluster of physical servers.

Records 8900 and 9200 define how Pingimeters are used by web service 2102. The Delivery Manager 2510 uses defined Pingimeters and privileges to drive alerts. While the user can send alerts to himself with Pingimeters and can perform actions relevant to himself, common use is for delivering alerts to users based on mobile travels of other users. Pingimeters are a form of situational locations. They define a point, area, region, or boundary that users can arrive to, or depart from, along with at least time criteria. Some embodiments will extend the Pingimeter record unit of data with additional criteria for clarifying when an alert gets delivered. This can include any fields from records 6500, 7000, or other record fields of web service 2102. Pingimeter alerts are a form of deliverable content, whether it be system generated messages, or user configured messages or content.

With reference back to FIG. 63, shown is a flowchart for a preferred embodiment of carrying out processing for presenting a web service user interface form in the members area 2500 and then processing user specifications to the interface prior to submitting to the service for further processing. For this discussion, FIG. 63 is invoked for adding a Pingimeter (record 9500, 9400 and record(s) 9450) upon invoking Pingimeters Add option 4632. Processing starts at block 6302 and continues to block 6304 where the ACCESS_LIST is set for authorized users. Thereafter, block 6306 performs FIG. 39 access control processing and continues to block 6308. Block 6308 builds and presents an appropriate user interface for adding a Pingimeter, and then a user interfaces with that interface at block 6310 until an Add button action is invoked. The DCDB add interface teachings above for buttons 7178, 7180, 7182 and 7184 and associated processing of FIGS. 72 through 76, are used similarly for adding at block 6310 the records 9400, 9450, and 9500 as a single unit of data that can be joined together in an SQL outer join for capturing any multiple records 9450. The FIG. 96A top map and FIGS. 96B, 96C, and 96D are examples of the user selecting Pingimeters on a map, as the result of selecting a button analogous to button 7178 already described. Button 7178 is the preferred method for defining a Pingimeter in web service 2102. The user may also select buttons analogous to 7180, 7182, and 7184 for automatically populating Tables 9400, 9450, and 9500, as the result of vertices selection by the user to make up the Pingimeter, area associated with a user selection, or a combination of teachings from buttons 7178, 7180, 7182, and 7184 for defining an enclosure for a Pingimeter. When an add action is invoked by the user, block 6312 validates user field specifications to the Pingimeter add interface, and block 6314 checks the results. If block 6314 determines the fields are valid (and can be submitted for processing), then block 6318 invokes FIG. 77 processing for adding the Pingimeter, and current page processing terminates at block 6316. If block 6314 determines that not all fields specified are valid, then block 6320 provides an error to the user so that specification can continue back at block 6310 (e.g. pop-up).

FIG. 77 depicts a flowchart for a preferred embodiment for processing the submittal to add a record to the web service. For purposes of this discussion, a Pingimeter is being added to the web service 2102 as a unit of data across tables 9400, 9450, and 9500 as described above, for example by a Pinger. Processing starts at block 7702 and continues to block 7704 where the ACCESS_LIST is set for authorized users. Thereafter, block 7706 performs FIG. 39 access control processing and continues to block 7710. Block 7710 validates user field specifications to the Pingimeter add interface, and block 7712 checks the results. If block 7712 determines all fields are not valid, then block 7708 reports the error to the user in an appropriate manner and processing terminates at block 7720. If block 7712 determines all fields are valid, then block 7714 builds appropriate insert commands from Pingimeter Add specifications (for records 9400, 9450 and 9500), opens a DB connection, does the inserts, and closes the DB connection. Thereafter, block 7716 sends an email to an administrator account if a Notify flag is set to document this type of transaction, and block 7718 provides the user with a successful add acknowledgement interface similar to those described above, and processing terminates at block 7720. FIG. 77 processing inserts a Pingimeter data unit as records 9500, 9400, and record(s) 9450 with appropriately defaulted fields.

There is preferably no search interface to Pingimeters since there is preferably a reasonably limited enforced maximum. The preferred user interface for managing them is analogous to FIGS. 59A, 67A, 71G, 79B, and 90B, however a search interface may be provided to support all conceivable embodiments where many Pingimeters will be managed. A reasonable standard set of fields are output for the list interface rows, preferably each row including at least Descript field 9506, Active field 9510, AlertType field 9508, TimeFrame field 9512, and a URL link to an appropriately zoomed map to display the Pingimeter defined by records 9450. A website defined maximum is preferably enforced at blocks 7710 and 7712. In another embodiment, record 3000 will contain a maximum (e.g. new field 3017) for each user, much like MaxDevs field 3020 is defined and used. A new max Pingimeters field 3017 would be passed to pages including FIG. 39 Access Control processing in a similar manner.

Clicking the Pingimeters Manage option 4630 preferably takes the user directly to a list interface similarly described above for other record types (2900/3000, 6500, 7000). Another embodiment could provide a similar search interface in context for the Pingimeter information. It should be readily understood now from previous descriptions that FIGS. 55, 57, 58, 60, 53, and 62 are easily described in context for Pingimeters (records 9500, 9400, and associated record(s) 9450) and applicable Pingimeter processing, and for obvious screenshots subsequent to actions from Pingimeter list processing. So for brevity, the redundant descriptions and figures are not included here except to say Pingimeter data units (a unit of data across PAXT record 9400, Pingimeter Table record(s) 9450, and Triggers Table record 9500) can be viewed, deleted, and modified (individually or as a list) in a similar manner to records 2900/3000, records 6500, and records 7000.

An alternative embodiment will use the DCDB interfaces described above to add and manage Pingimeters as a DCDB record 7000 for adding, viewing, modifying, and deleting DCDB records 7000. A Pingimeter defined with record 7000 requires the EntryType field 7004 set to 'R' for denoting a Pingimeter. All of DCDB add and management discussions above can apply for a Pingimeter. PMRID 7030 will be used to join to Triggers Table PMRID 9502 and Pingimeters Table PMRID 9452 for the Pingimeter defined. The user would then be enabled to define content to deliver upon triggering of the Pingimeter with all the deliverable content options provided in a record 7000. Further available for the user would be additional record 7000 fields for further defining a situational location for Pingimeter alerting. Any duplication between record 7000 fields and record 9452 fields could be eliminated in a new record 9452, or the record 9452 fields could be optional for overriding duplicated record 7000 fields.

PingSpots are similar in nature to Pingimeters and can overlap in some functionality. PingSpots are identically configured as a record 7000 has been discussed. PingSpots are situational locations configured by users of web service 2102 for delivering content to their PingPals who happen to travel to those situational locations. A website defined maximum is preferably enforced. In another embodiment, record 3000 will contain a maximum (e.g. new field 3015) for each user, much like MaxDevs field 3020 is defined and used. A new max PingSpots field 3015 could be passed to pages including FIG. 39 Access Control processing in a similar manner.

In one example, a Pinger travels to a large flee market, finds an item of interest to a PingPal, and sets a PingSpot where the item is located with a radius for covering an area certainly traveled by someone nearby. The Pinger then sets a deliverable content message like "Check out the antique chair over by the large oak tree" along with situational location criteria for the PingSpot. When the PingPal travels to the situational location sometime in the future, the message about the antique chair is automatically delivered to the PingPal according to his device preferences. Of course, the PingPal would have to have granted the "Set PingSpots" privilege to the Pinger (or his device) so the PingSpot was relevant for the PingPal. So, PingSpots enable a first user (or device) to set up content for a second user (or device) which is configured by the first user/device and is delivered to the second user/device according to the situational location of the second user/device. "Set PingSpots" is preferably assigned from a user (i.e. all his devices) or device, to a user. Another embodiment will also allow assigning from a user or device, to a device, wherein the device id is known when configuring PingSpots and is saved with the record 7000 in the AuthID 7038. Yet another embodiment will maintain an AuthType field 7037 for determining whether or not the PingSpot is configured on behalf of a user or on behalf of a device. In one embodiment, the device id field 6504 and device password 6506 can be used to authenticate to an interface of web service 2102 just as LogonName field 3004 and password field 3006 are used. In another embodiment the device id and device password are automatically determined, for example by a most recent interaction with the Delivery Manager 2510. In another embodiment, device data evidence (fields 5072 and 5074) is used.

PingSpots are identically configured as though a Content Provider were configuring deliverable content with options (e.g. 4650, 4652) subordinate to the DCDB option header 4648. Adding and managing PingSpots will use the DCDB interfaces described above to add and manage PingSpots as a DCDB record 7000 for adding, viewing, modifying, and deleting DCDB records 7000. A PingSpot defined with record 7000 requires the EntryType field 7004 set to 'S' for denoting a PingSpot. All of DCDB add and management discussions above apply for a PingSpot. The only difference is the records added and managed have EntryType field 7004 set to 'S' for PingSpots.

PingSpots Add option 4626 produces an interface analogous to FIG. 71A with proper PingSpot identifying interface indicators (e.g. top page locator identification bar set to "GPSPing.com Add PingSpot"), although some embodiments will do an appropriate subset of FIG. 71A for cell phone convenience. PingSpots Manage option 4624 produces an interface analogous to FIG. 71C with proper PingSpot identifying interface indicators (e.g. top page locator identification bar set to "GPSPingcom PingSpot Manage/List") for some reasonable system limited number of PingSpots creatable per user. A website defined maximum is preferably enforced as discussed above. Another embodiment would provide a search interface so that selecting PingSpots Manage option 4624 would produce an interface analogous to the FIG. 71B search interface with proper PingSpot identifying interface indicators (e.g. top page locator identification bar set to "GPSPing.com PingSpot Specify Search Criteria") for a larger number of permitted PingSpots. DCDB record 7000 processing is identical for PingSpots as it is for deliverable content configured by a Content Provider, with respect to FIGS. 71A, 71B, 71C and associated processing. The FIG. 96A bottom map shows a PingSpot selected with button 7178 in context for a PingSpot. Note that the PingSpot is preferably semi-transparent-opaque rather than an empty region as used for Pingimeters. This shows that the mobile device 2540 is a live target anywhere within the PingSpot, while a Pingimeter is more of a boundary for an alert setting. PingSpots are preferably viewed, deleted, and modified (individually or as a list) in an identical manner to records 7000.

FIG. 96A depicts a preferred embodiment screenshot of the Alerts option of the Services option from a public interface of the web service demonstrating circular specifications of an area on a map, for example for Pingimeters and PingSpots. FIG. 96B depicts a preferred embodiment screenshot demonstrating rectangular specification of an area on a map. FIG. 96B is an example of specification for DCDB content, Pingimeters, or PingSpots. PingSpots are preferably shown as semi-transparent-opaque regions. FIG. 96C depicts a preferred embodiment screenshot demonstrating polygon specification of an area on a map. FIG. 96C is an example of specification for DCDB content, Pingimeters, or PingSpots. PingSpots are preferably shown as semi-transparent-opaque regions. FIG. 96D depicts a preferred embodiment screenshot demonstrating point specification of an area on a map. Pingimeters, and situational locations for PingSpots and DCDB content (and Pingimeters using a record 7000) can be specified as points, circular areas, rectangular areas, polygon areas, or any other area bounding a geographical area.

A universal embodiment enables Pingimeters, and situational locations for PingSpots and DCDB content (and Pingimeters using a record 7000) to be specified in terms of a three dimensional solid area (called a three dimensional solid region) in space which may be traveled through. This allows specifications in space, not just on a planet's surface and/or at some elevation. Triangular elevations from known locatable points, triangular distances from origins in the universe, etc. can denote where exactly a point of the three dimensional solid in space is located. That same point can provide a mathematical reference to other points of the solid region in space and/or together with descriptions for angles, pitches, rotations, etc. from some reference point(s). That way, any mobile vehicle, or traveler, traveling through the solid region defined in space will have traveled through the situational location. Therefore, situational locations are not just two dimensional. Three dimensional location parameters of a situational location in the universe can be specified with a solid region in space, for example by a conical shape, cubical shape, spherical shape, pyramidal shape, irregular shapes, or any other shape either manipulated with a three dimensional graphic interface, or with mathematical descriptions. Locations of situational locations are regions that some traveler can pass through, regardless of being two dimensional (optionally with an elevation) or three dimensional.

In yet another embodiment, Pingimeters, and situational locations for PingSpots and DCDB content (and Pingimeters using a record 7000) can be specified in multiple dimensional terms (2, 3, or more) as is appropriate for the application. For example, time adds a fourth dimension (e.g. TimeCriteria field 7034) and other criteria adds additional dimensions. N-dimensions are supported as needed for applicable embodiments. In yet another embodiment, a smaller scale is incorporated, for example at the microscopic level. Pingimeters, and situational locations for PingSpots and DCDB content (and Pingimeters using a record 7000) can be specified in terms of microscopic measurements, for example for enabling a micro-motor device to travel through a situational location or Pingimeter defined in a human body to perform micro-surgery. When the micro-motor travels to, or through, the body to a configured record of web service 2102, then the same functionality disclosed can be applied. Content could be intercepted for sending to the examining system or doctor device(s). Pingimeter actions could in fact be sent to the micro-motor device upon arrival to a target area for then performing prescribed actions within the human body. Magnetic Resonance Imaging (MRI) is a key component to use for identifying situational locations relative to body landmarks. Travels of the micro-motor device through configured areas or regions could cause the micro-motor device to receive content to facilitate navigating itself around internal body landmarks. Communications would be by way of a wireless connection. Records 7000 could define executables and directional content for governing the micro-motor device actions through the human body. The web service 2102 in such a medical application would be a small scale private service used in close quarters. The point in all this is that location specifications, area specifications, region in space specifications, and situational location specifications can take on measurements and descriptors as is relevant in the application used, from a microscopic application to a universal application between galaxies. Scale, size and application of use is not a limiting feature of this disclosure.

Find Services

A preferred embodiment for locating mobile users incorporates a leading paid-for internet accessed mapping service such as Microsoft MapPoint or MapQuest (MapPoint is a trademark of Microsoft Corp. and MapQuest is a trademark of the MapQuest company). Those skilled in the art will recognize that location service features described herein apply regardless of map solution used. Descriptions herein are to be interpreted in their broadest sense and in view of any map solution that may be used. CD-ROM file name "tigermap.pdf" provides a printed description available from the free U.S. Census online mapping service (http://tiger.census.gov) which has been incorporated for use in an embodiment.

FIG. 63 depicts a flowchart for a preferred embodiment of carrying out processing for presenting a web service user interface form in the members area and then processing user specifications to the interface prior to submitting to the service for further processing. For this discussion, FIG. 63 is invoked upon selection of the Users Find option 4608 for the main find user interface. Processing starts at block 6302 and continues to block 6304 where the ACCESS_LIST is set for authorized users. Thereafter, block 6306 performs FIG. 39 access control processing and continues to block 6308. Block 6308 builds and presents FIG. 100A, and then a user interfaces with FIG. 100A at block 6310 until a button 10006, 10012, or 10020 is invoked (i.e. selected), or a link 10022, 10024, 10026, 10028, or 10030 is invoked (i.e. selected). When an action is invoked by the user, block 6312 validates user field specifications to FIG. 100A (if a button invoked), and block 6314 checks the results (if a button invoked). If block 6314 determines the fields are valid (if a button invoked and can be submitted for processing), then block 6318 invokes FIG. 97A processing, and current page processing terminates at block 6316. If block 6314 determines that not all fields specified are valid (if a button invoked), then block 6320 provides an error to the user so that specification can continue back at block 6310 (e.g. pop-up). If a link 10022 through 10030 was selected, then processing in effect leaves block 6310 and enters block 6318 for the applicable link processing.

FIG. 97A depicts a flowchart for a preferred embodiment for processing the request to find device(s) (e.g. PingPal(s)), upon selection of the get device location(s) button 10006, or get group location(s) button 10012, or get device location button 10020. Find location processing begins at block 9702 and continues to block 9704 where the ACCESS_LIST is set for authorized users. Thereafter, block 9706 performs FIG. 39 access control processing and continues to block 9708 where the button selected from FIG. 100A is determined. Thereafter, block 9710 validates the form fields in the field-set associated with the button and processing continues to block 9712. If all fields are not valid (e.g. checks syntax for single string or comma delimited strings, and optional date/time string, and SQL injection attacks), then block 9726 appropriately reports the error to the user and current page processing terminates at block 9734. If block 9712 determines all fields were valid, then processing continues to block 9714. If block 9714 determines button 10006 was invoked from action data evidence passed from the form, then block 9720 determines the "View Whereabouts" privileges (Groups Table, PingPal Privilege Assignment Table, Registry Table, Users Table) assigned to the user of FIG. 100A (as passed by FIG. 39 access control processing). The "View Whereabouts" privileges are determined with joins including device name(s) entered to field 10002 or by a user (i.e. all user's devices) of OwnerID (s) 6522 of device name(s) entered to field 10002. "View Whereabouts" is preferably assigned from a user (i.e. all his devices) or device, to a user. Another embodiment will also allow assigning from a user or device, to a device, wherein the device id is known for the device with the interface doing the find action from FIG. 100A. In one embodiment, the device id field 6504 and device password 6506 can be used to authenticate to an interface of web service 2102 just as LogonName field 3004 and password field 3006 are used. In another embodiment the device id and device password are automatically determined, for example by a most recent interaction with the Delivery Manager 2510. In another embodiment, device data evidence (fields 5072 and 5074) is used.

Thereafter, block 9722 checks if one or more "View Whereabouts" privileges are assigned from each comma delimited device name (i.e. id field 6504) specified in entry field 10002, to the user of FIG. 100A (or from the owner of devices specified to entry field 10002 to the user of FIG. 100A). If block 9722 determines a device id specified in entry field 10002 has not granted the "View Whereabouts" privilege to the user of FIG. 100A, then block 9726 reports the error to the user of FIG. 100A and current page processing terminates at block 9734. Another embodiment can also report the failed search to the device id(s), or owner(s) of the device id(s) for indicating someone without privileges is attempting to do a search on their location search on their device. Yet another embodiment could include a new field in record 6500 (checked for at block 9726) for reporting such location search attempts made by an unauthorized user, or made from an unauthorized device.

If block 9722 determines all sought devices have granted privileges to the user of FIG. 10A, then block 9728 builds query(s) to the Trail Table (records 6800) for the most recent record up until the optional date/time of entry field 10004 (most recent of all records if no field 10004 specified) for each device in the comma delimited list (or single device specified), a connection is opened to the database, the query(s) are performed and the database connection is closed. Thereafter, if block 9730 determines at least one device tracking record 6800 has been found, then block 9732 accesses current map settings data evidence (e.g. set by FIG. 100B), builds the map interface command, and redirects to a page with upper and lower frames pages for map display. Block 9732 ensures a WAP device gets single page with no frames. Thereafter, block 9734 terminates current page processing. An example of a map interface command URL for http://tiger.census.gov/ is:

"http://tiger.census.gov/cgi-bin/mapgen?wid=.2&ht=.2&lon=
−96.7003083333333&lat=33.0351666666667&
mark=−96.7003083333333,33.0351666666667,redstar,5/30/2005+
11:01:03+AM"

which shows a red star in Plano, Tex. with a date/time stamp.

The http://tiger.census.gov/ map interface is preferably interfaced to with two frames, a map display frame and a navigational action frame (for devices that support frames). For example, FIG. 100E shows a navigational frame 10072 and a map display frame 10074. This allows user navigation actions in frame 10072 which displays new maps in frame 10074. Frames of FIG. 100E could be displayed within frame 4698 of a full browser, or just as is in a PDA browser. A cell phone implementation should not have frames, so a single page would be returned that comprises all content items from frames 10072 and 10074. Every time a navigational link is selected from the cell phone, or any other WAP device, the entire map and navigational links are refreshed as a single unit. The advantage of using frames 10072 and 10074 allows only refreshing the map display frame 10074 for links selected in the navigational frame 10072.

With reference now to FIG. 100F, Zoom in link 10076 is provided for zooming into the current map for a zoomed-in map display, zoom out link 10080 is provided for zooming out from the current map for a zoomed-out map display, and panning control 10078 contains nine panning links for panning the current map Northwest ("NW"), North ("N"), Northeast ("NE"), West ("W"), Center ("C"), East ("E"), Southwest ("SW"), South ("S"), and Southeast ("SE"). Center pans the map so all originally displayed objects are seen again within a single map displayed (and will zoom if necessary to original display). Links 10076 and 10080, as well as control 10078, are preferably maintained in the navigational frame 10072 for devices that support frames. Otherwise, all of FIG. 100F is a single page presented to the device.

If block 9730 determines no records 6800 were found, then block 9726 reports a not found error to the user and current page processing terminates at block 9734. An alternative embodiment to block 9722 is to process the subset of devices which are determined to have granted the privileges rather than allowing one invalid device to cause an error flow from block 9722 to block 9726. If block 9714 determines button 10006 was not selected, then processing continues to block 9716. If block 9716 determines button 10012 was invoked from action data evidence passed from the form, then block 9720 determines the "View Whereabouts" privileges (Groups Table, PingPal Privilege Assignment Table, Registry Table, Users Table) assigned to the user of FIG. 100A (as passed by FIG. 39 access control processing). The "View Whereabouts" privileges are determined with joins including group name(s) entered to field 10008 or by a user (i.e. all user's devices) of OwnerID field(s) 6522 of device(s) of group name(s) entered to field 10008. Thereafter, block 9722 checks if one or more "View Whereabouts" privileges are assigned from each device of the comma delimited group names (i.e. group name field 8906) specified in entry field 10008, to the user of FIG. 100A (or from the owner of devices (of groups) specified to entry field 10008 to the user of FIG. 10A). If block 9722 determines a device id of group(s) specified in entry field 10008 has not granted the "View Whereabouts" privilege to the user of FIG. 100A, then block 9726 reports the error to the user of FIG. 100A and current page processing terminates at block 9734. Another embodiment can also report the failed search to the device id(s), or owner(s) of the device id(s) for indicating someone without privileges is attempting to do a search on their location search on their device. Yet another embodiment could include a new field in record 6500 (checked for at block 9726) for reporting such location search attempts made by an unauthorized user, or made from an unauthorized device.

If block 9722 determines all sought devices have granted privileges to the user of FIG. 100A, then block 9728 builds query(s) to the Trail Table (records 6800) for the most recent record up until the optional date/time of entry field 10010 (most recent of all records if no field 10010 specified) for each device in the comma delimited group list (or single group specified), a connection is opened to the database, the query(s) are performed and the database connection is closed. Thereafter, if block 9730 determines at least one device tracking record 6800 has been found, then block 9732 accesses current map settings data evidence (e.g. set by FIG. 100B), builds the map interface command, and redirects to a page with upper and lower frames pages for map display (WAP device gets single page). Thereafter, block 9734 terminates current page processing. If block 9716 determines button 10012 was not selected, then processing continues to block 9718. If block 9718 determines button 10020 was invoked from action data evidence passed from the form, then block 9724 builds a query to the Trail Table (joined to Registry Table) with the Deviceid field 6504 from entry field 10014, the device password field 6506 from entry field 10016, and an optional date/time stamp from entry field 10018. Block 9724 opens a DB connection, does the query for the most recent record for the device up to the optional date/time stamp of field 10018, and the database connection is closed. Thereafter, if block 9730 determines a device tracking record 6800 has been found, then block 9732 accesses current map settings data evidence (e.g. set by FIG. 100B), builds the map interface command, and redirects to a page with upper and lower frames pages for map display (WAP device gets single page). Thereafter, block 9734 terminates current page processing.

If block 9718 determines button 10020 was not selected, then processing continues to block 9726 where action data evidence in error is reported to the user and processing terminates at block 9734. So, the user can locate on a map a device, a list of devices, a group of devices, or a list of groups of devices, provided the "View Whereabouts" privilege has been granted by the sought device(s), or user(s) of the sought device(s). A device can also be located on a map if both the device id and device password is known by the seeking user. Map 100F provides an example when a single device is located from FIG. 100A. Map 100G provides an example when a list of devices, a group of devices, or a list of groups of devices are located through FIG. 100A.

FIG. 63 depicts a flowchart for a preferred embodiment of carrying out processing for presenting a web service user interface form in the members area and then processing user specifications to the interface prior to submitting to the service for further processing. For this discussion, FIG. 63 is invoked upon selection of the Find Routes Here link 10026, Find Reports Here link 10028, or Map Settings Here link 10030, respectively. Processing starts at block 6302 and continues to block 6304 where the ACCESS_LIST is set for authorized users. Thereafter, block 6306 performs FIG. 39 access control processing and continues to block 6308. Block 6308 builds and presents an appropriate user interface (FIG. 100C, 100D, or 100B, respectively) according to the link invoked from Find Routes Here link 10026, Find Reports Here link 10028, or Map Settings Here link 10030, respectively, and then a user interfaces with that user interface at block 6310 until a button from the user interface is invoked (i.e. selected). When an action is invoked by the user, block 6312 validates user field specifications to the user interface (if a button invoked), and block 6314 checks the results. If block 6314 determines the fields are valid (and can be submitted for processing), then block 6318 invokes the corresponding user interface processing (FIG. 98A, 98B, or 97B, respectively), and current page processing terminates at block 6316. If block 6314 determines that not all fields specified are valid, then block 6320 provides an error to the user so that specification can continue back at block 6310 (e.g. pop-up).

FIG. 97B depicts a flowchart for a preferred embodiment for processing the request to set map preferences, upon selection of button 10032 from FIG. 100B. Map settings processing starts at block 9752 and continues to block 9754 where the ACCESS_LIST is set for authorized users. Thereafter, block 9756 performs FIG. 39 access control processing and continues to block 9758. Block 9758 validates form fields specified to FIG. 100B and then block 9760 checks results. If block 9760 determines that fields specified by the user to FIG. 100B are valid, then user specifications are saved as map settings data evidence at block 9766, a success interface is displayed to the user at block 9768, and current page processing terminates at block 9764. If all fields specified by the user are not valid, then block 9762 reports the error(s) to the user and current page processing terminates at block 9764. Block 6308 always defaults the FIG. 100B user interface with any map settings data evidence found from previous configurations to FIG. 100B, and block 6310 allows the user to operate the device type dropdown 10034 for automatically populating a predefined set of map settings values to all entry fields of FIG. 100B according to a device type selected in the dropdown. There can be many devices to select from including cell phones, PDAs, etc. After a dropdown 10034 selection is made, then the user can customize specific fields as desired for saving as map settings data evidence. In another embodiment, another button is provided to FIG. 100B for saving a set of user customized values to a name that subsequently appears in dropdown 10034 selections so those become a desired set of default values at a future use of dropdown 10034 selection. The user should be able to delete an entry from the dropdown 10034 in this embodiment.

Save settings button 10032 saves the map settings in entry fields of FIG. 100B to map settings data evidence for use in map functionality of web service 2102. "Area width" determines how much horizontal width to display in a map (e.g. longitudinal degrees). "Area Height" determines how much vertical height to display in a map (e.g. latitudinal degrees). "Zoom factor" determines how much to zoom in or out on a map when selecting links 10076 or 10080 (e.g. percentage). "Pan factor" determines how much to pan a map when using control 10078 (e.g. in decimal degrees). "Image Width" determines how wide the image is to present the map in. "Image Height" determines how high the image is to present the map in. "Markers" is an ordered list of preferred markers to use for devices located on a map. If only one marker is provided, then that is used for all devices located. If a comma delimited list of markers is provided, then each marker from left to right is used until either devices to locate are completed, or markers to use in the list are exhausted. If markers run out first, then the list of markers is started with the first marker for the next device located, and so on. Thus, the marker list is round-robinned as needed to represent devices on a map. If devices to locate run out first, then there are plenty of markers to represent the located devices. "From X Center" and "From Y Center" determines how to automatically pan the map after its initial display (e.g. as percentage). "Max Devices" determines the maximum number of devices to display on a map. After this maximum is reached, no more devices are displayed. Best practices are to have a number of markers ("Markers" ordered list) that match the "Max Devices" value. "Map Layers" are predefined constants for what layers to display on maps. "Map Level" are predefined constants for what should be labeled on the presented maps. "Route Colors" is an ordered comma delimited list of colors to draw route lines for devices. If only one color is provided, then that is used for all device routes plotted. If a comma delimited list of colors is provided, then each color from left to right is used until either devices to route are completed, or colors to use in the list are exhausted. If colors run out first, then the list of colors is started with the first color for the next device plotted, and so on. Thus, the color list is round-robinned as needed to represent device routes on a map. If devices to plot run out first, then there are plenty of colors to represent the plotted devices. "Route Weight" determines the thickness of route lines to draw when plotting device routes on a map.

In another embodiment, map settings can be automatically set based on the device that is displaying the map, and the user may still be able to override them. There may be other embodiments of map settings wherein a user can control how maps are displayed. These embodiments should allow the user to select a named set of defaults for convenient population to configurable fields.

FIG. 98A depicts a flowchart for a preferred embodiment for processing the request to find routes of device(s) (e.g. PingPal(s)), upon selection of the get device route(s) button 10038, or get group route(s) button 10042, or get device route button 10048. Find route processing begins at block 9802 and continues to block 9804 where the ACCESS_LIST is set for authorized users. Thereafter, block 9806 performs FIG. 39 access control processing and continues to block 9808 where the button selected from FIG. 100C is determined. Thereafter, block 9810 validates the form fields in the field-set associated with the button and processing continues to block 9812. If all fields are not valid (e.g. checks syntax for single string or comma delimited strings, date/time strings, and SQL injection attacks), then block 9826 appropriately reports the error to the user and current page processing terminates at block 9836. If block 9812 determines all fields were valid, then processing continues to block 9814. If block 9814 determines button 10038 was invoked from action data evidence passed from the form, then block 9820 determines the "View Historical Route Information" privileges (Groups Table, PingPal Privilege Assignment Table, Registry Table, Users Table) assigned to the user of FIG. 100C (as passed by FIG. 39 access control processing). The "View Historical Route Information" privileges are determined with joins including device name(s) entered to field 10036 or by a user (i.e. all user's devices) of OwnerID (s) 6522 of device name(s) entered to field 10036. "View Historical Route Information" is preferably assigned from a user (i.e. all his devices) or device, to a user. Another embodiment will also allow assigning from a user or device, to a device, wherein the device id is known for the device with the interface doing the find route(s) action from FIG. 100C. In one embodiment, the device id field 6504 and device password 6506 can be used to authenticate to an interface of web service 2102 just as LogonName field 3004 and password field 3006 are used. In another embodiment the device id and device password are automatically determined, for example by a most recent interaction with the Delivery Manager 2510. In another embodiment, device data evidence (fields 5072 and 5074) is used.

Thereafter, block 9822 checks if one or more "View Historical Route Information" privileges are assigned from each comma delimited device name (i.e. id field 6504) specified in entry field 10036, to the user of FIG. 100C (or from the owner of devices specified to entry field 10036 to the user of FIG. 100C). If block 9822 determines a device id specified in entry field 10036 has not granted the "View Historical Route Information" privilege to the user of FIG. 100C, then block 9826 reports the error to the user of FIG. 100C and current page processing terminates at block 9836. Another embodiment can also report the failed search to the device id(s), or owner(s) of the device id(s) for indicating someone without privileges is attempting to do a search on their location search on their device. Yet another embodiment could include a new field in record 6500 (checked for at block 9826) for reporting such location search attempts made by an unauthorized user, or made from an unauthorized device.

If block 9822 determines all sought devices have granted privileges to the user of FIG. 100C, then block 9828 builds query(s) to the Trail Table (records 6800) for all record(s) found in range of the "Start:" date/time stamp and "End:" date/time stamp for each device in the comma delimited list (or single device specified), a connection is opened to the database, the query(s) are performed and the database connection is closed. Thereafter, if block 9830 determines at least one device tracking record 6800 has been found, then block 9832 accesses current map settings data evidence (e.g. set by FIG. 100B), builds the map interface command, and redirects to a page with upper and lower frames pages for map display. Blocks 9832/9834 ensure a WAP device gets single page with no frames. Thereafter, block 9834 draws an overlay of route lines for the map display background and refreshes the frame (or page). Another embodiment will have the map interface command specify how to draw the route lines so the map is returned with route lines on it. Thereafter, block 9836 terminates current page processing.

If block 9830 determines no records 6800 were found, then block 9826 reports a not found error to the user and current page processing terminates at block 9836. An alternative embodiment to block 9822 is to process the subset of devices which are determined to have granted the privileges rather than allowing one invalid device to cause an error flow from block 9822 to block 9826.

If block 9814 determines button 10038 was not selected, then processing continues to block 9816. If block 9816 determines button 10042 was invoked from action data evidence passed from the form, then block 9820 determines the "View Historical Route Information" privileges (Groups Table, PingPal Privilege Assignment Table, Registry Table, Users Table) assigned to the user of FIG. 100C (as passed by FIG. 39 access control processing). The "View Historical Route Information" privileges are determined with joins including device name(s) of group(s) entered to field 10040 or by a user (i.e. all user's devices) of OwnerID (s) 6522 of device name(s) of group(s) entered to field 10040. Thereafter, block 9822 checks if one or more "View Historical Route Information" privileges are assigned from each device of the comma delimited group names (i.e. group name field 8906) specified in entry field 10040, to the user of FIG. 100C (or from the owner of devices (of groups) specified to entry field 10040 to the user of FIG. 100C). If block 9822 determines a device id of group(s) specified in entry field 10040 has not granted the "View Historical Route Information" privilege to the user of FIG. 100C, then block 9826 reports the error to the user of FIG. 100C and current page processing terminates at block 9836. Another embodiment can also report the failed search to the device id(s), or owner(s) of the device id(s) for indicating someone without privileges is attempting to do a search on their location search on their device. Yet another embodiment could include a new field in record 6500 (checked for at block 9826) for reporting such location search attempts made by an unauthorized user, or made from an unauthorized device.

If block 9822 determines all sought devices have granted privileges to the user of FIG. 100C, then block 9828 builds query(s) to the Trail Table (records 6800) for) for all record(s) found in range of the "Start:" date/time stamp and "End:" date/time stamp for each device for each device in the comma delimited group list (or single group specified), a connection is opened to the database, the query(s) are performed and the database connection is closed. Thereafter, if block 9830 determines at least one device tracking record 6800 has been found, then block 9832 accesses current map settings data evidence (e.g. set by FIG. 100B), builds the map interface command, and redirects to a page with upper and lower frames pages for map display (WAP device gets single page). Otherwise, block 9830 continues to block 9826 for error processing. Block 9832 continues to block 9834 for drawing an overlay of route lines for the map display background and refreshing the frame (or page). Another embodiment will have the map interface command specify how to draw the route lines so the map is returned with route lines on it. Thereafter, block 9836 terminates current page processing.

If block 9816 determines button 10042 was not selected, then processing continues to block 9818. If block 9818 determines button 10048 was invoked from action data evidence passed from the form, then block 9824 builds a query to the Trail Table (joined to Registry Table) with the Deviceid field 6504 from entry field 10044, the device password field 6506 from entry field 10046, and for all record(s) found in range of the "Start:" date/time stamp and "End:" date/time stamp for the device. Block 9824 opens a DB connection, does the query for the record(s), and the database connection is closed. Thereafter, if block 9830 determines a device tracking record 6800 has been found, then block 9832 accesses current map settings data evidence (e.g. set by FIG. 100B), builds the map interface command, and redirects to a page with upper and lower frames pages for map display (WAP device gets single page). Thereafter, block 9834 draws an overlay of route line for the map display background and refreshes the frame (or page). Another embodiment will have the map interface command specify how to draw the route line so the map is returned with the route line on it. Thereafter, block 9836 terminates current page processing.

If block 9818 determines button 10048 was not selected, then processing continues to block 9826 where action data evidence in error is reported to the user and processing terminates at block 9836. So, the user can produce a map with the historical route(s) of a device, a list of devices, a group of devices, or a list of groups of devices, provided the "View Historical Route Information" privilege has been granted by the sought device(s), or user(s) of the sought device(s). A device can also have its route plotted on a map if both the device id and device password is known by the seeking user. Map 1 OOH provides an example when a single device route is plotted through from FIG. 100C. Map 1001 provides an example when a list of devices, a group of devices, or a list of groups of devices have their routes plotted through use of FIG. 100C. Map 1001 uses the "Route Colors" setting for plotting routes in different colors (cannot see differentiation well on black and white drawing). Because of the potentially large number of records 6800 involved in the above processing, another embodiment may completely process one query results before performing the next query in the list of queries to perform.

FIG. 98B depicts a flowchart for a preferred embodiment for processing the request to report on device(s) (e.g. PingPal(s)) upon selection of the get report button 10056, or get report button 10064. Get report processing begins at block 9852 and continues to block 9854 where the ACCESS_LIST is set for authorized users. Thereafter, block 9856 performs FIG. 39 access control processing and continues to block 9858 where the button selected from FIG. 100D is determined. Thereafter, block 9860 validates the form fields in the field-set associated with the button and processing continues to block 9862. Block 9862 checks for the user specification to address area 10052 or address area 10060 depending on the button data evidence from the form invoked (10056 or 10064). A query to a connected Geo-translation database is performed for the address specification. If more than 1 translation is returned, the user preferably selects one from the result for subsequent processing. In other embodiments, the user can select a plurality subset of results returned for reporting on multiple locations. In this way, wildcarding to fields of the address areas 10052 and 10060 can also be used to determine a plurality of location criteria. In another embodiment, no radio buttons are provided and the best match based on address information provided is used to search for a geocoded translation to latitude and longitude. In yet another embodiment, an area is returned instead of a simple latitude and longitude for reporting on the area instead of a point. In another embodiment, address areas 10052 and 10060 provide means for specifying a solid region in space (e.g. 3 dimensional coordinates with some origin, for example) for then reporting on device(s) having passed through the solid region in space during the time window. In another embodiment, a HitRadius can be specified by the user for location point(s). In yet another embodiment, address areas 10052 and 10060 are replaced with map selection(s) made by the user from functionality described above for a button 7178 provided to the FIG. 100D user interface. In a further embodiment, the user simply enters one or more latitude and longitude coordinate points (with optional HitRadius) in place of address areas 10052 and 10060.

Thereafter, if all fields are not valid (e.g. checks syntax for single string or comma delimited strings, address information, translation information returned, date/time strings, and SQL injection attacks), then block 9876 appropriately reports the error to the user and current page processing terminates at block 9882. If block 9864 determines all fields were valid, then processing continues to block 9866. If block 9866 determines button 10056 was invoked from action data evidence passed from the form, then block 9870 determines the "View Reports" privileges (Groups Table, PingPal Privilege Assignment Table, Registry Table, Users Table) assigned to the user of FIG. 100D (as passed by FIG. 39 access control processing). The "View Reports" privileges are determined with joins including device name(s) entered to field 10050 or by a user (i.e. all user's devices) of OwnerID (s) 6522 of device name(s) entered to field 10050. "View Reports" is preferably assigned from a user (i.e. all his devices) or device, to a user. Another embodiment will also allow assigning from a user or device, to a device, wherein the device id is known for the device with the interface doing the reporting action from FIG. 100D. In one embodiment, the device id field 6504 and device password 6506 can be used to authenticate to an interface of web service 2102 just as LogonName field 3004 and password field 3006 are used. In another embodiment the device id and device password are automatically determined, for example by a most recent interaction with the Delivery Manager 2510. In another embodiment, device data evidence (fields 5072 and 5074) is used.

Thereafter, block 9872 checks if one or more "View Reports" privileges are assigned from each comma delimited device name (i.e. id field 6504) specified in entry field 10050, to the user of FIG. 100D (or from the owner of devices specified to entry field 10050 to the user of FIG. 100D). If block 9872 determines a device id specified in entry field 10050 has not granted the "View Reports" privilege to the user of FIG. 100D, then block 9876 reports the error to the user of FIG. 100D and current page processing terminates at block 9882. Another embodiment can also report the failed search to the device id(s), or owner(s) of the device id(s) for indicating someone without privileges is attempting to do a search on their location search on their device. Yet another embodiment could include a new field in record 6500 (checked for at block 9876) for reporting such location search attempts made by an unauthorized user, or made from an unauthorized device.

If block 9872 determines all sought devices have granted privileges to the user of FIG. 100D, then block 9874 builds query(s) to the Trail Table (records 6800) for all record(s) found in range of the "Start:" date/time stamp and "End:" date/time stamp for each device in the comma delimited list (or single device specified) with the specified translated location information, a connection is opened to the database, the query(s) are performed, report(s) list is/are built, and the database connection is closed. Thereafter, if block 9878 determines at least one device tracking record 6800 has been found, then block 9880 builds report output categorized by device, and then by location(s) within a device category, and block 9882 terminates current page processing.

If block 9878 determines no records 6800 were found, then block 9876 reports a not found error to the user and current page processing terminates at block 9882. An alternative embodiment to block 9872 is to process the subset of devices which are determined to have granted the privileges rather than allowing one invalid device to cause an error flow from block 9872 to block 9876. If block 9866 determines button 10056 was not selected, then processing continues to block 9868. If block 9868 determines button 10064 was invoked from action data evidence passed from the form, then block 9870 determines the "View Reports" privileges (Groups Table, PingPal Privilege Assignment Table, Registry Table, Users Table) assigned to the user of FIG. 100D (as passed by FIG. 39 access control processing). The "View Reports" privileges are determined with joins including device name(s) of group(s) entered to field 10058 or by a user (i.e. all user's devices) of OwnerID field(s) 6522 of device name(s) of group(s) entered to field 10058. Thereafter, block 9872 checks if one or more "View Report" privileges are assigned from each device of the comma delimited group names (i.e. group name field 8906) specified in entry field 10058, to the user of FIG. 100D (or from the owner of devices (of groups) specified to entry field 10058 to the user of FIG. 100D). If block 9872 determines a device id of group(s) specified in entry field 10058 has not granted the "View Report" privilege to the user of FIG. 100D, then block 9876 reports the error to the user of FIG. 100D and current page processing terminates at block 9882. Another embodiment can also report the failed search to the device id(s), or owner(s) of the device id(s) for indicating someone without privileges is attempting to do a search on their location search on their device. Yet another embodiment could include a new field in record 6500 (checked for at block 9876) for reporting such location search attempts made by an unauthorized user, or made from an unauthorized device.

If block 9872 determines all sought devices have granted privileges to the user of FIG. 100D, then block 9874 builds query(s) to the Trail Table (records 6800) for) for all record(s) found in range of the "Start:" date/time stamp and "End:" date/time stamp for each device for each device in the comma delimited group list (or single group specified) along with the translated geocoding information, a connection is opened to the database, the query(s) are performed and the database connection is closed. Thereafter, if block 9878 determines at least one device tracking record 6800 has been found, then block 9880 builds report output categorized by group, then by device, then by location(s), and block 9882 terminates current page processing.

If block 9868 determines button 10064 was not selected, then processing continues to block 9876 where action data evidence in error is reported to the user and processing terminates at block 9882. So, a historical report can be produced on a device, a list of devices, a group of devices, or a list of groups of devices, provided the "View Report" privilege has been granted by the sought device(s), or user(s) of the sought device(s). Because of the potentially large number of records 6800 involved in the above processing, another embodiment may completely process one query results before performing the next query in the list of queries to perform. The report generated at block 9880 is a single page suitable for all devices, however reductions in size are preferably made for reporting to WAP devices without eliminating desirable report information. Reported information includes records 6800 field data collected within the time range for the sought location(s). Preferably, there is an organized breakdown by device, location(s), and time. The report information is textual, preferably in tabular form. Another embodiment could provide the reports as spreadsheets, graphs, bar charts, or any reasonable reporting method.

Field 10054 is preferably a client side monitored data entry field for expanding the number of address areas 10052 of the form for processing by button 10056. Field 10054 determines how many additional address areas 10052 to add to the form. This enables the user to process a plurality of locations for reporting on the device(s) in the time range. Block 9860 will validate multiple address areas 10052 and block 9862 will geo-translate for multiple locations regardless of how specified. Field 10054 may require a function key to accept the value typed at field 10054 (as recognized by client side Javascript for example), or may activate as soon as field 10054 loses cursor focus. Other embodiments to address area 10052 may also be multiplied using the field 10054.

Field 10062 is preferably a client side monitored data entry field for expanding the number of address areas 10060 of the form for processing by button 10064. Field 10062 determines how many additional address areas 10060 to add to the form. This enables the user to process a plurality of locations for reporting on the group(s) of device(s) in the time range. Block 9860 will validate multiple address areas 10060 and block 9862 will geo-translate for multiple locations regardless of how specified. Field 10062 may require a function key to accept the value typed at field 10062 (as recognized by client side Javascript for example), or may activate as soon as field 10062 loses cursor focus. Other embodiments to address area 10060 may also be multiplied using the field 10062.

FIG. 98C depicts a flowchart for a preferred embodiment for processing the request to discover PingPal(s) providing privileges, for example upon selection of link 10024. Processing begins at block 9884 and continues to block 9886 where the ACCESS_LIST is set for authorized users. Thereafter, block 9888 performs FIG. 39 access control processing and continues to block 9890 where at least the PersonID of the user who clicked link 10024 is determined (passed from FIG. 30 access control). Another embodiment will determine the device id and device password that is in use either from the last interaction through the Delivery Manager 2510, or from authentication to web service 2102 with the device id and password. In another embodiment, device data evidence (fields 5072 and 5074) is used.

Block 9890 builds query(s) to the Server Data 2104 (e.g. PingPal Privilege Assignment Table, Groups Table, Registry Table, Users Table, and joins therefrom) to determine all privileges assigned to this user (of FIG. 98C) by his PersonID 3002 or any one of the user's devices (as determined by Owner field 6522), opens a DB connection, does the query(s), closes the DB connection, and iterates through rows returned (i.e. lists) to build an output page. Preferably the output page is built in an organized manner to show the users who have assigned which privileges, as well as the devices which have assigned which privileges to this user (of FIG. 98C), or any of this user's devices. Preferably only the LogonName(s) and device name(s) of the assignors are shown to this user. Other embodiments may additionally display any fields of records 2900, 3000, or 6500. Another embodiment may require new privilege(s) assignable between users and/or devices for how much information to share in the output built at block 9890. The new privileges would also be maintained in PrivMask field 8910 with processing and user interfaces as heretofore described. Thereafter, if block 9892 determines no privileges were found to be assigned to this user (of FIG. 98C), then block 9898 presents a none found page and processing terminates at block 9896. If block 9892 determines one or more privileges were found, then block 9894 presents the output page built at block 9890 containing who and which devices have assigned which privileges to this user (or this user's devices), and processing terminates at block 9896.

FIG. 99 depicts a flowchart for a preferred embodiment for processing the request to find nearby PingPal(s), for example upon selection of link 10022. Processing begins at block 9902 and continues to block 9904 where the ACCESS_LIST is set for authorized users. Thereafter, block 9906 performs FIG. 39 access control processing and continues to block 9908. Block 9908 builds a query to get this querying device's interest radius from record 6500 (field 6540). The query device's device id field 6504 is preferably data evidence maintained as the result of an authentication with device id and device password, as the result of activity with the Delivery Manager 2510, as the result of Access Control processing, or as stored with the link 10022 in a URL variable. The user can also explicitly provide the querying device id and password at a block 9907 for authentication. In another embodiment, device data evidence (fields 5072 and 5074) is used. In any case, block 9908 also queries Server Data 2104 (Registry Table, Users Table, PingPal Privileges Assignment Table, Groups Table, and joins therefrom) for all devices which have provided the "View Nearby Status" privilege (devices explicitly assigning the privilege as well as devices assigning the privilege by the user assigning all his devices with the privilege) to the querying device. In another embodiment, the interest radius is also determined for each of the devices which have granted the "View Nearby Status" privilege to the querying device. Block 9908 opens a DB connection, does the query(s), and saves the interest radius information. Thereafter, block 9910 builds query(s) to the Trail Table for the most recent record 6800 of the querying device as well as all devices which assigned the "View Nearby Status" privilege. Thereafter, block 9916 does the query(s) for all most recent locations of the devices, and block 9918 determines which row from the query(s) contains the querying device Trail Table (record 6800) row location information. Block 9918 also starts an output page for presentation to the querying user, for example to the querying device. All other rows (PingPal devices) are processed in a loop starting at subsequent block 9920. Block 9920 gets the next PingPal ("View Nearby Status" privilege assignor) device Trail Table (record 6800) row location information and block 9922 checks if the last PingPal device location information was processed. If block 9922 determines all PingPal devices were processed, then block 9912 completes any output page so far constructed, presents it to the user, and block 9914 terminates current page processing. If block 9922 determines that not all PingPal devices have been processed, then block 9924 compares the locations (e.g. compares fields 6804 and 6806 between the querying device and current loop iteration PingPal device using at least the interest radius of the querying device (user's device causing FIG. 99 processing)). Thereafter, if block 9926 determines the PingPal device is at a location within the interest radius of the querying device, then block 9928 builds the output page with the nearby PingPal device information and processing continues back to block 9920. If block 9926 determines, the PingPal device is not within the interest radius of the querying device, then processing goes directly from block 9926 back to block 9920 for the next PingPal device to check. Each PingPal device is a device found at block 9908 to have assigned the "View Nearby Status" privilege to the querying device.

In another embodiment, block 9908 may have queried interest radiuses of the PingPal devices so blocks 9924 and 9926 can check to see if the interest radiuses intersect relative to the device locations being compared. Depending on the embodiment, FIG. 99 processing finds PingPal devices which are nearby the querying device at the time of FIG. 99 processing by (see FIGS. 125A-C):

FIG. 125A-*comparing* the PingPal location 12502 to see if it is nearby the querying device location 12504 as determined by the interest radius 12506 of the querying device (i.e. check if PingPal device is at most within an interest radius distance of the querying device (i.e. using interest radius of querying device)); or FIG. 125B-*comparing* the PingPal location 12502 to see if it is nearby the querying device location 12504 as determined by the intersection of the interest radius 12506 of the querying device and interest radius 12508 of the PingPal device (i.e. check if PingPal device is at most within a distance to the querying device using both interest radiuses (i.e. using interest radius of querying device and PingPal device)); or FIG. 125C-*comparing* the PingPal location 12502 to see if it is nearby the querying device location 12504 as determined by the interest radius 12508 of the PingPal device (i.e. check if PingPal device is at most within an interest radius distance of the querying device (i.e. using interest radius of PingPal device))

In an optional embodiment for how to determine being nearby, the user interface of a block 9907 can interact with the user of FIG. 99 for specifying whether to use only the interest radius of the querying device, or only the interest radius of the PingPal device, or both interest radiuses for an intersection. While FIGS. 125A, 125B, and 125C depict devices not nearby each other, they do demonstrate the different embodiments for what is used to determine them being nearby. In the FIG. 125A example, if PingPal location 12502 was within interest radius 12506, then being nearby would be true. In the FIG. 125B example, if PingPal interest radius 12508 intersected with interest radius 12506, then being nearby would be true. In the FIG. 125C example, if querying device location 12504 was within interest radius 12508, then being nearby would be true.

In another embodiment, elevation field 6812 can be factored in for determining a nearby result. In a three dimensional embodiment, nearby would be determined in terms of three dimensional information maintained in the Trail Table for three dimensional information of records 6800. That way nearness is based on proximity of nearness in space. The interest radiuses 12506 and 12508 could be spheres in the three dimensional embodiment so the radius was in terms of three dimensional space. An interest radius of a device, regardless of embodiment, is referred to as a moving interest radius, a mobile interest radius, or a traveling interest radius. These references are used interchangeably because the devices are mobile and the interest radius is always relative to the current device location (situational location) at all times.

In a user friendly embodiment to each of the find interfaces described above, the PingPal devices which have assigned the necessary privileges could be determined when building the user interfaces (discussed in context of FIG. 63) so a dropdown would be provided for selecting the eligible devices (replacing entry fields 10002, 10008, 10036, 10040, 10050, and 10058). This would prevent a user from manually entering a device (or group) that is then processed for producing an error. Link 10024 could also be replaced with a user interface for a multiple selection dropdown to select which PingPals already determined as eligible are wanted to be checked for being nearby. In yet another embodiment, wildcard specifications can be specified to fields 10002, 10008, 10036, 10040, 10050, and 10058 for specifying a plurality with a single entry (e.g. Dept*, Jo*, d?d, or any wildcard specification and method (e.g. similar to wildcard characters "?" and "*" used in a DOS dir command)).

My PREFS

Other Preferences

With reference back to FIG. 50I, other actions are now described. Profile dropdown 5076 shows all profiles the user has defined up to the point of display of FIG. 50I. Dropdown 5076 is built when the page is constructed for presentation to the user. There is always a "Default" profile defined which contains parameters for customizing device(s) through a simple association of the profile to the device(s). The "View" button adjacent to "Device Profile(s):" and dropdown 5076 allows display of the profile selected in dropdown 5076 in an analogous manner to button 5062 displaying user account information. The neighboring "Manage" button is used in an analogous manner to a record manage option (e.g. via button 5064) heretofore described except the add interface is a copy interface launched from within the Manage user interface invoked from selecting the "Manage" button. The selection in the dropdown 5076 is managed, and a new profile can be created by copying an existing profile as a starter for then doing subsequent (editing) managing of it. The default profile is a read-only record 10100 for all devices in web service 2102. A user must copy that profile to a new name and then make desired edits. User interfaces for managing data records in web service 2102 are similar to the user interfaces launched from actions to FIG. 50I.

FIG. 101 depicts a preferred embodiment of a data record in the Profile Table. Profile table records 10100 each contain a single profile of information for a user device in the web service 2102. ProfileID 10102 is preferably a unique primary key automatically generated by the underlying SQL database system to ensure uniqueness when inserting a record 10100 to the Profile Table. Descr field 10104 contains a user entered character string description for the particular profile. Param1 field 10106 contains a reference to a field in record 6500 with an assigned value. Param2 field 10108 contains a reference to a field in record 6500 with an assigned value. DotDotDot field 10110 is a placeholder field for representing many fields like Param1 and Param2 so that any user configurable field of record 6500 can be referenced as a field in record 10100 for assigning some value to some field of record 6500. Depending on the embodiment, DotDotDot field 10110 is to be replaced by some number of record 6500 references (i.e. some number of Param1 fields) for automatically configuring record(s) 6500 of the user who assigns the profile to their device(s). DTCreated field 10112 contains a date/time stamp of when the record 10100 was created in (added to) the Profile Table. DTLastChg field 10114 contains a date/time stamp of when any field in the record 10100 was last modified. CIP field 10116 preferably contains an internet protocol (ip) address of the user's device that created the applicable data record 10100. The CHIP field 10118 preferably contains the ip address of the actual physical server of web service 2102 that created applicable data record 10100. CHName field 10120 preferably contains the host name of the physical server of web service 2102 that created applicable data record 10100, for example because web service 2102 may be a large cluster of physical servers. ChgrIP field 10122 preferably contains an internet protocol (ip) address of the user's device that last modified the applicable data record 10100. The ChgrHIP field 10124 preferably contains the ip address of the actual physical server of web service 2102 that last modified applicable data record 10100. ChgrHName field 10126 preferably contains the host name of the physical server of web service 2102 that last modified applicable data record 10100, for example because web service 2102 may be a large cluster of physical servers. Profile Table records 10100 provide a convenient method for automatically setting any fields of records 6500 without having to manage the records 6500 individually or as a list.

FIG. 102 depicts a preferred embodiment of a data record in the Profile Assignment Table. Profile Assignment Table records 10200 each define an association of a profile to a user's device 2540 of the web service 2102. RegistryID 10202 contains a joining field to a record 6500 RegistryID 6502. ProfileID 10204 contains a joining field to a record 10100 ProfileID field 10102. ProfileID 10204 is preferably a foreign key to ProfileID 10102. OwnerID field 10206 contains the PersonID 2902/3002 of the user who created the record 10200. DTCreated field 10208 contains a date/time stamp of when the record 10200 was created in (added to) the Profile Assignment Table. DTLastChg field 10210 contains a date/time stamp of when any field in the record 10200 was last modified. CIP field 10212 preferably contains an internet protocol (ip) address of the user's device that created the applicable data record 10200. The CHIP field 10214 preferably contains the ip address of the actual physical server of web service 2102 that created applicable data record 10200. CHName field 10216 preferably contains the host name of the physical server of web service 2102 that created applicable data record 10200, for example because web service 2102 may be a large cluster of physical servers. ChgrIP field 10218 preferably contains an internet protocol (ip) address of the user's device that last modified the applicable data record 10200. The ChgrHIP field 10220 preferably contains the ip address of the actual physical server of web service 2102 that last modified applicable data record 10200. ChgrHName field 10222 preferably contains the host name of the physical server of web service 2102 that last modified applicable data record 10200, for example because web service 2102 may be a large cluster of physical servers. Records 10100 (i.e. profiles) are viewed, deleted, modified, and copied to a newly created record 10100 (profile) for viewing, modifying, and deleting through the "Manage" button adjacent to dropdown 5076. There is always at least one record 10100 that is read-only upon installation of web service 2102 for defining a "Default" dropdown in all user's first encounter of FIG. 50I. The "Default" profile contains no referenced changes to record(s) 6500, and there is no record 10200 for assigning the "Default" profile to a device. The "Default" profile is provided for consistency with the user interface accessed through the "Manage" button for copying a profile to a newly created profile, and then making subsequent edits to it. Any of a particular user's profiles can be copied to make a newly named one for appearing in dropdown 5076.

Device dropdown 5066 is automatically populated when building the user interface of FIG. 50I for all of the user's devices defined at the time of FIG. 50I display. When the user has not yet created a device (record 6500), the dropdown is disabled (as shown). When dropdown 5066 is enabled with the user's device(s) thus far created (record(s) 6500), show button 5068 and assign button 5070 are also enabled. The user of FIG. 50I can select a device from the dropdown 5066 (Deviceid field 6504 displayed there), and select the show button 5068 to show the profile information currently assigned to the device (if any) by querying records 10100 and 10200 for the RegistryID 6502 associated to the dropdown selection. The user may also delete an assignment from within that assignment interface. Another embodiment will allow assigning multiple profiles to a device for a superset applying of values to record 6500 where any conflicts are reconciled by the latest DTLastChg field 10210 value which takes precedence when the same field 65*xx* is referenced more than once by multiple profiles for setting fields in a record 6500. Upon selection of a device in the dropdown 5066, assign button 5070 (when enabled) allows a user to assign one of his profile records 10100 to the device by inserting a record 10200. So, records 10200 are created (interface launched from button 5070) or deleted (interface launched from button 5068). In the preferred embodiment, assigning a record 10100 (assignment creates a record 10200) instantly updates all referenced physical fields 65*xx* values in the associated record 6500.

The user of FIG. 50I can also select a device from the dropdown 5066 (Deviceid field 6504 displayed there), and select the show button 5068 to show the indicators currently assigned to the device (if any) by querying records 7800 and 8200 for the Type field 8202 for device and RecID 8204 equal to the RegistryID 6502 associated to the dropdown selection (IndicID 8206 joined to IndicID 7802). The user may also delete an assignment from within that assignment interface. A user can assign multiple indicators to a device for a priority order as described above. Upon selection of a device in the dropdown 5066, assign button 5070 (when enabled) allows a user to assign one of his indicator records 7800 to the device by inserting a record 8200. So, records 8200 are also created (interface launched from button 5070) or deleted (interface launched from button 5068).

Device records 6500 can be assigned profiles and delivery indicators through use of buttons 5068 and 5070. In one embodiment, profiles are accessed when data values are needed for record 6500 in Delivery Manager 2510 processing described below, as through the data values were physically in the record. In another embodiment, assigning a profile instantly modifies the associated record 6500 appropriately so the record 6500 always reflects profile(s) which are assigned. Record 6500 descriptions below assume any one of these embodiments when described in terms of accessing fields from record 6500. Delivery indicators can be assigned to a user's device(s) for preferences of how to deliver an indicator when a delivery indicator is to be delivered in place of deliverable content. If a delivery indicator is set for a DCDB record 7000, and the device 2540 which is to receive deliverable content also has one or more delivery indicators assigned, then the device indicators take precedence. Delivery indicators contain a Criteria field 7808 which provide the user with the ability to specify criteria for matching to deliverable content records 7000 for delivering an indicator based on that match. The user can also control priority of indicator record matches with Ordr field 7806. Another embodiment may have the DCDB record indicator or PingSpot record indicator take precedence.

Device id entry field 5072 and device password entry field 5074 are provided by the user and match a Deviceid field 6504 and corresponding device password field 6506. Once that is entered, invoking the adjacent "View" button displays the device record 6500 like FIG. 66E. Invoking the adjacent "Modify" button displays the device record 6500 for modification processing like FIG. 66F and associated processing. Once either of the buttons is invoked for valid user specifications to fields 5072 and 5074, the device credentials (Deviceid field 6504 and device password 6506) are converted to device data evidence, and are defaulted automatically from device data evidence when building the (page) user interface of FIG. 50I at subsequent times. The device data evidence is also useful for associating all subsequent user interfaces with a RegistryID 6502 (a device) when the user uses the user interfaces of web service 2102. This may be used for automatically determining the device, in addition to the user, of web service 2102 interfaces for the purpose of privilege determination as described herein (e.g. find processing). The device data evidence is preferably a long term expiration for automatically defaulting to FIG. 50I between logons to the members area 2500. Buttons 5078 and 5080 are described below with descriptions for FIGS. 143A and 143B. Link 5082 was already described above. Link 5084 is identical in function to link 14098 of FIG. 140 which is discussed below.

FIG. 103 depicts a flowchart for a preferred embodiment for processing user preferred settings for automatically populating user interface variables, upon selection of the "Submit" button adjacent to fields 5086 through 5092. Records per page field 5086 sets rows per page (i.e. ROWSPERPG variable) data evidence used by record processing described above for determining how many records to display per page (e.g. FIGS. 57, 59A, 59B, 61E, 66D, 67A, 71C, 71G, 79B, 90B, and other similar record processing). COM port field 5088 sets the device GPS interface communications port data evidence for automatically defaulting in subsequently used pages "COM Port:" fields, for example in the members area 2500. Baud Rate field 5090 sets the device GPS interface baud rate data evidence for automatically defaulting in subsequently used pages "Baud Rate:" fields, for example in the members area 2500. Round field 5092 sets the round checkmark data evidence for automatically defaulting in subsequently used pages "Round:" checkmark fields, for example in the members area 2500. Fields 5088 through 5092 are used for setting defaults at entry fields to the right of button 7182 of DCDB and PingSpot user interfaces at the time of building the page (values will show as though typed in by the user). Fields 5088 and 5090 may also be used by the Delivery Manager 2510 and by the priming interface (FIGS. 75A and 75B) for automatic retrieval of a situational location, for example GPS coordinates.

Upon selection of the "Submit" button adjacent to fields 5086 through 5092, user preference data evidence processing begins at block 10302 and continues to block 10304 where the ACCESS_LIST is set for authorized users. Thereafter, block 10306 performs FIG. 39 access control processing and continues to block 10308. Block 10308 validates the user entries (if any) to fields 5086 through 5092 and then block 10310 checks if they were valid. If block 10310 determines the user specified values are valid, then block 10312 sets user preference data evidence (each are individually named data evidence as described above) for use with a long term expiration for each non-null value of fields 5086 through 5092, and then processing terminates at block 10316. If block 10310 determines a field is not valid, then block 10314 appropriately reports the error to the user, and processing terminates at block 10316. Blocks 10308/10310 preferably enforce a minimum and maximum value to field 5086, and fields 5088 and 5090 may be validated by attempting to connect to the specified port.

Filters Management

Filters Management component 2506 comprises the selectable Filters Maps option 4636 and Filters Specify option 4638 under Filters options category header 4634. Filters Management component 2506 is provided to users of full browsers for convenient filtering of records through all members area 2500 interfaces. Another embodiment will support filtering web server data 2104 to user interfaces of any device.

FIG. 105A is displayed as the result of selecting Filters Maps option 4636. FIG. 105A can also be the default page displayed when newly logged on to the members area 2500. FIG. 50I may also be the default page displayed when newly logged on, or any of the FIG. 46B options may be the default page depending on the particular user, user type, device, device type, and/or user preferences.

In one embodiment, a user preference option is provided to FIG. 50I for the user to select which option page is defaulted to after newly logging on to the members area 2500.

FIG. 105A provides a design link 10502 for selection by a user to see web service 2102 architectural design information. Availability of link 10502 preferably displays only when the user type is a Site Owner or Delegate. Delegates are to see this link for better understanding the web service 2102 without having to use it. Map dropdown 10504 is provided to the user for selecting from a plurality of maps in web service 2102 for user selection. FIG. 105A shows that there are currently only a Unites States and Texas map installed. Selectable maps from dropdown 10504 are preferably continents, countries, and states from around the world. Preferably the entire earth is accounted for with dropdown 10504 and selectable maps appear in sorted order and/or indented to show being contained in a higher order map. Selectable maps from dropdown 10504 should be relevant to server data 2104 so filtering at user interfaces makes sense. Other planets will have a different set of maps, or there may be many maps across a universe of coverage.

FIG. 104A depicts a flowchart for a preferred embodiment for processing a request for the Filters Maps option, for example upon selection of a particular map from dropdown 10504. Processing begins at block 10402 and continues to block 10404 where the ACCESS_LIST is set for authorized users. Thereafter, block 10406 performs FIG. 39 access control processing and continues to block 10408. Block 10408 determines which map was selected from dropdown 10504. Thereafter, block 10410 sets page filter data evidence to the map selected in dropdown 10504, block 10412 displays the selected map in a page such as FIG. 105B upon selecting the United States map, and the user interfaces to the map until a region on the map is selected at block 10414. FIG. 105B shows the page with the map of the United States upon selecting Unites States from dropdown 10504. Since the only other map currently installed in web service 2102 for the United States is the map of Texas, the state of Texas is highlighted for being a hot spot link to the Texas map. So, the user can select Texas directly from the dropdown 10504, or can drill down into subordinate maps from a map, for example by selecting the state of Texas from FIG. 105B. If the user clicks the state of Texas from the FIG. 105B page, then the page of FIG. 105C is presented to the user. Since web service 2102 currently contains server data 2104 in four counties of Texas, the user can select one of the highlighted hot spot link counties (Denton, Collin, Tarrant, and Dallas County) to further drill down to a county map. Every time a hotspot region is selected, the page filter data evidence is automatically set to the selection. When the mouse cursor is placed over a hotspot such as Texas on FIG. 105B, or one of the four counties of FIG. 105C, rollover text indicates what the region is (e.g. "Texas", "Denton County", "Collin County", "Tarrant County", and "Dallas County").

So, the user interfaces with the map at block 10414 until an action such as a geographic area hotspot link is selected. Upon selection, for example, Texas of FIG. 105B, block 10416 redirects the user to the corresponding map such as FIG. 105C, and current page processing terminates at block 10418. The map selected at block 10414 causing processing to block 10416 is presented to the user and FIG. 104A processing begins again at block 10402 for the selected map. FIG. 104A processing occurs whether a map is selected from the dropdown 10504, or from another map such as FIGS. 105B and 105C, etc. So, a user can automatically set page filter data evidence by simply making mouse selections for maps, or on maps.

A single data entry field is provided with a submit button upon selecting Filters Specify option 4638. The user may know exactly what server data 2104 filter to set, so can manually type a character string for manually setting page filter data evidence. Obvious syntactical and format errors are validated in the form, and if valid, the form is submitted for processing to FIG. 104B. This provides the user with a method for typing the string "Texas", "United States", "Denton County", etc for setting page filter data evidence to any territory desired without having to navigate maps. The user can also enter "NONE" for clearing page filter data evidence as though no filter criteria were ever set (or a clear filters button can be provided). FIG. 104B depicts a flowchart for a preferred embodiment of processing a request for the Filters Specify option. Processing begins at block 10452 and continues to block 10454 where the ACCESS_LIST is set for authorized users. Thereafter, block 10456 performs FIG. 39 access control processing and continues to block 10458. Block 10408 validates the string entered in the single entry field and preferably ensures it corresponds to current permitted filters, then block 10460 checks validity. If block 10460 determines the entry is valid, block 10462 saves the user specification to page filter data evidence, and block 10466 terminates current page processing. If block 10460 determines the filter data entry was not valid, then block 10464 appropriately reports the error to the user and processing terminates at block 10466.

There may be other embodiments for setting page filter data evidence for filtering out server data 2104 before it is presented to a user interface of web service 2102. Page filter criteria set in the page filter data evidence is preferably displayed in a filter display field (e.g. field 5040) at the top of a relevant page of web service 2102 so the user knows what is currently set. Page filter data evidence is used when building the particular page. For example, FIGS. 46B, 50A, and 50G at top of content frame 4698 indicates that current page filter data evidence is set to United States (i.e. "Active Filter(s): US"). FIG. 50A also shows page filter data evidence set for United States. FIGS. 56A, 56B, 56C, 56D, 66C and 71B indicate no page filter data evidence which means the search interfaces do not have the filter criteria automatically amended to the search criteria. FIGS. 66A, 71A, 90A, 105A, 105B, 105C are also informative uses of the page filter data evidence. Page filter data evidence automatically becomes part of search interface criteria, and can be used to automatically set location information of records in web service data 2104.

Debug Variables option 4670 is preferably presented to only a Site Owner for display of all data evidence of web service 2102 which is persistent between all pages of web service 2102. Variables for debug output of web service 2102 which provide web service vital signs are output upon selection of option 4670. Support and Download option 4668 provides support and download options to users, provided they are paying customers. Support may involve a Contact interface (described above), email address, and phone number for human help. Human help is not required in web service 2102 because it is fully automated and does not require a human being to operate it. Support is preferably offered to paying customers for customer satisfaction. Download options may also be presented (preferably to the paying customers) in the form of web service 2102 documentation, directional information, and software executables and drivers for distribution.

Delivery Manager

Delivery Manager component 2510 comprises the selectable Delivery Start option 4660, Delivery User Specified Location Start option 4662, and Delivery Configurator option 4664 under Delivery options category header 4658. Delivery Manager options are available to users through a user interface or from a command line (e.g. URL). Every user interface to the Delivery Manager component 2510 can be bypassed in favor of using a URL command line string to the associated processing instead. One embodiment of web service 2102 allows replacing any members area 2500 user interface with some URL command line string. For example, FIG. 106A can be replaced with the following string to the same processing:

```
https://www.gpsping.com/MCD/zdeliv.asp?i=billj&p=billj123&x=
4&y=4800&mw=60000&gr=5000&sr=1000&1=-500&h=0
```

The "i" parameter is a DeviceID 6504. The "p" parameter is a device password field 6506. The "x" parameter is the GPS port, for example as set at field 10608. The "y" parameter is the GPS port baud rate, for example as set at field 10610. The "mw" parameter is the maximum wait timeout for interfacing to the GPS port in milliseconds. The "gr" parameter is the GPS interface retry time period in milliseconds if an attempts failed to get coordinated from the GPS port. The "sr" is the server retry period in milliseconds, for example as set at field 10618. The "I" parameter is the search method to use for this device with −500 meaning an interest radius of 500 feet, for example as set at field 10614. The "h" parameter is the hide console checkmark, for example as set at checkbox 10612. Also, any data field of record 6500 can be overridden with a command line parameter, for example to override interests, filters, checkmark settings, SMS messaging and email address:

```
https://www.gpsping.com/MCD/zdeliv.asp?i=billj&p=billj123&x=4&y=
4800&mw=60000&gr=5000&sr=1000&1=5&h=0&q=
basketball,soccer,baseball,football,tennis,swimming&f=
ballet,volleyball,golf&e=NYNNN&m=billj@iswtechnologies.com,
billj@iswtechnologies.com
```

The maximum wait timeout, and GPS retry time period are preferably system wide settings of web service 2102, but can be customized in some embodiments by a user for a particular GPS interface. There are varieties of methods for providing URL parameters to processing, just as a form would communicate parameters for its processing. One VBScript ASP embodiment for supporting user interfaces and/or URL command line strings in all processing is to do the following for each parameter needed:

```
'Check if passed by form submission 1st, otherwise check if passed
from URL cmd line param = Request.Form("paramFromForm")
if (param = "") then
        param = Request.QueryString("ParamFromURL")
end if
```

URL parameters will override any form variables that happen to be found for a duplicated variable. Another embodiment can override URL parameters with form variables that happen to be found.

FIG. 39 access control processing used in Delivery Manager 2510 processing can also require at least one previous successful logon to web service 2102 with logon data evidence made available (user account credentials used), however a preferred embodiment requires only a successfully validated set of device credentials. Preferably, Delivery Manager 2510 FIG. 39 access control processing references below should use successful device credential data evidence used successfully to match to a record 6500 Deviceid field 6504 and device password field 6506. That is all that is preferably required for access control so that device users need not have a user account to web service 2102. Consider all references to FIG. 39 access control in Delivery Manager 2510 descriptions below as requiring at least one successful authentication to web service 2102 with device credentials.

FIG. 63 depicts a flowchart for a preferred embodiment of carrying out processing for presenting a web service user interface form in the members area and then processing user specifications to the interface prior to submitting to the service for further processing. For Delivery Manager user interface discussions, FIG. 63 is invoked upon selection of a link or button to produce a page. Processing starts at block 6302 and continues to block 6304 where the ACCESS_LIST is set for authorized users. Thereafter, block 6306 performs FIG. 39 access control processing and continues to block 6308. Block 6308 builds and presents an appropriate user interface according to the link invoked, and then a user interfaces with that user interface at block 6310 until an action (or button) from the user interface is invoked. When an action is invoked by the user, block 6312 validates user field specifications to the user interface (if a button invoked), and block 6314 checks the results. If block 6314 determines the fields are valid (and can be submitted for processing), then block 6318 invokes the corresponding user interface processing, and current page processing terminates at block 6316. If block 6314 determines that not all fields specified are valid, then block 6320 provides an error to the user so that specification can continue back at block 6310 (e.g. pop-up).

Delivery Manazer—Automated Situational Location Determination

FIG. 106A depicts a preferred embodiment screenshot for starting a browser version of the Delivery Manager 2510, for example upon selection of Delivery Start option 4660. FIG. 63 can also be described in context for producing FIG. 106A, as discussed similarly for other members area 2500 user interfaces. The user interfaces at block 6310 for FIG. 106A. FIG. 106A shows what is preferably displayed to a full browser device or PDA device, however, WAP devices can have a similar interface. Link 10602 is an actual link to an executable run time library which provides a Active-X GPS interface (e.g. Javascript) to heterogeneous computing devices so that a programmer can write code to ready made interfaces for retrieving or receiving GPS information from connected GPS information means. One embodiment uses tools provided at GPS Tools link 10602 (http://franson.biz/gpstools/GpsToolsXPRunTime.zi). Link 10602 is presented to the user depending on his device type. For example, a PDA would have a different URL for a PDA device detected, and a WAP device would have different link depending on the WAP device type. GPS tools link 10602 is built with the page (by FIG. 63) according to the device type detected and provides the user with the ability to download and install needed runtime code (if does not have installed already on the device) so Delivery Manager 2510 operates properly. In one embodiment, FIG. 63 automatically detects if the needed runtime code is already installed for the device and only provides link 10602 with directions if the code or needed executable is not present, otherwise no link 10602 is provided to the user.

Each device of web service 2102 (record 6500) has its own credentials for authentication to the members area 2500 so that a user account can manage many devices without requiring the user of a device to have a user account. The Deviceid field 6504 is specified to device id validation entry field 10604. The device password field 6506 is specified to device password validation entry field 10606. Device data evidence, if available, is defaulted to fields 10604 and 10606. Device GPS interface communications port data evidence is used to default GPS port entry field 10608, otherwise the user enters it manually. Device GPS interface baud rate data evidence is used to default the GPS port baud rate entry field 10610, otherwise the user enters it manually. Hide console checkbox 10612 is used to set the Delivery Manager 2510 console for full view or partial view. The user can set his device mobile interest radius in the form for override of IntRadius field 6540 if desired. Interest radius units dropdown 10616 provides a selection of units, the number of which is entered to interest radius entry field 10614. FIGS. 125A through 125C shall be discussed in context for discussing a mobile interest radius and hit radius of deliverable content items. Deliverable content and PingSpots defined as records 7000 can be configured as a situational location 12502, and the device is a mobile device situational location 12504 with a relative moving interest radius 12506 (also called interest radius, mobile interest radius or traveling interest radius). When the mobile device travels to a situational location where situational location 12502 is within radius 12506 distance to situational location 12504, the deliverable content item triggers for delivery to the device at situational location 12504. In another embodiment, deliverable content and PingSpots defined as records 7000 can be configured as a situational location 12502 with a hit radius 12508, and the device is a mobile device situational location 12504 with a relative moving interest radius 12506. When the mobile device travels to a situational location where hit radius 12508 intersects with moving interest radius 12506, deliverable content item triggers for delivery to the device at situational location 12504. In another embodiment, deliverable content and PingSpots defined as records 7000 can be configured as a situational location 12502 with a hit radius 12508, and the device is a mobile device situational location 12504. When the mobile device travels to a situational location where situational location 12504 is within radius 12508 distance to situational location 12502, the deliverable content item triggers for delivery to the device at situational location 12504.

The user can set how often the web service is to check for deliverable content on his behalf (a device heartbeat) in time frequency. Server check frequency units dropdown 10620 provides a selection of units, the number of which is entered to server check frequency entry field 10618. In one embodiment device heartbeats are sent from the device to the web service 2102 periodically according to the server check frequency. In another embodiment device heartbeats are handled completely at the web service 2102 on behalf of the device and periodically according to the server check frequency. In another embodiment device heartbeats are sent from a location service 2112 to the web service 2102 periodically on behalf of the device according to the server check frequency. Each heartbeat contains situational location information of the device at that instant in time. Fields specified to FIG. 106A can become data evidence for automatic default to the same fields at a future invocation for FIG. 106A. Once the Start button 10622 is selected, block 6318 performs Device Interface processing of FIG. 112 (Delivery Manager start).

FIG. 106B depicts a preferred embodiment screenshot for the interest radius units dropdown 10616 of the interface for starting the Delivery Manager. Convenient distance units are provided to dropdown 10616 and a reasonable maximum value is enforced at field 10614 depending on the units selected. Regardless of units and amount selected, ultimately a distance in system used universal units (e.g. feet) is used by processing. FIG. 106C depicts a preferred embodiment screenshot for the server check frequency units dropdown 10620 of the interface for starting the Delivery Manager. Convenient time units are provided to dropdown 10620 and a reasonable maximum value is enforced at field 10618 depending on the units selected. One embodiment could enable setting a specific schedule of specific times instead of periodic heartbeat intervals.

FIG. 107 depicts a preferred embodiment of a data record in the Delivery History Table. Records 7000 that are delivered to a device are maintained in the Delivery History Table as records 10700. DCDBID 10702 contains a valid DCDBID 7002 value for the content item that was delivered to the device of RegistryID 10704. RegistryID 10704 contains a valid RegistryID 6502 value for the device the record 7000 represented in field 10702 was delivered to. Type field 10706 can be set to "A" for Archive, or "M" for Master. An Archive record is one that has been delivered to the device (delivery history) and selected for save by a user to an Archive History. A Master record is one that has been delivered to the device (delivery history) and is maintained in the active set of deliveries not yet acted upon by the user for deletion or archive. LastHit field 10708 contains a date/time stamp of when the record 7000 described at field 10702 was last (most recently) delivered to the device represented at field 10704. Field 10708 always reflects the latest delivery of the same content item for cases when the content item has been delivered multiple times to the device. In one embodiment, DCDBID 10702 maps to a record 7000 which can be modified at any time in the future. In another embodiment, DCDBID 10702 maps to a record 7000 which is not modified at any time in the future after insertion of record 10700 to the Device History Table. LastHit field 10708 preferably indicates the last time the particular deliverable content item was delivered when marked for Master. LastHit field 10708 preferably indicates the last time the particular deliverable content item was delivered just prior to being last archived when marked for Archive.

FIG. 110A depicts a preferred embodiment screenshot for modifying a Registry Table record 6500. A device with the device id "billj" has tracking to the Trail Table enabled, interests set to "estate sale", "garage sale" and "sale", a movement tolerance of 0, a default interest radius of 500 yards (which can be overridden at Delivery Manager Start time, a default service 2102 search method of "BY USER" (search using a moving interest radius in feet (converted from convenient units, for example from FIG. 106A to feet), browser receipt set to Yes, SMS message set to Yes, SMS address set to 2144034071@messaging.nextel.com, Email receipt set to Yes, email address set to williamjj@yahoo.com, and Verbose set to Yes. So this device has all three delivery methods set for delivering redundantly rather than any one, or two of the methods.

Every device of web service 2102 can be associated with a history of deliverable content records 7000 which were selected for save to an archive by the user. Link 11002 preferably contains data evidence such as a URL variable for specifying Archive ('A') as well as the RegistryID of the FIG. 110A record 6500 (built in link as URL parameters as result of building FIG. 110A page). FIG. 108 processing will invoke upon selecting link 11002 for the user to manage the device Archive.

FIG. 108 depicts a flowchart for a preferred embodiment of processing for requesting to manage an Archive or Master for a particular device in web service 2102. Upon selection of link 11002, FIG. 108 processing is for device archive processing. Processing starts at block 10802 and continues to block 10804 where the ACCESS_LIST is set for authorized users. Thereafter, block 10806 performs FIG. 39 access control processing and continues to block 10808. Block 10808 initializes an ENTRY_VIEW variable to Master, block 10810 determines the invoking page and RegistryID data evidence (device/browser type is already assumed to be determined for all user interfaces disclosed since heterogeneous devices are handled in web service 2102, and border 5050 surrounds and identifies a user interface area regardless of the heterogeneous device type, as described above), and block 10812 checks data evidence for Device History type (Archive or Master). If block 10812 determines FIG. 108 was invoked for Archive processing (e.g. as result of links 11002 or 12804), then block 10834 sets the ENTRY_VIEW variable to Archive and continues to block 10814, otherwise FIG. 108 processing was invoked for Master processing (e.g. by link 12802) and block 10812 continues directly to 10814 with the ENTRY_VIEW variable already set for Master.

Block 10814 builds a query for records 10700 joined to records 7000 for the particular device of FIG. 108 processing (RegistryID 6502 passed as URL variable from link for match to field 10704) that are ENTRY_VIEW type records (field 10706 set to "A" for Archive or "M" for Master), opens a DB connection, and does the query. Block 10814 also reads a user customizable Master or Archive page (see FIG. 143A or 143B for a ready made HTML page which gets edited and presented back to the user as a page from FIG. 108) into a template variable according to ENTRY_VIEW, and sets html styles of the template while in the template variable according to the device (or browser) type. An alternate embodiment will not modify styles but will leave whatever the user edited into the Master or Archive page. Thereafter, block 10838 checks if any rows were returned by the query at block 10814. If block 10838 determines no rows were returned, then a page is built for the user for 0 delivery history records status at block 10836, and processing continues to block 10830. Block 10830 closes any open DB connection, completes building the user interface page and presents it to the user, and current page processing terminates thereafter at block 10832. If block 10838 determines there were one or more joined rows returned from block 10814, then block 10816 strips off page termination information from the page in the template variable (i.e. "</body></html>"), strips off the sound element (i.e. "<embed . . . />") from the template variable if FIG. 108 was invoked for Archive or Master management processing (e.g. as the result of links 11002, 12802, and 12804), builds the top of the page to return to the user using the post-edited contents of the template variable, builds the "Select Delivery Range" time criteria section 11052 (see FIG. 110B), and builds the table header columns 11054. Block 10816 keeps the sound element for output to the content delivery section 13002 for user alerting to new content. Thereafter, block 10818 checks if the invoker of FIG. 108 processing is for manage the device's Archive (e.g. links 11002), or manage the device's Master (e.g. link 12802) processing. If so, then block 10820 iterates through rows returned from the query at block 10814 to build a page row such as row 11056 along with a checkmark box with associated hidden DCDBID 10702 in the Select for Action column, and then block 10822 checks the ENTRY_VIEW variable. If the ENTRY_VIEW variable is set to Master, then block 10824 builds Archive button 13096 and Delete button 13098 (FIG. 130C), and then continues to block 10830 for processing already described. If block 10822 determines the ENTRY_VIEW variable is set to Archive, then block 10826 builds the Save offline button 11058 and Delete button 11060, and processing continues to block 10830. Blocks 10824 and 10826 will make the buttons read-only actions for a Delegate user type to FIG. 108 processing (e.g. no-operation or an error pop-up that it is read-only).

If block 10818 determines the invoker of FIG. 108 is not for managing a device's Master or Archive (links 11002 and 12802), then block 10828 iterates out rows/records with no checkboxes and processing continues to block 10830. Block 10828 executes for Delivery Manager invoked Archive view (link 12804) or browser deliveries (section 13002). Link 12804 results in, for example, as shown in FIGS. 128C and 131. Link 21804 preferably provides a read-only access to the device Archive since device credentials are used for the Delivery Manager. The preferred embodiment requires a logon to web service 2102 with user account credentials to save archived deliveries offline or delete from archive (link 10002). Block 10828 also iterates out rows/records when displaying content deliveries as shown in content delivery section 13002 of FIGS. 130A, FIGS. 134B, and 136A.

FIG. 108 is invoked for managing a device Archive (e.g. links 11002), managing a device Master (e.g. link 12802), viewing a device archive from the browser version of the Delivery Manager (e.g. device archive management link 12804), or may be used for viewing results of deliverable content to the browser version of the Delivery Manager (content delivery section 13002). The invoker is determined at block 10810 to affect subsequent processing. FIG. 108 processing uses ready-made HTML page output for sending back to the user, such as in FIG. 143A (a device master output page template), and FIG. 143B (a device archive output page template). Every device created in web service 2102 has two default pages created for it: a Master page of FIG. 143A, and an Archive page of FIG. 143B. In one embodiment, the two default pages are created as unique files in a file system of web service 2102 for every device created in the web service 2102. Uniqueness can use the RegistryID 6502 as part of the file name to ensure uniqueness (e.g. m243.asp and a243.asp were 243 is the value for RegistryID 6502 of the device). The default template page is accessed at block 10814 and read into a template variable for editing prior to amending with output for sending back to the user. In another embodiment, the Master page and Archive page are created as character string data in an SQL database Table for SQL selection at block 10814 into the template variable for editing prior to amending with output for sending back to the user. The <embed . . . /> tag is included in the Master default output page (FIG. 143A) so audible sound plays upon a new delivery to the browser version of the Delivery Manager. Sound is stripped off when not needed. In one embodiment, a unique template page is provided for managing a device Master, managing a device Archive, viewing a device Archive, and presenting deliveries to the user with a sound alert (device Master used for real-time deliveries).

With reference now to FIGS. 50I, 143A and 143B, a user can edit a Master or Archive page for any of his devices to contain any HTML he wants. Editing a device Master is performed upon selection of personalize Master button 5078. Selecting button 5078 launches a web service configurable and device dependent text editor on the Master page for the device data evidence set at fields 5072 and 5074. If no device data evidence yet exists, then an error is reported to the user of button 5078. Once the device Master is brought up in an appropriate text editor for the device, the user can edit it any way he wants it. Likewise, editing a device Archive is performed upon selection of personalize Archive button 5080. Selecting button 5080 launches a web service configurable and device dependent text editor on the Archive page for the device data evidence set at fields 5072 and 5074. If no device data evidence yet exists, then an error is reported to the user of button 5080. Once the device Archive is brought up in an appropriate text editor for the device, the user can edit it any way he wants it.

Another embodiment will provide an appropriate user interface upon selecting buttons 5078 or 5080 for selecting a device to personalize, and/or similarly customizing a device Master and Archive, or any separately maintained page for user preference presentation, when maintained in an SQL database. There are many conceivable embodiments for user customization of how to present content deliveries, a history of content deliveries, and an archive of content deliveries.

Button 5078 provides a user with customization of how to present deliverable content to his device and how to manage or view the Master. Buttons 5078 and 5080 provide a user with customization of how to present history information of deliverable content that was delivered to his device. Visual and/or audible customization can be performed. FIG. 143A shows what happens when the user has selected button 5078 from a full browser for current device data evidence with a RegistryID of 2. The Windows Notepad editor is launched for edit of the device's Master page template. FIG. 143B shows what happens when the user has selected button 5080 from a full browser for current device data evidence with a RegistryID of 2. The Windows Notepad editor is launched for edit of the device's Archive page template.

FIG. 109 depicts a flowchart for a preferred embodiment of Archive and Master processing as invoked from buttons (e.g. buttons 11058, 11060, 13096, 13098) of the user interfaces built and presented to the user by FIG. 108. Processing starts at block 10902 and continues to block 10904 where the ACCESS_LIST is set for authorized users. Thereafter, block 10906 performs FIG. 39 access control processing and continues to block 10908. Block 10908 initializes a PROCESS4 variable to Master, block 10910 determines the invoking page and RegistryID data evidence (device/browser type is already assumed to be determined for all user interfaces disclosed since heterogeneous devices are handled in web service 2102, and border 5050 surrounds and identifies a user interface area regardless of the heterogeneous device type, as described above), and block 10912 checks data evidence for Device History type (Archive or Master). If block 10912 determines FIG. 109 was invoked for Archive processing, then block 10930 sets the PROCESS4 variable to Archive and continues to block 10914, otherwise FIG. 109 processing was invoked for Master processing, and block 10912 continues directly to 10914 with the PROCESS4 variable already set for Master. Block 10914 validates parameters (buttons invoked, etc) and block 10916 checks the validity results. If block 10916 determines any form data evidence, for example from page built by FIG. 108 is not valid, then block 10932 appropriately reports the error to the user, and current page processing terminates at block 10948. If block 10916 determines all form data evidence is valid, then block 10934 opens a DB connection, and block 10936 checks the button selected by the user from the previous FIG. 108 produced user interface. If block 10936 determines the user selected a Delete button (buttons 11060 or 13098), then block 10918 iterates through check-marked rows to build a delete command. Thereafter, block 10920 checks to see if even a single row was check-marked. If block 10920 determines no rows were check-marked, then processing continues to block 10942. Block 10942 closes an open DB connection, then block 10944 sends an email to an Administrator account if any DB changes were made and if a Notify flag is set to document this type(s) of DB changes, block 10946 redirects the page back to the invoking page of FIG. 108 processing starting at block 10802 (with appropriate URL parameters), and current page processing terminates at block 10948. If block 10920 determines that row(s) were check-marked, then block 10922 does the delete command to delete records 10700 using hidden associated DCDBID(s) which were check-marked, and processing continues to block 10942 already described.

If block 10936 determines a Delete button was not invoked, then block 10938 checks to see if the user selected an Archive button (button 13096) for moving delivery history records from the device's Master to the device's Archive. If block 10938 determines an Archive button was selected, then block 10924 iterates through check-marked rows with the hidden associated DCDBID to build an update command and do the update for each row in the Device History Table. Records 10700 Type field 10706 is updated from "M" (Master) to "A" for Archive for each row check-marked, and any update failure is noted by putting the failed row DCDBID into a list. A failure may have occurred if the same content item (DCDBID) is already in the Archive (marked with "A). Thereafter, block 10926 checks to see if even a single row was check-marked. If block 10926 determines no rows were check-marked, then processing continues to block 10942. If block 10926 determines that row(s) were check-marked, then block 10928 builds an update command on the LastHit field 10708 of records 10700 which had a failed update at block 10924, and does the update with a current date/time stamp for denoting the last time the same records 10700 were archived. Thereafter, block 10928 uses the list of DCDBIDs built at block 10924 to build a delete command, and deletes records 10700 which failed update at block 10924 and have just been reflected as being moved again into the archive with the update command at block 10928. Thereafter, processing continues to block 10942.

If block 10938 determines an Archive button was not invoked, then block 10940 checks to see if the user selected a Save Offline button (button 11058) for saving delivery history records to a file, for example out of the server data 2104. If block 10940 determines a Save Offline button was selected, then block 10950 interfaces with the user for a valid file name specification, and the check-marked entries are saved to that file. Thereafter, processing continues to block 10942. If block 10940 determines a Save Offline button was not invoked, then processing continues to block 10942.

FIG. 109 provides processing from buttons 11058, 11060, 13096, and 13098 which are part of the user interface pages built by FIG. 108. A Delegate user type should not be able to cause FIG. 109 processing because the buttons are disabled or cause an error to be reported when the user is a Delegate.

FIG. 110B depicts a preferred embodiment screenshot for the presentation of Archive records, for example upon selection of link 11002. Past deliveries that have been archived by the user from the Master to the Archive are shown as the result of FIG. 108 processing. The user can delete check-marked entries from the Archive with button 11060 or save offline to a file with button 11058. Note that "Free Coffee and Free Mugs" and "Best Priced Gasoline" short text entries are currently in the Archive for the billj device.

FIG. 111 depicts a preferred embodiment screenshot of a list of DCDB records, for example upon managing a list of DCDB records 7000 as described above. Note that all DCDB records of the web service 2102 are now marked inactive (not active) for processing disclosed in subsequent Figures.

FIG. 112 depicts a flowchart for a preferred embodiment of Delivery Manager device interface processing, for example upon selection of 10622 or upon entry of an applicable URL command line string. Processing starts at block 11202 and continues to block 11204 where the ACCESS_LIST is set for authorized users. Thereafter, block 11206 performs FIG. 39 access control processing (successful device credential data evidence preferably checked for instead) and continues to block 11208. Block 11208 validates data evidence passed and block 11210 checks validation results. If block 11210 determines a value in data evidence (from form or URL string) is invalid, then block 11214 appropriately reports the error to the user, and current page processing terminates at block 11218. If block 11210 determines all data evidence is valid, then block 11212 converts user interface specifications to universal units (e.g. distance to feet, time to milliseconds) if required, block 11216 redirects to a frame set processing page (FIG. 113), and current page processing terminates at block 11218. Frames are somewhat more difficult to implement than a plain web page, so frames are presented here for the more difficult explanation of the browser version of the Delivery Manager, with the understanding that frames are not necessary and some devices will receive equivalent functionality pages as single pages.

FIG. 113 depicts a flowchart for a preferred embodiment of Delivery Manager frame set processing, for example as caused by block 11216. Processing starts at block 11302 from block 11216 or upon entry of an applicable URL command line string and continues to block 11304 where the ACCESS_LIST is set for authorized users. Thereafter, block 11306 performs FIG. 39 access control processing (successful device credential data evidence preferably checked for instead) and continues to block 11308. Block 11308 validates data evidence passed and block 11310 checks validation results. If block 11310 determines a value in data evidence (from form or URL string) is invalid, then block 11338 appropriately reports the error to the user, and current page processing terminates at block 11340. If block 11310 determines all data evidence is valid, then block 11342 determines if the invoker of FIG. 113 processing is for a user specified location instance of the Delivery Manager (e.g. invoked from FIG. 140 or 142B, or equivalent URL command line string), and if so, block 11312 gets the user specified location parameters (e.g. Latitude and Longitude) and then block 11336 completes parameter getting and setting based on the invoker. If block 11342 determines the invoker was not for a user specified location instance of the Delivery Manager (but rather an automated situational location determination instance of the Delivery Manager), then block 11344 gets parameters for interfacing to connected GPS functionality, for example as provided in FIG. 106A fields 10608 and 10610. Thereafter, processing continues to block 11336 to complete parameter getting and setting for automated location determination by the Delivery Manager. Block 11336 continues to block 11324 where the top of the Delivery Manager page frameset start is built, and then to block 11314 for checking device type.

If block 11314 determines the device (or browser) type is a PDA, then processing continues to block 11326. If block 11326 determines a Hide Console check-mark was present (e.g. checkbox 13812 of FIG. 138), then block 11328 builds a short header frame and processing continues to block 11334, otherwise block 11330 builds a tall header frame and processing continues to block 11334. Block 11334 completes the frameset for presentation of a header frame with all parameters, and initializes the remaining two frames with an initialization page (for a PDA if arrived to from blocks 11328 or 11330). Block 11334 starts page processing within each of the three frames (header frame presentation processing of FIG. 114A, initialization page processing of FIG. 115). Thereafter, current page processing terminates at block 11340. If block 11314 determines the device (or browser) type is not a PDA, then processing continues to block 11316. If block 11316 determines the device (or browser) type is for special handling, then block 11318 completes building of the frameset for the particular special device (or browser) type, and then to block 11334 as already described. For a WAP device, blocks 11324, 11318, and 11334 preferably build a single WML page for the special device type. If block 11316 determines the device type is not for special handling, then a full browser device is assumed and processing continues to block 11320. If block 11320 determines a Hide Console check-mark was present (e.g. checkbox 10612 of FIG. 106A), then block 11322 builds a short header frame and processing continues to block 11334, otherwise block 11332 builds a tall header frame and processing continues to block 11334. Block 11334 completes the frameset for presentation of header frame with all parameters for a full browser device if arrived to from blocks 11332 or 11322.

When FIG. 113 is complete, the user sees for example, the page of FIG. 128A at a full browser device for automatic GPS data collection, a pre-start button selection version of FIG. 138B at a PDA browser device for automatic GPS data collection, a pre-start button selection version of FIG. 137 at a full browser device for automatic GPS data collection (hide console check-marked), pre-start button selection version of FIG. 139 at a PDA browser device for automatic GPS data collection (hide console check-marked), and pre-start button selection version of FIG. 142A at a full browser device for a user specified location. One embodiment as described by FIG. 113 for each of FIGS. 128A, 138B, 137, 139, and 142A consists of three adjacent horizontal frames: a top frame containing a header page and associated processing, a middle frame containing no visual display for device heartbeat processing, and a bottom frame for displaying deliverable content from the device Master in real-time as content is delivered. Upon completion of FIG. 113, each frame contains a processing page which executes independently from processing in the other two frames. In one common usage, only the device heartbeat processing page needs to be invoked from a device, or from a location service 2112 on behalf of a device, or from an executable thread executing at web service 2102 on behalf of a device, for automating delivery of deliverable content to the receiving device. FIGS. 128A, 138B, 137, 139, and 142A are relevant when BrowseRcpt 6530 is set to Yes, otherwise deliveries can be made by SMS message (fields 6532, 6534), and/or email (fields 6536, 6538) which does not need a browser. Other embodiments will deliver deliverable content using other means from the web service 2102 to the receiving device (i.e. RDPS). Deliverable content can be of any type which includes audio, video, graphical, textual, multimedia, intranet/internet web address(es) activated for transposable selection, image, executable or any combination thereof, etc. CD-ROM file name "zdeliv.asp" provides an ASP program source code listing for an embodiment of FIG. 113 (without URL override parameters for overriding record 6500 fields). The user invoking FIG. 113 processing with a URL command line can specify override parameters for overriding any fields of record 6500 of the record 6500 fields found in FIG. 114A header processing.

FIG. 114A depicts a flowchart for a preferred embodiment of Delivery Manager header presentation processing, the processing loaded into the top frame as discussed for FIG. 113. Processing starts at block 11402 and continues to block 11404 where the ACCESS_LIST is set for authorized users. Thereafter, block 11406 performs FIG. 39 access control processing (successful device credential data evidence preferably checked for instead) and continues to block 11408. Block 11408 determines data evidence passed from FIG. 113, or from a URL command line string, specifically the invoker, and device id and password (device/browser type is already assumed to be determined for all user interfaces disclosed since heterogeneous devices are handled in web service 2102, and border 5050 surrounds and identifies a user interface area regardless of the heterogeneous device type, as described above). FIG. 114A appropriately presents the header page based on device (or browser) type. Thereafter, if block 11410 determines the invoker was for user specified location processing, then block 11412 gets the user specifications (e.g. latitude and longitude) and processing continues to block 11416. If block 11410 determines the invoker was for automated GPS information gathering, then block 11414 determines data evidence for interfacing to connected GPS information gathering means, and processing continues to block 11416.

Block 11416 determines data evidence for maximum wait timeout and GPS interface retry time period discussed above, server retry (e.g. from field 10618), search method(s) (e.g. field 10614), and the hide console checkbox (e.g. checkbox 10612). Server retry is the period of time between device heartbeats. Search method(s) are all the methods to be used for searching for deliverable content, for example from records 7000. While FIG. 106A shows an interest radius search method in use, a URL invocation of a Delivery Manager processing can specify any of the search methods discussed above for a record 6500 field 6542. Thereafter, block 11424 determines any command line override values for overriding any fields in record 6500, validates them, and processing continues to block 11426. If block 11426 determines any command line override is invalid, then block 11428 appropriately reports the error to the user and current page processing terminates at block 11434. If block 11426 determines any command line overrides found are all valid, then block 11418 builds a query to records 6500 for the Deviceid and password in passed data evidence, opens a DB connection, does the query, and closes the DB connection. Thereafter, if block 11420 determines no record 6500 was found for the specified device credentials (Deviceid field 6504 and device password field 6506), then processing continues to block 11428 for appropriate error handling and termination. If block 11420 determines a device record 6500 was found, then block 11430 sets header display fields according to record 6500 data and any overrides to apply. Block 11430 also sets a variable PGLOADED to false and LOADRETRIES to none. Then, the page display is presented in the header frame for user interaction, for example header frame pages 12852, 13852, 13752, 13952, or 14252. The user then interfaces to the header page at block 11432 until a processing action is detected to the header frame page in which case block 11422 does the user selected processing action and processing continues back to block 11432 for any further user action selections. The user interfaces with the header frame page which is the user control portion of the browser version of the Delivery Manager.

FIG. 114B depicts a flowchart for a preferred embodiment of Delivery Manager user interface action processing, such as that which is performed at block 11422. Block 11422 processing begins at block 11452 and continues to block 11454. If block 11454 determines the Start button (e.g. button 12806) was selected, then block 11466 performs Delivery manager start button processing and processing terminates at block 11478. If block 11454 determines the Start button was not selected, then block 11456 checks the Stop button action. If block 11456 determines the Stop button (e.g. button 12808) was selected, then block 11468 performs Delivery manager stop button processing and processing terminates at block 11478. If block 11456 determines the Stop button was not selected, then block 11458 checks the manage Master link selection action. If block 11458 determines the manage Master link (e.g. link 12802) was selected, then block 11470 performs Master/Archive Manager processing of FIG. 108 preferably spawned in a new window (e.g. target="_blank") with data evidence parameters for device RegistryID 6502 selected from block 11418, device/browser type determined, and flag to process the device's Master. Thereafter, current page processing terminates at block 11478. If block 11458 determines the manage Master link was not selected, then block 11460 checks if the manage Archive link was selected. If block 11460 determines the manage Archive link (e.g. link 12804 for view) was selected, then block 11472 performs Master/Archive Manager processing of FIG. 108 preferably spawned in a new window (e.g. target="_blank") with data evidence parameters for device RegistryID 6502 selected from block 11418, device/browser type determined, and flag to process the device's Archive. Thereafter, current page processing terminates at block 11478. If block 11460 determines the manage Archive link was not selected, then block 11462 checks if the filters/configs link (e.g. link 12810) was selected. If block 11462 determines the filters/configs link (e.g. link 12810) was selected, then block 11474 invokes a new Device configs window (e.g. target="_blank") containing additional device configuration information resulting from querying record 6500 and any overrides applied. The RegistryID 6502 selected from block 11418 is communicated to the spawned page. Thereafter, current page processing terminates at block 11478. If block 11462 determines the manage filter/configs link was not selected, then block 11464 checks if the Prime link (e.g. link 12812) was selected. If block 11464 determines the Prime link (e.g. link 12812) was selected, then block 11476 invokes the GPS port Primer in a new window (e.g. target="_blank"). Thereafter, current page processing terminates at block 11478. If block 11464 determines the Prime link was not selected, then block 11464 continues to block 11478 for block 11422 processing termination.

Block 11466 processing is described below with FIG. 116. Block 11468 processing is described below with FIG. 117A. Block 11470 was already described in FIG. 108 processing and results in a window such as FIGS. 128B, 130C, 130D, 136D, and 138C with associated processing. Block 11472 was already described in FIG. 108 processing and results in a window such as FIGS. 128C, 131, and 138D with associated processing. Block 11474 results in a window such as FIGS. 128D, 136B, and 138E. Block 11476 results in a window such as FIG. 75A with associated processing. CD-ROM file name "mcddchdr.asp" provides an ASP program source code listing for an embodiment of FIGS. 114A and 114B, as well as automated GPS data gathering processing.

FIG. 115 depicts a flowchart for a preferred embodiment of Delivery Manager initialization page processing, for example as loaded into middle and bottom frames at block 11334. Processing starts at block 11502 and continues to block 11504 where the ACCESS_LIST is set for authorized users. Thereafter, block 11506 performs FIG. 39 access control processing (successful device credential data evidence preferably checked for instead) and continues to block 11508. Block 11508 determines the device (or browser) type and then block 11510 displays the initialization page (e.g. 12854, 13854) corresponding to the device (or browser) type. Thereafter, processing terminates at block 11512. CD-ROM file name "zdinit.asp" provides an ASP program source code listing for an embodiment of FIG. 115.

FIG. 116 depicts a flowchart for a preferred embodiment of Delivery Manager start button processing of block 11466. Processing starts at block 11602 and continues to block 11604 where automated GPS interface timeout over a number of retries is checked (uses maximum wait timeout). If block

11604 determines the maximum number of automated GPS interface retries is exceeded, then block 11616 performs Delivery Manager stop receipt processing, and block 11622 sets a variable GPSNUMRETRIES=None. Block 11622 also notifies the user of a GPS port error, for example with a pop-up. Thereafter, processing terminates at block 11626. If block 11604 determines the maximum number of retries is not exceeded, then block 11606 checks if processing page load retries (PGLOADRETRIES variable exceeding a maximum value) has been exceeded (processing page loaded implies a device heartbeat processing was completed). If block 11606 determines the processing page load retries was exceeded, then block 11618 performs Delivery Manager stop receipt processing, and block 11624 sets the variable PGLOADRETRIES=None. Block 11624 also notifies the user of web service 2102 error, for example with a pop-up (e.g. device heartbeat processing taking too long to complete and load page in lower frame). Thereafter, processing terminates at block 11626. If block 11606 determines the maximum number of processing page load retries is not exceeded, then block 11608 checks if the automated GPS interface has already been started. If block 11608 determines the automated GPS interface has already been started, then block 11620 notifies the user with an error that automated GPS data retrieval has already been started, and processing terminates at block 11626. If block 11608 determines the automated GPS data retrieval has not already been started, then block 11610 sets the GPSNUMRETRIES variable to Starting, and then block 11612 performs Delivery Manager start receipt processing. Thereafter, block 11614 spawns a GPS Get Fix thread for execution, and FIG. 116 processing terminates at block 11626. Depending on the embodiment, the GPS get fix thread spawned at block 11614 can be executed local to the device (at RDPS), at web service 2102, or executed at any other data processing system in communications with web service 2102. FIG. 116 blocks may include a protocol with a remote data processing system for managing its processing remote from the device. In some embodiments, starting the Delivery Manager can automatically start automated GPS data gathering at the device, at the web service 2102, or any data processing system in communications with web service 2102. CD-ROM file name "mcddchdr.asp" provides an ASP program source code listing containing an embodiment of FIG. 116 wherein device heartbeats are initiated by the device to the web service 2102 after interfacing automatically to locally connected GPS data retrieval means.

FIG. 117A depicts a flowchart for a preferred embodiment of Delivery Manager stop button processing of block 11468. Processing starts at block 11702 and continues to block 11704. If block 11704 determines that automated GPS data gathering processing is already stopped, then block 11706 notifies the user with an error that the Delivery Manager is already stopped, for example with a pop-up, and FIG. 117A processing terminates at block 11716. If block 11704 determines automated GPS data gathering processing is not already stopped, then block 11708 prompts the user with a confirmation pop-up asking if the user is sure he wants to stop, then block 11710 checks for the user's response. If block 11710 determines the user does want to stop automated GPS data gathering processing, then block 11712 does Delivery Manager stop receipt processing, block 11714 sets the GPSNUMRETRIES variable to None if its value does not already exceed the maximum, and sets the PGLOADRETRIES variable to None if its value does not already exceed the maximum. Thereafter, FIG. 117A terminates processing at block 11716. If block 11710 determines the user selected not to stop processing, then block 11716 terminates FIG. 117A processing. FIG. 117A blocks may include a protocol with a remote data processing system for managing its processing remote from the device. In some embodiments, stopping the Delivery Manager can automatically stop automated GPS data gathering at the device, at the web service 2102, or any data processing system in communications with web service 2102. CD-ROM file name "mcddchdr.asp" provides an ASP program source code listing containing an embodiment of FIG. 117A wherein device heartbeats are initiated by the device to the web service 2102 after interfacing automatically to locally connected GPS data retrieval means.

FIG. 117B depicts a flowchart for a preferred embodiment of Delivery Manager start receipt processing, for example at block 11612. Processing starts at block 11732 and continues to block 11734 where the GPS interface is enabled, then to block 11736 where the header page in the header frame is updated for "Delivery: Enabled" status, and processing terminates at block 11738. In some embodiments, FIG. 117B may be performed in part or whole at the device, at the web service 2102, or any data processing system in communications with web service 2102. CD-ROM file name "mcddchdr.asp" provides an ASP program source code listing containing an embodiment of FIG. 117A wherein device heartbeats are initiated by the device to the web service 2102 after interfacing automatically to locally connected GPS data retrieval means.

FIG. 117C depicts a flowchart for a preferred embodiment of Delivery Manager stop receipt processing, for example block 11712. Processing starts at block 11762 and continues to block 11764 where the GPS interface is disabled, then to block 11766 where the header page in the header frame is updated for Delivery Disabled ("Delivery: Not Enabled") status, and processing terminates at block 11768. In some embodiments, FIG. 117C may be performed in part or whole at the device, at the web service 2102, or any data processing system in communications with web service 2102. CD-ROM file name "mcddchdr.asp" provides an ASP program source code listing containing an embodiment of FIG. 117A wherein device heartbeats are initiated by the device to the web service 2102 after interfacing automatically to locally connected GPS data retrieval means.

FIG. 118 depicts a flowchart for a preferred embodiment of Delivery Manager processing for automatically determining situational location parameters, for example GPS parameters, for example processing of the executable thread spawned at block 11614. Processing begins at block 11802 and continues to block 11804. If block 11804 determines the GPS data gathering interface is not started/enabled, then block 11816 updates the header page in the header frame for Delivery Disabled ("Delivery: Not Enabled"), and FIG. 118 processing terminates at block 11818. If block 11804 determines the GPS data gathering interface is started, then block 11806 increments a GPS get fix retry count. Thereafter, if block 11808 determines the GPS get fix retry count exceeds a reasonable maximum, then processing terminates at block 11818. If block 11808 determines the GPS get fix retry count does not exceeds a maximum, then block 11810 gets GPS fix information from the GPS interface (preferably a timeout value is passed so block 11810 is returned to after the timeout). Thereafter, if block 11812 determines no fix information was returned, then block 11820 spawns another GPS get fix processing thread of FIG. 118 to execute in a reasonable retry time period (GPS retry time period) and current FIG. 118 thread processing terminates at block 11818. If block 11812 determines GPS information was successfully returned, then block 11814 converts the latitude and longitude to a usable format, and for display. Thereafter, block 11832 invokes again the GPS interface for movement information (e.g. heading and speed), and block 11830 checks data retrieval success. If block 11830 determines the movement information was not received, then block 11828 sets direction, speed, and heading to 0, and processing continues to block 11824. If block 11830 determines the movement information was received, then block 11826 sets direction, speed, and heading accordingly, and processing continues to block 11824. An alternate embodiment can get all GPS information from block 11810.

Block 11824 sets a PGLOADED Boolean variable to False, prepares a command for invocation of the device heartbeat processing page, invokes the device heartbeat processing page with the command (for processing in the middle frame that has no visuals (e.g. between header page frame section 12852 and lower frame section 12854, or between header page frame section 13852 and lower frame section 13854), and gets the current date/time stamp. Thereafter, block 11822 updates the header page visuals in the header frame for this thread execution processing ending (date/time stamp, GPS information, etc), sets the PGLOADRETRIES variable to 0, and spawns a do_again( ) processing executable thread for the next device heartbeat to execute in the next server retry period of time (e.g. from field 10618). FIG. 118 current thread processing then terminates at block 11818. Block 11822 invokes the device heartbeat processing page with device record 6500 fields and the GPS information gathered. The next invocation of device heartbeat processing can not occur (i.e. FIG. 118 will not execute again for the particular device) until the previous heartbeat processing is complete as indicated when PGLOADED gets set to True by another executable thread (discussed below).

FIG. 118 thread processing may occur local to the particular device, at the web service 2102, or at any data processing system in communications with web service 2102. CD-ROM file name "mcddchdr.asp" provides an ASP program source code listing containing an embodiment of FIG. 118 wherein device heartbeats are initiated by the device to the web service 2102 after interfacing automatically to locally connected GPS data retrieval means.

FIG. 119 depicts a flowchart for a preferred embodiment of Delivery Manager do again processing, for example as spawned by block 11822. Processing begins at block 11902 and continues to block 11904. If block 11904 determines that automated GPS interface processing has already stopped, then block 11914 sets the header page of the header frame with Delivery Disabled ("Delivery: Not Enabled") status and FIG. 119 thread processing terminates at block 11918. If block 11904 determines the interface has not been stopped, then block 11906 increments the PGLOADRETRIES variable and block 11908 checks its value. If block 11908 determines the PGLOADRETRIES value exceeds a reasonable maximum, then processing continues to block 11914. If block 11908 determines the PGLOADRETRIES value is under the maximum (preferably configured for web service 2102), then block 11910 checks if the previous device heartbeat processing page is completed (i.e. is PGLOADED set to True?). If block 11910 determines the PGLOADED variable is set to True (i.e. previous device heartbeat processing page is completed), then block 11916 spawns a GPS Get fix thread of FIG. 118 for immediate processing, and FIG. 119 thread processing terminates at block 11918. If block 11910 determines the PGLOADED variable is still False, then block 11912 spawns another FIG. 119 processing thread for execution in the server retry period of time. Thereafter, current FIG. 119 thread processing terminates at block 11918. FIG. 119 thread processing may occur local to the particular device, at the web service 2102, or at any data processing system in communications with web service 2102. CD-ROM file name "mcddchdr.asp" provides an ASP program source code listing containing an embodiment of FIG. 119 wherein device heartbeats are initiated by the device to the web service 2102 after interfacing automatically to locally connected GPS data retrieval means.

FIG. 120 depicts a flowchart for a preferred embodiment of Delivery Manager heartbeat processing, also referred to as the device heartbeat processing page. Regardless of how a situational location is determined for a device, the situational location can be communicated as periodic device heartbeats to web service 2102. A device heartbeat is a communicated set of data from a device, or on behalf of a device, to the web service 2102. The heartbeat contains information including the device situational location at the time of the heartbeat along with fields from the device record 6500. The device may determine its own situational location, a location service 2112 may determine the device situational location, location service 2112 may be connected with means for locating device(s) (e.g. in-range sensing means), web service 2102 may determine the device situational location, or web service 2102 may be integrated with a service which determines the device situational location. Regardless of these embodiments, FIG. 120 processing preferably occurs for each device heartbeat that contains the device situational location. That situational location is used with respect to settings in the device record 6500, fields in any applicable processed records 7000, and records joined from the device record 6500 and applicable records 7000 to perform novel functionality of web service 2102. The user interface processing of FIGS. 112 through 119 and associated user interfaces are provided as a convenience for driving Delivery Manager 2510 processing. The requirement is that heartbeats with appropriate parameters are sent from devices, or on behalf of devices, to FIG. 120 processing regardless of how that is accomplished.

In one use of FIG. 120 processing, a device sends its situational location information and needed record 6500 fields with each heartbeat. The heartbeat is a periodic communication to (e.g. URL invocation of a page of) web service 2102. That heartbeat is used to search for applicable deliverable content, PingSpots, Pingimeter Alerts, etc according to configurations made on behalf of the device, the content, the web service 2102, and criteria of the heartbeat's situational location. A browser driven Delivery Manager is not required. FIG. 120 heartbeat processing can be invoked from any device as a URL according to configurations made at the device. The burden is put on the originator for invoking FIG. 120 processing with proper heartbeat parameters including an accurate situational location at the time the heartbeat is sent to web service 2102. FIGS. 112 through 119 have completed all the work necessary to drive a proper heartbeat for a device and are therefore provided for convenient web browser invocation. Any software developer aware of the URL to invoke FIG. 120 processing can easily develop to FIG. 120 specifications. For example, assuming an originator (e.g. device, web service 2102, or location service 2112) can determine the applicable device(s) situational location(s) in a timely manner, the originator need only know how to invoke FIG. 120 processing. The following URL is an example of invoking FIG. 120 heartbeat processing:

```
https://www.gpsping.com/MCD/g.asp?ad=33&am=1&as=12.78&ap=
N&od=97&om=4&os=58.9&oh=W&sp=0&d=0&1=-500&r=
2&t=1&q=basketball,soccer,baseball,football,tennis,swimming&f=
ballet,volleyball,golf&in=N&c=Y&e=NYNNN&m=
billj@iswtechnologies.com,billj@iswtechnologies.com
```

The parameters for latitude and longitude are "ad" (Lat degrees), "am" (Lat minutes), "as" (Lat seconds), "ap" (latitude pole), "od" (Long degrees), "om" (Long minutes), "os" (Long seconds), and "oh" (Long hemisphere). The "d" parameter is the direction as determined from heading (0 is any or unknown). The "sp" parameter is the speed (0 is not moving). Elevation hasn't been passed in this example, but can be. The "r" parameter is a valid handle returned to the device (e.g. RegistryID 6502) for the device doing the heartbeat. An alternate invocation of FIG. 120 processing is with the following URL:

```
https://www.gpsping.com/MCD/g.asp?a=33.3458&o=-97.34111&sp=
39&d=1&1=5&r=2&t=1&q=basketball,soccer,baseball,
football,tennis,swimming&f=ballet,volleyball,golf&in=N&c=Y&e=
NYNNN&m=billj@iswtechnologies.com,billj@iswtechnologies.com
```

The parameters for latitude and longitude are in signed decimal degrees ("a"=latitude in decimal degrees (33.3458), "o"=longitude in decimal degrees (−97.34111)). The speeds ("sp") is 39 MPH. Note the search parameter "1" specifies to use the search method of PRECISE_FULLSECOND as described above, and the direction "d" parameter specified a direction the device is moving is North.

Another embodiment may not use a URL invocation method, although using a URL method simplifies supporting heterogeneous devices to web service 2102. A binary packet protocol interface can be implemented between originators of heartbeats and FIG. 120 processing to prevent exposing performance to string parameter processing, and to prevent easily discernable interfaces for attackers. In another embodiment of URL invocation, the Deviceid field 6504 and device password field 6506 are provided instead of the RegistryID parameter ("r") for authentication at each heartbeat, otherwise someone could send anyone else's RegistryID which may cause integrity issues in server data 2104 of web service 2102.

Processing starts at block 12002 and continues to block 12004 where the ACCESS_LIST is set for authorized users. Thereafter, block 12006 performs FIG. 39 access control processing (successful device credential data evidence preferably checked for instead) and continues to block 12008. Block 12008 determines and validates data evidence passed from the device heartbeat containing the situational location and device record 6500 information (or enough information to query the record 6500 in another embodiment), block 12010 checks validation results. Preferably, FIG. 120 does little validation, if any at all, to ensure maximum performance of its processing. If block 12010 determines a value in data evidence (e.g. from URL string) is invalid, then block 12012 appropriately reports the error, and current heartbeat processing terminates at block 12014. If block 12010 determines all data evidence is valid, then block 12026 performs Delivery Share processing (FIG. 152). Thereafter, processing continues to block 12016 which determines the current date/time, builds a query to DCDB records 7000 (i.e. EntryType field 7004 set to 'D' for Deliverable Content Entry) matching the device heartbeat situational location information, opens a DB connection, and opens a cursor for fetching any records 7000 found (PingSpots are preferably not handled here since privileges are required, but can be. See block 12038 for PingSpot processing). Block 12016 matches all records 7000 which are configured with a matching situational location to the device situational location passed in the heartbeat to FIG. 120 processing. FIG. 120 thread execution occurs for each heartbeat of potentially millions of mobile devices 2540. FIG. 120 thread execution processing is asynchronous and simultaneous for all devices that need it. Another embodiment may integrate multiple heartbeat invocations of FIG. 120 in a single FIG. 120 execution to minimize the number of outstanding threads required to satisfy all mobile devices 2540 that communicate with web service 2102 at substantially the same time. The query built at block 12016 preferably seeks records 7000 with EntryType field 7004 set to 'D' and preferably uses at least fields 7008 through 7028 to match to the situational location of the device and the device's mobile interest radius configured for the device as described for FIGS. 125A through 125C. Fields 7026 and 7028 may be used "exclusive or" fields 7008 through 7022 since it is the same information in a different form. Another embodiment of records 7000 may include one set of fields 7026 through 7028 "exclusive or" fields 7008 through 7022. Block 12016 preferably also uses fields 7034 and 7036 along with any other record 7000 fields for the search. Another embodiment will also use field 7032 for matching the situational location of the device to the deliverable content as described for FIGS. 125A through 125C. Only active records 7000 are searched (i.e. field 7054 set to active). At least the device record 6500 fields 6516, 6518, 6540, and 6542 (unless overridden) are used in the search, the type of which is defined by field 6542 (unless overridden). Fields 6516 and 6518 may be checked after records are returned satisfying the situational location match first. Any fields of the device record 6500 may be used in matching to records 7000.

Block 12016 continues to block 12018. If block 12018 determines there were no records 7000 matching the situational location of the device, then processing continues to block 12038 described below. If block 12018 determines there are one or more records 7000 to process with the open cursor, then block 12020 builds arrays for strings of the interests field 6516 and filters field 6518 of the device invoking FIG. 120 heartbeat processing. Thereafter, block 12022 gets the next (or first) record 7000 and processing continues to block 12024. If block 12024 determines all records 7000 of the open cursor have been processed, then processing continues to block 12038. If block 12024 determines all records 7000 have not been processed, then block 12030 initializes a KEEPHIT variable to True, and block 12032 checks interests field 6516. If block 12032 determines interests field 6516 for the device is null, then processing continues to block 12042. If block 12032 determines interests field 6516 is not null, then block 12034 iterates through interests configured for the device and matches to the current record 7000 being processed. Preferably, block 12034 matches interests to field 7006, 7046 and/or 7076 depending on content type, but any fields of a record 7000 can be used. Thereafter, if block 12036 determines the record 7000 does not match the device interests, then processing continues to block 12048. If block 12036 determines the device interests do match the record 7000, then block 12042 checks the device filters field 6518. If block 12042 determines the filters field 6518 for the device is null, then processing continues to block 12050. If block 12042 determines the filters field 6518 is not null, then block 12044 iterates through all filters set and matches to the same field(s) matched for the interests field 6516. Thereafter, if block 12046 determines a filter matches record 7000, then processing continues to block 12048. Block 12048 sets the KEEPHIT variable to False, and processing continues to block 12050. Block 12050 adds the DCDBID 7002 of the record 7000 of the open cursor to a HITLIST array only if the KEEPHIT variable is set to True from previous processing. The HITLIST array keeps track of all records 7000 determined for delivery to the device. Block 12050 continues to block 12022 where a next record 7000 of the cursor is accessed. If block 12046 determines the record 7000 does not match a filter, then processing continues to block 12050. Filters field 6518 takes precedence over interests field 6516 such that a record 7000 set for delivery from interests processing can be discarded from filters processing.

FIG. 120 can be invoked for device heartbeats containing situational location information on a configured periodic basis, or a movement tolerance (e.g. MoveTol field 6520) can be used which will not provide a heartbeat for processing until the device has moved according to the movement tolerance. The movement tolerance can be managed at the device, at a location service 2112 on behalf of the device, or by a location service on behalf of the device which is integrated in some manner with, or in communications with, web service 2102. The movement tolerance provides means for preventing frivolous heartbeats and unnecessary processing.

When all records 7000 have been processed in the loop of blocks 12022 and subsequent blocks already described for FIG. 120, processing continues to block 12038. Block 12038 invokes PingSpot processing (FIG. 122), then block 12052 invokes Pingimeter processing (FIG. 123), then block 12054 invokes Nearby processing (FIG. 124), then block 12040 invokes Build Master Processing (FIG. 121), then block 12028 closes any open DB connection, and processing terminates at block 12014. Different embodiments of FIG. 120 may not include block 12026 and/or block 12038 and/or block 12052 and/or block 12054.

At some point in the execution of FIG. 120, an insertion of a LastLog record 3100 is needed for recording a first access by the particular device to FIG. 120 processing. For a subsequent access by the same device, the presence of a record 3100 for the device simply requires a date/time stamp update to reflect the most recent Delivery Manager access for that particular device. Other embodiments may use a different flowchart of Delivery Manager processing so as to not affect critical performance of the heartbeat processing.

FIG. 121 depicts a flowchart for a preferred embodiment of Delivery Manager Build Master processing of block 12040. Processing starts at block 12102 and continues to block 12108. If block 12108 determines field 6514 of the device is set to Yes, then block 12110 builds an insert command for a record 6800 to the Trail table, and does the insert. The open DB connection from FIG. 120 is preferably used so no open and close is needed here. Thereafter, block 12112 builds a starter update command to the Device History Table for any failed Master record inserts in subsequent processing. Then, block 12114 gets the next DCDBID from the HITLIST array built in FIG. 120. If block 12108 determines tracking is not enabled for the device, then processing continues to block 12112.

Block 12114 continues to block 12116. If block 12116 determines all DCDBIDs from the HITLIST array are not yet processed, then block 12118 inserts a record 10700 into the Device History Table with field 10706 set to Master and field 10708 set to the current date/time stamp (field 10702 is set to DCDBID from HITLIST and field 10704 is set to the RegistryID 6502 of the device causing FIG. 120 heartbeat processing). Thereafter, if block 12120 determines the insert succeeded, then block 12104 adds the DCDBID to a NEWHITLIST array, and processing continues back to block 12114 for the next HITLIST DCDBID. If block 12120 determines the insert failed because of a duplicate record, then block 12106 adds the DCDBID to the update command started at block 12112. A duplicate error occurs when the record 7000 has already been delivered to the device as represented by the device Master, so only the LastHit field 10708 needs to be updated to reflect the last time it was delivered to the device. Processing then continues from block 12106 back to block 12114.

If block 12116 determines all DCDBIDs from the HITLIST array have been processed, then block 12118 checks to see if there is an update to do for records 10700 already in the Master which caused duplicate errors at block 12118. If block 12122 determines there is an update to do, then block 12124 does the update of LastHit field 10708 for the current date/time to indicate the last time the record(s) 7000 DCDBIDs added to the Where clause at block 12106 were delivered. Processing then continues to block 12126. If block 12122 determines there is no update to do, then processing continues to block 12126. Block 12126 builds the top of a browser delivery page (e.g. for section 12854) only if the device field 6530 is set to Yes. Thereafter, block 12128 checks if there are any DCDBID entries in NEWHITLIST. NEWHITLIST is an array containing record 7000 references that are not known to have been delivered previously to the device as represented in the device Master. If block 12128 determines there were no new hits (NEWHITLIST is empty), then block 12130 sets PGLOADED=True if applicable from Delivery Manager user interface processing so the next device heartbeat can be processed, then FIG. 121 processing terminates at block 12134. If block 12128 determines there were new hits (NEWHITLIST is not empty), then block 12132 invokes Master Page processing (FIG. 126) with the NEWHITLIST for highlight in case field 6530 is set to Yes. Processing then terminates at block 12134. When Master Page processing is invoked, it is invoked to execute within the lower frame (e.g. frame section 12854, or 13854). The user can manage the device Master to control what is determined a new deliverable content item for the device. There may have been an empty HITLIST as passed from FIG. 120 processing and checked at blocks 12114 and 12116, in which case FIG. 121 processing continues to block 12122 for no updating, then to block 12126, and then to block 12128 where the NEWHITLIST would also be empty. Block 12130 does nothing if FIG. 120 processing was invoked with a device heartbeat without FIGS. 112 through 119 processing.

FIG. 120 and associated processing is preferably performed at web service 2102 for all device heartbeats received from mobile devices 2540. CD-ROM file name "mcdg.asp" provides an ASP program source code listing containing an embodiment of FIGS. 120 and 121.

FIG. 122 depicts a flowchart for a preferred embodiment of Delivery Manager PingSpot processing of block 12038. Processing starts at block 12202 and continues to block 12204. Block 12204 determines all users who have been granted the "Set PingSpots" privilege by the device (or the user of the device) causing execution of FIG. 120 heartbeat processing. Those who have been granted the "Set PingSpots" privilege can set PingSpots for the device of FIG. 120 heartbeat processing. As described above, another privilege embodiment could enable assigning the privilege to a device so that a device configured the PingSpot, versus ownership being a user. That way the "Set PingSpots" privilege could be granted to users, or specific devices, and the owner of the record 7000 could be a device or a user.

In the preferred embodiment, block 12204 gathers joined records including records 9200 from privilege assignments (Groups Table, PingPal Privilege Assignment Table, Registry Table, DCDB Table) to determine which users (and/or device(s) in other embodiment) have been granted the "Set PingSpots" privilege by the particular device of FIG. 120 processing, then which users (and/or device(s) in other embodiment) have been granted the "Set PingSpots" privilege by the Owner (owner field 6522) of the device of FIG. 120 heartbeat processing. All PersonIDs are put into a PRIVILEGEDLIST array which contains eligible users who can configure PingSpots for this device. Another embodiment of PRIVILEGEDLIST would be a two dimensional array with each member having two fields: a type field (user or device) and a record identifier field (PersonID or RegistryID).

Thereafter, block 12206 builds a query to records 7000 for PingSpots configured (i.e. EntryType field 7004 set to 'S' for PingSpot) with a matching situational location of this particular device of FIG. 120 heartbeat processing, and that are owned by a privileged account (e.g. AuthID field 7038 contains a value in the PRIVILEGEDLIST array). Block 12206 then opens a cursor for any resulting PingSpot records 7000 found. Note that block 12206 does exactly what block 12016 does except PingSpots are being queried for the device situational location (rather than DCDB records), and only PingSpot records 7000 which are maintained by privileged users are candidate for delivery. Processing continues to block 12208. If block 12208 determines no PingSpot records 7000 were found, then FIG. 122 processing terminates at block 12214. If block 12208 determines one or more records were found matching the device situational location, then block 12210 gets the next (or first) record of the open cursor. Thereafter, if block 12212 determines the last record of the cursor was processed, then processing terminates at block 12214, otherwise block 12216 adds the particular record 7000 DCDBID 7002 to the HITLIST array, and processing continues back to block 12210 for the next PingSpot record 7000.

FIG. 123 depicts a flowchart for a preferred embodiment of Delivery Manager Pingimeter processing of block 12052. Processing starts at block 12302 and continues to block 12304. Block 12304 determines all users who have been granted either of the "Set Pingimeter Arrival Alert" or "Set Pingimeter Departure Alert" privileges by the device (or the user of the device) causing execution of FIG. 120 heartbeat processing. Those devices that have been granted the "Set Pingimeter Arrival Alert" or "Set Pingimeter Departure Alert" privilege can receive alerts when the device of FIG. 120 heartbeat processing is arriving to, or departing from an active Pingimeter configured by privileged device(s) (or users with the privileges). Another privilege embodiment could enable assigning the "Set Pingimeter Arrival Alert" or "Set Pingimeter Departure Alert" privileges to a user so an alert is sent to any of the active devices which are detected as being most recently used to web service 2102 (e.g. FIG. 120 heartbeat processing, or presence in the Trail Table, active authentication data evidence to web service 2102, or any other means for determining appropriate device information for a user that has been assigned the privilege(s)). That way the "Set Pingimeter Arrival Alert" and "Set Pingimeter Departure Alert" privileges could be granted to specific users, or devices.

In the preferred embodiment, block 12304 gathers joined records including records 9200 from privilege assignments (Groups Table, PingPal Privilege Assignment Table, Registry Table, DCDB Table) to determine which users (and/or device(s) in other embodiment) have been granted the "Set Pingimeter Arrival Alert" or "Set Pingimeter Departure Alert" privileges by the particular device of FIG. 120 heartbeat processing, then which user(s) (and/or device(s) in other embodiment) have been granted the "Set Pingimeter Arrival Alert" or "Set Pingimeter Departure Alert" privileges by the Owner (owner field 6522) of the device of FIG. 120 heartbeat processing. All PersonIDs (and/or RegistryIDs) are put into a PRIVILEGEDLIST array which contains eligible candidates that can receive automated status alerts for the device of FIG. 120 heartbeat processing. Another embodiment of PRIVILEGEDLIST would be a two dimensional array with each member having two fields: a type field (user or device) and a record identifier field (PersonID or RegistryID).

Thereafter, block 12306 builds a query to records 9450 and 9500 for Pingimeters configured with a matching location, or situational location, of this particular device of FIG. 120 heartbeat processing, and that the current/date time is valid for in Timeframe field 9512, and that are owned by a privileged account (e.g. OwnerID 9504 contains a value in the PRIVILEGEDLIST array). There can be an OwnerID type field 9503 for determining whether the owner of the Pingimeter is a device or a user. Records 9500 are preferably outer-joined to records 9450 to retrieve all Pingimeter record(s) 9450 associated to a record 9500. Block 12306 then opens a cursor in context for a record being a single unit of data including record 9500 and all its associated records 9450. Processing continues to block 12308. If block 12308 determines no Pingimeter records (9500 outer-joined to 9450(*s*)) were found, then FIG. 123 processing terminates at block 12314. If block 12308 determines one or more records were found matching the device situational location, then block 12310 gets the next (or first) record of the open cursor (record 9500 and all associated records 9450 treated as a single record for processing in flowchart). Thereafter, if block 12312 determines the last record of the cursor was processed, then processing terminates at block 12314, otherwise processing continues to block 12316.

Block 12316 queries the most recent records 6800 from the Trail Table for the device of FIG. 120 heartbeat processing. The query includes specifying records 6800 with a DTCreated 6816 field value up to the current/date time and no older than a trailing period as specified by a website configuration TIMELENGTH value. The TIMELENGTH value, for example 20 minutes, governs preventing of redundant alerts to the same Pingimeter owner for the same device, while at the same time providing a time window to determine whether the device is arriving or departing the Pingimeter. Blocks 12332 and 12334 prevent repeated redundant alerts according to the TIMELENGTH window of records returned at block 12316. Another embodiment could maintain a history of alerts sent at block 12326 so redundant alerts would not be sent. For example, the history would record all data about the alert to uniquely identify the alert, and to assign the historical record of the alert an expiration according to TIMELENGTH, so that when the history information expired, only then would block 12326 send the same alert again in the absence of a duplicate historical alert record (i.e. all governed by TIMELENGTH).

Block 12316 continues to block 12318 where the current Pingimeter record from block 12310 is examined with respect to a most recent record 6800 from block 12316 (not record 6800 from current heartbeat processing), after determining a middle of the Pingimeter. In one embodiment, extents are used of the outermost vertices, or radius, with arithmetic of dividing by two for a reasonable middle point, or for a member of a determined set to average for a reasonable middle point. Once a reasonable Pingimeter middle is determined, the most recent record 6800 (not record 6800 from current heartbeat processing) is compared to see if the device is traveling toward or away from the middle. Thereafter, if block 12320 determines the device is traveling toward the Pingimeter middle (i.e. arriving), then block 12332 checks all records returned from block 12316 to see if all are contained in the Pingimeter (over TIMELENGTH). Thereafter, if block 12330 determines all records 6800 are from within the Pingimeter, processing continues back to block 12310 for the next Pingimeter to process. Block 12330 decides that if the device has been in the Pingimeter for all of TIMELENGTH, then an alert was already sent. If block 12330 determines at least one record 6800 was not in the Pingimeter, then processing continues to block 12328. If block 12328 determines the Pingimeter AlertType field 9508 (I/E/B) is for arrival or both (arrival/departure) alerting, then processing continues to block 12338 which is described below. If block 12328 determines the Pingimeter AlertType field 9508 (I/E/B) is not for arrival or both alerting, then processing continues back to block 12310.

If block 12320 determines the device is not moving toward the Pingimeter middle, then processing continues to block 12322. If block 12322 determines the device is moving away from the Pingimeter middle, then processing continues to block 12334. Block 12334 checks all records returned from block 12316 to see if all are contained in the Pingimeter (over TIMELENGTH). Thereafter, if block 12336 determines all records 6800 are from within the Pingimeter, then processing continues back to block 12310 for the next Pingimeter to process. Block 12336 decides that if the device has been in the Pingimeter for all of TIMELENGTH, then a departure alert is not relevant. If block 12336 determines all records are contained in the Pingimeter except only the one most recent one is outside the Pingimeter, then processing continues to block 12324. If block 12324 determines the Pingimeter AlertType field 9508 (I/E/B) is for departure or both (arrival/departure) alerting, then processing continues to block 12338 which is described below. If block 12324 determines the Pingimeter AlertType field 9508 (I/E/B) is not for departure or both alerting, then processing continues back to block 12310.

Block 12338 determines the alert method from field 9508 and gathers related data if needed. Thereafter, block 12326 builds and sends an alert message with enough information to distinguish one alert from another, and to provide an informative message. Block 12326 then continues back to block 12310. If block 12322 determines the device is not departing, then processing continues to block 12310. A performance conscious embodiment of block 12316 may query the records 6800 one time for all loop iterations on Pingimeters that start at block 12310. A performance conscious embodiment will analyze those records 6800 one time for all loop iterations on Pingimeters that start at block 12310 (e.g. processing at blocks 12330, 12332, 12334, 12336). Block 12326 will use record 9500 fields as described in the record 9500 description for appropriate alerting.

FIG. 124 depicts a flowchart for a preferred embodiment of Delivery Manager Nearby processing of block 12054. Processing starts at block 12402 and continues to block 12404. Block 12404 query(s) for determining all devices and users who have been granted either of the "Set Nearby Arrival Alert" or "Set Nearby Departure Alert" privileges by the device (or the user of the device) causing execution of FIG. 120 heartbeat processing. The privilege must be complementary which means the devices (or users of the devices) must have also granted the same privilege(s) to the device (or user of the device) of FIG. 120 heartbeat processing. This is referred to as complementary privileges (granted by, and to, both parties involved). Otherwise, nearby alerting is not enabled. Both devices found to be nearby each other must have granted the "Set Nearby Arrival Alert" or "Set Nearby Departure Alert" privileges to each other (device to user, user to device, device to device, user to user) for that corresponding nearby functionality of FIG. 124 to be enabled. One privilege embodiment enables assigning the "Set Nearby Arrival Alert" or "Set Nearby Departure Alert" privileges to a user so an alert is sent to any of the active devices which are detected as being most recently used to web service 2102 (e.g. FIG. 120 heartbeat processing, or presence in the Trail Table, active authentication data evidence to web service 2102, or any other means for determining appropriate device information for a user that has been assigned the privilege(s)). That way the "Set Nearby Arrival Alert" and "Set Nearby Departure Alert" privileges could be granted to specific users, or devices.

In the preferred embodiment, block 12404 gathers joined records including records 9200 from privilege assignments (Groups Table, PingPal Privilege Assignment Table, Registry Table, DCDB Table) to determine which devices and/or users have granted each other the "Set Nearby Arrival Alert" or "Set Nearby Departure Alert" privileges including the particular device of FIG. 120 heartbeat processing as one side of the privilege assignment, then which devices and/or user(s) have granted each other the "Set Nearby Arrival Alert" or "Set Nearby Departure Alert" privileges including the Owner (owner field 6522) of the device of FIG. 120 heartbeat processing as one side of the privilege assignment. All RegistryIDs are put into a PRIVILEGEDLIST array which contains eligible devices that can receive automated nearby status alerts for the device of FIG. 120 heartbeat processing. Another embodiment of PRIVILEGEDLIST would be a two dimensional array with each member having two fields: a type field (user or device) and a record identifier field (PersonID or RegistryID). Block 12404 assembles privilege results into the PRIVILEGEDLIST array as records for subsequent processing, and initializes a pointer to the first record. Processing continues to block 12406. If block 12406 determines no complementary (same to each other) privileges were found, then FIG. 124 processing terminates at block 12412. If block 12406 determines one or more records were found with complementary "Set Nearby Arrival Alert" or "Set Nearby Departure Alert" privileges assigned to the device of FIG. 120 heartbeat processing and from the device of FIG. 120 heartbeat processing to the device in the record(s) found at block 12404, then block 12408 gets the next (or first) complementary device record, and processing continues to block 12410. If block 12410 determines all complementary privileged device records have been processed, then FIG. 124 processing terminates at block 12412, otherwise processing continues to block 12414.

Block 12414 queries records 6800 for the device at the record accessed at block 12408 and for the device of FIG. 120 heartbeat processing, and retrieves all records 6800 over a website configured time of TIMEPERIOD, for example 20 minutes. This TIMEPERIOD constant may or may not be the same as discussed above for Pingimeter processing. Thereafter, block 12416 analyzes the records 6800 returned at block 12414 and compares situational locations of records 6800 of the complementary privileged device with the situational locations of records 6800 of the device of FIG. 120 heartbeat processing, and the situational location of the device heartbeat situational location causing execution of FIG. 124. Then, if block 12418 determines the two devices were already nearby each other during the trailing TIMEPERIOD as found in records 6800, then processing continues back to block 12408 for the next privileged device. If block 12418 determines the devices were not nearby each other during the trailing TIMEPERIOD, then block 12420 determines an alert method based on the privileges assigned to each other, the analysis of block 12416, and the preferences of records 6500 for both nearby devices as configured in fields 6532 through 6538. Then, block 12422 sends a nearby alert to both devices, and processing continues back to block 12408.

The TIMEPERIOD value governs preventing of redundant alerts, while at the same time providing a time window to determine whether the devices are arriving or departing nearness. Blocks 12416 and 12418 prevent repeated redundant alerts according to the TIMEPERIOD window of records returned at block 12414. Another embodiment could maintain a history of alerts sent at block 12422 so redundant alerts would not be sent. For example, the history would record all data about the alert to uniquely identify the alert, and to assign the historical record of the alert an expiration according to TIMEPERIOD, so that when the history information expired, only then would block 12422 send the same alert again in the absence of a duplicate historical alert record (i.e. all governed by TIMEPERIOD). Artificial intelligence is preferably implemented at block 12416 for proper analyzing of a nearby status for newly becoming near, or just departing from being near. A critical component for designating the meaning of nearness is the IntRadius field 6540 for one of, or both of the devices. Block 12416 uses mobile interest radius information. The moving interest radius can be used out of the record(s) 6500, or overridden by use of the Delivery Manager by one or both devices. With reference now to FIGS. 125A through 125C, FIGS. 125A through 125C shall be discussed in context for nearby status embodiments as implemented at block 12416. A first device situational location 12502 is not nearby a second device situational location 12504 until first device situational location 12502 is within the moving interest radius 12506 of the second device situational location 12504. In another embodiment, a first device situational location 12502 is not nearby a second device situational location 12504 until the moving interest radius 12506 of the second device situational location intersects with moving interest radius 12508 of the first device situational location. In another embodiment, a first device situational location 12502 is not nearby a second device situational location 12504 until second device situational location 12504 is within the moving interest radius 12508 of the first device situational location 12502.

FIG. 126 depicts a flowchart for a preferred embodiment of Delivery Manager Master presentation processing. Processing starts at block 12602 and continues to block 12604 where the ACCESS_LIST is set for authorized users. Thereafter, block 12606 performs FIG. 39 access control processing (successful device credential data evidence preferably checked for instead) and continues to block 12608. Block 12608 determines the device (or browser) type (if any) which caused FIG. 126 processing, record 6500 fields of the device of FIG. 120 heartbeat processing, builds a query to all records 10700 joined to associated records 7000 with Type field 10706 set to Master, does the query and opens a cursor for the joined records returned. Thereafter, block 12610 accesses the device's default Master template (e.g. as managed by FIG. 143A) and stores it in a template variable, then modifies the template variable for an appropriate style based on the device (or browser) type if a browser is applicable to FIG. 126 processing as determined at block 12608, and strips off the terminating HTML ("</body></html>"). Sound is left in since it can be used to notify the user of a delivery in a particular browser. Block 12610 then starts the top of the delivery page to return to the browser (e.g. in section 12854 or section 13854), and continues to block 12612 where NEWHITLIST data evidence is placed into an array, and the page header (e.g. header 13004) is built for presentation of the page to return according to browser type if applicable. Then, block 12614 gets the next (or first) joined Master record 10700/7000 of the opened cursor, and continues to block 12616.

If block 12616 determines all Master records are processed, then processing continues to block 12642 discussed below. If block 12616 determines there is another record to process, then processing continues to block 12618 where a Boolean variable GOTNEWHIT is set to False, and the NEWHITLIST array is iterated through to check for the presence of DCDBID 7002 Joined to DCDBID 10702). NEWHITLIST contains the DCDBIDs which were not already contained in the device Master (i.e. new deliveries). Thereafter, if block 12620 determines the DCDBID was found in NEWHITLIST, then block 12622 sets the variable GOTNEWHIT to True, and then determines applicable delivery indicators. Block 12622 determines applicable delivery indicators by:

1) Querying a record 8200 joined to associated record 7800 (on IndicID fields 8206, and 7802) wherein Type field 8202 is for DCDBID and RecID 8204 equals the DCDBID of the joined record from block 12614 being currently processed. If no record is found, then the DCDBID content item has no associated Delivery Indicator, and the default indicator is set to NONE (i.e. null). If a record is found, then the default indicator is set to a pointer to the record data found.

2) Querying all records 8200 joined to associated record 7800 (on IndicID fields 8206, and 7802) wherein Type field 8202 is for RegistryID and RecID 8204 equals the RegistryID from the record 6500 for the device of FIG. 120 heartbeat processing. The query is to order records according to Ordr field 7806. If no record is found, then the device of FIG. 120 heartbeat processing has no associated Delivery Indicators defined, and a prioritized device indicator list is set to NONE (i.e. null). If one or more record(s) is found, then the prioritized device indicator list is set to a pointer to the highest prioritized indicator record in the list.

3) If steps #1 and #2 find no indicators, then block 12622 sets the best match delivery indicator to NONE. If step #2 finds no indicators, then block 12622 sets the best match delivery indicator to the record found at step #1. If step #2 finds one or more indicators, then each is processed in the priority order using Criteria field 7808 just as interests field 6516 is used to match to a record 7000. Another embodiment of criteria field 7808 permits filters and/or interests, like filters field 6518 and interests field 6516 for matching to the record 7000, or another embodiment maintains a separate configurable filters field 7807 for comparison. If Criteria field 7808 is null, then that indicator is used. If an indicator is found for being applicable to the record 7000, then the best match delivery indicator is set to that delivery indicator record. If no best match is found from the device indicators, and an indicator exists from step #1, the step #1 indicator becomes the best match delivery indicator.

When block 12622 continues to block 12624, the best match delivery indicator is either set to NONE, or is set to the best matching delivery indicator record 7800. The best match delivery indicator record fields 7812, 7814, and 7816 preferably override the analogous fields 6530, 6532, and 6536, respectively, of the record 6500 of the device of FIG. 120 heartbeat processing. Another embodiment of records 7800 could also include fields analogous to fields 6534 and 6538 for overriding the addresses to deliver to. Block 12622 ensures any overriding of record 6500 with best match delivery indicator fields is performed before continuing to block 12624.

If block 12624 determines the BrowseRcpt field (of record 6500 or overridden) is set to Yes, then block 12626 builds a row of output of record 7000 (from block 12614) for browser delivery according to the device and/or browser type, and according to the Verbose field 6544. Some subset of row fields is highlighted if GOTNEWHIT is set to True to indicate a new item in the Master. Preferably, the Pushed date/time stamp is highlighted for the user to see that field. The SpeedRef field 7048 is to be handled in accordance with the device receiving that field. For example, a web page browser link should be invocable with a surrounding anchor tag (e.g. <a . . . > . . . </a>) to be a user invocable link in a new window (target="_blank"), an auto-dial phone number should be encoded for auto-dialing from the cell phone or PDA device, etc. The SpeedRef field 7048 is treated in context for the device type, as well as the intended use, of automatically transposing the user to another data processing system, or automatically communicating with another data processing system upon user invocation (selection). Block 12626 then continues to block 12628. If block 12624 determines the BrowserRcpt flag is not set to yes, then processing continues to block 12628.

If block 12628 determines GOTNEWHIT is not set to True, then processing continues back to block 12614 for the next joined record to process. If block 12628 determines GOTNEWHIT is set to True, then processing continues to block 12630. If block 12630 determines the EmailRcpt field is not set to Yes, then processing continues to block 12634. If block 12630 determines the EMailRcpt field is set to Yes, then block 12632 builds (or adds to) an email body construction in progress, and continues to block 12634. Only records 7000 which are not existing in the Master at the time of delivery processing are preferably communicated by email to prevent redundant deliveries. If block 12634 determines the SMSRcpt field is not set to Yes, then processing continues to block 12638. If block 12634 determines the SMSRcpt field is set to Yes, then block 12636 builds (or adds to) a small SMS message body construction in progress, and continues to block 12638. Only records 7000 which are not existing in the Master at the time of delivery processing are preferably communicated by SMS message to prevent redundant deliveries. If block 12638 determines another device dependent delivery mechanism is not set to Yes, then processing continues to block 12614. If block 12638 determines the device dependent delivery mechanism is set to Yes, then block 12640 builds (or adds to) the appropriate encoding, and continues back to block 12614 for the next joined Master record.

Block 12642 preferably overrides any delivery bodies built at blocks 12632, 12636, and 12640 with a best match delivery indicator from a record 7800 that may have been found at block 12622 (assuming an indicator is applicable, for example when field 7052 is set to Yes). If no best match delivery indicator was found, then block 12642 continues directly to block 12644. If block 12644 determines the EmailRcpt field is not set to Yes, then processing continues to block 12648, otherwise block 12646 completes the email body constructed at block 12632, sends it to the EMailAddr field, and processing continues to block 12648. If block 12648 determines the SMSRcpt field is not set to Yes, then processing continues to block 12652, otherwise block 12650 completes the SMS message body constructed at block 12636, sends it to the SMSAddr field, and continues to block 12652. Block 12652 handles sending a distribution appropriately if another delivery mechanism was set to Yes as built at block 12640. Block 12652 also completes building of the browser page to return to the device if BrowseRct is set to Yes. Block 12652 completes building the page according to the device or browser type and sends it back to the user before continuing to block 12654 where FIG. 126 processing terminates. The PGLOADED variable is also set to true at block 12652 if the invoker of FIG. 120 processing was processing of FIGS. 112 through 119 and associated user interfaces.

Fields 7040, 7042, 7044, 7046, and 7076 are appropriately dealt with according to CType field 7040, and the device type and/or browser type of FIG. 120 processing, for appropriate presentation and delivery to a device. Compress field 7050 is preferably used at any of blocks 12632, 12636, 12640, 12646, 12650 and 12652 to ensure the content is compressed before sending it to the device. The compression algorithm type can be of a variety available for use according to receiving device type and/or deliverable content type. The IndicOnly field 6528 or IndicOnly field 7052 is used to force delivery of a delivery indicator in which case a system default indicator will be used in the absence of one determined at block 12622. The BrowseRcpt, SMSRcpt, and EMailRcpt fields used at blocks 12624, 12630, 12634, 12638, 12644, 12648, and 12652 are from the record 6500 field of the device of FIG. 120 heartbeat processing, or as overridden at block 12622. A performance conscious embodiment of block 12622 will process the device indicators one time and make them available for all subsequent accesses at block 12622 to prevent unnecessary I/O at block 12622. The Verbose field 6544 is used at block 12632, and is preferably never used at block 12636. SMS messages should be small in size. Blocks 12636 and/or 12650 can enforce a website configuration maximum size, and may summarize the deliveries to accomplish that. Blocks 12646, 12650, and 12652 can enforce a maximum size also, and may send a replacement distribution in place of a delivery deemed to be too large for a particular device. A best match delivery indicator can be implemented for delivery to a device browser and/or email address and/or SMS address and/or other delivery mechanism as is seen fit for the type of indicator, its content lengths, and a particular embodiment of FIG. 126. The BrowseRcpt field will variably define whether or not a device browser is to receive back delivery information. Various embodiments of FIG. 126 may ignore a field for detection of certain device types, may always obey a field even if a browser is detected at the device, or may variably process a field depending on content to return, the device type, the browser type, settings in other fields of record 6500, settings in fields of record 7000, settings in fields of record 7800, or in accordance with any server data 2104.

Record fields not specifically described in the furthest detail of processing for: records 7000, 6500, 3000, AND fields of other records joined to records 7000, 6500, or 3000, AND fields of web service 2102 records related to records 7000, 6500, or 3000; ARE to be understood as described in their detailed descriptions of the record fields, and are appropriately integrated into the processing described for FIG. 120 and related associated processing.

FIG. 126 does have Access Control processing which can be removed since already included in FIG. 120 processing. CD-ROM file name "zmast.asp" provides an ASP program source code listing containing an embodiment of FIG. 126.

FIG. 127 depicts a flowchart for a preferred embodiment of generic Delivery Manager authentication processing, for example for use by a device equipped with its own means for determining its situational location, by a device able to determine its own situational location, or by a service able to determine a device situational location. This embodiment only requires device credentials for validation. Processing starts at block 12702 and continues to block 12704 where the ACCESS_LIST is set for authorized users, or devices with a device credential embodiment of FIG. 39 Access Control. Successful logon data evidence is preferred as a prerequisite for using FIG. 127, but a device credential embodiment Access Control embodiment may be suitable. Thereafter, block 12706 performs FIG. 39 access control processing (successful device credential data evidence may be checked for instead) and continues to block 12708. Block 12708 gets credential data evidence of a Deviceid field 6504 and device PW field 6506. The invoker preferably uses a URL command line string from any device to FIG. 127 processing. Any override parameters are also maintained. A query for a corresponding record 6500 is built, a DB connection is opened, the query is issued, and the DB connection is closed. Thereafter, if block 12710 determines a record 6500 was found for the device credentials, block 12712 builds a URL command line string containing fields of record 6500 needed for FIG. 120 processing. Any override parameters received to FIG. 127 for overriding record 6500 fields are used to replace corresponding fields found in the record 6500. The completed command line string is returned to the invoker, and processing then terminates at block 12716. If block 12710 determines a record was not found, then block 12714 appropriately reports the error to the invoker and processing terminates at block 12716. The URL command line string is universal in nature for use by any device. Other embodiments can return a format of the information depending on the device and preferred communications format.

FIG. 127 can be used by any device, or service (e.g. service 2112), for returning a command line string for FIG. 120 heartbeat processing. The device, or service, uses the string as-is, and adds at least the device situational location parameters to it before invoking FIG. 120 heartbeat processing. Situational location parameters expected by FIG. 120 processing must be added by the device for each of its heartbeat requests to FIG. 120 heartbeat processing. Record 6500 configuration fields are returned to the successfully authenticated device credential invoker. An example of a string returned to the invoker of FIG. 127 is:

https://www.gpsping.com/MCD/
g.asp?r=12745&t=2&q=sale&e=Y&m=williamjj@yahoo.com

Absence of parameters preferably indicates a null or No setting for fields of record 6500. This device has interests of "sale" and wants deliveries to be made to only an email address of williamjj@yahoo.com. The "r" parameter is preferably a handle for subsequent FIG. 120 processing. Now that FIG. 127 validated the device credentials and provided its record 6500 configs, the device, or service, can send heartbeats after adding remaining parameters for FIG. 120 processing, for example situational location parameters such as latitude, longitude, speed, heading, elevation, etc. FIG. 120 processing is invoked from a GUI as described starting at FIGS. 106A and 128A, or with the command line started as returned from FIG. 127 processing, after adding situational location parameters for each heartbeat invocation of FIG. 120. Frames and separate pages are not relevant in command line invocations. FIG. 120 can be reviewed in terms of its functionality without regard for a GUI, frames, pages, browser settings, browser checks, or any other description associated with the device GUI or browser. A single processing thread up through single process return is assumed. An ASP source code listing embodiment of FIG. 120 processing which exemplifies FIG. 127 use for subsequent command line heartbeat processing by command line invocation is included as CD-ROM file name "gsec.asp". CD-ROM file name "gseclog.asp" provides an ASP program source code listing for an embodiment of FIG. 127.

FIG. 128A depicts a preferred embodiment screenshot for a full browser Delivery Manager prior to starting delivery processing, for example after submitting parameters from FIG. 106A. FIGS. 128A through 143B are screenshots from a browser invoked version of the Delivery Manager, and facilitate a visually guided understanding of the Delivery Manager. Devices that use FIG. 127 and FIG. 120 processing directly will work similarly, albeit without the GUI presentations involved. FIG. 128A can also be invoked with a URL command line. Local automated situational location data gathering has not yet started, so there is no information other than:

"m,t:-500,2" which means a moving interest radius of 500 feet, and a heartbeat for FIG. 120 processing every 2 seconds "Apr. 24, 2005 11:45:51 AM" which is a current date/time stamp "Delivery: Not Enabled" which means the Delivery Manager is currently disabled (Delivery Disabled)

"ID:2 t:4,i:N,c:N,e:YYYYY:2144034071@messaging.nextel.com,williamjj@yahoo.com" which means an authenticated handle to web service 2102 for the device of 2, a deviceType field of 4, IndicOnly field of No, compress field 6526 of No, fields 6514, 6530, 6532, 6536, and 6544, each set to Yes, field 6534 set to 2144034071@messaging.nextel.com, and field 6538 set to williamjj@yahoo.com. Other embodiments will display different record 6500 fields, less record 6500 fields, no record 6500 fields, more record 6500 fields, or data from records joined to the record 6500 for the device.

FIG. 128B depicts a preferred embodiment screenshot for an empty Master, for example there have been no deliveries yet to the device presenting FIG. 128A, or all previous deliveries have been archived to the device Archive. FIG. 128B is arrived to by selecting link 12802. FIG. 128C depicts a preferred embodiment screenshot for presentation of records in an Archive, for example from selecting link 12804. Apparently the device of FIG. 128A has received previous deliveries, and they were archived by the user to the device Archive as shown in FIG. 128C. Recall that FIG. 111 showed all records 7000 to currently be set to inactive which shall be assumed in the explanations here and hereinafter until indicated otherwise. FIG. 128D depicts a preferred embodiment screenshot for a full browser Device settings interface, for example upon selection of link 12810. The current device interests, filters, and delivery addresses (if configured are shown). This device has set interests to "estate sale", "garage sale", and "sale". This device has no filters set. SMS delivery is set on with the corresponding address. Email delivery is additionally set on with the corresponding address. The browser delivery was set to Yes (Y) as described above. This device has three delivery methods active to facilitate examples of each. Typically a single method is selected. FIG. 128E depicts a preferred embodiment screenshot for a full browser Delivery Manager after starting delivery processing. The user has selected the start button 12806 (which is now disabled since already started) and the screenshot of FIG. 128E was taken some time after Delivery Manager processing started. Notice there is situational location information now displaying real-time as shown with each update every 2 seconds by the date/time stamp. The device is not currently moving (Speed 0 MPH), but its most recent heading was 160.92 degrees from magnetic North. The prime link 12812 was likely not needed to ensure GPS connectivity was working, but the link is always available for real-time GPS data collection.

FIG. 129 depicts a preferred embodiment screenshot for listing DCDB records of FIG. 111 which show now that a Content Provider user has just completed modifying a single record ("Office Supply Out of Business Sale") for being active. The activated record is destined for any device traveling at any direction (0 means Any) at the associated latitude and longitude. Recall that the direction (e.g. Any, East, West, North, South, Northwest, Northeast, Southwest, Southeast) can be specified for mobile devices 2540 at a location to further distinguish a candidate delivery to the devices. As soon as the record 7000 is activated, it is instantly delivered to any devices at that situational location.

FIG. 130A depicts a preferred embodiment screenshot for a full browser Delivery Manager after traveling to a situational location having an applicable DCDB record, for example at a laptop or Tablet PC. The device of FIGS. 128A, 128E, and 130A has received the content delivery after the DCDB record was activated as shown in FIG. 129. Note the Verbose option was set to Yes for the full browser device, and a date/time stamp of when the record 7000 was pushed to the device is accompanied by the latitude, longitude, and configured direction of the content item received. A closer examination of FIG. 130A shows that the current location coordinates of the device and the interest radius of 500 feet is indeed reasonable for the delivery of the content item. These are actual screenshots of a fully functional GPSPing.com system as disclosed in the present application. The activated content item from FIG. 129 contains a speed reference 13078 for convenient user selection to link to a website address associated with the content. The content message 13080 is somewhat small but contains information relevant for the user's current situational location (e.g. latitude, longitude, direction, interests, speed, etc). Link 13082 can be selected by the user to clear the delivery section 13002 so it appears again like FIG. 128A section 12854. The Content item Pushed date/time stamp cell is highlighted to show this is an item delivered which is not already in the Master (i.e. a new hit). A speed reference may be delivered variably to different device types. For example, SpeedRef field 7048 contains special characters or commands for presenting a different speed reference type depending on the device, browser type, or any other data in server data 2104 associated with the device at the time of delivery. A cell phone can receive an auto-dial phone number while a full browser device receives a web link such as link 13078.

FIG. 130B shows that the content item was also sent to the williamjj@yahoo.com email address as configured in record 6500. The SMS message of the content was also delivered to the SMS address.

FIG. 130C depicts a preferred embodiment screenshot for records in a Master, for example after the user selects the Master link 12802 from FIG. 130A. The device Master now contains the single deliverable content item that was delivered. The user can view the device Master, or place a checkmark next to the item and move it to the device Archive with archive button 13096, or delete it from the Master with delete button 13098. Assuming the user check-marked the item under the "Select For Action" column, and then selected archive button 13096, FIG. 130D is presented. FIG. 130D displays because after the item was moved from the device Master to the device Archive, there are no content items remaining in the device Master. FIG. 108 processing as invoked from FIG. 109 now shows no records in the device Master. Selecting Archive link 12804 from FIG. 130A shows FIG. 131. Notice that when comparing FIG. 131 with the previous Archive contents of FIG. 128C, the content item delivered in FIG. 130A has been moved to the device Archive. There are now three content items in the device Archive and no items in the device Master. When there are a reasonable number of entries in either the device Master or Archive (e.g. when compared to a website configuration), the "Select Delivery Range" section at the top of the table can be used to return only the content items with Last Pushed dates in the user specified range. When time specification fields are enabled, a button appears at the top of the table for invocation. The page is simply refreshed with the entries meeting the time range criteria. The Archive is preferably read-only when linked from the Delivery Manager since a preferred embodiment uses device credentials (possibly a lesser security) for Delivery Manager authentication. A user preferably must logon on to web service 2102 with user account credentials and manage the Archive from device management interfaces, for example when viewing or modifying a device record.

FIG. 132 depicts a preferred embodiment screenshot for a full browser Delivery Manager after starting delivery processing, for example after archiving the content item delivered in FIG. 130A, and then selecting link 13082 to clear the section 13002. FIG. 132 is a running Delivery Manager, still providing device heartbeats to FIG. 120 processing every 2 seconds with the console being refreshed with any new situational location information that applies along with a current date/time stamp. For purposes of the following descriptions, the reader should assume that the Delivery Manager stop button 12808 was invoked for terminating processing immediately after moving the delivered record to the Archive, and the window of FIG. 132 was closed by the user. Current contents of the device Master and Archive are assumed to remain the same.

FIG. 133A depicts a preferred embodiment screenshot for modifying a plurality of DCDB records by a Content Provider, for example to modify the DCDB records 7000 of FIGS. 111 and 129 for all being active entries. FIG. 133B depicts a preferred embodiment screenshot for listing DCDB records, for example to confirm that all the DCDB records were successfully modified for being active. As soon as the records are activated, they are instantly delivered to any devices at that situational location.

FIG. 134A depicts a preferred embodiment screenshot for starting the Delivery Manager, except this time it is started with a moving interest radius of 250 miles in an attempt to cause proactive delivery of more content items. With reference to FIG. 134B, depicted is a preferred embodiment screenshot for a full browser Delivery Manager after starting delivery processing from FIG. 134A, starting the Delivery Manager processing with the start button, and traveling to a situational location with applicable DCDB records that are active. Note there are two content items which are delivered to the device, one that was delivered previously plus an additional item. The previously delivered item is no longer found in the Master so is deemed a new delivery. The user can control redundant deliveries by keeping previous deliveries in the Master. Since both items are considered new, the Pushed date/time stamp for each is highlighted. That way new entries can be distinguished from existing entries in the Master. The content items are sorted by Pushed date/time stamps starting with the most recent. Whenever a delivery refreshes the bottom section 13002 (i.e. a new delivery occurred), an audible sound is played, for example as shown in the Master template file of FIG. 143A. FIG. 134C shows the deliveries were also sent to the email address of record 6500 as discussed above for the device presenting FIG. 134B. Content items were also sent by SMS message to the SMS address as discussed above. Notice that the content items both have interests criteria of "sale" for the device as shown in FIG. 128D. That may be why only two DCDB items were delivered.

FIG. 135 depicts a preferred embodiment screenshot for modifying a Registry record, in fact the same record 6500 of the device demonstrating the Delivery Manager since FIG. 128A up to this point. Even though the device type is set for a cell phone, that does not prevent a user from starting the Delivery Manager with device credentials from any device. The device types are used for affecting content delivery and defaulting behavior, rather than for limiting a device access to the heterogeneous Delivery Manager interfaces. Also note the interests have been removed for the device so there is no limiting user interest criteria now for content to deliver. All fields except the interest field 6516 remain the same. It is at the "Manage Archive" link that the user can manage the device Archive.

FIG. 136A depicts a preferred embodiment screenshot for a full browser Delivery Manager after starting delivery processing and traveling to a situational location with applicable DCDB records. In one embodiment, an active Delivery Manager is communicated to instantly upon modifying record 6500 for updating any visual display of record 6500 information and affecting processing with new values. In another embodiment, the display may not be updated, but the new values are used for processing. In another embodiment, the display is not updated, nor is the processing with the new record 6500 processing. In this last embodiment, the user would have to stop and restart the Delivery Manager, for example from FIG. 134A. In any case, FIG. 136A shows that the absence of interests makes all content items eligible for delivery with respect to the user's lack of specific interests. Selecting the Filters/Configs link 13610 of FIG. 136A produces the window of FIG. 136B which confirms there are no interests configured now. FIG. 136A shows all four deliverable content records are highlighted even though there were already two existing in the Master at the time of delivery as shown at FIG. 134B. This is because all four entries were newly delivered. If only the new two entries of FIG. 136A had been delivered, then the other two existing Master entries would not have been highlighted this time. The Pushed column always reflects the most recent delivery date/time of the particular content item. FIG. 136C also confirms that all 4 entries were delivered (two redelivered) at the same time as sent to the configured email address. An SMS message was also delivered as configured. A preferred embodiment delivers only the two new entries which are not yet in the device Master at all.

FIG. 136D depicts a preferred embodiment screenshot for records in a Master, for example after selecting Master link 12802 from FIG. 136A. The 4 deliverable content records of FIG. 136A are shown in the Master view of FIG. 136D. The user can move check-marked entries to the Archive with button 13096 or delete check-marked entries with delete button 13098.

FIG. 137 depicts a preferred embodiment screenshot after starting delivery processing for a full browser Delivery Manager with the hide console option set (e.g. check-mark in hide console checkbox 10612) The situational location data portion of the console is removed, but everything else functions the same as the full console described above.

FIG. 138A depicts a preferred embodiment screenshot of a Delivery Manager device interface for a PDA. If the device is detected for being a PDA, or the device forces invocation of the PDA browser version of the Delivery Manager, the interface of FIG. 138A is presented to the device. All functionality of the full browser version of the Delivery Manager is also in the PDA version. The interface is smaller for being suitable for a smaller display. A PDA run-time code link is provided at the top of the page in case the user needs to install it to the device prior to use. The link is provided as described above for the full browser. Everything described for FIGS. 128A through 137 is identical for the PDA interfaces, albeit with a smaller display area, smaller buttons, and a compact display of information. FIG. 138B depicts a preferred embodiment screenshot for a PDA browser Delivery Manager after starting delivery processing. As described above, the PDA browser Delivery Manager can be started completely with a URL command line as well. Note that the same device credentials used for describing FIGS. 128A through 137 are used in the PDA Figures. So, where processing left off from FIG. 137, the PDA Figures will pick up with FIG. 138B, except that FIG. 138B was started with a moving interest radius override of 500 yards. The start button 13806 ("B" for Begin) was already invoked by the user, and Delivery manager processing is sending heartbeats to FIG. 120 processing every 2 seconds. No new deliverable content has been delivered so far to this invocation of the Delivery Manager. FIG. 138C depicts a preferred embodiment screenshot for presenting records in the device Master to a PDA upon selection of master link 13802. Of course, border 5050 is a scrollable area and a PDA would not see as much vertical data as shown. Analogous Archive and Delete buttons are provided at the bottom of the scrollable page. FIG. 138D depicts a preferred embodiment screenshot for presenting records in an Archive to a PDA upon selection of archive link 13804. Of course, border 5050 is a scrollable area and a PDA would not see as much vertical data as shown. The Archive is preferably read-only when invoked from the Delivery Manager. FIG. 138E depicts a preferred embodiment screenshot for a PDA Device settings interface upon selection of Filters/Configs link 13810. It confirms the settings as last seen for this device at FIG. 137, 136B, etc. The Prime link 13812 invokes FIG. 75A already described above. The GPS Dashboard of FIGS. 75A and 75B is already sized for a PDA or full browser. FIG. 139 depicts a preferred embodiment screenshot after starting automated delivery processing for a PDA Delivery Manager with the hide console option set, for example hide console check-mark option 13812. FIG. 139 is actively sending device heartbeats to FIG. 120 processing as depicted with "Deliv: Enabled", and the start button 13806 is disabled.

Delivery Manager—User Specified Situational Location

FIG. 140 depicts a preferred embodiment screenshot for starting the Delivery Manager with a user specified situational location. All Delivery Manager functionality is exactly the same for a user specified situational location except that situational location information (e.g. physical location) is specified by the user rather than automatically determined for a mobile device. A user can specify proactive search capability for anywhere in the world as though his device was there, however the device physical location is fixed (not moving). In another embodiment, a user may select a route on a map, or specify a plurality of position information for specifying a movement. In another embodiment, a user may further specify time points with the positions for designating when the device is at particular location(s). Depending on an embodiment, an interest radius can be circular, rectangular, a point, an area, a polygon, a three dimensional region in space, etc. Various embodiments will expose interfaces in a similar manner to FIG. 140 whereby the user can set any subset of a situational location, or any parameters of a situational location for driving desired Delivery Manager functionality.

The moving interest radius and other configurations and processing are the same. This allows users to set up proactive searches that stay running until applicable active content record(s) 7000 are available and meet situational location criteria. Current search engines provided by google.com, yahoo.com, icerocket.com, etc, search for information only at the moment the user conducts the search (google.com, yahoo.com, and icerocket.com are trademarks of the respective companies). The present disclosure enables a user to conduct a search that keeps on searching into the future until sought information become available (called a proactive search). The user is not burdened with repeated entering of the same search criteria over a period of time until sought information is found, remembering search criteria needed to find information that has not yet been found, nor manually searching for information that isn't available yet until sometime in the future. The user can specify situational location information one time and have it used in automatic periodic searches into the future for as long as he wants.

In one example, the user wishes to find a rare antique which is not yet available, for example from an auction site such as ebay.com. With the user specified location interface, the user specifies location information and an interest radius along with interests for the rare antique description information. From that point on, the search periodically takes place into the future according the server check frequency. Deliverable Content data, whether it be locally maintained to web service 2102, or remotely accessed as needed, can be accessed and delivered to the user when available. Web service 2102 preferably accesses the eBay database, yahoo databases, google search source databases, and many other databases for deliverable content over the internet. Web service 2102 is vendor neutral in supporting many and any databases or data sources, hopefully for maximizing the user's chance in finding the rare antique at some time in the future.

FIG. 140 is analogous to FIG. 106A except the user explicitly specifies situational location information to the Delivery Manager 2510. FIG. 112 processing is preferably as already described upon selecting start button 14096 except the user specified situational location information (e.g. section 14094) is validated and then converted to an appropriate data evidence format which is passed to subsequent processing. FIG. 113 processing is preferably as already described with block 11342 causing block 11312 to gather the user's situational location specifications to FIG. 140. FIG. 114A processing is preferably as already described with block 11410 causing block 11412 to gather the user's situational location specifications (e.g. to FIG. 140). FIG. 114B processing is preferably as already described with blocks 11464 and 11476 irrelevant since a prime link 12812 is preferably not presented to the Delivery Manager user interface for a user specified situational location. FIGS. 115, 116, 117A, 117B, 117C, 119, 121, 122 and 126 processing is preferably as already described. FIG. 120 processing is preferably as already described with functionality preferably removed for Pingimeter processing (removal of block 12052) and Nearby processing (removal of block 12054), otherwise false alerts will be sent for proactive searches. Another preferred embodiment will additionally remove Share Delivery processing (removal of block 12026), otherwise false experiences will be shared. In other embodiments, user configurations can drive whether or not to permit all or some portion of FIG. 120 processing for proactive searches (user specified situational location searches). FIG. 118 processing is preferably as is already described except GPS interface blocks 11804, 11816, 11806, 11808, 11812, 11820 and 11832 are removed, and FIG. 118 processing is as described here:

FIG. 118 user specified situational location Get Fix processing starts at block 11802 and continues to block 11810 where the user specified situational location information is determined as passed from the user, for example by FIG. 140 or FIG. 142B. Thereafter, block 11814 converts the user specified situational location information for display and subsequent processing if necessary. One preferred embodiment will establish the format of information one time at validation so that unnecessary repeated conversions need not take place at a block 11814. Thereafter, block 11830 checks if user specified situational location movement parameters were specified. Thereafter, blocks 11828, 11826, 11824, 11822, and 11818 are preferably as already described using the user specified situational location information instead of automatically detected information. Discussions with FIGS. 125A through 125C remain identical, as do other aspects of Delivery Manager processing, user interface, and related server data 2104.

User specified situational location information section 14094 provides the user with many options that are analogous to those which were discussed above for DCDB management. A radio button is specified by the user for "Location By:" processing. Button 14078 is analogous to button 7178. Dropdown 14078-*d* is analogous to dropdown 7178-*d*. Processing upon selecting button 14078 is identical to button 7178 except user specifications returned from FIG. 72 processing are used to set Latitude and Longitude read-only information at area 14092 at the bottom of section 14094 with possible right margin information also displayed there. So, even though the radio button is not selected for area 14092 of section 14094, information for the "Select on Map" button processing is displayed to area 14092 for informative purposes, as is information from selection of button 14084. Pre-translation criteria 14080-*m* is analogous to pre-translation criteria menu 7180-*m*. The only difference is there is no button 7180 required. Selecting button 14096 will validate specifications and then perform identical FIG. 73 processing as if a button 7180 was selected. The resulting geo-translated data is then communicated to subsequent processing. Button 14084 is analogous to button 7184. Button 14084 causes FIG. 76 processing as already described. The user specified decimal degrees are converted, and area 14092 is used to show the resulting values in a different form. The "Device" radio button and "Phone #" radio button are also analogous to as described above. The resulting location information is passed to subsequent processing upon invoking button 14096.

A description field 14002 enables the user to specify a description for the user specified situational location search for naming the search for easy identification since many user specified situational location searches can be made active simultaneously for even a single user, and many proactive searches are maintainable for a user of web service 2102. Proactive search method dropdown 14004 can be selected by the user for where the search thread is executed for conducting the proactive search: local to the device ("Driven By Client"), or at the server ("Driven By Server"). Various embodiments may enforce one or the other option. When driven by the client, the Delivery Manager heartbeat functionality is driven from the device, for example by a browser interface as already described, or an interface which invokes FIG. 120 processing (minus blocks 12026, 12052, 12054) directly as was already described. The device interfaces to web service 2102 by way of an internet connection, or other suitable communications method. When driven by the server, a thread is spawned at web service 2102, or at a system in communications with web service 2102, for periodically sending heartbeats on behalf of the device with the user specified location information to FIG. 120 processing (minus blocks 12026, 12052, 12054). Server search expiration entry field 14006 allows the user to specify a date/time stamp (e.g. Jul. 17, 2005) in the future for when the search thread or Delivery Manager is to stop sending heartbeats to FIG. 120 processing (minus blocks 12026, 12052, 12054). No specification to entry field 14006 indicates no expiration thereby forcing the user to terminate processing manually at some time in the future. Expiration processing is preferably checked for at a new block 11903 (after block 11902) where an expiration detected causes processing to continue to a new block 11905 where variables are set to indicate processing is terminated, and then on to block 11914 as already described. The user specified expiration at entry field 14006 is passed to subsequent processing as data evidence. Check-box field 14008 indicates whether to add this FIG. 140 user specified situational location search to the user's list of outstanding proactive searches (when check-marked). The user can manage all outstanding proactive searches at link 14098.

FIG. 141 depicts a preferred embodiment of a data record in the Proactive Search Table called a proactive search record 14100. RegistryID 14102 is foreign key to RegistryID 6502 with a cascade delete relationship preferably in place. RegistryID 14102 ties one or more records 14100 to a device record 6500. A join query can be performed for the PersonID of the user from Owner field 6522 of the record 6500 joined by field 14102 to field 6502. Descript field 14104 is the user specified description from entry field 14002. LatDD field 14106 contains the latitude degrees (signed decimal number) location of the user specified situational location for the proactive search. LonDD field 14108 contains the longitude degrees (signed decimal number) location of the user specified situational location for the proactive search. IntRadius field 14110 contains an interest radius surrounding the situational location of record 14100 which is the eligible target for situational location derived content. IntRadius field 14110 can be maintained in any units but preferably is maintained in feet, however, it can be derived from any units in a user interface. PMRID 14112 is an id for joining to records 9400 and 9450 on PMRID 9402. ChkFreq field 14114 corresponds to the user specification at field 10618 and dropdown 10620, preferably in a universal set of units converted to and from as needed. ProSrchMeth field 14148 is set to 'C' for client driven, or 'S' for server driven (heartbeat processing) as described above. SrchMeth field 14118 defines a preferred search method for the device when finding situational location content for the device. Search Methods include, and are not limited to:

communications with web service 2102, to know which proactive searches are currently executing. DTCreated field 14124 contains a date/time stamp of when the record 14100 was created in (added to) the Proactive Search Table, for example upon invocation of button 14094 when a check-mark is in check-box 14008. Block 11212 of FIG. 112 will create a record 14100 after selecting button 14096 as part of converting user interface fields for subsequent processing when check-box 14008 contains a check-mark. DTLastChg field 14126 contains a date/time stamp of when any field in the record 14100 was last modified. CIP field 14128 preferably contains an internet protocol (ip) address of the user's device that created the applicable data record 14100. The CHIP field 14130 preferably contains the ip address of the actual physical server of web service 2102 that created applicable data record 14100. CHName field 14132 preferably contains the host name of the physical server of web service 2102 that created applicable data record 14100, for example because web service 2102 may be a large cluster of physical servers. ChgrIP field 14134 preferably contains an internet protocol (ip) address of the user's device that last modified the applicable data record 14100. The ChgrHIP field 14136 preferably contains the ip address of the actual physical server of web service 2102 that last modified applicable data record 14100. ChgrHName field 14138 preferably contains the host name of the physical server of web service 2102 that last modified applicable data record 14100, for example because web service 2102 may be a large cluster of physical servers. Record 14100 may also include override fields for overriding any field in the record 6500 that is joined by way of RegistryID 14102. Record 14100 may also include override fields for overriding any field in any record 7000 that is found by a search match to criteria associated with record 14100. Speed, elevation, and other situational location parameters may also be provided to a record 14100 for user specification in proactive searches.

Records 14100 are created/added with FIG. 140 when the check-mark is placed at check-box 14008. When the check-mark is present upon selection of button 14096, then the search is preferably performed asynchronously without display of a Delivery Manager user interface, and processing takes the user to the same interface of link 14098. If a check-mark is not present, then a Delivery Manager user interface is presented to the user as though no other proactive searches are active (which may be), and block 11212 does not add the proactive search requested to the proactive search list managed through link 14098. Link 14098 takes the user to a list

| | |
|---|---|
| Const PRECISE_EXACTMATCH = 1 | 'Seconds (S) from client is used for exact match. |
| Const PRECISE_ROUNDnMATCH = 2 | 'Seconds (S) from client are rounded to an integer, then used to match exactly. |
| Const PRECISE_ROUNDw1D = 3 | 'S from client are rounded to a # with one decimal place, then used to match exactly. |
| Const PRECISE_HALFSECOND = 4 | 'S +/− .5 second range. |
| Const PRECISE_FULLSECOND = 5 | 'S +/− 1 second range. |
| Const PRECISE_SP25toP75 = 6 | 'X.25 < S < X.75 uses X; X.0 <= S <= X.25: (X − 1) & X; X.75 <= S <= X + 1: X & (X + 1). |
| Const PRECISE_SM1toSP1 = 7 | 'S = X.aaa . . .: (X − 1) to (X + 1) range. |
| Const PRECISE_BYUSER = −N | 'Negative indicates an interest radius in feet |

Expire field 14120 is a date/time stamp of when the proactive search is to terminate. ActiveEntry field 14122 is set to Yes ('Y') for the search is active, or No ("N") for the search is not active. This allows the Delivery Manager driving thread to FIG. 120 heartbeat processing, whether it be local to the device, at web service 2102, or at a data processing system in interface similarly discussed for other record types above wherein the list of pending proactive searches for the user (if any) are presented to the user, can be paginated, and check-marked for action. Preferably, there is a website enforced maximum number of pending proactive searches per user (and/or per device) so no search criteria interface needs to be provided (however, a search interface prior to listing entries may be provided). So, users can list their current proactive searches with a standard display of fields including at least the Descript field 14104 and ActiveEntry field 14122. Users can delete, view, or modify a record, or delete, view, or modify a plurality of records as discussed above for other record types (e.g. 2900, 6500, 7000, etc). When a proactive search record is modified, an associated executable search thread may be terminated, and a new one started, for example if ActiveEntry field 14122 is set to Yes and Expire field 14120 has not already expired. Modifying field 14122 provides the user with control for starting or terminating proactive search threads. In one embodiment, modifying other record 14100 fields causes an associated executable proactive search thread to be terminated and restarted automatically with new values. In another embodiment, the user must manually terminate the thread by modifying field 14122 to No, and then back to Yes for restarting with new values. In any case, records 14100 can be maintained by a user regardless of whether there are associated active executable threads issuing heartbeats to FIG. 120 processing (minus Share, Pingimeters, and Nearby processing as discussed above). This way the user can manage activating or deactivating any in his list as desired while changing any record 14100 fields to configure a particular search. Various embodiment will support drill down from any field of record 14100.

When ProSrchMeth is set to 'S' (Driven by server), communications is managed to the data processing system (server) which is executing a proactive search thread (when ActiveEntry field 14122 is set to yes) for starting or terminating the thread at the service. In a UNIX embodiment, an INETD.CONFIG configuration allows communicating to an ip port for spawning a proactive search thread or terminating the thread at the service 2102, or at a server in communications with the service 2102. In a Microsoft Windows environment, a service program may already be started for responding to ip requests for starting or terminating a proactive search thread at the data processing running the Windows service. In another Windows embodiment, Remote Procedure Call (RPC) functionality is employed for enabling or disabling remote proactive search threads. There are potentially millions of proactive search threads executing on behalf of users (or devices), so preferably the threads are compiled and linked executable code to keep code size small and efficient. One embodiment will utilize U.S. Pat. No. 5,938,722, entitled "Method of Executing Programs in a Network" by Johnson, for deploying mass numbers of threads to a network rather than to specific machines. This takes complexities out of managing the proactive search threads across a plurality of data processing systems on behalf of large masses of users. So, web service 2102 will execute a plurality of proactive search threads on behalf of users to web service 2102, or devices communicating to web services 2102, wherein each proactive search thread is configured to search for data into the future until the user terminates it, or its execution expires in accordance with a user configuration. Any data can be searched, any database or external data source is supported as described above, and searches are in context for many different applications.

When ProSrchMeth is set to 'C' (Driven by client), communications is managed to the local data processing system (e.g. device) which is executing a proactive search thread (when ActiveEntry field 14122 is set to yes) for starting or terminating the thread at the device. In one browser embodiment, pages are served back to the device and Active-X is used to interface to the operating system for managing local proactive search threads. In another embodiment, Javascript and/or Java applets are used to interface to the local device operating system.

FIG. 142A depicts a preferred embodiment screenshot for a full browser Delivery Manager after starting delivery processing for a user specified situational location. This user interface is identical in user interface processing to FIGS. 128A, 128E, 130A, 132, 134B, 136A, 137, etc. except the situational location information (e.g. latitude, longitude, etc) was user specified and remains constant throughout heartbeat processing, and the prime link is not relevant so is not displayed. In another embodiment as discussed above, situational location information may have been specified as a route with or without points in time of specific points on the route which allow changing over the course of time during Delivery Manager proactive search processing by user specified situational location.

In one embodiment, a user selects a route on a map much like the plotting of routes on a map by FIG. 98A. The user can specify a sequence of ordered points to define the route, or draw a line on a map which is used to generate a sequence of data points for a route. An elevation, speed and any other situational location information can be specified. In another embodiment, the user enters time points for applicable points of simulate travel in the proactive search capability. Regardless of embodiment, the user is provided with means for specifying one or more situational locations together with useful search criteria such as interests, filters, etc for conducting content or information searches into the future without further user interaction. Once sought data is found in the future, the user (or device) is appropriately notified of the content or information found.

FIG. 142B depicts a preferred embodiment screenshot of Delivery Manager PDA device interface processing for a user specified situational location. FIG. 142B is the PDA user interface version of FIG. 140. Web service 2102 is completely supports heterogeneous devices, so the scrollable area is shown for smaller screen devices. FIG. 142B is identical is functionality to FIG. 140. There is just a smaller presentation of the same interface. A device type and/or browser type is detected by web service 2102 for presenting the appropriate interface. Command line invocations also exist for invoking an interface manually from any device.

FIG. 142C depicts a preferred embodiment screenshot for an automated email delivery after traveling to a situational location having applicable DCDB records wherein the content length exceeds reasonable size of the receiving device. A large amount of deliverable content may be delivered to a device wherein an indicator may not be configured, applicable, relevant, or reasonable, depending on the embodiment. Therefore, the delivery mechanism, for example at blocks 12646 and 12650 (SMTP (Simple Mail Transport Protocol) interface in one embodiment), can deliver a smaller reasonable delivery which summarizes deliveries so an unusually large delivery does not take place. Block 12646 and/or 12650 may also determine an indicator is not relevant and that the receiving device capabilities are not reasonable for such a large delivery in which case a summary email such as FIG. 142C is sent by email or SMS message. Blocks 12646 and/or 12650 can also decide not to send deliverable content because of the content type with respect to the capabilities of the receiving device. The device type and/or browser type is automatically determined by the web service 2102, or is specified by the service interface invoker, thereby making that information always available. A table can be configured to web service 2102 which maps content delivery types supported by device type and/or browser type. The table can also map a maximum size and other constraints about the target system for delivery so blocks 12646 and/or 12650 appropriately push the right content and the right size of content to devices 2540. Other table embodiments can specify time periods with different capabilities, as well as any other variables affecting the content type and/or size of content to deliver. Blocks 12646 and/or 12650 send content appropriately as determined by device situational location, user configurations, user configured constraints, system configurations, system configured constraints, device capabilities, time of delivery, or any other variable useful in deciding the best method for sending content to the device.

FIG. 143A depicts a preferred embodiment screenshot for a text editor edit of a default Master presentation preferences file which provides a template for content delivery presentation. An alternate embodiment will store the template in an SQL database for access and maintenance. FIG. 143B depicts a preferred embodiment screenshot for a text editor edit of a default Archive presentation preferences file which provides a template for archived content delivery presentation. An alternate embodiment will store the template in an SQL database for access and maintenance.

A device can use FIG. 127 processing and a GUI-less driven version of FIG. 120 processing for heartbeats thereby preventing any use of GUI objects at all. The browser versions of the Delivery Manager can of course be executed in a window simultaneously while other applications are running. The window embodiment can be minimized so the user does not need to know its running. The non-GUI thread versions of the Delivery Manager, regardless of how driven, can also be executed simultaneously to other applications.

FIG. 39 Access Control processing of the Delivery Manager can use device credentials or user account credentials, or both. Delivery Manager flowchart processing is preferably performed as an executable thread limited by only the environment configured for web service 2102. Users should not have to wait for any thread to complete before being serviced. Many threads are executed simultaneously to service users at the same time. In one embodiment of web service 2102, a pre-allocated pool of threads are made available and reused as needed to service users.

PingSpots, situational locations of DCDB records 7000, and Pingimeters can be three dimensional regions. The three dimensional regions are three dimensional areas in space which deems a delivery for mobile devices that travel through or near (e.g. in accordance with their interest radius) the three dimensional area in space. A three dimensional region will require at least one point in three dimensional space, for example as an origin. That point can be specified as a point in a x-y-z plane, a point in polar coordinates, or the like, perhaps the center of a planet (e.g. earth) or the Sun, some origin in the Universe, or any other origin for distinctly locating three dimensional regions in space. The situational location of the device, or of the content, can be just the point in three dimensional space. A three dimensional situational location larger than a point, such as a three dimensional region in space, will need at least a three dimensional point as described and perhaps a radius from a center point for representing a sphere. FIG. 125 is easily discussed in terms of situational location points and interest radius spheres when considering a three dimensional embodiment. A three dimensional embodiment may include a rectangular region in space where all rectangle vertices are represented by x-y-z coordinates with a three dimensional point for an origin of reference. A rectangular region can be represented by one or more mathematical curves, or some other means for defining the region in space. Elevation (e.g. for earth, or some other planet, use) may be useful to the three dimensional point of origin, and/or for the three dimensional region in space. An unusual region in space can also be specified with connecting x-y-z coordinates together to bound the three dimensional region in space. There are many methods for representing a three dimensional region in space without departing from the spirit and scope of this disclosure. Users with their devices can travel by plane through three dimensional regions (situational locations) in space for deeming a delivery in context with descriptions above. Users with their devices can travel under the sea through three dimensional regions (situational locations) in space for deeming a delivery in context with descriptions above. Users with their devices can travel around earth, through space, or to other planets through three dimensional regions (situational locations) in space for deeming a delivery in context with descriptions above. Users with their devices can travel anywhere in the universe through three dimensional regions (situational locations) in space for deeming a delivery in context with descriptions above.

Application specific data fields are available for the SDPS being an integrated solution with some other service. Location information (regardless of a two dimensional point or area embodiment, or three dimensional point or region embodiment), direction information, time criteria information, and delivery activation setting(s) information together with application specific data fields, any fields of any records of web service 2102, any configuration information, criteria, or attributes of devices, content, or environments form the situational location information associated with the content which establishes a delivery.

Configurator and Special Interoperability

FIG. 144 depicts a flowchart for describing a preferred embodiment for Delivery Configurator configuration aspects, for example upon selection of the Delivery Config option 4664, or with a command line URL for invocation of the Delivery Config option for the Delivery Configurator. FIG. 144 is the preferred driving user interface logic to user interfaces of FIGS. 147, 149, and 156A through 156B. While FIGS. 147, 149, and 156A through 156B are presented as Java Applet style user interfaces, this is in no way meant to limit the possible embodiments to accomplish the same functionality. Any other user interface embodiment may be deployed as is reasonable for the particular device or device type without departing from the spirit and scope of this disclosure. After selection of option 4664, Delivery Configurator processing starts at block 14402 and continues to block 14418 where the user enters authentication parameters. In one option, the user enters web service 2102 user account credentials (LogonName field 3004 and password field 3006) maintained in a Users Table record 3000. In another option, the user enters device account credentials (Deviceid fields 6504 and password field 6506) maintained in a Registry Table record 6500. In yet another embodiment, the user specifies a group name field 8906 maintained in a Groups Table record 8900 along with a new group password field 8907 also maintained by a user with Groups Table record 8900. The group password can be maintained by a user as any other field in data record 8900 with the same record management interfaces. Any user who knows the group password can logon with the Group Table credentials.

When the user authenticates to the Delivery Configurator, he is setting the Delivery Configurator Assignor(s) for preferences discussed below. When the user authenticates at block 14418 with an account logon name and password (user account credentials), he accesses the Delivery Configurator for configuration on behalf of that user account (i.e. all devices), as well as any other user accounts or devices the account has an "Affinity Delegate" privilege granted (assigned) from as a User to User assignment, Device to Device assignment, User to Device assignment, or Device to User assignment. When the user authenticates at block 14418 with device credentials (device's id/password), he accesses the Delivery Configurator for configuration on behalf of that particular device, as well as any other devices he has an "Affinity Delegate" privilege granted (assigned) from as a User to User assignment, Device to Device assignment, User to Device assignment, or Device to User assignment. In one embodiment, hosting device data evidence or successful logon data evidence is compared with privileges assigned to enable an automated Delivery Configurator authentication, and/or to prevent logging on directly with someone else's credentials. When the user authenticates with group credentials, he accesses the Delivery Configurator for configuration on behalf of all users and devices contained in the group. Recall that a privilege (e.g. "Affinity Delegate") can be assigned (granted) from a user to a user, from a user to a device, from a device to a device, and from a device to a user. The context brings relevance to the privilege assignment depending on the privilege.

Block 14418 determines the authentication type requested (i.e. by user (logon name), by device (Deviceid), or by group (group name)), and validates the entered credentials before continuing to block 14420. The Users Table record 3000, Registry Table record 6500, or Groups Table record 8900 will be interrogated depending on the Delivery Configurator authentication type. Block 14418 never continues to block 14420 until user entered credentials are validated as successful. In a preferred embodiment, block 14418 will enforce a maximum number of authentication attempts. After a maximum number of unsuccessful attempts, the user's successful logon data evidence can automatically be expired as if logout option 4666 was performed. In the device embodiment, the device data evidence can be automatically expired. The user's applicable record 3000 or 6500 can also be deactivated as though it does not exist (ActiveUser field 3008 set to no, ActiveDev field 6550 set to No). An email may also be sent to an administrator account and/or the user to notify that his account or device has been disabled. Preferably, automated processes support reactivating the user account at a later time. Upon successfully entered credentials, if block 14420 determines a group authentication was requested, then block 14436 sets the Configurator Assignor(s) as all users (and their devices) which are members of the group (accesses Groups Table, Users Table/Registry Table, PingPal Privilege Assignment Table), otherwise block 14434 sets the Configurator Assignor(s) to the user account (all the user's devices) or device account used to authenticate to the Configurator. Block 14434 will additionally determine which users and devices have assigned the "Affinity Delegate" privilege to the user, or any of his devices, when authenticating with user account credentials (queries Groups Table, Users Table, PingPal Privilege Assignment Table) for additional candidate Configurator Assignor(s). Block 14434 will additionally determine which users and devices have assigned the "Affinity Delegate" privilege to the device when authenticating with device credentials (queries Groups Table, Users Table, PingPal Privilege Assignment Table) for additional candidate Configurator Assignor(s).

Thereafter, block 14438 initializes in-process configurations variable(s) to Assignor(s) set at block 14436 or 14434 (user, group, or device). If a device was specified at block 14418, then the Assignor(s) can be plural and includes that device as well as any devices and users which have granted the device the "Affinity Delegate" privilege. If a user was specified at block 14418, then the Assignor(s) can be plural and includes the user (equivalent to all user's devices) and each of the user's devices, as well as any devices and users which have granted the user or any of his devices the "Affinity Delegate" privilege. If a group was specified at block 14408, then the Assignor(s) can be plural and includes the group name (equivalent to all user member devices), each user of the group (equivalent to all the particular user's devices), and each of the group member user's devices. The Assignor(s) in any case includes the group name string entered at block 14418 and the id (PersonID, RegistryID, or GroupID) of the associated record in server data 2104 along with each user LogonName and/or device name string as described above associated with its record id. In an alternate embodiment, block 14436 can use the "Affinity Delegate" privilege in a similar manner to block 14434 for discovering additional Configurator Assignor(s) which have granted the "Affinity Delegate" privilege to members of the group. The Assignor(s) are used to automatically populate dropdowns 14968, 15568-*a* and 15568-*b* of FIGS. 149, 156A and 156B. Assignor(s) determined through having granted the "Affinity Delegate" privilege are preferably distinguishable, such as in the form discussed with FIG. 92 above (i.e. "JB345:johnsPDA" and "JB345:ALL DEVICES").

Block 14438 then initializes last-saved configuration(s) variable(s) by querying all users and/or devices which have granted the "Share Delivery Experiences" and "Intercept Delivery Experiences" privileges to the Assignor(s) as described above for assigning these privileges from "user to user", "device to device", "device to user", and "user to device", as is appropriate for Assignor(s) specified at block 14418 and determined further at block 14434 (and at block 14436 in the alternate embodiment of setting Assignor(s) to all users and devices with "Affinity Delegate" privileges granted to members of the group). The Groups Table, Users/Registry Table, and Privileges Assignment Table are queried appropriately. The users and/or devices which have granted either of the two privileges to the Assignor(s) are used to automatically populate dropdowns 14964, 15564-*a* and 15564-*b* of FIGS. 149, 156A and 156B, and are referred to as Configurator Assignee(s). Block 14438 then uses the Assignor(s) and Assignee(s) to query the Configurator Assignments Table for applicable records 15300. Records 15300 found are used to automatically populate configurator preference assignment lists of FIGS. 149, 156A and 156B. The Assignor(s), Assignee(s) and records 15300 are populated to the appropriate user interface by block 14452 when tabbed to by the user. Block 14438 additionally sets in-process configurations variable(s) to last-saved configurations variable(s) so current Delivery Configurator interfaces are reflective of what is in process.

Thereafter, block 14440 sets a user interface for a Delivery Configurator user interface such as FIG. 147 (preferably spawned as a new user interface (i.e. target="_blank")), block 14442 determines if a software upgrade exists for the user's device invoking the Delivery Configurator and sets the upgrade button 14702 as enabled or disabled accordingly before continuing to block 14452.

Block 14442 preferably checks the client software version of the device whereon the user selected option 4664 for FIG. 144 processing with the latest available software from web service 2102. Client software is used to maintain a local cache of deliverable content. Client software can also be resident on the device, for example as used by a WAP device (cell phone) which does not use a browser to invoke FIG. 120 heartbeat processing with situational location heartbeats. The heartbeat driving software can be downloaded to the device so the user is appropriately informed if a later version exists. An executable date/time stamp, version information maintained in persistent memory means (e.g. file), or any reasonable method for determining an application version can be used to determine the version of software installed at the device. After block 14442 checks the device software version, the web service 2102 is queried to see what the latest version is for the particular device, or the web service 2101 latest version can already be made available in the user interface for use when served back to the client from web service 2102. A server side date/time stamp, version information maintained in a separate file, an SQL query to server data 2104, or any reasonable method for determining an application version can be used to determine the version of software most recent for download from the server. Based on a comparison of the software version at the user's client device, and software available from the web service 2102, button 14702 is appropriately enabled or disabled for the particular device. Different software versions can be maintained at web service 2102 for different devices and/or different operating systems on the devices. For devices which use a completely browser based Delivery Manager, button 14702 is enabled or disabled based on version information of applicable local cache management software (if any) installed. Various cache management embodiments may use a browser based user interface with File System Object interfaces (e.g. VBScript FileSystemObject) to the operating system, Active-X interfaces to local device resources, or any reasonable browser based interfaces to resources of the local device for maintaining local cache information.

Thereafter, block 14452 presents (or refreshes) the applicable Delivery Configurator user interface context (FIG. 147, 149, 156A or 156B) in accordance with the most recent settings of the in-process configurations variable(s) made by the user to the Delivery Configurator user interfaces (or as initialized at block 14438). The in-process configurations variable(s) always contain most recent configurations made by the user to any interfaces of FIGS. 147, 149, and 156A through 156B, and represent user action results to the user interfaces. The user interfaces of FIGS. 147, 149, and 156A through 156B display in correlation to user configured in-process configurations variable(s). Thereafter, block 14422 monitors for user actions (also called user events) and waits until one is detected to the currently displayed Delivery Configurator user interface (FIG. 56B). When a user action is detected, processing continues from block 14422 to block 14424 where User Action Trigger processing (FIG. 158) is invoked and returned from before continuing to block 14426. Block 14426 checks for which action was performed by the user. If block 14426 determines the user selected to Save his configurations (selection of buttons 14704, 14904, 15504-*a*, 15504-*b*), then block 14444 performs Save Configurations processing (FIG. 146), and processing continues back to block 14452. If block 14426 determines a save action was not selected by the user, then block 14428 checks for a cancel action. If block 14428 determines the user selected to Cancel Configurations (selection of buttons 14706, 14906, 15506-*a*, 15506-*b*), then block 14446 discards values of in-process configurations variable(s) to the initialized state of block 14438 and resets in-process configurations variable(s) to last-saved configurations variable(s). Saving Configurations makes user configurations persistent throughout subsequent processing. Canceling effectively does an "UNDO" back to the last save. Delivery Configurator configuration can be complicated, and it is therefore desirable to be able to go back to a known set of good configuration information. Other embodiments will not permit a cancel (undo) action, and other embodiments will allow an undo action for each individual configuration made over a history of interfacing to the Delivery Configurator user interface. Block 14446 continues to block 14448 for providing a status (preferably a pop-up user interface) for letting the user know he just cancelled all configurations performed up until the last save. The user must acknowledge the status (preferably clear the pop-up) before block 14448 continues back to block 14452. If block 14428 determines a cancel action was not selected by the user, then block 14430 checks for a close or exit action. If block 14430 determines the user selected to close or exit the current user interface, then block 14462 terminates the active user interface context user interface (FIG. 56B), and Delivery Configurator processing terminates at block 14464. Exit or close processing can be selected from the "File" pulldown or from the rightmost topmost close option of a window. The user must have saved configurations, otherwise any in-process configurations variable(s) will have been lost. Other embodiments can automatically save upon close or exit rather than doing an effective quit with or without a prompt to save. If block 14430 determines a close or exit action was not selected by the user, then block 14432 checks if the user selected to maintain options (e.g. from the "Options" pulldown). If block 14432 determines the user selected to maintain options, then block 14416 performs options processing and continues to block 14452. Options processing includes setting variables related to Delivery Configurator configurations for governing associated processing (e.g. define alert methods or define situational location criteria used in deliveries). If block 14432 determines an options configuration was not selected, then block 14404 checks if the user selected a tab (e.g. any of tabs 14790 through 14798). If block 14404 determines the user selected a tab, then processing continues to block 14452 where the corresponding interface is displayed with in-process configurations in effect. Selection of tab 14790 from any of the Delivery Configurator user interfaces results in a display such as FIG. 147. Selection of tab 14794 from any of the Delivery Configurator user interfaces results in a display such as FIG. 149. Selection of tab 14796 from any of the Delivery Configurator user interfaces results in a display such as FIG. 155A. Selection of tab 14798 from any of the Delivery Configurator user interfaces results in a display such as FIG. 155B. If block 14404 determines a tab was not selected, then block 14406 checks the active tab to perform action processing in context for a tab.

If block 14406 determines the cache tab 14790 is active, then block 14450 performs cache management processing (FIG. 145) to handle specific actions associated to FIG. 147, and then processing continues to block 14452. If block 14406 determines the cache tab 14790 is not active, then block 14406 continues to block 14410. If block 14410 determines the content tab 14794 is active, then block 14456 performs content delivery management processing (FIG. 150 discussed in context for content delivery management processing) to handle specific actions associated to FIG. 149, and then processing continues to block 14452. If block 14410 determines the content tab 14794 is not active, then block 14410 continues to block 14412. If block 14412 determines the alerts tab 14796 is active, then block 14458 performs alert management processing (FIG. 150 discussed in context for alert management processing) to handle specific actions associated to FIG. 155A, and then processing continues to block 14452. If block 14412 determines the alerts tab 14796 is not active, then block 14412 continues to block 14414. If block 14414 determines the actions tab 14798 is active, then block 14460 performs actions management processing (FIG. 150 discussed in context for content actions management processing) to handle specific actions associated to FIG. 155B, and then processing continues to block 14452. If block 14414 determines the actions tab 14798 is not active, then block 14414 continues back to block 14452.

FIG. 145 depicts a flowchart for describing a preferred embodiment for Cache Management configuration processing, for example as referenced at block 14450. Cache management processing starts at block 14502 and continues to block 14504. If block 14504 determines maintain locally checkbox 14716 has just been unchecked, then block 14518 disables Refresh Cache button 14712, Trickle updates checkbox 14718 and Share Cache checkbox 14720. Disabling checkboxes preferably removes any checkmark and disables user selection (e.g. grays it out). Thereafter, block 14522 sets the user interface of FIG. 147 for disabling options and in-process configurations variable(s) are set accordingly. Block 14522 then continues to block 14530 where processing terminates (for return back to FIG. 144 processing). If block 14504 determines checkbox 14716 was not unchecked, then processing continues to block 14506. If block 14506 determines maintain locally checkbox 14716 was checked, then block 14520 enables Refresh Cache button 14712, Trickle updates checkbox 14718 and Share Cache checkbox 14720. Processing then continues to block 14522 for setting the user interface of FIG. 147 for enabling options and in-process configurations variable(s) are set accordingly. If block 14506 determines checkbox 14716 was not checked, then processing continues to block 14508. If block 14508 determines trickle updates checkbox 14718 was unchecked by the user, then processing continues to block 14522 for setting the user interface of FIG. 147 and in-process configurations variable(s) are set accordingly. If block 14508 determines checkbox 14718 was not unchecked, then processing continues to block 14510. If block 14510 determines checkbox 14718 was check-marked by the user, then processing continues to block 14522 for setting the user interface of FIG. 147 and in-process configurations variable(s) are set accordingly. If block 14510 determines checkbox 14718 was not checked, then processing continues to block 14524. If block 14524 determines share DCDB checkbox 14720 was check-marked by the user, then processing continues to block 14522 for setting the user interface of FIG. 147 and in-process configurations variable(s) are set accordingly. If block 14524 determines checkbox 14720 was not checked, then processing continues to block 14526. If block 14526 determines checkbox 14720 was unchecked by the user, then processing continues to block 14522 for setting the user interface of FIG. 147 and in-process configurations variable(s) are set accordingly. If block 14526 determines checkbox 14720 was not unchecked, then processing continues to block 14512.

If block 14512 determines upgrade system button 14702 was selected, then processing continues to block 14532 where a warning prompt is presented to the user that any in-process configurations which have not been explicitly saved shall be discarded. The user must select continue or cancel from the prompt. Thereafter, if block 14534 determines the user selected to cancel, then processing continues to block 14536 where the warning prompt is removed, and then to block 14530. If block 14534 determines the user confirmed to continue, then processing continues to block 14538 where device software is downloaded and installed to the device based on device and/or device type (along with instructions if necessary). A device reboot or power on/off cycle may be required to activate the upgraded software. In one embodiment, GPS interface software is upgraded automatically with this mechanism for downloading to the device to prevent the user from manually requesting a subset of needed upgraded software to the device. If block 14512 determines upgrade system button 14702 was not selected, then processing continues to block 14514. If block 14514 determines refresh cache button 14712 was selected, then block 14546 communicates with web service 2102 for checking the device CacheUpdate field 14810 to see if the device has pending DCDB data to deliver to the device local cache based on mobile travels. A record 14800 with a RegistryID 14802 that matches RegistryID 6502 for the device is used. The device is determined by a last access to the Delivery Manager 2510, device data evidence, authentication to the Delivery Configurator, or automatically by the Delivery Configurator. Thereafter, if block 14548 determines the CacheUpdate field 14810 is set to Yes, then block 14550 updates the device local cache with the DCDB not yet delivered to the device, updates the CacheUpdate field (flag) 14810 for the device to No, and processing continues to block 14552. CacheUpdate field 14810 is set by web service 2102 Delivery Manager processing for content destined for a device which is held back from delivery until such time the device local cache is updated. In one embodiment, FIG. 120 processing checks record 14800 for a device and maintains a pending list of content references (DCDBIDs) for later delivery when the device local cache is to be updated. If block 14548 determines the device CacheUpdate field 14810 is set to No (i.e. no pending DCDB data to refresh cache with), then processing continues to block 14552. Block 14552 provides a status (preferably a pop-up) to the user that his DCDB local cache has been updated. The status requires the user to acknowledge it. Once acknowledged by the user, block 14552 continues to block 14530. If block 14514 determines refresh cache button 14712 was not selected, then processing continues to block 14516. If block 14516 determines retrieve DCDB button 14714 was selected, then processing continues to block 14540 where the user is prompted for a source device to retrieve its locally cached DCDB data. Thereafter, the user specifies a (source) device of web service 2102 at block 14542, and block 14544 interfaces to web service 2102 for a record 14800 for the specified device. The source device is preferably specified by device name (Deviceid field 6504) so block 14544 causes a query for applicable records 6500 and 14800 with a join on RegistryID fields 6502 and 14802 using the device name to match to record 6500. Thereafter, if block 14554 determines the source device specified is shared (check if ShareDCDB field 14808 set to Yes) and there was no error finding the specified device at block 14544, then block 14558 updates the local DCDB cache of device of Delivery Configurator processing with any differences found in the local DCDB cache of the specified source device, and block 14560 provides a completion status to the user before terminating FIG. 145 processing at block 14530. If block 14554 determines the source device specified is not shared or there was an error finding the source device at block 14544, then block 14556 provides an appropriate error to the user and processing continues to block 14530. If block 14516 determines retrieve DCDB button 14714 was not selected, then processing continues to block 14528 where other user actions for this tabbed user interface are processed (e.g. window resizing, pulldown/dropdown click, etc), and then on to block 14530 where processing terminates (for return back to FIG. 144 processing).

Block 14558 may use direct device to device communications for updating DCDB information from one device to the other, or may update through the web service 2102. Preferably, the list of DCDBIDs at each device is compared to determine a difference before doing the update. Devices can share DCDB data between each other as long as the source device is set for sharing. While the share flag is an all or none in the example (i.e. share to all other devices or no other devices), another embodiment will provide a new privilege value to maintain in a Groups Table record 8900 for sharing DCDB data between devices (i.e. "Share DCDB"). The new Group privilege allows assigning the privilege to specific users or devices through assignment from a user to a user, user to device, device to device, and device to user. The new "Share DCDB" privilege is maintained in PrivMask field 8910 like any other privilege and managed in Groups management interfaces (e.g. FIG. 90A, etc) as discussed above. The privilege would then be queried at block 14544 (Registry, Users, Groups, Privileges Assignment Tables) for the devices to validate the privilege has been granted. So, cached deliverable content can be shared between devices without restriction, or can be restricted using the privileges methodology described above with FIGS. 89 through 93E.

Regardless of how the "Share DCDB" privilege is managed, it allows sharing DCDB data between devices so that content delivered to one device based on its travels can be shared and communicated to another device. Various embodiments will permit examination of the locally cached DCDB data through an appropriate user interface. DCDB data communicated from another device can also be examined and used as applicable for some application on the device which accesses the locally cached DCDB data. In the all or none embodiment described, Share DCDB checkbox 14720 is kept in field 14808 in a corresponding record 14800 of web server data 2104. Various embodiments of block 14558 will add to the requesting device's DCDB, replace the requesting device's DCDB, or provide the user with an option for either.

The trickle updates checkbox 14718 enables or disables automatically updating the locally cached DCDB data as the device is mobile. In one embodiment, DCDB data is delivered based on geographical regions. For example, a device travels to one of a plurality of major cities for then receiving an entire Deliverable Content database for maintaining in local cache so deliveries by situational location can occur from local cache thereafter. In another embodiment, cell tower range(s) is used to deliver a locally cached DCDB for content delivery to the device by situational location thereafter while the device is mobile. In one preferred embodiment, the device comes within range of a high speed communications link (i.e. a hot-spot) which is an opportune moment to deliver a DCDB for maintaining to device local cache. The DCDB is updated at the device while within range to the high speed communications link. Subsequently, content of the locally cached DCDB is delivered to the device by situational location of the traveling mobile device (or traveling mobile user). Trickle update checkbox 14718 is kept in field 14806 in a corresponding record 14800 in web server data 2104. Trickle updates checkbox checked preferably puts the device in the mode of looking for high speed hot-spots that happen to come within range of the device for downloading DCDB data at the opportune moments. A hot-spot is a point of presence for high speed internet connectivity. The maintain locally checkbox 14716 determines whether or not to maintain a DCDB local to the device in a cache for subsequent delivery of content contained at the device by the device situational location. Maintain locally checkbox 14716 is kept in field 14804 in a corresponding record 14800 in web server data 2104.

FIG. 146 depicts a flowchart for describing a preferred embodiment for Save Configurations processing, such as processing of block 14444. Processing starts at block 14602 and continues to block 14604 where last-saved configurations variable(s) are accessed, then to block 14606 where in-process configurations variable(s) are accessed. Thereafter, if block 14608 determines the maintain locally checkbox 14716 is newly checked, then block 14618 prepares the receiving device to download an appropriate local cached copy of a DCDB, block 14620 downloads the DCDB or appropriate portion thereof according to device configurations (or preferably puts the device in a mode seeking for the next opportune hot-spot), and processing continues to block 14612. The appropriate cached copy of the DCDB is preferably downloaded according to the current device situational location, along with any regional scheme in place to keep DCDB data reasonably small. In one embodiment, the mobile history of the device additionally determines how much of a DCDB to download to the device. In one embodiment, the user should check the maintain locally option when there is a high communications speed between the device and the web service 2102 to prevent a long download period. In another embodiment, checking the maintain locally option queues up the download until the next opportune moment when coming within range of a reasonable and detectable high communications bandwidth and/or speed, such as from a hot-spot. Block 14612 updates last-saved configurations variable(s) according to in-process configurations variable(s). Block 14612 communicates with web service 2102 to update the device record 14800. Device record 14800 is always equivalent to data values in last-saved configurations variable(s). Thereafter, processing continues to block 14614 where an appropriate status (e.g. pop-up) is provided to the user and the system waits for acknowledgement by the user. The status (e.g. pop-up) is cleared upon user acknowledgement. Thereafter, processing terminates at block 14616. If block 14608 determines the maintain locally checkbox 14716 was not newly checked, then block 14610 checks to see if it was newly unchecked. If block 14610 determines the maintain locally checkbox 14716 was newly unchecked, then block 14622 appropriately purges local cache and frees up memory back to the device operating system for other use. Processing then continues to block 14612. If block 14610 determines the maintain locally checkbox was not newly unchecked, then processing continues to block 14612. In one embodiment, block 14622 prompts the user for "Are you sure?" and awaits cancellation or acceptance to purge local cache. Block 14612 saves Delivery Configurator configurations/assignments and ensures insertions or deletions are made to the Delivery Configurator affected tables (e.g. Configurator Assignments Table record 51300, Cache Configuration Table record 14800, etc).

FIG. 147 depicts a preferred embodiment screenshot for Cache Management configuration aspects. The user can select to make situational location deliveries from the local device with a locally cached DCDB or from web service 2102 from service connected data (i.e. maintain locally checkbox 14716). The user can select to receive DCDB updates continually to his device during roaming (traveling) so DCDB data is automatically delivered to the device as is appropriate based on the device situational location (and hot-spots as they become available in one preferred embodiment). This allows select portions of the overall DCDB data at web service 2102 to be delivered to the device for local delivery (trickle updates checkbox 14718). Users of the FIG. 147 user interface may be users of a particular device, users who have authority to control a particular device, or any other user type appropriate for making such configurations. Preferably, the FIG. 147 user interface is used to affect the device that hosts the user interface of FIG. 147. The FIG. 147 user interface supports the usual windowed controls for minimizing, maximizing, closing, sizing, moving, pulldowns, buttons, a Help pulldown option, <F1> cursor-context sensitive help, etc, however an analogous embodiment for a WAP device, PDA, or any device where a window is unlikely will incorporate the same accomplished functionality. A File pulldown option enables the user to simply save any configurations (equivalent to Save buttons (e.g. 14704)), or to exit the window 2400 (i.e. terminate/close the Delivery Configurator application). An Options pulldown provides options to define Alerts methods and situational location criteria which is discussed below. The FIG. 147 window contains tabs as described above.

Maintain locally option 14716 enables the user to toggle specifying maintaining of the DCDB local to the device, or to access it dynamically as needed from the web service 2102. The delivery of DCDB data may perform better being local, and may become a personalized copy based on situational locations the device has experienced over time. A trickle updates checkbox 14718 enables the user to toggle trickling updates from the web service 2102 at real time when DCDB changes are made versus requiring the user to perform a manual refresh. A share DCDB checkbox 14720 enables the user to toggle permission to share locally maintained DCDB with other requesting users. This functionality is particularly useful when a locally cached DCDB becomes personalized for the particular device (RDPS). An upgrade system button 14702 enables upgrading the data processing system programs (or control logic) of the device for carrying out disclosed functionality. A refresh cache button 14712 enables manually refreshing the locally cached DCDB. Refreshing is preferably a modification rather than a completely new download to the device. A date/time stamp may be maintained with the cache for facilitating the latest date/time stamp of a record 7000 in cache to prevent scanning cache every time a refresh is requested.

A retrieve DCDB button 14714 enables the user to retrieve the locally maintained DCDB from another device, provided the source device has enabled the share DCDB checkbox 14720 (or required privilege). Data transfer between the requesting device and source device may occur in a variety of methods including over a peer to peer session, a datagram session-less connection, by way of a common SDPS, or any other method to accomplish the transmission.

The FIG. 147 user interface includes a save button 14704 to save any configurations made by the user to the Delivery Configurator application, and a Cancel button 14706 to cancel any configurations made by the user to the Delivery Configurator application. The save and cancel options are available to all tab contexts. Preferably, options provided are forced to enabled or disabled (e.g. grayed out) when a prerequisite mode is not established. For example, maintain locally checkbox 14716 disabled causes a graying out disablement of 14718, 14720, 14712, and 14714. When enabled, the refresh cache button 14712 refreshes differences between DCDB data meant for the device at web service 2102 and the current state of locally maintained DCDB data. As situational locations are determined, the locally maintained DCDB data is modified automatically to be reflective of what should be maintained there, for example by region of locale (e.g. physical location: state, city, county, Mapsco reference, etc; vicinity location: within cell tower range, within hot spot vicinity, etc). Trickling updates involves more than just adding. DCDB data is automatically removed, added to, or modified as needed. Trickling updates preferably occurs as soon as a reasonable communication bandwidth and speed is available such as coming within range of a hotspot or high transmission cell tower cell. As soon as the device comes within range, the device establishes authenticated communications with web service 2102 for subsequently maintaining the locally cached DCDB data in accordance with the device situational location.

When enabled, the retrieve DCDB button 14714 may blindly refresh the entire DCDB data meant for the device from web service 2102. The locally cached DCDB data is purged and an associated date/time stamp may be established for indicating the latest date/time stamp of a record 7000 in the locally cached DCDB for an easier comparison for future updates, or for trickling updates. (cache may be overwritten rather than purged first).

FIG. 14 has already been described above for configuring DCDB whether it be by an administrator from a device, or any other data processing system. If FIG. 14 processing is invoked from a device (RDPS), various embodiments will update DCDB at the web service 2102 (SDPS), local to the device where configuration is made, or both. A device may be appropriately equipped to automatically sense (e.g. simulate any or all of human senses) the environment upon user reconciliation or control. In one embodiment, a picture phone takes a picture for use as PingSpot content or deliverable content of records 7000. In another embodiment, a video-taking equipped phone takes footage for use as PingSpot content or deliverable content of records 7000. In another embodiment, a sensing device that samples the environment can use or convert sensed data to a usable form for records 7000. A device may automatically sense something in the environment in accordance with user action(s) for automatically loading of DCDB data, for example to add delivery content for proactive delivery. Situational location information, DCDB data, or any other associated data may be specified in part, or in its entirety by the user, depending on how much of the information is automatically determined by the device. Data that is automatically determined may also be provided in part, or its entirety, by device processing or automated device sensing. Once DCDB configuration(s) is complete, for example deliverable content database record(s) 7000, it is instantly activated for candidate delivery, or may require a confirmation configuration by a higher authority user or process before being activated for candidate delivery (e.g. Active Entry field 7054).

FIG. 148 depicts a preferred embodiment of a data record 14800 in the Cache Configuration Table. RegistryID 14802 is preferably a foreign key to RegistryID 6502 for associating a record 14800 uniquely to a record 6500. The foreign key relationship preferably utilizes a cascade delete relationship. MaintainLocal field 14804 is set to Yes or No by checkbox 14716 for a particular device. TrickleUpdates field 14806 is set to Yes or No by checkbox 14718 for a particular device. ShareDCDB field 14808 is set to Yes or No by checkbox 14720 for a particular device, and provides the right for other devices to access the locally maintained DCDB. CacheUpdate field 14810 is set to Yes or No when the Delivery Manager determines a device's locally cached DCDB needs an update (i.e. deliverable content for device is available for updating its local cache). In one embodiment, records 6500 are extended with the records 14800 fields. Records 14800 contain fields that can be returned to the device by block 12712, or can made available wherever records 6500 are accessed. In one embodiment, record 14800 fields can be maintained with any of the device management interfaces (Registry table management interfaces of viewing, adding, deleting, and modifying) as an extension to records 6500. Records 14800 are created with default values when adding a record 6500.

FIG. 149 depicts a preferred embodiment screenshot for Delivery Content configuration aspects. In the preferred embodiment, Configurator Assignor(s) from authentication to the Delivery Configurator are populated to delivery target dropdown 14968. These are the target devices for content deliveries as configured. User logon names and/or device names will be populated to the sorted dropdown 14968 list. A user logon name implies specifying all devices owned by that user. The dropdown 14968 list can be positioned to by the user entering a prefix string, or entire string, into delivery target entry field 14966. The closest matching prefix or string in dropdown 14966 is automatically scrolled to the corresponding sorted entry. The user can also select the down-arrow 14976 to see, scroll, and select any entry from the dropdown 14968 list. A user can highlight or unhighlight any entry(s) in the list so as to affect configurations of one or many at the same time. For example, holding the <Ctrl> key down while clicking with a cursor can highlight multiple entries. If the user accessed the Delivery Configurator with a device, then only a device and its "Affinity Delegate" privilege grantors will display in the dropdown 14968. If the user accessed the Delivery Configurator with a user logon name, then the user logon name and any devices owned by the user, along with "Affinity Delegate" privilege grantors, will each display in the dropdown list 14968. If the user accessed the Delivery Configurator with a group, then all users of the group, and all devices owned by all users of the group will display in the dropdown list 14968. An alternate embodiment will also set Assignor(s) to "Affinity Delegate" privilege grantors to users and devices of the group. Preferably, a user logon name qualifier precedes a device name in the dropdown 14968 list when the Delivery Configurator was accessed with a group, or with "Affinity Delegate" privilege granting users or devices (i.e. "JB345:johnsPDA" and "JB345:ALL DEVICES"). FIG. 149 shows that device names are numeric phone numbers. These device names could have been specified by a user, or automatically populated from a mobile phone service with the Registry Table import option. An entire cellular phone service directory is easily imported into records 6500 to conveniently adapt web service 2102 to an entire phone directory.

Configurator Assignee(s) which have granted Assignor(s) with either the "Share Delivery Experiences" or "Intercept Delivery Experiences" privilege are populated to the monitor dropdown 14964 according to the current highlighted Assignor(s) at dropdown 14968. Privileges configuration of FIGS. 89 through 93E are preferably used to grant these two privileges. User logon names and/or device names will be populated to the sorted dropdown 14964 list according to privileges assigned to the dropdown 14968 entry (user or device) shown. The list can be positioned to by the user entering a prefix string, or entire string, to monitor entry field 14962. The closest matching prefix or string in dropdown 14964 is automatically scrolled to the corresponding sorted entry. The user can also select the down-arrow 14974 to see, scroll, and select any entry from the dropdown 14964 list. A user can highlight or unhighlight any entry(s) in the list so as to affect configurations of one or many at the same time. For example, holding the <Ctrl> key down while clicking with a cursor can highlight multiple entries If an "Intercept Delivery Experiences" privilege has been assigned, then the corresponding user or device of dropdown list 14964 is preferably shown in italics to differentiate which users and/or devices have assigned which of the two privileges ("Share Delivery Experiences"=normal type and "Intercept Delivery Experiences"=italic type). While the Configurator Assignee(s) have assigned the "Share Delivery Experiences" or "Intercept Delivery Experiences" privileges to the Configurator Assignor(s) that are currently highlighted at dropdown 14968, they become assignees to delivery share preferences as described below. A user logon name specified in dropdown list 14964 or 14968 implies specifying all devices of that user without knowing, or caring, specifically what devices there are. A qualified user logon name ("JB345:ALL DEVICES") implies a user other than the user using the Delivery Configurator.

The user of the FIG. 149 user interface is able to either receive duplicate content deliveries to target device(s) of dropdown 14968 which are sent to the device(s) selected at dropdown 14964, or intercept content deliveries to target device(s) of dropdown 14968 which would have been sent to the device(s) selected at dropdown 14964. This depends on which of the two privileges were granted. Monitor preference list 14970 and target preferences list 14972 contains delivery share configurations that can be assigned for criteria used in delivery. The "Current Interests" delivery share configuration enables/disables (via checkmark) the preference of using the associated device's configured Interests field 6516 in order to perform content delivery. Other embodiments will use interests that are user specified, group specified, or automatically specified based on activities of a device, user, or group of devices or users. The "Current Filters" delivery share configuration enables/disables (via checkmark) the preference of using the associated device's Filter field 6518 in order to perform content delivery. Alternative embodiments will use filters that are user specified, group specified, or automatically specified based on activities of a device, user, or group of devices or users. The "Historical Interests" delivery share configuration enables/disables (via checkmark) the preference of using the associated device's historical interests in order to perform content delivery. One embodiment of historical interests used includes maintaining a history of Interests field 6516 that was used to match to records 7000 in order to cause a (historical) delivery of content. Other embodiments will use historical interests associated with previous content deliveries that are maintained for a user specified, group specified, or automatically specified based on activities of a device, user, or group of devices or users. Further still, there can be time criteria to scope the range of applicable historical interests. The "Historical Filters" delivery share configuration enables/disables (via checkmark) the preference of using the associated device's historical content filters in order to perform content delivery. One embodiment of historical filters used includes maintaining a history of filter constraints field 6518 that was used to match to records 7000 in order to prevent a (historical) delivery of content. Other embodiments will use historical filters associated with preventing previous content deliveries, the filters that are maintained for a user specified, group specified, or automatically specified based on activities of a device, user, or group of devices or users. Further still, there can be time criteria to scope the range of applicable historical filters. The "Keyword History" delivery share configuration (not shown but can be scrolled to in lists 14970 and 14972) enables/disables (via checkmark) the preference of using the associated device's historical keyword matches in order to perform content delivery. One embodiment of keyword history used includes maintaining a history of keywords successfully matched (perhaps in a system configured trailing time window) which were used to cause a historical delivery of content. Alternative embodiments will use a history of keywords associated with previous content deliveries, the keywords that are maintained for a user specified group, or automatically specified based on activities of a device, user, or group of devices or users. Further still, there can be time criteria to scope the range of applicable historical keywords. The "Situational Location" delivery share configuration (not shown but can be scrolled to in lists 14970 and 14972) enables/disables (via checkmark) the preference of using the associated device's situational location in order to perform content delivery. This allows content to be delivered to one device for a situational location of another device. It isolates specifying whose situational location(s) to use for content delivery, independently of whose filters, interests, or applicable keywords are used in determining a content delivery.

When a user interface such as FIG. 149 is presented to the user, the user typically first selects/highlights an Assignor(s) at dropdown 14968, for example device "2144044071". The user then selects/highlights an Assignee(s) at dropdown 14964, for example device "2144034071". Available Assignee(s) are those that have granted one or both of the privileges "Share Delivery Experiences" or "Intercept Delivery Experiences". A plurality of Assignor(s) and/or Assignee(s) can be highlighted (and un-highlighted) for identical preferences configurations. The user can then select preferences on how to share the delivery experience. FIG. 149 shows the user has selected "Current Interests" and "Current Filters" for both the monitored device "2144034071" and the target delivery device "2144043071". The monitored device "2144034071" is not in italics so therefore has granted a "Share Delivery Experience" privilege to "2144044071". Examining the configurations of FIG. 149 indicates that the interests field 6516 and filters field 6518 of device "2144034071" is used as a superset with interests field 6516 and filters field 6518 of device "2144044071" to deliver content that would normally be delivered by situational location to device "2144044071". Selecting a list entry from either list 14970 or 14972 toggles a checkmark on or off. A checkmark at any entry in the list 14970 says to use that entry criteria of the dropdown 14964 selection (e.g. 2144034071). A checkmark at any entry in the list 14972 says to use that entry criteria of the dropdown 14968 selection (e.g. 2144044071). If the "Situational Location" delivery share configuration is check-marked in list 14970, then the situational location of the device 2144034071 is used to determine content deliveries to device 2144044071. This allows using the situational locations of other mobile devices 2540 to cause delivery of content to another device. Mobile travels of device 2144034071 causes duplicate content deliveries to device 2144044071. If 2144034071 was italic, then the privilege was "Intercept Delivery Experiences", in which case mobile travels of 2144033071 would cause only delivery of content to device 2144044071 based on situational locations of device 2144034071. Device 2144034071 would not receive content that was ordinarily delivered to it whenever it is deemed deliverable to device 2144044071 according to Delivery Configurator configurations. If the "Situational Location" delivery share configuration is check-marked in list 14972, then the situational location of the device 2144044071 is used to determine content deliveries to device 2144044071 which is default behavior of web service 2102 for devices using web service 2102. However, the user can enable or disable this with list 14972. So, the user can use the Delivery Configurator to have content delivered to his target device(s) by the situational locations of other devices as well as configurations of those other devices and/or his own target devices of dropdown 14968. A first presentation of FIG. 149 preferably defaults checkmarks in lists 14970 and 14972 to reflect web service 2102 default behavior, assuming there are no preference configurations from records 15300 found. Default web service 2102 behavior (assuming no Delivery Configurator configurations made yet) equates to no checkmarks in list 14970. Default web service 2102 behavior equates to having checkmarks for "Current Interests", "Current Filters" and "Situational Location" in list 14972 for a device or user of dropdown 14968. In another embodiment, defaults can be used so the Delivery Configurator is not required for use after being assigned the "Share Delivery Experience" or "Intercept Delivery Experience" privileges. Any defaults can be implemented.

If a user logon name was specified at dropdown 14968, then all that user's devices are handled with a single configuration at dropdown 14968 as though each device were configured individually with the same configurations as those set for the user. If a user logon name was specified at dropdown 14964, then all that user's devices are handled with a single configuration at dropdown 14964 as though each device were configured individually with the same configurations as those set for the user. The Delivery Configurator configures functionality between devices. Configuring functionality between users, or between a user and a device is a convenience for specifying a plurality of devices in the configuration.

Checkbox 14986 is selected for a checkmark for particular highlighted entries at dropdown 14964 and dropdown 14968 for whether or not to queue up the delivery, for example in case the user thinks an instant delivery is not reasonable, or is undesirable, to the target device. A checkmark at checkbox 14986 indicates to queue up the content and save it for a later delivery. By web service 2102 default, there is no checkmark at checkbox 14986 for any set of entries selected at dropdowns 14964 and 14968. A delivery attempt is always made according to device configurations. When a checkmark at checkbox 14986 is selected, no delivery attempt is made. The device Master can be viewed at a later time to see what deliveries took place. While dropdowns display the name strings, they are associated with the record id when selected (e.g. PersonID 3002 for user, RegistryID 6502 for device, GroupID 8902 for group).

FIG. 149 gives the privileged user (or device) the ability to control when the duplicate or intercept feature is to be used. The privileged user (or device) effectively camps on the delivery line of the granting user (or device) that provided the "Share Delivery Experience" privilege without disrupting delivery to the granting user. The "Intercept Delivery Experience" should be granted only under strict uses to prevent others from stealing your deliveries. In another embodiment, all preferences assigned in FIGS. 149, 151A and 151B can be individual privileges assigned through FIGS. 89 through 93E and associated processing. In the best mode of this embodiment, preferences assigned as individual privileges provide the rights to assign the preferences and do not provide that actual privilege. Preferences of FIGS. 149, 151A and 151B would be still assigned as described herein but the user cannot assign a preference for which he does not have a privilege for to assign in the first place. In this best mode, privileges assigned merely provide the right to assign a preference.

In another embodiment, preferences of FIGS. 149, 151A and 151B are assigned as privileges through FIGS. 89 through 93E and associated processing wherein the preferences become assigned there. In this case, no preference assignments are needed in FIGS. 149, 151A and 151B. Regardless of embodiment, users can assign privileges to other users, users can assign privileges to devices, devices can assign privileges to users, devices can assign privileges to devices, users can assign preferences for interacting with other users, users can assign preferences for interacting with devices, devices can assign privileges for interacting with users, and devices can assign preferences for interacting with other devices. Using groups also permits organizing a group of users and/or devices at either end of a privilege or preference assignment.

FIG. 150 depicts a flowchart for describing a preferred embodiment of Delivery Configurator Management Configuration processing. FIG. 150 shall be discussed in context for Content Delivery Management processing of block 14456.

Processing starts at block 15002 and continues to block 15004 for processing and actions to a user interface such as FIG. 149. If block 15004 determines a checkmark was placed or removed at checkbox 14986, then block 15016 invokes participant list manage processing (FIG. 151) with the user checkmark action, and processing terminates at block 15012. If block 15004 determines checkbox 14986 was not checked or unchecked, then processing continues to block 15006. If block 15006 determines a monitor configuration action was made by the user to monitor configuration area 14982, then block 15018 invokes participant list manage processing (FIG. 151) with the user action to the area 14982, and processing terminates at block 15012. If block 15006 determines a monitor configuration action was not made by the user, then processing continues to block 15008. If block 15008 determines a deliver to configuration action was made by the user to deliver to configuration area 14984, then block 15020 invokes participant list manage processing (FIG. 151) with user action to the area 14984, and processing terminates at block 15012. If block 15008 determines a monitor configuration action was not made by the user, then processing continues to block 15010. Block 15010 handles other actions to the user interface of FIG. 149 which do not add or remove a preference configuration, for example selecting down-arrows 14974 or 14976 to expose a significant amount of list entries, scrolling lists 14970 or 14972, resizing the window of FIG. 149, or any other action that is not handled by FIG. 151 processing. Thereafter, FIG. 150 processing terminates at block 15012.

FIG. 151 depicts a flowchart for describing a preferred embodiment of participant list management processing, such as at blocks 15016, 15018 and 15020. FIG. 151 in also processed in context for a particular type of Delivery Configurator Management Configuration processing. Continuing with the discussion above in context for Content Delivery Management processing of block 14456, processing starts at block 15102 and continues to block 15104 for processing specific actions to a user interface such as FIG. 149. If block 15104 determines a character was typed to, deleted from, or changed at a data entry field of a configuration area of a tabbed user interface of the Delivery Configurator (e.g. fields 14962 or 14966), then processing continues to block 15116. If block 15116 determines the associated dropdown list is empty (e.g. dropdown 14964 list is associated with entry field 14962, dropdown 14968 list is associated with entry field 14966), then processing continues to block 15114 for handling the action as editing text in the data entry field, and then to block 15126. A list could be empty if it's a monitor configuration area dropdown list where neither the "Share Delivery Experiences", nor "Intercept Delivery Experiences" privileges have been assigned to the highlighted Assignor(s) at the other dropdown. Block 15126 terminates FIG. 151 processing. If block 15116 determines the associated dropdown list is not empty, then block 15118 matches the closest first occurrence entry in the associated dropdown list (which is in sorted order), scrolls the dropdown list and makes it the selected entry of the associated dropdown list. Thereafter, block 15128 sets in-process configurations variable(s) according to settings of the configuration areas, and processing continues to block 15126 where FIG. 151 processing terminates. If block 15104 determines a character was not acted upon at a data entry field, then processing continues to block 15106. If block 15106 determines an entry was selected (user or device) in a dropdown list of a configuration area of a tabbed user interface of the Delivery Configurator (e.g. dropdowns 14964 or 14968), then processing continues to block 15128 for toggling highlighting of the selected entry, and setting or removing the corresponding intended configuration in in-process configurations variable(s). Processing continues to block 15126 where FIG. 151 processing terminates. If block 15106 determines an entry was not selected in a dropdown list, then processing continues to block 15108. If block 15108 determines a preferences list entry was selected (e.g. in preferences lists 14970 or 14972), then processing continues to block 15120 for toggling a checkmark on or off for display depending on the previous state and block 15130 sets in-process configurations variable(s) according to the selected preference of the configuration area of the particular tabbed user interface of the Delivery Configurator. Thereafter, processing terminates at block 15126. If block 15108 determines a preferences list entry was not selected, then processing continues to block 15110. If block 15110 determines a queue for later checkbox was selected (e.g. checkbox 14986), then processing continues to block 15122 for toggling a checkmark on or off for display depending on the previous state and block 15130 sets in-process configurations variable(s) according to the selection of the checkbox area of a tabbed user interface of the Delivery Configurator. Thereafter, processing terminates at block 15126. If block 15110 determines a queue for later checkbox was not selected, then processing continues to block 15114 where other actions of the tabbed user interface of the Delivery Configurator are handled appropriately. Thereafter, processing terminates at block 15126.

FIG. 152 depicts a flowchart for describing a preferred embodiment of Share Delivery processing, as invoked by FIG. 120 heartbeat processing. Share Delivery processing has a null effect unless Content Delivery Management configurations (e.g. FIG. 149) have been made. It is recommended that the reader read descriptions thoroughly for this entire application disclosure before reading FIG. 152 descriptions here. FIG. 152 descriptions are made in reference for how to modify FIG. 120 processing based on Delivery Configurator configured processing. Share Delivery processing starts at block 15202 and continues to block 15204. Block 15204 accesses "Share Delivery Experiences" and "Intercept Delivery Experiences" privileges which have been assigned by the device (or owner of the device) of FIG. 120 processing to others (users and devices). If the privileges are assigned to users, then all devices owned by the users are accessed. Processing of block 15204 completes when all records 6500 are accessed for target devices based on privileges. The entire record can be put into the set of resulting devices, or only those fields that are required for further processing (fields used in preferences or delivery). Thereafter, block 15206 accesses records 15300 and any joined records 15400 for devices (found at block 15206) which are monitoring the device of FIG. 120 heartbeat processing. Block 15206 processing ends with a subset of devices from block 15204 which are monitoring the device of FIG. 120 heartbeat processing for content, alerts, and/or PingSpots. Thereafter, block 15208 initializes a Delivery Configurator Content Configuration (DCCC) array variable to null, a Delivery Configurator Alert Configuration (DCAC) array variable to null, and a Delivery Configurator PingSpot Configuration (DCPC) array variable to null before continuing to block 15210.

If block 15210 determines the device of FIG. 120 heartbeat processing is being monitored for content delivery, then block 15218 sets the DCCC array variable to target device record(s) from block 15206 specifically for content management as configured by FIG. 149, and processing continues to block 15212. If block 15210 determines the device of FIG. 120 heartbeat processing is not being monitored for content delivery, then processing continues to block 15212. If block 15212 determines the device of FIG. 120 heartbeat processing is being monitored for alerts, then block 15220 sets the DCAC array variable to target device record(s) from block 15206 specifically for alerts as configured by FIG. 155A, and processing continues to block 15214. If block 15212 determines the device of FIG. 120 heartbeat processing is not being monitored for alerts, then processing continues to block 15214. If block 15214 determines the device of FIG. 120 heartbeat processing is being monitored for PingSpot alerts, then block 15222 sets the DCPC array variable to target device record(s) from block 15206 specifically for PingSpots as configured by FIG. 155B, and processing continues to block 15216. If block 15214 determines the device of FIG. 120 heartbeat processing is not being monitored for PingSpots, then processing continues to block 15216 where processing terminates and returns to FIG. 120 processing.

So as to not obfuscate heartbeat processing, Delivery Share configurations are discussed as integrated to FIG. 120 heartbeat processing. The array variable DCCC is preferably used at block 12020 depending on whose interests and/or filters to use, and for the other historical information used to filter or include records 7000. Block 12050 further includes maintaining DCDBID hitlist data evidence for target devices that are to receive deliveries. Block 12016 will access Trail Table records 6800 of devices who want to use their own situational location at the time of delivery to the device of FIG. 120 processing. FIG. 121 processing will be altered by the array variable DCCC for duplicating deliveries or intercepting deliveries to the device of FIG. 120 processing by inserting into the target device Masters that were determined as receivers at blocks 12020, 12050, and/or 12016. Prevention of insertion to the master of the device of FIG. 120 processing will occur when all receiving target devices are configured for interception ("Intercept Delivery Experience"). If at least one duplicating target device exists ("Share Delivery Experience"), then the device of FIG. 120 processing will receive the record 7000 to its Master. The Queue for later configuration for receiving target devices of DCCC will determine whether or not the DCCC array is passed at block 12132 for Master processing. The DCCC array is not passed when all receiving DCCC target devices are marked queue for later, since each device can check its Master (the queue) later and no delivery processing is required. The DCCC array is passed at block 12132 to FIG. 126 processing for each DCCC target device to accomplish delivery. The devices with queue for later will have their Masters populated. In cases where the device of FIG. 120 heartbeat processing has all of its deliveries intercepted, no Master changes are made for the device of FIG. 120 heartbeat processing and no FIG. 126 processing occurs for the device of FIG. 120 heartbeat processing, however FIG. 126 may be performed for devices of the DCCC array as configured without queue for later processing.

The array variable DCAC is preferably used at blocks 12338 and 12326 to ensure alerts are delivered to the DCAC target devices 12020. The alerts may not be delivered to the device of FIG. 120 processing at all if all receiving DCAC target devices are marked for intercepting the alert. Otherwise, the alerts are duplicated to the DCAC target devices. The ALERT_COMMUNICATIONS_FIELD 15408 can be used to override normal record 9500 alert method processing as discussed below.

The array variable DCPC is preferably used at blocks 12216 depending on whose interests and/or filters to use, and for the other historical information used to filter or include records 7000. Block 12216 will access Trail Table records 6800 of any devices who want to use their own situational location at the time of delivery to the device of FIG. 120 heartbeat processing. FIG. 122 processing will be altered by the array variable DCPC for duplicating deliveries or intercepting deliveries to the device of FIG. 120 processing by inserting into the target device Masters that were determined as receivers at block 12216. Prevention of insertion to the master of the device of FIG. 120 processing will occur when all receiving target devices are configured for interception ("Intercept Delivery Experience"). If at least one duplicating target device exists ("Share Delivery Experience"), then the device of FIG. 120 processing will receive the record 7000 to its Master. The Queue for later configuration for receiving target devices of DCPC will determine whether or not the DCPC array is passed at block 12132 for Master processing. The DCPC array is passed at block 12132 to FIG. 126 processing for each DCPC target device to accomplish delivery. The devices with queue for later will have their Masters populated. In cases where the device of FIG. 120 heartbeat processing has all of its deliveries intercepted, no Master changes are made for the device of FIG. 120 heartbeat processing and no FIG. 126 processing occurs for the device of FIG. 120 heartbeat processing, however FIG. 126 may be performed for devices of the DCPC array as configured without queue for later processing.

FIG. 153 depicts a preferred embodiment of a data record in the Configurator Assignments Table. Records 15300 contain preferences configurations made to the Delivery Configurator interfaces, such as FIGS. 149, 155A, and 155B. Records 15300 are maintained with respect to default behavior of web service 2102 so that removing checkmarks from defaulted check-marked preferences will insert record(s) 15300 as will placing checkmarks to preferences which are not default web service 2102 behaviors. ASSIGNOR_ID 15302 contains the id (PersonID or RegistryID) of an entry from an Assignor(s) dropdown list. ASSIGNOR_TYPE field 15304 is set to "U" for user or "D" for device for indicating how to interpret field 15302. ASSIGNEE_ID 15306 contains the id (PersonID or RegistryID) of an entry from an Assignee(s) dropdown list. ASSIGNEE_TYPE field 15308 is set to "U" for user or "D" for device for indicating how to interpret field 15306. CONFIG_TYPE field 15310 contains the actual preference of a preferences list that is being configured. An enumerated list of constants for preference list entries with well known meanings is preferably configured to web service 2102 for easy reference by field 15310. REC_TYPE field 15312 is set to "$" for the record 15300 being a Content Delivery Management configuration, "!" for record 15300 being an Alerts Management configuration, "P" for being a PingSpots Alert Management configuration, or "®" for the record 15300 being an Actions Management configuration. DELIV_TYPE field 15314 is set to "D" for duplicate delivery or "I" for intercepted delivery. Q4LATER field 15314 is to Yes or No for whether or not to do the delivery or queue for later (require user to view the Master at some time in the future). CONFIG_ID 15318 is a handle for joining to a record 15400 when needed. A negative value indicates there is no joining record 15400.

Records 15300 are read at block 14438 for initialization (into last-saved configurations variable(s)), and any that do not show to have the associated "Share Delivery Experiences" and "Intercept Delivery Experiences" (FIGS. 89 through 93E processing) are deleted. Records 15300 are added, removed, or modified at block 14612 (from last-saved configurations variable(s)). Record data is prepared for being added, removed, or modified at blocks 15128, 15130 and 15132 (into in-process configurations variable(s)). Delivery Share processing makes use of the records 15300 for affecting delivery processing of FIG. 120.

FIG. 154 depicts a preferred embodiment of a data record in the Delivery Configuration Extensions Table. Records 15400 contain preferences configurations made to the Delivery Configurator interfaces specifically for the purpose of alerts management or actions management. CONFIG_ID 15402 joins to CONFIG_ID 15318 for associating a record 15400 with a record 15300. USE_SITUATIONAL_LOC field 15404 is a Yes or No flag for whether or not to use field 15406. SITUATIONAL_LOCATION field 15406 is a compound field that preferably contains a plurality of fields which form a list of situational locations, each a situational location described with fields from records 7000, 6500, or other criteria concerning a content delivery. The situational location is optional information for further clarifying when to deliver an alert or action associated delivery as described below, and is set with the Options pulldown. ALERT_COMMUNICATIONS_INFO field 15408 contains the method by which to send a duplicated alert or intercepted alert as configured by FIG. 155A. The ALERT_COMMUNICATIONS_INFO can be an email address and/or SMS message address and/or Deviceid field 6504 for active browser receipt. ALERT_COMMUNICATIONS_INFO is configured by the "Options" pulldown at any time and preferably affects configurations made thereafter. In a preferred embodiment, field 15404 is a join field to another table containing multiple rows, wherein each row contains fields for forming a situational location.

FIG. 155A depicts a preferred embodiment screenshot for Alerts Management configuration aspects. In the preferred embodiment, Configurator Assignor(s) from authentication to the Delivery Configurator are populated to delivery target dropdown 15568-*a*. These are the target devices for alerts as configured. User logon names and/or device names will be populated to the sorted dropdown 15568-*a* list. A user logon name implies specifying all devices owned by that user. The dropdown 15568-*a* list can be positioned to by the user entering a prefix string, or entire string, into delivery target entry field 15566-*a*. The closest matching prefix or string in dropdown 15566-*a* is automatically scrolled to the corresponding sorted entry. The user can also select the down-arrow 15576-*a* to see, scroll, and select any entry from the dropdown 15568-*a* list. A user can highlight or unhighlight any entry(s) in the list so as to affect configurations of one or many at the same time. For example, holding the <Ctrl> key down while clicking with a cursor can highlight multiple entries. Population of Assignors and Assignees to dropdowns is analogous to that which was described above for FIG. 149 and that which will be described for FIG. 155B. User interaction to the dropdowns and interfaces are also analogous. If the user accessed the Delivery Configurator with a device, then the device and the grantors of "Affinity Delegate" privileges to the device will display in the dropdown 15568-*a*. If the user accessed the Delivery Configurator with a user logon name, then the user logon name and any devices owned by the user, as well as grantors of "Affinity Delegate" privileges to the user or any of his devices will each display in the dropdown list 15568-*a*. If the user accessed the Delivery Configurator with a group, then all user logon names of the group, and all devices owned by all users of the group will display in the dropdown list 15568-*a*. An alternate embodiment will also set Assignor(s) to "Affinity Delegate" privilege grantors to users and devices of the group. Preferably, a user logon name qualifier precedes a device name in the dropdown 15568-*a* list when the Delivery Configurator was accessed with a group logon (e.g. user1: device23). FIG. 155A shows that device names are numeric phone numbers. These device names could have been specified by a user, or automatically populated from a mobile phone service with the Registry Table import option. An entire cellular phone service directory is easily imported into records 6500 to conveniently adapt web service 2102 to an entire phone directory.

Configurator Assignee(s) which have granted Assignor(s) with either the "Share Delivery Experiences" or "Intercept Delivery Experiences" privilege are populated to the monitor dropdown 15564-*a* according to the highlighted Assignor(s) at dropdown 15568-*a*. Privileges configuration of FIGS. 89 through 93E are preferably used to grant these two privileges. User logon names and/or device names will be populated to the sorted dropdown 15564-*a* list according to privileges assigned to the dropdown 15568-*a* entry (user or device) shown. The list can be positioned to by the user entering a prefix string, or entire string, to monitor entry field 15562-*a*. The closest matching prefix or string in dropdown 15564-*a* is automatically scrolled to the corresponding sorted entry. The user can also select the down-arrow 15574-*a* to see, scroll, and select any entry from the dropdown 15564-*a* list. A user can highlight or unhighlight any entry(s) in the list so as to affect configurations of one or many at the same time. For example, holding the <Ctrl> key down while clicking with a cursor can highlight multiple entries. If an "Intercept Delivery Experiences" privilege has been assigned, then the corresponding user or device of dropdown list 15564-*a* is preferably shown in italics to differentiate which users and/or devices have assigned which of the two privileges ("Share Delivery Experiences"=normal type and "Intercept Delivery Experiences"=italic type). While the Configurator Assignee(s) have assigned the "Share Delivery Experiences" or "Intercept Delivery Experiences" privileges to the Configurator Assignor(s), they become assignees to delivery share preferences as described below. A user highlighted in dropdown list 15564-*a* or 15568-*a* implies specifying all devices of that user without knowing, or caring, specifically what devices there are.

The user of the FIG. 155A user interface is able to either receive duplicate alerts or PingSpot deliveries to target device(s) of dropdown 15568-*a* which are sent to the device(s) selected at dropdown 15564-*a*, or intercept alerts to target device(s) of dropdown 15568-*a* which would have been sent to the device(s) selected at dropdown 15564-*a*. This depends on which of the two privileges were granted. Monitor preference list 15570-*a* and target preferences list 15572-*a* contains delivery share configurations that can be assigned for criteria used in alert delivery. There are two alert embodiments for configuring preferences via FIG. 155A, one for Pingimeter Alerts, and one for PingSpots (a form of content delivery alert from PingPals). A new tab may be provided to the Delivery Configurator for doing both of these, or the "Options" pulldown (which is shown) is used to toggle between the two alert configuration modes of FIG. 155A to display a unique tabbed interface of FIG. 155A. Delivery share preferences configured at 15570-*a* and 15572-*a* depend on the embodiment. Block 14452 can present the PingSpots or Pingimeter alerts user interface based on the mode specified by the user in the Options pulldown.

Assuming the alert configuration mode (or tabbed user interface in one embodiment) for alerts is used to configure sharing Pingimeter alerts, then no Areas 15570-*a* or 15572-*a* are shown. The user simply selects which entries to monitor by highlighting them in dropdown 15564-*a*. These will cause duplicate or intercepted delivery as described above based on the privilege assigned to be delivered to the associated entry in dropdown 15568-*a*. Pingimeter alerts are based on geographical boundaries without regard to interests, filters, etc. FIG. 150 shall be discussed in context for Pingimeter Alert Management processing of block 14458. Processing starts at block 15002 and continues to block 15004 for processing and actions to a user interface such as FIG. 155A. If block 15004 determines a checkmark was placed or removed at checkbox 14986 (which will never happen at FIG. 155A for Alerts), then block 15016 invokes participant list manage processing (FIG. 151) with the user checkmark action, and processing terminates at block 15012. If block 15004 determines checkbox 14986 was not checked or unchecked, then processing continues to block 15006. If block 15006 determines a monitor configuration action was made by the user to monitor configuration area 15582-*a*, then block 15018 invokes participant list manage processing (FIG. 151) with the user action to the area 15582-*a*, and processing terminates at block 15012. If block 15006 determines a monitor configuration action was not made by the user, then processing continues to block 15008. If block 15008 determines a deliver to configuration action was made by the user to deliver to configuration area 15584-*a*, then block 15020 invokes participant list manage processing (FIG. 151) with user action to the area 15584-*a*, and processing terminates at block 15012. If block 15008 determines a monitor configuration action was not made by the user, then processing continues to block 15010. Block 15010 handles other actions to the user interface of FIG. 155A which do not add or remove a preference configuration, for example selecting down-arrows 15574-*a* or 15576-*a* to expose a significant amount of list entries, resizing the window of FIG. 155A, or any other action that is not handled by FIG. 151 processing. Thereafter, FIG. 150 processing terminates at block 15012. Areas 15570-*a* and 15572-*a* have no preference configurations and therefore do not cause any configuration processing.

Continuing with the discussion above in context for Pingimeter alert processing of block 14458, processing starts at block 15102 and continues to block 15104 for processing specific actions to a user interface such as FIG. 155A. If block 15104 determines a character was typed to, deleted from, or changed at a data entry field of a configuration area of a tabbed user interface of the Delivery Configurator (e.g. fields 15562-*a* or 15566-*a*), then processing continues to block 15116. If block 15116 determines the associated dropdown list is empty (e.g. dropdown 15564-*a* list is associated with entry field 15562-*a*, dropdown 15568-*a* list is associated with entry field 15566-*a*), then processing continues to block 15114 for handling the action as editing text in the data entry field, and then to block 15126. A list could be empty if it's a monitor configuration area dropdown list where neither the "Share Delivery Experiences", nor "Intercept Delivery Experiences" privileges have been assigned to the selected Assignor highlighted at dropdown 15568-*a*. Block 15126 terminates FIG. 151 processing. If block 15116 determines the associated dropdown list is not empty, then block 15118 matches the closest first occurrence entry in the associated dropdown list (which is in sorted order), scrolls the dropdown list and makes it the selected entry of the associated dropdown list. Thereafter, block 15128 sets in-process configurations variable(s) according to settings of the configuration areas. Processing continues to block 15126 where FIG. 151 processing terminates. If block 15104 determines a character was not acted upon at a data entry field, then processing continues to block 15106. If block 15106 determines an entry was selected (user or device) in a dropdown list of a configuration area of a tabbed user interface of the Delivery Configurator (e.g. dropdowns 15564-*a* or 15568-*a*), then processing continues to block 15128 for toggling highlighting of the selected entry, and setting or removing the corresponding intended configuration in in-process configurations variable(s). Processing continues to block 15126 where FIG. 151 processing terminates. If block 15106 determines an entry was not selected in a dropdown list, then processing continues to block 15108. For FIG. 155A so far discussed, block 15108 will always determine a preferences list entry was not selected and block 1510 will always determine there is no action for queue for later processing (will never happen for Pingimeters alert processing), therefore processing continues directly to block 15114 from block 15106 where other actions of the tabbed user interface of the Delivery Configurator are handled appropriately. Thereafter, processing terminates at block 15126. Alerts are not stored in a device Master and there is preferably no queuing methodology. Another embodiment will queue up undeliverable alerts for later retries. FIGS. 150 and 151 in context for Pingimeter Alerts maintain records 15300 and joined records 15400. Note that records 15400 contain fields 15404 and 15406. The user can access the "Options" pulldown to configure one or more manually entered situational locations and then toggle an enable or disable flag for using fields 15404 or 15406. By default, field 15404 is set to No and field 15406 is empty. When the user has enabled situational location information, field 15404 is set to yes and that information is added to the records 15400 (field 15406 or joined from field 15406) for only duplicating or intercepting alerts when the monitored device(s) meet the situational location criteria while at the same time cause an alert to be generated. This allows clarifying alerts that the target user or devices are interested in based on any situational location information criteria.

In one embodiment, field 15408 which is set with the Options pulldown can override the alert methods configured in normal Pingimeter processing as discussed with records 9500. ALERTS_COMMUNICATIONS_INFO field 15408 is preferably configured analogously to configuring AlertType field 9508 as described with record 9500 descriptions. Record 15400 data is to be made available at the appropriate points of subsequent FIG. 120 heartbeat processing.

Assuming the alert configuration mode (or tabbed user interface in one embodiment) for alerts is used to configure sharing PingSpots, then Areas 15570-*a* and 15572-*a* will include an identical list of preferences discussed for FIG. 149. User interfacing to FIG. 155A is analogous to interfacing to FIG. 149 except the content to be duplicated on delivery or shared are specifically PingSpots. FIG. 150 shall be discussed in context for PingSpot (Alert) Management processing of block 14458. Processing starts at block 15002 and continues to block 15004 for processing and actions to a user interface such as FIG. 155A. If block 15004 determines a checkmark was placed or removed at checkbox 15586-*a* (checkbox 15586-*a* is not shown but will be displayed and placed analogously to checkbox 14986 of FIG. 149), then block 15016 invokes participant list manage processing (FIG. 151) with the user checkmark action, and processing terminates at block 15012. If block 15004 determines checkbox 15586-*a* was not checked or unchecked, then processing continues to block 15006. If block 15006 determines a monitor configuration action was made by the user to monitor configuration area 15582-*a*, then block 15018 invokes participant list manage processing (FIG. 151) with the user action to the area 15582-*a*, and processing terminates at block 15012. If block 15006 determines a monitor configuration action was not made by the user, then processing continues to block 15008. If block 15008 determines a deliver to configuration action was made by the user to deliver to configuration area 15584-*a*, then block 15020 invokes participant list manage processing (FIG. 151) with user action to the area 15584-*a*, and processing terminates at block 15012. If block 15008 determines a monitor configuration action was not made by the user, then processing continues to block 15010. Block 15010 handles other actions to the user interface of FIG. 155A which do not add or remove a preference configuration, for example selecting down-arrows 15574-*a* or 15576-*a* to expose a significant amount of list entries, scrolling lists 15570-*a* or 15572-*a*, resizing the window of FIG. 155A, or any other action that is not handled by FIG. 151 processing. Thereafter, FIG. 150 processing terminates at block 15012. Areas 15570-*a* and 15572-*a* have preference configurations identical to FIG. 149 for sharing PingSpots.

Continuing with the discussion above in context for Pingimeter alert processing of block 14458 for sharing PingSpots, processing starts at block 15102 and continues to block 15104 for processing specific actions to a user interface such as FIG. 155A. If block 15104 determines a character was typed to, deleted from, or changed at a data entry field of a configuration area of a tabbed user interface of the Delivery Configurator (e.g. fields 15562-*a* or 15566-*a*), then processing continues to block 15116. If block 15116 determines the associated dropdown list is empty (e.g. dropdown 15564-*a* list is associated with entry field 15562-*a*, dropdown 15568-*a* list is associated with entry field 15566-*a*), then processing continues to block 15114 for handling the action as editing text in the data entry field, and then to block 15126. A list could be empty if it's a monitor configuration area dropdown list where neither the "Share Delivery Experiences", nor "Intercept Delivery Experiences" privileges have been assigned to the highlighted Assignor(s) at the other dropdown. Block 15126 terminates FIG. 151 processing. If block 15116 determines the associated dropdown list is not empty, then block 15118 matches the closest first occurrence entry in the associated dropdown list (which is in sorted order), scrolls the dropdown list and makes it the selected entry of the associated dropdown list. Thereafter, block 15128 sets in-process configurations variable(s) according to settings of the configuration areas. Processing continues to block 15126 where FIG. 151 processing terminates. If block 15104 determines a character was not acted upon at a data entry field, then processing continues to block 15106. If block 15106 determines an entry was selected (user or device) in a dropdown list of a configuration area of a tabbed user interface of the Delivery Configurator (e.g. dropdowns 15564-*a* or 15568-*a*), then processing continues to block 15128 for toggling highlighting of the selected entry, and setting in-process configurations variable(s) accordingly. Processing continues to block 15126 where FIG. 151 processing terminates. If block 15106 determines an entry was not selected in a dropdown list, then processing continues to block 15108. If block 15108 determines a preferences list entry was selected (e.g. preferences lists 15570-*a* or 15572-*a*), then processing continues to block 15120 for toggling a checkmark on or off for display depending on the previous state and block 15130 sets in-process configurations variable(s) according to the selected preference of the configuration area of a tabbed user interface of the Delivery Configurator. Thereafter, processing terminates at block 15126. If block 15108 determines a preferences list entry was not selected, then processing continues to block 15110. If block 15110 determines a queue for later checkbox was selected (e.g. checkbox 15586-*a* is not shown but will be displayed and placed analogously to checkbox 14986 of FIG. 149), then processing continues to block 15122 for toggling a checkmark on or off for display depending on the previous state and block 15132 sets in-process configurations variable(s) according to the selection of the checkbox area of a tabbed user interface of the Delivery Configurator. Thereafter, processing terminates at block 15126. If block 15110 determines a queue for later checkbox was not selected, then processing continues to block 15114 where other actions of the tabbed user interface of the Delivery Configurator are handled appropriately. Thereafter, processing terminates at block 15126. PingSpots are stored in a device Master for later viewing, so delivery can be prevented so they are viewed later. FIGS. 150 and 151 in context for PingSpots (Alerts) maintain records 15300 and joined records 15400.

Field 15406 can be used to override situational location information used for the PingSpots involved if field 15404 is set to Yes. Field 15408 can be used to override PingSpot content delivery processing with an alert instead of the configured deliverable content. Record 15400 data is to be made available at the appropriate points of subsequent FIG. 120 heartbeat processing for alerting instead of updating the Master(s).

FIG. 155B depicts a preferred embodiment screenshot for Actions Management configuration aspects. In the preferred embodiment, Configurator Assignor(s) from authentication to the Delivery Configurator are populated to delivery target dropdown 15568-*b*. These are the target devices for actions as configured. User logon names and/or device names will be populated to the sorted dropdown 15568-*b* list. A user selected implies specifying all devices owned by that user. The dropdown 15568-*b* list can be positioned to by the user entering a prefix string, or entire string, into delivery target entry field 15566-*b*. The closest matching prefix or string in dropdown 15566-*b* is automatically scrolled to the corresponding sorted entry. The user can also select the down-arrow 15576-*b* to see, scroll, and select any entry from the dropdown 15568-*b* list. A user can highlight or unhighlight any entry(s) in the list so as to affect configurations of one or many at the same time. For example, holding the <Ctrl> key down while clicking with a cursor can highlight multiple entries. What gets displayed to the dropdowns is analogous to what has been discussed above for the dropdowns of FIGS. 149 and 155A. FIG. 155B shows that device names are numeric phone numbers. These device names could have been specified by a user, or automatically populated from a mobile phone service with the Registry Table import option. An entire cellular phone service directory is easily imported into records 6500 to conveniently adapt web service 2102 to an entire phone directory.

Configurator Assignee(s) which have granted Assignor(s) with either the "Share Delivery Experiences" or "Intercept Delivery Experiences" privilege are populated to the monitor dropdown 15564-*b* according to the current displayed Assignor(s) at dropdown 15568-*b*. Privileges configuration of FIGS. 89 through 93E are preferably used to grant these two privileges. User logon names and/or device names will be populated to the sorted dropdown 15564-*b* list according to the two privileges assigned to the dropdown 15568-*b* entry (user or device) highlighted. The list can be positioned to by the user entering a prefix string, or entire string, to monitor entry field 15562-*b*. The closest matching prefix or string in dropdown 15564-*b* is automatically scrolled to the corresponding sorted entry. The user can also select the down-arrow 15574-*b* to see, scroll, and select any entry from the dropdown 15564-*b* list. A user can highlight or unhighlight any entry(s) in the list so as to affect configurations of one or many at the same time. For example, holding the <Ctrl> key down while clicking with a cursor can highlight multiple entries. If an "Intercept Delivery Experiences" privilege has been assigned, then the corresponding user or device of dropdown list 15564-*b* is preferably shown in italics to differentiate which users and/or devices have assigned which of the two privileges ("Share Delivery Experiences"=normal type and "Intercept Delivery Experiences"=italic type). While the Configurator Assignee(s) have assigned the "Share Delivery Experiences" or "Intercept Delivery Experiences" privileges to the Configurator Assignor(s), they become assignees to delivery share preferences as described below. A user specified in dropdown list 15564-*b* or 15568-*b* implies specifying all devices of that user without knowing, or caring, specifically what devices there are.

There is no difference between "Share Delivery Experiences" or "Intercept Delivery Experiences" privileges for action configuration because actions at a device cannot be intercepted. Either of the two renders identical functionality for actions configuration. The user/device of the FIG. 155B user interface is notified with the monitored actions of other user(s)/device(s). The user/device can receive action alerts to target device(s) of dropdown 15568-*b* which occur at device(s) selected at dropdown 15564-*b*. Monitor preference list 15570-*b* and target preferences list 15572-*b* contains delivery share configurations that can be assigned for criteria used in action alert notification.

Preference lists 15570-*b* and 15572-*b* will include a list of preferences similarly discussed and acted upon by the user for FIG. 149, except they have different names and are different in the functionality provided. They are discussed in detail below. FIG. 150 shall be discussed in context for Action Management processing of block 14460. Processing starts at block 15002 and continues to block 15004 for processing and actions to a user interface such as FIG. 155B. If block 15004 determines a checkmark was placed or removed at checkbox 15586-*b*, then block 15016 invokes participant list manage processing (FIG. 151) with the user checkmark action, and processing terminates at block 15012. If block 15004 determines checkbox 15586-*b* was not checked or unchecked, then processing continues to block 15006. If block 15006 determines a monitor configuration action was made by the user to monitor configuration area 15582-*b*, then block 15018 invokes participant list manage processing (FIG. 151) with the user action to the area 15582-*b*, and processing terminates at block 15012. If block 15006 determines a monitor configuration action was not made by the user, then processing continues to block 15008. If block 15008 determines a deliver to configuration action was made by the user to deliver to configuration area 15584-*b*, then block 15020 invokes participant list manage processing (FIG. 151) with user action to the area 15584-*b*, and processing terminates at block 15012. If block 15008 determines a monitor configuration action was not made by the user, then processing continues to block 15010. Block 15010 handles other actions to the user interface of FIG. 155B which do not add or remove a preference configuration, for example selecting down-arrows 15574-*b* or 15576-*b* to expose a significant amount of list entries, scrolling lists 15570-*b* or 15572-*b*, resizing the window of FIG. 155B, or any other action that is not handled by FIG. 151 processing. Thereafter, FIG. 150 processing terminates at block 15012.

Continuing with the discussion above in context for actions management processing of block 14460, processing starts at block 15102 and continues to block 15104 for processing specific actions to a user interface such as FIG. 155B. If block 15104 determines a character was typed to, deleted from, or changed at a data entry field of a configuration area of a tabbed user interface of the Delivery Configurator (e.g. fields 15562-*b* or 15566-*b*), then processing continues to block 15116. If block 15116 determines the associated dropdown list is empty (e.g. dropdown 15564-*b* list is associated with entry field 15562-*b*, dropdown 15568-*b* list is associated with entry field 15566-*b*), then processing continues to block 15114 for handling the action as editing text in the data entry field, and then to block 15126. A list could be empty if it's a monitor configuration area dropdown list where neither the "Share Delivery Experiences", nor "Intercept Delivery Experiences" privileges have been assigned to the highlighted Assignor(s) at dropdown 15568-*b*. Block 15126 terminates FIG. 151 processing. If block 15116 determines the associated dropdown list is not empty, then block 15118 matches the closest first occurrence entry in the associated dropdown list (which is in sorted order), scrolls the dropdown list and makes it the selected entry of the associated dropdown list. Thereafter, block 15128 sets in-process configurations variable(s) according to settings of the configuration areas. Processing continues to block 15126 where FIG. 151 processing terminates. If block 15104 determines a character was not acted upon at a data entry field, then processing continues to block 15106. If block 15106 determines an entry was selected (user or device) in a dropdown list of a configuration area of a tabbed user interface of the Delivery Configurator (e.g. dropdowns 15564-*b* or 15568-*b*), then processing continues to block 15128 for toggling highlighting of the selected entry, and setting or removing the corresponding intended configuration in in-process configurations variable(s). Processing continues to block 15126 where FIG. 151 processing terminates. If block 15106 determines an entry was not selected in a dropdown list, then processing continues to block 15108. If block 15108 determines a preferences list entry was selected (e.g. preferences lists 15570-*b* or 15572-*b*), then processing continues to block 15120 for toggling a checkmark on or off for display depending on the previous state and block 15130 sets in-process configurations variable(s) according to the selected preference of the configuration area of a tabbed user interface of the Delivery Configurator. Thereafter, processing terminates at block 15126. If block 15108 determines a preferences list entry was not selected, then processing continues to block 15110. If block 15110 determines a queue for later checkbox was selected (e.g. checkbox 15586-*b*), then processing continues to block 15122 for toggling a checkmark on or off for display depending on the previous state and block 15132 sets in-process configurations variable(s) according to the selection of the checkbox area of a tabbed user interface of the Delivery Configurator. Thereafter, processing terminates at block 15126. If block 15110 determines a queue for later checkbox was not selected, then processing continues to block 15114 where other actions of the tabbed user interface of the Delivery Configurator are handled appropriately. Thereafter, processing terminates at block 15126. The FIG. 155B user interface is acted upon analogously to FIG. 149 in assigning preferences.

Records 15300 and 15400 are created in accordance with action configurations. The Options pulldown configurations can be used to populate an alert method in field 15408 as well as situational location information to fields 15404 and 15406. Other embodiments of alert management and action management will use the target device record 6500 fields for determining the suitable delivery method(s).

Monitor preference list 15570-*b* and target preferences list 15572-*b* contains delivery share configurations that can be assigned for criteria used in action notification. Each list contains different criteria for enabling or disabling. Records 15700 are preferably used to automatically populate list 15570-*b* since these are all actions that can be performed on the monitored device. The monitor preference list 15570-*b* contains preferences such as:

"Surf": delivery share configuration enables/disables (via checkmark) the preference of causing an action notification sent when the user of the device surfs (accesses) the internet through a web browser "eMail": delivery share configuration enables/disables (via checkmark) the preference causing an action notification sent when the user accesses a local email system "Dial": delivery share configuration enables/disables (via checkmark) the preference causing an action notification sent when the user invokes dialing a phone number from the device "Save File": delivery share configuration enables/disables (via checkmark) the preference causing an action notification sent when the user saves a file at the device There can be a list of preferences of monitor preference list 15570-*b* which equate to any action that can be performed at a device. There will be many records 15700 for all monitor user actions at devices. Eligible actions are all those found in records 15700. Records 15700 define all actions which can be registered by any participating device of web service 2102 (discussed below). For devices where the action is irrelevant, then the action simply never gets detected at the device. The target preference list 15572-*b* contains preferences for at least:

"My Actions": delivery share configuration enables/disables (via checkmark) the preference of causing an action notification sent from the source device when the user of the device performs any actions registered for the target device.

There can be a list of preferences of target reference list 15572-*b* which provide additional functionality using criteria associated with the target device(s). In other embodiments, each preference discussed above for FIGS. 149, 155A, 155B, and associated processing can be implemented completely with specific privileges as described with FIGS. 89 through 93E. Because the privileges are specific to the Delivery Configurator, the preferred embodiment handles these as preferences after main privileges of "Share Delivery Experiences" and "Intercept Delivery Experiences" are granted. Delivery Configurator user interfaces can take on different embodiments depending on the device which hosts the interface, and depending on user interface controls desired, while maintaining the foundation functionality.

FIG. 156 depicts a preferred embodiment of a data record in the Action Registration Table. While a user interface such as FIG. 155B can be used to define action management processing between users and/or devices, only the actions that are registered at the device can be monitored. The monitored device (or user) must register actions which can be monitored, so not only does the "Share Delivery Experiences" or "Intercept Delivery Experiences" have to be granted by the monitored device(s) (or user(s)), the actions must also be registered for the device. In the preferred embodiment (FIG. 158 processing), the device itself is used to register eligible actions for being monitored by other devices. In another embodiment, records 15600 can be maintained for a device without the knowledge of the user of a monitored device. Regardless or how records 15600 are created, they provide means for monitoring actions at a monitored device. Records 15600 are created for the devices which are to be monitored and can be used by the target device for the "My Actions" preference. The "My Actions" preference indicates to use the target device's actions for determining which actions to monitor of the monitored device. REGISTRANT_ID 15602 contains a PersonID 2902/3002 or RegistryID 6502 according to the REGISTRANT_TYPE field 15604 which is a "U" for a user (i.e. all the user's devices), or a "D" for a device. ACTION_ID 15606 contains an ACTION_ID 15702 value. A record 15700 with an ACTION_ID 15702 must exist before it can be inserted as a valid value to field 15606. ACTION_CONTEXT_INFO field 15608 contains device context information for the circumstances under which the action registered is to be performed. ACTION_CONTEXT_INFO field 15608 can contain a situational location, system constraint(s), user specified constraint(s), or any criteria for the environment or state under which the action is performed. DATETIME_STAMP field 15610 contains a date/time stamp of when the action was registered.

FIG. 157 depicts a preferred embodiment of a data record in the Actions Table. Records 15700 constitute all actions which can be registered by any device 2540 of web service 2102. Records 15700 provide a standard set of actions which are reasonable for registration by mobile devices 2540 to web service 2102. Without records 15700, it would be difficult to know what actions are being registered and how to monitor for those actions across heterogeneous devices. ACTION_ID 15702 contains a unique action identifier to an action which can be monitored at a heterogeneous device of web service 2102. USER_EVENT field 15704 contains a user event description of the monitorable device action such as a keystroke sequence, invocation sequence of an executable, determined presence of an executable, command line command, shortcut or iconic invocation, or any other description for a user action at a device. Field 15704 may further define information similar to ACTION_CONTEXT_INFO for specifying under what circumstances the user event is denoted a monitored action. DESCRIPTION field 15706 provides an administrator with the ability to document the action of record 15700. Records 15700 are preferably created in advance of a particular web service 2102 deployment, but can certainly be managed as needed after a deployment. Removing a record 15700 must remove any records 15600 which reference it.

FIG. 158 depicts a flowchart for describing a preferred embodiment of Action Trigger processing, such as that which takes place on any device 2540 to web service 2102 at any time. FIG. 158 is a Terminate and Stay Resident (TSR) type of program which intercepts input at a device for pre-processing. Processing starts at block 15802 and continues to block 15804. If block 15804 determines an action at the device is for registering an action, then block 15812 interfaces with the user to create, view, modify, or delete a record 15600. If a record 15700 does not exist for the action, then the user cannot create it. The user can also set the mode of his device to prompt when an action causes a delivery or don't prompt when an action causes a delivery, for the purpose of overriding notifications. Other embodiments will not support a mode option (e.g. to prevent the user from overriding action notification). The mode need not be set every time at blocks 15812 and 15814. The mode is optionally set at that opportune moment and stays in effect from that point forward until modified by the user. Thereafter, block 15822 checks if the action created or modified a resulting valid record 15600 (also a corresponding record 15700 must exist for the action). If block 15822 determines the action can be registered, then block 15814 creates or replaces a record 15600 for the action, sets the mode for triggers on the device (if user set at block 15812) and processing continues to block 15806. If block 15822 determines, the user deleted or viewed a record 15600 at block 15812, or the record created or modified is invalid, then processing continues to block 15824 where a status is reported to the user. Thereafter, processing continues to block 15806. Block 15806 accesses all registered action records 15600 as well as privilege configurations (Groups Table, PingPal Assignment Table, Users Table, Registry Table). Records 15600 without appropriate privileges are discarded.

A performance conscious implementation may cache records 15600 and joined privilege assignment table records for quick access at block 15806 and then update cache at reasonable opportune moments. Blocks 15812, 15822, 15824, and 15814 are provided for managing records 15600. Thereafter, if block 15808 determines an action invoked by the user is registered according to a valid record 15600 accessed at block 15806, then processing continues to block 15816, otherwise processing terminates at block 15810 where the action is handled by the device in the normal manner. Even a registration action may be monitored. Valid records 15600 are queried at block 15806 and checked if they contain an action being performed by the user.

If block 15816 determines the mode set last at block 15812 is for prompt, then block 15826 provides a prompt to the user indicating a registered action has been detected and is configured for notification to other device(s), otherwise block 15816 continues directly to block 15818. One embodiment of block 15826 will list which devices are being notified. Preferably, the user must act on the prompt to acknowledge it with cancel or continue. This permits the user to override sending a notification to other devices or users. Thereafter, if block 15828 determines the user selected to cancel, then processing terminates at block 15810, and normal device processing of the action occurs. If block 15828 determines the user selected to continue, then block 15818 determines the device situational location and block 15820 sends any applicable action notifications to configured devices as determined by valid records 15600 accessed at block 15806, along with applicable records 15300 and 15400 which are accessed at block 15820. A performance conscious implementation may cache record information for quick access at block 15820 and then update cache at reasonable opportune moments. The device situational location is determined at block 15818 in case the action alert has been clarified with the device having to perform the action at a situational location of field(s) 15406 for field(s) 15404 set to yes. Sending can be directly from device to device, or through web service 2102 with an appropriate means. Thereafter, block 15810 terminates FIG. 158 processing. Block 15820 will use ALERT_COMMUNICATIONS_INFO field 15408 if available, otherwise the record 6500 for each target device must be accessed for how to deliver the notification. The notification is preferably a textual message containing informative information about the action. Block 15820 will use SITUATIONAL_LOCATION field 15406 when USE_SITUATIONAL_LOC field 15404 is set to Yes. This clarifies to block 15820 when comparing the device situational location from block 15818 that the action is not to notify any device unless the situational location determined at block 15818 matches at least one that is configured in field 15406. Also, block 15808 can use any data found at ACTION_CONTEXT_INFO field 15608 to further clarify the action is registered. Record information can be accessed as needed from web service 2102, cached at opportune moments for being readily available for access, or periodically communicated to devices or systems that need it.

Statistics

FIG. 159 depicts a preferred embodiment screenshot for the Reports option of the Service option of the publicly accessed area of the web service 2102. Valuable statistics are provided to users of web service 2102 depending on the user type. For example, content delivery statistics, statistics on alerts, and other statistics are easily incorporated to web service 2102. Content providers are interested in how many content deliveries have been made, the type of recipients, the time the deliveries were made, and other attributes about delivering content to mobile devices/users. Anonymous membership registration provides approximate age, geographical location, sex, work industry information, and other information for categorizing statistics about deliveries, configurations made, and any other aspect of user dependent processing in web service 2102. The number of alerts generated by a device, the number of and type of deliveries made to a device, the keywords used to match, and many other attributes about mobile devices 2540 and web service 2102 are of interest depending on the users or user types. Appropriate data in server data 2104 and appropriate interfaces to access the data are provided in web service 2102 without revealing personally identifiable information about any particular user. Useful statistics 2522, depending on the preferred embodiment deployed, are maintained at appropriate points throughout web service 2102 processing as determined with the descriptions of web service 2102 above. FIGS. 159, 160A and 160B describe some preferred statistics. In a preferred embodiment of web service 2102, scripts access the statistics 2522 and automatically build spreadsheets, charts, and graphs for view in reporting applications such as Microsoft Excel. This provides excellent control on additional report generation with raw data totals used. In another embodiment, the My GPS component 2502 provides a new option, for example a Users Statistics option 4609 where a user can select the option link to go to reporting of statistics that are reasonable for the particular user type and/or device type as determined by FIG. 39 access control processing to the reporting page. In any case, statistics are a key piece of the anonymous location based services because valuable information can be presented without revealing too much information about devices, users, web service transactions and traffic, and any other processing of web service 2102. Useful statistics for marketing research, and for analyzing activities of web services 2102, provide a foundation for getting feedback on use of web service 2102 in an informative, yet anonymous manner.

FIGS. 160A and 160B depict preferred embodiment screenshots for the Service option of the publicly accessed area of the web service for summarizing some site features. Having read the above descriptions, those skilled in the art will understand how each of the features in FIGS. 160A and 160B are implemented. Statistical data is intuitive based on the Table records presented above, the times at which they are accessed, and the interaction of processing discussed above. Statistics of FIGS. 160A and 160B (e.g. "Reports" column) can each be itemized with associated running total(s) kept in server data 2104 for later access. A script accessing server data 2104 can report weekly, monthly, etc from timely snapshots taken. Another embodiment will associate statistics in server data 2104 to timeframes in server data 2104 which can then be reported based on timeframes requested.

EMBODIMENTS

FIG. 161 depicts an illustration of a preferred implementation environment for carrying out the web service described in this application. The web service 2102 is deployable from a stand-alone all in one server with local disk drive storage to mass load balanced clusters of servers with connected storage over a Storage Area Network (SAN). Tape backup is provided to protect web service 2102 data and server data 2104 from a disaster. The tape media is preferably written to from web service 2102 data at least once per day during minimal load hours, and then taken off-site to premises substantially distant from the physical location of web service 2102 to provide disaster protection. In a preferred embodiment, web service 2102 is backed up to fast disk storage media first before then being moved to tape to limit performance impact to web service 2102. Data backed up may also be moved by way of a communications link to a local or remote site of disk storage. In a preferred embodiment, a large cluster of Windows/2003 servers provide an excellent capability to serve massive numbers of simultaneous device heartbeats and web service 2102 accesses. All of web service 2102 features are preferably accessed over the internet, with the members area 2500 being accessed with https using an SSL certificate. Devices are targeted based on their situational locations and other configurations as described above. Virus protection and attack prevention is preferably incorporated at the public facing servers for web service 2102 on all data and communications there to web service 2102. Attack prevention is also incorporated in web service 2102 with SQL injection attack prevention (e.g. presence of special characters in string entry), denial of service attacks, buffer overflow attacks, and any other attack prevention that is known and is reasonable to incorporate.

The "Send Broadcast Messages" privilege is provided to devices for sending broadcast messages to PingPals willing to accept them. Using the many teachings above, the device can access privileges for who granted the "Send Broadcast Messages" privilege to it, or to the user of the device, for then looping on each grantor to send a prepared message for communicating to more than one device (or user) at the same time with the same message. For example, a user wants to let his PingPals know where he'll be that evening without having to call or send a message to each individually. The user prepares the message, invokes a broadcast request, and the message is automatically sent to all PingPals who have granted the "Send Broadcast Messages" privilege to the device sending the message (or to the user of the device). Sending a message (SMS message or email) is well known in the art. The feature discussed here is leveraging web service 2102 groups, privileges, and SMTP service to provide privileged broadcast functionality to a plurality of other users and devices of web service 2102. Continuing with the flowchart methods discussed above, a new broadcast option 4665 (e.g. FIG. 46B) is selected by the user. A suitable data entry broadcast specification page form is presented from web service 2102 to the user for specifying a group name field 8906 of a user's group record 8900 containing user(s) and/or device(s) that also happen to have granted the user with the "Send Broadcast Messages" privilege, along with a data entry field for the broadcast message. Preferably a plurality of the user's groups can be specified and additional users/devices can be added explicitly for receiving the broadcast message. Upon submittal, form validation is performed to assure the group(s) and any additional users or devices do indeed contain at least one appropriately privileged device to receive the broadcast, and data sent may also be validated. Successful validation as determined by an invoked broadcast processing page from web service 2102 then accesses all members of the group record(s) 8900 specified, along with the explicitly specified recipient users and/or devices. It is then determined which users and/or devices provided the sending user (invoker of new option 4665) with the "Send Broadcast Messages" privilege for elaborating to all privilege-granting target devices, and uses the data entry field to construct an SMTP message (SMS or email) to send to all target devices of the group using their record 6500 fields for preferred delivery (e.g. fields 6532, 6534, 6536, 6538).

Another embodiment will only permit users (rather than devices) to be recipients of the broadcast message. In this case the broadcast specification form validates that the user enters group name(s) of record(s) 8900 along with any additional users only which has granted privileges to the user. All user's who have granted the user sending the broadcast message with the "Send Broadcast Messages" from the user specified group(s) or explicitly added users will receive the broadcast. Upon constructing the broadcast message, the user account record 2900 fields (e.g. Email field) is used for receiving the broadcast.

In one use of web service 2102, a dating service is provided. Members interact through web service 2102 with PingPal configurations and can set PingSpots traveled by other users which meet situational location parameters and associated configurations for delivering the content of the PingSpot. Pingimeter Alerts can also be fun in configuring between PingPals. Web service 2102 becomes fun to use and provides reason to interact for developing relationships.

In another use, advertisers target user types, device types, situational locations, and other criteria for deeming a content delivery for the purpose of reaching an audience. A hit radius can be configured for deliverable content records 7000. A hit radius can be configured for PingSpots of records 7000. Pingimeters can also be configured with a radius for causing an alert (which is also a type of hit radius). A hit radius is preferably a fixed area, or fixed region in space, that mobile device 2540 travel to or through. The user who configured the hit radius can modify it and specify a different area or fixed region in space. In any case, features and functionality of web service 2102 occur when mobile device 2540 encounter the hit radius. In one embodiment, a hit radius can also be mobile. The user configures additional fields in records containing a hit radius so that the hit radius can take on a plurality of positions and/or size over time. In one embodiment, the user configures a plurality of hit radius sizes and/or locations for a plurality of different scheduled times (e.g. distinct times of a day, week, or month) with a single configuration. In another embodiment, a user uses a mathematical formula to plot the path of a hit radius with a speed to travel over the path (e.g. Cartesian coordinate system algebraic formula with a slope function), optionally with a start time and end time. Wherever a fixed location radius or hit radius has been used, various embodiments will provide additional fields for defining many hit radius configurations over time to prevent burdening a user with changing a configuration for the sole purpose of modifying a radius or hit radius. In another embodiment, any field of records 6500, 7000, 2900, 3000, joined records thereto or therefrom, or any other related data record or web service 2102, can be used as part of a configuration to dynamically change a hit radius over time. The hit radius and associated middle can be configured to be dynamic over time using any reasonable variables to affect changes.

Likewise, a device mobile interest radius may have additional configuration for being modified over time without burdening the user from constantly changing his interest radius. The user can configured his interest radius for unique sizes based on scheduled times/dates. In another embodiment, the user can have his device mobile interest radius dynamically change its size based on a current situational location. For example, the user can configure his mobile interest radius to be 500 feet when within certain major cities, but then set to 5 miles when well beyond city limits. This could be territory configurations, or proximity to a location configurations, etc. This allows users to configure one time all useful interest radiuses based on future device situational locations. In other embodiments, the user can configure any criteria about his situational location for affecting the size of his interest radius while mobile. In another example, the user may configure that a threshold number of content deliveries based on his interests and/or filters automatically decrease (or increase) the interest radius (e.g. decrease to prevent receiving too much content for farther away situational locations, or increase to attempt to receive more content). In another embodiment, any field of records 6500, 7000, 2900, 3000, joined records thereto or therefrom, or any other related data record or web service 2102, can be used as part of a configuration to dynamically change a mobile interest radius over time. The interest radius can be configured to be dynamic over time using any reasonable variables to affect changes.

In one embodiment of web service 2102, a subset of record 6500 fields are maintained at a user account level (i.e. records 2900/3000) for affecting configuration of devices. This allows a user with a plurality of devices to modify data (e.g. interests, filters, etc) in one place for all his devices. Any reasonable record 6500 fields are movable to a record 3000.

The "Affinity Delegate" privilege can be used wherever logon is requested, for example at web service 2102 logon processing, or at device accesses to the Delivery Manager 2510. A user with the "Affinity Delegate" privilege may logon to the members area 2500 of web service 2102 to find not only his own data configured though web service 2102, but also data of users who provided the "Affinity Delegate" privilege to him. Preferably after a successful logon, all users who have assigned the "Affinity Delegate" privilege to him appear in a dropdown made available to the My GPS interface (e.g. FIG. 46B) in the top left-hand corner. The user selects a user from the dropdown which then makes all members area interfaces adapt as though that selected user were logged on to the members area. The logon data evidence would be modified upon selection of a different user from the dropdown to ensure FIG. 39 access control processing uses the information for the selected user who granted the "Affinity Delegate" privilege. This way all members area pages treat the user as though he was in fact the one logged on. The users actual logon name also appears in the dropdown for being able to go back to his own logon data evidence for interfacing to members area pages. Preferably, the dropdown with the selected user logon name appears with all members area pages to always remind the user who he is currently acting on behalf of. The "Affinity Delegate" privilege allows users to manage records in web service 2102 on behalf of other users.

The "Affinity Delegate" privilege can be also be used for accesses by a device to the Delivery Manager 2510 with device name (Deviceid field 6504) and device password (PW field 6506). A device with the "Affinity Delegate" privilege may access the Delivery Manager to find a dropdown presented to an interface, for example the browser version of the Delivery Manager, containing all devices which provided the "Affinity Delegate" privilege to his device (user to user, user to device, device to device, and device to user assignments are used to elaborate all devices which have ultimately granted the privilege to the device). Preferably after a successful Delivery Manager access, all devices which have assigned the "Affinity Delegate" privilege to the accessing device see a dropdown made available. The user selects a device from the dropdown which then makes all Delivery Manager interfaces adapt as though that selected device were used to access the Delivery Manager. The device data evidence would be modified upon selection of a different device from the dropdown. This way subsequent Delivery Manager interactions treat the device as though it was in fact the one accessing the Delivery Manager. The actual device name also appears in the dropdown for being able to go back to it. Preferably, the dropdown with the selected device name appears with all applicable Delivery Manager interfaces to always remind the user which device he is currently using to web service 2102.

While Pingimeters have associated actions caused upon an arrival or departure of a mobile device 2540, PingSpots and deliverable content records may also have associated actions. When a mobile device travels to a targeted area (or region in space) for a PingSpot or deliverable content record, actions can be defined in a similar manner. Depending on the command configured, or the embodiment of a command itself, any action or plurality of actions can be performed as the result of a mobile device 2540 encountering a PingSpot or deliverable content record targeted situational location. Features of web service 2102 that are currently unique to one form of a triggered or automated delivery are easily incorporated to the other forms of triggered or automated deliveries, and are therefore assumed for incorporation. Any time a content delivery is determined for a device, an action or plurality of actions configured with the content can also take place. In one embodiment, the content delivered includes a script or executable which contains configurable actions. In another embodiment, a field such as field 9508 is provided to a record 7000. DCDB records, PingSpot records, Pingimeter records and registered action records can each have one or more situational locations configured for it to determine delivery. DCDB records, PingSpot records, Pingimeter records and registered action records can each have one or more alert types configured for it, with or without associated delivered content, and alerts can be delivered to users (or devices) involved in web service 2102 configuration that causes the alert(s), or any other user (or device) capable of receiving a distribution (email, SMS message, or the like). Situational location criteria for DCDB records, PingSpot records, Pingimeter records and registered action records can have situational locations further clarified with additional fields from, or in, records 6500, 7000, other record fields of web service 2102, or any other criteria to specifically define the situation of the situational location for triggering criteria of a content delivery or alert.

Content deliveries by situational location may also be authenticated. When a delivery by situational location is made to a device, the recipient may be forced to identify himself as a valid recipient. This can be done with credentials sought that are passed with content, or as a well known process for specifying anticipated credentials upon delivering content. The delivery will not occur unless the recipient shows authenticity of who he is that is receiving the content. DelivFlags field 7036 functionality is to be incorporated at appropriate blocks of processing per descriptions above.

Various billing models may be used with web service 2102 depending on the application. They include:

Billing the recipient for each delivery, or some bulk number of deliveries, made according to web service 2102 configurations (this requires gathering additional information about recipients (e.g. Pingers);

Billing the content providers for each delivery, or some bulk number of deliveries, made according to successful content deliveries made by web service 2102; or Subscriptions to use web service 2102 functionality by any subset of user types discussed.

The preferred embodiment makes web service 2102 free to all users except content providers in a publicly accessed advertising related application, and enforces user based subscriptions in certain special applications.

Server check frequency may be configured beyond just a simple fixed period. For example, server check frequency determines the time intervals by which to send a device heartbeat to FIG. 120 processing. The server check frequency may have additional configuration for being modified over time without burdening the user from constantly changing it. The user can configured a server check frequency for unique heartbeat intervals based on scheduled times/dates. In another embodiment, the user can have a server check frequency dynamically change its frequency of occurrence based on a current situational location. For example, the user can configure a server check frequency to be every 2 seconds when within certain major cities, but then set to every 10 seconds when well beyond city limits. This could be territory configurations, or proximity to a location configurations, etc. This allows users to configure one time all useful server check frequencies on future device situational locations. In other embodiments, the user can configure any criteria about his situational location(s) for affecting the server check frequency while mobile. In one embodiment, all mobile devices 2540 are set with a server check frequency which is not configurable at all by the user. In another embodiment, any field of records 6500, 7000, 2900, 3000, joined records thereto or therefrom, or any other related data record or web service 2101, can be used as part of a configuration to dynamically change a server check frequency over time. The server check frequency can be configured to be dynamic over time using any reasonable variables to affect changes.

The movement tolerance can also affect when device heartbeats are sent to web service 2102. A heart beat will not be sent to web service 2102 unless the mobile device 2540 has moved at least as much as the movement tolerance. In the preferred embodiment, the movement tolerance involves comparing a previous location of mobile device 2540 with a subsequent location of mobile device 2540. In another embodiment, a movement tolerance can be an amount of movement such as an elapsed time of any movement. In yet another embodiment, a movement tolerance can be configured to dynamically change based on user configurations for scheduling, preferences, territory, etc, in a similar manner to heartbeat and server check frequencies described above. In another embodiment, any field of records 6500, 7000, 2900, 3000, joined records thereto or therefrom, or any other related data record or web service 2101, can be used as part of a configuration to dynamically change a movement tolerance over time. The movement tolerance can be configured to be dynamic over time using any reasonable variables to affect changes.

In a further embodiment, a movement tolerance configuration, heartbeat configuration and/or server check frequency configuration can be configured together as part of the same unit of dynamic control for dynamic behavior of all three configurations together.

Heartbeats may be intermittently sent to web service 2102 in response to devices sensed at locations as they come in proximity to sensing means (e.g. U.S. Pat. Nos. 6,389,010 and 5,726,984 (Kubler et al)). Heartbeats are generic in that web service 2102 does not anticipate when a heartbeat will arrive. Web service 2102 processes device heartbeats when they are received, regardless of how timely they are, and regardless of the system originators of them. The heartbeat will contain enough information for how to deliver the content to the particular device, either by order of protocol, data contained in the heartbeat, or both. Heartbeats are not caused by a user through a user entering location information to a user interface. They are automatically system generated by some automatic location detection means typically without the user being concerned (or aware of in many cases) when they are being generated and sent to web service 2102. Automatic location detection means causes the sending of device heartbeats to web service 2102.

Currently, there are GPS systems in computers, Tablet PCs, PDAs, and wireless phones. Sometimes content will be delivered by situational location to a mobile device that is significantly far from a destination that the delivered content is associated with. It would be nice to provide the mobile user with a pushpin graphic on a local map of a destination associated with the content, and then provide automated narrated directions to the pushpin from the user's current location using current GPS technology. The delivered content may be configured with a situational location that covers a broad geographic area. If an advertisement is sent to the mobile device by its situational location that is intended to entice the user to travel to a destination, then directions to the destination from the mobile device location is desirable. While this information could also be delivered over a wireless connection as part of the content, it is better performance to simply send a pushpin location for processing by the local GPS system for directions. Therefore, a record 7000 can deliver a pushpin location as part of the content delivered by situational location to the mobile device. The pushpin location can be a latitude/longitude combination, physical address, MAPSCO address, or any other description for uniquely identifying a location on a map. When content is delivered by situational location, its a better performing solution to minimize information transmitted over a wireless internet connection. By transmitting a pushpin location to the mobile device for narrative direction processing by the mobile device itself, less narrative direction content is sent over the wireless connection.

So, content is sent to mobile devices depending on their situational locations. Pushpin locations can be sent as part, or all of the content. The pushpin conveniently provides a graphic to display on the local GPS map, and is preferably integrated with landmark point processing of the GPS application or service. The user can then use a conventional GPS system for guided directions for traveling to the pushpin location. Alternatively, the user simply selects the pushpin, and guided narratives directions are provided in forms well know in the art for guiding the mobile user to the pushpin location from his current location. The preferred embodiment will prevent user interaction for guidance to the pushpin location from the current user's location.

Some wireless phones may not have a microbrowser, or may have a user that does not want to use a microbrowser, or have a user that does not have an internet plan with their cell phone. Wireless connections may also be slow. Minimizing delivered content is preferable. Methods are needed for a good experience using such devices with web service 2102. Messages can be delivered directly to the person's phone mail, providing a unique ringing (e.g. by caller id), and/or playing an automated message to the person who answers the cell phone that has traveled to a situational location. The user can interface completely with voice commands to a web service 2102 for configuring content delivery method(s), interests or filters, and other record 6500 fields, and then participate in receiving content by his situational location. For delivery to the user's phone mail, text can be processed to voice for leaving a voice recording, or alternatively a voice recorded message already configured as content is delivered. The cell phone's normal notification of a newly delivered message then notifies the user. Depending on the user's configurations, a unique cell phone ring is provided for content delivered by situational location. In one embodiment, the wireless provider provides the unique cell phone ring with the service. In another embodiment, the cell phone recognizes a programmed caller id to provide the unique phone ring. Depending on the user's configuration, the user's cell phone can be automatically called with automated message content. Textual content can be converted to voice, or the content may already be a recording for play.

Content configured for situational locations may be expensive (by subscribed plan, or by performance measurements) in transmission. A method may be needed to minimize transmission, and to minimize costs associated with doing a content transmission. Content can be delivered to the device in a minimal form for further delivery processing by the receiving device. The receiving device maintains a cache which can be refreshed by a LAN (Local Area Network) connection, a high speed hot spot 802.11 connection, or any communications connection that provides better performance than the connection by which content is delivered to the wireless device by situational location. For example, a real estate multiple listing service database provides real estate listings as mobile users travel to situational locations that are configured with deliverable content. It may be "expensive" to deliver graphics, and large amounts of text to the devices. In one embodiment, a unique listing entry identifier is delivered to the mobile device upon traveling to a configured situational location, and subsequent processing by the mobile device itself retrieves the MLS (Multiple Listing Service) data using the entry identifier, or by way of a higher speed connection or local access. The mobile device refreshes locally maintained data when it is opportune to do so at hotspots, other fast connections, or the like. Database entries have unique identifiers. This methodology is not limited to MLS. The only requirement is to have a deliverable content database with unique handles for uniquely identifying the entries accessed by the local receiving device. So, entry ids are delivered as the content (or part thereof), and the device is then responsible for delivering the details of the content. In cases where the entry identifier is known, receiving device processing is straightforward. In cases where the entry identifier is unknown, for example because of a newly configured deliverable content database entry at the remote service, or because the device had not been refreshed recently, the content can be delivered over the usual wireless connection, or an indicator is delivered for indicating to do a refresh. Preferably, the user can control what happens as disclosed above for local cache management. The device local cache can be updated by a hot-spot which variably determines whether the information can be processed in detail by the mobile device. Alternatively, new content is wirelessly communicated (trickle updates) as appropriate, or indicator(s) can be sent to the user to inform the user to do a refresh. So, in the MLS example above, listings are presented to the user's device as it is mobile. Web service 2102 is delivering a minimal amount of information such as a unique MLS identifier which is then used locally by the device to access the MLS database to present details.

There are many other applications and/or embodiments where a minimal amount of information can be delivered to the device for more detailed processing by the device to ultimately present the information to the user at the device.

Currently, WAP devices have XML defined WML encoding to solve user interfaces for such small displays. It would be nice to provide a large display to any cell phone so full web browsing is possible to web service 2102. Cell phone mobile devices 2540 preferably include an RGB (Red/Green/Blue) projector. The cell phone provides internalized integration of RGB projection of a displayable image that would otherwise (or additionally) be displayed in the LCD (Liquid Crystal Display) of the phone. The cell phone user points the directed output light for the displayable image which is scaled and projected to a targeted surface. The strength of the light source will dictate how far the target surface can be from the projecting phone. Preferably, the resulting image will provide an area large enough for full web browsing to web service 2102, or at least the size of PDA web browsing, for example as used by Pocket Internet Explorer devices. In alternate embodiments, camera snapshots, video footage, or anything that could be displayed on the phone will also display in the image.

In one embodiment of web service 2102, users do not have to configure anything to participate in the content delivery by situational location. An entire telecommunications company mobile phone directory is easily imported to server data 2104 records 6500 with appropriate defaulted fields. Software can be already installed on mobile phones 2540, or downloaded by a user after purchasing the mobile phone, for transmitting timely heartbeats containing whereabouts to web service 2102. Based on a phone service plan of the mobile phone subscriber, content can be delivered to the phone as he is mobile. There are always options for providing a subset of the interfaces described above for further personalizing the experience to web service 2102.

When a user toggles an option to enable or disable content delivery by situational location, the preferred embodiment simply starts or terminates Delivery Manager processing, or he starts or terminates the processing which sends heartbeats to FIG. 120 processing. An appropriate device user interface is provided. In another embodiment, the ActiveDev field 6550 is set to No for disabled, or Yes for enabled.

In a preferred embodiment for enhancing mobile device locations, well known cell tower locations complement GPS coordinates received when locating devices. Cell tower or antenna triangulation, or cell tower communications information can further refine the whereabouts of mobile devices 2540. An environment which couples multiple location technologies together can provide better accuracy for device locations.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A data processing method comprising:

determining a first situational location with a first automatically detected location of a first mobile data processing system;

receiving content from said first mobile data processing system;

determining a region around said detected location of said first mobile data processing system, wherein said region is defined by a circle having a radius that is user configurable;

determining a second situational location with a second automatically detected location of a second mobile data processing system, where said second mobile data processing system has a predefined relationship to said first mobile data processing system and the relationship is known to the data processing system, or a second user of said second mobile data processing system has a predefined relationship to a first user of said first mobile data processing system, and the relationship is known to the data processing system;

determining that said second mobile data processing system is within said region; and sending said content to said second mobile data processing system.

2. The method of claim 1 wherein said first automatically detected location is automatically detected using global positioning system data.

3. The method of claim 1 wherein said first automatically detected location is automatically detected using a radio wave triangulated location.

4. The method of claim 1 wherein said first automatically detected location is automatically detected using a network cell identifier.

5. The method of claim 1 wherein said first automatically detected location is automatically detected using proximity to a location.

6. The method of claim 1 wherein said first automatically detected location is automatically detected using a phone number.

7. The method of claim 1 wherein said first automatically detected location is automatically detected using a network address.

8. The method of claim 1 wherein said second automatically detected location is automatically detected using global positioning system data.

9. The method of claim 1 wherein said second automatically detected location is automatically detected using a radio wave triangulated location.

10. The method of claim 1 wherein said second automatically detected location is automatically detected using a network cell identifier.

11. The method of claim 1 wherein said second automatically detected location is automatically detected using proximity to a location.

12. The method of claim 1 wherein said second automatically detected location is automatically detected using a phone number.

13. The method of claim 1 wherein said second automatically detected location is automatically detected using a network address.

14. The method of claim 1 wherein said first mobile data processing system is a handheld mobile data processing system.

15. The method of claim 1 wherein said first mobile data processing system is a data processing system mounted to a mobile machine.

16. The method of claim 1 wherein said second mobile data processing system is a handheld mobile data processing system.

17. The method of claim 1 wherein said second mobile data processing system is a data processing system mounted to a mobile machine.

18. The method of claim 1 further including using a privilege granted by said second user of said second mobile data processing system to determine whether to receive said content sent by said first mobile data processing system.

19. The method of claim 1 further including using a privilege granted by a third user with an affinity privilege to act on behalf of said second user of said second mobile data processing system to determine whether to receive said content sent by said first mobile data processing system.

20. The method of claim 1 wherein said second data processing system has a user configured relationship to a third mobile data processing system and wherein said third mobile data processing system has a user configured relationship to said first mobile data processing system.

21. A data processing system, comprising:

means for determining a first situational location with a first automatically detected location of a first mobile data processing system;

means for receiving content from said first mobile data processing system;

means for determining a region around said detected location of said first mobile data processing system, wherein said region is defined by a circle having a radius that is user configurable;

means for determining a second situational location with a second automatically detected location of a second mobile data processing system, where said second mobile data processing system has a predefined relationship to said first mobile data processing system and the relationship is known to the data processing system, or a second user of said second mobile data processing system has a predefined relationship to a first user of said first mobile data processing system and the relationship is known to the data processing system;

means for determining that said second mobile data processing system is within said region; and means for sending said content to said second mobile data processing system.

22. A system, comprising:

a first mobile data processing system;

a second mobile data processing system;

a data processing system configured for:

- determining a first situational location with a first automatically detected location of said first mobile data processing system;
- receiving content from said first mobile data processing system;
- determining a region around said detected location of said first mobile data processing system, wherein said region is defined by a circle having a radius that is user configurable;
- determining a second situational location with a second automatically detected location of said second mobile data processing system, where said second mobile data processing system has a predefined relationship to said first mobile data processing system and the relationship is known to the data processing system, or a second user of said second mobile data processing system has a predefined relationship to a first user of said first mobile data processing system and the relationship is known to the data processing system;
- determining that said second mobile data processing system is within said region; and
- sending said content to said second mobile data processing system.

* * * * *